United States Patent [19] | [11] 4,267,458
Uram et al. | [45] May 12, 1981

[54] SYSTEM AND METHOD FOR STARTING, SYNCHRONIZING AND OPERATING A STEAM TURBINE WITH DIGITAL COMPUTER CONTROL

[75] Inventors: Robert Uram, East Pittsburgh; Theodore C. Giras, Pittsburgh, both of Pa.

[73] Assignee: Westinghouse Electric Corp., Pittsburgh, Pa.

[21] Appl. No.: 408,962

[22] Filed: Oct. 23, 1973

Related U.S. Application Data

[63] Continuation of Ser. No. 247,877, Apr. 26, 1972, abandoned, which is a continuation-in-part of Ser. No. 247,440, Apr. 25, 1972, abandoned, which is a continuation-in-part of Ser. No. 246,9 00, Apr. 24, 1972, abandoned.

[51] Int. Cl.[2] .................................... H02P 9/04
[52] U.S. Cl. .................................... 290/40 R; 60/646; 60/657; 60/660; 364/492; 364/494; 415/1
[58] Field of Search .................. 60/105, 73, 646, 657, 60/660–667; 290/40, 2, 52; 290/2, 40

[56] References Cited

U.S. PATENT DOCUMENTS

| | | | |
|---|---|---|---|
| 3,325,650 | 6/1967 | Barnes | 290/40 |
| 3,446,224 | 5/1969 | Zwicky | 290/40 |
| 3,552,872 | 1/1971 | Giras et al. | 290/40 |
| 3,561,216 | 2/1971 | Moore | 60/73 |
| 3,564,273 | 2/1971 | Cockrell | 290/40 |
| 3,588,265 | 6/1971 | Berry | 415/1 |
| 3,623,324 | 1/1971 | Eggenberger | 60/660 |
| 3,643,437 | 2/1972 | Birnbaum | 60/646 |
| 3,741,246 | 6/1973 | Braytenbah | 60/105 |

*Primary Examiner*—Gene Z. Rubinson
*Assistant Examiner*—John W. Redman
*Attorney, Agent, or Firm*—E. F. Possessky

[57] ABSTRACT

Steam flow and pressure conditions needed in a turbine to satisfy the speed and load demand of an electric power generating system are controlled by a programmed digital computer system during start-up, synchronization and load operation. Manual backup control is provided for the computer control. Throttle valve tests are provided under digital control and transfers are made to manual backup control if predetermined task errors occur.

15 Claims, 130 Drawing Figures

TABLE 1-1. TASK PRIORITY ASSIGNMENT

FIG. 9

| Level | Function | Frequency | Core Location |
|---|---|---|---|
| F | STOP/INITIALIZE | ON DEMAND | 2F40 |
| E | AUXILIARY SYNCHRONIZER | 0.1 SEC | 14BD |
| D | CONTROL | 1.0 SEC | 2730 |
| C | OPERATOR'S PANEL | ON DEMAND | 21B0 |
| B | ANALOG SCAN | 0.5 SEC | 16D0 |
| A | ATS-PERIODICS | 1.0 SEC | 4420 |
| 9 | LOGIC | ON DEMAND | 1962 |
| 8 | VISUAL DISPLAY | 1.0 SEC | 1E60 |
| 7 | DATA LINK | ON DEMAND | 3D10 |
| 6 | ATS-ANALOG CONVERSIONS | 5.0 SEC | 6960 |
| 5 | FLASH | 0.5 SEC | 15A0 |
| 4 | PROGRAMMER'S CONSOLE | ON DEMAND | 3000 |
| 3 | ATS-MESSAGE WRITER | 5.0 SEC | 6CA0 |
| 2 | ANALOG/DIGITAL TREND | 1.0 SEC | 3E70 |
| 1 | CCO TEST* | ON DEMAND | 0E80 |
| 0 | BATCH PROCESSORS** | ON DEMAND | 4000 |

*The CCO test task may be used only during maintenance and debugging periods, since this program overlays the data link program area.

**The batch processors may be used only on manual control and with the sync disabled; also, the sequence of events interrupt must be disabled since the batch processor programs overlay the ATS program area.

TABLE 1-2. CORE MAP 1—FINAL OPERATING VERSION

FIG. 10

| Starting Location | Program | Size Dec | Size Hex |
|---|---|---|---|
| 0 | FAM FAST ACCESS MEMORY | 32 | 20 |
| 20 | SEQUENCE OF EVENTS INTERRUPT | 32 | 20 |
| 40 | VALVE INTERRUPT | 96 | 60 |
| A0 | ZERO TABLE | 96 | 60 |
| 100 | SRI TABLE | 32 | 20 |
| 120 | PLANTCCI SUBROUTINE | 120 | 78 |
| 198 | SPEED CHANNEL 1 INTERRUPT | 47 | 2F |
| 1C7 | SPEED CHANNEL 2 INTERRUPT | 25 | 19 |
| 1E0 | CCO IMAGE TABLE | 32 | 20 |
| 200 | MONITOR | 3162 | C5A |
| E5A | MONITOR PATCHES | 6 | 6 |
| E60 | MONITOR SPARE | 32 | 20 |
| E80 | DATA LINK-SPARE TERMINAL | 16 | 10 |
| E92 | DATA LINK-DT INTERRUPT | 40 | 28 |
| EBA | DATA LINK-CONTROL WORDS | 10 | A |
| EC4 | DATA LINK-INPUT BUFFER | 10 | A |
| ECE | DATA LINK-OUTPUT BUFFER | 50 | 32 |
| F00 | SYSTEM LIBRARY | 618 | 26A |
| 116A | BREAKER OPEN INTERRUPT | 22 | 16 |

1710

1850

| Pushbutton | IPBX | Function |
|---|---|---|
| REF | 1 | Display REFERENCE in REF windows and DEMAND in DMD windows |
| ACCEL RATE | 2 | Display ACCELERATION RATE in REF windows and clear DMD windows |
| LOAD RATE | 3 | Display LOAD RATE in REF windows and clear DMD windows |
| LOW LIMIT | 4 | Display LOW LOAD LIMIT in REF windows and clear DMD windows |
| HIGH LIMIT | 5 | Display HIGH LOAD LIMIT in REF windows and clear DMD windows |
| VALVE POSITION LIMIT | 6 | Display VALVE POSITION LIMIT in REF windows and governor valve variable being limited in DMD windows |
| PARAMETER DISPLAY | 7 | Initiate display of internal control system variable; see operating instructions |
| VALVE STATUS | 8 | Initiate display of valve position; see operating instructions |

FIG. 31

B - SCAN BASIC DEH INPUTS - 1 SEC - 15 POINTS
TA5 - SCAN ATS PRESS INPUTS - 5 SEC - 15 POINTS
TA10 - SCAN ATS VIB INPUTS - 10 SEC - 15 POINTS
TA601 - SCAN ATS TEMP INPUTS - 60 SEC - 10 POINTS
TA602 - SCAN ATS TEMP INPUTS - 60 SEC - 10 POINTS
TA603 - SCAN ATS TEMP INPUTS - 60 SEC - 10 POINTS
TA604 - SCAN ATS TEMP INPUTS - 60 SEC - 10 POINTS
TA605 - SCAN ATS TEMP INPUTS - 60 SEC - 10 POINTS
TA606 - SCAN ATS TEMP INPUTS - 60 SEC - 10 POINTS
SP - SPAN/ADJUST COMPUTATION - 15 SEC -

| | | EXPECTED GEN. STATOR COIL DISCH. GAS OR $H_2O$ TEMP. RISE = | GEN. STATOR COIL DISCHARGE GAS OR $H_2O$ RISE LIMIT = |
|---|---|---|---|
| HYDROGEN COOLED GENERATORS | WITH SINGLE VENT STATOR COILS 60 PSIG RATED GAS PRESSURE | $36\left(\frac{74.7}{14.7+PSIG}\right)\left(\frac{ISA}{IS}\right)^2$ | $40+\left(\frac{60-PSIG}{7.5}\right)$ |
| | WITH DOUBLE VENT STATOR COILS 60 PSIG RATED GAS PRESSURE | $50\left(\frac{74.7}{14.7+PSIG}\right)\left(\frac{ISA}{IS}\right)^2$ | $55+\left(\frac{60-PSIG}{15}\right)$ |
| | WITH DOUBLE VENT STATOR COILS 75 PSIG RATED GAS PRESSURE | $50\left(\frac{89.7}{14.7+PSIG}\right)\left(\frac{ISA}{IS}\right)^2$ | $55+\left(\frac{75-PSIG}{15}\right)$ |
| | WITH WATER COOLED STATOR COILS 75 PSIG RATED GAS PRESSURE | $30\left(\frac{ISA}{IS}\right)^2$ | 35 |
| CONVENTIONALLY COOLED GENERATORS | | EXPECTED EMBEDDED STATOR COIL RTD RISE = $45\left(\frac{44.7}{18.7+RISE}\right)^{.68}\left(\frac{ISA}{IS}\right)^2$ | EMBEDDED STATOR COIL RTD RISE LIMIT = $50+\left(\frac{30-PSIG}{2}\right)$ |

CHART I (SEE NOTE 2)

NOTE 2. ISA = ACTUAL GENERATOR STATOR CURRENT
IS = GENERATOR STATOR CURRENT AT RATED VOLTAGE AND RATED HYDROGEN PRESSURE
PSIG = ACTUAL GENERATOR HYDROGEN PRESSURE

FIG. 67-9

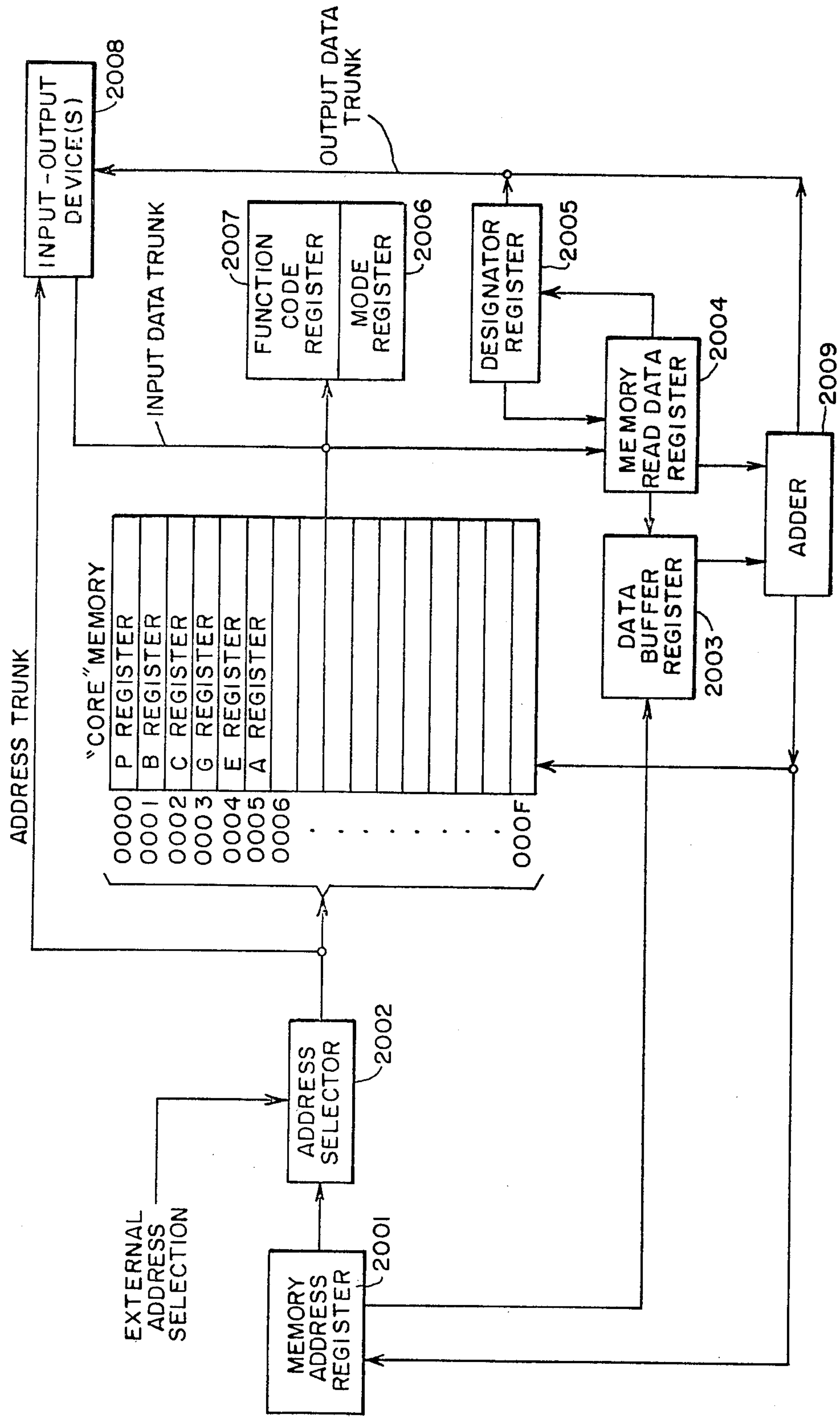
FIG. 70 ARITHMETIC AND LOGIC

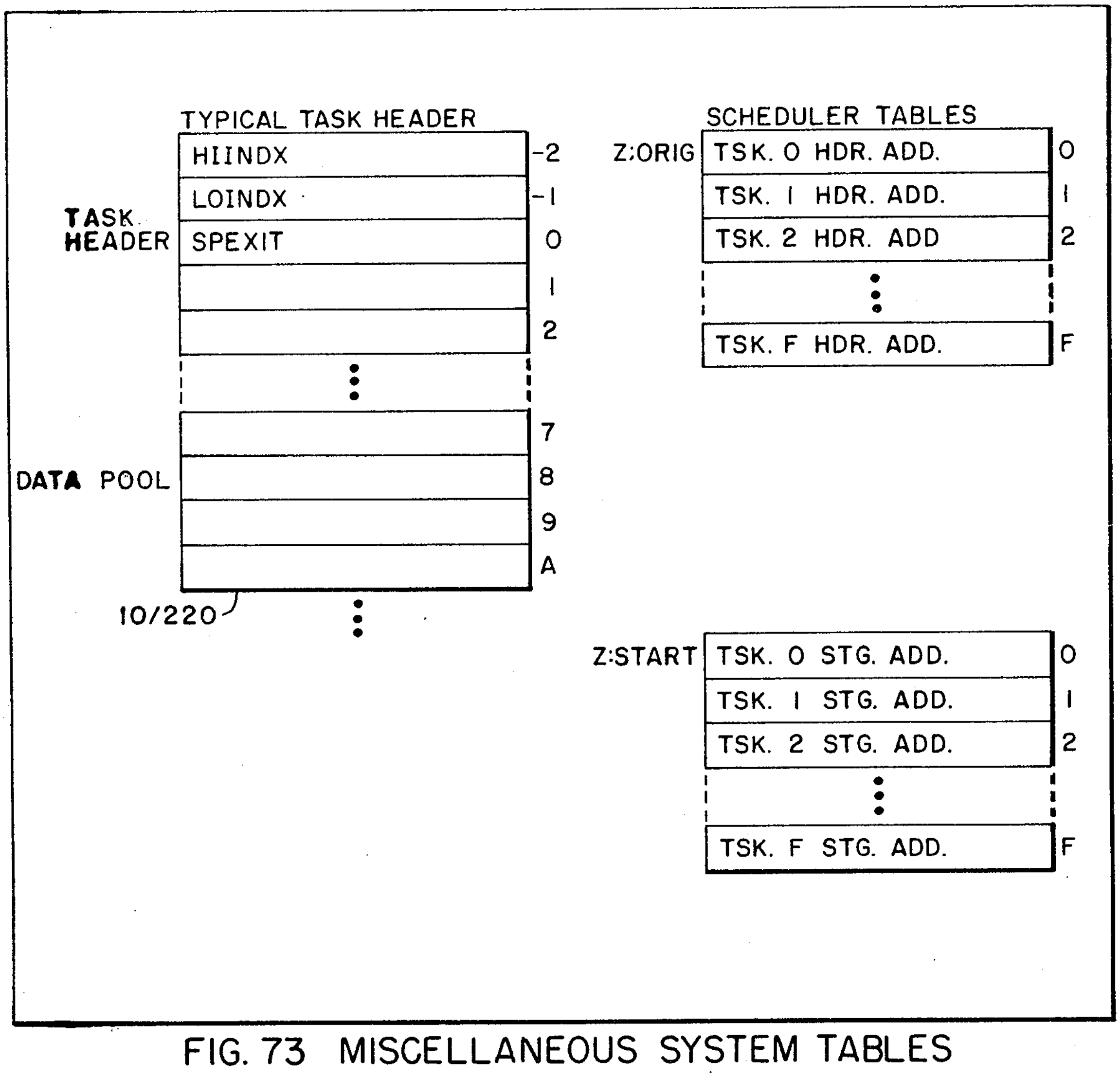
FIG. 73 MISCELLANEOUS SYSTEM TABLES

SYSTEM AND METHOD FOR STARTING, SYNCHRONIZING AND OPERATING A STEAM TURBINE WITH DIGITAL COMPUTER CONTROL

CROSS REFERENCE TO RELATED APPLICATIONS

This is a continuation of application Ser. No. 247,877 filed Apr. 26, 1972. Ser. No. 247,877 is a continuation-in-part of Ser. No. 247,440, entitled "Improved System and Method for Starting, Synchronizing and Operating a Steam Turbine with Digital Computer Control", filed by Theodore C. Giras and Robert Uram on Apr. 25, 1972 assigned to the present assignee and now abandoned. In turn Ser. No. 247,440 was a continuation-in-part of Ser. No. 246,900 entitled "General System and Method for Starting, Synchronizing and Operating a Steam Turbine with Digital Computer Control", filed by Theodore C. Giras and Robert Uram on Apr. 24, 1972 assigned to the present assignee and now abandoned.

1. Ser. No. 722,779, entitled "Improved System and Method for Operating a Steam Turbine and an Electric Power Generating Plant" filed by Theodore C. Giras and Manfred Birnbaum on Apr. 4, 1968, assigned to the present asignee, and continued as Ser. No. 124,993 on Mar. 16, 1971, and Ser. No. 319,115, on Dec. 29, 1972.

2. Ser. No. 247,597, entitled "System and Method for Operating a Turbine with Speed Channel Failure Detection System Applied to Digital Computer Control" filed by Francesco Lardi on Apr. 26, 1972, and assigned to the present assignee and continued as Ser. No. 407,011 on Oct. 1 6, 1973.

3. Ser. No. 247,577, entitled "System and Method for Initially Loading a Turbine Generator on Synchronization" filed by Francesco Lardi on Apr. 26, 1972, assigned to the present assignee and continued as Ser. No. 377,174 on July 6, 1973.

4. Ser. No. 247,883, entitled "System and Method for Tracking of Digital Controller and Manual Analog Controller for Operating a Steam Turbine with Digital Computer Control" filed by Francesco Lardi on Apr. 26, 1972, assigned to the present assignee and continued as Ser. No. 385,613 on Aug. 13, 1973.

5. Ser. No. 247,855, entitled "System and Method for Operating a Steam Turbine with Digital Computer Control Having Automatic Startup Combined with Speed and Load Control" filed by Manfred Birnbaum on Apr. 26, 1972 and assigned to the present assignee.

6. Ser. No. 247,847, entitled "System and Method for Operating a Steam Turbine with Digital Computer Control Having an Analog Backup System" filed by G. W. Berkebile on Apr. 26, 1972 and assigned to the present assignee.

7. Ser. No. 247, 878, entitled "System and Method for Operating a Steam Turbine with Digital Computer Control with Initial Load Increase on Synchronization" filed by Francesco Lardi and Robert Uram on Apr. 26, 1972 and assigned to the present assignee.

8. Ser. No. 247,600, entitled "System and Method for Operating a Steam Turbine with Digital Computer Control and with Improved Monitoring Capability" filed by Donald Jones on Apr. 26, 1972 and assigned to the prsent assignee.

9. Ser. No. 247,850, entitled "System and Method for Operating a Steam Turbine with Digital Computer Control with Accelerating Setpoint Change" filed by Andrew Braytenbah on Apr. 26, 1972, assigned to the present assignee and continued as Ser. No. 387,582 on Aug. 10, 1973.

10. Ser. No. 247,848, entitled "System and Method for Operating a Steam Turbine with Digital Computer Control Having Setpoint and Valve Position Limiting" filed by Gerald Waldron and Andrew Braytenbah on Apr. 26, 1972, assigned to the present assignee and continued as Ser. No. 385, 612 on Aug. 3, 1973.

11. Ser. No. 247, 880, entitled "System and Method for Operating a Steam Turbine with Digital Computer Control Having Absolute Value Limit Parameters" filed by Gerald Waldron on Apr. 26, 1972, assigned to the present assignee and continued as Ser. No. 377,173 on July 6, 1973.

12. Ser. No. 247,882, entitled "System and Method for Operating a Steam Turbine with Digital Computer Control Having Data Transmission to Additional Digital Computer" filed by Theodore C. Giras and Klaus Pasemann on Apr. 26, 1972, assigned to the present assignee and continued as Ser. No. 390,471 on Aug. 22, 1973.

13. Ser. No. 247,884, entitled "System and Method for Operating a Steam Turbine with Digital Computer Control Having Data Link with Another Computer" filed by Klaus Pasemann on Apr. 26, 1972, assigned to the present assignee and continued as Ser. No. 427, 281 on Dec. 21, 1973.

14. Ser. No. 247,866, entitled "System and Method for Operating a Steam Turbine with Digital Computer Control Having Monitor Parameter Conversion and Recording" filed by George Daum on Apr. 26, 1972, assigned to the present assignee and continued as Ser. No. 407,026 on Oct. 16, 1973.

15. Ser. No. 247,851, entitled "System and Method for Operating a Steam Turbine with Digital Computer Control Having Integrator Limit", filed by Andrew Braytenbah and Leaman Podolsky on Apr. 26, 1972, assigned to the present assignee and continued as Ser. No. 407,361 on Oct. 17, 1973.

16. Ser. No. 247,887, entitled "Systems and Method for Organizing Computer Programs for Operating a Steam Turbine with Digital Computer Control" filed by Robert Uram and Juan J. Tanco on Apr. 26, 1972, assigned to the present assignee and continued as Ser. No. 391,406 on Aug. 24, 1973.

17. Ser. No. 247,852, entitled "System and Method for Operating a Steam Turbine with Digital Computer Control Having a Turbine Simulator", filed by Robert Uram and Gerald Waldron on Apr. 26, 1972, assigned to the present assignee and continued as Ser. No. 396,160 on Sept. 11, 1973.

18. Ser. No. 247,854, entitled "System and Method for Operating a Steam Turbine with Digital Computer Controlled from an Operator Interface", filed by Richard Heiser and Anthony Scott on Apr. 26, 1972, assigned to the present assignee and continued as Ser. No. 407,025 on Oct. 16, 1973.

19. Ser. No. 247, 599, entitled "System and Method for Operating a Steam Turbine with Digital Computer Control Having Improved Operator Interface Layout", filed by Anthony Scott on Apr. 26, 1972, assigned to the present assignee and continued as Ser. No. 407,371 on Oct. 17, 1973.

20. Ser. No. 247,881, entitled "System and Method for Operating a Steam Turbine with Digital Computer Control Having Improved Display Functions" filed by Theodore C. Giras and Leaman Podolsky on Apr. 26, 1972, assigned to the present assignee and continued as Ser. No. 387,578 on Aug. 10, 1973.

21. Ser. No. 247,849, entitled "System and Method for Operating a Steam Turbine with Digital Computer Control Having Mode Selection", filed by Robert Uram on Apr. 26, 1972 and assigned to the present assignee.

22. Ser. No. 247,853, entitled "System and Method for Operating a Steam Turbine with Digital Computer Control Having Contingency Functions Therein", filed by Andrew Braytenbah and Leaman Podolsky on Apr. 26, 1972, assigned to the present assignee and continued as Ser. No. 404,057 on Oct. 5, 1973.

23. Ser. No. 247,551, entitled "System and Method for Operating a Steam Turbine with Improved Logic Task Functions in a Digital Computer Control", filed by Robert Uram on Apr. 26, 1972, assigned to the present assignee and continued as Ser. No. 407,024 on Oct. 16, 1973.

24. Ser. No. 247,885, entitled "System and Method for Starting, Synchronizing and Operating a Steam Turbine with Digital Computer Control Having Implementation for Rotor Bore Temperature Measuring" filed by Gerald Waldron on Apr. 26, 1972 and assigned to the present assignee.

25. Ser. No. 247,598, entitled "System and Method for Operating a Steam Turbine with Digital Computer Control Having Automatic Startup Sequential Programming" filed by Juan J. Tanco on Apr. 26, 1972 and assigned to the present assignee.

26. Ser. No. 189,322, entitled "System and Method for Operation of a Steam Turbine with Dual Hydraulic Independent Overspeed Protection" filed by James M. Fieglein and M. Csanady, Jr. on Oct. 14, 1971, and assigned to the present assignee.

27. Ser. No. 99,491, entitled "System and Method Employing a Digital Computer for Automatically Synchronizing a Gas Turbine or Other Electrical Power Plant Generator with a Power System" filed by John F. Reuther on Dec. 18, 1970, assigned to the present assignee and continued as Ser. No. 276,508 on July 31, 1972.

28. Ser. No. 99,493, entitled "System and Method Employing a Digital Computer for Automatically Synchronizing an Electric Power Plant Generator with a Power System" filed by T. J. Reed on Dec. 18, 1970, assigned to the present assignee and continued as Ser. No. 276,343 on July 31, 1972.

29. Ser. No. 247,888, entitled "Improved Turbine Speed Controlling Valve Operators" filed by John F. Reuther on Apr. 26, 1972, assigned to the present assignee and continued as Ser. No. 412,513 on Nov. 2, 1973.

30. Ser. No. 815,882, now U.S. Pat. No. 3,552,872 entitled "Computer Positioning Control System with Manual Backup Control Especially Adapted for Operating Steam Turbine Valves" filed by Theodore C. Giras and William W. Barns, Jr. on Apr. 14, 1969 and assigned to the present assignee.

31. Ser. No. 080,710, now U.S. Pat. No. 3,741,246 entitled "Steam Turbine System with Digital Computer Position Control Having Improved Automatic-Manual Interaction" filed by Andrew S. Braytenbah on Oct. 14, 1970 and assigned to the present assignee.

BACKGROUND OF THE INVENTION

The present invention relates to the elastic fluid turbines and more particularly to systems and methods for operating steam turbines and electric power plants in which generators are operated by steam turbines.

With respect to steam turbine control, prime mover turbine control usually operates to determine turbine rotor shaft speed, turbine load, and/or turbine throttle pressure as end control system variables. In the case of large electric power plants in which throttle pressure is steam-generating system controlled, turbine control is typically directed to the megawatt amount of electric load and the frequency participation of the turbine after the turbine rotor speed has been controllably brought to the synchronous value and the generator has been connected to the electric power system.

In addition to the conventional steam turbine generating system, another type of power generating system in which steam turbine control is needed is a combined cycle generating system. The combined cycle generating system involves a combination of heat sources and energy conversion apparatus organized to produce an electric power output. For example, gas turbines can drive generators and use their exhaust gases to supply heat for steam to be used in driving a steam turbine. A separate boiler can also be included in the system to provide steam generating heat. Electric power is supplied by separate generators driven by the turbines.

The end controlled plant or plant system variables and the turbine operation are normally determined by controlled variation of the steam flow to one or more of the various stages of the particular type and particular design of the turbine in use. In prime mover turbine applications such as drum type boiler electric power plants where turbine throttle pressure is externally controlled by the boiler operation, the turbine inlet steam flow is an end controlled steam characteristic or an intermediately controlled system variable which controllably determines in turn the end control system variables, i.e., turbine speed, electric load or the turbine speed and the electric load. It is noteworthy, however, that some supplemental or protective control may be placed on the end control variable by additional downstream steam flow control such as by control of reheat valving and to that extent inlet turbine steam flow control is not strictly wholly controllably determinative of the end controlled system variables under all operating conditions.

In determining turbine operation and the end controlled system variables, turbine steam flow control has generally been achieved by controlled operation of valves disposed in the steam flow path or paths. To illustrate the nature of the turbine valve control in general and to establish simultaneously some background for subsequent description, consideration will now be directed to the system structure and the operation of a typical large electric power tandem steam turbine design for use with a fossil fuel drumtype boiler steam generating system.

Steam generated at controlled pressure may be admitted to the turbine steam chest through one or more throttle or stop valves operated by the turbine control system. Governor or control valves are arranged to supply steam inlets disposed around the periphery of a high pressure turbine section casing. The governor valves are also operated by the turbine control system to determine the flow of steam from the steam chest through the stationary nozzles or vanes and the rotor blading of the high pressure turbine section.

Torque resulting from the work performed by steam expansion causes rotor shaft rotation and reduced steam pressure. The steam is usually then directed to a reheat stage where its enthalpy is raised to a more efficient operating level. In the reheat stage, the high pressure section outlet steam is ordinarily directed to one or more reheaters associated with the primary steam generating system where heat energy is applied to the steam. In large electric power nuclear turbine plants, turbine reheater stages are usually not used and instead combined moisture separator reheaters are employed between the tandem nuclear turbine sections.

Reheated steam crosses over the next or immediate pressure section of a large fossil fuel turbine where additional rotor torque is developed as intermediate pressure steam expands and drives the intermediate pressure turbine blading. One or more interceptor and/or reheater stop valves are usually installed in the reheat steam flow path or paths in order to cut off or reduce the flow of turbine contained steam as required to protect against turbine overspeed. Reheat and/or interceptor valve operation at best produces late corrective turbine response and accordingly is normally not used controllably as a primary determinant of turbine operation.

Additional reheat may be applied to the steam after it exits from the intermediate pressure section. In any event, steam would typically be at a pressure of about 1200 psi as it enters the next or low pressure turbine section usually provided in the large fossil fuel turbines. Additional rotor torque is accordingly developed and the vitiated steam then exhausts to a condenser.

In both the intermediate pressure and the low pressure sections, no direct steam flow control is normally applied as already suggested. Instead, steam conditions at these turbine locations are normally determined by mechanical system design subject to time delayed effects following control placed on the high pressure section steam admission conditions.

In a typical large fossil fuel turbine just described, 30% of the total steady state torque might be generated by the high pressure section and 70% might be generated by the intermediate pressure and low pressure sections. In practice, the mechanical design of the turbine system defines the number of turbine sections and their respective torque ratings as well as other structural characteristics such as the disposition of the sections of one or more shafts, the number of reheat stages, the blading and vane design, the number and form of turbine stages and steam flow paths in the sections, etc.

A variety of valve arrangements may be used for steam control in the various turbine types and designs, and hydraulically operated valve devices have generally been used for steam control in the various valving arrangements. The use of hydraulically operated valves has been predicated largely on their relatively low cost coupled with their ability to meet stroke operating power and positioning speed and accuracy requirements.

Turbine valve control and automatic turbine operation have undergone successive stages of development. With increasing plant sizes, mechanical-hydraulic controls have been largely subplanted by analog of electrohydraulic controllers sometimes designated as AEH controllers. The aforementioned Giras and Birnbaum Patent application, Ser. No. 319,115, provides a further description of the turbine control technology development and the earlier prior patent and publication art. The latter application discloses a programmed digital computer controller which generally provides improved turbine and electric power plant operation over the earlier prior art. U.S. Pat. No. 3,588,265 issued to W. Berry, entitled "System and Method for Providing Steam Turbine Operation With Improved Dynamics", and assigned to the present assignee, is also directed to a digital computer controller which provides improved automatic turbine startup and loading operations. U.S. Pat. No. 3,552,872 issued to T. Giras and T. C. Barns, Jr. entitled "Computer Positioning Control System With Manual Backup Control Especially Adapted For Operating Steam Turbine Valves", and assigned to the present assignee, discloses a digital computer controller interfaced with a manual backup controller. A general publication pertaining to turbine digital controllers has appeared in Electrical World Magazine.

At this point in the background writeup, it is noted that prior art citations are made herein in an attempt to characterize the context within which the presently disclosed subject matter has been developed. No representations are made that the cited art is the best art nor that the cited art is immune to alternative interpretations.

Generally, the earlier Berry and the earlier Giras and Birnbaum DEH turbine operating system comprise basic hardware and software elements and control loops which bear some similarity to a number of basic elements and loops described herein. However, the present disclosure involves improvements largely stemming from the combined application of principles associated with the turbine technology and principles associated with the computer and control technologies in the determination of a particular detailed system arrangement and operation. Thus, the earlier DEH is largely directed to central control concepts which, although implementable with conventional know-how, open up opportunities for improvement-type developments related to the more central aspects of turbine control and operation as well as the more supportive aspects of turbine control and operation including areas such as turbine protection, remote system interfacing, accuracy and reliability, computer utilization efficiency, operator interface, maintenance and operator training.

BRIEF DESCRIPTION OF THE DRAWINGS

FIG. 9 shows a table of program or task priority assignments in accordance with the principles of the invention;

FIG. 31 is a table of display buttons which is operable in accordance with the principles of the invention;

Figure 1:
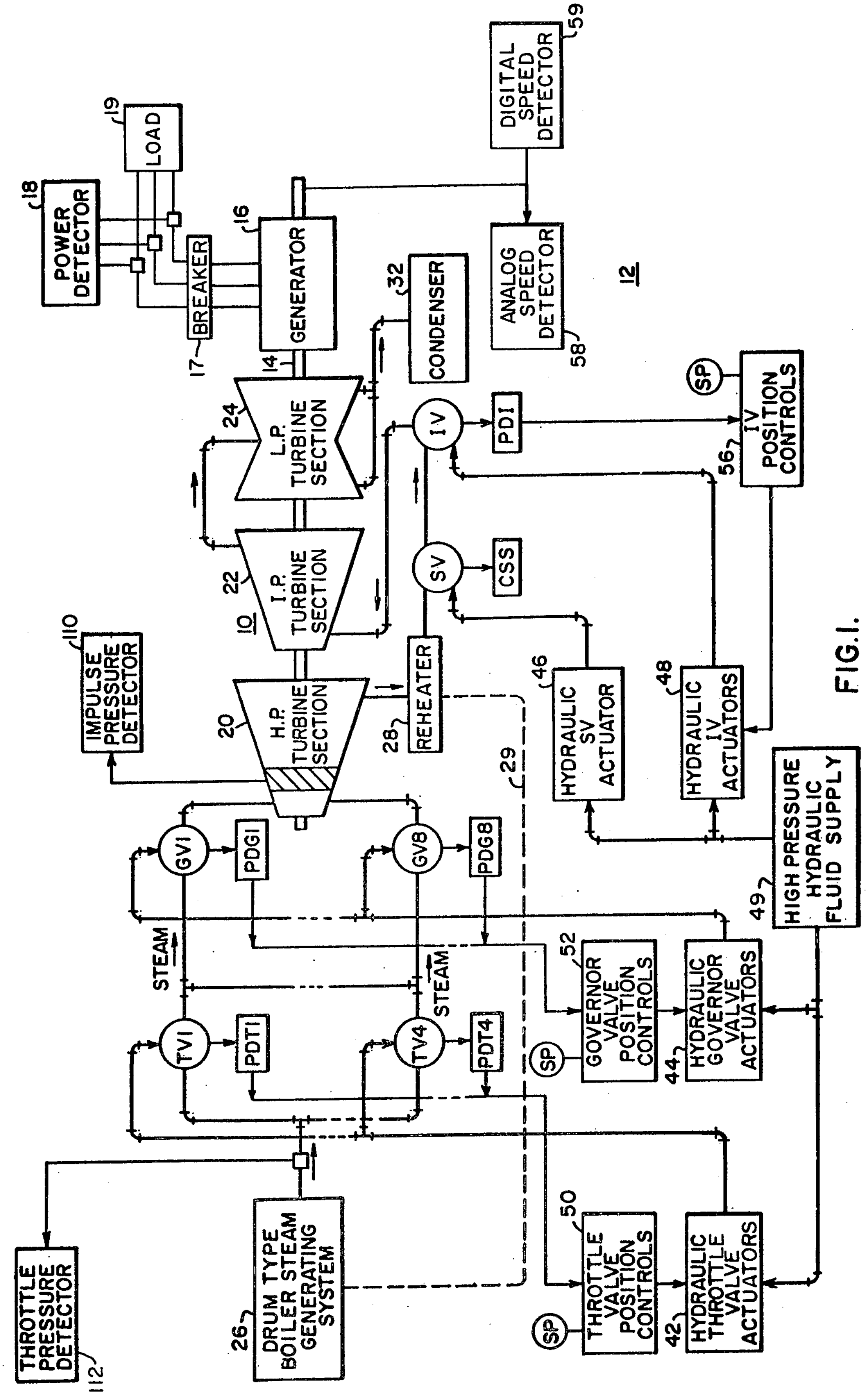
FIG. 1 shows a schematic diagram on an electric power plant including a large steam turbine and a fossile fuel fired drum type boiler and control devices which are all operable in accordance with the principles of the invention.
Figure 2:
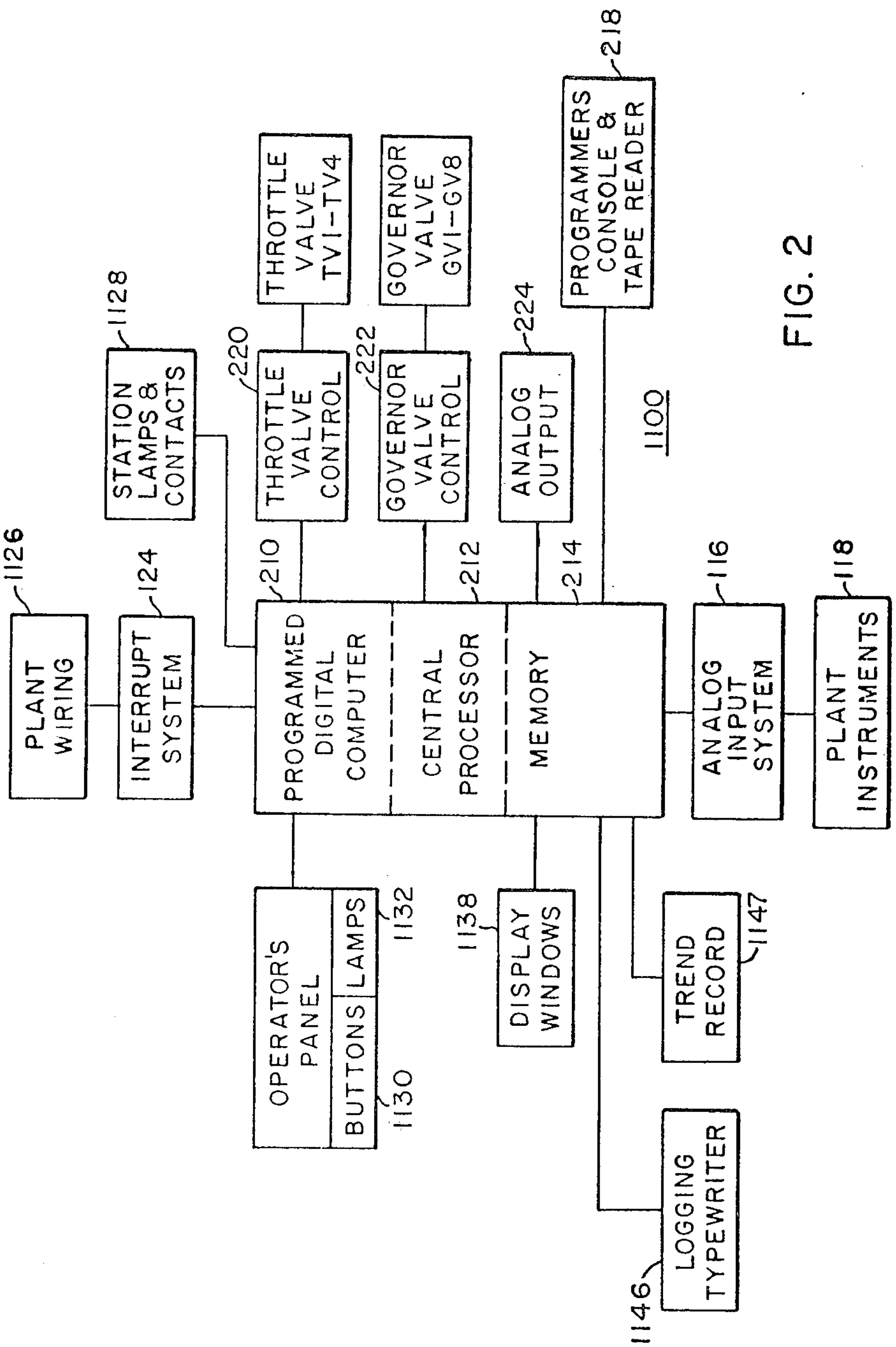
FIG. 2 shows a schematic diagram on a programmed digital computer control system operable with a steam turbine and its associated devices shown in FIG. 1 in accordance with the principles of the invention.
Figure 3:
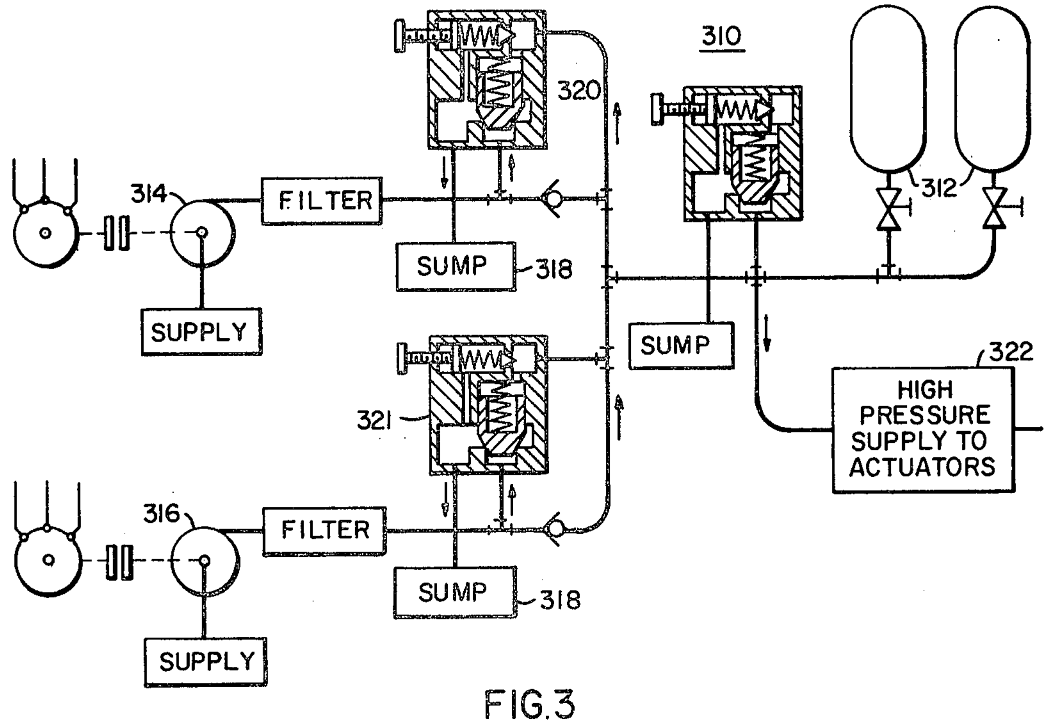
FIG. 3 shows a hydraulic system for supplying hydraulic fluid to valve actuators of the steam turbine.
Figure 4:
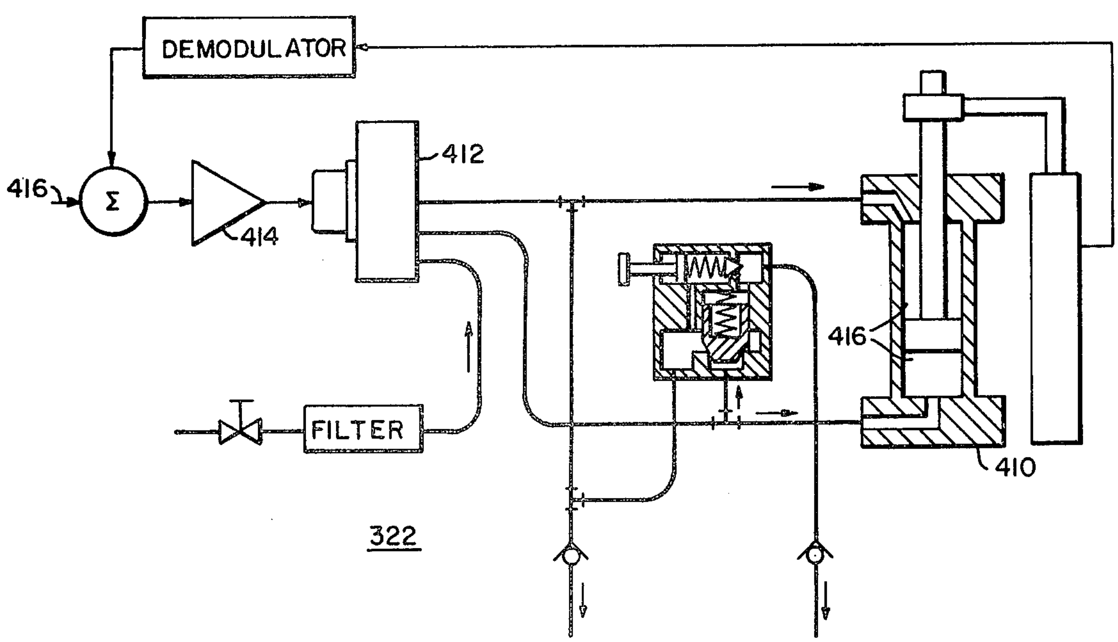
FIG. 4 shows a schematic diagram of a servo system connected to the valve actuators.
Figure 8:
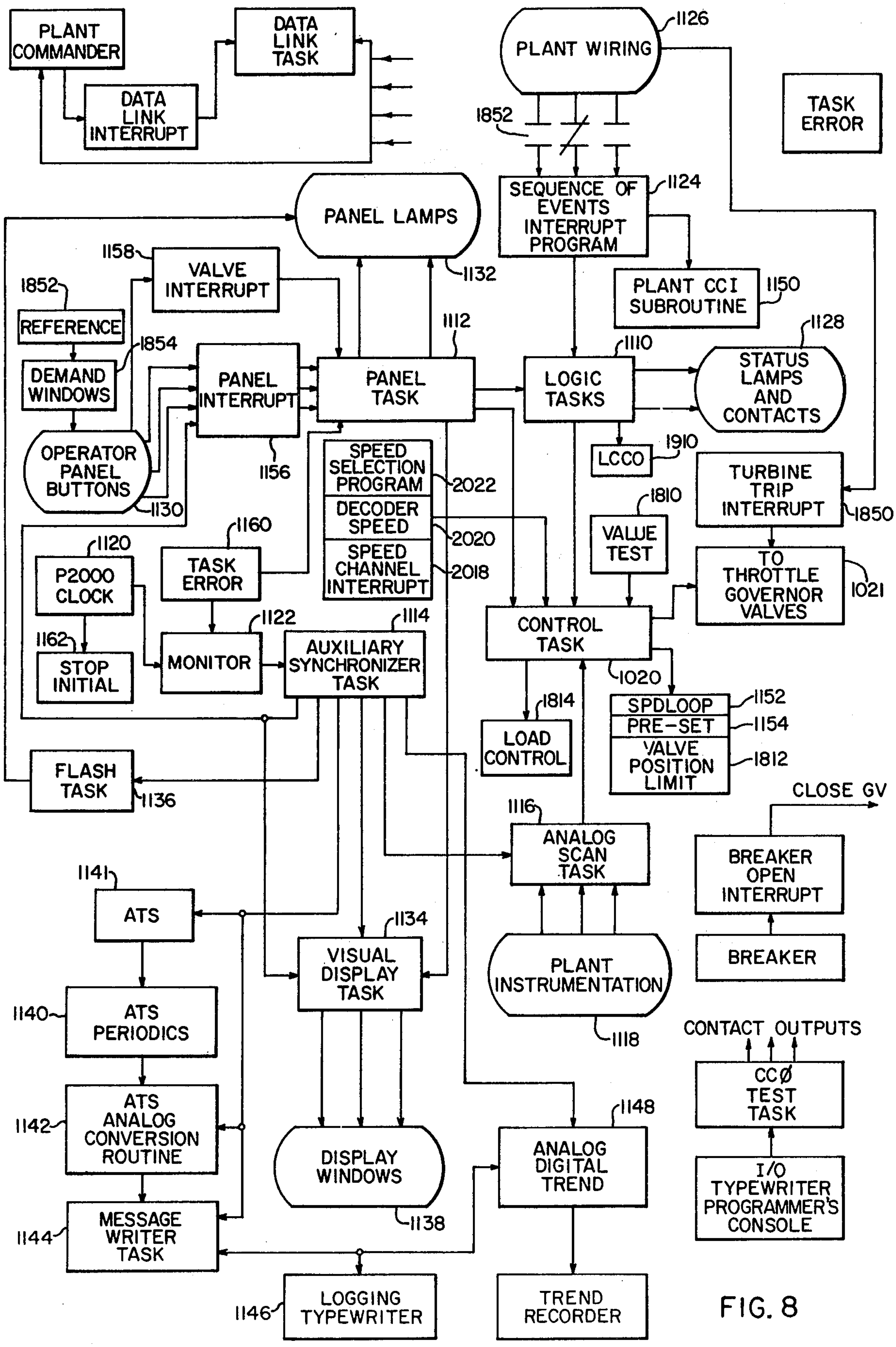
FIG. 8 shows a block diagram of the programs and subroutines of the digital Electro Hydraulic and the automatic turbine startup and monitoring program in accordance with the principles of the invention.
Figure 17:
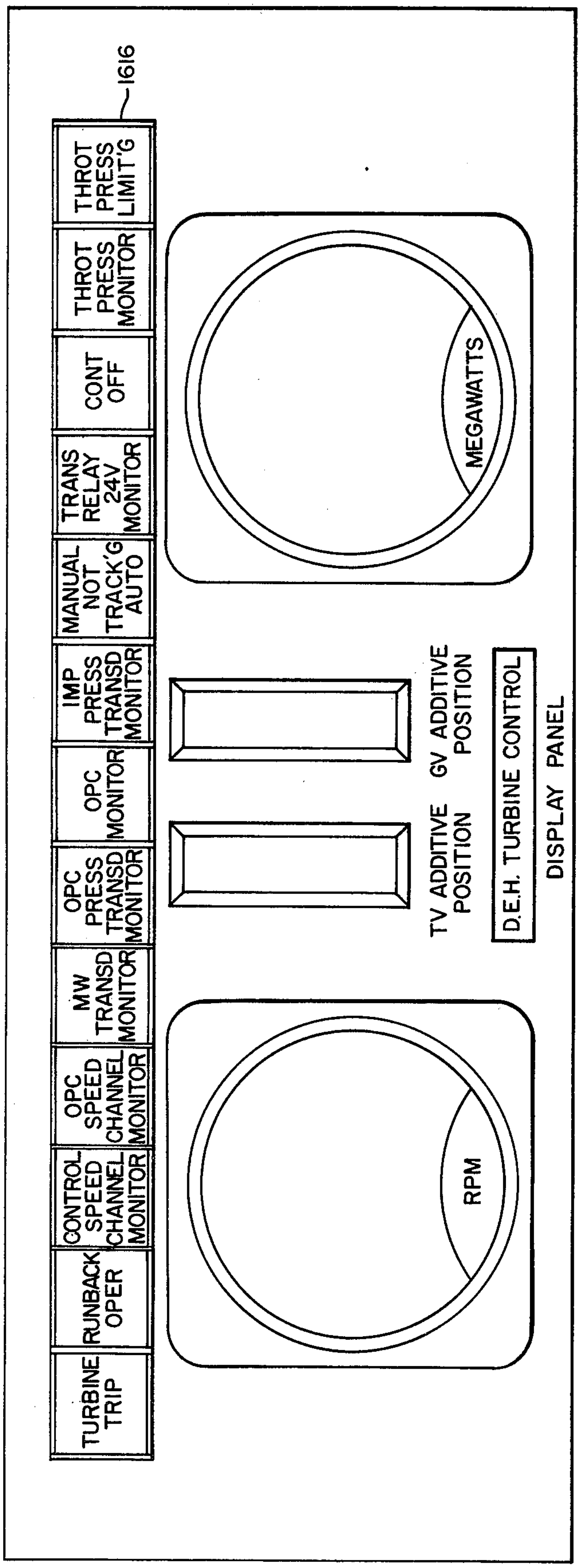
FIG. 17 shows a view of a part of an operator's control panel which is operable in accordance with the principles of the invention.
Figure 18:
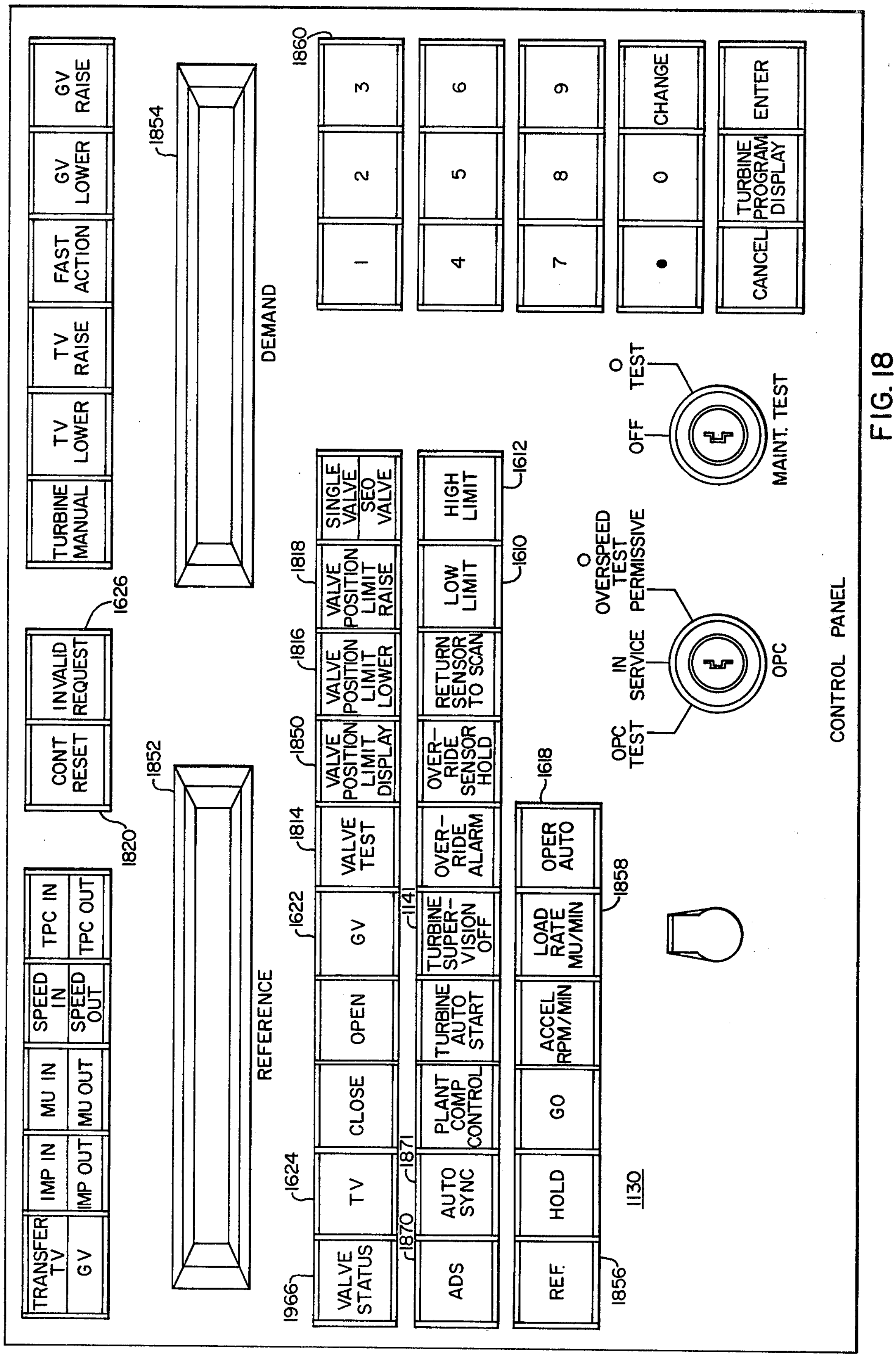
FIG. 18 shows a view of a part of the operator's control panel which is operable in accordance with the principles of the invention.
Figure 19:
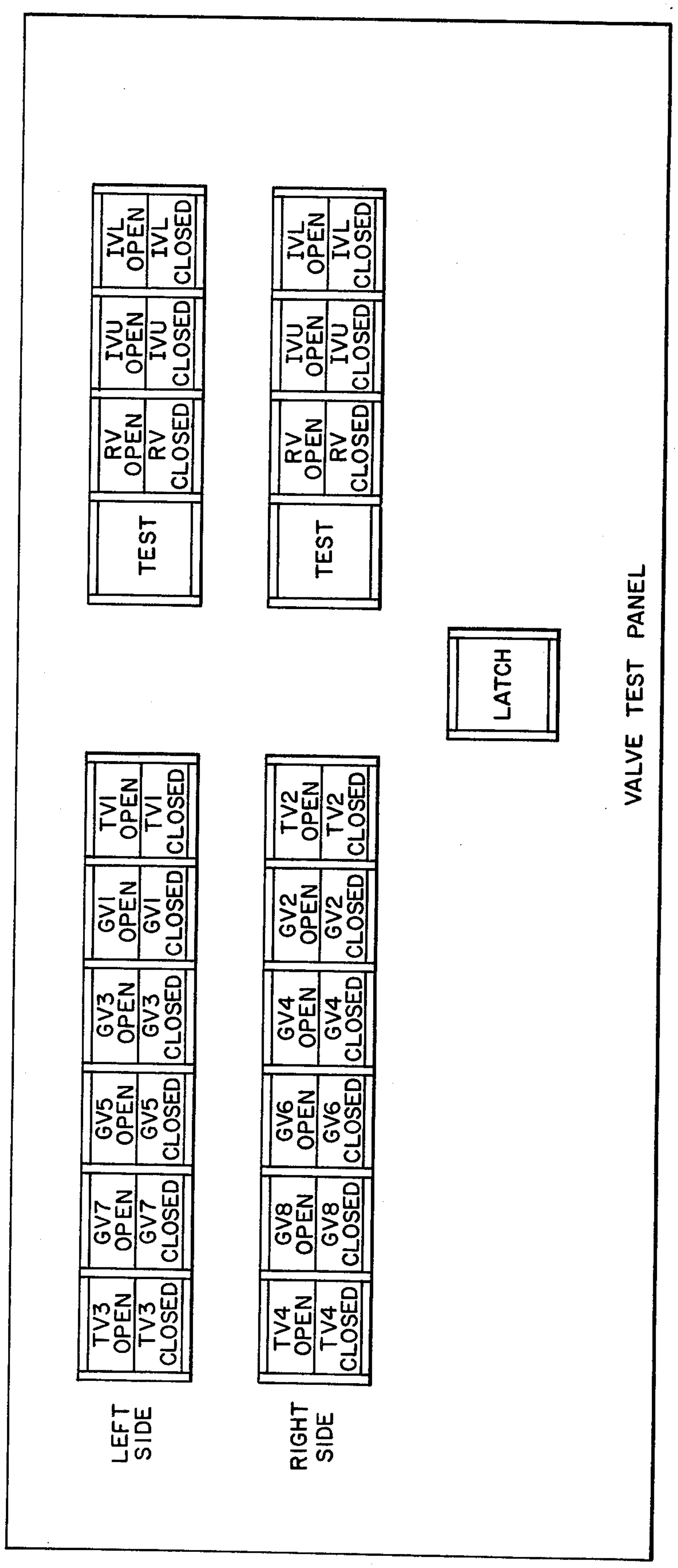
FIG. 19 shows a view of a portion of the operator's control panel which is operable in accordance with the principles of the invention.
Figure 57:
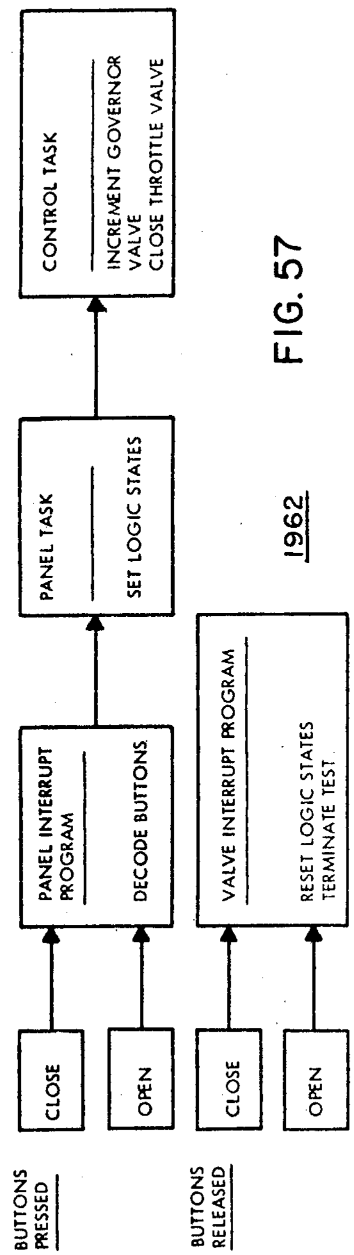
Figure 65A:
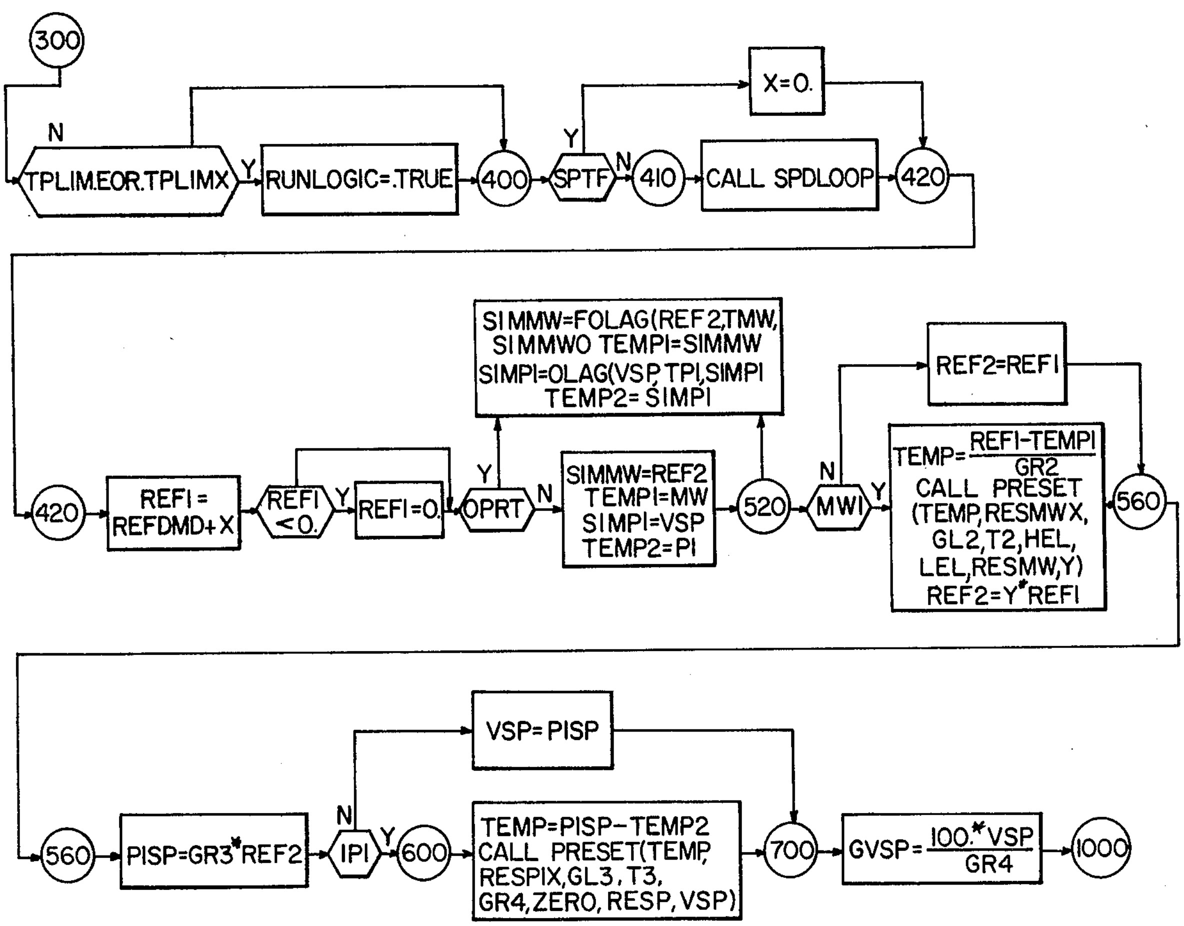
Figure 58:
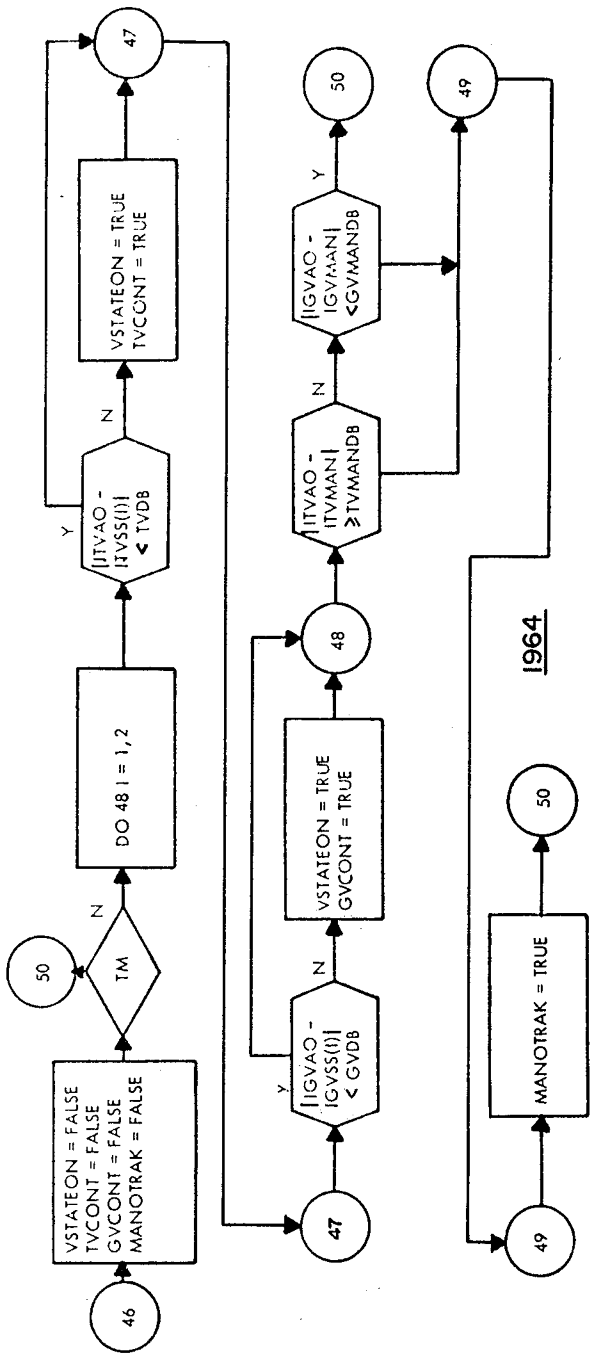
Figure 59:
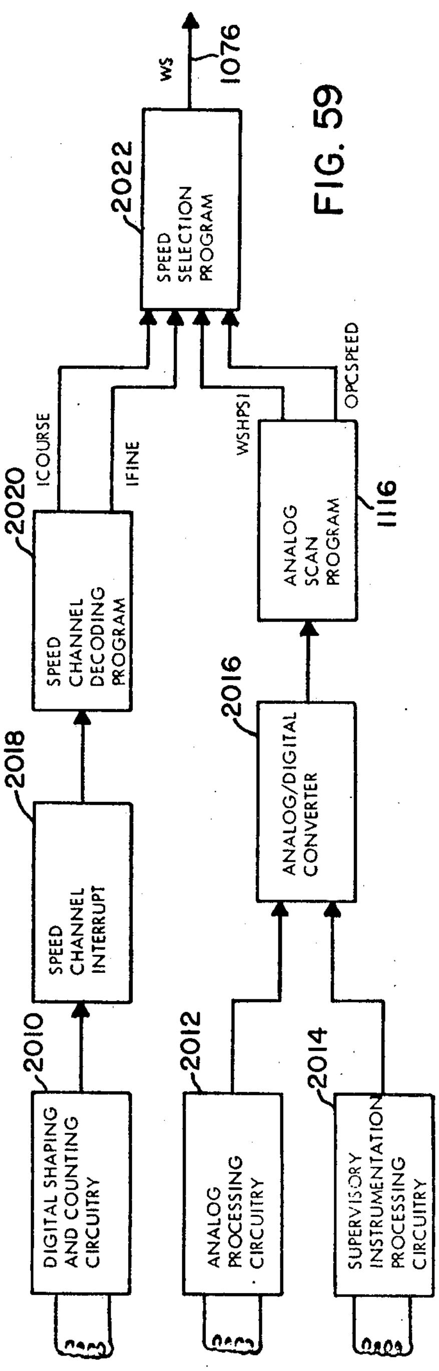
Figure 61:
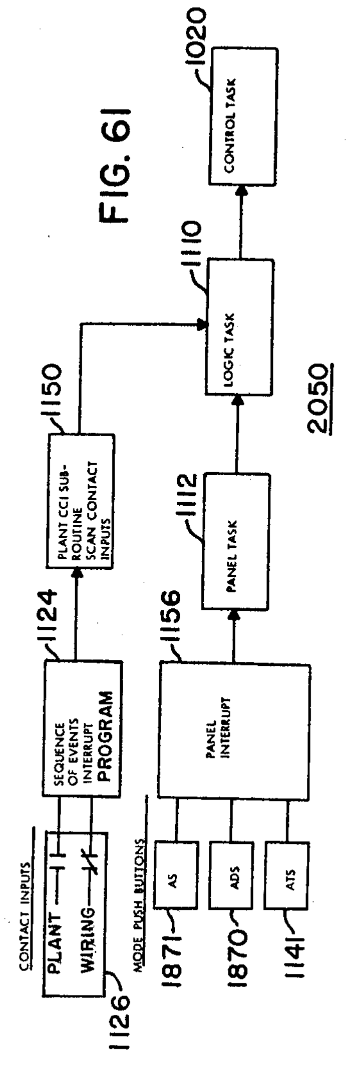
Figure 62:
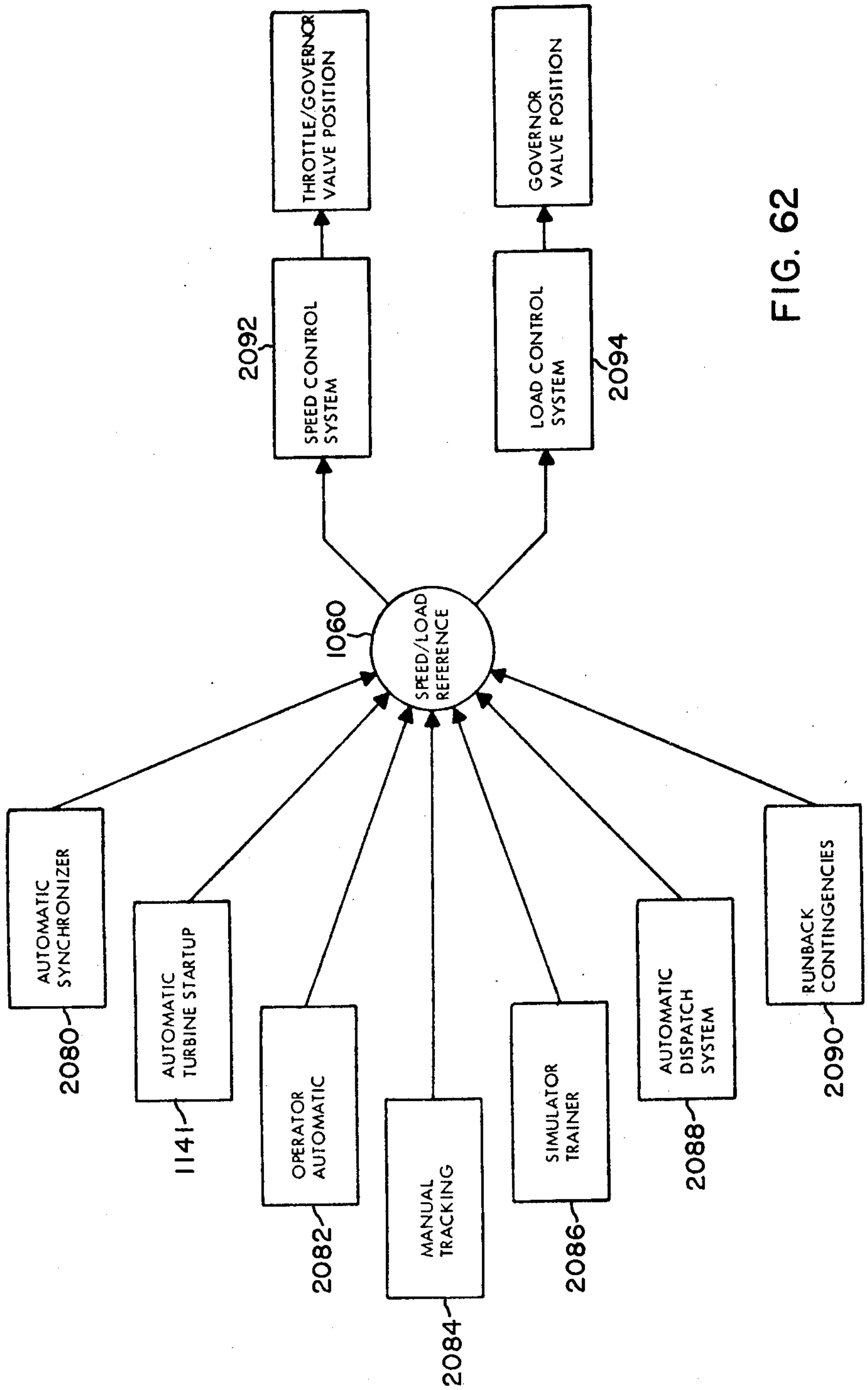
Figure 63:
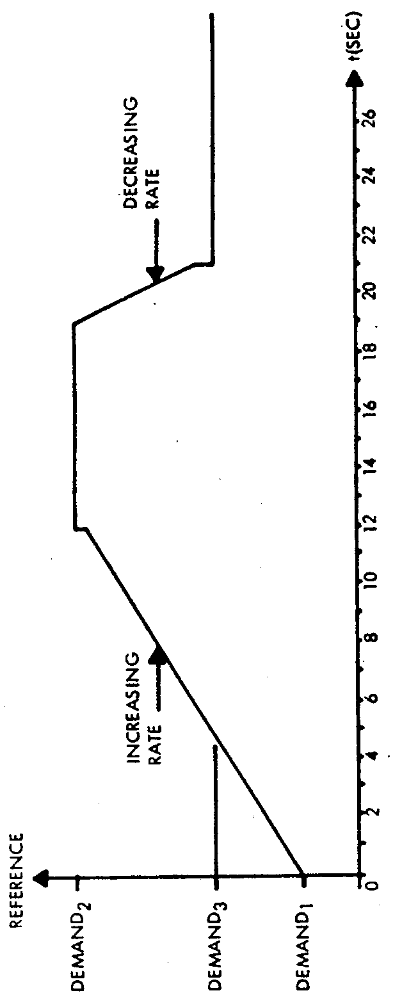
Figure 64:
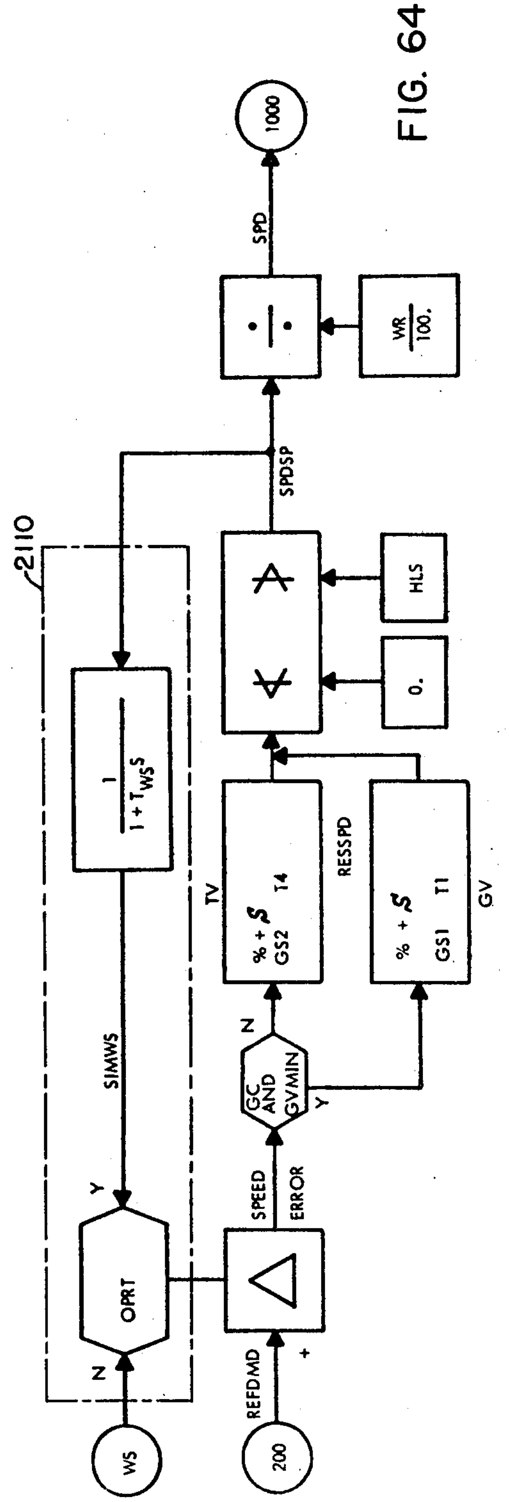
Figure 65:
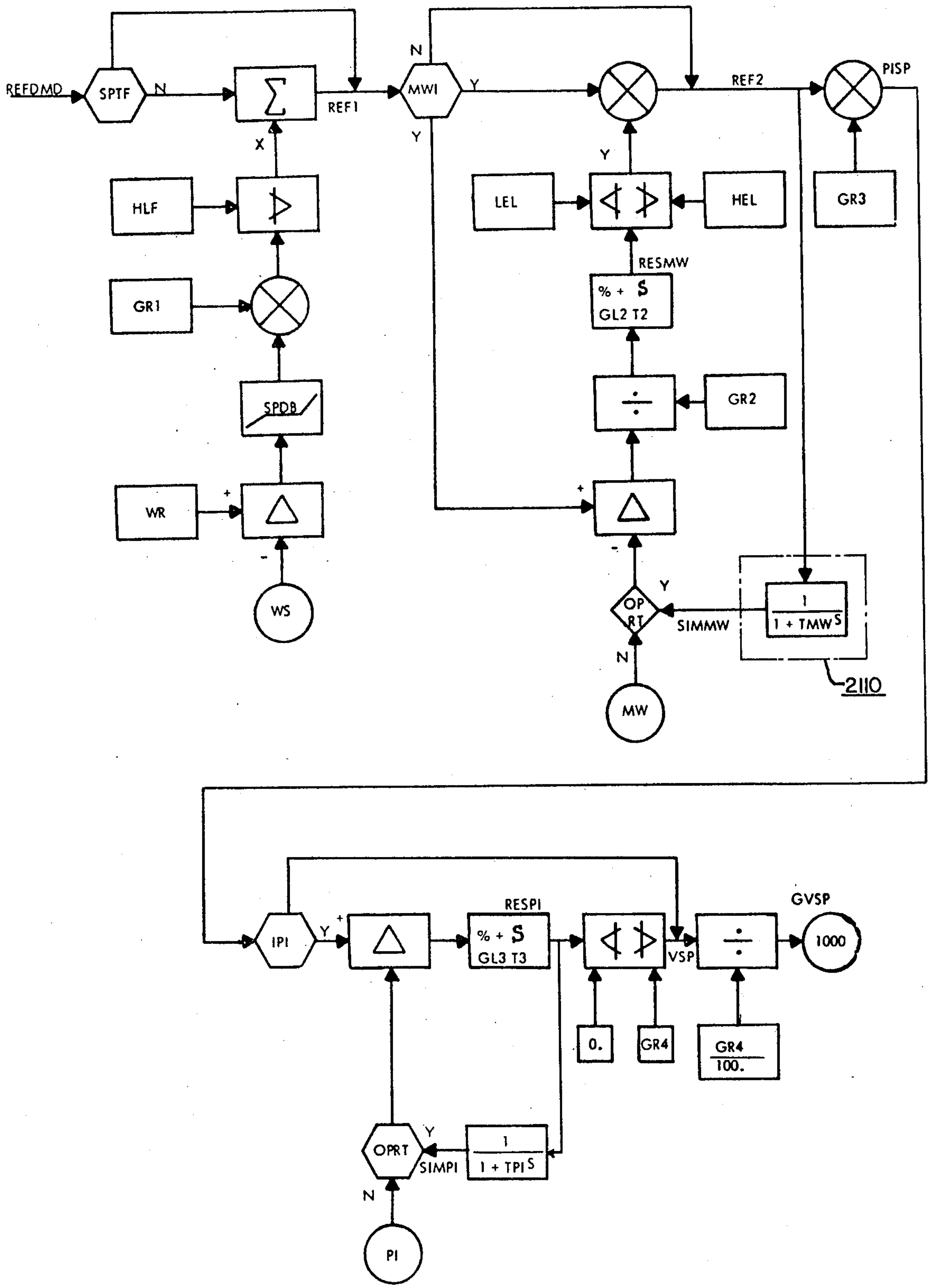
Figure 66:
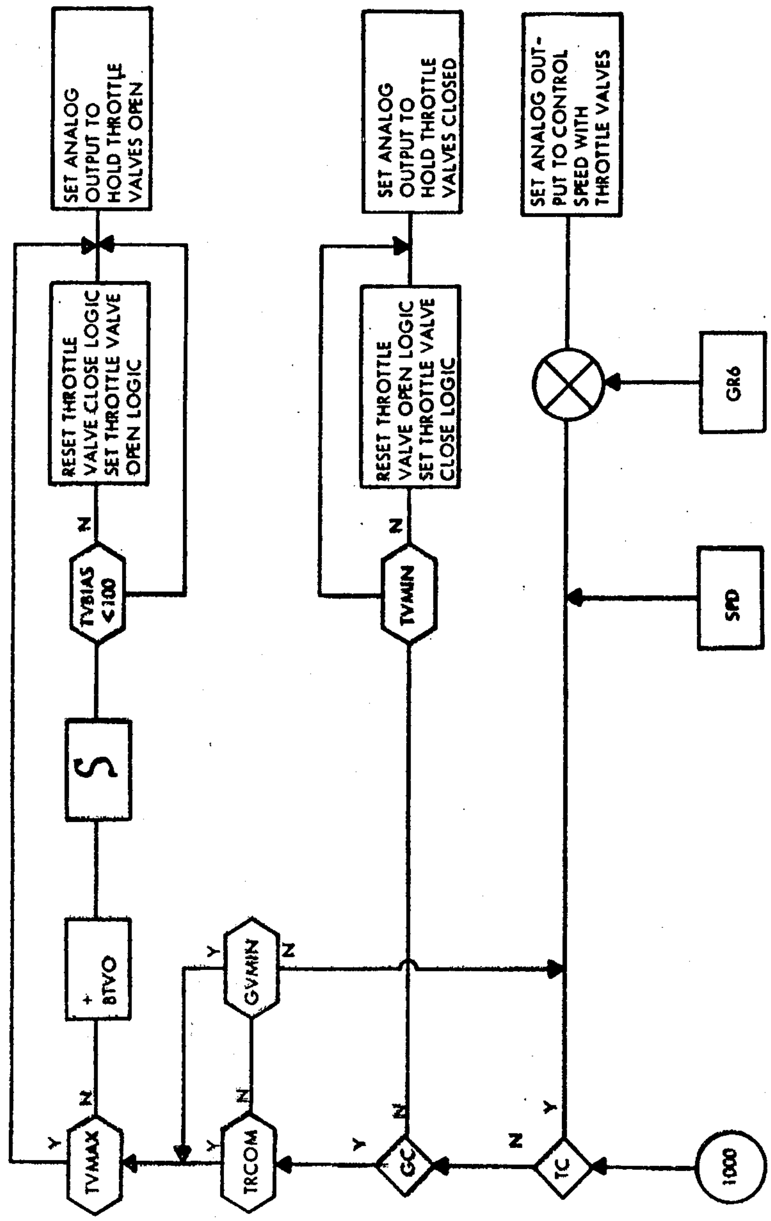
Figure 67:
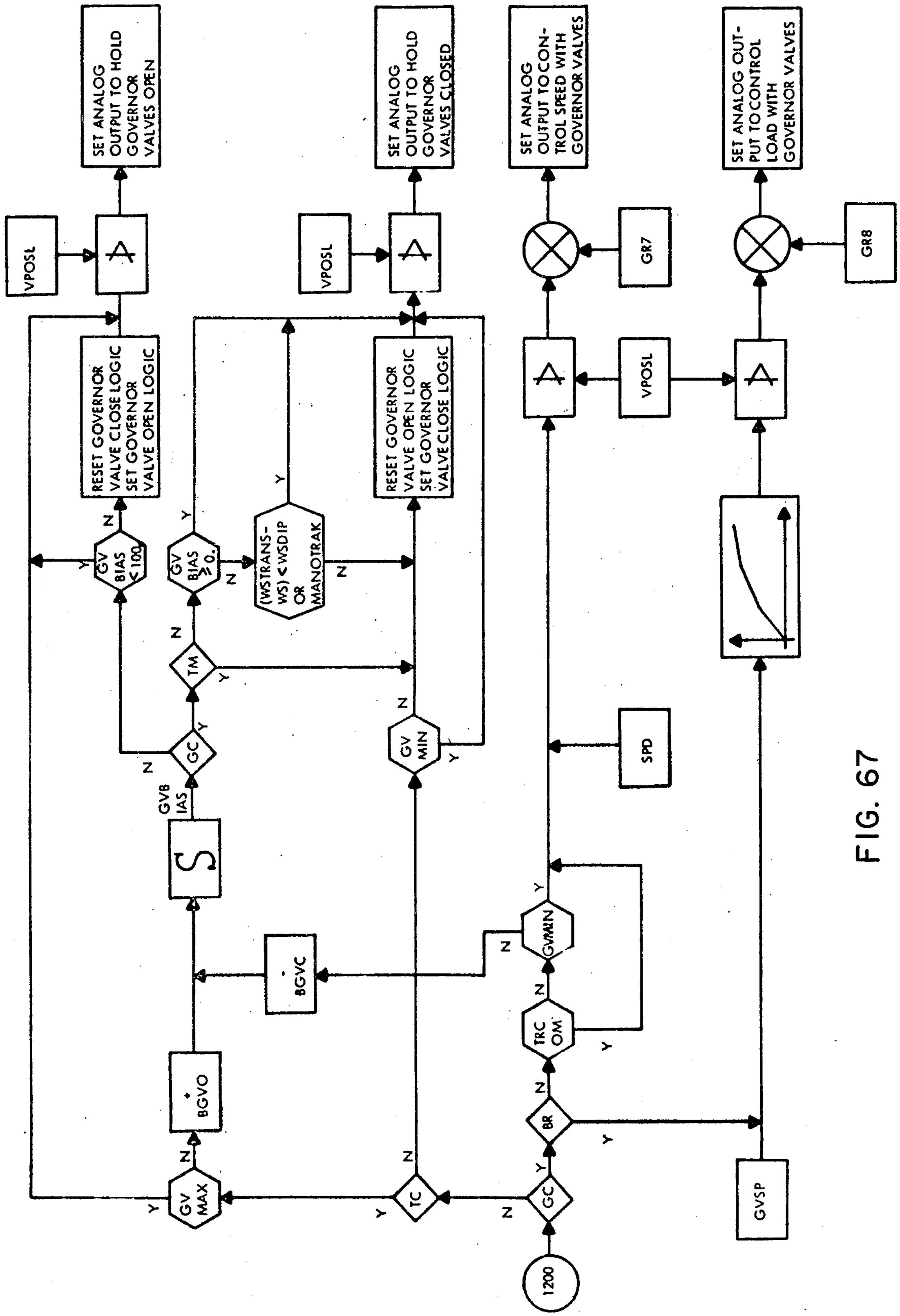
Figures 1, 67:
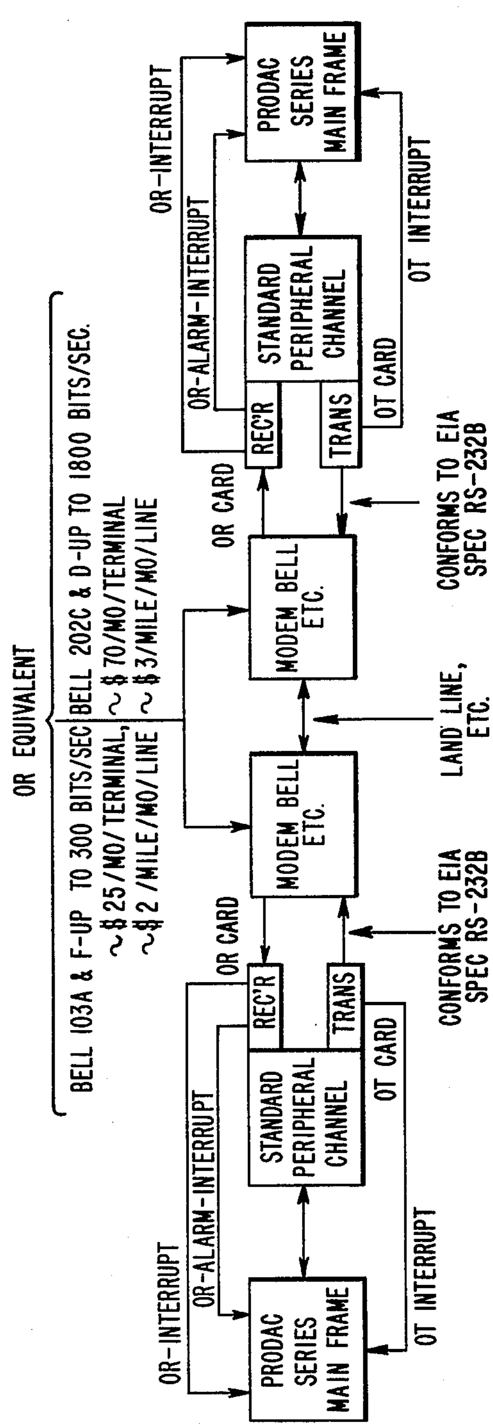
Figures 2, 67:
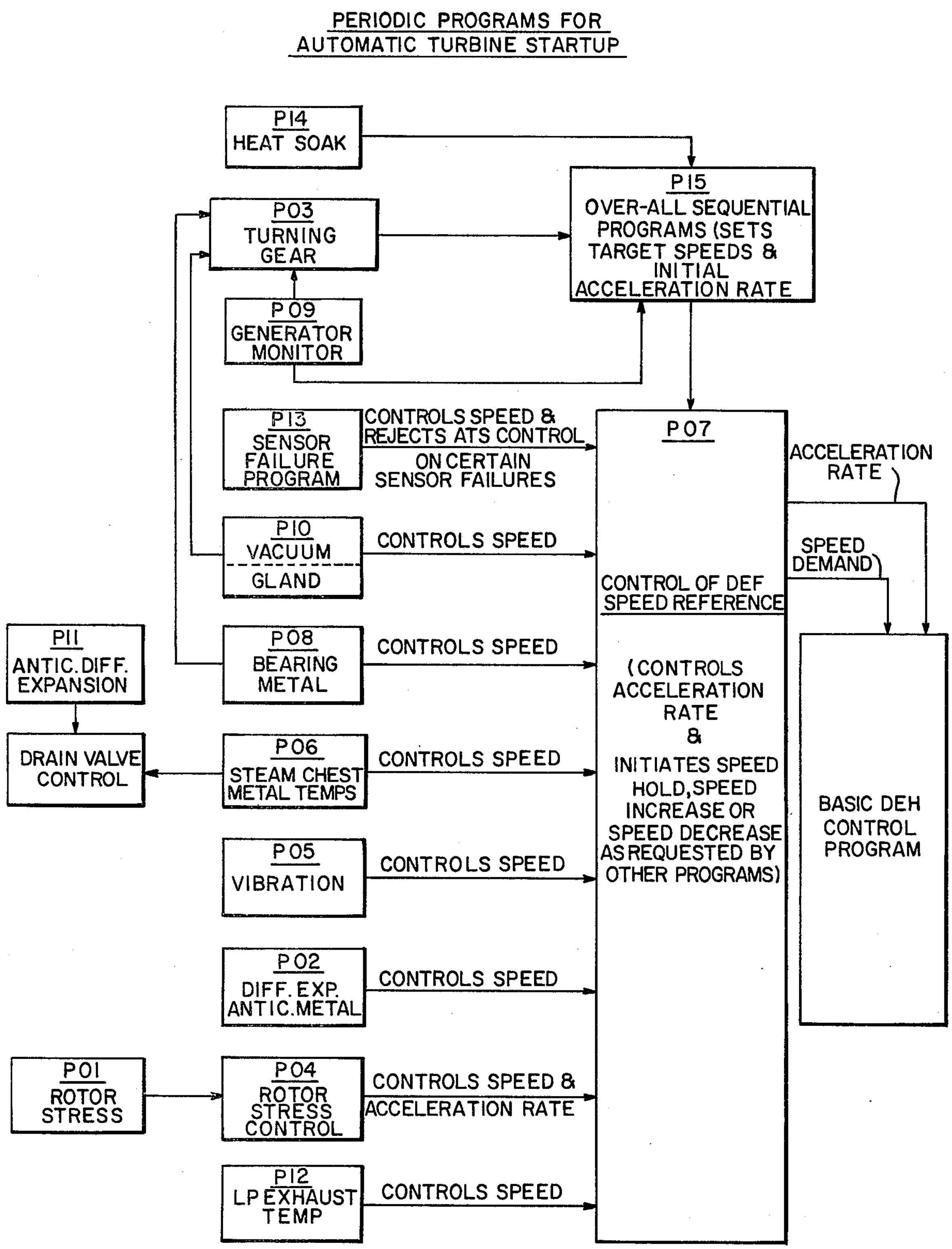
Figures 3, 67:
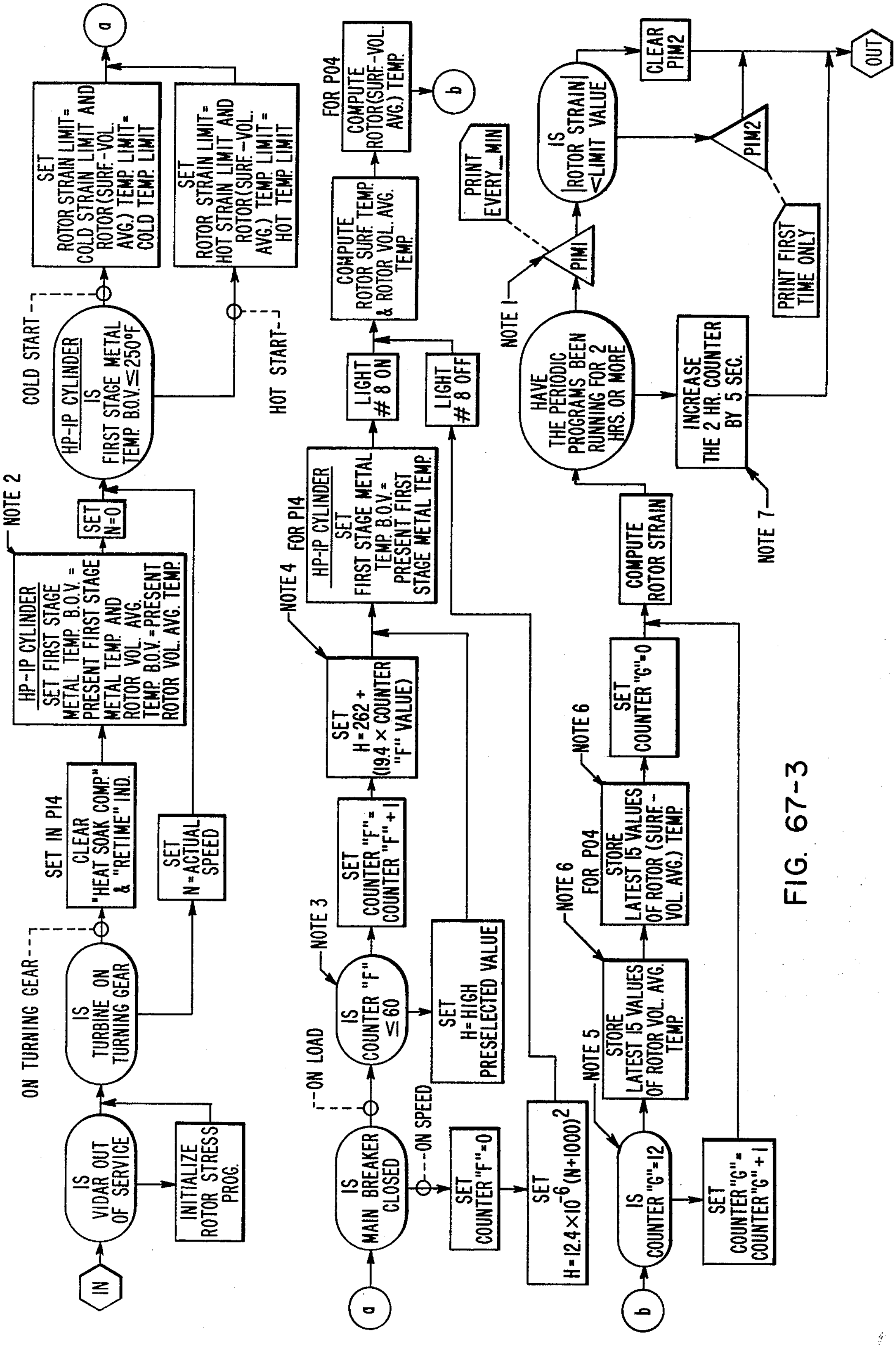
Figures 4, 67:
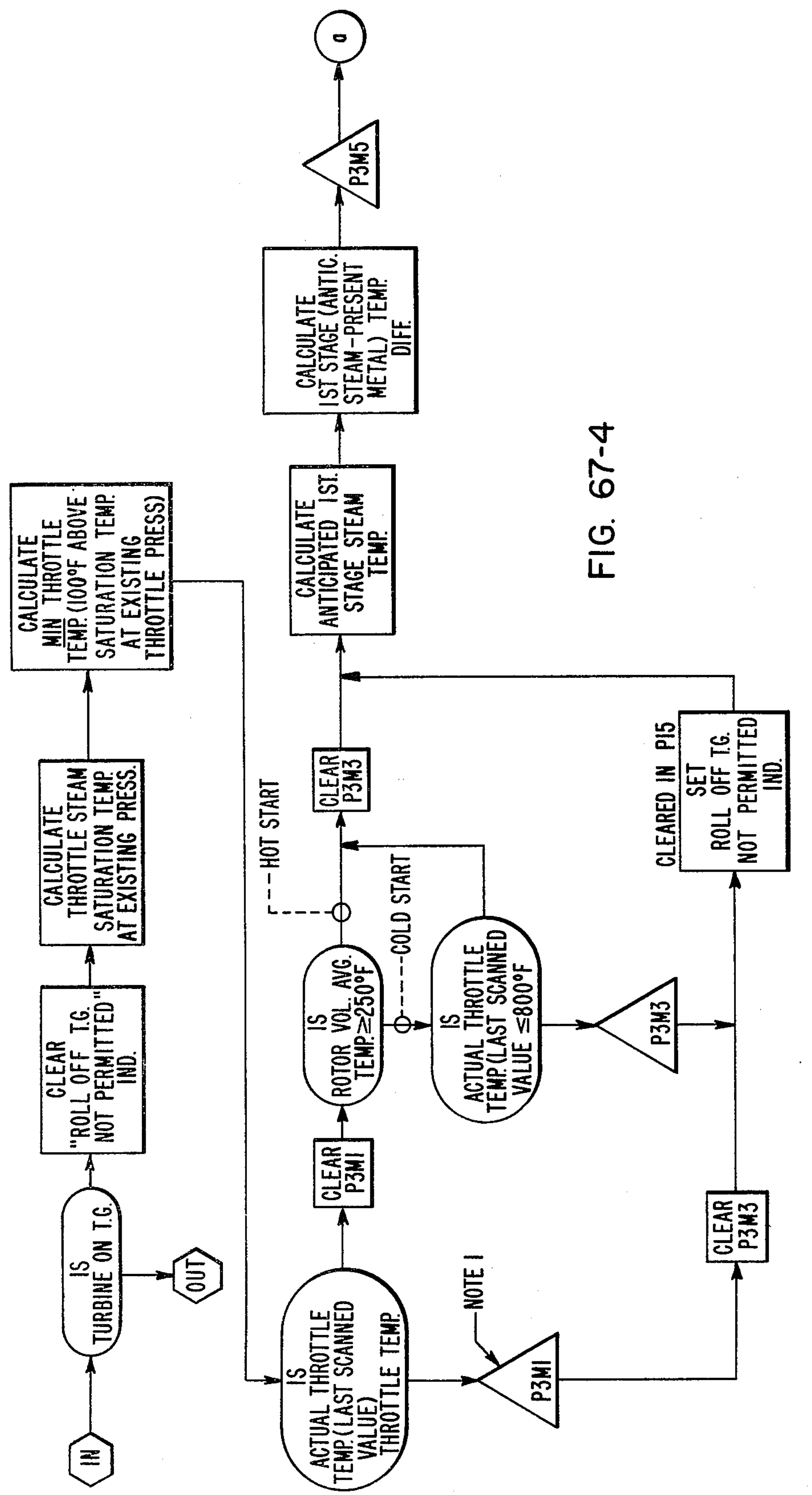
Figures 5A, 67:
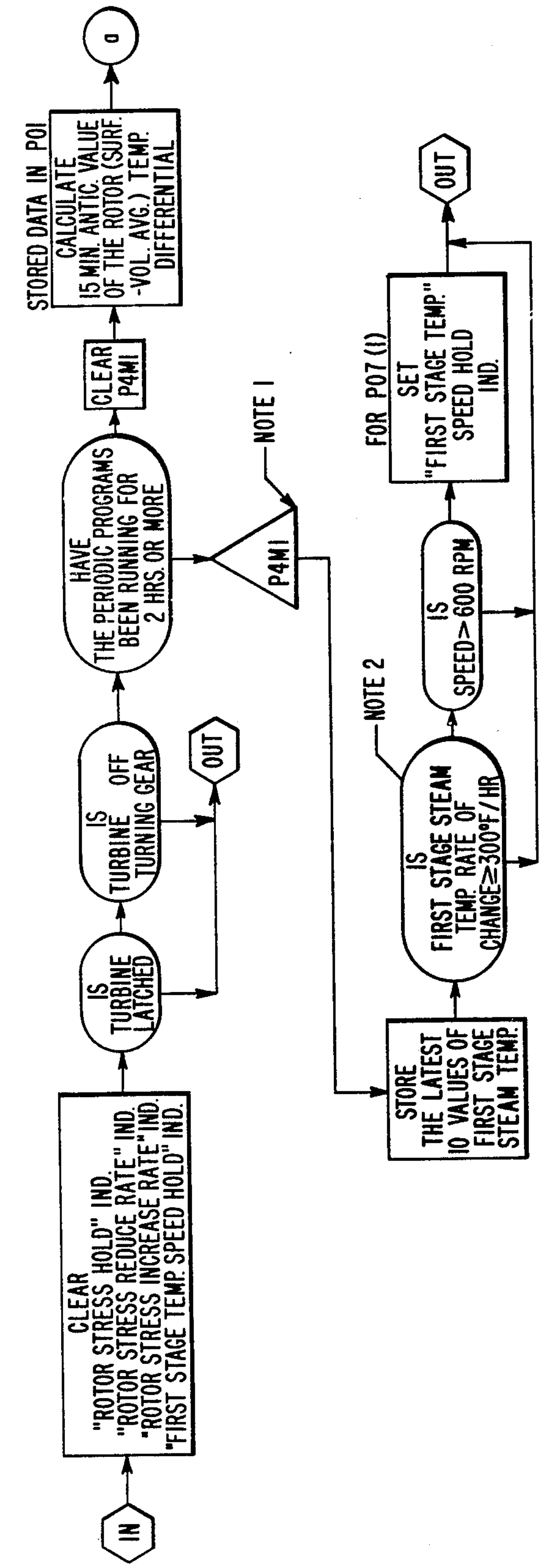
Figures 5B, 67:
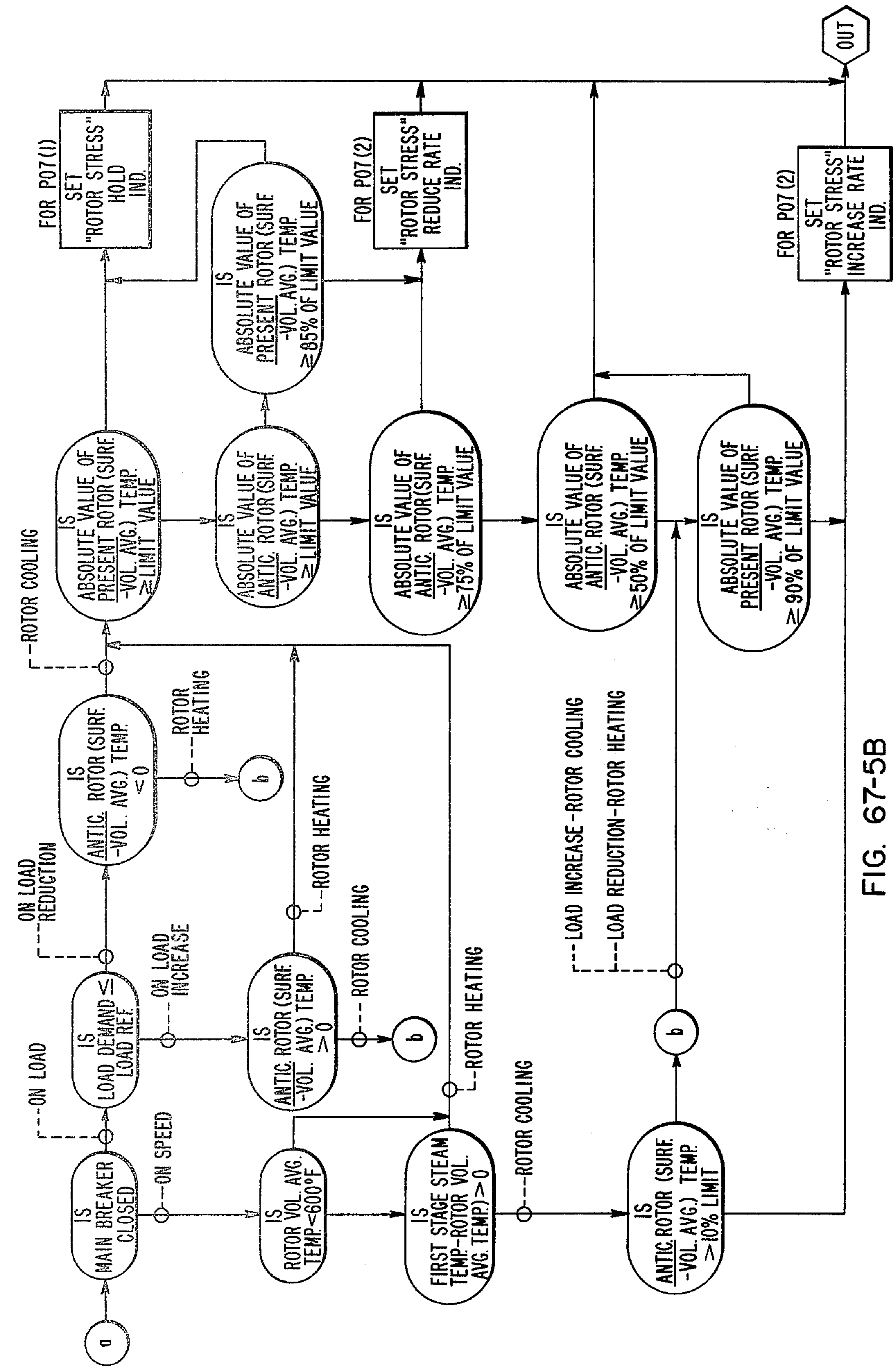
Figures 6A, 67:
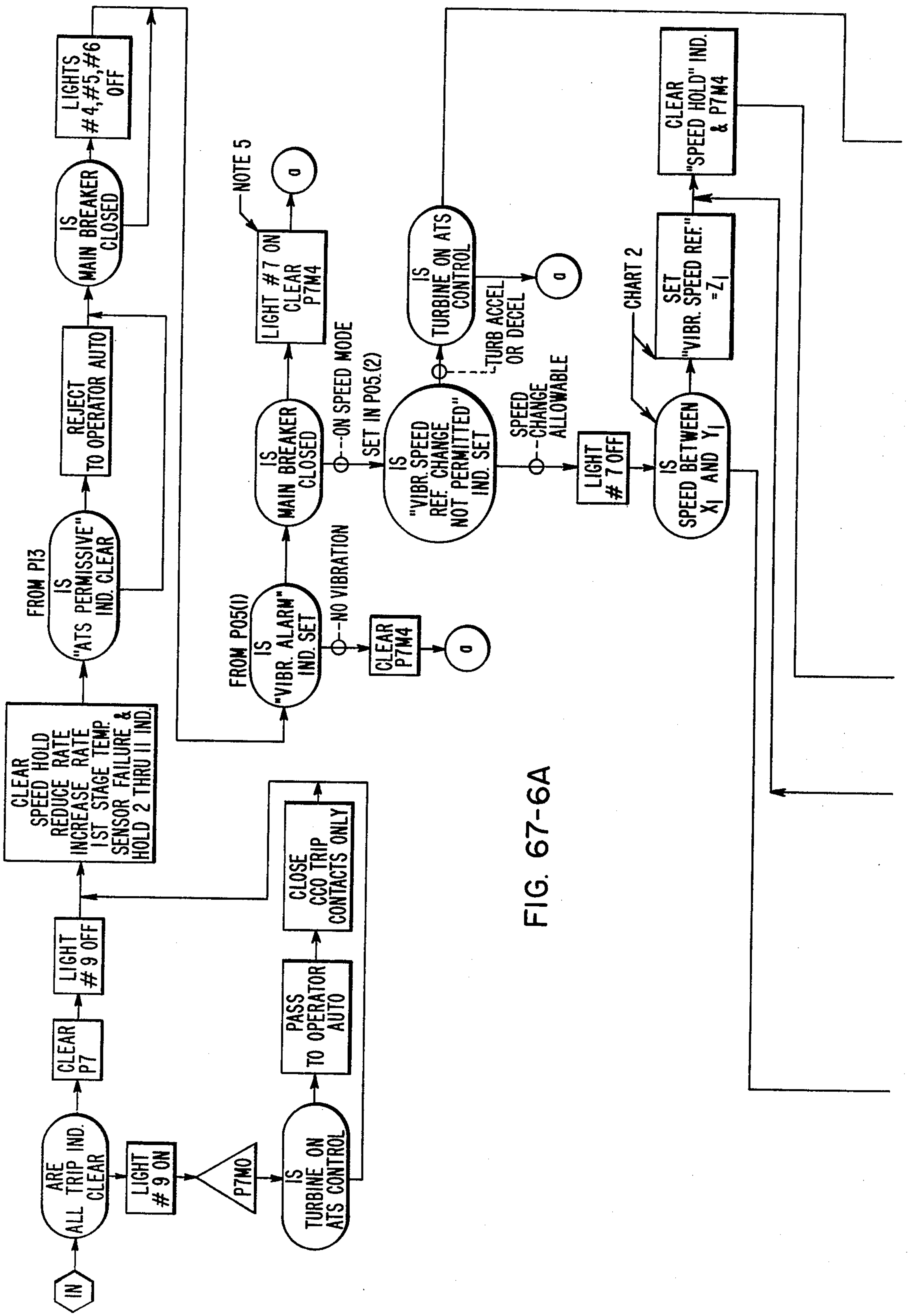
Figures 6B, 67:
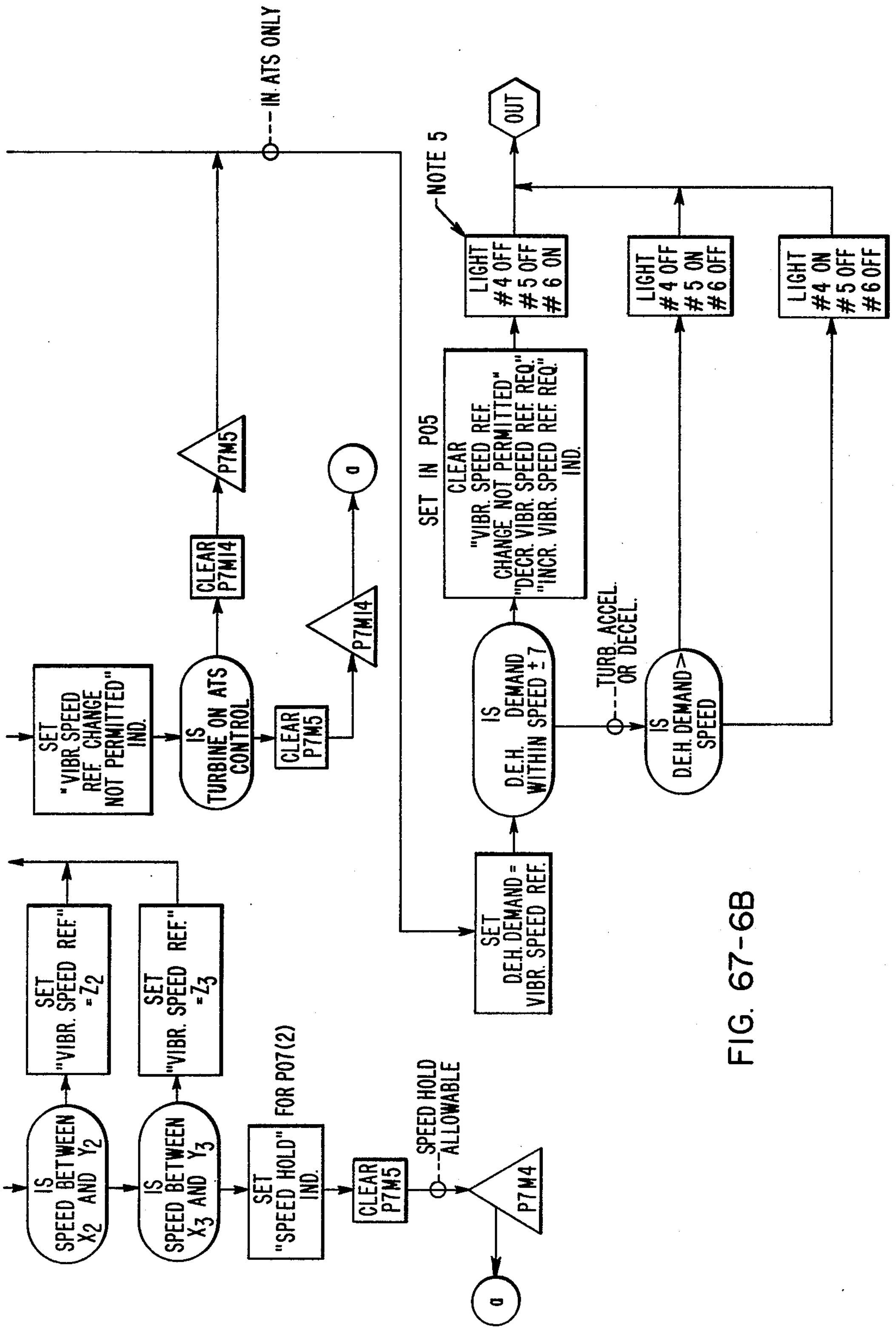
Figures 6C, 67:
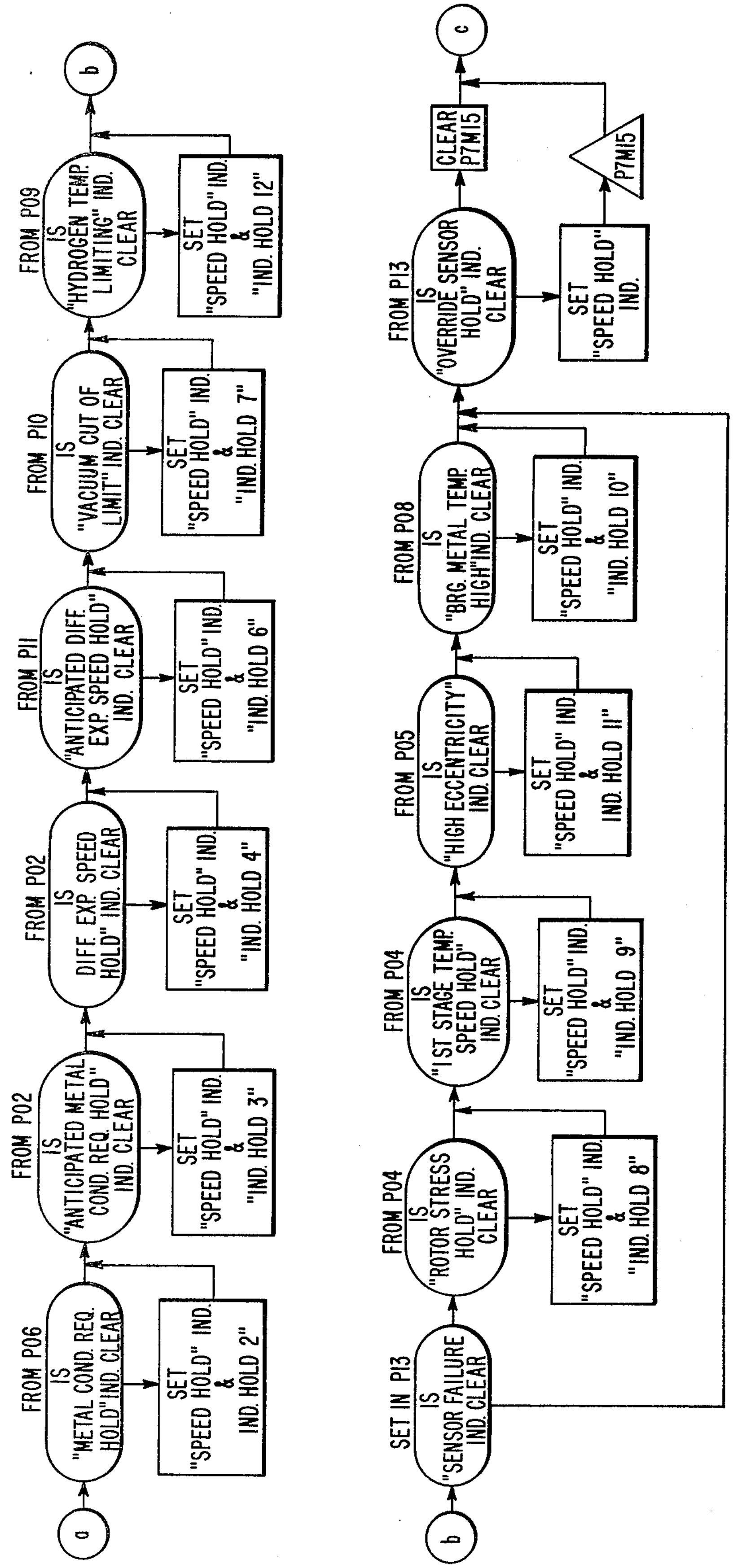
Figures 7A, 67:
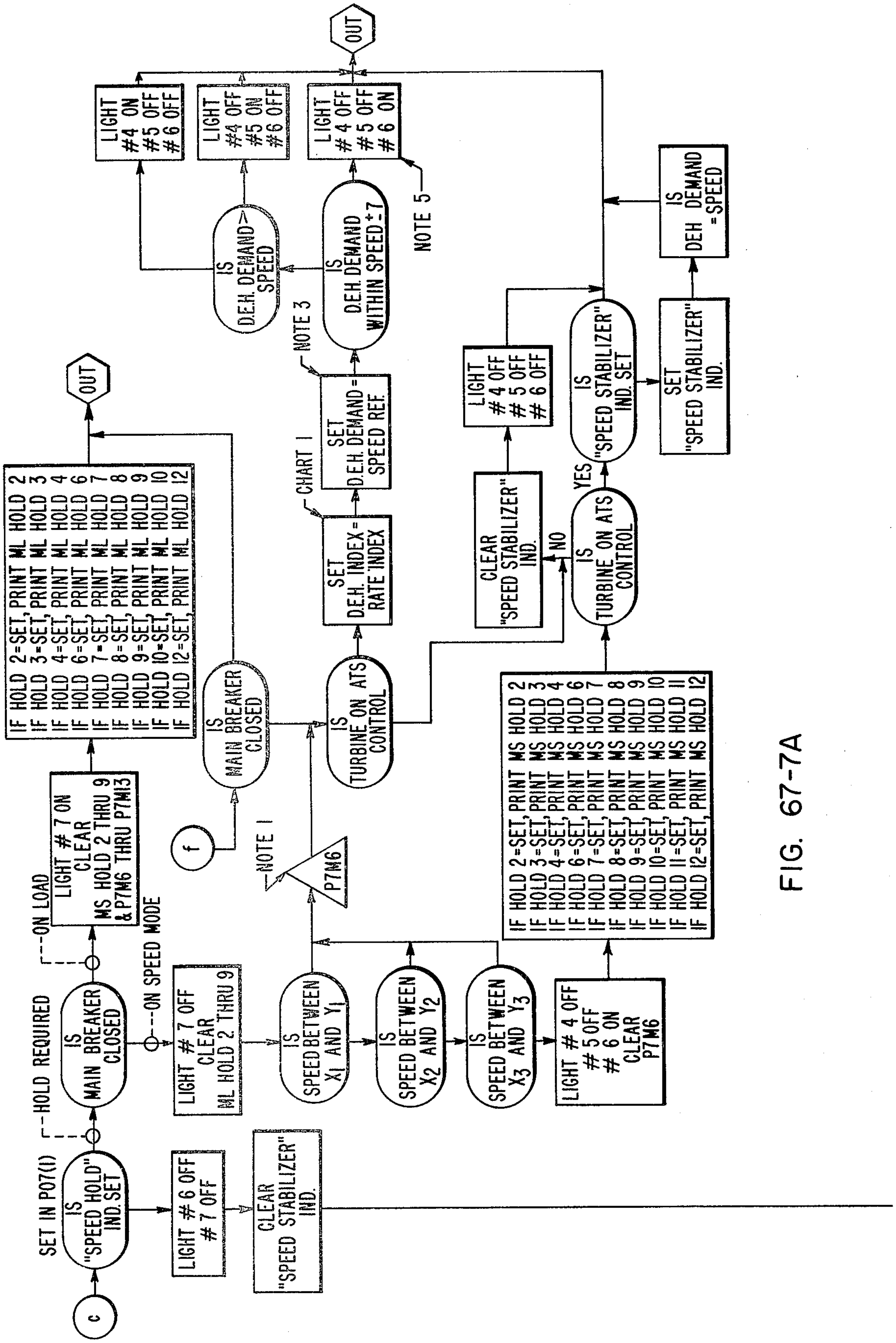
Figures 7B, 67:
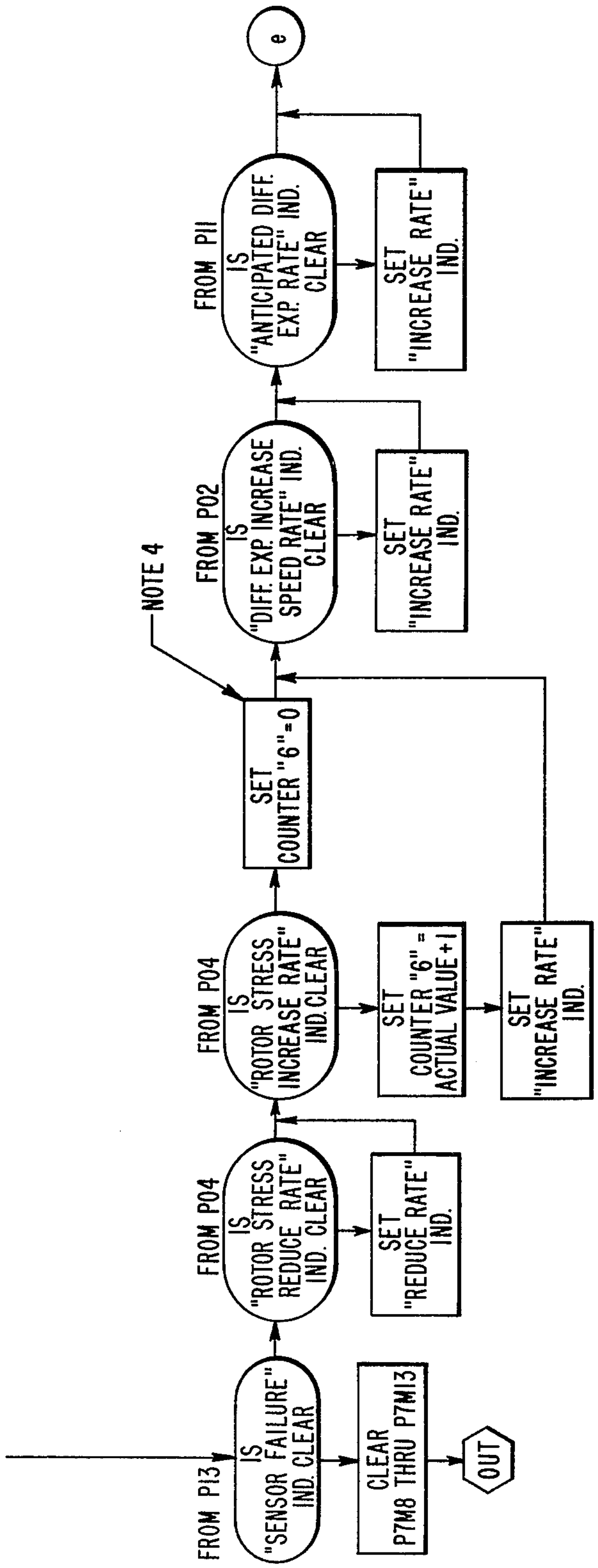
Figures 8, 67:
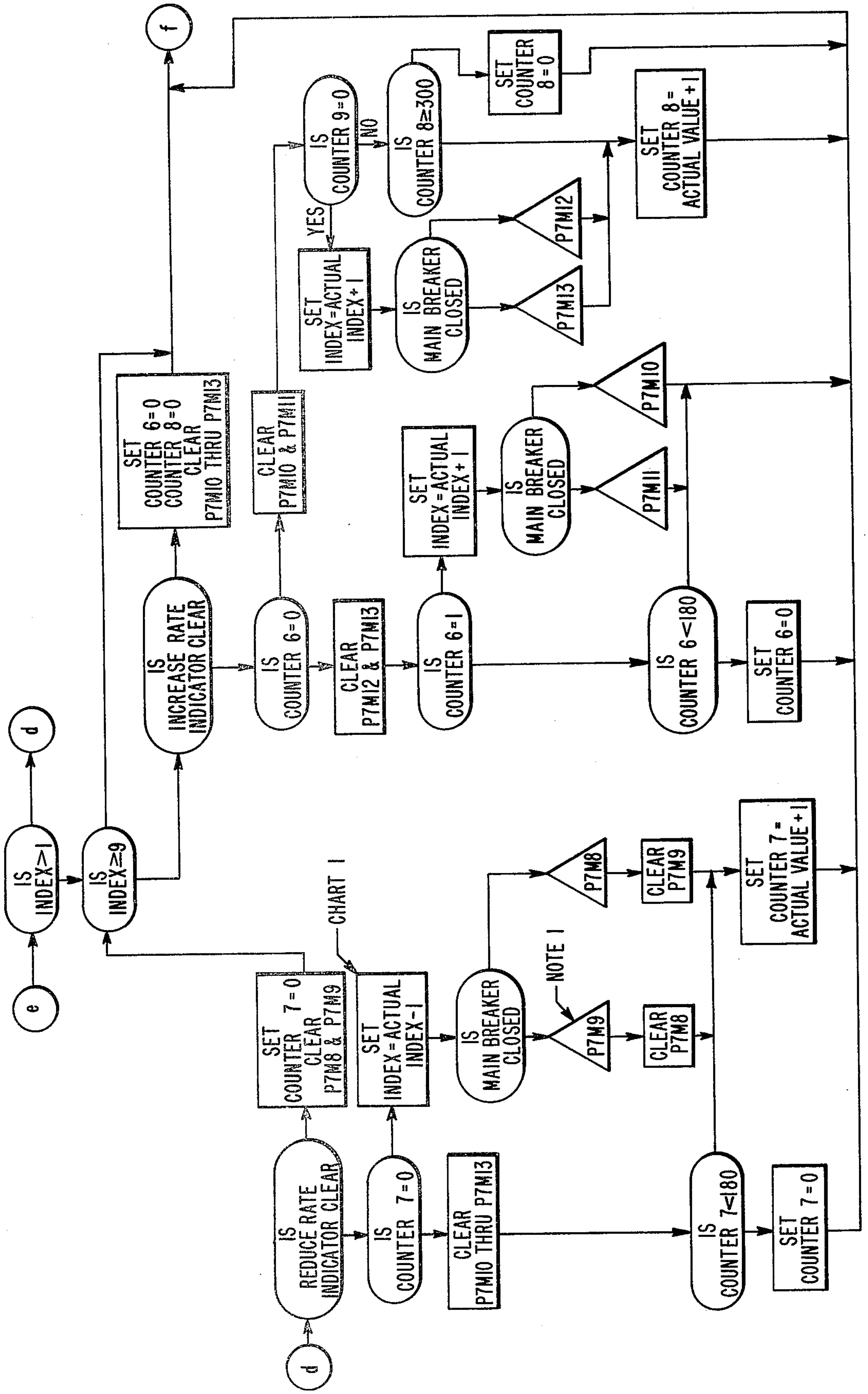
Figures 10A, 67:
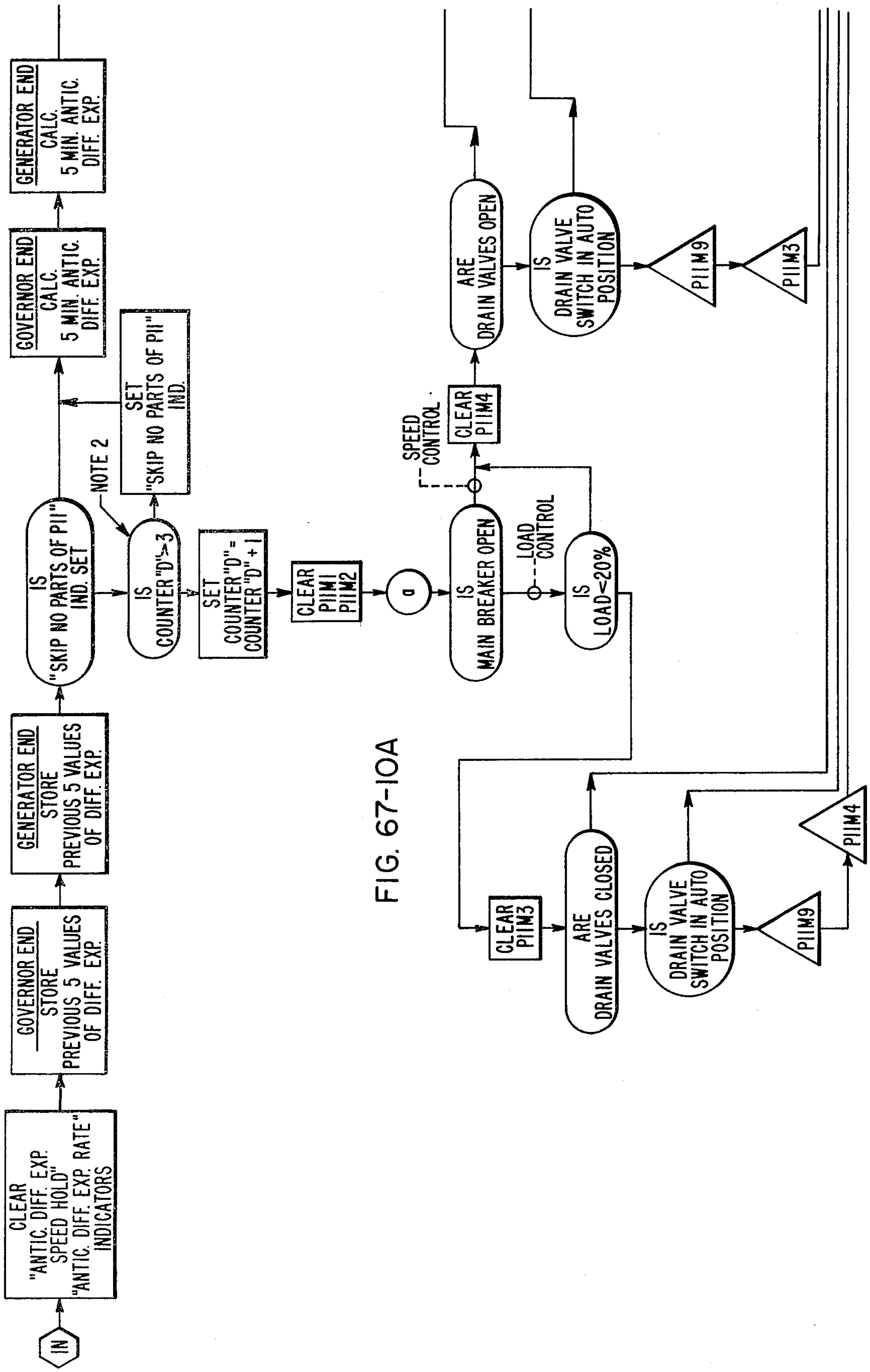
FIG. 10 shows the location of subroutines in accordance with the principles of the invention.
Figures 10B, 67:
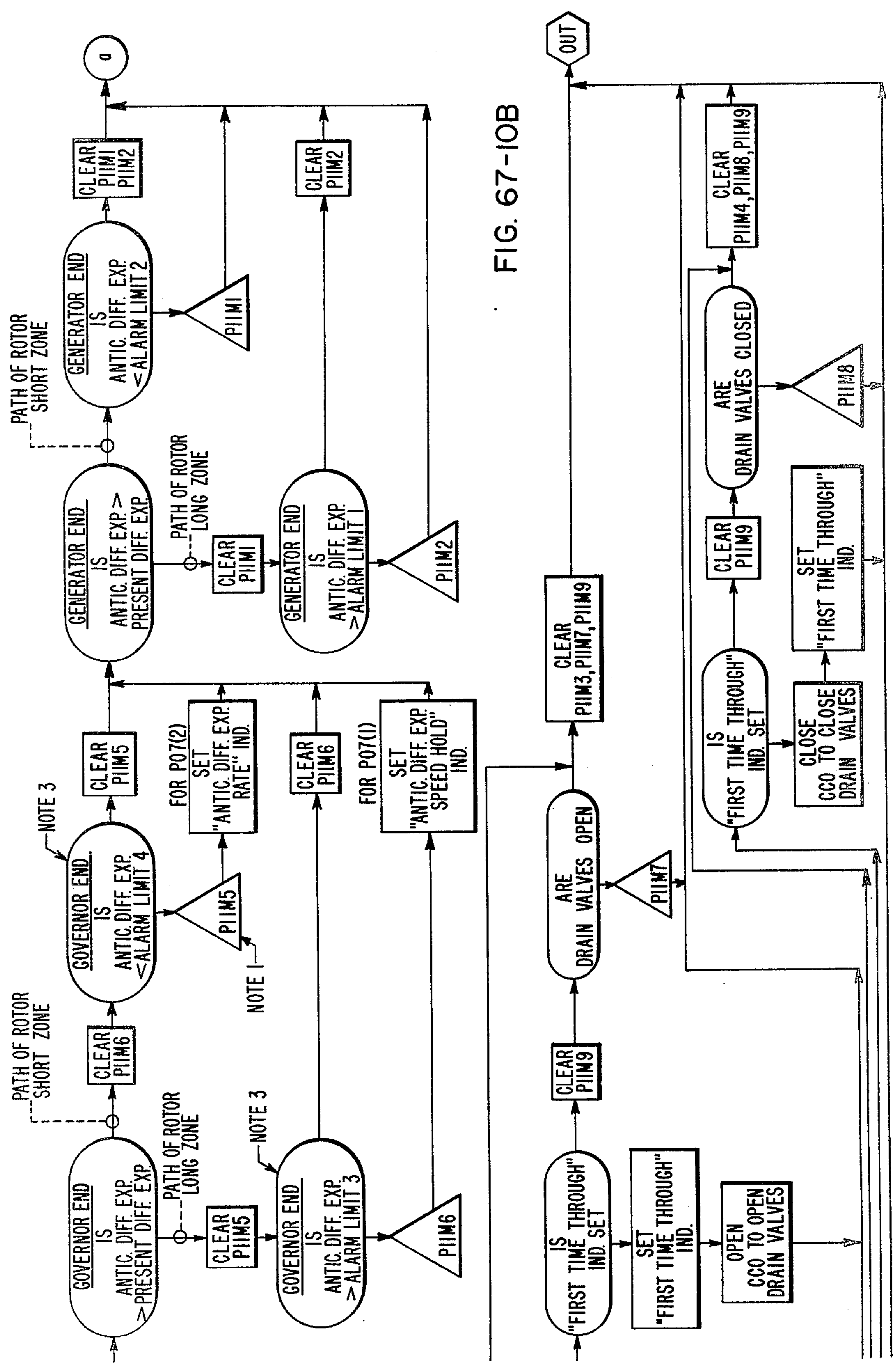
Figures 11A, 67:
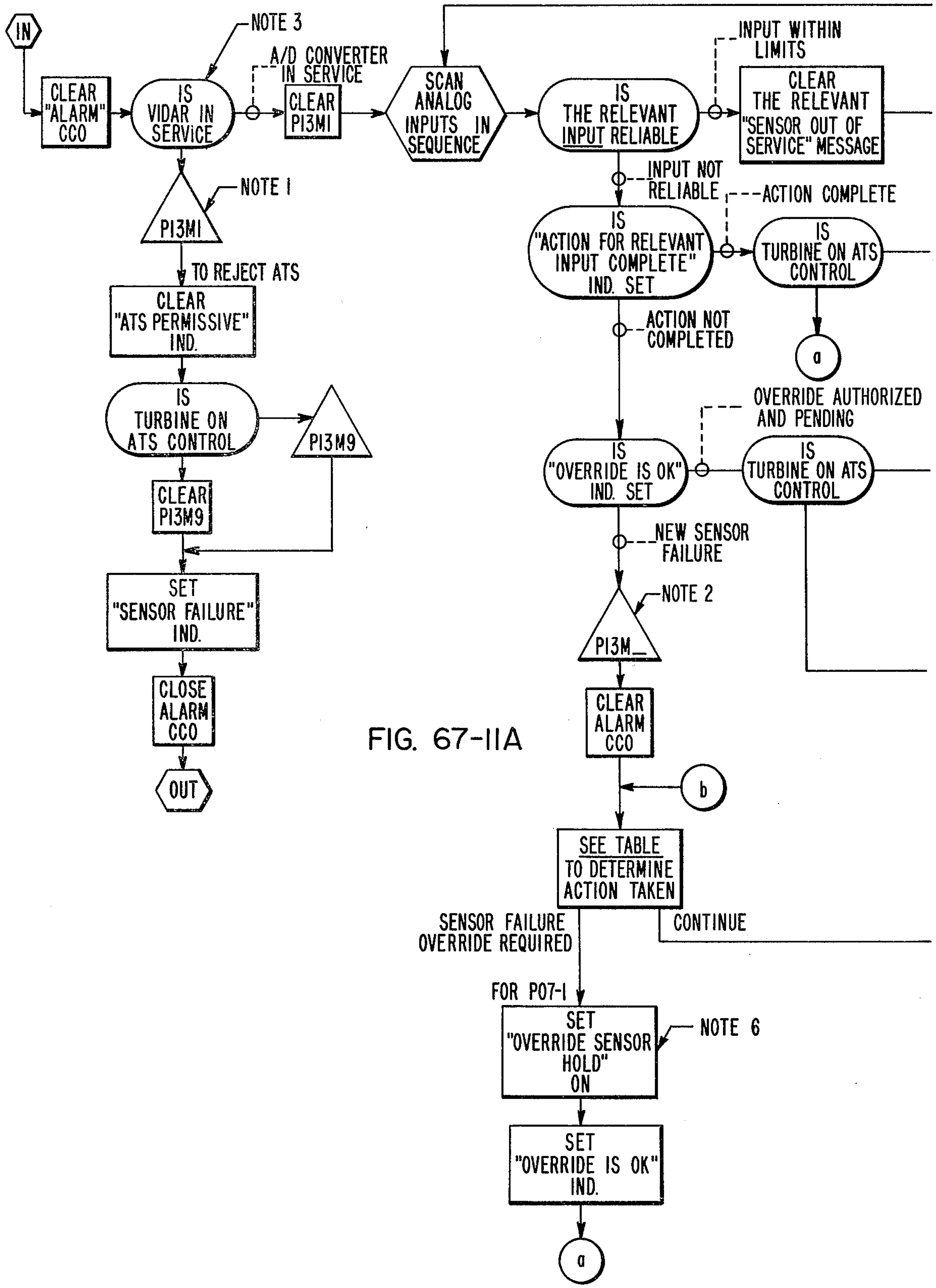
Figures 11B, 67:
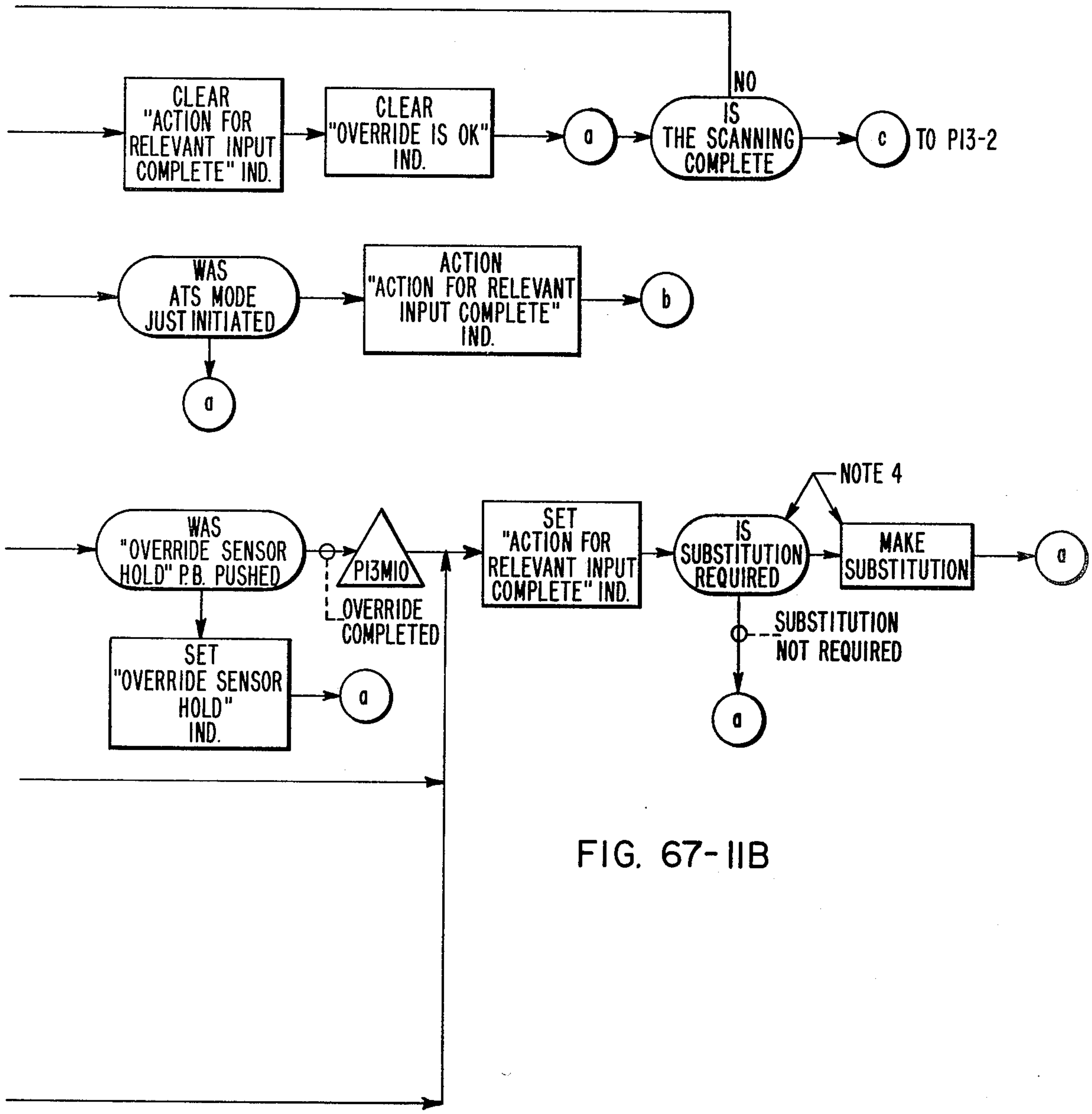
Figures 12A, 67:
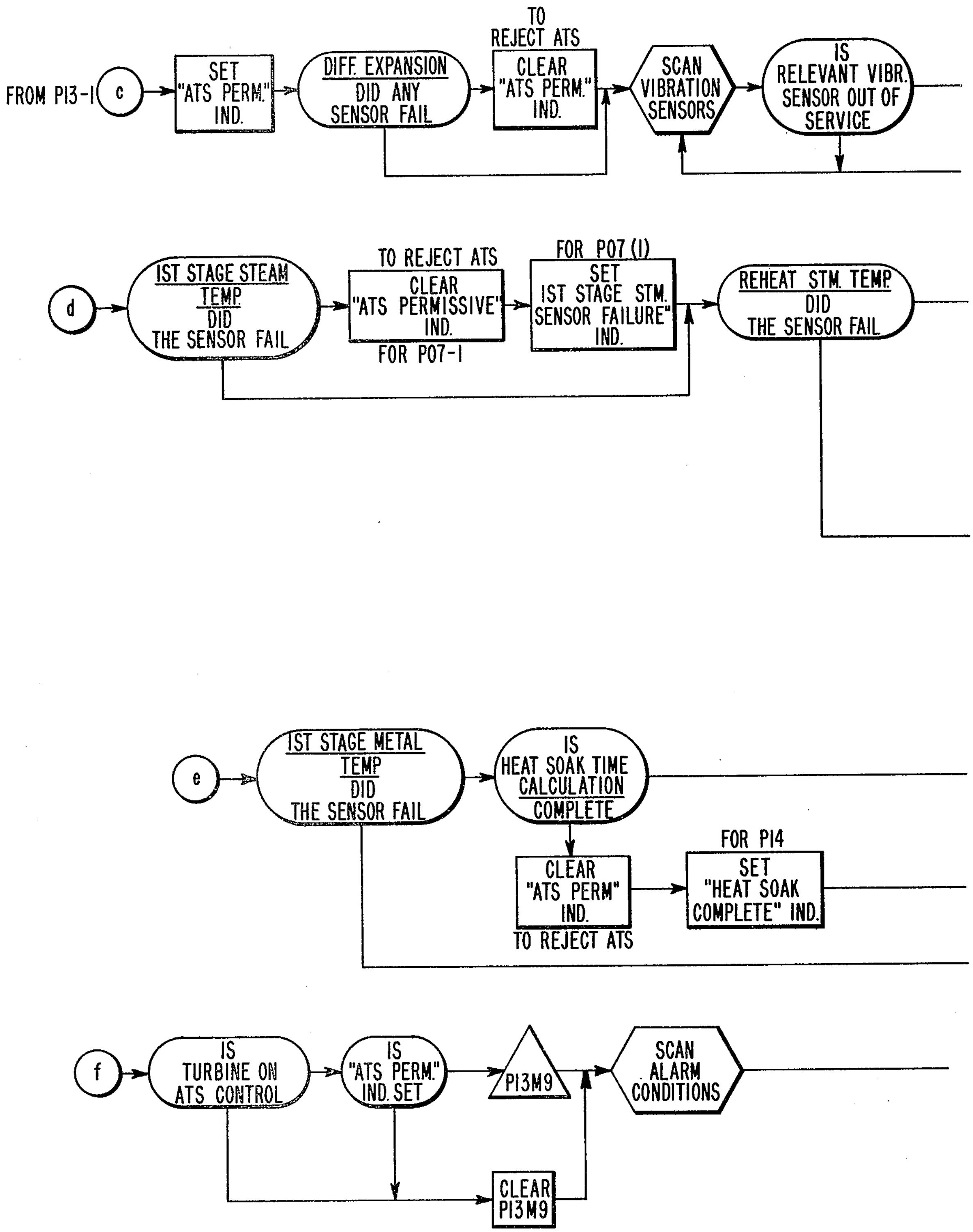
Figures 12B, 67:
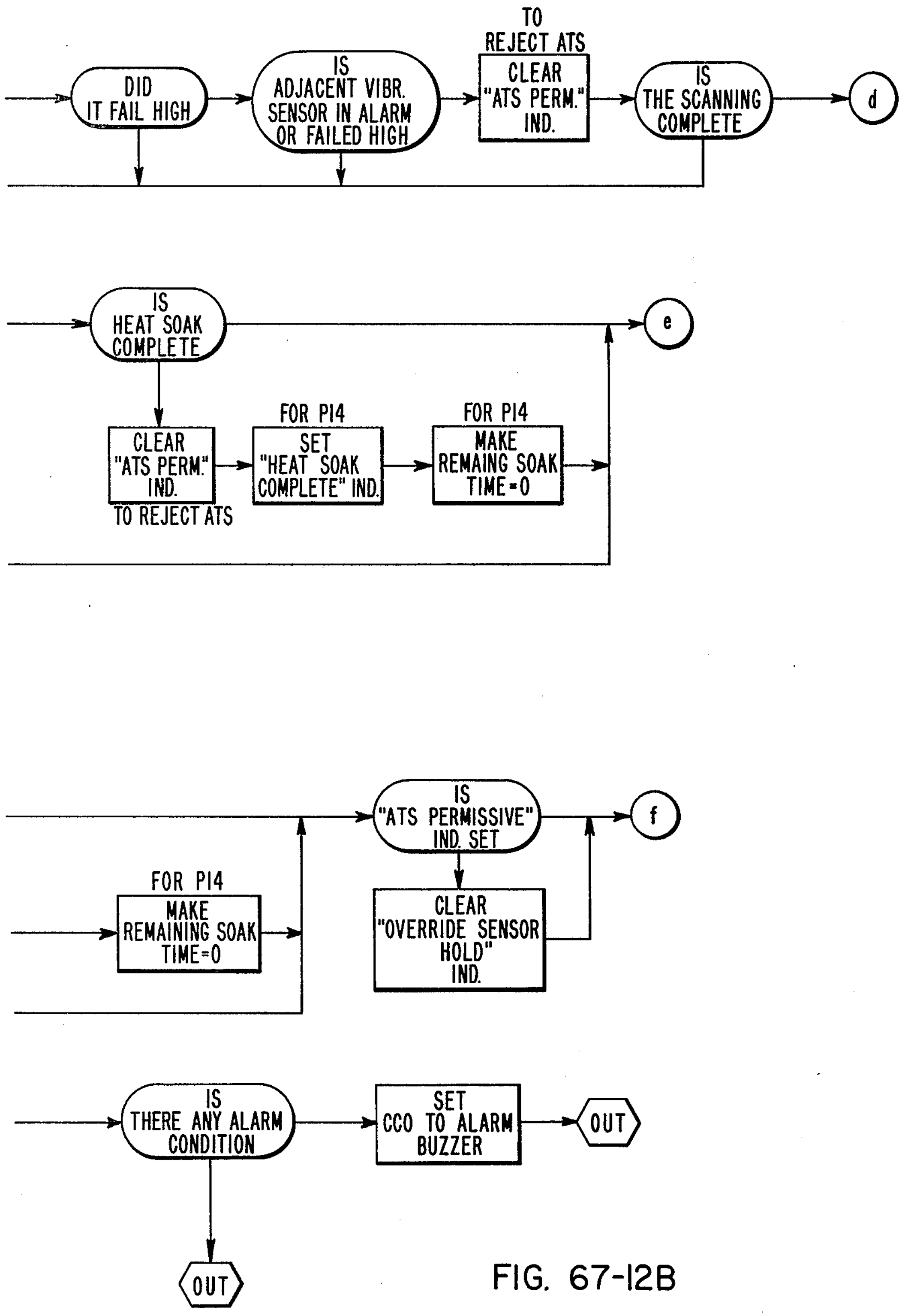
Figures 13A, 67:
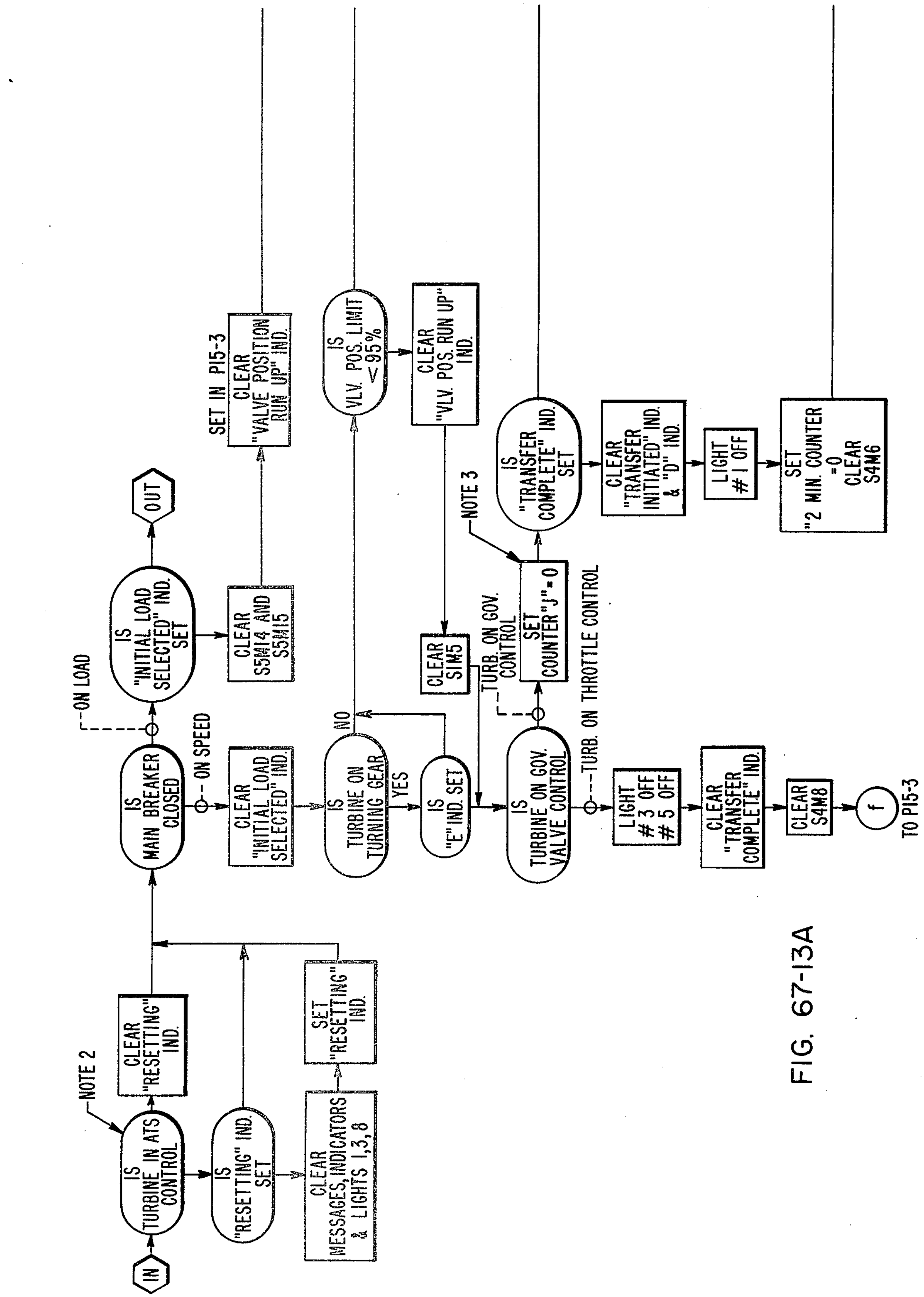
Figures 13B, 67:
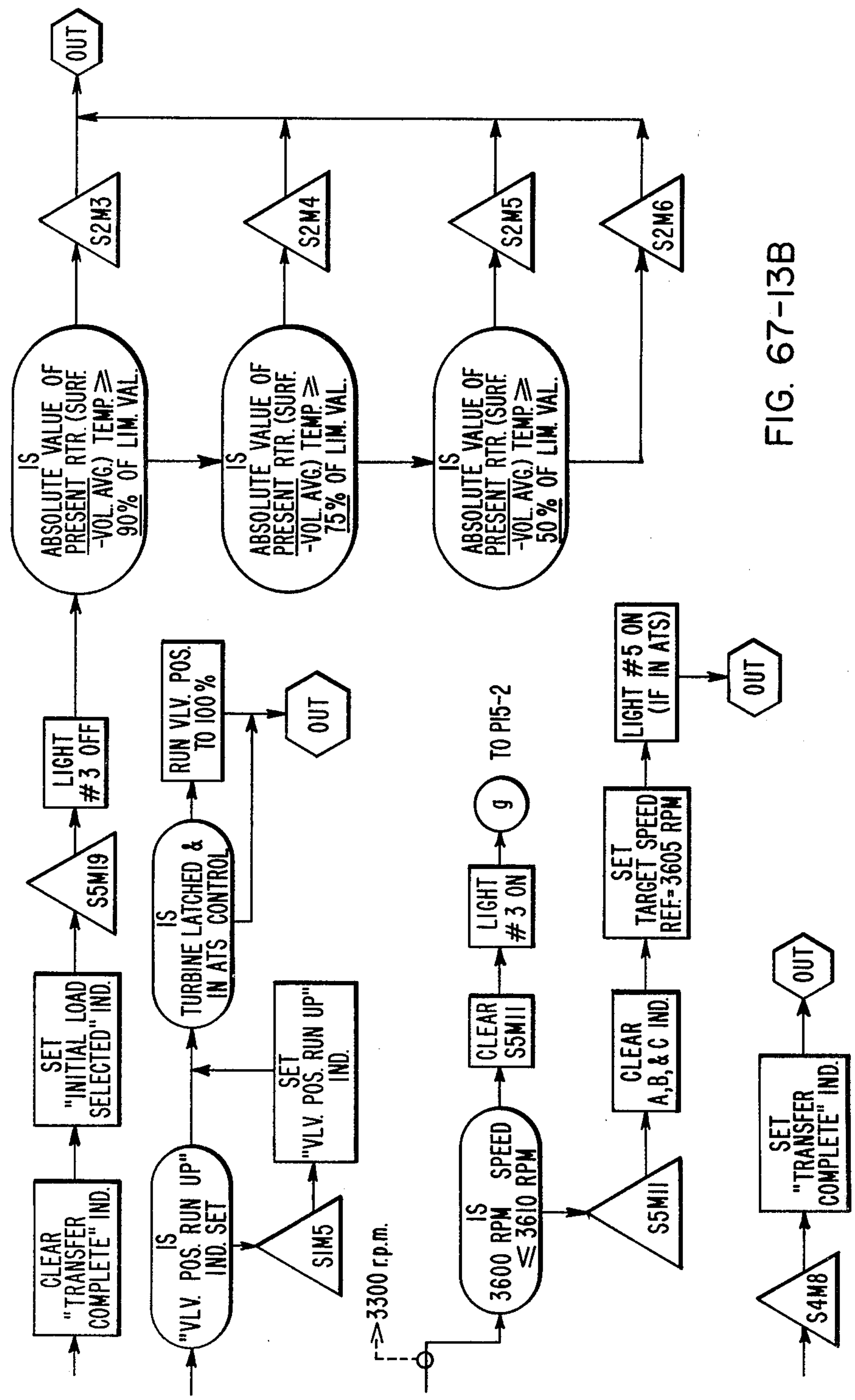
Figures 14A, 67:
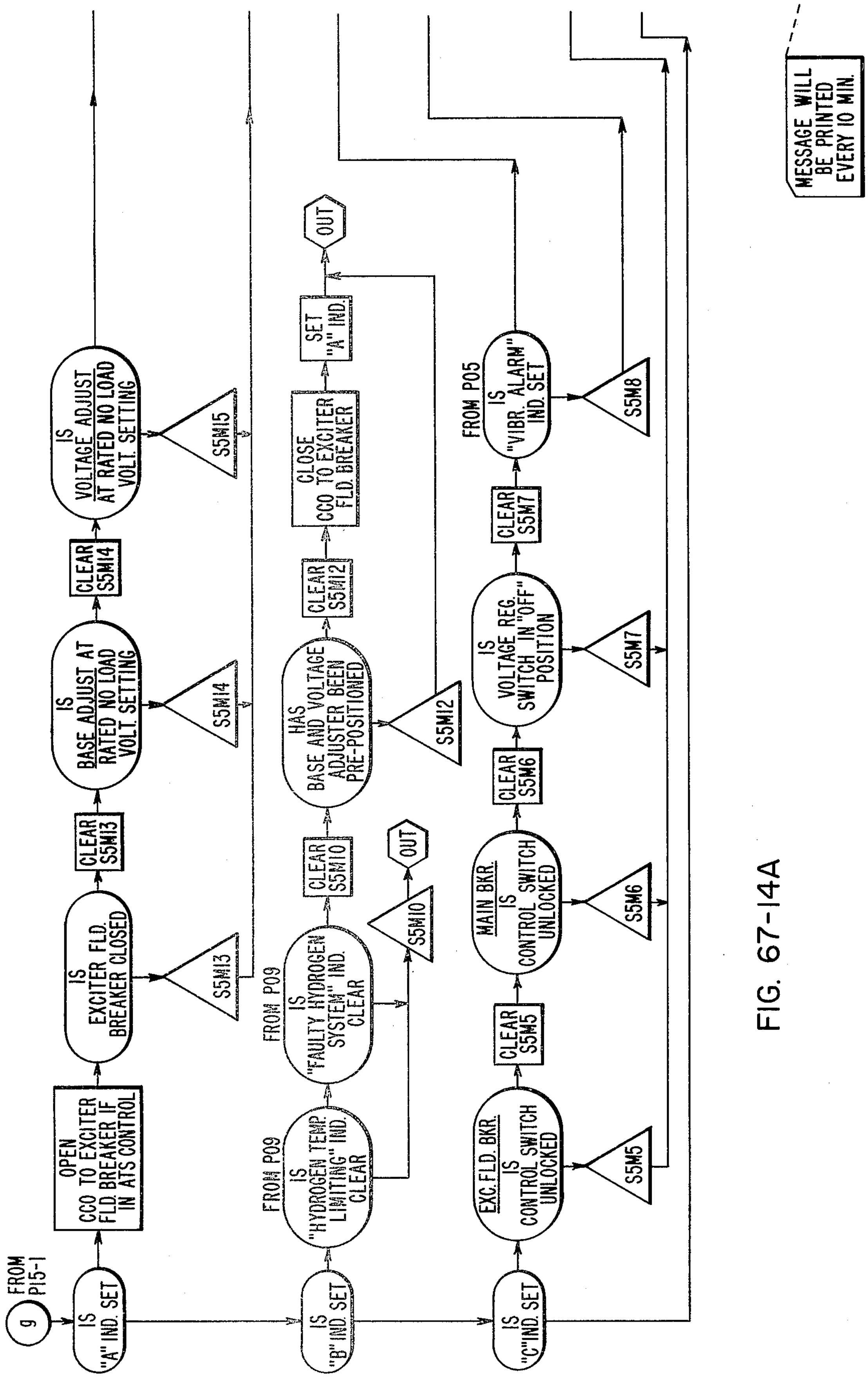
Figures 14B, 67:
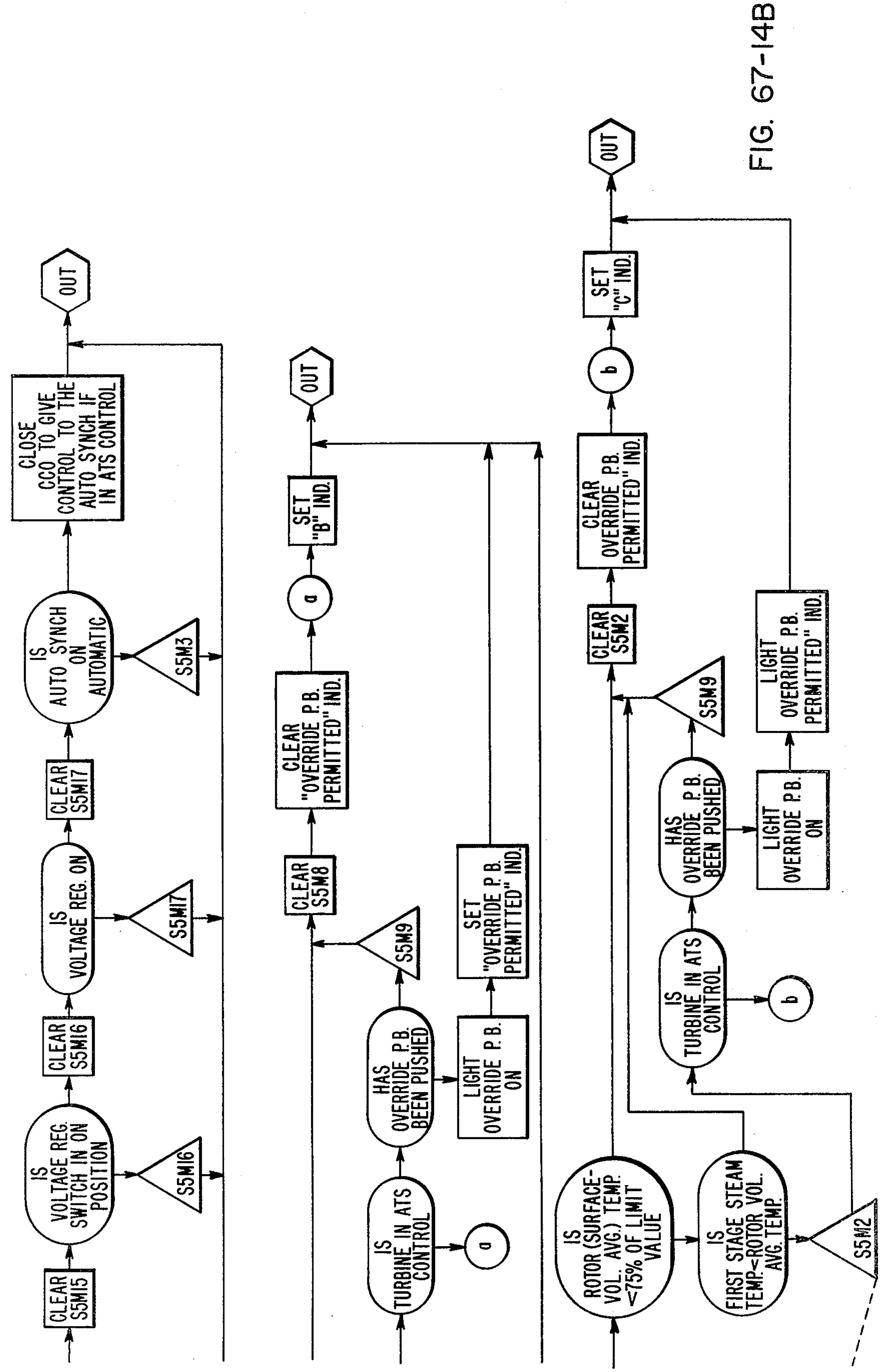
Figures 15A, 67:
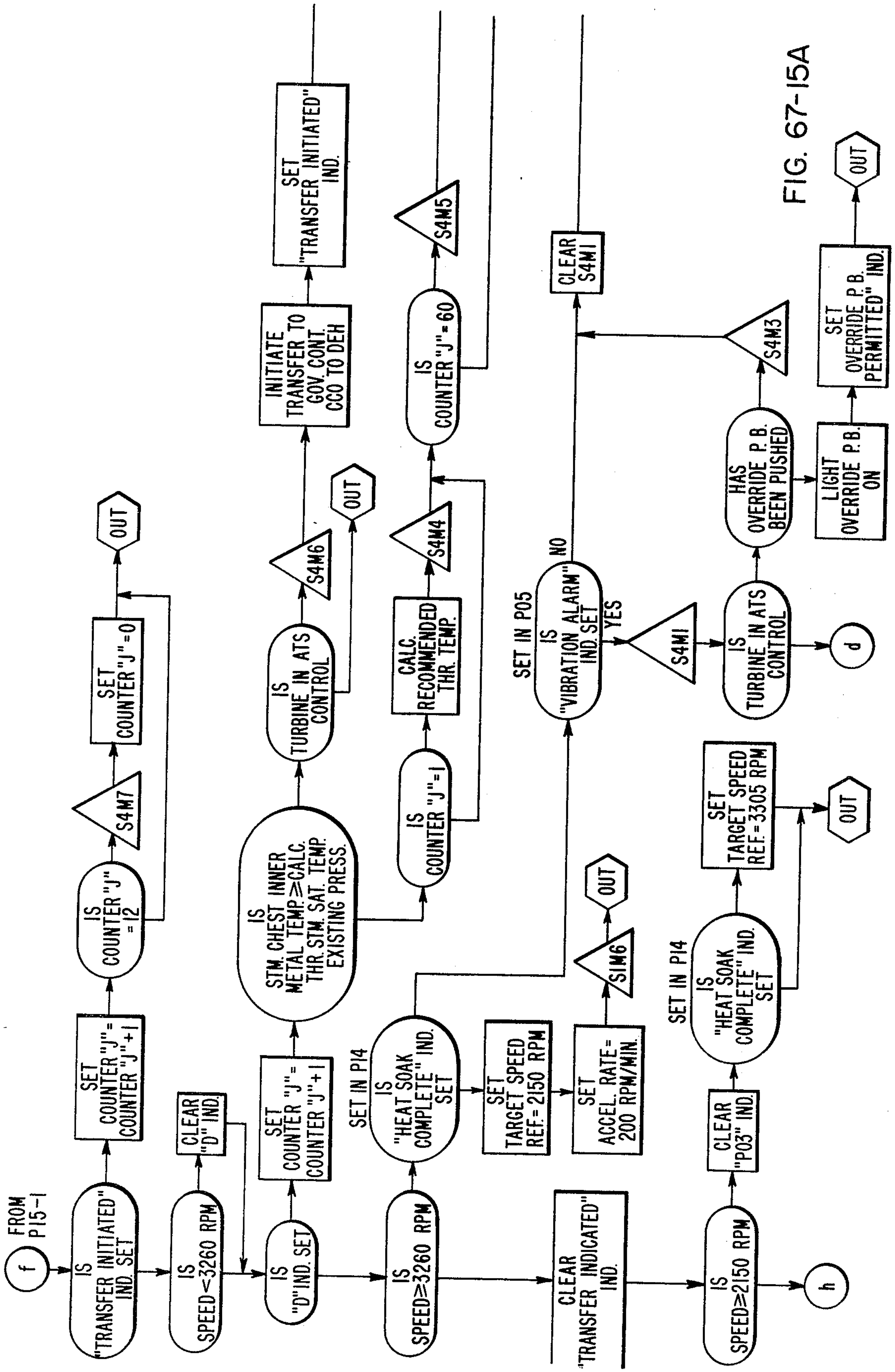
Figures 15B, 67:
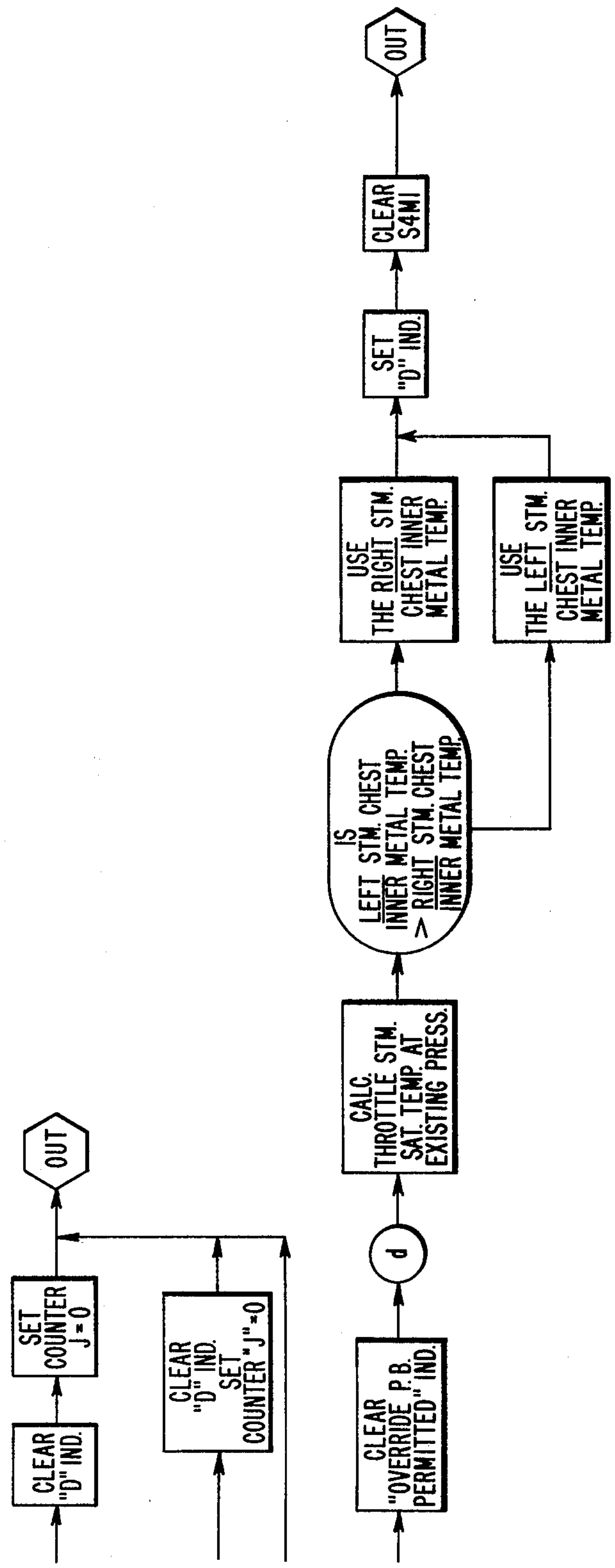
Figures 16A, 67:
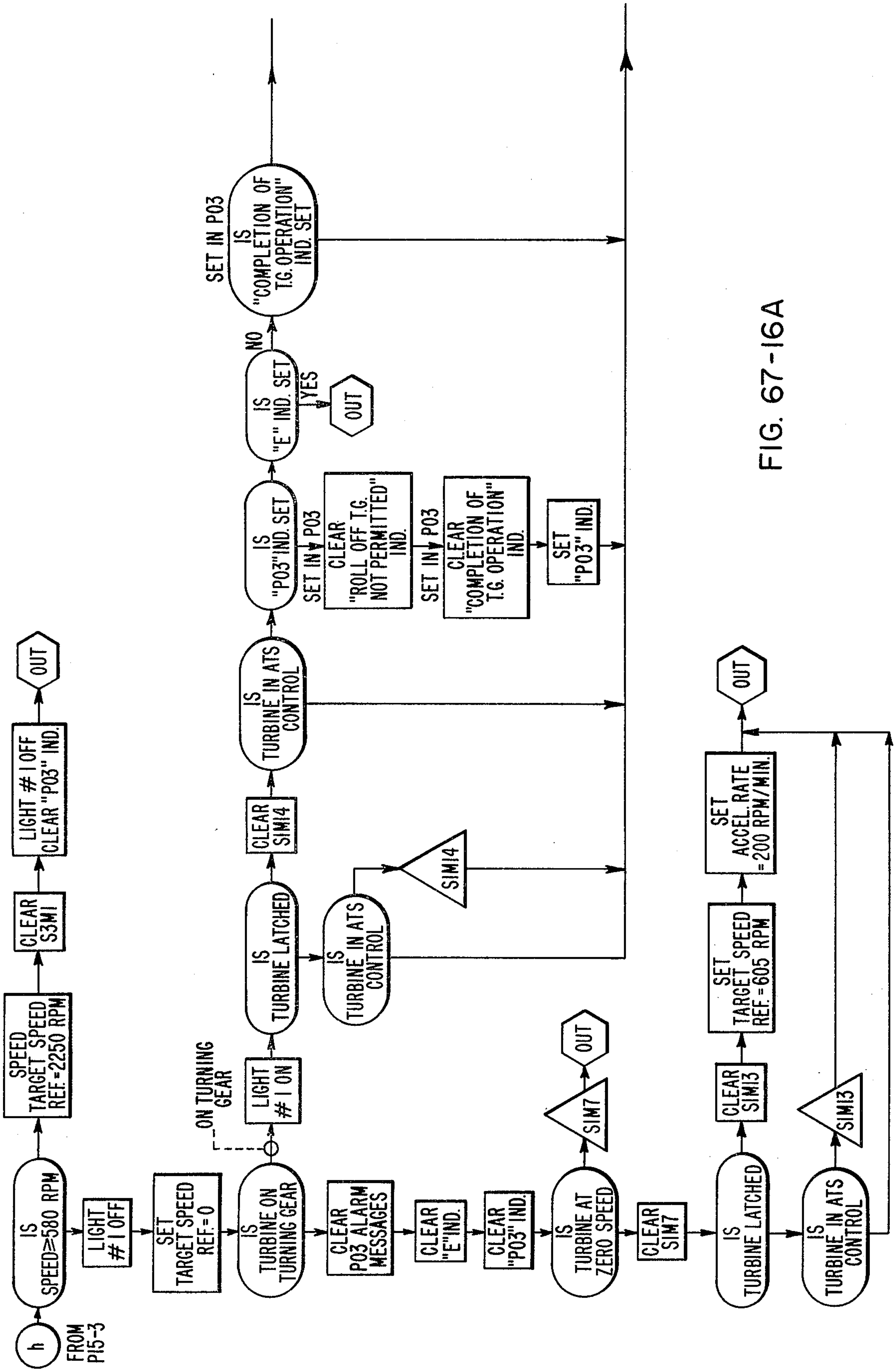
Figures 16B, 67:
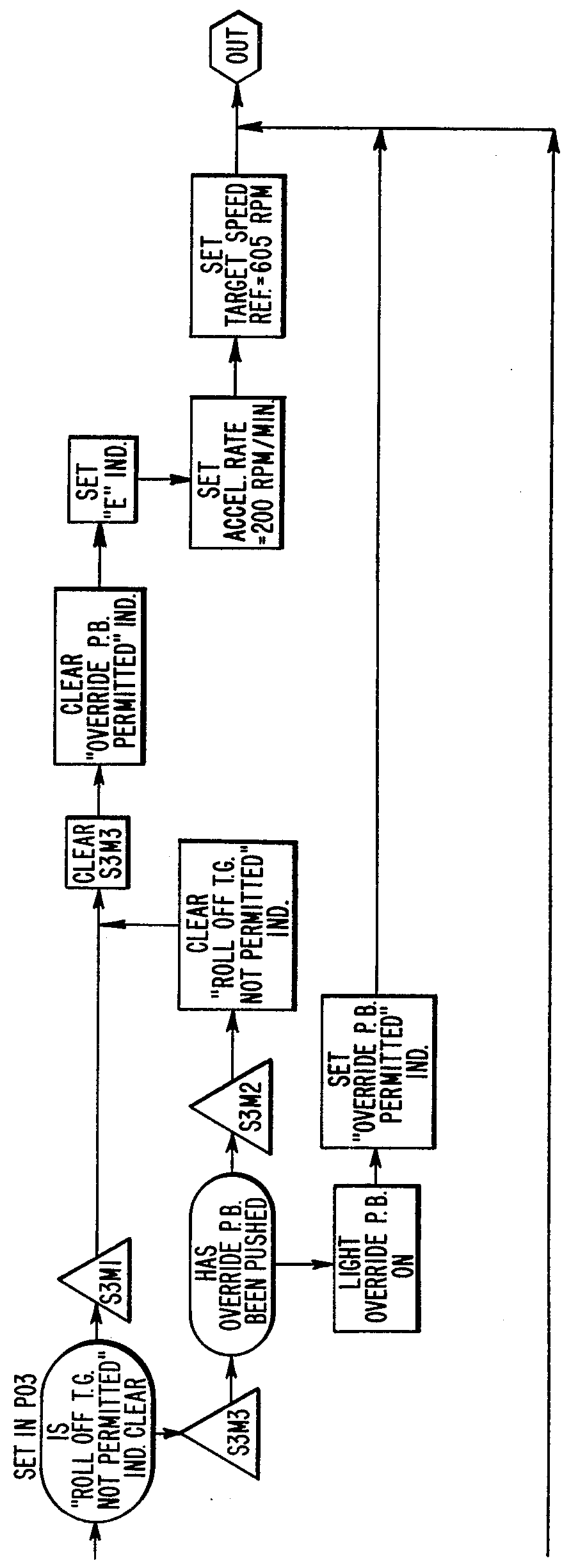
Figures 17, 67:
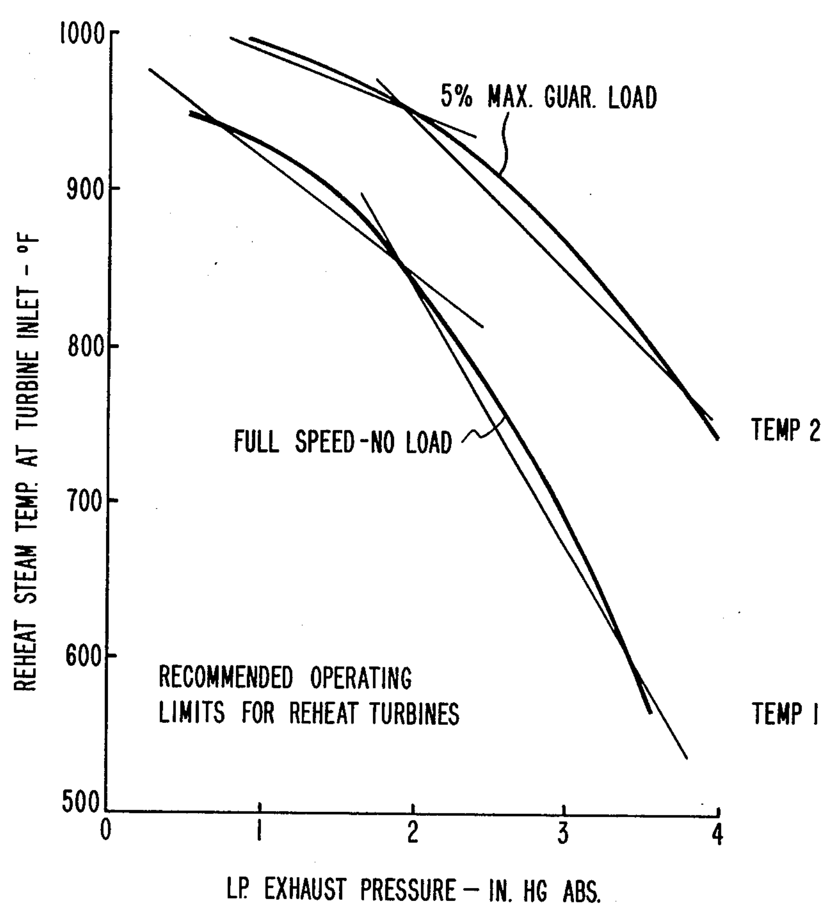
Figures 18, 67:
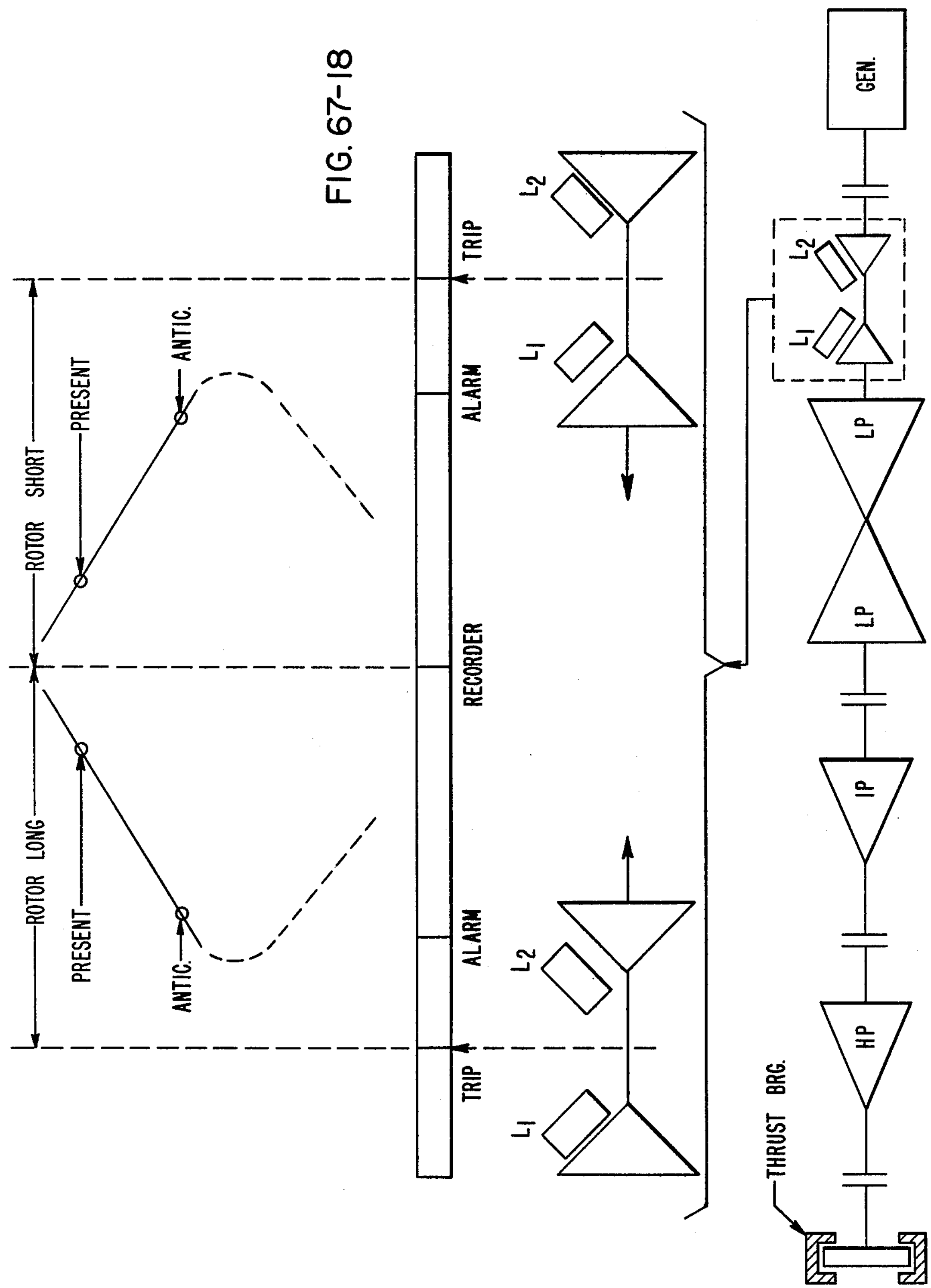
Figures 19, 67:
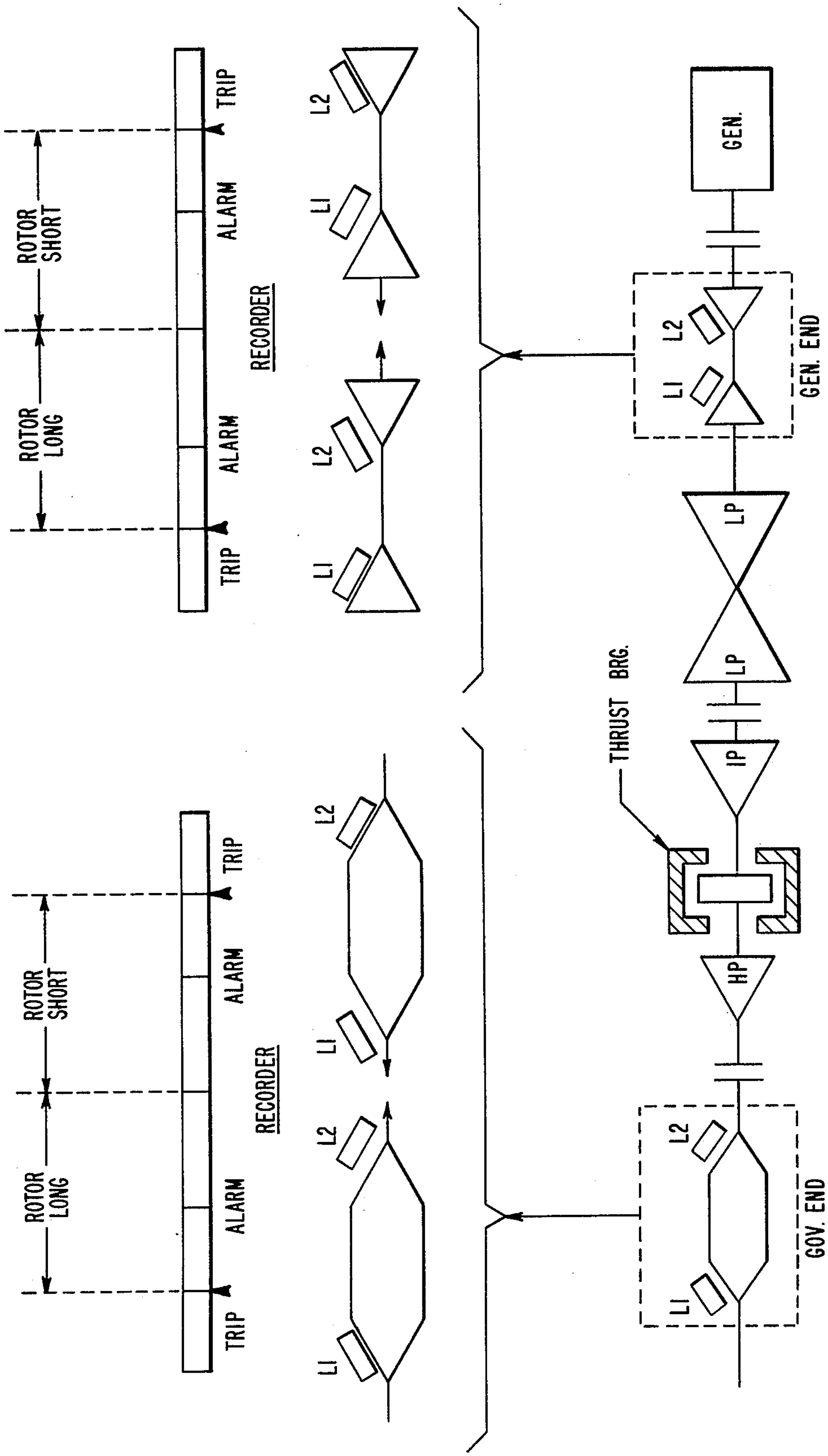
Figures 20A, 67:
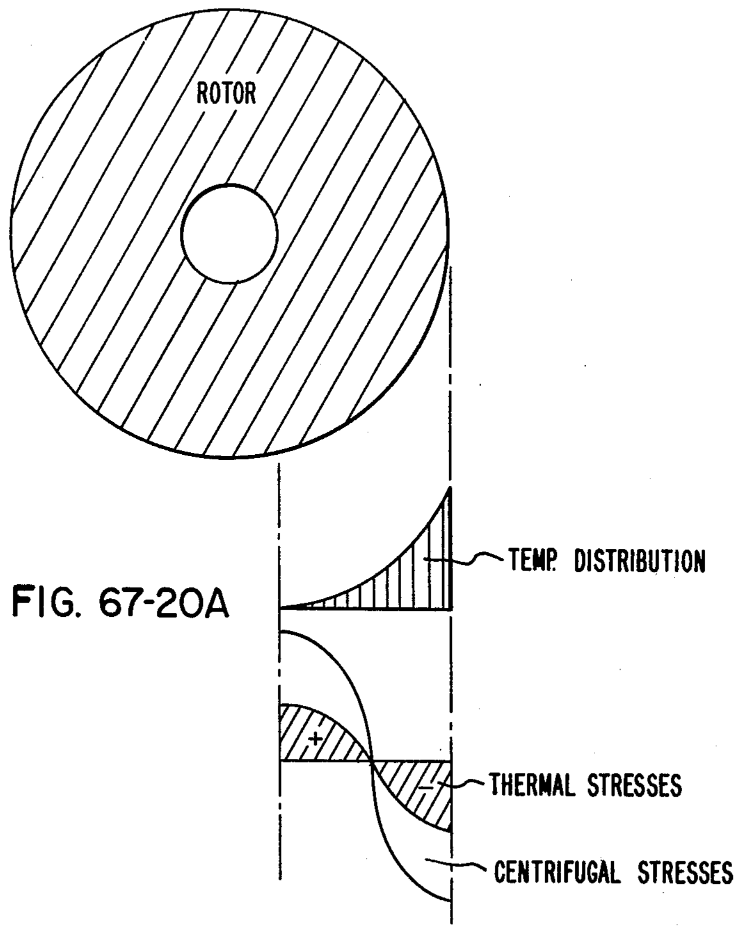
Figures 20B, 67:
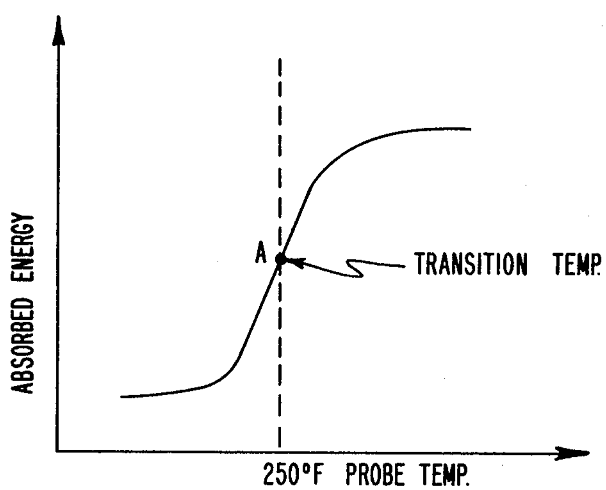
Figure 68:
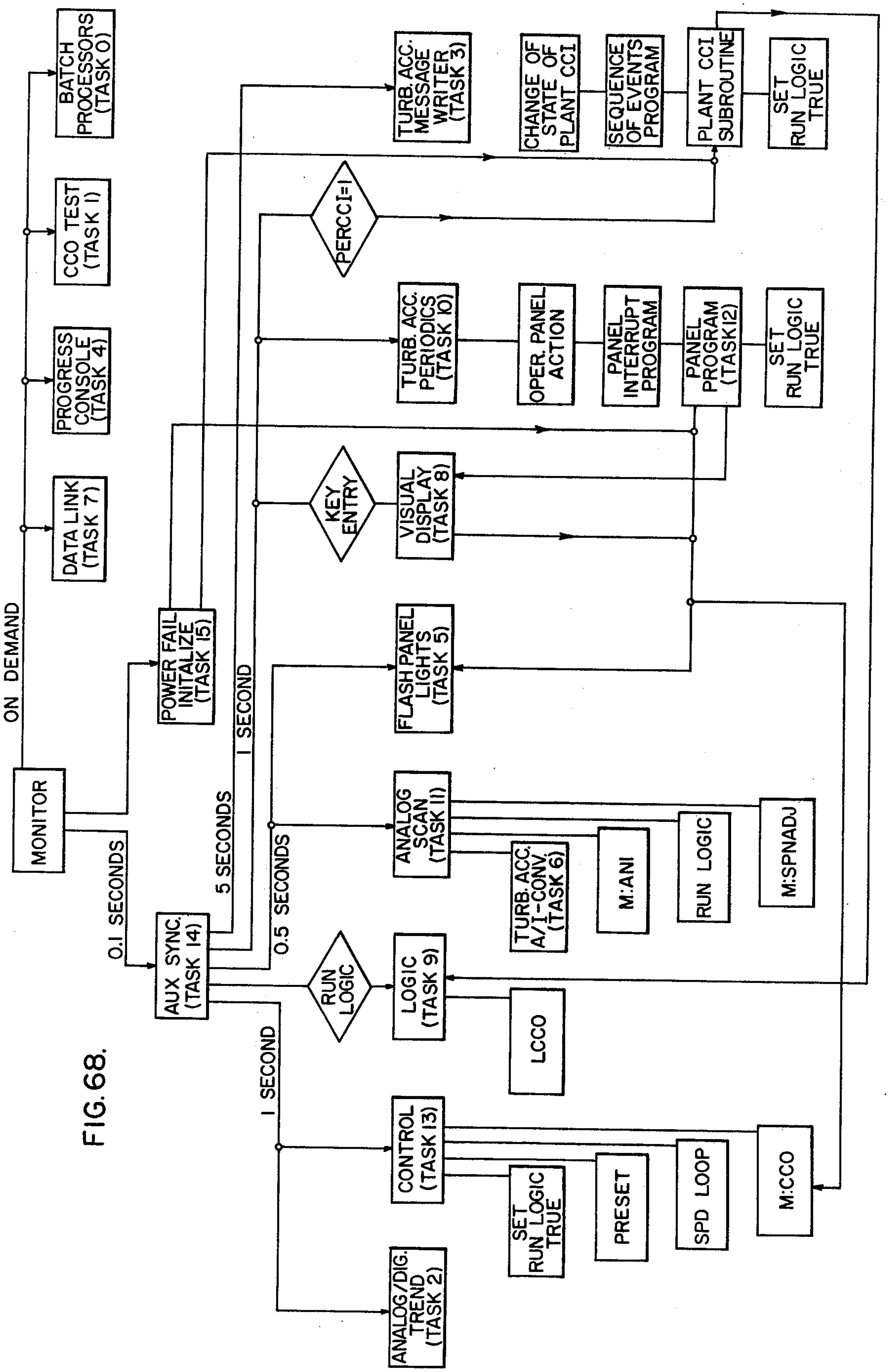

FIG. **56*a*** is a block diagram showing a valve position limit adjustment function which is operable in accordance with the principles of the invention;

FIG. 57 shows an interaction between the DEH program and a valve test function which is operable in accordance with the principles of the invention;

FIG. 58 is a flow chart showing a valve contingency program which is operable in accordance with the principles of the invention;

FIG. 59 shows a block diagram of a speed instrumentation and computation interface with special speed sensing circuitry which is operable in accordance with the principles of the invention;

FIGS. **60*a* and 60*b*** show flow charts of a speed selection function which is operable in accordance with the principles of the invention;

FIG. 61 shows a block diagram of an operating mode selection function which is operable in accordance with the principles of the invention;

FIG. **61*a*** shows a flow chart of a select operating mode function which is operable in accordance with the principles of the invention;

FIG. **61*b*** shows a flow chart of a select operating mode function which is operable in accordance with the principles of the invention;

FIG. 62 shows a symbolic diagram of the use of a speed/load reference function which is operable in accordance with the principles of the invention;

FIG. 63 shows a speed/load reference graph which is operable in accordance with the principles of the invention;

FIG. 64 is a block diagram showing a speed control function which is operable in accordance with the principles of the invention;

FIG. 65 shows a block diagram of the load control system which is operable in accordance with the principles of the invention;

FIG. **65*a*** includes a flow chart of the load control system which is operable in accordance with the principles of the invention;

FIG. 66 shows a block diagram of the throttle valve control function which is operable in accordance with the principles of the invention;

FIG. 67 shows a mixed block diagram of a governor control function program which is operable in accordance with the principles of the invention;

FIG. 67-1 shows a block diagram of the data link program which is operable in accordance with the principles of the invention;

FIG. 67-2 shows a block diagram of the sense parameters in the automatic turbine startup and monitoring program which is operable in accordance with the principles of the invention;

FIG. 67-3 shows a flow chart of a program for determining the rotor stresses in the turbine rotor which is operable in accordance with the principles of the invention;

FIG. 67-4 shows a flow chart of the ATS roll-off subroutine which is operable in accordance with the principles of the invention;

FIG. 67-5A and B show a flow chart of the ATS turbine latching and load references which are operable in accordance with the principles of the invention;

FIG. 67-6A, B and C show a portion of the flow chart of the ATS program which is operable in accordance with the principles of the invention;

FIG. 67-7A and B show a flow chart of the ATS program with library charts which is operable in accordance with the principles of the invention;

FIG. 67-8 shows the flow chart of the ATS acceleration program which is operable in accordance with the principles of the invention;

FIG. 67-9 shows a chart of generator conditions which is operable in accordance with the principles of the invention;

FIG. 67-10A and B show a flow chart of the ATS program governor valve control and drain control which are operable in accordance with the principles of the invention;

FIG. 67-11A and B shows a flow chart of the ATS program sensor failure detection subroutine which is operable in accordance with the principles of the invention;

FIG.67-12A and B shows a flow chart of the ATS vibration scan, reaheat temperature monitoring and heat soak time calculation which are operable in accordance with the principles of the invention;

FIG. 67-13A and B shows a flow chart of the ATS program resetting and clear functions which are operable in accordance with the principles of the invention;

FIG. 67-14A and B shows a flow chart of the ATS generator monitor which is operable in accordance with the principles of the invention;

FIG. 67-15A and B shows a flow chart of the ATS transfer logic front speed to load control which is operable in accordance with the principles of the invention;

FIG. 67-16A and B show a flow chart of the ATS program turbine latch which is operable in accordance with the principles of the invention;

FIG. 67-17 shows a graph of no load and light load guides which are operable in accordance with the principles of the invention;

FIG. 67-18 shows a schematic representation of turbine generator differential expansion which is operable in accordance with the principles of the invention;

FIG. 67-19 shows a schematic representation of turbine generator differential expansion which is operable in accordance with the principles of the invention;

FIG. 67-20A and B show a section with an indication of buildup of rotor stresses in the rotor of the turbine generator which is operable in accordance with the principles of the invention;

FIG. 68 shows a block diagram of the Digital Electro Hydraulic System which is operable in accordance with the principles of the invention.

Figure 69:
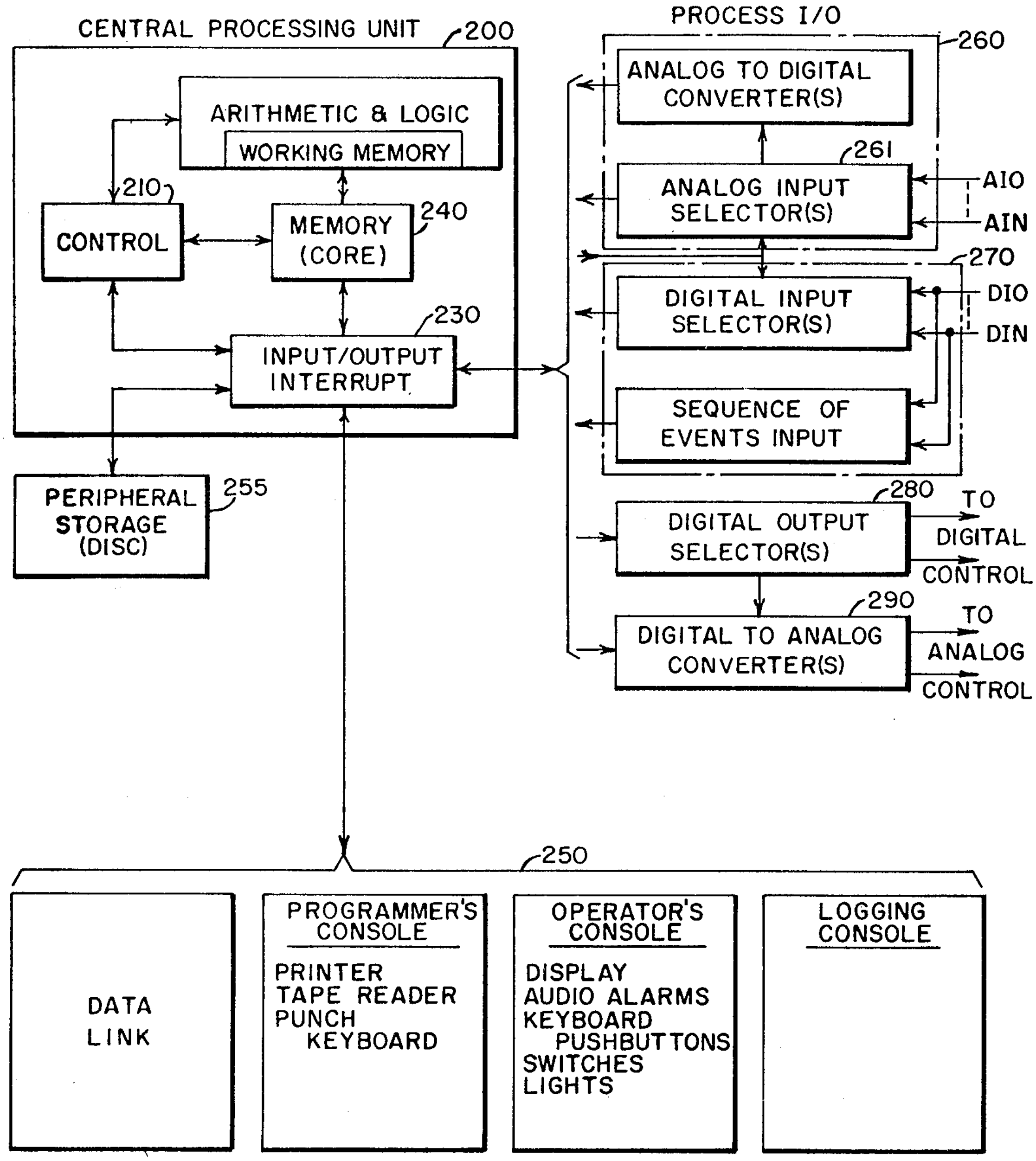
Figure 71A:
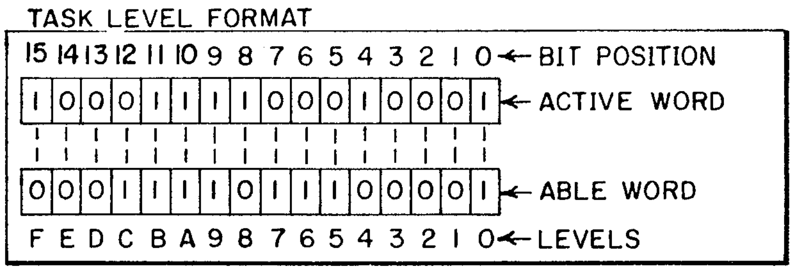
Figure 71B:
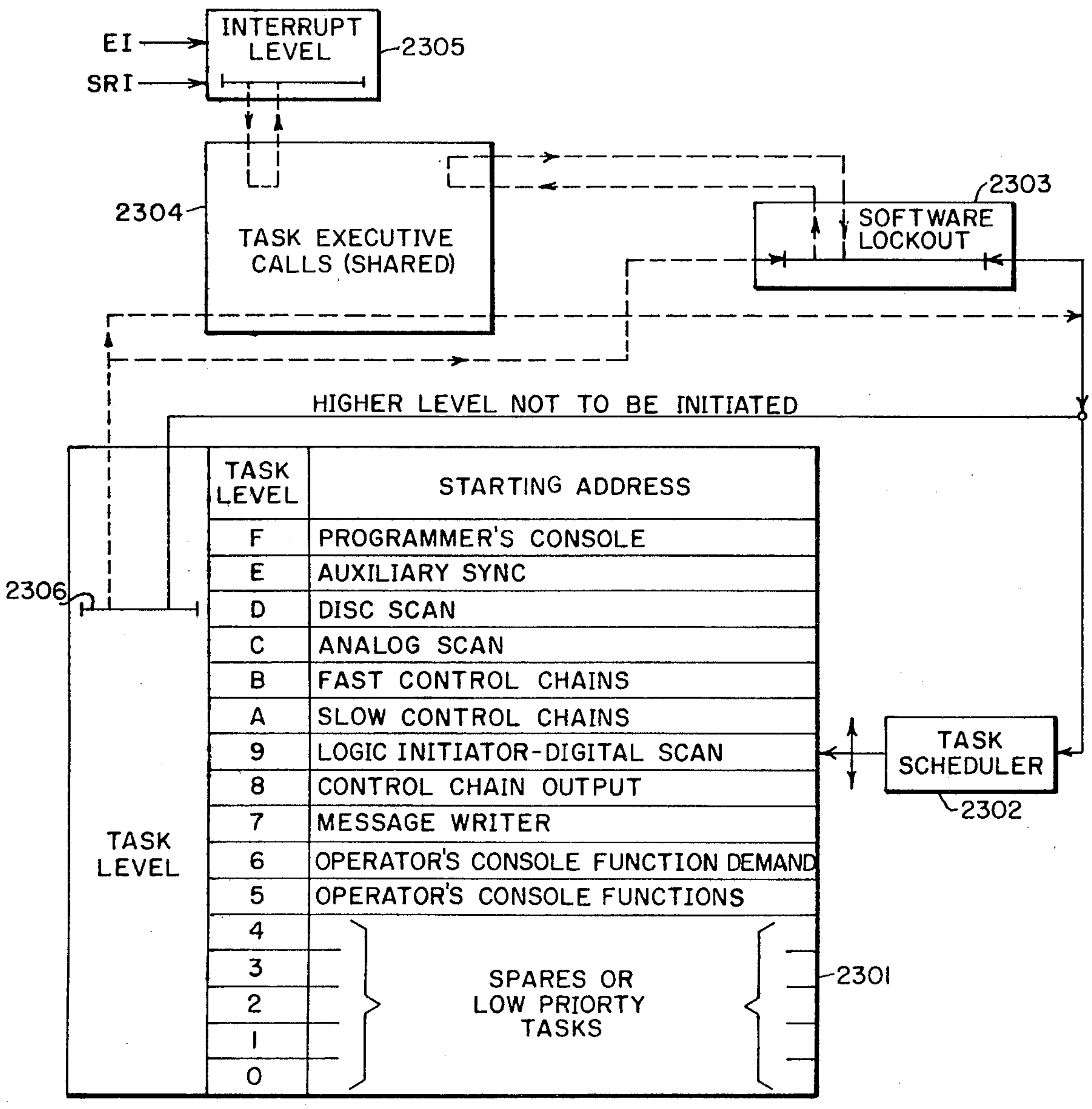
Figure 72A:
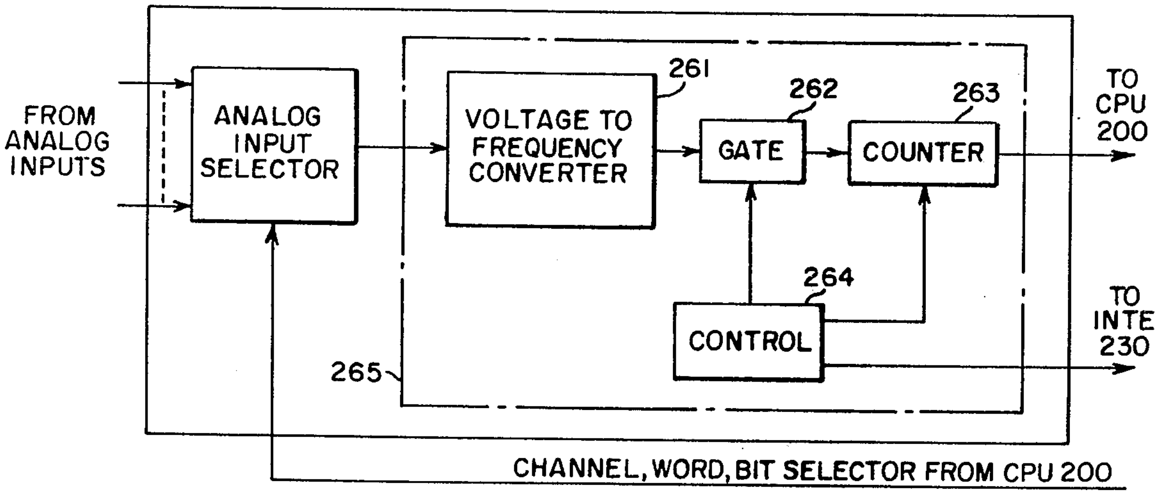
Figure 72B:
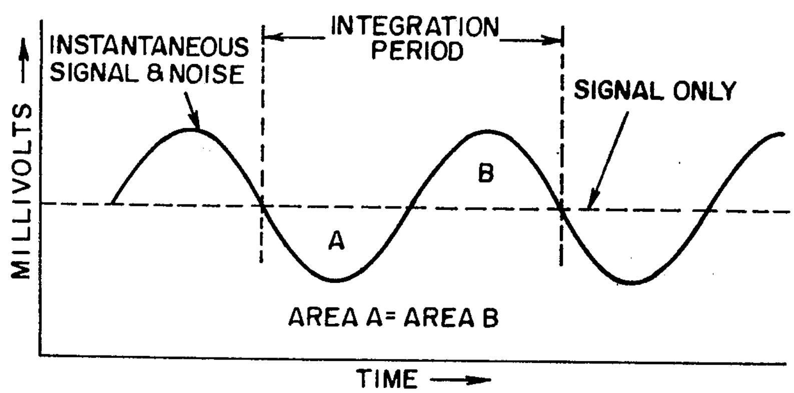
Figure 74B:
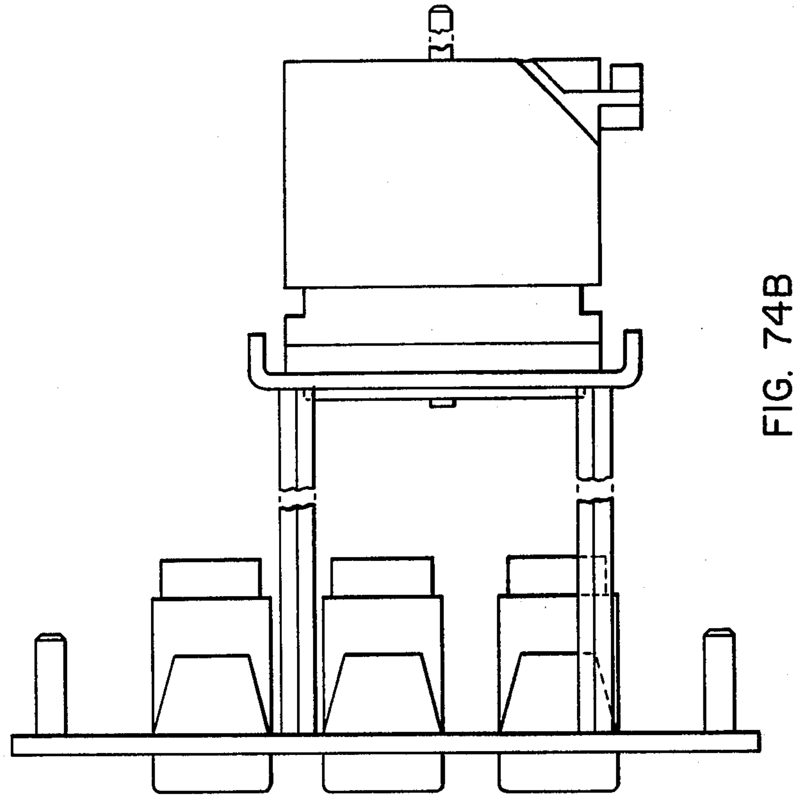
Figure 74A:
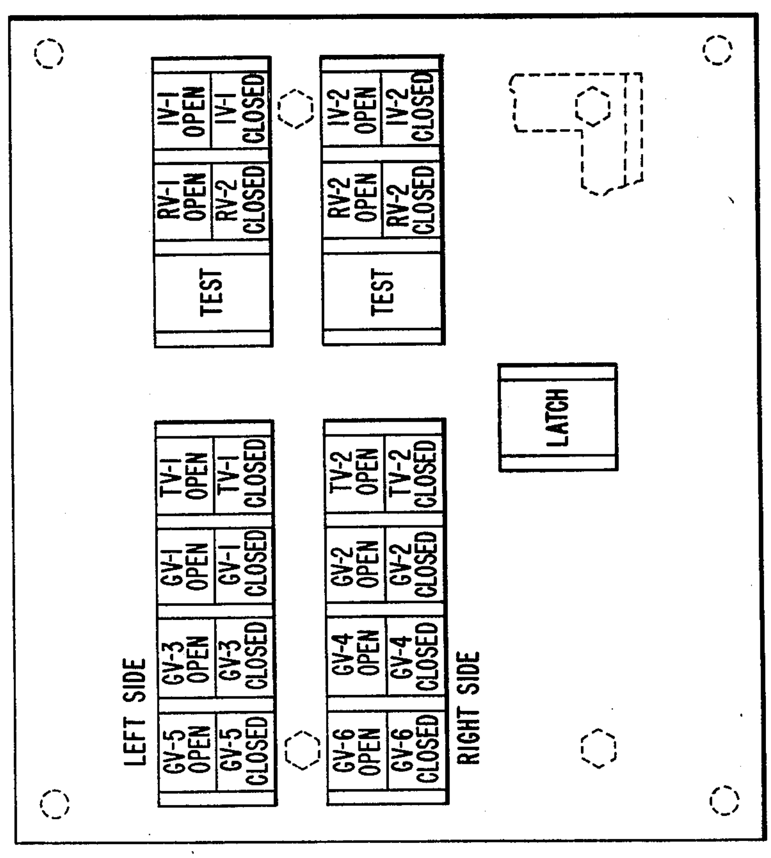
Figure 75:
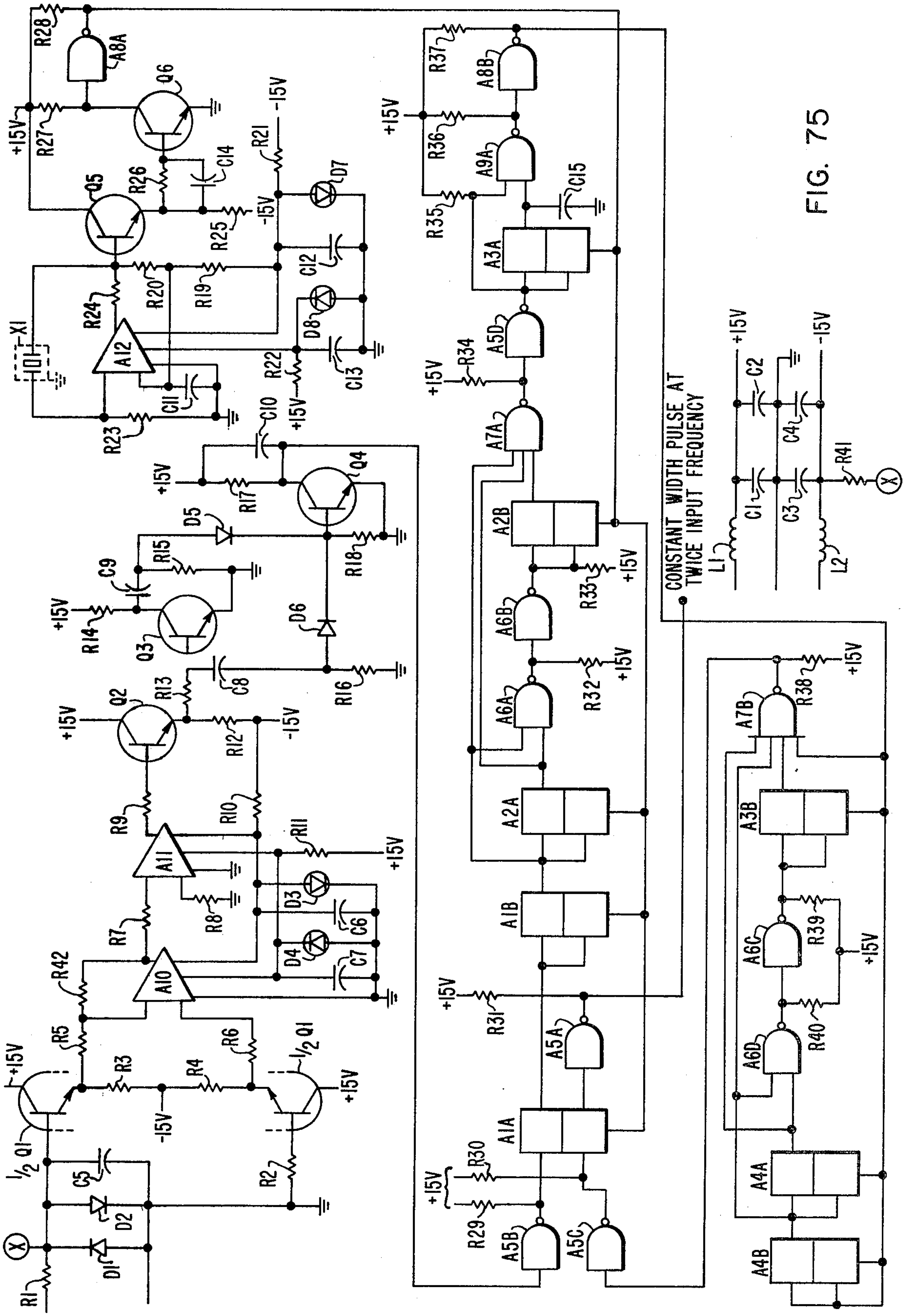
Figure 76:
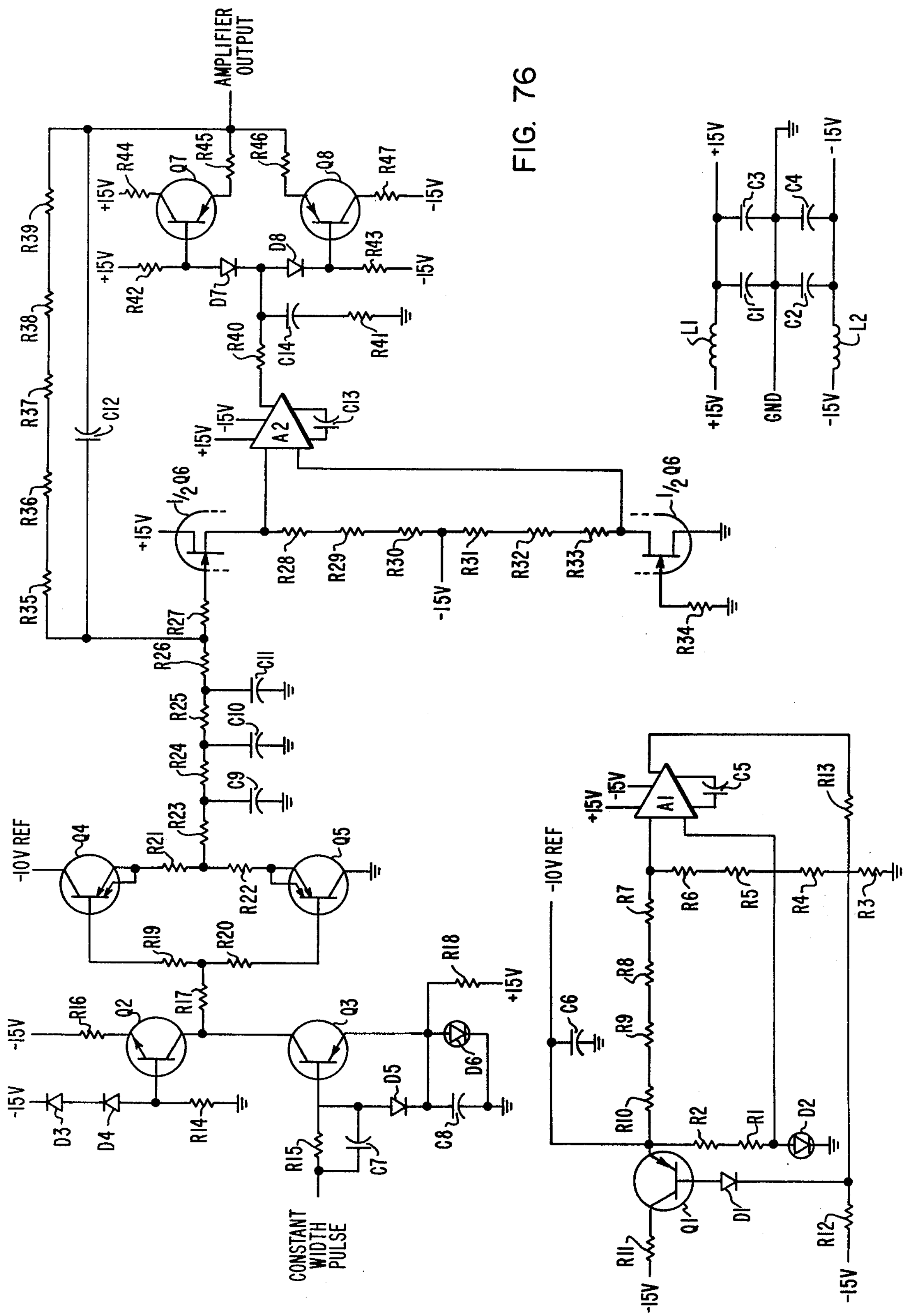
Figure 77:
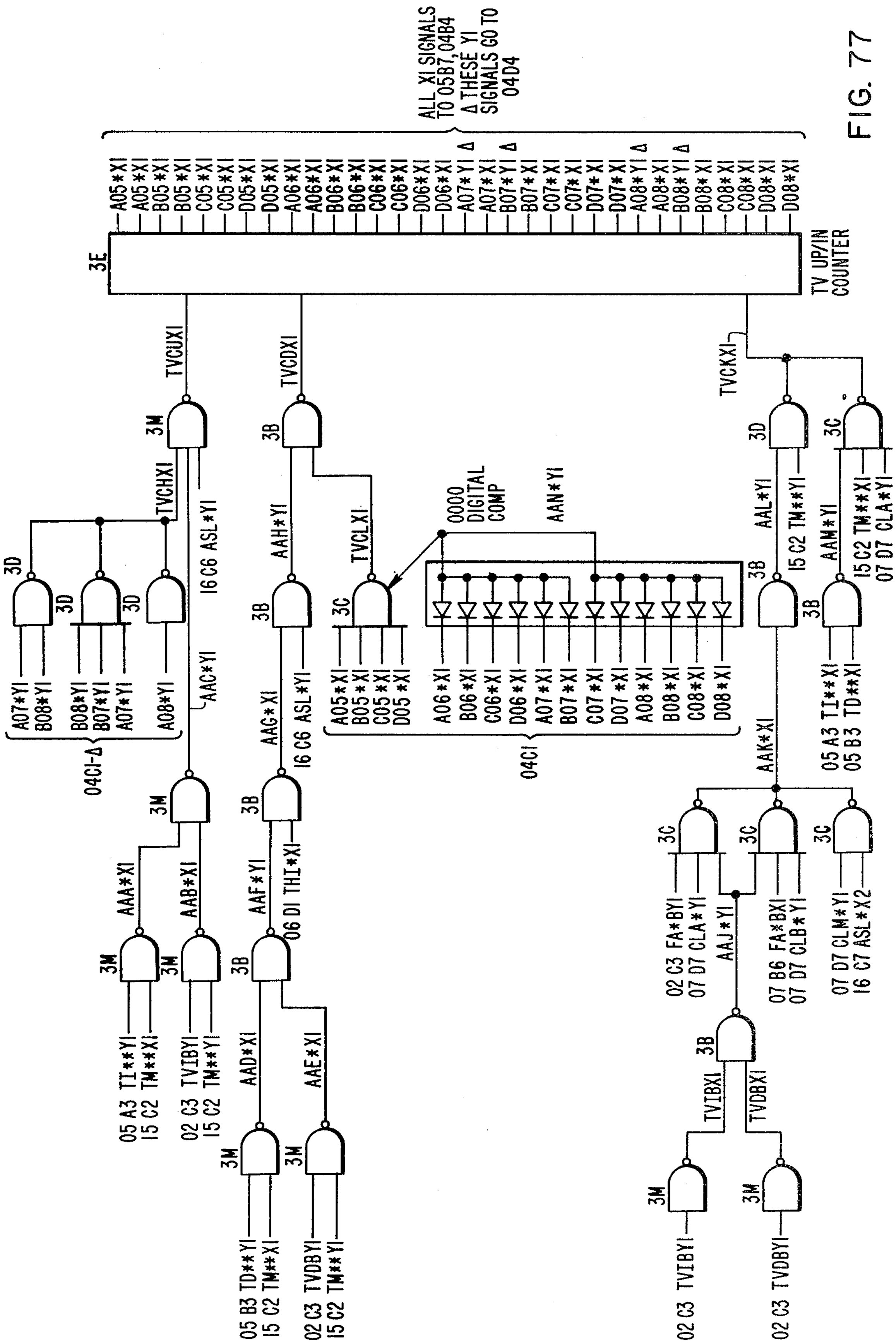
Figure 78:
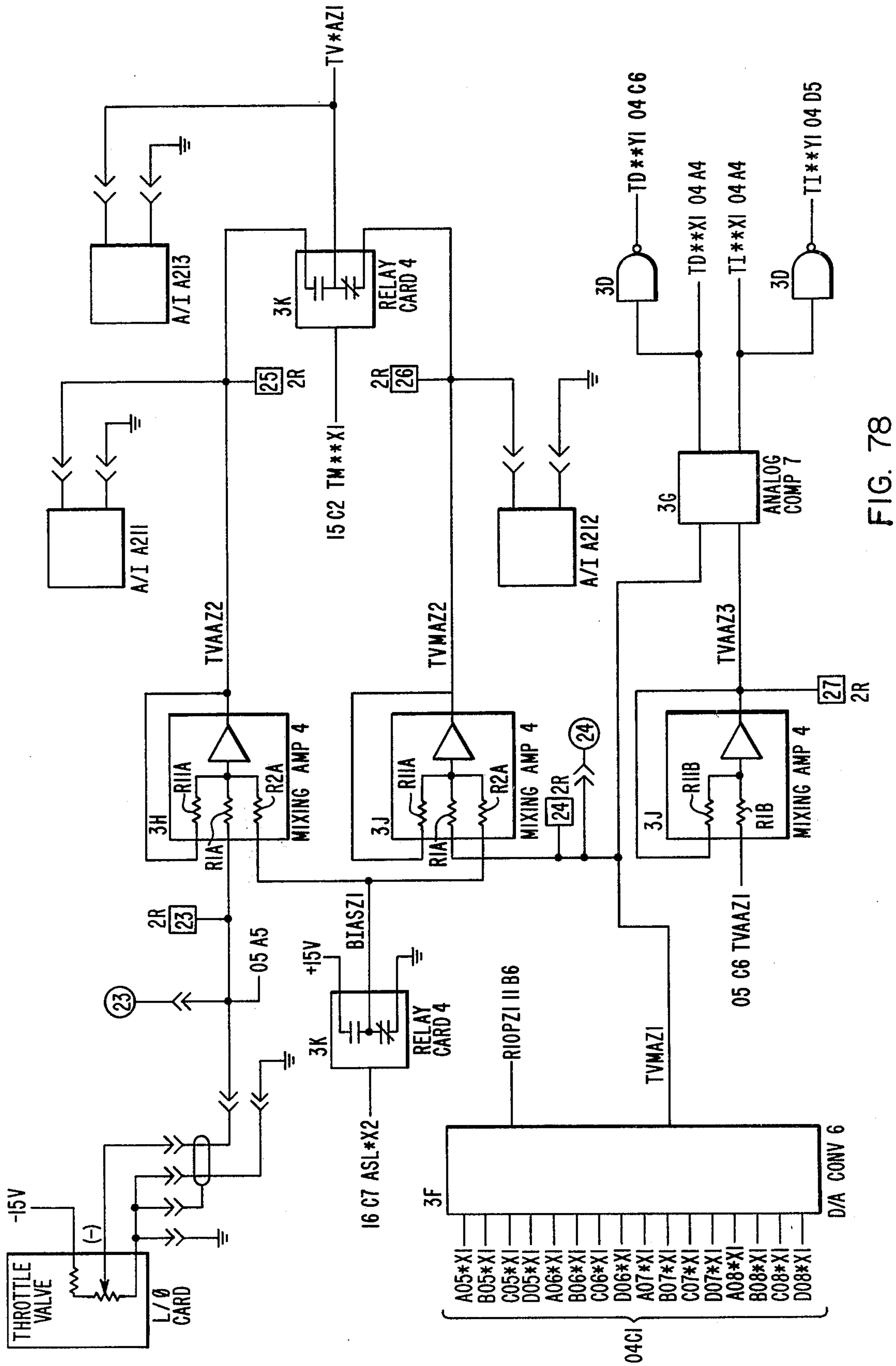
Figure 79A:
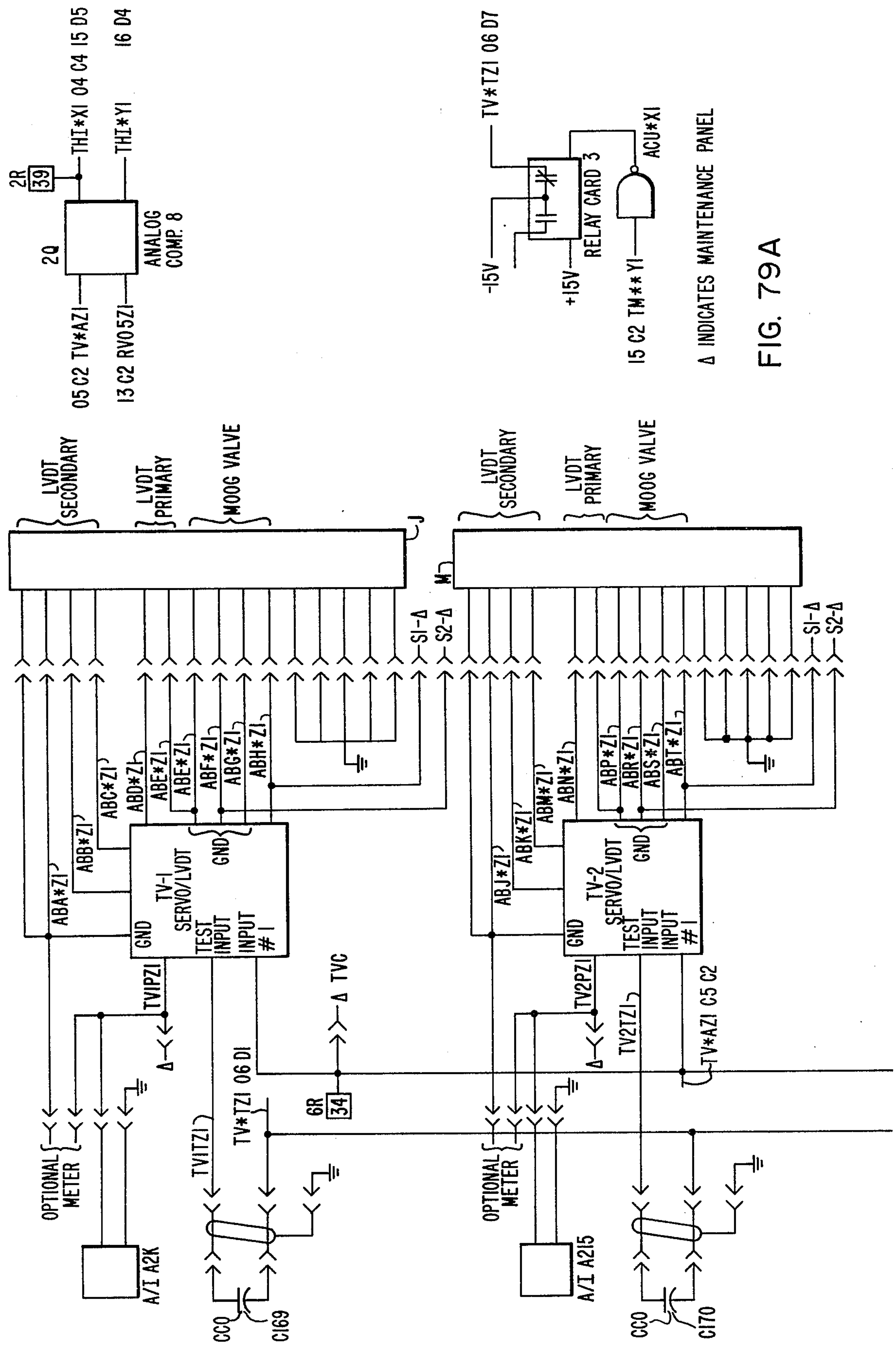
Figure 79B:
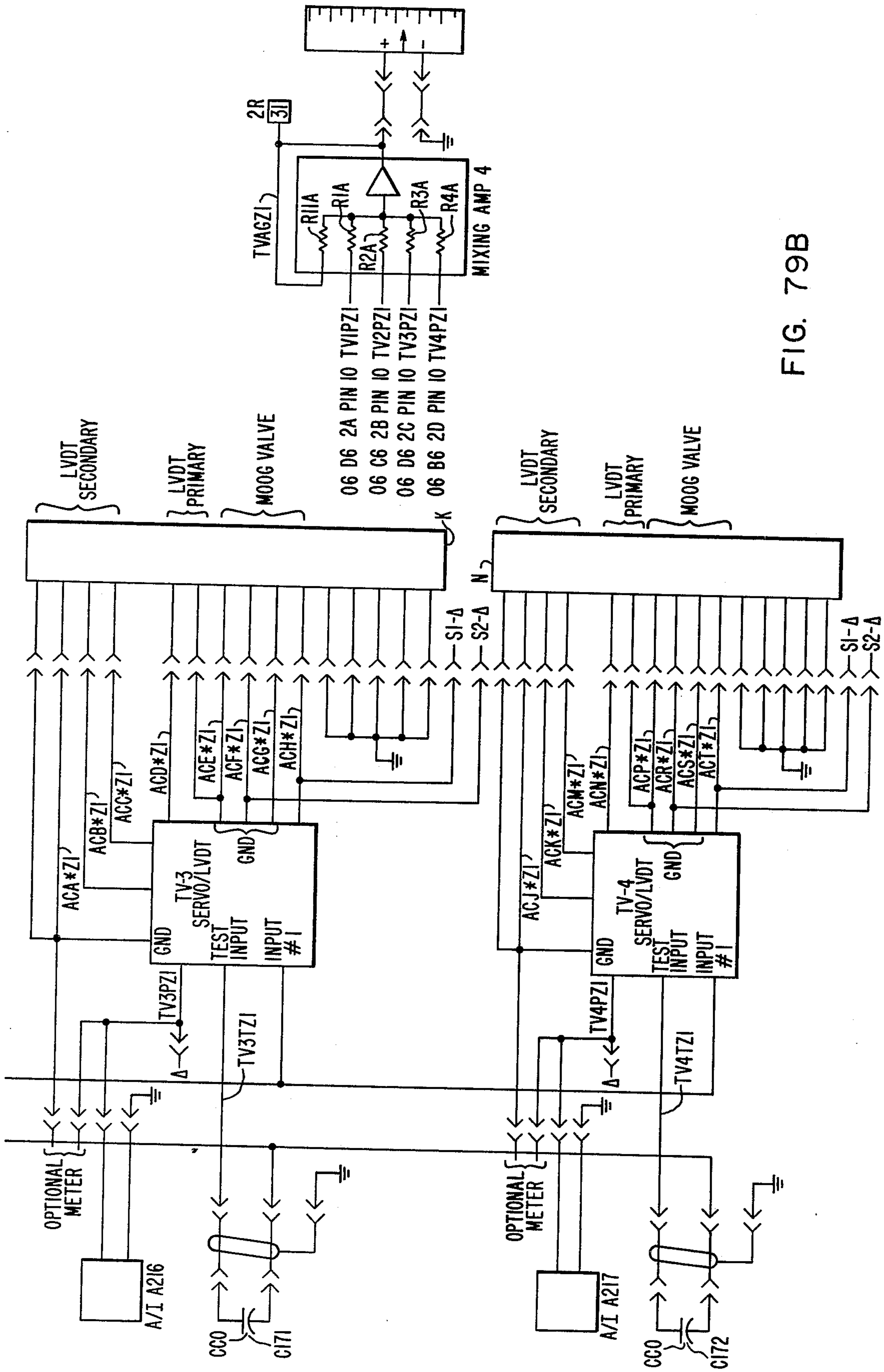
Figure 80:
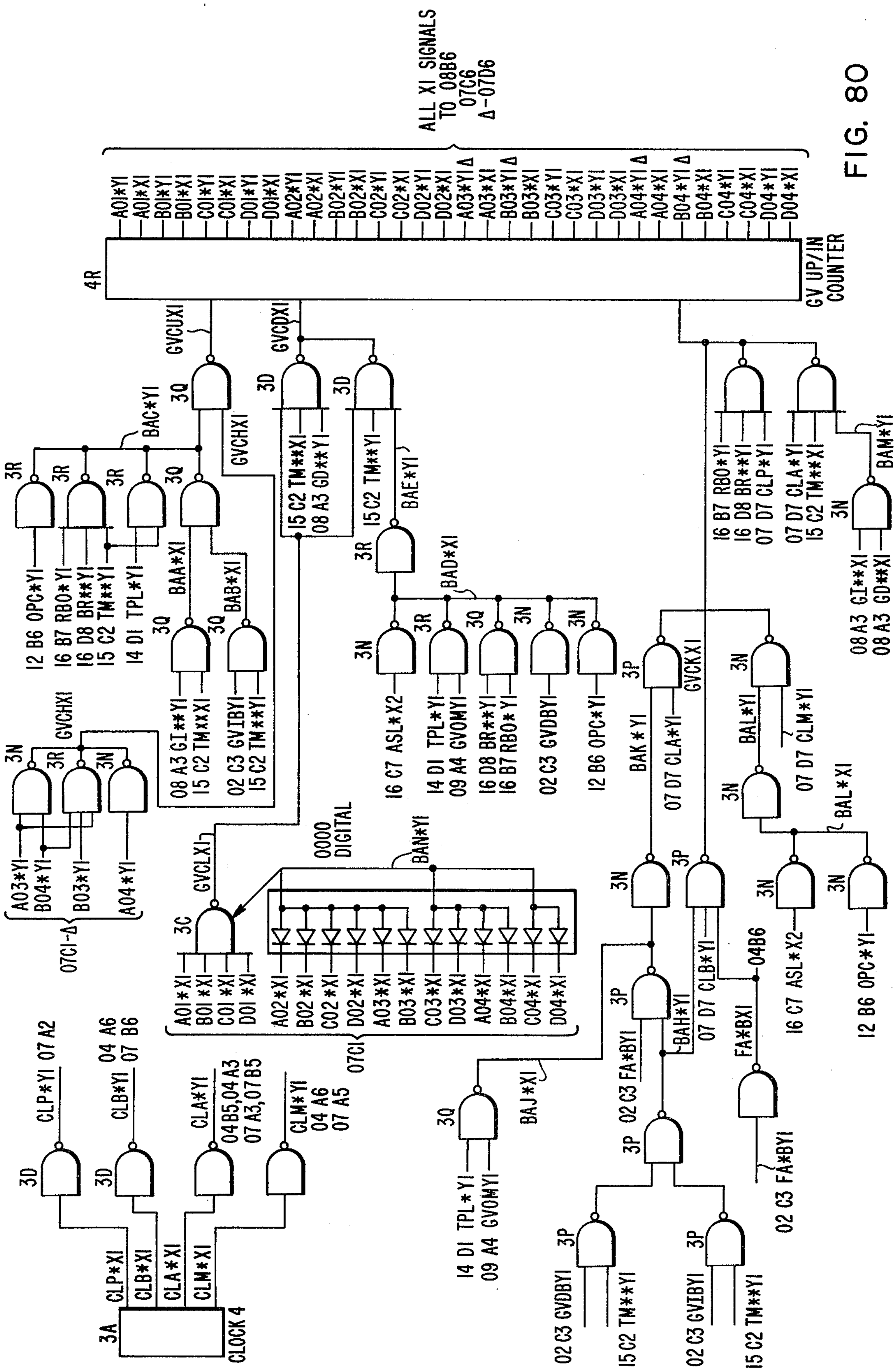
Figure 81:
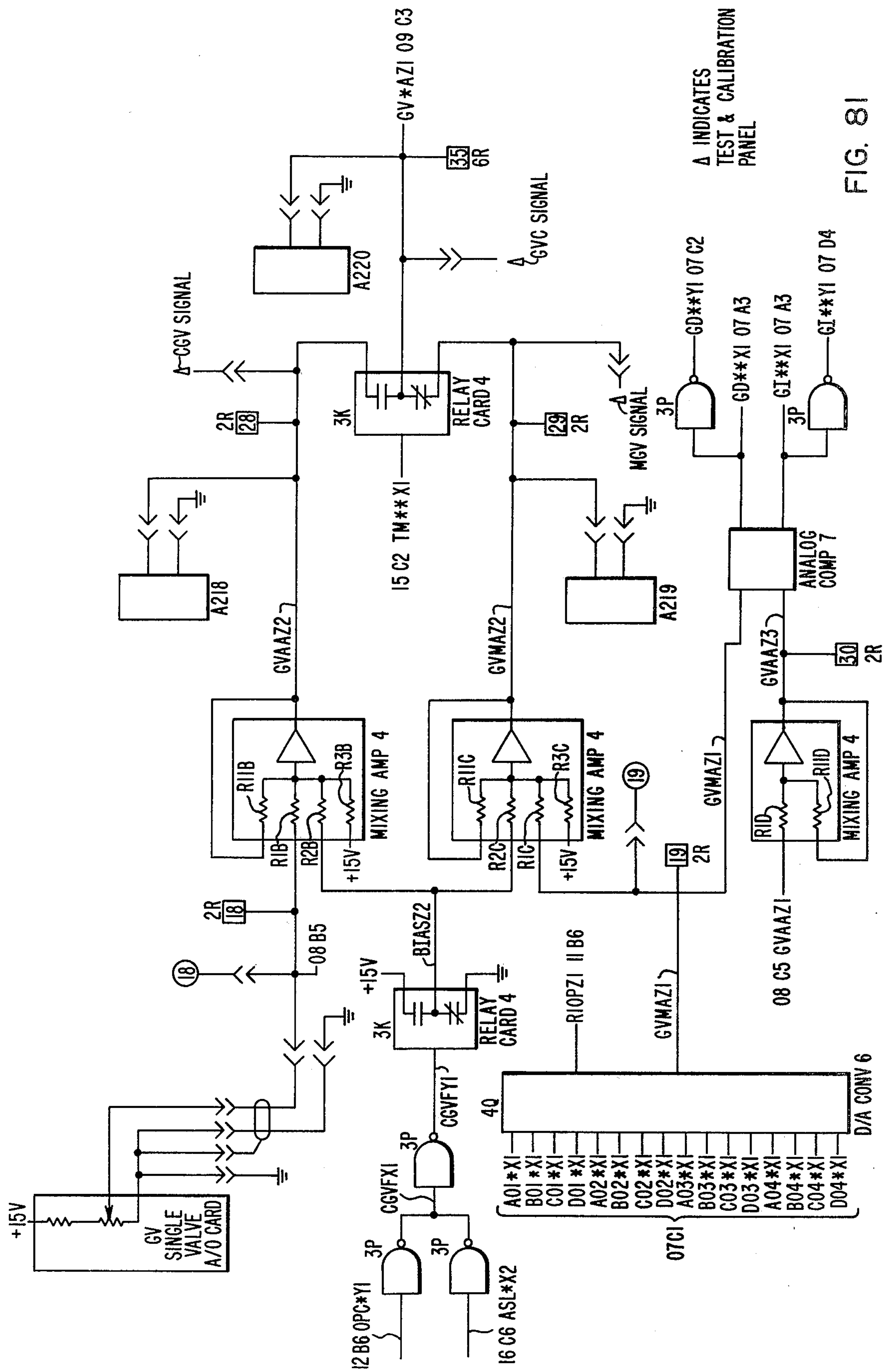
Figure 82:
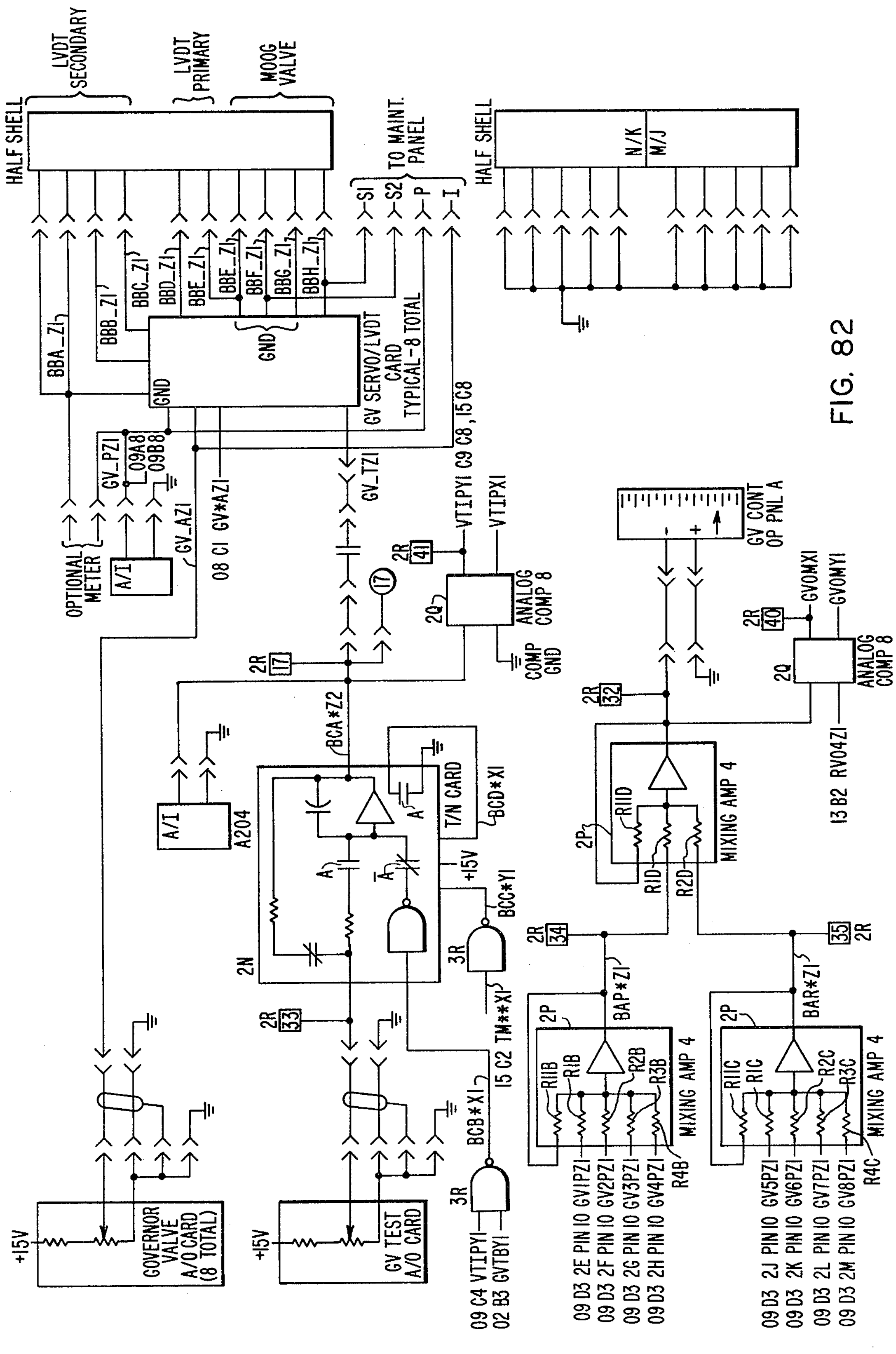
Figure 83A:
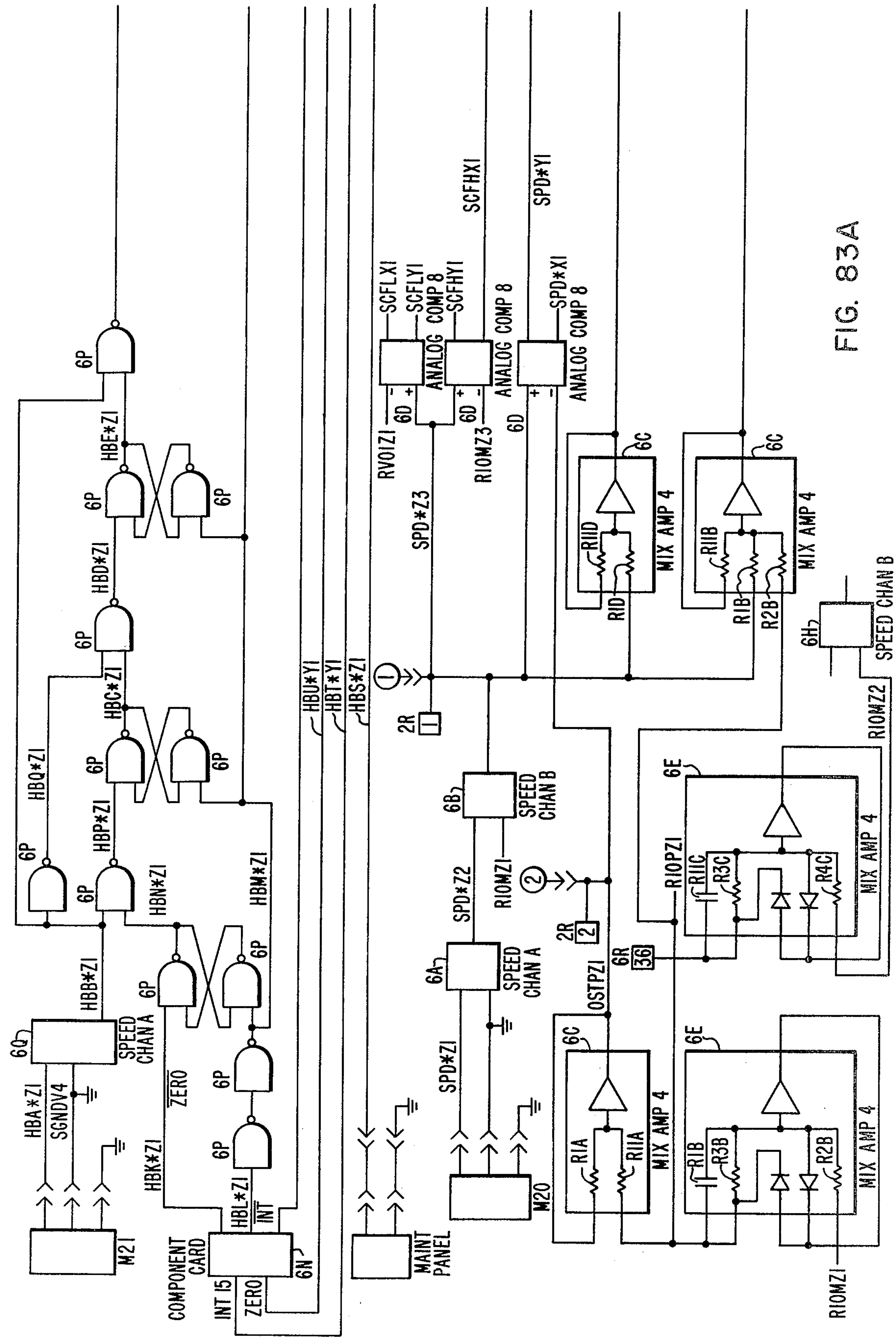
Figure 83B:
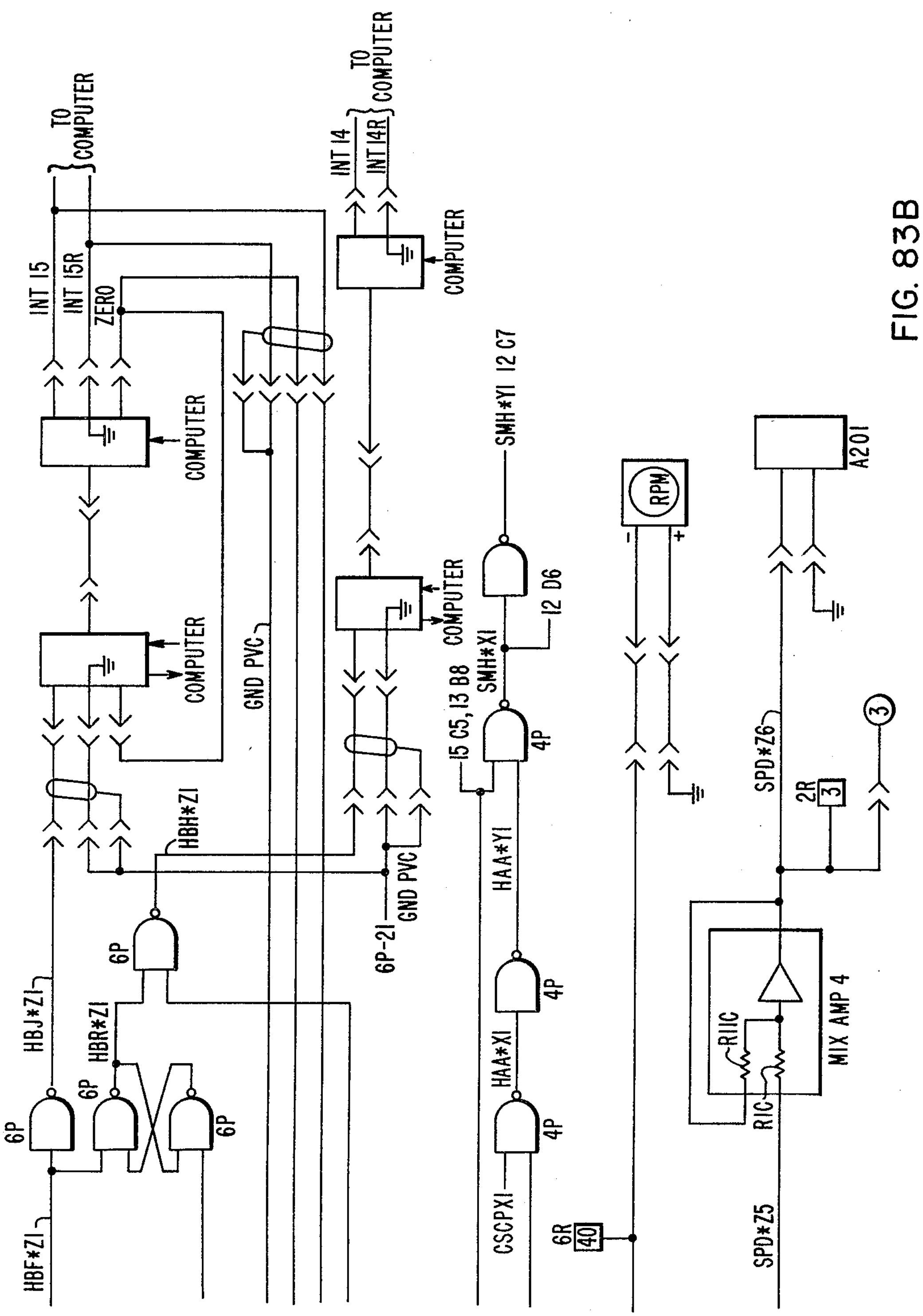
Figure 84:
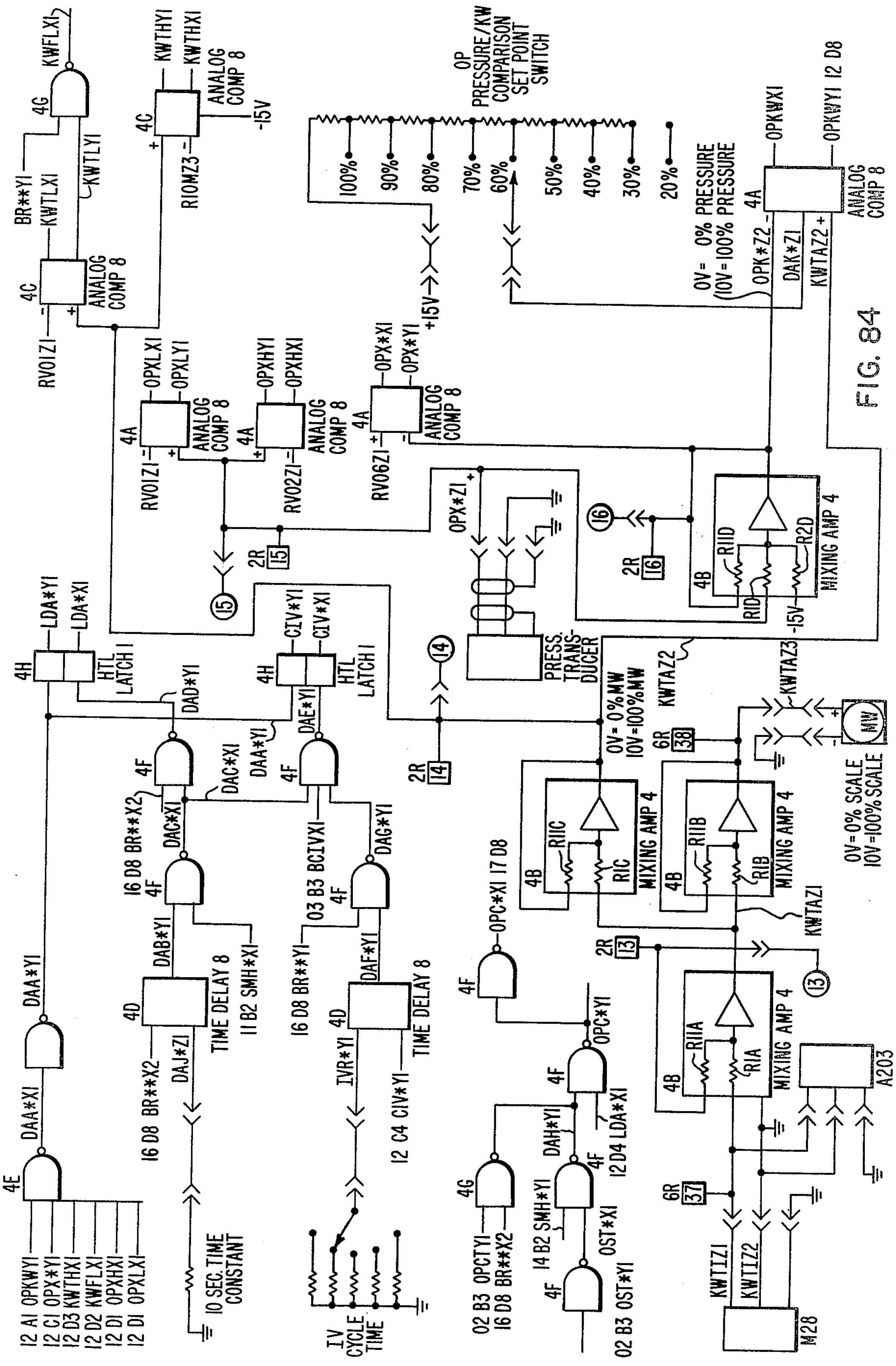
Figure 85:
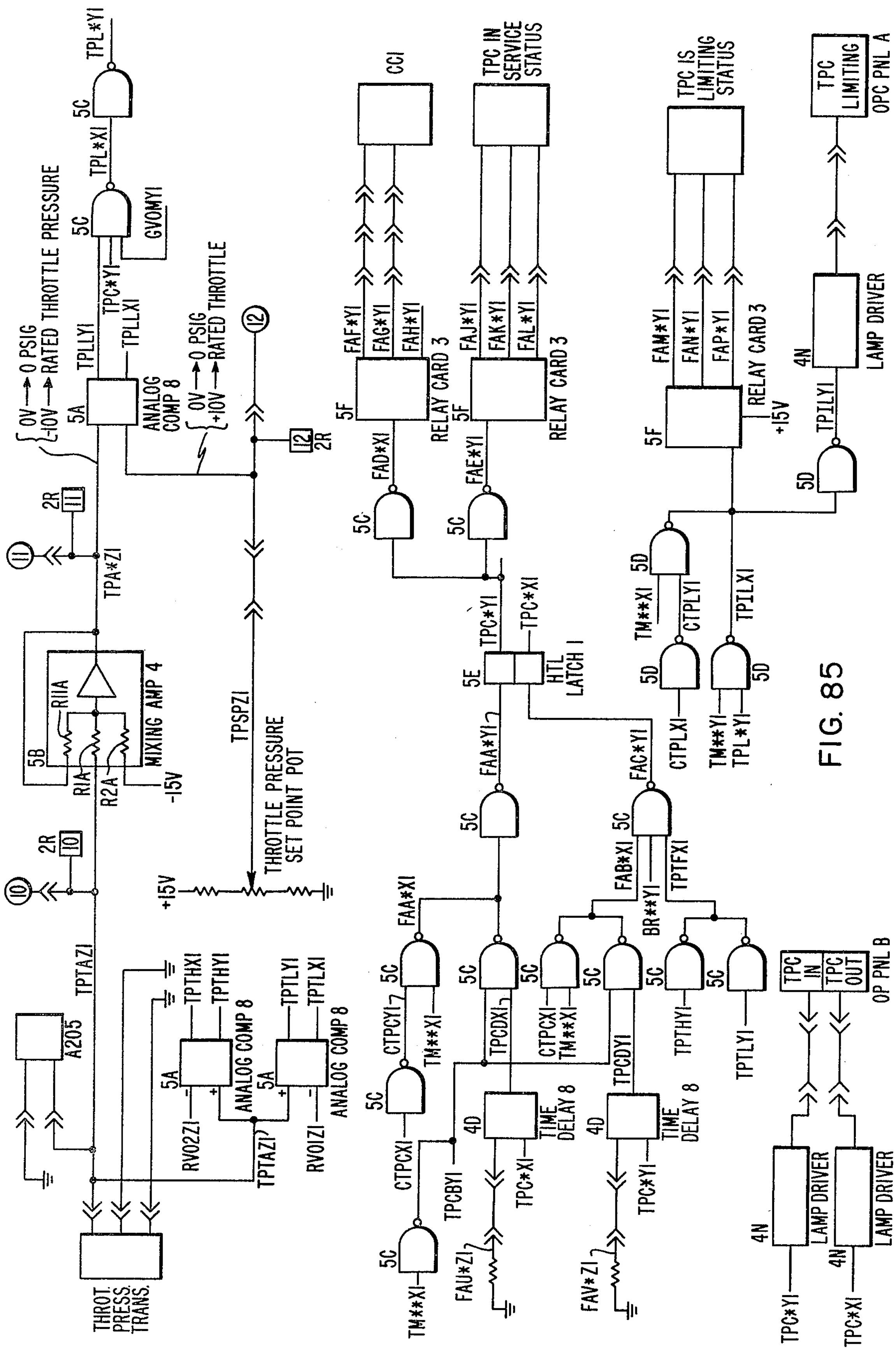
Figure 86:
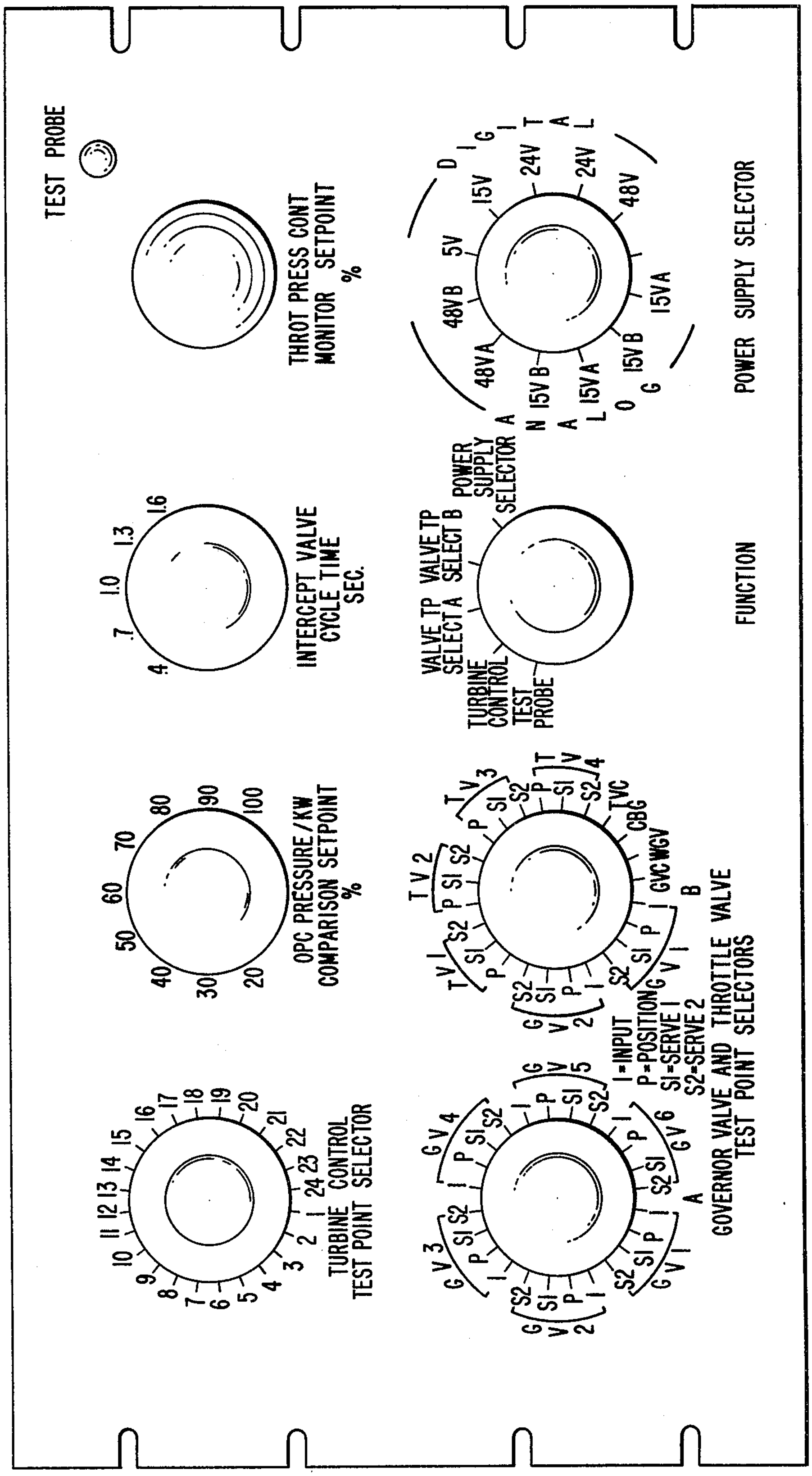
Figure 87A:
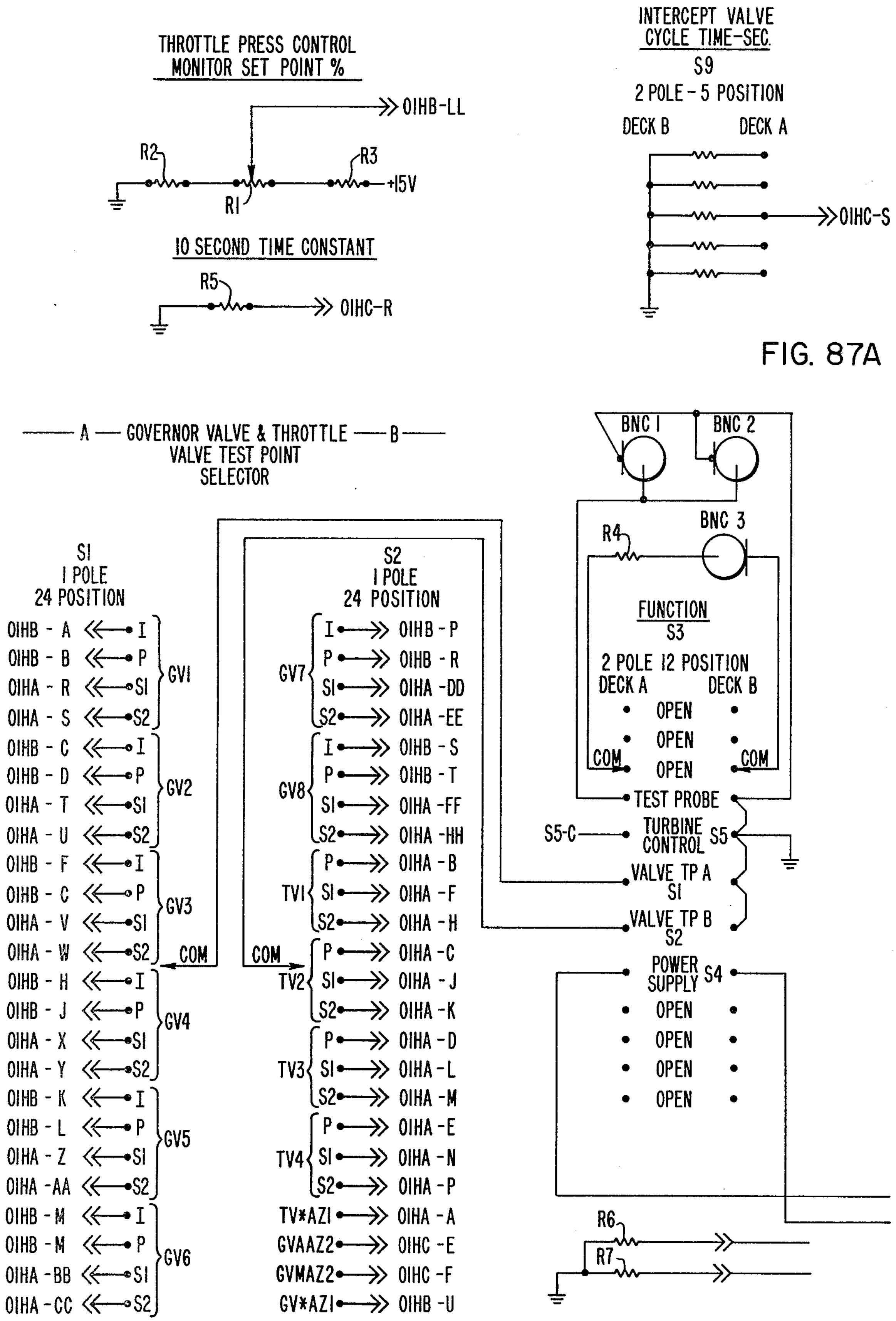
Figure 87B:
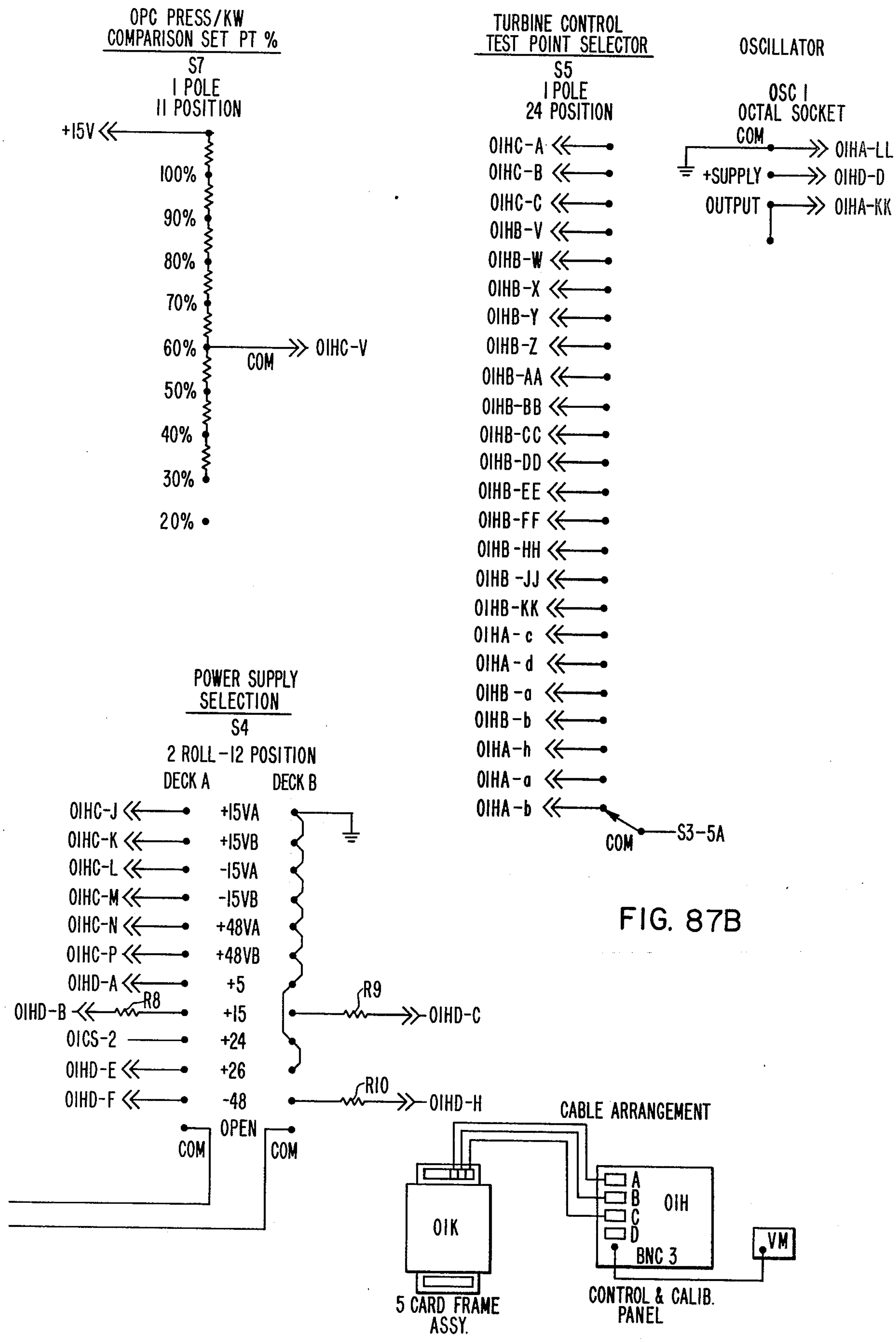

FIG. 69 is an over view block diagram of the computer system;

FIG. 70 is a block diagram representation of the arithmetic and logic portions of the computer system;

FIG. 71A illustrates the words within the executive level which controls the operation of sixteen different task levels;

FIG. 71B is a block diagram representation of the computer system executive program in which FIG. 71A illustrates the words within this executive which control the operation of sixteen different task levels;

FIG. 72A is a block diagram representation of an analog to digital converter;

FIG. 72B illustrates graphically the operation of this converter;

FIG. 73 illustrates miscellaneous system tables which are called upon by a subtask processor program;

FIG. 74A and B show a valve test panel of the DEH system;

FIG. 75 shows operational amplifier and logical circuitry in the DEH system;

FIG. 76 shows transistor and operational amplifier circuitry;

FIG. 77 shows logic circuitry for the DEH system;

FIG. 78 shows electronic circuitry connected to a throttle valve;

FIG. 79A and B show metering and detecting circuitry and LVDT circuit connections;

FIG. 80 shows logic circuitry of the DEH system;

FIG. 81 shows logic and operational amplifier circuitry of the DEH systems;

FIG. 82 shows governor valve circuitry;

FIG. 83A and B show flip-flop circuitry and other analog circuitry;

FIG. 84 shows operator panel interface circuitry;

FIG. 85 shows throttle pressure transmission circuitry;

FIG. 86 shows a power supply control panel;

FIG. 87A and B show interconnections between overspeed protection control, interceptor valve and throttle control circuitry.

DESCRIPTION OF THE PREFERRED EMBODIMENT

A. Power Plant

More specifically, there is shown in FIG. 1 a large single reheat steam turbine constructed in a well known manner and operated and controlled in an electric power plant 12 in accordance with the principles of the invention. As will become more evident through this description, other types of steam turbines can also be controlled in accordance with the principles of the invention and particularly in accordance with the broader aspects of the invention. The generalized electric power plant shown in FIG. 1 and the more general aspects of the computer control system to be described in connection with FIG. 2 are like those disclosed in the aforementioned Giras and Birnbaum Pat. application No. 319,115. As already indicated, the present application is directed to general improvements in turbine operation and control as well as more specific improvements related to digital computer operation and control of turbines.

The turbine 10 is provided with a single output shaft 14 which drives a conventional large alternating current generator 16 to produce three-phase electric power (or any other phase electric power) as measured by a conventional power detector 18 which measures the rate of flow of electric energy. Typically, the generator 16 is connected through one or more breakers 17 per phase to a large electric power network and when so connected causes the turbo-generator arrangement to operate at synchronous speed under steady state conditions. Under transient electric load change conditions, system frequency may be affected and conforming turbon-generator speed changes would result. At synchronism, power contribution of the generator 16 to the network is normally determined by the turbine steam flow which in this instance is supplied to the turbine 10 at substantially constant throttle pressure.

In this case, the turbine 10 is of the multistage axial flow type and includes a high pressure section 20, an intermediate pressure section 22, and a low pressure section 24. Each of these turbine sections may include a plurality of expansion stages provided by stationary vanes and an interacting bladed rotor connected to the shaft 14. In other applications, turbines operating in accordance with the present invention may have other forms with more or fewer sections tandemly connected to one shaft or compoundly coupled to more than one shaft.

The constant throttle pressure steam for driving the turbine 10 is developed by a steam generating system 26 which is provided in the form of a conventional drum type boiler operated by fossil fuel such as pulverized coal or natural gas. From a generalized standpoint, the present invention can also be applied to steam turbines associated with other types of steam generating systems such as nuclear reactor or once through boiler systems.

The turbine 10 in this instance is of the plural inlet front end type, and steam flow is accordingly directed to the turbine steam chest (not specifically indicated) through four throttle inlet valves TV1-TV4. Generally, the plural inlet type and other front end turbine types such as the single ended type or the end bar lift type may involve different numbers and/or arrangements of valves.

Steam is directed from the admission steam chest to the first high pressure section expansion stage through light governor inlet valves GV1–GV8 which are arranged to supply steam to inlets arcuately spaced about the turbine high pressure casing to constitute a somewhat typical governor valving arrangement for large fossil fuel turbines. Nuclear turbines might on the other hand typically utilize only four governor valves.

During start-up, the governor valves GV1–GV8 are typically all fully opened and steam flow control is provided by a full arc throttle valve operation. At some point in the start-up process, transfer is made from full arc throttle valve control to full arc governor valve control because of throttling energy losses and/or throttling control capability. Upon transfer the throttle valves TV1–TV4 are fully opened, and the governor valves GV1–GV8 are normally operated in the single valve mode. Subsequently, the governor valves may be individually operated in a predetermined sequence usually directed to achieving thermal balance on the rotor and reduced rotor blade stressing while producing the desired turbine speed and/or load operating level. For example, in a typical governor valve control mode, governor valves GV5–GV8 may be initially closed as the governor valves GV1–GV4 are jointly operated from time to time to define positions producing the desired corresponding total steam flows. After the governor valves GV1–GV4 have reached the end of their control region, i.e., upon being fully opened, or at some overlap point prior to reaching their fully opened position, the remaining governor valves GV5–GV8 are sequentially placed in operation in numerical order to produce continued steam flow control at higher steam flow levels. This governor valve sequence of operation is based on the assumption that the governor valve controlled inlets are arcuately spaced about the 360° periphery of the turbine high pressure casing and that they are numbered consecutively around the periphery so that the inlets corresponding to the governor valves GV1 and GV8 are arcuately adjacent to each other.

The preferred turbine start-up method is to raise the turbine speed from the turning gear speed of about 2rpm to about 8% of the synchronous speed under throttle valve control and then transfer to governor valve control and raise the turbine speed to the synchronous speed, then close the power system breakers and meet the load demand. On shutdown, similar but reverse practices or simple coastdown may be employed. Other transfer practice may be employed, but it is unlikely that transfer would be made at a loading point above 40% rated load because of throttling efficiency considerations.

After the steam has crossed past the first stage impulse blading to the first stage reaction blading of the high pressure section, it is directed to a reheater system 28 which is associated with a boiler or steam generating system 26. In practice, the reheater system 28 may typically include a pair of parallel connected reheaters coupled to the boiler 26 in heat transfer relation as indicated by the reference character 29 and associated with opposite sides of the turbine casing.

With a raised enthalpy level, the reheated steam flows from the reheater system 28 through the intermediate pressure turbine section 22 and the low pressure turbine section 24. From the latter, the vitiated steam is exhausted to a condenser 32 from which water flow is directed (not indicated) back to the boiler 26.

To control the flow of reheat steam, a stop valve SV including one or more check valves is normally open and closed only when the turbine is tripped. Interceptor valves IV (only one indicated), are also provided in the reheat steam flow path, and they are normally open and if desired they may be operated over a range of position control to provide reheat steam flow cutback modulation under turbine overspeed conditions. Further description of an appropriate overspeed protection system in presented in U.S. Pat. No. 3,643,437 issued to M. Birnbaum, A. Braytenbah and A. Richardson and assigned to the present assignee.

In the typical fossil fuel drum type boiler steam generating system, the boiler control system controls boiler operations so that steam throttle pressure is held substantially constant. In the present description, it is therefore assumed as previously indicated that throttle pressure is an externally controlled variable upon which the turbine operation can be based. A throttle pressure detector 38 of suitable conventional design measures the throttle pressure to provide assurance of substantially constant throttle pressure supply, and, if desired as a programmed computer protective system override control function, turbine control action can be directed to throttle pressure control as well as or in place of speed and/or load control if the throttle pressure falls outside predetermined constraining safety and turbine condensation protection limits.

In general, the steady state power or load developed by a steam turbine supplied with substantially constant throttle pressure steam is determined as follows: Equation (1)

$$\text{power or load} = K_p\, P_i/P_0 = K_F S_F$$

where $P_i$ = first stage impulse pressure
$P_0$ = throttle pressure
$K_p$ = constant of proportionality
$S_F$ = steam flow
$K_F$ = constant of proportionality Where the throttle pressure is held substantially constant by external control as in the present case, the turbine load is thus proportional to the first stage impulse pressure $P_i$. The ratio $P_i/P_0$ may be used for control purposes, for example to obtain better anticipatory control of $P_i$ (i.e. turbine load) as th boiler control throttle pressure $P_0$ undergoes some variation within protective constraint limit values. However, it is preferred in the present case that the impulse pressure $P_i$ be used for feedback signalling in load control operation as subsequently more fully described, and a conventional pressure detector 40 is employed to determine the pressure $P_i$ for the assigned control usage.

Within its broad field of applicability, the invention can also be applied in nuclear reactor and other applications involving steam generating systems which produce steam without placement of relatively close steam generator control on the constancy of the turbine throttle pressure. In such cases, throttle control and operating philosophies are embodied in a form preferred for and tailored to the type of plant and turbine involved. In cases of unregulated throttle pressure supply, turbine operation may be directed with top priority to throttle pressure control or constraint and with lower priority to turbine load and/or speed control.

Respective hydraulically operated throttle valve actuators indicated by the reference character 42 are provided for the four throttle valves TV1–TV4. Similarly, respective hydraulically operated governor valve actuators indicated by the reference character 44 are provided for the eight governor valves GV1–GV8. Hydraulically operated actuators indicated by the reference characters 46 and 48 are provided for the reheat stop and interceptor valves SV and IV. A computer monitored high pressure fluid supply 50 provides the controlling fluid for actuator operation of the valves TV1–TV4, GV1–GV8, SV and IV. A computer supervised lubricating oil system (not shown) is separately provided for turbine plant lubricating requirements.

The respective actuators 42, 44, 46 and 48 are of conventional construction, and the inlet valve actuators 42 and 44 are operated by respective stabilizing position controls indicated by the reference characters 50 and 52. If desired, the interceptor valve actuators 48 can also be operated by a positon control 56 although such control is not employed in the present detailed embodiment of the invention. Each position control includes a conventional analog controller (not shown in FIG. 1) which drives a suitably known actuator servo valve (not indicated) in the well known manner. The reheat stop valve actuators 46 are fully open unless the conventional trip system or other operating means causes them to close and stops the reheat steam flow.

Since the turbine power is proportional to steam flow under the assumed control condition of substantially constant throttle pressure, steam valve positions are controlled to produce control over steam flow as an intermediate variable and over turbine speed and/or load as an end control variable or variables. Actuator operation provides the steam valve positioning, and respective valve position detectors PDT1-PDG1-PDG8 and PDI are provided to generate respective valve position feedback signals for developing position error signals to be applied to the respective position controls 50, 52 and56. One or more contact sensors CSS provides status data for the stop valving SV. The position detectors are provided in suitable conventional form, for example, they may make conventional use of linear variable differential transformer operation in generating negative position feedback signals for algebraic summing with respect to position setpoint signals SP in developing the respective input error signals. Position controlled operation of the interceptor valving IV would typically be provided only under a reheat steam flow cutback requirement.

The combined position control, hydraulic actuator, valve position detector element and other miscellaneous devices (not shown) form a local hydraulic electric analog valve position control for each throttle or governor inlet steam valve. The position setpoints SP are computer determined and supplied to the respective local loops and updated on a periodic basis. Setpoints SP may also be computed for the interceptor valve controls when the latter are employed. A more complete general background description of electrohydraulic steam valve positioning and hydraulic fluid supply systems for valve actuation is presented in the aforementioned Birnbaum and Noyes paper.

In the present case, the described hybrid arrangement incuding local loop analog electrohydraulic position control is preferred primarily because of the combined effects of control computer operating speed capabilities and computer hardware economics, i.e., the cost of manual backup analog controls is less than that for backup computer capacity at present control computer operating speeds for particular applications so far developed. Further consideration of the hybrid aspects of the turbine control system is presented subsequently herein. However, economic and fast operating backup control computer capability is expected and direct digital computer control of the hydraulic valve actuators will then likely be preferred over the digital control of local analog controls described herein.

A speed detector 58 is provided for determining the turbine shaft speed for speed control and for frequency participation control purposes. The speed detectors 58 can for example be in the form of a reluctance pickup (not shown) magnetically coupled to a notched wheel (not shown) on the turbo-generator shaft 14. In the detailed embodiment subsequently described herein, a plurality of sensors are employed for speed detection. Analog and/or pulse signals produced by the speed detector 58, the electric power detector 18, the pressure detectors 38 and 40, the valve position detectors PDT1-PDT4, PDG1-PDG8 and PDI, the status contact or contacts CSS, and other sensors (not shown) and status contacts (not shown) are employed in programmed computer operation of the turbine 10 for various purposes including controlling turbine performance on an on-line real time basis and further including monitoring, sequencing, supervising, alarming, displaying and logging.

B. DEH - COMPUTER CONTROL SYSTEM

As generally illustrated in FIG. 2, a Digital Electro-Hydraulic control system (DEH) 1100 includes a programmed digital computer 210 to operate the turbine 10 and the plant 12 with improved performance and operating characteristics. The computer 210 can include conventional hardware including a central processor 212 and a memory 214. The digital computer 210 and its associated input/output interfacing equipment is a suitable digital computer system such as that sold by Westinghouse Electric Corporation under the trade name of P2000. In cases when the steam generating system 26 as well as the turbine 10 are placed under computer control, use can be made of one or more P2000 computers or alternatively a larger computer system such as that sold by Xerox Data Systems and known as the Sigma 5. Separate computers, such as P2000 computers, can be employed for the respective steam generation and turbine control functions in the controlled plant unit and interaction is achieved by interconnecting the separate computers together through data links or other means.

The digital computer used in the DEH control system 1100 is a P2000 computer which is designed for real time process control applications. The P2000 typically uses a 16 bit word length with 2's complement, a single address and fixed word length operated in a parallel mode. All the basic DEH system functions are performed with a 16,000 word (16K), 3 mircosecond magnetic core memory. The integral magnetic core memory can be expanded to 65,000 words (65K).

The equipment interfacing with the computer 210 includes a contact interrupt system 124 which scans contacts representing the status of various plant and equipment conditions in plant wiring 1126. The status contacts might typically be contacts of mercury wetted relays (not shown) which operate by energization circuits (not shown) capable of sensing the predetermined conditions associated with the various system devices. Data from status contacts is used in interlock logic functioning and control for other programs, protection analog system functioning, programmed monitoring and logging and demand logging, etc.

Operator's panel button 1130 transmit digital information to the computer 2010. The operator's panel buttons 1130 can set a load reference, a pulse pressure, megawatt output, speed, etc.

In addition, interfacing with plant instrumentation 1118 is provided by an analog input system 1116. The analog input system 1116 samples analog signals at a predetermined rate from predetermined input channels and converts the signals sampled to digital values for entry into the computer 210. The analog signals sensed, in the plant instrumentation 1118 represent parameters including the impulse chamber pressure, the megawatt power, the valve positions of the throttle valves TV1 through TV4 and the governor valves GV1 through GV8 and the interceptor valve IV, throttle pressure, steam flow, various steam temperatures, miscellaneous equipment operating temperature, generator hydrogen cooling pressure and temperature, etc. A detailed list of all parameters is provided in Appendix 1. Such parameters include process parameters which are sensed or controlled in the process (turbine or plant) and other variables which are defined for use in the programmed computer operation. Interfacing from external systems such as an automatic dispatch system is controlled through the operator's panel buttons 1130.

A conventional programmer's console and tape reader 218 is provided for various purposes including program entry into the central processor 212 and the memory 214 thereof. A logging typewriter 1146 is provided for logging printouts of various monitored parameters as well as alarms generated by an automatic turbine startup system (ATS) which includes program system blocks 1140, 1142, 1144 (FIG. 8) in the DEH control system 1100. A trend recorder 1147 continuously records predetermined parameters of the system. An interrupt system 124 is provided for controlling the input and output transfer of information between the digital computer 210 and the input/output equipment. The digital computer 210 acts on interrupt from the interrupt system 124 in accordance with an executive program. Interrupt signals from the interrupt system 124 stop the digital computer 210 by interrupting a program in operation. The interrupt signals are serviced immediately.

Output interfacing is provided by contacts 1128 for the computer 210. The contacts 1128 operate status display lamps, and they operate in conjunction with a conventional analog/output system and a valve position control output system comprising a throttle valve control system 220 and a governor valve control system 222. A manual control system is coupled to the valve position control output system 220 and is operable therewith to provide manual turbine control during computer shut-down. The throttle and governor valve control systems 220 and 222 correspond to the valve position control 50 and 52 and the actuators 42 and 44 in FIG. 1. Generally the manual control system is similar to those disclosed in prior U.S. Pat. 3,552,872 by T. Giras et al. and U.S. Pat. No. 3,741,246 by A. Braytenbah, both assigned to the present assignee.

Digital output data from the computer 210 is first converted to analog signals in the analog output system 24 and then transmitted to the valve control system 220 and 222. Analog signals are also applied to auxiliary devices and systems, not shown, and interceptor valve systems, not shown.

C. SUBSYSTEMS EXTERNAL TO THE DEH COMPUTER

At this point in the description, further consideration of certain subsystems external to the DEH computer will aid in reaching an understanding of the invention. Making reference now to FIG. 3, a high pressure HP fluid supply system 310 for use in controlled actuation of the governor valves GV1 through GV8, the throttle valves TV1 through TV4 and associated valves is shown. The high pressure fluid supply system 310 corresponds to the supply system 49 in FIG. 1 and it uses a synthetic, fire retardant phosphate ester-based fluid and operates in the range of 1500 and 1800 psi. Nitrogen charged piston type accumulators 312 maintain a flow of fluid to the actuators for the governor valves GV1–GV8, the throttle valves TV1–TV4, etc. when pumps 314 and 316 are discharging to a reservoir 318 through unloader valves 320 and 321. In addition, the accumulators 312 provide additional transient flow capacity for rapid valve movements.

Referring now to FIG. 4, a typical electrohydraulic valve actuation system 322 is shown in greater detail for positioning a modulating type valve actuator 410 against the closing force of a large coil spring. A servo-valve 412 which is driven by a servo-amplifier 414 controls the flow of fluid therethrough. The servo-valve 412 controls the flow of fluid entering or leaving the valve actuator cylinder 416 relative to the HP fluid supply system 310. A linear voltage differential transformer LVTD generates a valve position indicating transducer voltage which is summed with a valve position demand voltage at connection 418. The summation of the two previously mentioned voltages produces a valve position error input signal to the servo-amplifier 414. The linear voltage differential transformer LVTD has a linear voltage characteristic with respect to displacement thereof in the preferred embodiment. Therefore, the position of the valve actuator 410 is made proportional to the valve position demand voltage at connection 418.

Figure 5:
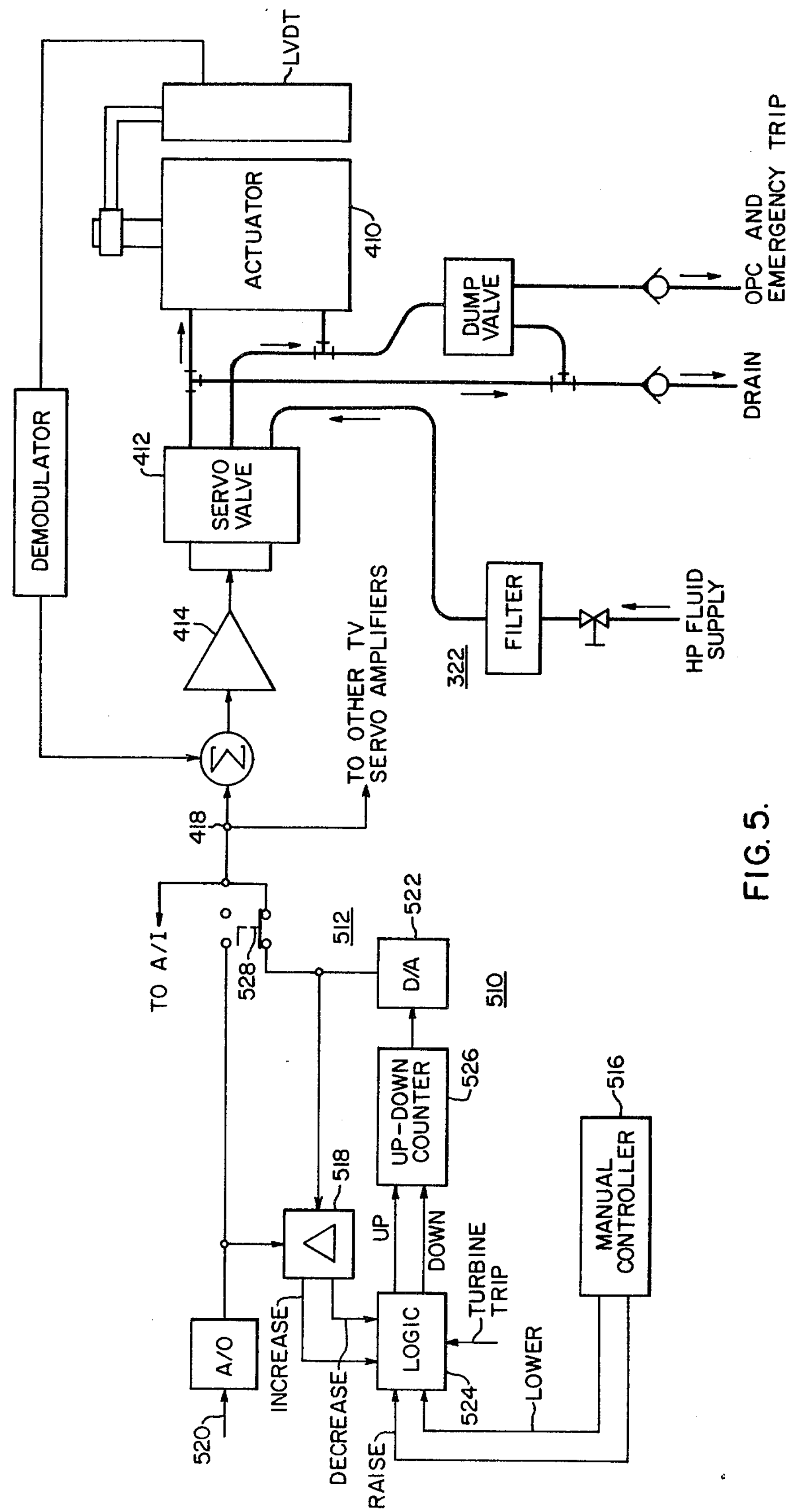
FIG. 5 shows a schematic diagram of a hybrid interface between a manual backup system and the digital computer connected with the servo system controlling the valve actuators.

Making reference now to FIG. 5, a hardwired digital-/analog system forms a part of the DEH control system 1100 (FIG. 2). Structurally, it embraces elements which are included in the blocks 50, 52, 42 and 44 of FIG. 1 as well as additional elements. A hybrid interface 510 is included as a part of the hardwired system. The hybrid interface 510 is connected to actuator system servoamplifier 414 for the various steam valves which in turn are connected to a manual controller 516, an overspeed protection controller, not shown, and redundant DC power supplies, not shown.

A controller shown in FIG. 5 is employed for throttle valve TV1–TV4 control in the TV control system 50 of FIG. 1. The governor valves GV1–GV8 are controlled in an analogous fashion by the GV control system 52.

While the steam turbine is controlled by the digital computer 210, the hardwired system 511 tracks single valve analog outputs 520 from the digital computer 210. A comparator 518 compares a signal from a digital-to-analog converter 522 of the manual system with the signal 520 from the digital computer 210. A signal from the comparator 518 controls a logic system 524 such that the logic system 524 runs an up-down 526 to the point where the output of the converter 522 is equal to the output signal 520 from the digital computer 210. Should the hardwired system 511 fail to track the signal 520 from the digital comparator 210 a monitor light will flash on the operator's panel.

When the DEH control system reverts to the control of the backup manual controller 516 as a result of an operator selection or due to a contigency condition, such as loss of power on the automatic digital computer 210, or a stoppage of a function in the digital computer 210, or a loss of a speed channel in the wide range speed control all as described in greater detail infra, the input of the valve actuation system 322 (FIG. 4) is switched by switches 528 from the automatic controllers in the blocks 50, 52 (FIG. 1) or 220, 222 (FIG. 2) to the control of the manual controller 516. Bumpless transfer is thereby accomplished between the digital computer 210 and the manual controller 516.

Similarly, tracking is provided in the computer 210 for switching bumplessly from manual to automatic turbine control. As previously indicated, the presently disclosed hybrid structural arrangement of software and hardware elements is the preferred arrangement for the provision of improved turbine and plant operation and control with backup capability. However, other hybrid arrangements can be implemented within the field of application of the invention.

D. DEH PROGRAM SYSTEM

DEH Program System Organization, DEH Control Loops and Control Task Program

Figure 6:
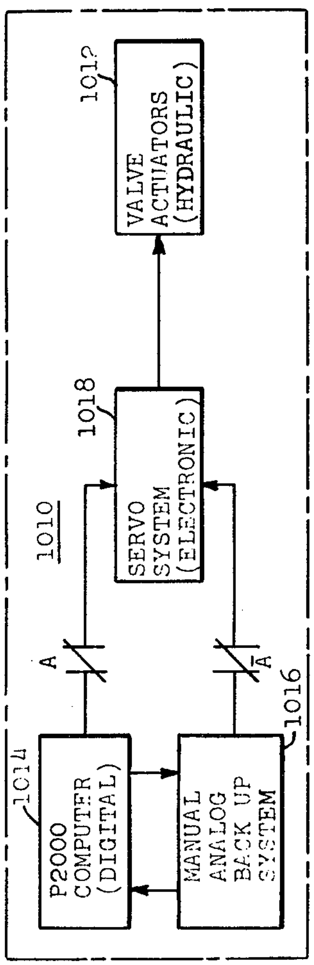
FIG. 6 shows a simplified block diagram of the digital Electro Hydraulic Control System in accordance with the principle of the invention.

With reference now to FIG. 6, an overall generalized control system of this invention is shown in block diagram form. The digital electrohydraulic (DEH) control system 1100 operates valve actuators 1012 for the turbine 10. The digital electrohydraulic control system 1100 comprises a digital computer 1014, corresponding to the digital computer 210 in FIG. 2, and it is interconnected with a hardwired analog backup control system 1016. The digital computer 1014 and the backup system 1016 are connected to an electronic servo system 1018 corresponding to blocks 220 and 222, in FIG. 2. The digital computer control system 1014 and the analog backup system 1016 track each other during turbine operations in the event it becomes necessary or desirable to make a bumpless transfer of control from a digital computer controlled automatic mode of operation to a manual analog backup mode or from the manual mode to the digital automatic mode.

In order to provide plant and turbine monitor and control functions and to provide operator interface functions, the DEH computer 1014 is programmed with a system of task and task support programs. The program system is organized efficiently and economically to achieve the end operating functions. Control functions are achieved by control loops which structurally include both hardware and software elements, with the software elements being included in the computer program system. Elements of the program system are considered herein to a level of detail sufficient to reach an understanding of the invention. More functional detail on various programs is presented in Appendix 2. Further, a detailed listing of a DEH system program substantially conforming to the description presented herein is presented in Appendix 3 in symbolic and machine language. Most of the listing is compiled by a P2000 compiler from instructions written in Fortran IV. A detailed dictionary of system parameters is presented in Appendix 1, and a detailed computer input/output signal list is presented in Appendix 4. Appendix 5 mainly provides additional hardware information related to the hardwired system previously considered as part of the DEH control system.

As previously discussed, a primary function of the digital electrohydraulic (DEH) system 1100 is to automatically position the turbine throttle valves TV1 through TV4 and the governor valves GV1 through GV8 at all times to maintain turbine speed and/or load. A special periodically executed program designated the CONTROL task is utilized by the P2000 computer along with other programs to be described in greater detail subsequently herein.

Figure 7:
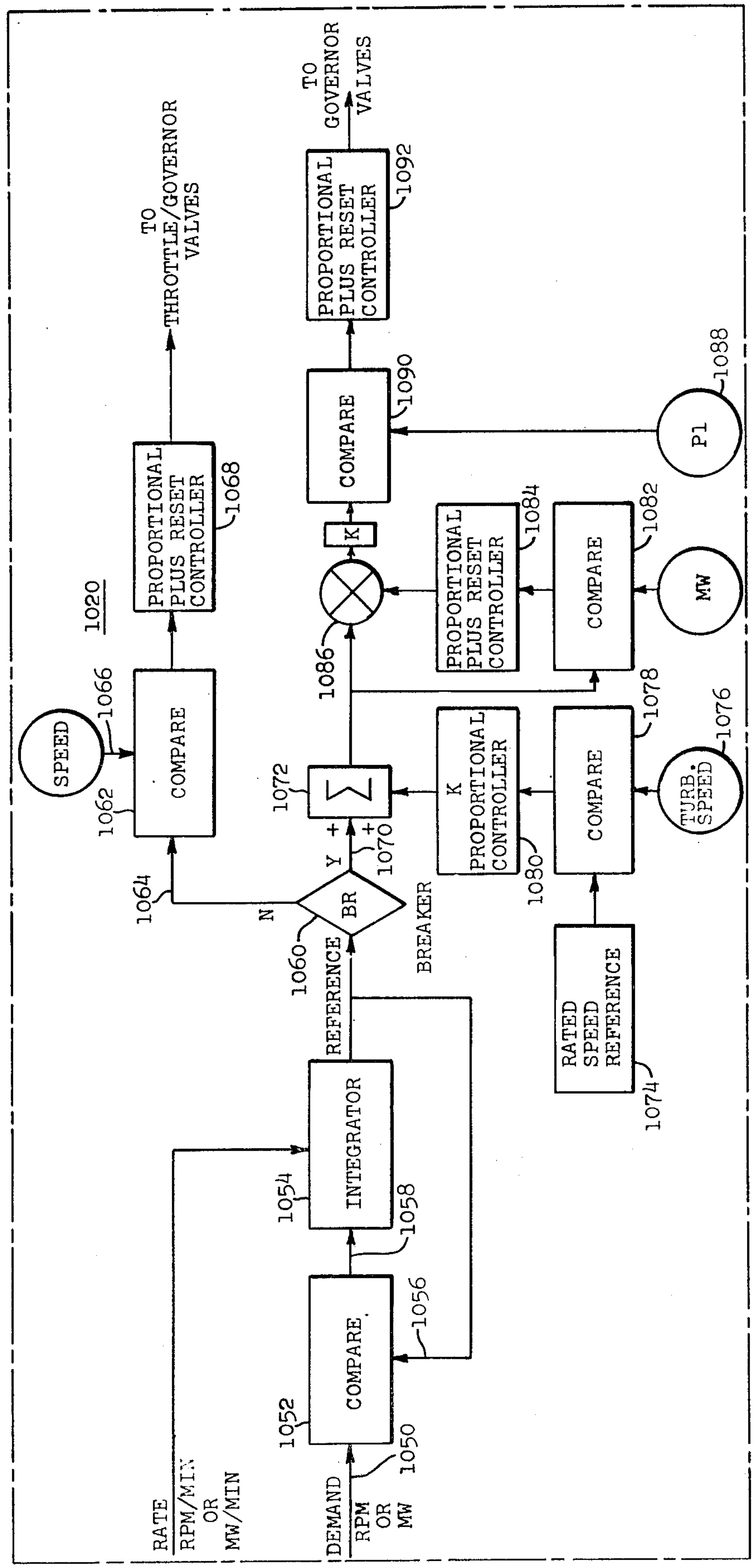
FIG. 7 shows a block diagram of a control program used in accordance with the principles of the invention.

With reference now to FIG. 7, a functional control loop diagram in its preferred form includes the CONTROL task or program 1020 which is executed in the computer 1010. Inputs representing demand and rate provide the desired turbine operating setpoint. The demand is typicallyeither the target speed in specified revolutions per minute of the turbine systems during startup or shutdown operations or the target load in metawatts of electrical output to be produced by the generating system 16 during load operations. The demand enters the block diagram configuration of FIG. 7 at the input 1050 of a compare block 1052.

The rate input either in specified RPM per minute or specified megawatts per minute, depending upon which input is to be used in the demand function, is applied to an integrator block 1054. The rate inputs in RPM and megawatts of loading per minute are established to limit the buildup of stresses in the rotor of the turbine-generator 10. An error output of the compare block 1052 is applied to the integrator block 1054. In generating the error output the demand value is compared with a reference corresponding to the present turbine operating setpoint in the compare block 1052. The reference value is representative of the setpoint RPM applied to the turbine system or the setpoint generator megawatts output, depending upon whether the turbine generating system is in the speed mode of operation or the load mode of operation. The error output is applied to the integrator 1054 so that a negative error drives the integrator 1054 in one sense and a positive error drives it in the opposite sense. The polarity error normally drives the integrator 1054 until the reference and the demand are equal or if desired until they bear some other predetermined relationship with each other. The rate input to the integrator 1054 varies the rate of integration, i.e. the rate at which the reference or the turbine operating setpoint moves toward the entered demand.

Demand and rate input signals can be entered by a human operator from a keyboard. Inputs for rate and demand can also be generated or selected by automatic synchronizing equipment, by automatic dispatching system equipment external to the computor, by another computer automatic turbine startup program or by a boiler control system. The inputs for demand and rate is automatic synchronizing and boiler control modes are preferably discrete pulses. However, time control pulse widths or continuous analog input signals may also be utilized. In the automatic startup mode, the turbine acceleration is controlled as a function of detected turbine operating conditions including rotor thermal stress. Similarly, loading rate can be controlled as a function of detected turbine operating conditions.

The output from the integrator 1054 is applied to a breaker decision block 1060. The breaker decision block 1060 checks the state of the main generator circuit breaker 17 and whether speed control or load control is to be used. The breaker block 1060 then makes a decision as to the use of the reference value. The decision made by the breaker block 1060 is placed at the earliest possible point in the control task 1020 thereby reducing computational time and subsequently the duty cycle required by the control task 1020. If the main generator circuit breaker 17 is open whereby the turbine system is in wide range speed control the reference is applied to the compare block 1062 and compared with the actual turbine generator speed in a feedback type control loop. A speed error value from the compare block 1062 is fed to a proportional plus reset controller block 1068, to be described in greater detail later herein. The proportional plus reset controller 1068 provides an integrating function in the control task 1060 which reduces the speed error signal to zero. In the prior art, speed control systems limited to proportional controllers are unable to reduce a speed error signal to zero. During manual operation an offset in the required setpoint is no longer required in order to maintain the turbine speed at a predetermined value. Great accuracy and precision of turbine speed whereby the turbine speed is held within one RPM over tens of minutes is also accomplished. The accuracy of speed is so high that the turbine 10 can be manually synchronized to the power line without an external synchronizer typically required. An output from the proportional plus reset controller block 1068 is then processed for external actuation and positioning of the appropriate throttle and/or governor valves.

If the main generator circuit breaker 17 is closed, the CONTROL task 1020 advances from the breaker block 1060 to a summer 1072 where the REFERENCE acts as a feedforward setpoint in a combined feedforward-feedback load control system. If the main generator circuit breaker 17 is closed, the turbine generator system 10 is being loaded by the electrical network connected thereto.

In the control task 1020 of the DEH system 1100 utilizes the summer 1072 to compare the reference value with the output of speed loop 1310 in order to keep the speed correction independent of load. A multiplier function has a sensitivity to varying load which is objectionable in the speed loop 1310.

During the load mode of operation the DEMAND represents the specified loading in MW of the generator 16, which is to be held at a predetermined value by the DEH system 1100. However, the actual load will be modified by any deviations in system frequency in accordance with a predetermined regulation value. To provide for frequency participation, a rated speed value in box 1074 is compared in box 1078 with a "two signal" speed value represented by box 1076. The two signal speed system provides high turbine operating reliability to be described infra herein. An output from the compare function 1078 is fed through a function 1080 which is similar to a proportional controller which converts the speed error value in accordance with the regulation value. The speed error from the proportional controller 1080 is combined with the feedforward megawatt reference, i.e., the speed error and the megawatt reference are summed in summation function or box 1072 to generate a combined speed compensated reference signal.

The speed compensated load reference is compared with actual megawatts in a compare box or function 1082. The resultant error is then run through a proportional plus reset controller represented by program box 1084 to generate a feedback megawatt trim.

The feed forward speed compensated reference is trimmed by the megawatt feedback error multiplicatively to correct load mismatch, i.e. they are multiplied together in the feedforward turbine reference path by multiplication function 1086. Multiplication is utilized as a safety feature such that if one signal e.g. MW should fail a large value would not result which could cause an overspeed condition but instead the DEH system 1100 would switch to a manual mode. The resulting speed compensated and megawatt trimmed reference serves as an impluse pressure setpoint in an impulse pressure controller and it is compared with a feedback inpulse chamber pressure representation from input 1088. The difference between the feedforward reference and the impulse pressure is developed by a comparator function 1090, and the error output therefrom functions in a feedback impulse pressure control loop. Thus, the impulse pressure error is applied to a proportional plus reset controller function 1092.

During load control the megawatt loop comprising in part blocks 1082 and 1084 may be switched out of service leaving the speed loop 1310 and an impulse pressure loop operative in the DEH system 1100.

Impulse pressure responds very quickly to changes of load and steam flow and therefore provides a signal with minimum lag which smooths the output response of the turbine generator 10 because the lag dynamics and subsequent transient response is minimized. The impulse pressure input may be switched in and out from the compare function 1090. An alternative embodiment embracing feedforward control with impulse pressure feedback trim is applicable.

Between block 1092 and the governor valves GV1–GV8 a valve characterization function for the purpose of linearizing the presponse of the valves is interposed. The valve characterization function described in detail in Appendix III infra herein is utilized in both automatic modes and manual modes of operation of the DEH system 1100. The output of the proportional plus reset controller function 1092 is then ultimately coupled to the governor valves GV1–GV8 through electrohydraulic position control loops implemented by equipment considered elsewhere herein. The proportional plus reset controller output 1092 causes positioning of the governor valves GV1–GV8 in load control to achieve the desired megawatt demand while compensation is made for speed, metawatt and impulse pressure deviations from desired setpoints.

Making reference to FIG. 8, the control program 1020 is shown with interconnections to other programs in the program system employed in the Digital Electro Hydraulic (DEH) system 1100. The periodically executed program 1020 receives data from a logic task 1110 where mode and other decisions which affect the control program are made, a panel task 1112 where operator inputs may be determined to affect the control program, an auxiliary synchronizer program 1114 and an analog scan program 1116 which processes input process data. The analog scan task 1116 receives data from plant instrumentation 1118 external to the computer as considered elsewhere herein, in the form of pressures, temperatures, speeds, etc. and converts such data to proper form for use by other programs. Generally, the auxiliary synchronizer program 1114 measures time for certain important events and it periodically bids or runs the control and other programs. An extremely accurate clock function 1120 operates through a monitor program 1122 to run the auxiliary synchronizer program 1114.

The monitor program or executive package 1122 also provides for controlling certain input/output operations of the computer and, more generally, it schedules the use of the computer to the various programs in accordance with assigned priorities. For more detail on the P2000 computer system and its executive package, reference is made to Appendix 4. In the appendix description, the executive package is described as including analog scan and contact closure input routines, whereas these routines are considered as programs external to the executive package in this part of the disclosure.

The logic task 1110 is fed from outputs of a contact interrupt or sequence of events program 1124 which monitors contact variables in the power plant 1126. The contact parameters include those which represent breaker state, turbine auto stop, tripped/latched state interrogation data states, etc. Bids from the interrupt program 1124 are registered with and queued for execution by the executive program 1111. The control program 1110 also receives data from the panel task 1112 and transmits data to status lamps and output contacts 1128. The panel task 1112 receives data instruction based on supervision signals from the operator panel buttons 1130 and transmits data to panel lamps 1132 and to the control program 1020. The auxiliary synchronizer program 1114 synchronizes through the executive program 1111 the bidding of the control program 1020, the analog scan program 1116, a visual display task 1134 and a flash task 1136. The visual display task transmits data to display windows 1138.

The control program 1020 receives numerical quantities representing process variables from the analog scan program 1116. As already generally considered, the control program 1020 utilizes the values of the various feedback variables including turbine speed, impulse pressure and megawatt output to calculate the position of the throttle valves TV1–TV4 and governor valves GV1–GV8 in the turbine system 10, thereby controlling the megawatt load and the speed of the turbine 10.

To inteface the control and logic programs efficiently, the sequence of events program 1124 normally provides for the logic task 1110 contact status updating on demand rather than periodically. The logic task 1110 computes all logical states according to predetermined conditions and transmits this data to the control program 1020 where this information is utilized in determining the positioning control action for the throttle valves TV1–TV4, and the governor valves GV1–GV8. The logic task 1110 also controls the state of various lamps and relay type contact outputs in a predetermined manner.

Another important part of the DEH system is the OPERATOR'S PANEL program. The operator communicates through the panel with the DEH control programs by means of various buttons which have assigned functions. When any button is pressed, a special interrupt is generated; this interrupt triggers a PANEL INTERRUPT program which decodes the button pressed, and then bids the PANEL task. The PANEL program processes the button and takes the proper action, which usually means manipulating some panel lamps, as well as passing on the button information to both the LOGIC and the CONTROL tasks.

The operator's Panel also has two sets of display windows which allow display of all turbine program parameters, variables, and constants. A visual display task presents this information in the windows at the request of the operator through various dedicated display buttons and a numerical keyboard. The visual display values are periodically updated in the windows as the quantity changes.

Certain important turbine operating conditions are communicated to the DEH operator by way of flashing lamps on the panel. Therefore a special FLASH program is part of the DEH system. Its function is to monitor and detect such contingency conditions, and flash the appropriate lamp to alert the operator to the state.

E. TASK PRIORITY ASSIGNMENTS

With reference now to FIG. 9, a table of program priority assignments is shown as employed in the executive monitor. A program with the highest priority is run first under executive control if two or more programs are ready to run. The stop/initializer program function has top priority and is run on startup of the computer or after the computer has been shut down momentarily and is being restarted. The control program 1020 is next in order of priority. The operator's panel program 1130, which generates control data, follows the control task 1020 in priority. The analog scan program 11116 also provides information to the control task 1020 and operates at a level of priority below that of the operator's panel 1130. The automatic turbine starting (ATS) periodic program 1140 is next in the priority list. ATS stands for automatic turbine startup and monitoring program, and is shown as a major task program 1140 of FIG. 8 for the operation of the DEH system 1100. The ATS-periodic program 1140 monitors the various temperatures, pressures, breaker states, rotational velocity, etc. during start-up and during load operation of the turbine system.

The logic task 1110, which generates control and operating mode data, follows in order of operating priority. The visual display task program 1134 follows the logic task program 1110 and makes use of outputs from the latter. A data link program for transmitting data from the DEH system to an external computer follows. An ATS-analog conversion task program 1142 for converting the parameters provided by the ATS-periodic program 1142 to usable computer data follows in order of priority. The flash task program 1136 is next, and it is followed by a programmer's console program which is used for maintenance testing and initial loading of data tapes. The next program is an ATS-message writer 1144 which provides for printout of information from the ATS analog conversion program 1142 on a suitable typewriter 1146. The next program in the priority list is an analog/digital trend which monitors parameters in the turbine system 10 and prints or plots them out for operator perusal. The remaining two programs are for debugging and special applications.

In the preferred embodiment, the stop/initialize program is given the highest priority in the table of FIG. 9 because certain initializing functions must be completed before the DEH system 1100 can run. The auxiliary synchronizer program 1114 provides timing for all programs other than the stop/initialize program while the DEH system 1100 is running. Therefore, the auxiliary synchronizer task program 1400 has the second order of priority of the programs listed. The control program 1020 follows at the third descending order of priority since the governor valves GV1 through GV8 and the throttle valves TV1 through TV4 must be controlled at all times while the DEH system 1100 is in operation.

The operator's panel program 1130 is given the next order of priority in order to enable an operator to exercise direct and instantaneous control of the DEH system 1100. The analog scan program 1116 provides input data for the control program 1020 and, therefore, is subordinate only to the initialize synchronizer control and operator functions.

In the preferred embodiment the ATS-periodic program 1140 is next in order of priority. During automatic turbine startup, the scanning of inputs by the ATS-periodic program 1140 is almost on the same order of priority as the inputs to the DEH system 1100. However, the ATS program 1140 in alternative embodiments, could be reduced in its priority, without any considerable adverse effect, because of the relatively limited duty cycle problems in the ATS system.

The logic task 1110 which control the operations of some of the functions of the control task program 1020 is next in order of priority. The visual display task 1134 follows in order of priority in order to provide an operator with a visual indication of the operation of the DEH program 1100. The visual display program 1134 is placed in the relatively low eighth descending order of priority since the physical response of an operator is limited in speed to 0.2 to 0.5 sec. as to a visual signal. The rest of the programs are in essentially descending order of importance in the preferred embodiment. In alternative embodiments of the inventions, alternate priority assignments can be employed for the described or similar programs, but the general priority listing described is preferred for the various reasons presented.

A series of interrupt programs interrupt the action of the computer and function outside the task priority assignments to process interrupts. One such program in FIG. 8 is the sequence events of contact interrupt program 1124 which suspends the operation of the computer for a very short period of time to process an interrupt. Between the operator panel buttons 1130 and the panel task program 1112 a panel interrupt program 1156 is utilized for signalling any changes in the operator's panel buttons 1130. A valve interrupt program 1158 is connected directly between the operator's panel buttons 1130 and the panel task program 1112 for operation during a valve test or in case of valve contingency situations.

Proportional plus reset controller subroutine 1154 (FIG. 11) is called by the control task program 1020 of FIG. 7 as previously described when the turbine control system is in the speed mode of control and also, for computer use efficiency, when the turbine 10 is in the load mode of control with the megawatt and impulse pressure feedback loops in service. Utilizing the proportional plus reset function 1068 during speed control provides very accurate control of the angular velocity of the turbine system.

In addition to previously described functions, the auxiliary synchronizer program 1114 is connected to and triggers the ATS periodic program 1140, the ATS analog conversion routine 1142 and the message writer 1144. The ATS program 1140 monitors a series of temperature, vibration, pressures, speed, etc. in the turbine system and also contains a routine for automatically starting the turbine system 10. The ATS analog conversion routine 1142 converts the digital computer signals from the ATS periodic program 1140 to analog or digital or hybrid form which can be typed out through the message writer task 1144 to the logging typewriter 1146 or a similar recorder.

The auxiliary synchronizer programs 1114 also controls an analog/digital trend program 1148. The analog digital trend program 1148 records a set of variables in addition to the variables of the ATS periodic program 1140.

Ancillary to a series of other programs is a plant CCI subroutine 1150 where CCI stands for contact closure inputs. The plant CCI subroutine 1150 responds to changes in the state of the plant contacts as transmitted over the plant wiring 1126. Generally, the plant contacts are monitored by the CCI subroutine 1150 only when a change in contact state is detected. This scheme conserves computer duty cycle as compared to periodic CCI monitoring. However, other triggers including operator demand can be employed for a CCI scan.

As shown in FIG. 8, the control task 1020 calls ancillary thereto a speed loop task 1152 and the preset or proportional plus reset controller program 1154. Ancillary to the executive monitoring program 1122 is a task error program 1160. In conjunction with the clock program 1120 a stop/initialize program 1162 is used. Various other functions in FIG. 8 are described in greater detail infra.

F. DEH PROGRAMS OF TASKS

1. Preset subroutine making reference now to FIG. 11, a functional diagram of the proportional plus reset controller task program 1068 of FIG. 7 is shown in greater detail. The proportional plus reset controller subroutine 1068 is called by the control program 1020 of FIG. 7 when the DEH turbine control system 1100 is in the speed mode of control and also when the DEH turbine control system 1100 is in the load mode of control with the megawatt and impulse pressure feedback loops in service. As already indicated utilizing a proportional plus reset function during speed control provides very accurate control of the angular velocity of the turbine system.

the proportional plus reset controller 1068 provides an output which is composed of the sum of two parts. One part of the output is proportional to an input and the other part is an integral of the input. Therefore, instantaneous response is available as well as the capability of zero input error. A setpoint or dynamic reference from a demand source is applied to an input 1210 of a difference function 1212. The difference function 1212 compares the input and the actual controlled process value. An output from the difference function 1212 is fed to a proportional gain function 1216 and to an input of an integrator or integrating function 1218 having a reset time TR. An output from the integrator 1218 is high and low limited by the program as represented by the reset windup prevention function 1220 in order to avoid excessive integrator outputs which could occur with a reset windup.

Proportional and integral outputs from the gain function 1216 and the windup limited integrator 1218 are summed in a summing function 1222. The total output from the summing function 1222 is high and low limited by another function 1224 and fed to a process function 1226 thereby limiting the total output to a useful output range.

Figure 12:
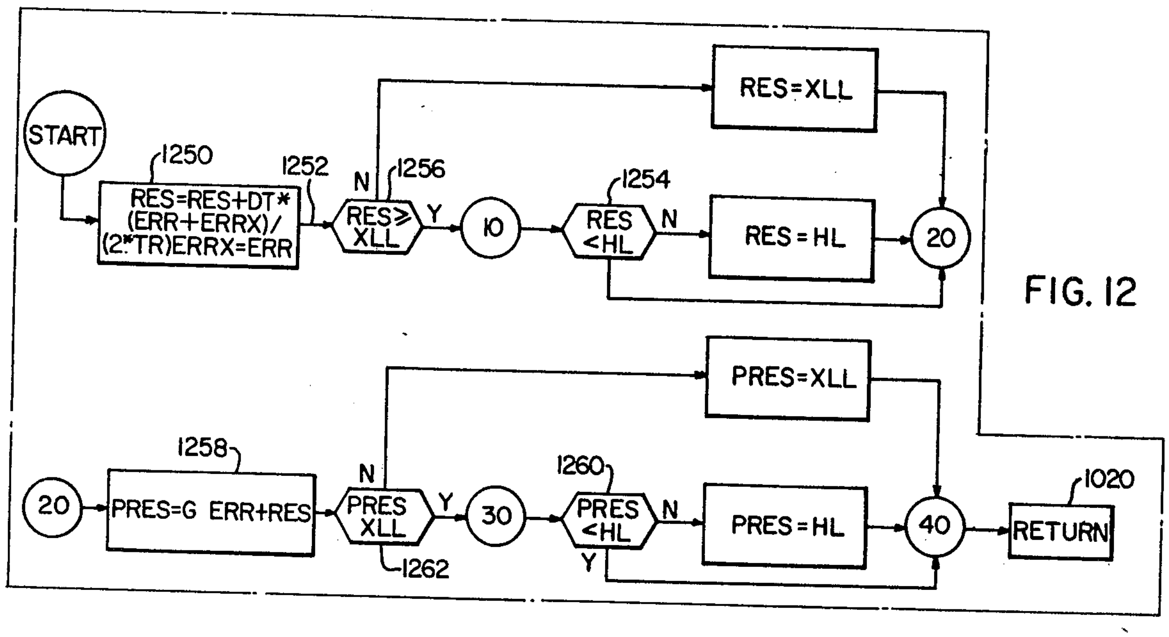
FIG. 12 shows a flow chart of the proportional-plus-reset subroutine (PRESET) which is operable in accordance with the principles of the invention.

Making reference now to FIG. 12, a pictorial representation of a flow chart for the proportional plus reset controller program is shown. In the preferred embodiment the Preset program is designed such that a call from the control program 1030 provides a list of variables necessary to evaluate the controller 1068 output. The structure of the subroutine is indicated by the Fortran statement given below.

SUBROUTINE PRESET (ERR, ERRX, G, TR, HL, XLL, RES, PRES)

The variables in the above equation are defined as follows:

| FORTRAN Variables | English Language Equivalents |
|---|---|
| ERR | The current input |
| ERRX | The last input |
| G | The controller proportional gain |
| TR | The controller reset time |
| HL | The controller high limit |
| XLL | The controller low limit |
| RES | The controller integral output |
| PRES | The controller total output. |

Again making reference to FIG. 12, where standard FORTRAN notation is used, the Preset subroutine 1068 first evaluates the integral part of the controller output according to equation:

$$Y(N) = Y(N-1) + \frac{DT}{2*TR} * [X(N) + X(N-1)].$$

The subroutine 1068 next saves the current input ERR in storage location ERRX 1250 for the following call to the subroutine 1068. The controller integral output RES 1252 is then checked against the high limit 1254 and the low limit 1256 to prevent reset/windup. The proportional part of the output is computed and added to the integral part of the output integrator 1218 to form the total output PRES 1258. PRES 1258 is checked against high limit 1260 and low limit 1262 after which the proportional plus reset controller subroutine 1068 returns to the control task 1020.

As previously considered, the proportional plus reset controller subroutine 1068 is used by the control task program 1020 during three different phases of operation of the turbine system. During startup of the turbine system 10, the proportional plus reset controller, subroutine program 1068 is used as a speed controller in order to regulate and hold the speed of the turbine 10 at a predetermined value or at a predetermined acceleration rate. Because of the integral function of the proportional plus reset controller subroutine program 1068 the speed of the turbine system 10 can be held to within 1 rpm. Also, in order for an operator to keep the speed of the turbine system 10 at a predetermined value, an error offset input signal typical of a purely proportional system is not required. Therefore, the reference and the controlled variable, both turbine speed in this case, will be equal. The proportional plus reset controller subroutine program 1068 is also used in the megawatt controller feedback loop and the impulse chamber pressure controller feedback loop.

During turbine startup, the quantity REFDMD is the internal speed reference while WS is the actual turbine speed. GS1 and T1 are the proportional gain and reset time, HLS and O. are the high and low limits, RESSPD is the integral part of the output, SPDSP is the total output, and RESSPDX is the last value of the input.

In the megawatt controller during megawatt loop operation, REF1 is the megawatt set point, MW is the megawatt feedback, and GR2 is a ranging gain to convert from engineering unit, to per-unit form. GL2 and T2 are the proportional gain and the reset time, while HEL and LEL are high and low limits. RESMW is the integral output, Y is the total output, and RESMWX is the last input.

With impluse pressure loop operation, PISP is the set point for the impulse pressure controller, PI is the feedback and GL3 and T3 are the proportional gain and the reset time. GR4 and O. are the high and low limits, RESPI is the integral output, VSP is the total output, and RESPIX is the last input.

Reset Integrator Algorithm

To perform the mathematical function of integration in a digital computer it is desirable to use numerical techniques to approximate the exact value of the integral. In the preferred embodiment, the algorithm uses the trapezoidal rule for integration and it is simple in format, requires little computer storage and is executed very rapidly. The algorithm uses one value of input past history to achieve a high degree of accuracy.

The following algorithm is used in the computer:

$$Y(N)=Y(N-1)+DT/2^{*}TR\ [X(N)+X(N-1)].$$

Definitions of the terms in this equation follow:

(N)—The current instant of real time (N−1)—The last instant of real time.

DT—The sampling interval, or the time duration between evaluations of the integration algorithm. In the DEH Control System this is normally 1 sec.

TR—The controller reset time in sec.

X(N)—The current value of the input.

X(N−1)—The last value of the input.

Y(N)—The current value of the output.

Y(N−1)—The last value of the output.

To use the integrator algorithm, the DEH control system is orgainized so that the parameters DT and TR, the input variables X(N) and X(N−1), and the output variables Y(N) and Y(N−1) are in known areas of COMMON storage. The CONTROL task computes the current value of X(N) and calls the PRESET subroutine. The PRESET subroutine evaluates the current value of Y(N) according to the integrator algorithm and stores the value for use by all other parts of the DEH system.

2. Speed Loop Subroutine

Figure 13:
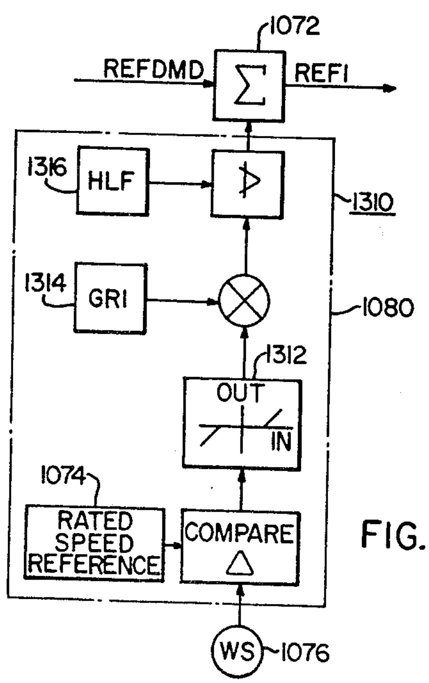
FIG. 13 shows a block diagram of a proportional controller function with dead band which is operable in accordance with the principles of the invention.

Making reference now to FIG. 13, a speed loop program 1310 which functionally is part of the arrangement shown in FIG. 7 is shown in greater detail. The speed loop (SPDLOOP) program 1310 normally computes data required in the functioning of the speed feedback loop in the load control comprising as shown in FIG. 7 the rated speed reference 1074, the actual turbine speed 1076, the compare function 1078, the proportional controller 1080 and the summing function 1072. During the load control, the speed feedback loop adjusts the load reference (and thus the governor valves) to correct for any turbine speed deviation from rated speed. The speed feedback loop uses a proportional controller to accomplish this function. The speed loop subroutine 1310 is called upon to perform speed control loop functions by the control program 1020. In FIG. 13, the functioning of the proportional controller 1080 is shown in detail. The error output from the compare function 1078 is fed through a deadband function 1312. A proportionality constant (GR1) 1314 and a high limit function(HLF) 1316 are included in the computation.

The speed loop (SPDLOOP) subroutine is called by the control task during the load control mode and when switching occurs between actual speed signals. Subroutine form reduces the requirement for memory storage space thereby reducing the computer expense required for operation of the DEH system 1100.

The deadband function 1312 provides for bypassing small noise variations in the speed error generated by the compare function 1078 so as to prevent turbine speed changes which would otherwise occur. Systems without a deadband continuously respond to small variations which are random in nature resulting in undue stress in the turbine 10 and unnecessary, time and duty cycle consuming operation of the control system. A continuous hunting about the rated speed due to the gain of the system would occur without the deadband 1312. The speed regulation gain GR1 at 1314 is set to yield rated megawatt output power speed correction for a predetermined turbine speed error. The high limit function HLS at 1316 provides for a maximum speed correction factor.

The turbine speed 1076 is derived from three transducers. The turbine digital speed transducer arrangement is that disclosed in greater element and system implementation detail in the aforementioned Reuther Application Ser. No. 412,513. Briefly, in the preferred embodiment for determining the speed of the turbine, the system comprises three independent speed signals. These speed signals consist of a very accurate digital signal generated by special electronic circuitry from a magnetic pickup, an accurate analog signal generated by a second independent magnetic pickup, and a supervisory analog instrument signal from a third independent pickup. the DEH system compares these signals and through logical decisions selects the proper signal to use for speed control or speed compensated load control. This selection process switches the signal used by the DEH control system 1100 from the digital channel signal to the accurate analog channel signal or vice versa under predetermined dynamic conditions. In order to hold the governor valves at a fixed position during this speed signal switching the control program 1020 uses the speed loop subroutine 1310 and performs a computation to maintain a bumpless speed signal transfer.

Figure 14:
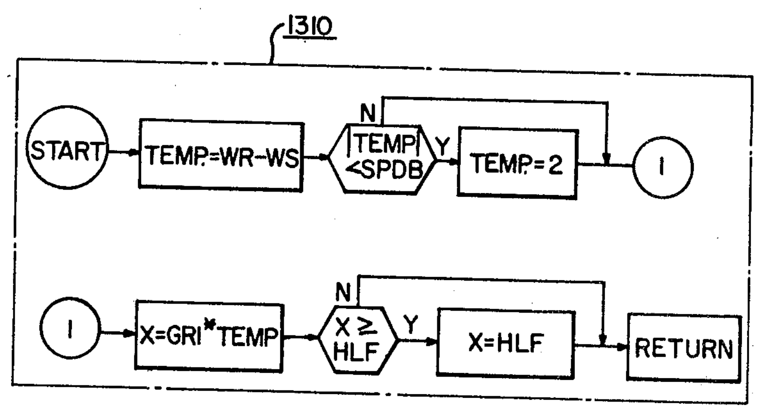
FIG. 14 shows a flow chart of a speed loop (SPDLOOP) subroutine which is operable in accordance with the principles of the invention.

Making reference to FIG. 14, the speed loop (SPDLOOP) subroutine flow chart 1310 is shown in greater detail. Two FORTRAN statements signify the operations of the speed loop subroutine program flow chart 1310. These statements are:

```
CALL SPDLOOP

REF1=REFDMD+X
```

Variables in the flow chart 1310 are defined as follows:

| FORTRAN VARIABLES | ENGLISH LANGUAGE EQUIVALENT |
|---|---|
| REFMD | Load reference |
| WR | The turbine rated speed |
| REF1 | Corrected load reference |
| WS | The actual turbine speed |
| TEMP | Temporary storage location variable |
| SPDB | The speed deadband |
| GR1 | The speed regulation gain (normally set to yield rated megawatt speed correction for a 180 rpm speed error) |
| X | Speed correction factor |
| HLF | The high limit function |

3. PLANT CONTACT CLOSURE INPUT (PLANTCCI) SUBROUTINE

Figure 15:
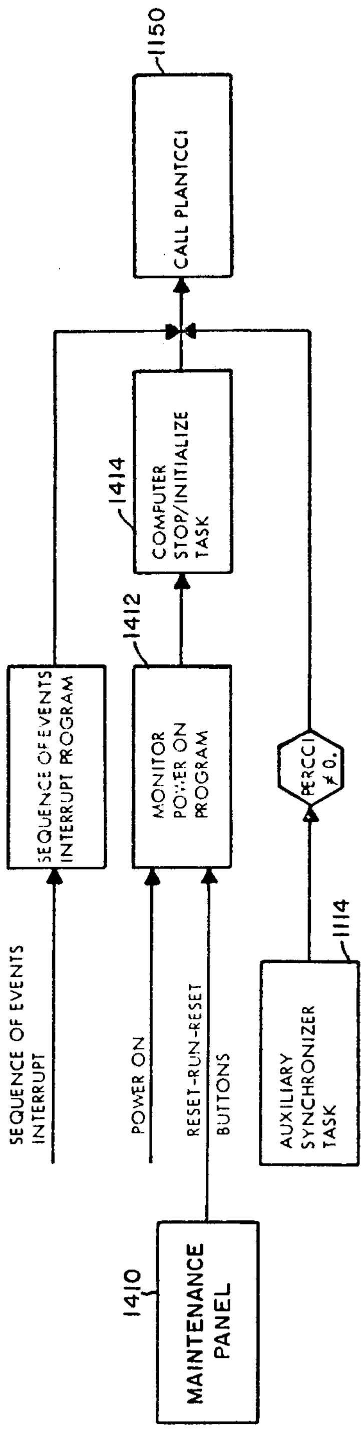
FIG. 15 shows a block diagram of a subroutine for scanning contact close inputs of the Digital Electro Hydraulic System which is operable in accordance with the principles of the invention.

A plant contact closure input subroutine 1150 as shown in FIG. 8 scans all the contact inputs tied to the computer through the plant wiring 1126 and sets logic data images of these in designated areas within the memory 214 of the computer 210. Various situations call for the PLANTCCI subroutine. The most common case represents a basic design feature of the DEH system; that is, the situation in which a change of state of any contact input triggers a sequence of events interrupt. A corresponding interrupt program then calls the PLANTCCI subroutine to do a scan of all contact inputs and to update the computer contact image table. Thus (under normal conditions) a contact scan is carried out only when necessary. A block diagram illustrating the operation of the plant contact closure input subroutine 1150 is shown in FIG. 15. The plant contact closure input subroutine 1150 is also utilized when power to the computer 210 is turned on or when the computer buttons reset-run-reset are pressed on a maintenance panel 1410. Under these circumstances, a special monitor power-on routine 1412 is called upon. This executes the computer STOP/INITIALIZE task program 1414 described previously, which in turn calls the plant contact closure input subroutine 1150 for performance of the initializing procedure.

The operator can also call the plant contact closure input subroutine 1150 through the auxiliary synchronizer program 1114, if desired, whereby a periodic scan of the entire computer CCI system is implemented for checking the state of any one or group of relays in the CCI system. This call is contingent upon the entry of a nonzero value for the constant PERCCI from the DEH Operator's Panel keyboard.

4. Auxliary Synchonizer Program

Figure 16:
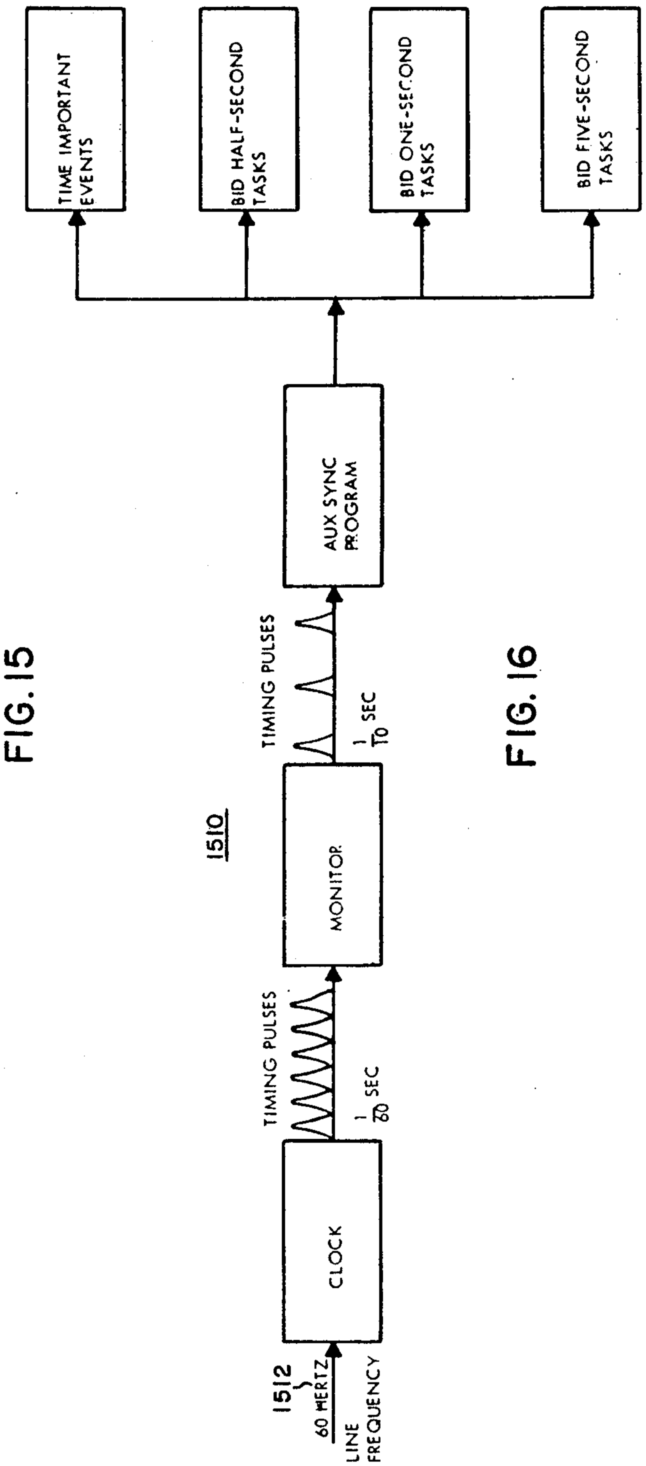
FIG. 16 shows a block diagram of an auxiliary synchronizer computer program which is operable in accordance with the principles of the invention.

With reference to FIG. 16, the block diagram shows an overall scheme which illustrates the operation of the auxiliary synchronizer program 1510. The auxiliary synchronizer program 1510 has two functions. It performs accurate counting to determine the time duration of important events to be described in more detail and it synchronizes the bidding for execution of all periodic programs in the digital electrohydraulic system 1100 on a predetermined schedule.

The AUX SYNC task is on priority level $E_{16}$ ($14_{10}$) and is initiated by the 60 Hz synchronizing program of the Monitor every 1/10 sec. Highly accurate and stable timing is provided by a clock to align all parts of the system in a repetitive working pattern. Such timing sources are called clocks or synchronizers. Clocks may generate their timing pulses in a number of ways; the most common clocks consist either of a very accurate electronic oscillator, or a timing circuit triggered by the 60 Hz supply frequency to the computer.

The DEH control system utilizes the line frequency as its timing source. As shown in FIG. 16, a clock pulse is generated every cycle (1/60 sec), and triggers a counting circuit in the computer Monitor system. The Monitor is initialized to generate an interrupt every six cycles (1/10 sec). When this interrupt occurs, the Monitor executes its own internal scheduling functions and then bids the AUX SYNC task to run. AUX SYNC proceeds to carry out its various timing calculations and bids all remaining periodic DEH programs.

OPERATOR'S PANEL AND FLASH PROGRAM

Referring now to FIGS. 17, 18 and 19, the control panel 1130 for the digital electrohydraulic system 1100 is shown in detail. Specified functions have control panel buttons which flash in order to attract the attention of an operator. The FLASH task has two functions: it flashes appropriate lights to alert the operator to various important conditions in the DEH system, and it sets contact outputs to pass these same conditions to the Analog Backup and Boiler Control Systems. The FLASH task is on priority level 5 and is bid by the AUX SYNC task every ½ sec.

Figure 20:
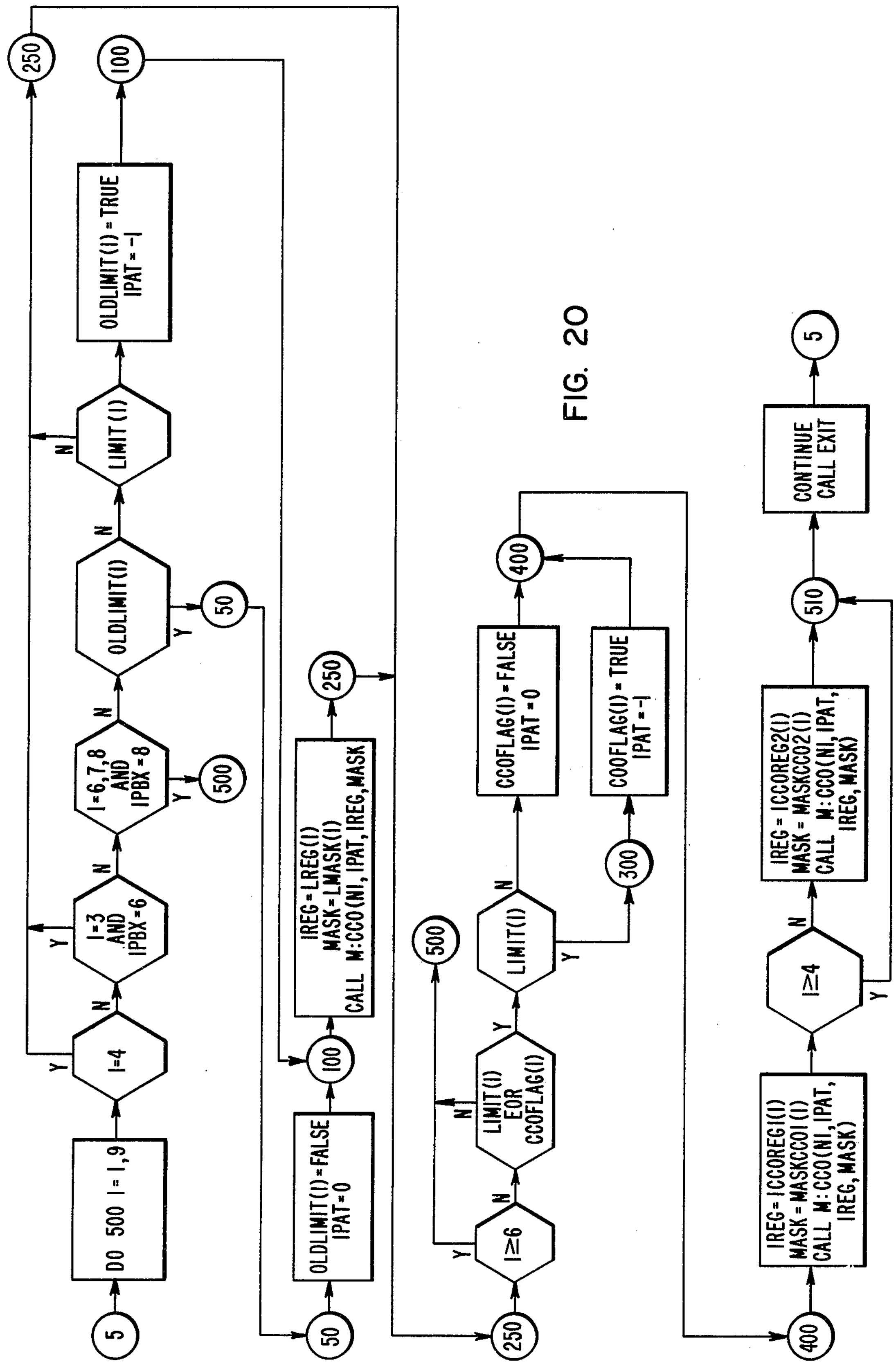
FIG. 20 shows a flow chart of a flash task which is operable in accordance with the principles of the invention.

FIG. 20 shows a detailed flow chart of the flash task 1136. The flash task is included in FIG. 8 as the flash task block 1136.

The concept behind the FLASH task is that flashing will attract the operator's attention much more quickly than simply maintaining a steady on condition. Most of the flashing lights indicate contingency conditions; a few indicate such things as invalid keyboard entries or that the DEH system is ready to go on automatic control. The flashing frequency is set at ½ sec on and ½ sec off as long as the condition exists. At the termination of the flashing condition, the corresponding lights and contacts are turned off.

A total of nine conditions are continually monitored for flashing by the FLASH task. These are listed below with a brief description of each.

1. Reference Low Limit—The turbine load reference is being limited by the low load limit.

2. Reference High Limit—The turbine load reference is being limited by the high load limit.

3. Valve Position Limit—The turbine governor valve output is being limited by the valve position limit.

4. Throttle Pressure Limit—The turbine load reference is being run back because throttle pressure is below set point. No light is flashed in this case but a contact output is set during the throttle pressure limiting.

5. DEH Ready for Automatic—The DEH control system has tracked the manual backup system and is ready to go on automatic control.

6. Valve Status Contingency—While on automatic control, the DEH system has detected a valve LVDT position not in agreement with its corresponding analog output.

7. Governor Valve Contingency—A governor valve LVDT position is not in agreement with its analog output.

8. Throttle Valve Contingency—A throttle valve LVDT position is not in agreement with its analog output.

9. Invalid Request—An invalid keyboard entry has been made.

In order to determine whether to flash a light or to suppress flashing, the FLASH task maintains two arrays in core memory. One of these is called LIMIT and contains the current value of the nine limiting or flashing conditions listed above, as they are set by various other DEH programs. The second array is called OLDLIMIT and is an image of the immediate past value of the LIMIT array. These two arrays are examined every ½ sec by the FLASH task according to the following table of combinations:

FLASH TASK LAMP COMBINATIONS

| LIMIT | OLDLIMIT | Action |
|---|---|---|
| 0 | 0 | Do Nothing |
| 0 | 1 | Turn Light Off |
| 1 | 0 | Turn Light On |
| 1 | 1 | Turn Light Off |

After the proper action is taken by the FLASH task, the OLDLIMIT array is then updated to agree with the current LIMIT array for the next pass through the task ½ sec later.

A third array called CCOFLAG is also maintained by the FLASH task in order to set contact outputs when a limiting condition exists. The contact outputs are not set and reset regularly (as are the flashing lights) but rather the contacts are set and remain on as long as the flashing condition exists. When the flashing condition ceases the contacts are reset. A table of combinations illustrating this action follows:

FLASH TASK CONTACT COMBINATIONS

| LIMIT | CCOFLAG | Action |
|---|---|---|
| 0 | 0 | Do Nothing |
| 0 | 1 | Reset Contact |
| 1 | 0 | Set Contact |
| 1 | 1 | Do Nothing |

It should be noted that only the first five flash conditions listed above have contact outputs associated with them; the remaining four simply flash Operator's Panel lights.

The control of the operation of the DEH control system 1100 is greatly facilitated for the operator by the novel layout of the operator's panel 1130, the flashing and warning capabilities thereof, and the interface provided with the turbine control and monitor functions through the pushbutton switches. In addition, simulated turbine operation is provided by the DEH system for operator training or other purposes through the operation of the appropriate panel switches during turbine down time. Further, it is noteworthy that manual and automatic operator controls are at the same panel location for good operator interface under all operating conditions. More detail on the functioning of the panel pushbuttons is presented in Appendix 2 and elsewhere in the description of the DEH programs herein.

In addition the layout of the panel 1130 of FIGS. 17, 18 and 19 is unique and very efficient from operation and operator interface considerations. The control of the DEH system 1100 by the buttons of the panel 1130 and the software programs thereto provides improved operation of the computer 210 and turbine generator 10.

Software details of the panel 1130 interface are available in the appendices 3, 4, 5 and 6.

5. CONTACT CLOSURE OUTPUT TEST PROGRAM

Figure 21:
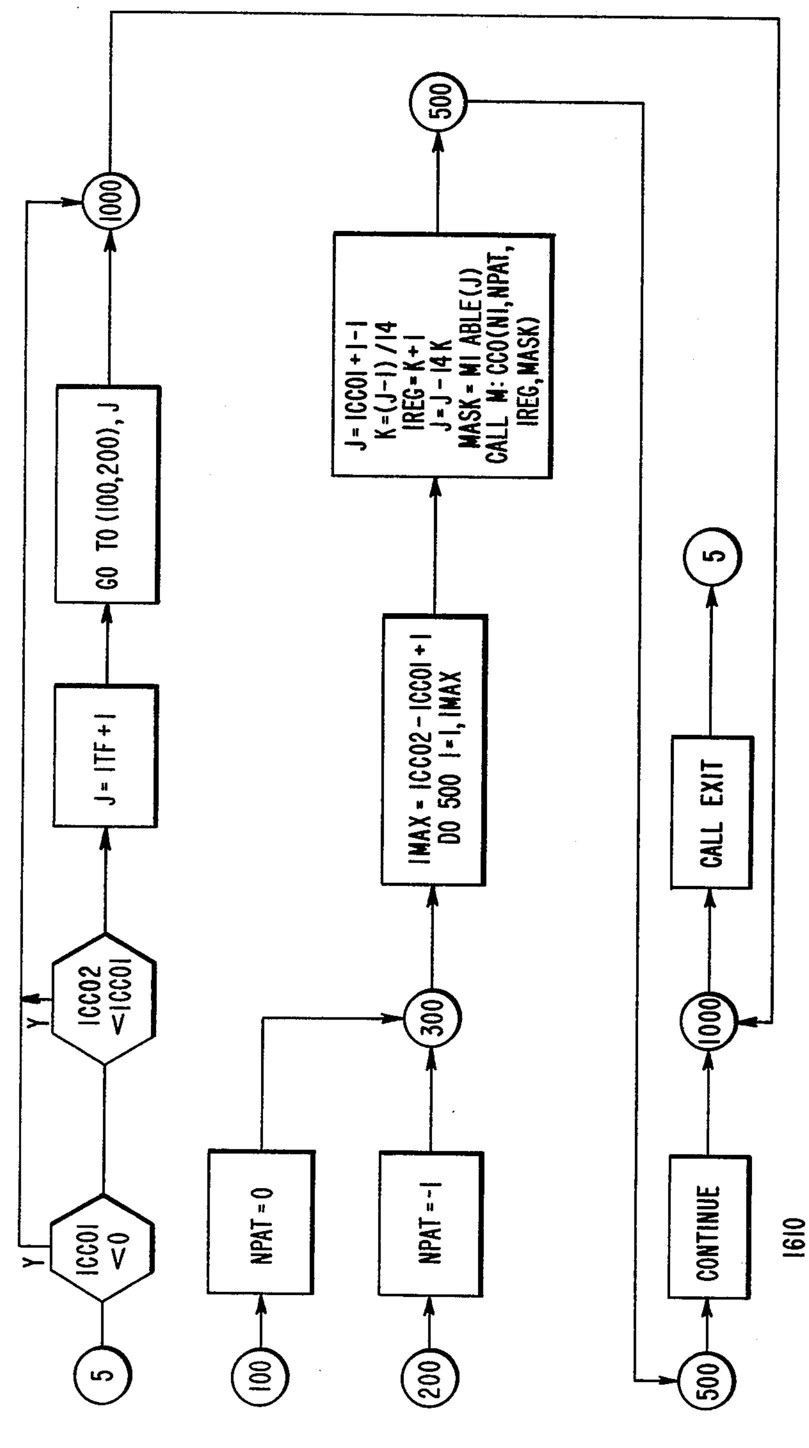
FIG. 21 is a flow chart of a contact closure output test program which is operable in accordance with the principles of the invention.

In FIG. 21, a flow chart of a contact closure output test program 1610 is shown. The contact closure output test program 1610 provides a mechanism for setting any contact output or any group of consecutive contact outputs in the plant 1126. The contact closure output test task facilitates debugging of programs and testing computer hardware and plant wiring in field installations of the digital electrohydraulic system 1100.

In the field-installation phase of computer control systems, checkout of all parts of the system can be a tedious and frustrating chore. Debugging of programs, computer hardware and plant wiring is often a slow and painful process, and isolation of problems to one of these areas is sometimes difficult. It is during this time that the CCO TEST task provides a powerful tool for helping to bring the DEH system to full operating capabilities quickly.

The CCO TEST task is patterned along the lines of the DEH Input/Output (I/O) listing. The I/O list has a description of all contact outputs in numerically increasing order, from C001 to C224. The list includes a verbal description of the contact output function, its bit position, hardware word, set channel, and cabinet-half-shell terminal connection information. Since each contact output is identified by its C-number, to set or reset a contact or group of consecutive contacts, it is necessary only to type in the contact number(s) from the Programmer's Console and bid the CCO TEST task. Since analog outputs are essentially groups of contact outputs, the CCO TEST task may also be used to set any value on an analog output. This allows additional software and hardware testing prior to interfacing of the entire system.

6. SEQUENCE OF EVENTS INTERRUPT PROGRAM

Figure 22:
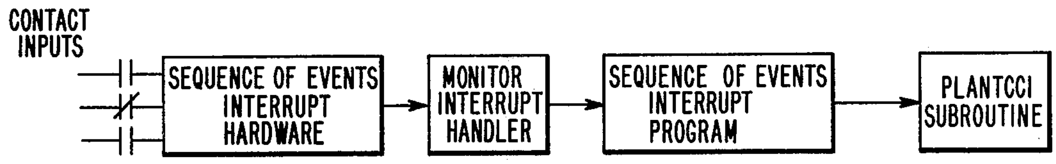
FIG. 22 is a block diagram of a contact input scan program with a sequence of events interrupt program therein which is operable in accordance with the principles of the invention.

The sequence of events interrupt program 1124 is shown in block form in FIG. 22. In order to carry out its functions properly, a computer control system must be provided with status input signals which represent the various states of the process or plant which is to be controlled. These status signals represent contacts which are normally open or closed (set or reset). Traditionally such contacts have been periodically scanned at some reasonable rate, such as every 1 sec. However, this method of processing contact inputs has two drawbacks. First, periodic contact scanning imposes a regular duty cycle on the computer; even through it may be small, it is unnecessary for the largest percentage of time when status contacts are not changing at a high rate. Secondly, when a contact does change state, the periodic scanning method (in the worst case) may not make this information available to the computer control system until a full scan period (say 1 sec) later. This situation clearly is undesirable for those control systems in which fast response is a necessity.

To minimize these effects, the DEH contact input scan is organized on a demand basis; a scan is initiated by a change of state on any of the contact inputs. Any contact status change generates a sequence of events interrupt which is processed by the Monitor interrupt handler. Identification of the interrupt causes the Monitor to run the SEQUENCE OF EVENTS INTERRUPT program, which calls the PLANTCCI subroutine to scan all of the contact inputs to the DEH system 1100. Once the PLANTCCI subroutine identifies the plant condition that changed state and activated the sequence of events program 1124 the execution of an appropriate function program may be initiated in accordance with the task priorities. Contact inputs scanned by the CCI subroutine are set forth in the input/output signal list in Appendix 4.

7. BREAKER OPEN INTERRUPT PROGRAM

Referring now to FIG. 1, if the breaker 17 opens thereby removing electrical load 19 from the generator 16, the turbine system 10 will begin to accelerate. The acceleration will overspeed the turbine generator system 10 and damage the turbine generator system 10 if it is not checked. It is mandatory that the turbine governor valves be closed an instant after the breaker opens, to cut off steam flow. The control system then reverts to speed control and positions the governor valves to maintain synchronous speed.

Figure 24:
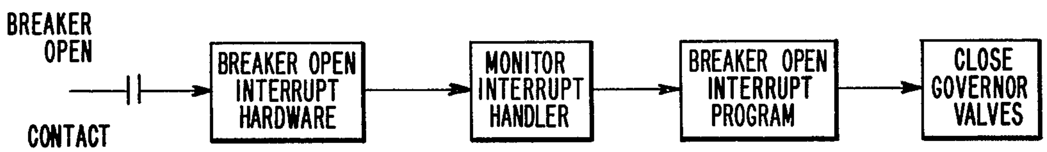
FIG. 24 is a block diagram of a breaker upon interrupt program which is operable in accordance with the principles of the invention.

In order to restrict turbine overspeed when the breaker 17 opens, the breaker open contact is used to produce an interrupt. The Monitor interrupt handler than runs a BREAKER OPEN INTERRUPT program 1710 (FIG. 24), which immediately closes the governor valves by setting the appropriate analog output to zero.

Figure 25:
FIG. 25 is a flow chart of the breaker open interrupt program which is operable in accordance with the principles of the invention.

FIG. 25 shows in detail the breaker open interrupt program flow chart. An independent hydraulic overspeed protection system shown in Ser. No. 189,322 by Fiegbein and Csanady also acts directly under predetermined conditions to close the governor valves GV1–GV8 and the throttle valves TV1–TV4 by dumping the hydraulic fluid in the valve actuators thereby giving additional protection to the turbine system 10. When the hydraulic overspeed protection system reacts to a breaker open operation (i.e. a full load rejection), the turbine steam valves are directly and immediately closed and the DEH system functions on a following basis to update its valve position outputs to call for valve closure. When a partial load rejection occurs, i.e. the breaker remains closed, a control strategy like that described in the aforementioned Birnbaum, Braytenbah and Richardson patent 3,552,872 is effected by the DEH system.

8. TASK ERROR PROGRAM

A task error program 1810 shown in FIG. 8 has supervisory control over all the other programs in the DEH system 1100. If any program is not functioning properly in correspondence to certain predefined error conditions, the task error program 1810 will switch the DEH system 1100 to manual control thereby preventing any accident, overload, underload, overspeed, or underspeed from happening. Thus, the TASK ERROR program 1810 switches control of the turbine from automatic to manual if certain important control tasks are disabled by the Monitor during input/output activity. The TASK ERROR program 1810 is initialized by the Monitor error handler.

The P2000 Monitor is composed of a variety of programs which handle all I/O activity for the DEH system. Thus, when some turbine control program wishes to use the I/O system, it calls the proper Monitor handler with a set of arguments describing the function to be performed. The handler then carries out the request and returns to the calling task at the completion of the function. However, in usual applications, if the handler finds erroneous information in the arguments passed along by the calling task, then the I/O request is ignored and the calling task is disabled. An example of such an error is a zero, negative or non-existent register number when calling the contact output handler.

An example of the usual operation of the P2000 Monitor in this particular case, i.e. in the DEH system, would be when a turbine operating program such as the panel task 1112 calls to use an input/output system such as the panel lamp program 1132. The panel task 1112 calls the monitor program 1122 with a set of arguments describing the function to be performed. The monitor program 1122 then carries out the request and returns to the panel task program 1112 at the completion of the function. However, if the monitor program 1122 finds erroneous information in the arguments or data passed along by the panel task 1112 then the input/output request for the panel lamp 1132 is ignored and the panel task 1112 is disabled. A monitor reference manual, TP043, of the Computer and Instrumentation Division of the Westinghouse Electric Corporation describes in detail all possible error conditions.

To give the DEH control system ability to take appropriate action if such an error occurs, the Monitor initialization provides an option SERO to indicate that a special TASK ERROR program will be available. This variable has been initialized with a zero value to indicate the option has been selected, and the task error table (Z:EROR) filled out with the transfer address of the TASK ERROR program. Reference to the DEH Monitor listing in Appendix 7 indicates which tasks will switch control to manual. When the Monitor handler detects an error condition it aborts the I/O request, disables the calling task, and runs the TASK ERROR program which switches the turbine to manual control.

Figure 26:
FIG. 26 is a block diagram of error action with a task error program which is operable in accordance with the principles of the invention.

FIG. 26 shows a block diagram of the task error program 1810. High safety and high reliability of operation of the DEH system 1100 are assured by the linking of the task error program 1810 to other DEH programs.

9. TURBINE TRIP INTERRUPT PROGRAM

TURBINE TRIP INTERRUPT program provides for throttle and governor valve closure immediately after the turbine latch mechanism is released. The TURBINE TRIP INTERRUPT program is initiated by the Monitor interrupt handler.

The mechanical latching mechanism of a turbine has a series of interlocks which are designed to trip the turbine off the line when any serious discrepancy is found in the system. Such factors as hydraulic fluid system, mechanical levers, emergency trip button, and solenoids operated by detection circuits may unlatch the turbine. When this happens, all throttle and governor valves must be closed to cut off steam flow immediately, after which the turbine begins to decelerate.

Figure 27:
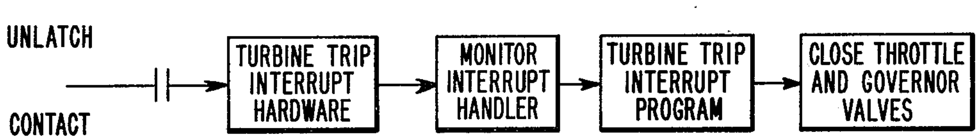
FIG. 27 is a block diagram of a turbine trip interrupt program which is operable in accordance with the principles of the invention.

In FIG. 8, a turbine trip interrupt program 1850 is shown coupled to the plant wiring 1126 and to the throttle valves TV1–TV4 and the governor valves GV1–GV8 1021. If the turbine system 10 reaches a trip condition, a latch open contact 1852 changes state and indicates a trip to the turbine trip interrupt program 1850 by means of an interrupt signal. The Monitor interrupt handler then runs the TURBINE TRIP INTERRUPT program, which immediately calls for throttle and governor valve closure. Simultaneously the analog backup system detects the trip condition and provides a large closing bias voltage to the throttle and governor valve servo system, thus assuring via redundant circuits that all valves are closed. By closing all the valves in the turbine system 10, dangerous turbine overspeed and other conditions are avoided. A block diagram of the turbine trip interrupt system 1850 is shown in FIG. 27.

10. PANEL INTERRUPT PROGRAM

Figure 28:
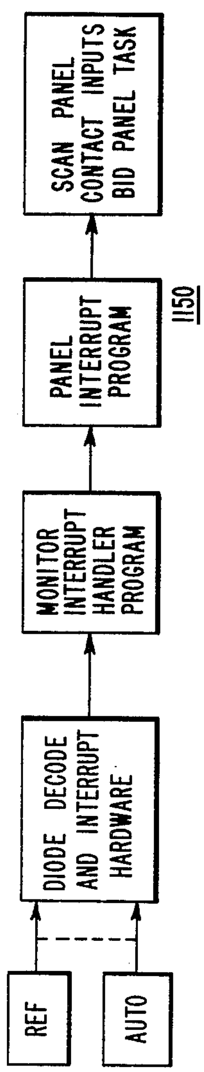
FIG. 28 is a block diagram of a panel interrupt program which is operable in accordance with the principles of the invention.

A block diagram of the panel interrupt program 1156 is shown in FIG. 28.

The PANEL INTERRUPT program responds to Operator's Panel pushbutton requests by decoding the pushbutton identification and bidding the PANEL task to carry out the appropriate response. The PANEL INTERRUPT program is initiated by the Monitor interrupt handler.

The DEH turbine control system is designed to provide maximum flexibility to plant personnel in performing their function of operating the turbine. This flexibility is evidenced by an Operator's Panel with an array of pushbuttons arranged in functional groups, and an internal software organization which responds immediately to pushbutton requests by the operator. The heart of this instant response is the interrupt capability of the DEH control system.

Pressing any panel pushbutton activates a diode-decoding network which identifies the pushbutton, sets a group of six contacts to an appropriate coded pattern, and generates an interrupt to the computer. The Monitor interrupt handler responds within microseconds and runs the PANEL INTERRUPT program, which does a demand contact input scan of the special panel pushbutton contacts and bids the PANEL task to carry out the function requested by the operator.

11. VALVE TEST, VALVE POSITION LIMIT AND VALVE INTERRUPT PROGRAM

Certain valve testing and limiting functions have been a traditional turbine control feature over the years to provide assurance of the emergency performance of valves and to give the operator a final override on the control valve position. Thus, on line testing of throttle valves periodically will detect potential malfunctions of the throttle valve mechanism which could be dangerous if not corrected. In addition, valve position limiting of the governor valves during on line operation provides a manual means of limiting steam flow from the Operator's Panel.

In the DEH control system these two important functions are initiated by appropriate pushbuttons on the panel. As long as the operator presses one of these pushbuttons, the proper action is carried out by the CONTROL program. When the operator releases any of these pushbuttons, this generates a special interrupt to terminate the action which has been performed.

Referring again to FIG. 8, a valve test program 1810 and a valve position limit program 1812 are subroutines of the control task program 1020. The valve test program 1810 tests the operation of any predetermined valve or valves such as the throttle valves TV1 through TV4 by the operator pressing a valve test button 1814 of FIG. 18 on the operator's panel 1130. The valve position limit program 1812 of the control task 1020 operates when an operator presses either of the two buttons, valve position limit lower 1816 or valve position limit raise 1818 of FIG. 18.

Figure 29:
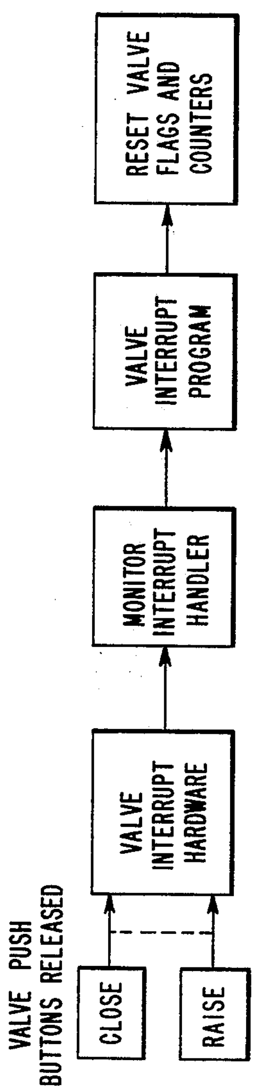
FIG. 29 is a block diagram of a valve interrupt program which is operable in accordance with the principles of the invention.

Referring again to FIG. 18, upon the release of the valve test button 1814, the valve position limit lower button 1816 or the valve position limit raise button 1818 by an operator, the valve interrupt program 1158 shown in FIG. 8, is run by the monitor program 1122. The monitor program 1122 runs the valve interrupt program 1158 and thereby resets various flags and counters thus signaling to the control task 1020 that the action is to cease. In FIG. 29 a block diagram of the valve interrupt program is shown.

12. STOP INITIALIZER PROGRAM

The STOP/INITIALIZE task 1162 (FIG. 8) initializes the DEH system to a known starting condition after the computer has stopped for any reason. (Note that stop here includes placing the computer out of sync.) The STOP/INITIALIZE task is assigned the highest priority level $F_{16}$ ($\mathbf{15}_{10}$) and is bid by special insert instructions in the Monitor POWER-ON routine.

To control a continuously operating process successfully, a computer must be designed to run for very long periods of time without stopping. However, it must be recognized that power failures, computer hardware malfunctions of program errors will eventually cause all control computers to stop at some time in their operation. At these times, backup systems take over the process while the necessary maintenance is done on the computer or its software.

Figure 30:
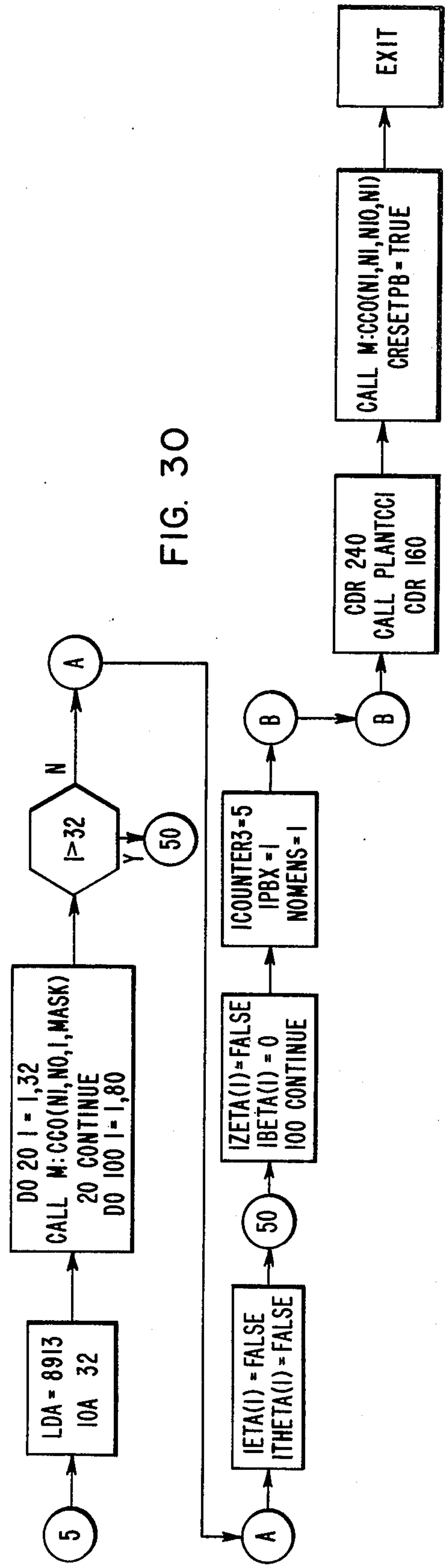
FIG. 30 is a flow chart of a stop/initializer program which is operable in accordance with the principles of the invention.

In FIG. 8, a stop/initializer program 1162 is shown ancillary to the clock program 1120. Should the DEH system 1100 have a power failure or be turned off, the stop/initializer program 1162, which has the highest priority (FIG. 9) of any program in the DEH system 1100, starts to run. Within the time that the voltages of the power supplies, not shown, decay to an unusable limit, the stop/initializer program 1162 sets the DEH system 1100 into a known state for the impending stop. Upon restarting, the stop/initializer program 1162 resets the system to the known state, i.e. it sets all contact and analog outputs to the throttle valves TV1 through TV4 and the governor valves GV1 through GV8 shown in box 1021 at reset position; all internal counters and logic states are reset; certain systems counters are set to starting values; a scan of all contact inputs from the plant wiring 1126 is carried out and the logic program 1110 is executed to align the DEH system 1100 to existing plant conditions. Finally, the controller reset lamp 1820 on the operator's panel 1130 as shown in FIG. 18 is turned on and the DEH system 1100 is ready to restart. A flow chart of the stop/initializer program is shown in FIG. 30.

When the operator presses the CONTROLLER RESET button, thus acknowledging the fact that the DEH system is operational again, all periodic programs begin to execute regularly and the control system tracks to the existing plant conditions. Operation from this point on is identical in all respects to normal execution of the DEH control system programs.

13. VISUAL DISPLAY PROGRAM

Visual display of numerical information which resides in memory has been a traditional function of control computer systems. This feature provides communication between the operator and the controller, with both display and changing of internal information usually available. Continuous display of a quantity provides visual indication of trends, patterns and dynamic response of control system variables; periodically updated values of the displayed quantity are entered into the windows so that fast changes may readily be observed by operating and technical personnel.

The DEH control system has provision for visual display of six important control quantities through dedicated individual pushbuttons. In addition, complete valve status (i.e. position) may be displayed through a group of appropriate pushbuttons; all remaining control system variables, parameters or constants may be displayed through another pushbutton, in conjunction with keyboard-entered dictionary addresses which select the desired quantity for display.

Figure 32:
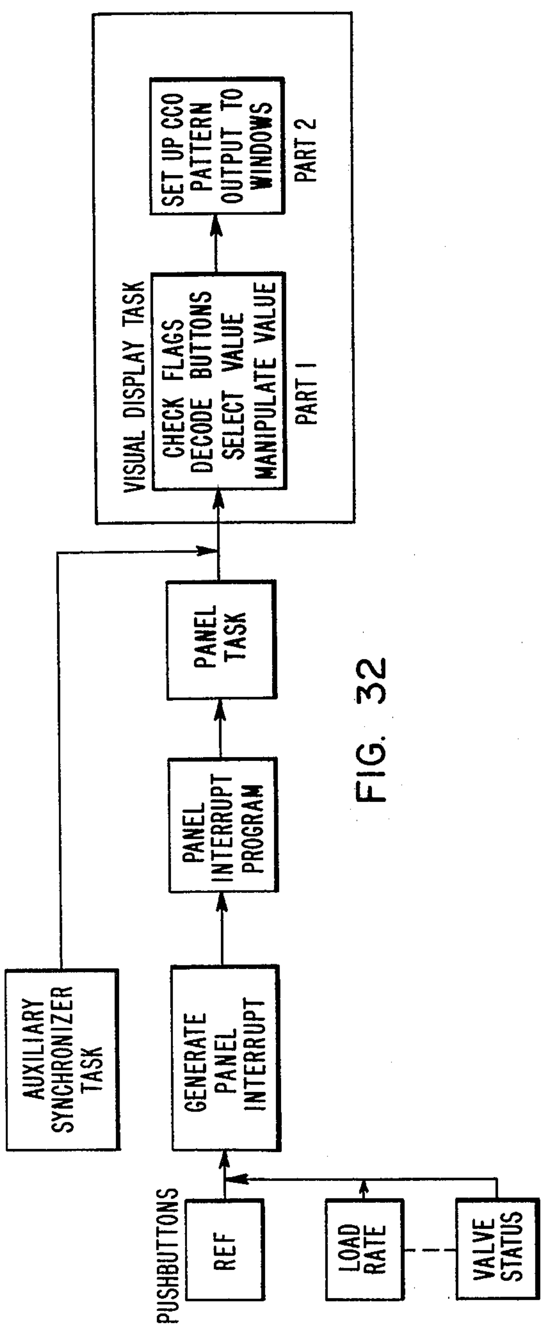
FIG. 32 is a block diagram of a visual display system which is operable in accordance with the principles of the invention.
Figure 33:
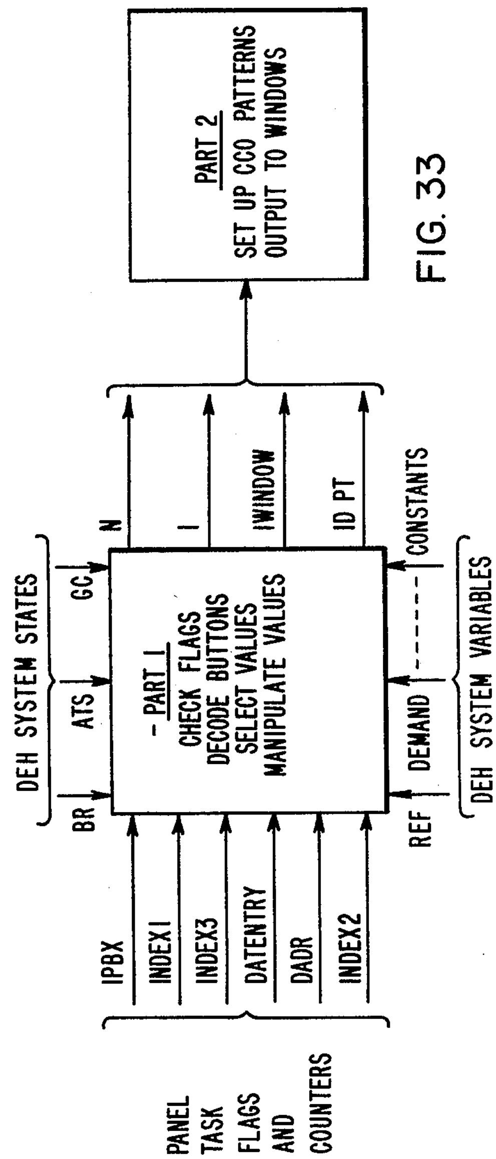
FIG. 33 is a block diagram of the execution of a two-part visual display function which is operable in accordance with the principles of the invention.

The visual display program 1134 as shown in FIG. 8 is connected with the panel interrupt program 1156 and the auxiliary synchronizer program 1114. The visual display program 1134 controls the display windows 1138 with a reference window 1852 and a demand window 1854. The demand window 1854 and the reference window 1852 are also shown in FIG. 18 as part of the operator's panel 1130. By pressing an appropriate button such as the reference button 1856 a reference value will be displayed in the reference window 1852 and a demand value will be displayed in the demand window 1854. Similarly, for example, if a valve position limit display button 1858 is pressed a valve position limit value will be displayed in the reference window 1852 and the corresponding valve variable being limited is displayed in the demand window 1854. Upon pressing the load rate button 1858 the load rate will be displayed in the reference window 1852. In addition, a keyboard 1860 has the capability through an appropriate program to select virtually any parameter or constant in the DEH system 1100 and display that parameter in the reference window 1852 and the demand window 1854. Referring now to FIG. 31 a table of the display buttons and their functions is given in greater detail. In FIG. 32 a block diagram of the visual display program system is shown. FIG. 33 shows a block diagram of the execution of a two-part visual display function.

14. ANALOG SCAN PROGRAM

In order to carry out its function, a computer control system must be provided with input signals from the process or plant variables which are to be controlled. However, the vast majority of real process variables (for example pressure, temperature and position) are analog or continuous in their natural form, whereas the organization and internal structure of computers is digital or discontinuous in nature. This basic difference in information format between the controller and the controlled process must be overcome with interfacing equipment which converts process signals to an appropriate computer numerical value.

A device which can accomplish this function is the analog-to-digital (A/D) converter. The A/D converter provides the interface between plant analog instrumentation and the digital control system. Normally the analog signal as picked up from a transducer is in the millivolt or volt range, and the A/D converter produces an output bit pattern which may be stored in computer memory. A/D converters can only convert a limited number of analog inputs to digital form in a given interval of time. The usual method of stating this limit is to indicate the number of points (analog inputs) which can be converted in 1 sec. Thus, the A/D converter used in the DEH system has a capacity of 40 pps. Since the total number of analog inputs to the DEH system maybe as high as 224, depending on the type of turbine to be controlled and the control system options selected, most of these must be scanned at a reduced frequency.

The nature of the plant variables which represent the analog inputs, and the sampling frequency of control programs using these inputs, are normally considered when one determines the scanning frequency of various analog input signals. In the DEH system, the control programs execute once a second and the primary analog signals used by the control system are generated megawatts, impulse pressure, throttle pressure, turbine speed and valve position. Since each of these variables may change a significant amount in a few seconds, all of these are scanned once a second. On the other hand, the majority of the analog inputs to the ATS program are temperatures which require minutes before significant changes in them may be observed. Consequently, all temperatures in the DEH system are scanned once a minute. The ATS program also requires a group of vibrations, which are scanned once every 5 sec, and a group of miscellaneous variables which are scanned once every 10 sec.

Figure 35:
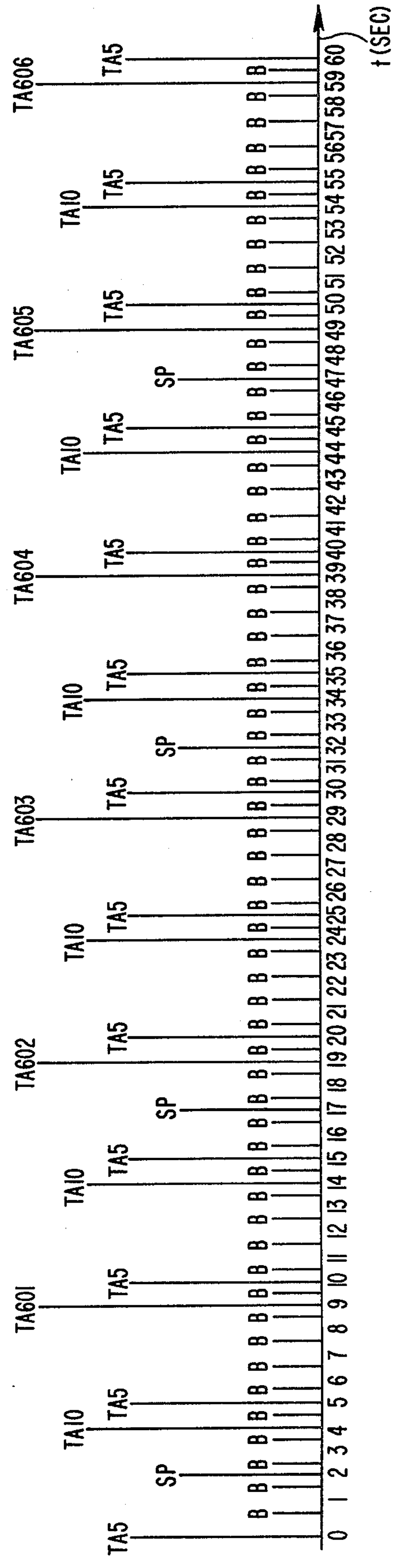
FIG. 35 is a timing chart of the various programs and functions within the Digital Electro Hydraulic System which is operable in accordance with the principles of the invention.

A timing diagram, or scan-frequency chart, is shown in FIG. 35 to indicate the complete analog scanning system for an end-bar-lift turbine having two throttle valves and two governor valves. The scanning pattern has been designed so that the A/D converter and the DEH computer system have an approximately uniform distribution of activity. A close look at FIG. 35 will indicate that once every 15 sec the analog scan system performs what is known as a SPAN/ADJUST operation. The purpose of this is to adjust the analog input bit patterns to account for drift in the A/D converter electronic circuitry and to account for the frequency variations, since the A/D converter operates on a voltage to fequency conversion principle.

The analog scan program 1116, shown in FIG. 8 periodically scans all analog inputs to the DEH system 1100 for control and monitoring purposes. The function of the analog scan program 1116 is performed in two parts. The first part of the analog scan program 1116 comprises the scanning of a first group of analog inputs. Values of scanned inputs are converted to engineering units and the values are checked against predetermined limits as required for computations in the DEH computer.

The second part of the function of the analog scan program 1116 comprises the scanning of the analog inputs required for the automatic turbine startup program as shown in FIG. 8. Conversion and limit-checking of this latter group of inputs is performed by another program. The automatic turbine startup program is shown in FIG. 8 as the ATS periodic program 1140, the ATS analog conversion routine 1142 and the ATS message writer program 1144.

15. LOGIC TASK

Figure 34:
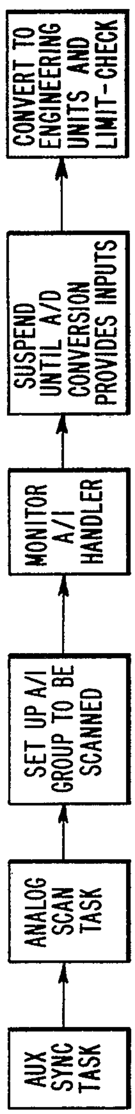
FIG. 34 is a block diagram of an analog scan system which is operable in accordance with the principles of the invention.
Figure 37:
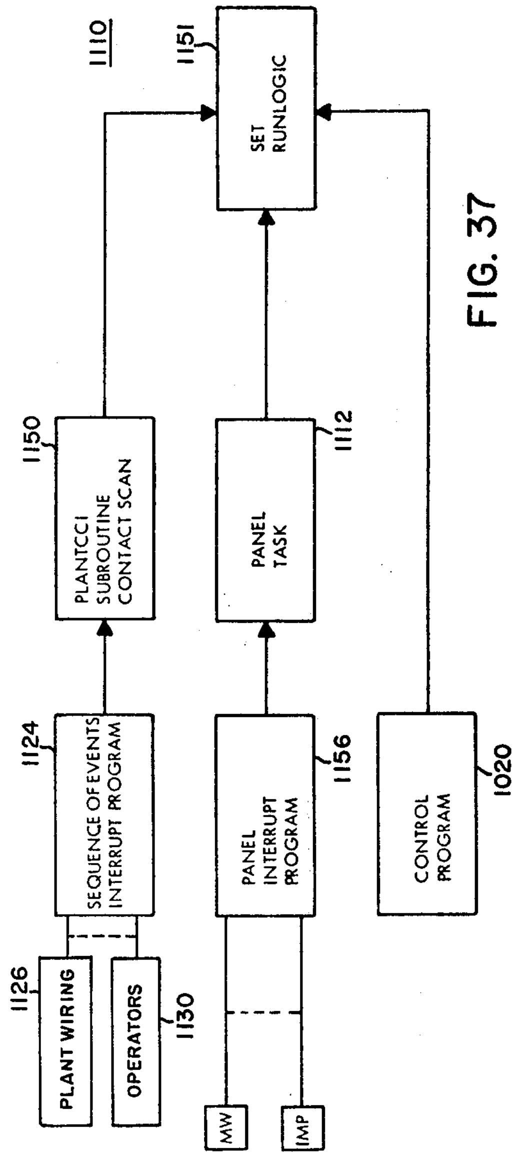
FIG. 37 is a block diagram of conditions which cause initiation of a logic program which is operable in accordance with the principles of the invention.
Figure 36:
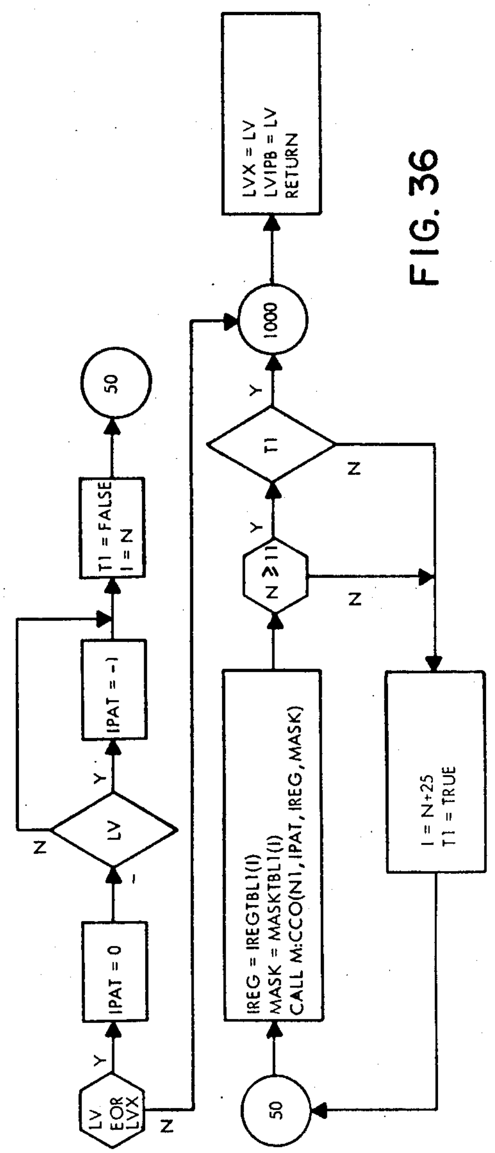
FIG. 36 is a flow chart of a logic contact closure output subroutine which is operable in accordance with the principles of the invention.
Figure 38:
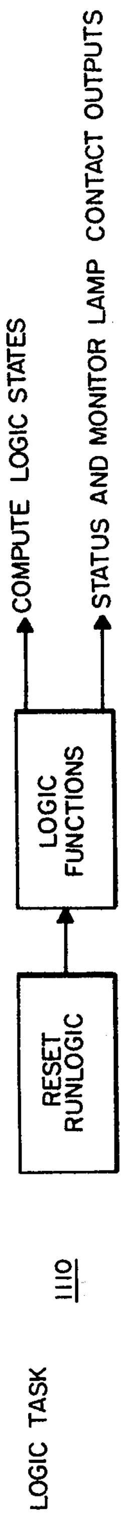
FIG. 38 is a simplified block diagram of a portion of the logic function which is operable in accordance with the principles of the invention.
Figure 39:
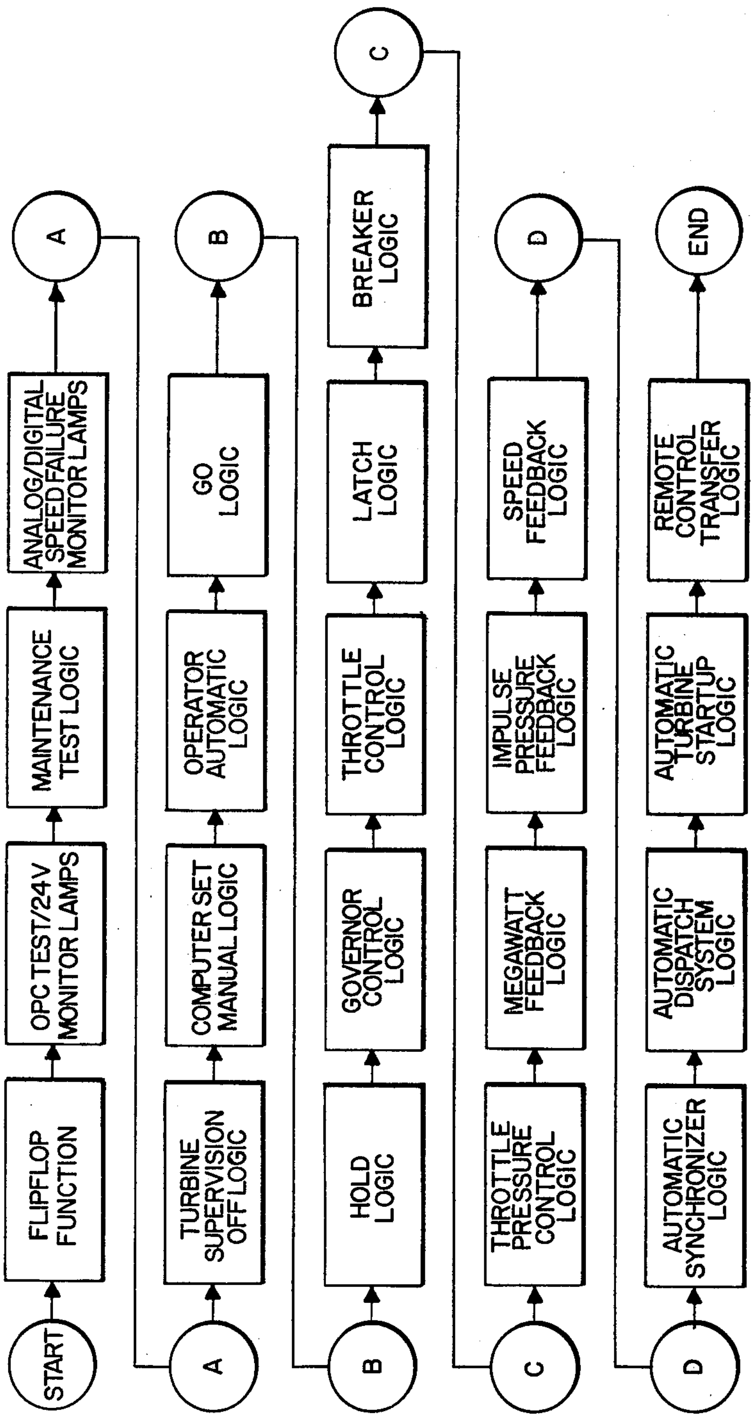
FIG. 39 is a block diagram of the logic program which is operable in accordance with the principles of the invention.

A functional organization diagram of the ANALOG SCAN task is shown in FIG. 34. The AUX SYNC task bids the ANALOG SCAN program every ½ sec. The ANALOG SCAN task then selects the appropriate group of inputs to be scanned, according to the timing diagram of FIG. 35, and calls the analog input handler portion of the Monitor. This handler triggers the A/D converter hardware to scan these points and suspends the ANALOG SCAN task until the bid patterns are available. The handler then restarts the ANALOG SCAN task, which converts the input bit patterns to engineering units, does appropriate limit-checking and makes logical decisions, and then exists until the next call from the AUX SYNC task, ½ sec later. Referring now to FIGS. 36 and 37, a block diagram representing the operation of the logic task 1110 is shown. A contact input from the plant wiring 1126 triggers the sequence of events or interrupt program 1124 which calls upon the plant contact closure input subroutine 1150 which in turn requests that the logic program 1110 be executed by the setting of a flag called RUNLOGIC 1151 in the logic program 1110. The logic program 1110 is also run by the panel interrupt program 1156 which calls upon the panel task program 1112 to run the logic program 1110 in response to panel button operations. The control task program 1020 in performing its various computations and decisions will sometimes request the logic program 1110 to run in order to update conditions in the control system. In FIG. 38, the functioning of the logic program 1110 is shown. FIG. 39 shows a more explicit block diagram of the logic program 1110.

The mechanism for actual execution of the LOGIC program is provided by the AUX SYNC task, which runs every 1/10 sec and carries out the scheduled and demand bidding of various tasks in the DEH system. AUX SYNC checks the state of the RUNLOGIC flag and, if it is set, bids the LOGIC task immediately. Thus, the maximum response time for LOGIC requests is 1/10 sec; on the average the response will be much faster than this.

In order to allow immediate rerunning of the LOGIC task should system conditions require, the LOGIC program first resets RUNLOGIC. Thus any other program may then set RUNLOGIC and request a bid which will be carried out by the AUX SYNC program within 1/10 sec. There are two major results of the LOGIC task: the computation of all logic states necessary for proper operation of the DEH system, and the processing of all status and monitor lamp contact outputs to inform the plant control system and operating personnel of the state of the DEH system.

The logic program 1110 controls a series of tests which determine the readiness and operability of the DEH system 1100. One of these tests is that for the overspeed protection controller which is part of the analog backup portion of the hardwired system 1016 shown in FIG. 6. Generally, the logic program 1110 is structured from a plurality of subroutines which provide the varying logic functions for other programs in the DEH program system, and the various logic subroutines are all sequentially executed each time the logic program is run.

LOGIC CONTACT CLOSURE OUTPUT SUBROUTINE

The logic task 1110 includes a subroutine called a logic contact closure output subroutine 1910 (FIGS. 36 and 37) therein. The logic contact closure output subroutine 1910 updates all the digital outputs to the status lamps and contacts 1128 for transmission thereto. The logic program 1110 handles a great number of contact outputs thereby keeping the output logic states of the DEH computer current. In addition, certain logical variables, which are normally set by the PANEL task, must be aligned by the LOGIC task with conditions as they exist instant by instant in the power plant. To do these functions in-line for each contact output in the LOGIC task would take considerable core storage to accommodate the individual situations. Thus, the logic contact closure output subroutine 1910 reduces the total storage requirements otherwise required for the logic program 1110.

MAINTENANCE TEST

Figure 40:
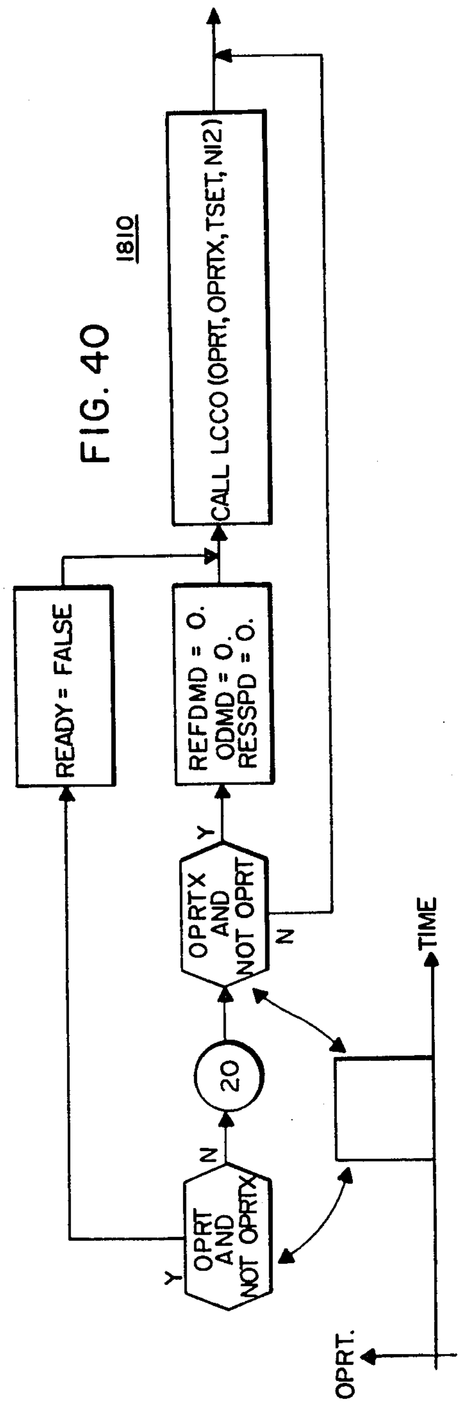
FIG. 40 is a flow chart of a maintenance test logic program which is operable in accordance with the principles of the invention.

In order to take advantage of the full flexibility, adjustability and dynamic response of the DEH system 1100 a maintenance test system 1810 is provided, a logic flow chart of which is shown in FIG. 40. The maintenance test program 1810 allows an operator to change, adjust or tune a large number of operational parameters and constants of the DEH system 1100. The constants of the DEH system 1100 can therefore be modified without extensive adjustment or reprogramming. An operator is able to optimize the DEH system 1100 from the control panel 1130 as shown in FIGS. 17 and 18 which allows for an essentially infinite variability in the choice of constants. Great flexibility and control is therefore available to an operator.

In addition, the maintenance test program 1810 of FIG. 40 allows an operator to use a simulation mode for operator training purposes.

TURBINE SUPERVISION OFF LOGIC COMPUTER SET MANUAL LOGIC

When the DEH system is in automatic control, it is possible for certain conditions to occur which require transfer to manual operator control. One of these is the case in which the maintenance test switch is moved to the test position. Even though a wired connection places the control in manual operation, the DEH LOGIC program sets a contact output requesting transfer to manual as a backup. The second situation occurs when the turbine is on automatic speed control and all speed input signals fail, as determined by the speed selection program in the CONTROL task. This speed channel failure will also require transfer to manual operation by a contact output from this LOGIC task.

Figure 42:
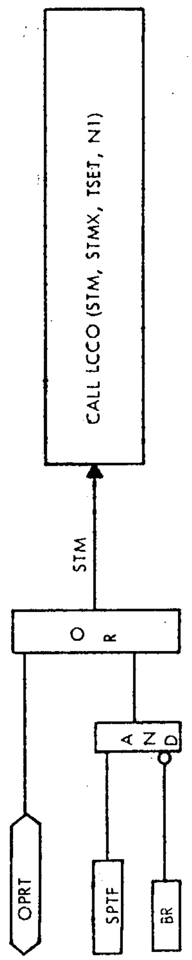
FIG. 42 is a flow chart of a transfer to manual operation subroutine which is operable in accordance with the principles of the invention.

FIG. 42 shows a flow chart of a transfer to manual operation subroutine.

STM is the logical variable to switch to turbine manual control, and is set by the maintenance test contact input (OPRT) or the speed channel failure variable (SPFT) while on speed control (i.e. the main breaker (BR) is not set). A call to the LCCO subroutine is then made.

BREAKER LOGIC

The state of the main circuit breaker which connects the generator to the power system determines a primary control strategy of the DEH system. When the breaker is open, the DEH system is on speed control and thus positions the throttle and governor valves to maintain speed demand as requested by the operator, an automatic startup program, or an automatic synchronizer. When the breaker is closed, the DEH system is on load control and thus positions the governor valves to maintain load demand as requested by the operator or by an automatic dispatching system.

The function of the breaker logic program is to detect changes in the state of the main breaker and take the appropriate action. When the breaker opens, it is necessary to reset the breaker flip-flop to place the DEH control system on speed control; in addition, both the REFERENCE and DEMAND are set to synchronous speed, and the speed integral controller is reset to zero. The control system will then position the governor valves to maintain synchronous speed. When the breaker closes and the unit is synchronized to the line, the breaker logic program must set the breaker flip-flop to place the DEH system on load control; in addition both the REFERENCE and DEMAND are set to pick up an initial megawatt load so that the turbine does not tend to motor. The control system will then position the governor valves to maintain this initial load.

Referring again to FIG. 1, upon synchronization of the turbine system 10 with a power grid, not shown, the governor valves GV1 through GV8 must allow sufficient steam to flow through the turbine system 10 to overcome turbine system losses. Otherwise, upon synchronization of the generator 16 with other generators in the power grid by closing the breakers 17, the turbine system 10 would as already indicated have a tendency to motor. The DEH control system 1100, in order to prevent motoring and subsequent damage to the low pressure turbine section 24, automatically opens the governor valves GV1 through GV8 such that a predetermined load is picked up by the generator 16 upon synchronization.

Figure 43:
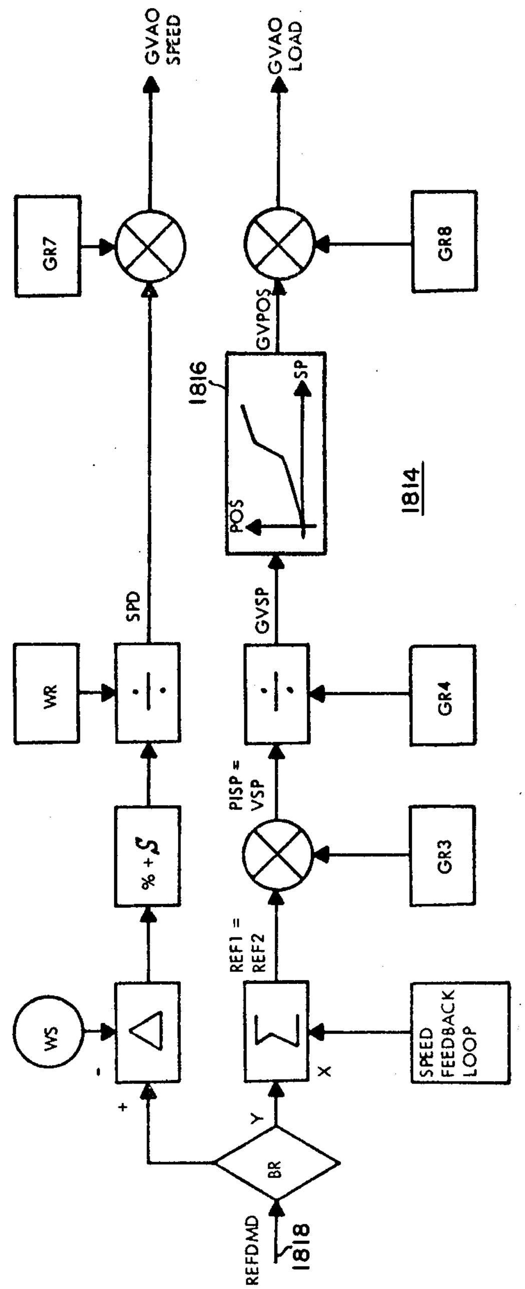
FIG. 43 is a block diagram of a load control system which is operable in accordance with the principles of the invention.

The value of the initial megawatt pickup is defined as MWINIT upon synchronization is entered from the keyboard 1860 in FIG. 18 and is typically set at about 5% of the rating of the turbine-generator 10. In the load control system 1814, as shown in FIG. 43, the actual megawatt pickup is modified by a factor which is the ratio of the rated throttle pressure to the existing throttle pressure at synchronization. This factor is utilized by the DEH system 1100 in maintaining approximately the same initial megawatt load pickup whether the turbine system 10 is synchronized at rated throttle pressure or at some lower or even higher throttle pressure. A second condition must be handled by the breaker logic program to properly position the governor valves in picking up initial load. This concerns the fact that the governor valves just prior to synchronizing will be at some small position necessary to maintain synchronous speed. Then immediately after synchronization the initial megawatt pickup must be added to the existing valve position. Since the existing position is coputed by the speed control program and the new position will be computed by the load control program, then an equivalent load position must be computed from the existing speed position. Reference is made to Appendix 3 for details on the Breaker Logic Program.

MEGAWATT FEEDBACK LOGIC

Megawatt feedback is one of the two major loops used on turbine load control to maintain the governor valves at the correct position. The other feedback is impulse pressure; between these two loops it is possible to adapt the computer outputs to account for valve non-linearities and to assure that the megawatt setting in the reference window is actually being supplied by the turbine/generator.

The megawatt feedback logic places the megawatt loop in service on request from an operator's panel pushbutton, providing all permissive conditions are satisfied, and removes the loop from service from the operator's panel pushbutton or when any condition exists which requires removing the megawatt feedback. Placing the loop in service or removing it is done bumplessly, so that the governor valves remain at the same position. In addition, the REFERENCE and DEMAND values are automatically adjusted to agree with the new state of the DEH control system.

Figure 46:
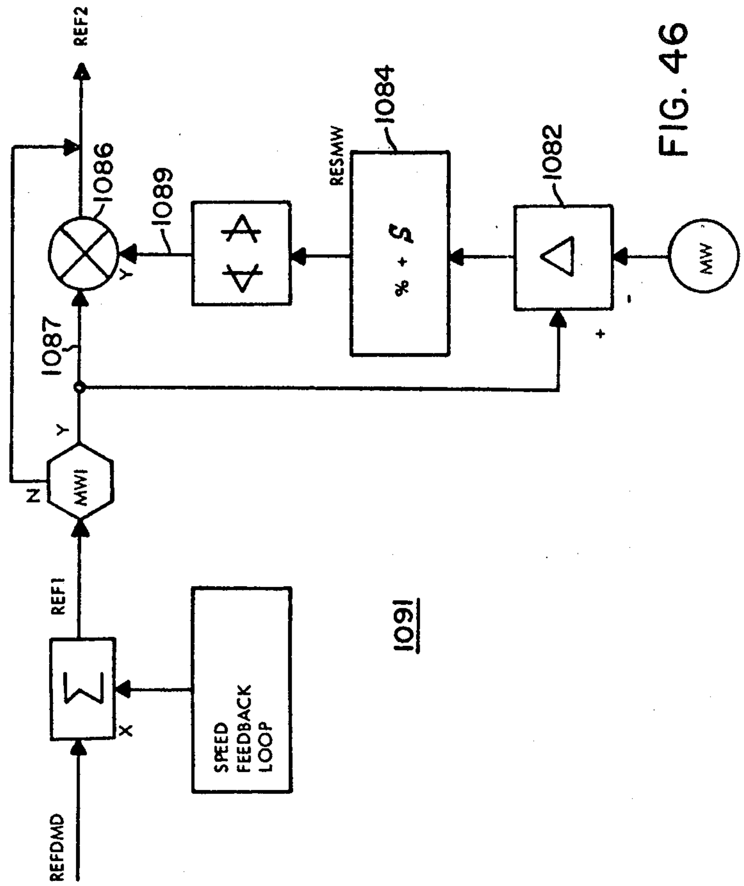
FIG. 46 is a block diagram of megawatt feedback loop subroutine which is operable in accordance with the principles of the invention.

Referring to FIG. 46, a block diagram of the megawatt feedback loop is shown in greater detail than in FIG. 7. It should be noted that the speed compensated reference 1087, at the input of multiplication function 1086, is multiplied by the megawatt compensation 1089. The multiplication of the signals instead of a differencing provides an additional safety feature since the loss of either of the signals 1087 or 1089 will produce a zero output rather than a runaway condition.

IMPULSE PRESSURE FEEDBACK LOGIC

Impulse pressure feedback is the other of the two major loops used in the turbine load control to maintain the governor valves at the correct position. The impulse pressure feedback logic places the impulse pressure feedback loop in service on request from an operator's panel pushbutton, providing all permissive conditions are satisfied, and removes the loop from service on request from the operator or when any condition exists which requires removing impulse pressure feedback. Placing the loop in service or removing it is done automatically and bumplessly, so that the governor valves remain at the same position.

Figure 11:
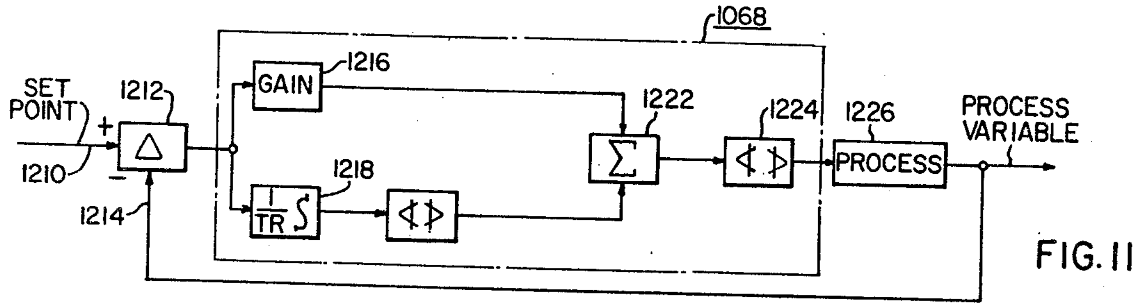
FIG. 11 shows a block diagram of a proportional-plus-reset controller program which is operable in accordance with the principles of the invention.
Figure 47:
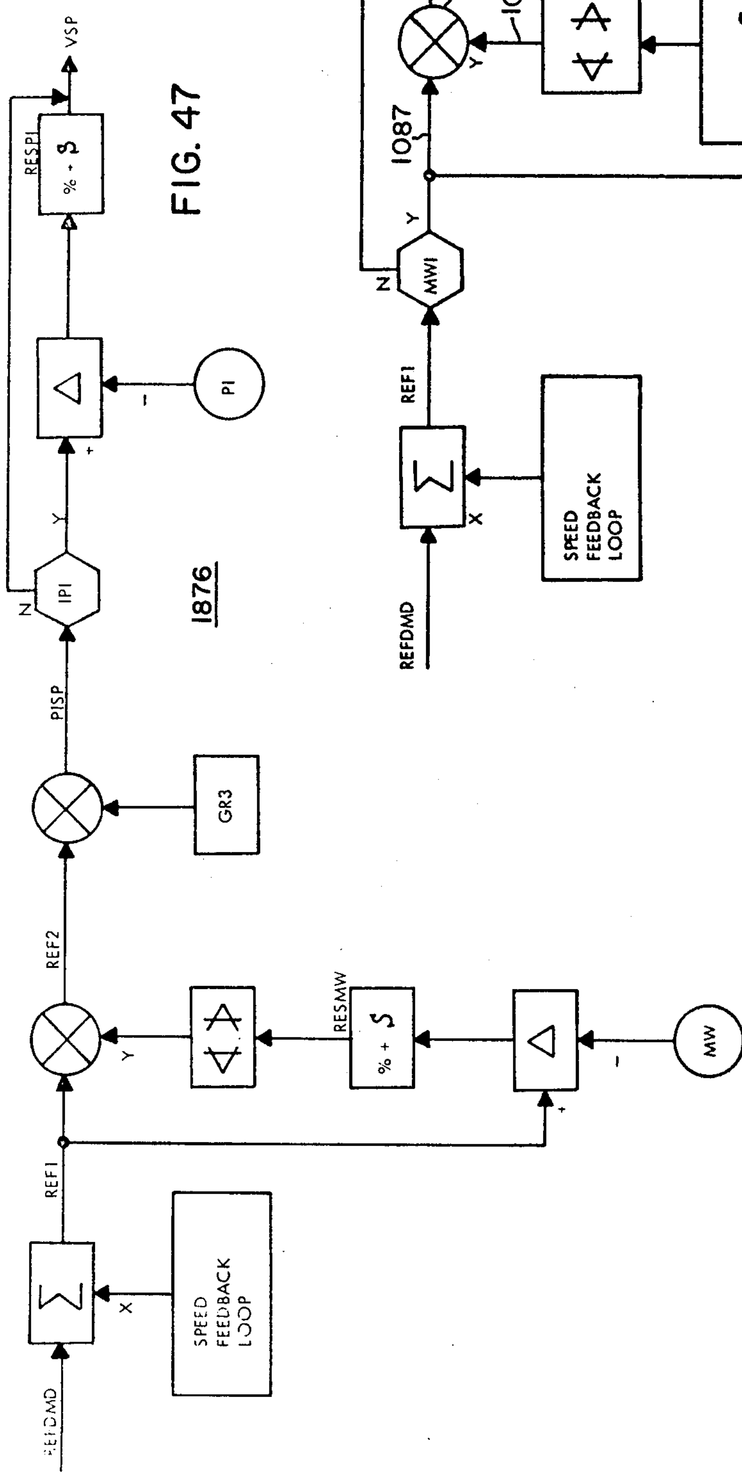
FIG. 47 is a block diagram of an impulse pressure loop with megawatt loop in service which is operable in accordance with the principles of the invention.

The impulse pressure feedback logic is shown in greater detail in FIG. 47. With a digital computer, bumpless transfer is achieved without the use of elaborate external circuitry because of the digital computational nature of the machine. A value can be computed instantaneously and inserted in the integrator 1218 of the proportional plus reset controller subroutine 1068 as shown in FIG. 11. In the preferred embodiment of the Digital Electro-Hydraulic control system 1100, the proportional plus reset controller 1168 is utilized by the following functions: the megawatt feedback loop 1091, the impulse pressure feedback loop 1816 and the speed feedback loop made up of the rated speed reference 1074, the compare function 1076 and the actual turbine speed function 1076.

SYNCHRONIZER LOGIC

During the process of accelerating a turbine on automatic speed control, the normal steps of operation may be summarized as follows: latch and roll the turbine on throttle control, accelerate to near synchronous speed, transfer to governor valve control, accelerate to synchronous speed, and synchronize the turbine with the power system. Most turbines are brought on the line with conventional automatic synchronizing equipment which carefully matches turbine conditions with power system conditions before automatically closing the main generator breaker.

Figure 48:
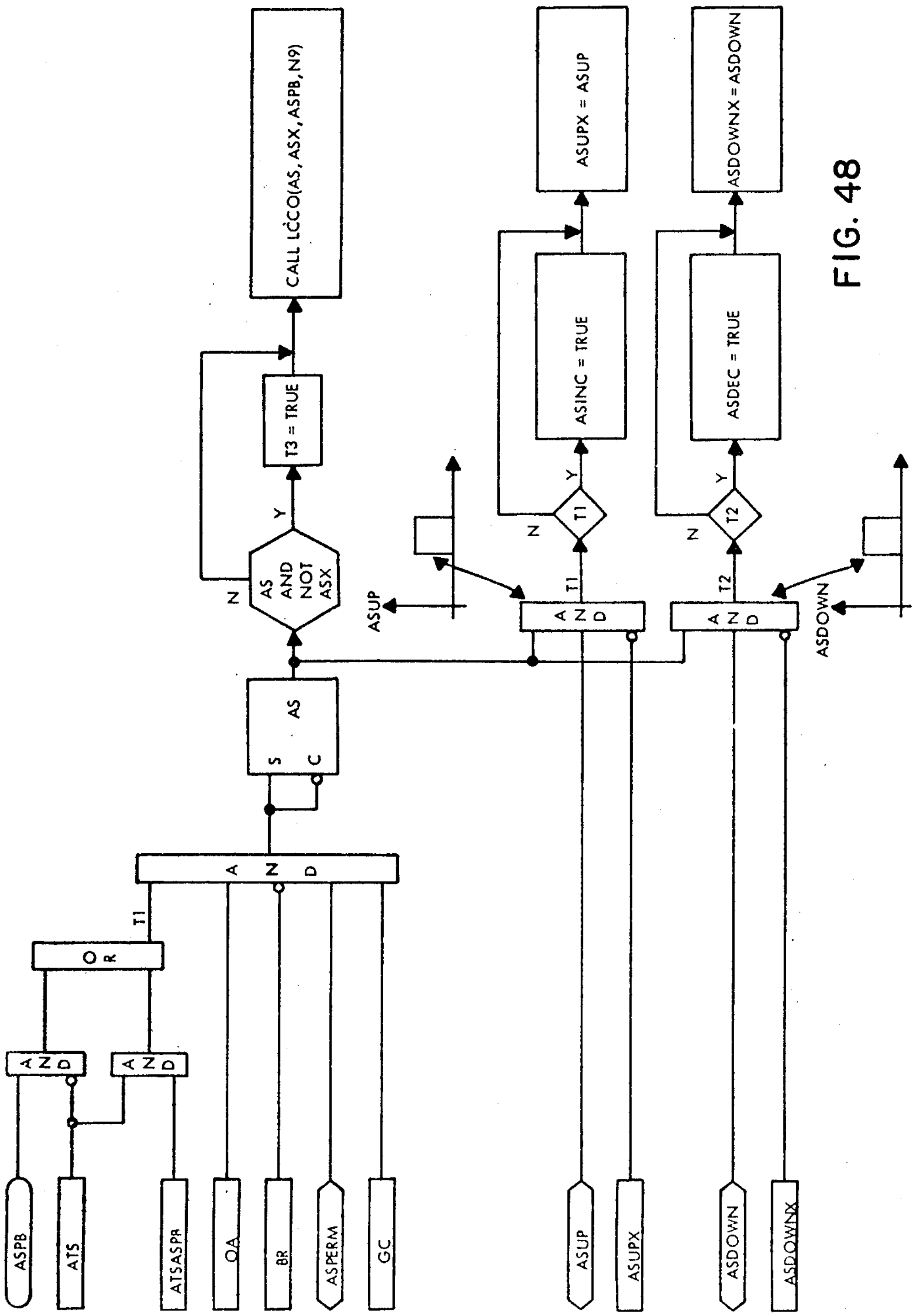
FIG. 48 is a flow chart of an automatic synchronize logic program which is operable in accordance with the principles of the invention.

The DEH control system 1100 provides an interface with synchronizing equipment by turning over supervision of the turbine reference and demand to the automatic synchronizer, which provides raise and lower pulses to the DEH system via contact inputs. Each pulse will raise and lower the turbine speed reference one rpm, thus providing the mechanism for adjusting the turbine speed to the power system. Provision has been made in the DEH system to allow selection of the auto sync mode through a pushbutton on the operator's panel or from an automatic turbine startup program, while the auto sync mode may be rejected by simply pressing the OPER AUTO pushbutton on the panel. The automatic synchronizer (auto sync) logic program detects those conditions concerned with auto sync, and sets all logical conditions accordingly. The turbine 10 operates in accordance with actions generated by the DEH control program in response to the synchronizer signals. FIG. 48 shows a flow chart of the automatic synchronizer logic program.

Because of the extreme accuracy of the ATS program 1141 in controlling the speed of the turbine 10 synchronization can be and preferably is performed without external automatic synchronizer equipment.

AUTOMATIC DISPATCH LOGIC

During the process of operating a turbine on automatic load control, the normal method of changing load is by entering new values of load demand from the keyboard, as described in the operating instructions. Then by using the GO and HOLD pushbuttons in conjunction with the load rate pushbutton, the operator may supervise the loading on the turbine which is actually carried out by the DEH system of control programs. This will result in the desired load being supplied to the power system by the turbine/generator.

Figure 49:
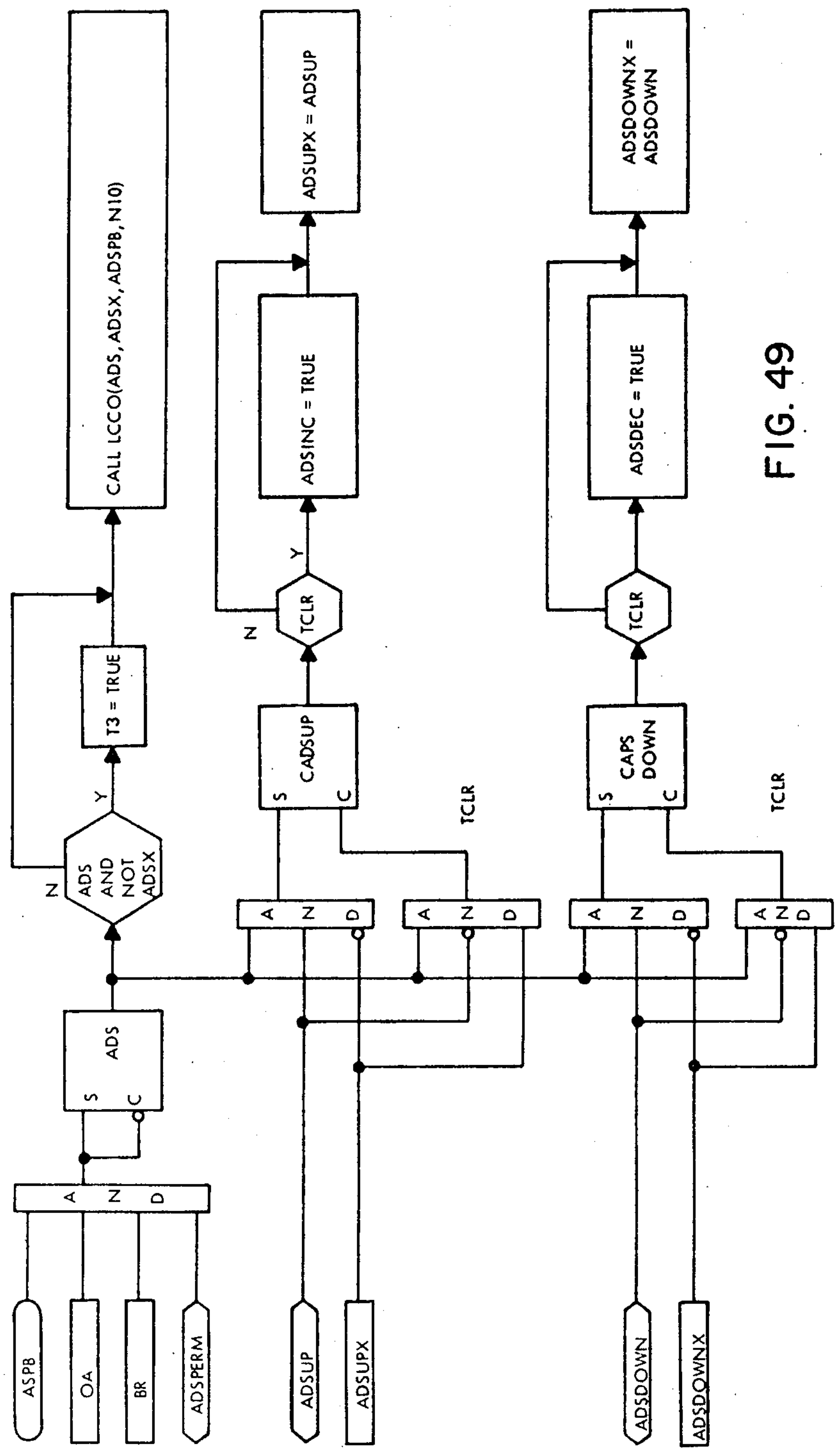
FIG. 49 is a flow chart of an automatic dispatch logic program which is operable in accordance with the principles of the invention.

Another method of supervising load on the turbine is through use of a remote automatic dispatching system. By turning over supervision of the turbine reference to an ADS operating mode, which provides raise and lower pulses whose width determines the requested load change, the DEH control system allows the turbine loading to be coordinated by a central dispatching office which can allocate total utility load on an economic basis to all units in the power system. Provision has been made in the DEH system to allow selection of the automatic dispatch mode through a pushbutton 1870 (FIG. 18) on the operator's panel; in addition, the ADS mode may be rejected by simply pressing the operator automatic pushbutton on the panel. The automatic dispatch logic program detects those conditions concerned with ADS, and sets all DEH states accordingly. A flow chart for the automatic dispatch logic program is shown in FIG. 49. It is triggered into operation on demand for automatic dispatch in order to interface the remote data with the DEH system.

AUTOMATIC TURBINE STARTUP (ATS) LOGIC

Modern methods of starting up turbines and accelerating to synchronous speed require careful monitoring of all turbine metal temperatures and vibrations to assure that safe conditions exist for continued acceleration. Until recently, these conditions have been observed by plant operators visually on various panel instruments. However, all of the important variables are rarely available from the plant instrumentation, and even if they were, the operator can not always be depended upon to make the right decision at a critical time. In addition to these factors, it is impossible to instrument the internal rotor metal temperatures, which are extremely important for indicating potentially excessive mechanical stresses.

To improve the performance at startup, automatic turbine accelerating programs have been written and placed under computer control. Such programs monitor large numbers of analog input signals representing all conceivable turbine variables, and from this information the program makes decisions on how and when to accelerate the unit. In addition, these programs numerically solve the complex heat distribution equations which describe temperature variations in the critical rotor metal parts. From these thermal computations it is possible to predict mechanical stresses and strains, and then to automatically take the proper action in the acceleration of the turbine.

The DEH system has such an automatic turbine startup program available as an optional item. Besides supervising the acceleration as described above, the program provides various messages printed on a typewriter to keep the operator informed as to the turbine acceleration progress. In addition, a group of monitor lamps are operated to indicate key points in the startup stages and to indicate alarm or contingency conditions. The automatic turbine startup logic program detects those conditions concerned with this DEH feature and sets all logical states accordingly.

REMOTE TRANSFER LOGIC

In the DEH turbine control system philosophy, the operator has overall authority in a control system hierarchy which has three general states: manual operation, operator automatic control, and remote automatic control. The manual operating mode is a contingency state which is used only when the computer is not available, as when the software control system is being tuned or modified. The operator automatic mode is the normal operating state during which speed/load demand and all other operating data are entered and displayed from the keyboard by the operator. Remote automatic control modes are those in which speed/load demand and rate are supervised from a source outside the basic DEH system.

Figure 51:
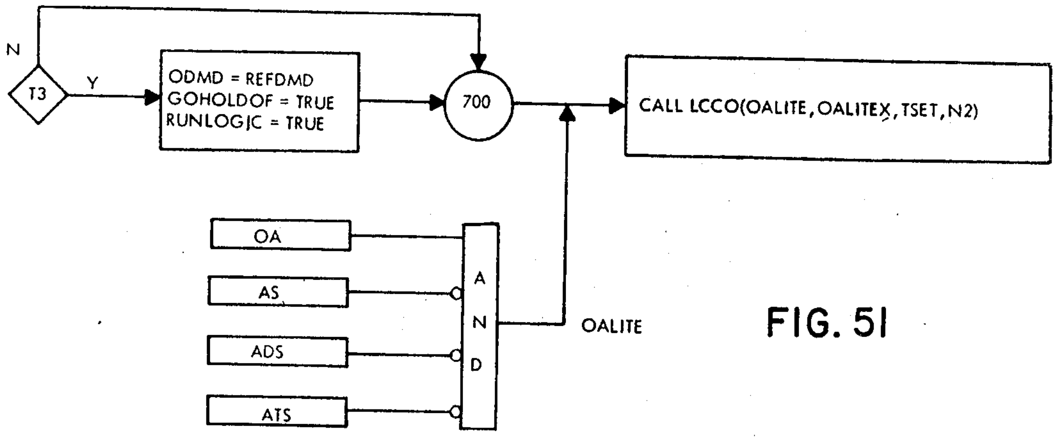
FIG. 51 is a flow chart of remote transfer logic subroutine which is operable in accordance with the principles of the invention.

In order to allow the DEH system 1100 to provide for automatic turbine operation from an independent source or a remote location, a remote transfer logic program shown in flow chart form in FIG. 51 is provided. In the preferred embodiment of the DEH system 1100, the available remote modes place the DEH system under control of the external automatic synchronizer system, the external automatic dispatching system or the automatic turbine startup system which is implemented within the DEH computer. An operator has the capability of choosing whichever mode is permissible and desired at a particular moment.

16. PANEL TASK

The DEH Operator's Panel is the focal point of turbine operation; it has been designed to make use of the latest digital techniques to provide maximum operational capability. The Operator's Panel provides the primary method of communicating information and control action between the operator and the DEH Control System. This is accomplished through a group of pushbuttons and a keyboard (which together initiate a number of diverse actions), and two digital displays (which provide the operator with visual indication of internal DEH system numerical values).

When pressed, any of the buttons on the Operator's Panel provide momentary action during which a normally-open contact is connected to an electronic diode matrix. Operation of a button energizes a common computer interrupt for the Operator's Panel and applies voltage to a unique combination of 6 contact inputs assigned as a pushbutton decoder. The diode matrix may be used to identify up to 60 pushbuttons. When a button is pressed, the associated interrupt is read within 64 μsec, and the corresponding contact inputs scanned and stored in computer memory as a bit pattern for further processing.

Each of the buttons on the panel are backlighted. When a button is pressed and appropriate logical conditions exist, the lamp is turned on to acknowledge to the operator that the action he initiated has been carried out. Should the proper logical conditions not be set, the lamp is not turned on. This informs the operator that the action he requested cannot be carried out.

A few of the buttons are of the digital push-push type which when pushed once initiate an action, and when pushed again suppress that action. Some of these buttons also contain a split lens which indicates one action in the upper half of the lamp and another (usually opposite) action in the lower lens. In addition, certain button backlights are flashed under particular operating circumstances and conditions.

The buttons and keys on the Operator's Panel may be grouped in broad functional groups according to the type of action associated with each set of buttons. A brief description of these groups follows:

1. CONTROL SYSTEM SWITCHING—These buttons alter the configuration of the DEH Control System by switching in or out certain control functions. Examples are throttle pressure control and impulse pressure control.

2. DISPLAY/CHANGE DEH SYSTEM PARAMETERS—These buttons allow the operator to visually display and change important parameters which affect the operation of the DEH system. Examples are the speed and load demand, high and low load limits, speed and load rate settings, and control system tuning parameters.

3. OPERATING MODE SELECTION—This group of buttons provides the operator with the ability to select the turbine operating mode. Examples are permitting an Automatic Synchronizer or an Automatic Dispatch System to set the turbine reference, or selecting local operator automatic control of the turbine (which includes hold/go action).

4. VALVE STATUS/TESTING/LIMITING—This group of buttons allows valve status information display, throttle/governor valve testing, and valve position limit adjustment.

5. AUTOMATIC TURBINE STARTUP—This group of buttons is used in conjunction with a special DEH program which continuously monitors important turbine variables, and which also may start up and accelerate the turbine during wide-range speed control.

6. MANUAL OPERATION—These buttons allow the operator to manually control the position of the turbine valves from the Operator's Panel. The DEH PANEL task has no direct connection with this group of buttons.

7. KEYBOARD ACTIVITY—These buttons and keys allow numerical data to be input to the DEH system. Such information may include requests for numerical values via the display windows, or may adjust system parameters for optimum performance.

Figure 52:
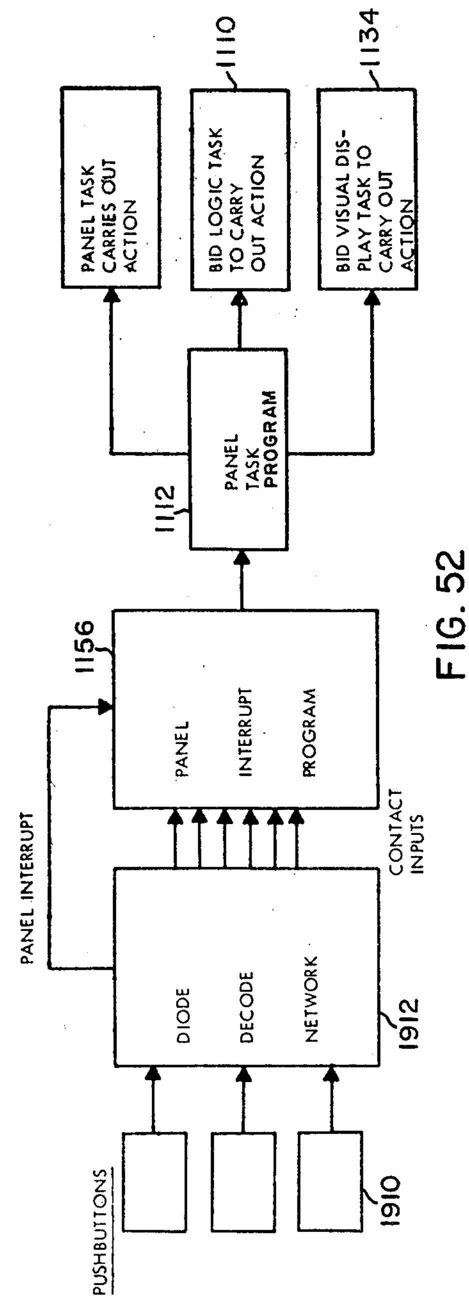
FIG. 52 is a block diagram showing a panel task interaction function which is operable in accordance with the principles of the invention.
Figure 53:
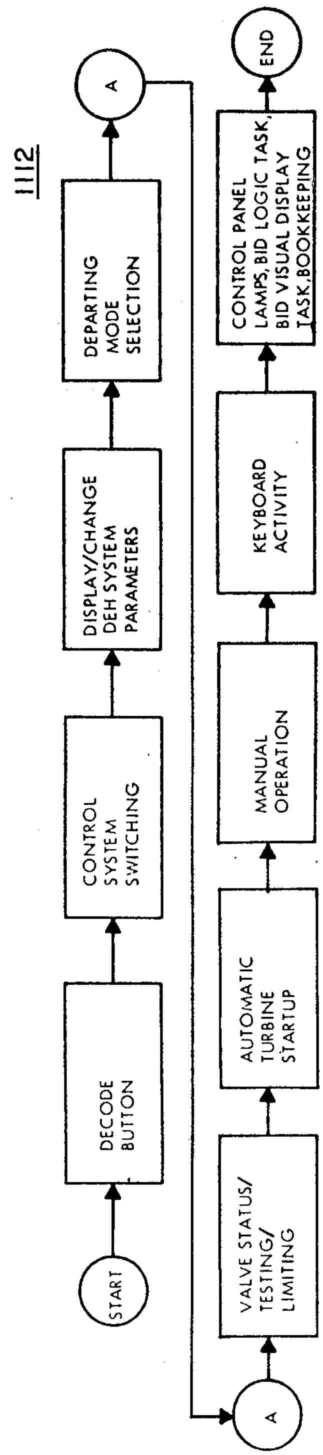
FIG. 53 is a block diagram of a panel program which is operable in accordance with the principles of the invention.

The panel task 1112 responds to the buttons pressed on the operator's panel 1130 by an operator of the DEH control system 1100. The control panel 1130 is shown in FIGS. 17 and 18. Referring now to FIGS. 52 and 53, the interactions of the panel task 1112 are shown in greater detail. Pushbuttons 1110 are decoded in a diode decoding network 1912 which generates contact inputs to activate the panel interrupt program 1156. The panel interrupt program scans the contact inputs and bids the panel task 1112 whereby the pressed button is decoded and either the panel task 112 carries out the desired action or the logic task 1110 is bid or the visual display task 1134 is called to carry out the desired command.

17. CONTROL PROGRAM

Automatic control of turbine speed and load requires a complex, interacting feedback control system capable of compensating for dynamic conditions in the power system, the boiler and the turbine-generator. Impulse chamber pressure and shaft speed from the turbine, megawatts from the generator, and throttle pressure from the boiler are used in the controlled operation of the turbine.

In addition to the primary control features discussed above, the DEH system also contains provisions for high and low load limits, valve position limit, and throttle pressure limit; each of these can be adjusted from the Operator's Panel. A number of auxiliary functions are also available which improve the overall turbine performance and the capabilities of the DEH system. Brief descriptions of these follow:

1. Valve position limit adjustment from the Operator's Panel.

2. Valve testing from the Operator's Panel.

3. Speed signal selection from alternate independent sources.

4. Automatic instantaneous, and bumpless operating-mode selection from the Operator's Panel.

5. A continuous valve position monitor and contingency-alert function for the operator during automatic control.

6. A digital simulation and training feature which allows use of the Operator's Panel and most of the DEH system at any time on manual control, without affecting the turbine output or valve position. This powerful aid is used for operator and engineer training, simulation studies, control system tuning or adjustment, and for demonstration purposes.

In order to achieve these objectives, the CONTROL task is provided with analog inputs representing the various important quantities to be controlled, and also is supplied with contact inputs and system logical states.

Figure 54:
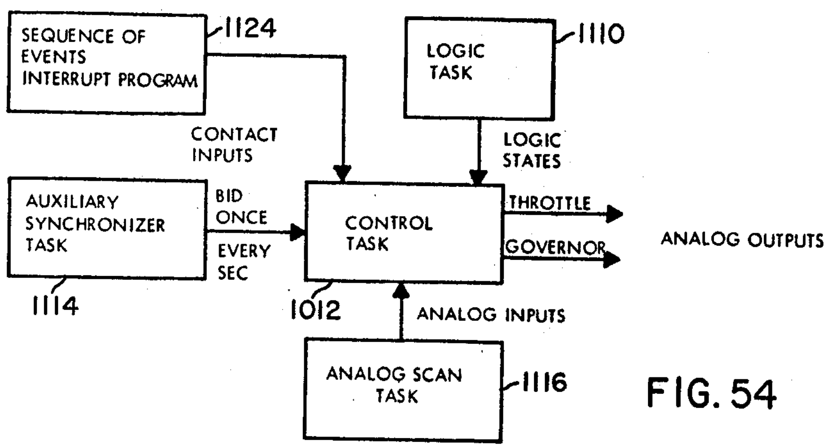
FIG. 54 is a block diagram showing a control task interface which is operable in accordance with the principles of the invention.
Figure 55:
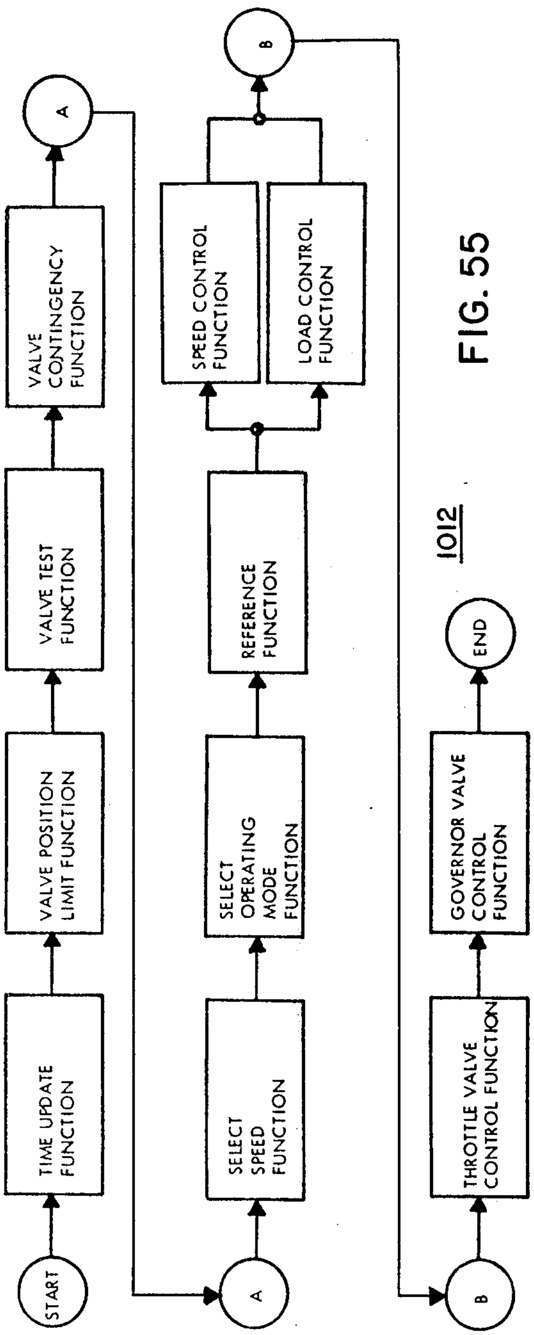
FIG. 55 is a block diagram showing a control program which is operable in accordance with the principles of the invention.

The control program 1012 and related programs are shown in greater detail in FIG. 54. In the computer program system, the control program 1012 is interconnected with the analog scan program 1116, the auxiliary sync program 1114, the sequence of events interrupt program 1124 and the logic task 1110. FIG. 55 shows a block diagram of the control program 1012. The control program 1012 accepts data from the analog scan program 1116, the sequence of events interrupt program 1124 and is controlled in certain respects by the logic program 1110 and the auxiliary synchronizing program 1114. The control program 1012, upon receiving appropriate inputs, computes the throttle valve TV1–TV4 and the governor valve GV1–GV8 outputs needed to satisfy speed or load demand.

The control program 1012 of the DEH control system 1100 functions, in the preferred embodiment, under three modes of DEH system control. The modes are manual, where the valves GV1–GV8 and TV1–TV4 are positioned manually through the hardwired control system and the DEH control computer tracks in preparation for an automatic mode of control. The second mode of control is the operator automatic mode, where the valves GV1–GV8 and TV1–TV4 are positioned automatically by the DEH computer in response to a demand signal entered from the keyboard 1130, of FIG. 18. The third mode of control is remote automatic mode, where the valves GV1–GV8 and TV1–TV4 are positioned automatically as in the operator automatic mode but use the automatic turbine startup program 1141 or an automatic synchronizer or an automatic dispatch system for setting the demand value.

VALVE POSITION LIMIT FUNCTION SUBROUTINE

Figure 56:
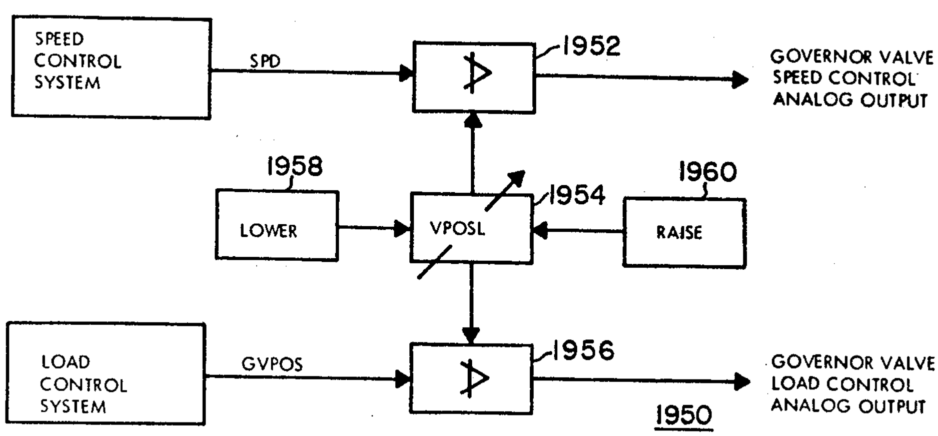
FIG. 56 is a block diagram showing a valve position limit function which is operable in accordance with the principles of the invention.
Figure 56A:
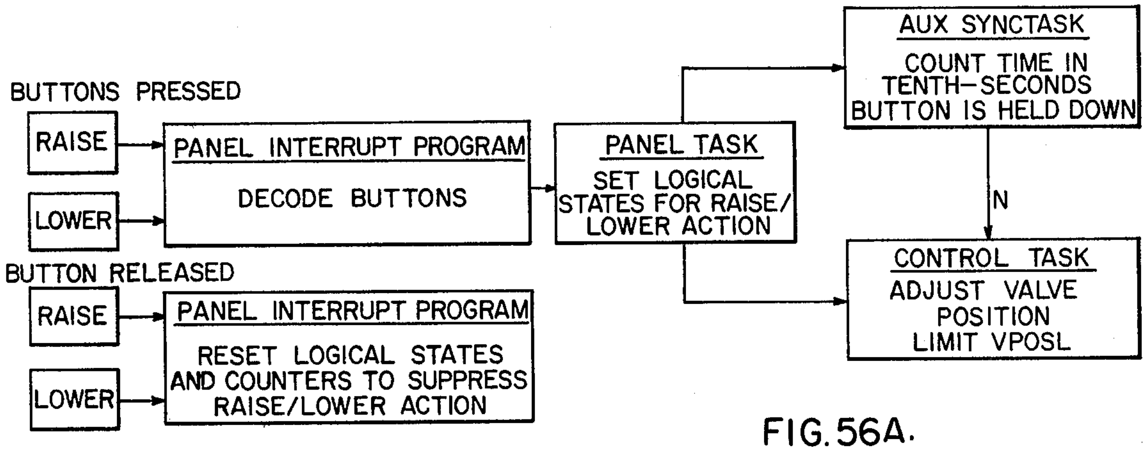

Referring now to FIGS. 56 and 56*a*, a block diagram of the valve position limit function subroutine 1950 is shown in detail. A speed control signal is limited by limit function 1952 which is controlled by the valve position limit function 1954 (VPOSL); similarly the governor valve speed signal (GVPOS) signal is limited by limiting function 1956. The valve position limit function 1954 may be raised by a raise function 1960 and lowered by a lower function 1958.

VALVE CONTINGENCY FUNCTION

A valve contingency function 1964 is shown in the flow chart of FIG. 58. In the automatic control mode, the valve contingency function subroutine 1964 continuously checks for discrepancies between the positions of the governor valves GV1 to GV8 called for by the DEH controller system 1100 and the actual valve positions sensed by a linear variable differential transformer LVDT of FIG. 4. If the discrepancy between the sensed and actual positions exceeds a predetermined value set on the keyboard 1860 of the operator's panel 1130, shown in FIG. 18, a valve status lamp 1966 warns the operator of this discrepancy situation. The valve contingency subroutine 1964 interfaces with the process and the operator through the analog scan program 1116 and the operator's panel 1130 of FIG. 8.

SPEED SELECTOR FUNCTION

When operating a steam turbine, the single most important variable which must be controlled is shaft speed. During load operation, speed regulation is necessary to help the power system maintain line frequency. During wide-range speed control, precise speed control is doubly important to bring the unit to synchronous speed and to overcome critical speed points at which excessive vibrations may cause a turbine trip. To accomplish such demanding control objectives, it is necessary to provide high-accuracy speed input signals to the control system so that exact valve position outputs may be computed by the speed controllers.

The DEH Control System has three independent speed signals available; these are used to achieve the precision required in speed control. The first of these (which is called the digital speed) is generated by a magnetic pickup, shaped and counted by specially-designed electronic printed circuitry, and passed on to the DEH Control System in the form of a digital numerical value. The second speed signal (which is called the analog speed) is generated by an identical independent magnetic pickup, processed in the analog packup circuitry for use there, and passed on to the DEH system as an analog input. The third speed signal (which is called the supervisory speed) is also generated by its own magnetic pickup, processed by supervisory instrumentation methods, and passed on to the DEH Control System as an analog input.

Referring now to FIG. 59, a block diagram of the DEH speed instrumentation and computation interface is shown. A digital counting and shaping circuit 2010 described in the copending Ruether application Ser. No. 412,513, referred to supra, generates the highly accurate digital signal. The digital shaping and counting circuitry 2010 includes a magnetic pickup, a shaping and counting circuit which passes the data to the DEH computer in the form of a digital numerical value. The second or analog speed signal is generated by high accuracy analog processing circuitry 2012. The third or supervisory signal is generated by analog supervisory instrumentation processing circuitry 2014 and transmitted to an analog to digital converter 2016 with the signal from the high grade analog processing circuitry 2012.

The speed selection function determines which of these available speed inputs should be used in the DEH Control System. If the speed selection process concludes that the digital speed is reliable, then under all circumstances it is used as the controlling speed signal because it is the most accurate. If the selection process concludes that the digital speed is unreliable, the analog speed is used as the controlling speed signal since it is of acceptable accuracy. If neither the digital nor the analog speed signal is reliable, the speed selection function must disable the speed feedback control loop, because the supervisory speed is not of acceptable accuracy for controlling turbine speed response.

Although the supervisory speed is unacceptable for control requirements, it performs a valuable role in helping to determine which of the two speeds, digital or analog, is to be used in the DEH system. The speed selection accomplishes this by using a two-out-of-three logical error detection process to deduce the status of the digital and the analog speed signals. If either becomes unreliable, logical states are set which will turn on appropriate monitor lamps on the Operator A Panel. In addition, if a switch is made from the digital to the analog speed signal, or vice versa, while on load control, appropriate bumpless transfers are made with respect to the turbine reference and valve position outputs.

If both the digital and the analog speeds become unreliable, the speed selection function makes a more serious decision as to what control action to take. Thus, if the turbine is on wide-range speed operation, the DEH system must transfer to manual control and stop all speed control computations; this is necessary because the speed feedback information is unreliable. However, if the turbine is on load control, the DEH system simply opens the speed feedback loop bumplessly and continues on automatic control. This is acceptable because the speed feedback is simply a trim factor during load operation.

In the digital speed circuitry there are actually two numerical outputs, each of which is accurate in certain ranges. The quantity ICOURSE is a low-range course value which is appropriate from 0 to about 1600 rpm, while the quantity of IFINE is a high-range vernier value which is appropriate from about 1600 to 4500 rpm. Thus, the speed selection function must determine which of these values to use in its two-out-of-three comparison with the remaining speed signals. The final result of the speed selection process is the value WS which is used by all other programs in the DEH system.

The digital signal from the digital shaping and counting circuitry 2010 passes through a speed channel interrupt 2018 to a speed channel decoding program 2020 as shown in FIG. 59. In this speed counting program 2020 an output quantity designated ICOURSE is the low range course value used from about 0 to 1600 rpm, while the IFINE quantity is the high range fine value used between about 1600 to 4500 rpm.

An analog to digital converter 2016 makes both the high precision analog signals from the analog processing circuitry 2012 and the supervisory circuitry 2014 available to the analog scan program 1116 which in turn provides the represented speed values available to the speed selection program 2022. The speed selection program 2022 compares the digital speed value and the high grade analog speed value with the supervisory analog speed value in order to determine whether both the digital value and the high grade analog value are accurate or whether there is any discrepancy between the two. The supervisory speed value is generally not accurate enough for speed control. Therefore, the speed selection program 2022 makes use of the supervisory speed value to determine which of the high grade speed values is accurate if they are not equal.

The digital speed value from the digital shaping and counting circuitry 2010 is used as the reference WS at 1076 if it is found to be accurate enough for control purposes. The high grade analog speed value from the analog processing circuitry 2012 is utilized if the digital speed value is not accurate enough for control purposes. If either of the high grade signals becomes unreliable, appropriate monitor lamps on the control panel 1130 alert an operator to this fact.

If both the high grade analog and the high grade digital speed values become unreliable and if the DEH system 1100 is on wide range speed control then a transfer takes place to the manual mode of control. However, if the turbine system 10 is on load control, the DEH system 1100 opens the speed feedback loop bumplessly and continues on automatic control with the remaining feedback loops intact.

SELECT OPERATING MODE FUNCTION

Input demand values of speed, load, rate of change of speed, and rate of change of load are fed to the DEH control system 1100 from various sources and transferred bumplessly from one source to another. Each of these sources has its own independent mode of operation and provides a demand or rate signal to the control program 1020. The control task 1020 responds to the input demand signals and generates outputs which ultimately move the throttle valves TV1 through TV4 and/or the governor valves GV1 through GB8.

With the breaker 17 open and the turbine 10 in speed control, the following modes of operation may be selected:

1. Automatic synchronizer mode—pulse type contact input for adjusting the turbine speed reference and speed demand and moving the turbine 10 to synchronizing speed and phase.

2. Automatic turbine startup program mode—provides turbine speed demand and rate.

3. Operator automatic mode—speed, demand and rate of change of speed entered from the keyboard 1860 on the operator's panel 1130 shown in FIG. 18.

4. Maintenance test mode—speed demand and rate of change of speed are entered by an operator from the keyboard 1860 on the operator's control panel 1130 of FIG. 18 while the DEH system 1100 is being used as a simulator or trainer.

5. Manual tracking mode—the speed demand and rate of change of speed are internally computed by the DEH system 1100 and set to track the manual analog back-up system 1016 as shown in FIG. 6 in preparation for a bumpless transfer to the operator automatic mode of control.

With the breaker 17 closed and the turbine 10 in the level mode control, the following modes of operation may be selected:

1. Throttle pressure limiting mode—a contingent mode in which the turbine load reference is run back or decreased at a predetermined rate to a predetermined minimum value as long as a predetermined condition exists.

2. Run-back mode—a contingency mode in which the load reference is run back or decreased at a predetermined rate as long as a predetermined condition exists.

3. Automatic dispatch system mode—pulse type contact inputs are supplied from an automatic dispatch system to adjust turbine load reference and demand when the automatic dispatch system button 1870 on the operator's panel 1130 is depressed.

4. Operator automatic mode—the load demand and the load rate are entered from the keyboard 1830 on the control panel 1130 in FIG. 18.

5. Maintenance test mode—load demand and load rate are entered from the keyboard 1860 of the control panel 1130 in FIG. 18 while the DEH system 1100 is being used as a simulator or trainer.

6. Manual tracking mode—the load demand and rate are internally computed by the DEH system 1100 and set to track the manual analog back-up system 1016 preparatory to a bumpless transfer to the operator automatic mode of control.

The select operating mode function responds immediately to turbine demand and rate inputs from the appropriate source as described above. This program determines which operating mode is currently in control by performing various logical and numerical decisions, and then retrieves from selected storage locations the correct values for demand and rate. These are then passed on to the succeeding DEH control programs for further processing and ultimate positioning of the valves. The select operating mode function also accommodates switching between operating modes, accepting new inputs and adapting the DEH system to the new state in a bumpless transfer of control.

Various contact inputs are required for raise and lower pulses, manual operation, maintenance test, and so forth; these are handled by the SEQUENCE OF EVENTS interrupt program and the PLANTCCI subroutine, which performs a contact input scan. In addition, certain panel pushbuttons affect the operating mode selection; these are handled by the PANEL INTERRUPT program and the PANEL task, which decode and classify the pushbuttons pressed. The LOGIC task then checks all permissive conditions and current control system status, and computes the appropriate logical states for interpretation by the CONTROL task and the SELECT OPERATING MODE program.

Referring now to FIG. 61, a block diagram is shown illustrating the select operating mode function 2050. Contact inputs from plant wiring 1126 activate the sequence of events interrupt program 1124 which calls the plant contact input subroutine 1150, to scan the plant wiring 1126 for contact inputs. Mode pushbuttons such as automatic turbine startup 1141, automatic dispatch system 1170 and automatic synchronizer 1871 activate the panel interrupt program 1156 which calls the panel program 1112 for classification and which in turn calls upon the logic program 1110 to compute the logic states involved. The logic program 1110 calls the control program 1020 to select the operating mode in that program.

Figure 61A:
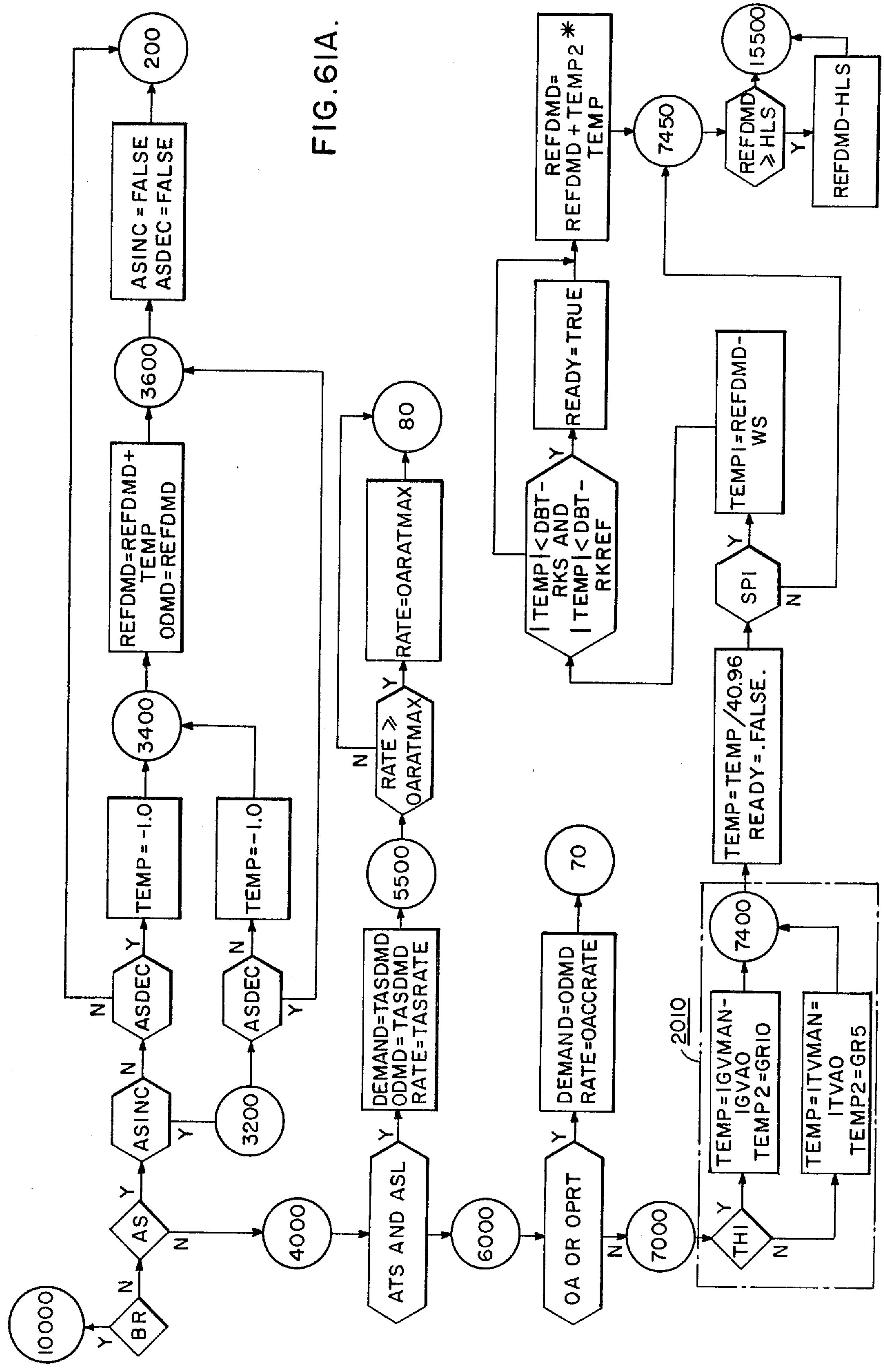
Figure 61B:
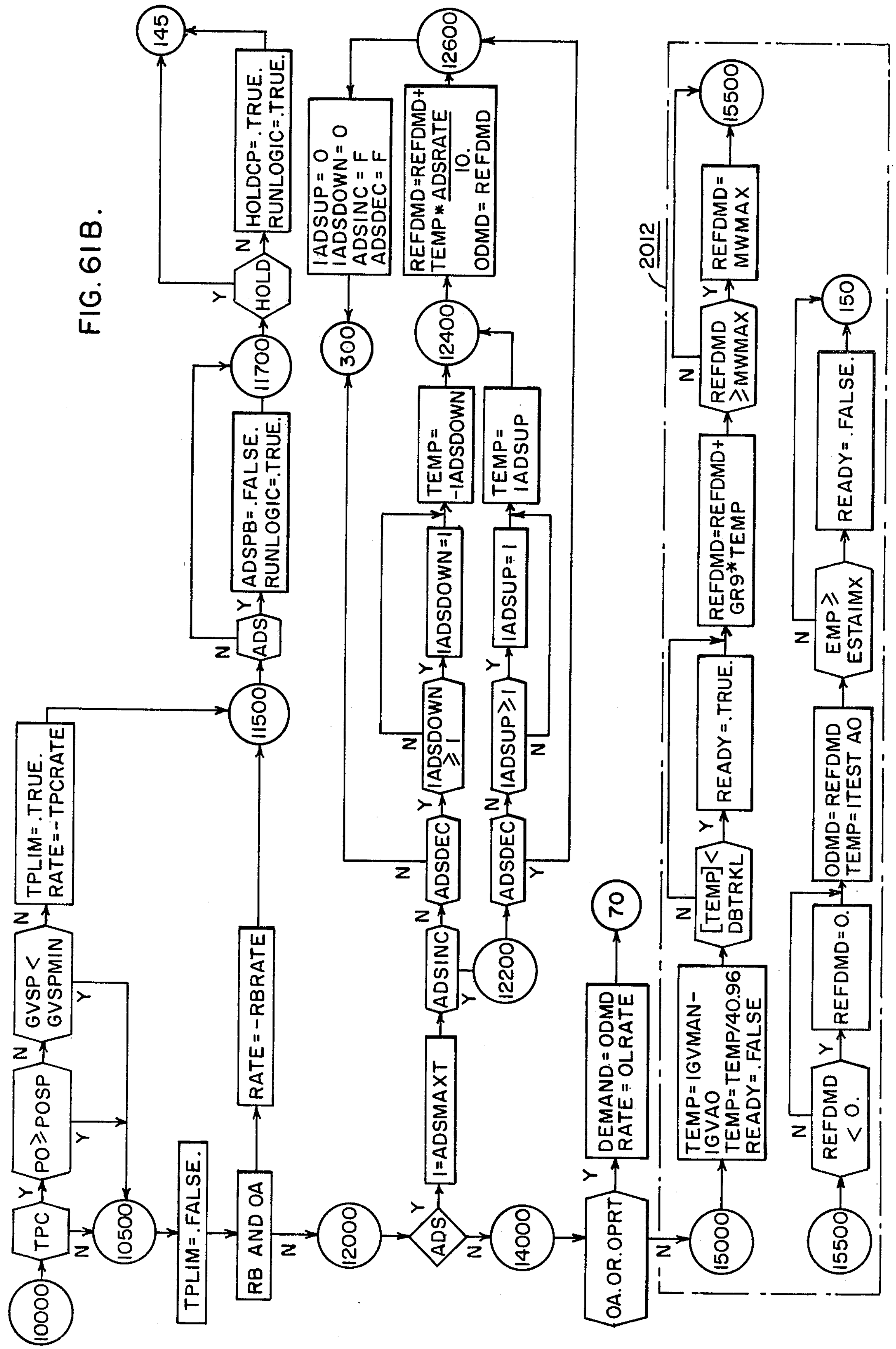

In FIGS. 61A and 61B a flow chart of the select operating mode logic is shown. As one example of mode selection referring to a path 2023, after a statement 7000, provisions are made for a bumpless transfer from an automatic or test mode to an operator mode. The bumpless transfer is accomplished by comparing the computer outputs and the operator mode output signals for the governor valve GV1-GV4 positions. The DEH system 1110 inhibits any transfer until the error between the transferring output and the output transferred is within a predetermined deadband (DBTRKS). Bumpless transfer is accomplished by the DEH control system 1100 by comparing output from one mode of control of the governor valves GV and the throttle valves TV and the same output from another output mode controlling the same parameters. The flow chart of FIGS. 61A and 61B shows mode selection for a complete system. In a hardwired or analog control system, the analog parameter output, to be transferred to must continuously track the parameter output to be transferred from. This tracking method is expensive and cumbersome since it has to be done continuously and requires complex hardware. However, in a digital system, such as the DEH control system 1100, the equating of the two parameter outputs need be performed only on transfer. Therefore, great economy of operation is achieved.

SPEED/LOAD REFERENCE FUNCTION

In the DEH turbine controller, the speed/load reference is the central and most important variable in the entire control system. The reference serves as the junction or meeting place between the turbine speed or load demand, selected from any of the various operating modes discussed in the last section, and the Speed or Load Control System, which directs the reference through appropriate control system strategy to the turbine throttle and governor valves to supply the requested demand. FIG. 62 is a diagram which indicates the central importance of the reference in the DEH control system.

The speed/load reference function increments the internal turbine reference at the selected rate to meet the selected demand. This function is most useful when the turbine is on Operator Automatic, on the AUTOMATIC TURBINE STARTUP program, or in the Simulator/Trainer modes. This is because each of these control modes requests unique rates of change of the reference, while the remaining control modes, such as the Automatic Synchronizer and the Automatic Dispatch System, move the reference in pulses or short bursts which are carried out in one step. The Runback and Throttle Pressure contingency modes use some of the features of the reference function, but they bypass much of the subtle reference logic in their hurry to unload the turbine.

For these modes which request movement of the reference at a unique rate, the reference function must provide the controlled motion. Not only must the rate be ramped exactly, but the logic must be such that, at the correct time, the reference must be made exactly equal to the demand, with no overshoot or undershoot. In addition, the reference logic must be sensitive to the GO and HOLD states, and must start or stop movement instantly if requested to do so. Finally, the reference system must turn off the GO and HOLD lamps, if conditions dictate, by passing on to the LOGIC task the proper status information to accomplish this important visual indication feature.

FIG. 63 is a plot of the reference as it moves to meet a given demand, both in the increasing and decreasing direction. The slope of the reference curve is the rate selected by the controlling mode. A key point in the reference system is the detection of the instant in time when the reference is within one increment of the demand; this increment is the step size associated with the selected rate, taken each second by the CONTROL task whose sampling interval is once a second. For example, an acceleration rate of 120 rpm per min yields an incremental speed step size of 2 rpm each sec, while a load rate of 30 MW per min yields an incremental load step size of 0.5 MW each sec. Thus when the reference approaches to within this step size of the demand, then the reference system immediately sets the internal reference to the demand. This condition is indicated by the step jumps at the 12-sec and the 21-sec points in time on the graph of FIG. 63. Special logical and numerical decisions are required to detect these points.

The decision breaker function 1060, of FIG. 7, is identical to the speed/load reference function 1060, of FIG. 62. A software speed control subsystem 2092 of FIG. 62, corresponds to the compare function 1062, the speed reference 1066 and the proportional plus reset controller function 1068, of FIG. 7. The software load control subsystem 1094, of FIG. 62, corresponds to the rated speed reference 1074, the turbine speed 1076, the compare function 1078, the proportional controller 1080, the summing function 1972, the compare function 1082, the proportional plus reset controller function 1084, the multiplication function 1086, the compare function 1090, the impulse pressure transducer 1088 and the proportional plus reset controller 1092, of FIG. 7. The speed/load reference 1060 is controlled by, depending upon the mode, and automatic synchronizer 1080, the automatic turbine starter program 1141, and operator automatic mode 1082, a manual tracking mode 2084, a simulator/trainer 2086, an automatic dispatch system 2088, or a run-back contingency load 2090. Each of these modes increments the speed/load reference function 1060 at a selected rate to meet a selected demand. A typical demand/reference rate is shown in FIG. 63 drawn as a function of time.

SPEED CONTROL FUNCTION

The speed control function positions the throttle and governor valves to achieve the existing speed reference with optimum dynamic and steady state response. This is accomplished by using individual proportional-plus-reset controllers for throttle and governor valve speed control, as shown in FIG. 64. The speed error between the turbine speed reference and actual speed drives the appropriate controller, which then reacts by positioning the proper valves to reduce the speed error to zero. The speed controller outputs are low-limit checked against zero and high-limit checked against the quantity HLS, which is a keyboard-entered constant set at 4200 rpm. This prevents the controllers from reaching a reset-windup condition which may inadvertently occur in odd circumstances. The speed controller output is then suitably ranged from 0 to 100 percent and sent downstream as the quantity SPD in the CONTROL task to the THROTTLE and GOVERNOR VALVE programs.

LOAD CONTROL FUNCTION

The load control function positions the governor valves to achieve the existing load reference with optimum dynamic and steady state response. This is accomplished with a feedforward-feedback control system strategy designed to stabilize interactions between the major turbine-generator variables: impulse chamber pressure, megawatts, shaft speed and valve position. FIGS. 65 and 65A show the control system which satisfies these objectives.

The main feedforward path is represented by the turbine load reference value (REFDMD), which is computed by the operating mode selection function described earlier. The feedforward variable (REFDMD) is compensated with two feedback trim factors to account for frequency (speed) participation and megawatt mismatch. The speed compensation is provided by a proportional feedback loop in which the droop regulation gain (GR1) is adjusted to yield rated megawatts correction for a 180 rpm speer error. This speed feedback factor (X) is then summed with the turbine load reference (REFDMD) to produce the speed-corrected load reference (REF1).

A special feature which has been incorporated in the speed feedback loop is a software speed-deadband; this non-linear function filters out high-frequency low-amplitude noise on the speed input signal, thus keeping the load control system from responding to such meaningless information. The width of the speed deadband may be adjusted from the keyboard by setting the appropriate value into the constant SPDB. Another special feature of the speed deadband is the method of implementing this function in comparison with most standard control systems. The common way to incorporate the speed deadband in previous systems is to allow speed errors greater than the width of the deadband to enter the control system completely. This has been found to shock many systems into oscillatory conditions which may have undesirable effects. In the DEH Control System the speed error, when it is larger than the deadband, is smoothly entered into the speed compensation factor by a linear relationship. Thus the shock effect of a sudden speed error is removed completely.

The megawatt feedback loop provides a trim correction signal which is applied to the speed-compensated load reference (REF1) in a product form to yield the speed-and-megawatt corrected load reference (REF2). An additional highly desirable feature of megawatt feedback in the DEH system is that with it the reference and demand display windows on the Operator's Panel are calibrated in actual megawatts when the loop is in service. A proportional-plus-reset controller is used to reduce megawatt error to zero, with the loop providing a feedback factor (Y) which floats around unity (1.9) in performing its corrective action. As usual, high and low limits are provided to prevent reset windup and to bound the range of megawatt compensation.

The load reference (REF2), now corrected for speed and megawatt errors, becomes the set point for the impulse pressure cascade feedback loop or the direct demand for valve position, depending on whether the impulse pressure loop is in or out of service. REF2 is multiplied by a ranging gain (GR3) to convert to impulse pressure set point (PISP) in psi. If the loop is in service, then a proportional-plus-reset controller is implemented to drive the impulse pressure error to zero; as always, high and low limits restrict the range of variation of the controller to eliminate the possibility of reset windup. The final governor valve set point (VSP), whether it is generated by the feedback loop or directly from the load reference (REF2), is then converted into a percent valve demand (GVSP) by suitable ranging and is sent downstream in the control task to the THROTTLE and GOVERNOR VALVE programs.

The load control function block diagram shown in FIGS. 65 and 65A is an expansion of the load control, shown in FIG. 7, incorporating the speed loop subroutine and proportional control of function diagram of FIG. 13.

THROTTLE VALVE CONTROL FUNCTION

The throttle valve control function (FIG. 66) computes the correct value of the throttle valve analog output at all times. When the DEH system is on automatic control, this analog output actually positions the throttle valves; when the DEH system is on manual control, this analog output tracks the backup system preparatory to transfer to automatic control.

To accomplish its objective, the throttle valve control function must interrogate various turbine logical and numerical states, and proceed to act on the outcome of these decisions. There are five distinct situations which must be detected by these logical and numerical interrogations. A brief description of these follow; refer to Figure for the method of performing these tests and the major actions taken.

1. The turbine is unlatched and in neither throttle nor governor valve control. During this time the throttle valves are held closed by the throttle valve control function.

2. The turbine is latched and in positive throttle valve control while the DEH system is in wide-range speed control. During this time the throttle valve control function accepts the output of the speed controller (SPD) and positions the throttle valves accordingly.

3. The DEH system is in a transition period, transferring from throttle to governor valves during wide-range speed control. For this interval of time, the throttle valves are still in positive control and the throttle valve control function continues to accept the speed controller output (SPD) and positions the throttle valves accordingly.

4. The DEH system remains in the transition period of transferring from throttle to governor valve control, but now the governor valves are in positive control. During this time the throttle valve control function drives the throttle valves to the wide-open position with a throttle valve bias integrator (TVBIAS), which has a constant input (BTVO) incrementing the integrator.

5. The transition period is over and the transfer from throttle to governor valve control is complete; the turbine is now on either wide-range speed control or on load control after having been synchronized with the power system. During this time the throttle valve control function keeps the throttle valves wide open.

GOVERNOR VALVE CONTROL FUNCTION

The governor valve control function (FIG. 67) computes the correct value for the governor valve analog output at all times. When the DEH system is on automatic control, this analog output actually positions the governor valves; when the DEH system is on manual ontrol, this analog output tracks the backup system preparatory to transfer to automatic control.

To accomplish its objective, the governor valve control function must interrogate various turbine logical states and proceed to act on the outcome of these decisions. There are five distinct situations which must be detected by these logical interrogations. A brief description of these follows; refer to Figure for the method of performing these tests and the major action taken.

1. The turbine is unlatched and in neither throttle nor governor control. During this time the governor valves are held closed by the governor valve control function.

2. The turbine is latched and in positive throttle valve control while the DEH system is in wide-range speed control. During this time the governor valve control function drives the governor valves wide open with a governor valve bias integrator (GVBIAS).

3. The DEH system is in a transition period, transferring from throttle valve to governor valve control during wide-range speed operation. For this interval of time, the governor valve control function drives the governor valves to the closed position with the governor valve bias integrator (GVBIAS). The governor valve control function then waits for a decrease in turbine speed and for the Analog Backup System to track the computer outputs.

4. The DEH system remains in the transition period but now the governor valves are in positive control during wide-range speed operation. During this time the governor valve control function accepts the output of the speed controller (SPD) and positions the governor valves accordingly.

5. The main generator circuit breaker is closed and the DEH system is in load control. During this time the governor valve control function accepts the output of the load control system (GVSP) and positions the governor valves accordingly.

TURBINE OPERATION SIMULATION

In order to allow operators to become proficient in the operation of the DEH system 1100 without risking damage to a multimillion dollar turbine-generator system 10 a simulation subroutine 2110, in FIG. 64, is provided during speed control. A similar subroutine 2111 (FIG. 65) is provided for simulation of the turbine-generator system dynamics during load control.

BUMPLESS TRANSFER

A flow chart path (FIG. 67) allows for the smooth and bumpless transfer from governor valve control to throttle valve control and vice versa. A function 2102 tests whether a governor valve bias integrator GVBIAS has reached zero. By forcing the DEH system 1100 to wait until the governor valve bias integrator GVBIAS has reached zero a bumpless transfer from governor to throttle valve control and vice versa is effectuated. Other bumpless transfer features are considered elsewhere herein.

18. DEH DATALINK

A DEH DATALINK shown in FIG. 8 allows the DEH control system 1100 to communicate with other computers such as a plant computer. In the preferred embodiment, the communication is initiated by the other computer, the plant computer. The DEH DATALINK waits for requests to send or receive information.

In the operation of the DEH DATALILNK any core location can be interrogated and numerous setpoint values can be changed. The format of the DATALINK is such that information as to a starting address in the memory 214, and a code indicating the number of words to be interrogated or changed. The following eight-bit control words are used for DATALINK transmission and reception.

| CONTROL-WORD SYMBOL | 8-BIT PATTERN | HEXA-DEC-IMAL AQUIV-ALENT | Meaning |
|---|---|---|---|
| DAT | $0011\ 1010_2$ | $3A_{16}$ | DATA Transmission-Mode |
| SPT | $00111011_2$ | $3B_{16}$ | SETPOINT-Transmission Mode |
| ACK | $00000110_2$ | $06_{16}$ | ACKNOWLEDGE-Word |
| NAK | $10010101_2$ | $G5_{16}$ | NOT ACKNOWLEDGE-Work |
| ENQ | $00000101_2$ | $05_{16}$ | ENQUIRY to DEH |
| ETX | $00000011_2$ | $03_{16}$ | END of Message |
| STX | $10000010_2$ | $82_{16}$ | ANSWER from DEH |
| CSF | $10010110_2$ | $96_{16}$ | CHECKSUM Failure |
| SAF | $10010111_2$ | $97_{16}$ | SETPOINT ADDRESS Failure |
| SVF | $10011000_2$ | $98_{16}$ | SETPOINT VALUE Failure |

For an absolute starting address in core to transmission words are used indicating the number of transmission words in one transmission. In the sequencing charts 8-bit numbers are represented by the following symbols:

ADD:First half of absolute core address

REF:Second half of absolute core address

WDS:Number of transmission words

W1, W2, . . . :Transmitted information

LIC:Checksum

The checksum is the binary sum of all 8-bit numbers of a data transmission with any remainder truncated. The hardware for the DEH DATALINK is operated asynchronously. A message can be transmitted at any time from the plant computer. The interrupt program 1124 is provided so that the plant computer can be serviced immediately.

FIG. 76a shows a DATALINK between two computers. A modem 2510 transmission system, available through the Bell Telephone Company, is shown for data transmission. The sequence of events interrupt program 1124 directs the computer 210 to execute one or more instructions in a sequence thereby interrupting any program running in the computer 210. When the interrupt program 1124 has finished, the computer 210 returns to complete the program which it was previously executing.

A DATALINK task shuttles any received data words into an input buffer in the memory 214 and thereby through the action of the central processor 212 generates the checksum which is compared with a received checksum. The data from the DEH system is transmitted and a checksum calculated at both the plant computer and the DEH computer 210. If a mistake is found an alarm interrupt is generated and a control word indicating an error is sent back and no further action is taken. The plant computer or requesting computer must then send the same message again for a second reply. If the interrupt program receives a proper message request, a DEH DATALINK task is energized again. A complete program of the DATALINK system is to be found in the appendices.

G. ANALOG BACKUP SYSTEM

The analog backup portion of the DEH Control System provides a second means, independent of the digital portion, of controlling the turbine valves. In the event of a failure in the digital portion, or during certain maintenance modes of operation, the Analog Backup System generates the signals necessary to control the valves, and thus the turbine.

While the digital portion of the control system is in service and in control of the turbine (the Operator Automatic mode), the analog system tracks the digital control signals. If the digital portion fails, or manual operation is selected, the DEH Control System transfers to the Analog Backup System without a change in valve positon (bumpless transfer). When the analog portion is supplying the control signals (the Turbine Manual mode), the operator controls valve position using the "manual" pushbuttons on the Operator B Panel.

In addition to tracking and positioning capabilities, the Analog Backup System provides protection circuits. This protection capability is used during contingency conditions, and duplicates similar protection circuits. This protection capability is used during contingency conditions, and duplicates similar protection provided by the digital portion of the DEH Control System. Thus, the operator is provided with an effective means of operating the turbine during a contingency condition or during maintenance or testing of the system.

Modes Of Operation

In the Turbine Manual mode of operation, the operator controls the turbine using the Analog Backup System. The mode of operation (Operator Automatic or Turbine Manual) of the DEH ControlSystem is determined by the state of a flip-flop (the Turbine Manual flip-flop). When this flip-flop is reset, the Analog Backup System is controlling the turbine (Turbine Manual mode). When the Turbine Manual flip-flop is set, the Digital Controller is controlling the turbine (Operator Automatic mode) and the Analog Backup System is tracking the Digital System.

If the Analog Backup System is in control, the operator must press the OPER AUTO button on the Operator B Panel to transfer to the Operator Automatic mode of operation (flip-flop is set). At the same time, however, a permissive generated by the digital portion must be maintained. If an internal failure in the digital portion causes the permissive to be absent, the DEH Control System remains in Turbine Manual even if the OPER AUTO button is pressed.

The Turbine Manual flip-flop can be reset (the DEH Control System goes from the Operator Automatic to the Turbine Manual mode) in several ways. If the operator presses the TURBINE MANUAL button on the Operator B Panel, the DEH Control System is placed in the Turbine Manual mode. Also, a contact closure generated by the digital portion (indicating a failure in the digital portion) causes the system to be placed in the Turbine Manual mode. In the event of a power supply failure in the digital portion, a contact closure is generated which resets the Turbine Manual flip-flop (Turbine Manual mode).

H. AUTOMATIC TURBINE STARTUP PROGRAMS—FUNCTIONAL DESCRIPTION

AUTOMATIC TURBINE STARTUP PROGRAM FOR FOSSIL UNITS

A digital computer is a powerful tool for achieving a better and more efficient control of a turbo-generator unit. To take advantage of the computer's ability to scan, memorize, calculate, make decisions and take executive actions, the computer program should go further than the operating instructions, normally provided with each turbine, by scanning additional parameters if necessary, determining the trends in the parameter changes and performing computations beyond the capacity and duties of a human operator.

The general objective of the starting and load changing recommendatios is the protection of the turbine parts against thermal-fatigue cracking caused by internal temperature variations. In the large turbines of present design the critical element is the H.P. rotor due to its relatively large diameters and high number of temperature variations at the first stage zone produced during startups and load changes. The operating procedures provided with each turbine, in the form of charts, assume that the machine is normally passing from one steady state to another, during a transient period, and the transition between the two selected states should be performed in a determined time to keep the thermal stresses below the allowable limit.

With the help of the computer, the thermal stresses in the rotor can be calculated minute by minute based on the actual temperature at the first stage provided by a thermocouple. The assumption that the turbine was in a steady state condition is not necessary. Once the thermal stress (or strain) is calculated, it can be compared with the allowable value, and the difference used as the index of the permissible first stage temperature variation, translated in the computer program as a variation of speed or load or rate of speed or load change.

Using the memory of the computer, values of some parameters can be stored for use in the estimation of their future values or rate of change, which in turn are used to take corrective measures before alarm or trip points are reached. Such is the case with metal temperature differentials and differential expansions.

Bearing vibration is another of the parameters for which the computer capacity is used in making logical decisions. Each bearing is under close supervision and when one of the vibrations reaches an alarm limit, its behaviour is studied and a decision is made according to the estimated future value of the vibrations, and whether it is an increasing, steady or decreasing function. A priority system is also inserted due to the possibility that two or more bearings may be in a different stage of alarm.

Under the approach used in the program, the rotor stress (or strain) calculations, sub-program P#01, and its decision-making counterpart, sub-program P#04, are the main controlling sections. They will allow the unit to roll with relatively high acceleration until the anticipated value of strain or other controlling parameters predict that limiting values are to be reached in the near future. Then a lower rate is selected and, if the condition persists, a speed hold is generated.

The following describes the Automatic Turbine Start-Up Program (ATS) in the DEH-P2000 Controller. The ATS program employs general concepts including the rotor stress control concepts described in the aforementioned Berry patent. In providing automatic control and monitoring, the ATS provides improvements over the Berry patent and earlier control systems in which digital computers have been used to provide supervisory startup control over analog EH controls.

The ATS Program is stored and executed in the same Central Processing Unit (CPU) as the basic DEH programs. Both programs work directly together by means of shared core locations. They also share the same input/output hardware and software, which is needed to communicate with the outside world, i.e., to read and operate contacts. The ATS Program is capable of rolling the turbine from turning gear to synchronous speed and application of initial load. It will check the pre-roll conditions, determine if a soak period is required, transfer from throttle valve (TV) to governor valve (GV) operation, check the presynchronizing conditions and allow the automatic synchronizer to put the unit on line or otherwise allow synchronization to occur, i.e. under accurate speed loop control.

During the operation of the turbine, whether during the acceleration period or under load, the computer will monitor the various parameters of the turbine, compare their values with limit values and print messages to inform the operator about the conditions of the machine to guide him in the operation of the unit.

The modes of operation are ATS Control and ATS Supervision. If both the "turbine auto-start" and the "turbine supervision off" pushbuttons are not backlighted the ATS Program is in ATS Supervision and messages are printed out. Pressing the "turbine auto-start" button brings the ATS Program into ATS Control. Pressing the "turbine supervision off" button stops the messages from being printed out while the ATS Programs are still running. If the "turbine supervision off" button is pushed a second time, all current alarm messages and all subsequent messages are printed The computer performs the following evaluations and control actions:

(a) Every minute prior to rolling off turning gear, the program checks and compares with allowable limits, the following parameters: Throttle temperature, differential expansions, metal temperature differentials, vacuum, exhaust temperatures, eccentricity, bearing metal temperatures, drain valve positions.

(b) Requests a change in throttle steam conditions to match inpulse chamber steam temperature to metal temperature within −100° and +200° F.

(c) Allows the turbine to roll off turning gear.

(d) Sets the target speed and selects the acceleration in the DEH controller.

(e) Determines the heat soak time at 2200 RPM and counts it down.

(f) Accelerates the turbine to 3300 RPM at controlled rates.

(g) Commands the DEH controller to transfer from throttle to governor control.

(h) Accelerates the turbine to synchronous speed.

(i) Allows the Automatic Synchronizer and DEH Controller to put the turbine on the line and apply minimum load.

(j) Calls for a "Load hold" at initial load if required by the thermal conditions of the turbine.

Under ATS Supervision, the function of the computer is limited to monitoring the various parameters and generating appropriate messages to assist the operator in the control of the turbine. The strain calculation is continuously performed to advise the operator about the thermal condition of the rotor. It is the operator's responsibility to match steam and metal temperatures, set demands, select rates of speed and load changes, determine the heat soak requirements and take all the necessary sequential steps to bring the turbine up to speed and load it.

All programs are called periodically and will run to completion unless preempted by a higher priority program. Program P15 determines the appropriate action to be performed in a sequential operational order. Programs P01 through P14 check the turbine and generator parameters. They compute rotor temperatures and strain at impulse chamber zone; they calcualte anticipated metal temperature differentials and differential expansions. Depending on the mode of operation these programs generate new DEH demands or holds.

PROGRAM LIST

P01 Determination of rotor thermal conditions.
P02 Periodic computation and supervision of anticipated steam chest wall, bolt flange temperature differentials and differential expansion.
P03 Supervision of turning gear operation.
P04 Control of rotor stress at first stage.
P05 Supervision of eccentricity and vibration.
P06 Turbine metal temperature supervision.
P07 Control of EH speed reference.
P08 Supervision of bearing temperatures.
P09 Supervision of generator.
P10 Supervision of gland seal, turbine exhaust and condenser vacuum conditions.
P11 Supervision of drain valves and computation in of anticipated differential expansion.
P12 Supervision of LP exhaust tempertures.
P13 Sensor failure action.
P14 Computation and timing of heat soak time.
P15 Acceleration sequence.

In order to improve the performance of a turbine 10 at startup and thereby decrease startup time and allow the turbine 10 to go to line at the earliest possible moment without undesired adverse effect on turbine life, the DEH system 1100 includes an automatic startup program. The automatic turbine startup and monitoring programs 1140, 1141, 1142 monitor large numbers of analog signals representing various turbine parameters including bearing, coolant, steam temperature, bearing vibration, speed valve phases, and others included in the input/output signal list in Appendix 5. In addition, the automatic startup programs 1140, 1141, 1142 calculate complex heat distribution equations which describe temperature variations in critical metal parts of the steam turbine 10 as generally considered in the aforementioned Berry patent. The automatic turbine startup program 1141 types out the variables and associated warnings through ATS periodic program 1140, ATS conversion routine 1142 and the message writer 1144 on the logging typewriter 1146.

The ATs automatic startup program 1141 is able to control the speed of the turbine generator 10 to well within a maximum deviation of 1 rpm over tens of minutes. Because of the extreme accuracy with which the ATS program 1141 can hold the speed of the turbine generator 10, a prefrred method for synchronization in the present embodiment is the use of manual synchronization of the generator 16 to the line. The automatic dispatch system as shown in FIG. 49 sends signals to the ATS program 1141 thereby allowing the ATS program to hold the speed of the turbine generator system 10 to well within 1 rpm. By the use of simple lamps to indicate the differential phase between the generator 16 and the line an operator is conveniently able to manually synchronize the system.

A more common approach, in the prior art, is the use of conventional automatic synchronizer equipment. However, because of the high degree of accuracy which the ATS program 1141 controls the turbine generator 10 the present system is easily synchronized without conventional automatic synchronizer equipment.

PROGRAM P01

DETERMINATION OF THE ROTOR THERMAL CONDITIONS

This program runs periodically to calculate and update the temperature of the H.P. rotor at the first stage zone, based on the temperature of its environment. Heat Transfer coefficient, rotor temperatures, temperature differentials, and rotor strain are calculated. The results are invalid if the rotor temperature has not been calculated continuously for at least 2 hours i.e. if the program was not running or the revelant sensor not in service. Then the ATS control mode cannot be entered, only STS Supervision is possible.

Program Sequence

If the analog signal to frequency (A/F) converter is out of service the rotor stress program is initialized with the actual first stage metal temperature.

If it did not run one cycle the variable values used in the program to start the calculations would be misleading.

If the unit is on turning gear (TG) the "HEAT SOAK COMPLETE" indicator is cleared to allow the calculation and timing of heat soak to be initiated.

The HP first stage metal and IP metal temperatures before opening the valves (bov) to be used in the heat soak calculation program are set equal to the present metal temperatures, this being an updating process that occurs only when the unit is on TG. Until the unit has been synchronized these temperatures are not changed since the heat soak calculation is based only on initial metal temperature values.

If the unit is not on TG, the variable N used to calculate the heat transfer coefficient is set equal to actual speed, otherwise it will be N=0.

The first stage metal temperature will determine if the turbine will go through a cold or hot start procedure. Rotor strain limits as well as rotor (surface-volume average) temperature are chosen based on the above temperature.

The heat transfer coefficient H will be computed as a function of speed reaching its higher value in the speed mode at rated speed. (See FIG. 1). Once the breaker is closed H will increase linearly as a function of time reaching its maximum value after five (5) minutes. The heat coefficient algorithms for speed and load modes are:

$H_{speed}=12.4 \quad (1000+N)^{2\times 10^{-6}} \quad N=RPM$ $H_{Load}=262+(12.3\times \text{Time Counter})$.

The rotor surface temperature is calculated as a function of the first stage steam temperature, the present heat transfer coefficient, and the rotor metal temperature's history. The magnitude of the rotor stress is determined by the rotor (surface-volume average) temperature which is stored in memory to be used by program P04 to analyze the rotor conditions based on present and past history. If the computer has been running after initialization for two (2) hours or more the rotor temperature calculation will be considered valid. Rotor strain, which is a direct function of the rotor temperature, is then calculated, compared to the selected limit and printed out if it is found to exceed the limit.

| | |
|---|---|
| Rotor surface temperature | $= T_s$ |
| Rotor Volume Average | $= \overline{T}$ |
| Rotor strain | $= C.f(T_s, \overline{T})$ |

Principal steps accomplished in this program are:

1. Set:
(a) 1st stage metal temperature b.o.v.
(b) rotor strain limits
(c) rotor (surface-volume average) temperature limits
2. Calculate:
(a) heat transfer coefficient (H)
(b) rotor (surface-volume average) temperature
(c) rotor strain
3. Store and Update:
(a) latest 15 values of rotor volume average every 1 min.
(b) latest 15 values of rotor (surface-volume average) every 1 min.

PROGRAM P02

Computation and supervision of anticipated steam chest wall, bolt flange temperature differentials and differential expansion. This program runs every 1 minute to calculate the anticipated steam chest wall temperature difference in both chests. The actual generator and governor end differential expansion are compared against limits to determine the best course of action.

Program Sequence

The "SKIP NO PART OF P02" indicator is used to avoid errnoeous calculations of the anticipated temperature differentials when this program runs for the first time. This is accomplished by setting this indicator when the programs are initialized Likewise "P13" sets this indicator in order to avoid misleading actions and messages when at least one of the thermocouples used in this part of the program is out of service.

This program will calculate the 5 MINUTES ANTICIPATED STEAM CHEST WALL TEMPERATURE DIFFERENTIAL as a linear interpolation for a 5 minute period from the latest stored temperature difference and the one stored one minute before. The algorithms used is $T_A=T_j+5(T_j-T_{j-1})$. The heating/cooling limit for the ANTIC. (IN-OUT) WALL TEMP. DIFF. is +150. A speed or load hold is generated by ANTIC. METAL COND REQUIRE HOLD indicator.

The GENERATOR END and GOVERNOR END differential expansion input is checked against the alarm and trip limits resulting in different actions taken by program P07.

Generator End: If the input exceeds the ALARM limit the DIFF. EXP. SPD HOLD indicator is set. This results in a speed or load hold.

If the input exceeds the TRIP limit the "DIFF. EXP. TRIP" indicator is set and a tripping action is initiated.

Governor End: Two diffrent actions are taken when the alarm limits are exceeded.

If the rotor is short the "DIFF. EXP. INCR SPEED RATE" indicator is set in order to increase the ACCELERATION which will result in an increase of the heat transfer coefficient. Therefore the rotor will heat faster counteracting the cause that generated the alarm.

If the rotor is long the "DIFF. EXP. SPD. HOLD" indicator. This results in a speed or load hold. If the TRIP limit is exceeded the "DIFF. EXP. TRIP" indicator is set and a tripping acton is initiated.

Any of the conditions analyzed will set the "DIFF. EXP. OF NORMAL" indicator which will prevent the turbine from rolling off turning gear (REF to P03), if the turbine is on turning gear.

In the Figures, there are shown the GENERATOR END and GOVERNOR END differential expansion non-contacting sensors in relationship to the thrust bearing and turbine elements for the rotor long and rotor short relative position. A representation of the supervisory recorder scale and the pointer movement in relation to the sensors and shaft position are shown. FIG. 3 shows the alarm and trip limits in relation to the pointer movement in the supervisory recorder scale.

Po2

Principal steps accomplished in this program are:

1. Calculate the:

a. 5 MIN. anticipated steam chest wall temperature differential b. 5 MIN. anticipated HP & IP (flange-bolt) temperature differential.

2. Compares against limits the:

a. anticipated HP & IP (flange-bolt) temperature differential b. anticipated steam chest wall differential c. governor end present differential expansion d. generator end present differential expansion.

Action Taken

Generator End exceed alarm short—speed/load hold exceed alarm long—speed/load hold exceed trip—short or long—turbine trip request Governor End exceed alarm—short—accelerate exceed alarm—long—speed/load hold exceed trip—short or long—turbine trip request.

PROGRAM Po3

Supervision of turning Gear Operation

All conditions that would hold the unit from rolling-off turning gear are checked. Messages will guide the operator on how to obtain the allowable mismatch between the impulse chamber steam and metal temperatures.

Program Sequence

This program runs to completion only if the unit is on turning gear. The minimum allowable throttle steam temperature at the existing pressure is checked against the actual throttle steam temperature (TST).

In the event of low TST the minimum allowed TST necessary to avoid steam condensation is printed-out.

If the TST is too high in respect to the rotor the TST will have to be decremented.

The two above mentioned conditions will prevent an automatic roll-off turning gear. The computer estimates what the first stage steam temperature would be when the valves open, as a function of the actual throttle steam temperature and pressure.

The expected temperature mismatch between the expected or anticipated first stage steam and metal temperature is checked. If the mismatch is out of specified limits a message will tell the operator what the first stage steam temperature should be to fall within limits and therefore permit the roll-off as soon as the inlet conditions are adjusted accordingly.

The following conditions checked and flagged in another program have to be within limits before a roll-off is allowed.

| FROM | CONDITION |
|---|---|
| P02 | Present differential expansion (governor & generator end) |
| P05 | Rotor eccentricity |
| P06 | Present steam chest wall temperature differential |
| P06 | Present cover-base wall temperature differential |
| P08 | Bearing oil temperature and pressures |
| P08 | Lube oil out of cooler temperature |
| P09 | Generator and exciter cooling media |
| P10 | Gland steam and rotor metal temperatures |
| P10 | LP exhaust pressure |
| P10 | LP exhaust hood temperature |
| | Drain valve conditions |
| | EH fluid pressure |

The above listed conditions will be alarmed by setting a common indicator for P15.

PROGRAM P04

Control Of Rotor Stress At First Stage

Since the rotor surface thermal stress (or strain) is proportional to the surface-to-volume average temperature differential calculated in P01, this is the parameter selected to determine the acceleration. By comparing the present value with previous values, the program finds the type of thermal transient the rotor is undergoing, and selects the path to be followed. An extrapolated value is also calculated and compared with the allowed value, according to this difference.

Program Sequence

If the turbine is off turning gear, latched, and the periodic programs have been running for 2 hours or more we proceed to:

1. Calculate the 15 minute anticipated rotor (surface-volume average) temperature.

2. To set permissive indicators for the P07 periodic program that will hold, reduce or increase turbine speed.

If the turbine is in turning gear and latched but the periodic programs have not been running for 2 hours or more we proceed to:

1. Store and update the latest ten values of 1st stage steam temperature to calculate the temperature gradient.

2. Hold speed by means of P07 if the 1st stage steam temperature rate of change is >300°/hr. and turbine speed is >600 RPM.

An increase in speed or load rate will be requested making use of the "ROTOR STRESS INCREASE RATE" indicator if, 1.1 The load is increasing and the rotor heating or, 1.2 The load is decreasing and the rotor cooling, the anticipated (surface-volume average) temperature difference is less than 50% of specified limit, and the present difference is less than 90% of the same limit.

2.1 The load is increasing and the rotor cooling.

2.2 The load is decreasing and the rotor heating, and the present (surface-volume average) temperature is less than 90% of limit.

3.1 In speed mode the motor is cooling, the anticipated difference is less than 10% of limit, and the present difference is less than 90% of limit.

4.1 In speed mode the rotor is heating, the anticipated difference is less than 50% of limit and the present difference is less than 90% of limit.

A reduction in speed or load rate will be requested making use of the "ROTOR STRESS REDUCE RATE" indicator, if 1.1 The load is increasing and the rotor heating, or 1.2 The load is decreasing and the rotor cooling, or 1.3 In speed mode the rotor is heating and the anticipated difference larger than the limit and the actual difference less than 85% of limit, or The anticipated difference larger than 75% of limit.

Finally the remaining action, a speed or load hold will be requested making use of the "ROTOR STRESS HOLD" indicator which is set when 2.1 The load is increasing and the rotor heating 3.1 The load is decreasing and the rotor cooling and (a) the present temperature difference is larger than the limit or (b) the anticipated temperature difference is larger than the limit and the present temperature difference is large than 85% of limit.

PROGRAM P05

Supervision Of Eccentricity and Vibration

This program analyzes present vibration inputs and takes action in accordance with the previously determined vibration trend.

Program Sequence

The program starts by clearing the vibration trip and vibration alarm indicators. If the turbine speed is below 600 rpm it checks for eccentricity. If the eccentricity is below the alarm limit, the high eccentricity indicator is cleared and the program is completed. Otherwise it prints "high eccentricity" and sets the high eccentricity indicator. If the turbine speed is larger than 600 rpm it proceeds to set alarm limits as a function of turbine speed. Below 2400 rpm the vibration alarm limit will be 8 mils. Above 3200 rpm it will be 5 mils. Between 2400 and 3200 rpm the vibration alarm will be a linear function to speed.

All vibration inputs to the computer are checked. This is done by as many loops as vibration inputs. Each loop represents one input as is referenced by an index number, according to the bearing number.

A trip is requested if a vibration input is equal to or higher than 10 mils. Tables are used to record the vibration values of each input. As more than one input may be in alarm at the same time, separate loops must be used. Also each input may be in a different stage of alarm requiring a speed hold or a change of speed to correct the vibration. Therefore, a priority system is necessary. Top priority is the decreasing mode, next is the hold condition and third the increasing mode of speed reference. Thus, a decrease is always checked before a hold or increase is called for by the conditions in the other vibration inputs. By applying the described method the following is accomplished for each bearing:

| Speed, N in RPM | Vibration, VIB in mils | Action |
|---|---|---|
| For all N | $VIB \geqq 10$ | Req. a Trip |
| $600 < N \leqq 2400$ | $VIB \geqq 8$ | Alarm |
| $2400 < N \leqq 3200$ | $VIB > 8\text{-}000375 \times (N\text{-}2400)$ | Alarm |
| $3200 < N$ | $VIB > 5$ | Alarm |

Vibration Trend

The program scans each vibration input in sequential order and determine if a vibration alarm condition exists. The alarm limit is decreased slightly to avoid an unstable alarm condition that would occur in the event of an input signal with ripple and/or noise. If a decrease or increase condition has not been set previously the program makes sure that the speed is not going to be held within the blade resonance range. If this is the case the program continues with the next sensor.

Otherwise, making use of counter "B" the program stores the present vibration level $(VIB)_o$ for use one minute later and continues the scanning process. Once a minute has elapsed the following is executed.

$$(VIB)_{+1}-(VIB)_o=VIB$$

1. If $\delta VIB > 0$ the expected vibration 5 minutes later is computed by $(VIB)_{+5}=(VIB)_o+((VIB)_{+1}-(VIB)_o)\times 5$ 1. If $(VIB)_{+5} \geqq$ TRIP LIMIT speed is reduced by 200 rpm. If $(VIB)_{+5} <$ TRIP LIMIT the $(VIB)_o$ is replaced by the present vibration level and the process described is repeated again.
2. If $\Delta VIB \leqq 0$ the program keeps updating $(VIB)_o$, $(VIB)_{+1}$ and calculating $\Delta VIB$ until the alarm condition is cleared or until 15 minutes has elapsed. The latter would indicate that the vibration has been descreasing steadily for 15 minutes, as a result an increase in speed of 200 rpm will be requested.

The speed change is accomplished by making the SPEED REFERENCE equal to the VIBR. SPEED REF. in program P07.

The VIB SPEED REF is decreased or increased by 200 RPM every time the conditions mentioned before are satisfied.

To make sure that the SPEED REFERENCE is only decreased or increased in steps of 200 RPM the VIBR. SPEED REF CHANGE NOT PERMITTED indicator is cleared only when the PRESENT TURBINE SPEED=SPEED REF.

PROGRAM P06

Turbine Metal Temperature Supervision

The temperature difference across the steam chest wall has to be maintained within limits to avoid extreme stresses.

Temperature sensors in the base and cover of the HP or HP-IP turbine will monitor its temperature. A difference larger than 100° F. denotes presence of water and the unit should be tripped to avoid further damage.

Program Sequence

This program monitors and alarms on metal conditions of the steam chest walls, cylinder bolt-flange (in single case units), and cover-base cyliner differentials.

When limits are reached speed or load holds are requested.

A trip is requested if the cover-base temperature difference indicates presence of water induction. In this program:

1. Limits are compared to:
 a. both steam chest (outer wall-inner wall) temperature difference.
 b. (flange-bolt) temperature.
 c. (cover—outer cylinder base metal) temperature.
2. Indicators are set to:
 a. hold speed if temperature diffentials are above limits.
 b. request ATS rejection if the (flange-outer cylinder base metal) temperature is >100 and the load is 20% or the load is <20% and the drain valves are open.

PROGRAM P07

Control OF DEH Speed Reference

This is the speed controlling or action program. It sets DEH speed DEMAND which is used by the DEH speed control programs when in ATS control. Acceleration rates are also selected by checking permissive set by other programs.

Program Sequence

Trip conditions requested by other programs will reject the ATS program.

Vibration Trip (P05)
Met. Temp. Trip (P06)
Diff. Exp. Trip (P02)
Brg. Metal Temp. Trip (P08)

Any of the five (5) sensors listed below will also make this program reject ATS.

1. differential expansion sensor (P13)
2. first stage metal temperature sensor (P13)
3. first stage steam temperature (P13)
4. reheat steam temperature (P13)
5. vibration sensor failed high and an adjacent vibration sensor failed high or is in an alarm condition (P13).

If there is at least one bearing with a vibration level above the ALARM limit and the unitis not on the line and the turbine is not changing speed (turbine not accelerating or decelerating) the program will make sure that the speed hold to be generated will not fall in the blade critical regions designated by "X" and "Y" in the flow chart.

If the turbine is dwelling at a blade resonance speed a new speed reference is generated which will decrease the speed to a lower level out of the resonant region. To avoid another reference change request due to the same cause the "VIBR. SPEED REF CHANGE NOT PERMITTED" is set, which will make the program go through a different path.

If in ATS mode the DEH demand will be changed to satisfy the new desired speed called by this program or by P05.

As soon as the demand is within ±7 RPM of the reference a new speed change will be permitted (if a request exists) by clearing the "VIBR. SPEED REF. CHANGE NOT PERMITTED" indicator. Lights are turned on and off accordingly.

With reference to connector (a) in the P07 flow chart, once the vibrator alarm is cleared indicators or flags set by other programs are scanned and new flags (to determine the type of message to be printed out) will be set. Following is a list of indicators scanned.

| FROM PROGRAM | INDICATOR |
|---|---|
| P02 | ANT. METAL COND. REQ. HOLD |
| P02 | DIFF. EXP. SPEED HOLD |
| P04 | ROTOR STRESS HOLD |
| P04 | 1st. STAGE TEMP. SPEED HOLD |
| P05 | HIGH ECCENTRICITY |
| P06 | METAL COND. REQ. HOLD |
| P08 | BRG. METAL TEMP. HIGH |
| P09 | HYDROGEN TEMP. LIMITING |
| P10 | VACUUM OUT OF LIMIT |
| P11 | ANTICIPATED DIFF. EXP. SPEED HOLD |

If the first stage steam temperature sensor fails messages requesting a hold because of rotor stresses are inhibited.

If the turbine is not dwelling at a blade resonance speed, a speed hold is requested (i.e. "SPEED HOLD" ind.) and continues per 3.1 of this program description.

With reference to connector (C)in the PO7 flow chart, if a speed hold other than vibration was requested, with the turbinwe in speed mode (i.e. breaker open) and not dwelling at blade resonance, speed messages indicating the type of speed hold are output.

The speed hold is accomplished by making the DEH DEMAND equal to the instantaneous REFERENCE.

If it is dwelling in or going through a blade resonance frequency zone the turbine will continue to accelerate toward the next speed reference plateau set by the Acceleration Sequence (P15) program before a hold.

If a speed hold was not requested and the first stage steam temperature sensor did not fail, the rotor stress program PO4 will decrease or increase the present acceleration rate one step down or up at the maximum rate of one step every 3 minutes according to the standard acceleration index table.

Present and anticipated differential expansion increase the acceleration rate at a maximum rate of one step every 5 minutes.

Acceleration rate changes will be carried on within the standard or allowable limit which are represented by index 1 through 9 (refer to P07-3).

If a rate request change would allow the present rate to exceed the allowable limits the request and corresponding messages will not be acknowledged.

Once a rate is selected, the DEH DEMAND will be made equal to the target speed reference set by the Acceleration Sequencing program P15. This is accomplished by means of a jump to connector (f) in P07-2.

Going back to connector (c) we will notice that if the turbine is in a hold speed condition and in load control relevant messages will be printed out.

PROGRAM P08

Supervision of Bearing Temperature

This program monitors the lube oil in and out of cooler temperature, the bearing metal temperature, and the bearing oil header pressure.

Program Sequence

Two different low and high oil out of cooler limits are used. If the turbine is running (speed or load mode) a higher pair of limits are used.

If the turbine is accelerating the oil will increase in temperature therefore if the oil temperature is below the low limit but the turbine is accelerating no action is required from the operator. All journal and thrust bearing metal temperatures are checked against two limits.

If any one of the bearing metal temperatures exceeds 210° F. an indicator is used to request a speed or load hold by means of program P07.

If any of these temperatures exceeds 225° F., a trip request is generated. The bearing oil pressure is monitored continuously, nevertheless the only action taken is a hold if the unit is in the roll-off turning gear routine. The oil returning to the lube ol cooler should be kept below 170° F., otherwise the program will put out a message indicating this alarm condition.

Summarizing in a table like format the following are the different steps and actions that this program takes care of:

1. It compares against limits:
a. the oil temperature out of cooler in turning gear
b. the oil temperature out of cooler out of turning gear
c. each metal bearing temperature (trip and alarm)
d. the bearing oil pressure
e. the oil temperature to cooler
2. It sets indicators that will:
a. hold roll-off T.G. if, the lube oil temperature is too cold, or the lube oil pressure is too low
b. hold speed or load if any bearing temperature exceeds the alarm limit
c. request a turbine trip if any bearing temperature exceeds the trip limit.

PROGRAM P09

Supervision of Generator

The generator cooling and sealing system and exciter cooling system are monitored by this program. Calculations are run continuously to determine if the generator stator coil temperature rise is within calculated limits.

Program Sequence

The generator cooling gas or water is monitored and a roll-off turning gear hold or a prior to synchronizing hold is generated if the cooling fluid exceeds a fixed high limit. A similar action is taken with the exciter cooling air.

The allowable coolant expected temperature rise is continuously calculated as a function of the coolant pressure (if it is a gas), the instantaneous or present stator current ($I_{SA}$) and the nominal stator current ($I_S$). Its limit is a sole function of the gas pressure (if gas cooled). Messages will tell the operator if the temperature rise trend is larger than expected. This will give him enough lead time to take a corrective action. Hydrogen pressure and purity are closely monitored, as well as seal oil pressures (air and hydrogen side).

The latter conditions will prevent the synchronization ion program to run. This means that the unit will go on a speed hold until these conditions are cleared.

Principal steps accomplished in this program are:

1. Calculate the:
a. expected generator stator coil coolant discharge temperature rise.
b. generator stator coil coolant temperature rise limit.
c. present generator stator coil coolant discharge temperature rise.
d. present exicter air temperature rise.
2. Compares against limits the:
a. coolant inlet temperature.
b. present generator stator coil coolant discharge temperature rise.
c. exciter coolant air.
d. exciter previously calculated temperature rise.
e. hydrogen and air side seal oil pressure and temperature.
f. hydrogen pressure.
g. seal pressure difference
3. It checks the running status of the
a. air side seal oil back-up pump.
b. hydrogen side seal oil pump.

PROGRAM P10

Supervision of Gland Seal, Turbine Exhaust And Condenser Vacuum Conditions

This program monitors temperatures and pressures in the LP exhaust and temperature differences in the seal LP gland system. Exhaust spray operation is monitored and HP sealing steam temperature are also monitored.

Program Description

The following conditions, which are monitored by this program will not allow the P15 program to carry on the roll-off turning gear operation if the:

1. HP gland seal steam is too cold
2. LP gland seal steam temperature is too high (3500° F.)
3. difference between the metal and the sealing steam temperatures in the HP sealing area is too great (+ 200° F. max.)
4. LP exhaust steam temperature is larger than the allowable limit for the sprays.

If the LP exhaust pressure is larger than 5 inches of Hg Absolute this program will request a speed or load hold carry on by P07 as usual.

Turbine operation experience recommends that the LP exhaust sprays be open between 600 RPM and 10 percent load. This is properly monitored by this program. Commands to take corrective actions are given to the operator by printed message.

PROGRAM P11

Supervision Of Drain Valves And Computation Of Anticipated Differential Expansion This program can be considered an extension of P02. The anticipated differential expansion in one or both ends is calculated and appropriate actions determined. Drain valves position are monitored and commands to open and close them (generated in accordance with speed and loading conditions as well as recommendation emanated of the recent water prevention operating procedures) are given.

Program Sequence

The GOVERNOR END AND GENERATOR END anticipated (desired) differential expansion is checked against the alarm and trip limits resulting in different actions taken by P07. The present temperature is calculated by a desired anticipation algorithm $T_A = T_{-5} + 5\,(T_{-5} - T_{-6})$.

Governor End. Two different actions are taken when the alarm limits are exceeded.

If the rotor tends to become shorter the "ANTIC. DIFF. EXP. RATE" indicator is set in order to increase the acceleration which will result in an increase of the heat transfer coefficient. Therefore the rotor will heat faster counteracting the trend toward a shorter rotor. If the rotor tends to become longer the "ANTIC. DIFF. EXP. SPEED HOLD" indicator is set resulting in a speed or load hold made effective by P07.

Generator End. A speed or load hold is accomplished through program P07 when the "ANTIC. DIFF. EXP. SPEED HOLD" indicator is set as a result of an anticipation to a rotor long alarm condition. p If on speed control, the drain valves are opened if not already open.

If on load control at less than 20% load, the drain valves are opened. If load is greater than 20%, the drain valves are closed.

PROGRAM P12

Supervision of LP Exhaust Temperatures

This program provides additional checks and calculations for a turbine with Building Block 73 to prevent overheating of the low pressure blades.

The temperature in the last row of blades is a direct function of the exhaust or condenser pressure. Therefore the LP exhaust pressure is used as the sensible index to determine low pressure blade conditions.

Program Sequence

To determine if the low pressure end is exceeding preestablished limits a straight linear approximation of Operating Curve #CT-22596B, attached, is being used.

The intersection of these two (2) straight lines has been selected to be at 1.92 in. HgAbs., and its respective equations are:

1. For full speed—no load

If cond. press. abs. $<1.92$—TEMP 1$=1000-(80\times$cond. press. abs.)

If cond. press. abs. $>1.92$—TEMP 1$=1150-(160\times$cond. press. abs.)

2. For 5% of MAX. GUAR. LOAD

If cond. press. abs. $<1.92$—TEMP 2$=1023-(33.3\times$cond. press. abs.)

If cond. press. abs. $>1.92$—TEMP 2$=1150-(100\times$cond. press. abs.)

If the reheat temperature does not fall below the curve for FULL SPEED - NO LOAD (see curve #CT22596B) or in other words if reheat temperature is larger than TEMP 1 an indicator named "VACUUM" is set to be used in the acceleration program P15. Its function is to hold turbine speed before the speed demand is moved up to the next higher level.

SPEED MODE

If the turbine is not on the line but close to rated speed two actions would be taken:

1. If there is not any bearing vibrating above the alarm limit the program will wait 4 minutes before advising the operator to reduce speed (if in OPER. AUTO) or decrease speed to the next lower step if it was not decreased already within the last 15 minutes. If speed was decreased already the program will wait 15 minutes total before advising the operator to go to OPER AUTO and place the turbine in turning gear.

2. If there is a bearing vibration above the alarm limit the operator will be advised to reduce speed (if in OPER AUTO).

In ATS the turbine speed will be brought down to the next lower step by program P15 making use of the "SPEED REF" indicator. In any case after 15 minutes total the operator will be advised to go to OPER AUTO and turning gear.

LOAD MODE

No action will be taken if the load applied is larger than 5%. If it is less than 5% and the reheat temperature does not fall below the curve for 5% of MAX. GUAR. LOAD (curve #CT-22596B) or in other words if reheat temperature is larger than TEMP. 2 the operator will be advised to increase load to avoid overheating the LP blades.

PROGRAM P13

Sensor Failure Action

This program monitors the converted ATS analog input values for detection of sensor failures, and initiates special actions (i.e. rejects ATS) for correct system response if a sensor failure is detected.

Program Sequence

This program can be distinctly divided into two parts. The main purpose of the first part is scanning all converted analog inputs for detection of sensor failures.

If an input is not reliable the program determines if the action has already been completed for this failure.

If action is complete it determines if action was completed while not in ATS mode. If this is true and the ATS mode was just selected (in the last 5 sec.) the sensor failure conditions must be reevaluated for possible further action.

Otherwise, no further action is taken. If action was not completed, then the failure has just occurred or it occurred previously but has remained incompleted because of an outstanding sensor failure override that has been requested (to allow a substitution) has not been satisfied. This condition will light the "OVERRIDE SENSOR HOLD" pushbutton on the operator's panel.

If the failure has just occurred (within the last 5 seconds since previous monitoring) a sensor failure message is printed (P13M11), a contact closure is sent to a plant alarm and the required sensor failure action is initiated as well as any required sensor value substitutions if a sensor failure override is not required for the particular sensor in scan.

If the failure is not new and subsequent action is pending a sensor failure override by the operator, a substitution is made if the operator pushed the "OVERRIDE SENSOR HOLD" pushbutton. Otherwise, no further action is taken until the pushbutton is pressed.

The second part of P13 monitors key sensors for failures which have more serious consequence to the ATS programs than actions initiated in the first part. This action results in, Reverting to OPERATOR AUTO from ATS mode if 1. a differential expansion sensor failed.
2. a vibration sensor failed high and an adjacent vibration sensor failed high or is in an alarm condition.
3. the first stage metal temperature sensor failed.
4. the reheat steam temperature sensor failed.
5. the first stage steam temperature sensor failed.

Substitutions

Depending on the sensor type a direct or reference substitution will be applied. In the substitution table, each substitutable sensor is listed with its predefined substitution sensors with the latter listed in accordance with substitution priorities.

Direct Substitution

This occurs when either the last previous valid value of the failed sensor is used or some preassigned fixed value is inserted for the failed sensor.

The oil out of cooler temperature and the bearing oil pressure are in this class.

Reference Substitutions

This is based on a table of other sensors whose value may be used for the analog input of the failed sensor. Thus, if the left steam-chest inner-temperature sensor fails, the right steam-chest inner-temperature is used in its place, providing that this sensor has not also failed. However, if it too has failed, the next sensor specified in the list is used. If no valid substitute is listed, then no replacement will be made for the original sensor which failed.

Priorities

There is a priority system applied to the order in which failed sensors are monitored for substitution action. Further, certain sensors i.e. vibration, differential expansion, first stage temperature and reheat temperature are classed as nonsubstitutable and processed separately for sensor failure control action.

PROGRAM P14

Calculation And Timing Of Heat Soak Time

This program will compute the necessary soak time based on the more critical temperature in the first stage. It will keep track of the time and allow the start-up sequence control program P15 to continue as soon as the computed time has expired.

Considerations

The soaking time necessary to bring the rotor volume average temperature above 250° F. is accomplished between 2200 and 2400 rpm. This speed is chosen as a compromise between soaking temperature and rotor velocity which generates undesirable centrifugal stresses.

The IP rotor is considered the most critical rotor. The energy absorbed by the rotor as a function of rotor temperature is represented by ENERGY versus TEMPERATURE curve (FIG. 2) obtained by the Charpy test method.

The transition point (A) which corresponds approximately to 50% of the ductile fracture falls in the 250° F. zone for the IP rotor material. For the Lp this transition point is below freezing.

The computation of the heat soak time is based conservatively on the lowest of four (4) temperatures listed below for the combined and separate HP-IP case.

COMBINED HP-IP

Rotor volume average temperature b.o.v. (1)
Rotor volume average temperature present
First stage metal temperature b.o.v.
First stage metal temperature present

SEPARATE HP-IP

IP metal temperature b.o.v.
IP metal temperature present
First stage metal temperature b.o.v.
First stage metal temperature present The b.o.v. temperatures are updated only when the unit is on turning gear. Once the unit rolls-off turning gear the updating process stops (See P01).

Three indicators or flags are used in order to select the appropriate path in the program.

"HEAT SOAK COMPLETE" indicator which is cleared in P01 only when the unit is on turning gear, determines if P14 will run. It is set when all thermal operating conditions have been satisfied.

"SOAK TIME PERMITTED" indicator. It is used as a means of determining the validity of message P14M1 (HEAT SOAK DELAY, SPD LO). This message is printed only when the soak time speed is lower than recommended and the reheat steam temperature is larger than 500° F. The heat soak time calculation is based on that temperature.

(1) b.o.v. stands for BEFORE OPENING THE VALVES.

"RETIME" indicator. The selection of the heat soak temperature and the heat soak temperature calculation is done only when the unit is on turning gear and the first time this program runs to completion. This indicator will bypass the calculation portion of the program every time but the first time.

Program Sequence

When the soak time speed has been reached the lowest metal temperature is selected and the heat soak computed unless it is a hot start (lowest temperature 250° F.) in which case heat soak is considered unnecessary.

The countdown of the heat soak time will start as soon as the reheat temperature goes above 500° F.

If for any reason the reheat temperature goes below 500° F. the countdown will stop until the reheat temperature is reestablished. Once the soak time has timed out a final check on the rotor volume average temperature is done (it should be 250° F.) before declaring that the heat soak cycle has been completed and allowing the turbine to continue acceleration.

PROGRAM P15

Acceleration Sequence

This program runs continuously, however, its actions are only accepted by the DEH if on ATS Control. In a normal start-up this program brings the turbine from turning to synchronous speed and turns the DEH Controller REFERENCE to the AUTOSYNCHRONIZER.

If the starting sequence is interrupted by a hold requested by any of the monitoring programs, it will resume its logical sequence where it was interrupted.

P15-1

The program will be in ATS Control when a flag set in the DEH Logic Program is set. This flag is set when not in loading mode, not in OPER. AUTO, and when the "SENSOR FAILURE REJECT ATS" indicator, (which is set by the SENSOR FAILURE ACTION program) is clear.

If in speed control and not in TG (turning gear) the VALVE POSITION LIMIT will be run up if it is set at less than 95%.

None of the conditions questioned in the vertical line between the questions IS TURB. ON T.G. will be affirmatively answered.

For study purposes we will assume that the unit is in TG and the ATS control P.B. has been pushed. Refer to P15-4.

If the unit is latched and in ATS control P03 flags are cleared. This is done to make sure that the latest PRE-ROLL conditions are being checked.

The "E" flag, set when the program has been overriden or the pre-roll completed successfully, is now not set, therefore, when P03 has completed successfully the pre-roll check out, an ACC RATE of 200 RPM/MIN. and a TARGET speed of approximately 605 RPM is selected.

The turbine now will accelerate at the selected rate until the selected target speed is reached.

By now the "E" flag has been set. The program will jump to repeatedly select the target speed until the turning gear disengages. If no HOLD has been requested by the monitoring programs the turbine will continue to accelerate until a speed larger than 580 RPM has been reached. At this point a new target speed between 2200 and 2400 RPM is selected.

The acceleration rate by now could have been increased by P07 which will every 3 minutes recognize an increase or decrease request by P04 which looks at the rotor stress computation and determines the course of action.

P15-3

Once the turbine has reached HEAT SOAK SPEED (2200 to 2400 RPM) the program will come down the same path until P14 sets the "HEAT SOAK COMPLETION" indicator. Then a new target speed of the order of 3300 RPM is selected and the turbine accelerates now at the present acceleration rate. This rate is being updated every 3 minutes as a result of the rotor stress calculation.

Again the turbine will accelerate to reach the new target speed. In the next step the transfer from throttle valves to governor valves occurs. Prerequisites are that all vibration levels be below the alarm limit and that the cooler steam chest inner temperature be larger than the throttle temperature at existing pressure. This is to avoid water condensation on the chest walls once the transfer is accomplished. We must remember that when in governor valve control the pressure in the steam chest is equal to the throttle pressure. "D" flag is set above 3260 RPM when:

1. there is not any vibration alarm
2. there has been a vibration alarm override.

Once "D" flag is set and the correct throttle temperature is achieved, the transfer is initiated.

If the throttle temperature is too cold the recommended throttle temperature is recalculated and printed out every 10 minutes.

Also, every 10 minutes a message indicating the cause of the transfer delay is output. Once the transfer has been initiated the system will have 2 minutes to complete it. If it has not been completed in 2 minutes this will be indicative of a malfunction and a message requesting the operator to take control will be printed out with the latter frequency.

The time counter is shown as counter "J" in this program.

P15-1

The unit should now be in GOV. CONTROL, therefore, the transfer is completed and a message indicating this condition is printed out.

The next time the program runs, a new target speed reference (equals synchronous speed) will be selected and the acceleration continued until the turbine speed is within synchronization range (SYNCHRONOUS SPEED±50 RPM). At this point the pre-synch check out starts.

P15-2

Indicator A, B and C are used to run this part of the program in a certain sequence.

It is desirable that the (surface-volume average) temperature differential in the rotor be less than 75% of the allowable limit before the unit is synchronized.

If the latter is not so the program will proceed only if the rotor average temperature is larger than the first stage steam temperature. If this second condition is not met the operator will have to override the program in order to complete the automatic start-up.

Otherwise the OPERATOR AUTO mode will have to be selected to make use of the remaining synchronizing monitor sequence. The program continues checking conditions that should have been accomplished by the operator beforehand. These are:

The exciter field breaker should be unlocked.

The generator main breaker should be unlocked.

The voltage regulator switch is in the "OFF" position.

Vibration and generator system conditions are checked before the program determines if the base adjuster and voltage adjuster have been prepositioned to the rated voltage, no load position. These will be prepositioned by motor operators which are actuated by a contact closure when the exciter field breaker is opened.

The exciter field breaker is closed by a contact closure output from the DEH controller. This contact reopens after 10 seconds. Successively the program checks if the:

1. exciter field breaker has closed.
2. base adjuster is at rated no load setting.
3. voltage adjuster is at rated no load setting.
4. voltage regulator switch is in the "ON" position.
5. voltage regulator is "ON".
6. auto-synchronizer is in AUTOMATIC. This should have been set by the operator beforehand.

Messages indicating the discrepancies with the programmed logic are printed out. Finally the program will instruct the DEH controller to go in AUTO SYNC. mode allowing the automatic synchronizer to change the reference signal in the DEH.

A generator excitation system schematic is shown in FIG. 2.

Once the breaker closes a message dependent on the present rotor stress is printed out advising the operator on the most desirable loading rate.

ATS Control At Any Speed Level

This program will catch the unit on the fly and resume the start-up sequence setting the reference at the next higher reference step (600, 2200, 3300, or 3600 RPM).

I. SUMMARY

Improved turbine and electric power plant operation is realized through the disclosed turbine startup, synchronizing, and load control systems and methods. Improved turbine and plant operation and management also results from the disclosed turbine monitoring and operator interface systems and methods. The improvements stem from advances in functional performances, operating efficiency, operating economy, manufacturing design and operating flexibility and operating convenience.

The present system supplements, expands and improves over the prior art. In doing so, the present system includes specialized programs for suppressing noise in the reference, demand and sensed parameter signals of the turbine-generator system; the programs are broken down into a series of master task programs and other programs for better utilization of the digital computer; a special program which monitors all of the programs and detects computing, addressing and transmitting errors therein increases the reliability, safety and flexibility of the system. Panel monitoring, information transmission and warning systems greatly increase the usefulness, ease-of-operation and inherent reliability of the present system. A breaker open interrupt program indicating the loss of load connected to the generator prevents any overspeed condition from becoming serious. A stop and initialization program automatically readies the digital computer for immediate service after any computer or turbine stop or loss of power thereto, either instantaneous or long term. A logic program in the present system provides the capability for maintenance testing of logic functions; monitoring analog and digital speed failure; increasing turbine supervision capabilities, expanding manual control capabilities of the computer allowing an operator to work in conjunction with the automatic operation of the turbine generator system with the digital computer. The logic program also including hold and suspend systems; governor and throttle valves control interlock systems; turbine latching logic programs; breaker logic programs; throttle pressure control logic programs; megawatt feedback logic; impulse pressure feedback logic; speed feedback logic; automatic synchronizer logic; automatic dispatch system logic; automatic turbine startup logic and remote transfer logic.

The control program of the present system includes the capability of time updating any function in the computer; limiting the position of predetermined valves in the turbine system; testing any valve in the system, checking for contingency conditions such as inoperativeness of any program or hardware; being able to select various speed control functions and various hardware therein for high reliability; selecting a series of operating modes in both load and speed modes of operation, providing speed and load reference functions with flexibility to change these during operation, switching between the speed control function and the load control functions during the automatic operation of the DEH system providing governor valve control functions and peripheral functions, such as, lags and nonlinear characterization of characteristics in the turbine-generator system.

The present system also has an elaborate programming system for better communications between an operator and the digital computer through use of special panel task program. The panel programs include a button-decoding program, a control switching system, a display system for displaying a vast number of system parameters of the turbine generator system, a system for changing during operation most parameters and constants in the digital computer with great ease and rapidity, a capability to select a great number of operating modes, a system for checking the status of predetermined valves in the system and display devices therefor, a testing system for predetermined valves in the system, a limiting provision for limiting the position of predetermined valves in the system. In addition the panel programs provide for the control of automatic turbine startup programs; the control of the digital computing system through the use of a series of manual buttons, switches, toggles, etc.; the program capability of monitoring keyboard activity for failsafe and improper operation thereby preventing operator mistakes from resulting in improper signals and signaling means for warning an operator of any improper commands or mistakes in his operation of the keyboard, panels etc.

INDEX OF APPENDICES

| No. | Title | Column No. |
|---|---|---|
| 1 | Glossary of Variable and Parameter Designations for Flowcharts, etc. - Alphabetical Listing | 78 |
| 2 | Glossary of Variable and Parameter Designations for Flowcharts, etc. - Changed According to Core Location and Address | 89 |
| 3 | Detailed Functional Description of DEH System | 103 |
| 4 | DEH Analog Hardware Description P 2000 Computer System | 160 |
| 5 | Input/Output Listing of Parameters and Variables in ATS and DEH Systems | 177 |
| 6 | Computer Program Listing | 219 |
| 7 | Core Dump of Locations in P2000 Computer Memory | 407 |
| 8 | Printout of Data Link Program in Fortran Language, etc. | 459 |
| 9 | Fortran Programs for the Manual Backup Functions, etc. of the DEH and ATS Systems | 491 |

APPENDIX 1

Glossary of Variable and Parameter Designations for Flowcharts, etc. - Alphabetical Listing

| NAME | TYPE | CORE LOC. | KEYBOARD ADR. | AREA | FUNCTION |
|---|---|---|---|---|---|
| A11X | | 0F20 | | LIBRARY | FLOATING ADD FUNCTION |
| ABS | | 0F0D | | LIBRARY | ABSOLUTE VALUE FUNCTION |
| ADS | L | 1357 | 1472 | ZETA | LOGICAL STATE |
| ADSDEC | L | 138C | 1525 | ZETA | LOGICAL STATE |
| ADSDOWN | L | 118C | 1013 | ALPHA | CONTACT INPUT |
| ADSDOWNX | L | 1370 | 1497 | ZETA | LOGICAL STATE |
| ADSINC | L | 138B | 1524 | ZETA | LOGICAL STATE |
| ADSMAXT | R | 12A0 | 3145 | DELTA | KEYBOARD-ENTERED CONSTANT |
| ADSPB | L | 13D6 | 1599 | THETA | OPERATORS PANEL BUTTON STATE |

| NAME | TYPE | CORE LOC. | KEYBOARD ADR. | AREA | FUNCTION |
|---|---|---|---|---|---|
| ADSPERM | L | 118D | 1014 | ALPHA | CONTACT INPUT |
| ADSRATE | R | 127C | 3127 | DELTA | KEYBOARD-ENTERED CONSTANT |
| ADSUP | L | 118B | 1012 | ALPHA | CONTACT INPUT |
| ADSUPX | L | 136F | 1496 | ZETA | LOGICAL STATE |
| ADSX | L | 137D | 1510 | ZETA | LOGICAL STATE |
| AIDBMW | R | 1286 | 3132 | DELTA | KEYBOARD-ENTERED CONSTANT |
| AIDBPI | R | 1288 | 3133 | DELTA | KEYBOARD-ENTERED CONSTANT |
| AIFAILMW | L | 138F | 1528 | ZETA | LOGICAL STATE |
| AIFAILMX | L | 1391 | 1530 | ZETA | LOGICAL STATE |
| AIFAILPI | L | 1390 | 1529 | ZETA | LOGICAL STATE |
| AIFAILPX | L | 1392 | 1531 | ZETA | LOGICAL STATE |
| ALPHA | | 1180 | | ALPHA | LABELED COMMON |
| ANASPDF | L | 1396 | 1535 | ZETA | LOGICAL STATE |
| ANASPDFX | L | 1397 | 1536 | ZETA | LOGICAL STATE |
| ARF | | 3A82 | | LIBRARY | FORMATTED ARGUMENT TRANSFER |
| AS | L | 1356 | 1471 | ZETA | LOGICAL STATE |
| ASDEC | L | 138E | 1527 | ZETA | LOGICAL STATE |
| ASDOWN | L | 1187 | 1008 | ALPHA | CONTACT INPUT |
| ASDOWNX | L | 1362 | 1483 | ZETA | LOGICAL STATE |
| ASINC | L | 138D | 1526 | ZETA | LOGICAL STATE |
| ASL | L | 1190 | 1017 | ALPHA | CONTACT INPUT |
| ASLX | L | 135F | 1480 | ZETA | LOGICAL STATE |
| ASPB | L | 13D5 | 1598 | THETA | OPERATORS PANEL BUTTON STATE |
| ASPERM | L | 1188 | 1009 | ALPHA | CONTACT INPUT |
| ASUP | L | 1186 | 1007 | ALPHA | CONTACT INPUT |
| ASUPX | L | 1361 | 1482 | ZETA | LOGICAL STATE |
| ASX | L | 137C | 1509 | ZETA | LOGICAL STATE |
| ATS | L | 1389 | 1522 | ZETA | LOGICAL STATE |
| ATSSCAN | R | 129A | 3142 | DELTA | KEYBOARD-ENTERED CONSTANT |
| ATSX | L | 138A | 1523 | ZETA | LOGICAL STATE |
| AUTOSTAR | L | 13D0 | 1593 | THETA | OPERATORS PANEL BUTTON STATE |
| BETA | | 11AA | | BETA | LABELED COMMON |
| BGVC | R | 1246 | 3100 | DELTA | KEYBOARD-ENTERED CONSTANT |
| BGVO | R | 1244 | 3099 | DELTA | KEYBOARD-ENTERED CONSTANT |
| BINT(1) | R | 12CC | 3167 | DELTA | KEYBOARD-ENTERED CONSTANT |
| BINT(2) | R | 12CE | 3168 | DELTA | KEYBOARD-ENTERED CONSTANT |
| BINT(3) | R | 12D0 | 3169 | DELTA | KEYBOARD-ENTERED CONSTANT |
| BINT(4) | R | 12D2 | 3170 | DELTA | KEYBOARD-ENTERED CONSTANT |
| BINT(5) | R | 12D4 | 3171 | DELTA | KEYBOARD-ENTERED CONSTANT |
| BR | L | 1363 | 1484 | ZETA | LOGICAL STATE |
| BRX | L | 1364 | 1485 | ZETA | LOGICAL STATE |
| BTVC | R | 1252 | 3106 | DELTA | KEYBOARD-ENTERED CONSTANT |
| BTVO | R | 1242 | 3098 | DELTA | KEYBOARD-ENTERED CONSTANT |
| C01X | | 10B7 | | LIBRARY | INTEGER TO REAL FUNCTION |
| C02: | | 10B2 | | LIBRARY | INTEGER TO REAL CONVERSION |
| C10X | | 108A | | LIBRARY | REAL TO INTEGER FUNCTION |
| C20: | | 108A | | LIBRARY | REAL TO INTEGER CONVERSION |
| CADSDOWN | L | 136C | 1493 | ZETA | LOGICAL STATE |
| CADSUP | L | 136B | 1492 | ZETA | LOGICAL STATE |
| CCOMANOTRAK | L | 13B7 | 1568 | ETA | FLASHING FLAG |
| CCOREADY | L | 13B8 | 1569 | ETA | FLASHING FLAG |
| CCOREFHL | L | 13B5 | 1566 | ETA | FLASHING FLAG |
| CCOREFLL | L | 13B4 | 1565 | ETA | FLASHING FLAG |
| CCOVPLIM | L | 13B6 | 1567 | ETA | FLASHING FLAG |
| CDLDMD | R | 132A | 4214 | EPSILON | COMPUTED VARIABLE |
| CDLRATE | R | 1328 | 4213 | EPSILON | COMPUTED VARIABLE |
| CLOSEDB | R | 1240 | 3097 | DELTA | KEYBOARD-ENTERED CONSTANT |
| CLOSEPB | L | 13DA | 1603 | THETA | OPERATORS PANEL BUTTON STATE |
| CM1 | | 0F00 | | LIBRARY | REAL NEGATION FUNCTION |
| CM2 | | 0F00 | | LIBRARY | REAL NEGATION FUNCTION |
| CM3 | | 0F00 | | LIBRARY | REAL NEGATION FUNCTION |
| CRESETPB | L | 13C4 | 1581 | THETA | OPERATORS PANEL BUTTON STATE |
| D11X | | 0FA2 | | LIBRARY | FLOATING DIVIDE FUNCTION |
| DADR | L | 11B7 | 1056 | BETA | FLAG |
| DATENTRY | L | 11B3 | 1052 | BETA | FLAG |
| DBTRKL | R | 125E | 3112 | DELTA | KEYBOARD-ENTERED CONSTANT |
| DBTRKREF | R | 12A6 | 3148 | DELTA | KEYBOARD-ENTERED CONSTANT |
| DBTRKS | R | 1260 | 3113 | DELTA | KEYBOARD-ENTERED CONSTANT |
| DEC: | | 3AC7 | | LIBRARY | INITIATE DECODE - FORMATTER |
| DECPT | L | 11B5 | 1054 | BETA | FLAG |
| DELTA | | 1210 | | DELTA | LABELED COMMON |
| DEMAND | R | 12F4 | 4187 | EPSILON | COMPUTED VARIABLE |
| DIGSPDF | L | 1394 | 1533 | ZETA | LOGICAL STATE |
| DIGSPDFX | L | 1395 | 1534 | ZETA | LOGICAL STATE |
| DLINK | L | 13D3 | 1596 | THETA | OPERATORS PANEL BUTTON STATE |

| NAME | TYPE | CORE LOC. | KEYBOARD ADR. | AREA | FUNCTION |
|---|---|---|---|---|---|
| ENC: | | 3AC3 | | LIBRARY | INITIATE ENCODE - FORMATTER |
| EPSILON | | 12E0 | | EPSILON | LABELED COMMON |
| ETA | | 13A0 | | ETA | LABELED COMMON |
| EXIT | | 09B2 | | MONITOR | PROGRAM EXIT HANDLER |
| FF | | | | LOGIC TASK | FLIPFLOP FUNCTION |
| FLGWRD | I | 11AC | 2045 | BETA | FLAG |
| FOLAG | | | | CONTROL TASK | FIRST ORDER LAG FUNCTION |
| GAMMA | | 11E0 | | GAMMA | LABELED COMMON |
| GC | L | 1350 | 1465 | ZETA | LOGICAL STATE |
| GCX | L | 1381 | 1514 | ZETA | LOGICAL STATE |
| GL2 | R | 1232 | 3090 | DELTA | KEYBOARD-ENTERED CONSTANT |
| GL3 | R | 1234 | 3091 | DELTA | KEYBOARD-ENTERED CONSTANT |
| GO | L | 1359 | 1474 | ZETA | LOGICAL STATE |
| GOHOLDOF | L | 137B | 1508 | ZETA | LOGICAL STATE |
| GOPB | L | 13CB | 1588 | THETA | OPERATORS PANEL BUTTON STATE |
| GOT: | | 10D7 | | LIBRARY | COMPUTED GO TO FUNCTION |
| GOX | L | 135A | 1475 | ZETA | LOGICAL STATE |
| GR1 | R | 1262 | 3114 | DELTA | KEYBOARD-ENTERED CONSTANT |
| GR2 | R | 1264 | 3115 | DELTA | KEYBOARD-ENTERED CONSTANT |
| GR3 | R | 1266 | 3116 | DELTA | KEYBOARD-ENTERED CONSTANT |
| GR4 | R | 1268 | 3117 | DELTA | KEYBOARD-ENTERED CONSTANT |
| GR5 | R | 126A | 3118 | DELTA | KEYBOARD-ENTERED CONSTANT |
| GR6 | R | 126C | 3119 | DELTA | KEYBOARD-ENTERED CONSTANT |
| GR7 | R | 126E | 3120 | DELTA | KEYBOARD-ENTERED CONSTANT |
| GR8 | R | 1270 | 3121 | DELTA | KEYBOARD-ENTERED CONSTANT |
| GR9 | R | 1272 | 3122 | DELTA | KEYBOARD-ENTERED CONSTANT |
| GR10 | R | 1274 | 3123 | DELTA | KEYBOARD-ENTERED CONSTANT |
| GS1 | R | 122E | 3088 | DELTA | KEYBOARD-ENTERED CONSTANT |
| GS2 | R | 128A | 3134 | DELTA | KEYBOARD-ENTERED CONSTANT |
| GV | L | 13CE | 1591 | THETA | OPERATORS PANEL BUTTON STATE |
| GVBIAS | R | 130C | 4199 | EPSILON | COMPUTED VARIABLE |
| GVCONT | L | 13A7 | 1552 | ETA | FLASHING FLAG |
| GVDB | R | 1278 | 3125 | DELTA | KEYBOARD-ENTERED CONSTANT |
| GVINIT | R | 128E | 3136 | DELTA | KEYBOARD-ENTERED CONSTANT |
| GVMAX | L | 137A | 1507 | ZETA | LOGICAL STATE |
| GVMIN | L | 1379 | 1506 | ZETA | LOGICAL STATE |
| GVPOS | R | 1136 | 4220 | EPSILON | COMPUTED VARIABLE |
| GVSP | R | 130A | 4198 | EPSILON | COMPUTED VARIABLE |
| GVSPMIN | R | 124E | 3104 | DELTA | KEYBOARD-ENTERED CONSTANT |
| HEL | R | 122A | 3086 | DELTA | KEYBOARD-ENTERED CONSTANT |
| HLF | R | 1228 | 3085 | DELTA | KEYBOARD-ENTERED CONSTANT |
| HLL | R | 12E8 | 4181 | EPSILON | COMPUTED VARIABLE |
| HLLMAX | R | 1218 | 3077 | DELTA | KEYBOARD-ENTERED CONSTANT |
| HLS | R | 1226 | 3084 | DELTA | KEYBOARD-ENTERED CONSTANT |
| HOLD | L | 135C | 1477 | ZETA | LOGICAL STATE |
| HOLDCP | L | 1358 | 1473 | ZETA | LOGICAL STATE |
| HOLDPB | L | 13CA | 1587 | THETA | OPERATORS PANEL BUTTON STATE |
| HOLDX | L | 135D | 1478 | ZETA | LOGICAL STATE |
| IADSDOWN | I | 11B9 | 2058 | BETA | COUNTER |
| IADSUP | I | 11B8 | 2057 | BETA | COUNTER |
| ICCO1 | I | 11BD | 2062 | BETA | COUNTER |
| ICCO2 | I | 11BE | 2063 | BETA | COUNTER |
| ICOUNTER(1) | I | 11C8 | 2073 | BETA | COUNTER |
| ICOUNTER(2) | I | 11C9 | 2074 | BETA | COUNTER |
| ICOUNTER(3) | I | 11CA | 2075 | BETA | COUNTER |
| ICOUNTER(4) | I | 11CB | 2076 | BETA | COUNTER |
| ICOUNTER(5) | I | 11CC | 2077 | BETA | COUNTER |
| ICOURSE | I | 11BF | 2064 | BETA | COUNTER |
| IDPT | I | 11B6 | 2055 | BETA | COUNTER |
| IDUTY | I | 11C6 | 2071 | BETA | COUNTER |
| IFINE | I | 11C0 | 2065 | BETA | COUNTER |
| IGV1SS | I | 11FE | 2127 | GAMMA | ANALOG INPUT |
| IGV2SS | I | 11FF | 2128 | GAMMA | ANALOG INPUT |
| IGV3SS | I | 1200 | 2129 | GAMMA | ANALOG INPUT |
| IGV4SS | I | 1201 | 2130 | GAMMA | ANALOG INPUT |
| IGV5SS | I | 1202 | 2131 | GAMMA | ANALOG INPUT |
| IGV6SS | I | 1203 | 2132 | GAMMA | ANALOG INPUT |
| IGV7SS | I | 1204 | 2133 | GAMMA | ANALOG INPUT |
| IGV8SS | I | 1205 | 2134 | GAMMA | ANALOG INPUT |
| IGVAO | I | 11F5 | 2118 | GAMMA | ANALOG INPUT |
| IGVCOM | I | 11F6 | 2119 | GAMMA | ANALOG INPUT |
| IGVMAN | I | 11F4 | 2117 | GAMMA | ANALOG INPUT |

| NAME | TYPE | CORE LOC. | KEYBOARD ADR. | AREA | FUNCTION |
|---|---|---|---|---|---|
| INDEX1 | I | 11AE | 2047 | BETA | COUNTER |
| INDEX2 | I | 11AF | 2048 | BETA | COUNTER |
| INDEX3 | I | 11B2 | 2051 | BETA | COUNTER |
| INDEX11 | I | | | PANEL TASK | COUNTER |
| INTSCAN | I | 11C5 | 2070 | BETA | COUNTER |
| INVREQ | L | 13A8 | 1553 | ETA | FLASHING FLAG |
| INVREQX | L | 13B2 | 1563 | ETA | FLASHING FLAG |
| IOLDCT | I | 11C1 | 2066 | BETA | COUNTER |
| IPB | I | 11AA | 2043 | BETA | COUNTER |
| IPBX | I | 11AB | 2044 | BETA | COUNTER |
| IPI | L | 136D | 1494 | ZETA | LOGICAL STATE |
| IPIPB | L | 13C1 | 1578 | THETA | OPERATORS PANEL BUTTON STATE |
| IPIX | L | 136E | 1495 | ZETA | LOGICAL STATE |
| ISCAN | I | 11C2 | 2067 | BETA | COUNTER |
| ISICOUNT | I | 11BA | 2059 | BETA | COUNTER |
| ISPCOUNT | I | 11B4 | 2053 | BETA | COUNTER |
| ITESTAO | I | 1206 | 2135 | GAMMA | ANALOG INPUT |
| ITF | I | 11BC | 2061 | BETA | FLAG |
| ITIME | I | 11CD | 2078 | BETA | COUNTER |
| ITV1SS | I | 11FA | 2123 | GAMMA | ANALOG INPUT |
| ITV2SS | I | 11FB | 2124 | GAMMA | ANALOG INPUT |
| ITV3SS | I | 11FC | 2125 | GAMMA | ANALOG INPUT |
| ITV4SS | I | 11FD | 2126 | GAMMA | ANALOG INPUT |
| ITVAO | I | 11F8 | 2121 | GAMMA | ANALOG INPUT |
| ITVCOM | I | 11F9 | 2122 | GAMMA | ANALOG INPUT |
| ITVMAN | I | 11F7 | 2120 | GAMMA | ANALOG INPUT |
| IVPL | I | 11BB | 2060 | BETA | COUNTER |
| IWINDOW | I | 11B0 | 2049 | BETA | COUNTER |
| LCCO | | 18C0 | | LOGIC TASK | PANEL/STATUS CCO SUBROUTINE |
| LDBX | | 1071 | | LIBRARY | LOAD BIT FUNCTION |
| LEL | R | 122C | 3087 | DELTA | KEYBOARD-ENTERED CONSTANT |
| LLL | R | 12E6 | 4183 | EPSILON | COMPUTED VARIABLE |
| LLLBP | L | 1366 | 1487 | ZETA | LOGICAL STATE |
| LLLMIN | R | 1216 | 3076 | DELTA | KEYBOARD-ENTERED CONSTANT |
| LLX | L | 1367 | 1488 | ZETA | LOGICAL STATE |
| KEYENTRY | L | 11B1 | 1050 | BETA | FLAG |
| M11X | | 0F9F | | LIBRARY | FLOATING MULTIPLY FUNCTION |
| M:AB | | 09B8 | | MONITOR | TASK ABLE HANDLER |
| M:ANI | | 0579 | | MONITOR | ANALOG INPUT HANDLER |
| M:CCO | | 07F7 | | MONITOR | CONTACT OUTPUT HANDLER |
| M:DA | | 09AC | | MONITOR | TASK DISABLE HANDLER |
| M:HT | | 090C | | MONITOR | TASK HALT HANDLER |
| M:IN | | 09CD | | MONITOR | TASK INITIATE (BID) HANDLER |
| M:SPNADJ | | 06B1 | | MONITOR | VIDAR SPAN/ADJUST HANDLER |
| M:TD | | 08F6 | | MONITOR | TIME DELAY HANDLER |
| MANOTRAK | L | 13A3 | 1548 | ETA | FLASHING FLAG |
| MANOTRAKX | L | 13AD | 1558 | ETA | FLASHING FLAG |
| MANTPC | L | 1184 | 1005 | ALPHA | CONTACT INPUT |
| MANTPCX | L | 139C | 1541 | ZETA | LOGICAL STATE |
| MGB | L | 1185 | 1006 | ALPHA | CONTACT INPUT |
| MGBX | L | 1360 | 1481 | ZETA | LOGICAL STATE |
| MON24V | L | 1195 | 1022 | ALPHA | CONTACT INPUT |
| MON24VX | L | 1377 | 1504 | ZETA | LOGICAL STATE |
| MONOPCT | L | 1194 | 1021 | ALPHA | CONTACT INPUT |
| MW | R | 11E0 | 4049 | GAMMA | ANALOG INPUT |
| MWI | L | 1371 | 1498 | ZETA | LOGICAL STATE |
| MWINIT | R | 124A | 3102 | DELTA | KEYBOARD-ENTERED CONSTANT |
| MWIPB | L | 13C3 | 1580 | THETA | OPERATORS PANEL BUTTON STATE |
| MWIX | L | 1372 | 1499 | ZETA | LOGICAL STATE |
| MWMAX | R | 1292 | 3138 | DELTA | KEYBOARD-ENTERED CONSTANT |
| MWTF | L | 1183 | 1004 | ALPHA | CONTACT INPUT |
| NDF | | 3A67 | | LIBRARY | TERMINATE FORMATTED RECORD |
| NOMINS | I | 11C7 | 2072 | BETA | COUNTER |
| NSYNC1 | I | 11C3 | 2068 | BETA | COUNTER |
| NSYNC2 | I | 11C4 | 2069 | BETA | COUNTER |
| NVTEST | I | 11AD | 2046 | BETA | COUNTER |
| OA | L | 1354 | 1469 | ZETA | LOGICAL STATE |
| OACCRATE | R | 12E2 | 4178 | EPSILON | COMPUTED VARIABLE |
| OALITE | L | 137E | 1511 | ZETA | LOGICAL STATE |
| OALITEX | L | 1387 | 1520 | ZETA | LOGICAL STATE |
| OARATMAX | R | 1212 | 3074 | DELTA | KEYBOARD-ENTERED CONSTANT |
| OAX | L | 1355 | 1470 | ZETA | LOGICAL STATE |
| ODMD | R | 12E0 | 4177 | EPSILON | COMPUTED VARIABLE |

| NAME | TYPE | CORE LOC. | KEYBOARD ADR. | AREA | FUNCTION |
|---|---|---|---|---|---|
| OOMOLMAX | R | 121C | 3073 | DELTA | KEYBOARD-ENTERED CONSTANT |
| OFFSET(1) | R | 1450 | 3361 | LAMBDA | KEYBOARD-ENTERED CONSTANT |
| OFFSET(2) | R | 1452 | 3362 | LAMBDA | KEYBOARD-ENTERED CONSTANT |
| OFFSET(3) | R | 1454 | 3363 | LAMBDA | KEYBOARD-ENTERED CONSTANT |
| OLDGVCON | L | 13B1 | 1562 | ETA | FLASHING FLAG |
| OLDREFHL | L | 13AB | 1556 | ETA | FLASHING FLAG |
| OLDREFLL | L | 13AA | 1555 | ETA | FLASHING FLAG |
| OLDTVCON | L | 13B0 | 1561 | ETA | FLASHING FLAG |
| OLDVPLIM | L | 13AC | 1557 | ETA | FLASHING FLAG |
| OLDVSTAT | L | 13AF | 1560 | ETA | FLASHING FLAG |
| OLRATE | R | 12E4 | 4179 | EPSILON | COMPUTED VARIABLE |
| OLRATMAX | R | 1214 | 3075 | DELTA | KEYBOARD-ENTERED CONSTANT |
| OPCOP | L | 1182 | 1003 | ALPHA | CONTACT INPUT |
| OPCOVSPD | L | 1199 | 1026 | ALPHA | CONTACT INPUT |
| OPCOVSPX | L | 1365 | 1486 | ZETA | LOGICAL STATE |
| OPCSPEED | R | 11E6 | 4052 | GAMMA | ANALOG INPUT |
| OPCTEST | L | 119A | 1027 | ALPHA | CONTACT INPUT |
| OPCTF | L | 1181 | 1002 | ALPHA | CONTACT INPUT |
| OPENPB | L | 13DB | 1604 | THETA | OPERATORS PANEL BUTTON STATE |
| OPRT | L | 119B | 1028 | ALPHA | CONTACT INPUT |
| OPRTX | L | 135B | 1476 | ZETA | LOGICAL STATE |
| PERCCI | R | 1298 | 3141 | DELTA | KEYBOARD-ENTERED CONSTANT |
| PERSCAN | L | 137F | 1512 | ZETA | LOGICAL STATE |
| PERSCANX | L | 1380 | 1513 | ZETA | LOGICAL STATE |
| PI | R | 11E2 | 4050 | GAMMA | ANALOG INPUT |
| PISP | R | 1304 | 4195 | EPSILON | COMPUTED VARIABLE |
| PLANTCCI | | 0120 | | SI INTERRUPT | SCAN PLANT CCI SUBROUTINE |
| PO | R | 11E4 | 4051 | GAMMA | ANALOG INPUT |
| POINT(1) | R | 1444 | 3355 | LAMBDA | KEYBOARD-ENTERED CONSTANT |
| POINT(2) | R | 1446 | 3356 | LAMBDA | KEYBOARD-ENTERED CONSTANT |
| POINT(3) | R | 1448 | 3357 | LAMBDA | KEYBOARD-ENTERED CONSTANT |
| POREF | R | 1254 | 3107 | DELTA | KEYBOARD-ENTERED CONSTANT |
| POS(1) | R | 13EC | 3311 | IOTA | KEYBOARD-ENTERED CONSTANT |
| POS(2) | R | 13EE | 3312 | IOTA | KEYBOARD-ENTERED CONSTANT |
| POS(3) | R | 13F0 | 3313 | IOTA | KEYBOARD-ENTERED CONSTANT |
| POS(4) | R | 13F2 | 3314 | IOTA | KEYBOARD-ENTERED CONSTANT |
| POS(5) | R | 13F4 | 3315 | IOTA | KEYBOARD-ENTERED CONSTANT |
| POS(6) | R | 13F6 | 3316 | IOTA | KEYBOARD-ENTERED CONSTANT |
| POSP | R | 123E | 3096 | DELTA | KEYBOARD-ENTERED CONSTANT |
| PRESET | | 26B0 | | CONTROL TASK | PI CONTROLLER SUBROUTINE |
| PRINT(1) | R | 145A | 3366 | LAMBDA | KEYBOARD-ENTERED CONSTANT |
| PRINT(2) | R | 145C | 3367 | LAMBDA | KEYBOARD-ENTERED CONSTANT |
| PRINT(3) | R | 145E | 3368 | LAMBDA | KEYBOARD-ENTERED CONSTANT |
| PRINT(4) | R | 1460 | 3369 | LAMBDA | KEYBOARD-ENTERED CONSTANT |
| PRINT(5) | R | 1462 | 3370 | LAMBDA | KEYBOARD-ENTERED CONSTANT |
| PRINT(6) | R | 1464 | 3371 | LAMBDA | KEYBOARD-ENTERED CONSTANT |
| PRINT(7) | R | 1466 | 3372 | LAMBDA | KEYBOARD-ENTERED CONSTANT |
| PRINT(8) | R | 1468 | 3373 | LAMBDA | KEYBOARD-ENTERED CONSTANT |
| PRINT(9) | R | 146A | 3374 | LAMBDA | KEYBOARD-ENTERED CONSTANT |
| PRINT(10) | R | 146C | 3375 | LAMBDA | KEYBOARD-ENTERED CONSTANT |
| PRINT(11) | R | 146E | 3376 | LAMBDA | KEYBOARD-ENTERED CONSTANT |
| PRINT(12) | R | 1470 | 3377 | LAMBDA | KEYBOARD-ENTERED CONSTANT |
| PRINT(13) | R | 1472 | 3378 | LAMBDA | KEYBOARD-ENTERED CONSTANT |
| PRINT(14) | R | 1474 | 3379 | LAMBDA | KEYBOARD-ENTERED CONSTANT |
| PRINT(15) | R | 1476 | 3380 | LAMBDA | KEYBOARD-ENTERED CONSTANT |
| PRINT(16) | R | 1478 | 3381 | LAMBDA | KEYBOARD-ENTERED CONSTANT |
| PRINT(17) | R | 147A | 3382 | LAMBDA | KEYBOARD-ENTERED CONSTANT |
| PRINT(18) | R | 147C | 3383 | LAMBDA | KEYBOARD-ENTERED CONSTANT |
| PRINT(19) | R | 147E | 3384 | LAMBDA | KEYBOARD-ENTERED CONSTANT |
| RATE | R | 12F6 | 4188 | EPSILON | COMPUTED VARIABLE |
| RB | L | 1191 | 1018 | ALPHA | CONTACT INPUT |
| RBRATE | R | 127A | 3126 | DELTA | KEYBOARD-ENTERED CONSTANT |
| READY | L | 13A4 | 1549 | ETA | FLASHING FLAG |
| READYX | L | 13AE | 1559 | ETA | FLASHING FLAG |
| REI: | | 114B | | LIBRARY | INTEGER FUNCTION RETURN |
| REF | | 39EF | | LIBRARY | INITIATE FORMATTED READ |
| REF1 | R | 12FA | 4190 | EPSILON | COMPUTED VARIABLE |
| REF2 | R | 12FC | 4191 | EPSILON | COMPUTED VARIABLE |
| REFOMD | R | 12F8 | 4189 | EPSILON | COMPUTED VARIABLE |
| REFHLIM | L | 13A1 | 1546 | ETA | FLASHING FLAG |
| REFLLIM | L | 13A0 | 1545 | ETA | FLASHING FLAG |
| RER: | | 115A | | LIBRARY | REAL FUNCTION RETURN |
| RESMW | R | 1312 | 4202 | EPSILON | COMPUTED VARIABLE |
| RESMWX | R | 131E | 4208 | EPSILON | COMPUTED VARIABLE |
| RESPI | R | 1314 | 4203 | EPSILON | COMPUTED VARIABLE |

| NAME | TYPE | CORE LOC. | KEYBOARD ADR. | AREA | FUNCTION |
|---|---|---|---|---|---|
| RESPIX | R | 1320 | 4209 | EPSILON | COMPUTED VARIABLE |
| RESSPD | R | 1310 | 4201 | EPSILON | COMPUTED VARIABLE |
| RESSPDX | R | 1322 | 4210 | EPSILON | COMPUTED VARIABLE |
| RIB: | | 114C | | LIBRARY | INTEGER FUNCTION RETURN |
| RRB: | | 115B | | LIBRARY | REAL FUNCTION RETURN |
| RUNLOGIC | L | 1376 | 1503 | ZETA | LOGICAL STATE |
| RVPLL | L | 118F | 1016 | ALPHA | CONTACT INPUT |
| RVPLR | L | 118E | 1015 | ALPHA | CONTACT INPUT |
| S11X | | 0F23 | | LIBRARY | FLOATING SUBTRACT FUNCTION |
| SAT: | | 10F1 | | LIBRARY | SUBPROGRAM ARGUMENT TRANSFER |
| SBT: | | 10F0 | | LIBRARY | SUBPROGRAM ARGUMENT TRANSFER |
| SECPB | L | 13D1 | 1594 | THETA | OPERATORS PANEL BUTTON STATE |
| SFT: | | 110B | | LIBRARY | STATEMENT FUNCTION TRANSFER |
| SIMAX | R | 1294 | 3139 | DELTA | KEYBOARD-ENTERED CONSTANT |
| SIMMW | R | 1318 | 4205 | EPSILON | COMPUTED VARIABLE |
| SIMPI | R | 131A | 4206 | EPSILON | COMPUTED VARIABLE |
| SIMWS | R | 131C | 4207 | EPSILON | COMPUTED VARIABLE |
| SIO | L | 118A | 1011 | ALPHA | CONTACT INPUT |
| SLLLBP | L | 1388 | 1521 | ZETA | LOGICAL STATE |
| SLOPE(1) | R | 1288 | 3157 | DELTA | KEYBOARD-ENTERED CONSTANT |
| SLOPE(2) | R | 128A | 3158 | DELTA | KEYBOARD-ENTERED CONSTANT |
| SLOPE(3) | R | 128C | 3159 | DELTA | KEYBOARD-ENTERED CONSTANT |
| SLOPE(4) | R | 128E | 3160 | DELTA | KEYBOARD-ENTERED CONSTANT |
| SLOPE(5) | R | 12C0 | 3161 | DELTA | KEYBOARD-ENTERED CONSTANT |
| SP(1) | R | 13E0 | 3305 | IOTA | KEYBOARD-ENTERED CONSTANT |
| SP(2) | R | 13E2 | 3306 | IOTA | KEYBOARD-ENTERED CONSTANT |
| SP(3) | R | 13E4 | 3307 | IOTA | KEYBOARD-ENTERED CONSTANT |
| SP(4) | R | 13E6 | 3308 | IOTA | KEYBOARD-ENTERED CONSTANT |
| SP(5) | R | 13E8 | 3309 | IOTA | KEYBOARD-ENTERED CONSTANT |
| SP(6) | R | 13EA | 3310 | IOTA | KEYBOARD-ENTERED CONSTANT |
| SPAN(1) | R | 144A | 3358 | LAMBDA | KEYBOARD-ENTERED CONSTANT |
| SPAN(2) | R | 144C | 3359 | LAMBDA | KEYBOARD-ENTERED CONSTANT |
| SPAN(3) | R | 144E | 3360 | LAMBDA | KEYBOARD-ENTERED CONSTANT |
| SPD | R | 130E | 4200 | EPSILON | COMPUTED VARIABLE |
| SPDB | R | 1280 | 3129 | DELTA | KEYBOARD-ENTERED CONSTANT |
| SPDLOOP | | 2FB0 | | CONTROL TASK | SPEED FEEDBACK LOOP SUBROUTINE |
| SPDSP | R | 12FE | 4192 | EPSILON | COMPUTED VARIABLE |
| SPI | L | 1373 | 1500 | ZETA | LOGICAL STATE |
| SPIPB | L | 13C5 | 1582 | THETA | OPERATORS PANEL BUTTON STATE |
| SPIX | L | 1374 | 1501 | ZETA | LOGICAL STATE |
| SPTF | L | 1375 | 1502 | ZETA | LOGICAL STATE |
| SPTFX | L | 135E | 1479 | ZETA | LOGICAL STATE |
| STBX | | 1052 | | LIBRARY | STORE BIT FUNCTION |
| STM | L | 1352 | 1467 | ZETA | LOGICAL STATE |
| STMX | L | 1353 | 1468 | ZETA | LOGICAL STATE |
| T1 | R | 1238 | 3093 | DELTA | KEYBOARD-ENTERED CONSTANT |
| T2 | R | 123A | 3094 | DELTA | KEYBOARD-ENTERED CONSTANT |
| T3 | R | 123C | 3095 | DELTA | KEYBOARD-ENTERED CONSTANT |
| T4 | R | 128C | 3135 | DELTA | KEYBOARD-ENTERED CONSTANT |
| TASDMD | R | 1326 | 4212 | EPSILON | COMPUTED VARIABLE |
| TASRATE | R | 1324 | 4211 | EPSILON | COMPUTED VARIABLE |
| TC | L | 1351 | 1466 | ZETA | LOGICAL STATE |
| TCLITE | L | 1383 | 1516 | ZETA | LOGICAL STATE |
| TCLITEX | L | 1384 | 1517 | ZETA | LOGICAL STATE |
| TESTAIMX | R | 12A2 | 3146 | DELTA | KEYBOARD-ENTERED CONSTANT |
| TESTAO | R | 1316 | 4204 | EPSILON | COMPUTED VARIABLE |
| THETA | | 13C0 | | THETA | LABELED COMMON |
| THI | L | 1192 | 1019 | ALPHA | CONTACT INPUT |
| TM | L | 1193 | 1020 | ALPHA | CONTACT INPUT |
| TMW | R | 125A | 3110 | DELTA | KEYBOARD-ENTERED CONSTANT |
| TMX | L | 139D | 1542 | ZETA | LOGICAL STATE |
| TPC | L | 1368 | 1489 | ZETA | LOGICAL STATE |
| TPCPB | L | 13C7 | 1584 | THETA | OPERATORS PANEL BUTTON STATE |
| TPCRATE | R | 127E | 3128 | DELTA | KEYBOARD-ENTERED CONSTANT |
| TPCX | L | 1369 | 1490 | ZETA | LOGICAL STATE |
| TPI | R | 125C | 3111 | DELTA | KEYBOARD-ENTERED CONSTANT |
| TPLIM | L | 139A | 1539 | ZETA | LOGICAL STATE |
| TPLIMX | L | 139B | 1540 | ZETA | LOGICAL STATE |
| TPTF | L | 1180 | 1001 | ALPHA | CONTACT INPUT |
| TRCOM | L | 1385 | 1518 | ZETA | LOGICAL STATE |
| TRCOMX | L | 1386 | 1519 | ZETA | LOGICAL STATE |
| TRPB | L | 13C0 | 1577 | ETA | FLASHING FLAG |
| TRTVGV | L | 139E | 1543 | ZETA | LOGICAL STATE |
| TRTVGVX | L | 139F | 1544 | ZETA | LOGICAL STATE |
| TSOFF | L | 1398 | 1537 | ZETA | LOGICAL STATE |
| TSOFFX | L | 1399 | 1538 | ZETA | LOGICAL STATE |
| TURBSPOF | L | 13D4 | 1597 | THETA | OPERATORS PANEL BUTTON STATE |

| NAME | TYPE | CORE LOC. | KEYBOARD ADR. | AREA | FUNCTION |
|---|---|---|---|---|---|
| TV | L | 13CF | 1592 | THETA | OPERATORS PANEL BUTTON STATE |
| TVBIAS | R | 1308 | 4197 | EPSILON | COMPUTED VARIABLE |
| TVCONT | L | 13A6 | 1551 | ETA | FLASHING FLAG |
| TVDB | R | 1276 | 3124 | DELTA | KEYBOARD-ENTERED CONSTANT |
| TVMAX | L | 1378 | 1505 | ZETA | LOGICAL STATE |
| TVMIN | L | 1382 | 1515 | ZETA | LOGICAL STATE |
| TWS | R | 1258 | 3109 | DELTA | KEYBOARD-ENTERED CONSTANT |
| VIDAROS | L | 136A | 1491 | ZETA | LOGICAL STATE |
| VIDAROSX | L | 1393 | 1532 | ZETA | LOGICAL STATE |
| VPLIM | L | 13A2 | 1547 | ETA | FLASHING FLAG |
| VPLLPB | L | 13D9 | 1602 | THETA | OPERATORS PANEL BUTTON STATE |
| VPLRPB | L | 13D8 | 1601 | THETA | OPERATORS PANEL BUTTON STATE |
| VPOSL | R | 12EA | 4182 | EPSILON | COMPUTED VARIABLE |
| VPOSLINC | R | 124C | 3103 | DELTA | KEYBOARD-ENTERED CONSTANT |
| VPOSLMAX | R | 121A | 3078 | DELTA | KEYBOARD-ENTERED CONSTANT |
| VSP | R | 1306 | 4196 | EPSILON | COMPUTED VARIABLE |
| VSTATCON | L | 13A5 | 1550 | ETA | FLASHING FLAG |
| VSTATUS | L | 13CD | 1590 | THETA | OPERATORS PANEL BUTTON STATE |
| VTESTINC | R | 1250 | 3105 | DELTA | KEYBOARD-ENTERED CONSTANT |
| VTESTPB | L | 13D2 | 1595 | THETA | OPERATORS PANEL BUTTON STATE |
| WR | R | 1224 | 3083 | DELTA | KEYBOARD-ENTERED CONSTANT |
| WRF | | 39FE | | LIBRARY | INITIATE FORMATTED WRITE |
| WS | R | 1334 | 4219 | EPSILON | COMPUTED VARIABLE |
| WSCOURSE | R | 1330 | 4217 | EPSILON | COMPUTED VARIABLE |
| WSDIG | R | 132E | 4216 | EPSILON | COMPUTED VARIABLE |
| WSDIP | R | 1248 | 3101 | DELTA | KEYBOARD-ENTERED CONSTANT |
| WSERROR | R | 1236 | 3092 | DELTA | KEYBOARD-ENTERED CONSTANT |
| WSFINE | R | 1332 | 4218 | EPSILON | COMPUTED VARIABLE |
| WSHPSI | R | 11E8 | 4053 | GAMMA | ANALOG INPUT |
| WSMAX | R | 1284 | 3131 | DELTA | KEYBOARD-ENTERED CONSTANT |
| WSMAXAI | R | 12A4 | 3147 | DELTA | KEYBOARD-ENTERED CONSTANT |
| WSMIN | R | 1282 | 3130 | DELTA | KEYBOARD-ENTERED CONSTANT |
| WSREFMIN | R | 1296 | 3140 | DELTA | KEYBOARD-ENTERED CONSTANT |
| WSTRANS | R | 132C | 4215 | EPSILON | COMPUTED VARIABLE |
| WSWITCH | R | 1256 | 3108 | DELTA | KEYBOARD-ENTERED CONSTANT |
| X | R | 1300 | 4193 | EPSILON | COMPUTED VARIABLE |
| XIT: | | 1127 | | LIBRARY | INTEGER ARITHMETIC EXIT |
| XPERIOD | R | 1458 | 3365 | LAMBDA | KEYBOARD-ENTERED CONSTANT |
| XPRINT | R | 1456 | 3364 | LAMBDA | KEYBOARD-ENTERED CONSTANT |
| XTD: | | 1139 | | LIBRARY | REAL ARITHMETIC EXIT |
| XTIME | R | 1440 | 3353 | LAMBDA | KEYBOARD-ENTERED CONSTANT |
| XUPDATE | R | 1442 | 3354 | LAMBDA | KEYBOARD-ENTERED CONSTANT |
| Y | R | 1302 | 4194 | EPSILON | COMPUTED VARIABLE |
| ZETA | | 1350 | | ZETA | LABELED COMMON |

APPENDIX 2

Glossary of Variable and Parameter Designations for Flowcharts, etc. - ~~Changed~~ According to Core Location and Address

| NAME | TYPE | CORE LOC. | KEYBOARD ADR. | FUNCTION |
|---|---|---|---|---|
| | | | | ALPHA - CONTACT INPUTS |
| TPTF | L | 1180 | 1001 | THROTTLE PRESSURE TRANSDUCER FAILURE |
| OPCTF | L | 1181 | 1002 | OPC TRANSDUCER FAILURE (REHEAT PRESSURE) |
| OPCOP | L | 1182 | 1003 | OPC OPERATING |
| MWTF | L | 1183 | 1004 | MEGAWATT TRANSDUCER FAILURE |
| MANTPC | L | 1184 | 1005 | MANUAL THROTTLE PRESSURE CONTROL |
| MGB | L | 1185 | 1006 | MAIN GENERATOR CIRCUIT BREAKER CLOSED |
| ASUP | L | 1186 | 1007 | AUTOMATIC SYNCHRONIZER RAISE (UP) |
| ASDOWN | L | 1187 | 1008 | AUTOMATIC SYNCHRONIZER LOWER (DOWN) |
| ASPERM | L | 1188 | 1009 | AUTOMATIC SYNCHRONIZER PERMISSIVE |
| | L | 1189 | 1010 | SPARE |
| SIO | L | 118A | 1011 | SET IMPULSE PRESSURE FEEDBACK LOOP OUT |
| ADSUP | L | 118B | 1012 | AUTOMATIC DISPATCH SYSTEM RAISE (UP) |
| ADSDOWN | L | 118C | 1013 | AUTOMATIC DISPATCH SYSTEM LOWER (DOWN) |
| ADSPERM | L | 118D | 1014 | AUTOMATIC DISPATCH SYSTEM PERMISSIVE |
| RVPLR | L | 118E | 1015 | REMOTE VALVE POSITION LIMIT RAISE |
| RVPLL | L | 118F | 1016 | REMOTE VALVE POSITION LIMIT LOWER |
| ASL | L | 1190 | 1017 | AUTO STOP LATCH |

| NAME | TYPE | CØRE LØC. | KEYBØARD ADR. | AREA FUNCTIØN |
|---|---|---|---|---|
| RB | L | 1191 | 1018 | RUNBACK |
| THI | L | 1192 | 1019 | THRØTTLE VALVES HIGH (90% ØPEN) |
| TM | L | 1193 | 1020 | TURBINE MANUAL CØNTRØL |
| MØNØPCT | L | 1194 | 1021 | ØPC TRANSDUCER MØNITØR |
| MØN24V | L | 1195 | 1022 | 24V. PØWER SUPPLY MØNITØR |
| | L | 1196 | 1023 | SPARE |
| | L | 1197 | 1024 | SPARE |
| | L | 1198 | 1025 | SPARE |
| ØPCØVSPD | L | 1199 | 1026 | ØPC ØVERSPEED TEST PERMISSIVE |
| ØPCTEST | L | 119A | 1027 | ØPC TEST |
| ØPRT | L | 119B | 1028 | ØPERATØR MAINTENANCE TEST |

| NAME | TYPE | CØRE LØC. | KEYBØARD ADR. | FUNCTIØN |
|---|---|---|---|---|
| | | | | ALPHA - CØNTACT INPUTS |
| | L | 119C | 1029 | SPARE |
| | L | 119D | 1030 | SPARE |
| | L | 119E | 1031 | SPARE |
| | L | 119F | 1032 | SPARE |
| | L | 11A0 | 1033 | SPARE |
| | L | 11A1 | 1034 | SPARE |
| | L | 11A2 | 1035 | SPARE |
| | L | 11A3 | 1036 | SPARE |
| | L | 11A4 | 1037 | SPARE |
| | L | 11A5 | 1038 | SPARE |
| | L | 11A6 | 1039 | SPARE |
| | L | 11A7 | 1040 | SPARE |
| | L | 11A8 | 1041 | SPARE |
| | L | 11A9 | 1042 | SPARE |
| | | | | BETA - FLAGS/CØUNTERS |
| IPB | I | 11AA | 2043 | PUSHBUTTØN IDENTIFICATIØN - ØPERATØRS PANEL |
| IPBX | I | 11AB | 2044 | PREVIØUS PUSHBUTTØN - ØPERATØRS PANEL |
| FLGWRD | I | 11AC | 2045 | FLAG WØRD - VIDAR ØUT ØF SERVICE |
| NVTEST | I | 11AD | 2046 | NUMBER (IDENTIFICATIØN) ØF VALVE BEING TESTED |
| INDEX1 | I | 11AE | 2047 | INDEX FØR DATA DISPLAY/ENTRY - ØPERATØRS PANEL |
| INDEX2 | I | 11AF | 2048 | INDEX FØR DATA DISPLAY/ENTRY - ØPERATØRS PANEL |
| IWINDØW | I | 11B0 | 2049 | VALUE IN DISPLAY WINDØWS |
| KEYENTRY | L | 11B1 | 1050 | FLAG INDICATING KEYBØARD ENTRY HAS BEEN MADE |
| INDEX3 | I | 11B2 | 2051 | INDEX FØR DATA DISPLAY/ENTRY - ØPERATØRS PANEL |
| DATENTRY | L | 11B3 | 1052 | FLAG INDICATING DATA ENTER BUTTØN PUSHED |
| ISPCØUNT | I | 11B4 | 2053 | CØUNTER FØR DIGITAL SPEED CHANNEL INTERRUPT |
| DECPT | L | 11B5 | 1054 | FLAG INDICATING DECIMAL PØINT BUTTØN PUSHED |
| IDPT | I | 11B6 | 2055 | CØUNTER FØR DECIMAL PØINT PØSITIØN |
| DADR | L | 11B7 | 1056 | FLAG INDICATING DICTIØNARY ADDRESS IS ENTERED |
| IADSUP | I | 11B8 | 2057 | CØUNTER FØR ADS RAISE (UP) |
| IADSDØWN | I | 11B9 | 2058 | CØUNTER FØR ADS LØWER (DØWN) |
| ISICØUNT | I | 11BA | 2059 | CØUNTER FØR SEQUENCE ØF EVENTS INTERRUPT |
| IVPL | I | 11BB | 2060 | CØUNTER FØR VALVE PØSITIØN LIMIT RAISE/LØWER |
| ITF | I | 11BC | 2061 | INTEGER FLAG FØR CCØ TEST |
| ICCØ1 | I | 11BD | 2062 | INTEGER VALUE ØF FIRST CCØ TØ BE TESTED |
| ICCØ2 | I | 11BE | 2063 | INTEGER VALUE ØF LAST CCØ TØ BE TESTED |
| ICØURSE | I | 11BF | 2064 | CØURSE DIGITAL SPEED CHANNEL CØUNT |
| IFINE | I | 11C0 | 2065 | FINE DIGITAL SPEED CHANNEL CØUNT |
| IØLDCT | I | 11C1 | 2066 | DIGITAL SPEED CHANNEL ØLD (LAST) CØUNT |
| ISCAN | I | 11C2 | 2067 | ANALØG SCAN DEH/ATS FLIPFLØP |
| NSYNC1 | I | 11C3 | 2068 | ANALØG SCAN ATS SYNCHRØNIZE CØUNT |
| NSYNC2 | I | 11C4 | 2069 | ANALØG SCAN ATS SYNCHRØNIZE CØUNT |
| INTSCAN | I | 11C5 | 2070 | ANALØG SCAN ATS CØUNTER |
| IDUTY | I | 11C6 | 2071 | CØMPUTER DUTY CYCLE IN PER CENT |
| NØMINS | I | 11C7 | 2072 | PERIØD IN MINUTES FØR DUTY CYCLE MEASUREMENT |
| ICØUNTER(1) | I | 11C8 | 2073 | AUX SYNC CØUNTER - CØNTRØL/VISUAL DISPLAY TASKS |
| ICØUNTER(2) | I | 11C9 | 2074 | AUX SYNC CØUNTER - ANALØG SCAN/FLASH TASKS |
| ICØUNTER(3) | I | 11CA | 2075 | AUX SYNC CØUNTER - ATS PERIØDIC TASK |
| ICØUNTER(4) | I | 11CB | 2076 | AUX SYNC CØUNTER - ATS MESSAGE WRITER TASK |
| ICØUNTER(5) | I | 11CC | 2077 | AUX SYNC CØUNTER - SPARE |
| ITIME | I | 11CD | 2078 | REAL TIME IN HØURS/MINUTES |
| | I | 11CE | 2079 | SPARE |
| | I | 11CF | 2080 | SPARE |
| | I | 11D0 | 2081 | SPARE |
| | I | 11D1 | 2082 | SPARE |
| | I | 11D2 | 2083 | SPARE |
| | I | 11D3 | 2084 | SPARE |

| NAME | TYPE | CORE LOC. | KEYBOARD ADR. | AREA | FUNCTION |
|---|---|---|---|---|---|
| | | BETA - FLAGS/COUNTERS | | | |
| | I | 11D4 | 2085 | SPARE | |
| | I | 11D5 | 2086 | SPARE | |
| | I | 11D6 | 2087 | SPARE | |
| | I | 11D7 | 2088 | SPARE | |
| | I | 11D8 | 2089 | SPARE | |
| | I | 11D9 | 2090 | SPARE | |
| | I | 11DA | 2091 | SPARE | |
| | I | 11DB | 2092 | SPARE | |
| | I | 11DC | 2093 | SPARE | |
| | I | 11DD | 2094 | SPARE | |
| | I | 11DE | 2095 | SPARE | |
| | I | 11DF | 2096 | SPARE | |
| | | GAMMA - ANALOG INPUTS | | | |
| Mw | R | 11E0 | 4049 | MEGAWATTS | |
| PI | R | 11E2 | 4050 | FIRST STAGE (IMPULSE) PRESSURE | |
| PO | R | 11E4 | 4051 | THROTTLE PRESSURE | |
| OPCSPEED | R | 11E6 | 4052 | ANALOG SYSTEM SPEED | |
| wSHPSI | R | 11E8 | 4053 | SUPERVISORY INSTRUMENT SPEED | |
| | R | 11EA | 4054 | SPARE | |
| | R | 11EC | 4055 | SPARE | |
| | R | 11EE | 4056 | SPARE | |
| | R | 11F0 | 4057 | SPARE | |
| | R | 11F2 | 4058 | SPARE | |
| IGVMAN | I | 11F4 | 2117 | GOVERNOR VALVE MANUAL POSITION | |
| IGVAO | I | 11F5 | 2118 | GOVERNOR VALVE COMPUTER POSITION ANALOG OUTPUT | |
| IGVCOM | I | 11F6 | 2119 | GOVERNOR VALVE COMMON POSITION | |
| ITVMAN | I | 11F7 | 2120 | THROTTLE VALVE MANUAL POSITION | |
| ITVAO | I | 11F8 | 2121 | THROTTLE VALVE COMPUTER POSITION ANALOG OUTPUT | |
| ITVCOM | I | 11F9 | 2122 | THROTTLE VALVE COMMON POSITION | |
| ITV1SS | I | 11FA | 2123 | THROTTLE VALVE NO. 1 LVDT | |
| ITV2SS | I | 11FB | 2124 | THROTTLE VALVE NO. 2 LVDT | |
| ITV3SS | I | 11FC | 2125 | THROTTLE VALVE NO. 3 LVDT | |
| ITV4SS | I | 11FD | 2126 | THROTTLE VALVE NO. 4 LVDT | |
| IGV1SS | I | 11FE | 2127 | GOVERNOR VALVE NO. 1 LVDT | |
| IGV2SS | I | 11FF | 2128 | GOVERNOR VALVE NO. 2 LVDT | |
| IGV3SS | I | 1200 | 2129 | GOVERNOR VALVE NO. 3 LVDT | |
| IGV4SS | I | 1201 | 2130 | GOVERNOR VALVE NO. 4 LVDT | |
| IGV5SS | I | 1202 | 2131 | GOVERNOR VALVE NO. 5 LVDT | |
| IGV6SS | I | 1203 | 2132 | GOVERNOR VALVE NO. 6 LVDT | |
| IGV7SS | I | 1204 | 2133 | GOVERNOR VALVE NO. 7 LVDT | |
| IGV8SS | I | 1205 | 2134 | GOVERNOR VALVE NO. 8 LVDT | |
| ITESTAO | I | 1206 | 2135 | TEST ANALOG OUTPUT | |
| | I | 1207 | 2136 | SPARE | |
| | I | 1208 | 2137 | SPARE | |
| | I | 1209 | 2138 | SPARE | |
| | I | 120A | 2139 | SPARE | |
| | I | 120B | 2140 | SPARE | |
| | I | 120C | 2141 | SPARE | |
| | I | 120D | 2142 | SPARE | |
| | I | 120E | 2143 | SPARE | |
| | I | 120F | 2144 | SPARE | |
| | | DELTA - KEYBOARD ENTERED CONSTANTS | | | |
| ODMDLMAX | R | 1210 | 3073 | MAXIMUM OPERATOR LOAD DEMAND | |
| OARATMAX | R | 1212 | 3074 | MAXIMUM OPERATOR ACCELERATION RATE | |
| OLRATMAX | R | 1214 | 3075 | MAXIMUM OPERATOR LOAD RATE | |
| LLLMIN | R | 1216 | 3076 | MINIMUM LOW LOAD LIMIT | |
| HLLMAX | R | 1218 | 3077 | MAXIMUM HIGH LOAD LIMIT | |
| VPOSLMAX | R | 121A | 3078 | MAXIMUM VALVE POSITION LIMIT | |
| | R | 121C | 3079 | SPARE | |
| | R | 121E | 3080 | SPARE | |
| | R | 1220 | 3081 | SPARE | |
| | R | 1222 | 3082 | SPARE | |
| wR | R | 1224 | 3083 | RATED SPEED | |
| HLS | R | 1226 | 3084 | HIGH LIMIT - SPEED CONTROL | |
| HLF | R | 1228 | 3085 | HIGH LIMIT ON SPEED FEEDBACK - LOAD CONTROL | |
| HEL | R | 122A | 3086 | HIGH LIMIT ON MEGAWATT FEEDBACK | |
| LEL | R | 122C | 3087 | LOW LIMIT ON MEGAWATT FEEDBACK | |
| GS1 | R | 122E | 3088 | PROPORTIONAL GAIN - GOVERNOR VALUE SPD. CONTROL | |

| NAME | TYPE | CORE LOC. | KEYBOARD ADR. | FUNCTION |
|---|---|---|---|---|
| | | | | DELTA - KEYBOARD ENTERED CONSTANTS |
| | R | 1230 | 3089 | SPARE |
| GL2 | R | 1232 | 3090 | PROPORTIONAL GAIN - MEGAWATT FEEDBACK LOOP |
| GL3 | R | 1234 | 3091 | PROPORTIONAL GAIN - IMP. PRESSURE FEEDBACK LOOP |
| WSERROR | R | 1236 | 3092 | ALLOWABLE DIFFERENCE - DIGITAL/ANALOG SPEEDS |
| T1 | R | 1238 | 3093 | RESET TIME - GOVERNOR VALVE SPEED CONTROL |
| T2 | R | 123A | 3094 | RESET TIME - MEGAWATT FEEDBACK LOOP |
| T3 | R | 123C | 3095 | RESET TIME - IMPULSE PRESSURE FEEDBACK LOOP |
| POSP | R | 123E | 3096 | THROTTLE PRESSURE CONTROLLER SET POINT |
| CLOSEDB | R | 1240 | 3097 | GOVERNOR VALVE CLOSED DEADBAND - VALVE TEST |
| BTVO | R | 1242 | 3098 | BIAS TO OPEN THROTTLE VALVES |
| BGVO | R | 1244 | 3099 | BIAS TO OPEN GOVERNOR VALVES |
| BGVC | R | 1246 | 3100 | BIAS TO CLOSE GOVERNOR VALVES |
| WSDIP | R | 1248 | 3101 | REQUIRED SPEED DIP TO INDICATE GOVERNOR CONTROL |
| MWINIT | R | 124A | 3102 | INITIAL MEGAWATT PICKUP ON BREAKER CLOSURE |
| VPOSLINC | R | 124C | 3103 | VALVE POSITION LIMIT INCREMENTAL STEP SIZE |
| GVSPMIN | R | 124E | 3104 | MINIMUM GOVERNOR VALVE POSITION FOR PO CONTROL |
| VTESTINC | R | 1250 | 3105 | INCREMENTAL STEP SIZE - VALVE TEST |
| BTVC | R | 1252 | 3106 | BIAS TO CLOSE THROTTLE VALVES |
| POREF | R | 1254 | 3107 | RATED THROTTLE PRESSURE |
| WSWITCH | R | 1256 | 3108 | DIGITAL COURSE/FINE SPEED BREAKPOINT |
| TWS | R | 1258 | 3109 | TIME CONSTANT FOR SIMULATED SPEED |
| TMW | R | 125A | 3110 | TIME CONSTANT FOR SIMULATED MEGAWATTS |
| TPI | R | 125C | 3111 | TIME CONSTANT FOR SIMULATED IMPULSE PRESSURE |
| DBTRKL | R | 125E | 3112 | DEADBAND FOR TRACKING MANUAL LOAD CONTROL |
| DBTRKS | R | 1260 | 3113 | DEADBAND FOR TRACKING MANUAL SPEED CONTROL |
| GR1 | R | 1262 | 3114 | RANGING GAIN - SPEED FEEDBACK ON LOAD CONTROL |
| GR2 | R | 1264 | 3115 | RANGING GAIN - MEGAWATT FEEDBACK |
| GR3 | R | 1266 | 3116 | RANGING GAIN - REFERENCE TO IMP. PRESSURE |
| GR4 | R | 1268 | 3117 | RANGING GAIN - IMP. PRESSURE TO PER CENT |
| GR5 | R | 126A | 3118 | TRACKING GAIN - THROTTLE VALVE SPEED CONTROL |
| GR6 | R | 126C | 3119 | RANGING GAIN - SPEED TO THROTTLE VALVE A/O |
| GR7 | R | 126E | 3120 | RANGING GAIN - SPEED TO GOVERNOR VALVE A/O |
| GR8 | R | 1270 | 3121 | RANGING GAIN - GOVERNOR VALVE SET POINT TO A/O |
| GR9 | R | 1272 | 3122 | TRACKING GAIN - LOAD CONTROL |
| GR10 | R | 1274 | 3123 | TRACKING GAIN - GOVERNOR VALUE SPEED CONTROL |
| TVDB | R | 1276 | 3124 | THROTTLE VALVE DEADBAND FOR CONTINGENCY CHECK |
| GVDB | R | 1278 | 3125 | GOVERNOR VALVE DEADBAND FOR CONTINGENCY CHECK |
| RBRATE | R | 127A | 3126 | RUNBACK RATE FOR LOAD REFERENCE |
| ADSRATE | R | 127C | 3127 | ADS RATE FOR LOAD REFERENCE |
| TPCRATE | R | 127E | 3128 | THROTTLE PRESSURE RATE FOR LOAD REFERENCE |
| SPDB | R | 1280 | 3129 | DEADBAND FOR SPEED FEEDBACK LOOP - LOAD CONTROL |
| WSMIN | R | 1282 | 3130 | MINIMUM VALUE FOR SPEED INPUT CHECK |
| WSMAX | R | 1284 | 3131 | MAXIMUM VALUE FOR SPEED INPUT CHECK |
| AIDBMW | R | 1286 | 3132 | DEADBAND FOR MEGAWATT ANALOG INPUT |
| AIDBPI | R | 1288 | 3133 | DEADBAND FOR IMPULSE PRESSURE ANALOG INPUT |
| GS2 | R | 128A | 3134 | PROPORTIONAL GAIN - THROTTLE VALVE SPD. CONTROL |
| T4 | R | 128C | 3135 | RESET TIME - THROTTLE VALVE SPEED CONTROL |
| GVINIT | R | 128E | 3136 | INITIAL GOVERNOR VALVE POSITION - SPEED CONTROL |
| | R | 1290 | 3137 | SPARE |
| MWMAX | R | 1292 | 3138 | MAXIMUM MEGAWATT OUTPUT |
| SIMAX | R | 1294 | 3139 | MAXIMUM SEG. INTERRUPTS PER HALF SECOND |
| WSREFMIN | R | 1296 | 3140 | MINIMUM REFERENCE SETTING FOR SPEED INPUT CHECK |
| PERCCI | R | 1298 | 3141 | PERIODIC CCI SCAN 1. = YES 0. = NO |
| ATSSCAN | R | 129A | 3142 | ATS SCAN 1. = YES 0. = NO |
| TVMANDB | R | 129C | 3143 | THROTTLE VALVE MANUAL NOT TRACKING DEADBAND |
| GVMANDB | R | 129E | 3144 | GOVERNOR VALVE MANUAL NOT TRACKING DEADBAND |
| ADSMAXT | R | 12A0 | 3145 | MAXIMUM ADS PULSE WIDTH IN TENTHS OF A SECOND |
| TESTAIMX | R | 12A2 | 3146 | MAXIMUM TEST A/O FOR MANUAL/AUTOMATIC TRANSFER |
| WSMAXAI | R | 12A4 | 3147 | MAXIMUM SPEED A/I BIT PATTERN |
| DBTRKREF | R | 12A6 | 3148 | SPEED CONTROL REFERENCE DEADBAND FOR TRACKING |
| | R | 12A8 | 3149 | SPARE |
| | R | 12AA | 3150 | SPARE |
| | R | 12AC | 3151 | SPARE |
| | R | 12AE | 3152 | SPARE |
| | R | 12B0 | 3153 | SPARE |
| | R | 12B2 | 3154 | SPARE |
| | R | 12B4 | 3155 | SPARE |
| | R | 12B6 | 3156 | SPARE |
| SLOPE(1) | R | 12B8 | 3157 | SLOPE FOR MEGAWATT ANALOG INPUT CONVERSION |
| SLOPE(2) | R | 12BA | 3158 | SLOPE FOR IMP. PRESSURE ANALOG INPUT CONVERSION |

| NAME | TYPE | CORE LOC. | KEYBOARD ADR. | FUNCTION |
|---|---|---|---|---|
| | | DELTA - | | KEYBOARD ENTERED CONSTANTS |
| SLOPE(3) | R | 12BC | 3159 | SLOPE FOR THROTTLE PRESSURE ANALOG INPUT CONV. |
| SLOPE(4) | R | 12BE | 3160 | SLOPE FOR ANALOG SPEED ANALOG INPUT CONVERSION |
| SLOPE(5) | R | 12C0 | 3161 | SLOPE FOR SUPERVISORY INST. SPEED ANALOG INPUT |
| | R | 12C2 | 3162 | SPARE |
| | R | 12C4 | 3163 | SPARE |
| | R | 12C6 | 3164 | SPARE |
| | R | 12C8 | 3165 | SPARE |
| | R | 12CA | 3166 | SPARE |
| BINT(1) | R | 12CC | 3167 | INTERCEPT FOR MEGAWATT ANALOG INPUT CONVERSION |
| BINT(2) | R | 12CE | 3168 | INTERCEPT FOR IMP. PRESSURE ANALOG INPUT CONV. |
| BINT(3) | R | 12D0 | 3169 | INTERCEPT FOR THROTTLE PRESSURE ANALOG INPUT |
| BINT(4) | R | 12D2 | 3170 | INTERCEPT FOR ANALOG SPEED ANALOG INPUT CONV. |
| BINT(5) | R | 12D4 | 3171 | INTERCEPT FOR SUPERVISORY INST. SPEED ANALOG IN |
| | R | 12D6 | 3172 | SPARE |
| | R | 12D8 | 3173 | SPARE |
| | R | 12DA | 3174 | SPARE |
| | R | 12DC | 3175 | SPARE |
| | R | 12DE | 3176 | SPARE |
| | | EPSILON - | | COMPUTED VARIABLES |
| ODMD | R | 12E0 | 4177 | OPERATOR SPEED/LOAD DEMAND |
| OACCRATE | R | 12E2 | 4178 | OPERATOR ACCELERATION RATE |
| OLRATE | R | 12E4 | 4179 | OPERATOR LOAD RATE |
| LLL | R | 12E6 | 4180 | LOW LOAD LIMIT |
| HLL | R | 12E8 | 4181 | HIGH LOAD LIMIT |
| VPOSL | R | 12EA | 4182 | VALVE POSITION LIMIT |
| | R | 12EC | 4183 | SPARE |
| | R | 12EE | 4184 | SPARE |
| | R | 12F0 | 4185 | SPARE |
| | R | 12F2 | 4186 | SPARE |
| DEMAND | R | 12F4 | 4187 | SPEED/LOAD DEMAND |
| RATE | R | 12F6 | 4188 | SPEED/LOAD RATE |
| REFDMD | R | 12F8 | 4189 | SPEED/LOAD REFERENCE |
| REF1 | R | 12FA | 4190 | SPEED COMPENSATED LOAD REFERENCE |
| REF2 | R | 12FC | 4191 | MEGAWATT COMPENSATED LOAD REFERENCE |
| SPDSP | R | 12FE | 4192 | SPEED CONTROL SET POINT |
| X | R | 1300 | 4193 | SPEED FEEDBACK FACTOR ON LOAD CONTROL |
| Y | R | 1302 | 4194 | MEGAWATT FEEDBACK FACTOR ON LOAD CONTROL |
| PISP | R | 1304 | 4195 | IMPULSE PRESSURE SET POINT ON LOAD CONTROL |
| VSP | R | 1306 | 4196 | GOVERNOR VALVE SET POINT IN PSI FOR IMP. PRESS. |
| TVBIAS | R | 1308 | 4197 | THROTTLE VALVE BIAS INTEGRATOR |
| GVSP | R | 130A | 4198 | GOVERNOR VALVE SET POINT IN PER CENT |
| GVBIAS | R | 130C | 4199 | GOVERNOR VALVE BIAS INTEGRATOR |
| SPD | R | 130E | 4200 | SPEED CONTROL SET POINT IN PER CENT |
| RESSPD | R | 1310 | 4201 | SPEED CONTROLLER - INTEGRAL OUTPUT |
| RESMW | R | 1312 | 4202 | MEGAWATT CONTROLLER - INTEGRAL OUTPUT |
| RESPI | R | 1314 | 4203 | IMP. PRESSURE CONTROLLER - INTEGRAL OUTPUT |
| TESTAO | R | 1316 | 4204 | VALVE TEST ANALOG OUTPUT |
| SIMMW | R | 1318 | 4205 | SIMULATED MEGAWATT FEEDBACK |
| SIMPI | R | 131A | 4206 | SIMULATED IMPULSE PRESSURE FEEDBACK |
| SIMWS | R | 131C | 4207 | SIMULATED SPEED FEEDBACK |
| RESMWX | R | 131E | 4208 | LAST INPUT TO MEGAWATT CONTROLLER ALGORITHM |
| RESPIX | R | 1320 | 4209 | LAST INPUT TO IMP. PRESS. CONTROLLER ALGORITHM |
| RESSPDX | R | 1322 | 4210 | LAST INPUT TO SPEED CONTROLLER ALGORITM |
| TASRATE | R | 1324 | 4211 | AUTOMATIC TURBINE STARTUP ACCELERATION RATE |
| TASDMD | R | 1326 | 4212 | AUTOMATIC TURBINE STARTUP SPEED DEMAND |
| CDLRATE | R | 1328 | 4213 | COMPUTER DATA LINK SPEED/LOAD RATE |
| CDLDMD | R | 132A | 4214 | COMPUTER DATA LINK SPEED/LOAD DEMAND |
| WSTRANS | R | 132C | 4215 | SPEED AT THROTTLE/GOVERNOR VALVE TRANSFER |
| WSDIG | R | 132E | 4216 | COMPUTED DIGITAL SPEED |
| WSCOURSE | R | 1330 | 4217 | COMPUTED DIGITAL COURSE SPEED |
| WSFINE | R | 1332 | 4218 | COMPUTED DIGITAL FINE SPEED |
| WS | R | 1334 | 4219 | SELECTED SPEED USED BY CONTROL SYSTEM |
| GVPOS | R | 1136 | 4220 | CHARACTERIZED GOVERNOR VALVE POSITION |
| | R | 1338 | 4221 | SPARE |
| | R | 133A | 4222 | SPARE |
| | R | 133C | 4223 | SPARE |
| | R | 133E | 4224 | SPARE |
| | R | 1340 | 4225 | SPARE |
| | R | 1342 | 4226 | SPARE |

| NAME | TYPE | CORE LOC. | KEYBOARD ADR. | FUNCTION |
|---|---|---|---|---|
| | | EPSILON - | COMPUTED VARIABLES | |
| | R | 1344 | 4227 | SPARE |
| | R | 1346 | 4228 | SPARE |
| | R | 1348 | 4229 | SPARE |
| | R | 134A | 4230 | SPARE |
| | R | 134C | 4231 | SPARE |
| | R | 134E | 4232 | SPARE |
| | | ZETA - | LOGICAL STATES | |
| GC | L | 1350 | 1465 | GOVERNOR CONTROL FLIPFLOP |
| TC | L | 1351 | 1466 | THROTTLE CONTROL STATE |
| STM | L | 1352 | 1467 | SET TURBINE MANUAL STATE |
| STMX | L | 1353 | 1468 | PREVIOUS STATE OF STM |
| OA | L | 1354 | 1469 | OPERATOR AUTOMATIC STATE |
| OAX | L | 1355 | 1470 | PREVIOUS STATE OF OA |
| AS | L | 1356 | 1471 | AUTOMATIC SYNCHRONIZER FLIPFLOP |
| ADS | L | 1357 | 1472 | AUTOMATIC DISPATCH SYSTEM FLIPFLOP |
| HOLDCP | L | 1358 | 1473 | COMPUTED HOLD STATE |
| GO | L | 1359 | 1474 | GO FLIPFLOP |
| GOX | L | 135A | 1475 | PREVIOUS STATE OF GO |
| OPRTX | L | 135B | 1476 | PREVIOUS STATE OF OPRT |
| HOLD | L | 135C | 1477 | HOLD FLOPFLOP |
| HOLDX | L | 135D | 1478 | PREVIOUS STATE OF HOLD |
| SPTFX | L | 135E | 1479 | PREVIOUS STATE OF SPTF |
| ASLX | L | 135F | 1480 | PREVIOUS STATE OF ASL |
| MGBX | L | 1360 | 1481 | PREVIOUS STATE OF MGB |
| ASUPX | L | 1361 | 1482 | PREVIOUS STATE OF ASUP |
| ASDOWNX | L | 1362 | 1483 | PREVIOUS STATE OF ASDOWN |
| BR | L | 1363 | 1484 | BREAKER FLIPFLOP |
| BRX | L | 1364 | 1485 | PREVIOUS STATE OF BR |
| OPCOVSPX | L | 1365 | 1486 | PREVIOUS STATE OF OPCOVSPD |
| LLLBP | L | 1366 | 1487 | LOW LOAD LIMIT BYPASS FLIPFLOP |
| LLX | L | 1367 | 1488 | PREVIOUS STATE OF LLLBP |
| TPC | L | 1368 | 1489 | THROTTLE PRESSURE CONTROL IN/OUT FLIPFLOP |
| TPCX | L | 1369 | 1490 | PREVIOUS STATE OF TPC |
| VIDAROS | L | 136A | 1491 | VIDAR OUT OF SERVICE STATE |
| CADSUP | L | 136B | 1492 | COUNT ADS UP FLIPFLOP |
| CADSDOWN | L | 136C | 1493 | COUNT ADS DOWN FLIPFLOP |
| IPI | L | 136D | 1494 | IMPULSE PRESSURE FEEDBACK IN/OUT FLIPFLOP |
| IPIX | L | 136E | 1495 | PREVIOUS STATE OF IPI |
| ADSUPX | L | 136F | 1496 | PREVIOUS STATE OF ADSUP |
| ADSDOWNX | L | 1370 | 1497 | PREVIOUS STATE OF ADSDOWN |
| MWI | L | 1371 | 1498 | MEGAWATT FEEDBACK LOOP IN/OUT FLIPFLOP |
| MWIX | L | 1372 | 1499 | PREVIOUS STATE OF MWI |
| SPI | L | 1373 | 1500 | SPEED FEEDBACK LOOP IN/OUT FLIPFLOP |
| SPIX | L | 1374 | 1501 | PREVIOUS STATE OF SPI |
| SPTF | L | 1375 | 1502 | SPEED TRANSDUCER FAILURE STATE |
| RUNLOGIC | L | 1376 | 1503 | RUN LOGIC PROGRAM STATE |
| MON24VX | L | 1377 | 1504 | PREVIOUS STATE OF MON24V |
| TVMAX | L | 1378 | 1505 | THROTTLE VALVES AT MAXIMUM POSITION STATE |
| GVMIN | L | 1379 | 1506 | GOVERNOR VALVES AT MINIMUM POSITION STATE |
| GVMAX | L | 137A | 1507 | GOVERNOR VALVES AT MAXIMUM POSITION STATE |
| GOHOLDOF | L | 137B | 1508 | SET GO/HOLD OFF STATE |
| ASX | L | 137C | 1509 | PREVIOUS STATE OF AS |
| ADSX | L | 137D | 1510 | PREVIOUS STATE OF ADS |
| OALITE | L | 137E | 1511 | OPERATOR AUTOMATIC LIGHT STATE |
| PERSCAN | L | 137F | 1512 | PERIODIC LCI SCAN STATE |
| PERSCANX | L | 1380 | 1513 | PREVIOUS STATE OF PERSCAN |
| GCX | L | 1381 | 1514 | PREVIOUS STATE OF GC |
| TVMIN | L | 1382 | 1515 | THROTTLE VALVES AT MINIMUM POSITION STATE |
| TCLITE | L | 1383 | 1516 | THROTTLE CONTROL LIGHT FLIPFLOP |
| TCLITEX | L | 1384 | 1517 | PREVIOUS STATE OF TCLITE |
| TRCOM | L | 1385 | 1518 | TV/GV TRANSFER COMPLETE FLIPFLOP |
| TRCOMX | L | 1386 | 1519 | PREVIOUS STATE OF TRCOM |
| OALITEX | L | 1387 | 1520 | PREVIOUS STATE OF OALITE |
| SLLLBP | L | 1388 | 1521 | SET LOW LOAD LIMIT BYPASS STATE |
| ATS | L | 1389 | 1522 | AUTOMATIC TURBINE STARTUP FLIPFLOP |
| ATSX | L | 138A | 1523 | PREVIOUS STATE OF ATS |
| ADSINC | L | 138B | 1524 | ADS INCREMENT FLIPFLOP |
| ADSDEC | L | 138C | 1525 | ADS DECREMENT FLIPFLOP |

| NAME | TYPE | CORE LOC. | KEYBOARD ADR. | FUNCTION |
|---|---|---|---|---|
| | | ZETA - LOGICAL STATES | | |
| ASINC | L | 138D | 1526 | AUTO SYNC INCREMENT FLIPFLOP |
| ASDEC | L | 138E | 1527 | AUTO SYNC DECREMENT FLIPFLOP |
| AIFAILMW | L | 138F | 1528 | MEGAWATT ANALOG INPUT FAILURE STATE |
| AIFAILPI | L | 1390 | 1529 | IMP. PRESSURE ANALOG INPUT FAILURE STATE |
| AIFAILMX | L | 1391 | 1530 | PREVIOUS STATE OF AIFAILMW |
| AIFAILPX | L | 1392 | 1531 | PREVIOUS STATE OF AIFAILPI |
| VIDAROSX | L | 1393 | 1532 | PREVIOUS STATE OF VIDAROS |
| DIGSPDF | L | 1394 | 1533 | DIGITAL SPEED CHANNEL FAILURE |
| DIGSPDFX | L | 1395 | 1534 | PREVIOUS STATE OF DIGSPDF |
| ANASPDF | L | 1396 | 1535 | ANALOG SPEED CHANNEL FAILURE |
| ANASPDFX | L | 1397 | 1536 | PREVIOUS STATE IF ANASPDFX |
| TSOFF | L | 1398 | 1537 | TURBINE SUPERVISION OFF STATE |
| TSOFFX | L | 1399 | 1538 | PREVIOUS STATE OF TSOFF |
| TPLIM | L | 139A | 1539 | THROTTLE PRESSURE LIMITING STATE |
| TPLIMX | L | 139B | 1540 | PREVIOUS STATE OF TPLIM |
| MANTPCX | L | 139C | 1541 | PREVIOUS STATE OF MANTPC |
| TMX | L | 139D | 1542 | PREVIOUS STATE OF TM |
| TRTVGV | L | 139E | 1543 | TV/GV TRANSFER INITIATED STATE |
| TRTVGVX | L | 139F | 1544 | PREVIOUS STATE OF TRTVGV |
| | | ETA - FLASHING FLAGS | | |
| REFLLIM | L | 13A0 | 1545 | REFERENCE LOW LOAD LIMITING STATE |
| REFHLIM | L | 13A1 | 1546 | REFERENCE HIGH LOAD LIMITING STATE |
| VPLIM | L | 13A2 | 1547 | VALVE POSITION LIMITING STATE |
| MANOTRAK | L | 13A3 | 1548 | MANUAL SYSTEM NOT TRACKING AUTO SYSTEM STATE |
| READY | L | 13A4 | 1549 | CONTROL SYSTEM READY TO TRANSFER TO AUTOMATIC |
| VSTATCON | L | 13A5 | 1550 | VALVE STATUS CONTINGENCY STATE |
| TVCONT | L | 13A6 | 1551 | THROTTLE VALVE CONTINGENCY STATE |
| GVCONT | L | 13A7 | 1552 | GOVERNOR VALVE CONTINGENCY STATE |
| INVREQ | L | 13A8 | 1553 | INVALID REQUEST STATE |
| | L | 13A9 | 1554 | SPARE |
| OLDREFLL | L | 13AA | 1555 | MEMORY OF REFLLIM FOR FLASHING |
| OLDREFHL | L | 13AB | 1556 | MEMORY OF REFHLIM FOR FLASHING |
| OLDVPLIM | L | 13AC | 1557 | MEMORY OF VPLIM FOR FLASHING |
| MANOTRAKX | L | 13AD | 1558 | MEMORY OF MANOTRAK FOR FLASHING |
| READYX | L | 13AE | 1559 | MEMORY OF READY FOR FLASHING |
| OLDVSTAT | L | 13AF | 1560 | MEMORY OF VSTATCON FOR FLASHING |
| OLDTVCON | L | 13B0 | 1561 | MEMORY OF TVCONT FOR FLASHING |
| OLDGVCON | L | 13B1 | 1562 | MEMORY OF GVCONT FOR FLASHING |
| INVREQX | L | 13B2 | 1563 | MEMORY OF INVREQ FOR FLASHING |
| | L | 13B3 | 1564 | SPARE |
| CCOREFLL | L | 13B4 | 1565 | STATUS CONTACT OUTPUT FOR REFLLIM |
| CCOREFHL | L | 13B5 | 1566 | STATUS CONTACT OUTPUT FOR REFHLIM |
| CCOVPLIM | L | 13B6 | 1567 | STATUS CONTACT OUTPUT FOR VPLIM |
| CCOMANOTRAK | L | 13B7 | 1568 | STATUS CONTACT OUTPUT FOR MANOTRAK |
| CCOREADY | L | 13B8 | 1569 | STATUS CONTACT OUTPUT FOR READY |
| | L | 13B9 | 1570 | SPARE |
| | L | 13BA | 1571 | SPARE |
| | L | 13BB | 1572 | SPARE |
| | L | 13BC | 1573 | SPARE |
| | L | 13BD | 1574 | SPARE |
| | L | 13BE | 1575 | SPARE |
| | L | 13BF | 1576 | SPARE |
| | | THETA - OPERATORS PANEL BUTTON STATES | | |
| TRPB | L | 13C0 | 1577 | TRANSFER TV/GV PUSHBUTTON |
| IPIPB | L | 13C1 | 1578 | IMP. PRESSURE FEEDBACK LOOP IN/OUT PUSHBUTTON |
| | L | 13C2 | 1579 | SPARE |
| MWIPB | L | 13C3 | 1580 | MEGAWATT FEEDBACK LOOP IN/OUT PUSHBUTTON |
| CRESETPB | L | 13C4 | 1581 | CONTROLLER RESET PUSHBUTTON |
| SPIPB | L | 13C5 | 1582 | SPEED FEEDBACK LOOP IN/OUT PUSHBUTTON |
| | L | 13C6 | 1583 | SPARE |
| TPCPB | L | 13C7 | 1584 | THROTTLE PRESSURE CONTROL IN/OUT PUSHBUTTON |
| | L | 13C8 | 1585 | SPARE |
| | L | 13C9 | 1586 | SPARE |
| HOLDPB | L | 13CA | 1587 | HOLD PUSHBUTTON |
| GOPB | L | 13CB | 1588 | GO PUSHBUTTON |
| | L | 13CC | 1589 | SPARE |
| VSTATUS | L | 13CD | 1590 | VALVE STATUS PUSHBUTTON |
| GV | L | 13CE | 1591 | GV PUSHBUTTON |
| TV | L | 13CF | 1592 | TV PUSHBUTTON |
| AUTOSTAR | L | 13D0 | 1593 | TURBINE AUTOMATIC STARTUP PUSHBUTTON |
| SEQPB | L | 13D1 | 1594 | SINGLE/SEQ VALVE OPERATION PUSHBUTTON |
| VTESTPB | L | 13D2 | 1595 | VALVE TEST PUSHBUTTON |

| NAME | TYPE | CORE LOC. | KEYBOARD ADR. | FUNCTION |
|---|---|---|---|---|
| | | THETA - | | OPERATORS PANEL BUTTON STATES |
| DLINK | L | 13D3 | 1596 | COMPUTER DATA LINK PUSHBUTTON |
| TURBSPOF | L | 13D4 | 1597 | TURBINE SUPERVISION OFF PUSHBUTTON |
| ASPB | L | 13D5 | 1598 | AUTOMATIC SYNCHRONIZER PUSHBUTTON |
| ADSPB | L | 13D6 | 1599 | AUTOMATIC DISPATCH SYSTEM PUSHBUTTON |
| | L | 13D7 | 1600 | SPARE |
| VPLRPB | L | 13D8 | 1601 | VALVE POSITION LIMIT RAISE PUSHBUTTON |
| VPLLPB | L | 13D9 | 1602 | VALVE POSITION LIMIT LOWER PUSHBUTTON |
| CLOSEPB | L | 13DA | 1603 | CLOSE PUSHBUTTON |
| OPENPB | L | 13DB | 1604 | OPEN PUSHBUTTON |
| | L | 13DC | 1605 | SPARE |
| | L | 13DD | 1606 | SPARE |
| | L | 13DE | 1607 | SPARE |
| | L | 13DF | 1608 | SPARE |
| | | IOTA = | | GOVERNOR VALVE CURVE |
| SP(1) | R | 13E0 | 3305 | GOVERNOR VALVE CURVE X-AXIS PT. NO. 1 |
| SP(2) | R | 13E2 | 3306 | GOVERNOR VALVE CURVE X-AXIS PT. NO. 2 |
| SP(3) | R | 13E4 | 3307 | GOVERNOR VALVE CURVE X-AXIS PT. NO. 3 |
| SP(4) | R | 13E6 | 3308 | GOVERNOR VALVE CURVE X-AXIS PT. NO. 4 |
| SP(5) | R | 13E8 | 3309 | GOVERNOR VALVE CURVE X-AXIS PT. NO. 5 |
| SP(6) | R | 13EA | 3310 | GOVERNOR VALVE CURVE X-AXIS PT. NO. 6 |
| POS(1) | R | 13EC | 3311 | GOVERNOR VALVE CURVE Y-AXIS PT. NO. 1 |
| POS(2) | R | 13EE | 3312 | GOVERNOR VALVE CURVE Y-AXIS PT. NO. 2 |
| POS(3) | R | 13F0 | 3313 | GOVERNOR VALVE CURVE Y-AXIS PT. NO. 3 |
| POS(4) | R | 13F2 | 3314 | GOVERNOR VALVE CURVE Y-AXIS PT. NO. 4 |
| POS(5) | R | 13F4 | 3315 | GOVERNOR VALVE CURVE Y-AXIS PT. NO. 5 |
| POS(6) | R | 13F6 | 3316 | GOVERNOR VALVE CURVE Y-AXIS PT. NO. 6 |
| | | LAMBDA = | | ANALOG/DIGITAL TREND AND TIME UPDATE DATA |
| XTIME | R | 1440 | 3353 | NEW VALUE FOR TIME UPDATE |
| XUPDATE | R | 1442 | 3354 | TIME UPDATE CODE 1.=.UPDATE 0. = NONE |
| POINT(1) | R | 1444 | 3355 | ANALOG TREND POINT NO. 1 ADDRESS - RED |
| POINT(2) | R | 1446 | 3356 | ANALOG TREND POINT NO. 2 ADDRESS - GREEN |
| POINT(3) | R | 1448 | 3357 | ANALOG TREND POINT NO. 3 ADDRESS - BLUE |
| SPAN(1) | R | 144A | 3358 | ANALOG TREND POINT NO. 1 SPAN |
| SPAN(2) | R | 144C | 3359 | ANALOG TREND POINT NO. 2 SPAN |
| SPAN(3) | R | 144E | 3360 | ANALOG TREND POINT NO. 3 SPAN |
| OFFSET(1) | R | 1450 | 3361 | ANALOG TREND POINT NO. 1 OFFSET |
| OFFSET(2) | R | 1452 | 3362 | ANALOG TREND POINT NO. 2 OFFSET |
| OFFSET(3) | R | 1454 | 3363 | ANALOG TREND POINT NO. 3 OFFSET |
| XPRINT | R | 1456 | 3364 | DIGITAL TREND CODE 0.=NONE 1.=ONCE 2.=PERIODIC |
| XPERIOD | R | 1458 | 3365 | DIGITAL TREND FREQUENCY IN SECONDS |
| PRINT(1) | R | 145A | 3366 | DIGITAL TREND POINT NO. 1 ADDRESS |
| PRINT(2) | R | 145C | 3367 | DIGITAL TREND POINT NO. 2 ADDRESS |
| PRINT(3) | R | 145E | 3368 | DIGITAL TREND POINT NO. 3 ADDRESS |
| PRINT(4) | R | 1460 | 3369 | DIGITAL TREND POINT NO. 4 ADDRESS |
| PRINT(5) | R | 1462 | 3370 | DIGITAL TREND POINT NO. 5 ADDRESS |
| PRINT(6) | R | 1464 | 3371 | DIGITAL TREND POINT NO. 6 ADDRESS |
| PRINT(7) | R | 1466 | 3372 | DIGITAL TREND POINT NO. 7 ADDRESS |
| PRINT(8) | R | 1468 | 3373 | DIGITAL TREND POINT NO. 8 ADDRESS |
| PRINT(9) | R | 146A | 3374 | DIGITAL TREND POINT NO. 9 ADDRESS |
| PRINT(10) | R | 146C | 3375 | DIGITAL TREND POINT NO. 10 ADDRESS |
| PRINT(11) | R | 146E | 3376 | DIGITAL TREND POINT NO. 11 ADDRESS |
| PRINT(12) | R | 1470 | 3377 | DIGITAL TREND POINT NO. 12 ADDRESS |
| PRINT(13) | R | 1472 | 3378 | DIGITAL TREND POINT NO. 13 ADDRESS |
| PRINT(14) | R | 1474 | 3379 | DIGITAL TREND POINT NO. 14 ADDRESS |
| PRINT(15) | R | 1476 | 3380 | DIGITAL TREND POINT NO. 15 ADDRESS |
| PRINT(16) | R | 1478 | 3381 | DIGITAL TREND POINT NO. 16 ADDRESS |
| PRINT(17) | R | 147A | 3382 | DIGITAL TREND POINT NO. 17 ADDRESS |
| PRINT(18) | R | 147C | 3383 | DIGITAL TREND POINT NO. 18 ADDRESS |
| PRINT(19) | R | 147E | 3384 | DIGITAL TREND POINT NO. 19 ADDRESS |

APPENDIX 3

DEH SYSTEM PROGRAMS

In this section the DEH system programs are described in the following order:

Interrupt Programs and Subroutines

Logic Programs

Operator's Panel Programs

Control Programs

PRESET SUBROUTINE

The CALL statement to PRESET provides the linking mechanism for all variables and parameters except the sampling interval (DT). This quantity is referenced in the PRESET program through a COMMON statement which defines the location of DT in the proper block COMMON area labeled DELTA. The PRESET program size is 108 words and the data pool size is 19 words; this requires a total storage of 127 words. The program is normally linked separately and loaded into the computer through the tape reader. The core area assigned to PRESET is from $(26B0 \text{ to } 273F)_{16}$; this is $90_{16}$ $(144_{10})$ locations; this allows $17_{10}$ words spare for future changes or modifications. The first executable location in PRESET is at $26B2_{16}$ and the subroutine requires the library function SAT: for argument transfer handling. PRESET is not a reentrant subroutine and therefore can be called only from the CONTROL task.

PLANTCCI SUBROUTINE

The PLANTCCI subroutine scans all contact inputs to the DEH system and sets full-word logical images of these in designated COMMON areas. The subroutine may be called by the SEQUENCE OF EVENTS program, the COMPUTER STOP/INITIALIZE task, or the AUXILIARY SYNCHRONIZER task. The PLANTCCI subroutine sets lockout prior to running and releases lockout after execution; this allows it to be called from any other program in the DEH system.

The PLANTCCI subroutine is desined so that it has COMMON areas which receive the full-word logical images of the contact input states. The DEH system has four channels of contact inputs; each channel contains 14 bits, thus yielding 56 contacts which must be scanned. Channels 2 and 3, covering the 28 contacts D029 through D056, are assigned to the AUTOMATIC TURBINE STARTUP program; these images are stored in the TACOMCCI COMMON area. Channels 4 and 5, covering the 28 contacts D057 through D084, are assigned to the basic DEH Control System; these images are stored in the ALPHA COMMON area.

The PLANTCCI subroutine is defined by the FORTRAN statement:

SUBROUTINE PLANTCCI

Three counters are first initialized: J counts from 1 to 28 for each group of 28 contacts assigned to the AUTOMATIC TURBINE STARTUP program and the basic DEH system; K counts from 0 to 4 to transfer to each of the contact input channel instructions; L counts from 1 to 2 to identify first the automatic turbine startup contacts and then the basic DEH contacts.

The program executes an Input to or Output from the Accumulator (IOA) assembly language instruction to input through the accumulator the contacts on channel 2. These are saved in a temporary location (IDUMMY) which has been equivalenced with the bit variable (ICCI). A simple FORTRAN DO loop then executes through steps 0 to 13, setting the proper full-word core location to the state of the corresponding contact.

The program repeats this pattern for channels 3, 4 and 5. Prior to returning, the subroutine bids the LOGIC task to run so that the DEH system status may be updated as a consequence of any contact changes. However, should the LOGIC task have been running just prior to PLANTCCI, this bid will be ignored by the Monitor. To guarantee that the LOGIC task runs, the variable RUNLOGIC is also set true, the AUXILIARY SYNCHRONIZER task then detects RUNLOGIC within 1/10 sec and it bids the LOGIC task.

SPDLOOP SUBROUTINE

The SPDLOOP subroutine is designed so that it has access to all quantities through COMMON references. The parameters WR, HLF, GR1, and SPDB are referenced through the DELTA COMMON block; the variables REFDMD, WS, X , and REF1 are accessed through the EPSILON COMMON block. The subroutine structure is given by the FORTRAN statement:

SUBROUTINE SPDLOOP

The subroutine computes the speed error, checks the magnitude of this with a deadband value, converts the result to an equivalent megawatt speed correction factor, and checks against a high limit before returning to the CONTROL task.

The SPDLOOP programs size is 49 words and the data pool size is 10 words; this requires a total storage of 59 words. The program is normally linked separately and loaded into the computer through the tape reader. The core area assigned to the program is from $(2FC2 \text{ to } 2FFF)_{16}$; this is $3E_{16}(62_{10})$ words, allowing a few spare. The first executable location in SPDLOOP is at location $2FC4_{16}$ and the subroutine requires the library function ABS to evaluate the absolute value of speed error. SPDLOOP is not a reentrant subroutine and thus can be called only from the CONTROL task.

AUXILIARY SYNCHRONIZER (AUX SYNC) TASK

The program first checks the CONTROLLER RESET pushbutton on the DEH Operator's Panel; if the button is backlighted, the operator has not acknowledged computer return from a power failure or an out-of-sync condition. When the button is pressed, the AUX SYNC task proceeds to carry out its functions.

The program checks three counters for timing. IVPL is incremented in 1/10 sec steps as long as the VALVE POSITION LIMIT RAISE or LOWER buttons are pressed. CADSUP is similarly incremented as long as the Automatic Dispatch System (ADS) raise contact input is set. CADSDOWN is incremented while the ADS lower contact input is set. Finally, if the RUNLOGIC variable is set, AUX SYNC bids the LOGIC task to run.

The program then initiates a FORTRAN DO loop to check for normal execution of the DEH system periodic tasks. Each entry in the array ICOUNTER is incremented and tested against its maximum count (IMAX). If ICOUNTER has expired, it is reset to zero and transfer is made to appropriate portions of the remaining program. Otherwise the next counter is examined in the same way until all have been tested; at this time the AUX SYNC task exits until the next bid from the Monitor.

When the first ICOUNTER expires, the CONTROL task is bid and a flag (ISCAN) is set for further action in both the AUX SYNC and the ANALOG SCAN tasks. When the second ICOUNTER expires, logical decisions are made on ISCAN and INTSCAN to set up the necessary information to properly execute the ANALOG SCAN task. This task and the FLASH task are then bid to run.

When the third ICOUNTER expires, the AUTOMATIC TURBINE STARTUP (ATS) task is bid. In addition, the VISUAL DISPLAY task is bid if no key entry is being made on the Operator's Panel keyboard. The PLANTCCI subroutine is called if the constant PERCCI has been set non-zero from the keyboard to request a periodic contact input scan. Finally, when the fourth ICOUNTER expires the ATS MESSAGE WRITER task is bid.

The AUX SYNC program communicates with the various counters, flags and variables in the DEH system through the COMMON areas BETA, DELTA, ZETA and THETA. The program size is 135 words, the data pool size is 36 words, and the task header size is 9 words, for a required minimum storage of 180 locations. AUX SYNC is linked as a separate task and is loaded into the computer through the tape reader. The core area assigned to the task is from $(\mathbf{14E0} \text{ to } \mathbf{149F})_{16}$; this is $C0_{16}(192_{10})$ locations, thus allowing some room for expansion.

CCO TEST TASK

The CCO TEST task is assigned priority level 1 and can be bid from the Programmer's Console only. The program first checks invalid entries for ITF, ICCO1 and ICCO2; if invalid, the CCO TEST request is ignored. For valid inputs, the program selects the set or reset pattern for the contact outputs according to the value of ITF, and computes the number of contacts to be sent out according to the values of ICCO1 and ICCO2. A FORTRAN DO loop then ranges through this group, computing the output register and selecting from a table of masks (MTABLE), the proper mask to output each contact. After all contacts have been sent out the CCO TEST task exists.

Use Of CCO Test For Analog Outputs

To use the CCO TEST task for analog outputs it is necessary to understand the hardware and software organization of the DEH system. A total of 32 words of contact and analog outputs are available, with 16 of these assigned to the contact outputs discussed above and the remaining 16 assigned to analog outputs. During initialization of the DEH software system, the Monitor variable PCREG is set to 32 to indicate the total number of contact output registers for use by the CO handler of the Monitor. In addition, the Monitor table PCOCTRL, which is 32 words long, was initialized with the hardware description of the 16 contact output words, followed by the hardware description of the 16 analog output words. This in effect makes the analog output words look like contact output words, and essentially doubles the length of the contact output list. The analog outputs can be considered to be contact outputs starting at C225 and continuing to C448.

However, the analog output printed circuit cards are not the same as the contact output printed circuit cards. Whereas each word of contact outputs has 14 bits associated with it and thus 14 contact outputs, each word of analog output has only 11 bits associated with it. Thus the 11 low-order bits look like contact outputs but the 3 high-order bits are essentially dummy or psuedo outputs.

A description of the analog output words in contact output terminology suitable for use with the CCO TEST task is given in the following table. As an example of setting an analog output, suppose it is desired to set maximum voltage on output word 22; this means it is necessary to set bits 0 through 10 on this word, which in turn means set equivalent contacts C253 through C263 as shown in the table.

SEQUENCE OF EVENTS INTERRUPT PROGRAM

Figure 23:
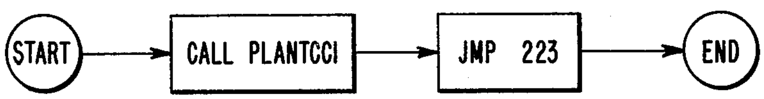
FIG. 23 is a flow chart of the sequence of the events interrupt program which is operable in accordance with the principles of the invention.

A flow chart for the SEQUENCE OF EVENTS INTERRUPT program is shown in FIG. 23. A call is made to the PLANTCCI subrouting to do the contact scanning; return then is to the Monitor interrupt handler indirectly through location 00DF$_{16}$(0023$_{10}$) in the Monitor zero table. The program size is 13 words and the data pool size is 1 word for a required storage of 14 location. The program is normally linked seprately and loaded into the computer through the tape reader. The SEQUENCE OF EVENTS INTERRUPT program has been assigned to core area (0020 to 003F)$_{16}$; this is 20$_{16}$ (32$_{10}$) locations, thus providing some spares.

The sequence of events interrupt is number 2 in the total list of interrupts in the DEH system. The Monitor interrupt transfer table (INTB) must be initialized to contain the location of the SEQUENCE OF EVENTS INTERRUPT program. The table entry is at 0327$_{16}$; the value 0020$_{16}$ must be entered in this location. Normally, this is done with a special SYMBOLIC ASSEMBLY program which defines all interrupt locations, and which is loaded after complete debugging of the DEH system in the field.

BREAKER OPEN INTERRUPT PROGRAM

A call is made to the contact output handler to send a zero analog output to the governor valves. Return is made to the Monitor interrupt handler indirectly through location 00DF$_{16}$(0223$_{10}$) in the Monitor zero table. The program size is 17 words and the data pool size is 5 words for a required storage of 22 locations. The program is normally linked separately and loaded into the computer through the tape reader. The BREAKER OPEN INTERRUPT program has been assigned to core area (116A to 117F)$_{16}$; this is 16$_{16}$(22$_{10}$) locations, thus allowing a few spares.

The breaker open interrupt is number 37 in the total list of interrupts in the DEH system. The Monitor interrupt transfer table (INTB) must be initialized to contain the location of the BREAKER OPEN INTERRUPT program. The table entry is at 034A$_{16}$; the valve of 116A$_{16}$ must be entered in this location. Normally this is done with a special SYMBOLIC ASSEMBLY program which defines all interrupt locations, and which is loaded after complete debugging of the DEH system in the field.

TASK ERROR PROGRAM

A contact output is set to switch the turbine to manual control. A time delay of 1/10 sec is then initiated to

CONTACT OUTPUTS FOR ANALOG OUTPUT WORDS

| WORD | BIT 13 | 12 | 11 | 10 | 9 | 8 | 7 | 6 | 5 | 4 | 3 | 2 | 1 | 0 |
|---|---|---|---|---|---|---|---|---|---|---|---|---|---|---|
| 20 | | | | 235 | 234 | 233 | 232 | 231 | 230 | 229 | 228 | 227 | 226 | 225 |
| 21 | | | | 249 | 248 | 247 | 246 | 245 | 244 | 243 | 242 | 241 | 240 | 239 |
| 22 | | | | 263 | 262 | 261 | 260 | 259 | 258 | 257 | 256 | 255 | 254 | 253 |
| 23 | | | | 277 | 276 | 275 | 274 | 273 | 272 | 271 | 270 | 269 | 268 | 267 |
| 24 | | | | 291 | 290 | 289 | 288 | 287 | 286 | 285 | 284 | 283 | 282 | 281 |
| 25 | | | | 305 | 304 | 303 | 302 | 301 | 300 | 299 | 298 | 297 | 296 | 295 |
| 26 | | | | 319 | 318 | 317 | 316 | 315 | 314 | 313 | 312 | 311 | 310 | 309 |
| 27 | | | | 333 | 332 | 331 | 330 | 329 | 328 | 327 | 326 | 325 | 324 | 323 |
| 30 | | | | 347 | 346 | 345 | 344 | 343 | 342 | 341 | 340 | 339 | 338 | 337 |
| 31 | | | | 361 | 360 | 359 | 358 | 357 | 356 | 355 | 354 | 353 | 352 | 351 |
| 32 | | | | 375 | 374 | 373 | 372 | 371 | 370 | 369 | 368 | 367 | 366 | 365 |
| 33 | | | | 389 | 388 | 387 | 386 | 385 | 384 | 383 | 382 | 381 | 380 | 379 |
| 34 | | | | 403 | 402 | 401 | 400 | 399 | 398 | 397 | 396 | 395 | 394 | 393 |
| 35 | | | | 417 | 416 | 415 | 414 | 413 | 412 | 411 | 410 | 409 | 408 | 407 |
| 36 | | | | 431 | 430 | 429 | 428 | 427 | 426 | 425 | 424 | 423 | 422 | 421 |
| 37 | | | | 445 | 444 | 443 | 442 | 441 | 440 | 439 | 438 | 437 | 436 | 435 |

avert a race condition and to give the analog backup system enough time to switch; after this delay, the contact requesting manual is reset so that automatic control may be selected after the TASK ERROR problem is solved. Return to the Monitor error handler is made indirectly through the C register.

The TASK ERROR program size is 25 words and the data pool size is 5 words for a required storage of 30 words. The program is normally linked spearately and loaded into the computer through the tape reader. The TASK ERROR program is assigned core area (3FE0 to 3FFF$_{16}$; this is 20$_{16}$(32$_{10}$) locations, thus providing a few spares.

TURBINE TRIP INTERRUPT PROGRAM

A call is made to the contact output handler to set a zero analog output to the throttle and governor valves. Return is made to the Monitor interrupt handler indirectly through location 00DF$_{16}$(0223$_{10}$) in the Monitor zero table. The program size is 17 words and the data pool size is 8 words for a required storage of 25 locations. The program is normally linked separately and loaded into the computer through the tape reader. The TURBINE TRIP INTERRUPT program is assigned to core area (14A0 to 14DF)$_{16}$; this is 40$_{16}$(64$_{10}$) locations, thus allowing some spares.

The turbine trip interrupt is number 34 in the total list of interrupts in the DEH system. The Monitor interrupt transfer table (INTB) must be initialized to contain the location of the TURBINE TRIP INTERRUPT program. The table entry is at 0347$_{16}$ and the value 14A0$_{16}$ must be entered in this location. Normally this is done with a special SYMBOLIC ASSEMBLY program which defines all interrupt locations, and which is loaded after complete debugging of the DEH system in the field.

PANEL INTERRUPT PROGRAM

A scan of the panel contact inputs (which are on channel 0) is performed with an IOA instruction. The high-order bits are then masked out so that the six contacts on bits 0 through 5 remain to identify the pushbutton pressed. This information is then stored in location IPB in the BETA COMMON area, the PANEL task is bid, and return is made to the Monitor interrupt handler indirectly through location 00DF$_{16}$(0223$_{10}$) in the Monitor zero table. The program size is 18 words and the data pool size is 3 words for a required storage of 21 words. The program is normally linked separately and loaded into the computer through the tape reader. The PANEL INTERRUPT program has been assigned core area (1480 to 149F)$_{16}$; this is 20$_{16}$(32$_{10}$) locations, thus allowing a few spares for growth.

The panel interrupt is number 33 in the total list of interrupts in the DEH system. The Monitor interrupt transfer table (INTB) must be initialized to contain the location of the PANEL INTERRUPT program. The table entry is at 0346$_{16}$ and the value 1480$_{16}$ must be entered in this location. Normally this is done with a special SYMBOLIC ASSEMBLY program which defines all interrupt locations, and which is loaded after complete debugging of the DEH system in the field.

VALVE INTERRUPT PROGRAM

The VALVE TEST CLOSEPB is interrogated to determine if it was the pushbutton released. If so, the pushbutton flag is reset and the contact output holding the throttle valve in a test close position is reset. If not, the VALVE TEST OPENPB is interrogated to determine if it was the pushbottom released. If so, the pushbuttom flag is reset and the test analog output (TESTAO) is checked to determine if it has been reduced to zero. If not, no further action is taken since the test is not completed. But if the test analog output is zero, then the counter (NVTEST) indicating which valve was being tested is reset to zero and the contact output connecting this test signal to the governor valve servo amplifier is reset.

If neither the CLOSEPB nor the OPENPB has been released, then the VALVE INTERRUPT program concludes that it was a VALVE POSITION LIMIT RAISE or LOWER pushbutton; therefore, both of these are reset and return is made to the Monitor interrupt handler indirectly through location 00DF$_{16}$ (0223$_{10}$) in the Monitor zero table. The VALVE INTERRUPT program size is 62 words and the data pool size is 18 words for a required storage of 80 locations. The program is normally linked separately and loaded into the computer through the tape reader. The VALVE INTERRUPT program is assigned to core area (0040 to 009F$_{16}$; this is 60$_{16}$(96$_{10}$) locations, thus providing some room for growth.

The valve interrupt is number 35 in the total list of interrupts in the DEH system. The Monitor interrupt transfer table (INTB) must be initialized to contain the location of the VALVE INTERRUPT program. The table entry is at 0348$_{16}$ and the valve 0040$_{16}$ must be entered in this location. Normally this is done with a special SYMBOLIC ASSEMBLY program which defines all interrupt locations, and which is loaded after complete debugging of the DEH system in the field.

STOP/INITIALIZE TASK

Although recovery from a power failure is the most common situation in which the STOP/INITIALIZE task will be called on, there is another case during which a precautionary note is necessary. This is the situation in which the SYNCH DISABLE button has been pressed on the CPU maintenance panel to allow special software debugging or reloading to proceed. When SYNCH DISABLE is pressed, the computer outputs are immediately disconnected by special hardware circuitry and the manual backup system holds the turbine at the existing state. Thus, for all intents and purposes the SYNCH DISABLE is identical to a power failure.

However, when return is to be made from SYNCH DISABLE, the following four-step procedure must be carried out at the CPU maintenance panel:

1. Press STOP button.
2. Press RESET button.
3. Press RUN button.
4. Press RESET button.

This will guarantee an orderly restart procedure as described above and minimize the time necessary to place the DEH system on automatic control.

An output instruction is executed to restore the digital speed channel interrupt system, after which all contact and analog outputs are reset by a FORTRAN DO loop which calls the Monitor handler (M:CCO). Then all DEH COMMON areas containing counters or logical variables are reset, thus concluding the clean-up stage of restarting.

In the initializing phase, certain counters in the BETA COMMON are set as follows: ICOUNTER3 is set to 5 so that the AUX SYNC task will then bid the turbine acceleration and supervising task in a fashion to uniformly distribute computer duty cycle; IPBX is set to 1 so that the VISUAL DISPLAY task will begin displaying the turbine REFERENCE; and NOMINS is set to 1 so that the duty cycle task, if it is initiated, will measure DEH duty cycle over 1 min intervals. A call is made to the PLANTCCI subroutine so that a contact ıput scan is activated; this is subroutine in turn bids the ͻGIC task which aligns the DEH Control System to the existing state of the plant. Finally, the CONTROLLER RESET lamp is turned on with a contact output and the logical variable CRESETPB is set. This inhibits the AUX SYNC task from executing any periodic programs until the operator presses the CONTROLLER RESET pushbutton; when he does this, the PANEL task resets CRESETPB, thus allowing AUX SYNC to bid all periodic tasks in the normal pattern.

The STOP/INITIALIZE task is 81 words long, its data pool size is 17 words, and the header size is 9 words for a required storage of 107 locations. STOP/INITIALIZE is linked as a separate task and loaded into the computer through the tape reader. The core area assigned to the task is $(\mathbf{2F40}$ to $\mathbf{2FC1})_{16}$; this is $\mathbf{82}_{16}(\mathbf{130}_{10})$ locations, thus providing spare area for additional functions which may be needed.

VISUAL DISPLAY TASK

The VISUAL DISPLAY TASK IN ON PRIORITY LEVEL 8 and is normally bid by the AUX SYNC task every 1 sec; however, when the operator requests a new display quantity, then VISUAL DISPLAY will be bid initially by the PANEL task.

A description of the display pushbuttons is given in FIG. 31 where there is also included the value of the counter (IPBX) which identifies these buttons to the appropriate DEH programs. Since more of the display pushbuttons in FIG. 31 are dedicated to a single quantity, the programming mechanism to accomplish this function is straight-forward. However, the general DEH parameter display requires a coded address to access the proper quantity in the various COMMON areas. This coding is necessary because the format of the displayed variable may be logical, integer or real (floating point); in addition, the variable may reside in the base DEH area, and thus exist in all systems, or it may reside in the AUTOMATIC TURBINE STARTUP area, and thus be an option which may or may not exist in all systems.

To accommodate these various situations, a dictionary addressing scheme has been designed which will provide access to every combination of variables. In this scheme all addresses are composed of four digits, each of which may validly range from 0 through 9. The most significant digit is coded to indicate the desired variable format (logical, integer or real) and the storage area (base DEH or ATS). The three least significant digits simply point to the relative location of the variable in either the base DEH or the ATS COMMON area.

The following table lists the address structure. The symbols XXX represent relative location in COMMON area and are completely catalogued in the dictionary portion of the operating instructions. The remaining most significant digit and its definition are tabulated.

ADDRESS STRUCTURE

| Address | Definition |
|---|---|
| 1XXX | Base DEH system - logical variable |
| 2XXX | Base DEH system - integer variable |
| 3XXX | Base DEH system - real variable |
| 4XXX | Base DEH system - real constant which may be changed from keyboard under special conditions |
| 5XXX | ATS system - logical variable |
| 6XXX | ATS system - integer variable |
| 7XXX | ATS system - real variable |
| 8XXX | ATS system - real temperature variable |
| 9XXX | ATS system - real pressure variable |

Under normal conditions, the program is bid once a second by the AUX SYNC task. However, when the operator presses a panel pushbutton to request a new display, a separate path to the VISUAL DISPLAY task is taken. The pushbutton generates a panel interrupt which is serviced by the Monitor; this results in the PANEL INTERRUPT program being executed, and after decoding the pushbuttom pressed the PANEL program runs. The PANEL task responds by setting appropriate flags and counters, and then bids the VISUAL DISPLAY task.

Whether called from the AUX SYNC or the PANEL task, the VISUAL DISPLAY program performs its functions the same way. It first checks the appropriate flags and counters previously set, decodes these, selects the proper numerical value from core storage, and then manipulates this value to the correct form. Then the VISUAL DISPLAY task sets up a contact output pattern for the number to be displayed and gates this to the display hardware.

The VISUAL DISPLAY program first reacts to a group of variables which have been set by the PANEL task, and then VISUAL DISPLAY creates another group of variables which will place the proper values in the windows. Concerning those variables generated by the PANEL program, IPBX indicateswhich display pushbutton has been pressed as shown in FIG. 31. INDEX1 and INDEX3 are flags which indicate special action; INDEX1 means a VALVE STATUS or PROGRAM DISPLAY pushbutton has been pressed and thus both display windows should be cleared preparatory to additional keyboard entries; INDEX3 indicates a dedicated pushbutton has been pressed and new values for the dedicated variable are being entered from the keyboard. DATENTRY and DADR are flags associated with changing DEH system constants while INDEX2 is a relative location in a COMMON area indicated by the symbols XXX in the above table.

The DEH system state (BR) is necessary when displaying REFERENCE in order to place the MW or SPEED message in the left-most windows. The state ATS is required when displaying REFERENCE and ACCELERATION RATE since these quantities are set by the ATS program, rather than from the keyboard, when the turbine is being accelerated by computed values from ATS. The state GC is necessary when displaying VALVE POSITION LIMIT since the limited quantity depends on whether the turbine is on throttle or governor control. The DEH system variables, such as REFERENCE, DEMAND, RATES and LIMITS are accessed from appropriate COMMON areas through the use of INDEX2.

ANALOG SCAN TASK

The ANALOG SCAN task is assigned priority level $B_{16}(\mathbf{11}_{10})$ and is bid by the AUX SYNC task every 1/2 sec.

The ANALOG SCAN task communicates with other parts of the DEH system through various COMMON areas. The BETA COMMON contains the variable FLGWRD which is set by the Monitor analog handler to indicate that the A/D converter is out of service. The converted base DEH system analog inputs are stored in the GAMMA COMMON area, while DELTA contains the arrays SLOPE and BINT for conversion of inputs to engineering units. Additional logic states are accessed via ZETA COMMON, while the ATS analog inputs and control words are located in TAAI and TAADBUF.

The program first checks the value of ISCAN, which is set by the AUX SYNC program to indicate whether to scan base DEH inputs or ATS inputs. These groups are each scanned on alternate ½ sec; the AUX SYNC task arranges the timing so that ½ sec prior to bidding the CONTROL task, the ANALOG SCAN task is directed to scan the inputs necessary for the control system. The following ½ sec, while the CONTROL task is running, the AUX SYNC task arranges the timing so that the ANALOG SCAN task will scan a group of ATS inputs. This is done by setting ISCAN=0 for base DEH inputs and ISCAN=1 for ATS inputs.

When ISCAN=0, the Monitor analog handler is called to scan the 15 base DEH inputs. The handler must be provided with a list of control words, one per input, which defines the hardware configuration of each input which are stored in ADBUF1. The P2000 Monitor Reference Manual, TP043, describes the format and function of each bit in these words, but essentially these bits define the channel, bit, multiplexer word and A/D gain setting for each input.

When the A/D converter completes the scanning of these inputs, the raw bit patterns are stored in a temporary buffer (VALBUF). The scan program then executes a FORTRAN DO loop to process these inputs. The two inputs MW and PI are checked for sensor failure against absolute low and high limits, and appropriate action is initiated if either failure occurs.

The remaining 10 base DEH inputs represent governor and throttle valve demand from the analog backup system and the digital system, and the actual LVDT position of each governor and throttle valve. These inputs are not converted but are kept in their raw form until used by the appropriate program. The reason for this is that these quantities are used much less frequently than the above inputs. In addition, the format of these inputs in engineering units is a percent value from 0 to 100; consequently, there is not much advantage to their conversion. However, these values are checked for low sensor limit, and if this occurs, they are set to zero. A portion of the instructions to do this work are written in Assembly language to reduce the program size. The inputs for the valve demands are stored in array ITVGV and the LVDT inputs are stored in array ITVGVSS.

The last action taken in this part of the ANALOG SCAN program is to check the A/D converter. The Monitor analog handlers set the variable FLGWRD if the A/D converter cannot be adjusted to the existing plant conditions; if this flag is set, the converter is said to be out of service and all feedback loops must be removed from the control system.

The variable ISCAN is reset to zero and a GO TO statement is executed; the transfer point depends on the value of INTSCAN, which is incremented once a second and runs from 1 to 10 before being reset back to 1. INTSCAN values 1, 3, 6 and 8 represent intervals of time when no additional work need be done, as can be seen on the timing chart of FIG. 2. INTSCAN values of 2 and 7 (thus being 5 sec apart) transfer to statement 200. Here a second counter (ISPAN) is incremented in steps of 1; when ISPAN=3, this represents a 15 sec interval and thus a SPAN/ADJUST call must be made. As this is done, the counter ISPAN is set back to zero.

When INTSCAN=9, it is time to call for a group of temperature analog inputs; these are scanned in groups of 10, and there are 6 such groups. Thus, the counter NSYNC1 is incremented from 1 to 6 to indicate to the ATS conversion program which group has been input at this time. Also, the variable NSYNC2 is set to −1 to indicate that temperatures are coming in now. Finally, J is a pointer to the proper control words in the ATS COMMON area ITAAI.

When INTSCAN=4, the ATS miscellaneous inputs which are scanned every 10 sec will be input. Statement 400 sets J to the proper pointer and sets NSYNC2=−2 to indicate this fact.

When INTSCAN=5 or 10, transfer is to statement 500 which sets up J to point to the ATS 5 sec vibration inputs. A flag (BIDATSCV) is also set at this point so that the ATS CONVERSION task may be bid further on in this program (note that this conversion task is bid every 5 sec). Finally, the Monitor analog handler is called with the proper pointer to control word tables and buffer areas where the raw bit patterns are stored for the appropriate group of ATS inputs.

The ANALOG SCAN task size is 335 words, its data pool size is 89 words, and its header is 9 words for a required minimum storage of 433 locations. ANALOG SCAN is linked as a separate task and loaded into the computer through the tape reader. The core area assigned to ANALOG SCAN is $(\mathbf{16DO}\text{ to }\mathbf{188F})_{16}$; this is $\mathbf{11CO}_{16}(\mathbf{448}_{10})$ locations, which allows a few spares.

LCCO SUBROUTINE

The subroutine is called only by the LOGIC task and thus is not reentrant. Arguments to the LCCO subroutine include three variables which indicate the appropriate action to be taken, and a pointer to a table of contact output words and bits which define the hardware connections for the quantities which must be set or reset.

The LCCO subroutine is designed so that a call from the LOGIC task provides a list of the variables necessary to evaluate whether or not contact outputs should be actuated and, if so, whether they should be set or reset. Not all calls to LCCO involve the logical pushbutton state; in those cases this argument (LVIPB) is a dummy which satisfies the calling sequence but accomplishes no other significant action. An exclusive-OR test is made on LV and LVX; if they are alike, no further action is taken. If they are different, this means contact outputs must be actuated.

The LCCO program size is 68 words and the data pool size is 92 words for a required storage of 160 locations. The program is normally linked separately and loaded into the computer through the tape reader. The core area assigned to LCCO is $(\mathbf{18DO}\text{ to }\mathbf{196F})_{16}$; this is $\mathrm{AO}_{16}(\mathbf{160}_{10})$ locations, which is exactly that required by the subroutine.

LOGIC TASK

The LOGIC task is assigned priority level 9 and is bid by the AUX SYNC program on demand by other tasks in the DEH system.

Its size is 1092 words, its data pool size is 147 words, and its header is 9 words for a required storage of 1248 locations. LOGIC is linked as a separate task and loaded into the computer through the tape reader. The core area assigned to LOGIC is $(\mathbf{1970}\text{ to }\mathbf{1E5F})_{16}$; this is $\mathbf{4F0}_{16}(\mathbf{1264}_{10})$ locations, which allows a few spares. The LOGIC task is organized as a series of small subprograms which are executed sequentially and which address themselves to particular aspects of the total DEH Control System logical operation. The subprograms are in some cases quite simple, as when monitor lights are turned on or off, and in other cases they are quite complex, as when it is necessary to account for many permissive conditions to allow feedback loops to be put into service.

Flip-Flop Function

The flip-flop is a basic building block of most logic systems, whether the system be of hardware or of software construction. A flip-flop is essentially a memory element which may be set or reset by other logical elements to achieve a desired result. The flip-flop has two input terminals, one for setting and one for resetting (or clearing), and one output terminal, which indicates the state of the flip-flop.

The operation of the flip-flop is as follows. A logically true signal at the set terminal results in a logical true signal at the output terminal, while a logically true signal at the reset terminal produces a logical false signal at the output terminal. Simultaneous logically true signals at both the set and reset terminals yield a logical false signal at the output terminal, thus providing the reset terminal with precedence over the set terminal. Simultaneous logically false signals at both the set and reset terminals yield no change at the output terminal; that is, the output stays at whatever state it had been, thus providing the memory feature of the flip-flop.

The flip-flop function has been incorporated into the DEH system with a FORTRAN FUNCTION statement, thus allowing evaluation of the flip-flop element anywhere in the LOGIC task as an in-line statement.

OPC Test/24 V Monitor Lamps

The OPC TEST and 24 V monitor lamps indicate the status of these systems to the operator. The OPC (Overspeed Protection Controller) is part of the analog backup portion of the DEH system. It continually compares turbine speed with an overspeed set point; should the turbine overspeed, then the backup system immediately provides a large bias to close the governor valves, thus cutting off steam flow and arresting the overspeed condition. The state of the OPC system is controlled from a three-position key-lock switch on the DEH Operator's Panel. Normally, the key-switch is in the mid-position which places the OPC system in service as described above.

Under certain conditions, however, it is desirable to run the turbine at a speed greater than the overspeed set point; this is usually done during initial startup as part of the turbine acceptance. During such times it is necessary to disable the OPC system and to provide a monitor light to indicate the special overspeed test. This is accomplished by switching the key-switch to the right position; the analog OPC system is then disabled and a contact input is sent to the DEH logic system to turn on a monitor lamp located above and to the right of the key-switch. When the overspeed test is completed, the switch is returned to the off position; this enables the OPC system and resets the contact input to the DEH LOGIC task, which then turns off the monitor lamp.

The 24 V monitor lamp is to indicate a failure in the 24 V power supply to the DEH system. The failure is detected by special circuitry in the analog backup system, which switches to an alternate supply and sets a contact input to the DEH system. The LOGIC task then turns on the 24 V monitor lamp which is located on the Operator A Panel. When the power supply problem is corrected, the contact input is reset and the LOGIC task turns off the monitor lamp.

The program to control these monitor lamps consists simply of two calls to the LCCO subroutine with the proper arguments to indicate the required action.

Maintenance Test

The MAINTENANCE TEST system is activated by a two-position key-lock switch on the Operator's Panel. The function of this switch is to allow tuning or adjusting of certain constants in the DEH Control System, or to allow operation of the DEH system in a simulation mode for training purposes. When such tests are to be performed, the maintenace test key is moved to the right position; this immediately switches the turbine to manual control by a wired connection and sets a contact input to the DEH system. The LOGIC task then reacts in three ways: first, a contact output is set which turns on a monitor lamp above and to the right of the maintenance test switch; second, another contact output is set which requests transfer to manual as a backup to the wired connection; and third, the manual-tracking portion of the DEH Control System is disabled.

When the maintenace test action is completed and the test switch returned to the off position, the LOGIC task resets the two contact outputs to turn off the maintenance test lamp and to release the request for manual control. In addition, this part of the program enables the manual-tracking system by resetting the turbine REFERENCE and DEMAND to zero and allowing the normal control programs to run.

Analog/Digital Speed Failure Monitor Lamps

The analog and digital speed failure monitor lamps indicate the status of the analog and digital speed channel inputs to the DEH system. The speed signals supplied by these two channels are generated by independent magnetic pickups and are compared, with the aid of a supervisory instrument speed signal as a third input, in a speed selection system in the CONTROL task. The result of this selection process is passed on to the LOGIC task by the variables ANASPDF and DIGSPDF, which when set, indicate failure of the particular speed input and when reset, indicate valid speed signals. The LOGIC task then places the corresponding monitor lamps in the proper state. The program to control these monitor lamps consists simply of two calls to the LCCO subroutine with the proper arguments to indicate the required action.

ANASPDF is the status of the analog speed channel as determined by the speed selection process, while ANASPDFX is the last value of ANASPDF. DIGSPDF is the status of the digital speed channel as determined by the speed selection process described above, while DIGSPDFX is the last value of DIGSPDF.

Turbine Supervision Off Logic

Figure 41:
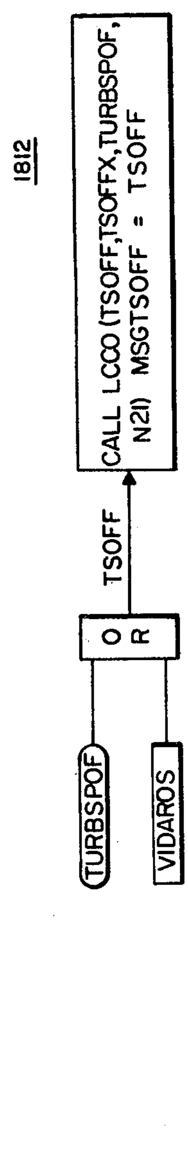
FIG. 41 is a flow chart of a turbine supervision of logic program which is operable in accordance with the principles of the invention.

The logical state (TSOFF) may be set by either the panel pushbutton represented by TURBSPOF or the the A/D converter out of service as given by VIDAROS as shown in FIG. 41. The pushbutton state (TURBSPOF) is generated by the PANEL task while VIDAROS is generated by the ANALOG SCAN task. A call to the LCCO subroutine is then made to update the pushbutton lamp status.

Operation Automatic Logic

The state of manual or automatic operation of the DEH system is actually determined by circuitry in the analog backup system, and the DEH programs simply respond to these states. When the DEH system is in manual control, the analog backup system ignores the computer output signals and positions the valves according to its up/down counter circuitry. Conversely, when the DEH system is in automatic control, the analog backup system uses the computer outputs to position the valves and adjusts its up/down counter to track the computer outputs.

When transfer is made to manual, either by pushbutton or computer request, the analog backup system opens contacts carrying the computer outputs to the valves and simultaneously closes contacts carrying backup system outputs to the valves. In addition, a contact input is sent to the DEH system LOGIC task indicating manual operation. When transfer is made to automatic control by pressing the OPERATOR AUTOMATIC pushbutton, and assuming that the computer system is tracked and ready for automatic, the analog backup system opens contacts carrying its own signals to the valves and simultaneously closes contacts carrying the computer outputs to the valves. The operator automatic logic thus merely updates internal computer variables to the state of manual or automatic control as determined by the backup system.

In updating the DEH system programs to the existing control state, the internal operator automatic variable (OA) is set to the logical inverse of the manual contact input represented by TM. Then a decision is made to determine if the system has just been switched to automatic by comparing OA and its last value (OAX). If automatic has just occurred, ready tracking flags are reset; if not, no action is taken. In either case, the last value (OAX) is set to the current automatic state (OA) for use in the next bid of the LOGIC task.

Go Logic

When the DEH system is on operator automatic control, the turbine speed/load (DEMAND) is entered from the keyboard. The operator then may allow the turbine reference to adjust to the demand by pressing the GO pushbutton. When the operator does this, the GO lamp is turned on and logical states are set to begin moving the reference in the CONTROL task. When the reference equals the demand, the GO lamp is turned off. The GO logic detects the various conditions affecting the GO state and sets the status and lamp accordingly. The GO pushbutton (GOPB), which is updated by the PANEL task, is the set signal for the GO flip-flop. The reset or clear signal, which will override the set signal, can occur from a number of different conditions as follows: the HOLD pushbutton (HOLDPB) as updated by the PANEL task, a computed hold condition (HOLDCP) as set by the CONTROL or LOGIC tasks, the DEH system not being in operator automatic control (OA) or in the maintenance test condition (OPRT) (during which the system may be used as a simulator/-trainer), or the condition in which the reference has reached the demand and the CONTROL task sets the GOHOLDOF state to clear the GO lamp.

Hold Logic

When the DEH system is an operator automatic control, the turbine speed/load (DEMAND) is entered from the keyboard. The operator may then inhibit the turbine reference from adjusting to the demand by pressing the HOLD pushbutton. When the operator does this, the HOLD lamp is turned on and logical states are set to prohibit the reference from moving in the CONTROL task. The HOLD logic detects the various conditions affecting the HOLD state and sets the status and lamp accordingly.

The HOLD pushbutton state (HOLDPB), which is set by the PANEL task, or the hold state (HOLDCP) computed by the CONTROL or LOGIC tasks, acts as the set signal for the HOLD flip-flop. The reset or clear signal, which will override the set signal, can occur from a number of different conditions as follows: the DEH system not being on operator automatic control (OA) or in the maintenance test condition (OPRT) (during which the system may be used as a simulator/-trainer), the GO flip-flop being set and thus overriding the HOLD state, or the condition in which the reference has reached the demand and the CONTROL task sets the GOHOLDOF state to clear the HOLD lamp. The HOLD logic program then resets the computed hold state (HOLDCP) and the GOHOLDOF state, so that they may be used in future decisions by the CONTROL and LOGIC tasks.

Governor Control Logic

Control of turbine steam flow with the governor valves is required during speed and load control. Normally governor control is initiated when the turbine has been accelerated to near synchronous speed, after which the unit is brought up to synchronous speed, synchronized and then loaded with the governor valves as the normal mode of operation.

The governor control logic detects turbine latch and unlatching conditions, transfer from throttle valve to governor valve control, and manual operation of the governor valves. When any of these conditions occur, the governor logic must align the DEH system to the appropriate governor control state.

The governor control flip-flop (GC) may be set by a number of conditions, the most common of which occurs on automatic control when the operator presses the transfer TV/GV pushbutton (TRPB). Assuming that the governor valves are at their maximum open position as indicated by GVMAX and that the automatic turbine startup mode (ATS) is not selected, then the governor flip-flop will be set. An alternate path for setting this flip-flop occurs if the automatic turbine startup program (ATS) requests transfer via the logical variable ATSTRPB. In addition, when the throttle valves reach about 90 percent position, a contact input (THI) is activated by the analog backup system, and this contact sets the GC flip-flop. This last case occurs when the turbine is a manual control. Finally, the governor control flip-flop is reset when the turbine latch contact input (ASL) is released.

Following the GC flip-flop, a decision is made to determine if the system has just switched to governor control by comparing GC with its last state (GCX). If transfer has just occurred, the turbine speed (WS) at this instant is saved as WSTRANS, the speed at throttle/-governor valve transfer. This value is used in the CONTROL task for a special valve position control logic decision. The last operation in the governor control program is to call the LCCO subroutine to update the GC lamp.

Throttle Valve Control Logic

Control of turbine steam flow with the throttle valves is required when the turbine is initially rolled and during speed control up to the point of transfer to governor valve control. After this the throttle valves are kept wide open during normal operation. The throttle control logic detects turbine latch and unlatching conditions, transfer from throttle to governor valve control, and manual operation of the throttle valves. When any of these conditions occur the throttle logic must then align the DEH system to the appropriate throttle control state.

The throttle control state (TC) is simply the logical inverse of the governor control state (GC) when the turbine is latched. However, the throttle control lamp flip-flop (TCLITE) may be set by either TC or by manual operation (TM) while the throttle valves are below 90 percent open as indicated by the contact input (THI) not being set. The TCLITE flip-flop is reset by the contact input (THI) indicating throttle valves wide open or by the turbine latch contact input (ASL) not set.

The throttle control logic also indicates that the transfer from throttle to governor valve state (TRTVGV) is underway when governor control (GC) exists but the throttle valves are not yet wide open. In addition, the transfer complete state (TRCOM) is set when the throttle valves are wide open on governor control as indicated by THI. Finally, the program sets various contact outputs to pass this information on to the plant and operating personnel by calling the LCCO subroutine.

Turbine Latch Logic

Before the turbine can be rolled and accelerated, it must be mechanically latched; this means the hydraulic fluid system must be prepared to move the throttle and governor valves, and a series of safety features as described in the turbine instruction book must be satisfied. After the turbine is latched, if unlatching should occur at any future time during speed or load control, then the control system must trip the turbine and close all valves immediately. The turbine latch logic detects latching or unlatching, and instantly sets the turbine reference and the control system to the proper states. A decision is made to determine if the turbine has just unlatched by comparing the current latch state (ASL) with the last state (ASLX). If unlatched has just occurred, then the DEH turbine reference given by REFDMD, the demand given by ODMD, and the speed integral controller given by RESSPD are immediately reset to zero. If the turbine has not unlatched, then a decision is made to determine if the turbine has just latched by a similar comparison of ASL and ASLX. If the unit has just latched, the DEH reference (REFDMD) and demand (ODMD) are set to the existing speed so that the control system may "catch the unit on the fly" should it be decelerating. The speed integral controller (RESSPD) is set to a zero value, from which point the control system will act to control the throttle valves.

Breaker Logic

The necessary and sufficient condition which must be satisfied when transferring from speed to load control is that the governor valve analog output must remain constant. This may be expressed as:

$$GVAO_{LOAD}=GVAO_{SPEED} \quad (1)$$

The computed values for these outputs may be written by referring to FIG. 43. This diagram shows the path taken by the CONTROL program on initial load control, when the megawatt and impulse pressure feedbacks are out of service, and on speed control prior to breaker closing. The expressions for the two governor valve analog outputs given in Equation (1) above follow.

$$GVAO_{LOAD}=GR8 * GVPOS$$

$$GVAO_{SPEED}=GR7 * SPD$$

These may be substituted into Equation (1) and solved for the governor valve position (GVPOS) in terms of the governor valve speed position (SPD) and ranging gains (GR7 and GR8).

$$GVPOS=GR7/GR8 * SPD \quad (2)$$

The required position (GVPOS) may in turn be related to the governor valve set point (GVSP) and the governor valve characterization curve. This relationship follows.

$$GVPOS=POS(2)/SP(2) * GVSP \quad (3)$$

POS(2) and SP(2) are points on the valve characterization and represent the slope of the first segment of the curve. Substitution of Equation (3) into (2) and solution for GVSP yields the required set point for correct valve position.

$$GVSP=SP(2)/POS(2) * GR7/GR8 * SPD \quad (4)$$

Referring to the load control system an expression for the governor valve set point can be written in terms of additional computed quantities as follows:

$$GVSP=VSP/GR4 \quad (5)$$

VSP is the governor valve set point in psi and GR4 is a ranging constant to convert to percent position. Substitution of Equation (5) into (4) produces the necessary value of VSP.

$$VSP=GR4 * SP(2)/POS(2) * GR7/GR8 * SPD \quad (6)$$

Note that immediately after synchronizing, the impulse pressure loop is out of service. In this case, then the governor valve set point (VSP) in psi is identical to the impulse pressure set point (PISP) in psi. This is given below.

$$VSP=PISP \quad (7)$$

Substitution of Equation (7) into (6) yields the required value of PISP.

$$PISP=GR4 * SP(2)/POS(2) * GR7/GR8 * SPD \quad (8)$$

Now the impulse pressure set point (PISP) can be related to the megawatt set point (REF2) as follows:

$$PISP=GR3 * REF2 \quad (9)$$

GR3 is a ranging gain which converts megawatts to psi. Substitution of Equation (9) into (8) allows computation of REF2.

$$REF2=GR4/GR3 * SP(2)/POS(2) * GR7/GR8 * SPD \quad (10)$$

Note that at the instant of synchronization, the megawatt feedback loop is out of service and that the speed error is essentially zero (otherwise the unit would not have been synchronized). Thus, the expression for the turbine reference is:

$$REFDMD=REF2 \quad (11)$$

Substitution of Equation (11) into (10) yields the desired result:

$$REFDMD=GR4/GR3 * SP(2)/POS(2) * GR7/GR8 * SPD \quad (12)$$

Equation (12) thus gives the required value which must be set into the turbine reference when the main breaker closes to maintain governor valve position on transfer from speed to load control. When this is added to the throttle-pressure modified initial megawatt pickup discussed above, the DEH Control System will make a smooth transfer from speed to load control with no potential motoring action by the turbine.

Figure 44:
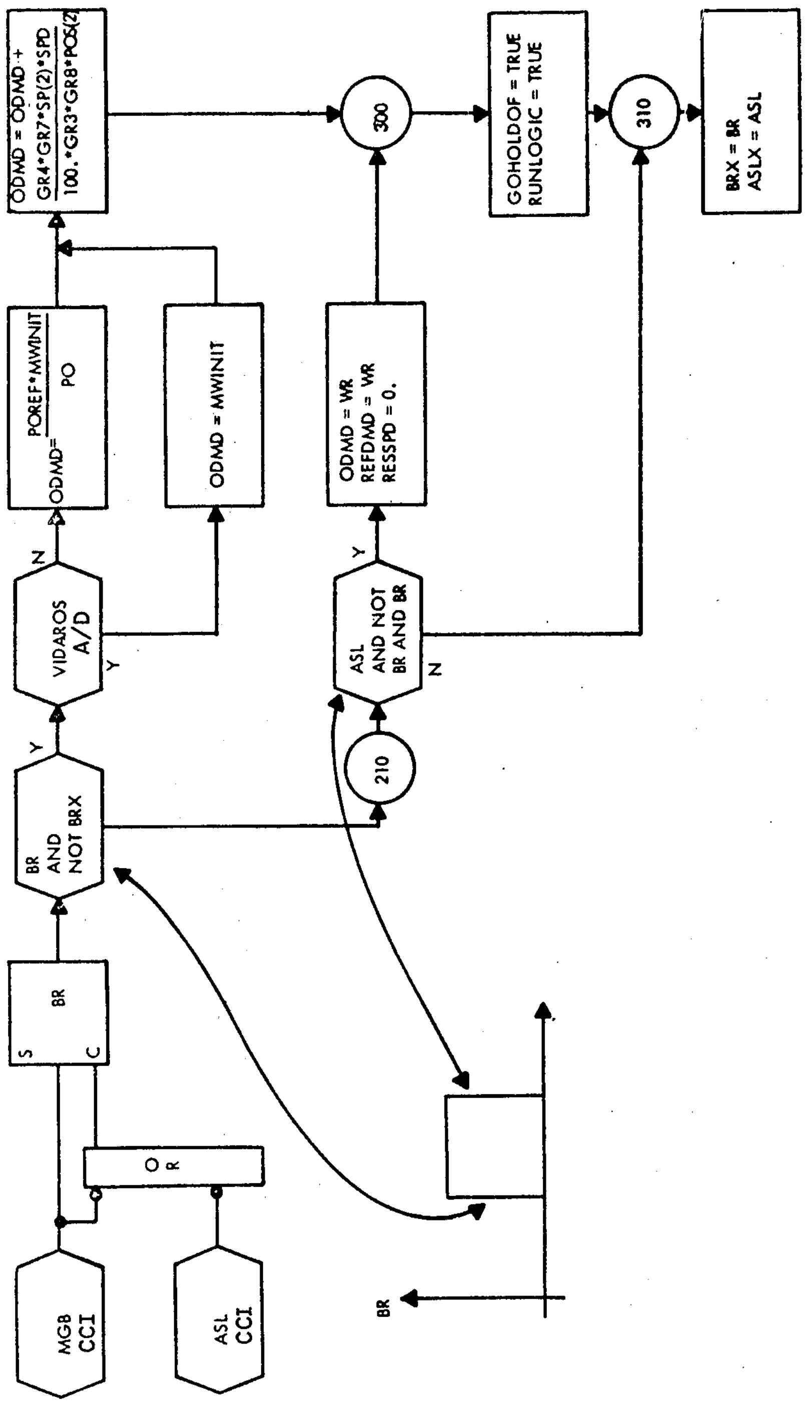
FIG. 44 is a flow chart of a breaker logic program which is operable in accordance with the principles of the invention.

As shown in FIG. 44, the main generator breaker contact input (MGB) sets the breaker flip-flop (BR), while loss of either MGB or the latch contact input (ASL) resets the BR flip-flop. Then a test is made to determine if the breaker just closed by comparing BR with its last state (BRX) as indicated by the leading edge of the BR pulse. If the breaker just closed, then the initial megawatt pickup (MWINIT) modified by throttle pressure ratio is computed as discussed above, the equivalent load governor position as given in Equation (12) is computed, and these are added together to form the new load REFERENCE and DEMAND.

If the breaker did not close, then BR and BRX are tested to see if the breaker opened as indicated by the trailing edge of the BR pulse. If this is the case, the turbine REFERENCE and DEMAND are set to synchronous speed, and logical flags set to rerun the LOGIC task to update the DEH system status. The final operation in the program then is to set the last states (MGBX and ASLX) to the current values of MGB and ASL for succeeding bids of the LOGIC task.

Throttle Pressure Control Logic

Control of throttle pressure in a fossil fired power plant is primarily a function of the boiler control system. Traditional turbine control practice is to react defensively to throttle pressure variations such that protection of the turbine is guaranteed. The DEH Control System is designed to detect throttle pressure below a set point and to runback the turbine reference at a preselected rate until the throttle pressure condition is corrected. For this purpose, the throttle pressure detector 112 of FIG. 1, transmits a signal to the DEH computer which is compared to a predetermined pressure set by keyboard 1816 entry on the Operator's Panel 1130. The throttle pressure control logic allows the throttle pressure controller to be placed in service or to be taken out of service by the operator when the turbine is on automatic control. In addition, this logic will automatically remove the loop from service under certain contingency conditions or when the turbine is in speed control.

Figure 45:
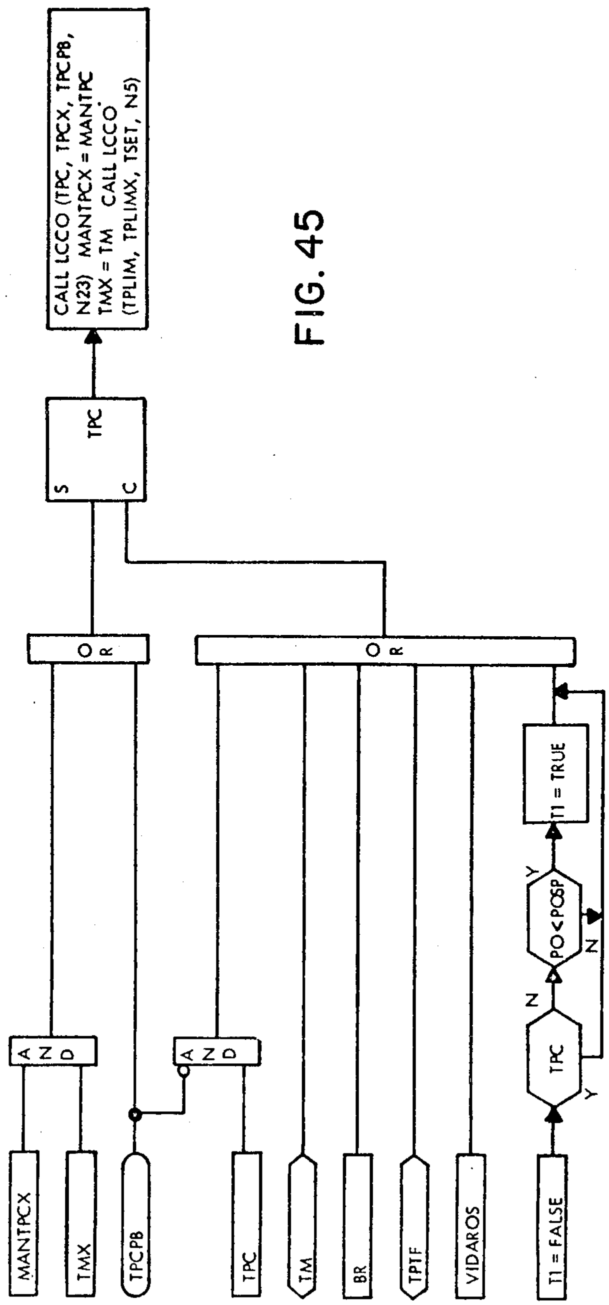
FIG. 45 is a flow chart of a logic pressure control logic subroutine which is operable in accordance with the principles of the invention.

With reference to FIG. 45, the throttle pressure control flip-flop (TPC) may be set by the throttle pressure pushbutton (TPCPB) on the Operator's Panel or by the analog backup system having its throttle pressure controller in service prior to transfer to automatic control; this latter case is given by the last state (MANTPCX) of the contact input (MANTPC) being set while in manual control. The TPC flip-flop is reset by a number of conditions; the panel pushbutton (TPCPB) when the loop is in service, breaker (BR) open, manual operation (TM), throttle pressure transducer failure (TPTF) which is a contact input from the backup system, the analog-to-digital converter out of service (VIDAROS), or an attempt to put the loop in service when the existing throttle pressure (PO) is below the set point (POSP). After evaluation of the TPC flip-flop, the program calls the LCCO subroutine to place the throttle pressure contact outputs in the correct state. Then the last values of the manual control and throttle pressure circuit are updated.

Megawatt Feedback Logic

To place the loop in service bumplessly, it is necessary to maintain constant governor valve position while inserting the magawatt proportional-plus-reset controller in the control system computations. This means that the integrator in this controller must be instantly set to the proper value, the reference must be reset to that value which will yield no change in governor valve position, and proper account must be taken of the speed feedback effect at the instant of putting the loop in service. A derivation of the equations necessary to guarantee these conditions follows.

REF2 is effectively the governor valve set point which must remain fixed in placing the loop in service, REFDMD is the turbine reference, X is the speed feedback effect and REF1 is the speed modified reference. When the loop is placed in service, the proper values of Y, the megawatt feedback factor, and RESMW, the megawatt integrator, must be computed, and REFDMD then readjusted to produce exactly the same value for REF2 to yield bumpless transfer. The necessary and sufficient condition for bumpless transfer then is that REF2 before and after the switching must be identical, as shown in Equation (13).

$$REF2_{IN} = REF2_{OUT} \quad (13)$$

The value of REF2 before the switch is retained in computer memory, whereas the expression for REF2 after the loop is in may be determined result follows.

$$REF2_{IN} = Y * REF1_{IN} \quad (14)$$

Immediately after the switch, the value of REF1 must equal the existing analog input representing megawatts (MW), so that the integrator sees a zero error. Thus, an equation for this condition is:

$$REF1_{IN} = MW \quad (15)$$

Substituting Equations (13) and (15) into (14) and solving for the required value of the megawatt factor (Y) and therefore the megawatt integrator output (RESMW) yields the following result:

$$Y = RESMW = REF2_{OUT}/MW \quad (16)$$

Finally, to guarantee that the transfer will be bumpless the new vaue of REFDMD must be computed as follows.

$$REF1_{IN} = REFDMD_{IN} + X \quad (17)$$

Substituting Equation (15) into (17) and solving for REFDMD completes the required derivation.

$$REFDMD_{IN} = MW - X \quad (18)$$

The steps in the computation may be summarized: compute the new value of Y and RESMW from Equation (16), compute the new value of REFDMD from Equation (18), set the megawatt integrator last input (RESMWX) to zero, and place the loop in service.

To remove the megawatt loop from service bumplessly, a similar set of computations must be followed. The necessary and sufficient condition for bumpless transfer is to retain a constant value for REF2 as follows.

$$REF2_{OUT} = REF2_{IN}$$

The value of REF2 before the switch is retained in computer memory, whereas the expression for REF2 after the switch may be determined as given below.

$$REF2_{OUT} = REF1_{OUT}$$

Immediately after the switch, the value of REF1 must equal the value of REF2 before the switch, since the megawatt loop is now out of service.

$$REF1_{OUT}=REF2_{IN} \quad (19)$$

Finally, to guarantee the bumpless transfer, the new value of the reference REFDMD must be computed to satisfy Equation (19).

$$REF1_{OUT}=REFDMD_{OUT}+X \quad (20)$$

Substituting Equation (19) into (20) and solving for REFDMD yields the final result.

$$REFDMD_{OUT}=REF2_{IN}-X \quad (21)$$

Thus to take the megawatt loop out of service, the reference is reset to the value given in Equation (21) and the monitor lamp indication is reset.

The megawatt pushbutton, represented by MWIPB and updated by the PANEL program, sets the megawatt flip-flop (MWI), while this flip-flop may be reset by a number of conditions as follows: the main breaker (BR) open; a megawatt transducer failure (MWTF), which is a contact input set by the analog backup system; a valve position limit condition as indicated by VPLIM; an analog input failure (AIFAILMW) of the megawatt feedback signal as set by the ANALOG SCAN program; or the analog-to-digital converter out of service (VIDAROS). After evaluation of the megawatt flip-flop, decisions are made to determine if the megawatt loop has just been put into service or just taken out of service, assuming that the main breaker (BR) is closed. If the loop has just been put in, as indicated by the leading edge of the MWI pulse, then the bumpless transfer computations listed in Equations (16) and (18) are executed. If the loop has just come out of service, as indicated by the trailing edge of the MWI pulse, then the bumpless transfer computation listed in Equation (21) is executed. In both cases a call to the LCCO subroutine is made to place the megawatt lamp and two status contact outputs for the megawatt loop in the proper state.

Impulse Pressure Feedback Logic

To place the impulse pressure loop in service bumplessly, it is necessary to maintain the governor valves constant while inserting the impulse pressure proportional-plus-reset controller in the control system computations. This means that the integrator in the controller must be instantly positioned at the proper value. Depending on whether the megawatt feedback loop is in service at this time, one of the following two sets of derivations will be appropriate.

GR3 is a ranging constant which converts the megawatt reference value (REF2) to an impulse pressure set point (PISP) while IPI is the impulse pressure flip-flop. The analog input (PI) is the actual impulse pressure at the instant of placing the loop in service, RESPI is the impulse pressure integrator, and VSP is the governor valve set point. When the loop is put in service, both the integrator values (RESMW and RESPI) must be instantly recomputed to hold the governor valve set point (VSP) constant. Thus to remain bumpless, the following expression must hold.

$$VSP_{IN}=VSP_{OUT}$$

The value of VSP before the switch is retained in computer memory, whereas after the loop is in service, the value of VSP will be given by the integrator (RESPI). Therefore this integrator output must be instantly set to the value of VSP.

$$RESPI=VSP_{OUT} \quad (22)$$

The additional requirement is that the impulse pressure set point (PISP) be identical to the existing impulse pressure analog ouput at the instant of switching so that the integrator sees a zero error. This is satisfied as follows.

$$PISP_{IN}=PI \quad (23)$$

The computed value for PISP now may be written to determine what changes must be made to the megawatt integrator.

$$PISP=GR3 * REF2_{IN} \quad (24)$$

The value of REF2 in turn may be determined in terms of REF1, which does not change when the impulse pressure is switched in since REF1 is upstream of the megawatt loop.

$$REF2_{IN}=Y * REF1 \quad (25)$$

Substituting Equations (23) and (24) into (25), and remembering that the megawatt correction factor (Y) and the megawatt integrator output (RESMW) are equal, the new value which must be given to RESMW may be solved for as follows:

$$RESMW = Y = \frac{PI}{GR3 * REF1} \quad (26)$$

The steps in the computation to place impulse pressure feedback into service when the megawatt loop is already in service may be summarized: compute the new value of the impulse integrator from Equation (22), set the last value of the impulse integrator input (RESPIX) to zero, compute the new value of the megawatt integrator from Equation (26), and place the loop in service.

To remove the impulse pressure feedback from service bumplessly, a similar set of computations must be followed. The necessary and sufficient condition is to hold the value of VSP constant as follows:

$$VSP_{OUT}=VSP_{IN} \quad (27)$$

The value of VSP before the switch will be retained in computer memory, whereas the value of VSP after the switch can be determined when the loop is out.

$$VSP_{OUT}=PISP \quad (28)$$

The set point (PISP) can in turn be computed as follows:

$$PISP=GR3 * REF2 \quad (29)$$

Finally, REF2 may be determined from REF1 which does not change since it is upstream of the megawatt integrator.

$$REF2=Y * REF1 \quad (30)$$

Substituting Equations (27), (28) and (29) into (30), and remembering that the megawatt correction factor (Y) and the megawatt integrator (RESMW) are equal, the new value which must be given to RESMW may be solved for as follows:

$$RESMW = Y = \frac{VSP_{OUT}}{GR3 * REF1} \quad (31)$$

The steps in the computation to remove the impulse pressure feedback from service when the megawatt loop is in service are to compute the new value of the megawatt integrator from Equation (31) and then place the loop out of service.

The above set of computations hold for switching the impulse pressure loop while the megawatt loop is in service. The situation is significantly different when the megawatt loop is out of service, since then the reference must be reset to maintain a bumpless transfer. To put the impulse pressure loop in service bumplessly, it is necessary, as always, to keep the governor valve set point constant.

$$VSP_{IN} = VSP_{OUT}$$

Again, the value of VSP before the switch will be in computer memory. The remaining equations describing the system after the switch may be derived with results as follows:

$$RESPI = VSP_{OUT} \quad (32)$$
$$PISP = PI$$
$$PISP = GR3 * REF2$$
$$REF2 = REF1$$
$$REF1 = REFDMD + X$$

Solving this set of equations for the new value of REFDMD yields the required condition.

$$REFDMD = PI/GR3 - X \quad (33)$$

Thus, to summarize, when placing impulse pressure feedback in service with the megawatt loop out of service, it is necessary to set the impulse integrator (RESPI) to the value given in Equation (32), reset the last input to this integrator (RESPIX) to zero, compute the new reference REFDMD from Equation (33), and place the loop in service.

The last case to cover is that of removing the impulse pressure loop when megawatt feedback is out of service. Once more the governor valves must remain constant to assure bumpless transfer, as indicated below.

$$VSP_{OUT} = VSP_{IN}$$

As always, the value of VSP prior to the switch will be in computer memory. The set of equations describing the computations may be written as follows:

$$VSP_{OUT} = PISP$$

$$PISP = GR3 * REF2$$

$$REF2 = REF1$$

$$REF1 = REFDMD + X$$

Solving this set of equations for the new value of REFDMD yields the required condition.

$$REFDMD = VSP_{IN}/GR3 - X \quad (34)$$

Thus, REFDMD is computed according to Equation (34), the impulse pressure loop is removed, and the transfer proceeds bumplessly.

The impulse pressure pushbutton, represented by IPIPB and updated by the PANEL program, sets the impulse pressure flip-flop (IPI), while a number of conditions may reset the flip-flop as follows: the main breaker (BR) open; a valve position limiting condition as indicated by VPLIM; an analog input failure (AIFAILPI) for the impulse pressure feedback signal as set by the ANALOG SCAN task; the analog-to-digital converter out of service (VISAROS); or a contact input (SIO) to set impulse pressure out of service when in the automatic dispatch system (ADS) mode. After evaluation of the impulse pressure flip-flop (IPI), decisions are made to determine if the loop has just been put into service or just taken out of service assuming that the main breaker (BR) is closed. If the loop has just come in, as indicated by "the leading edge of the IPI pulse, " then the bumpless transfer computations discussed and derived above and evaluated. If the loop has just come out, as indicated by "the trailing edge of the IPI pulse, " then again appropriate bumpless transfer conditions are evaulated as discussed above. An additional decision is made on MWI as to whether or not the megawatt feedback loop is in service. As derived above, the form of the bumpless transfer computations depends on the state of the megawatt loop. After all expressions are evaluated, calls are made to the LCCO subroutine to place the impulse pressure lamp and two status contact outputs in the proper state.

Speed Feedback Logic

The speed feedback loop is critically important when the turbine is on automatic speed control, and is of somewhat less importance on load control. Without speed feedback on automatic speed control, the DEH system must reject to manual operation, while on automatic load control the DEH system merely removes the speed feedback loop from service. The operator may place the speed loop back in service after it has been rejected by pressing the speed loop pushbutton, providing the speed inputs have in the meantime been corrected and are again valid.

Once the speed feedback loop is in service, the operator cannot take it out of service, since standard turbine control practice requires speed in service at all times if the input signals are valid. Thus when the loop is in service pressing the pushbutton is ignored. The only mechanism for taking the loop out of service is by automatic action of the DEH system programs when a speed transducer failure occurs. The speed feedback logic program responds to those conditions which will activate or deactivate the speed loop, whether the conditions be an operator pushbutton request or automatic rejection by the transducer failure.

Automatic Synchronizer Logic

The auto sync flip-flop (AS) may be set by the auto sync pushbutton (ASPB) or by the automatic turbine startup program request (ATSASPB), provided in both cases that the unit is on automatic control (OA), the breaker (BR) is open, the turbine is on governor control (GC), and the automatic synchronizer equipment permissive contact input (ASPERM) is set. Otherwise the AS flip-flop will be rest. Decisions are then made to determine if the AS flip-flop has just come on. If AS just came on, the temporary variable (T3) is set to indicate a remote control transfer for later logic programs. Then a call is made to the LCCO subroutine to set the auto sync lamp to the correct state; arguments in the call consist of the current state of AS, the last state (ASX), the auto sync pushbutton state (ASPB) which must be aligned with the AS flip-flop, and a pointer (N9) to a table of contact output words and bits which define connections to the auto sync lamp.

Decisions must be made in the auto sync logic program, when the AS mode has been selected, to detect whether the automatic synchronizing equipment is sending raise or lower pulses to the DEH system. Thus, if the leading edge of the ASUP contact input pulse has just come on, then the logical variable ASINC is set so that the CONTROL task may increment the turbine reference by one rpm. Similarly, if the leading edge of the ASDOWN contact input pulse has just come on, then the logical variable (ASDEC) is set so that the CONTROL task may decrement the turbine reference by one rpm. Finally, last values (ASUPX and ASDOWNX) are updated to the current states (ASUP and ASDOWN) in preparation for furtur bids of the LOGIC task.

Automatic Dispatch Logic

The automatic dispatch flip-flop (ADS) may be set by the automatic dispatch button (ADSPB), which is updated by the PANEL program, providing the unit is on automatic control (OA), the breaker (BR) is closed, and the automatic dispatch permissive contact input (ADSPERM) is set. Otherwise the ADS flip-flop will be reset. Decisions then are made to determine if the ADS flip-flop has just come on. If ADS just came on, the temporary variable (T3) is set to indicate a remote control transfer for later logic programs. Then a call is made to the LCCO subroutine to set the ADS lamp to the correct state; arguments in the call consist of the current state of ADS, the last state (ADSX), the automatic dispatch button (ADSPB) which must be aligned with the ADS flip-flop, and a pointer (N10) to a table of contact output words and bits which define connection to the ADS lamp.

Additional decisions must be made in the ADS logic program, when the ADS mode has been selected, to detect whether the ADS equipment is sending raise or lower pulses to the DEH system. Thus if the leading edge of the ADSUP contact input pulse has just come on, then a flip-flop (CADSUP) is set to start a counter which is handled by the AUX SYNC program. As long as the CADSUP is set the AUX SYNC will count in 1/10 sec increments, thus determining the length of time the raise pulse is on. When the trailing edge of the ADSUP contact input pulse is detected, this means the raise contact has been released; this then resets the CADSUP flip-flop and the AUX SYNC program will stop counting. Finally, a logical state (ADSINC) is set so that the CONTROL take may raise the turbine reference by an amount proportional to the CADSUP counter. Identical checks and logical decisions are made with respect to the ADS lower contact input (ADSDOWN), after which last values of both ADSUPX and ADSDOWNX are updated with the current state of ADSUP and ADSDOWN in preparation for future bids of the LOGIC task.

Automatic Turbine Startup Logic

Figure 50:
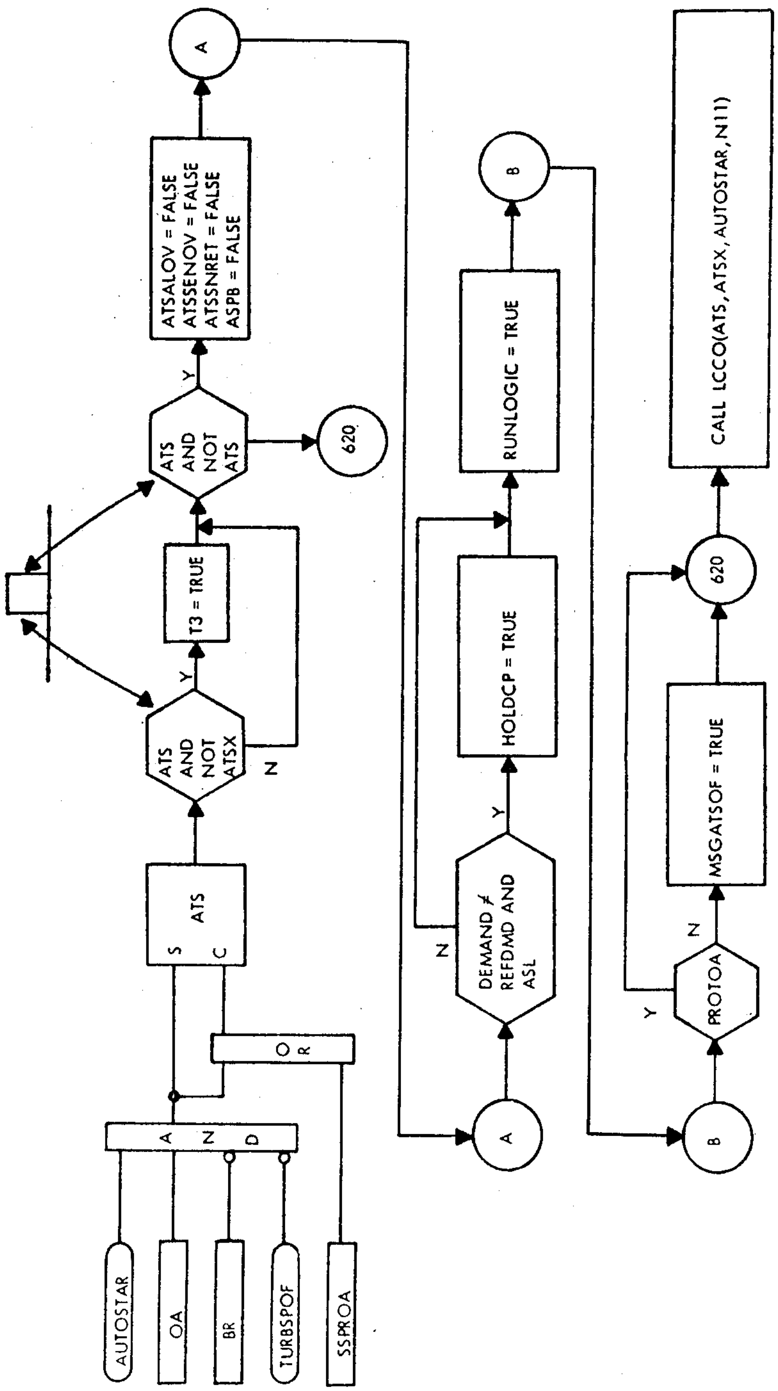
FIG. 50 is a flow chart of an automatic turbine startup program which is operable in accordance with the principles of the invention.

As shown in FIG. 50, the automatic startup flip-flop (ATS) may be set by the pushbutton (AUTOSTAR), which is updated by the PANEL task, provided the turbine is on automatic control (OA), the main breaker (BR) is not closed, and the turbine supervision off pushbutton (TURBSPOF) has not been pushed. Otherwise the ATS flip-flop will be reset by the lack of any of these conditions or by the automatic startup program itself through the variable SSPROA if the program detects improper conditions for startup.

Decisions are then made to determine if the ATS flip-flop has just come on. If so, a temporary logical variable (T3) is set to indicate a remote control transfer for later logic programs. A decision is also made to determine if the ATS flip-flop has just gone off. If this is the case, then a group of logical variables used in the ATS program must be reset. In addition, certain DEH system conditions must be aligned properly; these include the auto sync pushbutton (ASPB), which may have been set by the ATS program, and the reference/demand windows on the DEH Operator's Panel, which may have been left in an unequal state by the startup program. These conditions are cleared by setting RUNLOGIC to request another bid of the LOGIC task. Finally a call is made to the LCCO subroutine to set the ATS lamp to the proper state. Arguments in the call are the current state of ATS, the last state (ATSX), the auto start pushbutton (AUTOSTAR) which must be aligned with ATS, and a pointer (N11) to a table of contact output words and bits which define the hardware connections to the ATS lamp.

Remote Transfer Logic

To transfer from operator automatic to a remote mode, the operator simply presses the appropriate pushbutton on the Operator's Panel. Then, assuming all permissive conditions as described elsewhere in this writeup are satisifed, the new mode will be selected with a bumpless transfer in which the turbine valves remain at the existing position. In addition, a lamp behind the pushbutton selected will be turned on and the lamp for the previous mode will be turned off. Conversely, in order to return from any remote mode to operator automatic, the operator simply presses the OPER AUTO pushbutton. The remote transfer logic program detects operating mode chages and updates the panel lamps according.

As shown in FIG. 51, the temporary logical variable (T3), which has been updated in earlier portions of the logic program, is checked to determine if any remote state has been selected. If so, the operator demand (ODMD) is set equal to the current reference (REFDMD), and logical flags are set to run the LOGIC task again to set the appropriate conditions in the DEH system. Then the status of the operator automatic lamp (OALITE) is determined since a remote control mode selection must result in turning off this lamp. Finally, a call to the LCCO subroutine is made to place this lamp in the proper state.

PANEL TASK

The PANEL task is assigned priority level $C_{16}(\mathbf{12}_{10})$ and is bid by the PANEL INTERRUPT program when a button is pressed.

FIG. 53 shows a block diagram of the major functions performed by the PANEL task. These include executing each of the button group functions discussed above, as well as additional decisions, checks, and bookkeeping necessary to properly perform the action requested by the operator.

Button Decode

The BUTTON DECODE program examines the button identification (IPB) provided by the PANEL INTERRUPT program, and transfers to the proper location in the PANEL task to carry out the action required by this button. The program also does some bookkeeping checks necessary to keep the panel lamps in the correct state. A total of 54 buttons can be decoded in the current version of the DEH PANEL task.

The identification of the last button (IPBX), which had been pressed and which has associated with it a visual display mode lamp, is stored in a temporary integer location (JJ) for later use in turning off the last lamp. Then the current button identification (IPB) is checked to determine if it represents the ENTER pushbutton; if so, a special logical variable ENTERPB is reset for later use should the ENTER button be pressed two or more consecutive times. This has been found to be a rather common operator error and is flashed as an invalid request. The program then simply executes a FORTRAN computed GO TO statement and transfers to the appropriate portion of the PANEL task.

Control System Switching

There are six buttons on the Operator's Panel which may switch control states of the DEH system. A brief description of each follows:

1. TRANSFER TV/GV—This button initiates a transfer from throttle valve to governor valve control during wide-range speed operation. The pushbutton has a split lens. When control is on the throttle valves, the upper half of the lens is backlighted. When the button is pressed, to transfer control, the entire lens is backlighted. At the completion of the transfer, only the bottom half of the lens remains on. Once the DEH system is on governor control, it stays in this mode until the turbine is tripped and relatched. At this time, it is again in throttle valve control.
2. IMPULSE PRESSURE FEEDBACK IN-/OUT—This is a push-push button with split lens. It places the impulse pressure feedback loop in or out of service, with appropriate backlighting of the button lens.
3. MEGAWATT FEEDBACK IN/OUT—This is a push-push button with split lens. It places the megawatt feedback loop in or out of service, with appropriate back-lighting of the button lens.
4. SPEED FEEDBACK IN/OUT—This split lens button places the speed feedback loop in service in the DEH system. Normally the speed loop is always in service; however, when the DEH CONTROL task detects a speed channel failure condition in which all speed input signals are unreliable, the speed feedback loop is disabled and the speed channel monitor lamps turned on. When the speed inputs become reliable, the monitor lamps are turned off, thus indicating to the operator that he may place the speed feedback loop back in service. As long as the speed signals are reliable, the operator cannot take the speed loop out of service.
5. THROTTLE PRESSURE CONTROL IN-/OUT—This is a push-push button with split lens which places the throttle pressure controller in or out of service, with appropriate backlighting of the lens.
6. CONTROLLER RESET—The button restores the DEH system to an active operating state after the computer has been stopped due to a power failure or hardware/software mainntenance.

The logical variable TRPB is set when the TRANSFER TV/GV button is pressed. The impulse pressure, megawatt, and throttle pressure logical states (IPIPB, MWIPB and TRCPB respectively) are set to the logical inverse of their previous state when the corresponding buttons are pressed. This is the mechanism which provides the push-push nature of these buttons. The logical variable SPIPB is set when the speed feedback button is pressed. Finally, each of these buttons initiate a bid for the LOGIC task by setting the RUNLOGIC variable prior to exit from the PANEL task.

The CONTROLLER RESET button is handled somewhat differnetly. The state CRESETPB is set by the STOP/INITIALIZE task, which does cleanup and initialization after a computer stop condition. Then CRESETPB is checked; if it is not set, the computer has been running, and thus the button pressed is ignored. If CRESTETPB is set, this means the computer had been stopped; CRESETPB is reset and the lamp behind the button is turned off. In addition, the PANEL task effectively presses the speed feedback button by setting the logical state SPIPB. This is done so that the DEH system restarts after a power failure or other computer stop condition with the speed feedback loop in service. The LOGIC task is requested to run by setting the RUNLOGIC state. The REFERENCE display button is also effectively pressed so that the display windows always start out in the same mode after a stop condition on the computer.

Display/Change DEH System Parameters

Eight buttons allow the operator to display or change various DEH system parameters. Six of these buttons are dedicated to the display or change of a single important parameter for each button. The remaining two buttons provide the ability to display or change a group of DEH system variables from each button. In addition, two special buttons (GO and HOLD) are intimately associated with one of the dedicated display/change buttons, and thus are also included in this discussion.

Before listing each of these buttons, a brief description of the display window mechanism is given. The DEH Operator B Panel contains two digital displays which are provided with five windows each. The left display, labeled REFERENCE, has two major functions. It either presents numerical information which currently exists in computer memory for the six dedicated buttons mentioned above, or it accepts address inputs from the keyboard for the two buttons assigned to display or change groups of DEH system variables. The right display, labeled DEMAND, also has two major functions. It either accepts keyboard inputs in preparation for changing any of the currently existing numerical information in computer memory for the six dedicated buttons mentioned above, or it presents currently existing information in computer memory for the two buttons assigned to display or change groups of DEH system variables.

Of the five windows in each digital, the leftmost is reserved for mnemonic characters. These characters combine to form a short message identifying the numerical quantity in the remaining four windows. The following table lists the 11 available messages and an explanation of each. The four right windows in each display provide the numerical digits 0 through 9 and a decimal point where appropriate.

| MNEMONIC CHARACTER DEFINITION | |
|---|---|
| Message | Explanation |
| MW | Megawatt Symbol for Load Control |
| SPEED | Speed Symbol for Speed Control |
| % VALVE POSITION | Percent Valve Position for Valve Status |
| RPM/MIN | Acceleration Rate |
| MW/MIN | Load Rate |
| SYS PAR | General DEH System Parameter |
| IMP PRESS % | Impulse Pressure in Percent For Load Control |
| PRESS | General Pressure Variable |
| TEMP | General Temperature Variable |
| VALVE NO. | Valve Identification for Valve Status |
| – | Algebraic Negative Quantity |

A brief description of the eight buttons associated with display/change as well as the GO and HOLD buttons, follows:

1. REFERENCE—This button initiates a display or change of the DEH reference and demand for speed or load operation. When the turbine is on operator automatic control, new demand values may be entered from the keyboard. However, when the turbine is in a remote operating mode such as automatic synchronizer, dispatch or ACCELERATION program, the demand cannot be changed from the keyboard. Any attempt to do so is flashed as an invalid request.

2. ACCELERATION RATE—This button initiates a display or change of the acceleration rate used on wide-range speed operation. When the turbine is on operator automatic control, this value is entered by the operator, and may be changed from the keyboard. However, when the turbine is being accelerated by an AUTOMATIC STARTUP program, the displayed value is the rate selected by this program and cannot be changed from the keyboard. Any attempt to do so is flashed as an invalid request.

3. LOAD RATE—This button initiates a display or change of the load rate used on operator automatic control. This value may be displayed or changed at any time.

4. LOW LIMIT—This button is an optional feature which initiates a display or change of the low load limit used on all automatic load control modes. This value may be displayed or changed at any time.

5. HIGH LIMIT—This button is an optional feature which initiates a display or change of the high load limit used on all automatic load control modes. This value may be changed at any time.

Each of these buttons have high or low limits, whichever is appropriate, associated with them when changes are to be made in the values discussed above. Violation of these limits from a keyboard entry is flashed as an invalid request and the entry is ignored. More details of these limits are discussed in a later section where the KEYBOARD program is described.

6. VALVE POSITION LIMIT—This button initiates a display of the governor valve position limit and the quantity being limited. Change or adjustment of the valve position limit is accomplished by raise/lower buttons (described in a later section where the valve buttons are discussed). Any attempt to enter values from the keyboard in this display mode is flashed as an invalid request.

7. VALVE STATUS—This button initiates a display of the status (position) of the turbine throttle and governor valves. Thus, this button is associated with a group of DEH system variables. A description of the steps necessary to carry out this display function is given in later paragraphs (where the valve buttons are discussed).

8. TURBINE PROGRAM DISPLAY—This button initiates a display or change of any DEH system parameter not otherwise addressable with one of the unique buttons described above. These variables include pressures, temperatures, control system tuning constants, and calculated quantities in all parts of the DEH system. A dictionary is provided so that the address of such quantities may be entered from the keyboard. Further discussion of these points is given in later paragraphs where the keyboard is described.

9. GO—This button initiates a special DEH CONTROL program to adjust the turbine reference. The program ultimately positions the valves on operator automatic control. The reference then moves at the appropriate load or acceleration rate until the reference and demand are equal. The updated reference value is continually displayed in the REFERENCE windows so that the operator may observe it changing to meet the demand, which is displayed in the DEMAND windows.

10. HOLD—This button interrupts the reference adjustment process described above, and holds the reference at the value existing at the moment the HOLD button is pressed. In order to continue the adjustment process on the reference, the operator must press the GO button.

A brief description of the steps necessary to display or change any of the first six variables discussed above follows; description of cases 7 and 8 are withheld until a later section. When the operator wishes to display or change any of the DEH dedicated system parameters, he must execute a sequence of steps which result in the desired action. The steps are listed as follows:

1. The operator presses the appropriate button; the DEH programs display the current value of the parameter in the reference windows while the demand windows are cleared to allow for possible keyboard entry.

2. If the operator wishes only to observe the parameter value, then he does nothing else. The value remains in the reference windows until some new button is pressed.

3. If the operator wishes to change the parameter, he types in on the keyboard the new value which he desires. This is displayed in the DEMAND windows, but will not yet be entered into the DEH programs.

4. If the operator is satisfied with the new value as it appears in the demand windows, he may enter the new quantity into the DEH operating system by pressing the ENTER button. The ENTER button is described in more detail in a later section on the keyboard.

5. If for any reason the operator is not satisfied with the value as it appears in the demand windows, he may press the CANCEL button. The CANCEL button will be described in more detail in a later section on the keyboard. This removes the number from the DEMAND windows and allows the operator to begin a new sequence for the parameter.

6. Assuming that the operator is satisfied with the number and that he presses the ENTER button, the new value of the parameter appears in the REFERENCE window and the DEMAND window is cleared. This is an acknowledgment that the DEH programs have accepted the number and are using the new value from that point on.

7. If for any reason the numerical value entered into the DEH system violates preprogrammed conditions (such as high limits less than low limits), the entire operation is aborted and the INVALID REQUEST lamp is flashed.

The above description of data manipulation is modified somewhat when the operator wishes to display or change the turbine reference and demand. Both of these quantities are displayed when the reference button is pressed. During wide-range speed control, the left REFERENCE display contains the turbine speed reference value, while the right DEMAND display contains the turbine speed demand. During load control the REFERENCE display contains the turbine load reference while the demand display contains the turbine load demand.

Since the reference and demand control the turbine valves directly, it is essential that the operator have a unique handle on these quantities so that he may start or stop reference changes quickly and easily. This is accomplished by use of the GO and HOLD buttons in conjunction with the reference button. The GO and HOLD buttons control two reference states in the DEH system, which indicate whether the reference and demand are equal or unequal. When these quantities are equal, both the GO and HOLD backlights are off. When these quantities are unequal, either the GO or the HOLD lamp is on. If the GO light is turned on, the reference is changing to meet the demand value at the selected rate. Should the operator wish to stop the reference adjustment process, he simply presses the HOLD button. The HOLD button then backlights and holds the reference at its current value. When the operator wishes to start the reference moving again, he must press the GO button, which then backlights and enables the reference to adjust to the proper value.

The sequence of steps for displaying or changing the reference follows:

1. The operator presses the reference button. The DEH programs display the current value of reference in the left windows and the current value of demand in the right windows.

2. If the operator wishes to change the demand, he types the new value on the keyboard. This is displayed in the DEMAND windows, but is not yet entered into the DEH programs.

3. If the operator is satisfied with the new value, he presses the ENTER button. This places the new demand value in the DEH programs and turns the HOLD lamp, assuming that the new demand satisfies certain limit checks to be described shortly. If these conditions are not met, the INVALID REQUEST lamp is flashed, the new value is ignored, and the original value is returned to the DEMAND windows.

4. If the operator is not satisfied with the new value (set in Step 3), he simply presses the CANCEL button. The DEH programs then ignore this value and return the original value to the DEMAND windows.

5. If a new demand is finally entered and the HOLD lamp comes on, the operator may start the reference adjusting to this new demand by pressing the GO button. The HOLD lamp is turned off, the GO lamp is turned on, and the reference begins to move at the selected rate toward the demand.

6. At any time, the operator may inhibit the reference adjustment by pressing the HOLD button. He may then restart the reference adjustment by pressing the GO button.

7. When the reference finally equals the demand both the GO and HOLD lamps will be turned off.

Each of the eight display buttons set the integer pointer (IPBX) to its assigned value and the appropriate panel lamps are turned off and on. IPBX is then checked by the VISUAL DISPLAY task, which selects the numerical values from computer memory and displays then in the windows.

The TURBINE PROGRAM DISPLAY button also resets a few logical states in preparation for keyboard entries. These are discussed in later paragraphs on the keyboard description. The remote control modes AS, ADS and ATS for the Automatic Synchronizer, Dispatch System and TURBINE STARTUP program are checked, along with the manual control state (TM) if the maintenance test switch (OPRT) is not set. All of these modes exclude the possibility of the GO and HOLD buttons being active, so these buttons are ignored in these states and the PANEL program simply exits. However on operator automatic control, the HOLD button state (HOLDPB) is set, or the GO button state (G0PB) is set. In the latter case, HOLDPB is also reset. The LOGIC task is requested to run by setting the RUNLOGIC variable, and the program then exits.

Operating Mode Selection

There are five buttons which may be used to select the turbine operating mode. When any of these are pressed, they initiate major operating changes in the DEH Control System, assuming the proper conditions exist for the mode selected. A brief description of these buttons follows:

1. OPERATOR AUTOMATIC (OPER AUTO)—This button places the turbine in automatic control with the operator providing all demand, rate, and set point information from the keyboard. If the turbine had been previously in manual control, the OPER AUTO lamp must be flashing to indicate that the DEH system is ready to accept automatic control; otherwise pressing the OPER AUTO button is ignored. If the turbine had been in one of the remote control modes listed below, then pressing the OPER AUTO button rejects the remote and returns automatic control to the operator.

2. AUXILIARY SYNCHRONIZER (AUTO SYNC)—This button allows automatic synchronizing equipment to synchronize the turbine generator with the power system by indexing the speed demand and reference with raise/lower pulses, in the form of contact inputs.

3. AUTOMATIC DISPATCHING SYSTEM (ADS)—This button allows automatic dispatching equipment to operate the turbine generator by setting the load demand and reference. A number of dispatching options are available, including raise/lower pulses, raise/lower pulse-width modulation, and analog input values to set the reference.

4. AUTOMATIC TURBINE STARTUP (TURBINE AUTO START)—This button allows a special computer program to automatically start up and accelerate the turbine during wide-range speed control. The program may reside in the DEH computer or it may exist in another computer in the plant or at a remote location.

5. COMPUTER DATA LINK (COMP DATA LINK)—This optional button allows another computer, either in the plant or at a remote location, to provide all demand, rate, and set point information to the DEH system.

The OPER AUTO button resets the remote mode button states (ASPB, ADSPB and AUTOSTAR) for Automatic Synchronizer, the Automatic Dispatch System, and the AUTOMATIC TURBINE STARTUP program, respectively. Since the operator automatic state (OA) is merely the logical inverse of the turbine manual state (TM), the PANEL task cannot actually set OA, but can only request the LOGIC task to run, but setting the RUNLOGIC variable. The LOGIC program then determines whether or not operator automatic is accepted by the manual backup system.

The remote buttons set their corresponding pushbutton states after which RUNLOGIC is set. As in the case of operator automatic, the LOGIC task then determines if the requested mode will be accepted.

The data link button is handled somewhat differently; this is a push-push button whose stae (DLINK) is given the logical inverse of its previous value at statement 14. The new state is then interrogated in order to determine whether to turn the button backlight on or off, after which the program exits.

Valve Status/Testing/Limiting

Nine buttons on the Operator's Panel are used for displaying valve status, testing the throttle and governor valves, and displaying or changing the valve position limit. Some of these buttons are used in more than one of these areas. A brief description of the three buttons associated with display of valve status follows:

1. VALVE STATUS—This button initiates a display of the status (position) of the turbine throttle and governor valves.
2. TV—This button provides the mechanism for the throttle valve status (position) to be displayed.
3. GV—This button provides the mechanism for the governor valve status (position) to be displayed.

In order to display valve status, the operator must execute the following sequence of steps:

1. Press the VALVE STATUS button, which then backlights.
2. Press either the TV or the GV button, depending on which group of valves are to be displayed; the TV or GV lamp then lights.
3. On the keyboard, press the key corresponding to the number of the valve to be displayed; this valve then appears in the left windows.
4. Press the ENTER button. The DEH programs then place the valve position in percent in the right windows, and continually update this value as the valve position changes.
5. If the valve number entered on the keyboard in Step 3 is out of range of the existing valves on the turbine, the INVALID REQUEST lamp is flashed and both display windows are cleared. The operator then should press the CANCEL button, and begin again at Step 3.

A brief description of the four buttons associated with valve testing follows:

1. VALVE TEST—This button initiates a sequence of steps which results in throttle/governor valve testing.
2. TV—This button indicates that the turbine throttle valves are to be tested.
3. CLOSE—This button provides the mechanism for gradually closing the governor valve associated with the throttle valve to be tested.
4. OPEN—This button provides the mechanism for gradually opening the governor valve associated with the throttle valve which has just been tested.

To understand the need for valve testing, one must realize that steam turbines have two sets of valves for control of steam flow. The throttle valves are located upstream in the steam flow path and the governor valves are downstream.

Under most turbine operating conditions, the throttle valves are wide open and the governor valves assume the correct position to control steam flow. However, the throttle valves must always be prepared to close instantly in case a contingency occurs which requires a mandatory trip of the turbine. If either or both of the throttle valves remain open under such an emergency condition, the possibility of severe damage to the turbine and power plant is very high.

In order to demonstrate that the throttle valves are operable, the valve test feature is made available. Essentially this feature allows the operator to close the throttle valves for a few seconds to assure their operational availability during contingencies. However, in certain steam chest arrangements, a complication arises in the incorporation of a throttle valve test function. With normal steam flow through the throttle valve, mechanical forces acting on the throttle valve mechanism are so large that it is physically impossible to reopen the valve and thus verify its operational availability. To overcome this problem, it is necessary to close the governor valve on the same side of the turbine (in small incremental steps) so that load on the turbine is not upset to any great degree. When the governor valve is essentially closed and steam flow cut off, the throttle valve forces are negligible and the throttle valve may be test-closed and reopened to verify its operation. Finally, the governor valve must then be opened incrementally to return it to the conditions prior to the test.

In order to carry out a throttle valve test, the operator must execute the following sequence of steps:

1. Press the VALVE TEST button, which then backlights; the VALVE STATUS lamp also backlights if it is not already on.
2. Press the TV button, which then backlights.
3. On the keyboard, press the key corresponding to the number of the throttle valve to be tested. This number then appears in the left windows.
4. Press the ENTER button. The DEH programs then place the governor valve position, corresponding to the throttle valve being tested, in the right windows. This value is continually updated as the test proceeds.
5. Should the valve number entered on the keyboard in Step 3 be out of range of the existing valves on the turbine, the INVALID REQUEST lamp is flashed and both display windows are cleared. The operator then presses the CANCEL button and begins again at Step 3.
6. Press and hold the CLOSE button. The DEH valve test system then closes the appropriate governor valve at a controlled gradual rate; the right display windows show the governor valve position as it decreases throughout this part of the test. The lamps behind the CLOSE and OPEN buttons turn on and remain on until the test is complete. When the governor valve is within 5 percent of its closed position, the throttle valve immediately closes and stays closed as long as the CLOSE button is held down.
7. Release the CLOSE button. The throttle valves opens, but the governor valve remains closed. Pressing the CLOSE button again quickly recloses the throttle valve, if another operational check is desired. As many reclosures as necessary may be carried out at this stage of the test.

8. Press and hold the OPEN button. The DEH valve test system then opens the appropriate governor valve at the same controlled gradual rate. The right display windows show the governor valve position as it increases continually throughout this part of the test. When the governor valve is returned to its original position, the lamps behind the CLOSE and OPEN buttons go out, thus indicating the completion of the valve test.

9. It is not necessary to hold down the CLOSE and OPEN buttons continuously during the valve test. They may be released at any time and the test will simply be suspended; then a short while later, the buttons may be pressed and held and the test will continue.

10. It is prefectly valid to use the other visual display buttons during the temporary suspension of a valve test. When it is desired to return to complete or continue the valve test, it is necessary only to press the VALVE TEST button. The DEH system then retrieves from memory all the information needed to continue the test (including the valve number and position of governor valve for the display windows) so that the test procedure may be continued from that point.

A brief description of the three buttons associated with the valve position limit display and change function follows:

1. VALVE POSITION LIMIT DISPLAY—This button initiates a display of the current value of the valve position limit setting in the left windows, and the DEH governor valve quantity being limited in the right windows.

2. VALVE POSITION LIMIT LOWER—This button is used to lower the valve position limit setting as long as the button is held down.

3. VALVE POSITION LIMIT RAISE—This button is used to raise the valve position limit setting as long as the button is held down.

The rate of adjustment of the valve position limit setting is controlled by a keyboard entered constant. As long as the raise or lower button is held down, the setting is varied at an exponential rate. In order to make small changes in the limit, the operator simply presses and holds the appropriate button for a few seconds and then releases the button. He may do this more or less continuously, and the value of the limit is displayed in the left windows. In order to adjust the valve position limit setting with the raise and lower buttons, it is first necessary to press the VALVE POSITION LIMIT DISPLAY button. If it is not pressed, the raise and lower buttons are ignored. The display button acts as a permissive for varying the limit setting.

The program sets the state VSTATUS for this button and sets the integer pointer IPBX to 8 for this visual display mode. The program handles the TV and GV buttons, respectively. The VSTATUS state is checked; if it is not set, the TV and GV buttons are ignored. Otherwise, the TV and GV logical states are set and the lamp behind the button pressed is turned on by a call to the contact output handler. The VALVE TEST button is processed and the manual control state (TM) is checked. If the turbine is in manual operation, the valve test cannot be carried out and the test button is ignored. However, in automatic control, the logical state VTESTPB is set and the lamp behind the button is turned on. Then the integer NVTEST representing the valve to be tested is checked. If the value is non-zero, a test has been previously started, so the test conditions are immediately set up from memory. This includes setting the TV button state and lamp, and setting the pointer INDEX2 equal to NVTEST so that the visual display of governor valve position in the right windows may be properly selected. Should the value of NVTEST be zero, the VALVE STATUS lamp is set. The system then waits for more keyboard information from the operator.

The VALVE POSITION LIMIT DISPLAY button is serviced; this requires setting the pointer IPBX to 6 for a visual display. The valve test button (VTESTPB) and the TV buttons must have been previously pressed, and the valve number which is to be tested (which is stored in location INDEX2) must be valid; otherwise the CLOSE or OPEN button is ignored. If these conditions are met, the open button state (OPENPB) is set if this button is pressed, while the close button state (CLOSEPB) is set if this is the button pressed. In addition, a contact output to actuate the governor valve closing circuitry is set if the CLOSE button is pressed. Finally, the valve being tested NVTEST is set equal to INDEX2.

The VALVE POSITION LIMIT RAISE and LOWER buttons are serviced. If the display pointer IPBX is not equal to 6, the VALVE POSITION LIMIT DISPLAY button has not been pushed; therefore, the raise and lower buttons are ignored. If IPBX equals 6, the appropriate state VPLRPB or VPLLPB is set and the program exits.

Automatic Turbine Startup

Five buttons are associated with the automatic turbine startup feature of the DEH system. A brief description of these buttons follows:

1. AUTOMATIC TURBINE STARTUP (TURBINE AUTO START)—This button allows a special computer program to automatically start up and accelerate the turbine during wide-range speed control.

2. TURBINE SUPERVISION OFF—This is a push-push button which controls the printout of messages from the turbine supervisory programs. Normally, the messages are always printed; the operator may suppress printing by pressing this button, which then backlights. Should the messages be desired later, then the button may be pressed again; the lamp is turned off and the supervisory messages are printed on the typewriter.

3. OVERRIDE ALARM—This button overrides certain alarm stops which the AUTOMATIC TURBINE STARTUP program may detect. When this happens, the program waits for operator action before proceeding with the acceleration. If the operator decides to continue the startup, he presses the OVERRIDE ALARM button.

4. OVERRIDE SENSOR HOLD—This button overrides certain analog input sensor stops, which the AUTOMATIC TURBINE STARTUP program may detect. When this happens, the program waits for operator action before proceeding with the acceleration. If the operator decides to continue the startup, he presses this button.

5. RETURN SENSOR TO SCAN—This button returns certain analog inputs to scan after their sensor has been repaired. Should a sensor fail, the AUTOMATIC TURBINE STARTUP removes the corresponding input from scan; when the sensor is detected valid again, this button is backlighted to notify the operator. He then presses the button to return the input to its normal scan.

Manual Buttons

Six buttons on the Operator's Panel are associated with manual operation of the turbine. Even though the DEH PANEL program does not interface directly with these buttons, a brief description of their function is given for completeness. In general, these buttons allow the operator to control the position of the turbine throttle and governor valves directly from the panel.

1. TURBINE MANUAL—This button places the turbine under manual control of the operator, with the transition from automatic being achieved essentially bumplessly.

2. TV LOWER—This button lowers, or decreases, the throttle valves at a fixed rate as long as the button is held down.

3. TV RAISE—This button raises, or increases, the throttle valves at a fixed rate as long as the button is held down.

4. GV LOWER—This button lowers, or decreases, the governor valves at a fixed rate as long as the button is held down.

5. GV RAISE—This button raises, or increases, the governor valves at a fixed rate as long as the button is held down.

6. FAST ACTION—This button opens or closes the throttle and governor valves, at a fast rate, in manual control. The FAST ACTION button must be held down at the same time as any of the TV or GV RAISE/LOWER buttons described above to achieve the fast action effect.

Keyboard Activity.

There are fourteen buttons associated with keyboard activity on the DEH Operator's Panel. Of this total, eleven are numerical keys; these include the integers 0 through 9 and a decimal point. Three additional buttons are available for use with the keyboard to aid in data display or change. A brief description of these buttons follows:

1. NUMERICAL BUTTONS 0 THROUGH 9—When the operator keys in numbers of these buttons, the corresponding values are displayed in the reference or demand windows, whichever are appropriate, for the function being performed. The values move from right to left in the windows as new keys are pressed, and both leading and trailing zeros are always displayed. If more than four numerical keys are pressed, the leftmost value in the windows is lost as the new value is entered in the right-most window, and the remaining values shift left one position.

2. DECIMAL POINT BUTTON—When the decimal point key is pressed, the PANEL program retains this information but does not yet display it. When the next numerical key is pressed, both the value and the decimal point appear in the right-most window. The decimal point is positioned in the lower left-hand corner of the window position. Should additional numerical keys be pressed, the decimal point moves one position to the left with the number with which it was originally entered. Should the decimal point be shifted out of the left-most window it is lost, and a new point may be entered.

3. ENTER—When this button is pressed, the PANEL program enters the value residing in the reference or demand windows, whichever is appropriate, into core memory and performs the correct action requested by the keyboard activity. This action may consist of visual display, parameter change, or intermediate steps in a sequence of operations as described in preceding sections.

4. CANCEL—When this button is pressed, the PANEL program clears both the reference and demand windows, deletes any intermediate values in computer memory, and aborts the entire sequence of operations which was canceled. The operator may then begin a new sequence of steps.

5. CHANGE—This button indicates a sequence of operations necessary to alter numerical values residing in the DEH system memory. The steps necessary to change parameters are described earlier.

The decimal point key and keys 0–9 are serviced to check the validity of the requested entry and to set the entry if it is valid. Among other checks, a check is made on the integer IPBX, which represents the visual display and change button which has been previously pressed. If this value equals 2, thus indicating the acceleration rate button has been pressed, and the Automatic Turbine Startup mode (ATS) is in control, all keyboard buttons are invalid. During the ATS mode the acceleration rate is controlled by the startup program, and thus may be visually displayed but cannot be changed from the keyboard.

Should the ATS state be satisfied, the pointer IPBX is checked to determine if it is equal to 6; if so, the keyboard entry is flashed as invalid because this represents the valve position limit display mode, which cannot use the keyboard. If this situation is all right, the valve test button state (VTESTPB) is checked; should VTESTPB be set and the valve being tested NVTEST is non-zero, the keyboard entry is invalid. This is because NVTEST indicates that some valve has already been selected for test, thus implying that no further keyboard activity is necessary.

Finally, some special tests are made if IPBX equals 1; this means the reference display mode has been selected. If this is the case, all remote control modes such as Automatic Synchronizer (AS), Automatic Dispatch System (ADS), and Automatic Turbine Startup (ATS), imply that the keyboard cannot be used during reference display. Thus these result in the INVALID REQUEST lamp being flashed. In addition, should the turbine be on manual control (TM) or unlatched (NOT ASL), and not in the maintenance test mode (OPRT), then keyboard activity is also invalid during reference display. All of these cases are invalid for keyboard entry because the turbine demand and reference are set by the remote mode or the manual tracking system. The only time that the operator may use the keyboard in the reference display mode is during operator automatic control or during the maintenance test condition in which the DEH system is being used as a simulator and trainer.

Should all of these test be passed properly, the logical state KEYENTRY is set and the numerical value in location KEY is checked. This is the keyboard button which has just been pressed, and must lie between 0 and 9 inclusive; otherwise, the entry is flashed as invalid. For a valid value of KEY, the program then places the new number in its proper position in the integer array (IW). This array has a place for each of the four window positions of the visual display and, as keyboard buttons are pressed, the entries move down one position in IW and the latest key is entered in the top position.

The pointer ID maintains the proper position for each new key. Thus, if ID equals 0, this means there are no entries in the array IW. The value KEY is thus placed in the first position of IW. However, if ID is not zero, then a FORTRAN DO loop is executed to move the entries in IW down one position prior to entering the new value of key in the first position at statement 414. Then the value of the pointer ID is checked again; if it is less than 3, it is incremented by 1. If it is equal to 3, it retains that value. This is the mechanism used to accept more than four keyboard values with only the last four key entries being retained.

CONTROL TASK

General

The CONTROL task is assigned priority level $D_{16}$ ($\mathbf{13}_{10}$) and is bid by the AUX SYNC task every 1 sec.

The CONTROL task size is 1759 words long, the data pool is 247 words long, and the header is 9 words for a required storage of 2015 locations. CONTROL is linked as a separate task and loaded into the computer through the tape reader. The core area assigned to CONTROL is (2740 to 2F3F)$_{16}$; this is $\mathbf{800}_{16}$($\mathbf{2048}_{10}$) locations, thus allowing a few spares. The CONTROL task is organized as a series of relatively short subprograms, executed sequentially, and which address themselves to particular aspects of the general control system objectives.

Time Update Function

Most process control computers have the ability to synchronize with a real time station clock. Once this synchronization is made, the computer Monitor program continuously updates itself, usually every 1 sec, so that real time in hours, minutes and seconds in the computer is identical with real time on the station clock. Then any messages, alarms, or similar computer output to typewriters may be preceded with the time of occurrence for hardcopy record and analysis purposes.

However, should the computer stop for any reason, its time counters are immediately out of phase with the station clock. Thus when the computer returns to service, a mechanism must be provided to update the computer real time counters to the station clock. The TIME UPDATE function of the DEH CONTROL task provides this important feature by utilizing appropriate entries from the keyboard.

Since the time update mechanism requires keyboard entered values, it is necessary to switch to the maintenance test mode by using the key-lock switch on the Operator's Panel. This immediately switches the turbine to manual control and enables entry of values from the keyboard. At the end of the time update operation, the MAINTENANCE TEST key should be switched to the OFF position. The DEH system then tracks to the manual valve position in preparation for automatic control. As an example, assume that it is desired to update time to the value 3:27 PM. The following steps should be executed:

1. Move the MAINTENANCE TEST switch to the TEST position.
2. Press the TURBINE PROGRAM DISPLAY button; it will light.
3. Key in the address 3136 and press the ENTER button. The address appears in the left display windows.
4. Press the CHANGE button; it will light.
5. Key in the time value 1527 and press the ENTER button. The time appears in the right display windows and the CHANGE light is turned off.
6. Key in the address 3137 and press the ENTER button. The address appears in the left display windows.
7. Press the CHANGE button; it will light.
8. Key in the XUPDATE value of 1.0 and watch the station clock.
9. When the clock sweep second hand passes exactly through 3:27 PM, press the ENTER button. The right windows clear to zero and the CHANGE light is turned off.
10. Key in the address 2078 and press the ENTER button. The address appears in the left display windows and the computer real time appears in the right display windows. This value is continuously updated by the DEH CONTROL task TIME UPDATE program.
11. Move the MAINTENANCE TEST switch to the OFF position. It should be necessary to update time only when the computer has stopped; once this is done the DEH system keeps track of real time continuously. If it is desired to display computer time, Steps 2 and 10 above need only be executed.

Valve Position Limit Function

A valve position limit function is a traditional feature of turbine control systems. This function generally provides the operator with high limiting action on the final computer governor valve output to the servo actuator. It is most useful when the turbine is on automatic control, and allows the operator to override the automatic output if he feels a particular siutation justifies such action.

In the DEH Control System, the valve position limit feature is active on both speed and load control. The valve position limit is normally adjustable in both the rise and lower direction; when the governor valves are actually being limited by this function, the VALVE POSITION LIMIT DISPLAY button is flashed to alert the operator to the condition. The computed value (SPD) is the governor valve position set by the Speed Control System, while GVPOS is the governor valve position set by the Load Control System. Each output is high limited by the valve position limit (VPOSL) which is continuously adjustable by raise and lower push-buttons on the Operator's Panel.

When the valve position limit is adjusted with the raise or lower buttons, the rate of change of VPOSL is controlled by a keyboard entered constant (VPOSLINC), the valve position limit increment. The actual variation of VPOSL is a nonlinear function of the time in seconds which the raise or lower button is pressed and held. Basically, the valve position limit is incremented every 1 sec by an amount given by the expression (N * VPOSLINC), where N is the running number of consecutive seconds during which the raise or lower button is held down. Once the button is released, N is reset to zero and is counted up when either the raise or lower button is pressed again. By pressing and releasing these buttons, the operator may incrementally vary the valve position limit in a variety of ways.

When the raise or lower button is initially pressed, the PANEL INTERRUPT program decodes these buttons and bids the PANEL task. This program then sets logical states, if the proper conditions exist, to begin a time counter in the AUX SYNC task. The AUX SYNC task counts in 1/10 sec steps, as long as the raise or lower button is held down. Simultaneously, the CONTROL program runs every 1 sec and increments the valve position limit according to the count set by the AUX SYNC task.

When the raise or lower button is released, the valve interrupt is triggered. The Monitor then runs the VALVE INTERRUPT program, which resets the valve position limit logical states and time counter so that the valve position limit incremental action is no longer executed in the control task. Pressing the raise or lower button again repeats the cycle described.

A test is first made to determine if the limit is to be raised or lowered as indicated by raise pushbutton state (VPLRPB), or by a request from the AUTOMATIC TURBINE STARTUP (ATS) program through an equivalent raise logic state (ATSVPLPB-assuming that the limit VPOSL is below its maximum value VPOSLMAX). If the limit is to be raised, a temporary location is set to the incremental change (VPOSLINC). If the limit is not to be raised, a test is made to determine if the limit is to be lowered as indicated by the lower button state (VPLLPB). If so, a temporary location is set with the negative incremental change (VPOSLINC); if there is no lower action, the program moves on to the next stage.

If some changes is to be made in the limit, the program computes the incremental step as discussed above and adds this to the last value of VPOSL. Finally, tests are made to be sure that the limit does not exceed a maximum value (VPOSLMAX, a keyboard entered constant) or go below zero. The program then moves on to the next stage.

Valve Test Function

A valve test function is a traditional feature of turbine control systems. To understand the need for this function, it is necessary to realize that a steam turbine has two sets of valves for control of steam flow. The throttle valves are located first in the steam flow path and the governor valves follow. Under most turbine operating conditions, the throttle valves are wide open and the governor valves assume the proper position to control steam flow. However, the throttle valves must always be prepared to close instantly, in case a contingency occurs which requires a mandatory trip of the turbine. Should either or both throttle valves remain open under such emergency conditions, the possibility of severe damage to the turbine and the power plant is very high. Past experience shows that malfunctions in the electrical and mechanical trip detection systems, or physical binding of the throttle valve elements themselves, makes such a potentially disastrous situation occur occasionally.

In order to detect such malfunctions, a throttle valve test feature is always provided with turbine control systems. Essentially the test function allows the operator to close the throttle valves for a few seconds to assure their opertional availability during contingencies. Electric utility practices vary, but typically the throttle valves are periodically tested at times of relatively low load and stable power system conditions.

A complication can arise in the actual incorporation of a throttle valve test function. With normal steam flow through the turbine, the mechanical forces acting on the throttle valve mechanism are so large that it is physcially impossible to close and reopen the valve and thus verify its operational availability. To overcome this problem it is first necessary to close the governor valve(s) on the same side of the turbine in small incremental steps so that load on the turbine is not upset to any great degree. When the governor valve is closed and steam flow cut off, the throttle valve forces are negligible and the throttle valve may then be test-closed and reopened to verify its operation. Finally, the governor valve(s) must be opened incrementally to return it to conditions existing prior to the test.

In the DEH system, the valve test feature is arranged to accomplish the end functions discussed above. The incremental rate of closing and opening the governor valves is controlled by a keyboard entered constant (VTESTINC). Every 1 sec, the governor valve is moved by this amount, which is usually about 1 percent, until the governor valve reaches its proper position in the test sequence. The valve test program automatically carries out all steps in the procedure under control of the operator, who selects from appropriate panel pushbuttons the valve to be tested and the close/open portion of the governor valve excursion. The valve test need not be accomplished in one step, but rather the operator may stretch the test out over any reasonable time interval by simply releasing the close or open pushbuttons for a time and then pressing them again.

When the CLOSE or OPEN pushbutton is initially pressed, the PANEL INTERRUPT program decodes the pushbuttons and bids the PANEL task; the PANEL task program then sets logical states, if all permissive conditions exist, to activate the appropriate part of the test. The CONTROL task continually monitors these logical states and increments the governor valve at the proper time, closes the throttle valve, and keeps track of all necessary bookkeeping.

When the CLOSE or OPEN pushbutton is released, the VALVE INTERRUPT program resets the pushbutton logic states and either terminates the test or waits until the operator presses the proper pushbuttons to continue the test, whichever situation is appropriate. In FIG. 57, a block diagram shows interactions provided in the DEH system 1100 by the valve test function 1962. In the valve test execution, a check is first made to determine if the turbine is on manual control; if so a valve test cannot be carried out but some bookkeeping may be necessary to clean up computer conditions. These may have existed from an immediately preceding valve test on automatic control which was interrupted by transfer to manual control. Therefore, the test analog output (TESTAO) is checked to determine if it is nonzero. If so, this means that a valve test had been underway; thus TESTAO and the valve identification (NVTEST) are reset to zero and a call is made to the contact output handler to reset the test analog output voltage to zero.

If the turbine is on automatic control, the CLOSE pushbutton state (CLOSEPB) is interrogated. If it is set, the appropriate governor position, as determined from the linear variable differential transformer (LVDT) analog input in computer location IGVSS (INDEX2), is checked to see if it is within a deadband (CLOSEDB) of being closed. If it is not, the valve test increment (VTESTINC) is added to the current analog output (TESTAO) and the governor valve closed further. After a number of passes through this loop, the governor valve is esentially closed and a contact output is set to immediately close the corresponding throttle valve. As long as the CLOSE pushbutton is held down, the throttle and governor valves are held closed. When the CLOSE pushbutton is released, the VALVE INTERRUPT program resets the throttle valve contact output and thus allows the throttle valve to return to its normally open position. However, the governor valve remains closed because the test analog output (TESTAO) is still set.

A check is made to determine if the OPEN pushbutton has been pressed. If not, the program bypasses into the next section of the CONTROL task. However, if the OPEN pushbutton is pressed, this means that the governor valve test analog output must be removed at the incremental rate (VTESTINC). Thus, the valve (TESTAO) is checked to see if it is less than VTESTINC; if not, TESTAO is decremented by the amount (VTESTINC) and the cycle continued. Ultimately, TESTAO is reduced to a numerical value below VTESTINC, at which time TESTAO is reset to zero and the valve test is essentially completed. When the operator releases the OPEN pushbutton, the VALVE INTERRUPT program formally terminates the test by cleaning up logical states as described above.

Valve Contingency Function

In situations where the throttle and governor valves are asked to move very fast, such as the transfer from throttle to governor valve control or when load is changed at a high rate, the VALVE CONTINGENCY program flashes the valve status lamps for a few seconds. This is a normal situation which simply indicates that the valve servo actuator cannot move quite as fast as the DEH system has called for. The lamps flicker briefly and then go out when the LVDT signals catch up to the computer output.

The valve contingency function has a second feature which is executed during automatic control to alert the operator to situations during which the analog backup system 1016 is not tracking the DEH controller valve analog outputs. Under normal conditions, the backup system continuously tracks the computer outputs to assume control bumplessly at any time. However, in certain situations, when the automatic system makes fast valve movements, such as during throttle/governor transfer or large load changes at a high rate, the manual backup tracking system lags for a short interval of time. The valve contingency function indicates this conditin by flashing the MANUAL NOT TRACKING monitor lamp on the Operator A Panel. The tracking deadband is a keyboard entered constant for the throttle and governor valves individually; these are normally set at about 1 percent. While the MANUAL NOT TRACKING lamp is flashing, the operator must not transfer to manual control; otherwise, he may sustain a significant bump in the operating conditions and may even place the turbine in an unsafe operating state. In the preferred embodiment, the tracking deadband or discrepancy is a keyboard entered constant individually selectable for each throttle valve TV1, TV2, TV3, TV4 and each governor valve GV1 through GV8. The discrepancy values or deadbands are normally set at about 1%.

The valve contingency function interfaces with the remaining portions of the DEH Control System primarily through the appropriate analog inputs and keyboard entered constants discussed above. Otherwise the function is more or less self-contained.

In the VALVE CONTINGENCY program, all contingency states are reset and the manual control contact input (TM) is interrogated. If the turbine is on manual, nothing else is done in the contingency program. However, if the turbine is on automatic control, a FORTRAN DO loop is executed to evaluate the throttle and governor valve LVDT inputs with respect to the computer outputs. The throttle inputs are stored in the array ITVSS while the governor inputs are in array IGVSS. The throttle contingency deadband is at TVDB and the governor contingency deadband is at GVDB. If either contingency exists, the appropriate contingency state is set for flashing; otherwise no further action is taken.

A similar test is made for the manual not tracking situation. The throttle and governor valve analog outputs (ITVAO and IGVAO) are checked against the manual backup system outputs (ITVMAN and IGVMAN), with deadbands TVMANDB and GVMANDB respectively. If a discrepancy exits, the manual not tracking state is set for flashing; otherwise no action is taken and the program proceeds to the next section.

Speed Selection Function

An additional task which the speed selection function must accomplish is the bumpless transfer mechanisms necessary when the speed input signals are switched, and when all speed inputs fail. These bumpless transfers are incorporated only on load control, since speed switching then can be significant in affecting governor position and thus turbine load. During speed control, no noticeable effect of speed signal switching may be expected.

Consider first the case when the speed signal is to be switched from the digital to the analog channel, or from the analog to the digital channel. The portion of the Load Control System which will be affected by such a change includes essentially the speed feedback loop output (X, considered simply as a single block since the details are not important in this context), the turbine load reference (REFDMD), and the turbine speed modified load reference (REF1).

When the speed signal is switched, the factor X changes, in general, so it is necessary to change the reference (REFDMD) to avoid a bump in REF1 and ultimately in the valves. Suppose that the system has been using one of the two speed inputs (it is immaterial which one), and thus had been yielding a speed feedback factor ($X_1$). Then the value of REF1 is given by:

$$REF1_1 = REFDMD_1 + X_1 \quad (35)$$

Now the system switches to the other input and yields a speed feedback factor ($X_2$). The corresponding value for REF1 is given in:

$$REF1_2 = REFDMD_2 + X_2 \quad (36)$$

To yield a bumpless transfer, it is necessary to hold the value of REF1 constant, as indicated in the following expression:

$$REF1_2 = REF1_1 \quad (37)$$

Substituting Equations (35) and (36) into (37) and solving for the new value of REFDMD gives the proper condition for a bumpless transfer, as shown below:

$$REFDMD_2 = REFDMD_1 + X_1 - X_2 \quad (38)$$

Thus when the speed signal is switched, the speed selection function recomputes the new value of turbine reference according to Equation (38) and achieves the required bumpless transfer.

Consider next the situation in which both the digital and the analog signals fail, thus requiring the speed feedback loop to be disabled and taken out of service. Again this must be accomplished bumplessly so that the governor valves, and thus turbine load, do not change significantly. The value of the speed compensated reference when the speed loop (SPI) is in service is given by:

$$REF1_{in}=REFDMD_{in}+X \quad (39)$$

When the loop is taken out of service due to speed channel failure, the value of REF1 is computed from:

$$REF1_{out}=REFDMD_{out} \quad (40)$$

To yield a bumpless transfer, it is necessary to hold the value of REF1 constant as follows:

$$REF1_{out}=REF1_{in} \quad (41)$$

Substituting Equations (39) and (40) into (41) and solving for the new value of REFDMD gives the proper conditions to maintain a bumpless transfer, as shown below:

$$REFDMD_{out}=REFDMD_{in}+X \quad (42)$$

Thus, to satisfy the conditions for bumpless transfer with respect to the speed loop, the speed selection function must reset the reference as given in Equation (42) to maintain constant valve position and thus constant load during this interval. Brief consideration will now be directed to the two out of three logical error detection scheme used by the speed selection function. It must be realized first that the three speed signals will rarely, if ever, be exactly equal; thus, it is necessary to compare these signals with each other and check for a significant difference. The value of the allowable difference given by WSERROR and is a keyboard entered constant; should any two speeds differ in magnitude greater than WSERROR, then one or both of the speeds are faulty. The allowable speed error (WSERROR) is usually set about 100 rpm.

The speed selection process compares the three speeds and bases its logical conclusions on the results of this test. Since there are three differences (between the digital and the analog, the digital and the supervisory, and the analog and the supervisory), which may or may not be greater than WSERROR, then there are eight possible combinations which must be examined. Table 1 lists these combinations, the decision as to which speed to be used, and a comment on each situation. The column titles in Table 1 indicate "approximately equal", which means that the various speeds agree within WSERROR rpm. The letter Y in the table means YES they do agree, while the letter N means NO they do not agree.

The speed selection function simply compares the speed differences which exist every 1 sec (the sampling interval for the CONTROL task) and finds the corresponding entry in Table 1. Logical conditions are then set to carry out the appropriate action as indicated by the comments in Table 1, to assure proper control by the remaining parts of the DEH system.

Figure 60A:
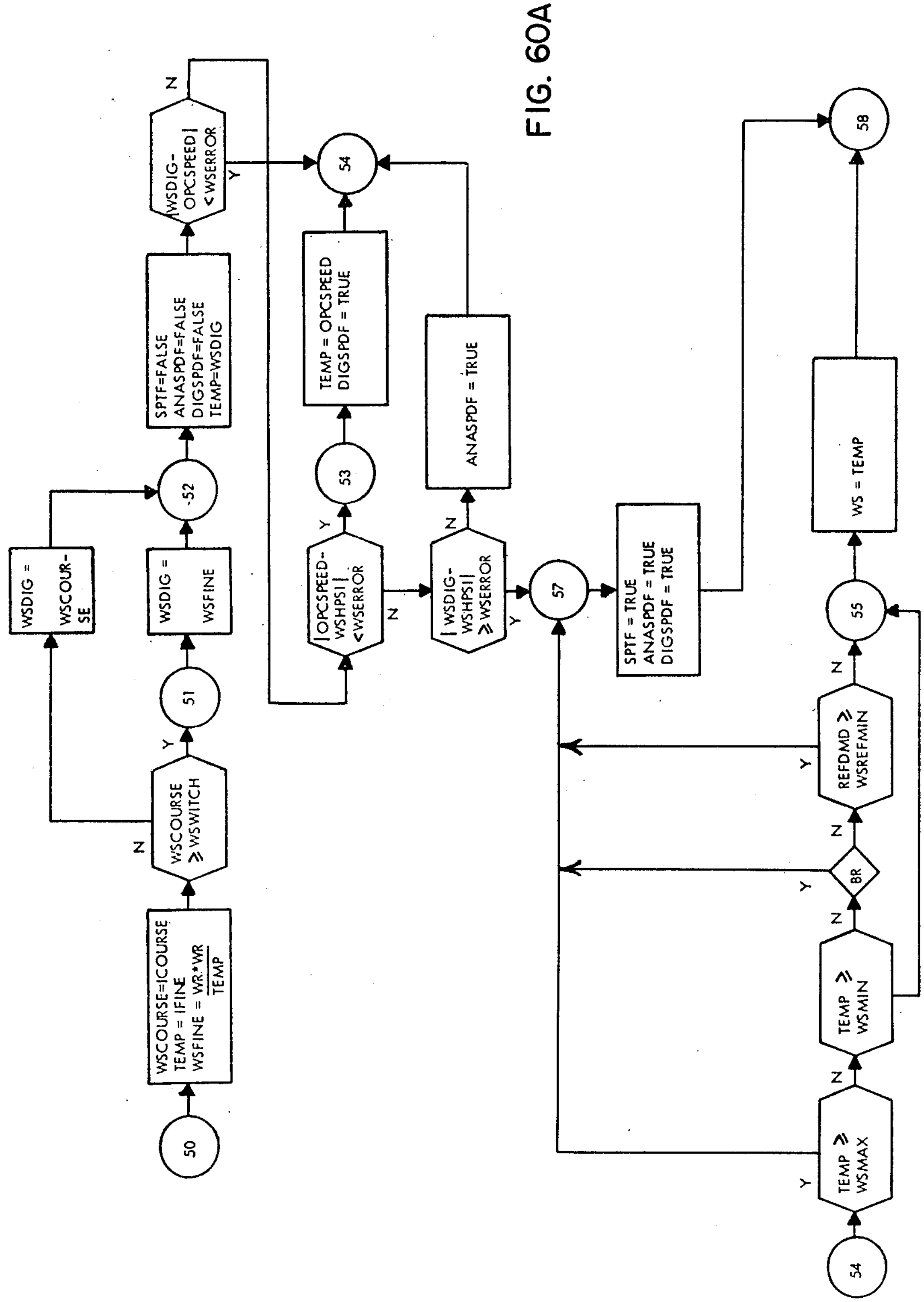
Figure 60B:
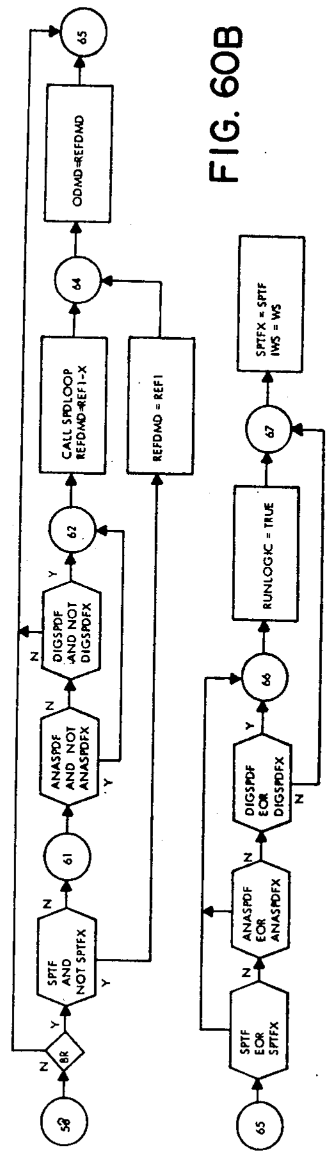

FIGS. 60A and 60B show the flow chart for the SPEED SELECTION program. At statement 50, the digital course and fine speeds (WSCOURSE and WSFINE) are computed from the integer numerical values (ICOURSE and IFINE) provided by the digital speed channel circuitry. Then either the course or the fine value, depending on whether the course is greater than the switchover speed (WSWITCH, a keyboard entered constant set at 1650 rpm), is selected as the digital speed (WSDIG). At statement 52 all speed failure states are reset prior to the two out of three speed selection process; then comparisons of the three speed differences are made against the allowable difference (WSERROR). The results of this comparison yield an entry in Table 1 which is then acted upon.

At statement 53, the speed selection process has concluded that the digital speed is unreliable, and therefore sets the logical state (DIGSPDF) for further action later in this process. Similarly, just before statement 57, the analog speed has been found to be unreliable and its logical state (ANASPDF) is set for further action. Finally, at statement 57 all speeds have been found unreliable, thus requiring the speed channel failure logical state (SPTF) to be set as well as the digital and analog failure states (DIGSPDF and ANASPDF).

TABLE 1.

SPEED SELECTION PROCESS

| Digital ≈ Analog | Digital ≈ Super. | Analog ≈ Super. | Speed Used | Comment |
|---|---|---|---|---|
| Y | Y | Y | DIGITAL | All Reliable |
| Y | Y | N | DIGITAL | Super. Inacc. |
| Y | N | Y | DIGITAL | Super. Inacc. |
| Y | N | N | DIGITAL | Super. Unrel. |
| N | Y | Y | ANALOG | Digital Inacc. |
| N | Y | N | DIGITAL | Analog Inacc. |
| N | N | Y | ANALOG | Digital Inacc. |
| N | N | N | NONE | All Unrel. |

At statement 54, the selected speed, whether it be the digital or the analog, has been placed in a temporary location (TEMP). This value is now checked against a high limit (WSMAX) and a low limit (WSMIN), each of which are keyboard entered constants which normally have values about 4500 and 300 rpm, respectively. This checks against absolute limits which the selected speeds may have violated. In addition, if the breaker (BR) is open (thus indicating that the DEH system is in wide-range speed control) and the selected speed is below WSMIN, the turbine speed reference (REFDMD) is compared with a minimum speed reference (WSREFMIN), which is another keyboard entered constant usually set at 600 rpm. If the reference (REFDMD) is greater than WSREFMIN, this indicates the turbine is not rolling or the speed channel system is not functioning properly. In all of these latter cases, transfer is made to statement 57 where the speed channel failure states are set, which then switch the turbine to manual control through action in the LOGIC task.

For the large majority of times however, the selected speed is reliable and the program transfers to statement 58. The state of the breaker (BR) is checked; if it is open, no special action is taken other than transfer to statement 65 for final bookkeeping. If the breaker is closed, thus indicating load control, special logic decisions are made to determine if a speed channel failure or a speed signal switch has just occurred. If so, the appropriate speed bumpless transfer computations are made as indicated in Equations (38) and (42) above, and transfer is made to statement 65.

At statement 65, final bookkeeping checks are made for the speed selection function. Thus, if any of the logical conditions (SPIF, DIGSPDF or ANASPDF)

have changed state in the current execution of the SPEED SELECTION program will respect to the last execution of this program, the LOGIC task is asked to run by setting the RUNLOGIC flag. The AUX SYNC task then bids the LOGIC task within 1/10 sec, thus providing the mechanism for aligning all monitor lamps and the speed feedback loop IN/OUT status. The program then proceeds to the next section of the CONTROL task.

Select Operating Mode Function

The SELECT OPERATING MODE program must distinguish between speed and load control by examining the state of the main generator circuit breaker. For wide-range speed control, the program flow chart is shown in FIG. 61A. The automatic synchronizer state (AS) is first interrogated; if it is the operating mode, the auto sync increase and decrease states (ASINC and ASDEC) are examined. These states are flip-flops which are controlled by the LOGIC task when the auto sync raise or lower contact inputs are set. The program carefully checks to see if both the increase and decrease states re set; if so, no action is taken. Otherwise a temporary location (TEMP) is set to +1 rpm or −1 rpm for each pass through the program during which the appropriate contact input is set. The turbine speed reference and demand are then incremented properly, the ASINC and ASDEC states are reset for the next time, and the program passes to the next stage of the CONTROL task.

If the automatic synchronizer is not the operating mode, then the Automatic Turbine Startup (ATS) stte is interrogated at sttement 4000 (FIG. 61A). If it is the operating mode, as determined by the LOGIC task, the turbine speed demand and rate are selected from this program via computer locations TASDMD and TASRATE. The rate is then checked against an absolute high limit (OARATMAX), which is a keyboard entered constant usually set at 800 rpm after which the program passes on to the next stage of the CONTROL task.

If the AUTOMATIC TURBINE STARTUP program is not the operating mode, the Operator Automatic (OA) state, and the Maintenance Test (OPRT) state are interrogated at statement 6000 (FIG. 61A). If either of these states are set, the turbine speed demand and rate are selected from the keyboard and the program proceeds to the next stage of the CONTROL task. Note that on Operator Automatic the keyboard values control the turbine, while in Maintenance Test the keyboard values simulate a turbine.

If neither Operator Automatic nor Maintenance Test is the operating mode, then the turbine is in Manual control and the SELECT OPERATING MODE program goes into the manual tracking mode at statement 7000. If the contact input (THI) is set, this means the throttle valves are wide open and the turbine is in speed governor control. Then the error between manual and computer governor valve outputs (IGVMAN and IGVAO) is multiplied by a gain factor (GR10) and saved in a temporary location. If the contact input (THI) is not set, then the turbine is in speed throttle control and the error between manual and computer throttle valve outputs (ITVMAN and ITVAO) is multiplied by a gain factor (GR5) and saved in a temporary location.

In either case, assuming the speed loop (SPI) is in service, the valve output error is checked against a speed tracking deadband (DBTRKS, which is a keyboard entered constant usually set at 1 percent) and the reference is checked against actual speed (WS) through a reference tracking deadband (DBTRKREF, which is also a keyboard entered constant usually set at 50 rpm). If both conditions are met, the READY state is set to indicate the DEH system is ready to assume automatic control. The READY state is detected by the FLASH task, which then flashes the OPER AUTO light to let the operator know that he may transfer to automatic control.

Finally, the gained valve position error in the temporary location (TEMP) is used to increment the reference (REFDMD), which is then checked against an absolute high speed limit (HLS). This is a keyboard entered constant which is normally set at 4200 rpm. The program then transfers to statement 15500 for some final bookkeeping checks.

When the SELECT OPERATING MODE program determines that the main generator circuit breaker is closed, thus indicating the turbine is on load control, transfer is made to statement 10000 which is shown in FIG. 61B. The Throttle Pressure Control (TPC) state is interrogated; if it is in service, then the actual throttle pressure (PO) is compared against a set point (POSP), which is a keyboard entered constant usually set at about 1600 psia. If the throttle pressure (PO) is above the set point (POSP), no further action is taken. But if PO is below POSP, then the governor valve position (GVSP) as called for by the computer is checked against a minimum governor valve set point (GVSPMIN). This is a keyboard entered constant usually set at about 25 percent. If GVSP is less than GVSPMIN, no further action is taken; but if GVSP is greater than GVSPMIN, then the throttle pressure limiting state (TPLIM) is set and the reference load rate is set to runback the reference at the rate TPCRATE, which is a keyboard entered constant usually set at 200 percents per minute. The program then transfers to statement 11500 for further bookkeeping computation.

If not throttle pressure contingency exists, the RUNBACK contact input (RB) is interrogated; if it is set, the load reference is runback at the rate (RBRATE, which is a keyboard entered constant set at about 100 percent per minute. Then at statement 11500 some bookkeeping details are taken care of. Thus if the Automatic Dispatch System (ADS) state has been in control when either a throttle pressure limit or runback condition occurred, this mode is rejected by resetting the automatic dispatch system pushbutton state (ADSPB) and setting th RUNLOGIC flag. Within 1/10 sec the AUX SYNC task bids the LOGIC task, which then realigns all states to the correct position. A second bookkeeping check is made at statement 11700 where th HOLD state is checked. If HOLD is reset, then it is set so that the operator has an indication of why the reference has been runback.

If no runback contingency exists, then the Automatic Dispatch System (ADS) state is interrogated at statement 1200. If it is the operating mode, the ADS increase and decrease states (ADSINC and ADSDEC) are examined. These are flip-flops which are controlled by the LOGIC task when the ADS increase and decrease contact inputs are set. The program carefully checks to see if both the increase and decrease contacts are set; if so no action is taken. Otherwise a temporary location (TEMP) is set to the ADS raise or lower pulse count (IADSUP or IADSDOWN). The AUX SYNC task keeps track of these pulse counts according to the conditions set up by the LOGIC task. However, a maximum ADS pulse-width is imposed on both the raise and lower pulses in the SELECT OPERATING MODE program by comparing their counts (IADSUP and IADSDOWN) with a limit (ADSMAXT), which is a keyboard entered constant usually set to 10 counts of 1/10 sec each (thus yielding a maximum pulse-width of 1 sec). After the pulse-width limiting action, at statement 12400 the turbine load reference and demand are incremented by an amount proprotional to the pulse-width; the proportionality factor (ADSRATE) is a keyboard entered constant usually set somewhere between 1 and 10 MW per sec of pulse-width. Finally, at statement 12600, various ADS counters and states are reset prior to moving on to the next stage of the CONTROL task.

If the ADS state is not set, then the select operating mode program checks the Operator Automatic (OA) state and the Maintenance Test (OPRT) state at statement 14000. If either of these states are set, then the turbine demand and rate are accepted from the keyboard and the program proceeds to the next stage of the CONTROL task. Note that in Operator Automatic the keyboard values control the turbine, while in Maintenance Test the keyboard values simulate a turbine.

If neither Operator Automatic nor Maintenance Test is the operting mode, then the turbine is in Manual control and the SELECT OPERATING MODE program goes into the Manual Load Tracking mode at statement 1500. The error between the manual and computer governor valve outputs (IGVMAN and IGVAO) is stored in a temporary location (TEMP) and compared against a load tracking deadband (DBTRKL), which is a keyboard entered constant usually set at about 1 percent. If the outputs agree within DBTRKL, then the READY state is set to indicate the DEH system is ready to assume automatic control. The READY state is detected by the FLASH task, which then flashes the OPER AUTO light to let the operator know that he may transfer to automatic control.

The valve output error is then gain multiplied by GR9 and added to the current reference (REFDMD), which is high-limit-checked against MWMAX, a keyboard entered constant usually set to about 120 percent of rated megawatts. REFDMD is also low-limit-checked against zero, thus assuring that the tracking scheme will not windup in either direction. Finally, a last check is made to determine if a voltage exists on the test analog output lines; if so, the READY state is reset so that transfer to automatic control is inhibited until this voltage is removed. This may be done by pressing the OPEN valve test pushbutton until the lights behind the OPEN and CLOSE pushbutton go out.

Speed/Load Reference Function

The GO state is checked; if GO is off, the HOLD state is checked. If HOLD is on and the demand and reference value (REFDMD) are equal, then the logical states (GOHOLDOF and RUNLOGIC) are set. This results in the LOGIC task being bid within 1/10 sec by the AUX SYNC task, which recognizes the RUNLOGIC state. The LOGIC task then turns off the HOLD flip-flop and lamp as requested by the GOHOLDOF state.

If the GO state is set back however, then this is the signal to allow the reference to move toward the demand. The magnitude of the difference between the reference and the demand is computed and stored in a temporary location. Then the magnitude of the incremental step size taken each second by the selected rate, as discussed above, is saved in another temporary location. These two temporary quantities are then compared and if the demand/reference difference in TEMP is greater than the incremental step size in TEMP1, this means the reference must continue to move closer to the demand. However, the governor valve position limiting state (VPLIM) is checked; if it is set and the demand is above the reference, then no movement is allowed in the reference. This is because the valve position limit function is operating and refuses to allow any increase in reference because this will attempt to increase the governor valve position beyond the limit.

If there is no valve position limiting action, then the reference is incremented by the incremental rate step size and the program transfers for final exit.

Eventually the reference will approach within the allotted boundary of the demand. Then the reference program immediately sets the reference equal to the demand. Finally, the state of the breaker (BR) is interrogated; if it is set, the program transfers for the Load Control System computations, while transfer is made for the Speed Control System computations if the breaker state (BR) is reset.

Speed Control Function

To provide the simulation and training feature, FIG. 64 shows an additional program path which will internally generate a simulated speed signal (SIMWS) in the Maintenance Test mode of operation. This is accomplished by feeding back the speed controller output (SPDSP) through a first order lag transfer function which approximates the turbine inertia response. This simulated speed then replaces the actual speed in developing a speed error during the Simulation/Training mode of operation.

All speed control system parameters, such as gains, reset times and limits, are keyboard entered constants which are available for tuning or adjustment during the Maintenance Test mode. These changes require transfer of the turbine control to manual operation.

Logical checks are made to determine whether the speed computations should be evaluated. Thus, if the speed inputs failed and are unreliable, then the speed loop (SPI) is taken out of service, and there is no speed information by which to control the turbine. In addition, if the overspeed speed protection circuit in the Analog Backup System is operating, as indicated by the contact input (OPCOP), this closes the governor valve and thus overrides the DEH Speed Control System; consequently in this case, no speed control computations are performed.

Assuming that neither of these situations exist, the speed error is calculated. If the system is in the Simulation/Training mode, this error is the difference between the reference and simulated speed; the speed error is the difference between the reference and actual speed in all other cases. Following this error computation, a decision is made as to whether the turbine is on governor or throttle control. Appropriate calls are then made to the PRESET subroutine to evaluate the proportional-plus-reset controller action for the throttle or governor valve. This subroutine takes care of evaluating the controller algorithm and the high/low limit checks to eliminate reset windup.

Load Control Function

As in the Speed Control System, all parameters in the Load Control System are keyboard entered constants, which may be tuned or adjusted in the Maintenance Test mode. As always, changes of this type require transfer to manual control for the adjustment, after which the DEH system will track and permit return to automatic control.

To provide the simulation and training feature disclosed previously, FIG. 65 shows additional program paths which internally generate simulated megawatt and impulse pressure signals (SIMMW and SIMPI) in the Maintenance Test mode of operation. These are accomplished by feeding back the load reference (REF2) and the valve set point (VSP) (through software) to first order lag transfer functions which approximate the generator and turbine responses. These simulated signals then replace the actual feedback in developing megawatt and impulse pressure errors during the Simulation/Training mode of operation.

A check is first made (FIG. 65A) to determine if a change has occurred in the throttle pressure limit state (TPLIM); if so the LOGIC task aligns all status variables accordingly. The LOAD CONTROL program next checks the speed transducer failure state (SPTF). If there is no failure, the speed feedback loop is evaluated with a call to the SPDLOOP subroutine; if there is a speed transducer failure, the speed feedback loop is bypassed and the speed compensation factor (X) is set to zero. Whichever is the case, the factor (X) is summed with the turbine load reference (REFDMD) to form the speed compensated load reference (REFI). A low-limit-check against zero is performed on REF1 to keep it from going negative, which is possible should a turbine overspeed condition result.

The LOAD CONTROL program then checks the maintenance test contact input (OPRT), which if set means the DEH system is being used as a simulator/-trainer or control system tuning is underway. In either case, simulated megawatt and impulse pressure signals (SIMMW and SIMPI) are generated; if the turbine is not in this mode, then the simulated signals are set equal to the actual signals.

The state of the megawatt feedback loop (MWI) is checked; if the loop is out of service, the speed/-megawatt compensated load reference (REF2) is simply set equal to the speed compensated load reference (REF1). But if the megawatt loop is in service, the megawatt error is computed and ranged to a per unit value by using the ranging gain (GR2), which is normally set at rated turbine generator megawatts. Then the PRESET subroutine is called to evaluate the megawatt proportional-plus-reset controller, including high/low limit checking. The result of this computation is the megawatt trim factor (Y), which is then applied to the speed compensated load reference (REF1) in a product relationship to form the speed/megawatt corrected load reference (REF2).

The speed/megawatt compensated load reference (REF2) is converted to an impulse pressure set point (PISP) by use of ranging gain (GR3). The state of the impulse pressure feedback loop (IPI) is then interrogated; if it is out of service the governor valve set point (VSP) is simply set equal to the impulse pressure set point (PISP) in psi. But if the impulse pressure loop is in service, then the impulse pressure error is computed and used as the driving signal for the proportional-plus-reset controller, which is evaluated by a call to the PRESET subroutine; this also does the high/low limit checking.

Finally, the governor valve set point (VSP) in psi is converted to a governor valve set point from 0 to 100 percent by use of the ranging gain (GR4), which is normally set at rated impulse pressure. The program then transfers to the final stages of the CONTROL task which actually compute the throttle and governor valve outputs.

Throttle Valve Control Function

The throttle control state (TC) is interrogated (FIG. 66); if it is set, this means the throttle valves are in positive control, and the program computes the throttle valve analog output from the speed controller value (SPD) and the keyboard entered ranging constant (GR6). However, if the throttle control state (TC) is not set, then the governor control state (GC) is checked. If it is not set, this means that the turbine is unlatched and that the throttle valves should be at their minimum position of completely closed. The program then computes the throttle valve analog output of zero.

If the governor control state (GC) is set, it is then necessary to determine if the throttle/governor transfer is complete by checking the TRCOM state. If TRCOM is not set, this means the transfer is still in progress; an additional check is made to determine if the governor valves have closed as indicated by GVMIN. If GVMIN is not set, then the throttle valves are still in positive control and the program computes the throttle valve analog output as required by the speed controller value (SPD) and the ranging gain (GR6).

Eventually the state GVMIN will be set to indicate that the governor valves are now in positive control. Then the throttle valve maximum position state (TVMAX) is questioned. If it is not set, then the throttle valve bias integrator (TVBIAS) is incremented by the bias constant (BTVO) and the throttle valve analog output set accordingly. In a short time the throttle valves are wide open; after this all logical states will be set to indicate this fact. Succeeding passes through the THROTTLE VALVE CONTROL program will then hold the throttle valve analog outputs wide open until the turbine is unlatched and tripped for some reason.

Governor Valve Control Function

The governor valve position, as set by the governor valve control function, is compared to (and high limited by) the valve position limit (VPOSL) at all times. This gives the operator the ability to override the control system at any time that he considers it necessary, and allows him to control the position of the governor valves from VALVE POSITION LIMIT RAISE and LOWER pushbuttons on the Operator's Panel. If the governor valves are limited by the valve position limit (VPOSL), the lamp behind the VALVE POSITION LIMIT DISPLAY pushbutton flashes, thus alterting the operator to the condition.

Various logical numerical checks are necessary to determine which of the five situations the turbine is currently in, on a second-by-second real time basis. Further, the actual governor valve analog output computation is made for each of these five situations, along with the valve position limit checking feature and additional bookkeeping computations necessary for coordination of the various DEH programs.

Considering the flow chart of FIG. 67 at statement 1200, the valve position limit state (VPLIM) is reset at each pass through the governor valve control program. Then the governor control state (GC) is interrogated; if it is not set, the throttle control state (TC) is checked. If throttle control (TC) is not set, this means the turbine is unlatched and the governor valve minimum state (GVMIN) is checked. If GVMIN is not set, then at statement 1270 all governor valve open states are reset and all governor valve close states, including GVMIN, are set. The program then transfers to statement 1320 for analog output computation and valve position limit checking to hold the governor valvess closed. Succeeding passes through the program will find the GVMIN state set and transfer directly to statement 1320.

If the turbine is latched, then the throttle control state (TC) is set. The governor valve control function finds itself at statement 1210, where the governor valve maximum state (GVMAX) is interrogated. If it is not set, then the governor valve bias integrator (GVBIAS) is incremented by the governor valve open-bias constant (BGVO), which is keyboard entered constant usually set at 10 percent to open the governor valves incrementally when the turbine is latched. The program then transfers to statement 1240 where the governor control state (GC) is again checked, since this point in the program may be reached from alternate paths. For the present situation, GC will not be set, thus leading to a check on whether the governor valve bias integrator (GVBIAS) has reached 100 percent and therefore have positioned the governor valves wide open. Assuming that GVBIAS has incremented up to 100 percent, all governor valve close states are reset and all governor valve open states are set, including GVMAX. The program then transfers to statement 1320 for analog output computation and valve position limit checking to hold the governor valves wide open. Succeeding passes through the program find the GVMAX state set at statement 1210 and transfer directly to statement 1320.

Each of the cases discussed above apply when the governor control state (GC) is not set. Once the throttle/governor transfer is initiated, however, this sets the governor control state (GC), in which case the GOVERNOR VALVE CONTROL program arrives at statement 1220. The state of the breaker (BR) is checked; if BR is set, this means the DEH system is on load control and the program transfers to statement 1340 for load computation of the governor valve analog outputs and valve position limit checking.

However, if the breaker (BR) is open and the DEH system still in speed control, the check of BR at statement 1220 finds it not set. Then the throttle/governor transfer complete state (TRCOM) is checked; assuming it has not yet been set, the governor valve closed state (GVMIN) is checked. Normally this will not be set at this point in time, thus requiring the governor valve bias integrator (GVBIAS) to be decremented by the governor valve close-bias constant (BGVC), which is a keyboard entered quantity normally set at 100 percent to instantly close the governor valves when the transfer from throttle to governor control is initiated.

The program then passes on to statement 1240 where the governor control state (GC) is checked again; since GC is set for the present discussion, then at statement 1260 the manual contact input (TM) is interrogated. If the turbine is in manual control at this time, the program transfers to statement 1270 for appropriate bookkeeping which will be described shortly. If the turbine is in automatic control, then the test at statement 1260 on the state of TM finds it not set and an additional test is made on whether the governor valve bias integrator (GVBIAS) has reached zero to indicate the governor valves are closed. If it has not, then the program cycles through this area until the GVBIAS value is zero. Normally this will take only a few passes since the closing bias constant (BGVC) will be quite large to achieve a fast, smooth throttle/governor valve transfer.

Once GVBIAS is zero, the GOVERNOR VALVE CONTROL program searches to determine if the turbine speed (WS) has dropped below the speed at transfer WSTRANS by an amount WSDIP, which is a keyboard entered constant usually set at 10 rpm. When this has occurred, and assuming that the analog backup system has followed the computer governor valve analog output as indicated by the manual not tracking state (MANOTRAK) the GOVERNOR VALVE CONTROL program transfer to statement 1270. All governor valve open states are reset and all governor valve close states, including GVMIN, are set and the program passes on to statement 1320 for computation of the governor valve analog output and valve position limit checking to hold the governor valves closed.

The setting of GVMIN at statement 1270 leads to execution of the LOGIC task, which then uses this information to generate the throttle/governor valve transfer complete state (TRCOM). Succeeding passes through the GOVERNOR VALVE CONTROL program at statement 1220 find TRCOM set and immediately transfer to statement 1380 for computation of the governor valve analog output and valve position limit checking to control turbine speed. The portion of the program at statement 1320 is that necessary to hold the governor valves at the value residing in the governor valve bias integrator (GVBIAS).

The computations necessary to position the governor valves on load control determine where the load control governor valve set point (GVSP) liess with respect to a nonlinear curve which characterizes the governor valve stroke mechanism. The result of this search positions GVSP along the abscissa of the curve, after which the actual valve position (GVPOS) is computed from analytical solution of points along the curve.

The computed governor valve position (GVPOS) is compared with the current valve position limit (VPOSL). If GVPOS is below VPOSL, no action is taken, if GVPOS is greater than VPOSL, then the valve position limiting state VPLIM is set, RUNLOGIC is set and the actual governor valve position GVPOS is reset to the value residing in VPOSL. The LOGIC and FLASH task perform their assigned functions of aligning the DEH system to these conditions and flashing the VALVE POSITION LIMIT DISPLAY lamp, respectively.

In the computations necessary to position the governor valves on speed control, the speed controller percent output (SPD), suitably ratioed to account for differences between the speed ranging gain (GR7) and the maximum ranging factor of 20.47, is checked against the current valve position limit (VPOSL). If the ratioed speed controller output is below VPOSL, no special action is taken; if VPOSL is violated, then the valve position limiting states (VPLIM and RUNLOGIC) are set to trigger the appropriate responses from the LOGIC and FLASH tasks. In addition the speed controller output (SPD) and the speed integrator (RESSPD) are reset to values consistant with VPOSL.

A FORTRAN DO loop is executed to make final checks on both the throttle and governor valve analog outputs. They are low-limit-checked to guarantee that they do not go below zero and high-limit-checked to guarantee that they do not go above the maximum analog output voltage pattern. Then, the analog output handler is called to output the computed throttle and governor valve patterns. Finally, the CONTROL task exits to the Monitor for the next bid 1 sec later.

First Order Lag Function

The first order lag transfer function is a more or less standard component of control systems. It provides an output signal which is a time delayed version of the input signal. The time constant T of the first order lag is a measure of the time delay in seconds produced by the lag. Approximately 5 T (i.e. five time constants) after the input makes a step change, the output has essentially reproduced this change.

The uses of the first order lag function vary somewhat. In some cases, it is valuable as a filter to smooth out random noise pulses or spikes in signals. In other cases, the first order lag is useful in simulating known response of various devices or portions of systems. This latter situation is the way in which the first order lag is used in the DEH application. When the MAINTENANCE TEST switch is moved to the TEST position; thus placing the DEH system in the simulation/training mode of operation, appropriate computer variables are sent into first order lag transfer functions. The output of these functions represents simulated analog inputs such as turbine speed, impulse pressure and megawatts.

In order to perform the mathematical function of a first order lag in a computer, it is necessary to use numerical techniques to approximate the function. A number of algorithms are available, each of which have certain advantages and disadvantages. Although the trapezoidal rule yields the most accurate first order lag response, it requires additional storage for past history of the input. For this reasons, the rectangular rule is used in the DEH system; it requires less storage and, though it is not as accurate as the trapezoidal rule, such accuracy is not required in the use of the first order lag in a simulator/trainer context.

The algorithm used by the DEH system to evaluate the first order lag is given by:

$$ZOUT(N) = \frac{T}{T+DT} * ZOUT(N-1) + \frac{T}{T+DT} * ZIN(N) \quad (43)$$

Definition of terms in Equation (43) follows:

| | |
|---|---|
| (N) | The current instant of real time |
| (N-1) | The last instant of real time |
| DT | The sampling interval, or the time interval between evaluations of the first order lag algorithm. In the DEH system this is normally 1 sec |
| T | The first order lag time delay in sec |
| ZIN(N) | The current value of the input |
| ZOUT(N) | The current value of the output |
| ZOUT(N-1) | The last value of the output |

To use the algorithm of Equation (43), the DEH system is organized so that the parameters (DT and T), the input variable (ZIN(N)), and the output variables (ZOUT(N)) and ZOUT(N−1) are in known COMMON areas of storage. The algorithm itself is programmed in the form of a FORTRAN STATEMENT function, so that use of the first order lag is restricted to the CONTROL task. To evaluate the lag transfer function, it is necessary only to write the statement function expression in-line at the appropriate place in the CONTROL task.

The first order lag is programmed as a FORTRAN STATEMENT function to minimize the overhead storage requirements that occur if programmed as a subroutine.

$$FOLAG(ZIN,TDELAY,ZOUT) = (TDELAY*ZOUT+ZIN)/(TDELAY+1) \quad (44)$$

This statement expresses the algorithm of Equation (43), with some collecting of terms and substitution of 1.0 for the general sampling interval (DT), since the CONTROL task runs every 1 sec. The dummy arguments (ZIN,TDELAY and ZOUT) represent the input, the time delay and the output variables needed to evaluate the first order lag.

Nonlinear Characterization Function

The nonlinear characterization function provides an important feature for accommodating the nonlinear nature of process equipment. This function produces an output related in a nonlinear fashion to the input.

The form of the curve comprising the characterization function varies somewhat with the application and with the mechanism available for incorporating this feature in the control system. In some analog systems, the curve may have two or at most three segments to accomplish its function. In some highly sophisticated computer systems, the curve may have as many as eight or ten segments. The DEH Control System provides a nonlinear characterization function having five straight-line segments composed of six points describing the intersections of these segments. The slope of any segment may be positive, zero or negative, while the points defining the intersections of various segments may have any positive value. For the DEH application requirements, it is only necessary to work with curves in the first quadrant.

The nonlinear characterization function in the DEH system is used to describe the governor valve position-versus-stroke relationship on load control. Accurate representation of this curve allows operation of the DEH system in automatic control (with the megawatt and impulse pressure feedback loops out of service) to be effectively linearized. Megawatt load demand can be achieved quite closely on automatic control without the feedback loops, which may be out of service due to faults with the transducers, or due to other problems. Of course, with the loops in service, operation then is exactly aligned between load demand and actual megawatt load. The axis of ordinates POS and the axis of abscissa SP consist of six points each. These are all keyboard entered quantities which may be tuned or adjusted in the maintenance test mode of operation.

The program isolates the segment of the SP axis within which the input value (GVSP) lies. Having found this, the program then evaluates the output value (GVPOS) using the slop intercept form of a straight-line from analytical geometry considerations. The ratio of the difference between corresponding values of POS and SP yields the slope of that section. This slope is multiplied by the exact position within the I-th section, which is given by the difference between the current value of the input (GVSP) and the left end point (SP(I−1)). The resultant product is added to the intercept (POS(I−1)) for this section to yield the required governor valve position (GVPOS).

CCI SCAN MONITOR — ANNUNCIATOR ALARM

The DEH system scans contact inputs on a demand basis. The scan is initiated by a change of state of any contact. This change triggers a sequence of events interrupt which in turn bids the CONTACT SCAN program. However under certain conditions such as may occur during initial plant startup when all wiring has not been completely checked out, high-frequency noise on a contact can result in the sequence interrupt being generated continuously. This activity essentially "captures" the computer and prevents the DEH programs from carrying out their normal functions.

In order to counteract such a condition, special logic detects high-frequency contact noise. Should this occur, the DEH system immediately switches from a demand scan to a ½ sec periodic contact scan, the sequence interrupt is disabled, and a contact output is set which triggers the DEH CCI SCAN MONITOR annunciator alarm. If this happens, the noisy contact input should be found and the field problem fixed. After this is done, the DEH system may be returned to its originally dessigned demand scan by entering a particular constant from the keyboard as follows:

1. Turn the MAINTENANCE TEST key to the TEST position; this switches the turbine to manual control.
2. Press the PROGRAM DISPLAY button, which then backlights.
3. Key in the address 3141 and press the ENTER buttons. The address appears in the left windows and the value 1.000 appears in the right windows.
4. Press the CHANGE button, which backlights. The right windows clear to zero.
5. Key in the value 0 and press the ENTER button. The CHANGE lamp goes out and the DEH CCI SCAN MONITOR annunciator is turned off.
6. Return the MAINTENANCE TEST key to the OFF position. The DEH system tracks the manual backup system preparatory to transfer to automatic control, which the normal demand scan being used.

DEH DIGITAL TREND UPDATE PROCEDURE

The digital trend feature provides the ability to print up to 19 DEH system variables. These quantities may be printed at one time, or they may be printed periodically at a controllable rate by setting certain constants from the keyboard. A brief description of the entry procedure follows:

1. Press the TURBINE PROGRAM DISPLAY button, which then backlights.
2. Key in address 3364 and press the ENTER button. The address appears in the left windows and a numerical value of 0000, 1.000, or 2.000 appears in the right windows, depending on the previous state of the digital trend.
3. Press the CHANGE button; the button backlights and the right windows are cleared.
4. Key in one of the following numerical values, depending on the desired results as listed.
   - 0 — Suppress the digital trend
   - 1 — Print the digital trend values one time
   - 2 — Print the digital trend values periodically at the frequency to be described below
5. Press the ENTER button. The CHANGE lamp goes out and the digital trend requested in Step 4 is carried out.

If a periodic trend has been requested, the time in seconds between printing of the values must be entered as follows:

1. Press the TURBINE PROGRAM DISPLAY button, which then backlights.
2. Key in address 3365 and press the ENTER button. The address appears in the left windows and the current value of the digital trend frequency appears in the right windows.
3. To alter the trend frequency, press the CHANGE button. The button then backlights and the right windows are cleared.
4. Key in the new digital trend frequency, in seconds, which will appear in the right windows.
5. Press the ENTER button. The CHANGE lamp goes out and the digital trend frequency requested is carried out.

A note on the frequency of the digital trend is appropriate. The IBM 735 typewriter prints out the 19 values requested, including real time and the address of each value, in about 40 sec. Therefore, this represents the minimum trend frequency; actually the frequency should be kept somewhere in the 120–300 sec range, which is about 2–5 min, or longer. However, it is not necessary to trend all 19 quantities which are available. If fewer quantities are trended, the frequency may be increased somewhat. Good practice would indicate 60 sec, (1 min) as the fastest trend frequency attempted.

The addresses of the 19, or less, quantities to be trended must be entered from the keyboard. The following presents the computer locations which must be given the addresses of the DEH quantities to be trended. In order to alter the variables in the digital trend, the following procedure must be carried out.

1. Press the TURBINE PROGRAM DISPLAY button, which then backlights.
2. Key in the trend location to be altered, as indicated in the following table. As an example, if the fourth variable is to be changed, then key in the number 3369; this appears in the left windows.
3. Press the ENTER button. The current value of the DEH quantity being trended in the fourth column will appear in the right windows.
4. Press the CHANGE button. The button backlights and the right windows are cleared.
5. Key in the address of the new DEH quantity to be trended in the fourth column.
6. Press the ENTER button. The CHANGE lamp is turned off and the new variable appears in the next print of the trend in column 4.

DEH TREND ADDRESSES

| Trend Column | Computer Location | DEH VARIABLE ADDRESS |
|---|---|---|
| 1 | 3366 | ADR1 |
| 2 | 3367 | ADR2 |
| 3 | 3368 | ADR3 |
| 4 | 3369 | ADR4 |
| 5 | 3370 | ADR5 |
| 6 | 3371 | ADR6 |
| 7 | 3372 | ADR7 |
| 8 | 3373 | ADR8 |
| 9 | 3374 | ADR9 |
| 10 | 3375 | ADR10 |

-continued

| DEH TREND ADDRESSES | | |
|---|---|---|
| Trend Column | Computer Location | DEH VARIABLE ADDRESS |
| 11 | 3376 | ADR11 |
| 12 | 3377 | ADR12 |
| 13 | 3378 | ADR13 |
| 14 | 3379 | ADR14 |
| 15 | 3380 | ADR15 |
| 16 | 3381 | ADR16 |
| 17 | 3382 | ADR17 |
| 18 | 3383 | ADR18 |
| 19 | 3384 | ADR19 |

APPENDIX 4

DEH Analog Hardware Description

P2000 Computer System

ANALOG BACKUP SYSTEM

Throttle Valve Control (Applicable Only to Units with Steam Chest Inlet Configurations)

Throttle valves are used on wide-range speed control from turning gear to approximately 90 percent of rated speed. From this point to full rated speed, governor valves are used for control.

When the DEH Control System is in the Operator Automatic mode of operation, the control signal from the computer analog output card (TVAAZ1) is permitted to control the throttle valves, through the Servo/-Linear Variable Differential Transformer (S/LVDT) Cards. The Analog Backup System tracks the computer output.

To accomplish this tracking, the analog comparator compares the TVAAZ1 signal to the output of digital-to-analog (D/A) converter (TVMAZ1). If TVAAZ1 exceeds TVMAZ1, the comparator generates a raise signal. This signal causes the up/down counter to count up at a preset rate and increase its digital output. The digital-to-analog (D/A) converter output (TVMAZ1) increases until it equals TVAAZ1. Thus the Analog Backup System continuously tracks signal TVAAZ1, when the DEH Control System is in the Operator Automatic mode.

When the DEH Control System is in the Turbine Manual mode of operation, the analog output (TVMAZ2) controls the throttle valves through the S/LVDT Cards; the computer output (TVAAZ2) is blocked. The auto/manual logic circuitry blocks the analog comparator output and allows the TV RAISE and TV LOWER pushbuttons on the Operator B Panel to control the up/down counter. Pressing the TV RAISE button causes the up/down counter to count up at a slow rate. If the FAST ACTION pushbutton is pressed at the same time however, a faster rate is selected. The up/down counter output is converted to an analog output and used to control the throttle valves (TVMAZ2). With the DEH Control System in the Turbine Manual mode, the digital portion tracks the analog output with a computer software program.

In summary, when the system is in the Operator Automatic mode, the Analog Backup System tracks the computer output. When the system goes to the Turbine Manual mode, the analog system output equals the computer output and the transfer is made without moving the throttle valves (bumpless transfer). While the system is in Turbine Manual, the TV RAISE and TV LOWER pushbuttons control the throttle valve position and the digital portion tracks the analog system output. If the system is put back in the Operator Automatic mode, the transfer is made without a bump.

Governor Valve Control

Governor valves are used for speed and load control. If there are separate valve actuators for each valve, the DEH Control System may be in either single valve or sequential valve operation.

There are two types of inputs to the S/LVDT Cards. One type is the sequential valve inputs (GV1AZ1, GV2AZ1); these signals are generated independently of the Analog Backup System. The second type of input (GV*AZ1) is the single valve input; this input is generated either by the computer GVAAZ2) or by the analog system (GVMAZ2).

When the system is in single valve operation (or when sequential valve operation is not supplied), the sequential valve inputs to the S/LVDT Cards are zero. The GV*AZ1 signal controls the governor valves. Except for the fact that the analog output is biased so that positive and negative values can be obtained, the governor valve control circuits are the same as the throttle valve control circuits previously discussed.

The Analog Backup System tracks the computer output (GVAAZ1) when the control system is in the Operator Automatic mode. The analog system is controlled by the GV RAISE and GV LOWER pushbuttons when the control system is in the Turbine Manual mode and the computer tracks the analog output. The control signal (GV*AZ1) goes to all S/LVDT Cards; all valves move the same amount at the same time.

When the control system is in sequential valve operation (and in the Operator Automatic mode), the sequential inputs (GV1AZ1, GV2AZ1) are controlled by the computer. The computer also sets the single valve input (GV*AZ1) to zero. The computer then uses the sequential inputs to individually control the governor valves.

If the control system transfers to the Turbine Manual mode while in sequential valve operation, the computer keeps the sequential valve input signals (GV1AZ1, GV2AZ1) constant. Bumpless transfer occurs since the governor valves do not move. When the transfer is complete, the operator can position the valves with the GV RAISE and GV LOWER pushbuttons. Pressing the GV RAISE pushbutton increases the output of the D/A converter (GVMAZ) and thus increases the single valve input signal (GV*AZ1). GV*AZ1 is summed with the sequential input signals (GV1AZ1 and GV2AZ1); this increases the output of the S/LVDT Cards, and opens all the valves by the same amount.

If the GV LOWER pushbutton is pressed, the single valve input signal (GV*AZ1) is decreased. This signal is summed with the sequential input signals, causes the decrease in S/LVDT Card output, and closes all the valves by the same amount. The up/down counter counts below its mid range and causes the D/A converter output (GVMAZ1) to go negative. This feature allows the valves to be closed, even though the sequential valve input remains constant.

The digital system continuously tracks the single valve input (GV*AZ1) with a computer software program. When transfer to Operator Automatic is initiated (by pressing the OPER AUTO pushbutton), transfer occurs without changing the valve position (bumpless transfer).

In summary, for units with individual servos, the governor valves can operate in either the single valve or sequential valve mode. In either case, the Analog Backup System tracks the computer generated single valve output signal when in Operator Automatic mode, and positions the valves when in Turbine Manual mode.

Overspeed Protection Control (OPC) System

The OPC system controls turbine overspeed in the event of a partial or complete loss of load and if the turbine reaches or exceeds 103 percent of rated speed. Turbine input power is a function of Intermediate Pressure (IP) exhaust pressure; a pressure transducer provides IP exhaust pressure. A three-phase watt transducer provides generated kW information. These quantities are compared; if they differ by a preset amount (adjustable with the OPC PRESSURE/KW COMPARISON SETPOINT switch on the Test and Calibration Panel from 20 to 100 percent), protection is required. OPC protection is also required if turbine shaft speed exceed 103 percent of rated speed. This information (in rpm) is supplied by another transducer. The signals from the transducers are checked against high and low reference voltages to determine when a transducer fails.

Partial Loss of Load

The IP exhaust pressure and the generated power are compared. When they differ by an adjustable amount, and neither transducer has failed, the close interceptor valve (CIV) flip-flop is set. This causes the interceptor valves to close in approximately 0.15 sec. If the generator breaker does not open, this condition is detected as a partial load loss. The interceptor valves remain closed for a period of time (0.4 to 1.6 sec); this time delay depends on the setting of the INTERCEPT VALVE CYCLE TIME switch on the Test and Calibration Panel. After the time delay, the CIV flip-flop is reset and the interceptor valves reopen. Closing the interceptor valves provides a momentary reduction in generator input and aids in achieving power system stability. This feature may be inhibited, if not required, by a jumper on the half-shell connectors.

Complete Loss Of Load

When the interceptor valves are closed and the generator breaker opens, this condition is detected as a complete load loss. When the generator breaker opens, the load drop anticipation (LDA) is set, requesting OPC action. All governor and interceptor valves are then rapidly closed. Load drop reset time is fixed at 10 sec. Both CIV and LDA load loss circuits are inoperable below 25 percent load as measured by IP exhaust pressure.

Overspeed Action

OPC action also occurs when turbine speed is equal to, or greater than, 103 percent of rated speed. Governor and interceptor valves are closed until the speed drops below 103 percent. The OPC system may be tested using the OPC key switch on the Operator B Panel. If the breaker is open and the key is turned to the OPC TEST position, a signal is generated; this signal indicates that the speed of the turbine is over 103 percent. The OPC system then closes the valves as though an actual overspeed condition had occurred.

Speed Channel System

Two speed channels are located in the Analog Backup System: an analog speed channel and a digital speed channel. The analog speed channel detects a system overspeed condition by comparing an analog speed signal to a reference voltage. The analog speed signal is also sent to the digital portion of the control system and to the rpm meter on the Operator B Panel. The digital speed channel shapes the input speed signal (analog) and uses a 36 kHz clock to convert the analog signal to a corresponding digital signal. This digital signal is then applied to circuits in the digital portion of the control system.

Throttle Pressure Control (TPC)

The TPC circuits provide a means (in Turbine Manual mode) of controlling minimum throttle pressure. If throttle pressure falls below a set point (adjustable on the Test and Calibration Panel from 20 to 100 percent of rated pressure), the governor valves are closed until throttle pressure increases to the set point. The TPC circuits cannot close the governor valves to less than 20 percent open. The TPC circuits can be placed in, or out, of service in two ways, as follows:

1. TPC IN/TPC OUT pushbutton on the Operator B Panel.
2. Digital controller.

A hardware flip-flop and associated contact closure input to the controller ensure that both the analog and digital systems are in the same state. A transducer failure or the generator breaker opening will put the TPC circuits out of service. The TPC circuits cannot be restored to service until the problem is corrected. Also, the TPC circuits cannot be placed in service at any pressure below the TPC set point.

Transducer Monitors And Status Contacts

The following Analog Backup System parameters are measured with transducers:

Inlet Pressure
Generator Electric Load
Analog Speed Channel
Throttle Pressure

The transducers are monitored for high signal and low signal failures.

The transducers for the first three parameters listed above are used in the OPC system. If any of these transducers fails, both the OPC MONITOR lamp and the appropriate failure lamp (on the Operator A Panel) light. If throttle pressure fails, only the THROT PRESS MONITOR lamp lights. When any transducer fails, a form C contact is activated. This contat provides a contact closure input to the digital section and also provides a contact for an external alarm.

Analog Backup System Schematic Description

General

The control and logic circuits for the Analog Backup System are shown on 18 drawings; these are numbered D01 through D18.

In general, analog signals are scaled for 0 to 10 Vdc representing 0 to 100 percent of the particular function. The signal can represent percent of valve position, pressure, megawatts, or any other similar signal. Analog signal names have a three or four letter prefix, followed by a Z1 and Z2. The "Z" indicates an analog signal; the "1" indicates that the signal is the original signal; the "2" indicates that the original signal has been processed by a circuit such as a mixing amplifier and may be inverted.

Logic level signal names have a three or four letter prefix followed by a Y1, Y2, X1 or X2. The Y designates the "yes" condition and the X designates the "no" condition. The "1" indicates the original logic signal and the "2" indicates a logic signal that has been inverted twice. A logical 1 is represented by a +15 V signal and indicates that the condition is true; a logical 0 is represented by ground (0 Vdc) and indicates that the condition is false.

Note

A four digit number/letter designation is associated with all signal names on the schematics (for example: 15B3). The first two digits indicate the drawing where the signal originates or is sent (D01 through 18). The second two digits indicate the zone coordinates on the drawing where the signal can be found. In the above example, the signal can be found on drawing D15, zone B3. All destinations or origins of all signals are given.

In the following descriptions, each of the schematics is discussed. The intent of these discussions is to point out the circuits shown on the schematics.

Manual Pushbuttons On Operator B Panel

The manual pushbutton circuit consists of a pushbutton and a Pushbutton Signal Conditioner (PSC) Card. When the pushbutton is pressed, card pins 3 and 4 are shorted. This action causes a +15 V output on card pin 5; the +15 V is equivalent to a 1. The signal conditioning circuit ensures that a good logical signal is sent to the analog section when a pushbutton is pressed.

Throttle Valve Tracking System (Drawing D04) (Applicable ONLY to Units with Steam Chest Inlet Configuration)

Details of the logic portion of the throttle valve tracking and manual control system are shown in this drawing. The essential elements of the throttle valve analog control system are shown in this drawing and also in drawings D05 and D06. The output to the throttle valve Servo/Linear Variable Differential Transformer (S/LVDT VP) Cards is generated by an up/down counter, digital/analog (D/A) converter, and an operational amplifier circuit.

In the quiescent state, the up/down counter has a 1 on pins 1 and 2. Input TVCUX1 on pin 2 is the raise signal; if this signal is 0, the counter counts upward at a rate determined by the clock rate signal (TVCKX1) applied to pin 8. A 0 is applied to pin 2 when the TV RAISE pushbutton on the Operator B Panel is pressed (TVIBY1 on NAND gate 3M is a 1), the system is in the Turbine Manual Mode (TMY1 on NAND gate 3M** is a 1), and permissives are present.

When the DEH Control System is in the Operator Automatic mode (TMX1 gate 3M, pin 14, is a 1), the Analog Backup System tracks the Digital Controller by increasing or decreasing the up/down counter output. Tracking for an increasing signal is accomplished with signal TIY1; this signal is generated by the tracking comparator (see the description for drawing D05). Two permissives must be present to enable the up/down counter, as follows:

1. The unit must be latched (**ASL*Y1 gate 3M, pin 1**, is a 1).

2. A high limit of 4500 counts must not have been reached (TVCHX1 gate 3M, pin 6, is a 1). TVCHX1 is determined by the signals at the input to NAND gates 3D.

Input TVCDX1 on pin 1 of the up/down counter is the decrease signal; if this signal is a 0, the counter counts downward at a rate determined by the clock rate signal (TVCKX1) applied to pin 8. A 0 is applied to pin 1 when the TV LOWER pushbutton is pressed, (TVDBY1 gate 3M, pin 5, is a 1), and the system is in the Turbine Manual Mode (TMY1 gate 3M, pin 4**, is a 1).

When the system is in the Operator Automatic mode, the Analog Backup System tracks the Digital Controller. The system must be in the Operator Automatic mode (TMX1 gate 3M, pin 38, must be a 1), and the comparator (see the description for D05) produces TDY1.

A decrease signal can also be generated by a turbine tripped condition (**ASL*Y1 gate 3B, pin 28, is a 0). This causes the counter to run down to a 0000 output. The counter zero stop is provided by an Input Expander (IE) Card (3L) and a gate (3C); these set signal TVCLX1 (gate 3L, pin 16**) to a 0. A 1.5 sec clock rate (CLM) is used so that the counter is in the zero position prior to relatching.

The throttle valves cannot be closed after the transfer to governor valves has occurred. When signal **THI*X1 (gate 3B, pin 14) is a zero, the counter cannot count down and the throttle valves cannot be closed. Signals THI*X1 is described in the description for drawing D06**.

The pulse-rate input, on pin 8 of up/down counter 3E, determines the rate at which the counter output changes.

Clock rate selection is detailed in the following table.

CLOCK RATES

| Description | Rate | Clock |
|---|---|---|
| Normal Pushbutton Rate | 180 sec | CLB |
| Fast Pushbutton Rate | 45 sec | CLA |
| Turbine Trip | 1.5 sec | CLM |
| Runback Tracking | 45 sec | CLA |

The X1 outputs of the up/down counter (pins 3 to 36) are connected to the input of the digital-to-analog (D/A) converter, card 3F on drawing D05. The counter output is in an Aiken code with a count range of 0 to 4500.

Throttle Valve Tracking System (Drawing D05) (Applicable ONLY to Units with Steam Chest Inlet Configuration)

The analog and transfer portions of the throttle valve control are shown on this drawing. The Relay 4 (RC4) Card (3K) selects the output from either the Analog Backup System (TVMAZ2) in the Turbine Manual mode, or from the Digital Controller (TVAAZ2) in the Operator Automatic mode. The selected output (**TV*AZ1) is sent to the Servo/Linear Variable Differential Transformer (S/LVDT VP) Card, see drawing D06. Transfer of the relay is controlled by the input (pin 2, TMX1); this signal is generated by circuitry on drawing D15. The relay is shown in the deenergized state (Turbine Manual mode).

The output from the up/down counter (see drawing D04) is the digital input to the D/A converter, card 3F, the digital input is converted to a 0 to −10 V analog signal (TVMAZ1). This signal is one input to the Mixing Amplifier 4 (MA4) Card (card 3J, pin 38). A +15 V bias is also applied to pin 37 upon loss of auto stop latch (ASL*X2, card 3K, pin 22, is a 1). The bias ensures that the output of the mixing amplifier (TVMAZ2) will be negative on loss of auto stop latch regardless of the level of the manual input signal (TVMAZ1).

The Digital Controller output is converted from digital to analog form with an Analog Output (AO) Card. The AO Card uses an 11 bit, resistance network as a voltage divider across a regulated −15 V source to generate a 0 to −10 V output TVAAZ1 (refer to computer system documentation for details). TVAAZ1 is applied to card 3H (MA4 Card) and a bias is applied upon loss of auto stop latch as described for the manual signal.

When the DEH Control System is in the Operator Automatic mode, manual tracking is accomplished by changing the up/down counter until TVMAZ1 equals TVAAZ1. The Analog Comparator 7 (AC7) Card (card 3G) generates increase (TIY1) and decrease (TDY1) signals for this purpose.

During the Operator Automatic mode, the Digital Controller monitors the Analog Backup System. If the Analog Backup System does not track the Digital Controller, the MANUAL NOT TRACKING AUTO lamp on the Operator A Panel is lit by the Digital Controller. Bumpless transfer from Turbine Manual to Operator Automatic is implemented by the Digital Controller tracking the Manual Backup System. Signals TV*AZ1, TVMAZ2, and TVAAZ2 (Analog Input (AI) (A211, A212, and A213) are used for this purpose.

Throttle Valve Servo's (Drawing D06) (Applicable ONLY to Units with Steam Chest Inlet Configurations)

The S/LVDT VP Cards for the throttle valves are shown on this drawing. The analog common signal (TV*AZ1, generated by circuitry shown on drawing D05) is applied to the S/LVDT VP Cards on pin 2. The valve test input (TV*TZ1) is generated by cards 3D and 4J (upper right corner of drawing D06) and applied to pin 2 of the S/LVDT VP Cards. TV*TZ1 is a −15 V signal, generated by a contact closure. When the unit is in the Turbine Manual mode, the input to gate 3D (TM**Y1) becomes a 1 and removes the −15 V valve test input by energizing the relay. Thus, if a valve test is in progress and the unit goes to the Turbine Manual mode, the valve test is immediately terminated and the throttle valves are opened.

When the throttle valves are opened more than 90 percent, it is necessary to inhibit the throttle valve manual up/down counter from counting down, so that the throttle valves cannot be closed. This is accomplished with signal THI*X1 which is generated by card 2Q. An indication of throttle valve position is sent to the Digital Controller (A214, A215, A216, and A217) from pin 10 of the S/LVDT VP Cards. The position signals (TV1PZ1 through TV4PZ1) are analog voltages with a range of 0 to 10 Vdc.

Governor Valve Tracking System (Drawing D07)

Details of the logic portion of the governor valve tracking and manual control system are shown in this drawing. The essential elements of the governor valve analog control system are shown in this drawing and also in drawings D08, D09 and D10. As previously described, the output to the governor valve S/LVDT VP Cards is generated by an up/down counter, D/A converter and an operational amplifier.

In the quiescent state, the up/down counter (card 4R) has a 1 on pins 1 and 2. Input GVCUX1 on pin 2 is the raise signal; if this signal is 0, the counter counts upward at a rate determined by the clock rate signal (GVCKX1) applied to pin 8. A 0 is applied to pin 2, in the Turbine Manual mode, when the GV RAISE pushbutton on the Operator B Panel is pressed (GVIBY1, gate 3Q, pin 40, is a 1), the system is in Turbine Manual mode (TMY1, gate 3Q, pin 38**, is a 1), and permissives are present.

When the DEH Control System is in the Operator Automatic mode (TMX1, gate 3Q, pin 1, is a 1), the Analog Backup System tracks the Digital Controller by increasing or decreasing the up/down counter output. Tracking for an increasing signal is accomplished with signal GIY1; this signal is generated by the tracking comparator (see the description for drawing D08).

Several permissives must be present to enable the up/down counter to count up, as follows:

1. A high limit of 4500 counts must not have been reached (GVCHX1, gate 3M, pin 6, is a 1). GVCHX1 is determined by the signals at the inputs to gates 3N (pins 9, 11, and 13) and 3R (pins 4, 5, and 36).
2. An OPC test must not be in progress (OPC*Y1, gate 3R, pin 33, is a 0).
3. A runback must not be in progress (RBO*Y1, gate 3R, pin 6, is a 0).
4. A throttle pressure limiting action must not occur (TPL*Y1, gate 3R, pin 13, is a 0).

Input GVCDX1 on pin 1 of the governor valve up/-down counter is the decrease signal; if this signal is a 0, the counter counts downward at a rate determined by the clock rate signal (GVCKX1) applied to pin 8. A 0 is applied to pin 1 when the GV LOWER pushbutton is pressed (GVDBY1) in the Turbine Manual mode (TMY1), or when the tracking signal (GDY1) is present in the Operator Automatic mode (TMX1), and the counter has not reached a count of 0000** (GVCLX1). Also, the loss of auto stop latch (ASL*X2), throttle pressure limiting (TPL*Y1), runback (RBO-*Y1), and OPC action (OPC*Y1) generates a decrease signal.

Pin 8 of the up/down counter is the clock rate input. Clock CLA is used during fast action (FAST ACTION pushbutton on Operator B Panel is pressed), tracking, and throttle pressure limiting. Clock CLB is used during normal raise and lower action. Clock CLM is used during OPC action and when the turbine is tripped (loss of auto stop latch). The X1 outputs of the counter are connected to the input of the digital-to-analog (D/A) converter, card 4R on drawing D07. The counter output is in an Aiken code.

Governor Valve Tracking System (Drawing D08)

The analog and transfer portions of the governor valve control are shown on this drawing. The Relay 4 (RC4) Card 3K, selects the output from either the Analog Backup System (GVMAZ2) in the Turbine Manual mode, or from the Digital Controller (GVAAZ2) in the Operator Automatic mode. The selected output (GV*AZ1) is sent to the S/LVDT VP Card, see drawing D09. Transfer of the relay is controlled by signal TMX1; this signal is generated by circuits on drawing D15**. The relay is shown in the deenergized state (Turbine Manual mode).

The output from the up/down counter (see drawing D07) is the digital input to the D/A Converter, card 4Q;

the digital input is converted to a 0 to −10 V analog signal (GVMAZ1). This signal is one input to Mixing Amplifier 4 (MA4) Card (card 3J, pin 33). A +15 V bias is also applied to pin 32 upon loss of auto stop latch (ASL*X2) or OPC action (OPC*Y1). The bias ensures that the output of the mixing amplifier (GVMAZ2) will be negative on loss of auto stop latch or OPC action, regardless of the level of GVMAZ1.

In Operator Automatic mode, the Digital Controller output is converted from digital to analog form with a governor valve Single Valve A/O Card. A 0 to −10 V signal (GVAAZ1) is generated. GVAAZ1 is applied to card 3H (MA4 Card) and a bias is applied upon loss of auto stop latch or OPC action as described for the manual signal.

When the DEH Control System is in the Operator Automatic mode, manual tracking is accomplished by changing the up/down counter (previously described) until GVMAZ1 equals GVAAZ1. The Analog Comparator (AC7) Card 3G generates increase (GIY1) and decrease (GDY1) signals for this purpose. Bumpless transfer from Turbine Manual to Operator Automatic is implemented by the Digital Controller tracking the Manual Backup system. Signals GV*AZ1, GVMAZ2, and GVAAZ2 (analog inputs A218, A219, and A220) are used for this purpose.

Governor Valve Servo's (Drawing D09)

A typical S/LVDT VP Card and some additional circuitry are shown on this drawing. The analog common signal (GV*AZ1, generated by circuitry shown on drawing D08) is applied to the S/LVDT VP Cards on pin 3. The sequential valve input (GVAZ1) is applied to pin 5. The valve test input (GVTZ1) is applied to pin 2. The Track Hold Amplifier (THA) Card generates the valve test input. During a valve test, the input to the THA Card is supplied by the Digital Controller GV Test Analog/Output Card. Note that, in this operation, the "A" contacts in the THA Card must be closed.

If the DEH Control System is rejected to the Turbine Manual mode of operation during a valve test, the operator can ramp the THA Card output to 0 Vdc using the OPEN button on the Operator B Panel (card 3R, pin 14). An Analog Comparator 8 (AC8) Card (card 2Q) ensures that the THA Card output cannot be ramped above 0 Vdc. The signal on pin 7 of card 2Q (VTIPY1) is present only when the THA Card output is less than 0 Vdc.

The GV ADD meter on the Operator A Panel receives its input from a Mixing Amplifier 4 (MA4) Card, shown on this drawing (card 2P). An AC8 Card (card 2Q) compares the mixed governor valve position signal (GVAGZ1) with a +2.0 reference voltage (RV04Z1). The resulting signal (GVOMY1) is used in the throttle pressure limiting circuitry shown on drawing D07. GVOMY1 is also used in the throttle pressure control circuitry shown on drawing D14.

Digital and Analog Speed Channels (Drawing D11)

Both the analog and the digital speed channels are shown on this drawing. The output of the analog speed channel cards (SPD*Z3) is checked against a high and a low limit; if either limit is exceeded, corresponding failure signals (SCFLY1 for low and SCFHY1 for high) are generated. SPD*Z3 is also compared to an overspeed set point (OSTPZ1) which is generated by a scaling amplifier (card 6C). The resulting signal (SPD*Y1) indicates when the speed is above the set point. If the speed is above the set point, and the Digital Controller has determined that no failure has occurred in the analog speed channel (CSCFX1), and the high limit has not been exceeded (SCFHX1), a signal (SMH*Y1) is generated for use by the Overspeed Protection Controller (OPC) circuitry (see drawing D12).

The analog speed channel signal is also applied to the rpm meter on the Operator A Panel, and to the Digital Controller. The controller uses the analog speed signal (SPD*Z6) in a two-out-of-three selection process to determine which speed channel is to be used. Circuitry for a portion of the digital speed channel is also shown on this drawing. The digital circuitry consists of a coarse channel (used for the entire speed range) and a fine channel (used only above 1600 rpm-synchronous speed).

The speed input (sine-wave frequency) is applied to Speed Channel A (SCA) Card 6Q. This card doubles and shapes the input and applies its output (through logic circuitry) to a Counter (CC) Card in the Digital Controller. The CC Card feeds a Register Comparator (RK) Card; the RK Card output is applied to the computer. This channel (coarse) works for the whole range of turbine speed; it has an accuracy of +10 rpm. A 0.1 sec time base is provided by a 36 kHz clock which is counted by another CC Card.

The fine channel counts the 36 kHz clock for a period of time dependent on the speed input. This method increases the accuracy to ±1 rpm at 3600 rpm (since the clock pulse might be missing). However, the fine channel can be used only above 1600 rpm. In both cases, the Digital Controller uses a software program to determine the speed channel used and the count.

Overspeed Protection Control—OPC (Drawing D12)

The OPC circuits are shown on this drawing. When the DEH Control System is on speed control, the overspeed protection signal (OPC*Y1, card 4F, pin 37) controls the governor valves using the SMH*Y1 signal (gate 4F, pin 40). This signal indicates that the speed is over 103 percent and is generated by circuitry shown on drawing D11. Note that, if an overspeed test is in progress, the overspeed protection signal (OPC*Y1) cannot be generated. OPC*Y1 closes the governor valves if the speed is above 103 percent.

When the DEH Control System is on load control, OPC*Y1 controls the governor using the Load Drop Anticipation signal (LDA*X1). LDA*Z1 is generated by HTL Latch 1 (HTLL1), pin 10. The latch is set when a mismatch exists between the kilowatt transducer signal and the OPC pressure transducer signal, and neither transducer has failed. The latch is reset 10 sec after the overspeed condition clears and the breaker is opened.

The transducer signals are compared with reference voltages (cards 4A and 4C) to determine sensor failure. The reference voltages for the OPC pressure transducer are −0.5 V and −5.5 V; the reference voltages for the kW transducer are −0.5 V and −10 V. The OPC pressure and kW transducer signals are also compared with an adjustable (from the Test and Calibration Panel) mismatch set point to determine the mismatch. Also, the kW transducer signal is compared with a reference set point to ensure that the load is greater than 30 percent before the LDA operates.

The Close Interceptor Valve latch (CIV—card 4H, pins 29 and 30) is set by the same signal (DAA*Y1) that sets the LDA latch. The CIV latch is reset when the breaker opens, after an adjustable time delay, or upon receiving a block CIV (BCIVX1) signal from the Digital Controller. The CIV*Y1 signal (card 4H, pin 6) energizes a relay shown on drawing D17. The relay contacts are wired externally to close the interceptor valves.

Throttle Pressure Control—TPC (Drawing D14)

The TPC circuits are shown on this drawing. The TPC latch (card 5E) indicates the status of the TPC system. If the latch is set, the output of the comparator which compares the throttle pressure signal (TPA*Z1) and the set point (TPSPZ1) is gated through gate 5C (pin 40). This causes the throttle pressure limiting signal (TPL*Y1) to be true. If the TPC latch is reset, TPL*Y1 is false. Signal TPL*Y1 closes the governor valves, as described in the Governor Valve Tracking System D07 description.

In the Turbine Manual mode of operation, the TPC latch is set when the TPC IN/TPC OUT pushbutton is pressed the first time. If this pushbutton is pressed again, the TPC latch is reset. In the Operator Automatic mode of operation, a contact closure from the Digital Controller (CTPCX1) sets the TPC latch. As long as the closure is maintained, the latch remains set; when the contact is opened, the latch is reset. A throttle pressure transducer failure (high or low) and the breaker opening also resets the TPC latch. Status contacts for TPC in service and TPC limiting are provided. A TPC in service contact is also provided to the Digital Controller. In addition, the Lamp Driver (LD) Cards and associated lamps (TPC IN/TPC OUT) are shown on this drawing.

THE P2000 COMPUTER SYSTEM

The preferred embodiment of the present invention is implemented using elements of the P2000 computer system designed and built by the Hagan/Computer Systems Division of Westinghouse Electric Corporation, Pittsburgh, Pennsylvania. Since many facets of the monitored and controlled system are affected by the nature of the computer system, at least a partial knowledge of the P2000 computer system will aid in reaching a full understanding of the invention.

FIG. 69 is a greatly simplified block diagram of the P2000 computer system. The system is designed around a central processing unit 200 having an addressable core memory 240. Each addressable location within the core memory contains 16 bits of data. In addition to the core memory 240, the P2000 system may be equipped with one or more disk or drum, high-speed, peripheral storage units 255. A variety of data input/output devices and options are available including an analog-to-digital converter input 260, contact closure inputs 270 and outputs 280, analog outputs 290, a variety of console display devices 250, and various input/output and interrupt options 230. A control unit 210 controls the operation of the central processing unit 200.

The arithmetic and logic portions of the P2000 computer system are shown in FIG. 70. Six system hardware registers P, B, C, G, E, and A are organized in such a way that their contents may be addressed as though they were part of the system core memory. A program address hardware register P is addressed as memory location zero. Two hardware index registers B and C are addressed as memory locations 1 and 2. A hardware shift code register G, the contents of which are used to control data shifting operations, is addressed as memory location 3. A hardware arithmetic accumulator A and a hardware extended arithmetic accumulator E (sometimes referred to as registers A and E) are respectively addressed as memory locations 5 and 4. Data may be transferred into or retrieved from these registers in the same manner that data may be transferred into or retrieved from any location within the system core memory, but at a higher rate of speed due to the hardware nature of these registers.

Arithmetic operations, such as addition, subtraction, multiplication and division are carried out by an adder 2009. Input data for this adder is presented by a data buffer register 2003 and by a memory read data register 2004. The particular operation which is carried out is determined by the contents of a function code register 2007, a mode register 2006, and a designator register 2005 which is sometimes referred to as register D.

When an instruction is to be executed, the address of that instruction is placed in the memory address register 2001. An address selector 2002 causes the contents of that location to be transferred into the function code register 2007 and into the mode register 2006. The function code register 2007 determines what is to be done, and the mode register 2006 together with the designator register 2005 determine how address computations are to be carried out. Data from the core memory is transferred into the memory read data register 2004. Additional data which is to be included in a computation is placed in the data buffer register 2003. The result of a computation is transferred back into core or into one of the hardware registers which occupy the six lowest addresses of the core memory. In the case of input/output instructions, the system hardware communicates directly with the input/output device or devices 2008. Data is transmitted either directly from register A to the input/output device or from the device to register A.

The designator register 2005 is loaded by special programming instructions so as to determine the mode of operation of the system. Bits of data may be placed in this register to lock out completely all types of interrupts. At the end of an arithmetic computation, the result of the computation (positive, zero, overflow, or carry) is indicated by bits within the designator register. The designator register is also used to aid in addressing. Bits may be set within the designator register to cause automatic post indexing using either the contents of index register B or the contents of index register C. When the system is operating with the designator register adjusted for post indexing using the contents of register C, for example, the contents of register C are added to the result of every address computation involving the use of the index register B.

The central processor of the P2000 system includes an executive monitor program package (FIG. 71B) which provides for the simultaneous handling of 16 different tasks. Each of the 16 tasks is assigned to a task (or priority) level between "O" and "F" (using hexadecimal numbers). These tasks are fully interruptable. Hence, if task "3" is runing at a time when a request for the execution of higher priority task "6" is received, the execution of task "3" is immediately suspended until the execution of task "6" is completed. The execution of task "3" is then recommended where it left off.

Bids for the execution of a program assigned to an executive task level may be placed by a program (for example, the program 2306) operating within a task level (in this case, the task level $D_{16}$), by a program operating within the system interrupt level 2305 in response to an external interrupt EI or a service request interrupt SRI, or by a program operating under software lockout 2303. In every case, an executive program 2304 records the bid in the table shown in FIG. 71A. Each such bid is recorded within an "able" word bit whose position corresponds to the task level of the program for which the bid has been placed. For example, the seventh bit position within the "able" word (FIG. 71A) contains a "1" data bit indicating that a program within the seventh task level is bidding for execution. Program control is then transferred to a task scheduler program 2302. The task scheduler program 2302 examines the contents of the able word (FIG. 71A) and determines which is the highest priority task level that is bidding for execution by examining the bits in the able word one at a time. An active word (FIG. 71A) is also provided so that a particular task level may be disabled. If the bit corresponding to a task level in the active word is "0", then the task level is disabled and the programs assigned to that task level are not run. When software lockout is in effect, the program which is running runs at a software lockout priority level 2303 which is higher than the priority level of the remaining programs in the system 2301 and which may only be interrupted by an external interrupt coming in at the interrupt level 2305. When a program running under software lockout bids for execution of a task level, the task level bid is recorded in the able word (FIG. 71A) and then program control is returned to the program running under software lockout rather than to the task scheduler 2302. Only when software lockout is released does program control return to the task scheduler 2302.

The executive program which calls for the execution of individual task levels is called the executive scheduler or task scheduler 2302 (FIG. 71B). Within the scheduler are located two sets of tables containing one entry for each task level within the system. The first is called the Z:ORIG table 2301 in FIG. 71B and "Z:ORIG" in FIG. 73. Each entry in this table is the starting address of a task header 10/220 (FIG. 73). The address of the Z:ORIG table entry for a particular task is found by adding the task level number to the starting address "Z:ORIG" of the table. A typical task header is shown in FIG. 73 at 10/220. Each task header contains data which is loaded into the system hardware registers P, B, C, G, E, A, and D (register D is the designator register - see FIG. 70) at the time when the corresponding task is given program control. The first location within the task header is loaded into the system program counter register P and is the address of the location which immediately precedes a location containing the first executable command of the task level. For example, in FIG. 73, the first location in the task header contains the address of a location SPEXIT. When the scheduler calls for execution of this task, program control commences at location SPEXIT+1 within the core memory.

A second table within the scheduler is called the Z:START table (FIG. 73). Each entry in this table is the starting address of a register storage pool for a task. The register storage pool may be any group of seven consecutive core locations into which the data contents of the registers P, B, C, G, E, A, and D (see FIG. 70) may be placed when the execution of a task is interrupted. If the execution of a task is interrupted before the task runs to completion, the contents of these seven system registers are loaded into the task register storage pool. When execution of the task is restarted, the contents of the register pool are reloaded into "CORE" locations 0 through 5 and into the designator register. Execution of the interrupted task then automatically proceeds from the point of interruption.

In order to speed up the process of testing or of manipulating a single data bit within a 16 bit group of data bits occupying a core location, the system can include a bit mask table BITTBL. The table starting address is "BITTBL", but this starting address is occasionally referred to as "K:X1" by some system subroutines. The mask for a particular bit position with a group of 16 bits is found by adding a bit position number to the starting address of the bit mask table. Each bit within a group of 16 bits is assigned a bit position number between 0 and 15 or "$F_{16}$" (again using hexadecimal numbers). The right-most bit in a group is the bit position 0, and the left-most bit is the bit position 15 or "$F_{16}$". Thus, the second location within the bit mask table contains the binary number "0000000000000100". This location contains a "1" in a bit position 2, and may be used to test or to manipulate the second bit position within any group of 16 bits. The following 2 bit manipulation commands are available within the P2000 system: AND and EXOR (exclusive OR). Any other logical operation may be carried out using logical combinations of these two commands.

When a program within the P2000 system wishes to call for the execution of a subroutine, the program usually executes a command:

```
SST   *X,B
```

Prior to executing this command, index register B contains the address of the last location in a register storage pool. The above command stores the contents of the seven system registers (P, B, C, G, E, A, and D) in the register storage pool and subtracts "7" from the contents of register B so that index register B contains the address of the location just preceding the pool. Program control is then transferred to the subroutine. The first executable subroutine statement must reside in the location having an address one greater than the address stored in the location X. The subroutine must take steps to preserve the address which is stored in index register B, since this address must be available when program control is returned to the calling program. If any arguments are to be transferred to the subroutine from the calling program, the addresses of these arguments are stored in the locations immediately following the SST instruction, and the subroutine calls upon a standard argument fetching subroutine which retrieves the argument addresses and transfers the addresses to the subroutine.

When a subroutine has run to completion, register B is reloaded with the address of the location just preceding the register storage pool. The following command is then executed:

```
EST   1,B
```

This command reloads the system registers from the calling program pool and adds "7" to the address stored in register B. Program execution within the calling program then resumes automatically with register B again pointing to the last location within the register storage pool.

The program registers P, B, C, G, E, and A are stored in the register storage pool in the exact order in which they appear in the "CORE" memory in FIG. 70. The contents of the designator register D are stored in a seventh location in the pool just beyond that in which the contents of register A are stored.

If a core location contains a negative number, the number is a 15 bit binary number in two's complement form, and the left-most bit (bit position F) in the core location is a sign bit equal to "1". If a core location contains a positive number, the number is a 15 bit binary number in standard form, and the left-most bit is a sign bit equal to "0". Often when the contents of the core location are discussed, those contents are represented as a 4 digit hexadecimal number, and the sign bit is included as part of the first digit in the hexadecimal number. For example, a core location containing +1 is said to contain the hexadecimal number "$0001_{16}$"; a core location containing −1 is said to contain the hexadecimal number "$FFFF_{16}$".

The executive scheduler within the P2000 system includes a software lockout provision for preventing a first program from interrupting the execution of a subroutine called by a second, lower priority program. Such an interruption can be undesirable. If the first program were allowed to interrupt the second and to call for execution of the same subroutine, data values relating to the second program and stored within the subroutine would be destroyed. A subroutine establishes software lockout by adding "1" to the present value of a software lockout counter having the symbolic name Z:SFL. Software lockout is in effect whenever the counter Z:SFL has a numeric value that is greater than 0. As long as software lockout is in effect, the executive scheduler accepts bids for the running of any task level but does not execute the bids until software lockout is "replaced"—that is, when Z:SFL equals 0. When a bid is received by the executive scheduler during software lockout, a call flag whose symbolic name is Z:CALL is set. The flag Z:CALL is set by adding "1" to the present value of the flag.

When the subroutine executed under software lockout has run to completion, index register B is loaded with the address of the calling program. Program control is then transferred to an executive software lockout release program whose symbolic address is stored in a location M:SFX. The executive software lockout release program subtracts 1 from the software lockout counter. If the counter then contains 0 count, the program checks the scheduler call flag Z:CALL. If the scheduler call flag indicates that task level bids have been received during the software lockout interval, program control is transferred to an executive scheduler task bidding routine. If the scheduler flag is not set, then no bids for the execution of other task levels were received during software lockout, and program control is returned by the standard subroutine exit procedure to the calling program.

Software lockout is used by many of the subroutines within the process control system. To simplify the discussion which follows, no mention is made of software lockout except in connection with the discussion of the CHKBID subroutine 10/1400 which has its own special software lockout release procedure.

The software lockout steps included in a program listing generally take the following form:

```
(Entry into subroutine)
*           *    *
INC              Z:SFL
*           *    *
JMP              *M:SFX
```

The "INC" step places software lockout in effect, and the JMP step is an executive call requesting the release of software lockout.

The analog-to-digital converters within the computer system are of the counter integration type. A typical converter is shown in FIG. 72A. The computer supplies channel, word, and bit selection signals to an analog input selector which connects one of a plurality of analog input signals to the analog-to-digital converter 265. A voltage-to-frequency converter 261 converts the incoming signal into a pulse train whose frequency is proportional to the magnitude of the incoming signal. A control 264 then allows the pulse train from the converter 261 to pass through a gate 262 to a counter 263 normally for exactly 1/60 of a second so that any 60 cycle noise pickup does not affect the result of the signal measurement (see FIG. 72B). The count upon the counter 263 is then transferred back to the central processor unit. This count is the digitized analog signal input value.

A typical system includes anywhere from 1 to 10 of these converters running in parallel. The executive handlers which control the operaton of these converters function by transmitting the necessary channel, word, bit, and gain figures to the converters at the request of other system programs. If a converter is busy, the program task level which is attempting to use the converter is automatically suspended until the converter is free.

In a typical analog scan application, analog signal input requests are transmitted to each of the converters in sequence until all of the converters are busy. A second request is then transferred to the first converter. Since this request may not be processed immediately, the task level containing the program which is attempting to retrieve analog signal data is suspended until the converters have finished retrieving the first set of data. At that time, the request to have the first converter input a second analog signal is processed, and simultaneously the result of the initial analog input request is returned to the calling program by the first converter. In a similar manner, each subsequent request to have a converter process an analog signal input causes the queried converter to return the result of an earlier request. After the last group of requests have been supplied to the converters, it is necessary to then make a final "dummy" request to the converters so that the converters are able to return the results of the last group of actual requests.

The system includes routines for handling contact closure inputs and outputs. Executive contact closure input handler routines check the status of contact closure inputs and maintain an accurate record of the status of each contact closure input within digital tables. A contact closure output handler alters the status of the system contact closure outputs at the request of any program within the system. This same handler routine is also able to service digital to analog outputs of the system. A typical digital-to-analog converter comprises a network of resistors which converts a binary number into an analog signal. Such a converter has a binary number input which is connected to an array of the system contact closure outputs and it has an analog signal output. By presenting appropriate data bits to the array of contact closure outputs, the contact closure output handler is able to generate any desired analog signal output.

APPENDIX 5

Input/Output Listing of Parameters and Variables in ATS and DEH Systems

ATS LIGHTS

These lights are integrated with OPERATORS PANEL "A" when the ATS option is purchased by the customer.

| LIGHT # | TEXT |
|---|---|
| 1 | TURNING GEAR IN OPERATION |
| 2 | HEAT SOAK IN PROGRESS |
| 3 | SYNCH. IN PROGRESS |
| 4 | TURBINE DECEL. (SPLIT LENS) |
| 5 | TURBINE ACCEL. (SPLIT LENS) |
| 6 | SPEED HOLD (SPLIT LENS) |
| 7 | HOLD LOAD (SPLIT LENS) |
| 8 | GENERATOR ON LINE |
| 9 | TRIP TURBINE |

TYPE OF MESSAGES AND COMPOSITION

The composition of a complete message includes 1. time (hours and minutes)
2. ALARM or CLEAR of message is an alarm message
3. message number (e.g. P03M02)
4. message text
5. insert (if any)

e.g. 17:35 ALARM P10M03 - HP GLAND STM TEMP LO
17:50 CLEAR P10M03 - HP GLAND STM TEMP LO

2:30 S04M08 - TFR COMPLETED

The 6 message types are

1. Non-Inhibited, non-alarm messages, without insert;

example: P07M08 RTR STRESS HI DECR LD RATE

2. Non-Inhibited, non-alarm messages. with insert;

example: P01M01 RTR STRESS = XXXX

3. Inhibited, non-alarm messages, without insert;

example: SENSOR OUT OF SERV. ATS CONT REJECTED

4. Inhibited, non-alarm messages, with insert;

example: P01M02 STRESS GT LIM STRESS = XXXX

5. Inhibited, alarm messages, without insert; and example: ALARM-P02M01 FAST INCR STM CHST TEMP DIFF 6. Inhibited, alarm messages, with insert.

example: ALARM-THR STM TEMP LO MINIMUM THR TEMP = XXXX

Non-Inhibited - A non-inhibited message is printed out each time a program goes through a path with a message.

e.g. S01M01

Inhibited: A inhibited message is printed out only once and it will not be printed again until the condition has been cleared and set again.

Alarm: This type of message will add the word ALARM or CLEAR before the message number.

Message Priority Levels

The message priority is established by the order of the message priority cards.

Higher priority messages are first.

| MESSAGE NO. | MESSAGE NO. | MESSAGE NO. | MESSAGE NO. | MESSAGE NO. |
|---|---|---|---|---|
| P13M01 | MLHM10 | P13M08:3 | P08M06E1 | P09M12 |
| P13M09 | MSHM02 | P13M08:4 | P08M06E2 | P09M13 |
| P02M05 | MSHM03 | P13M08:5 | P08M06E3 | P09M14 |
| P05M02:1 | MSHM04 | P13M08:6 | P08M06E4 | P09M15 |
| P05M02:2 | MSHM06 | P13M08:7 | P08M06E5 | P09M16 |
| P05M02:3 | MSHM07 | P13M08:8 | P08M06E6 | P09M17 |
| P05M02:4 | MSHM08 | P13M0813 | P08M06E7 | P10M01 |
| P05M02:5 | MSHM09 | P13M0814 | P08M06E8 | P10M02 |
| P05M02:6 | MSHM10 | P13M11:1 | P02M06 | P10M03 |
| P05M02:7 | MSHM11 | P13M11:2 | P03M06 | P10M04 |
| P06M07 | S01M10 | P13M11:3 | P03M08 | P10M07 |
| P07M00 | S01M13 | P13M11:4 | P03M09 | P10M08 |
| P08M05A | S04M07 | P13M11:5 | P03M10 | P14M01 |
| P08M05B | S05M03 | P13M11:6 | P03M11 | P14M02 |
| P08M05E1 | S05M04 | P13M11:7 | P03M12 | S01M01 |
| P08M05E2 | S05M05 | P13M11:8 | P03M14 | S01M02 |
| P08M05E3 | S05M06 | P13M1113 | P03M15 | S01M03 |
| P08M05E4 | S05M07 | P13M1114 | P03M16 | S01M05 |
| P08M05E5 | S05M12 | P13M1115 | P03M17 | S01M07 |
| P08M05E6 | S05M13 | P13M1116 | P03M18 | S01M09 |
| P08M05E7 | S05M14 | P13M1120 | P03M19 | S01M11 |
| P08M05E8 | S05M15 | P13M1121 | P05M01 | S01M14 |
| S01M06 | S05M16 | P13M1122 | P05M03:1 | S02M01 |
| S03M03 | S05M17 | P13M1123 | P05M03:2 | S02M02 |
| P04M02 | S05M18 | P13M1124 | P05M03:3 | S02M03 |
| P04M03 | P02M02 | P13M1125 | P05M03:4 | S02M04 |
| P05M04 | P02M03 | P13M1126 | P05M03:5 | S02M05 |
| P05M05 | P02M04 | P13M12:1 | P05M03:6 | S02M06 |
| P05M06 | P06M09 | P13M12:3 | P05M03:7 | S03M01 |
| P07M03 | P08M02 | P13M12:4 | P06M01 | S03M02 |
| P07M04 | P08M03 | P13M12:5 | P06M02 | S04M01 |
| P07M05 | P10M05 | P13M12:6 | P06M03 | S04M03 |
| P07M06 | P10M06 | P13M12:7 | P06M04 | S04M04 |
| P07M08 | P10M09 | P13M1210 | P06M05 | S04M05 |
| P07M09 | P10M10 | P13M1211 | P06M06 | S04M06 |
| P07M10 | P11M03 | P13M1212 | P06M08 | S04M08 |
| P07M11 | P11M04 | P13M1213 | S05M10 | S05M02 |
| P07M12 | P11M05 | P13M1214 | P08M07 | S05M09 |
| P07M13 | P13M02 | P13M1215 | P08M09 | S05M11 |
| P07M14 | P13M04 | P13M1216 | P09M01 | S05M19 |
| P07M15 | P13M04 | P13M1217 | P09M02 | P01M01 |
| P08M01 | P13M07:1 | P13M1218 | P09M03 | P03M01 |
| MLHM02 | P13M07:2 | P13M1219 | P09M04 | P03M03 |
| MLHM04 | P13M07:3 | P13M10 | P09M05 | P03M05A |
| MLHM06 | P13M07:4 | S05M08 | P09M06 | P03M05B |
| MLHM07 | P13M07:5 | P01M02 | P09M07 | P04M01 |
| MLHM08 | P13M07:6 | P11M01 | P09M08 | P14M03 |
| MLHM09 | P13M07:7 | P11M02 | P09M09 | P14M04 |
| | P13M08:1 | P08M06A | P09M10 | P14M05 |
| | P13M08:2 | P08M06B | P09M11 | P14M06 |

ABBREVIATIONS IN ATS MESSAGE LIST

| | |
|---|---|
| ATS | AUTOMATIC TURBINE STARTUP |
| ABNØRM | ABNORMAL |
| ACCEL | ACCELERATION |
| ADJ | ADJUST |
| ANTICIP | ANTICIPATED |
| BKR | BREAKER |
| BRG | BEARING |
| CHST | CHEST |
| CØMP | CØMPUTER |
| CØNT | CØNTRØL |
| DECR | DECREASE |
| DECSN | DECISION |
| DEV | DEVICE |
| DIFF | DIFFERENTIAL |
| DSCHR | DISCHARGE |
| ECCEN | ECCENTRICITY |
| EXP | EXPANSION |
| EXH | EXHAUST |
| FAIL | FAILURE |
| FLD | FIELD |
| GEN | GENERATOR |
| GT | GREATER THAN |
| GV | GOVERNOR VALVE |
| HI | HIGH |
| HP | HIGH PRESSURE |
| HRS | HOURS |
| HYDRØ | HYDROGEN |
| INCR | INCREASE |
| INITL | INITIAL |
| L | LEFT |
| LD | LOAD |
| LIM | LIMIT |
| LØ | LØW |
| LT | LESS THAN |
| MAN | MANUAL |
| MIN | MINUTE |
| MTL | METAL |
| NØRM | NORMAL |
| ØPER | OPERATOR |
| PERM | PERMITTED |
| PØS | POSITION |
| R | RIGHT |
| RECMND | RECOMMENDED |
| REG | REGULATØR |
| REQ | REQUEST |
| RES | RESONANCE |
| RTR | ROTOR |
| SERV | SERVICE |
| STM | STEAM |
| SPD | SPEED |
| STG | STAGE |
| SUGSTD | SUGGESTED |
| SUPVSN | SUPERVISION |
| SURF | SURFACE |
| SYNC | SYNCRØNIZATION |
| SYS | SYSTEM |
| TEMP | TEMPERATURE |
| TFR | TRANSFER |
| TG | TURNING GEAR |
| THR | THROTTLE |
| TIL | UNTIL |
| TURB | TURBINE |
| TV | THROTTLE VALVE |
| VAC | VACUUM |
| VIBR | VIBRATIØN |
| VØLT | VØLTAGE |

STANDARD ATS MESSAGES

| | |
|---|---|
| S01M01 | ATS CONT MODE INITIATED BY OPER |
| S01M02 | COMP IN SERV LT 2 HRS. ATS SUPVSN ONLY |
| S01M03 | TURB ON LINE. ATS SUPVSN ONLY |
| S01M05 | VALVE POS LIM LT 95% |
| S01M06 | SOAK TIME REQ. SPD DECR TO SOAK SPD |
| S01M07 | TURB SPD IS ZERO. ATS SUPVSN ONLY |
| S01M08 | TURB SPD LT 600 RPM |
| S01M09 | ATS SUPVSN SELECTED |
| S01M10 | ATS CONT REJECTED |
| S01M11 | ATS SUPVSN OFF INITIATED BY OPER |
| S01M13 | LATCH TURB |
| S01M14 | TURB NOT LATCHED |
| S02M01 | ACCEL DELAYED HP COLD |
| S02M02 | ATS STARTUP COMPLETED |
| S02M03 | SUGSTD INITL LD RATE = 0.5 %/MIN |
| S02M04 | SUGSTD INITL LD RATE = 1.0 %/MIN |
| S02M05 | SUGSTD INITL LD RATE = 1.5 %/MIN |
| S02M06 | SUGSTD INITL LD RATE = 2.0 %/MIN |
| S02M07 | TURB NOT ACCEL |
| S03M01 | ROLL OFF TG PERM |
| S03M02 | ROLL OFF TG PERM BY OPER |
| S03M03 | ROLL OFF TG NOT PERM. OVERRIDE PERM |
| S04M01 | TFR NOT PERM. HI VIBR. OVERRIDE PERM |
| S04M03 | OVERRIDE INITIATED BY OPER |
| S04M04 | TFR DELAY TIL STM CHST INNER MTL GT SAT TEMP<br>RECMND THR TEMP = XXXX F |
| S04M05 | TFR DELAY LO STM CHST TEMP |
| S04M06 | TFR TV TO GV INITIATED |
| S04M07 | TFR NOT COMPLETE. OPER TAKE CONT |
| S04M08 | TFR COMPLETED |
| S05M02 | SYNC DELAY. RTR STRESS COULD EXCEED LIM |
| S05M03 | OPER--PUT AUTO SYNC ON AUTO |
| S05M04 | BKR AIR SWITCH OPEN |
| S05M05 | EXCITER FLD BKR CONT SW LOCKED |
| S05M06 | GEN MAIN BKR CONT SW LOCKED |
| S05M07 | VOLT REG SWITCH NOT IN OFF POS |
| S05M08 | SYNC NOT PERM. HI VIBR. OVERRIDE PERM |
| S05M09 | OVERRIDE INITIATED BY OPER |
| S05M10 | SYNC NOT PERM. GEN SYS FAULTY |
| S05M11 | SPD OUT OF RANGE FOR SYNC |
| S05M12 | NO RUNBACK FOR EXCITATION |
| S05M13 | OPER--CLOSE FLD BKR |
| S05M14 | BASE ADJ NOT AT NO LD SETTING GO ON OPER CONT |
| S05M15 | VOLT ADJ NOT AT NO LD SETTING GO ON OPER CONT |
| S05M16 | OPER SW VOLT REG TO TEST POS - NULL TO ± 2 VOLT |
| S05M17 | VOLT REG OUT OF SERV |
| S05M18 | UNIT NOT ON LINE. |
| S05M19 | GEN ON LINE |
| P01M01 | RTR STRESS = .XXXX |
| P01M02 | RTR STRESS GT LIM. STRESS = .XXXX |
| P02M01 | FAST INCR STM CHST TEMP DIFF |
| P02M02 | FAST DECR STM CHST TEMP DIFF |
| P02M03 | FAST INCR FLANGE BOLT TEMP DIFF |
| P02M04 | FAST DECR FLANGE BOLT TEMP DIFF |
| P02M05 | TRIP TURB. DIFF EXP (GEN) |
| P02M06 | HI DIFF EXP (GEN) |
| P02M07 | TRIP TURB. DIFF EXP (GOV) |
| P02M08 | HI DIFF EXP (GOV) |
| P03M01 | THR STM TEMP LO. MINIMUM THR TEMP = XXXXF |
| P03M03 | RTR COLD. CECR THR TEMP LT 800°F |
| P03M05 | CALC 1ST STG STM TEMP = XXXX F |
| P03M05 | 1ST STG MTL TEMP = XXXX F |
| P03M06 | ROLL OFF TG HELD. REQ 1ST STG STM TEMP XXXX F |
| P03M08 | ROLL OFF TG HELD. DIFF EXP |
| P03M09 | ROLL OFF TG HELD. ABNORM MTL TEMP DIFF |
| P03M10 | ROLL OFF TG HELD. HI EXH PRESSURE |
| P03M11 | ROLL OFF TG HELD. TURB EXH TEMP |
| P03M12 | ROLL OFF TG HELD. HI ECCEN |
| P03M13 | ROLL OFF TG HELD - TURB NOT LATCHED |
| P03M14 | ROLL OFF TG HELD. LO EH FLUID PRESSURE |
| P03M15 | ROLL OFF TG HELD. FAULTY BRG OIL SYS |

| | |
|---|---|
| P03M16 | ROLL OFF TG HELD. FAULTY GLAND SEAL SYS |
| P03M17 | ROLL OFF TG HELD. H2 TEMP HI |
| P03M18 | ROLL OFF TG HELD. DRAIN VALVES NOT OPEN |
| P03M19 | ROLL OFF TG HELD. HI BRG MTL TEMP |
| P04M01 | RTR STRESS INVALID. COMP IN SERV LT 2 HRS. |
| P05M01 | HI ECCEN |
| P05M02 | TRIP TURB. VIBR GT LIM. BRG XXXX |
| P05M03 | VIBR GT ALARM LIM. BRG XXXX |
| P05M04 | HOLD LD. HI VIBR |
| P05M05 | DECR SPD REQ TO CORRECT VIBR |
| P05M06 | INCR SPD REQ TO CORRECT VIBR |
| P06M01 | R STM CHST TEMP DIFF GT LIM. INNER MTL TEMP LOXXXX F |
| P06M02 | R STM CHST TEMP DIFF GT LIM. INNER MTL TEMP HIXXXX F |
| P06M03 | L STM CHST TEMP DIFF GT LIM INNER MTL TEMP LO XXXX F |
| P06M04 | L STM CHST TEMP DIFF GT LIM INNER MTL TEMP HI XXXX F |
| P06M05 | HP CYL FLANGE BOLT TEMP DIFF GT LIM. FLANGE HIXXXX F |
| P06M06 | HP CYL FLANGE BOLT TEMP DIFF GT LIM. FLANGE LOXXXX F |
| P06M07 | - |
| P06M09 | HP (COVER-BASE) TEMP DIFF GT LIMIT - TRIP UNIT (SEP) |
| P06M09 | HP-IP (COVER-BASE) TEMP DIFF GT LIMIT - TRIP UNIT (COMB) |
| P06M10 | IP (COVER-BASE) TEMP DIFF GT LIMIT-TRIP UNIT (SEP) |
| P06M11 | OPEN DRAIN VALVES (SEP) |
| P06M11 | OPEN DRAIN VALVES (COMB) |
| P06M12 | HIGH HP (COVER-BASE) TEMP DIFF (SEP) |
| P06M12 | HIGH HP-IP (COVER-BASE) TEMP DIFF (COMB) |
| P06M13 | HIGH IP (COVER-BASE) (SEP) |
| P07M00 | ATS CONT REJECTED. TRIP REQUESTED |
| P07M04 | SPD HOLD. HI VIBR |
| P07M05 | SPD HOLD. HI VIBR SPD DECR TO AVOID RES |
| P07M06 | SPD INCR TO GET OFF RES BEFORE HOLD |
| P07M08 | RTR STRESS HI. DECR LD RATE |
| P07M09 | ACCEL RATE DECR BY RTR STRESS |
| P07M10 | RTR STRESS ALLOWS INCR LD RATE |
| P07M11 | ACCEL RATE INCR BY RTR STRESS |
| P07M12 | DIFF EXP (GEN) REQ INCR LD RATE |
| P07M13 | ACCEL RATE INCR BY DIFF EXP (GEN) |
| P07M14 | HI VIBR REQ HOLD SPD. DECR SPD TO AVOID RES |
| P07M15 | HOLD SPD.SENSOR OUT OF SERVICE. OVERRIDE PERM. |
| MSHM02 | HOLD SPD. HI MTL TEMP |
| MSHM03 | HOLD SPD. HI ANTICIP MTL TEMP |
| MSHM04 | HOLD SPD. HI DIFF EXP |
| MSHM06 | HOLD SPD. HI ANTICIP DIFF EXP |
| MSHM07 | HOLD SPD. LO VAC |
| MSHM08 | HOLD SPD. HI RTR STRESS |
| MSHM09 | HOLD SPD. HI RATE OF 1ST STG STM TEMP CHANGE |
| MSHM10 | HOLD SPD. HI BRG MTL TEMP |
| MSHM11 | HOLD SPD. HI ECCEN |
| MSHM12 | HOLD SPD GEN SYS FAIL |
| MLHM02 | HOLD LD HI MTL TEMP |
| MLHM03 | HOLD LD HI ANTICIP MTL TEMP |
| MLHM04 | HOLD LD HI DIFF EXP |
| MLHM06 | HOLD LD HI ANTICIP DIFF EXP |
| MLHM07 | HOLD LD LO VAC |
| MLHM08 | HOLD LD HI RTR STRESS |
| MLHM09 | HOLD LD HI RATE OF 1ST STM TEMP CHANGE |
| MLHM10 | HOLD LD HI BRG MTL TEMP |
| MLHM12 | HOLD LD GEN SYS FAIL |
| P08M01 | OIL TEMP LO |
| P08M02 | OIL TEMP OUT OF COOLER HI |
| P08M03 | OIL TEMP OUT OF COOLER LO |
| P08M05 | TRIP TURB. THRUST BRG GOV END TEMP HI |
| P08M05 | TRIP TURB. THRUST BRG GEN END TEMP HI |
| P08M05 | TRIP TURB. HI MTL TEMP BRGXXXX |
| P08M06 | THRUST BRG GOV END (P2) TEMP HI |
| P08M06 | THRUST BRG GEN END TEMP HI |
| P08M06 | HI MTL TEMP BRG XXXX |
| P08M07 | BRG OIL PRESSURE LO |
| P08M09 | OIL TO COOLER TEMP HI |
| P09M01 | H2 TEMP #1 HI |
| P09M02 | H2 TEMP #1 LO |
| P09M03 | H2 TEMP #2 HI |
| P09M04 | H2 TEMP #2 LO |

| | |
|---|---|
| P09M05 | H2 DISCHR TEMP RISE GT LIM |
| P09M06 | COLD AIR TEMP HI #1 EXCITER COOLER |
| P09M07 | COLD AIR TEMP HI #2 EXCITER COOLER |
| P09M08 | EXCITER TEMP RISE HI #2 COOLER |
| P09M09 | H2 PRESSURE HI |
| P09M10 | H2 PRESSURE LO |
| P09M11 | AIR SIDE SEAL OIL BACK UP PUMP RUNNING. PURGE GEN |
| P09M12 | H2 SIDE SEAL OIL PUMP OFF |
| P09M13 | H2 PURITY LO |
| P09M14 | EXCITER TEMP RISE HI #1 COOLER |
| P09M15 | H2 SIDE SEAL OIL TEMP OUT OF LIM |
| P09M16 | AIR SIDE SEAL OIL TEMP OUT OF LIM |
| P09M17 | GEN OFF NORM |
| P09M18 | SEAL DIFF PRESS LO-CORRECT FAULT IMMEDIATELY OR TRIP & PURGE H2 |
| P09M19 | H2 DSCHR TEMP RISE HI |
| P10M01 | HP GLAND STM TEMP LO |
| P10M02 | LP GLAND STM TEMP HI |
| P10M03 | HP GLAND STM TEMP LO |
| P10M04 | HP GLAND STM TEMP HI |
| P10M05 | LP EXH TEMP GT 160F, SPRAYS SHOULD BE OPEN |
| P10M06 | LP EXH TEMP GT 250F, SPRAYS ARE CLOSED |
| P10M07 | LP EXH TEMP GT 175F |
| P10M08 | LP EXH PRESSURE HI |
| P10M09 | CLOSE SPRAYS |
| P10M10 | OPEN SPRAYS |
| P11M01 | HI ANTICIP DIFF EXP (GEN). RTR SHORT |
| P11M02 | HI ANTICIP DIFF EXP (GEN). RTR LONG |
| P11M03 | ALL DRAIN VALVES NOT OPEN |
| P11M04 | DRAIN VALVES OPEN |
| P11M05 | HI ANTICIP DIFF EXP (GOV). RTR SHORT |
| P11M06 | HI ANTICIP DIFF EXP (GOV). RTR LONG |
| P11M07 | DRAIN VLV DO NOT OPEN |
| P11M08 | DRAIN VLV DO NOT CLOSE |
| P11M09 | DRAIN VLV SWITCH NOT IN AUTO POS |
| P14M01 | HEAT SOAK DELAY. SPD LO |
| P14M02 | HEAT SOAK DELAY. RH TEMP LO |
| P14M03 | CALC SOAK TIME IN MIN=XXXX |
| P14M04 | HEAT SOAK COMPLETE |
| P14M05 | REMAINING SOAK TIME IN MIN =XXXX |
| P12M01 | HI REHEAT TEMP |
| P12M02 | HI REHEAT TEMP-INCR LOAD |
| P12M03 | SYNC AS SOON AS POSSIBLE TO COOL LP BLADES |
| P12M04 | HI REHEAT TEMP - SYNC DELAYED |
| P12M05 | REDUCE SPEED TO COOL LP BLADES |
| P12M06 | GO TO TG AND DECR. REHEAT TEMP |
| P13M01 | A/D CONVERTER OUT OF SERV |
| P13M02 | DIFF EXP (GEN) SENSOR OUT OF SERVICE |
| P13M03 | |
| P13M04 | 1ST STG STM TEMP SENSOR OUT OF SERV |
| P13M05 | 1ST STG MTL TEMP SENSOR OUT OF SERV |
| P13M06 | RH TEMP SENSOR OUT OF SERV |
| P13M07 | VIBR SENSOR OUT OF SERV. SENSOR # |
| P13M08 | BRG MTL TEMP SENSOR OUT OF SERV. SENSOR # |
| P13M09 | SENSOR OUT OF SERV. ATS CONT REJECTED |
| P13M10 | SENSOR HOLD OVERRIDE INITIATED BY OPER |
| P13M11 | TURB SENSOR OUT OF SERV. SENSOR # |
| P13M12 | GEN SENSOR OUT OF SERV. SENSOR # |

P13 MESSAGES OUT-OF-SERVICE SENSOR NUMBERS

A. P13M11 TURB SENSOR OUT OF SERV. SENSOR

1 - ECCENTRICITY
2 - LEFT STEAM CHEST INNER TEMP.
3 - RIGHT STEAM CHEST INNER TEMP.
4 - LEFT STEAM CHEST OUTER TEMP.
5 - RIGHT STEAM CHEST OUTER TEMP.
6 - HP CYLINDER FLANGE TEMP.
7 - HP CYLINDER BOLT TEMP.
8 - HP OUTER CYLINDER BASE TEMP.
9 - SPARE*

10 - SPARE*
11 - SPARE*
12 - SPARE*
13 - COLD JUNCTION BOX UPPER RTD
14 - COLD JUNCTION BOX LOWER RTD
15 - BEARING OIL PRESSURE
16 - CONDENSER PRESSURE S1
17 - CONDENSER PRESSURE S2
18 - CONDENSER PRESSURE S3
19 - SPARE*
20 - THROTTLE STEAM TEMP.
21 - OIL COOLER OUT TEMP.
22 - OIL COOLER IN TEMP.
23 - HP GLAND STEAM TEMP.
24 - LP GLAND STEAM TEMP.
25 - GLAND METAL TEMP. ROTOR AREA
26 - LP EXHAUST STEAM TEMP. #1
27 - SPARE* LP EXHAUST STEAM TEMP #2
28 - SPARE*
29 - SPARE*
30 - SPARE*
31 - SPARE*

P13M12 GEN SENSOR OUT OF SERV. SENSOR #N

1 - GENERATOR CURRENT
2 - SPARE*
3 - HYDROGEN PRESSURE
4 - SEAL OIL TEMP. AIR SIDE
5 - SEAL OIL TEMP. GAS SIDE
6 - HYDROGEN COLD GAS TEMP. #1
7 - HYDROGEN COLD GAS TEMP. #2
8 - SPARE*
9 - SPARE*
10 - EXCITER AIR OUT TEMP. #1
11 - EXCITER AIR OUT TEMP. #2
12 - EXCITER AIR IN. TEMP. #1
13 - EXCITER AIR IN. TEMP. #2
14 - GENERATOR HOT GAS TEMP. #1
15 - GENERATOR HOT GAS TEMP. #2
16 - GENERATOR HOT GAS TEMP. #3
17 - GENERATOR HOT GAS TEMP. #4
18 - GENERATOR HOT GAS TEMP. #5
19 - GENERATOR HOT GAS TEMP. #6

DEH DIGITAL CONTROL SYSTEM PROJ 00935
ANALOG INPUT TERM ASSIGN REV 7 6-30-71

| COMP ADDR NO | DWG 807C610-398D528 807C559-398D442 DESCRIPTION | BIT WOR CH | CAB HS | TERM + | TERM - | SH | CAR LOC | OPT |
|---|---|---|---|---|---|---|---|---|
| A001 | VIDAR CAL POS FULL SCALE +10V | 007074 | 0011 | J15 | J16 | M16 | H03 | |
| A002 | VIDAR CAL NEG FULL SCALE -10V | 017074 | 0011 | J13 | J14 | M14 | H03 | |
| A003 | VIDAR CAL ZERO | 027074 | 0011 | J11 | J12 | M12 | H03 | |
| A004 | SPARE | 037074 | 0011 | J09 | J10 | M10 | H03 | |
| A005 | SPARE | 047074 | 0011 | J07 | J08 | M08 | H03 | |
| A006 | SPARE | 057074 | 0011 | J05 | J06 | M06 | H03 | |
| A007 | SPARE | 067074 | 0011 | J03 | J04 | M04 | H03 | |
| A008 | TA DIFF EXPANSION GOV END | 077074 | 0011 | K15 | K16 | N16 | H01 | 04 |
| A009 | TA DIFF EXPANSION GEN END | 087074 | 0011 | K13 | K14 | M14 | H01 | 04 |
| A010 | SEAL OIL PR MINUS H2 PR | 097074 | 0011 | K11 | K12 | N12 | H01 | 04 |
| A011 | SPARE | 107074 | 0011 | K09 | K10 | N10 | H01 | |
| A012 | VALVE POSITION LIMIT SET POINT | 117074 | 0011 | K07 | K08 | N08 | H01 | 08 |
| A013 | SPARE | 127074 | 0011 | K05 | K06 | N06 | H01 | |
| A014 | SPARE | 137074 | 0011 | K03 | K04 | N04 | H01 | |
| A015 | TA ECCENTRICITY | 007174 | 0012 | J15 | J16 | M16 | H04 | 04 |
| A016 | TA VIBRATION BRG 1 | 017174 | 0012 | J13 | J14 | M14 | H04 | 04 |
| A017 | TA VIBRATION BRG 2 | 027174 | 0012 | J11 | J12 | M12 | H04 | 04 |
| A018 | TA VIBRATION BRG 3 | 037174 | 0012 | J09 | J10 | M10 | H04 | 04 |
| A019 | TA VIBRATION BRG 4 | 047174 | 0012 | J07 | J08 | M08 | H04 | 04 |
| A020 | TA VIBRATION BRG 5 | 057174 | 0012 | J05 | J06 | M06 | H04 | 04 |

DEH DIGITAL CONTROL SYSTEM PROJ 00935
ANALOG INPUT TERM ASSIGN REV 7 6-30-71

DWG 807C610-398D528
807C559-398D442

| COMP ADDR NO | DESCRIPTION | BIT WRD CH | CAB HS | TERM + | TERM - | SH | CAR LOC | OPT |
|---|---|---|---|---|---|---|---|---|
| A021 | TA VIBRATION BRG 6 | 067174 | 0012 | J03 | J04 | M04 | H04 | 04 |
| A022 | TA VIBRATION BRG 7 | 077174 | 0012 | K15 | K16 | N16 | H02 | 04 |
| A023 | TA VIBRATION BRG 8 | 087174 | 0012 | K13 | K14 | N14 | H02 | 04 |
| A024 | TA VIBRATION BRG 9 | 097174 | 0012 | K11 | K12 | N12 | H02 | 04 |
| A025 | TA VIBRATION BRG 10 | 107174 | 0012 | K09 | K10 | N10 | H02 | 04 |
| A026 | TA VIBRATION BRG 11 | 117174 | 0012 | K07 | K08 | N08 | H02 | 04 |
| A027 | TA VIBRATION BRG 12 | 127174 | 0012 | K05 | K06 | N06 | H02 | 04 |
| A028 | SPARE | 137174 | 0012 | K03 | K04 | N04 | H02 | |
| A029 | CONDENSER 1 PRESSURE | 007274 | 0013 | J15 | J16 | M16 | H07 | 04 |
| A030 | CONDENSER 2 PRESSURE | 017274 | 0013 | J13 | J14 | M14 | H07 | 04 |
| A031 | CONDENSER 3 PRESSURE | 027274 | 0013 | J11 | J12 | M12 | H07 | 04 |
| A032 | BRG OIL PRESSURE | 037274 | 0013 | J09 | J10 | M10 | H07 | 04 |
| A033 | H2 PRESSURE | 047274 | 0013 | J07 | J08 | M08 | H07 | 04 |
| A034 | H2 PURITY | 057274 | 0013 | J05 | J06 | M06 | H07 | 04 |
| A035 | EXC AIR IN 1 RTD | 067274 | 0013 | J03 | J04 | M04 | H07 | 04 |
| A036 | EXC AIR IN 2 RTD | 077274 | 0013 | K15 | K16 | N16 | H05 | 04 |
| A037 | EXC AIR OUT 1 RTD | 087274 | 0013 | K13 | K14 | N14 | H05 | 04 |
| A038 | EXC AIR OUT 2 RTD | 097274 | 0013 | K11 | K12 | N12 | H05 | 04 |
| A039 | H2 COOLER OUT 1 RTD | 107274 | 0013 | K09 | K10 | N10 | H05 | 04 |
| A040 | H2 COOLER OUT 2 RTD | 117274 | 0013 | K07 | K08 | N08 | H05 | 04 |
| A041 | H2 COOLER OUT 3 RTD | 127274 | 0013 | K05 | K06 | N06 | H05 | 04 |
| A042 | H2 COOLER OUT 4 RTD | 137274 | 0013 | K03 | K04 | N04 | H05 | 04 |
| A043 | SPARE | 007374 | 0014 | J15 | J16 | M16 | H08 | |
| A044 | SPARE | 017374 | 0014 | J13 | J14 | M14 | H08 | |
| A045 | SPARE | 027374 | 0014 | J11 | J12 | M12 | H08 | |
| A046 | SPARE | 037374 | 0014 | J09 | J10 | M10 | H08 | |
| A047 | SPARE | 047374 | 0014 | J07 | J08 | M08 | H08 | |
| A048 | SPARE | 057374 | 0014 | J05 | J06 | M06 | H08 | |
| A049 | SPARE | 067374 | 0014 | J03 | J04 | M04 | H08 | |
| A050 | SPARE | 077374 | 0014 | K15 | K16 | N16 | H06 | 04 |
| A051 | GEN HOT GAS 6 RTD | 087374 | 0014 | K13 | K14 | N14 | H06 | 04 |
| A052 | GEN HOT GAS 5 RTD | 097374 | 0014 | K11 | K12 | N12 | H06 | 04 |
| A053 | GEN HOT GAS 4 RTD | 107374 | 0014 | K09 | K10 | N10 | H06 | 04 |
| A054 | GEN HOT GAS 3 RTD | 117374 | 0014 | K07 | K08 | N08 | H06 | 04 |
| A055 | GEN HOT GAS 2 RTD | 127374 | 0014 | K05 | K06 | N06 | H06 | 04 |
| A056 | GEN HOT GAS 1 RTD | 137374 | 0014 | K03 | K04 | N04 | H06 | 04 |
| A057 | SPARE | 007474 | 0015 | J15 | J16 | M16 | H11 | |
| A058 | SPARE | 017474 | 0015 | J13 | J14 | M14 | H11 | |
| A059 | SPARE | 027474 | 0015 | J11 | J12 | M12 | H11 | |
| A060 | SPARE | 037474 | 0015 | J09 | J10 | M10 | H11 | |
| A061 | SPARE | 047474 | 0015 | J07 | J08 | M08 | H11 | |
| A062 | SPARE | 057474 | 0015 | J05 | J06 | M06 | H11 | |
| A063 | SPARE | 067474 | 0015 | J03 | J04 | M04 | H11 | |
| A064 | SPARE | 077474 | 0015 | K15 | K16 | N16 | H09 | |
| A065 | SPARE | 087474 | 0015 | K13 | K14 | N14 | H09 | |
| A066 | SPARE | 097474 | 0015 | K11 | K12 | N12 | H09 | |
| A067 | SPARE | 107474 | 0015 | K09 | K10 | N10 | H09 | |
| A068 | SPARE | 117474 | 0015 | K07 | K08 | N08 | H09 | |
| A069 | SPARE | 127474 | 0015 | K05 | K06 | N06 | H09 | |
| A070 | SPARE | 137474 | 0015 | K03 | K04 | N04 | H09 | |
| A071 | SPARE | 007574 | 0016 | J15 | J16 | M16 | H12 | |
| A072 | SPARE | 017574 | 0016 | J13 | J14 | M14 | H12 | |
| A073 | SPARE | 027574 | 0016 | J11 | J12 | M12 | H12 | |
| A074 | SPARE | 037574 | 0016 | J09 | J10 | M10 | H12 | |
| A075 | SPARE | 047574 | 0016 | J07 | J08 | M08 | H12 | |
| A076 | SPARE | 057574 | 0016 | J05 | J06 | M06 | H12 | |
| A077 | SPARE | 067574 | 0016 | J03 | J04 | M04 | H12 | |
| A078 | SPARE | 077574 | 0016 | K15 | K16 | N16 | H10 | |
| A079 | HP TURB SPEED SI 0-4V | 087574 | 0016 | K13 | K14 | N14 | H10 | |
| A080 | SPARE | 097574 | 0016 | K11 | K12 | N12 | H10 | |
| A081 | REF INPUT FROM BLR OR ADS | 107574 | 0016 | K09 | K10 | N10 | H10 | |
| A082 | SPARE | 117574 | 0016 | K07 | K08 | N08 | H10 | |
| A083 | SPARE | 127574 | 0016 | K05 | K06 | N06 | H10 | |
| A084 | IMP PRESSURE 1-5V | 137574 | 0016 | K03 | K04 | N04 | H10 | |
| A085 | SPARE | 007674 | 0017 | J15 | J16 | M16 | H15 | |
| A086 | SPARE | 017674 | 0017 | J13 | J14 | M14 | H15 | |
| A087 | SPARE | 027674 | 0017 | J11 | J12 | M12 | H15 | |

DEH DIGITAL CONTROL SYSTEM PROJ 00935
ANALOG INPUT TERM ASSIGN REV 7 6-30-71

| COMP ADDR NO | DWG 807C610-398D528 807C559-398D442 DESCRIPTION | BIT WORD CH | CAB HS | TERM + | TERM - | SH | CAR LOC | OPT |
|---|---|---|---|---|---|---|---|---|
| A088 | SPARE | 037674 | 0017 | J09 | J10 | M10 | H15 | |
| A089 | SPARE | 047674 | 0017 | J07 | J08 | M08 | H15 | |
| A090 | SPARE | 057674 | 0017 | J05 | J06 | M06 | H15 | |
| A091 | SPARE | 067674 | 0017 | J03 | J04 | M04 | H15 | |
| A092 | SPARE | 077674 | 0017 | K15 | K16 | N16 | H13 | |
| A093 | SPARE | 087674 | 0017 | K13 | K14 | N14 | H13 | |
| A094 | SPARE | 097674 | 0017 | K11 | K12 | N12 | H13 | |
| A095 | SPARE | 107674 | 0017 | K09 | K10 | N10 | H13 | |
| A096 | SPARE | 117674 | 0017 | K07 | K08 | N08 | H13 | |
| A097 | SPARE | 127674 | 0017 | K05 | K06 | N06 | H13 | |
| A098 | SPARE | 137674 | 0017 | K03 | K04 | N04 | H13 | |
| A099 | SPARE | 007774 | 0018 | J15 | J16 | M16 | H16 | |
| A100 | SPARE | 017774 | 0018 | J13 | J14 | M14 | H16 | |
| A101 | SPARE | 027774 | 0018 | J11 | J12 | M12 | H16 | |
| A102 | SPARE | 037774 | 0018 | J09 | J10 | M10 | H16 | |
| A103 | SPARE | 047774 | 0018 | J07 | J08 | M08 | H16 | |
| A104 | SPARE | 057774 | 0018 | J05 | J06 | M06 | H16 | |
| A105 | SPARE | 067774 | 0018 | J03 | J04 | M04 | H16 | |
| A106 | SPARE | 077774 | 0018 | K15 | K16 | N16 | H14 | |
| A107 | SPARE | 087774 | 0018 | K13 | K14 | N14 | H14 | |
| A108 | SPARE | 097774 | 0018 | K11 | K12 | N12 | H14 | |
| A109 | SPARE | 107774 | 0018 | K09 | K10 | N10 | H14 | |
| A110 | SPARE | 117774 | 0018 | K07 | K08 | N08 | H14 | |
| A111 | SPARE | 127774 | 0018 | K05 | K06 | N06 | H14 | |
| A112 | SPARE | 137774 | 0018 | K03 | K04 | N04 | H14 | |
| A113 | BRG. 1 TEMP | 006074 | 0151 | J21 | J20 | J19 | A03 | 04 |
| A114 | GLAND METAL TEMP ROTOR AREA | 016074 | 0151 | J18 | J17 | J16 | A03 | 04 |
| A115 | HP OUTER CYL BASE TEMP | 026074 | 0151 | J15 | J14 | J13 | A03 | 04 |
| A116 | IMP CHAMBER STEAM TEMP | 036074 | 0151 | J12 | J11 | J10 | A03 | 04 |
| A117 | LS STEAM CHEST INNER TEMP | 046074 | 0151 | J09 | J08 | J07 | A03 | 04 |
| A118 | LS STEAM CHEST OUTER TEMP | 056074 | 0151 | J06 | J05 | J04 | A03 | 04 |
| A119 | HP OTR CYL COVER TEMP | 066074 | 0151 | J03 | J02 | J01 | A03 | 04 |
| A120 | SPARE | 076074 | 0151 | K21 | K20 | K19 | A01 | 04 |
| A121 | THRUST BRG TEMP CTR P2 | 086074 | 0151 | K18 | K17 | K16 | A01 | 04 |
| A122 | THRUST BRG TEMP CTR G4 | 096074 | 0151 | K15 | K14 | K13 | A01 | 04 |
| A123 | SPARE | 106074 | 0151 | K12 | K11 | K10 | A01 | 04 |
| A124 | BRG 2 TEMP | 116074 | 0151 | K09 | K08 | K07 | A01 | 04 |
| A125 | BRG 3 TEMP | 126074 | 0151 | K06 | K05 | K04 | A01 | 04 |
| A126 | SPARE | 136074 | 0151 | K03 | K02 | K01 | A01 | |
| A127 | BRG 7 TEMP | 006174 | 0152 | J21 | J20 | J19 | A04 | 04 |
| A128 | BRG 6 TEMP | 016174 | 0152 | J18 | J17 | J16 | A04 | 04 |
| A129 | BRG 5 TEMP | 026174 | 0152 | J15 | J14 | J13 | A04 | 04 |
| A130 | BRG 4 TEMP | 036174 | 0152 | J12 | J11 | J10 | A04 | 04 |
| A131 | HOT REHEAT STM TURB INLET | 046174 | 0152 | J09 | J08 | J07 | A04 | 04 |
| A132 | IP BLADE RING TEMP | 056174 | 0152 | J06 | J05 | J04 | A04 | 04 |
| A133 | IP OUTER CYL BASE TEMP | 066174 | 0152 | J03 | J02 | J01 | A04 | 04 |
| A134 | IP OTR CYL COVER TEMP | 076174 | 0152 | K21 | K20 | K19 | A02 | 04 |
| A135 | SPARE | 086174 | 0152 | K18 | K17 | K16 | A02 | 04 |
| A136 | IMP CHAMBER METAL TEMP | 096174 | 0152 | K15 | K14 | K13 | A02 | 04 |
| A137 | RS STM CHEST OUTER TEMP | 106174 | 0152 | K12 | K11 | K10 | A02 | 04 |
| A138 | RS STM CHEST INNER TEMP | 116174 | 0152 | K09 | K08 | K07 | A02 | 04 |
| A139 | HP CYL BOLT TEMP | 126174 | 0152 | K06 | K05 | K04 | A02 | 04 |
| A140 | HP CYL FLANGE TEMP | 136174 | 0152 | K03 | K02 | K01 | A02 | 04 |
| A141 | SPARE | 006274 | 0153 | J21 | J20 | J19 | A07 | |
| A142 | SPARE | 016274 | 0153 | J18 | J17 | J16 | A07 | |
| A143 | BRG 8 TEMP | 026274 | 0153 | J15 | J14 | J13 | A07 | 04 |
| A144 | BRG 9 TEMP | 036274 | 0153 | J12 | J11 | J10 | A07 | 04 |
| A145 | BRG 10 TEMP | 046274 | 0153 | J09 | J08 | J07 | A07 | 04 |
| A146 | BRG 11 TEMP | 056274 | 0153 | J06 | J05 | J04 | A07 | 04 |
| A147 | BRG 12 TEMP | 066274 | 0153 | J03 | J02 | J01 | A07 | 04 |
| A148 | THROTTLE STM TEMP | 076274 | 0153 | K21 | K20 | K19 | A05 | 04 |
| A149 | HP GLAND STM TEMP | 086274 | 0153 | K18 | K17 | K16 | A05 | 04 |
| A150 | LP GLAND STM TEMP | 096274 | 0153 | K15 | K14 | K13 | A05 | 04 |
| A151 | OIL COOLER IN TEMP | 106274 | 0153 | K12 | K11 | K10 | A05 | 04 |
| A152 | OIL COOLER OUT TEMP | 116274 | 0153 | K09 | K08 | K07 | A05 | 04 |
| A153 | SEAL OIL TEMP AIR SIDE | 126274 | 0153 | K06 | K05 | K04 | A05 | 04 |
| A154 | SEAL OIL TEMP GAS SIDE | 136274 | 0153 | K03 | K02 | K01 | A05 | 04 |
| A155 | SPARE | 006374 | 0154 | J21 | J20 | J19 | A08 | |

DEH DIGITAL CONTROL SYSTEM PROJ 00935
ANALOG INPUT TERM ASSIGN REV 7 6-30-71

| COMP ADDR NO | DWG 807C610-398D528 807C559-398D442 DESCRIPTION | BIT WOR CH | CAB HS | TERM + | TERM - | SH | CAR LOC | OPT |
|---|---|---|---|---|---|---|---|---|
| A156 | SPARE | 016374 | 0154 | J18 | J17 | J16 | A08 | |
| A157 | SPARE | 026374 | 0154 | J15 | J14 | J13 | A08 | |
| A158 | SPARE | 036374 | 0154 | J12 | J11 | J10 | A08 | |
| A159 | SPARE | 046374 | 0154 | J09 | J08 | J07 | A08 | |
| A160 | GEN COOLING WATER OUT TEMP | 056374 | 0154 | J06 | J05 | J04 | A08 | 04 |
| A161 | GEN COOLING WATER IN TEMP | 066374 | 0154 | J03 | J02 | J01 | A08 | 04 |
| A162 | SPARE | 076374 | 0154 | K21 | K20 | K19 | A06 | |
| A163 | LP2 EXH F L STAT/GNN | 086374 | 0154 | K18 | K17 | K16 | A06 | 04 |
| A164 | LP2 EXH F L STAT/GVN | 096374 | 0154 | K15 | K14 | K13 | A06 | 04 |
| A165 | LP1 EXH F L STAT/GNN | 106374 | 0154 | K12 | K11 | K10 | A06 | 04 |
| A166 | LP1 EXH F L STAT/GVN | 116374 | 0154 | K09 | K08 | K07 | A06 | 04 |
| A167 | LP2 EXH STM TEMP | 126374 | 0154 | K06 | K05 | K04 | A06 | 04 |
| A168 | LP1 EXH STM TEMP | 136374 | 0154 | K03 | K02 | K01 | A06 | 04 |
| A169 | SPARE | 006474 | 0155 | J21 | J20 | J19 | A11 | |
| A170 | SPARE | 016474 | 0155 | J18 | J17 | J16 | A11 | |
| A171 | SPARE | 026474 | 0155 | J15 | J14 | J13 | A11 | |
| A172 | SPARE | 036474 | 0155 | J12 | J11 | J10 | A11 | |
| A173 | SPARE | 046474 | 0155 | J09 | J08 | J07 | A11 | |
| A174 | SPARE | 056474 | 0155 | J06 | J05 | J04 | A11 | |
| A175 | SPARE | 066474 | 0155 | J03 | J02 | J01 | A11 | |
| A176 | SPARE | 076474 | 0155 | K21 | K20 | K19 | A09 | |
| A177 | SPARE | 086474 | 0155 | K18 | K17 | K16 | A09 | |
| A178 | SPARE | 096474 | 0155 | K15 | K14 | K13 | A09 | |
| A179 | SPARE | 106474 | 0155 | K12 | K11 | K10 | A09 | |
| A180 | SPARE | 116474 | 0155 | K09 | K08 | K07 | A09 | |
| A181 | SPARE | 126474 | 0155 | K06 | K05 | K04 | A09 | |
| A182 | SPARE | 136474 | 0155 | K03 | K02 | K01 | A09 | |
| A183 | GV1AZ1 | 006574 | 0156 | J21 | J20 | J19 | A12 | |
| A184 | GV2AZ1 | 016574 | 0156 | J18 | J17 | J16 | A12 | |
| A185 | GV3AZ1 | 026574 | 0156 | J15 | J14 | J13 | A12 | |
| A186 | GV4AZ1 | 036574 | 0156 | J12 | J11 | J10 | A12 | |
| A187 | GV5AZ1 | 046574 | 0156 | J09 | J08 | J07 | A12 | |
| A188 | GV6AZ1 | 056574 | 0156 | J06 | J05 | J04 | A12 | |
| A189 | GV7AZ1 | 066574 | 0156 | J03 | J02 | J01 | A12 | |
| A190 | SPARE 1RT1 | 076574 | 0156 | K21 | K20 | K19 | A10 | |
| A191 | SPARE 1RT1 | 086574 | 0156 | K18 | K17 | K16 | A10 | |
| A192 | RTD 1 CJ 1RT1 | 096574 | 0156 | K15 | K14 | K13 | A10 | |
| A193 | RTD 2 CJ 1RT1 | 106574 | 0156 | K12 | K11 | K10 | A10 | |
| A194 | SPARE 1RT1 | 116574 | 0156 | K09 | K08 | K07 | A10 | |
| A195 | SPARE 1RT1 | 126574 | 0156 | K06 | K05 | K04 | A10 | |
| A196 | SPARE 1RT1 | 136574 | 0156 | K03 | K02 | K01 | A10 | |
| A197 | GV5PZ1 | 006674 | 0157 | J21 | J20 | J19 | A15 | |
| A198 | GV6PZ1 | 016674 | 0157 | J18 | J17 | J16 | A15 | |
| A199 | GV7PZ1 | 026674 | 0157 | J15 | J14 | J13 | A15 | |
| A200 | GV8PZ1 | 036674 | 0157 | J12 | J11 | J10 | A15 | |
| A201 | SPD*26 OPC SPEED | 046674 | 0157 | J09 | J08 | J07 | A15 | |
| A202 | SPARE | 056674 | 0157 | J06 | J05 | J04 | A15 | |
| A203 | KWTIZ1 MW | 066674 | 0157 | J03 | J02 | J01 | A15 | |
| A204 | GV TEST OUTPUT | 076674 | 0157 | K21 | K20 | K19 | A13 | |
| A205 | TPTAZ1 THROTTLE PRESS | 086671 | 0157 | K18 | K17 | K16 | A13 | |
| A206 | GEN CURRENT | 096674 | 0157 | K15 | K14 | K13 | A13 | 04 |
| A207 | GV8AZ1 | 106674 | 0157 | K12 | K11 | K10 | A13 | |
| A208 | SPARE | 116674 | 0157 | K09 | K08 | K07 | A13 | |
| A209 | SPARE | 126674 | 0157 | K06 | K05 | K04 | A13 | |
| A210 | SPARE | 136674 | 0157 | K03 | K02 | K01 | A13 | |
| A211 | TVAAZ2 | 006774 | 0158 | J21 | J20 | J19 | A16 | |
| A212 | TVMAZ2 | 016774 | 0158 | J18 | J17 | J16 | A16 | |
| A213 | TV*AZ1 | 026774 | 0158 | J15 | J14 | J13 | A16 | |
| A214 | TV1PZ1 | 036774 | 0158 | J12 | J11 | J10 | A16 | |
| A215 | TV2PZ1 | 046774 | 0158 | J09 | J08 | J07 | A16 | |
| A216 | TV3PZ1 | 056774 | 0158 | J06 | J05 | J04 | A16 | |
| A217 | TV4PZ1 | 066774 | 0158 | J03 | J02 | J01 | A16 | |
| A218 | GVAAZ2 | 076774 | 0158 | K21 | K20 | K19 | A14 | |
| A219 | GVMAZ2 | 086774 | 0158 | K18 | K17 | K16 | A14 | |
| A220 | GV*AZ1 | 096774 | 0158 | K15 | K14 | K13 | A14 | |
| A221 | GV1PZ1 | 106774 | 0158 | K12 | K11 | K10 | A14 | |
| A222 | GV2PZ1 | 116774 | 0158 | K09 | K08 | K07 | A14 | |
| A223 | GV3PZ1 | 126774 | 0158 | K06 | K05 | K04 | A14 | |
| A224 | GV4PZ1 | 136774 | 0158 | K03 | K02 | K01 | A14 | |

```
                         DEH DIGITAL CØNTRØL SYSTEM  PRØJ 00935
                         ANALØG INPUT TERM ASSIGN REV 7 6-30-71
CØMP      DWG 807C610-398D528        B W   C
ADDR          807C559-398D442     .  I Ø C A H   TERM          CAR
NØ        DESCRIPTIØN                T R H B S   +    -    SH  LØC  ØPT


     ØPTIØNS

01 DATA LINK-PØWER PLANT CØMPUTER
   CØMPUTER DATA LINK LESS THAN 50 FT
   CØMPUTER DATA LINK GREATER THAN 50 FT
02 DATA LINK ADS
03 DATA LINK ASME TEST
04 AUTØ TURB ACCELERATIØN
05 SELECTRIC 735 LØGGING T/W
06 FREQUENCY BIAS A/Ø
07 LØAD REF A/Ø
08 REMØTE VALVE PØSITIØN LIMIT SETPØINT
09 ØPERATØR PB SETTING ØF THRØTTLE PRESSURE LIMITER
10 ØPERATØR SET H/L LIMIT
11 DIGITAL SPEED INDICATØR
12 DUPLICATE ØPERATØR'S PNL
13 DUAL CHANNEL SYSTEM
14 TELETYPE AUTØMATIC SEND AND RECEIVE T/W (ASR)
15 SEQUENCE ØF EVENTS
16 STATIC INVERTER

  ASSIGN CC,MR66
  EØJ
$$JØB ØFF AT 00  17  55

  JØB G7003,05 AI SCØTT
$$JØB ØN  AT 00  17  57

 ** JØB RUN ØN NØ.1  4/5/72  4/12**
 **                           $*
  ASSIGN CC,DC90,380,380
  ASSIGN CC,DC90,1CAA,1CC4 ***291 PRØGRAM***
  ASSIGN BI,DC90,1CB1,1CC4
  ASSIGN LI,DC90,200,2DF
  LINK
 /LD
 /LB
 /XE
                        DEH DIGITAL CØNTRØL SYSTEM  PRØJ 00935
                        ANALØG ØUTPUT TERM ASSIGN REV 7 6-30-71
CØMP     DWG 807C559-398D422              W  C
ADDR                                      Ø  A H   TERM         CAR
NØ         DESCRIPTIØN                    R  B S   +            LØC  ØPT

AØ01  GV1AZ1                      DIR TØ MAN BACKUP SYS         D01
AØ02  GV2AZ1                      DIR TØ MAN BACKUP SYS         D02
AØ03  GV3AZ1                      DIR TØ MAN BACKUP SYS         D03
AØ04  GV4AZ1                      DIR TØ MAN BACKUP SYS         D04
AØ05  GV5AZ1                      DIR TØ MAN BACKUP SYS         D05
AØ06  GV6AZ1                      DIR TØ MAN BACKUP SYS         D06
AØ07  GV7AZ1                      DIR TØ MAN BACKUP SYS         D07
AØ08  GV8AZ1                      DIR TØ MAN BACKUP SYS         D08
AØ09  TVAAZ1                      DIR TØ MAN BACKUP SYS         E09
AØ10  GVAAZ1                      DIR TØ MAN BACKUP SYS         E10
AØ11  BCA*Z1                      DIR TØ MAN BACKUP SYS         E11
AØ12  EH FREQ BIAS ØUTPUT             33 0171   J1 J2 J3        E12
AØ13  LØAD REF 0-10V FØR 0-120% LØAD  34 0172   J4 J7           E13
AØ14  VALVE PØSITIØN LIMIT SET PØINT  35 0172   K4 K7           E14
AØ15  SPARE                           36 0173   J4 J7           E15
AØ16  SPARE                           37 0173   K4 K7           E16

     ØPTIØNS

01 DATA LINK-PØWER PLANT CØMPUTER
   CØMPUTER DATA LINK LESS THAN 50 FT
   CØMPUTER DATA LINK GREATER THAN 50 FT
02 DATA LINK ADS
```

DEH DIGITAL CONTROL SYSTEM PROJ 00935
ANALOG INPUT TERM ASSIGN REV 7 6-30-71

```
COMP        DWG 807C610-398D528        B W     C
ADDR            807C559-398D442        I O C   A H   TERM          CAR
NO          DESCRIPTION                T R H   B S   +    -    SH   LOC   OPT
```

03 DATA LINK ASME TEST
04 AUTO TURB ACCELERATION
05 SELECTRIC 735 LOGGING T/W
06 FREQUENCY BIAS A/O
07 LOAD REF A/O
08 REMOTE VALVE POSITION LIMIT SETPOINT
09 OPERATOR PB SETTING OF THROTTLE PRESSURE LIMITER
10 OPERATOR SET H/L LIMIT
11 DIGITAL SPEED INDICATOR
12 DUPLICATE OPERATOR'S PNL
13 DUAL CHANNEL SYSTEM
14 TELETYPE AUTOMATIC SEND AND RECEIVE T/W (ASR)
15 SEQUENCE OF EVENTS
16 STATIC INVERTER

```
  ASSIGN CC,MR66
  EOJ
**JOB OFF AT 00  18  24

  JOB G7003,05 AI SCOTT
$$JOB ON  AT 00  18  25

 ** JOB RUN ON NO.1  4/5/72  4/12**
 **                             **
  ASSIGN CC,DC90,380,380
  ASSIGN CC,DC90,1CAA,1CC4 ***291 PROGRAM***
  ASSIGN BI,DC90,1CB1,1CC4
  ASSIGN LI,DC90,200,2DF
  LINK
 /LD
 /LB
 /XE
```

DEH DIGITAL CONTROL SYSTEM PROJ 00935
NON-MPX CONTACT INPUT TERM ASSIGN REV 7 6-30-71

DWG 807C610-398D528

| COMP ADDR NO | DESCRIPTION | B C I C H T | A H B S TERM + | CARD LOC | OPT |
|---|---|---|---|---|---|
| D001 | OP PNL MATRIX BD 1 | 0000 | 0021-J16,M16 | J01 | |
| D002 | OP PNL MATRIX BD 1 | 0001 | 0021-J15,M15 | J01 | |
| D003 | OP PNL MATRIX BD 1 | 0002 | 0021-J14,M14 | J01 | |
| D004 | OP PNL MATRIX BD 1 | 0003 | 0021-J13,M13 | J01 | |
| D005 | OP PNL MATRIX BD 1 | 0004 | 0021-J12,M12 | J01 | |
| D006 | OP PNL MATRIX BD 2 | 0005 | 0021-J11,M11 | J01 | |
| D007 | SPARE | 0006 | 0021-J10,M10 | J01 | |
| D008 | SPARE | 0007 | 0021-J09,M09 | J01 | |
| D009 | SPARE | 0008 | 0021-J08,M08 | J01 | |
| D010 | SPARE | 0009 | 0021-J07,M07 | J01 | |
| D011 | SPARE | 0010 | 0021-J06,M06 | J01 | |
| D012 | SPARE | 0011 | 0021-J05,M05 | J01 | |
| D013 | SPARE | 0012 | 0021-J04,M04 | J01 | |
| D014 | SPARE | 0013 | 0021-J03,M03 | J01 | |
| D015 | VALVE TEST INTERLK T1 | 0100 | 0021-K16,N16 | J02 | |
| D016 | VALVE TEST INTERLK T2 | 0101 | 0021-K15,N15 | J02 | |
| D017 | VALVE TEST INTERLK T3 | 0102 | 0021-K14,N14 | J02 | |
| D018 | VALVE TEST INTERLK T4 | 0103 | 0021-K13,N13 | J02 | |
| D019 | SPARE | 0104 | 0021-K12,N12 | J02 | |
| D020 | SPARE | 0105 | 0021-K11,N11 | J02 | |
| D021 | SPARE | 0106 | 0021-K10,N10 | J02 | |
| D022 | SPARE | 0107 | 0021-K09,N09 | J02 | |
| D023 | SPARE | 0108 | 0021-K08,N08 | J02 | |
| D024 | SPARE | 0109 | 0021-K07,N07 | J02 | |
| D025 | SPARE | 0110 | 0021-K06,N06 | J02 | |
| D026 | SPARE | 0111 | 0021-K05,N05 | J02 | |
| D027 | SPARE | 0112 | 0021-K04,N04 | J02 | |
| D028 | SPARE | 0113 | 0021-K03,N03 | J02 | |
| D029 | SPARE | 0200 | 0022-J16,M16 | J03 | |
| D030 | SPARE | 0201 | 0022-J15,M15 | J03 | |

DEH DIGITAL CONTROL SYSTEM PROJ 00935
NON-MPX CONTACT INPUT TERM ASSIGN REV 7 6-30-71

DWG 807C610-398D528

| COMP ADDR NO | DESCRIPTION | | B CI HT | C AH BS TERM ♦ | CARD LOC | OPT |
|---|---|---|---|---|---|---|
| D031 | SPARE | | 0202 | 0022-J14,M14 | J03 | |
| D032 | SPARE | | 0203 | 0022-J13,M13 | J03 | |
| D033 | SPARE | | 0204 | 0022-J12,M12 | J03 | |
| D034 | SPARE | | 0205 | 0022-J11,M11 | J03 | |
| D035 | SPARE | | 0206 | 0022-J10,M10 | J03 | |
| D036 | H2 SIDE SEAL OIL PUMP ON | | 0207 | 0022-J09,M09 | J03 | 04 |
| D037 | H2 PANEL ANNUNCIATOR | | 0208 | 0022-J08,M08 | J03 | 04 |
| D038 | EH FL PRESSURE LOW | | 0209 | 0022-J07,M07 | J03 | 04 |
| D039 | GEN BKR CONTR SW UNLOCKED | | 0210 | 0022-J06,M06 | J03 | 04 |
| D040 | FIELD BKR SW UNLOCKED | | 0211 | 0022-J05,M05 | J03 | 04 |
| D041 | AIR SW CLOSED | | 0212 | 0022-J04,M04 | J03 | 04 |
| D042 | AUTO SYNC SW ON AUTO | | 0213 | 0022-J03,M03 | J03 | 04 |
| D043 | EXHAUST SPRAYS ON | | 0300 | 0022-K16,N16 | J04 | 04 |
| D044 | DRAIN VALVES CLOSED | | 0301 | 0022-K15,N15 | J04 | 04 |
| D045 | DRAIN VALVES OPEN | | 0302 | 0022-K14,N14 | J04 | 04 |
| D046 | VR IN SERVICE | | 0303 | 0022-K13,N13 | J04 | 04 |
| D047 | AIR SIDE SEAL OIL BACKUP PUMP ON | | 0304 | 0022-K12,N12 | J04 | 04 |
| D048 | GEN TERM AT R. N. L. SET | | 0305 | 0022-K11,N11 | J04 | 04 |
| D049 | DV A/M SEL POS | | 0306 | 0022-K10,N10 | J04 | 04 |
| D050 | MAIN TURB ON TURNING GEAR | | 0307 | 0022-K09,N09 | J04 | 04 |
| D051 | ZERO SPEED INDIC | | 0308 | 0022-K08,N08 | J04 | 04 |
| D052 | FIELD BKR CLOSED | | 0309 | 0022-K07,N07 | J04 | 04 |
| D053 | EXCIT RUNBACK | | 0310 | 0022-K06,N06 | J04 | 04 |
| D054 | VOLT REG SW POS | | 0311 | 0022-K05,N05 | J04 | 04 |
| D055 | SPARE | | 0312 | 0022-K04,N04 | J04 | |
| D056 | VOLT ADJ AT NO LOAD SET | | 0313 | 0022-K03,N03 | J04 | 04 |
| D057 | THROT PRESS TRANSD FAIL | | 0400 | 0025-J16,M16 | J05 | |
| D058 | OPC SPEED CH MONITOR | | 0401 | 0025-J15,M15 | J05 | |
| D059 | OPC OPERATING | | 0402 | 0025-J14,M14 | J05 | |
| D060 | MW TRANSD FAIL | | 0403 | 0025-J13,M13 | J05 | |
| D061 | MANUAL TPC IN/OUT | | 0404 | 0025-J12,M12 | J05 | |
| D062 | MAIN GEN CIR BKR CLOSED | | 0405 | 0025-J11,M11 | J05 | |
| D063 | AS PULSE UP | 6-10 | 0406 | 0025-J10,M10 | J05 | |
| D064 | AS PULSE DOWN | 6-10 | 0407 | 0025-J09,M09 | J05 | |
| D065 | AS PERMISSIVE | 6 | 0408 | 0025-J08,M08 | J05 | |
| D066 | SPARE | | 0409 | 0025-J07,M07 | J05 | |
| D067 | SET IMP OUT | 8 | 0410 | 0025-J06,M06 | J05 | |
| D068 | ADS PULSE UP | 8,10 | 0411 | 0025-J05,M05 | J05 | |
| D069 | ADS PULSE DOWN | 8-10 | 0412 | 0025-J04,M04 | J05 | |
| D070 | ADS PERMISSIVE | 8 | 0413 | 0025-J03,M03 | J05 | |
| D071 | VALVE POS LIMITING INC | | 0500 | 0027-J16,M16 | J06 | |
| D072 | VALVE POS LIMITING DEC | | 0501 | 0027-J15,M15 | J06 | |
| D073 | ASL | | 0502 | 0027-J14,M14 | J06 | |
| D074 | RUNBACK | | 0503 | 0027-J13,M13 | J06 | |
| D075 | THI | | 0504 | 0027-J12,M12 | J06 | |
| D076 | TURB MAN STATUS | | 0505 | 0027-J11,M11 | J06 | |
| D077 | OPC XCER MONITOR | | 0506 | 0027-J10,M10 | J06 | |
| D078 | +24V PWR SUPPLY | | 0507 | 0027-J09,M09 | J06 | |
| D079 | PLANT COMPTR PERMISSIVE | | 0508 | 0027-J08,M08 | J06 | |
| D080 | SPARE | | 0509 | 0027-J07,M07 | J06 | |
| D081 | SPARE | | 0510 | 0027-J06,M06 | J06 | |
| D082 | OP PNL B OPC OVERSPEED TEST | | 0511 | 0027-J05,M05 | J06 | |
| D083 | OP PNL B OPC TEST | | 0512 | 0027-J04,M04 | J06 | |
| D084 | OP PNL B MAINT TEST | | 0513 | 0027-J03,M03 | J06 | |

NOTES ---
6 FROM AUTO SYNC
7 PLANT RUNBACK
8 FROM BLR OR ADS
9 BLR TO PUM
10 FIXED PULSE FURNISHED AS STD. FOR VARIABLE PUSLE SPECIFY AS ALTERNATE

OPTIONS

01 DATA LINK-POWER PLANT COMPUTER
COMPUTER DATA LINK LESS THAN 50 FT
COMPUTER DATA LINK GREATER THAN 50 FT

```
                         DEH DIGITAL CONTROL SYSTEM PROJ  00935
              NON-MPX CONTACT INPUT TERM ASSIGN REV 7 6-30-71
COMP        DWG 807C610-398D528                     B  C
ADDR                                                C I  A H     TERM CARD
NO          DESCRIPTION                             H T  B S       +  LOC      OPT
02 DATA LINK ADS
03 DATA LINK ASME TEST
04 AUTO TURB ACCELERATION
05 SELECTRIC 735 LOGGING T/W
06 FREQUENCY BIAS A/O
07 LOAD REF A/O
08 REMOTE VALVE POSITION LIMIT SETPOINT
09 OPERATOR PB SETTING OF THROTTLE PRESSURE LIMITER
10 OPERATOR SET H/L LIMIT
11 DIGITAL SPEED INDICATOR
12 DUPLICATE OPERATOR'S PNL
13 DUAL CHANNEL SYSTEM
14 TELETYPE AUTOMATIC SEND AND RECEIVE T/W (ASR)
15 SEQUENCE OF EVENTS
16 STATIC INVERTER

  ASSIGN CC,MR66
  EOJ
$$JOB OFF AT 00  19  27

  JOB G7003,05 AI SCOTT
$$JOB ON  AT 00  19  28

 ** JOB RUN ON NO.1  4/5/72  4/12**
 **                              $*
  ASSIGN CC,DC90,380,380
  ASSIGN CC,DC90,1CAA,1CC4 ***291 PROGRAM***
  ASSIGN BI,DC90,1CB1,1CC4
  ASSIGN LI,DC90,200,2DF
  LINK
 /LD
 /LB
 /XE
                         DEH DIGITAL CONTROL SYSTEM  PROJ 00935
                       INTERRUPT INPUT TERM ASSIGN REV 7 6-30-71
COMP        DWG 807C610-398D528                     I  C
ADD             807C559-398D442                     N  A H    T        CARD
NO          DESCRIPTION                             T  B S        +    LOC     OPT

I001   SPARE                                       40 0026-J15,   M15  EE11
I002   OP PNL MATRIC BD                            41 0026-J13,   M13  EE11
I003   TURBINE TRIPPED-ASL                         42 0026-J11,   M11  EE11
I004   OP PNL OPEN-CLOSE,LIM R-LIM L               43 0026-J09,   M09  EE11
I005   MAIN BKR                                    43 0026-J07,   M07  EE11
I006   SPARE                                       45 0026-J05,   M05  EE11
I007   SPARE                                       46 0026-J03,   M03  EE11
I008   SPARE                                       47 0026-J01,   M01  EE11


I009   SPARE                                       30 0026-K15,   N15  EE11
I010   SPARE                                       31 0026-K13,   N13  EE11
I011   SPARE                                       32 0026-K11,   N11  EE11
I012   SPARE                                       33 0026-K09,   N09  EE11
I013   SPARE                                       34 0026-K07,   N07  EE11
I014   SPARE                                       35 0026-K05,   N05  EE11
I015   SPARE                                       36 0026-K03,   N03  EE11
I016   SPARE                                       37 0026-K01,   N01  EE11
       OPTIONS

01 DATA LINK-POWER PLANT COMPUTER
   COMPUTER DATA LINK LESS THAN 50 FT
   COMPUTER DATA LINK GREATER THAN 50 FT
02 DATA LINK ADS
03 DATA LINK ASME TEST
04 AUTO TURB ACCELERATION
05 SELECTRIC 735 LOGGING T/W
06 FREQUENCY BIAS A/O
07 LOAD REF A/O
08 REMOTE VALVE POSITION LIMIT SETPOINT
09 OPERATOR PB SETTING OF THROTTLE PRESSURE LIMITER
10 OPERATOR SET H/L LIMIT
```

DEH DIGITAL CONTROL SYSTEM PROJ 00935
INTERRUPT INPUT TERM ASSIGN REV 7 6-30-71

| COMP ADD NO | DWG 807C610-398D528 807C559-398D442 DESCRIPTION | I N T | C A B | H S | T | + | CARD LOC | OPT |
|---|---|---|---|---|---|---|---|---|

11 DIGITAL SPEED INDICATOR
12 DUPLICATE OPERATOR'S PNL
13 DUAL CHANNEL SYSTEM
14 TELETYPE AUTOMATIC SEND AND RECEIVE T/W (ASR)
15 SEQUENCE OF EVENTS
16 STATIC INVERTER

```
  ASSIGN CC,MR66
  EOJ
$$JOB OFF AT 00  19  57

  JOB G7003,05 AI SCOTT
$$JOB ON  AT 00  19  58

 ** JOB RUN ON NO.1  4/5/72  4/12**
 **                           $*
  ASSIGN CC,DC90,380,380
  ASSIGN CC,DC90,1CAA,1CC4 ***291 PROGRAM***
  ASSIGN BI,DC90,1CB1,1CC4
  ASSIGN LI,DC90,200,2DF
  LINK
 /LD
 /LB
 /XE
```

DEH DIGITAL CONTROL SYSTEM PROJ 00935
CONTACT OUTPUT TERM ASSIGN REV 7 6-30-71

| COMP ADDR NO | DWG 807C610-398D528 807C559-398D442 DESCRIPTION | B W S I O EC T R TH | CAB HS CONN NO | TERM NC | COM | CARD LOC | OPT |
|---|---|---|---|---|---|---|---|
| C001 | OP PNL B DISP DEM DP UNITS | 000015 | HH16-J | ,E | ,F | M01 | |
| C002 | OP PNL B DISP DEM DP TENS | 010015 | HH16-N | ,K | ,L | M01 | |
| C003 | OP PNL B DISP DEM DP HUNS | 020015 | HH16-T | ,P | ,R | M01 | |
| C004 | OP PNL B DISP DEM DP THOU | 030015 | HH16-X | ,U | ,V | M01 | |
| C005 | OP PNL B DISP DEM GATE | 040015 | HH16-BB | ,Y | ,Z | M01 | |
| C006 | OP PNL B DISP DEM CLEAR | 050015 | HH16-FF | ,CC | ,DD | M01 | |
| C007 | OP PNL B DISP DEM MINUS SIGN | 060015 | HH16-LL | ,HH | ,JJ | M01 | |
| C008 | TA PNL HI ECCENTR | 070015 | HH15-J | ,E | ,F | M16 | 04 |
| C009 | TA PNL HI BRG TEMP | 080015 | HH15-N | ,K | ,L | M16 | 04 |
| C010 | TA PNL BRG OIL PR/TEMP OUT | 090015 | HH15-T | ,P | ,R | M16 | 04 |
| C011 | TA PNL VIB EQUIP MONITOR | 100015 | HH15-X | ,U | ,V | M16 | 04 |
| C012 | TA PNL H2 PR/TEMP OUT LIMIT | 110015 | HH15-BB | ,Y | ,Z | M16 | 04 |
| C013 | TA PNL HI VIBR | 120015 | HH15-FF | ,CC | ,DD | M16 | 04 |
| C014 | TA PNL HI ROTOR STRAIN | 130015 | HH15-LL | ,HH | ,JJ | M16 | 04 |
| C015 | TA PNL LOW H2 SEAL PRESS | 000115 | HH14-J | ,E | ,F | M02 | 04 |
| C016 | TA PNL TRIP TURB | 010115 | HH14-N | ,K | ,L | M02 | 04 |
| C017 | TA PNL TURB DECEL | 020115 | HH14-T | ,P | ,R | M02 | 04 |
| C018 | TA PNL REDUCE LOAD | 030115 | HH14-X | ,U | ,V | M02 | 04 |
| C019 | TA PNL SPEED HOLD | 040115 | HH14-BB | ,Y | ,Z | M02 | 04 |
| C020 | TA PNL HOLD LOAD | 050115 | HH14-FF | ,CC | ,DD | M02 | 04 |
| C021 | TA PNL DRAIN VALUES CLOSED | 060115 | HH14-LL | ,HH | ,JJ | M02 | 04 |
| C022 | TA PNL LOW REHEAT TEMP | 070115 | HH13-J | ,E | ,F | M15 | 04 |
| C023 | TA PNL LOW STM CHEST TEMP | 080115 | HH13-N | ,K | ,L | M15 | 04 |
| C024 | TA PNL AUTO SYN NOT ON AUT | 090115 | HH13-T | ,P | ,R | M15 | 04 |
| C025 | TA PNL OUT OF SYN SPEED RG | 100115 | HH13-X | ,U | ,V | M15 | 04 |
| C026 | TA PNL FIELD BKR OPEN | 110115 | HH13-BB | ,Y | ,Z | M15 | 04 |
| C027 | TA PNL EXCIT NOT RUNBACK | 120115 | HH13-FF | ,CC | ,DD | M15 | 04 |
| C028 | TA PNL SPARE | 130115 | HH13-LL | ,HH | ,JJ | M15 | |
| C029 | THROTTLE PRESS LIMITING 3 | 000215 | 0035-K08 | ,K05 | K06 | M03 | |
| C030 | SPEED CONTROL IN SERV 3 | 010215 | 0035-K12 | ,K09 | K10 | M03 | |
| C031 | IMP IN 2 | 020215 | 0035-K16 | ,K13 | K14 | M03 | |
| C032 | BLR OR ADS IN SERVICE 2 | 030215 | 0035-J04 | ,J01 | J02 | M03 | |
| C033 | AUTO SYNC 2 | 040215 | 0035-J08 | ,J05 | J06 | M03 | |
| C034 | AUTO SYNC 1 | 050215 | 0035-J12 | ,J09 | J10 | M03 | |
| C035 | ATS MESSAGES /ALARMS | 060215 | 0035-J16 | ,J13 | J14 | M03 | |
| C036 | LOW LIMITING 3 | 070215 | 0036-K08 | ,K05 | K06 | M14 | 10 |
| C037 | HIGH LIMITNG 3 | 080215 | 0036-K12 | ,K09 | K10 | M14 | 10 |
| C038 | IMP IN 3 | 090215 | 0036-K16 | ,K13 | K14 | M14 | |
| C039 | MW CONTROL IN SERVICE 3 | 100215 | 0036-J04 | ,J01 | J02 | M14 | |

DEH DIGITAL CONTROL SYSTEM PROJ 00935
CONTACT OUTPUT TERM ASSIGN REV 7 6-30-71

DWG 807C610-398D528
807C559-398D442

| COMP ADDR NO | DESCRIPTION | | B W S / I O EC / T R TH | CAB HS CONN NO | TERM NC | COM | CARD LOC | OPT |
|---|---|---|---|---|---|---|---|---|
| C040 | VALVE POS LIMITING | 3 | 110215 | 0036-J08, | J05 | J06 | M14 | |
| C041 | SPARE | | 120215 | 0036-J12, | J09 | J10 | M14 | |
| C042 | BLR OR ADS IN SERVICE | 3 | 130215 | 0036-J16, | J13 | J14 | M14 | |
| C043 | SPARE | | 000315 | 0037-K08, | K05 | K06 | M04 | |
| C044 | SPARE | | 010315 | 0037-K12, | K09 | K10 | M04 | |
| C045 | PLANT COMPTR CONTROL | | 020315 | 0037-K16, | K13 | K14 | M04 | 01 |
| C046 | VALVE TEST 20/TV4 | | 030315 | 0037-J04, | J01 | J02 | M04 | |
| C047 | VALVE TEST 20/TV3 | | 040315 | 0037-J08, | J05 | J06 | M04 | |
| C048 | VALVE TEST 20/TV2 | | 050315 | 0037-J12, | J09 | J10 | M04 | |
| C049 | VALVE TEST 20/TV1 | | 060315 | 0037-J16, | J13 | J14 | M04 | |
| C050 | SPARE | | 070315 | 0038-K08, | K05 | K06 | M13 | |
| C051 | SPARE | | 080315 | 0038-K12, | K09 | K10 | M13 | |
| C052 | SPARE | | 090315 | 0038-K16, | K13 | K14 | M13 | |
| C053 | SPARE | | 100315 | 0038-J04, | J01 | J02 | M13 | |
| C054 | SPARE | | 110315 | 0038-J08, | J05 | J06 | M13 | |
| C055 | SPARE | | 120315 | 0038-J12, | J09 | J10 | M13 | |
| C056 | SPARE | | 130315 | 0038-J16, | J13 | J14 | M13 | |
| C057 | TRANSF TV/GV COMPLETE | 2 | 000415 | 0041-K08, | K05 | K06 | M05 | |
| C058 | PLANT COMPTER CONTROL | 2 | 010415 | 0041-K12, | K09 | K10 | M05 | 01 |
| C059 | MW CONTROL IN SERVICE | 2 | 020415 | 0041-K16, | K13 | K14 | M05 | |
| C060 | SPEED CONTROL IN SERV | 2 | 030415 | 0041-J04, | J01 | J02 | M05 | |
| C061 | IMP TRANSDUCER MONITOR | 2 | 040415 | 0041-J08, | J05 | J06 | M05 | |
| C062 | CONTROL SPEED CH MON | 2 | 050415 | 0041-J12, | J09 | J10 | M05 | |
| C063 | MANUAL NOT TRACKING AUTO | | 060415 | 0041-J16, | J13 | J14 | M05 | |
| C064 | CCI SCAN MONITOR | | 070415 | 0042-K08, | K05 | K06 | M12 | |
| C065 | SINGLE VLV OPERATION | 2 | 080415 | 0042-K12, | K09 | K10 | M12 | |
| C066 | LOW LIMITING | 2 | 090415 | 0042-K16, | K13 | K14 | M12 | 10 |
| C067 | HIGH LIMITING | 2 | 100415 | 0042-J04, | J01 | J02 | M12 | 10 |
| C068 | VALVE POSITION LIMITING | 2 | 110415 | 0042-J08, | J05 | J06 | M12 | |
| C069 | STARTUP ALARMS | 2 | 120415 | 0042-J12, | J09 | J10 | M12 | 04 |
| C070 | ATS SENSOR FAILURE | | 130415 | 0042-J16, | J13 | J14 | M12 | 04 |
| C071 | SPARE | | 000515 | 0043-K08, | K05 | K06 | M06 | |
| C072 | SPARE | | 010515 | 0043-K12, | K09 | K10 | M06 | |
| C073 | SPARE | | 020515 | 0043-K16, | K13 | K14 | M06 | |
| C074 | SPARE | | 030515 | 0043-J04, | J01 | J02 | M06 | |
| C075 | SPARE | | 040515 | 0043-J08, | J05 | J06 | M06 | |
| C076 | SPARE | | 050515 | 0043-J12, | J09 | J10 | M06 | |
| C077 | SPARE | | 060515 | 0043-J16, | J13 | J14 | M06 | |
| C078 | OPEN DRAIN VLV | | 070515 | 0044-K08, | K05 | K06 | M11 | 04 |
| C079 | CLOSE DRAIN VLV | | 080515 | 0044-K12, | K09 | K10 | M11 | 04 |
| C080 | ENERGIZE TRIP SOLENOID | | 090515 | 0044-K16, | K13 | K14 | M11 | 04 |
| C081 | CLOSE FLD BKR | | 100515 | 0044-J04, | J01 | J02 | M11 | 04 |
| C082 | SPARE | | 110515 | 0044-J08, | J05 | J06 | M11 | 04 |
| C083 | SPARE | | 120515 | 0044-J12, | J09 | J10 | M11 | |
| C084 | HP OVERSPEED | | 130515 | 0044-J16, | J13 | J14 | M11 | |
| C085 | SPARE | | 000615 | 0045-K08, | K05 | K06 | M07 | |
| C086 | SPARE | | 010615 | 0045-K12, | K09 | K10 | M07 | |
| C087 | SPARE | | 020615 | 0045-K16, | K13 | K14 | M07 | |
| C088 | SPARE | | 030615 | 0045-J04, | J01 | J02 | M07 | |
| C089 | SPARE | | 040615 | 0045-J08, | J05 | J06 | M07 | |
| C090 | SPARE | | 050615 | 0045-J12, | J09 | J10 | M07 | |
| C091 | SPARE | | 060615 | 0045-J16, | J13 | J14 | M07 | |
| C092 | COMP READY TO GO ON AUTO(CSOAX1) | | 070615 | 0046-K08, | K05 | K06 | M10 | |
| C093 | TV TO GV TRANSFER IN PROG(CTTGX1) | | 080615 | 0046-K12, | K09 | K10 | M10 | |
| C094 | COMP REQUEST FOR MANUAL(CSTMX1) | | 090615 | 0046-K16, | K13 | K14 | M10 | |
| C095 | OPC SPEED CH FAIL & S (CSCFX1) | | 100615 | 0046-J04, | J01 | J02 | M10 | |
| C096 | COMPTR OPER OPC & S (COPCX1) | | 110615 | 0046-J08, | J05 | J06 | M10 | |
| C097 | COMPTR IN TH PR CONT (CTPCX1) | | 120615 | 0046-J12, | J09 | J10 | M10 | |
| C098 | COMP THROT PRESS LIMI'G (CTPLX1) | | 130615 | 0046-J16, | J13 | J14 | M10 | |
| C099 | TA PNL TURNING GEAR IN OP | | 000715 | HH12-J | ,E | ,F | M08 | 04 |
| C100 | TA PNL ACCEL TO HEAT SOAK | | 010715 | HH12-N | ,K | ,L | M08 | 04 |
| C101 | TA PNL AT HEAT SOAK SPEED | | 020715 | HH12-T | ,P | ,R | M08 | 04 |
| C102 | TA PNL HEAT SOAK IN PROGRESS | | 030715 | HH12-X | ,U | ,V | M08 | 04 |
| C103 | TA PNL ACCEL TO TRANSFER | | 040715 | HH12-BB | ,Y | ,Z | M08 | 04 |

DEH DIGITAL CONTROL SYSTEM PROJ 00935
CONTACT OUTPUT TERM ASSIGN REV 7 6-30-71

| COMP ADDR NO | DWG 807C610-398D528 807C559-398D442 DESCRIPTION | | B W S / I O EC / T R TH | CAB HS CONN NO | TERM NC | COM | CARD LOC | OPT |
|---|---|---|---|---|---|---|---|---|
| C104 | TA PNL | TRANSFER TV TO GV | 050715 | HH12-FF | ,CC | ,DD | M08 | 04 |
| C105 | TA PNL | ACCEL TO SYNC SPEED | 060715 | HH12-LL | ,HH | ,JJ | M08 | 04 |
| C106 | TA PNL | SYNC IN PROGRESS | 070715 | HH11-J | ,E | ,F | M09 | 04 |
| C107 | TA PNL | TURB ON LINE | 080715 | HH11-N | ,K | ,L | M09 | 04 |
| C108 | TA PNL | TURB SUPERVISION | 090715 | HH11-T | ,P | ,R | M09 | 04 |
| C109 | TA PNL | HI DIF TEMP STM METAL | 100715 | HH11-X | ,U | ,V | M09 | 04 |
| C110 | TA PNL | HI DIF EXPAN | 110715 | HH11-BB | ,Y | ,Z | M09 | 04 |
| C111 | TA PNL | HI DIF METAL METAL | 120715 | HH11-FF | ,CC | ,DD | M09 | 04 |
| C112 | TA PNL | LOW VACUUM | 130715 | HH11-LL | ,HH | ,JJ | M09 | 04 |
| C113 | OP PNL A | SPARE | 001015 | FF01-J | ,E | ,F | F01 | |
| C114 | OP PNL A | CONT SP CH MON | 011015 | FF01-N | ,K | ,L | F01 | |
| C115 | OP PNL A | IMP PRESS XCER MON | 021015 | FF01-T | ,P | ,R | F01 | |
| C116 | OP PNL A | TRANS RELAY 24V PWR | 031015 | FF01-X | ,U | ,V | F01 | |
| C117 | OP PNL A | MAN NOT TRACK'G AUTO | 041015 | FF01-BB | ,Y | ,Z | F01 | |
| C118 | OP PNL A | SPARE | 051015 | FF01-FF | ,CC | ,DD | F01 | |
| C119 | OP PNL A | SPARE | 061015 | FF01-LL | ,HH | ,JJ | F01 | |
| C120 | OP PNL B | TV TRANSFER | 071015 | FF02-J | ,E | ,F | F16 | |
| C121 | OP PNL B | GV | 081015 | FF02-N | ,K | ,L | F16 | |
| C122 | OP PNL B | IMP IN/OUT | 091015 | FF02-T | ,P | ,R | F16 | |
| C123 | OP PNL B | MW IN/OUT | 101015 | FF02-X | ,U | ,V | F16 | |
| C124 | OP PNL B | SPEED IN/OUT | 111015 | FF02-BB | ,Y | ,Z | F16 | |
| C125 | OP PNL B | SPARE | 121015 | FF02-FF | ,CC | ,DD | F16 | |
| C126 | OP PNL B | SPARE | 131015 | FF02-LL | ,HH | ,JJ | F16 | |
| C127 | OP PNL B | CONTROLLER RESET | 001115 | FF03-J | ,E | ,F | F02 | |
| C128 | OP PNL B | REF | 011115 | FF03-N | ,K | ,L | F02 | |
| C129 | OP PNL B | HOLD | 021115 | FF03-T | ,P | ,R | F02 | |
| C130 | OP PNL B | GO | 031115 | FF03-X | ,U | ,V | F02 | |
| C131 | OP PNL B | ACCEL RPM/MIN | 041115 | FF03-BB | ,Y | ,Z | F02 | |
| C132 | OP PNL B | LOAD RATE MW/MIN | 051115 | FF03-FF | ,CC | ,DD | F02 | |
| C133 | OP PNL B | OPER AUTO | 061115 | FF03-LL | ,HH | ,JJ | F02 | |
| C134 | OP PNL B | COMPTR DATA LINK | 071115 | FF04-J | ,E | ,F | F15 | 01 |
| C135 | OP PNL B | AUTO SYNC | 081115 | FF04-N | ,K | ,L | F15 | |
| C136 | OP PNL B | ADS | 091115 | FF04-T | ,P | ,R | F15 | |
| C137 | OP PNL B | TURB AUTO START | 101115 | FF04-X | ,U | ,V | F15 | 04 |
| C138 | OP PNL B | TURB SUPERV OFF | 111115 | FF04-BB | ,Y | ,Z | F15 | 04 |
| C139 | OP PNL B | LOW LIMIT | 121115 | FF04-FF | ,CC | ,DD | F15 | 10 |
| C140 | OP PNL B | HIGH LIMIT | 131115 | FF04-LL | ,HH | ,JJ | F15 | 10 |
| C141 | OP PNL B | INVALID REQUEST | 001215 | FF05-J | ,F | ,F | F03 | |
| C142 | OP PNL B | VALVE STATUS | 011215 | FF05-N | ,K | ,L | F03 | |
| C143 | OP PNL 3 | TV | 021215 | FF05-X | ,U | ,V | F03 | |
| C144 | OP PNL B | GV | 031215 | FF05-T | ,P | ,R | F03 | |
| C145 | OP PNL B | VALVE TEST | 041215 | FF05-BB | ,Y | ,Z | F03 | |
| C146 | OP PNL B | VVE POS LIM DISP | 051215 | FF05-FF | ,CC | ,DD | F03 | |
| C147 | OP PNL B | SINGLE VALVE | 061215 | FF05-LL | ,HH | ,JJ | F03 | |
| C148 | OP PNL B | 1 | 071215 | FF06-J | ,E | ,F | F14 | |
| C149 | OP PNL B | 2 | 081215 | FF06-N | ,K | ,L | F14 | |
| C150 | OP PNL B | 3 | 091215 | FF06-T | ,P | ,R | F14 | |
| C151 | OP PNL B | 4 | 101215 | FF06-X | ,U | ,V | F14 | |
| C152 | OP PNL B | 5 | 111215 | FF06-BB | ,Y | ,Z | F14 | |
| C153 | OP PNL B | 6 | 121215 | FF06-FF | ,CC | ,DD | F14 | |
| C154 | OP PNL B | 7 | 131215 | FF06-LL | ,HH | ,JJ | F14 | |
| C155 | OP PNL B | 8 | 001315 | FF07-J | ,E | ,F | F04 | |
| C156 | OP PNL B | 9 | 011315 | FF07-N | ,K | ,L | F04 | |
| C157 | OP PNL B | • | 021315 | FF07-T | ,P | ,R | F04 | |
| C158 | OP PNL B | 0 | 031315 | FF07-X | ,U | ,V | F04 | |
| C159 | OP PNL B | CHANGE | 041315 | FF07-BB | ,Y | ,Z | F04 | |
| C160 | OP PNL B | CANCEL | 051315 | FF07-FF | ,CC | ,DD | F04 | |
| C161 | OP PNL B | TURB PROG DISPLAY | 061315 | FF07-LL | ,HH | ,JJ | F04 | |
| C162 | OP PNL B | ENTER | 071315 | FF08-J | ,E | ,F | F13 | |
| C163 | OP PNL B | OVSPEED TEST LITE | 081315 | FF08-N | ,K | ,L | F13 | |
| C164 | OP PNL B | MAINT TEST LITE | 091315 | FF08-T | ,P | ,R | F13 | |
| C165 | OP PNL B | OVERRIDE LITE | 101315 | FF08-X | ,U | ,V | F13 | |
| C166 | OP PNL B | SEQ VALVE | 111315 | FF08-BB | ,Y | ,Z | F13 | |
| C167 | OP PNL B | OVRIDE SENSOR HLD | 121315 | FF08-FF | ,CC | ,DD | F13 | |
| C168 | OP PNL B | RET SENSOR TO SCAN | 131315 | FF08-LL | ,HH | ,JJ | F13 | |

DEH DIGITAL CONTROL SYSTEM PROJ 00935
CONTACT OUTPUT TERM ASSIGN REV 7 6-30-71

| COMP ADDR NO | DWG 807C610-398D528 807C559-398D442 DESCRIPTION | B W S / I O EC / T R TH | CAB HS CONN | NO | TERM NC | COM | CARD LOC | OPT |
|---|---|---|---|---|---|---|---|---|
| C169 | TV1 TEST | 001415 | DIR | -X8 | ,X5 | ,X6 | F05 | |
| C170 | TV2 TEST | 011415 | DIR | -X12 | ,X9 | ,X10 | F05 | |
| C171 | TV3 TEST | 021415 | DIR | -X16 | ,X13 | ,X14 | F05 | |
| C172 | TV4 TEST | 031415 | DIR | -X23 | ,X20 | ,X21 | F05 | |
| C173 | GV1 TEST | 041415 | DIR | -X27 | ,X24 | ,X25 | F05 | |
| C174 | GV2 TEST | 051415 | DIR | -X31 | ,X28 | ,X29 | F05 | |
| C175 | GV3 TEST | 061415 | DIR | -X35 | ,X32 | ,X33 | F05 | |
| C176 | GV4 TEST | 071415 | DIR | -X8 | ,X5 | ,X6 | F12 | |
| C177 | GV5 TEST | 081415 | DIR | -X12 | ,X9 | ,X10 | F12 | |
| C178 | GV6 TEST | 091415 | DIR | -X16 | ,X13 | ,X14 | F12 | |
| C179 | GV7 TEST | 101415 | DIR | -X23 | ,X20 | ,X21 | F12 | |
| C180 | GV8 TEST | 111415 | DIR | -X27 | ,X24 | ,X25 | F12 | |
| C181 | SPARE | 121415 | DIR | -X31 | ,X28 | ,X29 | F12 | |
| C182 | SPARE | 131415 | DIR | -X35 | ,X32 | ,X33 | F12 | |
| C183 | OP PNL DISPLAY UNITS 1 | 001515 | FF09 | - | ,A | | F06 | |
| C184 | OP PNL DISPLAY UNITS 2 | 011515 | FF09 | - | ,B | | F06 | |
| C185 | OP PNL DISPLAY UNITS 4 | 021515 | FF09 | - | ,C | | F06 | |
| C186 | OP PNL DISPLAY UNITS 8 | 031515 | FF09 | - | ,D | | F06 | |
| C187 | OP PNL DISPLAY TENS 1 | 041515 | FF09 | - | ,E | | F06 | |
| C188 | OP PNL DISPLAY TENS 2 | 051515 | FF09 | - | ,F | | F06 | |
| C189 | OP PNL DISPLAY TENS 4 | 061515 | FF09 | - | ,H | ,J | F06 | |
| C190 | OP PNL DISPLAY TENS 8 | 071515 | FF09 | - | ,K | | F11 | |
| C191 | OP PNL DISPLAY HUND 1 | 081515 | FF09 | - | ,L | | F11 | |
| C192 | OP PNL DISPLAY HUND 2 | 091515 | FF09 | - | ,M | | F11 | |
| C193 | OP PNL DISPLAY HUND 4 | 101515 | FF09 | - | ,N | | F11 | |
| C194 | OP PNL DISPLAY HUND 8 | 111515 | FF09 | - | ,P | ,U | F11 | |
| C195 | OP PNL DISPLAY REF GATE | 121515 | FF09 | - | ,R | | F11 | |
| C196 | OP PNL DISPLAY REF CLEAR | 131515 | FF09 | - | ,S | ,T | F11 | |
| C197 | OP PNL DISPLAY THOU 1 | 001615 | FF09 | - | ,V | | F07 | |
| C198 | OP PNL DISPLAY THOU 2 | 011615 | FF09 | - | ,W | | F07 | |
| C199 | OP PNL DISPLAY THOU 4 | 021615 | FF09 | - | ,X | | F07 | |
| C200 | OP PNL DISPLAY THOU 8 | 031615 | FF09 | - | ,Y | | F07 | |
| C201 | OP PNL DISPLAY TTHO 1 | 041615 | FF09 | - | ,Z | | F07 | |
| C202 | OP PNL DISPLAY TTHO 2 | 051615 | FF09 | - | ,AA | | F07 | |
| C203 | OP PNL DISPLAY TTHO 4 | 061615 | FF09 | - | ,BB | ,CC | F07 | |
| C204 | OP PNL DISPLAY TTHO 8 | 071615 | FF09 | - | ,DD | | F10 | |
| C205 | OP PNL DISP REF DEC PT UNITS | 081615 | FF09 | - | ,EE | | F10 | |
| C206 | OP PNL DISP REF DEC PT TENS | 091615 | FF09 | - | ,FF | | F10 | |
| C207 | OP PNL DISP REF DEC PT HUND | 101615 | FF09 | - | ,HH | | F10 | |
| C208 | OP PNL DISP REF DEC PT THOU | 111615 | FF09 | - | ,JJ | ,LL | F10 | |
| C209 | OP PNL DISP REF MINUS SIGN | 121615 | FF09 | - | ,KK | | F10 | |
| C210 | SPARE | 131615 | | - | , | , | F10 | |
| C211 | TA PNL BRG METAL T/C MONITOR | 001715 | FF10 | -J | ,E | ,F | | |
| C212 | TA PNL GEN T/C MONITOR | 011715 | FF10 | -N | ,K | ,L | | |
| C213 | TA PNL DIFF EXP EQUIP MONITOR | 021715 | FF10 | -T | ,P | ,R | | |
| C214 | SPARE | 031715 | FF10 | -X | ,U | ,V | F08 | |
| C215 | SPARE | 041715 | FF10 | -BB | ,Y | ,Z | F08 | |
| C216 | SPARE | 051715 | FF10 | -FF | ,CC | ,DD | F08 | |
| C217 | SPARE | 061715 | FF10 | -LL | ,HH | ,JJ | F08 | |
| C218 | SPARE | 071715 | FF11 | -J | ,E | ,F | F09 | |
| C219 | SPARE | 081715 | FF11 | -N | ,K | ,L | F09 | |
| C220 | SPARE | 091715 | FF11 | -T | ,P | ,R | F09 | |
| C221 | SPARE | 101715 | FF11 | -X | ,U | ,V | F09 | |
| C222 | SPARE | 111715 | FF11 | -BB | ,Y | ,Z | F09 | |
| C223 | SPARE | 121715 | FF11 | -FF | ,CC | ,DD | F09 | |
| C224 | SPARE | 131715 | FF11 | -LL | ,HH | ,JJ | F09 | |

NOTES---
1 TO AUTO SYN
2 DEH STATUS
3 TO BLR OR ADS
4 PUM STATUS
5 PUM TO BLR

LAMPS ON OP PNL REQUIRING CONTACTS OTHER THAN CCO

| | | |
|---|---|---|
| OP PNL A | TURBINE TRIP | FROM MAN BACK UP PNL |
| OP PNL A | OPC SPEED CH MONIOR | FROM MAN BACK UP PNL |
| OP PNL A | MW TRANSDUCER MONITOR | FROM MAN BACK UP PNL |

```
                    DEH DIGITAL CONTROL SYSTEM  PROJ 00935
                  CONTACT OUTPUT TERM ASSIGN REV 7 6-30-71
COMP       DWG 807C610-398D528                B W S  CAB
ADDR           807C559-398D442                I O EC HS       TERM      CARD
NO         DESCRIPTION                        T R TH CONN NO  NC   COM LOC  OPT

OP PNL A   OPC PRESS XCER MONITOR                FROM MAN BACK UP PNL
OP PNL A   OPC MONITOR                           FROM MAN BACK UP PNL
OP PNL A   CONTROLLER OFF                        FROM DEAD COMPTR AUX RELAY
OP PNL A   THROTTLE PRESS MONITOR                FROM MAN BACK UP PNL
OP PNL A   RUNBACK                               FROM MAN BACK UP PNL
OP PNL A   EMERG PWR SUPPLY                      FROM MAN BACK UP PNL
OP PNL B   GV LOWER                              FROM MAN BACK UP PNL
OP PNL B   GV RAISE                              FROM MAN BACK UP PNL
OP PNL B   FAST ACTION                           FROM MAN BACK UP PNL
OP PNL B   CLOSE                                 FROM MAN BACK UP PNL
OP PNL B   OPEN                                  FROM MAN BACK UP PNL
OP PNL B   VALUE POS LIMIT LOWER                 FROM PB CONTACT
OP PNL B   VALUE POS LIMIT RAISE                 FROM PB CONTACT
OP PNL B   TV RAISE                              FROM MAN BACK UP PNL
OP PNL B   TV LOWER                              FROM MAN BACK UP PNL
OP PNL B   TPC IN/OUT                            FROM MAN BACK UP PNL
OP PNL B   TURB MAN                              FROM MAN BACK UP PNL

      OPTIONS

01 DATA LINK-POWER PLANT COMPUTER
   COMPUTER DATA LINK LESS THAN 50 FT
   COMPUTER DATA LINK GREATER THAN 50 FT
02 DATA LINK ADS
03 DATA LINK ASME TEST
04 AUTO TURB ACCELERATION
05 SELECTRIC 735 LOGGING T/W
06 FREQUENCY BIAS A/O
07 LOAD REF A/O
08 REMOTE VALVE POSITION LIMIT SETPOINT
09 OPERATOR PB SETTING OF THROTTLE PRESSURE LIMITER
10 OPERATOR SET H/L LIMIT
11 DIGITAL SPEED INDICATOR
12 DUPLICATE OPERATOR'S PNL
13 DUAL CHANNEL SYSTEM
14 TELETYPE AUTOMATIC SEND AND RECEIVE T/W (ASR)
15 SEQUENCE OF EVENTS
16 STATIC INVERTER
  ASSIGN CC,MR66
  EOJ
$$JOB OFF AT 00  22  14

  JOB G7003,05 AI SCOTT
$$JOB ON  AT 00  22  15

 ** JOB RUN ON NO.1  4/5/72  4/12**
 **                             $*
  ASSIGN CC,DC90,380,380
  ASSIGN CC,DC90,1CAA,1CC4 ***291 PROGRAM***
  ASSIGN BI,DC90,1CB1,1CC4
  ASSIGN LI,DC90,200,2DF
  LINK
 /LD
 /LB
 /XE
                    DEH DIGITAL CONTROL SYSTEM  PROJ 00935
                SERVO INPUT-OUTPUT TERM ASSIGN REV 7 6-30-71
INPUT      DWG 807C559-398422                 C                    CARD
OUTPUT                                        A H     TERM         LOC  OPT
NO         DESCRIPTION                        B S  SIG RET SH      SLOT

H01   GV1 SERVO 1 OUTPUT                      0174 N01 N02 N03
H02   GV1 SERVO 2 OUTPUT                      0174 N04 N05 N06
H03   GV1 LVDT SEC 1 INPUT                    0174 N07 N08 N09
H04   GV1 LVDT 2 INPUT                        0174 N10 N11 N12
H05   GV1 LVDT PRI OUTPUT                     0174 N13 N14 N15


H06   GV3 SERVO 1 OUTPUT                      0174 M01 M02 M03
H07   GV3 SERVO 2 OUTPUT                      0174 M04 M05 M06
H08   GV3 LVDT SEC 1 INPUT                    0174 M07 M08 M09
```

DEH DIGITAL CONTROL SYSTEM PROJ 00935
SERVO INPUT-OUTPUT TERM ASSIGN REV 7 6-30-71

| INPUT OUTPUT NO | DWG 807C559-398422 DESCRIPTION | C A B | H S | TERM SIG | RET | SH | CARD LOC SLOT | OPT |
|---|---|---|---|---|---|---|---|---|
| H09 | GV3 LVDT SEC 2 INPUT | 0174 | | M10 | M11 | M12 | | |
| H10 | GV3 LVDT PRI OUTPUT | 0174 | | M13 | M14 | M15 | | |
| H11 | GV5 SERVO 1 OUTPUT | 0174 | | K01 | K02 | K03 | | |
| H12 | GV5 SERVO 2 OUTPUT | 0174 | | K04 | K05 | K06 | | |
| H13 | GV5 LVDT SEC 1 INPUT | 0174 | | K07 | K08 | K09 | | |
| H14 | GV5 LVDT SEC 2 INPUT | 0174 | | K10 | K11 | K12 | | |
| H15 | GV5 LVDT PRI OUTPUT | 0174 | | K13 | K14 | K15 | | |
| H16 | GV7 SERVO 1 OUTPUT | 0174 | | J01 | J02 | J03 | | |
| H17 | GV7 SERVO 2 OUTPUT | 0174 | | J04 | J05 | J06 | | |
| H18 | GV7 LVDT PRI OUTPUT | 0174 | | J07 | J08 | J09 | | |
| H19 | GV7 LVDT SEC 1 INPUT | 0174 | | J10 | J11 | J12 | | |
| H20 | GV7 LVDT SEC 2 UNPUT | 0174 | | J13 | J14 | J15 | | |
| H21 | TV1 SERVO 1 OUTPUT | 0175 | | J16 | J15 | J14 | | |
| H22 | TV1 SERVO 2 OUTPUT | 0175 | | J13 | J12 | J11 | | |
| H23 | TV1 LVDT SEC 1 INPUT | 0175 | | J10 | J09 | J08 | | |
| H24 | TV1 LVDT SEC 2 INPUT | 0175 | | J07 | J06 | J05 | | |
| H25 | TV1 LVDT PRI OUTPUT | 0175 | | J04 | J03 | J02 | | |
| H26 | TV3 SERVO 1 OUTPUT | 0175 | | K16 | K15 | K14 | | |
| H27 | TV3 SERVO 2 OUTPUT | 0175 | | K13 | K12 | K11 | | |
| H28 | TV3 LVDT SEC 1 INPUT | 0175 | | K10 | K09 | K08 | | |
| H29 | TV3 LVDT SEC 2 INPUT | 0175 | | K07 | K06 | K05 | | |
| H30 | TV3 LVDT PRI OUTPUT | 0175 | | K04 | K03 | K02 | | |
| H31 | TV2 SERVO 1 OUTPUT | 0175 | | M16 | M15 | M14 | | |
| H32 | TV2 SERVO 2 OUTPUT | 0175 | | M13 | M12 | M11 | | |
| H33 | TV2 LVDT SEC 1 INPUT | 0175 | | M10 | M09 | M08 | | |
| H34 | TV2 LVDT SEC 2 INPUT | 0175 | | M07 | M06 | M05 | | |
| H35 | TV2 LVDT PRI OUTPUT | 0175 | | M04 | M03 | M02 | | |
| H36 | TV4 SERVO 1 OUTPUT | 0175 | | N16 | N15 | N14 | | |
| H37 | TV4 SERVO 2 OUTPUT | 0175 | | N13 | N12 | N11 | | |
| H38 | TV4 LVDT SEC 1 INPUT | 0175 | | N10 | N09 | N08 | | |
| H39 | TV4 LVDT SEC 2 INPUT | 0175 | | N07 | N06 | N05 | | |
| H40 | TV4 LVDT PRI OUTPUT | 0175 | | N04 | N03 | N02 | | |
| H41 | GV2 SERVO 1 OUTPUT | 0176 | | N01 | N02 | N03 | | |
| H42 | GV2 SERVO 2 OUTPUT | 0176 | | N04 | N05 | N06 | | |
| H43 | GV2 LVDT SEC 1 INPUT | 0176 | | N07 | N08 | N09 | | |
| H44 | GV2 LVDT SEC 2 INPUT | 0176 | | N10 | N11 | N12 | | |
| H45 | GV2 LVDT PRI OUTPUT | 0176 | | N13 | N14 | N15 | | |
| H46 | GV4 SERVO 1 OUTPUT | 0176 | | M01 | M02 | M03 | | |
| H47 | GV4 SERVO 2 OUTPUT | 0176 | | M04 | M05 | M06 | | |
| H48 | GV4 LVDT SEC 1 INPUT | 0176 | | M07 | M08 | M09 | | |
| H49 | GV4 LVDT SEC 2 INPUT | 0176 | | M10 | M11 | M12 | | |
| H50 | GV4 LVDT PRI OUTPUT | 0176 | | M13 | M14 | M15 | | |
| H51 | GV6 SERVO 1 OUTPUT | 0176 | | K01 | K02 | K03 | | |
| H52 | GV6 SERVO 2 OUTPUT | 0176 | | K04 | K05 | K06 | | |
| H53 | GV6 LVDT SEC 1 INPUT | 0176 | | K07 | K08 | K09 | | |
| H54 | GV6LVDT SEC 2 INPUT | 0176 | | K10 | K11 | K12 | | |
| H55 | GV6 LVDT PRI OUTPUT | 0176 | | K13 | K14 | K15 | | |
| H56 | GV8 SERVO 1 OUTPUT | 0176 | | J01 | J02 | J03 | | |
| H57 | GV8 SERVO 2 OUTPUT | 0176 | | J04 | J05 | J06 | | |
| H58 | GV8 LVDT SEC 1 INPUT | 0176 | | J07 | J08 | J09 | | |
| H59 | GV8 LVDT SEC 2 INPUT | 0176 | | J10 | J11 | J12 | | |
| H60 | GV8 LVDT PRI OUTPUT | 0176 | | J13 | J14 | J15 | | |

```
                 DEH DIGITAL CONTROL SYSTEM  PROJ 00935
            SERVO INPUT-OUTPUT TERM ASSIGN REV 7 6-30-71
INPUT     DWG 807C559-398422                 C              CARD
OUTPUT                                       A H    TERM    LOC  OPT
NO        DESCRIPTION                        B S  SIG RET SH  SLOT

     OPTIONS

01 DATA LINK-POWER PLANT COMPUTER
   COMPUTER DATA LINK LESS THAN 50 FT
   COMPUTER DATA LINK GREATER THAN 50 FT
02 DATA LINK ADS
03 DATA LINK ASME TEST
04 AUTO TURB ACCELERATION
05 SELECTRIC 735 LOGGING T/W
06 FREQUENCY BIAS A/O
07 LOAD REF A/O
08 REMOTE VALVE POSITION LIMIT SETPOINT
09 OPERATOR PB SETTING OF THROTTLE PRESSURE LIMITER
10 OPERATOR SET H/L LIMIT
11 DIGITAL SPEED INDICATOR
12 DUPLICATE OPERATOR'S PNL
13 DUAL CHANNEL SYSTEM
14 TELETYPE AUTOMATIC SEND AND RECEIVE T/W (ASR)
15 SEQUENCE OF EVENTS
16 STATIC INVERTER
  ASSIGN CC,MR66
  EOJ
$$JOB OFF AT 00  23  13
  JOB G7003,05 AI SCOTT
$$JOB ON  AT 00  23  14

 ** JOB RUN ON NO.1  4/5/72  4/12**
 **                          $*
  ASSIGN CC,DC90,380,380
  ASSIGN CC,DC90,1CAA,1CC4 ***291 PROGRAM***
  ASSIGN BI,DC90,1CB1,1CC4
  ASSIGN LI,DC90,200,2DF
  LINK
 /LD
 /LB
 /XE
                 DEH DIGITAL CONTROL SYSTEM  PROJ 00935
            MISCEL INPUT-OUTPUT TERM ASSIGN REV 7 6-30-71
INPUT     DWG 807C610-398D528          C      TERM
OUTPUT        807C559-398D422          A H   SIG RET SH OR
NO        DESCRIPTION                  B S   NO  ARM NC            OPT


M01   SPARE                            0178  K01,K02
M02   SPARE                            0178  K03,K04
M03 O TM STATUS                        0178  K05,K06,K07
M04 O TPC IN SERVICE                   0178  K08,K09,K10
M05 O TPC IS LIMITING                  0178  K11,K12,K13
M06 O OPC OPERATING                    0178  K14,K15,K16
M07 O CIV OPERATING                    0178  J01,J02,J03
M08 O MW XD MONITOR                    0178  J05,J06,J07
M09 O OPC PRESS XD MONITOR             0178  J08,J09,J10
M10 O OPC SPEED CH MONITOR             0178  J11,J12,J13
M11 O THROTTLE PRESS XD MONITOR        0178  J14,J15,J16
M12 I OPC SOL VLV 1                    0178  N01,N02
M13 I OPC SOL VLV 2                    0178  N03,N04
M14 O CIV 1                            0178  N05,N06
M15 O CIV 2                            0178  N07,N08
M16 O CIV 3                            0178  N09,N10
M17 O CIV 4                            0178  N11,N12
M18 O CIV 5                            0178  N13,N14
M19 O CIV 6                            0178  N15,N16
M20 I OPC SPEED PU                     0178  M02,M03,M04
M21 I CONTROLLER SPEED PU              0178  M06,M05
M22   SPARE                            0178  M07,M08
M23   SPARE                            0178  M09,M10
M24 O RUNBACK OPERATING                0178  M11,M12,M13
M26 O TM STATUS                        0178  M14,M15,M16
```

```
                    DEH DIGITAL CONTROL SYSTEM  PROJ 00935
              MISCEL INPUT-OUTPUT TERM ASSIGN REV 7 6-30-71
INPUT     DWG 807C610-398D528            C      TERM
OUTPUT        807C559-398D422            A H    SIG RET SH OR
NO         DESCRIPTION                   B S    NO  ARM NC              OPT

M27 I THROTTLE PRESS                     0177   J16,J15,J14
M28 I MW                                 0177   J13,J12,J11
M29 I OPC PRESS                          0177   J10,J09,J08
M30   SPARE                              0177   J07,J06,J05
M31   SPARE                              0177   J04,J03
M32   SPARE                              0177   J02,J01
M33 O DC PWR SUPPLY MONITOR ALARM        0177   K15,K14,K13
M34 O BUS TRIP ALARM                     0177   K11,K10,K09
M35 O DC BUS TRIP                        0177   K07,K06,K05
M36   SPARE                              0177   K04,K03
M37   SPARE                              0177   K02,K01
M38   SPARE                              0177   M16,M15,M14
M39   SPARE                              0177   M13,M12,M11
M40   SPARE                              0177   M10,M09,M08
M41   SPARE                              0177   M07,M06,M05
M42   SPARE                              0177   M04,M03
M43   SPARE                              0177   M02,M01
M44   SPARE                              0177   N16,N15,N14
M45   SPARE                              0177   N13,N12,N11
M46   SPARE                              0177   N10,N09
M47 I RUNBACK                            0177   N08,N07
M48 I ASL                                0177   N06,N05
M49 I CIV INHIBIT                        0177   N04,N03
M50 I MAIN GEN BKR CLOSED                0177   N02,N01
      OPTIONS
01 DATA LINK-POWER PLANT COMPUTER
   COMPUTER DATA LINK LESS THAN 50 FT
   COMPUTER DATA LINK GREATER THAN 50 FT
02 DATA LINK ADS
03 DATA LINK ASME TEST
04 AUTO TURB ACCELERATION
05 SELECTRIC 735 LOGGING T/W
06 FREQUENCY BIAS A/O
07 LOAD REF A/O
08 REMOTE VALVE POSITION LIMIT SETPOINT
09 OPERATOR PB SETTING OF THROTTLE PRESSURE LIMITER
10 OPERATOR SET H/L LIMIT
11 DIGITAL SPEED INDICATOR
12 DUPLICATE OPERATOR'S PNL
13 DUAL CHANNEL SYSTEM
14 TELETYPE AUTOMATIC SEND AND RECEIVE T/W (ASR)
15 SEQUENCE OF EVENTS
16 STATIC INVERTER
  ASSIGN CC,MR66
  EOJ
**JOB OFF AT 00  24  00
```

APPENDIX 6

COMPUTER PROGRAM LISTING

The following computer program listing was compiled from a FORTRAN program and represents instructional information used in the DEH system in the digital computer to provide steam turbine operation including automtic startup, speed and load control, data monitoring, operator interface, etc. The listing represents an operative program system which substantially conforms to the system description presented elsewhere herein.

```
0000      0000                          DAT    X'0000'
0001      0AFF   08 2 FF                LDB    $+X'FFFF'
0002      1200   10 2 00                LDC    $+X'0000'
0003      0610   00 C 10                INC    ISICOUNT,C
0004      EDE4   E8 5 E4                SST    *MSIN,B
0005      0001                          ADL    N15
0006      71DF   70 1 DF                JMP    *X'FFDF'
0007      EDE7   E8 5 E7                SST    *LXIT,B
                                         LPL
0008      7200   70 2 00                JMP    $+X'0000'
0009      0000                          DAT    X'0000'
000A      0010                          ADL    X'0010'
PROGRAM SIZE: 0010     DATA POOL SIZE: 0002     ERROR COUNT:  0000
0000      0000                          DAT    X'0000'
0001      0AFF   0B 2 FF                LDB    $+X'FFFF'
0002      EF00   E8 7 00                BST    *MSCCO ,B
0003      0004                          ADL    N1
0004      0001                          ADL    IPAT
0005      0002                          ADL    IREGAD
```

```
0006    0003                      ADL   MASKAU
0007    71DF    70 1 DF           JMP   *X'FFDF'
0008    EDE7    E8 5 E7           BST   *EXIT,B

                                  LPL
0009    7200    70 2 00           JMP   $+X'0000'
000A    0000                      DAT   X'0000'
0000    0011                      ADL   X'0011'
PROGRAM SIZE: 0017     DATA POOL SIZE: 0005     ERROR COUNT: 0000
0000    0000                      DAT   X'0000'
0001    0AFF    08 2 FF           LDB   $+X'FFFF'
0002    1200    10 2 00           LDC   $+X'0000'
0003    6E30    60 6 30           DCR   DCNT,C
0004    2E30    28 6 30           LDA   DCNT,C
0005    F201    F0 2 01           ZJP   $+X'0001'
0006    B200    B0 2 00           PJP   $+X'0000'
0007    7502    70 5 02           JMP   *)1000 ,B
0008    1206    10 2 06           LDC   $+X'0006'
0009    662F    60 6 2F           INC   M ,C
000A    2E2F    28 6 2F           LDA   M ,C
000B    4200    40 2 00           ADD   *X'FFFF'
000C    AC03    A8 4 03           STA   *AIA,B
000D    2D03    28 5 03           LDA   *AIA,B
000E    AC01    A8 4 01           STA   TEMP,B
000F    2C01    28 4 01           LDA   TEMP,B
0010    8810    88 0 10           IOA   X'0010'
0011    7504    70 5 04           JMP   *)500,B
0006+B  FFFF              )1000
0012    2C05    28 4 05           LDA   *X'FFFF' ,B
0013    120B    10 2 0B           LDC   $+X'000B'
0014    AE31    A8 6 31           STA   DEND,C
0015    71DF    70 1 DF   )500    JMP   *X'FFDF'
0016    EDE7    E8 5 E7           BST   *EXIT,B

                                  LPL
0017    7200    70 2 00           JMP   $+X'0000'
0018    0000                      DAT   X'0000'
0019    FFFF                      DAT   X'FFFF'
0000    0020                      ADL   X'0020'
PROGRAM SIZE: 0032     DATA POOL SIZE: 0006     ERROR COUNT: 0000

0000    0000                      ADL   SAT:
0001    0000                      DAT   X'0000'
0002    1800    18 0 00           LDG   X'0000'
0003    73FD    70 3 FD           JMP   *$+X'FFFD'
0004    0007                      DAT   X'0007'
0005    3804    38 0 04           STZ   X'0004'
0006    3805    38 0 05           STZ   X'0005'
0007    C506    C0 5 05           ADA   *TR,B
0008    EDEC    E8 5 EC           BST   *H11:,B
000A+B  4200
000B+B  0000
0009    000A                      ADL   *X'4200'
000A    AC0D    A8 4 0D           STA   *ARA,B
000B    A40C    A0 4 0C           STE   *ARA,B
000C    3804    38 0 04           STZ   X'0004'
000D    3805    38 0 05           STZ   X'0005'
000E    C502    C0 5 02           ADA   *ERR ,B
000F    EDEA    E8 5 EA           BST   *A11:,B
0010    0003                      ADL   ERRX
0011    EDED    E8 5 ED           SST   *D11:,B
0012    000C                      ADL   *ARA
0013    EDEA    E8 5 EA           BST   *A11:,B
0014    0008                      ADL   RES
0015    1C08    18 4 08           LDG   RES ,B
0016    A103    A0 1 03           STE   *X'0003'
0017    6003    60 0 03           INC   X'0003'
0018    A903    A8 1 03           STA   *X'0003'
0019    3804    38 0 04           STZ   X'0004'
001A    3805    38 0 05           STZ   X'0005'
001B    C502    C0 5 02           ADA   *ERR ,B
001C    1C03    18 4 03           LDG   ERRX,B
001D    A103    A0 1 03           STE   *X'0003'
001E    6003    60 0 03           INC   X'0003'
001F    A903    A8 1 03           STA   *X'0003'
```

```
0020   3804   38 0 04         STZ   X'0004'
0021   3805   38 0 05         STZ   X'0005'
0022   C508   C0 5 08         ADA   *RES ,B
0023   EDEB   E8 5 EB         BST   *B11;,B
0024   8007                   ADL   XLL
0025   BA00   B8 2 00         NJP   $+X'0000'
0026   750E   70 5 0E         JMP   *)10 ,B
0027   3804   38 0 04         STZ   X'0004'
0028   3805   38 0 05         STZ   X'0005'
0029   C507   C0 5 07         ADA   *XLL ,B
002A   1C08   18 4 08         LDG   RES ,B
002B   A103   A0 1 03         STE   *X'0003'
002C   6003   60 0 03         INC   X'0003'
002D   A903   A8 1 03         STA   *X'0003'
002E   750F   70 5 0F         JMP   *)20 ,B
002F   3804   38 0 04   )10   STZ   X'0004'
0030   3805   38 0 05         STZ   X'0005'
0031   C508   C0 5 08         ADA   *RES ,B
0032   EDEB   E8 5 EB         BST   *B11;,B
0033   8006                   ADL   HL
0034   B200   B0 2 00         PJP   $+X'0000'
0035   750F   70 5 0F         JMP   *)20 ,B
0036   3804   38 0 04         STZ   X'0004'
0037   3805   38 0 05         STZ   X'0005'
0038   C506   C0 5 06         ADA   *HL,B
0039   1C08   18 4 08         LDG   RES ,B
003A   A103   A0 1 03         STE   *X'0003'
003B   6003   60 0 03         INC   X'0003'
003C   A903   A8 1 03         STA   *X'0003'
003D   3804   38 0 04   )20   STZ   X'0004'
003E   3805   38 0 05         STZ   X'0005'
003F   C502   C0 5 02         ADA   *ERR ,B
0040   EDEC   E8 5 EC         BST   *H11;,B
0041   8004                   ADL   B
0042   EDEA   E8 5 EA         BST   *A11;,B
0043   8008                   ADL   RES
0044   1C09   18 4 09         LDG   PRES,B
0045   A103   A0 1 03         STE   *X'0003'
0046   6003   60 0 03         INC   X'0003'
0047   A903   A8 1 03         STA   *X'0003'
0048   EDEB   E8 5 EB         BST   *B11;,B
0049   8007                   ADL   XLL
004A   BA00   B8 2 00         NJP   $+X'0000'
004B   7510   70 5 10         JMP   *)30 ,B
004C   3804   38 0 04         STZ   X'0004'
004D   3805   38 0 05         STZ   X'0005'
004E   C507   C0 5 07         ADA   *XLL ,B
004F   1C09   18 4 09         LDG   PRES,B
0050   A103   A0 1 03         STE   *X'0003'
0051   6003   60 0 03         INC   X'0003'
0052   A903   A8 1 03         STA   *X'0003'
0053   7511   70 5 11         JMP   *)40 ,B
0054   3804   38 0 04   )30   STZ   X'0004'
0055   3805   38 0 05         STZ   X'0005'
0056   C509   C0 5 09         ADA   *PRES,B
0057   EDEB   E8 5 EB         BST   *B11;,B
0058   8006                   ADL   HL
0059   B200   B0 2 00         PJP   $+X'0000'
005A   7511   70 5 11         JMP   *)40 ,B
005B   3804   38 0 04         STZ   X'0004'
005C   3805   38 0 05         STZ   X'0005'
005D   C506   C0 5 06         ADA   *HL,B
005E   1C09   18 4 09         LDG   PRES,B
005F   A103   A0 1 03         STE   *X'0003'
0060   6003   60 0 03         INC   X'0003'
0061   A903   A8 1 03         STA   *X'0003'
0062   0C01   08 4 01   )40   LDB   X'0001' ,B
0063   E401   E0 4 01         EST   X'0001' ,B
0001   806A                   ADL   X'006A'
PROGRAM SIZE: 0106     DATA POOL: SIZE: 0016     ERROR COUNT: 0000
0000   0000                   DAT   X'0000'
0001   0AFF   08 2 FF         LDB   $+X'FFFF'
0002   1200   10 2 00   )5    LDC   $+X'0000'
0003   2E13   28 6 13         LDA   ICCO; ,C
```

```
ØØØ4     B2ØØ   B8 2 ØØ            PJP   $+X'ØØØØ'
ØØØ5     75ØF   7Ø 5 ØF            JMP   *)1ØØØ ,B
ØØØ6     12Ø4   1Ø 2 Ø4            LDC   $+X'ØØØ4'
ØØØ7     2E14   28 6 14            LDA   ICCO2 ,C
ØØØ8     4E13   48 6 13            SUB   ICCO1 ,C
ØØØ9     B2ØØ   B8 2 ØØ            PJP   $+X'ØØØØ'
ØØØA     75ØF   7Ø 5 ØF            JMP   *)1ØØØ ,B
ØØØB     12Ø5   1Ø 2 Ø5            LDC   $+X'ØØØ5'
ØØØC     2E12   28 6 12            LDA   ITF ,C
ØØØD     6ØØ5   6Ø Ø Ø5            INC   K'ØØØ5'
ØØØE     AC1Ø   A8 4 1Ø            STA   J ,B
ØØØF     EFØØ   E8 7 ØØ            SST   *GOTS,B
ØØ1Ø     ØØØ3                      DAT   K'ØØØ3'
ØØ11     ØØØØ                      ADL   )1ØØ
ØØ12     ØØØØ                      ADL   )2ØØ
ØØ13     ØØ1Ø                      ADL   J
ØØ14     75ØF   7Ø 5 ØF   )5Ø      JMP   *)1ØØØ ,B
ØØ15     3C11   38 4 11   )1ØØ     STZ   NPAT,B
ØØ16     7512   7Ø 5 12            JMP   *)3ØØ,B
ØØ13+B   FFFF             )2ØØ
ØØ17     2C13   28 4 13            LDA   =X'FFFF' ,B
ØØ18     AC11   A8 4 11            STA   NPAT,B
ØØ19     12ØE   1Ø 2 ØE   )3ØØ     LDC   $+X'ØØØE'
ØØ1A     2E14   28 6 14            LDA   ICCO2 ,C
ØØ1B     4E13   48 6 13            SUB   ICCO1 ,C
ØØ1C     6ØØ5   6Ø Ø Ø5            INC   K'ØØØ5'
ØØ1D     AC14   A8 4 14            STA   IMAX,B
ØØ16+B   ØØØ1
ØØ1E     2C16   28 4 16            LDA   =K'ØØØ1' ,B
ØØ1F     AC15   A8 4 15            STA   I ,B
ØØ2Ø     2C16   28 4 16            LDA   =X'ØØØ1' ,B
ØØ21     12ØØ   1Ø 2 ØØ            LDC   $+X'ØØØØ'
ØØ22     4E13   48 6 13            SUB   ICCO1 ,C
ØØ23     4C15   48 4 15            SUB   I ,B
ØØ24     5413   5Ø 4 13            EOR   =K'FFFF' ,B
ØØ25     6ØØ5   6Ø Ø Ø5            INC   K'ØØØ5'
ØØ26     AC1Ø   A8 4 1Ø            STA   J ,B
ØØ27     68Ø5   68 Ø Ø5            DCR   K'ØØØ5'
ØØ28     38Ø4   38 Ø Ø4            STZ   K'ØØØ4'
ØØ29     28Ø5   28 Ø Ø5            LDA   K'ØØØ5'
ØØ2A     B2Ø1   B8 2 Ø1            PJP   $+X'ØØØ1'
ØØ2B     68Ø4   68 Ø Ø4            DCR   K'ØØØ4'
ØØ1A+B   ØØØE
ØØ2C     DC1A   D8 4 1A            DIV   =X'ØØØE' ,B
ØØ2D     AC17   A8 4 17            STA   KI ,B
ØØ2E     6ØØ5   6Ø Ø Ø5            INC   K'ØØØ5'
ØØ2F     AC18   A8 4 18            STA   IREG,B
ØØ3Ø     2C17   28 4 17            LDA   K ,B
ØØ31     D41A   DØ 4 1A            MPY   =K'ØØØE' ,B
ØØ32     AC1B   A8 4 1B            STA   #AIA,B
ØØ33     2C1Ø   28 4 1Ø            LDA   J ,B
ØØ34     4C1B   48 4 1B            SUB   #AIA,B
ØØ35     AC1Ø   A8 4 1Ø            STA   J ,B
ØØ36     2C1Ø   28 4 1Ø            LDA   J ,B
ØØ37     42ØØ   4Ø 2 ØØ            ADD   =X'ØØØØ'
ØØ38     AC1C   A8 4 1C            STA   #AIB,B
ØØ39     2D1C   28 5 1C            LDA   *#AIB,B
ØØ3A     AC19   A8 4 19            STA   MASK,B
ØØ3B     EFØØ   E8 7 ØØ            SST   *MICCD ,B
ØØ3C     ØØØ1                      ADL   N1
ØØ3D     ØØ11                      ADL   NPAT
ØØ3E     ØØ18                      ADL   IREG
ØØ3F     ØØ19                      ADL   MASK
ØØ4Ø     6415   6Ø 4 15   )5ØØ     INC   I ,B
ØØ41     2C14   28 4 14            LDA   IMAX,B
ØØ42     4C15   48 4 15            SUB   I ,B
ØØ43     B2DC   BØ 2 DC            PJP   $+X'FFDC'
ØØ44     EDE7   E8 5 E7   )1ØØØ    SST   *EXIT,B
ØØ45     72BC   7Ø 2 BC            JMP   )5

                                   LPL
ØØ46     72ØØ   7Ø 2 ØØ            JMP   $+X'ØØØØ'
ØØ47     ØØØØ                      DAT   K'ØØØØ'
ØØ48     ØØØØ                      DAT   K'ØØØØ'
ØØ49     ØØØØ                      DAT   K'ØØØØ'
ØØ4A     ØØØØ                      DAT   K'ØØØØ'
ØØØØ     ØØ51                      ADL   K'ØØ51'
```

```
PROGRAM SIZE: 0081    DATA POOL SIZE: 0029    ERROR COUNT:  0000

0000      0000                           DAT   X'0000'
0001      0000                           DAT   X'0000'
0002      2801   28 0 01                 LDA   X'0001'
0003      0AFE   08 2 FE                 LDB   $+X'FFFE'
0004      AC01   A8 4 01                 STA   X'0001' ,B
0005+B    0000
0005      2C05   28 4 05                 LDA   *X'0000' ,B
0006      AC02   A8 4 02                 STA    MINUS ,B
0007      1200   10 2 00                 LDC   $+X'0000'
0008      2E15   28 6 15                 LDA   NR,C
0009      2614   20 6 14                 LDE   NR,C
000A      EDEB   E8 5 EB                 BST   *S11:,B
000B      0006                           ADL    NB
000C      AC04   A8 4 04                 STA    TEMP,B
000D      A403   A0 4 03                 STE    TEMP,B
000E      B200   B0 2 00                 PJP   $+X'0000'
0007+B    FFFF
000F      2C07   28 4 07                 LDA   *X'FFFF' ,B
0010      AC02   A8 4 02                 STA    MINUS ,B
0011      EF00   E8 7 00                 BST   *ABS ,B
0012      0003                           ADL    TEMP
0013      AC04   A8 4 04                 STA    TEMP,B
0014      A403   A0 4 03                 STE    TEMP,B
0015      EDEB   E8 5 EB                 BST   *S11:,B
0016      0000                           ADL    SPDB
0017      B200   B0 2 00                 PJP   $+X'0000'
0018      7509   70 5 09                 JMP   *)100,B
0019      2C04   28 4 04                 LDA    TEMP,B
001A      2403   20 4 03                 LDE    TEMP,B
001B      EDEB   E8 5 EB                 BST   *S11:,B
001C      0000                           ADL    SPDB
001D      AC04   A8 4 04                 STA    TEMP,B
001E      A403   A0 4 03                 STE    TEMP,B
001F      750A   70 5 0A                 JMP   *)200,B
0009+B    0000                  )100
000C+B    0000
0020      2C0C   28 4 0C                 LDA   *X'0000' ,B
0021      240B   20 4 0B                 LDE   *X'0000' ,B
0022      AC04   A8 4 04                 STA    TEMP,B
0023      A403   A0 4 03                 STE    TEMP,B
0024      121D   10 2 1D    )200         LDC   $+X'001D'
0025      2E53   28 6 53                 LDA    DR1 ,C
0026      2652   20 6 52                 LDE    DR1 ,C
0027      EDEC   E8 5 EC                 BST   *M11:,B
0028      0003                           ADL    TEMP
0029      1200   10 2 00                 LDC   $+X'0000'
002A      AE21   A8 6 21                 STA    K ,C
002B      A620   A0 6 20                 STE    K ,C
002C      2C02   28 4 02                 LDA    MINUS ,B
002D      F200   F0 2 00                 ZJP   $+X'0000'
002E      1205   10 2 05                 LDC   $+X'0005'
002F      2E21   28 6 21                 LDA    K ,C
0030      2620   20 6 20                 LDE    K ,C
0031      EDF0   E8 5 F0                 BST   *CM1:,B
0032      AE21   A8 6 21                 STA    K ,C
0033      A620   A0 6 20                 STE    K ,C
0034      0C01   08 4 01                 LDB   X'0001' ,B
0035      E401   E0 4 01                 EST   X'0001' ,B

                                         LPL
0036      7200   70 2 00                 JMP   $+X'0000'
0037      0000                           DAT   X'0000'
0038      0000                           DAT   X'0000'
0039      0000                           DAT   X'0000'
0081      0040                           ADL   X'0040'
PROGRAM SIZE: 0064    DATA POOL SIZE: 0013    ERROR COUNT:  0000

0000      0000                           DAT   X'0000'
0001      0AFF   08 2 FF                 LDB   $+X'FFFF'
0002      0080   08 0 80                 IDA   X'FF80'
0003      5C01   58 4 01                 AND   MASK,B
0004      1200   10 2 00                 LDC   $+X'0000'
0005      AE00   A8 6 00                 STA   IPB ,C
```

```
0006    EDE4   E8 6 E4        BST   *MSIN,B
0007    0008                  ADL   N10
0008    71DF   70 1 DF        JMP   *K'FFDF'
0009    EDE7   E8 6 E7        BST   *EXIT,B

                              LPL
000A    7200   70 2 00        JMP   $+K'0000'
000B    0000                  DAT   K'0000'
0000    0012                  ADL   K'0012'

PROGRAM SIZE: 0016      DATA POOL SIZE: 0003      ERROR COUNT:   0000

0000    0000                  DAT   K'0000'
0001    DAFF   D8 2 FF        LDB   $+K'FFFF'
0002    EF00   E8 7 00        BST   *MSCCO ,B
0003    0002                  ADL   N1
0004    0003                  ADL   IPAT
0005    0004                  ADL   IREG
0006    0003                  ADL   IPAT
0007    EDE0   E8 6 E0        BST   *MSTD,B
0008    0002                  ADL   N1
0009    EF07   E8 7 07        BST   *MSCCO ,B
000A    0002                  ADL   N1 .
000B    0001                  ADL   N0
000C    0004                  ADL   IREG
000D    0003                  ADL   IPAT
000E    0002   60 0 02        INC   K'0002'
000F    7102   70 1 02        JMP   *K'0002'
0010    EDE7   E8 5 E7        BST   *EXIT,B

                              LPL
0011    7200   70 2 00        JMP   $+K'0000'
0012    0000                  DAT   K'0000'
0000    0010                  ADL   K'0010'

PROGRAM SIZE: 0025      DATA POOL SIZE: 0005      ERROR COUNT:   0000

0000    0000                  DAT   K'0000'
0001    DAFF   D8 2 FF        LDB   $+K'FFFF'
0002    EF00   E8 7 00        BST   *MSCCO ,B
0003    0007                  ADL   N2
0004    0001                  ADL   IPAT
0005    0003                  ADL   IREGAD
0006    0005                  ADL   MASKAD
0007    71DF   70 1 DF        JMP   *K'FFDF'
0008    EDE7   E8 5 E7        BST   *EXIT,B

                              LPL
0009    7200   70 2 00        JMP   $+K'0000'
000A    0000                  DAT   K'0000'
0000    0011                  ADL   K'0011'

PROGRAM SIZE: 0017      DATA POOL SIZE: 0000      ERROR COUNT:   0000

0000    0000                  ADL   DATS
0001    0000                  DAT   K'0000'
0002    1600   16 0 00        LDG   K'0000'
0003    73FD   70 3 FD        JMP   *$+K'FFFD'
0004    0003                  DAT   K'0003'
0005    2D02   28 5 02        LDA   *LN,B
0006    5503   50 5 03        EOR   *LNK ,B
0001+B  FFFF
0007    5401   50 4 01        EOR   *K'FFFF' ,B
0008    F200   F0 2 00        ZJP   $+K'0000'
0009    7502   70 5 02        JMP   *)1000 ,B
000A    3C03   38 4 03        STZ   IPAT,B
000B    2D02   28 5 02        LDA   *LN,B
000C    F200   F0 2 00        ZJP   $+K'0000'
000D    2C4F   28 4 4F        LDA   M1,B
000E    AC03   A8 4 03        STA   IPAT,B
0005+B  0000
000F    2C05   28 4 05        LDA   *K'0000' ,B
0010    AC00   A8 4 00        STA   T1,B
0011    2D05   28 5 05        LDA   *N ,B
0012    AC04   A8 4 04        STA   I ,B
0013    2C04   28 4 04   360  LDA   I ,B
0014    AC00   A8 4 00        STA   *AIA,B
0015    4200   40 2 00        ADD   *K'0005'
```

```
0016     AC59   A8 4 59              STA    #AIB,B
0017     2D59   28 5 59              LDA    *#AIB,B
0018     AC56   A8 4 56              STA    IREG,B
0019     2C58   28 4 58              LDA    #AIA,B
001A     4200   40 2 00              ADD    =X'0029'
001B     AC5A   A8 4 5A              STA    #AIC,B
001C     2D5A   28 5 5A              LDA    *#AIC,B
001D     AC57   A8 4 57              STA    MASK,B
001E     EF00   E8 7 00              BST    *MICCD ,B
001F     004E                        ADL    N1
0020     0063                        ADL    IPAT
0021     0056                        ADL    IREG
0022     0057                        ADL    MASK
0023     2D05   28 5 05              LDA    *N ,B
005B+B   000B
0024     4C5B   48 4 5B              SUB    =X'000B' ,B
0025     B202   B0 2 02              PJP    $+X'0002'
0026     3805   38 0 05              STZ    X'0005'
0027     F201   F0 2 01              ZJP    $+X'0001'
0028     28A0   28 0 A0              LDA    X'FFFF'
0029     A803   A8 0 03              STA    X'0003'
002A     50A0   50 0 A0              EOR    X'FFFF'
002B     5C50   58 4 50              AND    T1,B
002C     5003   50 0 03              EOR    X'0003'
002D     F200   F0 2 00              ZJP    $+X'0000'
002E     7552   70 5 52              JMP    *)1000 ,B
002F     2D05   28 5 05              LDA    *N ,B
005C+B   0019
0030     445C   40 4 5C              ADD    =X'0019' ,B
0031     AC54   A8 4 54              STA    I ,B
005D+B   FFFF
0032     2C5D   28 4 5D              LDA    =X'FFFF' ,B
0033     AC50   A8 4 50              STA    T1,B
0034     72DE   70 2 DE              JMP    )50
0035     2D02   28 5 02      )1000   LDA    *LN,B
0036     AD03   A8 5 03              STA    *LNX ,B
0037     AD04   A8 5 04              STA    *LNIPB ,B
0038     0C01   08 4 01      )2000   LDB    X'0001' ,B
0039     E401   E0 4 01              EST    X'0001' ,B

                                     LPL
003A     7200   70 2 00              JMP    $+X'0000'
003B     0000                        DAT    X'0000'
003C     0000                        DAT    X'0000'
003D     0000                        DAT    X'0000'
0001     0044                        ADL    X'0044'
PROGRAM SIZE: 0058    DATA POOL SIZE: 0004    ERROR COUNT: 0000

0000     0000                        DAT    X'0000'
0001     0AFF   08 2 FF              LDB    $+X'FFFF'
0020+B   FFFF                )5
0002     2C20   28 4 20              LDA    =X'FFFF' ,B
0003     AC0B   A8 4 0B              STA    PLOT,B
0004     2C09   28 4 09              LDA    N3,B
0005     AC1F   A8 4 1F              STA    IMAX,B
0022+B   0001                )10
0006     2C22   28 4 22              LDA    =X'0001' ,B
0007     AC21   A8 4 21              STA    I ,B
0008     2C0B   28 4 0B              LDA    PLOT,B
0009     F200   F0 2 00              ZJP    $+X'0000'
000A     7523   70 5 23              JMP    *)20 ,B
000B     2C21   28 4 21              LDA    I ,B
000C     4005   40 0 05              ADD    X'0005'
000D     4200   40 2 00              ADD    =X'0018'
000E     AC25   A8 4 25              STA    #AIA,B
000F     3804   38 0 04              STZ    X'0004'
0010     3805   38 0 05              STZ    X'0005'
0011     C525   C0 5 25              ADA    *#AIA,B
0012     EDEF   E8 5 EF              BST    *CI0S,B
0013     AC24   A8 4 24              STA    J ,B
0014     2C0A   28 4 0A              LDA    PASS2 ,B
0015     F200   F0 2 00              ZJP    $+X'0000'
0016     7526   70 5 26              JMP    *)25 ,B
0017     2C24   28 4 24              LDA    J ,B
0027+B   03E8
```

```
0018    4C27    48 4 27            SUB   =X'03E8' ,B
0019    BA00    B8 2 00            NJP    $+X'0000'
001A    7528    70 5 28            JMP   *)700,B
001B    2C21    28 4 21            LDA    I ,B
0029+B  0002
001C    4C29    48 4 29            SUB   =X'0002' ,B
001D    B200    B0 2 00            PJP    $+X'0000'
001E    752A    70 5 2A            JMP   *)3000 ,B
001F    2C21    28 4 21            LDA    I ,B
0020    6805    68 0 05            DCR    X'0005'
0021    AC1F    A8 4 1F            STA    IMAX,B
0022    752B    70 5 2B            JMP   *)2050 ,B
0023    2C21    28 4 21    )20     LDA    I ,B
0024    4005    40 0 05            ADD    X'0005'
0025    4200    40 2 00            ADD   =X'0002'
0026    AC25    A8 4 25            STA    #AIA,B
0027    3804    38 0 04            STZ    X'0004'
0028    3805    38 0 05            STZ    X'0005'
0029    C525    C0 5 25            ADA   *#AIA,B
002A    EDEF    E8 5 EF            BST   *C10:,B
002B    AC24    A8 4 24            STA    J ,B
002C    2C24    28 4 24    )25     LDA    J ,B
002D    3804    38 0 04            STZ    X'0004'
002E    2805    28 0 05            LDA    X'0005'
002F    B201    B0 2 01            PJP    $+X'0001'
0030    6804    68 0 04            DCR    X'0004'
0031    DC27    D8 4 27            DIV   =X'03E8' ,B
0032    AC2C    A8 4 2C            STA    K ,B
0033    D427    D0 4 27            MPY   =X'03E8' ,B
0034    AC25    A8 4 25            STA    #AIA,B
0035    2C24    28 4 24            LDA    J ,B
0036    4C25    48 4 25            SUB    #AIA,B
0037    AC01    A8 4 01            STA    INDEX ,B
0038    EF00    E8 7 00            BST   *GOT:,B
0039    000A                       DAT    X'000A'
003A    0000                       ADL    )100
003B    003A                       ADL    )100
003C    0000                       ADL    )300
003D    003C                       ADL    )300
003E    003B                       ADL    )100
003F    003E                       ADL    )100
0040    0000                       ADL    )700
0041    0040                       ADL    )700
0042    0041                       ADL    )700
0043    002C                       ADL    K
002D+B  270F               )100
0044    2C2D    28 4 2D            LDA   =X'270F' ,B
0045    AC24    A8 4 24            STA    J ,B
0046    2C0B    28 4 0B            LDA    PLOT,B
0047    F200    F0 2 00            ZJP    $+X'0000'
0048    3C24    38 4 24            STZ    J ,B
0049    7528    70 5 28            JMP   *)750,B
004A    2C01    28 4 01    )300    LDA    INDEX ,B
004B    4005    40 0 05            ADD    X'0005'
004C    4200    40 2 00            ADD   =X'FFFE'
004D    AC25    A8 4 25            STA    #AIA,B
004E    3804    38 0 04            STZ    X'0004'
004F    3805    38 0 05            STZ    X'0005'
0050    C525    C0 5 25            ADA   *#AIA,B
0051    EDEF    E8 5 EF            BST   *C10:,B
0052    AC24    A8 4 24            STA    J ,B
0053    752C    70 5 2C            JMP   *)750,B
0054    2C01    28 4 01    )700    LDA    INDEX ,B
0055    4005    40 0 05            ADD    X'0005'
0056    4200    40 2 00            ADD   =X'FFFE'
0057    AC25    A8 4 25            STA    #AIA,B
0058    3804    38 0 04            STZ    X'0004'
0059    3805    38 0 05            STZ    X'0005'
005A    C525    C0 5 25            ADA   *#AIA,B
005B    EDEF    E8 5 EF            BST   *C10:,B
005C    AC24    A8 4 24            STA    J ,B
005D    2C0B    28 4 0B    )750    LDA    PLOT,B
002F+B  FFFF
005E    542F    50 4 2F            EOR   =X'FFFF' ,B
005F    F200    F0 2 00            ZJP    $+X'0000'
```

```
0060     7528   70 5 28              JMP   *)7800,B
0061     2C24   28 4 24              LDA    J ,B
0062     EDEE   E8 5 EE              SST   *C01:,B
0063     AC02   A8 4 02              STA    X ,B
0064     A401   A0 4 01              STE    X ,B
0065     2C21   28 4 21              LDA    I ,B
0066     4005   40 0 05              ADD    X'0005'
0067     AC25   A8 4 25              STA    #AIA,B
0068     4200   40 2 00              ADD   *X'000C'
0069     AC30   A8 4 30              STA    #AIB,B

                                     LPL
006A     7200   70 2 00              JMP    $+X'0000'
006B     0018                        DAT    X'0018'
006C     0002                        DAT    X'0002'
006D     0000                        DAT    X'0000'
006E     FFFE                        DAT    X'FFFE'
006F     FFFE                        DAT    X'FFFE'
0070     000E                        DAT    X'000E'
0071     2C25   28 4 25              LDA    #AIA,B
0072     4200   40 2 00              ADD   *X'0006'
0073     AC31   A8 4 31              STA    #AIC,B
0074     2C02   28 4 02              LDA    X ,B
0075     2401   20 4 01              LDE    X ,B
0076     EDEB   E8 5 EB              SST   *S11:,B
0077     8030                        ADL    #AIB
0078     EDEC   E8 5 EC              SST   *M11:,B
0032+B   4AFF
0033+B   C000
0079     0032                        ADL   *X'4AFF'
007A     EDED   E8 5 ED              SST   *D11:,B
007B     8031                        ADL    #AIC
007C     EDEF   E8 5 EF              SST   *C10:,B
007D     AC24   A8 4 24              STA    J ,B
007E     2C21   28 4 21   )700       LDA    I ,B
007F     4200   40 2 00              ADD   *X'000B'
0080     AC25   A8 4 25              STA    #AIA,B
0081     2C24   28 4 24              LDA    J ,B
0082     AD25   A8 5 25              STA   *#AIA,B
0083     6421   60 4 21   )1000      INC    I ,B
0084     2C1F   28 4 1F              LDA    IMAX,B
0085     4C21   48 4 21              SUB    I ,B
0086     B281   B0 2 81              PJP    $+X'FF81'
0087     2C0B   28 4 0B              LDA    PLOT,B
0088     542F   50 4 2F              EOR   *X'FFFF' ,B
0089     F200   F0 2 00              ZJP    $+X'0000'
008A     752B   70 5 2B              JMP   *)2050 ,B
008B     EF00   E8 7 00              SST   *M3CCD ,B
008C     0009                        ADL    N3
008D     000C                        ADL    IBUF
008E     0003                        ADL    NREG
008F     0006                        ADL    MASK
0090     1200   10 2 00              LDC    $+X'0000'
0091     2E17   28 6 17              LDA    KPRINT,C
0092     2616   20 6 16              LDE    KPRINT,C
0093     EDEF   E8 5 EF              SST   *C10:,B
0094     AC01   A8 4 01              STA    IPRINT,B
0095     6401   60 4 01              INC    IPRINT,B
0096     EFD7   E8 7 D7              SST   *GOT:,B
0097     0004                        DAT    X'0004'
0098     0000                        ADL    )3000
0099     0000                        ADL    )1100
009A     0000                        ADL    )1050
009B     0001                        ADL    IPRINT
009C     120C   10 2 0C   )1050      LDC    $+X'000C'
009D     2E19   28 6 19              LDA    KPERIOD ,C
009E     2618   20 6 18              LDE    KPERIOD ,C
009F     EDEF   E8 5 EF              SST   *C10:,B
00A0     AC01   A8 4 01              STA    IPERIOD ,B
00A1     6434   60 4 34              INC    ICOUNT,B
00A2     2C34   28 4 34              LDA    ICOUNT,B
00A3     4C01   48 4 01              SUB    IPERIOD ,B
00A4     B200   B0 2 00              PJP    $+X'0000'
00A5     752A   70 5 2A              JMP   *)3000 ,B
00A6     3C34   38 4 34              STZ    ICOUNT,B
```

```
00A7      7636   70 5 36              JMP   *)1200 ,B
0036+B    0000               )1100
0037+B    0000
00A8      2C37   28 4 37              LDA   =X'0000' ,B
00A9      2436   20 4 36              LDE   =X'0000' ,B
00AA      120E   10 2 0E              LDC    $+X'000E'
00AB      AE17   A8 6 17              STA    XPRINT,C
00AC      A616   A0 6 16              STE    XPRINT,C
0038+B    0000               )1200
00AD      2C38   28 4 38              LDA   =X'0000' ,B
00AE      AC0A   A8 4 0A              STA    PASS2 ,B
00AF      AC0B   A8 4 0B              STA    PLOT,B
0039+B    0013
00B0      2C39   28 4 39              LDA   =X'0013' ,B
00B1      AC1F   A8 4 1F              STA    IMAX,B
00B2      753A   70 5 3A              JMP   *)10 ,B
00B3      2C0A   28 4 0A     )2050    LDA    PASS2 ,B
00B4      F200   F0 2 00              ZJP    $+X'0000'
00B5      753B   70 5 3B              JMP   *)2070 ,B
00B6      1C22   18 4 22              LDG   =X'0001' ,B
00B7      EDF4   E8 5 F4              SST   *WRF$,B
00B8      0000                        DAT    X'0000'
00B9      EDF6   E8 5 F6              SST   *NDF$,B
003C+B    3001               )2060
003D+B    6002
003E+B    303D
003F+B    0002
0040+B    2E2E
0041+B    2001
0042+B    2001
00BA      1C22   18 4 22     )2070    LDG   =X'0001' ,B
00BB      EDF4   E8 5 F4              SST   *WRF$,B
00BC      0000                        DAT    X'0000'
00BD      EDF5   E8 5 F5              SST   *ARF$,B
00BE      0006                        DAT    X'0006'
00BF      8043                        ADL    ITIME
00C0      2C22   28 4 22              LDA   =X'0001' ,B
00C1      AC21   A8 4 21              STA    I ,B
00C2      2C21   28 4 21              LDA    I ,B
00C3      4244   40 2 44              ADD   =X'000B'
00C4      AC25   A8 4 25              STA    #AIA,B
00C5      EDF5   E8 5 F5              SST   *ARF$,B
00C6      0006                        DAT    X'0006'
00C7      8025                        ADL    #AIA
00C8      6421   60 4 21              INC    I ,B
00C9      2C1F   28 4 1F              LDA    IMAX,B
00CA      4C21   48 4 21              SUB    I ,B
00CB      B2F6   B0 2 F6              PJP    $+X'FFF6'
00CC      EDF6   E8 5 F6              SST   *NDF$,B
0044+B    3001               )2100
0045+B    6002
0046+B    8001
0047+B    0200
0048+B    6006
0049+B    3013
004A+B    8001
004B+B    0200
004C+B    6002
004D+B    2001
004E+B    2001
00CD      2C0A   28 4 0A              LDA    PASS2 ,B
00CE      F200   F0 2 00              ZJP    $+X'0000'
00CF      754F   70 5 4F              JMP   *)2200 ,B

                                      LPL
00D0      7200   70 2 00              JMP    $+X'0000'
00D1      0006                        DAT    X'0006'
00D2      0000                        DAT    X'0000'
00D3      0000                        DAT    X'0000'
00D4      0000                        DAT    X'0000'
00D5      1C22   18 4 22              LDG   =X'0001' ,B
00D6      EDF4   E8 5 F4              SST   *WRF$,B
00D7      0000                        DAT    X'0000'
00D8      EDF6   E8 5 F6              SST   *NDF$,B
0050+B    3001               )2150
```

```
0051+B   0002
0052+B   2001
00D9     2C20   28 4 20              LDA   *X'FFFF' ,B
00DA     AC0A   A8 4 0A              STA    PASS2 ,B
00DB     753A   70 5 3A              JMP   *)10 ,B
00DC     1C22   18 4 22     )2200    LDG   *X'0001' ,B
00DD     EDF4   E8 5 F4              SST   *NRF$,B
00DE     00B8                        ADL    X'00B8'
00DF     EDF6   E8 5 F6              SST   *NDF$,B
00E0     EDE7   E8 5 E7     )3000    SST   *EXIT,B
00E1     7553   70 5 53              JMP   *)5,B
0000     00E0                        ADL    X'00E0'

PROGRAM SIZE: 0236      DATA POOL SIZE: 0004      ERROR COUNT: 0000

0000     2000                        DAT    X'0000'
0001     0AFF   08 2 FF              LDH    $+X'FFFF'
0002     1200   10 2 00     )5       LDL    $+X'0000'
0003     2E17   28 6 17              LDA    XPRINT,C
0004     2616   20 6 16              LDL    XPRINT,C
0005     EDEF   E8 5 EF              SST   *CIP$,B
0006     AC01   A8 4 01              STA    IPRINT,B
0007     6401   60 4 01              INC    IPRINT,B
0008     FF00   F8 7 00              SST   *GDT$,B
0009     0004                        DAT    X'0004'
000A     0000                        ADL    )3000
000B     0000                        ADL    )15
000C     0000                        ADL    )10
000D     0001                        ADL    IPRINT
000E     120C   10 2 0C     )10      LDL    $+X'000C'
000F     2E19   28 6 19              LDA    XPERIOD ,C
0010     2618   20 6 18              LDL    XPERIOD ,C
0011     EDEF   E8 5 EF              SST   *CIO$,B
0012     AC01   A8 4 01              STA    IPERIOD ,B
0013     6416   60 4 16              INC    ICOUNT,B
0014     2C16   28 4 16              LDA    ICOUNT,B
0015     4C01   48 4 01              SUB    IPERIOD ,B
0016     B200   B0 2 00              PJP    $+X'0000'
0017     7517   70 5 17              JMP   *)3000 ,B
0018     3C16   38 4 16              STZ    ICOUNT,B
0019     7516   70 5 16              JMP   *)20 ,B
0019+B   0000               )15
001A+B   0000
001A     2C1A   28 4 1A              LDA   *X'0000' ,B
001B     2419   20 4 19              LDL   *X'0000' ,B
001C     120C   10 2 0C              LDC    $+X'000C'
001D     AE17   A8 6 17              STA    XPRINT,C
001E     A616   A0 6 16              STL    XPRINT,C
001C+B   0000               )20
001F     2C1C   28 4 1C              LDA   *X'0000' ,B
0020     AC02   A8 4 02              STA    PASS2 ,B
001D+B   0013
0021     2C1D   28 4 1D              LDA   *X'0013' ,B
0022     AC1D   A8 4 1D              STA    IMAX,B
001F+B   0001               )22
0023     2C1F   28 4 1F              LDA   *X'0001' ,B
0024     AC1E   A8 4 1E              STA    I ,B
0025     2C1E   28 4 1E              LDA    I ,B
0026     4005   40 0 05              ADD    X'0005'
0027     4E00   40 6 00              ADD   *X'0013'
0028     AC21   A8 4 21              STA    RATA,B
0029     3804   38 0 04              STZ    X'0004'
002A     3805   38 0 05              STZ    X'0005'
002B     CD21   C8 5 21              ADA   *RATA,B
002C     EDEF   E8 5 EF              SST   *CIO$,B
002D     AC20   A8 4 20              STA    J ,B
002E     2C02   28 4 02              LDA    PASS2 ,B
002F     F200   F0 2 00              ZJP    $+X'0000'
0030     7522   70 5 22              JMP   *)25 ,B
0031     2C20   28 4 20              LDA    J ,B
0023+B   03E8
0032     4C23   48 4 23              SUB   *X'03E8' ,B
0033     BA00   B8 2 00              NJP    $+X'0000'
0034     7524   70 5 24              JMP   *)750,B
0035     2C1E   28 4 1E              LDA    I ,B
0025+B   000E
```

```
0036    4C25   48 4 25           SUB   =X'0002' ,B
0037    B200   B0 2 00           PJP   $+X'0000'
0038    7517   70 5 17           JMP   *)3000 ,B
0039    2C1E   28 4 1E           LDA   I ,B
003A    6605   60 0 05           DCR   X'0005'
003B    AC1B   A8 4 1B           STA   IMAX,B
003C    7526   70 5 26           JMP   *)2050 ,B
003D    2C20   28 4 20   )25     LDA   J ,B
003E    3604   30 C 04           STZ   X'0004'
003F    2805   28 0 05           LDA   X'0005'
0040    B201   B0 2 01           PJP   $+X'0001'
0041    6604   60 0 04           DCR   X'0004'
0042    DC23   D8 4 23           DIV   =X'03E8' ,B
0043    AC27   A8 4 27           STA   K ,B
0044    D423   D0 4 23           MPY   =X'03E8' ,B
0045    AC21   A8 4 21           STA   *AIA,B
0046    2C20   28 4 20           LDA   J ,B
0047    4C21   48 4 21           SUB   *AIA,B
0048    AC01   A8 4 01           STA   INDEX ,B
0049    EF41   E8 7 41           SST   *OUT$,B
004A    000A                     DAT   X'000A'
004B    0000                     ADL   )100
004C    004B                     ADL   )100
004D    004C                     ADL   )300
004E    004D                     ADL   )300
004F    004E                     ADL   )100
0050    004F                     ADL   )100
0051    0050                     ADL   )700
0052    0051                     ADL   )700
0053    0052                     ADL   )700
0054    0027                     ADL   K
0026+B  270F             )100
0055    2C28   28 4 28           LDA   =X'270F' ,B
0056    AC20   A8 4 20           STA   J ,B
0057    7524   70 5 24           JMP   *)750,B
0058    2C01   28 4 01   )300    LDA   INDEX ,B
0059    4005   40 0 05           ADD   X'0005'
005A    4200   40 2 00           ADD   =X'FFFC'
005B    AC21   A8 4 21           STA   *AIA,B
005C    3604   30 C 04           STZ   X'0004'
005D    3605   30 C 05           STZ   X'0005'
005E    C521   C0 5 21           ADA   **AIA,B
005F    EDEF   E8 5 EF           SST   *C10$,B
0060    AC20   A8 4 20           STA   J ,B

                                 LPL
0061    7200   70 2 00           JMP   $+X'0000'
0062    0000                     DAT   X'0000'
0063    0000                     DAT   X'0000'
0064    0010                     DAT   X'0010'
0065    FFFC                     DAT   X'FFFC'
0066    7524   70 5 24           JMP   *)750,B
0067    2C01   28 4 01   )700    LDA   INDEX ,B
0068    4005   40 0 05           ADD   X'0005'
0069    4200   40 2 00           ADD   =X'FFFC'
006A    AC21   A8 4 21           STA   *AIA,B
006B    3604   30 C 04           STZ   X'0004'
006C    3605   30 C 05           STZ   X'0005'
006D    C521   C0 5 21           ADA   **AIA,B
006E    EDEF   E8 5 EF           SST   *C10$,B
006F    AC20   A8 4 20           STA   J ,B
0070    2C1E   28 4 1E   )750    LDA   I ,B
0071    4200   40 2 00           ADD   =X'0002'
0072    AC21   A8 4 21           STA   *AIA,B
0073    2C20   28 4 20           LDA   J ,B
0074    AD21   A8 5 21           STA   **AIA,B
0075    641E   60 4 1E   )1000   INC   I ,B
0076    2C1B   28 4 1B           LDA   IMAX,B
0077    4C1E   48 4 1E           SUB   I ,B
0078    B2AC   B0 2 AC           PJP   $+X'FFAC'
0079    2C02   28 4 02   )2050   LDA   PASS2 ,B
007A    F200   F0 2 00           ZJP   $+X'0000'
007B    7529   70 5 29           JMP   *)2070 ,B
007C    1C1F   18 4 1F           LDG   =X'0001' ,B
007D    ECF4   E8 5 F4           SST   *WRT$,B
```

```
007E    0000                              DAT   X'0000'
007F    EDF0    E6 5 F0                   SST   *NDF$#B
002A+B  3001                    )2200
002B+B  0002
002C+B  303D
002D+B  0002
002E+B  2E2E
002F+B  2001
0030+B  2001
0000    1C1F    1C 4 1F         )2020     LDG   *X'0001' #B
0001    EDF4    E6 5 F4                   SST   *WRF$#B
0002    0000                              DAT   X'0000'
0003    EDF5    E6 5 F5                   SST   *ARF$#B
0004    0000                              DAT   X'0000'
0005    8031                              ADL   IITHF
0006    2C1F    2C 4 1F                   LDA   *X'0001' #B
0007    AC1E    A6 4 1E                   STA   I #B
0008    2C1E    2C 4 1E                   LDA   I #B
0009    4210    40 2 10                   ADD   *X'0002'
000A    AC21    A6 4 21                   STA   *AIA#B
000B    EDF5    E6 5 F5                   SST   *ARF$#B
000C    0000                              DAT   X'0000'
000D    8021                              ADL   *AIA
000E    641E    60 4 1E                   INC   I #B
000F    2C1B    2B 4 1B                   LDA   IMAX#B
0090    4C1E    46 4 1E                   SUB   I #B
0091    32F0    30 2 F0                   PJP   $+X'FFF0'
0092    EDF0    E6 5 F0                   SST   *NDF$#B
0032+B  3001                    )2100
0033+B  0002
0034+B  6001
0035+B  0200
0036+B  6000
0037+B  3013
0038+B  6001
0039+B  0200
003A+B  0002
003B+B  2001
003C+B  2001
0093    2C02    2C 4 02                   LDA   PASS2 #B
0094    7200    70 2 00                   ZJP   $+X'0000'
0095    753C    7C 5 3C                   JMP   *)2200 #B
0096    1C1F    1C 4 1F                   LDG   *X'0001' #B
0097    EDF4    E6 5 F4                   SST   *WRF$#B
0098    0000                              DAT   X'0000'
0099    EDF0    E6 5 F0                   SST   *NDF$#B
003E+B  3001                    )2150
003F+B  0004
0040+B  2001
0041+B  FFFF
009A    2C41    2C 4 41                   LDA   *X'FFFF' #B
009B    AC02    A6 4 02                   STA   PASS2 #B
009C    7200    70 2 00                   JMP   )22
009D    1C1F    1C 4 1F         )2200     LDG   *X'0001' #B
009E    EDF4    E6 5 F4                   SST   *WRF$#B
009F    007E                              ADL   X'007E'
00A0    EDF0    E6 5 F0                   SST   *NDF$#B
00A1    EDE7    E6 5 E7         )3000     SST   *EXIT#B
00A2    7542    7C 5 42                   JMP   *)5#B

                                          LPL
00A3    7200    70 2 00                   JMP   $+X'0000'
00A4    FFFF                              DAT   X'FFFE'
00A5    0000                              DAT   X'0000'
0000    00AC                              ADL   X'00AC'

PROGRAM SIZE: 0172      DATA POOL SIZE: 0067      ERROR COUNT:  0000

0000    0000                              DAT   X'0000'
0001    0000                              DAT   X'0000'
0002    2001    20 3 01                   LDA   X'0001'
0003    0AFE    0B 2 FE                   LDB   $+X'FFFE'
0004    AC01    A6 4 01                   STA   X'0001' #B
0007+B  0001
0005    2C07    2C 4 07                   LDA   *X'0001' #B
0006    AC04    A6 4 04                   STA   J #B
```

```
0007     AC05   A8 4 05            STA   L ,B
0008     3C06   38 4 06            STZ   K ,B
0009     8882   88 0 82            IOA   X'FF82'
000A     AC02   A8 4 02     )50    STA   IDUMMY,B
0009+L   0000
000B     2C09   28 4 09            LDA   =X'0000' ,B
000C     AC06   A8 4 06            STA   I ,B
000D     2C05   28 4 05            LDA   L ,B
000E     0805   08 0 05            DCR   X'0005'
000F     F201   F0 2 01            ZJP   $+X'0001'
0010     7200   70 2 00            JMP   $+X'0000'
0011     750A   70 5 0A            JMP   *)60 ,B
0012     2C04   28 4 04            LDA   J ,B
0013     4200   40 2 00            ADD   =X'FFFF'
0014     AC0B   A8 4 0B            STA   @AIA,B
000C+B   0000
0015     2C0C   28 4 0C            LDA   =X'0000' ,B
0016     AD0B   A8 5 0B            STA   *@AIA,B
0017     2A00   28 2 00            LDA   =X'0002'
0018     AC0D   A8 4 0D            STA   @AIB,B
0019     2C06   28 4 06            LDA   I ,B
001A     AC0E   A8 4 0E            STA   @AIC,B
001B     1C0E   18 4 0E            LDB   @AIC,B
001C     EDF1   E8 5 F1            SST   *LDBI,B
001D     800D                      ADL   @AIB
001E     F200   F0 2 00            ZJP   $+X'0000'
001F     2C04   28 4 04            LDA   J ,B
0020     420D   40 2 0D            ADD   =X'FFFF'
0021     AC0B   A8 4 0B            STA   @AIA,B
000F+B   FFFF
0022     2C0F   28 4 0F            LDA   =X'FFFF' ,B
0023     AD0B   A8 5 0B            STA   *@AIA,B
0024     7510   70 5 10            JMP   *)60 ,B
0025     2C04   28 4 04     )60    LDA   J ,B
0026     4200   40 2 00            ADD   =X'FFFF'
0027     AC0B   A8 4 0B            STA   @AIA,B
0028     2C0C   28 4 0C            LDA   =X'0000' ,B
0029     AD0B   A8 5 0B            STA   *@AIA,B
002A     6404   60 4 04     )80    INC   J ,B
002B     2A14   28 2 14            LDA   =X'0002'
002C     AC0B   A8 4 0B            STA   @AIA,B
002D     2C06   28 4 06            LDA   I ,B
002E     AC0D   A8 4 0D            STA   @AIB,B
002F     1C0D   18 4 0D            LDB   @AIB,B
0030     EDF1   E8 5 F1            SST   *LDBI,B
0031     800B                      ADL   @AIA
0032     F200   F0 2 00            ZJP   $+X'0000'
0033     2C04   28 4 04            LDA   J ,B
0034     420E   40 2 0E            ADD   =X'FFFF'
0035     AC0B   A8 4 0B            STA   @AIA,B
0036     2C0F   28 4 0F            LDA   =X'FFFF' ,B
0037     AD0B   A8 5 0B            STA   *@AIA,B
0038     6406   60 4 06     )100   INC   I ,B
0011+B   000D
0039     2C11   28 4 11            LDA   =X'000D' ,B
003A     4C06   48 4 06            SUB   I ,B
003B     B2D1   B0 2 D1            PJP   $+X'FFD1'
003C     6406   60 4 06            INC   K ,B
003D     EF00   E8 7 00            SST   *GOTI,B
003E     0005                      DAT   X'0005'
003F     0000                      ADL   )200
0040     0000                      ADL   )300
0041     0000                      ADL   )400
0042     0000                      ADL   )1000
0043     0000                      ADL   K
0044     8883   88 0 83     )200   IOA   X'FF83'
0045     72C4   70 2 C4            JMP   )50
0046     2C07   28 4 07     )300   LDA   =X'0001' ,B
0047     AC04   A8 4 04            STA   J ,B
0012+B   0002
0048     2C12   28 4 12            LDA   =X'0002' ,B
0049     AC05   A8 4 05            STA   L ,B
004A     8884   88 0 84            IOA   X'FF84'
004B     72BE   70 2 BE            JMP   )50
004C     8885   88 0 85     )400   IOA   X'FF85'
```

```
004D     720C    70 2 0C               JMP    )50
004E     2C0F    26 4 0F     )1000     LDA    *X'FFFF' ,B
004F     1200    10 2 00               LDC    $+X'0000'
0050     AE20    A8 6 20               STA    RUNLOGIC,C
0051     E8E4    E8 6 E4               SST    *MIIN,6
0052     0003                          ADL    N9
0053     0C01    08 4 01               LDB    X'0001' ,B
0054     E401    E0 4 01               EST    X'0001' ,B

                                       EPL
0055     7200    70 2 00               JMP    $+X'0000'
0056     FFFF                          DAT    X'FFFF'
0057     0000                          DAT    X'0000'
0058     FFFF                          DAT    X'FFFF'
0059     0000                          DAT    X'0000'
005A     0000                          DAT    X'0000'
0001     0061                          ADL    X'0061'

PROGRAM SIZE: 0097     DATA POOL SIZE: 0019     ERROR COUNT: 0000

0000     0000                          DAT    X'0000'
0001     0AFF    08 2 FF               LDB    $+X'FFFF'
0002     1200    10 2 00               LDC    $+X'0000'
0003     2E1A    28 6 1A               LDA    CLOSEPB ,C
0004     F200    F0 2 00               ZJP    $+X'0000'
0005     7508    70 5 08               JMP    *)50 ,B
0006     1204    10 2 04               LDC    $+X'0004'
0007     2E1B    28 6 1B               LDA    OPENPB,C
0008     F200    F0 2 00               ZJP    $+X'0000'
0009     7509    70 5 09               JMP    *)100,B
000A+B   0000
000A     2C0A    26 4 0A               LDA    *X'0000' ,B
000B     1205    10 2 05               LDC    $+X'0005'
000C     AE18    A8 6 18               STA    VPERPB,C
000D     AE19    A8 6 19               STA    VPELPB,C
000E     1200    10 2 00               LDC    $+X'0000'
000F     3E11    38 6 11               STZ    IVPL,C
0010     7506    70 5 06               JMP    *)1000 ,B
0011     2C0A    26 4 0A     )50       LDA    *X'0000' ,B
0012     1207    10 2 07               LDC    $+X'0007'
0013     AE1A    A8 6 1A               STA    CLOSEPB ,C
0014     1206    10 2 06               LDC    $+X'0006'
0015     2E05    28 6 05               LDA    INDEX2,C
0016     4200    40 2 00               ADD    *X'0000'
0017     AC0D    A8 4 0D               STA    *AIA,B
0018     2D0D    28 5 0D               LDA    **AIA,B
0019     AC0C    A8 4 0C               STA    IPAT,B
001A     750E    70 5 0E               JMP    *)200,B
001B     2C0A    28 4 0A     )100      LDA    *X'0000' ,B
001C     120A    10 2 0A               LDC    $+X'000A'
001D     AE1B    A8 6 1B               STA    OPENPB,C
000F+B   0000
0010+B   0000
001E     2C10    28 4 10               LDA    *X'0000' ,B
001F     240F    20 4 0F               LDE    *X'000C' ,B
0020     EDEB    E8 5 EB               SST    *SII:,B
0021     0011                          ADL    TESTAO
0022     F200    F0 2 00               ZJP    $+X'0000'
0023     7508    70 5 08               JMP    *)1000 ,B
0024     1200    10 2 00               LDC    $+X'0000'
0025     2E13    28 6 13               LDA    TM,C
0026     120A    10 2 0A               LDC    $+X'000A'
0027     5E12    58 6 12               AND    VTESTPB ,C
0028     F200    F0 2 00               ZJP    $+X'0000'
0029     7508    70 5 08               JMP    *)1000 ,B
002A     1216    10 2 16               LDC    $+X'0016'
002B     3E03    38 6 03               STZ    NVTEST,C
002C     2E05    28 6 05               LDA    INDEX2,C
002D     4200    40 2 00               ADD    *X'0002'
002E     AC0D    A8 4 0D               STA    *AIA,B
002F     2D0D    28 5 0D               LDA    **AIA,B
0030     AC0C    A8 4 0C               STA    IPAT,B
0031     FF00    E8 7 00     )200      SST    *MICCO ,B
0032     0006                          ADL    N1
0033     0005                          ADL    N0
0034     0007                          ADL    N13
```

```
0035    000C                          ADL   IPAT
0036    71DF    70 1 DF    )1000      JMP   *X'FFDF'
0037    EDE7    E8 5 F7               SST   *EXIT,D

                                      LPL
0038    7200    70 2 00               JMP   $+X'0000'
0039    0000                          DAT   X'0000'
003A    0000                          DAT   X'0000'
003B    0000                          DAT   X'0000'
003C    0000                          DAT   X'0000'
003D    0000                          DAT   X'0000'
003E    0000                          DAT   X'0000'
0000    0045                          ADL   X'0045'

PROGRAM SIZE: 0035     DATA POOL SIZE: 0016     ERROR COUNT: 000E
0000    0000                          DAT   X'0000'
0001    0AFF    08 2 FF               LDB   $+X'FFFF'
0005+B  22D1               )5
0002    2C05    28 4 05               LDA   =X'22D1' ,B
0003    882D    88 0 2D               IDA   X'002D'
0007+B  0001
0004    2C07    28 4 07               LDA   =X'0001' ,B
0005    AC06    A8 4 06               STA   1 ,B
0006    EF00    E8 7 00               SST   *MICLO ,B
0007    0002                          ADL   N1
0008    0001                          ADL   N0
0009    0006                          ADL   1
000A    0004                          ADL   MASK
000B    6406    60 4 06    )23        INC   1 ,B
0008+B  0028
000C    2C08    28 4 08               LDA   =X'0028' ,B
000D    4C06    48 4 06               SUB   1 ,B
000E    82F7    80 2 F7               PJP   $+X'FFF7'
000F    2C07    28 4 07               LDA   =X'0001' ,B
0010    AC06    A8 4 06               STA   1 ,B
0011    2C06    28 4 06               LDA   1 ,B
0012    4C08    48 4 08               SUB   =X'0020' ,B
0013    F200    F0 2 00               ZJP   $+X'0000'
0014    BA01    B8 2 01               NJP   $+X'0001'
0015    7509    70 5 09               JMP   *350 ,B
0016    2C06    28 4 06               LDA   1 ,B
0017    AC0A    A8 4 0A               STA   *A1A,B
0018    4200    40 2 00               ADD   =X'FFFF'
0019    AC0B    A8 4 0B               STA   *A1B,B
000C+B  0000
001A    2C0C    28 4 0C               LDA   =X'0000' ,B
001B    AD0B    A8 5 0B               STA   **A1B,B
001C    2C0A    28 4 0A               LDA   *A1A,B
001D    4200    40 2 00               ADD   =X'FFFF'
001E    AC0D    A8 4 0D               STA   *A1C,B
001F    2C0C    28 4 0C               LDA   =X'0000' ,B
0020    AD0D    A8 5 0D               STA   **A1C,B
0021    2C06    28 4 06    )58        LDA   1 ,B
0022    AC0A    A8 4 0A               STA   *A1A,B
0023    4200    40 2 00               ADD   =X'FFFF'
0024    AC0B    A8 4 0B               STA   *A1B,B
0025    2C0C    28 4 0C               LDA   =X'0000' ,B
0026    AD0B    A8 5 0B               STA   **A1B,B
0027    2C0A    28 4 0A               LDA   *A1A,B
0028    4200    40 2 00               ADD   =X'FFFF'
0029    AC0D    A8 4 0D               STA   *A1C,B
002A    3D0D    38 5 0D               STZ   **A1C,B
002B    6406    60 4 06    )100       INC   1 ,B
000E+B  0050
002C    2C0E    28 4 0E               LDA   =X'0050' ,B
002D    4C06    48 4 06               SUB   1 ,B
002E    82E2    80 2 E2               PJP   $+X'FFE2'
002F    2C02    28 4 02               LDA   N1,B
0030    1200    10 2 00               LDL   $+X'0000'
0031    AE01    A8 6 01               STA   IPBX,C
0032    AE1D    A8 6 1D               STA   NOMINS,C
000F+B  0005
0033    2C0F    28 4 0F               LDA   =X'0005' ,B
0034    AE20    A8 6 20               STA   ICOUNTER,C
0010+B  0000
0011+B  0000
```

```
0035     2C11   28 4 11            LDA   *X'0000' ,B
0036     2410   20 4 10            LDE   *X'0000' ,B
0037     1200   10 2 00            LDC    $+X'0000'
0038     AE09   A8 6 09            STA    PERCCI,C
0039     A008   A0 6 08            STE    PERCCI,C
003A     EF34   E8 7 34            BST   *MICCO ,B
003B     0002                      ADL    N1
003C     0002                      ADL    N1
003D     0003                      ADL    N10
003E     0002                      ADL    N1
0012+B   FFFF
003F     2C12   28 4 12            LDA   *X'FFFF' ,B
0040     1200   10 2 00            LDC    $+X'0000'
0041     AE04   A8 6 04            STA    CRESLTPB,C
0042     FF00   E8 7 00    )1000   BST   *PLANTCC1,B
0043     EDE7   E8 5 E7            BST   *EXIT,B
0044     72F0   70 2 F0            JMP    )1000

                                   LPL
0045     7200   70 2 00            JMP    $+X'0000'
0046     0000                      DAT    X'0000'
0047     FFFF                      DAT    X'FFFF'
0048     FFFF                      DAT    X'FFFF'
0049     FFFF                      DAT    X'FFFF'
004A     FFFF                      DAT    X'FFFF'
004B     0000                      DAT    X'0000'
004C     0000                      DAT    X'0000'
004D     0000                      DAT    X'0000'
004E     0000                      DAT    X'0000'
0000     0055                      ADL    X'0055'

PROGRAM SIZE: 0065    DATA POOL SIZE: 0019    ERROR COUNT:  0000
0000     0000                      DAT    X'0000'
0001     0AFF   08 2 FF            LDB    $+X'FFFF'
0002     1200   10 2 00    )5      LDC    $+X'0000'
0003     2E18   28 6 18            LDA    ISCAN ,C
0004     F200   F0 2 00            ZJP    $+X'0000'
0005     752C   70 5 2C            JMP   *)60 ,B
0006     FF00   E6 7 00            BST   *MIANI ,B
0007     0015                      ADL    N10
0008     0002                      ADL    ADBUFI
0009     0013                      ADL    VALBUF
000A     002D                      ADL    FLGWRD
002F+B   0001
000B     2C2F   28 4 2F            LDA   *X'0001' ,B
000C     AC2E   A8 4 2E            STA    I ,B
000D     2C2E   28 4 2E            LDA    I ,B
0030+B   0005
000E     4C30   48 4 30            SUB   *X'0005' ,B
000F     F200   F0 2 00            ZJP    $+X'0000'
0010     BA01   B8 2 01            NJP    $+X'0001'
0011     7531   70 5 31            JMP   *)10 ,B
0012     2C2E   28 4 2E            LDA    I ,B
0013     4200   40 2 00            ADD   *X'001A'
0014     AC34   A8 4 34            STA    #AIA,B
0015     2D34   28 5 34            LDA   *#AIA,B
0016     EDEE   E8 5 EE            BST   *C01,B
0017     AC33   A8 4 33            STA    TEMP,B
0018     A432   A0 4 32            STE    TEMP,B
0019     2C2E   28 4 2E            LDA    I ,B
001A     4005   40 0 05            ADD    X'0005'
001B     AC35   A8 4 35            STA    #AIB,B
001C     4200   40 2 00            ADD   *X'FFFE'
001D     AC36   A8 4 36            STA    #AIC,B
001E     2C35   28 4 35            LDA    #AIB,B
001F     4200   40 2 00            ADD   *X'00A0'
0020     AC37   A8 4 37            STA    #AID,B
0021     2C35   28 4 35            LDA    #AIB,B
0022     4200   40 2 00            ADD   *X'00BA'
0023     AC38   A8 4 38            STA    #AIE,B
0024     3804   38 0 04            STZ    X'0004'
0025     3805   38 0 05            STZ    X'0005'
0026     C537   C0 5 37            ADA   *#AID,B
0027     EDEC   E8 5 EC            BST   *MI1,B
0028     0032                      ADL    TEMP
0029     EDE6   E8 5 E6            BST   *SI1,B
```

```
002A    8036                    ADL    #AIL
002B    1C3D    18 4 3D         LDG    #AIC,B
002C    A103    A0 1 03         STE    *X'0003'
002D    6B03    68 0 03         INC    X'0003'
002E    A903    A8 1 03         STA    *X'0003'
002F    2C2E    28 4 2E         LDA    I ,B
0039+B  0003
0030    4C39    48 4 39         SUB    =X'0003' ,B
0031    B200    B0 2 00         PJP    $+X'0000'
0032    753A    70 5 3A         JMP    *)0,B
0033    2C2E    28 4 2E         LDA    I ,B
0034    4005    40 0 05         ADD    X'0005'
0035    AC34    A8 4 34         STA    #AIA,B
0036    421A    40 2 1A         ADD    =X'FFFE'
0037    AC35    A8 4 35         STA    #AIB,B
0038    2C34    28 4 34         LDA    #AIA,B
0039    4203    40 2 03         ADD    =X'FFFE'
003A    AC36    A8 4 36         STA    #AIC,B
003B    3804    38 0 04         STZ    X'0004'
003C    3805    38 0 05         STZ    X'0005'
003D    C536    C0 5 36         ADA    *#AIC,B
003E    BA02    B8 2 02         NJP    $+X'0002'
003F    3805    38 0 05         STZ    X'0005'
0040    F201    F0 2 01         ZJP    $+X'0001'
0041    28A0    28 0 A0         LDA    X'FFFF'
0042    AC36    A8 4 36         STA    #ALD,B
0043    3804    38 0 04         STZ    X'0004'
0044    3805    38 0 05         STZ    X'0005'
0045    C535    C0 5 35         ADA    *#AIB,B
0046    EDEB    E8 5 EB         SST    *S11I,B
0047    603C                    ADL    #SMAXAI
0048    B202    B0 2 02         PJP    $+X'0002'
0049    3805    38 0 05         STZ    X'0005'
004A    F201    F0 2 01         ZJP    $+X'0001'
004B    28A0    28 0 A0         LDA    X'FFFF'
004C    A803    A8 0 03         STA    X'0003'
004D    50A0    50 0 A0         LOR    X'FFFF'
004E    5C3B    58 4 3B         AND    #ALD,B
004F    5003    50 0 03         EOR    X'0003'
0050    F200    F0 2 00         ZJP    $+X'0000'
0051    2C2E    28 4 2E         LDA    I ,B
0052    4005    40 0 05         ADD    X'0005'
0053    421A    40 2 1A         ADD    =X'FFFE'
0054    AC34    A8 4 34         STA    #AIA,B
003D+B  0000
003E+B  0000
0055    2C3E    28 4 3E         LDA    =X'0000' ,B
0056    243D    20 4 3D         LDE    =X'0000' ,B
0057    1C34    18 4 34         LDG    #AIA,B
0058    A103    A0 1 03         STE    *X'0003'
0059    6B03    68 0 03         INC    X'0003'
005A    A903    A8 1 03         STA    *X'0003'
005B    753F    70 5 3F         JMP    *)50 ,B

                                LPL
005C    7200    70 2 00         JMP    $+X'0000'
005D    0000                    DAT    X'0000'
005E    0000                    DAT    X'0000'
005F    0000                    DAT    X'0000'
0060    FFFE                    DAT    X'FFFE'
0061    00A0                    DAT    X'00A0'
0062    00BA                    DAT    X'00BA'
0063    2C2E    28 4 2E    )0   LDA    I ,B
0064    AC34    A8 4 34         STA    #AIA,B
0065    4200    40 2 00         ADD    =X'003E'
0066    AC35    A8 4 35         STA    #AIB,B
0040+B  0000
0067    2C40    28 4 40         LDA    =X'0000' ,B
0068    AD35    A8 5 35         STA    *#AIB,B
0069    2C34    28 4 34         LDA    #AIA,B
006A    42F0    40 2 F0         ADD    =X'001A'
006B    AC36    A8 4 36         STA    #AIC,B
006C    2D36    28 5 36         LDA    *#AIC,B
006D    AC01    A8 4 01         STA    IDUMMY,B
006E    2A00    28 2 00         LDA    =X'0001'
006F    AC37    A8 4 37         STA    #AID,B
```

```
0041+B   000D
0070     2C41    28 4 41          LDA   *X'000D' ,B
0071     AC38    A8 4 38          STA    #AIE,B
0072     1C38    18 4 38          LDC    #AIE,B
0073     EDF1    E8 5 F1          SST   *LDB:,B
0074     8037                     ADL    #AID
0075     F200    F8 2 00          ZJP    $+X'0000'
0076     7542    70 5 42          JMP   *)7,B
0077     2C01    28 4 01          LDA    IDUMMY,B
0078     4C19    48 4 19          SUB    MASKMAX ,B
0079     BA00    B8 2 00          NJP    $+X'0000'
007A     7542    70 5 42          JMP   *)7,B
007B     1200    10 2 00          LDC    $+X'0000'
007C     2E13    28 6 13          LDA    BR,C
0043+B   FFFF
007D     5443    50 4 43          EOR   *X'FFFF' ,B
007E     F200    F8 2 00          ZJP    $+X'0000'
007F     7544    70 5 44          JMP   *)6,B
0080     2C2E    28 4 2E          LDA    I ,B
0081     4200    40 2 00          ADD   *X'0015'
0082     AC34    A8 4 34          STA    #AIA,B
0083     2D34    28 5 34          LDA   *#AIA,B
0084     AC45    A8 4 45          STA    J ,B
0085     2C45    28 4 45          LDA    J ,B
0086     4005    40 0 05          ADD    X'0005'
0087     4200    40 2 00          ADD   *X'FFFE'
0088     AC35    A8 4 35          STA    #AIB,B
0089     2C2E    28 4 2E          LDA    I ,B
008A     4005    40 0 05          ADD    X'0005'
008B     AC36    A8 4 36          STA    #AIC,B
008C     42D4    40 2 D4          ADD   *X'FFFE'
008D     AC37    A8 4 37          STA    #AID,B
008E     3804    38 0 04          STZ    X'0004'
008F     3805    38 0 05          STZ    X'0005'
0090     C535    C0 5 35          ADA   *#AIB,B
0091     EDEC    E8 5 EC          SST   *RII:,B
0092     8046                     ADL    PD
0093     EDED    E8 5 ED          SST   *DII:,B
0094     8047                     ADL    PDREF
0095     EDEB    E8 5 EB          SST   *SII:,B
0096     8037                     ADL    #AID
0097     AC49    A8 4 49          STA    #ARE,B
0098     A448    A0 4 48          STE    #ARE,B
0099     EF00    E8 7 00          SST   *ABS ,B
009A     0048                     ADL    #ARE
009B     AC33    A8 4 33          STA    TEMP,B
009C     A432    A0 4 32          STE    TEMP,B
009D     2C36    28 4 36          LDA    #AIC,B
009E     4200    40 2 00          ADD   *X'0074'
009F     AC4A    A8 4 4A          STA    #AIF,B
00A0     2C33    28 4 33          LDA    TEMP,B
00A1     2432    20 4 32          LDE    TEMP,B
00A2     EDEB    E8 5 EB          SST   *SII:,B
00A3     804A                     ADL    #AIF
00A4     B200    B0 2 00          PJP    $+X'0000'
00A5     7544    70 5 44          JMP   *)6,B
00A6     2C2E    28 4 2E    )7    LDA    I ,B
00A7     4242    40 2 42          ADD   *X'003E'
00A8     AC34    A8 4 34          STA    #AIA,B
004B+B   FFFF
00A9     2C4B    28 4 4B          LDA   *X'FFFF' ,B
00AA     AD34    A8 5 34          STA   *#AIA,B
00AB     2C2E    28 4 2E    )6    LDA    I ,B
00AC     AC34    A8 4 34          STA    #AIA,B
00AD     4200    40 2 00          ADD   *X'003E'
00AE     AC35    A8 4 35          STA    #AIB,B
00AF     2C34    28 4 34          LDA    #AIA,B
00B0     4200    40 2 00          ADD   *X'0040'
00B1     AC36    A8 4 36          STA    #AIC,B
00B2     2D36    28 5 36          LDA   *#AIC,B
00B3     5535    50 5 35          EOR   *#AIB,B
00B4     F200    F8 2 00          ZJP    $+X'0000'
00B5     2C4B    28 4 4B          LDA   *X'FFFF' ,B
00B6     123B    10 2 3B          LDC    $+X'003B'
00B7     AE26    A8 6 26          STA    RUNLOGIC,C
00B8     753F    70 5 3F          JMP   *)50 ,B
```

```
00B9    2C2E   20 4 2E   )10    LDA   I ,B
00BA    42A5   40 2 A5          ADD   =X'001A'
00BB    AC34   A8 4 34          STA   *AIA,B
00BC    2D34   28 5 34          LDA   **AIA,B
00BD    AC01   A8 4 01          STA   IDUMMY,B

                                LPL
00BE    7200   70 2 00          JMP   $+X'0000'
00BF    003E                    DAT   X'003E'
00C0    0000                    DAT   X'0000'
00C1    0000                    DAT   X'0000'
00C2    0000                    DAT   X'0000'
00C3    0000                    DAT   X'0000'
00C4    FFFE                    DAT   X'FFFE'
00C5    0074                    DAT   X'0074'
00C6    0040                    DAT   X'0040'
00C7    2C2E   20 4 2E          LDA   I ,B
004C+B  000B
00C8    4C4C   48 4 4C          SUB   =X'000B' ,B
00C9    F200   F0 2 00          ZJP   $+X'0000'
00CA    BA01   B8 2 01          NJP   $+X'0001'
00CB    754D   70 5 4D          JMP   *)30 ,B
00CC    2AF4   28 2 F4          LDA   =X'0001'
00CD    AC34   A8 4 34          STA   *AIA,B
00CE    2C41   28 4 41          LDA   =X'000D' ,B
00CF    AC35   A8 4 35          STA   *AIB,B
00D0    1C35   18 4 35          LDG   *AIB,B
00D1    EDF1   E8 5 F1          SST   *LDGS,B
00D2    8C34                    ADL   *AIA
00D3    5443   50 4 43          EOR   =X'FFFF' ,B
00D4    F200   F0 2 00          ZJP   $+X'0000'
00D5    754E   70 5 4E          JMP   *)20 ,B
00D6    3C01   38 4 01          STZ   IDUMMY,B
00D7    2C2E   28 4 2E   )20    LDA   I ,B
00D8    4200   40 2 00          ADD   =X'000E'
00D9    AC34   A8 4 34          STA   *AIA,B
00DA    2C01   28 4 01          LDA   IDUMMY,B
00DB    AD34   A8 5 34          STA   **AIA,B
00DC    753F   70 5 3F          JMP   *)50 ,B
00DD    2AE3   28 2 E3   )30    LDA   =X'0001'
00DE    AC34   A8 4 34          STA   *AIA,B
00DF    2C41   28 4 41          LDA   =X'000D' ,B
00E0    AC35   A8 4 35          STA   *AIB,B
00E1    1C35   18 4 35          LDG   *AIB,B
00E2    EDF1   E8 5 F1          SST   *LDGS,B
00E3    8034                    ADL   *AIA
00E4    F200   F0 2 00          ZJP   $+X'0000'
00E5    754F   70 5 4F          JMP   *)40 ,B
00E6    3C01   38 4 01          STZ   IDUMMY,B
00E7    755C   70 5 5C          JMP   *)45 ,B
00E8    2C01   28 4 01   )40    LDA   IDUMMY,B
00E9    5418   50 4 18          EOR   MASK,B
00EA    AC01   A8 4 01          STA   IDUMMY,B
00EB    2C2E   28 4 2E   )45    LDA   I ,B
00EC    4C4C   48 4 4C          SUB   =X'000B' ,B
00ED    AC45   A8 4 45          STA   J ,B
00EE    2C2E   28 4 2E          LDA   I ,B
00EF    4C41   48 4 41          SUB   =X'000D' ,B
00F0    F200   F0 2 00          ZJP   $+X'0000'
00F1    BA01   B8 2 01          NJP   $+X'0001'
00F2    2C45   28 4 45          LDA   J ,B
0051+B  0002
00F3    4451   40 4 51          ADD   =X'0002' ,B
00F4    AC45   A8 4 45          STA   J ,B
00F5    2C45   28 4 45          LDA   J ,B
00F6    4200   40 2 00          ADD   =X'0015'
00F7    AC34   A8 4 34          STA   *AIA,B
00F8    2C01   28 4 01          LDA   IDUMMY,B
00F9    AD34   A8 5 34          STA   **AIA,B
00FA    642E   60 4 2E   )50    INC   I ,B
00FB    2C15   28 4 15          LDA   N10 ,B
00FC    4C2E   48 4 2E          SUB   I ,B
00FD    8302   80 3 02          PJP   *$+X'0002'
00FE    7201   70 2 01          JMP   $+X'0001'
00FF    000C                    ADL   X'000C'
0100    1200   10 2 00          LDC   $+X'0000'
```

```
0101   2E20   28 0 20         LDA   ITVGVSS ,C
0102   AE20   A8 0 20         STA   ITESTAD ,C
0103   2C40   28 4 40         LDA   =X'0000' ,B
0104   12BD   10 2 BD         LDC   $+X'FF3D'
0105   AE1A   A8 0 1A         STA   VIDAROS ,C
0106   1200   10 2 00         LDC   $+X'0000'
0107   2E02   28 0 02         LDA   FLGWRD,C
0108   B200   B0 2 00         PJP   $+X'0000'
0109   2C4B   28 4 4B         LDA   =X'FFFF' ,B
010A   12B7   10 2 B7         LDC   $+X'FFB7'
010B   AE1A   A8 0 1A         STA   VIDAROS ,C
010C   12B5   10 2 B5         LDC   $+X'FFB5'
010D   2E1A   28 0 1A         LDA   VIDAROS ,C
010E   5E43   50 0 43         LOR   VIDAROSX,C
010F   F200   F0 2 00         ZJP   $+X'0000'
0110   2C4B   28 4 4B         LDA   =X'FFFF' ,B
0111   12B0   10 2 B0         LDC   $+X'FFB0'
0112   AE26   A8 0 26         STA   RUNLOGIC,C
0113   12AE   10 2 AE         LDC   $+X'FFAE'
0114   2E1A   28 0 1A         LDA   VIDAROS ,C
0115   AE43   A8 0 43         STA   VIDAROSX,C
0116   7552   70 5 52         JMP   *)1000 ,B
0117   1211   10 2 11   )000  LDC   $+X'0011'
0118   3E18   38 0 18         STZ   ISCAN ,C
0119   EF00   E8 7 00         SST   *GOTI,B
011A   000B                   DAT   X'000B'
011B   0000                   ADL   )1000
011C   0000                   ADL   )200
011D   011B                   ADL   )1000
011E   0000                   ADL   )400
011F   0000                   ADL   )500
0120   011D                   ADL   )1000
0121   011C                   ADL   )200
0122   0120                   ADL   )1000
0123   0000                   ADL   )300
0124   011F                   ADL   )500
0125   0053                   ADL   INTSCAN
0126   6454   60 4 54   )200  INC   ISPAN ,B
0127   2C54   28 4 54         LDA   ISPAN ,B
0128   4C39   48 4 39         SUB   =X'0003' ,B
0129   B200   B0 2 00         PJP   $+X'0000'
012A   7552   70 5 52         JMP   *)1000 ,B
012B   3C54   38 4 54         STZ   ISPAN ,B
012C   EF00   E8 7 00         SST   *HISPNADJ,B
012D   7552   70 5 52         JMP   *)1000 ,B
012E   1217   10 2 17   )300  LDC   $+X'0017'
012F   6019   60 0 19         INC   NSYNC1,C
0130   2E19   28 0 19         LDA   NSYNC1,C
0131   4C13   48 4 13         SUB   NB,B
0132   F200   F0 2 00         ZJP   $+X'0000'
0133   BA01   B8 2 01         NJP   $+X'0001'
0134   2C2F   28 4 2F         LDA   =X'0001' ,B
0135   1207   10 2 07         LDC   $+X'0007'
0136   AE19   A8 0 19         STA   NSYNC1,C

                              LPL
0137   7200   70 2 00         JMP   $+X'0000'
0138   0000                   DAT   X'0000'
0139   000E                   DAT   X'000E'
013A   0019                   DAT   X'0019'
013B   0000                   DAT   X'0000'
013C   0000                   DAT   X'0000'
013D   0000                   DAT   X'0000'
013E   12FA   10 2 FA         LDC   $+X'FFFA'
013F   2E19   28 0 19         LDA   NSYNC1,C
0056+B 000A
0140   D456   D0 4 56         MPY   =X'000A' ,B
0057+B 001A
0141   4457   40 4 57         ADD   =X'001A' ,B
0142   AC45   A8 4 45         STA   J ,B
0058+B 0009
0143   2C58   28 4 58         LDA   =X'0009' ,B
0144   AC55   A8 4 55         STA   NJ,B
0145   2C43   28 4 43         LDA   =X'FFFF' ,B
0146   AE1A   A8 0 1A         STA   NSYNC2,C
0147   7559   70 5 59         JMP   *)020,B
```

```
005A+B   0015                  )400
0148     2C5A   28 4 5A             LDA   =X'0015' ,B
0149     AC45   A8 4 45             STA   J ,B
005B+B   FFFE
014A     2C5B   28 4 5B             LDA   =X'FFFE' ,B
014B     12ED   10 2 ED             LDC   $+X'FFED'
014C     AE1A   A8 6 1A             STA   NSYNC2,C
014D     755C   74 5 5C             JMP   *)600,B
014E     2C2F   28 4 2F    )500     LDA   =X'0001' ,B
014F     AC45   A8 4 45             STA   J ,B
0150     2C4B   28 4 4B             LDA   =X'FFFF' ,B
0151     AC1A   A8 4 1A             STA   BIDATSCV,B
0152     2C14   28 4 14    )600     LDA   N15 ,B
0153     AC55   A8 4 55             STA   NJ,B
0154     2C3E   28 4 3E    )620     LDA   =X'0000' ,B
0155     243D   20 4 3D             LDE   =X'0000' ,B
0156     EDEB   E8 5 EB             SST   *B11:,B
0157     805D                       ADL   ATSSCAN
0158     F201   F0 2 01             ZJP   $+X'0001'
0159     7200   70 2 00             JMP   $+X'0000'
015A     7552   74 5 52             JMP   *)1000 ,B
015B     2C45   28 4 45             LDA   J ,B
015C     AC34   A8 4 34             STA   *AIA,B
015D     4200   40 2 00             ADD   =X'FFFF'
015E     AC35   A8 4 35             STA   *AIB,B
015F     2C34   28 4 34             LDA   *AIA,B
0160     4200   40 2 00             ADD   =X'FFFF'
0161     AC36   A8 4 36             STA   *AIC,B
0162     EF00   E8 7 00             SST   *MIANI ,B
0163     0055                       ADL   NJ
0164     8035                       ADL   *AIB
0165     8036                       ADL   *AIC
0166     802D                       ADL   FLGWRD
0167     2C1A   28 4 1A             LDA   BIDATSCV,B
0168     5443   50 4 43             EOR   =X'FFFF' ,B
0169     F200   F0 2 00             ZJP   $+X'0000'
016A     7562   74 5 52             JMP   *)1000 ,B
016B     EDE4   E8 5 E4             SST   *MIINE,B
016C     0013                       ADL   NO
016D     2C4D   28 4 4D             LDA   =X'0000' ,B
016E     AC1A   A8 4 1A             STA   BIDATSCV,B
016F     EDE7   E8 5 E7    )1000    SST   *EXIT,B
0170     755C   74 5 5C             JMP   *)5E,

                                    LPL
0171     7200   70 2 00             JMP   $+X'0000'
0172     005E                       ADL   X'005E'
0173     FFFF                       DAT   X'FFFF'
0174     FFFF                       DAT   X'FFFF'
0000     0178                       ADL   X'0178'
PROGRAM SIZE: 0379     DATA POOL SIZE: 0095     ERROR COUNT:     0000
0000     0000                       DAT   X'0000'
0001     0AFF   0C 2 FF             LDB   $+X'FFFF'
0002     2C25   28 4 25    )5       LDA   N1,B
0003     AC27   A8 4 27             STA   I ,B
0004     1200   10 2 00             LDC   $+X'0000'
0005     2E01   28 6 01             LDA   IPBX,C
0028+B   0006
0006     4C28   48 4 28             SUB   =X'0006' ,B
0007     F202   F0 2 02             ZJP   $+X'0002'
0008     3805   38 0 05             STZ   X'0005'
0009     F201   F0 2 01             ZJP   $+X'0001'
000A     20A8   20 0 A8             LDA   X'FFFF'
000B     AC29   A8 4 29             STA   *ALA,B
000C     2C27   28 4 27             LDA   I ,B
002A+B   0003
000D     4C2A   48 4 2A             SUB   =X'0003' ,B
000E     F202   F0 2 02             ZJP   $+X'0002'
000F     3805   38 0 05             STZ   X'0005'
0010     F201   F0 2 01             ZJP   $+X'0001'
0011     20A8   20 0 A8             LDA   X'FFFF'
0012     5C29   58 4 29             AND   *ALA,B
0013     F200   F0 2 00             ZJP   $+X'0000'
0014     7526   74 5 26             JMP   *)25,B
```

```
0015      1211    10 2 11            LDC   $+X'0011'
0016      2E01    28 6 01            LDA   IPBX,C
002C+B    0008
0017      4C2C    48 4 2C            SUB   =X'0008',B
0018      F202    F0 2 02            ZJP   $+X'0002'
0019      3805    38 0 05            STZ   X'0005'
001A      F201    F0 2 01            ZJP   $+X'0001'
001B      28A0    28 0 A0            LDA   X'FFFF'
001C      AC29    A8 4 29            STA   #ALA,B
001D      2C27    28 4 27            LDA   I,B
001E      4C2C    48 4 2C            SUB   =X'0008',B
001F      F202    F0 2 02            ZJP   $+X'0002'
0020      3805    38 0 05            STZ   X'0005'
0021      F201    F0 2 01            ZJP   $+X'0001'
0022      28A0    28 0 A0            LDA   X'FFFF'
0023      AC2D    A8 4 2D            STA   #ALB,B
0024      2C27    28 4 27            LDA   I,B
002E+B    0007
0025      4C2E    48 4 2E            SUB   =X'0007',B
0026      F202    F0 2 02            ZJP   $+X'0002'
0027      3805    38 0 05            STZ   X'0005'
0028      F201    F0 2 01            ZJP   $+X'0001'
0029      28A0    28 0 A0            LDA   X'FFFF'
002A      AC2F    A8 4 2F            STA   #ALC,B
002B      2C27    28 4 27            LDA   I,B
002C      4C2B    48 4 2B            SUB   =X'0006',B
002D      F202    F0 2 02            ZJP   $+X'0002'
002E      3805    38 0 05            STZ   X'0005'
002F      F201    F0 2 01            ZJP   $+X'0001'
0030      28A0    28 0 A0            LDA   X'FFFF'
0031      A803    A8 0 03            STA   X'0003'
0032      50A0    50 0 A0            EOR   X'FFFF'
0033      5C2F    58 4 2F            AND   #ALC,B
0034      5003    50 0 03            EOR   X'0003'
0035      A803    A8 0 03            STA   X'0003'
0036      50A0    50 0 A0            EOR   X'FFFF'
0037      5C2D    58 4 2D            AND   #ALB,B
0038      5003    50 0 03            EOR   X'0003'
0039      5C29    58 4 29            AND   #ALA,B
003A      F200    F0 2 00            ZJP   $+X'0000'
003B      753C    70 5 3C            JMP   *)500,B
003C      2C27    28 4 27            LDA   I,B
003D      4200    40 2 00            ADD   =X'0009'
003E      AC31    A8 4 31            STA   #AIA,B
003F      2D31    28 5 31            LDA   *#AIA,B
0040      F200    F0 2 00            ZJP   $+X'0000'
0041      7532    70 5 32            JMP   *)50 ,B
0042      2C27    28 4 27            LDA   I,B
0043      4200    40 2 00            ADD   =X'FFFF'
0044      AC31    A8 4 31            STA   #AIA,B
0045      2D31    28 5 31            LDA   *#AIA,B
0033+B    FFFF
0046      5433    50 4 33            EOR   =X'FFFF',B
0047      F200    F0 2 00            ZJP   $+X'0000'
0048      752B    70 5 2B            JMP   *)250,B
0049      2C27    28 4 27            LDA   I,B
004A      420D    40 2 0D            ADD   =X'0009'
004B      AC31    A8 4 31            STA   #AIA,B
0035+B    FFFF
004C      2C35    28 4 35            LDA   =X'FFFF',B
004D      AD31    A8 5 31            STA   *#AIA,B
004E      2C26    28 4 26            LDA   M1,B
004F      AC34    A8 4 34            STA   IPAT,B
0050      7536    70 5 36            JMP   *)100,B
0051      2C27    28 4 27    )50     LDA   I,B
0052      4200    40 2 00            ADD   =X'0009'
0053      AC31    A8 4 31            STA   #AIA,B
0037+B    0000
0054      2C37    28 4 37            LDA   =X'0000',B
0055      AD31    A8 5 31            STA   *#AIA,B
0056      3C34    38 4 34            STZ   IPAT,B
0057      2C27    28 4 27    )100    LDA   I,B
0058      AC31    A8 4 31            STA   #AIA,B
0059      4200    40 2 00            ADD   =X'0000'
005A      AC3A    A8 4 3A            STA   #AIB,B
```

```
005B   2D3A   28 5 3A          LDA   **AIB,B
005C   AC38   A8 4 38          STA    IREG,B
005D   2C31   28 4 31          LDA    *AIA,B
005E   4200   40 2 00          ADD   =X'000A'
005F   AC3B   A8 4 3B          STA    *AIC,B
0060   2D3B   28 5 3B          LDA   **AIC,B
0061   AC39   A8 4 39          STA    MASK,B

                               LPL
0062   7200   70 2 00          JMP    $+X'0000'
0063   0000                    DAT    X'0000'
0064   0009                    DAT    X'0009'
0065   FFFF                    DAT    X'FFFF'
0066   000E                    DAT    X'000E'
0067   000E                    DAT    X'000E'
0068   EF00   E8 7 00          SST   *H$CCD ,B
0069   0025                    ADL    N1
006A   0034                    ADL    IPAT
006B   0038                    ADL    IREG
006C   0039                    ADL    MASK
006D   2C27   28 4 27   )250   LDA    I ,B
006E   4C26   48 4 26          SUB   =X'0006' ,B
006F   BA00   B8 2 00          NJP    $+X'0000'
0070   753D   70 5 3D          JMP   *)500,B
0071   2C27   28 4 27          LDA    I ,B
0072   AC31   A8 4 31          STA    *AIA,B
0073   42F2   40 2 F2          ADD   =X'FFFF'
0074   AC3A   A8 4 3A          STA    *AIB,B
0075   2C31   28 4 31          LDA    *AIA,B
0076   4200   40 2 00          ADD   =X'0013'
0077   AC3B   A8 4 3B          STA    *AIC,B
0078   2D3B   28 5 3B          LDA   **AIC,B
0079   553A   50 5 3A          EOR   **AIB,B
007A   5433   50 4 33          EOR   =X'FFFF' ,B
007B   F200   F0 2 00          ZJP    $+X'0000'
007C   753C   70 5 3C          JMP   *)500,B
007D   2C27   28 4 27          LDA    I ,B
007E   42E7   40 2 E7          ADD   =X'FFFF'
007F   AC31   A8 4 31          STA    *AIA,B
0080   2D31   28 5 31          LDA   **AIA,B
0081   F200   F0 2 00          ZJP    $+X'0000'
0082   753C   70 5 3C          JMP   *)300,B
0083   2C27   28 4 27          LDA    I ,B
0084   420E   40 2 0E          ADD   =X'0013'
0085   AC31   A8 4 31          STA    *AIA,B
0086   2C37   28 4 37          LDA   =X'0000' ,B
0087   AD31   A8 5 31          STA   **AIA,B
0088   3C34   38 4 34          STZ    IPAT,B
0089   753D   70 5 3D          JMP   *)400,B
008A   2C27   28 4 27   )300   LDA    I ,B
008B   4207   40 2 07          ADD   =X'0013'
008C   AC31   A8 4 31          STA    *AIA,B
008D   2C35   28 4 35          LDA   =X'FFFF' ,B
008E   AD31   A8 5 31          STA   **AIA,B
008F   2C26   28 4 26          LDA    N1,B
0090   AC34   A8 4 34          STA    IPAT,B
0091   2C27   28 4 27   )400   LDA    I ,B
0092   AC31   A8 4 31          STA    *AIA,B
0093   4200   40 2 00          ADD   =X'0014'
0094   AC3A   A8 4 3A          STA    *AIB,B
0095   2D3A   28 5 3A          LDA   **AIB,B
0096   AC38   A8 4 38          STA    IREG,B
0097   2C31   28 4 31          LDA    *AIA,B
0098   4200   40 2 00          ADD   =X'001C'
0099   AC3B   A8 4 3B          STA    *AIC,B
009A   2D3B   28 5 3B          LDA   **AIC,B
009B   AC39   A8 4 39          STA    MASK,B
009C   EF34   E8 7 34          SST   *H$CCD ,B
009D   0025                    ADL    N1
009E   0034                    ADL    IPAT
009F   0038                    ADL    IREG
00A0   0039                    ADL    MASK
00A1   2C27   28 4 27          LDA    I ,B
003E+B 0004
00A2   4C3E   48 4 3E          SUB   =X'0004' ,B
00A3   BA00   B8 2 00          NJP    $+X'0000'
```

```
00A4    753B    7B 5 3B           JMP   *)5000,B
00A5    2C27    28 4 27           LDA    1 ,B
00A6    AC31    AB 4 31           STA    #A1A,B
00A7    4200    40 2 00           ADD   =X'0019'
00A8    AC3A    AB 4 3A           STA    #A1B,B
00A9    2D3A    28 5 3A           LDA   *#A1B,B
00AA    AC3B    AB 4 3B           STA    IREG,B
00AB    2C31    28 4 31           LDA    #A1A,B
00AC    4200    40 2 00           ADD   =X'0021'
00AD    AC3E    AB 4 3E           STA    #A1C,B
00AE    2D3E    28 5 3E           LDA   *#A1C,B
00AF    AC39    AB 4 39           STA    MASK,B
00B0    EF14    EB 7 14           SST   *M$CCO ,B
00B1    0025                      ADL    N1
00B2    0034                      ADL    IPAT
00B3    003B                      ADL    IREG
00B4    0039                      ADL    MASK
00B5    6427    60 4 27    J500   INC    1 ,B
003F*B  000A
00B6    2C3F    28 4 3F           LDA   =X'000A' ,B
00B7    4C27    48 4 27           SUB    1 ,B
00B8    5302    50 3 02           PJP   *$+X'0002'
00B9    7201    70 2 01           JMP    $+X'0001'
00BA    0003                      ADL    X'0003'
00BB    EDE7    EB 5 E7           SST   *EXIT,B
00BC    7540    70 5 40           JMP   *)5,B

                                  LPL
00BD    7200    70 2 00           JMP    $+X'0000'
00BE    0000                      DAT    X'0000'
00BF    0013                      DAT    X'0013'
00C0    0000                      DAT    X'0002'
00C1    0000                      DAT    X'0000'
00C2    0000                      DAT    X'0000'
00C3    0000                      DAT    X'0000'
0000    00CA                      ADL    X'00CA'
0000    0000                      DAT    X'0000'
0001    0AFF    00 2 FF           LDB    $+X'FFFF'
0002    1200    10 2 00    J5     LDC    $+X'0000'
0003    2E04    28 6 04           LDA    CRESETPB,C
0004    F200    F0 2 00           ZJP    $+X'0000'
0005    750D    70 5 0D           JMP   *)5000 ,B
0006    1204    10 2 04           LDC    $+X'0004'
0007    2E18    28 6 18           LDA    VPLRPB,C
0008    AB03    AB 6 03           STA    X'0003'
0009    58AB    58 0 AB           EOR    X'FFFF'
000A    5E19    58 6 19           AND    VPLLPB,C
000B    5003    50 0 03           EOR    X'0003'
000C    F200    F0 2 00           ZJP    $+X'0000'
000D    1200    10 2 00           LDC    $+X'0000'
000E    6011    60 6 11           INC    IVPL,C
000F    1200    10 2 00           LDC    $+X'0000'
0010    2E10    28 6 10           LDA    CADSUP,C
0011    F200    F0 2 00           ZJP    $+X'0000'
0012    1205    10 2 05           LDC    $+X'0005'
0013    660E    60 6 0E           INC    IADSUP,C
0014    1205    10 2 05           LDC    $+X'0005'
0015    2E1C    28 6 1C           LDA    CADSDOWN,C
0016    F200    F0 2 00           ZJP    $+X'0000'
0017    1205    10 2 05           LDC    $+X'0005'
0018    660F    60 6 0F           INC    IADSDOWN,C
0019    1205    10 2 05           LDC    $+X'0005'
001A    2E26    28 6 26           LDA    RUNLOGIC,C
001B    F200    F0 2 00           ZJP    $+X'0000'
001C    EDE4    E8 5 E4           SST   *M$IN,B
001D    0007                      ADL    N9
000F*B  0001
001E    2C0F    28 4 0F           LDA   =X'0001' ,B
001F    AC0E    AB 4 0E           STA    1 ,B
0020    2C0E    28 4 0E           LDA    1 ,B
0021    AC10    AB 4 10           STA    #A1A,B
0022    4200    40 2 00           ADD   =X'001D'
0023    AC11    AB 4 11           STA    #A1B,B
0024    2C10    28 4 10           LDA    #A1A,B
0025    4203    40 2 03           ADD   =X'001D'
```

```
0026   AC12  A8 4 12           STA   #AIC,B
0027   2D12  28 5 12           LDA   *#AIC,B
0028   6005  60 0 05           INC   X'0005'
0029   AD11  A8 5 11           STA   *#AIB,B
002A   2C10  28 4 10           LDA   #AIA,B
002B   420D  40 2 0D           ADD   =X'001D'
002C   AC13  A8 4 13           STA   #AID,B
002D   2C10  28 4 10           LDA   #AIA,B
002E   4200  40 2 00           ADD   =X'0000'
002F   AC14  A8 4 14           STA   #AIE,B
0030   2D13  28 5 13           LDA   *#AID,B
0031   4D14  48 5 14           SUB   *#AIE,B
0032   8200  80 2 00           PJP   $+X'0000'
0033   7515  70 5 15           JMP   *)2000 ,B
0034   2C0E  28 4 0E           LDA   I ,B
0035   420A  40 2 0A           ADD   =X'001D'
0036   AC10  A8 4 10           STA   #AIA,B
0016+B 0000
0037   2C16  28 4 16           LDA   =X'0000' ,B
0038   AD10  A8 5 10           STA   *#AIA,B
0039   FF00  E8 7 00           SST   *GOT:,B
003A   0005                    DAT   X'0005'
003B   0000                    ADL   )100
003C   0000                    ADL   )200
003D   0000                    ADL   )300
003E   0000                    ADL   )400
003F   000E                    ADL   I
0040   EDE4  E8 5 E4    )100   SST   *M:IN,B
0041   0009                    ADL   N13
0042   2C0F  28 4 0F           LDA   =X'0001' ,B
0043   122C  10 2 2C           LDC   $+X'002C'
0044   AE16  A8 6 16           STA   ISCAN ,C
0045   2E07  28 6 07           LDA   KEYENTRY,C
0017+B FFFF
0046   5417  50 4 17           EOR   =X'FFFF' ,B
0047   F200  F0 2 00           ZJP   $+X'0000'
0048   EDE4  E8 5 E4           SST   *M:IN,B
0049   0006                    ADL   N6
004A   7515  70 5 15           JMP   *)2000 ,B
004B   1208  10 2 08    )200   LDC   $+X'0008'
004C   2E16  28 6 16           LDA   ISCAN ,C
004D   F201  F0 2 01           ZJP   $+X'0001'
004E   7200  70 2 00           JMP   $+X'0000'
004F   7516  70 5 16           JMP   *)220,B
0050   1205  10 2 05           LDC   $+X'0005'
0051   601B  60 6 1B           INC   INTSCAN ,C
0052   2E1B  28 6 1B           LDA   INTSCAN ,C
0053   4C0B  48 4 0B           SUB   11 ,B
                               LPL
0054   7200  70 2 00           JMP   $+X'0000'
0055   0000                    DAT   X'0005'
0056   0000                    DAT   X'0000'
0057   0000                    DAT   X'0000'
0058   001D                    DAT   X'001D'
0059   0000                    DAT   X'0000'
005A   0000                    DAT   X'0000'
005B   BA00  B0 2 00           NJP   $+X'0000'
005C   2C0F  28 4 0F           LDA   =X'0001' ,B
005D   12F9  10 2 F9           LDC   $+X'FFFB'
005E   AE1B  A8 6 1B           STA   INTSCAN ,C
005F   EDE4  E8 5 E4    )220   SST   *M:IN,B
0060   000B                    ADL   N11
0061   EDE4  E8 5 E4           SST   *M:IN,B
0062   0002                    ADL   N5
0063   7515  70 5 15           JMP   *)2000 ,B
0064   EDE4  E8 5 E4    )300   SST   *M:IN,B
0065   0001                    ADL   N10
0066   1200  10 2 00           LDC   $+X'0000'
0067   2E65  28 6 65           LDA   SIMAX ,C
0068   2E64  28 6 64           LDE   SIMAX ,C
0069   EDEF  E8 5 EF           SST   *CIN:,B
006A   AC19  A8 4 19           STA   ISIMAX,B
006B   12EB  10 2 EB           LDC   $+X'FFEB'
006C   2E10  28 6 10           LDA   ISICOUNT,C
006D   4C19  48 4 19           SUB   ISIMAX,B
006E   8200  80 2 00           PJP   $+X'0000'
006F   751A  70 5 1A           JMP   *)350,B
```

```
001B+B  4100
001C+B  0000
0070    2C1C   20 4 1C              LDA   =X'4100' ,B
0071    241B   20 4 1B              LDE   =X'4100' ,B
0072    120C   10 2 0C              LDC   $+X'000C'
0073    AEB9   A8 6 B9              STA   PERCC1,C
0074    A0BB   A0 6 BB              STE   PERCC1,C
001D+B  0000                 )350
0075    2C1D   28 4 1D              LDA   =X'0000' ,B
0076    12E1   10 2 E1              LDC   $+X'FFE1'
0077    AE2F   A8 6 2F              STA   PERSCAN ,C
001E+B  0000
001F+B  0000
0078    2C1F   28 4 1F              LDA   =X'0000' ,B
0079    241E   20 4 1E              LDE   =X'0000' ,B
007A    EDEB   E8 5 EB              SST   *S11I,B
007B    0020                        ADL   PERCC1
007C    F200   F0 2 00              ZJP   $+X'0000'
0021+B  FFFF
007D    2C21   28 4 21              LDA   =X'FFFF' ,B
007E    12D9   10 2 D9              LDC   $+X'FFD9'
007F    AE2F   A8 6 2F              STA   PERSCAN ,C
0080    12D7   10 2 D7              LDC   $+X'FFD7'
0081    2E2F   28 6 2F              LDA   PERSCAN ,C
0082    5630   50 6 30              EOR   PERSCANX,C
0083    5417   50 4 17              EOR   =X'FFFF' ,B
0084    F200   F0 2 00              ZJP   $+X'0000'
0085    7522   70 5 22              JMP   *)380,B
0086    12D1   10 2 D1              LDC   $+X'FFD1'
0087    2E30   28 6 30              LDA   PERSCANX,C
0088    F200   F0 2 00              ZJP   $+X'0000'
0089    7523   70 5 23              JMP   *)360,B
008A    2C0A   28 4 0A              LDA   1SIDIS,B
008B    1200   10 2 00              LDC   $+X'0000'
008C    AE00   A8 6 00              STA   INTBS1,C
008D    7524   70 5 24              JMP   *)370,B
008E    2C0B   28 4 0B       )360   LDA   1SIABLE ,B
008F    AC25   A8 4 25              STA   INTBS1,B
0090    2C21   28 4 21       )370   LDA   =X'FFFF' ,B
0091    12C6   10 2 C6              LDC   $+X'FFC6'
0092    AE26   A8 6 26              STA   RUNLOGIC,C
0093    2C16   28 4 16       )380   LDA   =X'0000' ,B
0094    12C2   10 2 C2              LDC   $+X'FFC2'
0095    AE10   A8 6 10              STA   1S1COUNT,C
0096    12C1   10 2 C1              LDC   $+X'FFC1'
0097    2E2F   28 6 2F              LDA   PERSCAN ,C
0098    5417   50 4 17              EOR   =X'FFFF' ,B
0099    F200   F0 2 00              ZJP   $+X'0000'
009A    7515   70 5 15              JMP   *)2000 ,B
009B    EDE4   E8 5 E4              SST   *MIIN,B
009C    000C                        ADL   N15
009D    7515   70 5 15              JMP   *)2000 ,B
009E    EDE4   E8 5 E4       )400   SST   *MIIN,B
009F    0005                        ADL   N5
00A0    64FE   60 4 0E       )2000  INC   I ,B
0026+B  0004
00A1    2C26   28 4 26              LDA   =X'0004' ,B
00A2    4C0E   48 4 0E              SUB   I ,B
00A3    B302   B0 3 02              PJP   *$+X'0042'
00A4    7201   70 2 01              JMP   $+X'0001'
00A5    001F                        ADL   X'001F'
00A6    EDE7   E8 5 E7       )5000  SST   *EXIT,B
00A7    7527   70 5 27              JMP   *)5,B

                                    LPL
00A8    7200   70 2 00              JMP   $+X'0000'
00A9    0000                        DAT   X'0000'
00AA    0000                        DAT   X'0000'
0000    00B1                        ADL   X'00B1'

PROGRAM SIZE: 0177    DATA POOL: SIZE: 0040    ERROR COUNT: 0000
0000    0000                        DAT   X'0000'
0001    0AFF   00 2 FF              LDB   $+X'FFFF'
0002    1200   10 2 00       )5     LDC   $+X'0000'
0003    2E09   28 6 09              LDA   INFL,C
```

```
0004    F201   F0 2 01          ZJP   $+X'0001'
0005    7200   70 2 00          JMP   $+X'0000'
0006    7509   70 5 09          JMP   *)1010 ,B
0007    EF00   E8 7 00          SST   *GO1$,B
0008    0004                    DAT   X'0004'
0009    0000                    ADL   )100
000A    0000                    ADL   )500
000B    000A                    ADL   )500
000C    000A                    ADL   INFL
000D    1200   10 2 00   )100   LDC   $+X'0000'
000E    2E31   28 6 31          LDA   DEND,C
000F    F200   F0 2 00          ZJP   $+X'0000'
0010    750B   70 5 0B          JMP   *)105,B
0011    EDE9   E8 5 E9          SST   *H$1C,B
000C+B  0003
0012    000C                    ADL   *X'0003'
0013    1206   10 2 06          LDC   $+X'0006'
0014    3E30   38 6 30          STZ   DCNT,C
0015    1213   10 2 13   )105   LDC   $+X'0013'
0016    2E02   28 6 02          LDA   INP ,C
0017    AC06   A8 4 06          STA   HALF1 ,B
0018    2E03   28 6 03          LDA   INP ,C
0019    AC07   A8 4 07          STA   HALF2 ,B
001A    2E04   28 6 04          LDA   INP ,C
001B    AC08   A8 4 08          STA   HALF3 ,B
000D+B  0028
001C    4C0D   48 4 0D          SUB   *X'0028' ,B
001D    F200   F0 2 00          ZJP   $+X'0000'
001E    BA01   B8 2 01          NJP   $+X'0001'
001F    2C0D   28 4 0D          LDA   *X'0025' ,B
0020    AC08   A8 4 08          STA   HALF3 ,B
0021    2C08   28 4 08          LDA   HALF3 ,B
000E+B  4001
0022    1C0E   18 4 0E          LDG   *X'4001' ,B
0023    9805   98 0 05          SHF   X'0005'
0024    AC05   A8 4 05          STA   WDNO,B
0025    2C06   28 4 06          LDA   HALF1 ,B
000F+B  0008
0026    1C0F   18 4 0F          LDG   *X'0008' ,B
0027    9805   98 0 05          SHF   X'0005'
0028    4407   40 4 07          ADD   HALF2 ,B
0029    AC03   A8 4 03          STA   ADDR,B
002A    3C04   38 4 04          STZ   CCKS,B
002B    2C08   28 4 08          LDA   HALF3 ,B
002C    5407   50 4 07          EOR   HALF2 ,B
002D    5406   50 4 06          EOR   HALF1 ,B
002E    AC04   A8 4 04          STA   CCKS,B
002F    2C06   28 4 06          LDA   HALF1 ,B
0030    121D   10 2 1D          LDC   $+X'001D'
0031    AE02   A8 6 02          STA   OUT ,C
0032    2C07   28 4 07          LDA   HALF2 ,B
0033    AE03   A8 6 03          STA   OUT ,C
0034    2C08   28 4 08          LDA   HALF3 ,B
0035    AE04   A8 6 04          STA   OUT ,C
0036    1200   10 2 00          LDC   $+X'0000'
0037    2E06   28 6 06          LDA   STXSY ,C
0038    1208   10 2 08          LDC   $+X'0008'
0039    AE01   A8 6 01          STA   OUT ,C
003A    1225   10 2 25          LDC   $+X'0025'
003B    2E04   28 6 04          LDA   INP ,C
0011+B  0006
003C    4411   40 4 11          ADD   *X'0006' ,B
003D    AC10   A8 4 10          STA   M ,B
003E    2C10   28 4 10          LDA   M ,B
003F    4200   40 2 00          ADD   *X'FFFF'
0040    AC12   A8 4 12          STA   *AIA,B
0041    120B   10 2 0B          LDC   $+X'000B'
0042    2E05   28 6 05          LDA   ETXSY ,C
0043    AD12   A8 5 12          STA   **AIA,B
0014+B  0001
0044    2C14   28 4 14          LDA   *X'0001' ,B
0045    AC13   A8 4 13          STA   K ,B
0046    2C13   28 4 13          LDA   K ,B
0047    4005   40 0 05          ADD   X'0005'
0016+B  0005
```

```
0048      441B    40 4 1B              ADD   =X'0005' ,B
0049      AC15    A8 4 15              STA   N ,B
004A      2003    28 5 03              LDA   *ADDR,B
004B      5C02    58 4 02              AND   MASK2 ,B
004C      AC06    A8 4 06              STA   HALF1 ,B
004D      2003    28 5 03              LDA   *ADDR,B
004E      5C01    58 4 01              AND   MASK1 ,B
004F      AC07    A8 4 07              STA   HALF2 ,B
0050      2C06    28 4 06              LDA   HALF1 ,B
0017+B    4000
0051      1C17    18 4 17              LDG   =X'4000' ,B
0052      9805    98 0 05              SHF   X'0005'
0053      AC06    A8 4 06              STA   HALF1 ,B
0054      2C04    28 4 04              LDA   CCKS,B
0055      5406    50 4 06              EOR   HALF1 ,B
0056      5407    50 4 07              EOR   HALF2 ,B
0057      AC04    A8 4 04              STA   CCKS,B
0058      2C15    28 4 15              LDA   N ,B
0059      AC12    A8 4 12              STA   *AIA,B
005A      4200    40 2 00              ADD   =X'FFFC'
005B      AC18    A8 4 18              STA   *AIB,B

                                       LPL
005C      7200    70 2 00              JMP   $+X'0000'
005D      0000                         DAT   X'0000'
005E      0000                         DAT   X'0000'
005F      0000                         DAT   X'0000'
0060      0000                         DAT   X'0000'
0061      FFFF                         DAT   X'FFFF'
0062      FFFE                         DAT   X'FFFE'
0063      2C06    28 4 06              LDA   HALF1 ,B
0064      AD18    A8 5 18              STA   **AIB,B
0065      2C12    28 4 12              LDA   *AIA,B
0066      42FB    40 2 FB              ADD   =X'FFFF'
0067      AC19    A8 4 19              STA   *AIC,B
0068      2C07    28 4 07              LDA   HALF2 ,B
0069      AD19    A8 5 19              STA   **AIC,B
006A      6403    60 4 03     )150     INC   ADDR,B
006B      6413    60 4 13              INC   K ,B
006C      2C05    28 4 05              LDA   HDNO,B
006D      4C13    48 4 13              SUB   K ,B
006E      B2D7    B0 2 D7              PJP   $+X'FFD7'
006F      2C10    28 4 10              LDA   M ,B
0070      42EF    40 2 EF              ADD   =X'0000'
0071      AC12    A8 4 12              STA   *AIA,B
0072      2C04    28 4 04              LDA   CCKS,B
0073      AD12    A8 5 12              STA   **AIA,B
0074      2C14    28 4 14              LDA   =X'0001' ,B
0075      12EA    10 2 EA              LDC   $+X'FFEA'
0076      AE2F    A8 6 2F              STA   MD,C
0077      12E6    10 2 E6              LDC   $+X'FFE6'
0078      2E04    28 6 04              LDA   INP ,C
001A+B    0007
0079      441A    40 4 1A              ADD   =X'0007' ,B
007A      12E5    10 2 E5              LDC   $+X'FFE5'
007B      AE30    A8 6 30              STA   DCNT,C
001B+B    0000
007C      2C1B    28 4 1B              LDA   =X'0000' ,B
007D      AE31    A8 6 31              STA   DCND,C
001C+B    FFFF
007E      2C1C    28 4 1C              LDA   =X'FFFF' ,B
007F      12DE    10 2 DE              LDC   $+X'FFDE'
0080      AE07    A8 6 07              STA   ACCFL ,C
0081      12DF    10 2 DF              LDC   $+X'FFDF'
0082      2E00    28 6 00              LDA   DATSY ,C
0083      8810    88 0 10              IOA   X'0010'
0084      751D    70 5 1D              JMP   *)1000 ,B
0085      EDE9    E8 5 E9     )500     SST   *MSTD,B
001E+B    0002
0086      001E                         ADL   =X'0002'
0087      2C14    28 4 14              LDA   =X'0001' ,B
0088      12D7    10 2 D7              LDC   $+X'FFD7'
0089      AE2F    A8 6 2F              STA   MD,C
008A      AE30    A8 6 30              STA   DCNT,C
008B      EFD3    E8 7 D3              SST   *GOT:,B
```

```
008C    0004                              DAT   X'0004'
008D    0000                              ADL   )1000
008E    0000                              ADL   )510
008F    0000                              ADL   )610
0090    000A                              ADL   INFL
0091    12CF    10 2 CF    )510           LDC   $+X'FFCF'
0092    2EE3    28 6 E3                   LDA   NAKSY ,C
0093    8810    88 0 10                   IOA   X'0010'
0094    751D    70 5 1D                   JMP   *)1000 ,B
0095    12CB    10 2 CB    )610           LDC   $+X'FFCB'
0096    2EE7    28 6 E7                   LDA   CSFSY ,C
0097    8810    88 0 10                   IOA   X'0010'
0098    12C5    10 2 C5    )1000          LDC   $+X'FFC5'
0099    3EE8    38 6 E8                   STZ   ICNT,C
009A    3EE9    38 6 E9                   STZ   INFL,C
009B    EDE7    E8 5 E7    )1010          SST   *EXIT,B
009C    751F    70 5 1F                   JMP   *)5,B
0000    00A3                              ADL   X'00A3'
PROGRAM SIZE: 01B3      DATA POOL SIZE: 0032      ERROR COUNT:  0000
0000    0000                              DAT   X'0000'
0001    0AFF    08 2 FF                   LDB   $+X'FFFF'
0002    8891    88 0 91                   IOA   X'FF91'
0003    AC02    A8 4 02                   STA   INPUT ,B
0004    1200    10 2 00                   LDC   $+X'0000'
0005    2E06    28 6 06                   LDA   ICNT,C
0006    F200    F0 2 00                   ZJP   $+X'0000'
0007    7504    70 5 04                   JMP   *)30 ,B
0008    1204    10 2 04                   LDC   $+X'0004'
0009    2E07    28 6 07                   LDA   ACCFL ,C
0005+B  FFFF
000A    5405    50 4 05                   LDR   *X'FFFF' ,B
000B    F200    F0 2 00                   ZJP   $+X'0000'
000C    7506    70 5 06                   JMP   *)100,B
0006+B  0006
000D    2C06    28 4 06                   LDA   *X'0006' ,B
000E    AC07    A8 4 07                   STA   IMXCNT,B
0009+B  0000
000F    2C09    28 4 09                   LDA   *X'0000' ,B
0010    1208    10 2 08                   LDC   $+X'0008'
0011    AE06    A8 6 06                   STA   ENDFL ,C
0012    3C03    38 4 03                   STZ   CCKS,B
0013    3E09    38 6 09                   STZ   INFL,C
0014    2C02    28 4 02                   LDA   INPUT ,B
0015    1200    10 2 00                   LDC   $+X'0000'
0016    4E00    48 6 00                   SUB   DATSY ,C
0017    F201    F0 2 01                   ZJP   $+X'0001'
0018    7200    70 2 00                   JMP   $+X'0000'
0019    750A    70 5 0A                   JMP   *)1000 ,B
001A    7506    70 5 06                   JMP   *)100,B
001B    1206    10 2 06    )30            LDC   $+X'0006'
001C    2E06    28 6 06                   LDA   ICNT,C
001D    6605    66 0 05                   DCR   X'0005'
001E    F200    F0 2 00                   ZJP   $+X'0000'
001F    BA01    B8 2 01                   NJP   $+X'0001'
0020    750B    70 5 0B                   JMP   *)40 ,B
0021    2C02    28 4 02                   LDA   INPUT ,B
0022    120D    10 2 0D                   LDC   $+X'000D'
0023    4EE4    48 6 E4                   SUB   ENQSY ,C
0024    F201    F0 2 01                   ZJP   $+X'0001'
0025    7200    70 2 00                   JMP   $+X'0000'
0026    750A    70 5 0A                   JMP   *)1000 ,B
0027    7506    70 5 06                   JMP   *)100,B
0028    120D    10 2 0D    )40            LDC   $+X'000D'
0029    2E06    28 6 06                   LDA   ICNT,C
000C+B  0005
002A    4C0C    48 4 0C                   SUB   *X'0005' ,B
002B    BA00    B8 2 00                   NJP   $+X'0000'
002C    750C    70 5 0C                   JMP   *)60 ,B
002D    1205    10 2 05                   LDC   $+X'0005'
002E    2E08    28 6 08                   LDA   ICNT,C
002F    4202    40 2 02                   ADD   *X'0000'
0030    AC0E    A8 4 0E                   STA   DATA,B
0031    2C02    28 4 02                   LDA   INPUT ,B
0032    AD0E    A8 5 0E                   STA   **DATA,B
```

```
0033    2C03   28 4 03            LDA   CCKS,B
0034    5402   50 4 02            LOR   INPUT,B
0035    AC03   A8 4 03            STA   CCKS,B
0036    750A   70 5 0A            JMP   *)1000,B
0037    1208   10 2 08    )60     LDC   $+X'0008'
0038    2E08   28 6 08            LDA   ICNT,C
000F+B  0006
0039    4C0F   48 4 0F            SUB   =X'0006',B
003A    F201   F0 2 01            ZJP   $+X'0001'
003B    7200   70 2 00            JMP   $+X'0000'
003C    7510   70 5 10            JMP   *)70,B
003D    2C02   28 4 02            LDA   INPUT,B
003E    121C   10 2 1C            LDC   $+X'001C'
003F    4E05   48 6 05            SUB   ETXSY,C
0040    F201   F0 2 01            ZJP   $+X'0001'
0041    7200   70 2 00            JMP   $+X'0000'
0042    750A   70 5 0A            JMP   *)1000,B
0043    7506   70 5 06            JMP   *)100,B
0044    2C02   28 4 02    )70     LDA   INPUT,B
0045    4C03   48 4 03            SUB   CCKS,B
0046    F201   F0 2 01            ZJP   $+X'0001'
0047    7200   70 2 00            JMP   $+X'0000'
0048    7511   70 5 11            JMP   *)900,B
0012+B  0003
0049    2C12   28 4 12            LDA   =X'0003',B
004A    1213   10 2 13            LDC   $+X'0013'
004B    AE09   A8 6 09            STA   INFL,C
004C    7513   70 5 13            JMP   *)101,B
0014+B  0002              )100
004D    2C14   28 4 14            LDA   =X'0002',B
004E    1204   10 2 04            LDC   $+X'0004'
004F    AE09   A8 6 09            STA   INFL,C
0050    2C05   28 4 05    )101    LDA   =X'FFFF',B
0051    1203   10 2 03            LDC   $+X'0003'
0052    AE08   A8 6 08            STA   ICNT,C
0015+B  FFFF
0053    2C15   28 4 15            LDA   =X'FFFF',B
0054    AE07   A8 6 07            STA   ACCFL,C
0055    7516   70 5 16            JMP   *)800,B
0056    2C09   28 4 09    )900    LDA   =X'0000',B
0057    1206   10 2 06            LDC   $+X'0006'
0058    AE07   A8 6 07            STA   ACCFL,C
0017+B  0001
0059    2C17   28 4 17            LDA   =X'0001',B
005A    AE09   A8 6 09            STA   INFL,C

                                  LPL
005B    7200   70 2 00            JMP   $+X'0000'
005C    0000                      DAT   X'0000'
005D    0000                      DAT   X'0000'
005E    EDE4   E8 5 E4    )800    SST   *MAIN,B
005F    0001                      ADL   N7
0060    2C17   28 4 17            LDA   =X'0001',B
0061    12FB   10 2 FB            LDC   $+X'FFFB'
0062    AE30   A8 6 30            STA   INP,C
0063    2C15   28 4 15            LDA   =X'FFFF',B
0064    AE0D   A8 6 0D            STA   ENDFL,C
0065    6605   60 6 05            INC   ICOMP,C
0066    12F6   10 2 F6    )1000   LDC   $+X'FFF6'
0067    6608   60 6 08            INC   ICNT,C
0068    6C07   68 4 07            DCR   IMXCNT,B
0069    2C07   28 4 07            LDA   IMXCNT,B
006A    F201   F0 2 01            ZJP   $+X'0001'
006B    7200   70 2 00            JMP   $+X'0000'
006C    72E0   70 2 E0            JMP   )100
006D    71DF   70 1 DF            JMP   *X'FFDF'
006E    EDE7   E8 5 E7            SST   *EXIT,B
0000    0075                      ADL   X'0075'
PROGRAM SIZE: 0117     DATA POOL SIZE: 0024     ERROR COUNT: 0000

0000    0000                      DAT   X'0000'
0001    0AFF   08 2 FF            LDB   $+X'FFFF'
0002    2C49   28 4 49    )5      LDA   N5,B
0003    4200   40 2 00            ADD   =X'0005'
0004    AC50   A8 4 50            STA   WAIA,B
```

```
0005      1200     10 2 00            LDC    $+X'0000'
0006      2E01     28 6 01            LDA    IPBX,C
0007      4200     40 2 00            ADD    =X'0039'
0008      AC51     A8 4 51            STA    *A1B,B
0009      2D51     28 5 51            LDA    **A1B,B
000A      AD50     A8 5 50            STA    **A1A,B
000B      2E04     28 6 04            LDA    INDEX1,C
0052+B    FFFF
000C      4C52     48 4 52            SUB    =X'FFFF' ,B
000D      F200     F0 2 00            ZJP    $+X'0000'
000E      7553     70 5 53            JMP    *)10 ,B
000F      120A     10 2 0A            LDC    $+X'000A'
0010      2E01     28 6 01            LDA    IPBX,C
0054+B    0007
0011      4C54     48 4 54            SUB    =X'0007' ,B
0012      B200     B0 2 00            PJP    $+X'0000'
0013      7555     70 5 55            JMP    *)950,B
0014      2C0D     28 4 0D            LDA    N1,B
0015      AC56     A8 4 56            STA    N ,B
0016      7557     70 5 57            JMP    *)45 ,B
0017      1208     10 2 08   )10      LDC    $+X'0008'
0018      2E08     28 6 08            LDA    INDEX3,C
0019      4C52     48 4 52            SUB    =X'FFFF' ,B
001A      F200     F0 2 00            ZJP    $+X'0000'
001B      7558     70 5 58            JMP    *)50 ,B
001C      1205     10 2 05            LDC    $+X'0005'
001D      2E01     28 6 01            LDA    IPBX,C
001E      4C0D     48 4 0D            SUB    N1,B
001F      F200     F0 2 00            ZJP    $+X'0000'
0020      7559     70 5 59            JMP    *)15 ,B
0021      1200     10 2 00            LDC    $+X'0000'
0022      2E13     28 6 13            LDA    BR,C
0023      F200     F0 2 00            ZJP    $+X'0000'
0024      7555     70 5 55            JMP    *)950,B
0025      2C49     28 4 49            LDA    N5,B
0026      4223     40 2 23            ADD    =X'0005'
0027      AC50     A8 4 50            STA    *A1A,B
0028      2C4E     28 4 4E            LDA    N2,B
0029      AD50     A8 5 50            STA    **A1A,B
002A      7555     70 5 55            JMP    *)950,B
002B      120F     10 2 0F   )15      LDC    $+X'000F'
002C      2E01     28 6 01            LDA    IPBX,C
002D      4C54     48 4 54            SUB    =X'0007' ,B
002E      B200     B0 2 00            PJP    $+X'0000'
002F      7555     70 5 55            JMP    *)950,B
0030      1205     10 2 05            LDC    $+X'0005'
0031      2E01     28 6 01            LDA    IPBX,C
0032      4C10     48 4 10            SUB    N8,B
0033      F201     F0 2 01            ZJP    $+X'0001'
0034      7200     70 2 00            JMP    $+X'0000'
0035      755A     70 5 5A            JMP    *)40 ,B
0036      1206     10 2 06            LDC    $+X'0006'
0037      2E09     28 6 09            LDA    DATENTRY,C
0038      5452     50 4 52            LOR    =X'FFFF' ,B
0039      F200     F0 2 00            ZJP    $+X'0000'
003A      755A     70 5 5A            JMP    *)40 ,B
003B      1205     10 2 05            LDC    $+X'0005'
003C      2E0D     28 6 0D            LDA    DADR,C
003D      F200     F0 2 00            ZJP    $+X'0000'
003E      755B     70 5 5B            JMP    *)100,B
003F      1224     10 2 04            LDC    $+X'0004'
0040      2E0C     28 6 0C            LDA    IOPT,C
0041      AE08     A8 6 08            STA    INDEX3,C
0042      7555     70 5 55            JMP    *)950,B
0043      2C46     28 4 46   )40      LDA    N3,B
0044      AC56     A8 4 56            STA    N ,B
0045      2C46     28 4 46   )45      LDA    N3,B
0046      AC5C     A8 4 5C            STA    I ,B
0047      755D     70 5 5D            JMP    *)1000 ,B
0048      EF00     E8 7 00   )50      SST    *OUT1,B
0049      0009                        DAT    X'0009'
004A      0000                        ADL    )100
004B      0000                        ADL    )200
004C      0000                        ADL    )600
004D      004C                        ADL    )600
```

```
004E    004D                     ADL   )000
004F    004E                     ADL   )600
0050    0000                     ADL   )700
0051    0000                     ADL   )800
0052    005E                     ADL   IPDX
0053    1200    10 2 00   )100   LDC   $+X'0000'
0054    2E19    28 6 19          LDA   REFDMD,C
0055    2618    20 6 18          LDE   REFDMD,C
0056    EDEF    E8 5 EF          SST   *C10:,B
0057    1218    10 2 18          LDC   $+X'0018'
0058    AE06    A8 6 06          STA   IWINDOW ,C

                                 LPL
0059    7200    70 2 00          JMP   $+X'0000'
005A    0000                     DAT   X'0000'
005B    0000                     DAT   X'0000'
005C    0000                     DAT   X'0000'
005D    0000                     DAT   X'0000'
005E    0000                     DAT   X'0000'
005F    0000                     DAT   X'0000'
0060    12FD    10 2 FD          LDC   $+X'FFFD'
0061    2E13    28 6 13          LDA   BR,C
0062    F200    F0 2 00          ZJP   $+X'0000'
0063    755F    70 5 5F          JMP   *)110,B
0064    2C49    28 4 49          LDA   N5,B
0065    42F5    40 2 F5          ADD   =X'0005'
0066    AC58    A8 4 58          STA   *AIA,B
0067    2C0E    28 4 0E          LDA   N2,B
0068    AD58    A8 5 58          STA   *#AIA,B
0069    7560    70 5 60          JMP   *)120,B
006A    12F3    10 2 F3   )110   LDC   $+X'FFF3'
006B    2E09    28 6 09          LDA   GO,C
006C    A803    A8 0 03          STA   X'0003'
006D    50A0    50 0 A0          EOR   X'FFFF'
006E    5E0C    58 6 0C          AND   HOLD,C
006F    5003    50 0 03          EOR   X'0003'
0070    5452    50 4 52          EOR   =X'FFFF' ,B
0071    F200    F0 2 00          ZJP   $+X'0000'
0072    7560    70 5 60          JMP   *)120,B
0073    12EC    10 2 EC          LDC   $+X'FFEC'
0074    2E19    28 6 19          LDA   REFDMD,C
0075    2618    20 6 18          LDE   REFDMD,C
0076    EDEB    E8 5 EB          SST   *S11:,B
0077    8061                     ADL   DDMD
0078    AC12    A8 4 12          STA   TEMP,B
0079    A411    A0 4 11          STE   TEMP,B
007A    B200    B0 2 00          PJP   $+X'0000'
007B    7560    70 5 60          JMP   *)120,B
007C    2C12    28 4 12          LDA   TEMP,B
007D    2411    20 4 11          LDE   TEMP,B
007E    EDEF    E8 5 EF          SST   *C10:,B
007F    AC11    A8 4 11          STA   ITEMP ,B
0080    4C0D    48 4 0D          SUB   N1,B
0081    BA00    B8 2 00          NJP   $+X'0000'
0082    7560    70 5 60          JMP   *)120,B
0083    12D8    10 2 D8          LDC   $+X'FFD8'
0084    6606    60 6 06          INC   IWINDOW ,C
0085    2C0D    28 4 0D   )120   LDA   N1,B
0086    AC5C    A8 4 5C          STA   I ,B
0087    7562    70 5 62          JMP   *)620,B
0088    12D5    10 2 D5   )150   LDC   $+X'FFD5'
0089    2E39    28 6 39          LDA   ATS ,C
008A    F200    F0 2 00          ZJP   $+X'0000'
008B    7563    70 5 63          JMP   *)152,B
008C    12D3    10 2 D3          LDC   $+X'FFD3'
008D    2E01    28 6 01          LDA   DDMD,C
008E    2600    20 6 00          LDE   DDMD,C
008F    EDEF    E8 5 EF          SST   *C10:,B
0090    12CB    10 2 CB          LDC   $+X'FFCB'
0091    AE06    A8 6 06          STA   IWINDOW ,C
0092    7564    70 5 64          JMP   *)155,B
0093    12CC    10 2 CC   )152   LDC   $+X'FFCC'
0094    2E47    28 6 47          LDA   TASDMD,C
0095    2646    20 6 46          LDE   TASDMD,C
0096    EDEF    E8 5 EF          SST   *C10:,B
```

```
0097      12C4   10 2 C4          LDC   $+X'FFC4'
0098      AE06   A8 0 06          STA   IWINDOW ,C
0099      645C   60 4 5C   )150   INC   I ,B
009A      7565   70 5 65          JMP   *)900,B
009B      2C0E   28 4 0E   )100   LDA   N2,B
009C      AC5C   A8 4 5C          STA   I ,B
009D      AC56   A8 4 56          STA   N ,B
009E      755D   70 5 5D          JMP   *)1000 ,B
009F      12BE   10 2 BE   )200   LDC   $+X'FFBE'
00A0      2E39   28 0 39          LDA   AT5 ,C
00A1      5452   50 4 52          EOR   *X'FFFF' ,B
00A2      F200   F0 2 00          ZJP   $+X'0000'
00A3      7566   70 5 66          JMP   *)600,B
00A4      12B8   10 2 B8          LDC   $+X'FFB8'
00A5      2E45   28 0 45          LDA   TABRATE ,C
00A6      2644   20 0 44          LDE   TABRATE ,C
00A7      EDEF   E8 5 EF          SST   *C10;,B
00A8      12B3   10 2 B3          LDC   $+X'FFB3'
00A9      AE06   A8 0 06          STA   IWINDOW ,C
00AA      7567   70 5 67          JMP   *)610,B
00AB      12B0   10 2 B0   )600   LDC   $+X'FFB0'
00AC      2E01   28 0 01          LDA   IPBX,C
00AD      4005   40 0 05          ADD   X'0005'
00AE      4200   40 2 00          ADD   *X'FFFE'
00AF      AC50   A8 4 50          STA   *AIA,B
00B0      3804   38 0 04          STZ   X'0004'
00B1      3805   38 0 05          STZ   X'0005'
00B2      C550   C0 5 50          ADA   *#AIA,B
00B3      EDEF   E8 5 EF          SST   *C10;,B
00B4      AE06   A8 0 06          STA   IWINDOW ,C
00B5      2C0F   28 4 0F   )610   LDA   N4,B
00B6      AC5C   A8 4 5C          STA   I ,B
00B7      2C48   28 4 48   )620   LDA   N3,B
00B8      AC56   A8 4 56          STA   N ,B
00B9      755D   70 5 5D          JMP   *)1000 ,B
00BA      12A1   10 2 A1   )650   LDC   $+X'FFA1'
00BB      2E01   28 0 01          LDA   IPBX,C
00B8+B    0006
00BC      4C06   48 4 06          SUB   *X'0006' ,B
00BD      F200   F0 2 00          ZJP   $+X'0000'
00BE      72DC   70 2 DC          JMP   )160
00BF      129E   10 2 9E          LDC   $+X'FF9E'
00C0      2E13   28 0 13          LDA   BR,C
00C1      F200   F0 2 00          ZJP   $+X'0000'
00C2      7569   70 5 69          JMP   *)660,B
00C3      129A   10 2 9A          LDC   $+X'FF9A'
00C4      2E00   28 0 00          LDA   GC,C
00C5      F200   F0 2 00          ZJP   $+X'0000'
00C6      756A   70 5 6A          JMP   *)680,B
00C7      1296   10 2 96          LDC   $+X'FF96'
00C8      2E2D   28 0 2D          LDA   GVBIAS,C
00C9      262C   20 0 2C          LDE   GVBIAS,C
00CA      EDEF   E8 5 EF          SST   *C10;,B
00CB      1290   10 2 90          LDC   $+X'FF90'
00CC      AE06   A8 0 06          STA   IWINDOW ,C
00CD      7555   70 5 55          JMP   *)950,B
00CE      1200   10 2 00   )660   LDC   $+X'0000'
00CF      2E5F   28 0 5F          LDA   GR7 ,C
00D0      265E   20 0 5E          LDE   GR7 ,C
00D1      EDEC   E8 5 EC          SST   *R11;,B
00D2      8066                    ADL   SPD
00D3      EDED   E8 5 ED          SST   *D11;,B
00DC+B    45A3
00DD+B    C2BE
00D4      806E                    ADL   *X'45A3'
00D5      EDEF   E8 5 EF          SST   *C10;,B
00D6      1285   10 2 85          LDC   $+X'FF85'
00D7      AE06   A8 0 06          STA   IWINDOW ,C
00D8      7555   70 5 55          JMP   *)950,B
00D9      1280   10 2 80   )680   LDC   $+X'FF80'
00DA      2E57   28 0 57          LDA   GVPOS ,C
00DB      2656   20 0 56          LDE   GVPOS ,C
00DC      EDEF   E8 5 EF          SST   *C10;,B
00DD      1200   10 2 00          LDC   $+X'0000'
00DE      AE06   A8 0 06          STA   IWINDOW ,C
00DF      7555   70 5 55          JMP   *)950,B
```

```
00E0    1203   10 2 03   )700   LDC    $+X'0003'
00E1    2E04   28 6 04          LDA    INDEX1,C
00E2    4C49   48 4 49          SUB    N5,B
00E3    BA00   B8 2 00          NJP    $+X'0000'
00E4    756E   70 5 6E          JMP    *)750,B
00E5    1205   10 2 05          LDC    $+X'0005'
00E6    2E05   28 6 05          LDA    INDEX2,C
00E7    4200   40 2 00          ADD    =X'FFFF'
00E8    AC50   A8 4 50          STA    #AIA,B
00E9    2D50   28 5 50          LDA    *#AIA,B
00EA    AE06   A8 6 06          STA    IWINDOW ,C
00EB    EF00   E8 7 00          SST    *GOT!,B
00EC    0005                    DAT    X'0005'
00ED    0000                    ADL    )710
00EE    0000                    ADL    )720
00EF    0000                    ADL    )730
00F0    00EF                    ADL    )730
00F1    80EF                    ADL    INDEX1
00F2    120D   10 2 0D   )710   LDC    $+X'000D'
00F3    2E06   28 6 06          LDA    IWINDOWL,C
00F4    F200   F0 2 00          ZJP    $+X'0000'
00F5    2C0D   28 4 0D          LDA    N1,B
00F6    1204   10 2 04          LDC    $+X'0004'
00F7    AE06   A8 6 06          STA    IWINDOW ,C
00F8    7555   70 5 55          JMP    *)950,B
00F9    1203   10 2 03   )720   LDC    $+X'0003'
00FA    2E06   28 6 06          LDA    IWINDOW ,C
00FB    BA00   B8 2 00          NJP    $+X'0000'
00FC    7570   70 5 70          JMP    *)725,B
00FD    1204   10 2 04          LDC    $+X'0004'
00FE    2E06   28 6 06          LDA    IWINDOW ,C
00FF    5452   50 4 52          EOR    =X'FFFF' ,B
0100    6005   60 0 05          INC    X'0005'
0101    AE06   A8 6 06          STA    IWINDOW ,C
0102    2C49   28 4 49          LDA    N5,B
0103    4200   40 2 00          ADD    =X'0005'
0104    AC50   A8 4 50          STA    #AIA,B

                                LPL
0105    7200   70 2 00          JMP    $+X'0000'
0106    005A                    ADL    X'005A'
0107    0000                    DAT    X'0000'
0108    005E                    ADL    X'005E'
0109    FFFE                    DAT    X'FFFE'
010A    0000                    DAT    X'0000'
010B    FFFF                    DAT    X'FFFF'
010C    2C4A   28 4 4A          LDA    N10 ,B
010D    AD50   A8 5 50          STA    *#AIA,B
010E    12F9   10 2 F9   )725   LDC    $+X'FFF9'
010F    2E06   28 6 06          LDA    IWINDOW ,C
0071+B  270F
0110    4C71   48 4 71          SUB    =X'270F' ,B
0111    BA00   B8 2 00          NJP    $+X'0000'
0112    2C71   28 4 71          LDA    =X'270F' ,B
0113    12F4   10 2 F4          LDC    $+X'FFF4'
0114    AE06   A8 6 06          STA    IWINDOW ,C
0115    7555   70 5 55          JMP    *)950,B
0116    12F1   10 2 F1   )730   LDC    $+X'FFF1'
0117    2E05   28 6 05          LDA    INDEX2,C
0118    4005   40 0 05          ADD    X'0005'
0119    4200   40 2 00          ADD    =X'FFFE'
011A    AC50   A8 4 50          STA    #AIA,B
011B    3804   38 0 04          STZ    X'0004'
011C    3805   38 0 05          STZ    X'0005'
011D    C550   C0 5 50          ADA    *#AIA,B
011E    AC12   A8 4 12          STA    TEMP,B
011F    A411   A0 4 11          STE    TEMP,B
0120    7572   70 5 72          JMP    *)900,B
0121    12E6   10 2 E6   )750   LDC    $+X'FFE6'
0122    2E05   28 6 05          LDA    INDEX2,C
0123    4200   40 2 00          ADD    =X'FFFF'
0124    AC50   A8 4 50          STA    #AIA,B
0125    2D50   28 5 50          LDA    *#AIA,B
0126    AE06   A8 6 06          STA    IWINDOW ,C
0127    2E04   28 6 04          LDA    INDEX1,C
```

```
0128    4C0F    48 4 0F              SUB   N4,B
0129    AC73    A8 4 73              STA   J ,B
012A    2C49    28 4 49              LDA   N5,B
012B    42DB    48 2 DB              ADD   =X'0005'
012C    AC51    A8 4 51              STA   #A1B,B
012D    2C73    28 4 73              LDA   J ,B
012E    4200    48 2 00              ADD   =X'0041'
012F    AC74    A8 4 74              STA   #A1C,B
0130    2D74    28 5 74              LDA   *#A1C,B
0131    AD51    A8 5 51              STA   *#A1B,B
0132    EFD0    E8 7 D0              SST   *C01I,B
0133    0000                         DAT   X'0000'
0134    00F1                         ADL   )710
0135    00F8                         ADL   )720
0136    0000                         ADL   )760
0137    0136                         ADL   )760
0138    0137                         ADL   )760
0139    0073                         ADL   J
013A    12CD    18 2 CD     )700     LDC   $+X'FFCD'
013B    2E05    28 6 05              LDA   INDEX2,C
013C    4005    40 0 05              ADD   X'0005'
013D    4200    48 2 00              ADD   =X'FFFE'
013E    AC50    A8 4 50              STA   #A1A,B
013F    3604    38 6 04              STZ   X'0004'
0140    3605    38 6 05              STZ   X'0005'
0141    C550    C0 5 50              ADA   *#A1A,B
0142    AC12    A8 4 12              STA   TEMP,B
0143    A411    A0 4 11              STE   TEMP,B
0144    7572    70 5 72              JMP   *)500,B
0145    1200    18 2 00     )600     LDC   $+X'0000'
0146    2E12    28 6 12              LDA   VTLSTPB ,C
0147    5452    50 4 52              EOR   =X'FFFF' ,B
0148    F200    F8 2 00              ZJP   $+X'0000'
0149    7575    70 5 75              JMP   *)650,B
014A    12B0    18 2 B0              LDC   $+X'FFB0'
014B    2E03    28 6 03              LDA   NVTEST,C
014C    F201    F8 2 01              ZJP   $+X'0001'
014D    7200    70 2 00              JMP   $+X'0000'
014E    7576    70 5 76              JMP   *)630,B
014F    1268    18 2 B8              LDC   $+X'FFB8'
0150    2E03    28 6 03              LDA   NVTEST,C
0151    AE00    A8 6 00              STA   INWINDOW ,C
0152    2C49    28 4 49              LDA   N5,B
0153    AC5C    A8 4 5C              STA   I ,B
0154    7562    70 5 62              JMP   *)620,B
0155    1262    18 2 62     )630     LDC   $+X'FFB2'
0156    2E05    28 6 05              LDA   INDEX2,C
0157    440F    40 4 0F              ADD   N4,B
0158    AC73    A8 4 73              STA   J ,B
0159    7577    70 5 77              JMP   *)800,B
015A    12AD    18 2 AD     )650     LDC   $+X'FFAD'
015B    2E05    28 6 05              LDA   INDEX2,C
015C    AC73    A8 4 73              STA   J ,B
015D    2C73    28 4 73     )800     LDA   J ,B
015E    4200    48 2 00              ADD   =X'0010'
015F    AC50    A8 4 50              STA   #A1A,B
0160    2D50    28 5 50              LDA   *#A1A,B
0161    EDEE    E8 5 EE              SST   *C01I,B
0162    AC12    A8 4 12              STA   TEMP,B
0163    A411    A0 4 11              STE   TEMP,B
0164    EDED    E8 5 ED              SST   *D11I,B
0078+B  46A3
0079+B  D70A
0165    0078                         ADL   =X'46A3'
0166    AC12    A8 4 12              STA   TEMP,B
0167    A411    A0 4 11              STE   TEMP,B
0168    2C49    28 4 49              LDA   N5,B
0169    429D    48 2 9D              ADD   =X'0005'
016A    AC51    A8 4 51              STA   #A1B,B
016B    2C46    28 4 46              LDA   N3,B
016C    AD51    A8 5 51              STA   *#A1B,B
016D    2C12    28 4 12     )900     LDA   TEMP,B
016E    2411    20 4 11              LDE   TEMP,B
016F    BA00    B8 2 00              NJP   $+X'0000'
0170    757A    70 5 7A              JMP   *)910,B
```

```
0171    2C12   28 4 12          LDA   TEMP,B
0172    2411   20 4 11          LDE   TEMP,B
0173    EDFC   E8 5 FC          SST   *CM1:,B
0174    AC12   A8 4 12          STA   TEMP,B
0175    A411   A0 4 11          STE   TEMP,B

                                LPL
0176    7200   70 2 00          JMP   $+X'0000'
0177    FFFE                    DAT   X'FFFE'
0178    FFFF                    DAT   X'FFFF'
0179    0000                    DAT   X'0000'
017A    FFFE                    DAT   X'FFFE'
017B    0000                    DAT   X'0000'
017C    0019                    DAT   X'0019'
017D    2C49   28 4 49          LDA   N5,B
017E    4200   40 2 00          ADD   =X'0005'
017F    AC50   A8 4 50          STA   #AIA,B
0180    2C4A   28 4 4A          LDA   N10 ,B
0181    AD50   A8 5 50          STA   *#AIA,B
0182    2C12   28 4 12   )910   LDA   TEMP,B
0183    2411   20 4 11          LDE   TEMP,B
0184    EDEB   E8 5 EB          SST   *S11:,B
007B+B  4E9C
007C+B  3C00
0185    007B                    ADL   =X'4E9C'
0186    BA00   B8 2 00          NJP   $+X'0000'
0187    2C7C   28 4 7C          LDA   =X'4E9C' ,B
0188    247B   20 4 7B          LDE   =X'4E9C' ,B
0189    AC12   A8 4 12          STA   TEMP,B
018A    A411   A0 4 11          STE   TEMP,B
018B    2C0D   28 4 0D          LDA   N1,B
018C    AC5C   A8 4 5C          STA   I ,B
018D    2C5C   28 4 5C          LDA   I ,B
018E    4005   40 0 05          ADD   X'0005'
018F    4200   40 2 00          ADD   =X'0011'
0190    AC50   A8 4 50          STA   #AIA,B
0191    2C12   28 4 12          LDA   TEMP,B
0192    2411   20 4 11          LDE   TEMP,B
0193    EDEB   E8 5 EB          SST   *S11:,B
0194    8050                    ADL   #AIA
0195    B200   B0 2 00          PJP   $+X'0000'
0196    757D   70 5 7D          JMP   *)940,B
0197    645C   60 4 5C   )930   INC   I ,B
0198    2C0F   28 4 0F          LDA   N4,B
0199    4C5C   48 4 5C          SUB   I ,B
019A    B2F2   B0 2 F2          PJP   $+X'FFF2'
007E+B  0005             )940
019B    2C7E   28 4 7E          LDA   =X'0005' ,B
019C    4C5C   48 4 5C          SUB   I ,B
019D    1200   10 2 00          LDL   $+X'0000'
019E    AE06   A8 6 06          STA   INDEX3,C
019F    2E06   28 6 06          LDA   INDEX3,C
01A0    4005   40 0 05          ADD   X'0005'
01A1    4200   40 2 00          ADD   =X'0013'
01A2    AC50   A8 4 50          STA   #AIA,B
01A3    3804   38 0 04          STZ   X'0004'
01A4    3805   38 0 05          STZ   X'0005'
01A5    C550   C0 5 50          ADA   *#AIA,B
01A6    EDEC   E8 5 EC          SST   *M11:,B
01A7    0011                    ADL   TEMP
01A8    EDEA   E8 5 EA          SST   *A11:,B
007F+B  3783
0080+B  120E
01A9    007F                    ADL   =X'3783'
01AA    EDEF   E8 5 EF          SST   *C10:,B
01AB    AE0D   A8 6 0D          STA   WINDOW ,C
01AC    2C0E   28 4 0E   )950   LDA   N2,B
01AD    AC5C   A8 4 5C          STA   I ,B
01AE    2C0F   28 4 0F   )960   LDA   N4,B
01AF    AC56   A8 4 56          STA   N ,B
01B0    2C56   28 4 56   )1000  LDA   N ,B
01B1    4C48   48 4 48          SUB   N3,B
01B2    BA00   B8 2 00          NJP   $+X'0000'
01B3    7581   70 5 81          JMP   *)1200 ,B
01B4    2C01   28 4 01          LDA   N0,B
```

```
01B5   1216   10 2 16            LDC   $+X'0016'
01B6   AE06   A8 6 06            STA   IWINDOW ,C
01B7   7582   70 5 82            JMP   *)1300 ,B
01B8   2C56   28 4 56   )1200    LDA   N ,B
01B9   4C0E   48 4 0E            SUB   N2,B
01BA   AC56   A8 4 56            STA   N ,B
0083+B 03E8             )1300
01BB   2C83   28 4 83            LDA   =X'03E8' ,B
01BC   AC11   A8 4 11            STA   IDM ,B
01BD   2C0D   28 4 0D            LDA   N1,B
01BE   AC73   A8 4 73            STA   J ,B
01BF   2C49   28 4 49            LDA   N5,B
01C0   4C73   48 4 73            SUB   J ,B
01C1   AC84   A8 4 84            STA   II,B
01C2   2C84   28 4 84            LDA   II,B
01C3   AC50   A8 4 50            STA   #AIA,B
01C4   4200   40 2 00            ADD   =X'0005'
01C5   AC51   A8 4 51            STA   #AIB,B
01C6   1211   10 2 11            LDC   $+X'0011'
01C7   2E06   28 6 06            LDA   IWINDOW ,C
01C8   3804   38 0 04            STX   X'0004'
01C9   2805   28 0 05            LDA   X'0005'
01CA   B201   B0 2 01            PJP   $+X'0001'
01CB   6804   68 0 04            DCR   X'0004'
01CC   DC11   D8 4 11            DIV   IDM ,B
01CD   AD51   A8 5 51            STA   *#AIB,B
01CE   2C50   28 4 50            LDA   #AIA,B
01CF   4200   40 2 00            ADD   =X'0005'
01D0   AC74   A8 4 74            STA   #AIC,B
01D1   2D74   28 5 74            LDA   *#AIC,B
01D2   D411   D0 4 11            MPY   IDM ,B
01D3   AC85   A8 4 85            STA   #AID,B
01D4   2E06   28 6 06            LDA   IWINDOW ,C
01D5   4C85   48 4 85            SUB   #AID,B
01D6   AE06   A8 6 06            STA   IWINDOW ,C
01D7   2C11   28 4 11            LDA   IDM ,B
01D8   3804   38 0 04            STX   X'0004'
01D9   2805   28 0 05            LDA   X'0005'
01DA   B201   B0 2 01            PJP   $+X'0001'
01DB   6804   68 0 04            DCR   X'0004'
01DC   DC4A   D8 4 4A            DIV   N10 ,B
01DD   AC11   A8 4 11            STA   IDM ,B
01DE   6473   60 4 73   )1500    INC   J ,B
01DF   2C0F   28 4 0F            LDA   N4,B
01E0   4C73   48 4 73            SUB   J ,B
01E1   B2DD   B0 2 DD            PJP   $+X'FFDD'
01E2   2C01   28 4 01            LDA   N0,B
01E3   AC0B   A8 4 0B            STA   MASK1 ,B
01E4   AC0C   A8 4 0C            STA   MASK2 ,B
01E5   2C01   28 4 01            LDA   N0,B
01E6   AC84   A8 4 84            STA   II,B
01E7   2C0D   28 4 0D            LDA   N1,B
01E8   AC73   A8 4 73            STA   J ,B
01E9   2C73   28 4 73            LDA   J ,B
01EA   AC50   A8 4 50            STA   #AIA,B
01EB   4200   40 2 00            ADD   =X'000E'
01EC   AC51   A8 4 51            STA   #AIB,B

                                 LPL
01ED   7200   70 2 00            JMP   $+X'0000'
01EE   0106                      ADL   X'0106'
01EF   0000                      DAT   X'0000'
01F0   0000                      DAT   X'0000'
01F1   0000                      DAT   X'0000'
01F2   0000                      DAT   X'0000'
01F3   2D51   28 5 51            LDA   *#AIB,B
01F4   4484   40 4 84            ADD   II,B
01F5   AC86   A8 4 86            STA   L ,B
01F6   2C50   28 4 50            LDA   #AIA,B
01F7   4200   40 2 00            ADD   =X'002E'
01F8   AC74   A8 4 74            STA   #AIC,B
01F9   2D74   28 5 74            LDA   *#AIC,B
01FA   AC87   A8 4 87            STA   M ,B
01FB   2C87   28 4 87            LDA   M ,B
01FC   4200   40 2 00            ADD   =X'000A'
01FD   AC85   A8 4 85            STA   #AID,B
```

```
01FE     2C66   28 4 66              LDA   L1,B
01FF     AC88   A8 4 88              STA   #AIE,B
0200     2C50   28 4 50              LDA   #AIA,B
0201     42ED   40 2 ED              ADD   =X'0005'
0202     AC89   A8 4 89              STA   #AIF,B
0203     2C84   28 4 84              LDA   I1,B
0204     AC8A   A8 4 8A              STA   #AIG,B
0205     1C8A   18 4 8A              LDG   #AIG,B
0206     EDF1   E8 5 F1              SST   *LDB1,B
0207     8089                        ADL   #AIF
0208     1C88   18 4 88              LDG   #AIE,B
0209     EDF2   E8 5 F2              SST   *STB1,B
020A     8085                        ADL   #AID
020B     6473   60 4 73    )1800     INC   J ,B
020C     2C49   28 4 49              LDA   N5,B
020D     4C73   48 4 73              SUB   J ,B
020E     B2DA   B0 2 DA              PJP   $+X'FFDA'
020F     6484   60 4 84              INC   I1,B
0210     2C46   28 4 46              LDA   N3,B
0211     4C84   48 4 84              SUB   I1,B
0212     B2D4   B0 2 D4              PJP   $+X'FFD4'
0086+B   0000
0213     2C86   28 4 86              LDA   =X'0000' ,B
0214     AC11   A8 4 11              STA    DISPLAY ,B
0215     2C0D   28 4 0D              LDA   N1,B
0216     AC73   A8 4 73              STA   J ,B
0217     2C0E   28 4 0E              LDA   N2,B
0218     4C66   48 4 66              SUB   [illegible] ,B
0219     F201   F0 2 01              ZJP   $+X'0001'
021A     7200   70 2 00              JMP   $+X'0000'
021B     758C   70 5 8C              JMP   *)1820 ,B
021C     2C73   28 4 73              LDA    J ,B
021D     AC50   A8 4 50              STA    #AIA,B
021E     4222   40 2 22              ADD   =X'000A'
021F     AC51   A8 4 51              STA    #AIB,B
0220     2C50   28 4 50              LDA    #AIA,B
0221     4200   40 2 00              ADD   =X'004D'
0222     AC74   A8 4 74              STA    #AIC,B
0223     2D74   28 5 74              LDA   *#AIC,B
0224     4D51   48 5 51              SUB   *#AIB,B
0225     F200   F0 2 00              ZJP    $+X'0000'
008D+B   FFFF
0226     2C8D   28 4 8D              LDA   =X'FFFF' ,B
0227     AC11   A8 4 11              STA    DISPLAY ,B
0228     2C73   28 4 73              LDA    J ,B
0229     AC50   A8 4 50              STA    #AIA,B
022A     4209   40 2 09              ADD   =X'004D'
022B     AC51   A8 4 51              STA    #AIB,B
022C     2C50   28 4 50              LDA    #AIA,B
022D     420F   40 2 0F              ADD   =X'000A'
022E     AC74   A8 4 74              STA    #AIC,B
022F     2D74   28 5 74              LDA   *#AIC,B
0230     AD51   A8 5 51              STA   *#AIB,B
0231     758E   70 5 8E              JMP   *)1852 ,B
0232     2C73   28 4 73    )1820     LDA    J ,B
0233     AC50   A8 4 50              STA    #AIA,B
0234     4207   40 2 07              ADD   =X'000A'
0235     AC51   A8 4 51              STA    #AIB,B
0236     2C50   28 4 50              LDA    #AIA,B
0237     4200   40 2 00              ADD   =X'004D'
0238     AC74   A8 4 74              STA    #AIC,B
0239     2D74   28 5 74              LDA   *#AIC,B
023A     4D51   48 5 51              SUB   *#AIB,B
023B     F200   F0 2 00              ZJP    $+X'0000'
023C     2C8D   28 4 8D              LDA   =X'FFFF' ,B
023D     AC11   A8 4 11              STA    DISPLAY ,B
023E     2C73   28 4 73              LDA    J ,B
023F     AC50   A8 4 50              STA    #AIA,B
0240     4209   40 2 09              ADD   =X'004D'
0241     AC51   A8 4 51              STA    #AIB,B
0242     2C50   28 4 50              LDA    #AIA,B
0243     420F   40 2 0F              ADD   =X'000A'
0244     AC74   A8 4 74              STA    #AIC,B
0245     2D74   28 5 74              LDA   *#AIC,B
0246     AD51   A8 5 51              STA   *#AIB,B
```

```
0247    0473    04 4 73    )1650    INC    J ,B
0248    2C0E    28 4 0E             LDA    N2,B
0249    4C73    48 4 73             SUB    J ,B
024A    B2CC    B0 2 CC             PJP    $+X'FFCC'
024B    2C11    28 4 11             LDA    DISPLAY ,B
024C    5462    50 4 62             LOR    =X'FFFF' ,B
024D    F200    F0 2 00             ZJP    $+X'0000'
024E    758F    70 5 8F             JMP    *)3000 ,B
024F    EF00    E8 7 00             SST    *MICCO ,B
0250    000E                        ADL    N2
0251    0008                        ADL    PAT
0252    002D                        ADL    IREGDATA
0253    0030                        ADL    MASKBITS

                                    LPL
0254    7200    70 2 00             JMP    $+X'0000'
0255    0000                        DAT    X'0000'
0256    0000                        DAT    X'0000'
0257    0000                        DAT    X'0000'
0258    0000                        DAT    X'0000'
0259    0000                        DAT    X'0000'
025A    2C0E    28 4 0E    )1900    LDA    N2,B
025B    4C56    48 4 56             SUB    N ,B
025C    F201    F0 2 01             ZJP    $+X'0001'
025D    7200    70 2 00             JMP    $+X'0000'
025E    7590    70 5 90             JMP    *)2100 ,B
025F    EFFA    E8 7 FA             SST    *MICCO ,B
0260    000F                        ADL    N4
0261    0034                        ADL    IPATTBL
0262    001D                        ADL    REGCGREF
0263    0021                        ADL    MASKREF
0264    758F    70 5 8F             JMP    *)3000 ,B
0265    2C01    28 4 01    )2100    LDA    N0,B
0266    AC11    A8 4 11             STA    IPAT,B
0267    1288    10 2 88             LDC    $+X'FF88'
0268    2E88    28 6 88             LDA    INDEX3,C
0269    F201    F0 2 01             ZJP    $+X'0001'
026A    B200    B0 2 00             PJP    $+X'0000'
026B    7591    70 5 91             JMP    *)2200 ,B
026C    1283    10 2 83             LDC    $+X'FF83'
026D    2E88    28 6 88             LDA    INDEX3,C
026E    4200    40 2 00             ADD    =X'000C'
026F    AC50    A8 4 50             STA    *AIA,B
0270    2D50    28 5 50             LDA    **AIA,B
0271    AC11    A8 4 11             STA    IPAT,B
0272    EFE7    E8 7 E7    )2200    SST    *MICCO ,B
0273    000D                        ADL    N1
0274    0011                        ADL    IPAT
0275    000D                        ADL    N1
0276    0047                        ADL    IPATOPCL
0277    EFE2    E8 7 E2             SST    *MICCO ,B
0278    000F                        ADL    N4
0279    0034                        ADL    IPATTBL
027A    0025                        ADL    REGCGDMD
027B    0029                        ADL    MASKDMD
027C    2C01    28 4 01             LDA    N0,B
027D    AC11    A8 4 11             STA    IPAT,B
027E    2C49    28 4 49             LDA    N5,B
027F    4200    40 2 00             ADD    =X'0005'
0280    AC50    A8 4 50             STA    *AIA,B
0281    2D50    28 5 50             LDA    **AIA,B
0282    4C4A    48 4 4A             SUB    N16 ,B
0283    BA00    B8 2 00             NJP    $+X'0000'
0284    2C4B    28 4 4B             LDA    N64 ,B
0285    AC11    A8 4 11             STA    IPAT,B
0286    EFD3    E8 7 D3             SST    *MICCO ,B
0287    000D                        ADL    N1
0288    0011                        ADL    IPAT
0289    000D                        ADL    N1
028A    004B                        ADL    N64
028B    EF00    E8 7 00    )3000    SST    *GOT,B
028C    0006                        DAT    X'0006'
028D    0067                        ADL    )150
028E    0000                        ADL    )5000
028F    009A                        ADL    )160
```

```
0290    00B9                            ADL   )050
0291    0154                            ADL   )330
0292    005C                            ADL   1
0293    E0E7   E8 5 E7   )5000          SST   *LXIT,B
0294    7592   70 5 92                  JMP   *)5,B

                                        LPL
0295    7200   70 2 00                  JMP   $+X'0000'
0296    01EC                            ADL   X'01EC'
0297    0108                            ADL   X'0108'
0298    0000                            DAT   X'0000'
0000    029F                            ADL   X'029F'
PROGRAM SIZE: 0071     DATA POOL SIZE: 0147     ERROR COUNT: 0000
001D+B  FFFF
0000    1000   10 0 00                  LDC   X'0000'
0001    7303   70 3 03                  JMP   *$+X'0003'
0002    0002                            DAT   X'0002'
0003    001F                            DAT   X'001F'
0004    0000                            ADL   SETI
0005    201F   28 5 1F                  LDA   *TSET,B
0006    A803   A8 0 03                  STA   X'0003'
0007    50A0   50 0 A0                  EOR   X'FFFF'
0008    5D21   58 5 21                  AND   *T1,B
0009    5003   50 0 03                  EOR   X'0003'
0022+B  FFFF
000A    5422   50 4 22                  EOR   *X'FFFF' ,B
000B    AC23   A8 4 23                  STA   *ALA,B
000C    2D20   28 5 20                  LDA   *TCLR,B
000D    A803   A8 0 03                  STA   X'0003'
000E    50A0   50 0 A0                  EOR   X'FFFF'
000F    5C23   58 4 23                  AND   *ALA,B
0010    5003   50 0 03                  EOR   X'0003'
0011    5422   50 4 22                  EOR   *X'FFFF' ,B
0012    751E   70 5 1E                  JMP   *X'001E' ,B
0013    0000                            DAT   X'0000'
0014    0AFF   08 2 FF                  LDB   $+X'FFFF'
0020+B  0000             )5
0015    2C20   28 4 20                  LDA   *X'0000' ,B
0016    1200   10 2 00                  LDC   $+X'0000'
0017    AE26   A8 6 26                  STA   RUNLOGIC,C
0018    EF00   E8 7 00                  SST   *LCCO,B
0019    8027                            ADL   OPCOVSP
001A    8028                            ADL   OPCOVSPX
001B    0024                            ADL   TSET
001C    0012                            ADL   N16
001D    EF05   E8 7 05                  SST   *LCCO,B
001E    8029                            ADL   MON24V
001F    802A                            ADL   MON24VX
0020    0024                            ADL   TSCL
0021    0013                            ADL   N17
0022    120C   12 2 0C                  LDC   $+X'000C'
0023    2E0B   28 6 0B                  LDA   OPRTX ,C
0024    5422   50 4 22                  EOR   *X'FFFF' ,B
0025    1200   10 2 00                  LDC   $+X'0000'
0026    5E1B   58 6 1B                  AND   OPRT,C
0027    5422   50 4 22                  EOR   *X'FFFF' ,B
0028    F200   F0 2 00                  ZJP   $+X'0000'
0029    752B   70 5 2B                  JMP   *)20 ,B
002A    2C26   28 4 26                  LDA   *X'0000' ,B
002B    1200   10 2 00                  LDC   $+X'0000'
002C    AE04   A8 6 04                  STA   READY ,C
002D    752C   70 5 2C                  JMP   *)50 ,B
002E    1209   10 2 09   )20            LDC   $+X'0009'
002F    2E1B   28 6 1B                  LDA   OPRT,C
0030    5422   50 4 22                  EOR   *X'FFFF' ,B
0031    120F   10 2 0F                  LDC   $+X'000F'
0032    5E0B   58 6 0B                  AND   OPRTX ,C
0033    5422   50 4 22                  EOR   *X'FFFF' ,B
0034    F200   F0 2 00                  ZJP   $+X'0000'
0035    752D   70 5 2D                  JMP   *)60 ,B
002E+B  0000
002F+B  0000
0036    2C2F   28 4 2F                  LDA   *X'0000' ,B
0037    242E   20 4 2E                  LDC   *X'0000' ,B
0038    1200   10 2 00                  LDC   $+X'0000'
```

```
0039    AE31   A8 6 31         STA   RESSPD,C
003A    A630   A0 6 30         STE   RESSPD,C
003B    AE19   A8 6 19         STA   REFDMD,C
003C    A618   A0 6 18         STE   REFDMD,C
003D    AE01   A8 6 01         STA   DDMD,C
003E    A600   A0 6 00         STE   DDMD,C
003F    EF22   E8 7 22   )5M   SST   *LCC0,B
0040    8030                   ADL   OPRT
0041    8031                   ADL   OPRTX
0042    0024                   ADL   TSET
0043    000C                   ADL   N12
0044    EF05   E8 7 05   )60   SST   *LCC0,B
0045    8032                   ADL   ANASPDF
0046    8033                   ADL   ANASPDFX
0047    0024                   ADL   TSET
0048    0014                   ADL   N16
0049    EF05   E8 7 05         SST   *LCC0,B
004A    8034                   ADL   DIGSPDF
004B    8035                   ADL   DIGSPDFX
004C    0024                   ADL   TSET
004D    000D                   ADL   N4
004E    121D   10 2 1D         LDC   $+X'001D'
004F    2E1A   28 6 1A         LDA   VIDAR03 ,C
0050    A803   A8 0 03         STA   X'0003'
0051    50A0   50 0 A0         EOR   X'FFFF'
0052    1200   10 2 00         LDC   $+X'0000'
0053    5E14   58 6 14         AND   TURBSPDF,C
0054    5003   50 0 03         EOR   X'0003'
0055    1207   10 2 07         LDC   $+X'0007'
0056    AE48   A8 6 48         STA   TSOFF ,C
0057    EFEC   E8 7 EC         SST   *LCC0,B
0058    8036                   ADL   TSOFF
0059    8037                   ADL   TSOFFX
005A    8038                   ADL   TURBSPDF
005B    0017                   ADL   N21
005C    120A   10 2 0A         LDC   $+X'000A'
005D    2E14   28 6 14         LDA   TURBSPDF,C
005E    1200   10 2 00         LDC   $+X'0000'
005F    AE30   A8 6 30         STA   MSGTSOFF,C
0060    120B   10 2 0B         LDC   $+X'000B'
0061    2E13   28 6 13         LDA   BR,C
0062    5422   50 4 22         EOR   *X'FFFF' ,B
0063    5E25   58 6 25         AND   SPTF,C
0064    A803   A8 0 03         STA   X'0003'
0065    50A0   50 0 A0         EOR   X'FFFF'
0066    1238   10 2 38         LDC   $+X'0038'
0067    5E1B   58 6 1B         AND   OPRT,C
0068    5003   50 0 03         EOR   X'0003'
0069    1209   10 2 09         LDC   $+X'0009'
006A    AE02   A8 6 02         STA   STM ,C

                                LPL
006B    7200   70 2 00         JMP   $+X'0000'
006C    0000                   DAT   X'0000'
006D    0000                   DAT   X'0000'
006E    0000                   DAT   X'0000'
006F    0000                   DAT   X'0000'
0070    0000                   DAT   X'0000'
0071    0000                   DAT   X'0000'
0072    0100                   DAT   X'0100'
0073    EFFA   E8 7 FA         SST   *LCC0,B
0074    8039                   ADL   STM
0075    803A                   ADL   STMX
0076    0024                   ADL   TSET
0077    0003                   ADL   N1
0078    12F6   10 2 F6         LDC   $+X'FFF6'
0079    2E13   28 6 13         LDA   TM,C
007A    5422   50 4 22         EOR   *X'FFFF' ,B
007B    12F1   10 2 F1         LDC   $+X'FFF1'
007C    AE04   A8 6 04         STA   DA,C
007D    2E05   28 6 05         LDA   DAX ,C
007E    5422   50 4 22         EOR   *X'FFFF' ,B
007F    5E04   58 6 04         AND   DA,C
0080    5422   50 4 22         EOR   *X'FFFF' ,B
0081    F200   F0 2 00         ZJP   $+X'0000'
```

```
0082   753B   70 5 3B          JMP   *)100,B
0083   2C26   28 4 26          LDA   *X'0000' ,B
0084   12EB   10 2 EB          LDC   $+X'FFEB'
0085   AE04   A8 6 04          STA   READY ,C
0086   AE0E   A8 6 0E          STA   READYX,C
0087   12E5   10 2 E5   )100   LDC   $+X'FFE5'
0088   2E04   28 6 04          LDA   DA,C
0089   AE05   A8 6 05          STA   DAX ,C
008A   2E08   28 6 08          LDA   HOLDCP,C
008B   A803   A8 0 03          STA   X'0003'
008C   50A0   50 0 A0          EOR   X'FFFF'
008D   12E4   10 2 E4          LDC   $+X'FFE4'
008E   5E0A   58 6 0A          AND   HOLDPB,C
008F   5003   50 0 03          EOR   X'0003'
0090   AC01   A8 4 01          STA   T1,B
0091   12DD   10 2 DD          LDC   $+X'FFDD'
0092   2E1B   28 6 1B          LDA   DPRI,C
0093   A803   A8 0 03          STA   X'0003'
0094   50A0   50 0 A0          EOR   X'FFFF'
0095   12D7   10 2 D7          LDC   $+X'FFD7'
0096   5E04   58 6 04          AND   DA,C
0097   5003   50 0 03          EOR   X'0003'
0098   AC02   A8 4 02          STA   T2,B
0099   2E2B   28 6 2B          LDA   GOHOLDDF,C
009A   A803   A8 0 03          STA   X'0003'
009B   50A0   50 0 A0          EOR   X'FFFF'
009C   5C01   58 4 01          AND   T1,B
009D   5003   50 0 03          EOR   X'0003'
009E   5422   50 4 22          EOR   *X'FFFF' ,B
009F   AC3C   A8 4 3C          STA   *BLA,B
00A0   2C02   28 4 02          LDA   T2,B
00A1   5C3C   58 4 3C          AND   *BLA,B
00A2   5422   50 4 22          EOR   *X'FFFF' ,B
00A3   AC25   A8 4 25          STA   TCLR,B
00A4   1800   18 0 00          LDG   X'0000'
00A5   751D   70 5 1D          JMP   *FF,B
00A6   803D                    ADL   GOPB
00A7   8025                    ADL   TCLR
00A8   803E                    ADL   GO
00A9   12C3   10 2 C3          LDC   $+X'FFC3'
00AA   AE39   A8 6 39          STA   GO,C
00AB   EFC2   E8 7 C2          SST   *LCCO,B
00AC   803E                    ADL   GO
00AD   803F                    ADL   GOX
00AE   803D                    ADL   GOPB
00AF   0019                    ADL   N19
00B0   12BC   10 2 BC          LDC   $+X'FFBC'
00B1   2E09   28 6 09          LDA   GO,C
00B2   A803   A8 0 03          STA   X'0003'
00B3   50A0   50 0 A0          EOR   X'FFFF'
00B4   5E2B   58 6 2B          AND   GOHOLDDF,C
00B5   5003   50 0 03          EOR   X'0003'
00B6   5422   50 4 22          EOR   *X'FFFF' ,B
00B7   AC3C   A8 4 3C          STA   *BLA,B
00B8   2C02   28 4 02          LDA   T2,B
00B9   5C3C   58 4 3C          AND   *BLA,B
00BA   5422   50 4 22          EOR   *X'FFFF' ,B
00BB   AC25   A8 4 25          STA   TCLR,B
00BC   1800   18 0 00          LDG   X'0000'
00BD   751D   70 5 1D          JMP   *FF,B
00BE   0001                    ADL   T1
00BF   0025                    ADL   TCLR
00C0   8040                    ADL   HOLD
00C1   12AB   10 2 AB          LDC   $+X'FFAB'
00C2   AE0C   A8 6 0C          STA   HOLD,C
00C3   EFAA   E8 7 AA          SST   *LCCO,B
00C4   8040                    ADL   HOLD
00C5   8041                    ADL   HOLDX
00C6   8042                    ADL   HOLDPB
00C7   0016                    ADL   N20
00C8   2C26   28 4 26          LDA   *X'0000' ,B
00C9   12A3   10 2 A3          LDC   $+X'FFA3'
00CA   AE08   A8 6 08          STA   HOLDCP,C
00CB   AE2B   A8 6 2B          STA   GOHOLDDF,C
00CC   2E39   28 6 39          LDA   ATN ,C
00CD   1200   10 2 00          LDC   $+X'0000'
```

```
00CE   5E05   58 6 05      AND   ATSTRPB ,C
00CF   AC3C   A8 4 3C      STA   *BLA,B
00D0   129C   10 2 9C      LDC   $+X'FF9C'
00D1   2E39   28 6 39      LDA   ATS ,C
00D2   5422   50 4 22      EOR   *X'FFFF' ,B
00D3   AC43   A8 4 43      STA   *BLB,B
00D4   129A   10 2 9A      LDC   $+X'FF9A'
00D5   2E13   28 6 13      LDA   TH,C
00D6   5422   50 4 22      EOR   *X'FFFF' ,B
00D7   5C43   58 4 43      AND   *BLB,B
00D8   1294   10 2 94      LDC   $+X'FF94'
00D9   5E2A   58 6 2A      AND   GVMAX ,C
00DA   1297   10 2 97      LDC   $+X'FF97'
00DB   5E08   58 6 08      AND   TRPB,C
00DC   A803   A8 0 03      STA   X'0003'
00DD   50A0   50 0 A0      EOR   X'FFFF'
00DE   5C3C   58 4 3C      AND   *BLA,B
00DF   5003   50 0 03      EOR   X'0003'
00E0   A803   A8 0 03      STA   X'0003'
00E1   50A0   50 0 A0      EOR   X'FFFF'
00E2   128C   10 2 8C      LDC   $+X'FF8C'
00E3   5E12   58 6 12      AND   THI ,C
00E4   5003   50 0 03      EOR   X'0003'
00E5   AC24   A8 4 24      STA   TSET,B
00E6   2E10   28 6 10      LDA   ASL ,C
00E7   5422   50 4 22      EOR   *X'FFFF' ,B
00E8   AC25   A8 4 25      STA   TCLR,B
00E9   1800   18 0 00      LDG   X'0000'
00EA   751D   70 5 1D      JMP   *FF,B
00EB   0024                ADL   TSET
00EC   0025                ADL   TCLR
00ED   8044                ADL   GC
00EE   1200   10 2 00      LDC   $+X'0000'
00EF   AE00   A8 6 00      STA   GC,C
00F0   2E31   28 6 31      LDA   GCX ,C
00F1   5422   50 4 22      EOR   *X'FFFF' ,B
00F2   5E00   58 6 00      AND   GC,C
00F3   F200   F0 2 00      ZJP   $+X'0000'
00F4   1200   10 2 00      LDC   $+X'0000'
00F5   2E55   28 6 55      LDA   WS,C
00F6   2654   20 6 54      LDE   WS,C
00F7   AE4D   A8 6 4D      STA   WSTRANS ,C
00F8   A64C   A0 6 4C      STE   WSTRANS ,C
00F9   EF00   E8 7 00      SST   *LCCU,B
00FA   8044                ADL   GC
00FB   8045                ADL   GCX
00FC   8046                ADL   TR,B
00FD   000F                ADL   N13
00FE   1200   10 2 00      LDC   $+X'0000'
00FF   2E10   28 6 10      LDA   ASL ,C
0100   5422   50 4 22      EOR   *X'FFFF' ,B
0101   AC3C   A8 4 3C      STA   *BLA,B
0102   1214   10 2 14      LDC   $+X'0014'
0103   2E00   28 6 00      LDA   GC,C
0104   A803   A8 0 03      STA   X'0003'
0105   50A0   50 0 A0      EOR   X'FFFF'
0106   5C3C   58 4 3C      AND   *BLA,B
0107   5003   50 0 03      EOR   X'0003'
0108   5422   50 4 22      EOR   *X'FFFF' ,B
0109   AE01   A8 6 01      STA   TC,C
010A   120C   10 2 0C      LDC   $+X'000C'
010B   2E12   28 6 12      LDA   THI ,C
010C   5422   50 4 22      EOR   *X'FFFF' ,B
010D   5E13   58 6 13      AND   TH,C
010E   A803   A8 0 03      STA   X'0003'
010F   50A0   50 0 A0      EOR   X'FFFF'
0110   120E   10 2 0E      LDC   $+X'000E'
0111   5E01   58 6 01      AND   TC,C
0112   5003   50 0 03      EOR   X'0003'
0113   AC24   A8 4 24      STA   TSET,B
0114   2C3C   28 4 3C      LDA   *BLA,B
0115   5E32   58 6 32      AND   TVMIN ,C
0116   A803   A8 0 03      STA   X'0003'
0117   50A0   50 0 A0      EOR   X'FFFF'
0118   120E   10 2 0E      LDC   $+X'000E'
```

```
0119    5E12   58 6 12        AND   THI,C
011A    5003   50 0 03        EOR   X'0003'
011B    AC25   A8 4 25        STA   TCLR,B
011C    1800   18 0 00        LDC   X'0000'
011D    751D   70 5 1D        JMP   *FF,B
011E    0024                  ADL   TSET
011F    0025                  ADL   TCLR
0120    0047                  ADL   TCLITL
0121    1211   10 2 11        LDC   $+X'0011'
0122    AE33   A8 6 33        STA   TCLITE,C
0123    EF2A   E8 7 2A        SST   *LCCD,B
0124    0047                  ADL   TCLITL
0125    0048                  ADL   TCLITEX
0126    0024                  ADL   TSET
0127    0010                  ADL   N14

                              LPL
0128    7200   70 2 00        JMP   $+X'0000'
0129    0000                  DAT   X'0000'-
012A    000D                  ADL   X'000D'
012B    0000                  DAT   X'0000'
012C    0000                  DAT   X'0000'
012D    0000                  DAT   X'0000'
012E    12FD   10 2 FD        LDC   $+X'FFFD'
012F    2E12   28 6 12        LDA   THI,C
0130    12F9   10 2 F9        LDC   $+X'FFF9'
0131    5E00   58 6 00        AND   GC,C
0132    AE35   A8 6 35        STA   TRCOM,C
0133    EFF7   E8 7 F7        SST   *LCCD,B
0134    0049                  ADL   TRCOM
0135    004A                  ADL   TRCOMX
0136    0024                  ADL   TSET
0137    0011                  ADL   N15
0138    12F3   10 2 F3        LDC   $+X'FFF3'
0139    2E12   28 6 12        LDA   THI,C
013A    5422   50 4 22        EOR   *X'FFFF',B
013B    12EE   10 2 EE        LDC   $+X'FFEE'
013C    5E00   58 6 00        AND   GC,C
013D    AE4E   A8 6 4E        STA   TRTVGV,C
013E    EFEC   E8 7 EC        SST   *LCCD,B
013F    004B                  ADL   TRTVGV
0140    004C                  ADL   TRTVGVX
0141    0024                  ADL   TSET
0142    0016                  ADL   N22
0143    12E8   10 2 E8        LDC   $+X'FFE8'
0144    2E10   28 6 10        LDA   ASL,C
0145    5422   50 4 22        EOR   *X'FFFF',B
0146    12E3   10 2 E3        LDC   $+X'FFE3'
0147    5E0F   58 6 0F        AND   ASLX,C
0148    5422   50 4 22        EOR   *X'FFFF',B
0149    F200   F0 2 00        ZJP   $+X'0000'
014A    754D   70 5 4D        JMP   *)150,B
014B    2C2F   28 4 2F        LDA   *X'0000',B
014C    242E   20 4 2E        LDE   *X'0000',B
014D    12DF   10 2 DF        LDC   $+X'FFDF'
014E    AE01   A8 6 01        STA   DDMD,C
014F    A600   A0 6 00        STE   DDMD,C
0150    AE19   A8 6 19        STA   REFDMD,C
0151    A618   A0 6 18        STE   REFDMD,C
0152    2C26   28 4 26        LDA   *X'0000',B
0153    1200   10 2 00        LDC   $+X'0000'
0154    AE1C   A8 6 1C        STA   AUTOSTAR,C
0155    754E   70 5 4E        JMP   *)160,B
0156    12D3   10 2 D3  )150  LDC   $+X'FFD3'
0157    2E0F   28 6 0F        LDA   ASLX,C
0158    5422   50 4 22        EOR   *X'FFFF',B
0159    12D2   10 2 D2        LDC   $+X'FFD2'
015A    5E10   58 6 10        AND   ASL,C
015B    5422   50 4 22        EOR   *X'FFFF',B
015C    F200   F0 2 00        ZJP   $+X'0000'
015D    754F   70 5 4F        JMP   *)180,B
015E    12CE   10 2 CE        LDC   $+X'FFCE'
015F    2E55   28 6 55        LDA   WS,C
0160    2654   20 6 54        LDE   WS,C
0161    AE01   A8 6 01        STA   DDMD,C
```

```
0162   A000   A0 6 00          STE   DDMD,C
0163   AE19   A8 6 19          STA   REFDMD,C
0164   A018   A0 6 18          STE   REFDMD,C
0165   2C2F   26 4 2F   )100   LDA   =X'0000' ,B
0166   242E   20 4 2E          LDE   =X'0000' ,B
0167   12C5   10 2 C5          LDC   $+X'FFC5'
0168   AE31   A8 6 31          STA   RESSPD,C
0169   A630   A0 6 30          STE   RESSPD,C
016A   12C1   10 2 C1   )100   LDC   $+X'FFC1'
016B   2E05   28 6 05          LDA   MGB ,C
016C   5E10   58 6 10          AND   ABL ,C
016D   5422   50 4 22          EOR   =X'FFFF' ,B
016E   AC25   A8 4 25          STA   TCLR,B
016F   1800   18 6 00          LDG   X'0000'
0170   7510   70 5 10          JMP   *FF,B
0171   8058                    ADL   MGB
0172   0025                    ADL   TCLR
0173   8051                    ADL   BR
0174   12B5   10 2 B5          LDC   $+X'FFB5'
0175   AE13   A8 6 13          STA   BR,C
0176   2E14   28 6 14          LDA   BRX ,C
0177   5422   50 4 22          EOR   =X'FFFF' ,B
0178   5E13   58 6 13          AND   BR,C
0179   5422   50 4 22          EOR   =X'FFFF' ,B
017A   F200   F0 2 00          ZJP   $+X'0000'
017B   7552   70 5 52          JMP   *)200,B
017C   1200   10 2 00          LDC   $+X'0000'
017D   2E3B   28 6 3B          LDA   MWINIT,C
017E   263A   20 6 3A          LDE   MWINIT,C
017F   12AD   10 2 AD          LDC   $+X'FFAD'
0180   AE01   A8 6 01          STA   DDMD,C
0181   A600   A0 6 00          STE   DDMD,C
0182   12A7   10 2 A7          LDC   $+X'FFA7'
0183   2E1A   28 6 1A          LDA   VIDAROS ,C
0184   5422   50 4 22          EOR   =X'FFFF' ,B
0185   F200   F0 2 00          ZJP   $+X'0000'
0186   120A   10 2 0A          LDC   $+X'000A'
0187   2E45   28 6 45          LDA   POREF ,C
0188   2644   20 6 44          LDE   POREF ,C
0189   EDEC   E8 5 EC          SST   *M11;,B
018A   8053                    ADL   DDMD
018B   EDED   E8 5 ED          SST   *D11;,B
018C   8054                    ADL   PD
018D   129F   10 2 9F          LDC   $+X'FF9F'
018E   AE01   A8 6 01          STA   DDMD,C
018F   A600   A0 6 00          STE   DDMD,C
0190   1200   10 2 00          LDC   $+X'0000'
0191   2E0F   28 6 0F          LDA   PDS ,C
0192   260E   20 6 0E          LDE   PDS ,C
0193   EDEC   E8 5 EC          SST   *M11;,B
0194   8055                    ADL   GR3
0195   EDEC   E8 5 EC          SST   *M11;,B
0196   8056                    ADL   GR8
0197   EDEC   E8 5 EC          SST   *M11;,B
0057+B 47C6
0058+B 0000
0198   8057                    ADL   =X'47C6'
0199   AC5A   A8 4 5A          STA   *BRA,B
019A   A459   A0 4 59          STE   *BRA,B
019B   2E03   28 6 03          LDA   SP,C
019C   2602   20 6 02          LDE   SP,C
019D   EDEC   E8 5 EC          SST   *M11;,B
019E   805B                    ADL   GR4
019F   EDEC   E8 5 EC          SST   *M11;,B
01A0   805C                    ADL   GR7
01A1   EDEC   E8 5 EC          SST   *M11;,B
01A2   805D                    ADL   SPD
01A3   EDED   E8 5 ED          SST   *D11;,B
01A4   8059                    ADL   FBRA
01A5   EDEA   E8 5 EA          SST   *A11;,B
01A6   8053                    ADL   DDMD
01A7   1285   10 2 85          LDC   $+X'FF85'
01A8   AE01   A8 6 01          STA   DDMD,C
01A9   A600   A0 6 00          STE   DDMD,C
01AA   AE19   A8 6 19          STA   REFDMD,C
01AB   A018   A0 6 18          STE   REFDMD,C
01AC   755E   70 5 5E          JMP   *)300,B
```

```
01AD     1200   10 2 00   )200   LDC   $+X'0000'
01AE     2E13   28 0 13          LDA   BR,C
01AF     5422   50 4 22          EOR   *X'FFFF' ,B
01B0     1200   10 2 00          LDC   $+X'0000'
01B1     5E10   58 0 10          AND   ASL ,C
01B2     1205   10 2 05          LDC   $+X'0005'
01B3     5E14   58 0 14          AND   BRX ,C
01B4     5422   50 4 22          EOR   *X'FFFF' ,B

                                 LFL
01B5     7200   70 2 00          JMP   $+X'0000'
01B6     0000                    DAT   X'0000'
01B7     0000                    DAT   X'0000'
01B8     0000                    DAT   X'0000'
01B9     0000                    DAT   X'0000'
01BA     0000                    DAT   X'0000'
01BB     F200   F0 2 00          ZJP   $+X'0000'
01BC     755F   70 5 5F          JMP   *)310,B
01BD     12FC   10 2 FC          LDC   $+X'FFFC'
01BE     2E15   28 0 15          LDA   WR,C
01BF     2614   20 6 14          LDE   WR,C
01C0     1200   10 2 00          LDC   $+X'0000'
01C1     AE01   A8 0 01          STA   DDMD,C
01C2     A600   A0 6 00          STE   DDMD,C
01C3     AE19   A8 0 19          STA   REFDMD,C
01C4     A618   A0 6 18          STE   REFDMD,C
01C5     2C2F   28 4 2F          LDA   *X'0000' ,B
01C6     242E   20 4 2E          LDE   *X'0000' ,B
01C7     AE31   A8 0 31          STA   RESSPD,C
01C8     A630   A0 6 30          STE   RESSPD,C
0060+B   FFFF             )300
01C9     2C60   28 4 60          LDA   *X'FFFF' ,B
01CA     12EC   10 2 EC          LDC   $+X'FFEC'
01CB     AE2B   A8 0 2B          STA   GOHOLDDF,C
01CC     AE26   A8 0 26          STA   RUNLOGIC,C
01CD     12E9   10 2 E9   )310   LDC   $+X'FFE9'
01CE     2E13   28 0 13          LDA   BR,C
01CF     AE14   A8 0 14          STA   BRX ,C
01D0     12E7   10 2 E7          LDC   $+X'FFE7'
01D1     2E10   28 0 10          LDA   ASL ,C
01D2     12E4   10 2 E4          LDC   $+X'FFE4'
01D3     AE0F   A8 0 0F          STA   ASLX,C
01D4     2E4C   28 0 4C          LDA   MANTPCX ,C
01D5     5E4D   58 0 4D          AND   THX ,C
01D6     A803   A8 0 03          STA   X'0003'
01D7     50A0   50 0 A0          EOR   X'FFFF'
01D8     12E0   10 2 E0          LDC   $+X'FFE0'
01D9     5E07   58 0 07          AND   TPCPB ,C
01DA     5003   50 0 03          EOR   X'0003'
01DB     AC24   A8 4 24          STA   TSLT,B
01DC     2C26   28 4 26          LDA   *X'0000' ,B
01DD     AC01   A8 4 01          STA   T1,B
01DE     12D8   10 2 D8          LDC   $+X'FFD8'
01DF     2E18   28 0 18          LDA   TPC ,C
01E0     F200   F0 2 00          ZJP   $+X'0000'
01E1     7561   70 5 61          JMP   *)320,B
01E2     1200   10 2 00          LDC   $+X'0000'
01E3     2E05   28 0 05          LDA   PO,C
01E4     2604   20 6 04          LDE   PO,C
01E5     EDEB   E8 5 EB          SST   *511,B
01E6     8062                    ADL   POSP
01E7     B200   B0 2 00          PJP   $+X'0000'
01E8     2C60   28 4 60          LDA   *X'FFFF' ,B
01E9     AC01   A8 4 01          STA   T1,B
01EA     12CC   10 2 CC   )320   LDC   $+X'FFCC'
01EB     2E16   28 0 16          LDA   TPC ,C
01EC     5422   50 4 22          EOR   *X'FFFF' ,B
01ED     AC3C   A8 4 3C          STA   #BLA,B
01EE     12CA   10 2 CA          LDC   $+X'FFCA'
01EF     2E07   28 0 07          LDA   TPCPB ,C
01F0     A803   A8 0 03          STA   X'0003'
01F1     50A0   50 0 A0          EOR   X'FFFF'
01F2     5C3C   58 4 3C          AND   #BLA,B
01F3     5003   50 0 03          EOR   X'0003'
01F4     5422   50 4 22          EOR   *X'FFFF' ,B
```

```
01F5    A803    A8 0 03          STA    X'0003'
01F6    50A0    50 0 A0          EOR    X'FFFF'
01F7    12C0    10 2 C0          LDC    $+X'FFC0'
01F8    5E00    58 6 00          AND    TPTF,C
01F9    5003    50 0 03          EOR    X'0003'
01FA    A803    A8 0 03          STA    X'0003'
01FB    50A0    50 0 A0          EOR    X'FFFF'
01FC    5E13    58 6 13          AND    TM,C
01FD    5003    50 0 03          EOR    X'0003'
01FE    5422    50 4 22          EOR    *X'FFFF' ,B
01FF    AC45    A8 4 45          STA    *BLB,B
0200    1280    10 2 80          LDC    $+X'FF80'
0201    2E13    28 6 13          LDA    BR,C
0202    5C45    58 4 45          AND    *BLB,B
0203    5422    50 4 22          EOR    *X'FFFF' ,B
0204    A803    A8 0 03          STA    X'0003'
0205    50A0    50 0 A0          EOR    X'FFFF'
0206    5E1A    58 6 1A          AND    VIDAROS ,C
0207    5003    50 0 03          EOR    X'0003'
0208    A803    A8 0 03          STA    X'0003'
0209    50A0    50 0 A0          EOR    X'FFFF'
020A    5C01    58 4 01          AND    I1,B
020B    5003    50 0 03          EOR    X'0003'
020C    AC25    A8 4 25          STA    TCLR,B
020D    1800    18 0 00          LDG    X'0002'
020E    751D    70 5 1D          JMP    *FF,B
020F    0024                     ADL    TSLT
0210    0025                     ADL    TCLR
0211    8063                     ADL    TPC
0212    12A4    10 2 A4          LDC    $+X'FFA4'
0213    AE18    A8 6 18          STA    TPC ,C
0214    EF00    E8 7 00          SST    *LCCO,B
0215    8063                     ADL    TPC
0216    8064                     ADL    TPCX
0217    8065                     ADL    TPCPB
0218    0019                     ADL    N23
0219    129E    10 2 9E          LDC    $+X'FF9E'
021A    2E04    28 6 04          LDA    MANTPC,C
021B    129B    10 2 9B          LDC    $+X'FF9B'
021C    AE4C    A8 6 4C          STA    MANTPCX ,C
021D    129A    10 2 9A          LDC    $+X'FF9A'
021E    2E13    28 6 13          LDA    TM,C
021F    1297    10 2 97          LDC    $+X'FF97'
0220    AE4D    A8 6 4D          STA    TMX ,C

                                 LPL
0221    7200    70 2 00          JMP    $+X'0000'
0222    012A                     ADL    X'012A'
0223    0000                     DAT    X'0000'
0224    0000                     DAT    X'0000'
0225    EFFD    E8 7 FD          SST    *LCCO,B
0226    8066                     ADL    TPLIM
0227    8067                     ADL    TPLIMX
0228    0024                     ADL    TSLT
0229    0007                     ADL    N5
022A    128D    10 2 8D          LDC    $+X'FF8D'
022B    2E03    28 6 03          LDA    MNTF,C
022C    5422    50 4 22          EOR    *X'FFFF' ,B
022D    AC3C    A8 4 3C          STA    *BLA,B
022E    1288    10 2 88          LDC    $+X'FF88'
022F    2E13    28 6 13          LDA    BR,C
0230    5C3C    58 4 3C          AND    *BLA,B
0231    5422    50 4 22          EOR    *X'FFFF' ,B
0232    A803    A8 0 03          STA    X'0003'
0233    50A0    50 0 A0          EOR    X'FFFF'
0234    5E1A    58 6 1A          AND    VIDAROS ,C
0235    5003    50 0 03          EOR    X'0003'
0236    A803    A8 0 03          STA    X'0003'
0237    50A0    50 0 A0          EOR    X'FFFF'
0238    5E3F    58 6 3F          AND    AIFAILMM,C
0239    5003    50 0 03          EOR    X'0003'
023A    A803    A8 0 03          STA    X'0003'
023B    50A0    50 0 A0          EOR    X'FFFF'
023C    1200    10 2 00          LDC    $+X'0000'
023D    5E02    58 6 02          AND    VPLIM ,C
```

```
023E   5003   50 0 03          EOR   X'0003'
023F   5422   50 4 22          EOR   =X'FFFF',B
0240   AC43   A8 4 43          STA   *BLB,B
0241   1200   10 2 00          LDC   $+X'0000'
0242   2E03   28 6 03          LDA   MWIFB,C
0243   5C43   58 4 43          AND   *BLB,B
0244   5422   50 4 22          EOR   =X'FFFF',B
0245   AC25   A8 4 25          STA   TCLR,B
0246   1600   10 3 00          LDC   X'0000'
0247   751D   70 5 1D          JMP   *FF,B
0248   8066                    ADL   MWIPB
0249   8025                    ADL   TCLR
024A   8069                    ADL   MWI
024B   1200   10 2 00          LDC   $+X'0000'
024C   AE21   A8 6 21          STA   MWI,C
024D   2E3F   28 6 3F          LDA   AIFAILMW,C
024E   AE41   A8 6 41          STA   AIFAILMX,C
024F   2E13   28 6 13          LDA   BR,C
0250   5422   50 4 22          EOR   =X'FFFF',B
0251   F200   F0 2 00          ZJP   $+X'0000'
0252   756A   70 5 6A          JMP   *)350,B
0253   1206   10 2 06          LDC   $+X'0006'
0254   2E22   28 6 22          LDA   MWIX,C
0255   5422   50 4 22          EOR   =X'FFFF',B
0256   5E21   58 6 21          AND   MWI,C
0257   5422   50 4 22          EOR   =X'FFFF',B
0258   F200   F0 2 00          ZJP   $+X'0000'
0259   7566   70 5 66          JMP   *)340,B
025A   12CA   10 2 CA          LDC   $+X'FFCA'
025B   2E01   28 6 01          LDA   MW,C
025C   2600   20 6 00          LDE   MW,C
025D   EDEB   E8 5 EB          SST   *S11;,B
025E   806C                    ADL   X
025F   12C4   10 2 C4          LDC   $+X'FFC4'
0260   AE19   A8 6 19          STA   REFDMD,C
0261   A618   A0 6 18          STE   REFDMD,C
0262   2E1D   28 6 1D          LDA   REF2,C
0263   261C   20 6 1C          LDE   REF2,C
0264   EDED   E8 5 ED          SST   *D11;,B
0265   806D                    ADL   MW
0266   AE23   A8 6 23          STA   Y,C
0267   A622   A0 6 22          STE   Y,C
0268   AE33   A8 6 33          STA   RESMW,C
0269   A632   A0 6 32          STE   RESMW,C
026A   2C2F   28 4 2F          LDA   =X'0000',B
026B   242E   20 4 2E          LDE   =X'0000',B
026C   AE3F   A8 6 3F          STA   RESMWX,C
026D   A63E   A0 6 3E          STE   RESMWX,C
026E   756E   70 5 6E          JMP   *)345,B
026F   121C   10 2 1C   )340   LDC   $+X'001C'
0270   2E21   28 6 21          LDA   MWI,C
0271   5422   50 4 22          EOR   =X'FFFF',B
0272   5E22   58 6 22          AND   MWIX,C
0273   5422   50 4 22          EOR   =X'FFFF',B
0274   F200   F0 2 00          ZJP   $+X'0000'
0275   756F   70 5 6F          JMP   *)360,B
0276   12AD   10 2 AD          LDC   $+X'FFAD'
0277   2E1D   28 6 1D          LDA   REF2,C
0278   261C   20 6 1C          LDE   REF2,C
0279   EDEB   E8 5 EB          SST   *S11;,B
027A   806C                    ADL   X
027B   AE19   A8 6 19          STA   REFDMD,C
027C   A618   A0 6 18          STE   REFDMD,C
027D   12A6   10 2 A6   )345   LDC   $+X'FFA6'
027E   2E19   28 6 19          LDA   REFDMD,C
027F   2618   20 6 18          LDE   REFDMD,C
0280   AE01   A8 6 01          STA   DDMD,C
0281   A600   A0 6 00          STE   DDMD,C
0282   1213   10 2 13   )350   LDC   $+X'0013'
0283   2E22   28 6 22          LDA   MWIX,C
0284   AC01   A8 4 01          STA   T1,B
0285   EF9D   E8 7 9D          SST   *LCCO,B
0286   8069                    ADL   MWI
0287   807B                    ADL   MWIX
0288   8066                    ADL   MWIPB
```

```
0289    0009                                ADL   N7
028A    EF98    E8 7 98                     SST   *LCCO,B
028B    8069                                ADL   MWI
028C    0001                                ADL   T1
028D    0024                                ADL   TSET
028E    001A                                ADL   N<4

                                            LPL
028F    7200    72 2 00                     JMP   $+X'0000'
0290    0000                                DAT   X'0000'
0291    0000                                DAT   X'0000'
0292    0000                                DAT   X'0000'
0293    1200    10 2 00         )300        LDL   $+X'0000'
0294    2E0A    28 6 0A                     LDA   SIB ,C
0295    12FB    10 2 FB                     LDL   $+X'FFFB'
0296    5E07    58 6 07                     AND   ADS ,C
0297    5422    50 4 22                     EOR   *X'FFFF' ,B
0298    AC3C    A8 4 3C                     STA   *BLA,B
0299    2E13    28 6 13                     LDA   BR,C
029A    5C3C    58 4 3C                     AND   *BLA,B
029B    5422    50 4 22                     EOR   *X'FFFF' ,B
029C    A803    A8 0 03                     STA   X'0003'
029D    50A0    50 0 A0                     EOR   X'FFFF'
029E    5E1A    58 6 1A                     AND   VIDAR03 ,C
029F    5003    50 0 03                     EOR   X'0003'
02A0    A803    A8 0 03                     STA   X'0003'
02A1    50A0    50 0 A0                     EOR   X'FFFF'
02A2    5E40    58 6 40                     AND   AIFAILPI,C
02A3    5003    50 0 03                     EOR   X'0003'
02A4    A803    A8 0 03                     STA   X'0003'
02A5    50A0    50 0 A0                     EOR   X'FFFF'
02A6    12EB    10 2 EB                     LDL   $+X'FFEB'
02A7    5E02    58 6 02                     AND   VPLIM ,C
02A8    5003    50 0 03                     EOR   X'0003'
02A9    5422    50 4 22                     EOR   *X'FFFF' ,B
02AA    AC43    A8 4 43                     STA   *BLB,B
02AB    12E7    10 2 E7                     LDL   $+X'FFE7'
02AC    2E01    28 6 01                     LDA   IPIPB ,C
02AD    5C43    58 4 43                     AND   *BLB,B
02AE    5422    50 4 22                     EOR   *X'FFFF' ,B
02AF    AC25    A8 4 25                     STA   TCLR,B
02B0    1000    10 0 00                     LDL   X'0000'
02B1    751D    70 5 1D                     JMP   *FF,B
02B2    8071                                ADL   IPIPB
02B3    0025                                ADL   TCLR
02B4    0072                                ADL   IP1
02B5    12DB    10 2 DB                     LDL   $+X'FFDB'
02B6    AE1D    A8 6 1D                     STA   IP1 ,C
02B7    2E13    28 6 13                     LDA   BR,C
02B8    5422    50 4 22                     EOR   *X'FFFF' ,B
02B9    F280    F0 2 00                     ZJP   $+X'0000'
02BA    7573    70 5 73                     JMP   *)480,B
02BB    12D5    10 2 D5                     LDL   $+X'FFD5'
02BC    2E1E    28 6 1E                     LDA   IP1X,C
02BD    5422    50 4 22                     EOR   *X'FFFF' ,B
02BE    5E1D    58 6 1D                     AND   IP1 ,C
02BF    5422    50 4 22                     EOR   *X'FFFF' ,B
02C0    F200    F0 2 00                     ZJP   $+X'0000'
02C1    7574    70 5 74                     JMP   *)480,B
02C2    1200    10 2 00                     LDL   $+X'0000'
02C3    2E03    28 6 03                     LDA   PI,C
02C4    2602    20 6 02                     LDE   PI,C
02C5    AC02    A8 4 02                     STA   TEMP,B
02C6    A401    A0 4 01                     STE   TEMP,B
02C7    1200    10 2 00                     LDL   $+X'0000'
02C8    2E27    28 6 27                     LDA   VSP ,C
02C9    2626    20 6 26                     LDE   VSP ,C
02CA    AE35    A8 6 35                     STA   RESPI ,C
02CB    A634    A0 6 34                     STE   RESPI ,C
02CC    2C2F    28 4 2F                     LDA   *X'0000' ,B
02CD    242E    20 4 2E                     LDE   *X'0000' ,B
02CE    AE41    A8 6 41                     STA   RESPIX,C
02CF    A640    A0 6 40                     STE   RESPIX,C
02D0    7575    70 5 75                     JMP   *)450,B
02D1    12DF    10 2 DF         )400        LDL   $+X'FFDF'
```

```
02D2    2E1D    28 6 1D             LDA    IPI ,C
02D3    6422    60 4 22             EOR    =X'FFFF' ,B
02D4    5E1E    58 6 1E             AND    IPIX,C
02D5    6422    60 4 22             EOR    =X'FFFF' ,B
02D6    F200    F0 2 00             ZJP    $+X'0000'
02D7    7576    70 5 76             JMP    *)490,B
02D8    1211    10 2 11             LDC    $+X'0011'
02D9    2E27    28 6 27             LDA    VSP ,C
02DA    2626    20 6 26             LDE    VSP ,C
02DB    AC02    A8 4 02             STA    TEMP,B
02DC    A401    A0 4 01             STE    TEMP,B
02DD    12B3    10 2 B3    )450     LDC    $+X'FFB3'
02DE    2E21    28 6 21             LDA    MHI ,C
02DF    F200    F0 2 00             ZJP    $+X'0000'
02E0    7577    70 5 77             JMP    *)470,B
02E1    2C02    28 4 02             LDA    TEMP,B
02E2    2401    20 4 01             LDE    TEMP,B
02E3    EDED    E8 5 ED             SST    *D11:,B
02E4    8055                        ADL    GR3
02E5    EDEB    E8 5 EB             SST    *S11:,B
02E6    806C                        ADL    A
02E7    120F    10 2 0F             LDC    $+X'000F'
02E8    AE19    A8 6 19             STA    REFDMD,C
02E9    A618    A0 6 18             STE    REFDMD,C
02EA    AE01    A8 6 01             STA    DDMD,C
02EB    A600    A0 6 00             STE    DDMD,C
02EC    EDEA    E8 5 EA             SST    *A11:,B
02ED    806C                        ADL    X
02EE    AE1D    A8 6 1D             STA    REF2,C
02EF    A61C    A0 6 1C             STE    REF2,C
02F0    7573    70 5 73             JMP    *)460,B
02F1    120A    10 2 0A    )470     LDC    $+X'000A'
02F2    2E19    28 6 19             LDA    REFDMD,C
02F3    2618    20 6 18             LDE    REFDMD,C
02F4    EDEA    E8 5 EA             SST    *A11:,B
02F5    806C                        ADL    X
02F6    AE1B    A8 6 1B             STA    REF1,C
02F7    A61A    A0 6 1A             STE    REF1,C

                                    LPL
02F8    7200    70 2 00             JMP    $+X'0000'
02F9    0000                        DAT    X'0000'
02FA    0000                        DAT    X'0000'
02FB    0000                        DAT    X'0000'
02FC    1200    10 2 00             LDC    $+X'0000'
02FD    2E57    28 6 57             LDA    GR3 ,C
02FE    2656    20 6 56             LDE    GR3 ,C
02FF    EDEC    E8 5 EC             SST    *M11:,B
0300    8078                        ADL    REF1
0301    AC5A    A8 4 5A             STA    #BRA,B
0302    A459    A0 4 59             STE    #BRA,B
0303    2C02    28 4 02             LDA    TEMP,B
0304    2401    20 4 01             LDE    TEMP,B
0305    EDED    E8 5 ED             SST    *D11:,B
0306    8059                        ADL    #BRA
0307    12F3    10 2 F3             LDC    $+X'FFF3'
0308    AE33    A8 6 33             STA    RESMW ,C
0309    A632    A0 6 32             STE    RESMW ,C
030A    2E1B    28 6 1B             LDA    REF1,C
030B    261A    20 6 1A             LDE    REF1,C
030C    EDEC    E8 5 EC             SST    *M11:,B
030D    8079                        ADL    RESMW
030E    AE1D    A8 6 1D             STA    REF2,C
030F    A61C    A0 6 1C             STE    REF2,C
0310    EF00    E8 7 00    )460     SST    *LCCO,B
0311    8072                        ADL    IPI
0312    807A                        ADL    IPIX
0313    8071                        ADL    IPIPB
0314    8008                        ADL    NB
0315    EF05    E8 7 05    )490     SST    *LCCO,B
0316    807B                        ADL    AIFAILPB
0317    807C                        ADL    AIFAILPX
0318    8024                        ADL    TSLT
0319    8005                        ADL    N3
031A    1800    18 0 00             LDG    X'0000'
031B    751D    70 5 1D             JMP    *FF,B
```

```
031C    807D                 ADL    SPIPB
031D    807E                 ADL    SPIF
031E    807F                 ADL    SPI
031F    1200    10 2 00      LDC    $+X'0000'
0320    AC23    A8 6 23      STA    SPI ,C
0321    2C24    28 6 24      LDA    SPIX,C
0322    AC01    A8 4 01      STA    T1,B
0323    EF0E    E8 7 0E      SST    *LCCO,B
0324    807F                 ADL    SPI
0325    8080                 ADL    SPIX
0326    807D                 ADL    SPIPB
0327    800A                 ADL    N8
0328    EF05    E8 7 05      SST    *LCCO,B
0329    807F                 ADL    SPI
032A    8001                 ADL    T1
032B    8024                 ADL    TSET
032C    801B                 ADL    N25
032D    EF05    E8 7 05      SST    *LCCO,B
032E    8081                 ADL    PERSCAN
032F    8082                 ADL    PERSCANX
0330    8024                 ADL    TSET
0331    801C                 ADL    N36
0332    2C26    28 4 26      LDA    =X'0000' ,B
0333    AC02    A8 4 02      STA    T2,B
0334    1215    10 2 15      LDC    $+X'0015'
0335    2E39    28 6 39      LDA    ATS ,C
0336    1200    10 2 00      LDC    $+X'0000'
0337    5E23    58 6 23      AND    ATSABPH ,C
0338    AC3C    A8 4 3C      STA    *BLA,B
0339    1205    10 2 05      LDC    $+X'0005'
033A    2E39    28 6 39      LDA    ATS ,C
033B    5422    50 4 22      EOR    =X'FFFF' ,B
033C    1200    10 2 00      LDC    $+X'0000'
033D    5E15    58 6 15      AND    ASPB,C
033E    A803    A8 0 03      STA    X'0003'
033F    50A0    50 0 A0      EOR    X'FFFF'
0340    5C3C    58 4 3C      AND    *BLA,B
0341    5003    50 0 03      EOR    X'0003'
0342    AC01    A8 4 01      STA    T1,B
0343    120A    10 2 0A      LDC    $+X'000A'
0344    2E2F    28 6 2F      LDA    PERSCAN ,C
0345    5422    50 4 22      EOR    =X'FFFF' ,B
0346    AC43    A8 4 43      STA    *BLB,B
0347    2E13    28 6 13      LDA    BR,C
0348    5422    50 4 22      EOR    =X'FFFF' ,B
0349    5C43    58 4 43      AND    *BLB,B
034A    12AF    10 2 AF      LDC    $+X'FFAF'
034B    5E0B    58 6 0B      AND    ASPERH,C
034C    1209    10 2 09      LDC    $+X'0009'
034D    5E00    58 6 00      AND    GC,C
034E    5E04    58 6 04      AND    DA,C
034F    5C01    58 4 01      AND    T1,B
0350    AC24    A8 4 24      STA    TSET,B
0351    5422    50 4 22      EOR    =X'FFFF' ,B
0352    AC25    A8 4 25      STA    TCLR,B
0353    1800    18 0 00      LDG    X'0000'
0354    751D    70 5 1D      JMP    *FF,B
0355    8024                 ADL    TSET
0356    8025                 ADL    TCLR
0357    8263                 ADL    AS
0358    120C    10 2 0C      LDC    $+X'000C'
0359    AE06    A8 6 06      STA    AS,C

                             LPL
035A    7200    70 2 00      JMP    $+X'0000'
035B    0000                 DAT    X'0000'
035C    0222                 ADL    X'0222'
035D    0000                 DAT    X'0000'
035E    0000                 DAT    X'0000'
035F    0000                 DAT    X'0000'
0360    2E2C    28 6 2C      LDA    ASX ,C
0361    5422    50 4 22      EOR    =X'FFFF' ,B
0362    5E06    58 6 06      AND    AS,C
0363    F200    F0 2 00      ZJP    $+X'0000'
0364    2C60    28 4 60      LDA    =X'FFFF' ,B
```

```
0365  AC02  A8 4 02   STA   T2,B
0366  EFF6  E8 7 F6   SST   *LCCO,B
0367  8083            ADL   AS
0368  8084            ADL   ASX
0369  8085            ADL   ASPB
036A  000B            ADL   N9
036B  12F0  10 2 F0   LDC   $+X'FFF0'
036C  2E11  28 6 11   LDA   ASUPX ,C
036D  5422  50 4 22   EOR   =X'FFFF' ,B
036E  1286  10 2 86   LDC   $+X'FF86'
036F  5E06  58 6 06   AND   ASUP,C
0370  12EB  10 2 EB   LDC   $+X'FFEB'
0371  5E06  58 6 06   AND   AS,C
0372  AC01  A8 4 01   STA   T1,B
0373  F200  F0 2 00   ZJP   $+X'0000'
0374  2C60  28 4 60   LDA   =X'FFFF' ,B
0375  12E6  10 2 E6   LDC   $+X'FFE6'
0376  AE3D  A8 6 3D   STA   ASINC ,C
0377  1262  10 2 62   LDC   $+X'FF82'
0378  2E06  28 6 06   LDA   ASUP,C
0379  12E2  10 2 E2   LDC   $+X'FFE2'
037A  AE11  A8 6 11   STA   ASUPX ,C
037B  2E12  28 6 12   LDA   ASDOWNX ,C
037C  5422  50 4 22   EOR   =X'FFFF' ,B
037D  1200  10 2 00   LDC   $+X'0000'
037E  5E07  58 6 07   AND   ASDOWN,C
037F  12DC  10 2 DC   LDC   $+X'FFDC'
0380  5E06  58 6 06   AND   AS,C
0381  AC01  A8 4 01   STA   T1,B
0382  F200  F0 2 00   ZJP   $+X'0000'
0383  2C60  28 4 60   LDA   =X'FFFF' ,B
0384  12D7  10 2 D7   LDC   $+X'FFD7'
0385  AE3E  A8 6 3E   STA   ASDEC ,C
0386  1209  10 2 09   LDC   $+X'0009'
0387  2E07  28 6 07   LDA   ASDOWN,C
0388  12D3  10 2 D3   LDC   $+X'FFD3'
0389  AE12  A8 6 12   STA   ASDOWNX ,C
038A  2E2F  28 6 2F   LDA   PERSCAN ,C
038B  5422  50 4 22   EOR   =X'FFFF' ,B
038C  1206  10 2 06   LDC   $+X'0006'
038D  5E0D  58 6 0D   AND   ADSPERM ,C
038E  12CD  10 2 CD   LDC   $+X'FFCD'
038F  5E04  58 6 04   AND   DA,C
0390  5E13  58 6 13   AND   BR,C
0391  12CC  10 2 CC   LDC   $+X'FFCC'
0392  5E16  58 6 16   AND   ADSPB ,C
0393  AC24  A8 4 24   STA   TSLT,B
0394  5422  50 4 22   EOR   =X'FFFF' ,B
0395  AC25  A8 4 25   STA   TCLR,B
0396  1800  18 0 00   LDG   X'0000'
0397  751D  70 5 1D   JMP   *FF,B
0398  0024            ADL   TSET
0399  0025            ADL   TCLR
039A  8086            ADL   ADS
039B  12C0  10 2 C0   LDC   $+X'FFC0'
039C  AE07  A8 6 07   STA   ADS ,C
039D  2E20  28 6 20   LDA   ADSX,C
039E  5422  50 4 22   EOR   =X'FFFF' ,B
039F  5E07  58 6 07   AND   ADS ,C
03A0  F200  F0 2 00   ZJP   $+X'0000'
03A1  2C60  28 4 60   LDA   =X'FFFF' ,B
03A2  AC02  A8 4 02   STA   T2,B
03A3  EFB9  E8 7 B9   SST   *LCCO,B
03A4  8086            ADL   ADS
03A5  8087            ADL   ADSX
03A6  8088            ADL   ADSPB
03A7  000C            ADL   N10
03A8  12B3  10 2 B3   LDC   $+X'FFB3'
03A9  2E1F  28 6 1F   LDA   ADSUPX,C
03AA  5422  50 4 22   EOR   =X'FFFF' ,B
03AB  121F  10 2 1F   LDC   $+X'001F'
03AC  5E06  58 6 06   AND   ADSUP ,C
03AD  12AE  10 2 AE   LDC   $+X'FFAE'
03AE  5E07  58 6 07   AND   ADS ,C
03AF  AC24  A8 4 24   STA   TSET,B
03B0  1205  10 2 05   LDC   $+X'0005'
03B1  2E06  28 6 06   LDA   ADSUP ,C
```

```
03B2   5422   54 4 22       EOR   *X'FFFF' ,B
03B3   12A6   10 2 A6       LDC    $+X'FFA6'
03B4   5E07   58 6 07       AND    ADS ,C
03B5   5E1F   58 6 1F       AND    ADSUPX,C
03B6   AC25   A8 4 25       STA    TCLR,B
03B7   1800   18 0 00       LDG    X'0000'
03B8   751D   70 5 1D       JMP   *FF,B
03B9   0024                 ADL    TSET
03BA   0025                 ADL    TCLR
03BB   8089                 ADL    CADSUP
03BC   129F   10 2 9F       LDC    $+X'FF9F'
03BD   AE1B   A8 6 1B       STA    CADSUP,C
03BE   2C25   28 4 25       LDA    TCLR,B
03BF   F200   F0 2 00       ZJP    $+X'0000'
03C0   2C60   28 4 60       LDA   *X'FFFF' ,B
03C1   129A   10 2 9A       LDC    $+X'FF9A'
03C2   AE3B   A8 6 3B       STA    ADSINC,C
03C3   1213   10 2 13       LDC    $+X'0013'
03C4   2E0B   28 6 0B       LDA    ADSUP ,C
03C5   1296   10 2 96       LDC    $+X'FF96'
03C6   AE1F   A8 6 1F       STA    ADSUPX,C
03C7   2E20   28 6 20       LDA    ADSDOWNX,C
03C8   5422   54 4 22       EOR   *X'FFFF' ,B
03C9   1206   10 2 06       LDC    $+X'0006'
03CA   5E0C   58 6 0C       AND    ADSDOWN ,C
03CB   1298   10 2 98       LDC    $+X'FF98'
03CC   5E07   58 6 07       AND    ADS ,C
03CD   AC24   A8 4 24       STA    TSET,B
03CE   1205   10 2 05       LDC    $+X'0005'
03CF   2E0C   28 6 0C       LDA    ADSDOWN ,C
03D0   5422   54 4 22       EOR   *X'FFFF' ,B
03D1   128A   10 2 8A       LDC    $+X'FF8A'
03D2   5E07   58 6 07       AND    ADS ,C
03D3   5E20   58 6 20       AND    ADSDOWNX,C
03D4   AC25   A8 4 25       STA    TCLR,B
03D5   1800   18 0 00       LDG    X'0000'
03D6   751D   70 5 1D       JMP   *FF,B
03D7   0024                 ADL    TSET
03D8   0025                 ADL    TCLR
03D9   808A                 ADL    CADSDOWN
03DA   1200   10 2 00       LDC    $+X'0000'
03DB   AE1C   A8 6 1C       STA    CADSDOWN,C
03DC   7200   70 2 00       JMP    $+X'0000'
03DD   0000                 DAT    X'0000'
03DE   0000                 DAT    X'0000'
03DF   2C25   28 4 25       LDA    TCLR,B
03E0   F200   F0 2 00       ZJP    $+X'0000'
03E1   2C60   28 4 60       LDA   *X'FFFF' ,B
03E2   12FB   10 2 FB       LDC    $+X'FFFB'
03E3   AE3C   A8 6 3C       STA    ADSDEC,C
03E4   12FA   10 2 FA       LDC    $+X'FFFA'
03E5   2E0C   28 6 0C       LDA    ADSDOWN ,C
03E6   12F7   10 2 F7       LDC    $+X'FFF7'
03E7   AE20   A8 6 20       STA    ADSDOWNX,C
03E8   1200   10 2 00       LDC    $+X'0000'
03E9   2E14   28 6 14       LDA    TURBSPDF,C
03EA   5422   54 4 22       EOR   *X'FFFF' ,B
03EB   AC3C   A8 4 3C       STA    #BLA,B
03EC   12F1   10 2 F1       LDC    $+X'FFF1'
03ED   2E13   28 6 13       LDA    BR,C
03EE   5422   54 4 22       EOR   *X'FFFF' ,B
03EF   5C3C   58 4 3C       AND    #BLA,B
03F0   5E04   58 6 04       AND    DA,C
03F1   1209   10 2 09       LDC    $+X'0009'
03F2   5E10   58 6 10       AND    AUTOSTAR,C
03F3   AC24   A8 4 24       STA    TSET,B
03F4   1200   10 2 00       LDC    $+X'0000'
03F5   2E04   28 6 04       LDA    SSPROA,C
03F6   5422   54 4 22       EOR   *X'FFFF' ,B
03F7   AC43   A8 4 43       STA    #BLB,B
03F8   2C24   28 4 24       LDA    TSET,B
03F9   5C43   58 4 43       AND    #BLB,B
03FA   5422   54 4 22       EOR   *X'FFFF' ,B
03FB   AC25   A8 4 25       STA    TCLR,B
03FC   1800   18 0 00       LDG    X'0000'
```

```
03FD    751D   70 5 1D          JMP   *FF,B
03FE    0024                    ADL    TSET
03FF    0025                    ADL    TCLR
0400    080B                    ADL    ATS
0401    12DC   10 2 DC          LDC    $+X'FFDC'
0402    AE39   AB 6 39          STA    ATS ,C
0403    2E3A   28 6 3A          LDA    ATSX,C
0404    5422   50 4 22          EOR   *X'FFFF' ,B
0405    5E39   58 6 39          AND    ATS ,C
0406    F200   F0 2 00          ZJP    $+X'0000'
0407    2C60   28 4 60          LDA   *X'FFFF' ,B
0408    AC12   A8 4 12          STA    T2,B
0409    12D4   10 2 D4          LDC    $+X'FFD4'
040A    2E39   28 6 39          LDA    ATS ,C
040B    5422   50 4 22          EOR   *X'FFFF' ,B
040C    5E3A   58 6 3A          AND    ATSX,C
040D    5422   50 4 22          EOR   *X'FFFF' ,B
040E    F200   F0 2 00          ZJP    $+X'0000'
040F    758E   70 5 8E          JMP   *)620,B
0410    2C26   28 4 26          LDA   *X'0000' ,B
0411    121D   10 2 1D          LDC    $+X'001D'
0412    AE02   A8 6 02          STA    ATSALOV ,C
0413    AE31   A8 6 31          STA    ATSSLNOV,C
0414    AE33   A8 6 33          STA    ATSSNRET,C
0415    1224   10 2 24          LDC    $+X'0024'
0416    AE15   A8 6 15          STA    ASPB,C
0417    1200   10 2 00          LDC    $+X'0000'
0418    2E19   28 6 19          LDA    REFDMD,C
0419    2618   20 6 18          LDE    REFDMD,C
041A    EDEB   E8 5 EB          SST   *S111,B
041B    080D                    ADL    DEMAND
041C    F201   F0 2 01          ZJP    $+X'0001'
041D    28A0   28 0 A0          LDA    X'FFFF'
041E    12C0   10 2 C0          LDC    $+X'FFC0'
041F    5E10   58 6 10          AND    ASL ,C
0420    F200   F0 2 00          ZJP    $+X'0000'
0421    2C60   28 4 60          LDA   *X'FFFF' ,B
0422    12BB   10 2 BB          LDC    $+X'FFBB'
0423    AE06   A8 6 06          STA    HOLDCP,C
0424    2C60   28 4 60          LDA   *X'FFFF' ,B
0425    12B8   10 2 B8          LDC    $+X'FFB8'
0426    AE26   A8 6 26          STA    RUNLOGIC,C
0427    1216   10 2 16          LDC    $+X'0016'
0428    2E1F   28 6 1F          LDA    PROTDA,C
0429    5422   50 4 22          EOR   *X'FFFF' ,B
042A    F200   F0 2 00          ZJP    $+X'0000'
042B    2C60   28 4 60          LDA   *X'FFFF' ,B
042C    1200   10 2 00          LDC    $+X'0000'
042D    AE2E   A8 6 2E          STA    M3GATSOF,C
042E    EF00   E8 7 00    )620  SST   *LCCO,B
042F    080B                    ADL    ATS
0430    080E                    ADL    ATSX
0431    080F                    ADL    AUTOSTAR
0432    080D                    ADL    N11
0433    2C02   28 4 02          LDA    T2,B
0434    5422   50 4 22          EOR   *X'FFFF' ,B
0435    F200   F0 2 00          ZJP    $+X'0000'
0436    7590   70 5 90          JMP   *)700,B
0437    1220   10 2 20          LDC    $+X'0020'
0438    2E19   28 6 19          LDA    REFDMD,C
0439    2618   20 6 18          LDE    REFDMD,C
043A    AE01   A8 6 01          STA    DDMD,C
043B    A600   A0 6 00          STE    DDMD,C
043C    2C60   28 4 60          LDA   *X'FFFF' ,B
043D    12A0   10 2 A0          LDC    $+X'FFA0'
043E    AE2B   A8 6 2B          STA    GOHOLDDF,C
043F    AE26   A8 6 26          STA    RUNLOGIC,C
0440    129D   10 2 9D    )700  LDC    $+X'FF9D'
0441    2E39   28 6 39          LDA    ATS ,C
0442    5422   50 4 22          EOR   *X'FFFF' ,B
0443    AC3C   A8 4 3C          STA   *DLA,B

                                LPL
0444    7200   70 2 00          JMP    $+X'0000'
0445    035C                    ADL    X'035C'
```

```
0446    0000                    DAT   X'0000'
0447    0000                    DAT   X'0000'
0448    0100                    DAT   X'0100'
0449    0000                    DAT   X'0000'
044A    2E07   26 6 07          LDA   ADS ,C
044B    5422   50 4 22          EOR   =X'FFFF' ,B
044C    AC43   A8 4 43          STA   *BLB,B
044D    2E06   26 6 06          LDA   AS,C
044E    5422   50 4 22          EOR   =X'FFFF' ,B
044F    5C43   58 4 43          AND   *BLB,B
0450    5C3C   58 4 3C          AND   *BLA,B
0451    5E04   58 6 04          AND   DA,C
0452    AC2E   A8 6 2E          STA   DALITE,C
0453    EFF2   E8 7 F2          SST   *LCCO,B
0454    8091                    ADL   DALITE
0455    8092                    ADL   DALITEK
0456    0024                    ADL   TSET
0457    0004                    ADL   N2
0458    EDE7   E8 5 E7          SST   *EXIT,B
0459    7593   70 5 93          JMP   *)5,B
0013    0460                    ADL   X'0460'
PROGRAM SIZE: 1120    DATA POOL SIZE: 0140    ERROR COUNT: 0000
0000    0000                    DAT   X'0000'
0001    0AFF   08 2 FF          LDB   $+X'FFFF'
0002    1200   10 2 00  )30000  LDC   $+X'0000'
0003    2E01   26 6 01          LDA   IPBX,C
0004    AC3E   A8 4 3E          STA   JJ,B
0005    2E00   26 6 00          LDA   IPN ,C
0044+B  002C
0006    4C44   48 4 44          SUB   =X'002C' ,B
0007    F200   F0 2 00          ZJP   $+X'0000'
0045+B  0000
0008    2C45   28 4 45          LDA   =X'0000' ,B
0009    AC3D   A8 4 3D          STA   ENTERPB ,B
000A    EF00   E8 7 00          BST   *GOT1,B
000B    0037                    DAT   X'0037'
000C    0000                    ADL   )1
000D    0000                    ADL   )2
000E    0000                    ADL   )3
000F    0000                    ADL   )4
0010    0000                    ADL   )5
0011    0000                    ADL   )2000
0012    0000                    ADL   )7
0013    0000                    ADL   )8
0014    0000                    ADL   )9
0015    0014                    ADL   )9
0016    0000                    ADL   )11
0017    0000                    ADL   )12
0018    0000                    ADL   )13
0019    0000                    ADL   )14
001A    0000                    ADL   )15
001B    0000                    ADL   )16
001C    0000                    ADL   )17
001D    0000                    ADL   )18
001E    0011                    ADL   )2000
001F    001E                    ADL   )2000
0020    001F                    ADL   )2000
0021    0000                    ADL   )22
0022    000E                    ADL   )23
0023    0000                    ADL   )24
0024    0000                    ADL   )25
0025    0000                    ADL   )26
0026    0020                    ADL   )2000
0027    0000                    ADL   )28
0028    0027                    ADL   )28
0029    0028                    ADL   )28
002A    0026                    ADL   )2000
002B    002A                    ADL   )2000
002C    0000                    ADL   )33
002D    002C                    ADL   )33
002E    002D                    ADL   )33
002F    002E                    ADL   )33
0030    002F                    ADL   )33
0031    0030                    ADL   )33
0032    0000                    ADL   )39
```

```
0033    0000                              ADL   )40
0034    0000                              ADL   )41
0035    0000                              ADL   )42
0036    0000                              ADL   )43
0037    0000                              ADL   )44
0038    002B                              ADL   )2000
0039    0038                              ADL   )2000
003A    0000                              ADL   )47
003B    0039                              ADL   )2000
003C    0000                              ADL   )49
003D    0000                              ADL   )50
003E    0000                              ADL   )5152
003F    003E                              ADL   )5152
0040    0000                              ADL   )53
0041    0000                              ADL   )54
0042    0046                              ADL   IPB
0043    7547    70 5 47    )10000   JMP   *)2000 ,B
0048+B  FFFF               )1
0044    2C48    28 4 48             LDA   *X'FFFF' ,B
0045    1200    10 2 00             LDC   $+X'0000'
0046    AE00    A8 6 00             STA   TRPB,C
0047    7549    70 5 49             JMP   *)1000 ,B
0048    1203    10 2 03    )2       LDC   $+X'0003'
0049    2E01    28 6 01             LDA   IPIPB ,C
004A+B  FFFF
004A    544A    50 4 4A             EOR   *X'FFFF' ,B
004B    AE01    A8 6 01             STA   IPIPB ,C
004C    7549    70 5 49             JMP   *)1000 ,B
004D    1205    10 2 05    )3       LDC   $+X'0005'
004E    2E03    28 6 03             LDA   MWIPB ,C
004F    544A    50 4 4A             EOR   *X'FFFF' ,B
0050    AE03    A8 6 03             STA   MWIPB ,C
0051    7549    70 5 49             JMP   *)1000 ,B
0052    2C48    28 4 48    )4       LDA   *X'FFFF' ,B
0053    1206    10 2 06             LDC   $+X'0006'
0054    AE05    A8 6 05             STA   SPIPB ,C
0055    7549    70 5 49             JMP   *)1000 ,B
0056    1203    10 2 03    )5       LDC   $+X'0003'
0057    2E07    28 6 07             LDA   TPCPB ,C
0058    544A    50 4 4A             EOR   *X'FFFF' ,B
0059    AE07    A8 6 07             STA   TPCPB ,C
005A    7549    70 5 49             JMP   *)1000 ,B
005B    1205    10 2 05    )7       LDC   $+X'0005'
005C    2E04    28 6 04             LDA   CRESETPB,C
005D    544A    50 4 4A             EOR   *X'FFFF' ,B
005E    F200    F0 2 00             ZJP   $+X'0000'
005F    7547    70 5 47             JMP   *)2000 ,B

                                    LPL
0060    7200    70 2 00             JMP   $+X'0000'
0061    0000                        DAT   X'0000'
0062    0000                        DAT   X'0000'
0063    0000                        DAT   X'0000'
0064    2C45    28 4 45             LDA   *X'0000' ,B
0065    12FE    10 2 FE             LDC   $+X'FFFE'
0066    AE04    A8 6 04             STA   CRESETPB,C
0067    EF00    E8 7 00             SST   *M$CCU ,B
0068    0021                        ADL   N1
0069    0020                        ADL   N0
006A    002A                        ADL   N10
006B    0021                        ADL   N1
006C    2C48    28 4 48             LDA   *X'FFFF' ,B
006D    12F6    10 2 F6             LDC   $+X'FFF6'
006E    AE05    A8 6 05             STA   SPIPB ,C
006F    1200    10 2 00             LDC   $+X'0000'
0070    AE26    A8 6 26             STA   RUNLOGIC,C
0071    2C21    28 4 21    )8       LDA   N1,B
0072    12EF    10 2 EF             LDC   $+X'FFEF'
0073    AE01    A8 6 01             STA   IPBX,C
0074    754B    70 5 4B             JMP   *)100,B
0075    1200    10 2 00    )9       LDC   $+X'0000'
0076    2E1B    28 6 1B             LDA   OPRT,C
0077    544A    50 4 4A             EOR   *X'FFFF' ,B
0078    5E13    58 6 13             AND   TM,C
0079    AB03    A8 3 03             STA   X'0003'
```

```
007A    50A0    50 0 A0           EOR   X'FFFF'
007B    120C    10 2 0C           LDC   $+X'000C'
007C    5E06    58 6 06           AND   AS,C
007D    5003    50 0 03           EOR   X'0003'
007E    A803    A8 0 03           STA   X'0003'
007F    50A0    50 0 A0           EOR   X'FFFF'
0080    5E07    58 6 07           AND   ADS ,C
0081    5003    50 0 03           EOR   X'0003'
0082    A803    A8 0 03           STA   X'0003'
0083    50A0    50 0 A0           EOR   X'FFFF'
0084    5E39    58 6 39           AND   ATS ,C
0085    5003    50 0 03           EOR   X'0003'
0086    F200    F0 2 00           ZJP   $+X'0000'
0087    7547    70 5 47           JMP   *)2000 ,B
0088    12D9    10 2 D9           LDC   $+X'FFD9'
0089    2E00    28 6 00           LDA   IPB ,C
008A    4C2A    48 4 2A           SUB   N10 ,B
008B    F201    F0 2 01           ZJP   $+X'0001'
008C    7200    70 2 00           JMP   $+X'0000'
008D    754C    70 5 4C           JMP   *)10 ,B
008E    2C48    28 4 48           LDA   *X'FFFF' ,B
008F    12D4    10 2 D4           LDC   $+X'FFD4'
0090    AE0A    A8 6 0A           STA   HOLDPB,C
0091    7549    70 5 49           JMP   *)1000 ,B
0092    2C48    28 4 48   )10     LDA   *X'FFFF' ,B
0093    12D0    10 2 D0           LDC   $+X'FFD0'
0094    AE0B    A8 6 0B           STA   GDPB,C
0095    2C45    28 4 45           LDA   *X'0000' ,B
0096    AE0A    A8 6 0A           STA   HOLDPB,C
0097    2C48    28 4 48   )1000   LDA   *X'FFFF' ,B
0098    121D    10 2 1D           LDC   $+X'001D'
0099    AE25    A8 6 25           STA   RUNLOGIC,C
009A    7547    70 5 47           JMP   *)2000 ,B
009B    2C22    28 4 22   )11     LDA   N2,B
009C    12C5    10 2 C5           LDC   $+X'FFC5'
009D    AE01    A8 6 01           STA   IPBX,C
009E    754B    70 5 4B           JMP   *)100,B
009F    2C23    28 4 23   )12     LDA   N3,B
00A0    12C1    10 2 C1           LDC   $+X'FFC1'
00A1    AE01    A8 6 01           STA   IPBX,C
00A2    754B    70 5 4B           JMP   *)100,B
00A3    2C45    28 4 45   )13     LDA   *X'0000' ,B
00A4    12BF    10 2 BF           LDC   $+X'FFBF'
00A5    AE15    A8 6 15           STA   ASPB,C
00A6    AE16    A8 6 16           STA   ADSPB ,C
00A7    AE10    A8 6 10           STA   AUTOSTAR,C
00A8    72EE    70 2 EE           JMP   )1000
00A9    12BA    10 2 BA   )14     LDC   $+X'FFBA'
00AA    2E13    28 6 13           LDA   DLINK ,C
00AB    544A    50 4 4A           EOR   *X'FFFF' ,B
00AC    AE13    A8 6 13           STA   DLINK ,C
00AD    F200    F0 2 00           ZJP   $+X'0000'
00AE    754D    70 5 4D           JMP   *)1400 ,B
00AF    EF48    E8 7 48           BST   *H$CLO ,B
00B0    0023                      ADL   N3
00B1    0030                      ADL   DLPATOFF
00B2    0036                      ADL   DLREG
00B3    0039                      ADL   DLMASK
00B4    7547    70 5 47           JMP   *)2000 ,B
00B5    EF86    E8 7 86   )1400   BST   *H$CLO ,B
00B6    0023                      ADL   N3
00B7    0033                      ADL   DLPATON
00B8    0036                      ADL   DLREG
00B9    0039                      ADL   DLMASK
00BA    7547    70 5 47           JMP   *)2000 ,B
00BB    2C48    28 4 48   )15     LDA   *X'FFFF' ,B
00BC    12A7    10 2 A7           LDC   $+X'FFA7'
00BD    AE15    A8 6 15           STA   ASPB,C
00BE    72D8    70 2 D8           JMP   )1000
00BF    2C48    28 4 48   )16     LDA   *X'FFFF' ,B
00C0    12A3    10 2 A3           LDC   $+X'FFA3'
00C1    AE16    A8 6 16           STA   ADSPB ,C
00C2    72D4    70 2 D4           JMP   )1000
00C3    2C48    28 4 48   )17     LDA   *X'FFFF' ,B
00C4    129F    10 2 9F           LDC   $+X'FF9F'
00C5    AE10    A8 6 10           STA   AUTOSTAR,C
```

```
                                          LPL
00C6     7200   70 2 00              JMP    $+X'0000'
00C7     0000                        DAT    X'0000'
00C8     0000                        DAT    X'0000'
00C9     0000                        DAT    X'0000'
00CA     72CC   70 2 CC              JMP    )1000
00CB     12FD   10 2 FD    )18       LDC    $+X'FFFD'
00CC     2E39   28 6 39              LDA    AT8 ,C
00CD     F200   F0 2 00              ZJP    $+X'0000'
00CE     7547   70 5 47              JMP    *)2000 ,B
00CF     1294   10 2 94              LDC    $+X'FF94'
00D0     2E14   28 6 14              LDA    TURBSPDF,C
00D1     544A   50 4 4A              EOR    =X'FFFF' ,B
00D2     AE14   A8 6 14              STA    TURBSPDF,C
00D3     72C3   70 2 C3              JMP    )1000
00D4     2C48   28 4 48    )22       LDA    =X'FFFF' ,B
00D5     128E   10 2 8E              LDC    $+X'FF8E'
00D6     AE0D   A8 6 0D              STA    VSTATUS ,C
00D7     2C26   28 4 26              LDA    N8,B
00D8     1289   10 2 89              LDC    $+X'FF89'
00D9     AE01   A8 6 01              STA    IPBX,C
00DA     754B   70 5 4B              JMP    *)100,B
00DB     1288   10 2 88    )23       LDC    $+X'FF88'
00DC     2E0D   28 6 0D              LDA    VSTATUS ,C
00DD     544A   50 4 4A              EOR    =X'FFFF' ,B
00DE     F200   F0 2 00              ZJP    $+X'0000'
00DF     7547   70 5 47              JMP    *)2000 ,B
00E0     2C48   28 4 48              LDA    =X'FFFF' ,B
00E1     1282   10 2 82              LDC    $+X'FF82'
00E2     AE0F   A8 6 0F              STA    TV,C
00E3     2C45   28 4 45              LDA    =X'0000' ,B
00E4     AE0E   A8 6 0E              STA    GV,C
00E5     EFE2   E8 7 E2              SST    *H$CCO ,B
00E6     0021                        ADL    N1
00E7     0024                        ADL    N4
00E8     002B                        ADL    N11
00E9     002C                        ADL    N12
00EA     754E   70 5 4E              JMP    *)115,B
00EB     1200   10 2 00    )24       LDC    $+X'0000'
00EC     2E0D   28 6 0D              LDA    VSTATUS ,C
00ED     544A   50 4 4A              EOR    =X'FFFF' ,B
00EE     A003   A8 0 03              STA    X'0003'
00EF     50A0   50 0 A0              EOR    X'FFFF'
00F0     5E12   58 6 12              AND    VTESTPB ,C
00F1     5003   50 0 03              EOR    X'0003'
00F2     F200   F0 2 00              ZJP    $+X'0000'
00F3     7547   70 5 47              JMP    *)2000 ,B
00F4     2C48   28 4 48              LDA    =X'FFFF' ,B
00F5     120A   10 2 0A              LDC    $+X'000A'
00F6     AE0E   A8 6 0E              STA    GV,C
00F7     2C45   28 4 45              LDA    =X'0000' ,B
00F8     AE0F   A8 6 0F              STA    TV,C
00F9     EFCE   E8 7 CE              SST    *H$CCO ,B
00FA     0021                        ADL    N1
00FB     0026                        ADL    N6
00FC     002B                        ADL    N11
00FD     002C                        ADL    N12
00FE     754E   70 5 4E              JMP    *)115,B
00FF     12CA   10 2 CA    )25       LDC    $+X'FFCA'
0100     2E13   28 6 13              LDA    TM,C
0101     F200   F0 2 00              ZJP    $+X'0000'
0102     7547   70 5 47              JMP    *)2000 ,B
0103     2C48   28 4 48              LDA    =X'FFFF' ,B
0104     120F   10 2 0F              LDC    $+X'000F'
0105     AE12   A8 6 12              STA    VTESTPB ,C
0106     EFC1   E8 7 C1              SST    *H$CCO ,B
0107     0021                        ADL    N1
0108     0006                        ADL    ON
0109     002B                        ADL    N11
010A     001B                        ADL    N16
010B     1200   10 2 00              LDC    $+X'0000'
010C     2E03   28 6 03              LDA    NVTEST,C
010D     F201   F0 2 01              ZJP    $+X'0001'
010E     7200   70 2 00              JMP    $+X'0000'
010F     72C4   70 2 C4              JMP    )22
0110     2C48   28 4 48              LDA    =X'FFFF' ,B
```

```
0111     120D   10 2 0D          LDC   $+X'000D'
0112     AE0F   A8 6 0F          STA   TV,C
0113     EFB4   E8 7 B4          SBT   *MSCCD ,B
0114     0021                    ADL   N1
0115     0024                    ADL   N4
0116     002B                    ADL   N11
0117     002C                    ADL   N12
0118     120D   10 2 0D          LDC   $+X'000D'
0119     2E03   28 6 03          LDA   NVTEST,C
011A     AE05   A8 6 05          STA   INDEX2,C
011B     720B   70 2 0B          JMP   )22
011C     2C26   28 4 26   )26    LDA   N6,B
011D     1205   10 2 05          LDC   $+X'0005'
011E     AE01   A8 6 01          STA   IPBX,C
011F     754B   70 5 4B          JMP   *)100,B
0120     1203   10 2 03   )28    LDC   $+X'0003'
0121     2E00   28 6 00          LDA   IPB ,C
0050+B   001B
0122     4C50   48 4 50          SUB   =X'001B' ,B
0123     AC4F   A8 4 4F          STA   KEY ,B
0124     7551   70 5 51          JMP   *)410,B
0125     1206   10 2 06   )33    LDC   $+X'0006'
0126     2E00   28 6 00          LDA   IPB ,C
0052+B   001D
0127     4C52   48 4 52          SUB   =X'001D' ,B
0128     AC4F   A8 4 4F          STA   KEY ,B
0129     7551   70 5 51          JMP   *)410,B
012A     1205   10 2 05   )39    LDC   $+X'0005'
012B     2E09   28 6 09          LDA   DATENTRY,C
012C     544A   50 4 4A          EOR   =X'FFFF' ,B
012D     A803   A8 0 03          STA   X'0003'
012E     50A0   50 0 A0          EOR   X'FFFF'
012F     5C3C   58 4 3C          AND   DECPT ,B
0130     5003   50 0 03          EOR   X'0003'
0131     F200   F0 2 00          ZJP   $+X'0000'
0132     7553   70 5 53          JMP   *)4100 ,B
0133     2C48   28 4 48          LDA   =X'FFFF' ,B
0134     AC3C   A8 4 3C          STA   DECPT ,B
0135     120B   10 2 0B          LDC   $+X'000B'
0136     3E0C   38 6 0C          STZ   IDPT,C
0137     7547   70 5 47          JMP   *)2000 ,B
0138     3C4F   38 4 4F   )48    STZ   KEY ,B
0139     7551   70 5 51          JMP   *)410,B
013A     1205   10 2 05   )41    LDC   $+X'0005'
013B     2E01   28 6 01          LDA   IPBX,C
013C     4C27   48 4 27          SUB   N7,B
013D     F202   F0 2 02          ZJP   $+X'0002'
013E     3805   38 0 05          STZ   X'0005'
013F     F201   F0 2 01          ZJP   $+X'0001'
0140     28A0   28 0 A0          LDA   X'FFFF'
0141     5E09   58 6 09          AND   DATENTRY,C
0142     AC54   A8 4 54          STA   #ALA,B
0143     2E01   28 6 01          LDA   IPBX,C
0144     4C27   48 4 27          SUB   N7,B
0145     F201   F0 2 01          ZJP   $+X'0001'
0146     28A0   28 0 A0          LDA   X'FFFF'
0147     A803   A8 0 03          STA   X'0003'
0148     50A0   50 0 A0          EOR   X'FFFF'
0149     5C54   58 4 54          AND   #ALA,B
014A     5003   50 0 03          EOR   X'0003'

                                 LPL
014B     7200   70 2 00          JMP   $+X'0000'
014C     0000                    DAT   X'0000'
014D     0000                    DAT   X'0000'
014E     F200   F0 2 00          ZJP   $+X'0000'
014F     7553   70 5 53          JMP   *)4100 ,B
0150     2C48   28 4 48          LDA   =X'FFFF' ,B
0151     12FB   10 2 FB          LDC   $+X'FFFB'
0152     AE09   A8 6 09          STA   DATENTRY,C
0153     EF00   E8 7 00          SBT   *MSCCO ,B
0154     0021                    ADL   N1
0155     0006                    ADL   ON
0156     002C                    ADL   N12
0157     0010                    ADL   N16
```

```
0158    12F4   10 2 F4           LDC   $+X'FFF4'
0159    2E0D   28 6 0D           LDA   DADR,C
015A    F200   F0 2 00           ZJP   $+X'0000'
015B    7555   70 5 55           JMP   *)4100 ,B
0057+B  0003
015C    2C57   28 4 57           LDA   =X'0003' ,B
015D    AC56   A8 4 56           STA   J ,B
015E    7558   70 5 58           JMP   *)440,B
015F    2C4A   28 4 4A   )4100   LDA   =X'FFFF' ,B
0160    12EC   10 2 EC           LDC   $+X'FFEC'
0161    AE08   A8 6 08           STA   INDEX3,C
0162    3E04   38 6 04           STZ   INDEX1,C
0163    7559   70 5 59           JMP   *)1691 ,B
0164    1200   10 2 00   )410    LDC   $+X'0000'
0165    2E06   28 6 06           LDA   INVREG,C
0166    F200   F0 2 00           ZJP   $+X'0000'
0167    7547   70 5 47           JMP   *)2000 ,B
0168    12E4   10 2 E4           LDC   $+X'FFE4'
0169    2E01   28 6 01           LDA   IPBX,C
016A    4C22   48 4 22           SUB   N2,B
016B    F202   F0 2 02           ZJP   $+X'0002'
016C    3805   38 0 05           STZ   X'0005'
016D    F201   F0 2 01           ZJP   $+X'0001'
016E    28A0   28 0 A0           LDA   X'FFFF'
016F    1200   10 2 00           LDC   $+X'0000'
0170    5E39   58 6 39           AND   ATS ,C
0171    F200   F0 2 00           ZJP   $+X'0000'
0172    7553   70 5 53           JMP   *)4100 ,B
0173    12D9   10 2 D9           LDC   $+X'FFD9'
0174    2E01   28 6 01           LDA   IPBX,C
0175    4C26   48 4 26           SUB   N6,B
0176    F201   F0 2 01           ZJP   $+X'0001'
0177    7200   70 2 00           JMP   $+X'0000'
0178    7553   70 5 53           JMP   *)4106 ,B
0179    12D3   10 2 D3           LDC   $+X'FFD3'
017A    2E03   28 6 03           LDA   NVTEST,C
017B    F201   F0 2 01           ZJP   $+X'0001'
017C    28A0   28 0 A0           LDA   X'FFFF'
017D    12D0   10 2 D0           LDC   $+X'FFD0'
017E    5E12   58 6 12           AND   VTESTPB ,C
017F    F200   F0 2 00           ZJP   $+X'0000'
0180    7553   70 5 53           JMP   *)4106 ,B
0181    1200   10 2 00           LDC   $+X'0000'
0182    2E10   28 6 10           LDA   ASL ,C
0183    544A   50 4 4A           EOR   =X'FFFF' ,B
0184    A803   A8 0 03           STA   X'0003'
0185    50A0   50 0 A0           EOR   X'FFFF'
0186    5E13   58 6 13           AND   TM,C
0187    5003   50 0 03           EOR   X'0003'
0188    544A   50 4 4A           EOR   =X'FFFF' ,B
0189    AC54   A8 4 54           STA   #ALA,B
018A    2E1B   28 6 1B           LDA   DPRT,C
018B    A803   A8 0 03           STA   X'0003'
018C    50A0   50 0 A0           EOR   X'FFFF'
018D    5C54   58 4 54           AND   #ALA,B
018E    5003   50 0 03           EOR   X'0003'
018F    544A   50 4 4A           EOR   =X'FFFF' ,B
0190    A803   A8 0 03           STA   X'0003'
0191    50A0   50 0 A0           EOR   X'FFFF'
0192    1223   10 2 23           LDC   $+X'0023'
0193    5E06   58 6 06           AND   AS,C
0194    5003   50 0 03           EOR   X'0003'
0195    A803   A8 0 03           STA   X'0003'
0196    50A0   50 0 A0           EOR   X'FFFF'
0197    5E07   58 6 07           AND   ADS ,C
0198    5003   50 0 03           EOR   X'0003'
0199    A803   A8 0 03           STA   X'0003'
019A    50A0   50 0 A0           EOR   X'FFFF'
019B    5E09   58 6 09           AND   DO,C
019C    5003   50 0 03           EOR   X'0003'
019D    A803   A8 0 03           STA   X'0003'
019E    50A0   50 0 A0           EOR   X'FFFF'
019F    5E39   58 6 39           AND   ATS ,C
01A0    5003   50 0 03           EOR   X'0003'
01A1    AC5A   A8 4 5A           STA   #ALB,B
```

```
01A2    12AA   10 2 AA          LDC   $+X'FFAA'
01A3    2E01   28 6 01          LDA   IPBX,C
01A4    4C21   48 4 21          SUB   N1,B
01A5    F202   F0 2 02          ZJP   $+X'0002'
01A6    3805   38 0 05          STZ   X'0005'
01A7    F201   F0 2 01          ZJP   $+X'0001'
01A8    28A0   28 0 A0          LDA   X'FFFF'
01A9    5C5A   58 4 5A          AND   #ALB,B
01AA    F200   F0 2 00          ZJP   $+X'0000'
01AB    7563   70 5 63          JMP   *)4106 ,B
01AC    2C48   28 4 48          LDA   =X'FFFF' ,B
01AD    129F   10 2 9F          LDC   $+X'FF9F'
01AE    AE07   A8 6 07          STA   KEYENTRY,C
01AF    2C4F   28 4 4F          LDA   KEY ,B
01B0    4C29   48 4 29          SUB   N9,B
01B1    BA03   B8 2 03          NJP   $+X'0003'
01B2    F202   F0 2 02          ZJP   $+X'0002'
01B3    3805   38 0 05          STZ   X'0005'
01B4    F201   F0 2 01          ZJP   $+X'0001'
01B5    28A0   28 0 A0          LDA   X'FFFF'
01B6    AC54   A8 4 54          STA   #ALA,B

                                LPL
01B7    7200   70 2 00          JMP   $+X'0000'
01B8    00C7                    ADL   X'00C7'
01B9    0000                    DAT   X'0000'
01BA    0000                    DAT   X'0000'
01BB    0000                    DAT   X'0000'
01BC    2C4F   28 4 4F          LDA   KEY ,B
01BD    B202   B0 2 02          PJP   $+X'0002'
01BE    3805   38 0 05          STZ   X'0005'
01BF    F201   F0 2 01          ZJP   $+X'0001'
01C0    28A0   28 0 A0          LDA   X'FFFF'
01C1    5C54   58 4 54          AND   #ALA,B
01C2    544A   50 4 4A          EOR   =X'FFFF' ,B
01C3    F200   F0 2 00          ZJP   $+X'0000'
01C4    7563   70 5 63          JMP   *)4106 ,B
01C5    2C5B   28 4 5B          LDA   ID,B
01C6    F201   F0 2 01          ZJP   $+X'0001'
01C7    7200   70 2 00          JMP   $+X'0000'
01C8    756C   70 5 6C          JMP   *)414,B
005D+B  0001
01C9    2C5D   28 4 5D          LDA   =X'0001' ,B
01CA    AC3E   A8 4 3E          STA   JJ,B
01CB    2C5B   28 4 5B          LDA   ID,B
01CC    4C3E   48 4 3E          SUB   JJ,B
01CD    6005   60 0 05          INC   X'0005'
01CE    AC5E   A8 4 5E          STA   I ,B
01CF    2C5E   28 4 5E          LDA   I ,B
01D0    AC5F   A8 4 5F          STA   #AIA,B
01D1    4200   40 2 00          ADD   =X'003F'
01D2    AC60   A8 4 60          STA   #AIB,B
01D3    2C5F   28 4 5F          LDA   #AIA,B
01D4    4200   40 2 00          ADD   =X'003E'
01D5    AC61   A8 4 61          STA   #AIC,B
01D6    2D61   28 5 61          LDA   *#AIC,B
01D7    AD60   A8 5 60          STA   *#AIB,B
01D8    643E   60 4 3E   )412   INC   JJ,B
01D9    2C5B   28 4 5B          LDA   ID,B
01DA    4C3E   48 4 3E          SUB   JJ,B
01DB    B2EF   B0 2 EF          PJP   $+X'FFEF'
01DC    2C4F   28 4 4F   )414   LDA   KEY ,B
01DD    AC3F   A8 4 3F          STA   IN,B
01DE    2C5B   28 4 5B          LDA   ID,B
01DF    4C23   48 4 23          SUB   N3,B
01E0    B200   B0 2 00          PJP   $+X'0000'
01E1    645B   60 4 5B          INC   ID,B
01E2    2C3C   28 4 3C          LDA   DECPT ,B
01E3    544A   50 4 4A          EOR   =X'FFFF' ,B
01E4    F200   F0 2 00          ZJP   $+X'0000'
01E5    7562   70 5 62          JMP   *)416,B
01E6    1200   10 2 00          LDC   $+X'0000'
01E7    660C   60 6 0C          INC   IDPT,C
01E8    2E0C   28 6 0C          LDA   IDPT,C
01E9    4C24   48 4 24          SUB   N4,B
```

```
01EA    F201   F0 2 01          ZJP   $+X'0001'
01EB    B200   B0 2 00          PJP   $+X'0000'
01EC    7562   70 5 62          JMP   *)415,B
01ED    1207   10 2 07          LDC   $+X'0007'
01EE    3E0C   38 6 0C          STZ   IDPT,C
01EF    2C45   28 4 45          LDA   =X'0000' ,B
01F0    AC3C   A8 4 3C          STA   DECPT ,B
0064+B  0002            )415
01F1    2C64   28 4 64          LDA   =X'0002' ,B
01F2    AC56   A8 4 56          STA   J ,B
01F3    2C4A   28 4 4A          LDA   =X'FFFF' ,B
01F4    1207   10 2 07          LDC   $+X'0007'
01F5    AE08   A8 6 08          STA   INDEX3,C
01F6    3E04   38 6 04          STZ   INDEX1,C
01F7    6463   60 4 63          INC   IVS ,B
01F8    7558   70 5 58          JMP   *)440,B
01F9    2C48   28 4 48  )4100   LDA   =X'FFFF' ,B
01FA    12C1   10 2 C1          LDC   $+X'FFC1'
01FB    AE08   A8 6 08          STA   INVREQ,C
01FC    7565   70 5 65          JMP   *)420,B
01FD    2C45   28 4 45  )42     LDA   =X'0000' ,B
01FE    12BD   10 2 BD          LDC   $+X'FFBD'
01FF    AE08   A8 6 08          STA   INVREQ,C
0200    EFB8   E8 7 B8          BST   *MSCCO ,B
0201    0021                    ADL   N1
0202    0065                    ADL   OFF
0203    002C                    ADL   N12
0204    001B                    ADL   N16
0205    2C45   28 4 45  )420    LDA   =X'0000' ,B
0206    1212   10 2 12          LDC   $+X'0012'
0207    AE09   A8 6 09          STA   DATENTRY,C
0208    AC3C   A8 4 3C          STA   DECPT ,B
0209    3E0C   38 6 0C          STZ   IDPT,C
020A    7566   70 5 66          JMP   *)110,B
020B    2C27   28 4 27  )43     LDA   N7,B
020C    1206   10 2 06          LDC   $+X'0006'
020D    AE01   A8 6 01          STA   IPBX,C
020E    2C45   28 4 45          LDA   =X'0000' ,B
020F    AE0D   A8 6 0D          STA   DADR,C
0210    AE09   A8 6 09          STA   DATENTRY,C
0211    AC3C   A8 4 3C          STA   DECPT ,B
0212    754B   70 5 4B          JMP   *)100,B
0213    12A6   10 2 A6  )44     LDC   $+X'FFA6'
0214    2E06   28 6 06          LDA   AS,C
0215    A803   A8 0 03          STA   X'0003'
0216    50A0   50 0 A0          EOR   X'FFFF'
0217    5E07   58 6 07          AND   ADS ,C
0218    5003   50 0 03          EOR   X'0003'
0219    A803   A8 0 03          STA   X'0003'
021A    50A0   50 0 A0          EOR   X'FFFF'
021B    5E39   58 6 39          AND   ATS ,C
021C    5003   50 0 03          EOR   X'0003'
021D    A803   A8 0 03          STA   X'0003'
021E    50A0   50 0 A0          EOR   X'FFFF'
021F    129C   10 2 9C          LDC   $+X'FF9C'
0220    5E08   58 6 08          AND   INVREQ,C
0221    5003   50 0 03          EOR   X'0003'
0222    AC54   A8 4 54          STA   PALA,B
0223    1217   10 2 17          LDC   $+X'0017'
0224    2E01   28 6 01          LDA   IPBX,C
0225    4C21   48 4 21          SUB   N1,B
0226    F202   F0 2 02          ZJP   $+X'0002'
0227    3805   38 0 05          STZ   X'0005'
0228    F201   F0 2 01          ZJP   $+X'0001'
0229    28A0   28 0 A0          LDA   X'FFFF'
022A    5C54   58 4 54          AND   PALA,B
022B    A803   A8 0 03          STA   X'0003'
022C    50A0   50 0 A0          EOR   X'FFFF'
022D    5C3D   58 4 3D          AND   ENTERPB ,B
022E    5003   50 0 03          EOR   X'0003'

                                LPL
022F    7200   70 2 00          JMP   $+X'0000'
0230    0000                    DAT   X'0000'
0231    0000                    DAT   X'0000'
```

```
0232     0000                       DAT   K'0000'
0233     F200  F0 2 00              ZJP   $+X'0000'
0234     72C4  70 2 C4              JMP   )4100
0235     2C48  28 4 48              LDA   =K'FFFF' ,B
0236     AC3D  A8 4 3D              STA   ENTERPB ,B
0237     2C5D  28 4 5D              LDA   =K'0001' ,B
0238     AC56  A8 4 56              STA   J ,B
0068+B   03E8             )440
0239     2C68  28 4 68              LDA   =X'03E8' ,B
023A     AC67  A8 4 67              STA   IDM ,B
023B     12F5  10 2 F5              LDC   $+X'FFF5'
023C     3E06  38 6 06              STZ   IWINDOW ,C
023D     2C21  28 4 21              LDA   N1,B
023E     AC3E  A8 4 3E              STA   JJ,B
023F     2C25  28 4 25              LDA   NP,B
0240     4C3E  48 4 3E              SUB   JJ,B
0241     AC5E  A8 4 5E              STA   I ,B
0242     2C5E  28 4 5E              LDA   I ,B
0243     42EF  40 2 EF              ADD   =K'003E'
0244     AC5F  A8 4 5F              STA   FAIA,B
0245     2D5F  28 5 5F              LDA   *FAIA,B
0246     D467  D0 4 67              MPY   IDM ,B
0247     12E9  10 2 E9              LDC   $+X'FFE9'
0248     4606  40 6 06              ADD   IWINDOW ,C
0249     AE06  A8 6 06              STA   IWINDOW ,C
024A     2C67  28 4 67              LDA   IDM ,B
024B     3804  38 0 04              STZ   X'0004'
024C     2805  28 0 05              LDA   X'0005'
024D     B201  B0 2 01              PJP   $+X'0001'
024E     6804  68 0 04              DCR   X'0004'
024F     DC2A  D8 4 2A              DIV   N10 ,B
0250     AC67  A8 4 67              STA   IDM ,B
0251     643E  60 4 3E    )444      INC   JJ,B
0252     2C24  28 4 24              LDA   N4,B
0253     4C3E  48 4 3E              SUB   JJ,B
0254     B2EA  B0 2 EA              PJP   $+X'FFEA'
0255     2C45  28 4 45              LDA   =X'0000' ,B
0256     12DA  10 2 DA              LDC   $+X'FFDA'
0257     AE0D  A8 6 0D              STA   DADR,C
0258     EF00  E8 7 00              BST   *GOTI$,B
0259     0004                       DAT   X'0004'
025A     0000                       ADL   )445
025B     0000                       ADL   )170
025C     0000                       ADL   )4450
025D     0056                       ADL   J
025E     12D2  10 2 D2    )445      LDC   $+X'FFD2'
025F     2E06  28 6 06              LDA   IWINDOW ,C
0260     EDEE  E8 5 EE              BST   *CMI$,B
0261     AC5A  A8 4 5A              STA   VDISPLAY,B
0262     A459  A0 4 59              STL   VDISPLAY,B
0263     2E01  28 6 01              LDA   IPBX,C
0264     4C27  48 4 27              SUB   N7,B
0265     F202  F0 2 02              ZJP   $+X'0002'
0266     3805  38 0 05              STZ   X'0005'
0267     F201  F0 2 01              ZJP   $+X'0001'
0268     28A0  28 0 A0              LDA   K'FFFF'
0269     5E09  58 6 09              AND   DATENTRY,C
026A     F200  F0 2 00              ZJP   $+X'0000'
026B     756B  70 5 6B              JMP   *)4460 ,B
026C     EF14  E8 7 14    )4450     BST   *GOTI$,B
026D     0009                       DAT   X'0009'
026E     0000                       ADL   )4400
026F     0000                       ADL   )4402
0270     026F                       ADL   )4402
0271     01FB                       ADL   )4106
0272     01FB                       ADL   )4106
0273     01FB                       ADL   )4106
0274     0000                       ADL   )441
0275     0000                       ADL   )442
0276     006C                       ADL   IPBX
0277     1200  10 2 00    )4400     LDC   $+X'0000'
0278     2E13  28 6 13              LDA   BR,C
0279     F200  F0 2 00              ZJP   $+X'0000'
027A     756D  70 5 6D              JMP   *)4403 ,B
027B     1200  10 2 00              LDC   $+X'0000'
```

```
027C     2E17   28 6 17            LDA   HLS ,C
027D     2616   20 6 16            LDE   HLS ,C
027E     AC6F   A8 4 6F            STA   TEMP,B
027F     A46E   A0 4 6E            STE   TEMP,B
0280     7570   70 5 70            JMP   *)4405 ,B
0071+B   0000             )4402
0072+B   0000
0281     2C72   28 4 72            LDA   *K'0000' ,B
0282     2471   20 4 71            LDE   *K'0000' ,B
0283     EDEB   E8 5 EB            BST   *B11;,B
0284     0069                      ADL   VDISPLAY
0285     F201   F0 2 01            ZJP   $+X'0001'
0286     7200   70 2 00            JMP   $+X'0000'
0287     7553   70 5 53            JMP   *)4106 ,B
0288     12AB   10 2 AB   )4403    LDC   $+X'FFAB'
0289     2E01   28 6 01            LDA   IPBX,C
028A     4005   40 0 05            ADD   X'0005'
028B     4200   40 2 00            ADD   *X'FFFE'
028C     AC5F   A8 4 5F            STA   #AIA,B
028D     3804   38 0 04            STZ   X'0004'
028E     3805   38 0 05            STZ   X'0005'
028F     C55F   C0 5 5F            ADA   *#AIA,B
0290     AC6F   A8 4 6F            STA   TEMP,B
0291     A46E   A0 4 6E            STE   TEMP,B
0292     2C6A   28 4 6A   )4405    LDA   VDISPLAY,B
0293     2469   20 4 69            LDE   VDISPLAY,B
0294     EDEB   E8 5 EB            BST   *B11;,B
0295     006E                      ADL   TEMP
0296     F200   F0 2 00            ZJP   $+X'0000'
0297     BA01   B8 2 01            NJP   $+X'0001'
0298     7553   70 5 53            JMP   *)4106 ,B
0299     1297   10 2 97   )4406    LDC   $+X'FF97'
029A     2E01   28 6 01            LDA   IPBX,C
029B     4005   40 0 05            ADD   X'0005'
029C     4200   40 2 00            ADD   *X'FFFE'
029D     AC5F   A8 4 5F            STA   #AIA,B
029E     2C6A   28 4 6A            LDA   VDISPLAY,B
029F     2469   20 4 69            LDE   VDISPLAY,B
02A0     1C5F   18 4 5F            LDG   #AIA,B
02A1     A103   A0 1 03            STE   *X'0003'
02A2     6003   60 0 03            INC   X'0003'
02A3     A903   A8 1 03            STA   *X'0003'
02A4     2E01   28 6 01            LDA   IPBX,C
02A5     4C21   48 4 21            SUB   N1,B
02A6     F200   F0 2 00            ZJP   $+X'0000'
02A7     BA01   B8 2 01            NJP   $+X'0001'
02A8     7573   70 5 73            JMP   *)169,B
02A9     1200   10 2 00            LDC   $+X'0000'
02AA     2E19   28 6 19            LDA   REFDMD,C
02AB     2618   20 6 18            LDE   REFDMD,C
02AC     EDEF   E8 5 EF            BST   *C10;,B
02AD     AC5E   A8 4 5E            STA   I ,B
02AE     2E01   28 6 01            LDA   DDMD,C
02AF     2600   20 6 00            LDE   DDMD,C
02B0     EDEF   E8 5 EF            BST   *C10;,B
02B1     AC56   A8 4 56            STA   J ,B
02B2     4C5E   48 4 5E            SUB   I ,B
02B3     F201   F0 2 01            ZJP   $+X'0001'
02B4     7200   70 2 00            JMP   $+X'0000'
02B5     7574   70 5 74            JMP   *)4407 ,B

                                   LPL
02B6     7200   70 2 00            JMP   $+X'0000'
02B7     0062                      ADL   X'0062'
02B8     0000                      DAT   X'0000'
02B9     0000                      DAT   X'0000'
02BA     FFFE                      DAT   X'FFFE'
02BB     FFFE                      DAT   X'FFFE'
02BC     0000                      DAT   X'0000'
02BD     2C48   28 4 48            LDA   *X'FFFF' ,B
02BE     12FA   10 2 FA            LDC   $+X'FFFA'
02BF     AE08   A8 6 08            STA   HOLDCP,C
02C0     757B   70 5 7B            JMP   *)4409 ,B
02C1     2C48   28 4 48   )4407    LDA   *X'FFFF' ,B
02C2     12F6   10 2 F6            LDC   $+X'FFF6'
```

```
02C3   AE2B   A8 6 2B           STA   GOHOLDUF,C
02C4   2C48   28 4 48   )4409   LDA   =X'FFFF' ,B
02C5   12F3   10 2 F3           LDC   $+X'FFF3'
02C6   AE26   A8 6 26           STA   RUNLOGIC,C
02C7   7573   70 5 73           JMP   *)169,B
02C8   1200   10 2 00   )441    LDC   $+X'0000'
02C9   2E06   28 6 06           LDA   IWINDOW ,C
02CA   3804   38 0 04           STZ   X'0004'
02CB   2805   28 0 05           LDA   X'0005'
02CC   B201   B0 2 01           PJP   $+X'0001'
02CD   6804   68 0 04           DCR   X'0004'
02CE   DC68   D8 4 68           DIV   =X'03E8' ,B
02CF   AE04   A8 6 04           STA   INDEX1,C
02D0   D468   D0 4 68           MPY   =X'03E8' ,B
02D1   AC5F   A8 4 5F           STA   #A1A,B
02D2   2E06   28 6 06           LDA   IWINDOW ,C
02D3   4C5F   48 4 5F           SUB   #A1A,B
02D4   AE05   A8 6 05           STA   INDEX2,C
02D5   2C48   28 4 48           LDA   =X'FFFF' ,B
02D6   AE0D   A8 6 0D           STA   DADR,C
02D7   2E04   28 6 04           LDA   INDEX1,C
02D8   AC76   A8 4 76           STA   INDEX11 ,B
02D9   2E09   28 6 09           LDA   DATENTRY,C
02DA   5C4A   58 4 4A           EOR   =X'FFFF' ,B
02DB   F200   F0 2 00           ZJP   $+X'0000'
02DC   7577   70 5 77           JMP   *)1695 ,B
02DD   7578   70 5 78           JMP   *)200,B
02DE   1200   10 2 00   )442    LDC   $+X'0000'
02DF   2E0E   28 6 0E           LDA   GV,C
02E0   A803   A8 0 03           STA   X'0003'
02E1   58A0   58 0 A0           EOR   X'FFFF'
02E2   5E0F   58 6 0F           AND   TV,C
02E3   5803   58 0 03           EOR   X'0003'
02E4   5C4A   58 4 4A           EOR   =X'FFFF' ,B
02E5   F200   F0 2 00           ZJP   $+X'0000'
02E6   7553   70 5 53           JMP   *)4106 ,B
02E7   121F   10 2 1F           LDC   $+X'001F'
02E8   2E06   28 6 06           LDA   IWINDOW ,C
02E9   4C22   48 4 22           SUB   N2,B
02EA   F204   F0 2 04           ZJP   $+X'0004'
02EB   B202   B0 2 02           PJP   $+X'0002'
02EC   3805   38 0 05           STZ   X'0005'
02ED   F201   F0 2 01           ZJP   $+X'0001'
02EE   28A0   28 0 A0           LDA   X'FFFF'
02EF   AC54   A8 4 54           STA   #ALA,B
02F0   2E06   28 6 06           LDA   IWINDOW ,C
02F1   BA03   B8 2 03           NJP   $+X'0003'
02F2   F202   F0 2 02           ZJP   $+X'0002'
02F3   3805   38 0 05           STZ   X'0005'
02F4   F201   F0 2 01           ZJP   $+X'0001'
02F5   28A0   28 0 A0           LDA   X'FFFF'
02F6   A803   A8 0 03           STA   X'0003'
02F7   58A0   58 0 A0           EOR   X'FFFF'
02F8   5C54   58 4 54           AND   #ALA,B
02F9   5803   58 0 03           EOR   X'0003'
02FA   F200   F0 2 00           ZJP   $+X'0000'
02FB   7553   70 5 53           JMP   *)4106 ,B
02FC   121E   10 2 1E           LDC   $+X'001E'
02FD   2E0F   28 6 0F           LDA   TV,C
02FE   F200   F0 2 00           ZJP   $+X'0000'
02FF   7579   70 5 79           JMP   *)4423 ,B
0300   1219   10 2 19   )4422   LDC   $+X'0019'
0301   2E06   28 6 06           LDA   IWINDOW ,C
0302   4424   40 4 24           ADD   N4,B
0303   AE06   A8 6 06           STA   IWINDOW ,C
0304   1204   10 2 04   )4423   LDC   $+X'0004'
0305   2E06   28 6 06           LDA   IWINDOW ,C
0306   AE05   A8 6 05           STA   INDEX2,C
0307   7573   70 5 73           JMP   *)169,B
0308   2C76   28 4 76   )4408   LDA   INDEX11 ,B
0309   4C67   48 4 67           SUB   =X'0003' ,B
030A   F201   F0 2 01           ZJP   $+X'0001'
030B   28A0   28 0 A0           LDA   X'FFFF'
030C   AC54   A8 4 54           STA   #ALA,B
```

```
030D      1200    10 2 00              LDC    $+X'0000'
030E      2E05    28 6 05              LDA    INDEX2,C
007A+B    0101
030F      4C7A    48 4 7A              SUB    =X'0101' ,B
0310      B202    B0 2 02              PJP    $+X'0002'
0311      3805    38 0 05              STZ    X'0005'
0312      F201    F0 2 01              ZJP    $+X'0001'
0313      20A0    20 0 A0              LDA    X'FFFF'
0314      AC5A    A8 4 5A              STA    #ALB,B
0315      2E05    28 6 05              LDA    INDEX2,C
007B+B    0161
0316      4C7B    48 4 7B              SUB    =X'0161' ,B
0317      BA02    B8 2 02              NJP    $+X'0002'
0318      3805    38 0 05              STZ    X'0005'
0319      F201    F0 2 01              ZJP    $+X'0001'
031A      20A0    20 0 A0              LDA    X'FFFF'
031B      A803    A8 0 03              STA    X'0003'
031C      50A0    50 0 A0              EOR    X'FFFF'
031D      5C5A    58 4 5A              AND    #ALB,B
031E      5003    50 0 03              EOR    X'0003'
031F      544A    50 4 4A              EOR    =X'FFFF' ,B
0320      AC7C    A8 4 7C              STA    #ALC,B
0321      1200    10 2 00              LDC    $+X'0000'
0322      2E1B    28 6 1B              LDA    OPRT,C
0323      A803    A8 0 03              STA    X'0003'
0324      50A0    50 0 A0              EOR    X'FFFF'
0325      5C7C    58 4 7C              AND    #ALC,B
0326      5003    50 0 03              EOR    X'0003'
0327      AC7D    A8 4 7D              STA    #ALD,B
                                      LPL
0328      7200    70 2 00              JMP    $+X'0000'
0329      0000                         DAT    X'0000'
032A      0000                         DAT    X'0000'
032B      0000                         DAT    X'0000'
032C      2C54    28 4 54              LDA    #ALA,B
032D      544A    50 4 4A              EOR    =X'FFFF' ,B
032E      AC7E    A8 4 7E              STA    #ALE,B
032F      2C7D    28 4 7D              LDA    #ALD,B
0330      5C7E    58 4 7E              AND    #ALE,B
0331      544A    50 4 4A              EOR    =X'FFFF' ,B
0332      F200    F0 2 00              ZJP    $+X'0000'
0333      7583    70 5 83              JMP    *)4108 ,B
0081+B    4100
0082+B    0000
0334      2C82    28 4 82              LDA    =X'4100' ,B
0335      2481    20 4 81              LDE    =X'4100' ,B
0336      AC80    A8 4 80              STA    DEC ,B
0337      A47F    A0 4 7F              STE    DEC ,B
0338      12F1    10 2 F1    )4462     LDC    $+X'FFF1'
0339      2E0C    28 6 0C              LDA    IDPT,C
033A      F201    F0 2 01              ZJP    $+X'0001'
033B      7200    70 2 00              JMP    $+X'0000'
033C      7583    70 5 83              JMP    *)4464 ,B
033D      12EC    10 2 EC              LDC    $+X'FFEC'
033E      6E0C    68 6 0C              DCR    IDPT,C
033F      2C80    28 4 80              LDA    DEC ,B
0340      247F    20 4 7F              LDE    DEC ,B
0341      EDEC    E8 5 EC              BST    *M11,B
0084+B    44A0
0085+B    0000
0342      0084                         ADL    =X'44A0'
0343      AC80    A8 4 80              STA    DEC ,B
0344      A47F    A0 4 7F              STE    DEC ,B
0345      72F2    70 2 F2              JMP    )4462
0346      12E3    10 2 E3    )4464     LDC    $+X'FFE3'
0347      2E05    28 6 05              LDA    INDEX2,C
0348      4005    40 0 05              ADD    X'0005'
0349      4200    40 2 00              ADD    =X'FFFE'
034A      AC5F    A8 4 5F              STA    #AIA,B
034B      2C6A    28 4 6A              LDA    VDISPLAY,B
034C      2469    20 4 69              LDE    VDISPLAY,B
034D      EDED    E8 5 ED              BST    *D11,B
034E      007F                         ADL    DEC
034F      1C5F    18 4 5F              LDG    #AIA,B
0350      A103    A0 1 03              STE    *X'0003'
```

```
0351    6003   60 0 03              INC   K'0003'
0352    A903   A8 1 03              STA   *K'0003'
0353    EF00   E8 7 00              BST   *MICCD ,B
0354    0021                        ADL   N1
0355    0000                        ADL   OFF
0356    002C                        ADL   N12
0357    001B                        ADL   N16
0358    2C45   28 4 45              LDA   *K'0008' ,B
0359    12D0   10 2 D0              LDC   $+X'FFD0'
035A    AE09   A8 6 09              STA   DATENTRY,C
035B    AC3C   A8 4 3C              STA   DECPT ,B
035C    2C48   28 4 48              LDA   *X'FFFF' ,B
035D    AE0D   A8 6 0D              STA   DADR,C
035E    7578   70 5 78              JMP   *)200,B
035F    1200   10 2 00      )47     LDC   $+X'0000'
0360    2E01   28 6 01              LDA   ALOVPERM,C
0361    544A   50 4 4A              EOR   *X'FFFF' ,B
0362    F200   F0 2 00              ZJP   $+X'0000'
0363    7547   70 5 47              JMP   *)2000 ,B
0364    2C48   28 4 48              LDA   *K'FFFF' ,B
0365    1206   10 2 06              LDC   $+X'0006'
0366    AE02   A8 6 02              STA   ATSALOV ,C
0367    7547   70 5 47              JMP   *)2000 ,B
0368    1203   10 2 03      )49     LDC   $+X'0003'
0369    2E30   28 6 30              LDA   SNDVPERM,C
036A    544A   50 4 4A              EOR   *X'FFFF' ,B
036B    F200   F0 2 00              ZJP   $+X'0000'
036C    7547   70 5 47              JMP   *)2000 ,B
036D    2C48   28 4 48              LDA   *K'FFFF' ,B
036E    1206   10 2 06              LDC   $+X'0006'
036F    AE31   A8 6 31              STA   ATSSENDV,C
0370    7547   70 5 47              JMP   *)2000 ,B
0371    1203   10 2 03      )50     LDC   $+X'0003'
0372    2E32   28 6 32              LDA   SNRTPERM,C
0373    544A   50 4 4A              EOR   *X'FFFF' ,B
0374    F200   F0 2 00              ZJP   $+X'0000'
0375    7547   70 5 47              JMP   *)2000 ,B
0376    2C48   28 4 48              LDA   *K'FFFF' ,B
0377    1206   10 2 06              LDC   $+X'0006'
0378    AE33   A8 6 33              STA   ATSSNRET,C
0379    7547   70 5 47              JMP   *)2000 ,B
037A    12AF   10 2 AF      )5152   LDC   $+X'FFAF'
037B    2E05   28 6 05              LDA   INDEX2,C
037C    4C22   48 4 22              SUB   N2,B
037D    BA03   B8 2 03              NJP   $+X'0003'
037E    F202   F0 2 02              ZJP   $+X'0002'
037F    3805   38 0 05              STZ   K'0005'
0380    F201   F0 2 01              ZJP   $+X'0001'
0381    28A0   28 0 A0              LDA   K'FFFF'
0382    AC54   A8 4 54              STA   VALA,B
0383    2E05   28 6 05              LDA   INDEX2,C
0384    F204   F0 2 04              ZJP   $+X'0004'
0385    B202   B0 2 02              PJP   $+X'0002'
0386    3805   38 0 05              STZ   K'0005'
0387    F201   F0 2 01              ZJP   $+X'0001'
0388    28A0   28 0 A0              LDA   K'FFFF'
0389    5C54   58 4 54              AND   VALA,B
038A    12A0   10 2 A0              LDC   $+X'FFA0'
038B    5E0F   58 6 0F              AND   TV,C
038C    5E12   58 6 12              AND   VTESTPB ,C
038D    544A   50 4 4A              EOR   *K'FFFF' ,B
038E    F200   F0 2 00              ZJP   $+X'0000'
038F    7547   70 5 47              JMP   *)2000 ,B
0390    1290   10 2 90              LDC   $+X'FF90'
0391    2E00   28 6 00              LDA   IPB ,C
000D+B  0034
0392    4C86   48 4 86              SUB   *K'0034' ,B
0393    F201   F0 2 01              ZJP   $+X'0001'
0394    7200   70 2 00              JMP   $+X'0000'
0395    7587   70 5 87              JMP   *)52 ,B
0396    2C48   28 4 48              LDA   *K'FFFF' ,B
0397    1293   10 2 93              LDC   $+X'FF93'
0398    AE1A   A8 6 1A              STA   CLOSEPB ,C
0399    1290   10 2 90              LDC   $+X'FF90'
039A    2E05   28 6 05              LDA   INDEX2,C
```

```
039B   4200   40 2 00          ADD  *X'002D'
039C   AC5F   A8 4 5F          STA   *AIA,B
039D   2D5F   28 5 5F          LDA  **AIA,B
039E   AC88   A8 4 88          STA   IPAT,B
039F   EF4C   E8 7 4C          BST  *MICCO ,B
03A0   0021                    ADL   N1
03A1   0006                    ADL   DN
03A2   002D                    ADL   N13
03A3   0088                    ADL   IPAT
                                LPL
03A4   7200   70 2 00          JMP   $+X'0000'
03A5   01B8                    ADL   X'01B8'
03A6   FFFE                    DAT   X'FFFE'
03A7   0000                    DAT   X'0000'
03A8   0000                    DAT   X'0000'
03A9   1200   10 2 00          LDC   $+X'0000'
03AA   2E05   28 6 05          LDA   INDEX2,C
03AB   AE03   A8 6 03          STA   NVTEST,C
03AC   7547   70 5 47          JMP  *)2000 ,B
03AD   2C48   28 4 48   )52    LDA  *X'FFFF' ,B
03AE   1200   10 2 00          LDC   $+X'0000'
03AF   AE18   A8 6 18          STA   DPLNPB,C
03B0   7547   70 5 47          JMP  *)2000 ,B
03B1   1200   10 2 00   )53    LDC   $+X'0000'
03B2   2E01   28 6 01          LDA   IPBX,C
03B3   4C26   48 4 26          SUB   N6,B
03B4   F200   F0 2 00          ZJP   $+X'0000'
03B5   7547   70 5 47          JMP  *)2000 ,B
03B6   2C48   28 4 48          LDA  *X'FFFF' ,B
03B7   1200   10 2 00          LDC   $+X'0000'
03B8   AE18   A8 6 18          STA   VPLRPB,C
03B9   7547   70 5 47          JMP  *)2000 ,B
03BA   1200   10 2 00   )54    LDC   $+X'0000'
03BB   2E01   28 6 01          LDA   IPBX,C
03BC   4C26   48 4 26          SUB   N6,B
03BD   F200   F0 2 00          ZJP   $+X'0000'
03BE   7547   70 5 47          JMP  *)2000 ,B
03BF   2C48   28 4 48          LDA  *X'FFFF' ,B
03C0   1200   10 2 00          LDC   $+X'0000'
03C1   AE19   A8 6 19          STA   VPLLPB,C
03C2   7547   70 5 47          JMP  *)2000 ,B
03C3   2C3E   28 4 3E   )100   LDA   JJ,B
03C4   AC89   A8 4 89          STA   IPBXX ,B
03C5   2C89   28 4 89          LDA   IPBXX ,B
03C6   AC5F   A8 4 5F          STA   *AIA,B
03C7   4200   40 2 00          ADD  *X'0010'
03C8   AC60   A8 4 60          STA   *AIB,B
03C9   2D60   28 5 60          LDA  **AIB,B
03CA   AC01   A8 4 01          STA   MASK1 ,B
03CB   2C5F   28 4 5F          LDA   *AIA,B
03CC   4200   40 2 00          ADD  *X'0006'
03CD   AC61   A8 4 61          STA   *AIC,B
03CE   2D61   28 5 61          LDA  **AIC,B
03CF   AC03   A8 4 03          STA   IREG1 ,B
03D0   1216   10 2 16          LDC   $+X'0016'
03D1   2E01   28 6 01          LDA   IPBX,C
03D2   AC8A   A8 4 8A          STA   *AID,B
03D3   420C   40 2 0C          ADD  *X'0010'
03D4   AC8B   A8 4 8B          STA   *AIE,B
03D5   2D8B   28 5 8B          LDA  **AIE,B
03D6   AC02   A8 4 02          STA   MASK2 ,B
03D7   2C8A   28 4 8A          LDA   *AID,B
03D8   420C   40 2 0C          ADD  *X'0006'
03D9   AC8C   A8 4 8C          STA   *AIF,B
03DA   2D8C   28 5 8C          LDA  **AIF,B
03DB   AC04   A8 4 04          STA   IREG2 ,B
03DC   EFC9   E8 7 C9          BST  *MICCO ,B
03DD   0022                    ADL   N2
03DE   0006                    ADL   DFFON
03DF   0003                    ADL   IREG
03E0   0001                    ADL   MASK
03E1   2C28   28 4 28          LDA   N8,B
03E2   4C89   48 4 89          SUB   IPBXX ,B
03E3   F200   F0 2 00          ZJP   $+X'0000'
03E4   7566   70 5 66          JMP  *)110,B
```

```
03E5   1215   10 2 15          LDC   $+X'0015'
03E6   2E01   28 6 01          LDA   IPBX,C
03E7   4C28   48 4 28          SUB   N0,B
03E8   F201   F0 2 01          ZJP   $+X'0001'
03E9   7200   70 2 00          JMP   $+X'0000'
03EA   750D   70 5 0D          JMP   *)104,B
03EB   2C45   28 4 45          LDA   =X'0000' ,B
03EC   122C   10 2 2C          LDC   $+X'002C'
03ED   AE0D   A8 6 0D          STA   VSTATUS ,C
03EE   AE12   A8 6 12          STA   VTESTPB ,C
03EF   EFB6   E8 7 B6          BST   *M4CCO ,B
03F0   0021                    ADL   N1
03F1   0005                    ADL   OFF
03F2   002B                    ADL   N11
03F3   001B                    ADL   N16
03F4   120F   10 2 0F   )104   LDC   $+X'000F'
03F5   2E03   28 6 03          LDA   NVTEST,C
03F6   F201   F0 2 01          ZJP   $+X'0001'
03F7   28A0   28 0 A0          LDA   K'FFFF'
03F8   120C   10 2 0C          LDC   $+X'000C'
03F9   5E12   58 6 12          AND   VTESTPB ,C
03FA   F200   F0 2 00          ZJP   $+X'0000'
03FB   7573   70 5 73          JMP   *)169,B
03FC   2C45   28 4 45          LDA   =X'0000' ,B
03FD   1205   10 2 05          LDC   $+X'0005'
03FE   AE0F   A8 6 0F          STA   TV,C

                               LPL
03FF   7200   70 2 00          JMP   $+X'0000'
0400   0000                    DAT   X'0000'
0401   0000                    DAT   X'0000'
0402   0000                    DAT   X'0000'
0403   0000                    DAT   X'0000'
0404   AE0E   A8 6 0E          STA   GV,C
0405   EFA8   E8 7 A8          BST   *M4CCO ,B
0406   0021                    ADL   N1
0407   0005                    ADL   OFF
0408   002B                    ADL   N11
0409   002C                    ADL   N12
040A   EF00   E8 7 00   )110   BST   *GOT1,B
040B   0009                    DAT   X'0009'
040C   0000                    ADL   )169
040D   040C                    ADL   )169
040E   040D                    ADL   )169
040F   040E                    ADL   )169
0410   040F                    ADL   )169
0411   0410                    ADL   )169
0412   0000                    ADL   )115
0413   0000                    ADL   )113
0414   005C                    ADL   IPBX
0415   12EB   10 2 EB   )113   LDC   $+X'FFEB'
0416   2E03   28 6 03          LDA   NVTEST,C
0417   F201   F0 2 01          ZJP   $+X'0001'
0418   28A0   28 0 A0          LDA   K'FFFF'
0419   12E6   10 2 E6          LDC   $+X'FFE6'
041A   5E12   58 6 12          AND   VTESTPB ,C
041B   F200   F0 2 00          ZJP   $+X'0000'
041C   7573   70 5 73          JMP   *)169,B
041D   2C4A   28 4 4A   )115   LDA   =X'FFFF' ,B
041E   12E2   10 2 E2          LDC   $+X'FFE2'
041F   AE04   A8 6 04          STA   INDEX1,C
0420   AE08   A8 6 08          STA   INDEX3,C
0421   2C48   28 4 48          LDA   =X'FFFF' ,B
0422   AE07   A8 6 07          STA   KEYENTRY,C
0423   7559   70 5 59          JMP   *)1691 ,B
0424   12DC   10 2 DC   )169   LDC   $+X'FFDC'
0425   3E04   38 6 04          STZ   INDEX1,C
0426   12DA   10 2 DA   )1690  LDC   $+X'FFDA'
0427   3E08   38 6 08          STZ   INDEX3,C
0428   2C45   28 4 45          LDA   =X'0000' ,B
0429   AE07   A8 6 07          STA   KEYENTRY,C
042A   2C5D   28 4 5D   )1691  LDA   =X'0001' ,B
042B   AC63   A8 4 63          STA   IV8 ,B
042C   EDE5   E8 5 E5   )170   BST   *M4MT,B
042D   0028                    ADL   N0
```

```
042E      EDE0    E8 5 E0               BST   *H$AB,B
042F      0026                          ADL    N0
0430      EDE4    E8 5 E4               BST   *H$IN,B
0431      0026                          ADL    N0
0432      2C63    28 4 63               LDA    IVB ,B
0433      0806    08 0 06               DCR    X'0006'
0434      F200    F0 2 00               ZJP    $+X'0000'
0435      7547    70 5 47               JMP   *)2000 ,B
0436      3C5B    38 4 5B     )200      STZ    ID,B
0437      2C21    28 4 21               LDA    N1,B
0438      AC5E    A8 4 5E               STA    I ,B
0439      2C5E    28 4 5E               LDA    I ,B
043A      4200    40 2 00               ADD   =X'003E'
043B      AC5F    A8 4 5F               STA    $AIA,B
006E+B    0000
043C      2C6E    28 4 6E               LDA   =X'0000' ,B
043D      AD5F    A8 5 5F               STA   *$AIA,B
043E      645E    60 4 5E     )210      INC    I ,B
043F      2C25    28 4 25               LDA    N5,B
0440      4C5E    48 4 5E               SUB    I ,B
0441      B2F7    B0 2 F7               PJP    $+X'FFF7'
0442      EDE7    E8 5 E7     )2000     BST   *EXIT,B
0443      750F    70 5 0F               JMP   *)30000,B

                                        LPL
0444      7200    70 2 00               JMP    $+X'0000'
0445      02B7                          ADL    X'02B7'
0446      0232                          ADL    X'0232'
0000      044D                          ADL    X'044D'

PROGRAM SIZE: 1101      DATA POOL SIZE: 0144     ERROR COUNT:  0000
0014+B    FFFF
0000      1000    10 0 00               LDC    X'0000'
0001      7303    70 3 03               JMP   *$+X'0003'
0002      0002                          DAT    X'0002'
0003      0016                          DAT    X'0016'
0004      0000                          ADL    SFT:
0005      3804    38 0 04               STZ    X'0004'
0006      3805    38 0 05               STZ    X'0005'
0007      C517    C0 5 17               ADA   *TDELAY,B
0008      EDEA    E8 5 EA               BST   *A11:,B
0019+B    4100
001A+B    0000
0009      0019                          ADL   =X'4100'
000A      AC1C    A8 4 1C               STA    $ARA,B
000B      A41B    A0 4 1B               STE    $ARA,B
000C      3804    38 0 04               STZ    X'0004'
000D      3805    38 0 05               STZ    X'0005'
000E      C517    C0 5 17               ADA   *TDELAY,B
000F      EDEC    E8 5 EC               BST   *H11:,B
0010      0018                          ADL    ZOUT
0011      EDEA    E8 5 EA               BST   *A11:,B
0012      0016                          ADL    ZIN
0013      EDED    E8 5 ED               BST   *D11:,B
0014      001B                          ADL    $ARA
0015      7515    70 5 15               JMP   *X'0015' ,B
0016      0000                          DAT    X'0000'
0017      0AFF    08 2 FF               LDB    $+X'FFFF'
0026+B    0000                )5
0027+B    0000
0018      2C27    28 4 27               LDA   =X'0000' ,B
0019      2426    20 4 26               LDE   =X'0000' ,B
001A      EDEB    E8 5 EB               BST   *B11:,B
001B      0028                          ADL    KUPDATE
001C      F201    F0 2 01               ZJP    $+X'0001'
001D      7200    70 2 00               JMP    $+X'0000'
001E      7529    70 5 29               JMP   *)6,B
001F      1200    10 2 00               LDC    $+X'0000'
0020      2E01    28 6 01               LDA    XTIME ,C
0021      2600    20 6 00               LDE    XTIME ,C
0022      EDEF    E8 5 EF               BST   *C10:,B
0023      1200    10 2 00               LDC    $+X'0000'
0024      AE23    A8 6 23               STA    1TIME ,C
0025      3804    38 0 04               STZ    X'0004'
0026      2805    28 0 05               LDA    X'0005'
0027      B201    B0 2 01               PJP    $+X'0001'
```

```
0028      6804   68 0 04         DCR   K'0004'
002A+B    0064
0029      DC2A   D8 4 2A         DIV   *K'0064' ,B
002A      1200   10 2 00         LDC   $+X'0000'
002B      AE02   A8 6 02         STA   IHOUR ,C
002C      D42A   D0 4 2A         MPY   *K'0064' ,B
002D      AC2B   A8 4 2B         STA   001A,B
002E      120B   10 2 0B         LDC   $+X'000B'
002F      2E23   28 6 23         LDA   ITIME ,C
0030      4C2B   48 4 2B         SUB   001A,B
0031      1207   10 2 07         LDC   $+X'0007'
0032      AE01   A8 6 01         STA   IMIN,C
0033      3E00   38 6 00         STZ   ISEC,C
0034      2C27   28 4 27         LDA   *K'0000' ,B
0035      2426   20 4 26         LDE   *K'0000' ,B
0036      1217   10 2 17         LDC   $+X'0017'
0037      AE03   A8 6 03         STA   KUPDATE ,C
0038      A602   A0 6 02         STE   KUPDATE ,C
0039      1208   10 2 08   )6    LDC   $+X'0008'
003A      2E02   28 6 02         LDA   IHOUR ,C
003B      D42A   D0 4 2A         MPY   *K'0064' ,B
003C      4601   40 6 01         ADD   IMIN,C
003D      120F   10 2 0F         LDC   $+X'000F'
003E      AE23   A8 6 23         STA   ITIME ,C
003F      1200   10 2 00         LDC   $+X'0000'
0040      2E0B   28 6 0B         LDA   VPOSL ,C
0041      260A   20 6 0A         LDE   VPOSL ,C
0042      EDEB   E8 5 EB         BST   *B11,B
0043      002C                   ADL   VPOSLMAX
0044      BA02   B8 2 02         NJP   $+X'0002'
0045      3805   38 0 05         STZ   K'0005'
0046      F201   F0 2 01         ZJP   $+X'0001'
0047      28A0   28 0 A0         LDA   K'FFFF'
0048      1200   10 2 00         LDC   $+X'0000'
0049      5E39   58 6 39         AND   ATB ,C
004A      1200   10 2 00         LDC   $+X'0000'
004B      5E00   58 6 00         AND   ATBVPLPB,C
004C      A803   A8 0 03         STA   K'0003'
004D      50A0   50 0 A0         EOR   K'FFFF'
004E      1200   10 2 00         LDC   $+X'0000'
004F      5E18   58 6 18         AND   VPLRPB,C
0050      5003   50 0 03         EOR   K'0003'
002D+B    FFFF
0051      542D   50 4 2D         EOR   *K'FFFF' ,B
0052      F200   F0 2 00         ZJP   $+X'0000'
0053      762E   70 6 2E         JMP   *)7,B
0054      1200   10 2 00         LDC   $+X'0000'
0055      2E3D   28 6 3D         LDA   VPOSLINC,C
0056      263C   20 6 3C         LDE   VPOSLINC,C
0057      AC30   A8 4 30         STA   TEMP,B
0058      A42F   A0 4 2F         STE   TEMP,B
0059      7531   70 5 31         JMP   *)8,B
005A      120C   10 2 0C   )7    LDC   $+X'000C'
005B      2E19   28 6 19         LDA   VPLLPB,C
005C      542D   50 4 2D         EOR   *K'FFFF' ,B
005D      F200   F0 2 00         ZJP   $+X'0000'
005E      7532   70 5 32         JMP   *)10 ,B
005F      120B   10 2 0B         LDC   $+X'000B'
0060      2E3D   28 6 3D         LDA   VPOSLINC,C
0061      263C   20 6 3C         LDE   VPOSLINC,C
0062      EDF0   E8 5 F0         BST   *CM1,B
0063      AC30   A8 4 30         STA   TEMP,B
0064      A42F   A0 4 2F         STE   TEMP,B
0065      1228   10 2 28   )8    LDC   $+X'0028'
0066      2E11   28 6 11         LDA   IVPL,C
0067      3804   38 0 04         STZ   K'0004'
0068      2805   28 0 05         LDA   K'0005'
0069      B201   B0 2 01         PJP   $+X'0001'
006A      6804   68 0 04         DCR   K'0004'
006B      DC0F   D8 4 0F         DIV   N10 ,B
006C      440C   40 4 0C         ADD   N1,B
006D      EDEE   E8 5 EE         BST   *CM1,B
006E      AC34   A8 4 34         STA   TEMP1 ,B
006F      A433   A0 4 33         STE   TEMP1 ,B
0070      2C30   28 4 30         LDA   TEMP,B
```

```
0071    242F  20 4 2F          LDE   TEMP,B
0072    EDEC  E8 5 EC          SST   *M111,B
0073    0033                   ADL   TEMP1
0074    EDEA  E8 5 EA          SST   *A111,B
0075    0035                   ADL   VPOSL
0076    1237  10 2 37          LDC   $+X'0037'
0077    AE0B  A8 6 0B          STA   VPOSL ,C
0078    A60A  A0 6 0A          STE   VPOSL ,C
0079    EDEB  E8 5 EB          SST   *B111,B
007A    002C                   ADL   VPOSLMAX
                                LPL
007B    7200  70 2 00          JMP   $+X'0000'
007C    0000                   DAT   K'0000'
007D    0000                   DAT   K'0000'
007E    0000                   DAT   K'0000'
007F    0000                   DAT   K'0000'
0080    0000                   DAT   K'0000'
0081    0000                   DAT   K'0000'
0082    0000                   DAT   K'0000'
0083    0000                   DAT   K'0000'
0084    B200  B0 2 00          PJP   $+X'0000'
0085    7536  70 5 36          JMP   *)9,B
0086    12FD  10 2 FD          LDC   $+X'FFFD'
0087    2E0B  28 6 0B          LDA   VPOSLMAX,C
0088    260A  20 6 0A          LDE   VPOSLMAX,C
0089    12F6  10 2 F6          LDC   $+X'FFF6'
008A    AE0B  A8 6 0B          STA   VPOSL ,C
008B    A60A  A0 6 0A          STE   VPOSL ,C
008C    7532  70 5 32          JMP   *)10 ,B
008D    12F2  10 2 F2    )9    LDC   $+X'FFF2'
008E    2E0B  28 6 0B          LDA   VPOSL ,C
008F    260A  20 6 0A          LDE   VPOSL ,C
0090    BA00  B8 2 00          NJP   $+X'0000'
0091    7532  70 5 32          JMP   *)10 ,B
0092    2C27  28 4 27          LDA   =K'0000' ,B
0093    2426  20 4 26          LDE   =K'0000' ,B
0094    12EB  10 2 EB          LDC   $+X'FFEB'
0095    AE0B  A8 6 0B          STA   VPOSL ,C
0096    A60A  A0 6 0A          STE   VPOSL ,C
0097    1200  10 2 00    )10   LDC   $+X'0000'
0098    2E13  28 6 13          LDA   TM,C
0099    542D  50 4 2D          EOR   =K'FFFF' ,B
009A    F200  F0 2 00          ZJP   $+X'0000'
009B    7537  70 5 37          JMP   *)16 ,B
009C    2C27  28 4 27          LDA   =K'0000' ,B
009D    2426  20 4 26          LDE   =K'0000' ,B
009E    EDEB  E8 5 EB          SST   *B111,B
009F    0038                   ADL   TESTAD
00A0    F201  F0 2 01          ZJP   $+X'0001'
00A1    7200  70 2 00          JMP   $+X'0000'
00A2    7539  70 5 39          JMP   *)46 ,B
00A3    2C27  28 4 27          LDA   =K'0000' ,B
00A4    2426  20 4 26          LDE   =K'0000' ,B
00A5    12DA  10 2 DA          LDC   $+X'FFDA'
00A6    AE37  A8 6 37          STA   TESTAD,C
00A7    A636  A0 6 36          STE   TESTAD,C
00A8    EF00  E8 7 00          SST   *MICCD ,B
00A9    000C                   ADL   N1
00AA    000B                   ADL   N0
00AB    0011                   ADL   N27
00AC    0004                   ADL   MASK
00AD    12D0  10 2 D0          LDC   $+X'FFD0'
00AE    3E03  38 6 03          BTZ   NVTEST,C
00AF    7539  70 5 39          JMP   *)46 ,B
00B0    12D2  10 2 D2    )16   LDC   $+X'FFD2'
00B1    2E1A  28 6 1A          LDA   CLDSEP0 ,C
00B2    542D  50 4 2D          EOR   =K'FFFF' ,B
00B3    F200  F0 2 00          ZJP   $+X'0000'
00B4    753A  70 5 3A          JMP   *)30 ,B
00B5    12C8  10 2 C8          LDC   $+X'FFC8'
00B6    2E05  28 6 05          LDA   INDEX2,C
00B7    4200  40 2 00          ADD   =K'001D'
00B8    AC2B  A8 4 2B          STA   *BIA,B
00B9    2D2B  28 5 2B          LDA   *#BIA,B
00BA    EDEE  E8 5 EE          SST   *C011,B
```

```
00BB    AC30   A0 4 30          STA   TEMP,B
00BC    A42F   A0 4 2F          STE   TEMP,B
00BD    EDED   E0 5 ED          BST   *D11:,B
003B+B  46A3
003C+B  D70A
00BE    003B                    ADL   =X'46A3'
00BF    AC30   A0 4 30          STA   TEMP,B
00C0    A42F   A0 4 2F          STE   TEMP,B
00C1    EDEB   E0 5 EB          BST   *B11:,B
00C2    003D                    ADL   CLOSED0
00C3    B200   B0 2 00          PJP   $+X'0000'
00C4    753E   70 5 3E          JMP   *)20 ,B
00C5    12BE   10 2 BE          LDC   $+X'FFBE'
00C6    2E41   20 6 41          LDA   VTESTINC,C
00C7    2640   20 6 40          LDE   VTESTINC,C
00C8    AC30   A0 4 30          STA   TEMP,B
00C9    A42F   A0 4 2F          STE   TEMP,B
00CA    753F   70 5 3F          JMP   *)40 ,B
00CB    12B2   10 2 B2   )20    LDC   $+X'FFB2'
00CC    2E05   20 6 05          LDA   INDEX2,C
00CD    4200   40 2 00          ADD   =X'0006'
00CE    AC2B   A0 4 2B          STA   #B1A,B
00CF    2D2B   20 5 2B          LDA   *#B1A,B
00D0    AC23   A0 4 23          STA   IPAT,B
00D1    EF20   E0 7 20          BST   *M8CCD ,B
00D2    000C                    ADL   N1
00D3    0023                    ADL   IPAT
00D4    0010                    ADL   N13
00D5    0023                    ADL   IPAT
00D6    7539   70 5 39          JMP   *)45 ,B
00D7    12AB   10 2 AB   )30    LDC   $+X'FFAB'
00D8    2E1B   20 6 1B          LDA   OPENPB,C
00D9    542D   50 4 2D          LOR   =X'FFFF' ,B
00DA    F200   F0 2 00          ZJP   $+X'0000'
00DB    7539   70 5 39          JMP   *)45 ,B
00DC    12A3   10 2 A3          LDC   $+X'FFA3'
00DD    2E37   20 6 37          LDA   TESTAD,C
00DE    2636   20 6 36          LDE   TESTAD,C
00DF    EDEB   E0 5 EB          BST   *B11:,B
00E0    0040                    ADL   VTESTINC
00E1    BA00   B0 2 00          NJP   $+X'0000'
00E2    7541   70 5 41          JMP   *)35 ,B
00E3    2C27   20 4 27          LDA   =X'0000' ,B
00E4    2426   20 4 26          LDE   =X'0000' ,B
00E5    129A   10 2 9A          LDC   $+X'FF9A'
00E6    AE37   A0 6 37          STA   TESTAD,C
00E7    A636   A0 6 36          STE   TESTAD,C
00E8    7542   70 5 42          JMP   *)45 ,B
00E9    129A   10 2 9A   )35    LDC   $+X'FF9A'
00EA    2E41   20 6 41          LDA   VTESTINC,C
00EB    2640   20 6 40          LDE   VTESTINC,C
00EC    EDF0   E0 5 F0          BST   *CM1:,B
00ED    AC30   A0 4 30          STA   TEMP,B
00EE    A42F   A0 4 2F          STE   TEMP,B
00EF    1290   10 2 90   )40    LDC   $+X'FF90'
00F0    2E37   20 6 37          LDA   TESTAD,C
00F1    2636   20 6 36          LDE   TESTAD,C
00F2    EDEA   E0 5 EA          BST   *A11:,B
00F3    002F                    ADL   TEMP
00F4    AE37   A0 6 37          STA   TESTAD,C
00F5    A636   A0 6 36          STE   TESTAD,C
00F6    1289   10 2 89   )45    LDC   $+X'FF89'
00F7    2E37   20 6 37          LDA   TESTAD,C
00F8    2636   20 6 36          LDE   TESTAD,C
00F9    EDEC   E0 5 EC          BST   *M11:,B
0043+B  45A3
0044+B  C2BE
00FA    0043                    ADL   =X'46A3'
00FB    EDEF   E0 5 EF          BST   *C1B:,B
00FC    AC23   A0 4 23          STA   IPAT,B

                                LPL
00FD    7200   70 2 00          JMP   $+X'0000'
00FE    0000                    DAT   X'0000'
00FF    0000                    DAT   X'0000'
```

```
0100     001D                         DAT   X'001D'
0101     0000                         DAT   X'0000'
0102     EFFD   E8 7 FD               BST   *HICCD ,B
0103     000C                         ADL   N3
0104     0023                         ADL   IPAT
0105     0011                         ADL   N27
0106     0004                         ADL   MASK
0045+B   0000               )46
0107     2C45   28 4 45               LDA   =X'0000' ,B
0108     1200   10 2 00               LDC   $+X'0000'
0109     AE05   A8 6 05               STA   VSTATCON,C
010A     AE06   A8 6 06               STA   TVCONT,C
010B     AE07   A8 6 07               STA   GVCONT,C
010C     AE03   A8 6 03               STA   HANDTRAK,C
010D     12F1   10 2 F1               LDC   $+X'FFF1'
010E     2E13   28 6 13               LDA   TM,C
010F     F200   F8 2 00               ZJP   $+X'0000'
0110     7546   70 5 46               JMP   *)46 ,B
0048+B   0001
0111     2C48   28 4 48               LDA   =X'0001' ,B
0112     AC47   A8 4 47               STA   I ,B
0113     2C47   28 4 47               LDA   I ,B
0114     4200   40 2 00               ADD   =X'001D'
0115     AC2B   A8 4 2B               STA   *BIA,B
0116     1200   10 2 00               LDC   $+X'0000'
0117     2E18   28 6 18               LDA   ITVAD ,C
0118     4D2B   48 5 2B               SUB   *PBIA,B
0119     EDEE   E8 5 EE               BST   *CMI1,B
011A     AC30   A8 4 30               STA   TEMP,B
011B     A42F   A0 4 2F               STE   TEMP,B
011C     EF00   E8 7 00               BST   *ABS ,B
011D     002F                         ADL   TEMP
011E     EDEB   E8 5 EB               BST   *BI11,B
011F     0049                         ADL   TVDB
0120     B200   B0 2 00               PJP   $+X'0000'
0121     754A   70 5 4A               JMP   *)47 ,B
004B+B   FFFF
0122     2C4B   28 4 4B               LDA   =X'FFFF' ,B
0123     121B   10 2 1B               LDC   $+X'001B'
0124     AE05   A8 6 05               STA   VSTATCON,C
0125     AE06   A8 6 06               STA   TVCONT,C
0126     2C47   28 4 47     )47       LDA   I ,B
0127     42D9   40 2 D9               ADD   =X'001D'
0128     AC2B   A8 4 2B               STA   *BIA,B
0129     1213   10 2 13               LDC   $+X'0013'
012A     2E15   28 6 15               LDA   IGVAD ,C
012B     4D2B   48 5 2B               SUB   *PBIA,B
012C     EDEE   E8 5 EE               BST   *CMI1,B
012D     AC30   A8 4 30               STA   TEMP,B
012E     A42F   A0 4 2F               STE   TEMP,B
012F     EF13   E8 7 13               BST   *ABS ,B
0130     002F                         ADL   TEMP
0131     EDEB   E8 5 EB               BST   *BI11,B
0132     004C                         ADL   GVDB
0133     B200   B0 2 00               PJP   $+X'0000'
0134     754D   70 5 4D               JMP   *)48 ,B
0135     2C4B   28 4 4B               LDA   =X'FFFF' ,B
0136     1213   10 2 13               LDC   $+X'0013'
0137     AE05   A8 6 05               STA   VSTATCON,C
0138     AE07   A8 6 07               STA   GVCONT,C
0139     6447   60 4 47     )48       INC   I ,B
004E+B   0002
013A     2C4E   28 4 4E               LDA   =X'0002' ,B
013B     4C47   48 4 47               SUB   I ,B
013C     B2D6   B0 2 D6               PJP   $+X'FFD6'
013D     1214   10 2 14               LDC   $+X'0014'
013E     2E18   28 6 18               LDA   ITVAD ,C
013F     4E17   48 6 17               SUB   ITVMAN,C
0140     EDEE   E8 5 EE               BST   *CMI1,B
0141     AC30   A8 4 30               STA   TEMP,B
0142     A42F   A0 4 2F               STE   TEMP,B
0143     EF14   E8 7 14               BST   *ABS ,B
0144     002F                         ADL   TEMP
0145     EDEB   E8 5 EB               BST   *BI11,B
0146     004F                         ADL   TVMANDB
```

```
0147    BA00   B8 2 00          NJP   $+X'0000'
0148    7550   70 5 50          JMP   *)49 ,B
0149    120C   10 2 0C          LDC   $+X'000C'
014A    2E15   28 6 15          LDA   IGVAD ,C
014B    4E14   48 6 14          SUB   IGVMAN,C
014C    EDEE   E8 5 EE          BST   *C01:,B
014D    AC30   A8 4 30          STA   TEMP,B
014E    A42F   A0 4 2F          STE   TEMP,B
014F    EF0C   E8 7 0C          BST   *ABS ,B
0150    002F                    ADL   TEMP
0151    EDEB   E8 5 EB          BST   *B11:,B
0152    0051                    ADL   GVMAND0
0153    B200   B0 2 00          PJP   $+X'0000'
0154    7546   70 5 46          JMP   *)50 ,B
0155    2C4B   28 4 4B   )49    LDA   =X'FFFF' ,B
0156    1220   10 2 20          LDC   $+X'0020'
0157    AE03   A8 6 03          STA   HANDTRAK,C
0158    1200   10 2 00   )50    LDC   $+X'0000'
0159    2E0A   28 6 0A          LDA   ISPCOUNT,C
015A    4C0E   48 4 0E          SUB   N ,B
015B    [illegible]  [illegible] 00  [illegible]  NJP   $+X'0000'
015C    7552   70 5 52          JMP   *)5001 ,B
0053+B  22D1
015D    2C53   28 4 53          LDA   =X'22D1' ,B

                                LPL
015E    7200   70 2 00          JMP   $+X'0000'
015F    0000                    DAT   K'0000'
0160    0000                    DAT   K'0000'
0161    0000                    DAT   K'0000'
0162    0019                    DAT   K'0019'
0163    0000                    DAT   K'0000'
0164    0020   B8 0 20          IOA   K'0020'
0165    12FA   10 2 FA   )5001  LDC   $+X'FFFA'
0166    3E0A   38 6 0A          STZ   ISPCOUNT,C
0167    2E15   28 6 15          LDA   ICOURSE ,C
0168    EDEE   E8 5 EE          BST   *C01:,B
0169    1200   10 2 00          LDC   $+X'0000'
016A    AE51   A8 6 51          STA   HSCOURSE,C
016B    A650   A0 6 50          STE   HSCOURSE,C
016C    12F3   10 2 F3          LDC   $+X'FFF3'
016D    2E15   28 6 15          LDA   IFINE ,C
016E    EDEE   E8 5 EE          BST   *C01:,B
016F    AC30   A8 4 30          STA   TEMP,B
0170    A42F   A0 4 2F          STE   TEMP,B
0171    1200   10 2 00          LDC   $+X'0000'
0172    2E15   28 6 15          LDA   WR,C
0173    2614   20 6 14          LDE   WR,C
0174    EDEC   E8 5 EC          BST   *H11:,B
0175    0054                    ADL   WR
0176    EDED   E8 5 ED          BST   *D11:,B
0177    002F                    ADL   TEMP
0178    120F   10 2 0F          LDC   $+X'000F'
0179    AE53   A8 6 53          STA   HSFINE,C
017A    A652   A0 6 52          STE   HSFINE,C
017B    2E51   28 6 51          LDA   HSCOURSE,C
017C    2650   20 6 50          LDE   HSCOURSE,C
017D    EDEB   E8 5 EB          BST   *B11:,B
017E    0055                    ADL   HSHITCH
017F    BA00   B8 2 00          NJP   $+X'0000'
0180    7556   70 5 56          JMP   *)51 ,B
0181    1209   10 2 09          LDC   $+X'0009'
0182    2E51   28 6 51          LDA   HSCOURSE,C
0183    2650   20 6 50          LDE   HSCOURSE,C
0184    AE4F   A8 6 4F          STA   HSDIG ,C
0185    A64E   A0 6 4E          STE   HSDIG ,C
0186    7557   70 5 57          JMP   *)52 ,B
0187    1206   10 2 06   )51    LDC   $+X'0006'
0188    2E53   28 6 53          LDA   HSFINE,C
0189    2652   20 6 52          LDE   HSFINE,C
018A    AE4F   A8 6 4F          STA   HSDIG ,C
018B    A64E   A0 6 4E          STE   HSDIG ,C
018C    2C45   28 4 45   )52    LDA   =X'0000' ,B
018D    1200   10 2 00          LDC   $+X'0000'
018E    AE25   A8 6 25          STA   SPTF,C
```

```
018F    AE40   A8 6 40            STA    ANASPDFI,C
0190    AE44   A8 6 44            STA    DIGSPDFI,C
0191    120A   10 2 0A            LDC    $+X'000A'
0192    2E4F   28 6 4F            LDA    #SDIG ,C
0193    264E   20 6 4E            LDE    #SDIG ,C
0194    AC30   A8 4 30            STA    TEMP,B
0195    A42F   A0 4 2F            STE    TEMP,B
0196    EDEB   E8 5 EB            BST    *B111,B
0197    0058                      ADL    DPCSPEED
0198    AC5A   A8 4 5A            STA    #BRA,B
0199    A459   A0 4 59            STE    #BRA,B
019A    EFC7   E8 7 C7            BST    *ABS ,B
019B    0059                      ADL    #BRA
019C    EDEB   E8 5 EB            BST    *B111,B
019D    005B                      ADL    #SERROR
019E    B200   B0 2 00            PJP    $+X'0000'
019F    755C   70 5 5C            JMP    *)64 ,B
01A0    12C3   10 2 C3            LDC    $+X'FFC3'
01A1    2E07   28 6 07            LDA    DPCSPEED,C
01A2    2606   20 6 06            LDE    DPCSPEED,C
01A3    EDEB   E8 5 EB            BST    *B111,B
01A4    005D                      ADL    #SHPSI
01A5    AC5A   A8 4 5A            STA    #BRA,B
01A6    A459   A0 4 59            STE    #BRA,B
01A7    EFBA   E8 7 BA            BST    *ABS ,B
01A8    0059                      ADL    #BRA
01A9    EDEB   E8 5 EB            BST    *B111,B
01AA    005B                      ADL    #SERROR
01AB    B200   B0 2 00            PJP    $+X'0000'
01AC    755E   70 5 5E            JMP    *)63 ,B
01AD    121C   10 2 1C            LDC    $+X'001C'
01AE    2E4F   28 6 4F            LDA    #SDIG ,C
01AF    264E   20 6 4E            LDE    #SDIG ,C
01B0    EDEB   E8 5 EB            BST    *B111,B
01B1    005D                      ADL    #SHPSI
01B2    AC5A   A8 4 5A            STA    #BRA,B
01B3    A459   A0 4 59            STE    #BRA,B
01B4    EFAD   E8 7 AD            BST    *ABS ,B
01B5    0059                      ADL    #BRA
01B6    EDEB   E8 5 EB            BST    *B111,B
01B7    005B                      ADL    #SERROR
01B8    BA00   B8 2 00            NJP    $+X'0000'
01B9    755F   70 5 5F            JMP    *)67 ,B
01BA    2C4B   28 4 4B            LDA    *X'FFFF' ,B
01BB    122E   10 2 2E            LDC    $+X'002E'
01BC    AE40   A8 6 40            STA    ANASPDFI,C
01BD    755C   70 5 5C            JMP    *)64 ,B
01BE    12AD   10 2 AD     )63    LDC    $+X'FFAD'
01BF    2E07   28 6 07            LDA    DPCSPEED,C
01C0    2606   20 6 06            LDE    DPCSPEED,C
01C1    AC30   A8 4 30            STA    TEMP,B
01C2    A42F   A0 4 2F            STE    TEMP,B

                                  LPL
01C3    7200   70 2 00            JMP    $+X'0000'
01C4    0000                      DAT    X'0000'
01C5    0000                      DAT    X'0000'
01C6    0000                      DAT    X'0000'
01C7    2C4B   28 4 4B            LDA    *X'FFFF' ,B
01C8    12FD   10 2 FD            LDC    $+X'FFFD'
01C9    AE44   A8 6 44            STA    DIGSPDFI,C
01CA    2C30   28 4 30     )64    LDA    TEMP,B
01CB    242F   20 4 2F            LDE    TEMP,B
01CC    EDEB   E8 5 EB            BST    *B111,B
01CD    0060                      ADL    #SMAX
01CE    BA00   B8 2 00            NJP    $+X'0000'
01CF    755F   70 5 5F            JMP    *)67 ,B
01D0    2C30   28 4 30            LDA    TEMP,B
01D1    242F   20 4 2F            LDE    TEMP,B
01D2    EDEB   E8 5 EB            BST    *B111,B
01D3    0061                      ADL    #SMIN
01D4    BA00   B8 2 00            NJP    $+X'0000'
01D5    7562   70 5 62            JMP    *)65 ,B
01D6    12EF   10 2 EF            LDC    $+X'FFEF'
01D7    2E13   28 6 13            LDA    WR,C
01D8    F200   F0 2 00            ZJP    $+X'0000'
```

```
01D9   760F   70 5 0F          JMP   *)67,B
01DA   12EA   10 2 EA          LDC   $+X'FFEA'
01DB   2E19   28 6 19          LDA   REFDMD,C
01DC   2618   20 6 18          LDE   REFDMD,C
01DD   EDE8   E8 5 E8          SBT   *8111,B
01DE   8063                    ADL   NBREFMIN
01DF   BA00   B8 2 00          NJP   $+X'0000'
01E0   760F   70 5 0F          JMP   *)67,B
01E1   2C3B   28 4 3B    )55   LDA   TEMP,B
01E2   242F   20 4 2F          LDE   TEMP,B
01E3   12E1   10 2 E1          LDC   $+X'FFE1'
01E4   AE55   A8 6 55          STA   NB,C
01E5   A654   A0 6 54          STE   NB,C
01E6   7664   70 5 64          JMP   *)58,B
01E7   2C4B   28 4 4B    )57   LDA   *K'FFFF',B
01E8   12DD   10 2 DD          LDC   $+X'FFDD'
01E9   AE25   A8 6 25          STA   SPTF,C
01EA   AE46   A8 6 46          STA   ANASPDFI,C
01EB   AE44   A8 6 44          STA   DIGSPDFI,C
01EC   12D9   10 2 D9    )58   LDC   $+X'FFD9'
01ED   2E13   28 6 13          LDA   BR,C
01EE   542D   50 4 2D          EOR   *K'FFFF',B
01EF   F200   F0 2 00          ZJP   $+X'0000'
01F0   7565   70 5 65          JMP   *)65,B
01F1   12D4   10 2 D4          LDC   $+X'FFD4'
01F2   2E0E   28 6 0E          LDA   SPTFX,C
01F3   542D   50 4 2D          EOR   *K'FFFF',B
01F4   5E25   58 6 25          AND   SPTF,C
01F5   F200   F0 2 00          ZJP   $+X'0000'
01F6   7566   70 5 66          JMP   *)61,B
01F7   12CE   10 2 CE          LDC   $+X'FFCE'
01F8   2E45   28 6 45          LDA   DIGSPDFX,C
01F9   542D   50 4 2D          EOR   *K'FFFF',B
01FA   5E44   58 6 44          AND   DIGSPDFI,C
01FB   542D   50 4 2D          EOR   *K'FFFF',B
01FC   F200   F0 2 00          ZJP   $+X'0000'
01FD   7565   70 5 65          JMP   *)65,B
01FE   12C6   10 2 C6    )61   LDC   $+X'FFC6'
01FF   2E1B   28 6 1B          LDA   REF1,C
0200   261A   20 6 1A          LDE   REF1,C
0201   AE19   A8 6 19          STA   REFDMD,C
0202   A618   A0 6 18          STE   REFDMD,C
0203   AE01   A8 6 01          STA   DDMD,C
0204   A600   A0 6 00          STE   DDMD,C
0205   12C0   10 2 C0    )65   LDC   $+X'FFC0'
0206   2E0E   28 6 0E          LDA   SPTFX,C
0207   5625   50 6 25          EOR   SPTF,C
0208   F200   F0 2 00          ZJP   $+X'0000'
0209   7567   70 5 67          JMP   *)66,B
020A   12BB   10 2 BB          LDC   $+X'FFBB'
020B   2E46   28 6 46          LDA   ANASPDFI,C
020C   5647   50 6 47          EOR   ANASPDFX,C
020D   F200   F0 2 00          ZJP   $+X'0000'
020E   7567   70 5 67          JMP   *)66,B
020F   12B6   10 2 B6          LDC   $+X'FFB6'
0210   2E44   28 6 44          LDA   DIGSPDFI,C
0211   5645   50 6 45          EOR   DIGSPDFX,C
0212   542D   50 4 2D          EOR   *K'FFFF',B
0213   F200   F0 2 00          ZJP   $+X'0000'
0214   7568   70 5 68          JMP   *)67,B
0215   2C4B   28 4 4B    )66   LDA   *K'FFFF',B
0216   12AF   10 2 AF          LDC   $+X'FFAF'
0217   AE26   A8 6 26          STA   RUNLOGIC,C
0218   12AD   10 2 AD    )67   LDC   $+X'FFAD'
0219   2E25   28 6 25          LDA   SPTF,C
021A   AE0E   A8 6 0E          STA   SPTFX,C
021B   2E13   28 6 13          LDA   BR,C
021C   F200   F0 2 00          ZJP   $+X'0000'
021D   7569   70 5 69          JMP   *)10000,B
021E   12A7   10 2 A7          LDC   $+X'FFA7'
021F   2E06   28 6 06          LDA   AS,C
0220   542D   50 4 2D          EOR   *K'FFFF',B
0221   F200   F0 2 00          ZJP   $+X'0000'
0222   756A   70 5 6A          JMP   *)4000,B
0223   12A2   10 2 A2          LDC   $+X'FFA2'
```

```
0224    2E3D   28 6 3D          LDA   ABINC ,C
0225    F200   F0 2 00          EJP   $+X'0000'
0226    756B   70 5 6B          JMP   *)3200 ,B
0227    129E   10 2 9E          LDC   $+X'FF9E'
0228    2E3E   28 6 3E          LDA   ABDEC ,C
0229    542D   50 4 2D          EOR   *X'FFFF' ,B
022A    F200   F0 2 00          ZJP   $+X'0000'
022B    756C   70 5 6C          JMP   *)200,B
022C    2C1A   28 4 1A          LDA   *X'4100' ,B
022D    2419   20 4 19          LDE   *X'4100' ,B
022E    EDF0   E8 5 F0          SST   *CM11,B
022F    AC30   A8 4 30          STA   TEMP,B
0230    A42F   A0 4 2F          STE   TEMP,B
0231    756D   70 5 6D          JMP   *)3400 ,B
0232    1293   10 2 93   )3200  LDC   $+X'FF93'
0233    2E3E   28 6 3E          LDA   ABDEC ,C
0234    F200   F0 2 00          ZJP   $+X'0000'
0235    756E   70 5 6E          JMP   *)3600 ,B
0236    2C1A   28 4 1A          LDA   *X'4100' ,B
0237    2419   20 4 19          LDE   *X'4100' ,B
0238    AC30   A8 4 30          STA   TEMP,B
0239    A42F   A0 4 2F          STE   TEMP,B
023A    128A   10 2 8A   )3400  LDC   $+X'FF8A'
023B    2E19   28 6 19          LDA   REFDMD,C
023C    2618   20 6 18          LDE   REFDMD,C
023D    EDEA   E8 5 EA          SST   *A11,B
023E    002F                    ADL   TEMP
023F    AE19   A8 6 19          STA   REFDMD,C
0240    A618   A0 6 18          STE   REFDMD,C
0241    AE01   A8 6 01          STA   DDMD,C
0242    A600   A0 6 00          STE   DDMD,C
0243    2C45   28 4 45   )3600  LDA   *X'0000' ,B
0244    1200   10 2 00          LDC   $+X'0000'
0245    AE3D   A8 6 3D          STA   ABINC ,C
0246    AE3E   A8 6 3E          STA   ABDEC ,C
0247    756C   70 5 6C          JMP   *)200,B
0248    1200   10 2 00   )4000  LDC   $+X'0000'
0249    2E10   28 6 10          LDA   ASL ,C
024A    1206   10 2 06          LDC   $+X'0006'
024B    5E39   58 6 39          AND   ATS ,C
024C    542D   50 4 2D          EOR   *X'FFFF' ,B
024D    F200   F0 2 00          ZJP   $+X'0000'
024E    756F   70 5 6F          JMP   *)6000 ,B
024F    1200   10 2 00          LDC   $+X'0000'
0250    2E47   28 6 47          LDA   TABDMD,C
0251    2646   20 6 46          LDE   TABDMD,C
0252    AE15   A8 6 15          STA   DEMAND,C
0253    A614   A0 6 14          STE   DEMAND,C
0254    AE01   A8 6 01          STA   DDMD,C
0255    A600   A0 6 00          STE   DDMD,C
0256    2E45   28 6 45          LDA   TABRATE ,C
0257    2644   20 6 44          LDE   TABRATE ,C
0258    AE17   A8 6 17          STA   RATE,C
0259    A616   A0 6 16          STE   RATE,C
025A    1206   10 2 06   )5500  LDC   $+X'0006'
025B    2E17   28 6 17          LDA   RATE,C
025C    2616   20 6 16          LDE   RATE,C
025D    EDEB   E8 5 EB          SST   *B11,B
025E    0070                    ADL   DARATMAX
025F    8A00   88 2 00          NJP   $+X'0000'
0260    1200   10 2 00          LDC   $+X'0000'
0261    2E03   28 6 03          LDA   DARATMAX,C
0262    2602   20 6 02          LDE   DARATMAX,C
0263    1209   10 2 09          LDC   $+X'0009'
0264    AE17   A8 6 17          STA   RATE,C
0265    A616   A0 6 16          STE   RATE,C
0266    7571   70 5 71          JMP   *)00 ,B
0267    121F   10 2 1F   )6000  LDC   $+X'001F'
0268    2E18   28 6 18          LDA   DPRT,C
0269    A803   A8 0 03          STA   X'0003'
026A    50A0   50 0 A0          EOR   X'FFFF'
026B    1221   10 2 21          LDC   $+X'0021'
026C    5E04   58 6 04          AND   DA,C
026D    5003   50 0 03          EOR   X'0003'
026E    542D   50 4 2D          EOR   *X'FFFF' ,B
```

```
026F    F200    F0 2 00              ZJP   $+X'0000'
0270    7572    70 5 72              JMP   *)7000 ,B
0271    120E    10 2 0E              LDC   $+X'000E'
0272    2E01    20 6 01              LDA   DDMD,C
0273    2600    20 6 00              LDE   DDMD,C
0274    AE15    A0 6 15              STA   DEMAND,C
0275    A614    A0 6 14              STE   DEMAND,C
0276    2E03    20 6 03              LDA   DACCRATE,C
0277    2602    20 6 02              LDE   DACCRATE,C
0278    AE17    A0 6 17              STA   RATE,C
0279    A616    A0 6 16              STE   RATE,C
027A    7573    70 5 73              JMP   *)70 ,B
027B    1214    10 2 14     )7000    LDC   $+X'0014'
027C    2E12    20 6 12              LDA   THI ,C
027D    542D    50 4 2D              EOR   *K'FFFF' ,B
027E    F200    F0 2 00              ZJP   $+X'0000'
027F    7574    70 5 74              JMP   *)7200 ,B
0280    1200    10 2 00              LDC   $+X'0000'
0281    2E14    20 6 14              LDA   IGVMAN,C
0282    4E15    40 6 15              SUB   IGVAD ,C
0283    EDEE    E0 5 EE              BST   *C011,B
0284    AC30    A0 4 30              STA   TEMP,B
0285    A42F    A0 4 2F              STE   TEMP,B
0286    1226    10 2 26              LDC   $+X'0026'
0287    2E65    20 6 65              LDA   GR10,C
0288    2664    20 6 64              LDE   GR10,C
0289    AC76    A0 4 76              STA   TEMP2 ,B
028A    A475    A0 4 75              STE   TEMP2 ,B
028B    7577    70 5 77              JMP   *)7400 ,B
028C    120C    10 2 0C     )7200    LDC   $+X'000C'
028D    2E17    20 6 17              LDA   ITVMAN,C
028E    4E16    40 6 16              SUB   ITVAD ,C
028F    EDEE    E0 5 EE              BST   *C011,B
0290    AC30    A0 4 30              STA   TEMP,B
0291    A42F    A0 4 2F              STE   TEMP,B
0292    120C    10 2 0C              LDC   $+X'000C'
0293    2E5B    20 6 5B              LDA   GR8 ,C
0294    265A    20 6 5A              LDE   GR8 ,C
0295    AC76    A0 4 76              STA   TEMP2 ,B
0296    A475    A0 4 75              STE   TEMP2 ,B
0297    2C30    20 4 30     )7400    LDA   TEMP,B
0298    242F    20 4 2F              LDE   TEMP,B
0299    EDED    E0 5 ED              BST   *D011,B
029A    003B                         ADL   *K'46A3'
029B    AC30    A0 4 30              STA   TEMP,B
029C    A42F    A0 4 2F              STE   TEMP,B

                                     LPL
029D    7200    70 2 00              JMP   $+X'0000'
029E    0000                         DAT   K'0000'
029F    0000                         DAT   K'0000'
02A0    0000                         DAT   K'0000'
02A1    0000                         DAT   K'0000'
02A2    0000                         DAT   K'0000'
02A3    2C45    20 4 45              LDA   *K'0000' ,B
02A4    1200    10 2 00              LDC   $+X'0000'
02A5    AE04    A0 6 04              STA   READY ,C
02A6    12F9    10 2 F9              LDC   $+X'FFF9'
02A7    2E23    20 6 23              LDA   SP1 ,C
02A8    542D    50 4 2D              EOR   *K'FFFF' ,B
02A9    F200    F0 2 00              ZJP   $+X'0000'
02AA    7578    70 5 78              JMP   *)7460 ,B
02AB    12F3    10 2 F3              LDC   $+X'FFF3'
02AC    2E19    20 6 19              LDA   REFDMD,C
02AD    2618    20 6 18              LDE   REFDMD,C
02AE    EDEB    E0 5 EB              BST   *B011,B
02AF    0079                         ADL   H0
02B0    AC34    A0 4 34              STA   TEMP1 ,B
02B1    A433    A0 4 33              STE   TEMP1 ,B
02B2    12EF    10 2 EF              LDC   $+X'FFEF'
02B3    2E10    20 6 10              LDA   ASL ,C
02B4    542D    50 4 2D              EOR   *K'FFFF' ,B
02B5    F200    F0 2 00              ZJP   $+X'0000'
02B6    2C27    20 4 27              LDA   *X'0000' ,B
02B7    2426    20 4 26              LDE   *K'0000' ,B
```

```
0288    AC34  A0 4 34          STA   TEMP1 ,B
0289    A433  A0 4 33          STE   TEMP1 ,B
028A    EF00  E0 7 00          BST   *ABB ,B
028B    0033                   ADL   TEMP1
028C    EDEB  E0 5 EB          BST   *B11;,B
028D    007A                   ADL   DBTRKREF
028E    BA02  B0 2 02          NJP   $+X'0002'
028F    3805  38 0 05          BTZ   K'0005'
02C0    F201  F0 2 01          ZJP   $+X'0001'
02C1    28A0  20 0 A0          LDA   K'FFFF'
02C2    AC7B  A0 4 7B          STA   #BLA,B
02C3    EF09  E0 7 09          BST   *ABB ,B
02C4    002F                   ADL   TEMP
02C5    EDEB  E0 5 EB          BST   *B11;,B
02C6    007C                   ADL   DBTRKB
02C7    BA02  B0 2 02          NJP   $+X'0002'
02C8    3805  38 0 05          BTZ   K'0005'
02C9    F201  F0 2 01          ZJP   $+X'0001'
02CA    28A0  20 0 A0          LDA   K'FFFF'
02CB    5C7B  50 4 7B          AND   #BLA,B
02CC    F200  F0 2 00          ZJP   $+X'0000'
02CD    2C4B  20 4 4B          LDA   *K'FFFF' ,B
02CE    122A  10 2 2A          LDC   $+X'002A'
02CF    AE04  A0 6 04          STA   READY ,C
02D0    2C30  20 4 30          LDA   TEMP,B
02D1    242F  20 4 2F          LDE   TEMP,B
02D2    EDEC  E0 5 EC          BST   *H11;,B
02D3    0075                   ADL   TEMP2
02D4    EDEA  E0 5 EA          BST   *A11;,B
02D5    007D                   ADL   REFDMD
02D6    12C0  10 2 C0          LDC   $+X'FFC0'
02D7    AE19  A0 6 19          STA   REFDMD,C
02D8    A618  A0 6 18          STE   REFDMD,C
02D9    12C6  10 2 C6   )7450  LDC   $+X'FFC6'
02DA    2E19  20 6 19          LDA   REFDMD,C
02DB    2618  20 6 18          LDE   REFDMD,C
02DC    EDEB  E0 5 EB          BST   *B11;,B
02DD    007E                   ADL   HLB
02DE    BA00  B0 2 00          NJP   $+X'0000'
02DF    12C1  10 2 C1          LDC   $+X'FFC1'
02E0    2E17  20 6 17          LDA   HLB ,C
02E1    2616  20 6 16          LDE   HLB ,C
02E2    12BC  10 2 BC          LDC   $+X'FFBC'
02E3    AE19  A0 6 19          STA   REFDMD,C
02E4    A618  A0 6 18          STE   REFDMD,C
02E5    757F  70 5 7F          JMP   *)10000,B
02E6    12B9  10 2 B9   )10000 LDC   $+X'FFB9'
02E7    2E18  20 6 18          LDA   TPC ,C
02E8    542D  50 4 2D          EOR   *X'FFFF' ,B
02E9    F200  F0 2 00          ZJP   $+X'0000'
02EA    7580  70 5 80          JMP   *)10500,B
02EB    12B7  10 2 B7          LDC   $+X'FFB7'
02EC    2E05  20 6 05          LDA   PD,C
02ED    2604  20 6 04          LDE   PD,C
02EE    EDEB  E0 5 EB          BST   *B11;,B
02EF    0081                   ADL   PDSP
02F0    BA00  B0 2 00          NJP   $+X'0000'
02F1    7500  70 5 80          JMP   *)10500,B
02F2    12AC  10 2 AC          LDC   $+X'FFAC'
02F3    2E2B  20 6 2B          LDA   GVSP,C
02F4    262A  20 6 2A          LDE   GVSP,C
02F5    EDEB  E0 5 EB          BST   *B11;,B
02F6    0082                   ADL   GVSPMIN
02F7    B200  B0 2 00          PJP   $+X'0000'
02F8    7580  70 5 80          JMP   *)10500,B
02F9    2C4B  20 4 4B          LDA   *K'FFFF' ,B
02FA    12A5  10 2 A5          LDC   $+X'FFA5'
02FB    AE4A  A0 6 4A          STA   TPLIM ,C
02FC    12A4  10 2 A4          LDC   $+X'FFA4'
02FD    2E6F  20 6 6F          LDA   TPCRATE1 ,C
02FE    266E  20 6 6E          LDE   TPCRATE1 ,C
02FF    EDF0  E0 5 F0          BST   *CM1;,B
0300    129E  10 2 9E          LDC   $+X'FF9E'
0301    AE17  A0 6 17          STA   RATE,C
0302    A616  A0 6 16          STE   RATE,C
0303    7583  70 5 83          JMP   *)11500,B
```

```
                                          LPL
0304    7200   70 2 00            JMP   $+X'0000'
0305    0000                      DAT   X'0000'
0306    0101                      ADL   X'0101'
0307    2C46   28 4 46   )10500   LDA   =X'0000' ,B
0308    1207   10 2 07            LDC   $+X'FF07'
0309    AE4A   A8 6 4A            STA   TPLIM ,C
030A    1207   10 2 07            LDC   $+X'FF07'
030B    2E11   28 6 11            LDA   RB,C
030C    1203   10 2 03            LDC   $+X'FF03'
030D    6E04   58 6 04            AND   DA,C
030E    542D   50 4 2D            EOR   =X'FFFF' ,B
030F    F200   F0 2 00            ZJP   $+X'0000'
0310    7504   70 5 04            JMP   *)12000,B
0311    120F   10 2 0F            LDC   $+X'FF0F'
0312    2E6B   28 6 6B            LDA   RBRATE,C
0313    266A   20 6 6A            LDE   RBRATE,C
0314    EDF0   E8 5 F0            SST   *CH1;,B
0315    1209   10 2 09            LDC   $+X'FF09'
0316    AE17   A8 6 17            STA   RATE,C
0317    A616   A0 6 16            STE   RATE,C
0318    1207   10 2 07   )11500   LDC   $+X'FF07'
0319    2E07   28 6 07            LDA   ADS ,C
031A    542D   50 4 2D            EOR   =X'FFFF' ,B
031B    F200   F0 2 00            ZJP   $+X'0000'
031C    7506   70 5 06            JMP   *)11700,B
031D    2C46   28 4 46            LDA   =X'0000' ,B
031E    1200   10 2 00            LDC   $+X'0000'
031F    AE16   A8 6 16            STA   ADSPB ,C
0320    2C48   28 4 48            LDA   =X'FFFF' ,B
0321    1200   10 2 00            LDC   $+X'0000'
0322    AE26   A8 6 26            STA   RUNLOGIC,C
0323    1202   10 2 02   )11700   LDC   $+X'0002'
0324    2E0C   28 6 0C            LDA   HOLD,C
0325    F200   F0 2 00            ZJP   $+X'0000'
0326    7506   70 5 06            JMP   *)146,B
0327    2C48   28 4 48            LDA   =X'FFFF' ,B
0328    1206   10 2 06            LDC   $+X'0006'
0329    AE08   A8 6 08            STA   HOLDCP,C
032A    AE26   A8 6 26            STA   RUNLOGIC,C
032B    7506   70 5 06            JMP   *)146,B
032C    1204   10 2 04   )12000   LDC   $+X'0004'
032D    2E07   28 6 07            LDA   ADS ,C
032E    542D   50 4 2D            EOR   =X'FFFF' ,B
032F    F200   F0 2 00            ZJP   $+X'0000'
0330    7507   70 5 07            JMP   *)14000,B
0331    1200   10 2 00            LDC   $+X'0000'
0332    2E91   28 6 91            LDA   ADSMAXT ,C
0333    2690   20 6 90            LDE   ADSMAXT ,C
0334    EDEF   E8 5 EF            SST   *C10;,B
0335    AC47   A8 4 47            STA   I ,B
0336    120A   10 2 0A            LDC   $+X'000A'
0337    2E3B   28 6 3B            LDA   ADSINC,C
0338    F200   F0 2 00            ZJP   $+X'0000'
0339    7508   70 5 08            JMP   *)12200,B
033A    1204   10 2 04            LDC   $+X'0004'
033B    2E3C   28 6 3C            LDA   ADSDEC,C
033C    542D   50 4 2D            EOR   =X'FFFF' ,B
033D    F200   F0 2 00            ZJP   $+X'0000'
033E    7509   70 5 09            JMP   *)300,B
033F    1200   10 2 00            LDC   $+X'0000'
0340    2E0F   28 6 0F            LDA   IADSDWN,C
0341    4C47   48 4 47            SUB   I ,B
0342    BA00   B8 2 00            NJP   $+X'0000'
0343    2C47   28 4 47            LDA   I ,B
0344    1205   10 2 05            LDC   $+X'0005'
0345    AE0F   A8 6 0F            STA   IADSDWN,C
0346    1202   10 2 02            LDC   $+X'0002'
0347    2E0F   28 6 0F            LDA   IADSDWN,C
0348    542D   50 4 2D            EOR   =X'FFFF' ,B
0349    6005   58 0 05            INC   X'0005'
034A    EDEE   E8 5 EE            SST   *C01;,B
034B    AC30   A8 4 30            STA   TEMP,B
034C    A42F   A0 4 2F            STE   TEMP,B
034D    750A   70 5 0A            JMP   *)12400,B
034E    1214   10 2 14   )12200   LDC   $+X'0014'
```

```
034F    2E3C   28 6 3C           LDA   ADBDEC,C
0350    F200   F0 2 00           ZJP   $+X'0000'
0351    7566   70 5 66           JMP   *)12600,B
0352    120C   10 2 0C           LDC   $+X'000C'
0353    2E0E   28 6 0E           LDA   IADSUP,C
0354    4C47   48 4 47           SUB   I ,B
0355    BA00   B8 2 00           NJP   $+X'0000'
0356    2C47   28 4 47           LDA   I ,B
0357    1205   10 2 05           LDC   $+X'0005'
0358    AE0E   A8 6 0E           STA   IADSUP,C
0359    1202   10 2 02           LDC   $+X'0002'
035A    2E0E   28 6 0E           LDA   IADSUP,C
035B    EDEE   E8 5 EE           BST   *C01;,B
035C    AC30   A8 4 30           STA   TEMP,B
035D    A42F   A0 4 2F           STE   TEMP,B
035E    122D   10 2 2D   )12400  LDC   $+X'002D'
035F    2E6D   28 6 6D           LDA   ADSRATE ,C
0360    266C   20 6 6C           LDE   ADSRATE ,C
0361    EDEC   E8 5 EC           BST   *H11;,B
0362    002F                     ADL   TEMP
0363    EDED   E8 5 ED           BST   *D11;,B
006C+B  44A0
006D+B  0000
0364    000C                     ADL   =X'44A0'
0365    EDEA   E8 5 EA           BST   *A11;,B
0366    007D                     ADL   REFDMD
0367    1200   10 2 00           LDC   $+X'0000'
0368    AE19   A8 6 19           STA   REFDMD,C
0369    A618   A0 6 18           STE   REFDMD,C
036A    AE01   A8 6 01           STA   DDMD,C
036B    A600   A0 6 00           STE   DDMD,C
036C    1213   10 2 13   )12600  LDC   $+X'0013'
036D    3E0E   38 6 0E           STZ   IADSUP,C
036E    3E0F   38 6 0F           STZ   IADSDOWN,C
036F    2C45   28 4 45           LDA   =X'0000' ,B
0370    1222   10 2 22           LDC   $+X'0022'
0371    AE3B   A8 6 3B           STA   ADBINC,C

                                 LPL
0372    7200   70 2 00           JMP   $+X'0000'
0373    0000                     DAT   X'0000'
0374    0000                     DAT   X'0000'
0375    0000                     DAT   X'0000'
0376    0000                     DAT   X'0000'
0377    0000                     DAT   X'0000'
0378    AE3C   A8 6 3C           STA   ADBDEC,C

/////  ERROR#   0020  )12600   0005
0379    7569   70 5 69           JMP   *)300,B
037A    1200   10 2 00   )14000  LDC   $+X'0000'
037B    2E1B   28 6 1B           LDA   DPRT,C
037C    A003   A8 0 03           STA   X'0003'
037D    50A0   50 0 A0           EOR   X'FFFF'
037E    12F7   10 2 F7           LDC   $+X'FFF7'
037F    5E04   58 6 04           AND   DA,C
0380    5003   50 0 03           EOR   X'0003'
0381    542D   50 4 2D           EOR   =X'FFFF' ,B
0382    F200   F0 2 00           ZJP   $+X'0000'
0383    750E   70 5 0E           JMP   *)15000,B
0384    12F0   10 2 F0           LDC   $+X'FFF0'
0385    2E01   28 6 01           LDA   DDMD,C
0386    2600   20 6 00           LDE   DDMD,C
0387    AE15   A8 6 15           STA   DEMAND,C
0388    A614   A0 6 14           STE   DEMAND,C
0389    2E05   28 6 05           LDA   DLRATE,C
038A    2604   20 6 04           LDE   DLRATE,C
038B    AE17   A8 6 17           STA   RATE,C
038C    A616   A0 6 16           STE   RATE,C
038D    7573   70 5 73           JMP   *)7B ,B
038E    1200   10 2 00   )15000  LDC   $+X'0000'
038F    2E14   28 6 14           LDA   IGVMAN,C
0390    4E15   48 6 15           SUB   IGVAO ,C
0391    EDEE   E8 5 EE           BST   *C01;,B
0392    AC30   A8 4 30           STA   TEMP,B
0393    A42F   A0 4 2F           STE   TEMP,B
```

```
Ø394   EDED   E8 5 ED              BST   *D111,B
Ø395   ØØ3B                        ADL   =K'4ØA3'
Ø396   AC3Ø   A8 4 3Ø              STA   TEMP,B
Ø397   A42F   AØ 4 2F              STE   TEMP,B
Ø398   2C45   28 4 45              LDA   =X'ØØØØ',B
Ø399   12ØØ   1Ø 2 ØØ              LDC   $+X'ØØØØ'
Ø39A   AEØ4   A8 6 Ø4              STA   READY,C
Ø39B   EFØØ   E8 7 ØØ              BST   *ABS,B
Ø39C   ØØ2F                        ADL   TEMP
Ø39D   EDEB   E8 5 EB              BST   *B111,B
Ø39E   ØØBF                        ADL   DBTRKL
Ø39F   B2ØØ   BØ 2 ØØ              PJP   $+X'ØØØØ'
Ø3AØ   2C4B   28 4 4B              LDA   =K'FFFF',B
Ø3A1   12ØØ   1Ø 2 ØØ              LDC   $+X'ØØØØ'
Ø3A2   AEØ4   A8 6 Ø4              STA   READY,C
Ø3A3   12D4   1Ø 2 D4              LDC   $+X'FFD4'
Ø3A4   2E63   28 6 63              LDA   GRP,C
Ø3A5   2662   2Ø 6 62              LDE   GRP,C
Ø3A6   EDEC   E8 5 EC              BST   *M111,B
Ø3A7   ØØ2F                        ADL   TEMP
Ø3A8   EDEA   E8 5 EA              BST   *A111,B
Ø3A9   ØØ7D                        ADL   REFDMD
Ø3AA   12CA   1Ø 2 CA              LDC   $+X'FFCA'
Ø3AB   AE19   A8 6 19              STA   REFDMD,C
Ø3AC   A618   AØ 6 18              STE   REFDMD,C
Ø3AD   EDEB   E8 5 EB              BST   *B111,B
Ø3AE   ØØØ9                        ADL   MMMAX
Ø3AF   BAØØ   B8 2 ØØ              NJP   $+X'ØØØØ'
Ø3BØ   12C7   1Ø 2 C7              LDC   $+X'FFC7'
Ø3B1   2E83   28 6 83              LDA   MMMAX,C
Ø3B2   2682   2Ø 6 82              LDE   MMMAX,C
Ø3B3   12C1   1Ø 2 C1              LDC   $+X'FFC1'
Ø3B4   AE19   A8 6 19              STA   REFDMD,C
Ø3B5   A618   AØ 6 18              STE   REFDMD,C
Ø3B6   12BE   1Ø 2 BE    )155ØØ    LDC   $+X'FFBE'
Ø3B7   2E19   28 6 19              LDA   REFDMD,C
Ø3B8   2618   2Ø 6 18              LDE   REFDMD,C
Ø3B9   B2ØØ   BØ 2 ØØ              PJP   $+X'ØØØØ'
Ø3BA   2C27   28 4 27              LDA   =K'ØØØØ',B
Ø3BB   2426   2Ø 4 26              LDE   =K'ØØØØ',B
Ø3BC   12B8   1Ø 2 B8              LDC   $+X'FFB8'
Ø3BD   AE19   A8 6 19              STA   REFDMD,C
Ø3BE   A618   AØ 6 18              STE   REFDMD,C
Ø3BF   12B5   1Ø 2 B5              LDC   $+X'FFB5'
Ø3CØ   2E19   28 6 19              LDA   REFDMD,C
Ø3C1   2618   2Ø 6 18              LDE   REFDMD,C
Ø3C2   AEØ1   A8 6 Ø1              STA   DDMD,C
Ø3C3   A6ØØ   AØ 6 ØØ              STE   DDMD,C
Ø3C4   1236   1Ø 2 36              LDC   $+X'ØØ36'
Ø3C5   2E26   28 6 26              LDA   ITESTAD,C
Ø3C6   EDEE   E8 5 EE              BST   *C111,B
Ø3C7   AC3Ø   A8 4 3Ø              STA   TEMP,B
Ø3C8   A42F   AØ 4 2F              STE   TEMP,B
Ø3C9   EDEB   E8 5 EB              BST   *B111,B
Ø3CA   ØØ91                        ADL   TESTAIMX
Ø3CB   BAØØ   B8 2 ØØ              NJP   $+X'ØØØØ'
Ø3CC   2C45   28 4 45              LDA   =X'ØØØØ',B
Ø3CD   122C   1Ø 2 2C              LDC   $+X'ØØ2C'
Ø3CE   AEØ4   A8 6 Ø4              STA   READY,C
Ø3CF   7592   7Ø 5 92              JMP   *)15Ø,B
Ø3DØ   12A5   1Ø 2 A5    )7Ø       LDC   $+X'FFA5'
Ø3D1   2EØ9   28 6 Ø9              LDA   DO,C
Ø3D2   F2ØØ   FØ 2 ØØ              ZJP   $+X'ØØØØ'
Ø3D3   7571   7Ø 5 71              JMP   *)6Ø,B
Ø3D4   12AØ   1Ø 2 AØ              LDC   $+X'FFAØ'
Ø3D5   2E15   28 6 15              LDA   DEMAND,C
Ø3D6   2614   2Ø 6 14              LDE   DEMAND,C
Ø3D7   EDEB   E8 5 EB              BST   *B111,B
Ø3D8   ØØ7D                        ADL   REFDMD
Ø3D9   F2Ø2   FØ 2 Ø2              ZJP   $+X'ØØØ2'
Ø3DA   3ØØ5   3Ø Ø Ø5              STZ   K'ØØØ5'
Ø3DB   F2Ø1   FØ 2 Ø1              ZJP   $+X'ØØØ1'
Ø3DC   28AØ   28 Ø AØ              LDA   K'FFFF'
Ø3DD   1298   1Ø 2 98              LDC   $+X'FF98'
Ø3DE   5EØC   58 6 ØC              AND   HOLD,C
```

```
                                     LPL
03DF     7200   70 2 00              JMP   $+X'0000'
03E0     0000                        DAT   X'0000'
03E1     0000                        DAT   X'0000'
03E2     03B6                        ADL   X'03B6'
03E3     0000                        DAT   X'0000'
03E4     F200   F0 2 00              ZJP   $+X'0000'
03E5     7593   70 5 93              JMP   *)130,B
03E6     7592   70 5 92              JMP   *)150,B
03E7     12BD   10 2 BD   )80        LDC   $+X'FFBD'
03E8     2E15   28 6 15              LDA   DEMAND,C
03E9     2614   20 6 14              LDE   DEMAND,C
03EA     EDEB   E8 5 EB              BST   *B11,B
03EB     807D                        ADL   REFDMD
03EC     AC30   A8 4 30              STA   TEMP,B
03ED     A42F   A0 4 2F              STE   TEMP,B
03EE     BA00   B8 2 00              NJP   $+X'0000'
03EF     7594   70 5 94              JMP   *)180,B
03F0     2C30   28 4 30              LDA   TEMP,B
03F1     242F   20 4 2F              LDE   TEMP,B
03F2     EDF0   E8 5 F0              BST   *CM1,B
03F3     AC30   A8 4 30              STA   TEMP,B
03F4     A42F   A0 4 2F              STE   TEMP,B
03F5     1200   10 2 00              LDC   $+X'0000'
03F6     2E17   28 6 17              LDA   RATE,C
03F7     2616   20 6 16              LDE   RATE,C
03F8     EDF0   E8 5 F0              BST   *CM1,B
03F9     AE17   A8 6 17              STA   RATE,C
03FA     A616   A0 6 16              STE   RATE,C
03FB     1206   10 2 06   )180       LDC   $+X'0006'
03FC     2E17   28 6 17              LDA   RATE,C
03FD     2616   20 6 16              LDE   RATE,C
03FE     EDED   E8 5 ED              BST   *D11,B
0005+B   46F0
0005+B   0000
03FF     0005                        ADL   =X'46F0'
0400     AC34   A8 4 34              STA   TEMP1 ,B
0401     A433   A0 4 33              STE   TEMP1 ,B
0402     B200   B0 2 00              PJP   $+X'0000'
0403     2C34   28 4 34              LDA   TEMP1 ,B
0404     2433   20 4 33              LDE   TEMP1 ,B
0405     EDF0   E8 5 F0              BST   *CM1,B
0406     AC34   A8 4 34              STA   TEMP1 ,B
0407     A433   A0 4 33              STE   TEMP1 ,B
0408     2C30   28 4 30              LDA   TEMP,B
0409     242F   20 4 2F              LDE   TEMP,B
040A     EDEB   E8 5 EB              BST   *B11,B
040B     8033                        ADL   TEMP1
040C     BA00   B8 2 00              NJP   $+X'0000'
040D     7597   70 5 97              JMP   *)140,B
040E     1213   10 2 13              LDC   $+X'0013'
040F     2E15   28 6 15              LDA   DEMAND,C
0410     2614   20 6 14              LDE   DEMAND,C
0411     AE19   A8 6 19              STA   REFDMD,C
0412     A618   A0 6 18              STE   REFDMD,C
0413     12CD   10 2 CD              LDC   $+X'FFCD'
0414     2E1B   28 6 1B              LDA   OPRT,C
0415     A803   A8 0 03              STA   X'0003'
0416     58A0   58 0 A0              EOR   X'FFFF'
0417     1200   10 2 00              LDC   $+X'0000'
0418     5E04   58 6 04              AND   DA,C
0419     5803   58 0 03              EOR   X'0003'
041A     542D   50 4 2D              EOR   =X'FFFF' ,B
041B     F200   F0 2 00              ZJP   $+X'0000'
041C     7592   70 5 92              JMP   *)150,B
041D     2C4B   28 4 4B   )130       LDA   =X'FFFF' ,B
041E     1207   10 2 07              LDC   $+X'0007'
041F     AE2B   A8 6 2B              STA   GOHOLDOF,C
0420     AE26   A8 6 26              STA   RUNLOGIC,C
0421     7592   70 5 92              JMP   *)150,B
0422     1214   10 2 14   )140       LDC   $+X'0014'
0423     2E15   28 6 15              LDA   DEMAND,C
0424     2614   20 6 14              LDE   DEMAND,C
0425     EDEB   E8 5 EB              BST   *B11,B
0426     807D                        ADL   REFDMD
0427     B202   B0 2 02              PJP   $+X'0002'
```

```
0428    3B05   3B 0 05          STZ   X'0005'
0429    F201   F0 2 01          ZJP   $+X'0001'
042A    28A0   28 0 A0          LDA   X'FFFF'
042B    12B6   10 2 B6          LDC   $+X'FFB6'
042C    5E02   58 6 02          AND   VPLIM ,C
042D    F200   F0 2 00          ZJP   $+X'0000'
042E    7502   70 5 02          JMP   *)100,B
042F    120D   10 2 0D   )146   LDC   $+X'000D'
0430    2E17   28 6 17          LDA   RATE,C
0431    2616   20 6 16          LDE   RATE,C
0432    EDED   E8 5 ED          BST   *D11,B
0433    0005                    ADL   *X'4000'
0434    EDEA   E8 5 EA          BST   *A11,B
0435    007D                    ADL   REFDMD
0436    AE19   A8 6 19          STA   REFDMD,C
0437    A618   A0 6 18          STE   REFDMD,C
0438    121A   10 2 1A   )150   LDC   $+X'001A'
0439    2E13   28 6 13          LDA   BR,C
043A    F200   F0 2 00          ZJP   $+X'0000'
043B    7589   70 5 89          JMP   *)300,B
043C    12A4   10 2 A4   )200   LDC   $+X'FFA4'
043D    2E02   28 6 02          LDA   DPCOP ,C
043E    542D   50 4 2D          EOR   *X'FFFF' ,B
043F    AC7B   A8 4 7B          STA   *BLA,B
0440    1200   10 2 00          LDC   $+X'0000'
0441    2E23   28 6 23          LDA   BPI ,C
0442    5C7B   58 4 7B          AND   *BLA,B
0443    AC9B   A8 4 9B          STA   *BLB,B
0444    129C   10 2 9C          LDC   $+X'FF9C'
0445    2E1B   28 6 1B          LDA   DPRT,C
0446    542D   50 4 2D          EOR   *X'FFFF' ,B
0447    542D   50 4 2D          EOR   *X'FFFF' ,B
0448    AC99   A8 4 99          STA   *BLC,B
0449    2C9B   28 4 9B          LDA   *BLB,B
044A    A803   A8 0 03          STA   X'0003'
044B    50A0   50 0 A0          EOR   X'FFFF'
044C    5C99   58 4 99          AND   *BLC,B
044D    5003   50 0 03          EOR   X'0003'
044E    542D   50 4 2D          EOR   *X'FFFF' ,B
                                 LPL
044F    7200   70 2 00          JMP   $+X'0000'
0450    0000                    DAT   X'0000'
0451    0000                    DAT   X'0000'
0452    F200   F0 2 00          ZJP   $+X'0000'
0453    750A   70 5 0A          JMP   *)1000 ,B
0454    128C   10 2 8C          LDC   $+X'FF8C'
0455    2E1B   28 6 1B          LDA   DPRT,C
0456    542D   50 4 2D          EOR   *X'FFFF' ,B
0457    F200   F0 2 00          ZJP   $+X'0000'
0458    7508   70 5 08          JMP   *)210,B
0459    1000   10 0 00          LDG   X'0000'
045A    7514   70 5 14          JMP   *FDLAG ,B
045B    000C                    ADL   BPDSP
045C    000D                    ADL   TWB
045D    000E                    ADL   SIMWS
045E    12F2   10 2 F2          LDC   $+X'FFF2'
045F    AE3D   A8 6 3D          STA   SIMWS ,C
0460    A63C   A0 6 3C          STE   SIMWS ,C
0461    AC34   A8 4 34          STA   TEMP1 ,B
0462    A433   A0 4 33          STE   TEMP1 ,B
0463    750F   70 5 0F          JMP   *)220,B
0464    12EC   10 2 EC   )210   LDC   $+X'FFEC'
0465    2E1F   28 6 1F          LDA   BPDSP ,C
0466    261E   20 6 1E          LDE   BPDSP ,C
0467    AE3D   A8 6 3D          STA   SIMWS ,C
0468    A63C   A0 6 3C          STE   SIMWS ,C
0469    2E55   28 6 55          LDA   WS,C
046A    2654   20 6 54          LDE   WS,C
046B    AC34   A8 4 34          STA   TEMP1 ,B
046C    A433   A0 4 33          STE   TEMP1 ,B
046D    12E3   10 2 E3   )220   LDC   $+X'FFE3'
046E    2E19   28 6 19          LDA   REFDMD,C
046F    2618   20 6 18          LDE   REFDMD,C
0470    EDEB   E8 5 EB          BST   *B11,B
0471    0033                    ADL   TEMP1
```

```
0472    AC30  A8 4 30           STA  TEMP,B
0473    A42F  A0 4 2F           STE  TEMP,B
0474    12DD  10 2 DD           LDC  $+X'FFDD'
0475    2E00  28 6 00           LDA  SC,C
0476    5E29  58 6 29           AND  GVMIN ,C
0477    F200  F0 2 00           ZJP  $+X'0000'
0478    75A0  70 5 A0           JMP  *)230,B
0479    EF00  E8 7 00           BST  *PRESET,B
047A    002F                    ADL  TEMP
047B    00A1                    ADL  RESSPDX
047C    00A2                    ADL  GS2
047D    00A3                    ADL  T4
047E    007E                    ADL  HLB
047F    0012                    ADL  ZERO
0480    00A4                    ADL  RESSPD
0481    009C                    ADL  SPDSP
0482    75A5  70 5 A5           JMP  *)240,B
0483    EF0A  E8 7 0A    )230   BST  *PRESET,B
0484    002F                    ADL  TEMP
0485    00A1                    ADL  RESSPDX
0486    00A6                    ADL  GS1
0487    00A7                    ADL  T1
0488    007E                    ADL  HLB
0489    0012                    ADL  ZERO
048A    00A4                    ADL  RESSPD
048B    009C                    ADL  SPDSP
048C    12C4  10 2 C4    )240   LDC  $+X'FFC4'
048D    2E1F  28 6 1F           LDA  SPDSP ,C
048E    261E  20 6 1E           LDE  SPDSP ,C
048F    EDEC  E8 5 EC           BST  *H111,B
00A8+B  47C8
00A9+B  0000
0490    00A8                    ADL  =X'47C8'
0491    EDED  E8 5 ED           BST  *D111,B
0492    0054                    ADL  NR
0493    AE2F  A8 6 2F           STA  SPD ,C
0494    A62E  A0 6 2E           STE  SPD ,C
0495    759A  70 5 9A           JMP  *)1000 ,B
0496    12BB  10 2 BB    )300   LDC  $+X'FFBB'
0497    2E4A  28 6 4A           LDA  TPLIM ,C
0498    564B  50 6 4B           EOR  TPLIMK,C
0499    F200  F0 2 00           ZJP  $+X'0000'
049A    2C4B  28 4 4B           LDA  =X'FFFF' ,B
049B    12B6  10 2 B6           LDC  $+X'FFB6'
049C    AE26  A8 6 26           STA  RUNLOGIC,C
049D    12B4  10 2 B4    )400   LDC  $+X'FFB4'
049E    2E44  28 6 44           LDA  DIGSPDPI ,C
049F    542D  50 4 2D           EOR  =X'FFFF' ,B
04A0    5E04  58 6 04           AND  DA,C
04A1    AC7B  A8 4 7B           STA  PBLA,B
04A2    2E25  28 6 25           LDA  SPTF,C
04A3    542D  50 4 2D           EOR  =X'FFFF' ,B
04A4    5C7B  58 4 7B           AND  PBLA,B
04A5    F200  F0 2 00           ZJP  $+X'0000'
04A6    75AA  70 5 AA           JMP  *)410,B
04A7    2C27  28 4 27           LDA  =X'0000' ,B
04A8    2426  20 4 26           LDE  =X'0000' ,B
04A9    12A7  10 2 A7           LDC  $+X'FFA7'
04AA    AE21  A8 6 21           STA  X ,C
04AB    A620  A0 6 20           STE  X ,C
04AC    75AB  70 5 AB           JMP  *)420,B
04AD    EF00  E8 7 00    )410   BST  *SPDLOOPI ,B
04AE    12A2  10 2 A2           LDC  $+X'FFA2'
04AF    2E21  28 6 21           LDA  X ,C
04B0    2620  20 6 20           LDE  X ,C
04B1    EDEB  E8 5 EB           BST  *S111,B
04B2    00AC                    ADL  HLF
04B3    BA00  B8 2 00           NJP  $+X'0000'
04B4    1200  10 2 00           LDC  $+X'0000'
04B5    2E19  28 6 19           LDA  HLF ,C
04B6    2618  20 6 18           LDE  HLF ,C
04B7    1299  10 2 99           LDC  $+X'FF99'
04B8    AE21  A8 6 21           STA  X ,C
04B9    A620  A0 6 20           STE  X ,C
04BA    1296  10 2 96    )420   LDC  $+X'FF96'
```

```
04BB   2E19   20 6 19          LDA   REFDMD,C
04BC   2618   20 6 18          LDE   REFDMD,C
04BD   EDEA   E0 5 EA          SBT   *A11,B
04BE   80AD                    ADL   K
04BF   AE1B   A0 6 1B          STA   REF1,C
04C0   A61A   A0 6 1A          STE   REF1,C
04C1   B200   B0 2 00          PUP   $+X'0000'
04C2   2C27   20 4 27          LDA   *K'0000' ,B
04C3   2426   20 4 26          LDE   *K'0000' ,B
04C4   120C   10 2 0C          LDC   $+X'FF0C'
04C5   AE1B   A0 6 1B          STA   REF1,C
04C6   A61A   A0 6 1A          STE   REF1,C
04C7   1200   10 2 00          LDC   $+X'0000'
04C8   2E1B   20 6 1B          LDA   DPRT,C
04C9   F200   F0 2 00          ZJP   $+X'0000'
04CA   75AE   70 5 AE          JMP   *)500,B
04CB   1205   10 2 05          LDC   $+X'FF05'
04CC   2E1D   20 6 1D          LDA   REF2,C
04CD   261C   20 6 1C          LDE   REF2,C
04CE   AE39   A0 6 39          STA   BINMW ,C
04CF   A638   A0 6 38          STE   BINMW ,C
04D0   1200   10 2 00          LDC   $+X'0000'
04D1   2E01   20 6 01          LDA   MW,C
04D2   2600   20 6 00          LDE   MW,C
04D3   AC34   A0 4 34          STA   TEMP1 ,B
04D4   A433   A0 4 33          STE   TEMP1 ,B
04D5   1200   10 2 00          LDC   $+X'0000'
04D6   2E27   20 6 27          LDA   VBP ,C
04D7   2626   20 6 26          LDE   VBP ,C
04D8   AE3B   A0 6 3B          STA   BIMP1 ,C
04D9   A63A   A0 6 3A          STE   BIMP1 ,C

                               LPL
04DA   7200   70 2 00          JMP   $+X'0000'
04DB   0000                    DAT   K'0000'
04DC   0000                    DAT   K'0000'
04DD   0000                    DAT   K'0000'
04DE   0000                    DAT   K'0000'
04DF   0000                    DAT   K'0000'
04E0   0000                    DAT   K'0000'
04E1   12FD   10 2 FD          LDC   $+X'FFFD'
04E2   2E03   20 6 03          LDA   P1,C
04E3   2602   20 6 02          LDE   P1,C
04E4   AC76   A0 4 76          STA   TEMP2 ,B
04E5   A475   A0 4 75          STE   TEMP2 ,B
04E6   75AF   70 5 AF          JMP   *)520,B
04E7   1800   18 0 00   )500   LDG   K'0000'
04E8   7514   70 5 14          JMP   *FDLAG ,B
04E9   80B0                    ADL   REF2
04EA   80B1                    ADL   TMW
04EB   80B2                    ADL   BINMW
04EC   12EF   10 2 EF          LDC   $+X'FFEF'
04ED   AE39   A0 6 39          STA   BINMW ,C
04EE   A638   A0 6 38          STE   BINMW ,C
04EF   AC34   A0 4 34          STA   TEMP1 ,B
04F0   A433   A0 4 33          STE   TEMP1 ,B
04F1   1800   18 0 00          LDG   K'0000'
04F2   7514   70 5 14          JMP   *FDLAG ,B
04F3   80B3                    ADL   VBP
04F4   80B4                    ADL   TP1
04F5   80B5                    ADL   BIMP1
04F6   12E5   10 2 E5          LDC   $+X'FFE5'
04F7   AE3B   A0 6 3B          STA   BIMP1 ,C
04F8   A63A   A0 6 3A          STE   BIMP1 ,C
04F9   AC76   A0 4 76          STA   TEMP2 ,B
04FA   A475   A0 4 75          STE   TEMP2 ,B
04FB   1200   10 2 00   )520   LDC   $+X'0000'
04FC   2E21   20 6 21          LDA   MW1 ,C
04FD   F200   F0 2 00          ZJP   $+X'0000'
04FE   75B6   70 5 B6          JMP   *)526,B
04FF   12DC   10 2 DC          LDC   $+X'FFDC'
0500   2E1B   20 6 1B          LDA   REF1,C
0501   261A   20 6 1A          LDE   REF1,C
0502   AE1D   A0 6 1D          STA   REF2,C
0503   A61C   A0 6 1C          STE   REF2,C
0504   75B7   70 5 B7          JMP   *)530,B
```

```
0505   12D6   10 2 D6   )626   LDC   $+X'FFD6'
0506   2E1B   20 6 1B          LDA   REF1,C
0507   261A   20 6 1A          LDE   REF1,C
0508   EDEB   E8 5 EB          BST   *B11,B
0509   0033                    ADL   TEMP1
050A   EDED   E8 5 ED          BST   *D11,B
050B   00B8                    ADL   GR2
050C   AC30   A8 4 30          STA   TEMP,B
050D   A42F   A0 4 2F          STE   TEMP,B
050E   EFD1   E8 7 D1          BST   *PRESET,B
050F   002F                    ADL   TEMP
0510   00B9                    ADL   RESMWX
0511   00BA                    ADL   GL2
0512   00BB                    ADL   T2
0513   00BC                    ADL   HEL
0514   00BD                    ADL   LEL
0515   00BE                    ADL   RESMW
0516   00BF                    ADL   Y
0517   12C4   10 2 C4          LDC   $+X'FFC4'
0518   2E1B   20 6 1B          LDA   REF1,C
0519   261A   20 6 1A          LDE   REF1,C
051A   EDEC   E8 5 EC          BST   *H11,B
051B   00BF                    ADL   Y
051C   AE1D   A8 6 1D          STA   REF2,C
051D   A61C   A0 6 1C          STE   REF2,C
051E   12BE   10 2 BE   )560   LDC   $+X'FFBE'
051F   2E57   20 6 57          LDA   GR3 ,C
0520   2656   20 6 56          LDE   GR3 ,C
0521   EDEC   E8 5 EC          BST   *H11,B
0522   00B0                    ADL   REF2
0523   12B8   10 2 B8          LDC   $+X'FFB8'
0524   AE25   A8 6 25          STA   PISP,C
0525   A624   A0 6 24          STE   PISP,C
0526   122B   10 2 2B          LDC   $+X'002B'
0527   2E1D   20 6 1D          LDA   IPI ,C
0528   F200   F0 2 00          ZJP   $+X'0000'
0529   75C0   70 5 C0          JMP   *)600,B
052A   12B1   10 2 B1          LDC   $+X'FFB1'
052B   2E25   20 6 25          LDA   PISP,C
052C   2624   20 6 24          LDE   PISP,C
052D   AE27   A8 6 27          STA   VBP ,C
052E   A626   A0 6 26          STE   VBP ,C
052F   75C1   70 5 C1          JMP   *)700,B
0530   12AB   10 2 AB   )600   LDC   $+X'FFAB'
0531   2E25   20 6 25          LDA   PISP,C
0532   2624   20 6 24          LDE   PISP,C
0533   EDEB   E8 5 EB          BST   *B11,B
0534   0075                    ADL   TEMP2
0535   AC30   A8 4 30          STA   TEMP,B
0536   A42F   A0 4 2F          STE   TEMP,B
0537   EFA0   E8 7 A0          BST   *PRESET,B
0538   002F                    ADL   TEMP
0539   00C2                    ADL   RESPIX
053A   00C3                    ADL   GL3
053B   00C4                    ADL   T3
053C   00C5                    ADL   GR4
053D   0012                    ADL   ZERO
053E   00C6                    ADL   RESPI
053F   00B3                    ADL   VBP
0540   1296   10 2 96   )700   LDC   $+X'FF96'
0541   2E27   20 6 27          LDA   VBP ,C
0542   2626   20 6 26          LDE   VBP ,C
0543   EDEC   E8 5 EC          BST   *H11,B
0544   00A8                    ADL   =X'47C8'
0545   EDED   E8 5 ED          BST   *D11,B
0546   00C5                    ADL   GR4
0547   AE2B   A8 6 2B          STA   GVSP,C
0548   A62A   A0 6 2A          STE   GVSP,C
0549   1223   10 2 23   )1000  LDC   $+X'0023'
054A   2E01   20 6 01          LDA   TC,C
054B   F200   F0 2 00          ZJP   $+X'0000'
054C   75C7   70 5 C7          JMP   *)1180 ,B
054D   1204   10 2 04          LDC   $+X'0004'
054E   2E00   20 6 00          LDA   SC,C
054F   F200   F0 2 00          ZJP   $+X'0000'
```

```
0550    75C8    70 5 C8            JMP   *)1020 ,B
0551    1204    10 2 04            LDC    $+X'0004'
0552    2E32    28 6 32            LDA    TVMIN ,C
0553    F200    F0 2 00            ZJP    $+X'0000'
0554    75C9    70 5 C9            JMP   *)1120 ,B
0555    2C4B    28 4 4B            LDA   =K'0000' ,B
0556    1206    10 2 06            LDC    $+X'0006'
0557    AE28    A8 6 28            STA    TVMAX ,C
0558    2C27    28 4 27            LDA   =K'0000' ,B
0559    2426    20 4 26            LDE   =K'0000' ,B
055A    1200    10 2 00            LDC    $+X'0000'
055B    AE29    A8 6 29            STA    TVBIAS,C
055C    A628    A0 6 28            STE    TVBIAS,C

                                   LPL
055D    7200    70 2 00            JMP    $+X'0000'
055E    0000                       DAT    K'0000'
055F    0000                       DAT    K'0000'
0560    2C4B    28 4 4B            LDA   =K'FFFF' ,B
0561    12FE    10 2 FE            LDC    $+X'FFFE'
0562    AE32    A8 6 32            STA    TVMIN ,C
0563    AE26    A8 6 26            STA    RUNLOGIC,C
0564    75C9    70 5 C9            JMP   *)1120 ,B
0565    12FA    10 2 FA    )1020   LDC    $+X'FFFA'
0566    2E35    28 6 35            LDA    TRCOM ,C
0567    F200    F0 2 00            ZJP    $+X'0000'
0568    75CA    70 5 CA            JMP   *)1040 ,B
0569    12F6    10 2 F6            LDC    $+X'FFF6'
056A    2E29    28 6 29            LDA    GVMIN ,C
056B    B42D    B0 4 2D            EOR   =K'FFFF' ,B
056C    F200    F0 2 00            ZJP    $+X'0000'
056D    75C7    70 5 C7            JMP   *)1160 ,B
056E    12F1    10 2 F1    )1040   LDC    $+X'FFF1'
056F    2E28    28 6 28            LDA    TVMAX ,C
0570    F200    F0 2 00            ZJP    $+X'0000'
0571    75C9    70 5 C9            JMP   *)1120 ,B
0572    1200    10 2 00            LDC    $+X'0000'
0573    2E33    28 6 33            LDA    BTVO,C
0574    2632    20 6 32            LDE    BTVO,C
0575    EDEA    E8 5 EA            SST   *A11,B
0576    00CB                       ADL    TVBIAS
0577    12E7    10 2 E7            LDC    $+X'FFE7'
0578    AE29    A8 6 29            STA    TVBIAS,C
0579    A628    A0 6 28            STE    TVBIAS,C
057A    EDEB    E8 5 EB            SST   *S11,B
057B    00A8                       ADL   =K'47C8'
057C    B200    B0 2 00            PUP    $+X'0000'
057D    75C9    70 5 C9            JMP   *)1120 ,B
057E    2C4B    28 4 4B            LDA   =K'0000' ,B
057F    12E0    10 2 E0            LDC    $+X'FFE0'
0580    AE32    A8 6 32            STA    TVMIN ,C
0581    2CA0    28 4 A0            LDA   =K'47C0' ,B
0582    24A0    20 4 A0            LDE   =K'47C0' ,B
0583    12DB    10 2 DB            LDC    $+X'FFDB'
0584    AE29    A8 6 29            STA    TVBIAS,C
0585    A628    A0 6 28            STE    TVBIAS,C
0586    2C4B    28 4 4B            LDA   =K'FFFF' ,B
0587    12D8    10 2 D8            LDC    $+X'FFD8'
0588    AE28    A8 6 28            STA    TVMAX ,C
0589    AE26    A8 6 26            STA    RUNLOGIC,C
058A    12D4    10 2 D4    )1120   LDC    $+X'FFD4'
058B    2E29    28 6 29            LDA    TVBIAS,C
058C    2628    20 6 28            LDE    TVBIAS,C
058D    EDEC    E8 5 EC            SST   *M11,B
058E    0043                       ADL   =K'4DA3'
058F    EDEF    E8 5 EF            SST   *C10,B
0590    AC23    A8 4 23            STA    IPAT,B
0591    75CC    70 5 CC            JMP   *)1200 ,B
0592    1220    10 2 20    )1160   LDC    $+X'0020'
0593    2E5D    28 6 5D            LDA    GR0 ,C
0594    265C    20 6 5C            LDE    GR0 ,C
0595    EDEC    E8 5 EC            SST   *M11,B
0596    00CD                       ADL    BPD
0597    EDEF    E8 5 EF            SST   *C10,B
0598    AC23    A8 4 23            STA    IPAT,B
```

```
0599    2C45   28 4 45   )1200   LDA   *K'0000' ,B
059A    1200   10 2 00           LDC   $+X'0000'
059B    AE02   A8 6 02           STA   VPLIM ,C
059C    12C3   10 2 C3           LDC   $+X'FFC3'
059D    2E00   28 6 00           LDA   GC,C
059E    F200   F0 2 00           ZJP   $+X'0000'
059F    75CE   70 5 CE           JMP   *)1220 ,B
05A0    12BF   10 2 BF           LDC   $+X'FFBF'
05A1    2E01   28 6 01           LDA   TC,C
05A2    F200   F0 2 00           ZJP   $+X'0000'
05A3    75CF   70 5 CF           JMP   *)1210 ,B
05A4    12BB   10 2 BB           LDC   $+X'FFBB'
05A5    2E29   28 6 29           LDA   GVMIN ,C
05A6    F200   F0 2 00           ZJP   $+X'0000'
05A7    75D0   70 5 D0           JMP   *)1320 ,B
05A8    75D1   70 5 D1           JMP   *)1270 ,B
05A9    12B6   10 2 B6   )1210   LDC   $+X'FFB6'
05AA    2E2A   28 6 2A           LDA   GVMAX ,C
05AB    F200   F0 2 00           ZJP   $+X'0000'
05AC    75D0   70 5 D0           JMP   *)1320 ,B
05AD    121B   10 2 1B           LDC   $+X'001B'
05AE    2E35   28 6 35           LDA   0GVO,C
05AF    2634   20 6 34           LDE   BGVO,C
05B0    EDEA   E8 5 EA           SST   *A111,B
05B1    00D2                     ADL   GVBIAS
05B2    12AC   10 2 AC           LDC   $+X'FFAC'
05B3    AE2D   A8 6 2D           STA   GVBIAS,C
05B4    A62C   A0 6 2C           STE   GVBIAS,C
05B5    75D3   70 5 D3           JMP   *)1240 ,B
05B6    12A9   10 2 A9   )1220   LDC   $+X'FFA9'
05B7    2E13   28 6 13           LDA   BR,C
05B8    F200   F0 2 00           ZJP   $+X'0000'
05B9    75D4   70 5 D4           JMP   *)1340 ,B
05BA    12A5   10 2 A5           LDC   $+X'FFA5'
05BB    2E35   28 6 35           LDA   TRCOM ,C
05BC    F200   F0 2 00           ZJP   $+X'0000'
05BD    75D5   70 5 D5           JMP   *)1360 ,B
05BE    12A1   10 2 A1           LDC   $+X'FFA1'
05BF    2E29   28 6 29           LDA   GVMIN ,C
05C0    F200   F0 2 00           ZJP   $+X'0000'
05C1    75D5   70 5 D5           JMP   *)1380 ,B
05C2    129C   10 2 9C           LDC   $+X'FF9C'
05C3    2E2D   28 6 2D           LDA   GVBIAS,C
05C4    262C   20 6 2C           LDE   GVBIAS,C
05C5    EDEB   E8 5 EB           SST   *B111,B
05C6    00D6                     ADL   BGVC
05C7    AE2D   A8 6 2D           STA   GVBIAS,C
05C8    A62C   A0 6 2C           STE   GVBIAS,C
05C9    1296   10 2 96   )1240   LDC   $+X'FF96'
05CA    2E00   28 6 00           LDA   GC,C
05CB    F200   F0 2 00           ZJP   $+X'0000'
05CC    75D7   70 5 D7           JMP   *)1260 ,B
05CD    1291   10 2 91           LDC   $+X'FF91'
05CE    2E2D   28 6 2D           LDA   GVBIAS,C
05CF    262C   20 6 2C           LDE   GVBIAS,C
05D0    EDEB   E8 5 EB           SST   *B111,B
05D1    00A8                     ADL   =X'47C8'
05D2    B200   B0 2 00           PUP   $+X'0000'
05D3    75D0   70 5 D0           JMP   *)1320 ,B
                                   LPL
05D4    7200   70 2 00           JMP   $+X'0000'
05D5    0000                     DAT   X'0000'
05D6    0000                     DAT   X'0000'
05D7    2C45   28 4 45           LDA   *K'0000' ,B
05D8    1287   10 2 87           LDC   $+X'FF87'
05D9    AE29   A8 6 29           STA   GVMIN ,C
05DA    AE32   A8 6 32           STA   TVMIN ,C
05DB    2CA9   28 4 A9           LDA   *K'47C8' ,B
05DC    24A8   20 4 A8           LDE   *K'47C8' ,B
05DD    1200   10 2 00           LDC   $+X'0000'
05DE    AE2D   A8 6 2D           STA   GVBIAS,C
05DF    A62C   A0 6 2C           STE   GVBIAS,C
05E0    2C4B   28 4 4B           LDA   *K'FFFF' ,B
05E1    1200   10 2 00           LDC   $+X'0000'
05E2    AE2A   A8 6 2A           STA   GVMAX ,C
```

```
05E3   AE26   A8 6 26           STA   RUNLOGIC,C
05E4   75D0   70 5 D0           JMP   *)1320 ,B
05E5   1200   10 2 00   )1260   LDC   $+X'0000'
05E6   2E13   28 6 13           LDA   TM,C
05E7   F200   F0 2 00           ZJP   $+X'0000'
05E8   75D1   70 5 D1           JMP   *)1270 ,B
05E9   120C   10 2 0C           LDC   $+X'000C'
05EA   2E2D   28 6 2D           LDA   GVBIAS,C
05EB   262C   20 6 2C           LDE   GVBIAS,C
05EC   BA00   B8 2 00           NJP   $+X'0000'
05ED   75D0   70 5 D0           JMP   *)1320 ,B
05EE   1206   10 2 06           LDC   $+X'0006'
05EF   2E4D   28 6 4D           LDA   HSTRANS ,C
05F0   264C   20 6 4C           LDE   HSTRANS ,C
05F1   EDEB   E8 5 EB           BST   *B11,B
05F2   0079                     ADL   HS
05F3   EDEB   E8 5 EB           BST   *B11,B
05F4   00D0                     ADL   HSDIP
05F5   BA02   B8 2 02           NJP   $+X'0002'
05F6   3805   38 0 05           STZ   X'0005'
05F7   F201   F0 2 01           ZJP   $+X'0001'
05F8   28A0   28 0 A0           LDA   X'FFFF'
05F9   A803   A8 0 03           STA   X'0003'
05FA   50A0   50 0 A0           EOR   X'FFFF'
05FB   12DB   10 2 DB           LDC   $+X'FFDB'
05FC   5E03   58 6 03           AND   HANOTRAK,C
05FD   5003   50 0 03           EOR   X'0003'
05FE   F200   F0 2 00           ZJP   $+X'0000'
05FF   75D0   70 5 D0           JMP   *)1320 ,B
0600   2C45   28 4 45   )1270   LDA   *X'0000' ,B
0601   1220   10 2 20           LDC   $+X'0020'
0602   AE2A   A8 6 2A           STA   GVMAX ,C
0603   2C27   28 4 27           LDA   *X'0000' ,B
0604   2426   20 4 26           LDE   *X'0000' ,B
0605   1217   10 2 17           LDC   $+X'0017'
0606   AE2D   A8 6 2D           STA   GVBIAS,C
0607   A62C   A0 6 2C           STE   GVBIAS,C
0608   12CD   10 2 CD           LDC   $+X'FFCD'
0609   2E7F   28 6 7F           LDA   GVINIT,C
060A   267E   20 6 7E           LDE   GVINIT,C
060B   1206   10 2 06           LDC   $+X'0006'
060C   AE31   A8 6 31           STA   RESSPD,C
060D   A630   A0 6 30           STE   RESSPD,C
060E   2C27   28 4 27           LDA   *X'0000' ,B
060F   2426   20 4 26           LDE   *X'0000' ,B
0610   AE43   A8 6 43           STA   RESSPDX ,C
0611   A642   A0 6 42           STE   RESSPDX ,C
0612   12C3   10 2 C3           LDC   $+X'FFC3'
0613   2E5D   28 6 5D           LDA   GR0 ,C
0614   265C   20 6 5C           LDE   GR0 ,C
0615   EDEC   E8 5 EC           BST   *H11,B
0616   00CD                     ADL   SPD
0617   EDED   E8 5 ED           BST   *D11,B
0618   0043                     ADL   *X'46A3'
0619   120E   10 2 0E           LDC   $+X'000E'
061A   AE29   A8 6 29           STA   TVBIAS,C
061B   A628   A0 6 28           STE   TVBIAS,C
061C   2C4B   28 4 4B           LDA   *X'FFFF' ,B
061D   121C   10 2 1C           LDC   $+X'001C'
061E   AE29   A8 6 29           STA   GVMIN ,C
061F   AE26   A8 6 26           STA   RUNLOGIC,C
0620   1207   10 2 07   )1320   LDC   $+X'0007'
0621   2E2D   28 6 2D           LDA   GVBIAS,C
0622   262C   20 6 2C           LDE   GVBIAS,C
0623   EDEB   E8 5 EB           BST   *B11,B
0624   0035                     ADL   VPOSL
0625   8200   80 2 00           PJP   $+X'0000'
0626   75D9   70 5 D9           JMP   *)1325 ,B
0627   1207   10 2 07           LDC   $+X'0007'
0628   2E0B   28 6 0B           LDA   VPOSL ,C
0629   260A   20 6 0A           LDE   VPOSL ,C
062A   AE2D   A8 6 2D           STA   GVBIAS,C
062B   A62C   A0 6 2C           STE   GVBIAS,C
062C   2C45   28 4 45           LDA   *X'0000' ,B
062D   1210   10 2 10           LDC   $+X'0010'
```

```
Ø62E    AE2A   A8 6 2A           STA   GVMAX ,C
Ø62F    2C4B   28 4 4B           LDA   =K'FFFF' ,B
Ø63Ø    12A6   1Ø 2 A6           LDC   $+X'FFA6'
Ø631    AEØ2   A8 6 Ø2           STA   VPLIM ,C
Ø632    12Ø5   1Ø 2 Ø5           LDC   $+X'ØØØ5'
Ø633    AE26   A8 6 26           STA   RUNLOGIC,C

                                 LPL
Ø634    72ØØ   7Ø 2 ØØ           JMP   $+X'ØØØØ'
Ø635    ØØØØ                     DAT   K'ØØØØ'
Ø636    ØØØØ                     DAT   K'ØØØØ'
Ø637    ØØØØ                     DAT   K'ØØØØ'
Ø638    12FD   1Ø 2 FD   )132Ø   LDC   $+X'FFFD'
Ø639    2E2D   28 6 2D           LDA   GVBIAS,C
Ø63A    262C   2Ø 6 2C           LDE   GVBIAS,C
Ø63B    EDEC   E8 5 EC           BST   *M11,B
Ø63C    ØØ43                     ADL   =K'4ØA3'
Ø63D    EDEF   E8 5 EF           BST   *C4Ø,B
Ø63E    AC24   A8 4 24           STA   IPAT,B
Ø63F    75DA   7Ø 5 DA           JMP   *)15ØØ ,B
Ø64Ø    2C4E   28 4 4E   )134Ø   LDA   =K'ØØØ2' ,B
Ø641    AC47   A8 4 47           STA   I ,B
Ø642    2C47   28 4 47           LDA   I ,B
Ø643    4ØØ5   4Ø Ø Ø5           ADD   K'ØØØ5'
Ø644    42ØØ   4Ø 2 ØØ           ADD   =K'FFFE'
Ø645    AC2B   A8 4 2B           STA   #BIA,B
Ø646    12EF   1Ø 2 EF           LDC   $+X'FFEF'
Ø647    2E2B   28 6 2B           LDA   GVBP,C
Ø648    262A   2Ø 6 2A           LDE   GVBP,C
Ø649    EDEB   E8 5 EB           BST   *B11,B
Ø64A    ØØ2B                     ADL   #BIA
Ø64B    B2ØØ   BØ 2 ØØ           PJP   $+X'ØØØØ'
Ø64C    75DB   7Ø 5 DB           JMP   *)136Ø ,B
Ø64D    6447   6Ø 4 47   )1345   INC   I ,B
ØØDC*B  ØØØ6
Ø64E    2CDC   28 4 DC           LDA   =K'ØØØ6' ,B
Ø64F    4C47   48 4 47           SUB   I ,B
Ø65Ø    B2F1   BØ 2 F1           PJP   $+X'FFF1'
Ø651    2CDC   28 4 DC           LDA   =K'ØØØ6' ,B
Ø652    AC47   A8 4 47           STA   I ,B
Ø653    2C47   28 4 47   )136Ø   LDA   I ,B
Ø654    4ØØ5   4Ø Ø Ø5           ADD   X'ØØØ5'
Ø655    AC2B   A8 4 2B           STA   #BIA,B
Ø656    42ØØ   4Ø 2 ØØ           ADD   =K'ØØØØ'
Ø657    ACDD   A8 4 DD           STA   #BIB,B
Ø658    2C2B   28 4 2B           LDA   #BIA,B
Ø659    42ØØ   4Ø 2 ØØ           ADD   =K'ØØØA'
Ø65A    ACDE   A8 4 DE           STA   #BIC,B
Ø65B    2C2B   28 4 2B           LDA   #BIA,B
Ø65C    42Ø6   4Ø 2 Ø6           ADD   =K'ØØØ6'
Ø65D    ACDF   A8 4 DF           STA   #BID,B
Ø65E    2C2B   28 4 2B           LDA   #BIA,B
Ø65F    421B   4Ø 2 1B           ADD   =K'FFFE'
Ø66Ø    ACEØ   A8 4 EØ           STA   #BIE,B
Ø661    2C2B   28 4 2B           LDA   #BIA,B
Ø662    42ØØ   4Ø 2 ØØ           ADD   =K'FFFC'
Ø663    ACE1   A8 4 E1           STA   #BIF,B
Ø664    2C2B   28 4 2B           LDA   #BIA,B
Ø665    42Ø3   4Ø 2 Ø3           ADD   =K'FFFC'
Ø666    ACE2   A8 4 E2           STA   #BIG,B
Ø667    12CE   1Ø 2 CE           LDC   $+X'FFCE'
Ø668    2E2B   28 6 2B           LDA   GVBP,C
Ø669    262A   2Ø 6 2A           LDE   GVBP,C
Ø66A    EDEB   E8 5 EB           BST   *B11,B
Ø66B    ØØE2                     ADL   #BIG
Ø66C    ACE4   A8 4 E4           STA   #BRH,B
Ø66D    A4E3   AØ 4 E3           STE   #BRH,B
Ø66E    38Ø4   38 Ø Ø4           STZ   K'ØØØ4'
Ø66F    38Ø5   38 Ø Ø5           STZ   K'ØØØ5'
Ø67Ø    C5EØ   CØ 5 EØ           ADA   *#BIE,B
Ø671    EDEB   E8 5 EB           BST   *B11,B
Ø672    ØØE1                     ADL   #BIF
Ø673    ACE6   A8 4 E6           STA   #BRI,B
Ø674    A4E5   AØ 4 E5           STE   #BRI,B
Ø675    38Ø4   38 Ø Ø4           STZ   K'ØØØ4'
Ø676    38Ø5   38 Ø Ø5           STZ   K'ØØØ5'
```

```
0677      E6DE   C0 5 DE               ADA   *#BIC,B
0678      EDEB   E8 5 EB               BST   *B111,B
0679      00DF                         ADL    #BID
067A      EDED   E8 5 ED               BST   *D111,B
067B      00E5                         ADL    #BRI
067C      EDEC   E8 5 EC               BST   *M111,B
067D      00E3                         ADL    #BRH
067E      EDEA   E8 5 EA               BST   *A111,B
067F      00DD                         ADL    #BIB
0680      AE57   A8 6 57               STA    GVPOS ,C
0681      A656   A0 6 56               STE    GVPOS ,C
0682      EDEB   E8 5 EB               BST   *B111,B
0683      0035                         ADL    VPOSL
0684      B200   B0 2 00               PUP    $+X'0000'
0685      75E7   70 5 E7               JMP   *)1365 ,B
0686      12AF   10 2 AF               LDC    $+X'FFAF'
0687      2E0B   28 6 0B               LDA    VPOSL ,C
0688      260A   20 6 0A               LDE    VPOSL ,C
0689      AE57   A8 6 57               STA    GVPOS ,C
068A      A656   A0 6 56               STE    GVPOS ,C
068B      2C40   28 4 40               LDA   *X'FFFF' ,B
068C      1200   10 2 00               LDC    $+X'0000'
068D      AE02   A8 6 02               STA    VPLIM ,C
068E      12A0   10 2 A0               LDC    $+X'FFA0'
068F      AE20   A8 6 20               STA    RUNLOGIC,C
0690      1200   10 2 00     )1365     LDC    $+X'0000'
0691      2E01   28 6 01               LDA    BR8 ,C
0692      2600   20 6 00               LDE    BR8 ,C
0693      EDEC   E8 5 EC               BST   *M111,B
0694      00E8                         ADL    GVPOS
0695      EDEF   E8 5 EF               BST   *C111,B
0696      AC24   A8 4 24               STA    IPAT,B
0697      75DA   70 5 DA               JMP   *)1500 ,B
0698      1200   10 2 00     )1380     LDC    $+X'0000'
0699      2E0F   28 6 0F               LDA    BR7 ,C
069A      260E   20 6 0E               LDE    BR7 ,C
069B      EDEC   E8 5 EC               BST   *M111,B
069C      00ED                         ADL    BPD
069D      EDED   E8 5 ED               BST   *D111,B
069E      0043                         ADL   *X'45A3'
069F      EDEB   E8 5 EB               BST   *B111,B
06A0      0035                         ADL    VPOSL

                                       LPL
06A1      7200   70 2 00               JMP    $+X'0000'
06A2      0000                         DAT    X'0000'
06A3      0000                         DAT    X'0000'
06A4      FFFE                         DAT    X'FFFE'
06A5      0005                         DAT    X'0005'
06A6      000A                         DAT    X'000A'
06A7      FFFC                         DAT    X'FFFC'
06A8      B200   B0 2 00               PUP    $+X'0000'
06A9      75E9   70 5 E9               JMP   *)1385 ,B
06AA      1208   10 2 08               LDC    $+X'FF08'
06AB      2E0B   28 6 0B               LDA    VPOSL ,C
06AC      260A   20 6 0A               LDE    VPOSL ,C
06AD      EDEC   E8 5 EC               BST   *M111,B
06AE      0043                         ADL   *X'45A3'
06AF      EDED   E8 5 ED               BST   *D111,B
06B0      00EA                         ADL    BR7
06B1      AE2F   A8 6 2F               STA    BPD ,C
06B2      A62E   A0 6 2E               STE    BPD ,C
06B3      12EF   10 2 EF               LDC    $+X'FFEF'
06B4      2E15   28 6 15               LDA    HR,C
06B5      2614   20 6 14               LDE    HR,C
06B6      EDEC   E8 5 EC               BST   *M111,B
06B7      00ED                         ADL    BPD
06B8      EDED   E8 5 ED               BST   *D111,B
06B9      00AB                         ADL   *X'47CB'
06BA      1200   10 2 00               LDC    $+X'0000'
06BB      AE31   A8 6 31               STA    RESBPD,C
06BC      A630   A0 6 30               STE    RESBPD,C
06BD      2C40   28 4 40               LDA   *X'FFFF' ,B
06BE      12E5   10 2 E5               LDC    $+X'FFE5'
06BF      AE02   A8 6 02               STA    VPLIM ,C
```

```
06C0    1200   10 2 00          LDC   $+X'0000'
06C1    AE26   A8 6 26          STA   RUNLOGIC,C
06C2    12E0   10 2 E0  )1385   LDC   $+X'FFE0'
06C3    2E5F   28 6 5F          LDA   GR7 ,C
06C4    2E5E   28 6 5E          LDE   GR7 ,C
06C5    EDEC   E8 5 EC          BST   *M11,B
06C6    00CD                    ADL   BPD
06C7    EDEF   E8 5 EF          BST   *C10,B
06C8    AC24   A8 4 24          STA   IPAT,B
06C9    2C24   28 4 24  )1500   LDA   IPAT,B
00EB*B  4001
06CA    1CEB   18 4 EB          LDG   *K'4001' ,B
06CB    0805   08 0 05          SHF   K'0005'
00EC*B  0400
06CC    44EC   40 4 EC          ADD   *K'0400' ,B
06CD    AC24   A8 4 24          STA   IPAT,B
06CE    2C48   28 4 48          LDA   *K'0001' ,B
06CF    AC47   A8 4 47          STA   I ,B
06D0    2C47   28 4 47          LDA   I ,B
06D1    4200   40 2 00          ADD   *K'0022'
06D2    AC2B   A8 4 2B          STA   BIA,B
06D3    2D2B   28 5 2B          LDA   *BIA,B
06D4    B200   B0 2 00          PJP   $+X'0000'
06D5    2C47   28 4 47          LDA   I ,B
06D6    4205   40 2 05          ADD   *K'0022'
06D7    AC2B   A8 4 2B          STA   BIA,B
00ED*B  0000
06D8    2CED   28 4 ED          LDA   *K'0000' ,B
06D9    AD2B   A8 5 2B          STA   *BIA,B
06DA    2C47   28 4 47          LDA   I ,B
06DB    4205   40 2 05          ADD   *K'0022'
06DC    AC2B   A8 4 2B          STA   BIA,B
06DD    2D2B   28 5 2B          LDA   *BIA,B
00EE*B  7FFF
06DE    4CEE   48 4 EE          SUB   *K'7FFF' ,B
06DF    BA00   B8 2 00          NJP   $+X'0000'
06E0    2C47   28 4 47          LDA   I ,B
06E1    4205   40 2 05          ADD   *K'0022'
06E2    AC2B   A8 4 2B          STA   BIA,B
06E3    2CEE   28 4 EE          LDA   *K'7FFF' ,B
06E4    AD2B   A8 5 2B          STA   *BIA,B
06E5    5447   50 4 47  )1700   INC   I ,B
06E6    2C4E   28 4 4E          LDA   *K'0002' ,B
06E7    4C47   48 4 47          SUB   I ,B
06E8    B2E7   B0 2 E7          PJP   $+X'FFE7'
06E9    EF00   E8 7 00          BST   *M1CCD ,B
06EA    000D                    ADL   NR
06EB    0023                    ADL   IPAT
06EC    0001                    ADL   IREG
06ED    0004                    ADL   MASK
06EE    EDE4   E8 5 E4          BST   *M1IN,B
06EF    000D                    ADL   NR
06F0    EDE7   E8 5 E7          BST   *EXIT,B
06F1    75EF   70 5 EF          JMP   *15,B

                                LPL
06F2    7200   70 2 00          JMP   $+X'0000'
06F3    0000                    DAT   K'0000'
06F4    0000                    DAT   K'0000'
06F5    00FF                    ADL   K'00FF'
06F6    0000                    DAT   K'0000'
0016    06FD                    ADL   K'06FD'
PROGRAM SIZE: 1700     DATA POOL SIZE: 0020     ERROR COUNT: 0001
```

APPENDIX 7

Core Dump of Locations in P2000 Computer Memory ^ includes executive monitor instruction

```
0120= 0000 018 2801 0AFE AC01 2C07 AC04 AC05
0128= 3C06 8882 AC02 2C09 AC08 2C05 6805 F201
0130= 7201 750A 2C04 4243 AC0B 2C0C AD0B 2A40
0138= AC0D 2C08 AC0E 1C0E EDF1 800D F205 2C04
0140= 4236 AC0B 2C0F AD0B 7510 2C04 4232 AC0B
0148= 2C0C AD0B 2A2D AC0D 2C08 AC0E 1C0E EDF1
0150= 800D F205 2C04 4225 AC0B 2C0F AD0B 6404
0158= 6408 2C11 4C08 B2D1 6406 EF1C 0005 0163
0160= 0165 016B 016D 0006 8833 72C4 2C07 AC04
0168= 2C12 AC05 8834 72BE 8885 72BC 2C0F 120B
```

```
0170= AE26 EDE4 0003 0C01 E401 7205 117F 0133
0178= 40BD 10D6 1350 0000 0000 0000 0000 0000
0180= 0000 0000 0000 0000 0009 0000 0000 0000
0188= 0001 0000 0000 0144 0000 0000 0000 0000
0190= FFFF 0156 000D 0002 0000 0000 0000 0000
0198= 88A1 AA1D 5A25 F201 72FB 2A20 AA20 2A1D
01A0= AA1D 2A1A AA1A 2A17 AA17 2A11 4B1A AA13
01A8= 4213 4213 4213 4213 AB15 2A09 AB12 2A08
01B0= 4212 5A12 AA05 8823 6310 71DF 0000 0000
01B8= 0000 0000 0000 0000 0000 0000 0000 2000
01C0= 11C1 11BF 0E10 1FFF 11B4 0000 0000 88A2
01C8= AA13 5A14 F201 72FB 2A0F 4A0F B201 420E
01D0= AB0E 2A09 8820 2A08 AA08 2D0A 4A03 AB08
01D8= 71DF 02D0 22D1 0000 0000 2000 11C0 11C1

!!HD,120-1DF

0018= A688 281C A91D 711E 0020 0327 2F82 0000
0020= 0030 0AFF 1207 6610 EDE4 0001 71DF EDE7
0028= 7201 11AA 0000 0000 0000 0000 0000 0000
0030= 0000 000F 0000 0000 0000 0000 0000 0000
 ..
0040= 007E 0AFF 1231 2E1A F201 7508 122D 2E1B
0048= F201 7509 2C0A 1228 AE18 AE19 1226 3E11
0050= 750B 2C0A 1221 AE1A 1220 2E05 421F AC0D
0058= 2D0D AC0C 750E 2C0A 1217 AE1B 2C10 240F
0060= EDEB 8011 F201 750B 1210 3E03 2E05 420F
0068= AC0D 2D0D AC0C EF0C 0006 0005 0007 000C
0070= 71DF EDE7 7205 13C0 11AA 007E 0080 07F6
0078= 0000 0000 0000 0000 0000 0000 0000 0001
0080= 0002 0010 0020 0000 0001 000D 0050 005A
0088= 0000 006F 0000 0000 006A 0000 0000 1316
0090= 0000 0000 0000 0000 0000 0000 0000 0000
0098= 0000 0000 0000 0000 0000 0000 0000 0000
0E80= 0000 0000 0000 0000 0000 0000 0000 0000
 ..
0E90= 0000 0000 0EB2 0AFF 1216 6E30 2E30 F201
0E98= B201 7502 1210 662F 2E2F 420E AC03 2D03
0EA0= AC01 2C01 8810 7504 2C05 1205 AE31 71DF
0EA8= EDE7 7202 0ECE 0ECD 0000 0000 0000 0000
0EB0= 0000 0000 0000 0000 0EA3 0000 0EA6 FFFF
0EB8= 0000 0000 003A 003B 0006 0095 0005 0003
0EC0= 0082 0096 0097 0098 0000 0000 0000 0000
 ..
0EF8= 0000 0000 0000 0000 0000 0000 0000 0000
1168= 0008 0000 117B 0AFF EF08 0004 0001 0002
1170= 0003 71DF EDE7 7201 07F6 0000 0000 0000
1178= 0000 0000 0000 0000 0000 001A 07FF 4001
1180= 0000 0000 0000 0000 0000 0000 0000 0000
 ..
1480= 1492 0AFF 8880 5C01 1207 AE00 EDE4 0002
1488= 71DF EDE7 7201 11AA 0000 0000 0000 0000
1490= 0000 0000 0000 003F 000C 0000 0000 0000
 ..
14A0= 14B1 0AFF EF08 0007 0001 0003 0005 71DF
14A8= EDE7 7201 07F6 0000 0000 0000 0000 0000
14B0= 0000 0000 0000 0000 0019 001A 07FF 07FF
14B8= 4002 0000 0000 0000 0000 14C6 0000 0000
14C0= 0000 0000 0000 0000 0000 0000 1577 0AFF
14C8= 1253 2E04 F201 750D 124F 2E18 A803 50A0
14D0= 5E19 5003 F202 1249 6611 1248 2E1B F202
14D8= 1244 660E 1243 2E1C F202 123F 660F 123E
14E0= 2E26 F202 EDE4 0007 2C0F AC0E 0000 AC10
14E8= 4236 AC11 2C10 4233 AC12 2D12 6005 AD11
14F0= 2C10 422D AC13 2C10 422B AC14 2D13 4D14
14F8= B201 7515 2C0E 4223 AC10 2C16 AD10 EF21
1500= 0005 1505 1510 1529 1563 000E EDE4 0009
1508= 2C0F 1213 AE18 2E07 5417 F202 EDE4 0006
1510= 7515 120B 2E18 F201 7201 7518 1206 661B
1518= 2E1B 4C08 7206 13C0 11AA 1350 11C7 1577
1520= 10D6 BA03 2C0F 12F9 AE1B EDE4 0008 EDE4
1528= 0002 7515 EDE4 0001 1243 2E85 2684 EDEF
1530= AC19 12EB 2E10 4C19 B201 751A 2C1C 241B
1538= 1237 AE89 A688 2C1D 12E1 AE2F 2C1F 241E
1540= EDEB 8020 F203 2C21 12D9 AE2F 12D7 2E2F
1548= 5630 5417 F201 7522 12D1 2E30 F201 7523
1550= 2C0A 121F AE00 7524 2C0B AD25 2C21 12C6
1558= AE26 2C16 12C2 AE10 12C1 2E2F 5417 F201
1560= 7515 EDE4 000C 7515 EDE4 0005 640E 2C26
1568= 4C0E B302 7201 14E5 EDE7 7527 7202 1210
1570= 0327 0000 0000 0000 0000 0000 0000 0000
1578= 000A 0005 000A 0032 0003 0008 0009 000B
1580= 000D 0CCD 0020 000F 156B 0000 0001 0000
1588= 0000 0000 0000 0000 1565 0000 FFFF 1524
1590= 0000 153A 4180 0000 0000 0000 0000 1298
1598= FFFF 1558 1553 1555 0327 0004 14C7 14C7
15A0= 15A9 0000 0000 0000 0000 0000 0000 0000
15A8= 0000 1673 0AFF 2C25 AC27 125F 2E01 4C28
15B0= F202 3805 F201 28A0 AC29 2C27 4C2A F202
15B8= 3805 F201 28A0 5C29 F201 752B 124E 2E01
15C0= 4C2C F202 3805 F201 28A0 AC29 2C27 4C2C
15C8= F202 3805 F201 28A0 AC2D 2C27 4C2E F202
15D0= 3805 F201 28A0 AC2F 2C27 4C28 F202 3805
15D8= F201 28A0 A803 50A0 5C2F 5003 A803 50A0
15E0= 5C2D 5003 5C29 F201 7530 2C27 4227 AC31
15E8= 2D31 F201 7532 2C27 4222 AC31 2D31 5433
15F0= F201 752B 2C27 421A AC31 2C35 AD31 2C26
15F8= AC34 7536 2C27 4212 AC31 2C37 AD31 3C34
1600= 2C27 AC31 420D AC3A 2D3A AC38 2C31 4209
1608= AC3B 2D3B AC39 7205 11AA 13A0 139F 1673
1610= 167D EF56 0025 0034 0038 0039 2C27 4C28
1618= BA01 7530 2C27 AC31 42F2 AC3A 2C31 4249
1620= AC3B 2D3B 553A 5433 F201 7530 2C27 42E7
1628= AC31 2D31 F201 753C 2C27 423B AC31 2C37
1630= AD31 3C34 753D 2C27 4234 AC31 2C35 AD31
1638= 2C26 AC34 2C27 AC31 422D AC3A 2D3A AC38
1640= 2C31 4229 AC3B 2D3B AC39 EF22 0025 0034
1648= 0038 0039 2C27 4C3E BA01 7530 2C27 AC31
1650= 421B AC3A 2D3A AC38 2C31 4217 AC3B 2D3B
1658= AC39 EF0E 0025 0034 0038 0039 6427 2C3F
1660= 4C27 B302 7201 15AC EDE7 7540 7206 07F6
1668= 13B3 1687 168F 168C 1694 0000 0000 0000
1670= 0000 0000 0000 0000 000A 000A 000B 0009
1678= 000A 000B 000B 000B 000B 000B 1000 2000
1680= 0020 0010 0040 0002 0004 0008 0001 0001
1688= 0003 0003 0003 0005 0007 0005 0005 0005
1690= 0080 0100 0800 0040 0080 0200 0400 0800
1698= 0001 FFFF 0000 0006 0000 0003 1615 0008
16A0= 0000 0007 0000 165D 0000 15F9 FFFF 0000
16A8= FFFF 15FF 0000 0000 0000 0000 0000 1632
16B0= 1639 0004 000A 15AA 0000 0000 0000 0000
 ..
16D0= 16D9 0000 0000 0000 0000 0000 0000 0000
16D8= 0000 1854 0AFF 125B 2E18 F201 752C EF58
16E0= 0015 0002 001B 802D 2C2F AC2E 2C2E 4C30
16E8= F202 BA01 7531 2C2E 424C AC34 2D34 EDEE
16F0= AC33 A432 2C2E 4005 AC35 4244 AC36 2C35
16F8= 4242 AC37 2C35 4240 AC38 3804 3805 C537
1

7

 00= EDEC 0032 EDEB 8038 1C36 A103 6003 A903
170

!HD,16F!HD,16F8-2FFF

16F8= 4242 AC37 2C35 4240 AC38 3804 3805 C537
1700= EDEC 0032 EDEB 8038 1C36 A103 6003 A903
1708= 2C2E 4C39 B201 753A 2C2E 4005 AC34 422A
1710= AC35 2C34 4227 AC36 3804 3805 C536 BA02
1718= 3805 F201 28A0 AC3B 3804 3805 C535 EDEB
1720= 803C B202 3805 F201 28A0 A803 50A0 5C3B
1728= 5003 F20A 2C2E 4005 420D AC34 2C3E 243D
1730= 1C34 A103 6003 A903 753F 7206 11AA 0578
1738= 186E 11DE 12B6 12CA 2C2E AC34 425A AC35
1740= 2C40 AD35 2C34 42F5 AC36 2D36 AC01 2A52
1748= AC37 2C41 AC38 1C38 EDF1 8037 F201 7542
1750= 2C01 4C19 BA01 7542 1246 2E13 5443 F201
1758= 7544 2C2E 4242 AC34 2D34 AC45 2C45 4005
```

```
1760= 423D AC35 2C2E 4005 AC36 42D4 AC37 3804
1768= 3805 C535 EDEC 8046 EDED 8047 EDEB 8037
1770= AC49 A448 EF29 0048 AC33 A432 2C36 4227
1778= AC4A 2C33 2432 EDEB 804A B201 7544 2C2E
1780= 4218 AC34 2C4B AD34 2C2E AC34 4212 AC35
1788= 2C34 4216 AC36 2D36 5535 F203 2C4B 120B
1790= AE26 753F 2C2E 42A5 AC34 2D34 AC01 7208
1798= 138E 1855 1350 0F0C 1869 12DE 1284 1390
17A0= 2C2E 4C4C F202 BA01 754D 2AF4 AC34 2C41
17A8= AC35 1C35 EDF1 8034 5443 F201 754E 3C01
17B0= 2C2E 4261 AC34 2C01 AD34 753F 2AE3 AC34
17B8= 2C41 AC35 1C35 EDF1 8034 F201 754F 3C01
17C0= 7550 2C01 5418 AC01 2C2E 4C4C AC45 2C2E
17C8= 4C41 F204 BA03 2C45 4451 AC45 2C45 4244
17D0= AC34 2C01 AD34 642E 2C15 4C2E B302 7201
17D8= 16E5 123B 2E20 AE26 2C40 12BD AE1A 1232
17E0= 2E02 B203 2C4B 12B7 AE1A 12B5 2E1A 5643
17E8= F203 2C4B 12B0 AE26 12AE 2E1A AE43 7552
17F0= 1221 3E18 EF23 000B 1847 17FE 1847 1820
17F8= 1826 1847 17FE 1847 1806 1826 8053 6454
1800= 2C54 4C39 B201 7552 3C54 EF11 7552 120A
1808= 6619 2E19 4C13 F20B BA0A 2C2F 1203 AE19
1810= 7206 11AA 11EE 11F9 11E0 10D6 06B0 12FA
1818= 2E19 D456 4457 AC45 2C58 AC55 2C43 AE1A
1820= 7559 2C5A AC45 2C5B 12ED AE1A 755C 2C2F
1828= AC45 2C4B AC1A 2C14 AC55 2C3E 243D EDEB
1830= 805D F201 7201 7552 2C45 AC34 4216 AC35
1838= 2C34 4214 AC36 EF10 0055 8035 8036 802D
1840= 2C1A 5443 F201 7552 EDE4 0013 2C40 AC1A
1848= EDE7 755E 7203 0578 3FFF 405E 0000 0000
1850= 0000 0000 0000 0000 0000 0000 9660 DDD0
1858= F680 F640 FD80 F780 F770 F790 F710 F700
1860= F720 F730 F740 F7A0 F7B0 F670 F670 0006
1868= 000F 0010 000E 0013 3FFF 1000 0000 0000
..
1880= 17EF 11AC 0000 0001 0005 1791 0000 0000
1888= 0000 0000 0000 0000 0000 0003 173B 0000
1890= 12A4 0000 0000 17D2 0000 000D 0000 FFFF
1898= 1783 0000 11E4 1254 0000 0000 0000 FFFF
18A0= 000B 17B5 17AF 17C0 17C3 0002 1847 11C5
18A8= 0000 0000 000A 001A 0009 182C 0015 FFFE
18B0= 182A 129A 16DA 0000 0000 0000 0000 0000
..
18C0= 10F0 1904 1800 73FD 0003 2D02 5503 5451
18C8= F201 7552 3C53 2D02 F202 2C4F AC53 2C55
18D0= AC50 2D05 AC54 2C54 AC58 4226 AC59 2D59
18D8= AC56 2C58 4222 AC5A 2D5A AC57 EF1F 004E
18E0= 0053 0056 0057 2D05 4C5B B202 3805 F201
18E8= 28A0 A803 50A0 5C50 5003 F201 7552 2D05
18F0= 445C AC54 2C5D AC50 72DE 2D02 AD03 AD04
18F8= 0C01 E401 7203 1909 192D 07F6 0000 0000
..
1908= 0000 0000 0007 000A 0009 0009 0007 0009
1910= 0009 0009 000A 000A 000A 000C 0009 0009
1918= 0005 000C 0009 0007 000A 000A 000A 0007
1920= 0007 0003 0003 0007 000A 0005 0005 0003
1928= 0003 0005 0005 0003 0003 0005 0200 0040
1930= 0004 0002 2000 0200 0400 0800 0100 0200
1938= 0400 0200 0100 0080 0001 0100 0008 0400
1940= 0008 0004 0800 0100 1000 0400 0002 0200
1948= 0040 0010 0020 0001 0204 0004 0008 0030
1950= 2008 0080 0001 FFFF 0000 FFFF 18F4 0000
1958= 0000 0000 0000 0000 0000 0000 0000 000B
1960= 0019 FFFF 197E 0000 0000 0000 0000 0000
1968= 0000 0000 0000 1000 7303 0002 001F 110A
1970= 2D1F A803 50A0 5D21 5003 5422 AC23 2D20
1978= A803 50A0 5C23 5003 5422 751E 1DCB 0AFF
1980= 2C26 1256 AE26 EF55 8027 8028 0024 0012
1988= EF50 8029 802A 0024 0013 124A 2E0B 5422
1990= 1249 5E1B 5422 F201 752B 2C26 0000 AE04
1998= 752C 1240 2E1B 5422 123B 5E0B 5422 F201
19A0= 752D 2C2F 242E 1238 AE31 A630 AE19 A618
19A8= AE01 A600 EF2E 8030 8031 0024 000E EF29
19B0= 8032 8033 0024 0014 EF24 8034 8035 0024
```

```
19B8= 0006 121E 2E1A A803 50A0 121F 5E14 5003
19C0= 1217 AE48 EF16 8036 8037 8038 0017 1215
19C8= 2E14 1214 AE30 120C 2E13 5422 5E25 A803
19D0= 50A0 1208 5E1B 5003 1203 AE02 7207 1350
19D8= 18C1 1180 13A0 12E0 13C0 41DA EFFA 8039
19E0= 803A 0024 0003 12F6 2E13 5422 12F1 AE04
19E8= 2E05 5422 5E04 5422 F201 753B 2C26 12EB
19F0= AE04 AE0E 12E5 2E04 AE05 2E08 A803 50A0
19F8= 12E4 5E0A 5003 AC01 12DD 2E1B A803 50A0
1A00= 12D7 5E04 5003 AC02 2E2B A803 50A0 5C01
1A08= 5003 5422 AC3C 2C02 5C3C 5422 AC25 1800
1A10= 751D 803D 0025 803E 12C3 AE09 EFC2 803E
1A18= 803F 803D 0015 12BC 2E09 A803 50A0 5E2B
1A20= 5003 5422 AC3C 2C02 5C3C 5422 AC25 1800
1A28= 751D 0001 0025 8040 12A3 AE0C EFAA 8040
1A30= 8041 8042 0016 2C26 12A3 AE08 AE2B 2E39
1A38= 1260 5E05 AC3C 129C 2E39 5422 AC43 129A
1A40= 2E13 5422 5C43 1294 5E2A 1297 5E00 A803
1A48= 50A0 5C3C 5003 A803 50A0 128C 5E12 5003
1A50= AC24 2E10 5422 AC25 1800 751D 0024 0025
1A58= 8044 123B AE00 2E31 5422 5E00 F205 1238
1A60= 2E55 2654 AE4D A64C EF31 8044 8045 8046
1A68= 000F 122D 2E10 5422 AC3C 1227 2E00 A803
1A70= 50A0 5C3C 5003 5422 AE01 1221 2E12 5422
1A78= 5E13 A803 50A0 1219 5E01 5003 AC24 2C3C
1A80= 5E32 A803 50A0 1213 5E12 5003 AC25 1800
1A88= 751D 0024 0025 8047 1208 AE33 EF07 8047
1A90= 8048 0024 0010 7205 1350 18C1 1180 12E0
1A98= 40DA 12FD 2E12 12F9 5E00 AE35 EFF7 8049
1AA0= 804A 0024 0011 12F3 2E12 5422 12EE 5E00
1AA8= AE4E EFEC 804B 804C 0024 0018 12E8 2E10
1AB0= 5422 12E3 5E0F 5422 F201 754D 2C2F 242E
1AB8= 12DF AE01 A600 AE19 A618 2C26 1265 AE10
1AC0= 754E 12D3 2E0F 5422 12D2 5E10 5422 F201
1AC8= 754F 12CE 2E55 2654 AE01 A600 AE19 A618
1AD0= 2C2F 242E 12C5 AE31 A630 12C1 2E05 5E10
1AD8= 5422 AC25 1800 751D 8050 0025 8051 12B5
1AE0= AE13 2E14 5422 5E13 5422 F201 7552 123D
1AE8= 2E3B 263A 12AD AE01 A600 12A7 2E1A 5422
1AF0= F20A 1233 2E45 2644 EDEC 8053 EDED 8054
1AF8= 129F AE01 A600 122A 2E0F 260E EDEC 8055
1B00= EDEC 8056 EDEC 0057 AC5A A459 2E03 2602
1B08= EDEC 805B EDEC 805C EDEC 805D EDED 0059
1B10= EDEA 8053 1285 AE01 A600 AE19 A618 755E
1B18= 1209 2E13 5422 1207 5E10 1204 5E14 5422
1B20= 7205 1350 1180 13C0 1210 13E0 F201 755F
1B28= 12FC 2E15 2614 1263 AE01 A600 AE19 A618
1B30= 2C2F 242E AE31 A630 2C60 12EC AE23 AE26
1B38= 12E9 2E13 AE14 12E7 2E10 12E4 AE0F 2E4C
1B40= 5E4D A803 50A0 12E0 5E07 5003 AC24 2C26
1B48= AC01 12D8 2E18 F201 7561 1242 2E05 2604
1B50= EDEB 8062 B202 2C60 AC01 12CC 2E18 5422
1B58= AC3C 12CA 2E07 A803 50A0 5C3C 5003 5422
1B60= A803 50A0 12C0 5E00 5003 A803 50A0 5E13
1B68= 5003 5422 AC43 12B6 2E13 5C43 5422 A803
1B70= 50A0 5E1A 5003 A803 50A0 5C01 5003 AC25
1B78= 1800 751D 0024 0025 8063 12A4 AE18 EF0E
1B80= 8063 8064 8065 0019 129E 2E04 129B AE4C
1B88= 129A 2E13 1297 AE4D 7203 18C1 12E0 11E0
1B90= EFFD 8066 8067 0024 0007 128D 2E03 5422
1B98= AC3C 1288 2E13 5C3C 5422 A803 50A0 5E1A
1BA0= 5003 A803 50A0 5E3F 5003 A803 50A0 1255
1BA8= 5E02 5003 5422 AC43 1251 2E03 5C43 5422
1BB0= AC25 1800 751D 8068 0025 8069 1245 AE21
1BB8= 2E3F AE41 2E13 5422 F201 756A 123D 2E22
1BC0= 5422 5E21 5422 F201 756B 12CA 2E01 2600
1BC8= EDEB 806C 12C4 AE19 A618 2E1D 261C EDED
1BD0= 806D AE23 A622 AE33 A632 2C2F 242E AE3F
1BD8= A63E 756E 1221 2E21 5422 5E22 5422 F201
1BE0= 756F 12AD 2E1D 261C EDEB 806C AE19 A618
1BE8= 12A6 2E19 2618 AE01 A600 120E 2E22 AC01
1BF0= EF9D 8069 8070 8068 0009 EF98 8069 0001
1BF8= 0024 001A 7203 1350 13A0 13C0 1206 2E0A
1C00= 12FB 5E07 5422 AC3C 2E13 5C3C 5422 A803
```

```
1C08= 50A0 5E1A 5003 A803 50A0 5E40 5003 A803
1C10= 50A0 12EB 5E02 5003 5422 AC43 12E7 2E01
1C18= 5C43 5422 AC25 1800 751D 8071 0025 8072
1C20= 12DB AE1D 2E13 5422 F201 7573 12D5 2E1E
1C28= 5422 5E1D 5422 F201 7574 1239 2E03 2602
1C30= AC02 A401 1233 2E27 2626 AE35 A634 2C2F
1C38= 242E AE41 A640 7575 12BF 2E1D 5422 5E1E
1C40= 5422 F201 7576 1222 2E27 2626 AC02 A401
1C48= 12B3 2E21 F201 7577 2C02 2401 EDED 8055
1C50= EDEB 806C 1213 AE19 A618 AE01 A600 EDEA
1C58= 806C AE1D A61C 7573 1209 2E19 2618 EDEA
1C60= 806C AE1B A61A 7203 1180 12E0 11E0 1263
1C68= 2E57 2656 EDEC 8078 AC5A A459 2C02 2401
1C70= EDED 0059 12F3 AE33 A632 2E1B 261A EDEC
1C78= 8079 AE1D A61C EF4C 8072 807A 8071 0008
1C80= EF47 807B 807C 0024 0005 1800 751D 807D
1C88= 807E 807F 123C AE23 2E24 AC01 EF39 807F
1C90= 8080 807D 000A EF34 807F 0001 0024 001B
1C98= EF2F 8081 8082 0024 001C 2C26 AC02 1227
1CA0= 2E39 1228 5E03 AC3C 1222 2E39 5422 1221
1CA8= 5E15 A803 50A0 5C3C 5003 AC01 1218 2E2F
1CB0= 5422 AC43 2E13 5422 5C43 12AF 5E08 120F
1CB8= 5E00 5E04 5C01 AC24 5422 AC25 1800 751D
1CC0= 0024 0025 8083 1203 AE06 7205 1350 18C1
1CC8= 13C0 40DA 1210 2E2C 5422 5E06 F202 2C60
1CD0= AC02 EFF6 8083 8084 8085 0003 12F0 2E11
1CD8= 5422 128B 5E06 12EB 5E06 AC01 F203 2C60
1CE0= 12E6 AE3D 1282 2E06 12E2 AE11 2E12 5422
1CE8= 1261 5E07 12DC 5E06 AC01 F203 2C60 12D7
1CF0= AE3E 1258 2E07 12D3 AE12 2E2F 5422 1252
1CF8= 5E0D 12CD 5E04 5E13 12CC 5E16 AC24 5422
1D00= AC25 1800 751D 0024 0025 8086 12C0 AE07
1D08= 2E2D 5422 5E07 F202 2C60 AC02 EFB9 8086
1D10= 8087 8088 000C 12B3 2E1F 5422 1233 5E0B
1D18= 12AE 5E07 AC24 122E 2E0B 5422 12A8 5E07
1D20= 5E1F AC25 1800 751D 0024 0025 8089 129F
1D28= AE1B 2C25 F203 2C60 129A AE3B 121B 2E0B
1D30= 1296 AE1F 2E20 5422 1215 5E0C 1290 5E07
1D38= AC24 1210 2E0C 5422 128A 5E07 5E20 AC25
1D40= 1800 751D 0024 0025 808A 1203 AE1C 7202
1D48= 1350 1180 2C25 F203 2C60 12FB AE3C 12FA
1D50= 2E0C 12F7 AE20 125F 2E14 5422 AC3C 12F1
1D58= 2E13 5422 5C3C 5E04 1256 5E10 AC24 1255
1D60= 2E04 5422 AC43 2C24 5C43 5422 AC25 1800
1D68= 751D 0024 0025 808B 12DC AE39 2E3A 5422
1D70= 5E39 F202 2C60 AC02 12D4 2E39 5422 5E3A
1D78= 5422 F201 758C 2C26 1238 AE02 AE31 AE33
1D80= 1232 AE15 122F 2E19 2618 EDEB 808D F201
1D88= 28A0 12C0 5E10 F203 2C60 12BB AE08 2C60
1D90= 12B8 AE26 1222 2E1F 5422 F203 2C60 121C
1D98= AE2E EF17 808B 808E 808F 000D 2C02 5422
1DA0= F201 7590 120F 2E19 2618 AE01 A600 2C60
1DA8= 12A0 AE2B AE26 129D 2E39 5422 AC3C 7205
1DB0= 18C1 12E0 13C0 41DA 40DA 2E07 5422 AC43
1DB8= 2E06 5422 5C43 5C3C 5E04 AE2E EFF2 8091
1DC0= 8092 0024 0004 EDE7 7593 0000 0000 0000
1DC8= 0000 0000 0000 0000 0000 0000 0001 0002
1DD0= 0003 0004 0005 0006 0007 0008 0009 000A
1DD8= 000B 000C 000D 000E 000F 0010 0011 0012
1DE0= 0013 0014 0015 0016 0017 0018 0019 0024
1DE8= 196A 0000 0000 0000 0000 FFFF 0000 0000
1DF0= 0000 0000 1199 1365 1195 1377 1998 19A9
1DF8= 19AE 0000 0000 119B 135B 1396 1397 1394
1E00= 1395 1398 1399 13D4 1352 1353 19F1 0000
1E08= 13CB 1359 135A 135C 135D 13CA 0000 1350
1E10= 1381 13C0 1383 1384 1385 1386 139E 139F
1E18= 1AC0 1ACF 1AD4 1185 1363 1B17 12E0 11E4
1E20= 1266 1270 47C8 0000 0000 0000 1268 126E
1E28= 130E 1B33 1B37 FFFF 1B54 123E 1368 1369
1E30= 13C7 139A 139B 13C3 1371 1BEC 1BD9 1300
1E38= 11E0 1BE7 1BFD 1372 13C1 136D 1C7A 1C3B
1E40= 1C47 1C7F 1C5B 12FA 1312 136E 1390 1392
1E48= 13C5 1375 1373 1374 137F 1380 1356 137C
1E50= 13D5 1357 137D 13D6 136B 136C 1389 1D98
```

```
1E58= 12F4 138A 13D0 1DAA 137E 1387 197F 0000
1E60= 1E69 0000 0000 0000 0000 0000 0000 0000
1E68= 0000 2108 0AFF 2C49 4257 AC50 1256 2E01
1E70= 4255 AC51 2D51 AD50 2E04 4C52 F201 7553
1E78= 124C 2E01 4C54 B201 7555 2C0D AC56 7557
1E80= 1244 2E08 4C52 F201 7558 123F 2E01 4C0D
1E88= F201 7559 123C 2E13 F201 7555 2C49 4234
1E90= AC50 2C0E AD50 7555 1230 2E01 4C54 B201
1E98= 7555 122B 2E01 4C10 F201 7201 755A 1225
1EA0= 2E09 5452 F201 755A 1220 2E0D F201 755B
1EA8= 121C 2E0C AE08 7555 2C48 AC56 2C48 AC5C
1EB0= 755D EF16 0009 1EBB 1F07 1F13 1F13 1F13
1EB8= 1F13 1F48 1FAD 805E 120C 2E19 2618 EDEF
1EC0= 1204 AE06 7206 210D 11AA 2141 1350 10D6
1EC8= 12E0 12FD 2E13 F201 755F 2C49 42F5 AC50
1ED0= 2C0E AD50 7560 12F3 2E09 A803 50A0 5E0C
1ED8= 5003 5452 F201 7560 12EC 2E19 2618 EDEB
1EE0= 8061 AC12 A411 B201 7560 2C12 2411 EDEF
1EE8= AC11 4C0D BA01 7560 12D8 6606 2C0D AC5C
1EF0= 7562 12D5 2E39 F201 7563 12D3 2E01 2600
1EF8= EDEF 12CB AE06 7564 12CC 2E47 2646 EDEF
1F00= 12C4 AE06 645C 7565 2C0E AC5C AC56 755D
1F08= 12BE 2E39 5452 F201 7566 12BB 2E45 2644
1F10= EDEF 12B3 AE06 7567 12B0 2E01 4005 425B
1F18= AC50 3804 3805 C550 EDEF AE06 2C0F AC5C
1F20= 2C48 AC56 755D 12A1 2E01 4C68 F201 72DC
1F28= 129E 2E13 F201 7569 129A 2E00 F201 756A
1F30= 1298 2E2D 262C EDEF 1290 AE06 7555 123C
1F38= 2E5F 265E EDEC 806B EDED 006C EDEF 1285
1F40= AE06 7555 1286 2E57 2656 EDEF 122A AE06
1F48= 7555 1227 2E04 4C49 BA01 756E 1222 2E05
1F50= 4224 AC50 2D50 AE06 EF1D 0005 1F5A 1F61
1F58= 1F7E 1F7E 806F 1215 2E06 F203 2C0D 1211
1F60= AE06 7555 120E 2E06 BA01 7570 120A 2E06
1F68= 5452 6005 AE06 2C49 4203 AC50 7206 210D
1F70= 11AA 10D6 12DE 1210 117F 2C4A AD50 12F9
1F78= 2E06 4C71 BA03 2C71 12F4 AE06 7555 12F1
1F80= 2E05 4005 425E AC50 3804 3805 C550 AC12
1F88= A411 7572 12E6 2E05 4255 AC50 2D50 AE06
1F90= 2E04 4C0F AC73 2C49 42DB AC51 2C73 424B
1F98= AC74 2D74 AD51 EFD6 0006 1F5A 1F61 1FA2
1FA0= 1FA2 1FA2 0073 12CD 2E05 4005 423D AC50
1FA8= 3804 3805 C550 AC12 A411 7572 1236 2E12
1FB0= 5452 F201 7575 12BD 2E03 F201 7201 7576
1FB8= 12B8 2E03 AE06 2C49 AC5C 7562 12B2 2E05
1FC0= 440F AC73 7577 12AD 2E05 AC73 2C73 421E
1FC8= AC50 2D50 EDEE AC12 A411 EDFD 0078 AC12
1FD0= A411 2C49 429D AC51 2C48 AD51 2C12 2411
1FD8= BA01 757A 2C12 2411 EDF0 AC12 A411 7206
1FE0= 117E 3FFF 2149 3FFE 13C0 11F9 2C49 4238
1FE8= AC50 2C4A AD50 2C12 2411 EDEB 007B BA04
1FF0= 2C7C 247B AC12 A411 2C0D AC5C 2C5C 4005
1FF8= 4261 AC50 2C12 2411 EDEB 8050 B201 757D
2000= 645C 2C0F 4C5C B2F2 2C7E 4C5C 1252 AE08
2008= 2E08 4005 4250 AC50 3804 3805 C550 EDEC
2010= 0011 EDEA 007F EDEF AE06 2C0E AC5C 2C0F
2018= AC56 2C56 4C48 BA01 7581 2C01 123A AE06
2020= 7582 2C56 4C0E AC56 2C33 AC11 2C0D AC73
2028= 2C49 4C73 AC84 2C84 AC50 422A AC51 1229
2030= 2E06 3804 2805 B201 6804 DC11 AD51 2C50
2038= 421F AC74 2D74 D411 AC85 2E06 4C85 AE06
2040= 2C11 3304 2805 B201 6804 DC4A AC11 6473
2048= 2C0F 4C73 B2DD 2C01 AC0B AC0C 2C01 AC84
2050= 2C0D AC73 2C73 AC50 4207 AC51 7205 210D
2058= 11AA 2119 211B 2108 2D51 4484 AC86 2C50
2060= 425E AC74 2D74 AC87 2C87 425A AC85 2C86
2068= AC88 2C50 42ED AC89 2C84 AC8A 1C8A EDF1
2070= 8089 1C88 EDF2 8085 6473 2C49 4C73 B2DA
2078= 6484 2C48 4C84 B2D4 2C8B AC11 2C0D AC73
2080= 2C0E 4C56 F201 7201 758C 2C73 AC50 4238
2088= AC51 2C50 4236 AC74 2D74 4D51 F202 2C8D
2090= AC11 2C73 AC50 422D AC51 2C50 4229 AC74
2098= 2D74 AD51 758E 2C73 AC50 4222 AC51 2C50
20A0= 4221 AC74 2D74 4D51 F202 2C8D AC11 2C73
```

```
20A8= AC50 4218 AC51 2C50 4213 AC74 2D74 AD51
20B0= 6473 2C0E 4C73 B2CC 2C11 5452 F201 758F
20B8= EF0A 000E 000B 002D 0038 7205 2136 2112
20C0= 2153 2155 07F6 2C0E 4C56 F201 7201 7590
20C8= EFFA 000F 0034 001D 0021 758F 2C01 AC11
20D0= 1288 2E08 F201 B201 7591 1283 2E08 422A
20D8= AC50 2D50 AC11 EFE7 000D 0011 000D 0047
20E0= EFE2 000F 0034 0025 0029 2C01 AC11 2C49
20E8= 4217 AC50 2D50 4C4A BA02 2C4B AC11 EFD3
20F0= 000D 0011 000D 004B EF0C 0006 1EF0 20FB
20F8= 1F03 1F22 1FDD 005C EDE7 7592 7203 210D
2100= 10D6 2114 0000 0000 0000 0000 0000 0000
2108= 0000 0000 0004 0008 0000 0004 0000 0000
2110= 0000 0000 0000 0000 0000 0001 0002 0004
2118= 0008 0000 0000 4180 0000 44A0 0000 47C8
2120= 0000 4AFA 0000 4E9C 4000 000E 000E 000E
2128= 000E 2000 2000 1000 1000 0001 0001 0001
2130= 0001 0020 0020 0010 0010 000E 000F 0001
2138= 0001 0001 0002 0002 3FFF 0000 3FFF 0000
2140= 0FFF 00FF 0001 0004 0005 0001 0001 0003
2148= 0006 0000 0006 0006 0008 0009 0006 000F
2150= 0003 0005 000A 0040 0000 0000 0000 0000
2158= 0000 0000 FFFF 1E7F 0007 2014 0000 1EAD
2160= 1EB0 1E93 1EAB 1F03 0000 2018 11AB 1ED2
2168= 1EED 12E0 1F1F 1EFB 1F01 2016 1F13 1F1D
2170= 0006 1F41 1F36 130E 45A3 C28E 1F89 11AE
2178= 1F76 270F 1FD5 0000 0000 1FC2 1FBD 1FC5
2180= 46A3 D70A 1FEA 4E9C 3C00 2003 0005 3783
2188= 126E 2020 2023 03E8 0000 0000 0000 0000
2190= 0000 0000 0000 0000 209A FFFF 20AF 20F3
2198= 20CD 20DA 1E6A 0000 0000 0000 0000 0000
 ..
21B0= 21B9 0000 0000 0000 0000 0000 0000 0000
21B8= 0000 2606 0AFF 125F 2E01 AC3E 2E00 4C44
21C0= F202 2C45 AC3D EF58 0037 21FC 2200 2205
21C8= 220A 220E 25FA 2213 2229 222D 222D 2253
21D0= 2257 225B 2261 2273 2277 227B 2283 25FA
21D8= 25FA 25FA 228C 2293 22A3 22B7 22D4 25FA
21E0= 22D8 22D8 22D8 25FA 25FA 22DD 22DD 22DD
21E8= 22DD 22DD 22DD 22E2 22F0 22F2 23B5 23C3
21F0= 23CB 25FA 25FA 2517 25FA 2520 2529 2532
21F8= 2532 2569 2572 8046 7547 2C48 121E AE00
2200= 7549 121B 2E01 544A AE01 7549 1216 2E03
2208= 544A AE03 7549 2C48 1210 AE05 7549 120D
2210= 2E07 544A AE07 7549 1208 2E04 544A F201
2218= 7547 7203 11AA 10D6 13C0 2C45 12FE AE04
2220= EF60 0021 0020 002A 0021 2C48 12F6 AE05
2228= 1259 AE26 2C21 12EF AE01 754B 1254 2E1B
2230= 544A 5E13 A803 50A0 124D 5E06 5003 A803
2238= 50A0 5E07 5003 A803 50A0 5E39 5003 F201
2240= 7547 12D9 2E00 4C2A F201 7201 754C 2C48
2248= 12D4 AE0A 7549 2C48 12D0 AE03 2C45 AE0A
2250= 2C48 1230 AE26 7547 2C22 12C5 AE01 754B
2258= 2C23 12C1 AE01 754B 2C45 12BF AE15 AE16
2260= AE10 72EE 12BA 2E13 544A AE13 F201 754D
2268= EF18 0023 0030 0036 0039 7547 EF12 0023
2270= 0033 0036 0039 7547 2C48 12A7 AE15 72D8
2278= 2C48 12A3 AE16 72D4 2C48 129F AE10 7203
2280= 07F6 1350 1180 72CC 12FD 2E39 F201 7547
2288= 1294 2E14 544A AE14 72C3 2C48 128E AE0D
2290= 2C28 1289 AE01 754B 1288 2E0D 544A F201
2298= 7547 2C48 1282 AE0F 2C45 AE0E EFE2 0021
22A0= 0024 002B 002C 754E 1262 2E0D 544A A803
22A8= 50A0 5E12 5003 F201 7547 2C48 1258 AE0E
22B0= 2C45 AE0F EFCE 0021 0028 002B 002C 754E
22B8= 12CA 2E13 F201 7547 2C48 1249 AE12 EFC1
22C0= 0021 0006 002B 001B 1241 2E03 F201 7201
22C8= 72C4 2C48 123C AE0F EFB4 0021 0024 002B
22D0= 002C 1234 2E03 AE05 7288 2C26 122F AE01
22D8= 754B 122C 2E00 4C50 AC4F 7551 1227 2E00
22E0= 4C52 AC4F 7551 1222 2E09 544A A803 50A0
22E8= 5C3C 5003 F201 7553 2C48 AC3C 1217 3E0C
22F0= 7547 3C4F 7551 1212 2E01 4C27 F202 3805
22F8= F201 28A0 5E09 AC54 2E01 4C27 F201 28A0
```

```
2300= A803 50A0 5C54 5003 7202 11AA 13C0 F201
2308= 7553 2C48 12FB AE09 EF65 0021 0006 002C
2310= 001B 12F4 2E0D F201 7555 2C57 AC56 7558
2318= 2C4A 12EC AE08 3E04 7559 1257 2E08 F201
2320= 7547 12E4 2E01 4C22 F202 3805 F201 28A0
2328= 124A 5E39 F201 7553 12D9 2E01 4C26 F201
2330= 7201 7553 12D3 2E03 F201 28A0 12D0 5E12
2338= F201 7553 1239 2E10 544A A803 50A0 5E13
2340= 5003 544A AC54 2E1B A803 50A0 5C54 5003
2348= 544A A803 50A0 1227 5E06 5003 A803 50A0
2350= 5E07 5003 A803 50A0 5E09 5003 A803 50A0
2358= 5E39 5003 AC5A 12AA 2E01 4C21 F202 3805
2360= F201 28A0 5C5A F201 7553 2C48 129F AE07
2368= 2C4F 4C29 BA03 F202 3805 F201 28A0 AC54
2370= 7204 07F6 1350 1180 13A0 2C4F B202 3805
2378= F201 28A0 5C54 544A F201 7553 2C5B F201
2380= 7201 755C 2C5D AC3E 2C5B 4C3E 6005 AC5E
2388= 2C5E AC5F 4260 AC60 2C5F 425E AC61 2D61
2390= AD60 643E 2C5B 4C3E B2EF 2C4F AC3F 2C5B
2398= 4C23 B201 645B 2C3C 544A F201 7562 124A
23A0= 660C 2E0C 4C24 F201 B201 7562 1243 3E0C
23A8= 2C45 AC3C 2C64 AC56 2C4A 123C AE08 3E04
23B0= 6463 7558 2C48 12C1 AE08 7565 2C45 12BD
23B8= AE08 EFB8 0021 0005 002C 001B 2C45 122A
23C0= AE09 AC3C 3E0C 7566 2C27 1224 AE01 2C45
23C8= AE0D AE09 AC3C 754B 12A6 2E06 A803 50A0
23D0= 5E07 5003 A803 50A0 5E39 5003 A803 50A0
23D8= 129C 5E08 5003 AC54 120D 2E01 4C21 F202
23E0= 3805 F201 28A0 5C54 A803 50A0 5C3D 5003
23E8= 7203 11AA 2645 2644 F201 72C4 2C48 AC3D
23F0= 2C5D AC56 2C68 AC67 12F5 3E06 2C21 AC3E
23F8= 2C25 4C3E AC5E 2C5E 42EF AC5F 2D5F D467
2400= 12E9 4606 AE06 2C67 3804 2805 B201 6804
2408= DC2A AC67 643E 2C24 4C3E B2EA 2C45 12DA
2410= AE0D EF5F 0004 2416 25E4 2424 0056 12D2
2418= 2E06 EDEE AC6A A469 2E01 4C27 F202 3805
2420= F201 28A0 5E09 F201 756B EF4B 0009 242F
2428= 2439 2439 23B1 23B1 23B1 2480 2496 806C
2430= 1241 2E13 F201 756D 123E 2E17 2616 AC6F
2438= A46E 7570 2C72 2471 EDEB 0069 F201 7201
2440= 7553 12A8 2E01 4005 422F AC5F 3804 3805
2448= C55F AC6F A46E 2C6A 2469 EDEB 006E F202
2450= BA01 7553 1297 2E01 4005 421F AC5F 2C6A
2458= 2469 1C5F A103 6003 A903 2E01 4C21 F202
2460= BA01 7573 1213 2E19 2618 EDEF AC5E 2E01
2468= 2600 EDEF AC56 4C5E F201 7201 7574 7206
2470= 10D6 1350 1210 120E 12DE 12E0 2C48 12FA
2478= AE08 7575 2C48 12F6 AE2B 2C48 12F3 AE26
2480= 7573 1261 2E06 3804 2805 B201 6804 DC68
2488= AE04 D468 AC5F 2E06 4C5F AE05 2C48 AE0D
2490= 2E04 AC76 2E09 544A F201 7577 7578 124C
2498= 2E0E A803 50A0 5E0F 5003 544A F201 7553
24A0= 1242 2E06 4C22 F204 B202 3805 F201 28A0
24A8= AC54 2E06 BA03 F202 3805 F201 28A0 A803
24B0= 50A0 5C54 5003 F201 7553 122E 2E0F F201
24B8= 7579 1229 2E06 4424 AE06 1225 2E06 AE05
24C0= 7573 2C76 4C57 F201 28A0 AC54 121C 2E05
24C8= 4C7A B202 3805 F201 28A0 AC5A 2E05 4C7B
24D0= BA02 3805 F201 28A0 A803 50A0 5C5A 5003
24D8= 544A AC7C 120A 2E1B A803 50A0 5C7C 5003
24E0= AC7D 7203 11AA 13C0 1180 2C54 544A AC7E
24E8= 2C7D 5C7E 544A F201 7553 2C82 2481 AC80
24F0= A47F 12F1 2E0C F201 7201 7583 12EC 6E0C
24F8= 2C80 247F EDEC 0084 AC80 A47F 72F2 12E3
2500= 2E05 4005 425D AC5F 2C6A 2469 EDED 007F
2508= 1C5F A103 6003 A903 EF52 0021 0005 002C
2510= 001B 2C45 12D0 AE09 AC3C 2C48 AE0D 7578
2518= 1248 2E01 544A F201 7547 2C48 1242 AE02
2520= 7547 123F 2E30 544A F201 7547 2C48 1239
2528= AE31 7547 1236 2E32 544A F201 7547 2C48
2530= 1230 AE33 7547 12AF 2E05 4C22 BA03 F202
2538= 3805 F201 28A0 AC54 2E05 F204 B202 3805
2540= F201 28A0 5C54 12A0 5E0F 5E12 544A F201
2548= 7547 1299 2E00 4C86 F201 7201 7587 2C48
```

```
2550= 1293 AE1A 1290 2E05 420D AC5F 2D5F AC88
2558= EF06 0021 0006 002D 0088 7204 07F6 117E
2560= 40DA 2633 1257 2E05 AE03 7547 2C48 1253
2568= AE1B 7547 124F 2E01 4C26 F201 7547 2C48
2570= 124A AE18 7547 1246 2E01 4C26 F201 7547
2578= 2C48 1241 AE19 7547 2C3E AC89 2C89 AC5F
2580= 423B AC60 2D60 AC01 2C5F 4237 AC61 2D61
2588= AC03 1230 2E01 AC8A 422F AC8B 2D8B AC02
2590= 2C8A 422B AC8C 2D8C AC04 EFC9 0022 0005
2598= 0003 0001 2C28 4C89 F201 7566 121B 2E01
25A0= 4C28 F201 7201 758D 2C45 1215 AE0D AE12
25A8= EFB6 0021 0005 002B 001B 120C 2E03 F201
25B0= 28A0 1209 5E12 F201 7573 2C45 1204 AE0F
25B8= 7204 11AA 13C0 2616 260C AE0E EFA0 0021
25C0= 0005 002B 002C EF3B 0009 25DC 25DC 25DC
25C8= 25DC 25DC 25DC 25D5 25CD 806C 12EB 2E03
25D0= F201 28A0 12E8 5E12 F201 7573 2C4A 12E2
25D8= AE04 AE08 2C48 AE07 7559 12DC 3E04 12DA
25E0= 3E08 2C45 AE07 2C5D AC63 EDE5 0028 EDE6
25E8= 0028 EDE4 0028 2C63 6805 F201 7547 3C5B
25F0= 2C21 AC5E 2C5E 420C AC5F 2C8E AD5F 645E
25F8= 2C25 4C5E B2F7 EDE7 758F 7202 10D6 2644
2600= 0000 0000 0000 0000 0000 0000 0000 0000
2608= 0000 0000 0000 0000 FFFF 000A 000A 000A
2610= 000A 000A 000B 000C 000B 0000 0000 0002
2618= 0010 0020 1000 2000 0020 0040 0002 0000
2620= 0000 0010 0080 0100 0400 0800 0000 0001
2628= 0002 0003 0004 0005 0006 0007 0008 0009
2630= 000A 000B 000C 000D 0010 0020 0000 0000
2638= 0000 FFFF FFFF FFFF 000A 0005 0004 0080
2640= 0002 0004 0000 0000 0000 0000 0000 0000
2648= 0000 0000 002C 0000 11AA 25FA FFFF 224F
2650= FFFF 257B 224A 226D 25D5 0000 001B 231C
2658= 001D 23B1 0000 2317 0000 0003 23F1 25E2
2660= 0000 0000 2394 0001 0000 0000 0000 0000
2668= 23A9 0000 0002 23BD 25C2 0000 03E8 0000
2670= 0000 24C0 11AB 2440 0000 0000 244A 0000
2678= 0000 25DC 2479 247C 0000 25DE 25EE 24BC
2680= 0181 0161 0000 0000 0000 0000 0000 4180
2688= 0000 24FE 44A0 0000 0034 2565 0000 0000
2690= 0000 0000 0000 25AC 0000 21BA 0000 0000
 ..
26B0= 10F0 271A 1800 73FD 0007 3804 3805 C505
26B8= EDEC 000A AC0D A40C 3804 3805 C502 EDEA
26C0= 8003 EDED 000C EDEA 8008 1C08 A103 6003
26C8= A903 3804 3805 C502 1C03 A103 6003 A903
26D0= 3804 3805 C508 EDEB 8007 BA01 750E 3804
26D8= 3805 C507 1C08 A103 6003 A903 750F 3804
26E0= 3805 C508 EDEB 8006 B201 750F 3804 3805
26E8= C506 1C08 A103 6003 A903 3804 3805 C502
26F0= EDEC 8004 EDEA 8008 1C09 A103 6003 A903
26F8= EDEB 8007 BA01 7510 3804 3805 C507 1C09
2700= A103 6003 A903 7511 3804 3805 C509 EDED
2708= 8006 B201 7511 3804 3805 C505 1C09 A103
2710= 6003 A903 0C01 E401 0000 0000 0000 0000
 ..
2720= 0000 0000 0000 0000 4280 0000 0000 0000
2728= 26DE 26EC 2703 2711 0000 0000 0000 0000
2730= 274F 0000 0000 0000 0000 0000 0000 0000
2738= 0000 1000 7303 0002 0015 110A 3804 3805
2740= C517 EDEA 0019 AC1C A41B 3804 0000 C517
2748= EDEC 8018 EDEA 8016 EDED 001B 7515 2E36
2750= 0AFF 2C27 2426 EDEB 8028 F201 7201 7529
2758= 125D 2E01 2600 EDEF 125A AE23 3804 2805
2760= B201 6804 DC2A 1254 AE02 D42A AC2B 124F
2768= 2E23 4C2B 124D AE01 3E00 2C27 2426 1246
2770= AE03 A602 1245 2E02 D42A 4601 1240 AE23
2778= 1240 2E0B 260A EDEB 802C BA02 3805 F201
2780= 28A0 1238 5E39 1237 5E00 A803 50A0 1234
2788= 5E18 5003 542D F201 752E 122F 2E3D 263C
2790= AC30 A42F 7531 1228 2E19 542D F201 7532
2798= 1224 2E3D 263C EDF0 AC30 A42F 1218 2E11
27A0= 3804 2805 B201 6804 DC0F 440C EDEE AC34
27A8= A433 2C30 242F EDEC 0033 EDEA 8035 1209
27B0= AE0B A60A EDEB 802C 7208 1440 11AA 0457
27B8= 12E0 1350 40DA 13C0 1210 B201 7536 12FD
27C0= 2E0B 260A 12F6 AE0B A60A 7532 12F2 2E0B
27C8= 260A BA01 7532 2C27 2426 12EB AE0B A60A
27D0= 1267 2E13 542D F201 7537 2C27 2426 EDEB
27D8= 8038 F201 7201 7539 2C27 2426 12DA AE37
27E0= A636 EF57 000C 000B 0011 0004 12D0 3E03
27E8= 7539 12D2 2E1A 542D F201 753A 12C8 2E05
27F0= 4249 AC2B 2D2B EDEE AC30 A42F EDED 003B
27F8= AC30 A42F EDEB 803D B201 753E 12BE 2E41
2800= 2640 AC30 A42F 753F 12B2 2E05 4234 AC2B
2808= 2D2B AC23 EF2E 000C 0023 0010 0023 7539
2810= 12AB 2E1B 542D F201 7539 12A3 2E37 2636
2818= EDEB 8040 BA01 7541 2C27 2426 129A AE37
2820= A636 7542 129A 2E41 2640 EDF0 AC30 A42F
2828= 1290 2E37 2636 EDEA 002F AE37 A636 1289
2830= 2E37 2636 EDEC 0043 EDEF AC23 7204 1180
2838= 07F6 11FD 2E3C EFFD 000C 0023 0011 0004
2840= 2C45 1258 AE05 AE06 AE07 AE03 12F1 2E13
2848= F201 7546 2C48 AC47 2C47 424E AC2B 124D
2850= 2E18 4D2B EDEE AC30 A42F EF45 002F EDEB
2858= 8049 B201 754A 2C4B 123D AE05 AE06 2C47
2860= 42D9 AC2B 123A 2E15 4D2B EDEE AC30 A42F
2868= EF32 002F EDEB 804C B201 754D 2C4B 122A
2870= AE05 AE07 6447 2C4E 4C47 B2D6 1226 2E18
2878= 4E17 EDEE AC30 A42F EF1E 002F EDEB 804F
2880= BA01 7550 121A 2E15 4E14 EDEE AC30 A42F
2888= EF12 002F EDEB 8051 B201 7546 2C4B 120A
2890= AE03 1207 2E0A 4C0E BA01 7552 2C53 7205
2898= 11AA 13A0 0F0C 11F9 11E0 8820 12FA 3E0A
28A0= 2E15 EDEE 125B AE51 A650 12F3 2E16 EDEE
28A8= AC30 A42F 1255 2E15 2614 EDEC 8054 EDED
28B0= 002F 124C AE53 A652 2E51 2650 EDEB 8055
28B8= BA01 7556 1243 2E51 2650 AE4F A64E 7557
28C0= 123D 2E53 2652 AE4F A64E 2C45 1238 AE25
28C8= AE46 AE44 1233 2E4F 264E AC30 A42F EDEB
28D0= 8058 AC5A A459 EFC7 0059 EDEB 805B B201
28D8= 755C 12C3 2E07 2606 EDEB 805D AC5A A459
28E0= EFBA 0059 EDEB 805B B201 755E 1217 2E4F
28E8= 264E EDEB 805D AC5A A459 EFAD 0059 EDEB
28F0= 805B BA01 755F 2C4B 120A AE46 755C 12A5
28F8= 2E07 2606 AC30 A42F 7203 12E0 1350 1210
2900= 2C4B 12FD AE44 2C30 242F EDEB 8060 BA01
2908= 755F 2C30 242F EDEB 8061 BA01 7562 12EF
2910= 2E13 F201 755F 12EA 2E19 2618 EDEB 8063
2918= BA01 755F 2C30 242F 12E1 AE55 A654 7564
2920= 2C4B 12DD AE25 AE46 AE44 12D9 2E13 542D
2928= F201 7565 12D4 2E0E 542D 5E25 F201 7566
2930= 12CE 2E45 542D 5E44 542D F201 7565 12C6
2938= 2E1B 261A AE19 A618 AE01 A600 12C0 2E0E
2940= 5625 F201 7567 12BB 2E46 5647 F201 7567
2948= 12B6 2E44 5645 542D F201 7568 2C4B 12AF
2950= AE26 12AD 2E25 AE0E 2E13 F201 7569 12A7
2958= 2E06 542D F201 756A 12A2 2E3D F201 756B
2960= 129E 2E3E 542D F201 756C 2C1A 2419 EDF0
2968= AC30 A42F 756D 1293 2E3E F201 756E 2C1A
2970= 2419 AC30 A42F 128A 2E19 2618 EDEA 002F
2978= AE19 A618 AE01 A600 2C45 125B AE3D AE3E
2980= 756C 1259 2E10 1255 5E39 542D F201 756F
2988= 124F 2E47 2646 AE15 A614 AE01 A600 2E45
2990= 2644 AE17 A616 1244 2E17 2616 EDEB 8070
2998= BA06 1240 2E03 2602 123B AE17 A616 7571
29A0= 123A 2E1B A803 50A0 1234 5E04 5003 542D
29A8= F201 7572 122D 2E01 2600 AE15 A614 2E03
29B0= 2602 AE17 A616 7573 1226 2E12 542D F201
29B8= 7574 1222 2E14 4E15 EDEE AC30 A42F 121A
29C0= 2E65 2664 AC76 A475 7577 1216 2E17 4E13
29C8= EDEE AC30 A42F 120E 2E5B 265A AC76 A475
29D0= 2C30 242F EDED 003B AC30 A42F 7205 12E0
29D8= 1350 1210 1180 11E0 2C45 1261 AE04 12F9
29E0= 2E23 542D F201 7578 12F3 2E19 2618 EDEB
29E8= 8079 AC34 A433 12EF 2E10 542D F204 2C27
29F0= 2426 AC34 A433 EF4C 0033 EDEB 807A BA02
29F8= 3805 F201 28A0 AC7B EF43 002F EDEB 807C
```

```
2A00= BA02 3805 F201 28A0 5C7B F203 2C4B 1237
2A08= AE04 2C30 242F EDEC 0075 EDEA 807D 12C8
2A10= AE19 A618 12C5 2E19 2618 EDEB 807E BA06
2A18= 12C1 2E17 2616 12BC AE19 A618 757F 12B9
2A20= 2E18 542D F201 7580 12B7 2E05 2604 EDEB
2A28= 8081 BA01 7580 12AC 2E2B 262A EDEB 8082
2A30= B201 7580 2C4B 12A5 AE4A 12A4 2E6F 266E
2A38= EDF0 129E AE17 A616 7583 7202 13A0 0F0C
2A40= 2C45 1297 AE4A 1297 2E11 1293 5E04 542D
2A48= F201 7584 128F 2E6B 266A EDF0 1289 AE17
2A50= A616 1287 2E07 542D F201 7585 2C45 1258
2A58= AE16 2C4B 1254 AE26 1252 2E0C F201 7586
2A60= 2C4B 124D AE08 AE26 7586 1249 2E07 542D
2A68= F201 7587 1246 2E91 2690 EDEF AC47 123F
2A70= 2E3B F201 7588 123B 2E3C 542D F201 7589
2A78= 1234 2E0F 4C47 BA03 2C47 122F AE0F 122D
2A80= 2E0F 542D 6005 EDEE AC30 A42F 758A 1227
2A88= 2E3C F201 758B 1221 2E0E 4C47 BA03 2C47
2A90= 121C AE0E 121A 2E0E EDEE AC30 A42F 1219
2A98= 2E6D 266C EDEC 002F EDED 008C EDEA 807D
2AA0= 120D AE19 A618 AE01 A600 1207 3E0E 3E0F
2AA8= 2C45 1205 AE3B 7205 11AA 12E0 1350 13C0
2AB0= 1210 AE3C 7589 1266 2E1B A803 50A0 12F7
2AB8= 5E04 5003 542D F201 758E 12F0 2E01 2600
2AC0= AE15 A614 2E05 2604 AE17 A616 7573 1255
2AC8= 2E14 4E15 EDEE AC30 A42F EDED 003B AC30
2AD0= A42F 2C45 1248 AE04 EF47 002F EDEB 808F
2AD8= B203 2C4B 1240 AE04 12D4 2E63 2662 EDEC
2AE0= 002F EDEA 807D 12CA AE19 A618 EDEB 8090
2AE8= BA06 12C7 2E83 2682 12C1 AE19 A618 12BE
2AF0= 2E19 2618 B205 2C27 2426 12B8 AE19 A618
2AF8= 12B5 2E19 2618 AE01 A600 121F 2E26 EDEE
2B00= AC30 A42F EDEB 8091 BA03 2C45 1214 AE04
2B08= 7592 12A5 2E09 F201 7571 12A0 2E15 2614
2B10= EDEB 807D F202 3805 F201 28A0 1298 5E0C
2B18= 7204 1180 13A0 0F0C 11E0 F201 7593 7592
2B20= 128D 2E15 2614 EDEB 807D AC30 A42F BA01
2B28= 7594 2C30 242F EDF0 AC30 A42F 125B 2E17
2B30= 2616 EDF0 AE17 A616 1255 2E17 2616 EDED
2B38= 0095 AC34 A433 B205 2C34 2433 EDF0 AC34
2B40= A433 2C30 242F EDEB 0033 BA01 7597 1242
2B48= 2E15 2614 AE19 A618 12CD 2E1B A803 50A0
2B50= 123A 5E04 5003 542D F201 7592 2C4B 1233
2B58= AE2B AE26 7592 122E 2E15 2614 EDEB 807D
2B60= B202 3805 F201 28A0 12B6 5E02 F201 7592
2B68= 1221 2E17 2616 EDED 0095 EDEA 807D AE19
2B70= A618 1219 2E13 F201 7589 12A4 2E02 542D
2B78= AC7B 1211 2E23 5C7B AC98 129C 2E1B 542D
2B80= 542D AC99 2C98 A803 50A0 5C99 5003 542D
2B88= 7202 12E0 1350 F201 759A 128C 2E1B 542D
2B90= F201 759B 1800 7514 809C 809D 809E 12F2
2B98= AE3D A63C AC34 A433 759F 12EC 2E1F 261E
2BA0= AE3D A63C 2E55 2654 AC34 A433 12E3 2E19
2BA8= 2618 EDEB 0033 AC30 A42F 12DD 2E00 5E29
2BB0= F201 75A0 EF66 002F 80A1 80A2 80A3 807E
2BB8= 0012 80A4 809C 75A5 EF5C 002F 80A1 80A6
2BC0= 80A7 807E 0012 80A4 809C 12C4 2E1F 261E
2BC8= EDEC 00A8 EDED 8054 AE2F A62E 759A 123B
2BD0= 2E4A 564B F203 2C4B 12B6 AE26 12B4 2E44
2BD8= 542D 5E04 AC7B 2E25 542D 5C7B F201 75AA
2BE0= 2C27 2426 12A7 AE21 A620 75AB EF33 12A2
2BE8= 2E21 2620 EDEB 80AC BA06 1228 2E19 2618
2BF0= 1299 AE21 A620 1296 2E19 2618 EDEA 80AD
2BF8= AE1B A61A B205 2C27 2426 128C AE1B A61A
2C00= 1216 2E1B F201 75AE 1285 2E1D 261C AE39
2C08= A638 120E 2E01 2600 AC34 A433 1206 2E27
2C10= 2626 AE3B A63A 7206 12E0 1210 1180 11E0
2C18= 26B1 2FB4 12FD 2E03 2602 AC76 A475 75AF
2C20= 1800 7514 80B0 80B1 80B2 12EF AE39 A638
2C28= AC34 A433 1800 7514 80B3 80B4 80B5 12E5
2C30= AE3B A63A AC76 A475 1264 2E21 F201 75B6
2C38= 12DC 2E1B 261A AE1D A61C 75B7 12D6 2E1B
2C40= 261A EDEB 0033 EDED 80B8 AC30 A42F EFD1
2C48= 002F 80B9 80BA 80BB 80BC 80BD 80BE 80BF
2C50= 12C4 2E1B 261A EDEC 80BF AE1D A61C 12BE
2C58= 2E57 2656 EDEC 80B9 12B8 AE25 A624 1239
2C60= 2E1D F201 75C0 12B1 2E25 2624 AE27 A626
2C68= 75C1 12AB 2E25 2624 EDEB 0075 AC30 A42F
2C70= EFA8 002F 80C2 80C3 80C4 80C5 0012 80C6
2C78= 80B3 129B 2E27 2626 EDEC 00A8 EDED 80C5
2C80= AE2B A62A 1216 2E01 F201 75C7 1212 2E00
2C88= F201 75C8 120E 2E32 F201 75C9 2C45 1209
2C90= AE28 2C27 2426 1204 AE29 A628 7202 12E0
2C98= 1350 2C4B 12FE AE32 AE26 75C9 12FA 2E35
2CA0= F201 75CA 12F6 2E29 542D F201 75C7 12F1
2CA8= 2E28 F201 75C9 1263 2E33 2632 EDEA 80CB
2CB0= 12E7 AE29 A628 EDEB 00A8 B201 75C9 2C45
2CB8= 12E0 AE32 2CA9 24A8 12DB AE29 A628 2C4B
2CC0= 12D8 AE28 AE26 12D4 2E29 2628 EDEC 0043
2CC8= EDEF AC23 75CC 1243 2E5D 265C EDEC 80CD
2CD0= EDEF AC23 2C45 123C AE02 12C3 2E00 F201
2CD8= 75CE 12BF 2E01 F201 75CF 12BB 2E29 F201
2CE0= 75D0 75D1 12B6 2E2A F201 75D0 1228 2E35
2CE8= 2634 EDEA 80D2 12AC AE2D A62C 75D3 12A9
2CF0= 2E13 F201 75D4 12A5 2E35 F201 75D5 12A1
2CF8= 2E29 F201 75D5 129C 2E2D 262C EDEB 80D6
2D00= AE2D A62C 1296 2E00 F201 75D7 1291 2E2D
2D08= 262C EDEB 00A8 B201 75D0 7202 1210 13A0
2D10= 2C45 1287 AE29 AE32 2CA9 24A8 1258 AE2D
2D18= A62C 2C4B 1255 AE2A AE26 75D0 1252 2E13
2D20= F201 75D1 124C 2E2D 262C BA01 75D0 1247
2D28= 2E4D 264C EDEB 8079 EDEB 80D8 BA02 3805
2D30= F201 28A0 A803 50A0 12DB 5E03 5003 F201
2D38= 75D0 2C45 1235 AE2A 2C27 2426 1230 AE2D
2D40= A62C 12CD 2E7F 267E 122A AE31 A630 2C27
2D48= 2426 AE43 A642 12C3 2E5D 265C EDEC 80CD
2D50= EDED 0043 121C AE29 A628 2C4B 1219 AE29
2D58= AE26 1215 2E2D 262C EDEB 8035 B201 75D9
2D60= 120E 2E0B 260A AE2D A62C 2C45 1209 AE2A
2D68= 2C4B 12A6 AE02 1204 AE26 7203 12E0 1350
2D70= 1180 12FD 2E2D 262C EDEC 0043 EDEF AC24
2D78= 75DA 2C4E AC47 2C47 4005 4260 AC2B 12EF
2D80= 2E2B 262A EDEB 802B B201 75DB 6447 2CDC
2D88= 4C47 B2F1 2CDC AC47 2C47 4005 AC2B 424F
2D90= ACDD 2C2B 424D ACDE 2C2B 4249 ACDF 2C2B
2D98= 4245 ACE0 2C2B 4245 ACE1 2C2B 4242 ACE2
2DA0= 12CE 2E2B 262A EDEB 80E2 ACE4 A4E3 3804
2DA8= 3805 C5E0 EDEB 80E1 ACE6 A4E5 3804 3805
2DB0= C5DE EDEB 80DF EDED 00E5 EDEC 00E3 EDEA
2DB8= 80DD AE57 A656 EDEB 8035 B201 75E7 12AF
2DC0= 2E0B 260A AE57 A656 2C4B 1217 AE02 12A8
2DC8= AE26 1212 2E61 2660 EDEC 80E8 EDEF AC24
2DD0= 75DA 120A 2E5F 265E EDEC 80CD EDED 0043
2DD8= EDEB 8035 7206 1210 13A0 13DE 13E8 13EA
2DE0= 13DC B201 75E9 128B 2E0B 260A EDEC 0043
2DE8= EDED 80EA AE2F A62E 12EF 2E15 2614 EDEC
2DF0= 80CD EDED 00A8 1239 AE31 A630 2C4B 12E5
2DF8= AE02 1234 AE26 12E0 2E5F 265E EDEC 80CD
2E00= EDEF AC24 2C24 1CEB 9805 44EC AC24 2C48
2E08= AC47 2C47 4225 AC2B 2D2B B205 2C47 4220
2E10= AC2B 2CED AD2B 2C47 421B AC2B 2D2B 4CEE
2E18= BA05 2C47 4215 AC2B 2CEE AD2B 6447 2C4E
2E20= 4C47 B2E7 EF0C 000D 0023 0001 0004 EDE4
2E28= 000D EDE7 75EF 7204 12E0 1350 07F6 2E58
2E30= 0000 0000 0000 0000 0000 0000 0000 0019
2E38= 001A 001C 07FF 07FF 07FF 0001 0002 0010
2E40= 0020 0000 0001 0002 0005 000A 000D 001B
2E48= 0000 0000 2738 0000 0000 0000 0000 4180
2E50= 0000 0000 0000 0000 0000 0000 0000 0000
2E58= 0000 0000 0000 0000 0000 0000 1442 2771
2E60= 0064 0000 121A FFFF 2792 0000 0000 279D
2E68= 27CF 0000 0000 12EA 27C5 27E8 1316 283F
2E70= 280F 46A3 D70A 1240 2803 2827 1250 2821
2E78= 282E 45A3 C28E 0000 2890 0000 0001 1276
2E80= 285E FFFF 1278 2871 0002 129C 288D 129E
2E88= 289D 22D1 1224 1256 288F 28C4 11E6 0000
2E90= 0000 1236 2902 11E8 28F6 291F 1284 1282
2E98= 2919 1296 2924 293D 2936 294D 2950 2A1E
```

```
2EA0= 2980 296A 2B74 2972 297B 299F 1212 231F
2EA8= 29B3 2B08 29C4 0000 0000 29CF 2A11 1334
2EB0= 12A6 0000 1260 12F8 1226 2AEE 2A3F 123E
2EB8= 124E 2A50 2A64 2A5B 2B67 2AB2 2A86 2BCE
2EC0= 2A96 2AA4 44A0 0000 2AC6 125E 1292 12A2
2EC8= 2B70 2B55 2B33 46F0 0000 2B5A 0000 0000
2ED0= 2C81 2B9C 12FE 1258 131C 2BA5 2D9B 1322
2ED8= 128A 128C 1310 2BC4 122E 1238 47C8 0000
2EE0= 2BE5 2BF2 1228 1300 2C1F 2C33 12FC 125A
2EE8= 1318 1306 125C 131A 2C3D 2C56 1264 131E
2EF0= 1232 123A 122A 122C 1312 1302 2C68 2C78
2EF8= 1320 1234 123C 1268 1314 2CCA 2C9D 2CC2
2F00= 2CA6 1308 2CD1 130E 2CEE 2CE1 2D58 2D58
2F08= 130C 2D01 2D78 2D00 1246 2D1D 1248 2D70
2F10= 2E01 2D8B 0006 0000 0000 0000 0000 0000
2F18= 0000 0000 0000 0000 0000 2DC8 1336 2DFA
2F20= 126E 4001 0400 0000 07FF 2750 0000 0000
 ..
2F40= 2F49 0000 0000 0000 0000 0000 0000 0000
2F48= 0000 2F9E 0AFF 2C05 8020 2C07 AC06 EF40
2F50= 0002 0001 0006 0004 6406 2C08 4C06 B2F7
2F58= 2C07 AC06 2C06 4C08 F202 BA01 7509 2C06
2F60= AC0A 422F AC0B 2C0C AD0B 2C0A 422B AC0D
2F68= 2C0C AD0D 2C06 AC0A 4226 AC0B 2C0C AD0B
2F70= 2C0A 4222 AC0D 3D0D 6406 2C0E 4C06 B2E2
2F78= 2C02 121B AE01 AE1D 2C0F AE20 2C11 2410
2F80= 1215 AE89 7017 EF0C 0002 0002 0003 0002
2F88= 2C12 120D AE04 EF0C EDE7 72FD 7209 07F6
2F90= 139F 13BF 134F 11A9 11AA 1210 13C0 0121
2F98= 0000 0000 0000 0000 0000 0000 0000 0000
2FA0= 0001 000A FFFF 22D1 0000 0001 0020 2F69
2FA8= 0000 0000 0000 0000 0050 0005 0000 0000
2FB0= FFFF 2FF0 2801 0000 2FF3 2801 0AFE AC01
2FB8= 2C05 AC02 1230 2E15 2614 EDEB 8006 AC04
2FC0= A403 B202 2C07 AC02 EF27 0003 AC04 A403
2FC8= EDEB 8008 B201 7509 2C04 2403 EDEB 8008
2FD0= AC04 A403 750A 2C0C 240B AC04 A403 1213
2FD8= 2E53 2652 EDEC 0003 1210 AE21 A620 2C02
2FE0= F206 120B 2E21 2620 EDF0 AE21 A620 0C01
2FE8= E401 7203 1210 0F0C 12E0 0000 0000 0000
 ..
2FF8= 0000 1334 FFFF 1280 2FD2 2FD6 0000 0000
3CF0= 3D09 0AFF 1210 2E06 F201 7502 2C03 120B
3CF8= AE09 EDE4 0001 1207 3E08 2C04 AE06 71DF
3D00= EDE7 7201 0EC4 0000 0000 0000 0000 0000
3D08= 0000 0000 0007 3CFE 0002 FFFF 0000 0000
3D10= 3D19 0000 0000 0000 0000 0000 0000 0000
3D18= 0000 3DBC 0AFF 125B 2E09 F201 7201 7509
3D20= EF57 0004 3D25 3D9D 3D9D 800A 1252 2E31
3D28= F201 750B EDE9 000C 124C 3E30 1248 2E02
3D30= AC06 2E03 AC07 2E04 AC08 4C0D F203 BA02
3D38= 2C0D AC08 2C08 1C0E 9805 AC05 2C06 1C0F
3D40= 9805 4407 AC03 3C04 2C08 5407 5406 AC04
3D48= 2C06 122F AE02 2C07 AE03 2C08 AE04 122A
3D50= 2E06 1227 AE01 1223 2E04 4411 AC10 2C10
3D58= 4222 AC12 121F 2E05 AD12 2C14 AC13 2C13
3D60= 4005 4416 AC15 2D03 5C02 AC06 2D03 5C01
3D68= AC07 2C06 1C17 9805 AC06 2C04 5406 5407
3D70= AC04 2C15 AC12 4208 AC13 7206 0EC4 10D6
3D78= 0ECE 0EBA 0ECD 0ECC 2C06 AD18 2C12 42FB
3D80= AC19 2C07 AD19 6403 6413 2C05 4C13 B2D7
3D88= 2C10 42EF AC12 2C04 AD12 2C14 12EA AE2F
3D90= 12E6 2E04 441A 12E5 AE30 2C1B AE31 2C1C
3D98= 12DE AE07 12DF 2E00 8810 751D EDE9 001E
3DA0= 2C14 12D7 AE2F AE30 EFD3 0004 3DB0 3DA9
3DA8= 3DAD 800A 12CF 2E03 8810 751D 12CB 2E07
3DB0= 8810 12C5 3E08 3E09 EDE7 751F 0000 0000
3DB8= 0000 0000 0000 0000 0000 00FF FF00 0000
3DC0= 0000 0000 0000 0000 0000 3D03 0ECD 3D2D
3DC8= 0003 0028 4001 0008 0000 0006 0000 0000
3DD0= 0001 0000 0005 4008 0000 0000 0007 0000
3DD8= FFFF 3DB0 0002 3D1A 0000 0000 0000 0000
3DE0= 3E55 0AFF 8391 AC02 1258 2E08 F201 7504
3DE8= 1254 2E07 5405 F201 7506 2C08 AC07 2C00
```

```
3DF0= 124C AE06 3C03 3E09 2C02 1248 4E00 F201
3DF8= 7201 750A 7506 1241 2E08 6805 F202 BA01
3E00= 750B 2C02 123B 4E04 F201 7201 750A 7506
3E08= 1234 2E08 4C0C BA01 750D 122F 2E08 422D
3E10= AC0E 2C02 AD0E 2C03 5402 AC03 750A 1225
3E18= 2E08 4C0F F201 7201 7510 2C02 121F 4E05
3E20= F201 7201 750A 7506 2C02 4C03 F201 7201
3E28= 7511 2C12 1212 AE09 7513 2C14 120E AE09
3E30= 2C05 120B AE08 2C15 AE07 7516 2C09 1205
3E38= AE07 2C17 AE09 7202 0EC4 0EBA EDE4 0001
3E40= 7200 7200 7200 2C15 AE06 6605 12F6 6608
3E48= 6C07 2C07 F201 7201 72E0 71DF EDE7 0000
3E50= 0000 0000 0000 0000 0000 0000 0007 0000
3E58= 0000 3DFA FFFF 3E2C 0000 0008 0000 3E45
3E60= 3E07 0005 3E16 0000 0006 3E23 3E35 0003
3E68= 3E2F 0002 FFFF 3E3D 0001 0000 0000 0000
3E70= 3E98 0000 0000 0000 0000 0000 0000 0000
 ..
3E98= 3F80 0AFF 2C20 AC0B 2C09 AC1F 2C22 AC21
3EA0= 2C0B F201 7523 2C21 4005 425E AC25 3804
3EA8= 3805 C525 EDEF AC24 2C0A F201 7526 2C24
3EB0= 4C27 BA01 7528 2C21 4C29 B201 752A 2C21
3EB8= 6805 AC1F 752B 2C21 4005 4247 AC25 3804
3EC0= 3805 C525 EDEF AC24 2C24 3804 2805 B201
3EC8= 6804 DC27 AC2C D427 AC25 2C24 4C25 AC01
3ED0= EF35 000A 3EDB 3EDB 3EE1 3EE1 3EDB 3EDB
3ED8= 3EEB 3EEB 3EEB 002C 2C2D AC24 2C0B F201
3EE0= 3C24 7528 2C01 4005 4222 AC25 3804 3805
3EE8= C525 EDEF AC24 752E 2C01 4005 4219 AC25
3EF0= 3804 3805 C525 EDEF AC24 2C0B 542F F201
3EF8= 7528 2C24 EDEE AC02 A401 2C21 4005 AC25
3F00= 4208 AC30 7206 1458 1442 10D6 117E 3FFE
3F08= 144E 2C25 425F AC31 2C02 2401 EDEB 8030
3F10= EDEC 0032 EDED 8031 EDEF AC24 2C21 4253
3F18= AC25 2C24 AD25 6421 2C1F 4C21 B281 2C0B
3F20= 542F F201 752B EF48 0009 000C 0003 0006
3F28= 1244 2E17 2616 EDEF AC01 6401 EFD7 0004
3F30= 3F77 3F3F 3F33 0001 1238 2E19 2618 EDEF
3F38= AC01 6434 2C34 4C01 B201 752A 3C34 7535
3F40= 2C37 2436 122A AE17 A616 2C38 AC0A AC0B
3F48= 2C39 AC1F 753A 2C0A F201 753B 1C22 EDF4
3F50= 3FBC EDF6 1C22 EDF4 3FC4 EDF5 0008 8043
3F58= 2C22 AC21 2C21 420F AC25 EDF5 0008 8025
3F60= 6421 2C1F 4C21 B2F6 EDF6 2C0A F201 754F
3F68= 7204 1448 3F8B 07F6 1440 1C22 EDF4 3FD0
3F70= EDF6 2C20 AC0A 753A 1C22 EDF4 3FBC EDF6
3F78= EDE7 7553 0000 0000 0000 0000 0000 0000
3F80= 0000 0000 0000 001D 001E 001F 07FF 07FF
3F88= 07FF 0003 0000 0000 0000 0000 0000 0000
 ..
3FA0= FFFF 0000 0001 3EBA 0000 0000 3EC3 03E8
3FA8= 3F15 0002 3F77 3F4A 0000 270F 3EF4 FFFF
3FB0= 0000 0000 4AFF C000 0000 3F44 0000 0000
3FB8= 0000 0013 3E9D 3F51 3001 6002 303D 0002
3FC0= 2E2E 2001 2001 11CD 3001 6002 8001 0200
3FC8= 6006 3013 8001 0200 6002 2001 2001 3F73
3FD0= 3001 6002 2001 3E99 0000 0000 0000 0000
 ..
3FE0= 3FF9 0AFF EF10 0002 0003 0004 0003 EDE9
3FE8= 0002 EF09 0002 0001 0004 0003 6002 7102
3FF0= EDE7 7201 07F6 0000 0000 0000 0000 0000
3FF8= 0000 0000 0000 0001 0200 0007 0000 0000
0200= 1890 0E80 6000 7200 3000 15A0 6700 0000
0208= 1E60 1990 4400 16D0 21B0 2740 14E0 2F40
0210= 1890 0E80 6000 7200 3002 15A0 6700 0000
0218= 1E60 1990 4400 16D0 21B0 2740 14E0 2F40
0220= 0000 0000 0000 0000 0000 0000 0000 0000
 ..
0230= 0000 0000 3FE0 0000 0000 3FE0 0000 0000
0238= 3FE0 3FE0 0000 3FE0 3FE0 3FE0 3FE0 0000
0240= FFFF FFFF FFFF FFFF FFFF FFFF FFFF 0004
0248= FFFF FFFF 026B 02AD 02E3 0082 006A 006A
0250= FFFF 0000 0000 0038 FF6A 0000 0CF1 0B97
0258= 0B97 8607 A800 0029 0000 0000 0000 0000
```

```
0260= 0000 0000 8D00 8D00 8D00 0505 09FF FF17
0268= 03EF 03EE 03EE 0038 A0A0 30B2 36B8 BDA0
0270= 3033 3333 A000 3333 3333 A000 4130 3030
0278= A000 3333 3333 A000 0000 3030 A000 3330
0280= 3330 A000 4130 3030 A000 3333 3330 A000
0288= 0000 0000 0000 0000 0000 0000 0000 0000
 ..
02A8= 0000 0000 0000 0000 0000 FF96 8000 1002
02B0= 0000 0000 0000 0000 0000 0000 0000 0000
 ..
02E0= 0000 0000 6FFE FF6B 8000 1002 0000 0000
 ..
0318= 6FFE 0246 0249 024C 024F 0252 0255 0258
0320= 025B 025E 0261 0264 0267 0CCD 0608 0CCD
0328= 086B 0C4A 0D19 086B 0CE0 0D19 0C4A 0CCD
 ..
0338= 0CCD 0CCD 0CCD 0CCD 0BC1 0CCD 0CCD 0CCD
 ..
0348= 0CCD 0CCD 0CCD 0CCD 0CCD 000C 010C 020C
0350= 030C 040C 050C 060C 070C 080C 090C 0A0C
0358= 0B0C 0C0C 0D0C 0E0C 0F0C 102C 112C 122C
0360= 132C 142C 152C 162C 172C 182A 192A 1A2A
0368= 1B2A 1C2A 1D2A 1E2A 1F2A 008E 000F 2000
0370= 4000 6000 8000 A000 C000 E000 E000 E000
0378= 1820 1800 1810 0000 0000 0000 0000 0000
0380= 0000 0000 30F0 6306 2A50 AB05 2A4F AB06
0388= E2F3 0472 010C 0381 010B 0107 0A0B 0242
0390= 0004 0001 000F FFFF 000B 30F4 60C5 2AF4
0398= ABF4 3BF0 2A3A ABEF 2A39 ABF0 3020 2AF5
03A0= BA01 3080 6A36 B235 2A32 AA33 0A31 EF03
03A8= 0001 7209 09CC 03A8 03B1 0004 0001 000F
03B0= 0000 0018 000E 1320 BA24 28DB 4002 2105
03B8= B20F 6105 BA10 2EB0 30F0 50C2 A8C2 3020
03C0= 28C0 BA02 4802 B201 60C3 2B0E 4802 F208
03C8= 6802 B2EB 720E 2B08 B2FB 2802 AB05 72F8
03D0= 3B03 6B02 72F5 0240 0111 FFFA 0000 03B1
03D8= 0000 6A12 B21E 28AF AA0F 08DC 10D5 30F7
03E0= 6D08 F205 B201 3D08 6802 F213 72F9 2D07
03E8= F2FB 2D0B 7105 0003 2D03 BAF6 72F5 72F4
03F0= 2D03 B2F2 0D06 28B6 8C00 08DC 28A6 AD08
03F8= 72EB 3024 6A05 F205 B205 3A02 7203 0000
0400= 0CD7 6BFF 6A05 F205 B205 3A02 7203 0000
0408= 0CDC 6BFF 6A6C B25F 28AF AA69 8888 AA08
0410= 5208 F211 5208 F207 2A04 F206 7204 2AAA
0418= 1555 2AAA 3FFF 00DD 2AFB 52FC F204 52FB
0420= F202 2AF8 7201 2AF4 52F6 AAF3 8808 6230
0428= 2A2F 4A37 BA40 3A2C 622C 2A2B 4A32 BA3B
0430= 3A28 6228 2A27 4A2E BA36 3A24 6224 2A23
0438= 48B3 BA03 3A20 621F 621F 6220 2A1F 4A20
0440= BA2A F229 3A1B 621A 6218 2A17 4A1C BA05
0448= 3A14 6213 6214 3A10 620F 2A0F 48AE F201
0450= B202 40AD F211 58B0 420F AA0A 7214 0016
0458= 001D 0001 0003 0015 0005 001B 07B1 001F
0460= 003C 0018 000D 001E 2AFA 58AC F202 2A10
0468= 7201 2A0F AAF5 3030 6A06 B307 2A0B AB06
0470= 0A0A 71DA FFFF 0394 039D 010B 0008 001C
0478= 001D 0394 038D 0000 0000 0000 0000 0000
0480= 0000 0000 30F0 7210 09EC 0000 0000 0000
0488= 0000 0000 0000 30F7 0A12 10AF 2D00 AD01
0490= 6802 B2FC 3A0B 620A 2A08 AB10 28B0 881D
0498= 00AA 3020 6800 0481 04AC 0000 049F 0006
04A0= 0532 0104 052C E80C 3000 010A 0000 0000
04A8= 0000 0000 0000 0000 0000 30F7 0AF0 6AEE
04B0= F201 720B 6AEB 22F1 10AD 2D02 AD03 A502
04B8= 6802 B2FB 29B8 AAE8 A1B8 2ADE ABE7 30A0
04C0= 2A3D 6805 B2FE 30F0 20B7 88FF 6804 B2FD
04C8= 60C5 28A6 AA30 0A30 EDE5 0001 6A2C B2FC
04D0= 38C5 60C5 3B2C 3B2C 3B2C 28B4 AB2B 3B2B
04D8= 2B2B AB2B 222B 2A2B 3905 6005 6804 B2FC
04E0= 2B27 F209 2226 2904 B204 58A8 A904 6B20
04E8= F202 6004 72F8 38C0 68C0 38C6 68C6 38C9
04F0= 2A0C AA93 7216 04CD 04F9 FFFF 2005 FFFF
04F8= 000F C03F FFFF 04F9 09EC 1D4C 05F2 05F3
0500= 05F4 07DB 07DA 07E7 07E4 002F 079F 07E8
```

```
0508= 01E0 0A95 10AF 2D01 AD00 6802 B2FC 10AD
0510= 2D03 AD02 6802 B2FC 2A8F A9B8 3B0F 2A0F
0518= AB0F 3A84 6283 0A0D 30F0 3B0C 2A0C AB86
0520= 28C1 58A8 40BF A8C1 71DA 0472 0394 010B
0528= 0483 049D 048A 0CCD E90B 0000 690C FFFA
0530= 3000 0000 0000 0000 0000 0000 0000 0000
0538= 0000 60C5 88FF 71CE 6004 2802 6805 BA08
0540= 48D5 B206 08DC 30F7 2D00 B207 6005 F202
0
548= 28A0 7104 28A1 AD00 7104 A211 2802 AA11
0550= 4211 AA0E 2B0D BA03 1800 71D9 72FB 1209
0558= 3D07 2D00 40A3 AD00 48A3 7301 0000 0000
0560= 0000 0241 6004 2802 6805 B904 48D5 B104
0568= 08DC 30F7 2D00 6005 B104 A2F1 2802 AAF1
0570= 1800 71D9 12EE 3D00 6D00 73E9 0636 0B2D
0578= 099F 30C0 28C8 6005 F202 1A6D 71D8 60C4
0580= 3080 1000 73F6 1805 6401 2D01 58A8 4402
0588= 2501 B201 2905 2005 6401 2D01 58A8 4402
0590= 1501 B201 2905 1005 6401 2D01 BA02 4402
0598= 7203 58A8 4402 2905 EA07 0000 0000 0000
05A0= 0000 0000 0000 0000 0AFA 1249 2BFB 5A4A
05A8= 4248 40BD A804 2A4F 4002 A105 2BF3 1A3D
05B0= 9805 5A45 A804 2A49 4002 A105 2BEB 58A5
05B8= 9805 4232 2105 2A3E 4002 A105 62E3 6002
05C0= BAE5 30C0 2A32 F3B3 BBB2 28C0 A8C8 AA1E
05C8= 73AF 6AD7 B2DA 3A29 6228 38C8 68C8 2A1B
05D0= 1800 71D9 2A21 F208 3A1F 2801 AA19 0A0F
05D8= EDE6 0001 0A15 71DF 0AC2 71D7 0000 0000
05E0= 0000 0000 0000 0000 0000 0000 05E4 F800
05E8= 0800 0000 0005 00B0 4004 0000 FFFF 0000
05F0= 003C 1F0F 0000 0000 0000 0000 0E00 FFFE
05F8= 036E 05EE 05F6 0000 05FC 0000 0800 1000
0600= 2000 4000 8000 05FF 036F 0000 0000 0000
0608= 0CCC 3B57 3B57 2AE7 F3FC 1AE1 2AEA 4003
0610= 1105 2AF2 4003 2905 AAE9 2AF0 6805 F20D
0618= 2AD1 5AE4 F20A 2AE2 52DB 5BEA 52DF ABE8
0620= 52C8 F201 7204 6805 ABE3 8E00 ABE0 62DF
0628= 6003 BAE4 6ACA F201 7215 3AC5 2BD9 5AC8
0630= 6005 ABD6 28C8 6005 F1DF 62BE 7207 2ABC
0638= F202 3ABA 71DF 2AB7 F201 7287 2B25 AAC7
0640= 2B22 AAC6 1AAC 2AB6 4003 A804 2AB4 4003
0648= 1105 2904 8902 2AB1 4003 A804 2AB6 4003
0650= 1105 2904 8E00 6003 BAEE 28A6 AB0A 2A9B
0658= F201 7202 6298 7309 28B0 AA95 AA95 7305
0660= 03FF 0CD7 05A2 059F 05C8 05F2 05F3 05C4
0668= 0000 0000 0000 0000 0000 0000 0000 0578
0670= 0000 0000 0000 0000 0000 0000 0000 0000
 ..
0680= 0679 0679 0670 0670 0000 0000 0378 0684
0688= 0685 FFF9 FFF9 FFFE 0379 037A 0378 0000
0690= FFFE 0000 21FF 1000 1000 0000 0695 0695
0698= 1FFF 0000 0699 4002 0677 0678 0677 FFFF
06A0= 0001 036E 036E 0699 FFFC FFFC 4001 0000
06A8= 0002 4002 2000 036F 036F 6004 0605 05E9
06B0= 066E 2801 AADD 0AFD 3ADF 12D1 22D1 2902
06B8= 5AE0 42F1 A904 62E4 F203
06B8= 5AE0 42F1 A904 62E4 F203 6002 6004 72F7
6C0= 3805 4ADF AADD 63EB EFAB 0039 0016 0017
06C8= 8041 2BE6 58B0 F2FD 3BE3 3BE1 62DE 12DD
06D0= 2902 AAD9 12B6 22B0 2902 1AD3 9805 1AD2
06D8= 9805 BA02 4AB9 7201 42B7 4104 A904 62A4
06E0= 62BF F202 6002 72EF 3805 4ABB AAB9 62A2
06E8= BACA 62A2 F220 BA22 2AA2 AA99 2ABD AABD
06F0= 2A92 AA92 2A93 AA96 2A9C AA96 2BB6 AAB3
06F8= 62AC F201 720E 22A1 12A1 2904 4902 A904
0700= 3902 6004 6002 629C BAF8 3805 4A9A AA98
0708= 720C 0A86 E401 2A82 AC18 72A7 2A86 AA84
0710= 2A8C AC15 2C1E 72F8 079B 2A90 AA8E 3BFD
0718= 1284 2902 1A81 9805 1C2C A903 1A88 9805
0720= 3902 50A0 6005 1428 4102 A902 AC23 B206
0728= 50A0 6005 A804 40BD AC23 2804 4A6C BA01
0730= 7263 2C23 5C24 4425 2433 1104 AC23 3805
0738= 8E00 2C23 8E00 6261 642E 642C 6433 6428
0740= 6431 F201 72D5 3805 4C32 AC31 2C30 AC2E
```

```
0748= 2C34 AC33 2C35 AC2C 2A51 AA4F 2C29 AC28
0750= 1415 242C 2C13 2905 1C2D 9902 4902 4104
0758= 3902 1C13 A903 AC23 B202 50A0 6005 4A3A
0760= BA01 722C 2C23 5C24 4425 243E 2104 1C3F
0768= 9804 4004 2433 1104 8E00 622F 642C 6433
0770= 6413 6415 6431 F201 72DB 3805 4C32 AC31
0778= 2A25 AA23 2C34 AC33 643E 2C35 AC2C 641B
0780= F201 72CE 2C14 AC15 2C12 AC13 2C3D AC3E
0788= 2C1C AC1B 2A11 AD41 0C21 E401 2B0E 530F
0790= 5A0B 530B AA09 72D9 2B08 4206 AA05 72A3
0798= 05E9 0100 0100 0000 05FE 05FE 05E7 0000
..
07D8= 01DF FFFF 0000 0010 0020 0000 0000 034C
07E0= 0004 0000 3FFF 0000 079F 079F 07CE 079F
07E8= 0000 0000 0000 0000 0000 0000 0FFF 07D6
07F0= 08E2 08F1 08F4 0B2D 099F 0010 0CCC 1000
07F8= 73FC 1005 6401 2D01 58A8 4402 2501 B201
0800= 2905 2005 6401 2D01 58A8 4402 1D01 B201
0808= 2905 1805 6401 2D01 58A8 4402 30F0 AAD2
0810= 2D01 B202 2BCF AACE 2801 AAC9 0AD9 2803
0818= AAD5 2802 5AD4 AAC2 2BD1 F3D4 BBD3 4ABD
0820= F201 B3D0 62CB 6ABA F201 72F6 2802 5AC7
0828= AAB5 4AB2 BA02 F201 73C4 2802 B201 3AAA
0830= 2904 5BB0 AAB1 2903 42AB 2905 ABAE 62AD
0838= 2903 429F 1005 2BA6 52A6 5902 52A5 A902
0840= ABA4 62A3 6A99 6A9A F20D 3B9F 6B9E 2A9D
0848= 4A9E F202 629A 7202 2A99 AA97 6004 6292
0850= 6003 72DE 2A87 F201 7201 28C0 AB8E 2A8D
0858= 4A8E F202 628A 7202 2A89 AA87 2C04 F201
0860= 7202 6C04 7210 2C03 BA03 6C03 0C08 738C
0868= 0C08 E401 0407 0CDC 30F0 0A82 3BFC 3BFC
0870= 2C04 F385 3C04 2D11 F51C 3D11 A802 6411
0878= 2D11 AC0D 540C 8902 2C0D 6002 8902 6411
0880= 28A6 ABE9 2D11 BA03 AC01 EDE6 0001 6405
0888= 2C11 4C10 F202 6411 7202 2C0F AC11 2D11
0890= F201 7202 6805 AC03 2C12 F21D 6C12 1402
0898= 2902 BA02 6002 72FC 5C0C A902 AC0D 2802
08A0= 4C02 4409 1105 6C05 2802 AD0E 640E 2C0D
08A8= AD0E 640E 3D0E 6D0E 2C0E 4C10 F202 640E
08B0= 7202 2C0F AC0E 2C04 BA06 28B0 AC04 2C0A
08B8= 1800 71D9 71DF 28B0 AC04 72A5 2C07 4C13
08C0= AC07 4004 AC14 2803 4407 AC15 2C0B 4407
08C8= AC16 2D14 5D16 AC0D 2D15 4402 AC17 2D17
08D0= BA01 6412 2D16 540C 5D17 540D 50BF AD17
08D8= 6414 6415 6416 6C13 F201 72EB 2C07 F201
08E0= 7459 0C08 E401 AC13 2802 58BE F201 72D6
08E8= 2C1F 4C07 BA07 1C0A 0C08 6C01 6C01 6C01
08F0= 6C01 71D8 0C08 2A75 71E8 71DF 28DB 40C0
08F8= A803 1000 7311 50A0 30F0 A903 2B0B BA02
0900= 48C0 B202 28C0 AB06 28C2 10C0 56B0 A8C2
0908= 7302 0240 09E6 099F 1000 73FE 58A6 A802
0910= 2800 7259 28B9 4002 2105 40B4 A105 A005
0918= 40AB 3905 28C1 5EB0 F20A 28C1 56B0 A8C1
0920= 28C2 5EB0 F209 60C3 28C0 4802 F201 E401
0928= 28C5 F33E 38C4 E401 28C2 56B0 A8C2 28DB
0930= 4002 2105 3905 2004 F2F2 B20F A803 2BD2
0938= 4802 F201 E401 3BCE 6BCD 6803 6802 BAE7
0940= 2903 B2FB 2802 ABC6 E401 A221 2223 18AD
0948= 2904 B20B 6804 6803 B2FB 18A6 221C 2904
0950= B20D 6804 6803 B2FB E401 4802 F201 72F2
0958= 2A0E 48B8 B201 28A0 A904 E401 F2F2 48B8
0960= BAF0 4802 F201 72ED 2A02 72F6 0911 09ED
0968= C3CF 0246 022F 30F0 AAFA 2802 AA25 222C
0970= 10B1 2904 BA21 4A20 F20C 6804 6802 B2F9
0978= 28C6 4A1A F20F 28C8 4A17 F210 62E8 1214
0980= 73E6 3904 6904 2A19 4002 3905 2802 6005
0988= 1A15 71D9 38C6 68C6 1A12 71D9 38C8 68C8
0990= 1A0F 28AD 71D9 0004 50A3 4AFE F201 72DD
0998= 28A1 A904 72DA 0249 025C 096D 0979 097C
09A0= 3004 6401 2D01 B204 58A8 4402 2905 7201
09A8= 4402 2905 6002 7102 10C0 2EB0 30F0 50C2
09B0= A8C2 7235 10C0 2EB0 30F0 50C1 A8C1 722F
09B8= 1000 72E6 58A6 A802 2EB0 30F0 58C2 F201
09C0= E401 28DB 4002 2905 F201 E401 28C2 56B0
09C8= A8C2 28C1 5EB0 F2F9 720F 1000 72D1 58A6
09D0= A802 2EB0 30F0 58C1 F201 E401 2EB0 58C2
09D8= F2FC 28C1 56B0 A8C1 28C0 BA02 4802 B2F5
09E0= 60C3 28C4 F201 E401 28C5 F201 E401 2A54
09E8= 40C0 2001 6004 A105 7201 30F0 38C3 60C4
09F0= 38C0 68C0 30A0 20A6 28C1 58C2 F212 BA03
09F8= 6804 4005 B2FD 28B9 4004 30F0 10C3 F201
0A00= 72ED A0C0 2105 F2A8 A0C7 40B4 1905 38C4
0A08= E103 28BF 4005 BA07 F201 7205 B201 7203
0A10= FA01 7201 7A01 00FF 3805 40A0 3008 B2FB
0A18= FAFA F2F9 7AF8 BAD7 72F6 30F0 68C4 F201
0A20= E401 28C3 F2FD 6001 60C7 60C7 20C7 2A14
0A28= 40C0 A105 10AB 2901 A904 6001 6004 6802
0A30= B2FA 72BC 30F0 68C5 F201 E401 28C0 BA02
0A38= 28C4 F2E7 E401 0210 60C4 EA07 0000 0000
0A40= 0000 0000 0000 0000 0000 2AFB AAF8 0A75
0A48= 3803 60C4 6001 6C00 60C7 60C7 20C7 2AEC
0A50= 40C0 A105 10AB 2901 A904 6001 6004 6802
0A58= B2FA 2A64 4003 A801 28DB 40C0 A804 10C0
0A60= 2EB0 30F0 50C2 A8C2 2901 BA0D 4802 BA13
0A68= 2901 40DB A801 2901 48B8 BA10 A803 4802
0A70= BA0D 2803 72F6 2803 F201 7201 28A2 A904
0A78= 2802 A901 7309 2901 40B8 72F9 2901 A904
0A80= 2802 40B8 72F6 09ED 0A85 0030 00B1 00B2
0A88= 0033 00B4 0035 0036 00B7 00B8 0039 0041
0A90= 0042 00C3 0044 00C5 00C6 D400 0000 60C4
0A98= AA50 10C0 2800 7346 1401 30A0 18D1 E9E2
0AA0= 60C4 A241 2AE2 40C0 2905 42F0 AA3F 3AEF
0AA8= 6AEE 2002 1A14 3805 9804 42D7 1105 3805
0AB0= 9804 42D3 2905 18A7 9802 4002 62E0 FA02
0AB8= AA33 7205 AA30 72EE 0A3D 0241 A004 10B3
0AC0= 1A23 2903 AB20 6003 621E 6802 B2FA 18D1
0AC8= E9E3 2A24 40C0 2105 F203 2A1B 1000 7104
0AD0= 28B9 40C0 2105 40B4 30F0 A105 A005 40AB
0AD8= 3905 10C0 28C1 56B0 A8C1 28C2 56B0 A8C2
0AE0= 73A3 096A 0000 0AE4 000F D4A0 A0C5 D2A0
0AE8= 0000 A0C0 0000 0000 8D00 0230 42CF A804
0AF0= 1104 BA11 2EB0 30F0 50C2 A8C2 28C0 4802
0AF8= B201 60C3 28DB 4002 A802 2902 3902 48B8
0B00= B201 28A0 A904 6003 7103 30F3 302D 30A8
0B08= 0001 026B A000 0008 60C4 1003 F201 B203
0B10= 2A41 0A41 71E8 28D5 4803 BAFA 08DC 30F7
0B18= 2D00 6005 F202 0A37 71D8 20C0 A500 30A0
0B20= 2501 A2E8 2D02 3904 6004 6805 6805 B2FB
0B28= 3D03 3D04 2D05 38D6 7105 0A25 10C0 2EB0
0B30= 30F0 50C2 A8C2 7301 0A22 30FF 302D 3148
0B38= 0001 FFFF 311F 0008 60C4 08DC 3007 1003
0B40= 2D00 50C0 F208 50A3 F203 2A0E 0A0E 71E8
0B48= 28A1 AD00 7202 3D00 6D00 2802 1A07 0A05
0B50= 71D9 C944 0B04 D2D4 0B34 0A1B 32A0 302D
0B58= 0286 0001 026B 0082 0038 60C4 2803 F201
0B60= B203 2A33 0A33 71E8 48D5 F201 B2FA 08DC
0B68= 30F7 1003 2500 6004 F202 0A28 71D8 20C0
0B70= A500 2501 A2E8 2502 A2E7 0A20 71D7 32C3
0B78= 302D 0286 0001 33B2 0000 0038 60C4 08DC
0B80= 3007 1003 2D00 50C0 F205 50A3 F209 2A0F
0B88= 0A0F 71E8 3D03 3D04 2D05 38D6 68D6 7105
0B90= 28A1 AD00 0A05 71D7 CF44 0B55 D7D2 0B76
0B98= 3D07 30C0 6D07 28A6 AD08 28D6 B216 2501
0BA0= 2904 BA07 AD04 3904 6104 1D06 B207 2A57
0BA8= 7209 5A56 A904 50A8 6005 AD04 2A52 1D06
0BB0= B201 4250 AD03 28BD 730C 2D06 58A2 F23A
0BB8= 2A49 AD03 0D06 28BD 8C00 7301 0B2C 0CB4
0BC0= 0C3C 0C41 3803 2000 73FB 2D07 B1DF 3D08
0BC8= 2501 2D03 F3F7 B220 6005 F246 6005 F22B
0BD0= 2D03 58A2 50A2 F24A 6D03 B202 28BD 73E9
0BD8= 2904 BA0E 2804 6005 2905 58A1 4A24 F204
0BE0= 2A23 AD03 2A22 7259 6104 3D03 6D03 722C
0BE8= 3D03 6D03 2A1B 7251 50A2 F304 6D03 F202
0BF0= 72E5 0CA3 0D06 18A7 9801 8C00 08DC 28C5
0BF8= F3C6 7248 0B2C 6503 2A0A 723F 8009 80FF
0C00= 800F 000A 2B00 FFFE 31A0 3FE0 2140 2904
0C08= 5A3E F202 2D04 720A 18A7 2904 9305 58A1
0C10= A8CF 2A36 A904 7225 2D04 BAF1 4904 B20D
```

```
0C18= 2D06 B204 2AE5 AD03 28B0 721F 3D00 6D00
0C20= 3D07 1A03 2802 71D9 0CCC 2904 1A22 9805
0C28= FA02 18A7 7202 3803 6005 58A9 4004 2905
0C30= 9805 58A1 A8CF 6104 BA04 2805 F2DD 4A12
0C38= F2A7 28CF 1A10 9805 40BD 0D06 8C00 28C5
0C40= F305 08DC 28A6 AD08 71DF 0B91 7F00 FF01
0C48= 4001 8D00 6003 18A7 2000 7267 2D07 B1DF
0C50= 2D03 F201 71DF 3D08 0D06 9801 8C00 4005
0C58= 4005 A8CF 08DC 2501 2904 F222 BA28 28CF
0C60= F21C 4A51 F21A 4A50 F218 6104 2904 1AE1
0C68= 9805 FA02 18A7 7202 3803 6005 58A9 4004
0C70= A804 28CF 9805 4104 A904 2501 2904 BA20
0C78= 4D02 B224 2D09 48CF F221 28A6 AD08 71DF
0C80= 28CF F2FB 50A1 F201 72DA 6904 72F6 6005
0C88= F201 72DB 28A1 A904 98CF 2D02 40A1 40CF
0C90= B202 28A1 7203 28CF 50A0 6005 AD04 72E5
0C98= 4D04 BAE3 2D04 50A2 6005 A904 2D06 58A2
0CA0= F203 28A2 7301 0C1A 2D00 420F 2905 40AD
0CA8= 2104 A105 3D07 1500 2EB0 30F0 50C2 A8C2
0CB0= 60C3 71DF 0A00 F500 0210 08DC 3007 2802
0CB8= A8CF 10D5 2D0A 9805 58AA 48CF F205 6802
0CC0= F201 72F8 0001 720A 6004 7104 A802 4217
0CC8= 2105 4A16 B202 3004 7104 3000 7301 0E59
0CD0= BA03 2A0B BA06 71DA 6204 7301 0608 0000
0CD8= 0000 6204 7301 086B 0000 0000 0325 034D
0CE0= 0CF0 0AFF EDE5 0001 EDE6 0001 EDE4 0001
0CE8= 38C9 71DF 0CE7 0CF0 0007 0001 0CE0 FFDF
0CF0= 8018 0004 2D09 5A22 AD09 3D07 30C0 6D07
0CF8= 60D6 F20B 2D09 58B7 F308 2A19 5509 AD09
0D00= 0D06 28B3 8C00 7301 0B2C 6D03 2501 2904
0D08= BB10 AD04 3904 6104 2804 6005 2905 58A1
0D10= 4A07 F201 725A 6104 7217 FF80 0083 2B00
0D18= 0B86 0CB4 3803 2000 7298 2D07 B1DF 3D08
0D20= 2D09 58A9 F206 A804 2D09 5AF0 AD09 71DF
0D28= 0DAB 2501 2D03 F3FD 2D04 4904 BB2A 2904
0D30= 1A57 9805 FA02 3803 7202 18A7 6005 4004
0D38= 2905 9805 58A2 F22E 4A4C F22E 424A A804
0D40= 3803 58B5 F201 18A7 2804 5A44 4244 2905
0D48= 9805 58A2 A804 48A5 B222 2804 5509 58B7
0D50= F20A 2D09 50B7 AD09 58B7 F203 28B4 7209
0D58= 0C1D 28B3 7206 A005 58AA 18A7 9805 2501
0D60= 6104 0D06 8C00 08DC 28A6 AD08 28C5 F302
0D68= 71DF 0B91 6104 72C0 6104 28B5 72F2 421C
0D70= 2905 A804 48B7 BA07 5509 58B7 F201 72D9
0D78= 20B7 2804 72E4 58AC F2FC 2D09 50B7 AD09
0D80= 58B7 F202 28B4 7201 28B3 4004 72D8 400

0D88= 008D 001F 0D8C 00B0 F6BA 1E19 9C20 BB29
D90= B52D BC2C BD0B 1C0F B024 B418 B90E 8A28
0D98= 0925 F71F 1A2A 0515 340C 3F08 3A1D 3B14
0DA0= 352E 3C2B 381B 3D10 392F 3004 8D3E 0DB8
0DA8= BFF0 0AF1 9EF8 85F2 2904 B204 58A8 A904
0DB0= 7301 0CA3 18A7 0D06 9801 8C00 08DC A8CF
0DB8= 58A1 F258 9805 A8CF 2D09 58B7 40CF A8CF
0DC0= 9805 40CF A8CF 1AC6 0AC6 2901 50CF A804
0DC8= 58A2 F211 2804 58A1 F210 6001 6803 B2F5
0DD0= 08DC 28CF 58A9 2275 48AF F262 2273 4A73
0DD8= F25F 728A 0D63 28B6 7201 28B5 4001 4AAB
0DE0= A8CF 08AB 1AA5 9805 FA04 3804 6801 BA07
0DE8= 72FA 20B7 6801 BA03 9805 FAF7 72FB 2804
0DF0= 40CF 08DC A8CF 2501 6104 2904 1A91 9805
0DF8= FA02 3803 7202 18A7 6005 4004 A804 28CF
0E00= 9805 4104 A904 2501 2904 4D02 B207 18A7
0E08= 2D09 9805 50CF 58A2 F201 73CD 2904 40BF
0E10= A904 73C9 98CF F3C7 BA1E 28CF 4005 BA22
0E18= 4005 BA22 4005 BA24 4005 BA24 4005 BA1E
0E20= 4005 BA01 73B8 2904 F3B6 6904 1A25 9805
0E28= FA06 4004 A804 2904 58A1 A904 73AC 4004
0E30= 6005 3905 73A8 2219 2D09 58B7 F201 2216
0E38= A0CF 72B9 2A14 72B6 2A13 72B4 2A12 72B2
0E40= 20B7 7201 3804 2D09 5A0D 5004 AD09 7393
0E48= 00AC 002E 0011 4001 002D 00DE 00A0 003D
0E50= 005F FF7F 0033 88FF 3B04 6303 7301 04AC
0E58= 049D 0000 3004 08AD 2B03 7301 0CCF 0CD7
```

```
0E60= 0000 0000 0000 0000 0000 0000 0000 0000
00A0= FFFF FF00 00FF F000 0F00 00F0 000F 6008
0A8= 7FFF 007F 003F 0006 0003 0005 0007 0009
00B0= 0001 0002 0004 0008 0010 0020 0040 0080
00B8= 0100 0200 0400 0800 1000 2000 4000 8000
00C0= 0004 8010 0010 0000 0000 0000 FFFF 3000
00C8= FFFF 0000 0000 0000 0000 0325 0CC5 0005
00D0= 0001 0001 0002 0003 7FFF 0003 0000 0A1C
00D8= 0A48 0AED 0A31 0220 0319 0A3B 0000 0CCD
00E0= 0B0B 0B3B 0B5C 0B7D 09CC 090B 09B7 09B1
00E8= 0A96 08F5 0F1F 0F22 0F9E 0FA1 10B6 1089
00F0= 0EFF 1070 1051 39A6 39B5 3A39 3A1E 0A96
..
0100= E80C 30AA E90A 0000 E90B 0000 690C FFFB
0108= 3000 0000 048A 0394 0110 0000 3000 0000
0110= 3000 0000 3000 0000 3000 0000 3000 0000
0118= 3000 0000 3000 0000 3000 0000 3000 0000
0120= 0000 0181 2801 0AFE AC01 2C07 AC04 AC05
1040= C009 0010 7FFF C001 C00F 8001 FF00 8010
1048= E008 0008 0F96 0F9A 003E FFFE 0F9D 0001
1050= 1138 FFFF 60C4 3804 6004 9804 6401 2D01
1058= BA02 4402 7203 5A13 4402 2905 A802 2C06
1060= B207 2E00 5804 A803 2E00 5004 5003 7203
1068= 2804 5206 5E00 AE00 2C06 7303 7FFF FFFF
1070= 1126 7200 6401 2D01 BA02 4402 7203 5A0C
1078= 4402 2905 A802 2A09 4803 A803 2E00 9805
1080= 1A05 9805 7304 7FFF 000F 400F 114B C000
1088= C008 C010 60C4 2004 F211 B204 3805 4804
1090= A804 2C06 1AF6 9804 A802 3805 4804 4214
1098= BA0B F20A 42ED A803 4AED BA01 3802 3804
10A0= 2802 9804 3803 7201 2A08 1405 B202 5206
10A8= 6005 7301 1126 0050 7FFF FFFF 0000 0001
10B0= 8008 0008 60C4 10C7 3E09 3E0A 7201 60C4
10B8= 3804 1AF6 3802 2C06 F216 B203 5218 6005
10C0= BA03 6802 9805 B2FD 3804 1AEB 9804 AAE7
10C8= 2802 420C 1AE7 9805 4004 1406 B202 5207
10D0= 6005 A804 2ADC 7301 1138 0050 FFFF 1401
10D8= 6002 2E00 4002 A803 2903 BA02 4402 7203
10E0= 5A0F 4402 2905 2905 BA07 F206 4002 A802
10E8= 4803 B202 2902 7201 2803 AC01 E401 7FFF
10F0= 60C4 6803 1103 2801 AE01 6003 6003 6003
10F8= 2103 6002 6401 2D01 5A0E 4402 AE01 2D01
1100= B202 2F01 AE01 6804 B2F4 2802 4903 6805
1108= 0805 7103 7FFF 2802 4219 AC00 2602 2E03
1110= 4001 6805 A802 6003 6003 2803 4004 AE00
1118= 2903 BA07 4001 AE01 6002 6003 6804 B2F8
1120= 7500 5A05 4001 2905 72F6 0004 7FFF AC06
1128= 2A0D 5C07 2406 BA02 F206 520A 1803 B201
1130= 5208 AC07 71D7 5203 72F9 FFC3 000C 0008
1138= 0010 AC06 2C07 5A0C A405 BA02 F206 520A
1140= 1803 B201 5208 AC07 71D7 5203 72F9 FFC3
1148= 000C 0008 0010 0C01 AC06 2C07 5A09 2406
1150= BA02 F203 5207 AC07 E401 5203 72FC FFC3
1158= 000C 0008 0C01 AC06 2C07 5A09 A405 BA02
1160= F203 5207 AC07 E401 5203 72FC FFC3 000C
1168= 0008 0000 117B 0AFF EF08 0001 8002 8003
V
0F00= 60C4 7205 60C4 10C7 3805 4E09 AE09 3805
F08= 4804 A804 2C06 7301 1138 6401 2D01 B204
0F10= 5A0E 4402 2905 7201 4402 A802 2E00 B202
0F18= 5205 6005 2005 2E01 7303 FFFF 7FFF 115A
0F20= 60C4 3A7A 7203 60C4 3A77 6A76 AA77 5A5E
0F28= 1000 723B A26B AA6B 2A6E AA6C 1000 724A
0F30= A802 2E00 1A69 F202 5259 6005 A804 2E01
0F38= 5255 5A64 5601 AA62 2E01 5A48 1000 7225
0F40= AA58 2A59 4A57 BA0A 524B A803 4A4A BA01
0F48= 1A48 2A51 AA4F 9A4A 2A4C 7209 523F 6005
0F50= 423F 1805 4A3E BA01 1A3C 2A43 9804 C23E
0F58= A243 B204 A002 A803 C804 C802 A802 2A3A
0F60= 422E AA3B 2802 7301 1004 A803 A236 B204
0F68= 3805 4804 A804 2803 A22E 1A19 9A2C 1A23
0F70= 9804 1A22 9804 1A29 B601 A222 AA22 C804
0F78= CA1F 7601 6401 2D01 BA02 4402 7601 5A0C
0F80= 4402 2905 7601 0F9B 0F9D FFFE 4008 0F95
```

```
0F88= 0F96 0F9A 0F99 7FFF 0F98 FFFF 0046 C000
0F90= C01F 0F9C 8008 E008 0F97 0000 0000 0000
0F98= 0000 0000 0000 0000 0000 0000 0000 60C4
0FA0= 3AFE 7203 60C4 3AFB 6AFA A2F6 B205 A803
0FA8= 3805 4804 A804 2803 AAF1 5AD8 1000 72B5
0FB0= AAE6 A2E4 2AE8 AAE6 1000 72C4 A802 2E00
0FB8= 52E3 AAE2 2E00 B202 52D1 6005 A804 2E01
0FC0= 52CD 5ADC 5601 AADA 2E01 5AC0 1000 729D
0FC8= AAD0 A2CE 2AD0 1AD3 F203 52C0 6005 426E
0FD0= 42C9 AACB 1A6A 9AC4 1A6A 9AC3 2AC0 22BE
0FD8= 1AC6 BA13 1A62 9804 1A62 9805 A2B7 D2B8
0FE0= A2B9 AAB9 2AB3 D2B5 C2B5 1A5B 9804 A2B2
0FE8= AAB2 2AAC D2AD C2AE 7218 3008 1A51 9804
0FF0= DAA7 7A41 A2A7 AAA2 D2A4 A002 A803 C804
0FF8= C802 1A43 9804 3A9F C29D 1A46 9804 DA98
1000= 2005 1A43 9804 3A93 C291 3A95 2004 F207
1008= 1A3D 6291 9804 BA09 72FC 0F95 0F9B 2232
1010= A28A 1A36 9804 F201 B2F3 5A31 1A32 9804
1018= 1A31 AB31 A3F3 F21A 2A80 4B2E 4A2E BA16
1020= A804 3805 3008 9804 7A0E C3E8 13E8 B205
1028= A802 3805 4804 A804 2802 5A20 A802 2B1F
1030= 5A1F 4002 731E 220F 1A1D 7202 3804 3803
1038= 2A19 AB15 2803 72EA 8007 0080 6007 8005
3000= 30DC 302D 30F3 302D 30A8 0001 026B 0010
3008= 0038 0000 0000 11E6 0000 302D 026B 3026
3010= 35AF 000A 0000 0001 0000 3A34 0000 0000
3018= 0002 0002 0001 0000 0000 0008 0008 0000
3020= 0000 0000 0001 35A1 0000 0000 0001 30DC
3028= 302D 0286 0001 B830 0000 003C 3000 B100
3030= B200 3300 B400 3500 3600 B700 B800 3900
3038= 4100 4200 C300 4400 C500 C600 A000 AC00
3040= 2D00 2B00 2E00 484D 4844 CC42 5042 5642
3048= 53CC C94D C944 D24D D244 C9D4 48D4 D2D4
3050= 53D8 53C5 53C3 5350 0000 A0A0 D2D2 A0C5
3058= A02E 2EA0 BDA0 A0C9 A0C3 2337 2200 0000
3060= 0410 5111 8900 0020 2000 0202 3300 0003
3068= 6000 0000 31A0 31B4 31BE 31D0 30DA 31EE
3070= 31F9 3203 3209 320C 2004 2008 200C 2000
3078= 3211 3252 33A9 3252 33F4 34BD 3211 3252
3080= 3211 3252 34CF 34D3 34D7 34DF 3677 3616
3088= 365F 0000 0001 0000 3CF0 3000 0011 4844
3090= 3257 33B2 42B2 0000 0000 0003 311F FFFF
3098= 0000 0000 309A 0003 3CF0 0000 32B1 0000
30A0= 0010 0000 FFF8 FFF8 0000 0000 0000 0000
30A8= 3089 001E 302E 0015 3043 3078 3074 305D
30B0= 306A 311F 31A0 31A4 3317 335B 332C 3301
30B8= 330D 333C 3351 FFF8 0038 0008 FF00 2100
30C0= 302D 32C3 E9DE 0001 0001 0002 0003 30C8
30C8= AC00 0F00 1010 1010 1010 1010 1010 1010
30D0= 0000 FFFF 32FF 3542 3554 3581 3592 353A
30D8= 353C 3534 35BD 7224 EDE7 0AE3 2AC9 BAFC
30E0= 22C9 12C7 3E00 6002 6804 B2FC 6AAD 28A1
30E8= AAD6 62A1 1ADA E9E2 28B0 A904 6004 2C11
30F0= A904 E9E3 1AD1 E9E0 A2A2 2261 12BB 2B9F
30F8= AE00 6002 629C 6804 B2FA 2AB4 AA98 E3E1
3100= 2A8A AA8A 2A8C 4A52 BA07 2A8E F3AC 2A93
3108= F3AA AA85 3A89 72CF 2A82 6281 3804 D8B1
3110= 4286 2905 2004 F201 D0B8 58A1 1005 1C66
3118= F22F 4AA6 F201 72BF 2C61 AC6D 72BC 0010
3120= 2121 4844 AC33 3030 302D 33C3 C630 A08D
3128= 0000 0000 0000 0000 0000 0000 0000 0000

3148= 18A7 9805 4002 5C91 AC73 147D 2E00 F251
3150= 5C91 4C73 F206 6002 72F9 0050 0028 31A0

  58= 3158 2802 4C7D AC6A 4C7E BA2E 2C91 48A2
3160= F205 3C77 3C62 3C67 3C72 3C68 2C62 4473
3168= AC62 2C91 50A0 AC91 48A2 F4AD 147F 2E00
3170= F230 4C62 F202 6002 72FA 2802 4C7F 4480
3178= 2905 AC63 6472 2C62 4C1E F201 3C72 2C62
3180= 58A2 4A1E F207 48B1 F205 4A1B F203 48B3
3188= F201 6467 28AB 7205 2C6A 48B4 B201 28A0
3190= 40B0 AC5D 2C5E D0AE 445D D8B2 1004 C481
```

```
3198= 2905 5EA3 1904 9805 4483 2905 7105 0042
31A0= 0086 2C02 1C68 F201 2C03 AC73 1C97 E9E2
31A8= 1004 28B3 AE00 2C2A AE01 2C29 AE02 2C11
31B0= AE03 2C73 AE04 E9E3 74AE 149A 20AB 2CA2
31B8= 1C77 F201 2C28 AE00 6002 6804 B2FC 2C6A
31C0= 18A7 2477 F202 2C73 9805 AC6A 1800 7589
31C8= 7204 58A2 18A7 9C6A 7201 58A1 446A AD6D
31D0= 74AD 2C77 F217 2C6B 4A6C FA14 2C9A 40AD
31D8= A802 2E01 58A1 AE01 1A65 9E00 18A7 9E00
31E0= 6802 2802 4C9A FAF8 9E01 2D9A 4411 AD9A
31E8= 646B 72E9 3C70 6468 3C6B 6463 7563 2C68
31F0= 48B0 F203 6468 646C 74AD 2C62 58A1 4A48
31F8= F2F9 7585 2C62 58A1 4A46 F2D3 4A45 F2D1
3200= 4A44 F2CF 6468 74AD 2C67 F2CB 2C68 48B0
3208= F2C8 72B5 2C70 F585 74AD 2C67 F2A6 2C68
3210= 6805 F2A3 72AC 7587 720E 7587 721D 722F
3218= 721E 2C5D 48B0 F4AE 48B1 F585 6C63 6C63
3220= 6C63 6470 74AD 1800 758A 6463 6463 6477
3228= 2C62 4C1E F204 2C62 4C1C F201 3C77 2C5D
3230= 48B1 F201 7585 74AD 1800 758B 72F0 2C6C
3238= 2472 F201 D0B1 4460 AC60 3C6C 722E D400
3240= 000E E008 5300 0300 7600 326C 3246 2C62
3248= 18A7 9805 58A2 4A07 F587 48AD F100 4A04
3250= F5A6 75A8 0048 007C 7587 720D 7587 7211
3258= 722E 2C5D 48B0 F4AE 48B1 F585 2C63 48AB
3260= AC63 6470 74AD 1800 758A 6463 6463 6463
3268= 7563 1800 758B 6463 7563 2C60 AC6D 28D4
3270= 4C6D FA01 7585 2C6D 4CA3 FA01 75A5 2CA4
3278= 4C72 4C6D FA01 75A5 2464 A56D 646D 2C72
3280= F203 2465 A56D 646D 2C5F 4C6D FAEC 2C60
3288= AC6D 2C5F AC6F 2C62 18A7 9805 58A6 F588
3290= 48B1 F5A9 48AB F203 6805 F5A7 7100 2C6F
3298= F203 2C6D 5C8E AC6D 2C8E AC75 AC76 1C97
32A0= E9E2 1004 2C8F AE00 2C28 AE01 2C2D AE04
32A8= 3C6E 6C6E 2C6D 7204 2C11 AE04 2D6D 646D
32B0= 2000 758C A602 AE03 6002 6002 6002 646E
32B8= FAF3 2C6E 4C90 F206 3E02 2C6F AE03 AE04
32C0= F2F3 72EA 1C97 E9E3 2C6F 4C6D FA0A 2C5F
32C8= F202 3C5F AC60 6460 2C60 4472 AC60 6463
32D0= 7563 3C5C 2C6D 6805 2105 A465 4C72 2905
32D8= AC64 2C6D 4C75 4C6F FA14 3803 2C6D AC6E
32E0= 256E 2C6E 4472 AC6E 2905 CC64 F201 7209
32E8= 646E 6003 2803 4476 BAF3 645C 2C6E AC6D
32F0= 72E8 2C5C F298 1C97 E9E2 1004 28AB AE00
32F8= 2C28 AE01 2C2B AE02 2C2C AE03 E9E3 728B
3300= 2C06 7586 3C5F 2C64 AC60 28D4 4C60 FA01
3308= 7585 2C5D 48AC F4AD 6003 7103 2C64 AC5F
3310= 28D4 4C5F FA01 7585 2C5F 4C60 FAF5 7585
3318= 3C64 1800 7589 7202 18A7 9805 58A2 AC73
3320= 48B4 F206 B585 2C64 D0B4 4473 AC64 72F1
3328= 3C6B 2C12 AD9A 6463 7563 6003 2C6B 4A2B
3330= B585 2C6B 646B 3804 D8B1 449A AC6D 2905
3338= 2004 F201 7103 6003 7103 A471 AC5C 1A1C
3340= 28AC AC6A 2C5C 3804 D8B4 AC5C C47D 9C64
3348= 2C64 58A2 4104 AC64 6C6A B2F4 2464 2C65
3350= 6471 7571 6C63 2C5D 6805 F4AE 48B1 F585
3358= 6470 74AD 000E C008 1C99 E9E2 A474 1004
3360= 2234 3E01 6002 6804 B2FC 1474 2A2F AE00
3368= 28BF AE01 2C5F F223 28B0 AE02 2C60 AE03
3370= 2C5F 4C60 6005 2005 4A23 BA01 2221 2804
3378= 40BB AE04 6804 2D60 AE05 6002 6460 6804
3380= B2FA 1800 7216 50A0 6005 AE01 1C99 E9E3
3388= 2C60 F203 2C5F 4C60 FACF 6463 7563 2A07
3390= AE02 2C60 AE03 72ED 0033 FF96 1002 0030
3398= 3398 1474 2E01 4005 BA0B 22F7 3805 4601
33A0= FA01 6805 6005 6002 6804 B2F9 6003 7103
33A8= 2803 40B2 7105 2C68 6805 F201 7585 1C98
33B0= E9E0 A474 1800 72E5 4601 F201 723B 1474
33B8= 2802 4C74 4ADA F231 2E02 F22F 5A15 F201
33C0= 722F 2E02 58A2 A804 2E02 58A1 F205 48BB
33C8= F20D 1C98 E9E1 758D 2E03 AC60 6002 6002
33D0= 72E7 33F1 33EC E700 33EF 33D5 6804 2C60
33D8= 4CA3 FA01 75A5 2CA4 4C60 FA01 75A5 28D4
33E0= 4C60 FA03 1C98 E9E1 7585 2E03 AD60 6460
```

```
33E8= 6002 6804 B2EC 6002 72CB 1C98 E9E1 72BB
33F0= 2C05 7201 2C04 1C98 E9E1 7586 7203 7587
33F8= 7221 7585 3C79 2C5D 6805 F220 2C61 4A14
3400= FD85 2C61 3804 D8B1 4469 2905 18A7 9805
3408= 2004 F201 9805 5A09 A804 2A08 4804 FCAD
3410= 720D 341D 3419 0050 007F 0046 3398 0036
3418= 3488 0033 6463 2C64 AC78 6C79 1C98 E9E0
3420= A474 1800 73F4 4601 F201 72CC 1474 22F0
3428= 1AF0 2902 A903 6002 6003 6804 F201 72F9
3430= 12E8 1C98 E9E1 2802 4AE4 4AE4 F2E7 2E02
3438= F2E5 5A9A F201 72B4 2E02 58A2 A804 2E02
3440= 58A1 F203 48BB F206 758D 2E03 AC60 6002
3448= 6002 72E9 6804 28D4 4C60 FA03 1C98 E9E1
3450= 7585 2C79 F203 2E03 5478 F22C 2E03 5560
3458= F229 2802 AC6E A46F 1C97 E9E2 1004 2A5F
3460= AE00 2C28 AE01 2C2E AE04 2C2F AE08 2C11
3468= AE05 AE09 2C60 2000 758C A602 AE03 2C6E
3470= 40AC 2905 2000 758C A606 AE07 2D60 2000
3478= 758C A60A AE0B 1C97 E9E3 146E 246F 2C98
3480= 4C97 F58D 6460 6002 6804 B2C5 6002 72AB
3488= FF96 8000 1002 0000 0000 0000 0000 0000
..
34B8= 0000 0000 0000 0000 0000 6FFE 0016 74AD
34C0= 7587 720C 7587 2C68 48AC F201 7585 1800
34C8= 758B 2C60 ACA3 2C5F ACA4 758D 1800 758A
34D0= 7585 720B EDE4 0064 758D 7207 EDE5 0064
34D8= 758D 7203 EDE6 0064 758D 2C68 48B1 F587
34E0= 7585 74AD 7587 723A 7587 28D4 4C64 FA01
34E8= 7585 2D64 AC73 2CAA A8DE 2C95 AD64 EA43
34F0= 2C73 AD64 2CAC AC6D 2CAB AC6E 28AB AC6F
34F8= 1C97 E9E2 1004 2A30 AE00 6002 2D6E AE00
3500= 2C2D AE01 646E 2D6D 646D 2000 758C A602
3508= AE03 2802 40B2 A802 6C6F B2F0 1C97 E9E3
3510= 2C5D 6805 F4AE 48B1 F585 6470 3C67 3C68
3518= 6468 2C4C AC63 2C17 AC62 74AD 28D4 4C64
3520= FA01 7585 2C64 6805 AA10 2C5D 48B1 F4AD
3528= 7585 3534 3532 0038 0000 0000 0000 0000
3530= 0000 0000 0000 E201 0000 0000 0000 0000
3538= 0000 0000 0000 E2F1 A050 A042 A0C3 A047
3540= A0C5 A041 A044 1A2E 28F5 6805 ED05 3550
3548= 009B 0000 EDF5 0008 0064 EDF6 6463 7563
3550= 3001 6008 8001 0300 2000 20B3 2C6F F204
3558= 2C6D 5A19 AC6D 2218 A208 1C97 EDF4 3574
3560= EDF5 0008 006D EDF5 FFE0 806D EDF6 2C6D
3568= 246F F201 40AC 6005 AC6D 2A05 AC75 AC76
3570= 7594 000E FFFC FFE0 3001 0002 A0A0 B001
3578= 0200 0002 BDA0 3004 8001 0300 0001 A0A0
3580= 2000 2000 1AEF 28F5 6805 ED05 358F 009B
3588= 0000 EDF5 0009 0064 EDF6 6463 7563 3001
3590= D001 0707 2000 20AF 2C6F F201 2218 A208
3598= 1C97 EDF4 35AF EDF5 0008 006D EDF5 FFF1
35A0= 806D EDF6 2C6D 246F F201 40B1 40B1 AC6D
35A8= 2A05 AC76 2AC8 AC75 7594 FFFE FFF1 3001
35B0= 0002 A0A0 B001 0200 0002 BDA0 3002 D001
35B8= 0707 0001 A0A0 2000 2000 0000 0000 0000
..
35D0= 0000 0000 0000 0000 0000 35D6 0000 0000
35D8= 0000 0000 0000 0000 0000 0000 0000 302D
35E0= 302E 35C5 386D 3872 C54E 44A0 30C3 30C4
35E8= 30C5 30C6 35EB 44CC C5AC C94E 53AC D2C5
35F0= 50AC C54E 44A0 0000 367F 38DD 38BF 3648
35F8= 3681 389C 37CD 3840 3827 3768 37F6 37C0
3600= 38AA 3602 36CC 3708 372E 375D 000A 000E
3608= 0012 002F 0050 0060 2B00 0046 005F 007C
3610= 007F 008D 008D 008D 00A0 00BB 3AA0 8D0A
3618= 7203 7587 720F 7585 1000 73DA 7201 721E
3620= 12B5 20B3 3E00 6002 6804 B2FC 3A9C 2AAE
3628= AA9B 74AD 2C64 F585 42DB 6805 A804 2B94
3630= 4804 FD85 6291 A390 628E 2A8D 48B3 FA06
3638= 6C63 6C63 1000 73BC 74AD 7200 0CAD 2000
3640= 73BD 2000 73BA 2000 73B7 7201 72F8 0A98
3648= 758D 2C5D 6805 F212 2C61 4ABD FD85 2C61
3650= 3804 D8B1 4469 2905 18A7 9805 2004 F201
3658= 9805 5AB7 A804 2AB2 4804 FA01 6002 6002
3660= 7102 2C68 6805 F201 7585 0CAD 3C0C 2000
3668= 7396 1425 2AAA AE02 AE03 AE04 AE05 2AA7
3670= AE06 2000 7388 2000 7387 7201 72F0 0C22
3678= 758D 2C68 6805 F201 7585 0CAD 3C17 6417
3680= 2000 7540 2C24 AC00 3C08 3C09 3C01 3C0A
3688= 1425 2E07 AC02 2E08 AC03 4C28 F22E 2C25
3690= AC11 2C4E AC10 2C4B AC0F 2000 7543 7538
3698= 9805 AC04 1423 2E00 F538 4C04 F202 6002
36A0= 72FA 2802 4C23 AC07 48B4 F211 48B1 F209
36A8= 28AF 4C07 FA01 7538 2D00 D449 4407 AD00
36B0= 72E4 2C01 BD38 6400 640A 6C01 72DE 2C0A
36B8= F202 2C09 F538 2C08 F538 142D 2600 F538
36C0= 2E01 CC02 F203 6002 6002 72F8 2802 4C2D
36C8= 3804 D8B1 4444 2905 7105 2C0A F220 2C09
36D0= 4C08 FA01 7538 2C09 4C17 FA01 7538 2C17
36D8= 4C08 FA01 7204 2C09 4C17 FA0A 7537 2000
36E0= 7541 6417 2000 753F 2000 753E 7538 72EF
36E8= 2000 7541 6417 2000 753E 7218 72F5 2C08
36F0= 4C17 FA01 7538 2C08 4C17 F209 2000 7541
36F8= 6417 2000 753F 2000 753E 7538 72F4 2000
3700= 7541 6417 2000 753E 7201 7537 2000 753F
3708= 7538 2C0A F201 7538 2C08 4C17 FA01 7538
3710= 2C17 4C08 F209 2000 7541 6417 2000 753F
3718= 2000 753E 7538 72F4 2000 7540 1425 2E07
3720= AC02 2E08 AC03 142D 2600 F206 2E01 CC02
3728= F53B 6002 6002 72F8 2000 753F 72ED 2C0A
3730= F201 7538 2C08 4C17 FA01 7538 2C17 4C08
3738= F209 2000 7541 6417 2000 753F 2000 753E
3740= 7538 72F4 2000 7540 1425 2E07 AC02 2E08
3748= AC03 142D 2600 F206 2E01 CC02 F53B 6002
3750= 6002 72F8 2000 753F 2000 7541 6417 2000
3758= 753E 7201 72E7 2000 753F 7538 2000 7541
3760= 2000 753F 2000 753E 7201 72F8 0C22 7301
3768= 30DB A40E 1800 753C 1D29 E9E0 A40B 2805
3770= BA3B 6005 18A7 3804 D8B1 440B 2905 9805
3778= 2004 F201 9805 58A2 4C54 F201 7201 6D0B
3780= 28B1 AC0F AC16 450B AC10 AD0B 2C0B AC11
3788= 2000 7543 7206 4C58 F201 72FA 2C0F AC16
3790= 72F7 2C16 AC0F 2D0B AC10 2C25 AC14 2C4E
3798= AC13 2C4A AC12 2000 7543 720A AC07 4C51
37A0= F21B 4C52 F20C 2C07 2000 7539 7201 72F3
37A8= 1D29 E9E1 640E 750E 1D29 E9E1 7538 1800
37B0= 7542 72E9 2E00 AC0D 2C57 2000 7539 72F0
37B8= 2C12 4C0D F2E0 72F8 2C4A 4C12 FADC 6C12
37C0= 72DA 6003 1418 20B3 2C12 4E00 F103 FA02
37C8= 6003 7103 6002 6804 B2F7 7103 A40E 640C
37D0= 1426 2C0C AC00 2C00 3804 DC49 AC00 2804
37D8= 4423 2905 AE00 6802 2C00 F201 72F4 1D2A
37E0= E9E2 A414 AC13 3C12 2C25 AC11 2C4E AC10
37E8= 3C0F 2000 7543 7204 2000 7539 7201 72F9
37F0= 2C12 48B1 AD14 1D2A E9E3 640E 750E A40E
37F8= 1800 753C 1D2B E9E0 A40B 2805 BA26 6005
3800= 18A7 3804 D8B1 440B 2905 9805 2004 F201
3808= 9805 58A2 4C55 F201 7201 6D0B 28B1 AC0F
3810= 450B AC10 2C0B AC11 2C25 AC14 2C4E AC13
3818= 2C4A AC12 2000 7543 7204 2000 7539 7201
3820= 72F9 1D2B E9E1 640E 750E 1D2B E9E1 7538
3828= A40E 1D2C E9E2 A414 AC13 3C12 2C25 AC11
3830= 2C4E AC10 3C0F 2000 7543 7204 2000 7539
3838= 7201 72F9 2C12 48B1 AD14 1D2C E9E3 640E
3840= 750E A40E 2C25 AC11 2C4E AC10 2C4A AC0F
3848= 2000 7543 721F 4C57 F201 72FA 2000 7543
3850= 7219 AC07 4C57 F2FA 2C07 9805 AC02 2000
3858= 7543 7210 4402 AC02 2000 7543 720B 9805
3860= AC03 2000 7543 7206 4403 AC03 2427 2C28
3868= CC02 F201 640E 640E 750E 0000 0000 0000
..
3898= 0000 0000 0000 0000 0000 1425 244C 3E00
38A0= 6002 6804 B2FC 1425 6E00 2C4F AE01 2C56
38A8= AE2F 6003 7103 A415 2C0F 4C10 BA02 6415
38B0= 7515 2C0F 640F 3804 D8B1 4411 2905 18A7
38B8= 9805 2004 F201 9805 58A2 6415 6415 7515
38C0= A415 AC07 F218 2C12 4C13 BA02 6415 7515
38C8= 2C12 6412 3804 D8B1 4414 A802 2905 18A7
```

```
38D0= 9805 2004 F201 9805 58A1 4407 9805 2004
38D8= F201 9805 AE00 6415 6415 7515 1D2A E9E2
38E0= 1004 2C49 AE00 2C5A AE05 0C22 2C2A AE01
38E8= 2C29 AE02 2C11 AE03 2C08 AE04 E9E3 0CAD
38F0= 7537 0000 0000 0000 0000 0000 0000 0000
 ..
3960= 0030 00B1 00B2 0033 00B4 0035 0036 00B7
3968= 00B8 0039 0041 0042 00C3 0044 00C5 00C6
3970= 3A5B 3960 3ABC 3ABF 394C 3ABC 3BD0 3BB2
3978= 39EC 3953 3C7D 3C7E 3B58 3CD0 3BEE 0003
3980= 0005 0006 0007 000A 00C6 00D4 0020 002D
3988= 0030 0034 0073 007F 00A0 2004 4001 4003
3990= 4004 4008 7FFF 8004 8009 E001 FFFF FF00
3998= 00FF 000F 0001 0002 0004 0008 0010 C6B1
39A0= C6B2 C633 C6B4 C635 A0A0 3A61 0000 E9E0
39A8= 30F0 10C6 BA03 30A4 1270 71DD AAF8 28C0
39B0= A8C6 30A4 10C7 3E14 6614 720E E9E2 30F0
39B8= 10C6 BA03 30A4 1262 71DD AAE9 28C0 A8C6
39C0= 30A4 10C7 3E14 3904 2801 AE0F 0A26 3E12
39C8= A60E 6004 A401 2ADB AC02 2803 AE26 3A8F
39D0= 628E 2E0F 6005 6105 2905 2905 AE10 2AA1
39D8= AE15 2000 755F 3C03 3E11 3E18 3E21 3E25
39E0= 2ABA AE22 AE0C AE16 0E0F 2C01 6005 AE23
39E8= 2C02 0A03 AE0D 752F 3946 1E26 2E14 6805
39F0= F20C E9E3 2AA4 A8C6 3805 1800 71D9 10C7
39F8= 1E26 E9E2 30F0 3904 720A E9E1 2A98 A8C6
3A00= 3805 1800 71D9 10C7 1E26 E9E0 30F0 10C6
3A08= BA03 30A4 1214 71DD AA9A 28C0 A8C6 30A4
3A10= 10C7 0ADB 2A94 AC02 A60E 6004 A401 3C03
3A18= 3E12 2000 7247 7717 39A8 39B7 3A06 2801
3A20= 0ACC 10C7 AE0F 2C18 F20D 1E26 2E14 F202
3A28= E9E1 7201 E9E3 2C50 0E0F A8C6 3805 1800
3A30= 71D9 E401 2419 F2F7 2C17 4240 A904 72F3
3A38= 3A45 723D 2001 2C01 0AB0 10C7 A60F AE23
3A40= 6623 1E12 F203 2AF5 AE17 7715 2F23 5C3C
3A48= AE13 2F23 1C49 9805 3E0C 660C AE16 B205
3A50= 5450 6005 AE0C 2C54 AE16 6623 2C54 AE27
3A58= 2E25 F308 3C15 7264 0E0F 2E23 6805 AC01
3A60= E401 3AE3 6004 A410 2E14 F201 7104 1C48
3A68= 2C02 6005 9805 1C01 245E A103 6003 6805
3A70= F201 B2FB 7510 3804 7203 0000 0001 22FF
3A78= 30F0 10C6 BA03 30A4 1230 71DD 28C0 A8C6
3A80= 30A4 10C7 A614 6401 2401 2801 AE0F 4226
3A88= AAED 6401 6401 0A74 2803 AC02 A003 2903
3A90= 6003 AE10 2903 5C4C 42E1 2103 B201 2905
3A98= AC01 6003 2903 F205 5C4C 42D8 2103 B201
3AA0= 2905 AC19 3C18 2A08 AE15 3C17 3E12 2A07
3AA8= AE0E 3ACC 7494 3AAE 3A78 0007 3A75 2C17
3AB0= 42C5 AC17 2C02 6005 1C48 9805 4401 AC01
3AB8= 3ABD 3C03 2000 72A6 7717 6E22 F201 7216
3AC0= 2E11 4610 2905 3804 1C4D 9804 A414 6611
3AC8= 1C4A 9805 AE22 2804 4C3C BA39 2E11 4610
3AD0= 2905 3804 1C4E 9804 A415 6611 3E24 3C0F
3AD8= 3C05 3C0D 2E25 BA08 6E0C F202 720E 3A5B
3AE0= 6E16 F3FE 2C54 AE0C 2F23 5C4C 460D 2723
3AE8= B201 2905 AE0B 3E25 6623 2C15 AC0C 3C16
3AF0= 2E14 F201 7203 270B A40D 660B 2C14 4C57
3AF8= F201 7206 2613 F204 2C5B EDE8 3B0D 3946
3B00= 6805 F201 7204 2E13 4C56 F201 72F5 2C14
3B08= 4005 4614 42F4 2905 7105 3C03 3B40 3CD4
3B10= 3CD4 3CB7 3CB7 3CA4 3CA4 3B88 3B88 3B2C
3B18= 3B2C 3C35 3B76 3C1B 3B5F 3C3C 3B90 3BF5
3B20= 3B2E 3C1B 3B5F 3C64 3B7A 3B2C 3B2C 3B2C
3B28= 3B2C 3B2C 3B2C 3B2C 3B2C 2C5A EDE8 2C50
3B30= AC0D 2000 7530 2805 BD38 4C3F F207 4443
3B38= F2F6 3C0D 2000 7530 B2FD 7538 2C50 AC0D
3B40= 72F9 2E22 AC0C 3C05 2000 7530 2805 BA11
3B48= 2C05 1C4F 3804 9804 4610 4611 AC10 2905
3B50= 5C51 5413 2004 BA02 1C57 9805 AD10 6405
3B58= 72EB 2C05 6005 1C48 9805 4611 AE11 752D
3B60= 2000 7530 2805 BA06 1C57 9C0D 2C0D 4413
3B68= AC0D 72F5 2C14 4C3D F21A 2C0D 5C51 F201
3B70= 7538 1C57 9C0D 2C0D 4446 AC0D 7538 2C03
3B78= 4622 AC03 752D 2C54 AC16 2000 7531 2805
3B80= BA06 1C56 9C0D 2C0D 4413 AC0D 72F6 3C16
3B88= 7538 2E22 6805 AC03 4F0E BD2D 2C03 AF0E
3B90= 752D 2000 7530 2C13 BD38 4C46 F2FA 4444
3B98= F212 4455 F202 6C03 640C 2000 7531 2C13
3BA0= BA0C 2C0D D43D 4413 AC0D BA02 2004 F2F5
3BA8= 2C4C AC0D 72F2 6624 72F0 2E24 F538 3805
3BB0= 4C0D AC0D 7538 A003 2000 7530 2805 BA07
3BB8= 5C45 AC13 4C42 BA0E 4C3D B204 443D AC13
3BC0= 6003 7103 2416 F206 4C3C BA04 4C3B B202
3BC8= 4458 72F5 2C13 4C40 F202 2C50 72F1 3805
3BD0= 72EE 6004 A410 2003 A411 2C0C F201 B202
3BD8= 2C50 7213 6C0C 2C03 4C02 BA02 2C46 720D
3BE0= 2C03 3804 1C4F 9804 4401 2905 2004 BA02
3BE8= 1C4B 9805 5C52 6403 1C11 AC13 7510 2C0D
3BF0= AF0B 660B 2C0C F52C 2C5C EDE8 2C54 4C0C
3BF8= F203 2000 7534 72FA 2C0D F203 1C3F 2000
3C00= 7535 1C3E 2000 7535 2C4C AC0C 3C05 2E11
3C08= 4610 AC10 2C05 3804 1C4F 9804 4410 2905
3C10= 2004 BA02 1C4B 9805 5C52 A803 2000 7535
3C18= 6405 6E22 F536 72EE 2E27 D455 4C0C AC0B
3C20= 2C14 4C3C F203 3805 4C0B AC0F 2C0B B204
3C28= 2000 7534 640B BAFC 2C0D 1C4B 9805 5C52
3C30= 1805 2000 7535 1C57 9C0D 72F6 2C52 AC0C
3C38= 2000 7534 6E22 F52D 72F9 2C0D B204 3805
3C40= 4C0D AC0D 6624 2C2E 443A AC0E 6C0E 640F
3C48= 3804 2C0D DC3D A50E AC0D F201 72F7 2C15
3C50= 4C0F 4E24 AC0F BA05 F204 2000 7534 6C0F
3C58= 72FB 2E24 F203 1C41 2000 7535 2D0E 442B
3C60= 1905 2000 7535 640E 72F9 2C0C 4C56 AC0F
3C68= BA10 F205 2000 7534 6C0F F201 72FB 2C0D
3C70= 1C47 9805 AC0D 5C53 442B 1905 2000 7535
3C78= 72F6 1C56 9C0D 640F F2F2 72FB 1C46 6004
3C80= A224 2C0F B202 640F 7104 2803 AC12 2C02
3C88= 4C03 BD2C 3804 2C03 1C4F 9804 4401 AC11
3C90= 2905 5C51 5412 2004 BA02 1C57 9805 AD11
3C98= 6403 2C03 4F0E BA02 2C03 AF0E 2C0C F52C
3CA0= BD2C 6C0C F52C 7301 0000 2E18 AC10 6618
3CA8= 4C56 BA02 2C5D EDE8 2C10 4002 A801 2E22
3CB0= AE19 AC19 2E11 AE1D AC1D 0A02 752D 3946
3CB8= 2E18 6805 AC10 F20C 4002 A801 6C19 F204
3CC0= 2C1D AE11 0AF5 752D 0AF3 2C10 AE18 752D
3CC8= 0A19 2E1D AE11 2E19 AE22 2E0C 4E16 F201
3CD0= 720D 2C50 AE25 AE12 752A 2E14 F201 7206
3CD8= 2F0E F201 7203 670E 2C5E AD01 2C2D AE17
3CE0= 7715 3946 2C04 4C03 BA02 2C7E 720D 2C04
3CE8= 3804 1C91 9804 4402 2905 2004 BA02 1C87
3CF0= 9805 5C97 6404 1C26 AC2B 7525 2E13 6805
4000= 50305190 F900 F910 F920 F930 F940 F950
4008= F960 F970 F980 F990 F9A0 F9B0 F9C0 3860
4010= 3860 3860 3860 3860 5040 51B0 5050 51A0
4018= 51D0 51C0 5020 5160 5150 5180 5170 55A0
4020= 5590 3860 3860 F880 F870 F690 3A50 FA40
4028= FA30 FA00 FA10 FA20 38A0 3000 30B0 30C0
4030= 3130 3120 3110 3100 3220 3230 3240 3250
4038= 3260 3080 3090 3090 3090 5270 32B0 32A0
4040= 32C0 32D0 5280 5290 5010 5140 53D0 53C0
4048= 53A0 53B0 5380 5390 9AA0 9AB0 9AC0 9AD0
4050= 9A80 9A90 9A60 9A70 9BD0 9BC0 9BB0 9BA0
4058= 9B90 9B80 3860 3860 3860 3860 3860 0000
 ..
40C0= 0000 0000 0000 0000 0000 0000 FFFF FFFF
40C8= 0000 0000 0000 0000 0000 0000 0000 0000
 ..
4420= 4429 0000 0000 0000 0000 0000 0000 0000
4428= 0000 4986 0AFF 2CC3 F201 75DE 75DC 2CDD
4430= 126B AEDE 2CDE 1269 AE02 2CDD AE0E AE10
4438= 1265 2E00 F201 75DF 2CDD ACC5 2CDD ACC4
4440= ACC2 75E0 2CDE ACC5 72F9 2CC5 F201 72F6
4448= 2CDE 1255 AE00 1251 2E15 4CE1 F202 BA01
4450= 72F1 2CDE 124C AE01 ACC2 ACC4 2CE2 4CE3
4458= BA01 3CE2 64E2 EF44 003D 449F 44AC 44AE
4460= 44AA 48D0 449F 44AC 44A1 48D4 48D0 449F
4468= 44AC 44AE 44AF 48D0 449F 44AC 48CE 48D4
4470= 48D0 449F 44AC 44AE 48D2 48D0 449F 44AC
```

```
4478= 48C8 48D4 48D0 449F 44AC 44AE 44AA 48D0
4480= 449F 44AC 48CA 48D4 48D0 449F 44AC 44AE
4488= 44AF 48D0 449F 44AC 48CC 48D4 48D0 449F
4490= 44AC 44AE 44AF 48D0 449F 44AC 44A3 48D4
4498= 48D0 00E2 7205 4000 4100 1389 4200 10D6
44A0= EF5C 75E4 EF5B 75E4 12F7 2EF8 54E5 F201
44A8= 75E4 EF55 75E4 EF54 75E4 EF53 75E4 EF52
44B0= 12EC 2E07 F201 75E6 12E7 2EF6 F201 75E6
44B8= 12E3 2EEA F201 75E6 12DF 2EE3 F201 75E6
44C0= 2CDD 1241 AEE0 12DB AE7B 12D7 2E03 F201
44C8= 75E7 2CC4 F201 75E7 2CC9 F201 75E8 2CDD
44D0= ACC8 2CDE ACC9 EF30 00E9 00EA 00EB 00EC
44D8= 2CDD 12C2 AEDE AEF9 2CDD ACC1 12BD AEFF
44E0= AEF3 AEFA 2CEE ACED 2CED 421F ACEF 2CDD
44E8= ADEF 64ED 2CF0 4CED B2F7 1218 2E00 F201
44F0= 75F1 2CC0 F201 75F2 12A8 2E05 F201 75F3
44F8= 2CDD 12A5 AE80 720A 4B29 4F81 50C1 53E1
4500= 5501 5869 4300 07F6 4A50 1185 2CDD ACC0
4508= 1293 2EF5 54E5 F201 75F4 2CDE 12F4 AED6
4510= 128B AEFF ACCC 1288 2EE2 54E5 F201 75F5
4518= 2CDE 1282 AEFF ACCD 1254 2EE7 54E5 F201
4520= 75F6 2CDE 124E AEFF ACCE 124B 2EE1 54E5
4528= F201 75F7 2CDE 1245 AEFF ACD0 1243 2E04
4530= 54E5 F201 75F8 2CDE 123C AEFF ACD1 12CB
4538= AED7 1238 2E0F F201 75F9 1233 2EFD 54E5
4540= F201 75FA 2CDE 12BF AEDE 122B AEFF ACD2
4548= 1228 2EF1 54E5 F201 75FB 2CDE 1222 AEFF
4550= ACD3 1220 2E08 54E5 F201 75FC 2CDE ACD4
4558= 1218 AEFF 1216 2EEB 54E5 F201 75FD 2CDE
4560= ACD5 120F AEFF 120E 2E0A F201 75FE 2CDD
4568= 120A AE8B 1206 2EFF F202 1206 77FF 7204
4570= 4000 4100 4200 4986 2CDD ACBF 1259 2E01
4578= AE00 1256 2E00 4255 ACEF 2CDD ADEF 1250
4580= 6600 2E02 4E00 B2F5 2CDD 1249 AEE4 AEE3
4588= 12E9 2E0F F202 1244 7703 12E3 2EFC 54E5
4590= F202 123E 7704 2CDE 12DC AEFA 12DA 2EFB
4598= 54E5 F202 1235 7705 12D5 6612 2CDE 12D1
45A0= AEF3 12CF 2EE8 54E5 F202 122A 7706 2CDE
45A8= 12C8 AEF3 12C7 2E17 6805 F201 B202 1220
45B0= 7707 12BF 2EFA F202 121B 7708 2CEA 12BA
45B8= AE13 2CDD 12B8 AE84 AE85 12B4 2E17 1210
45C0= 4E09 BA02 120D 770A 12AC 2EF3 F202 1208
45C8= 770B 2CEA 12A7 AE12 AE14 7203 4300 4A86
45D0= 41FF 2CDD 12A0 AE86 AE87 AE88 AE89 12F8
45D8= 770C 1298 2E13 F201 7202 12F2 770D 2CDD
45E0= 1292 AE86 AE87 AE88 AE89 128C 2E13 12E8
45E8= 4E0E B202 12E5 770F 2CEA 1234 AE13 125C
45F0= 2E00 F202 12DD 7710 1256 2E00 54E5 F202
45F8= 12D7 7711 124F 2E17 4005 424F ACEF 3804
4600= 3805 C5EF 124B AE01 A600 1244 2E31 2630
4608= 1246 AE01 A600 1244 2E01 2600 EDEB 0112
4610= 12BF AE15 A614 123B 2E01 2600 EDEB 0114
4618= B202 12B6 7716 1234 2E01 2600 EDEA 0112
4620= 12AF AE18 A617 122B 2E01 2600 EDEB 0117
4628= F203 BA02 12A5 7716 2CDD 12A1 AEE1 AEE2
4630= 2CDE AEE3 129D 7710 121A 2E01 2600 EDEB
4638= 8119 F203 BA02 1294 771A 2CDE 1290 AEE1
4640= 2CDD AEE3 AEE2 128C 7710 2CDD 1288 AEE1
4648= 7207 4100 1389 1185 49D8 1324 1326 1334
4650= 2CDE AEE2 2CDD AEE3 125D 7710 2CDE 1257
4658= AE7B 1256 AEE0 2CC8 F202 1254 771B 2CDE
4660= ACC8 2CDD ACC9 2CDE 1249 AEF9 AEDE 2CE9
4668= 54E5 6005 ACEF EF45 00E9 00EF 00EB 00EC
4670= 2CDE 1241 AE00 123E 771C 2CDD 1239 AEE1
4678= AEE2 AEE3 1237 771D 12CF 2E00 F202 1232
4680= 771E 122C 2EF7 F202 122D 771F 2CDD 1228
4688= AEE4 2C66 1227 AE20 1225 2E20 4005 ACEF
4690= 4223 AE21 2CEF 4221 AE22 12BA 2E01 2600
4698= EDEB 8122 BA03 F202 3805 F201 28A0 1212
46A0= AE23 3804 3805 C721 EDEB 8119 BA03 F202
46A8= 3805 F201 28A0 5E23 7208 4000 4200 4300
46B0= 07F6 4A86 1376 498A 49A4 F202 12FB 7724
46B8= 12F9 6620 2C67 4E20 B2CF 2CDE 12EF AEFF
46C0= 2CDD 12ED AE8A AE81 2CDE AE80 12EB 7725
46C8= 1282 2E00 54E5 F202 12E5 7726 125E 2E39
46D0= 2638 125E AE01 A600 125C 2E01 2600 EDEA
46D8= 0112 12D8 AE18 A617 1253 2E01 2600 EDEB
46E0= 0117 F203 BA02 12CE 7716 124B 2E01 2600
46E8= EDEB 0112 12C7 AE18 A617 1242 2E01 2600
46F0= EDEB 0117 B202 12BE 7716 2CDD ACC0 12BA
46F8= 2E28 2627 1232 AE39 A638 2CDD 12AF AEF7
4700= AEF2 AEE6 12AD AEE1 AEE2 2CDE AEE3 12AA
4708= 7710 2CDD 12A5 AED6 12A5 7729 2CDD 12A0
4710= AED7 12A0 772A 2CDD 129B AEDE 129B 772B
4718= 2CDD 1296 AEDE 75FD 1211 2E00 F202 1292
4720= 772C 2CDD 128D AEE4 128D 2E2E AE2D 128A
4728= 2E2D 4205 ACEF 7205 4100 1185 41FF 1326
4730= 1334 2CDD ADEF 125A 662D 2E2F 4E2D B2EF
4738= 2C66 1254 AE30 1252 2E30 4005 ACEF 424F
4740= AE21 2CEF 424D AE22 12EC 2E01 2600 EDEB
4748= 8122 BA03 F202 3805 F201 28A0 123F AE23
4750= 3804 3805 C721 EDEB 8119 BA03 F202 3805
4758= F201 28A0 5E23 F202 1231 7731 122F 6630
4760= 2C67 4E30 B2D8 2CDD 1227 AEE1 AEE2 2CDE
4768= AEE3 2CDD 1220 AE82 2CE9 1220 AE32 121E
4770= 2E32 4634 AE33 2E32 4218 ACEF 2DEF F202
4778= 1215 7735 1213 2E33 42B2 ACEF 2CDD ADEF
4780= 120D 6632 2CF0 4E32 B2EA 1204 2E00 54E5
4788= 7207 1389 4200 4300 4A50 4A86 498A 49A4
4790= F202 12FC 7711 2CBF F202 12F8 7710 2CDE
4798= ACBF 1297 2E01 2600 1293 AE01 A600 12EE
47A0= 7710 12EC 2E33 428B ACEF 2CDE ADEF 72D8
47A8= 12E5 2E36 ACED 2CED 4282 ACEF 2CDD ADEF
47B0= 64ED 12DC 2E37 4CED B2F6 12D8 7710 2CEA
47B8= 1258 AE12 12D3 7738 1254 6E17 2E17 4005
47C0= 4253 ACEF 3804 3805 C5EF EDEF 12C5 AEA7
47C8= 124A 2E00 F202 12C2 7739 2CDE 12BC AE85
47D0= 2CDD AE84 123E 6613 12B9 770C 123A 2E12
47D8= F203 BA02 12B3 773A 2CDD 12AD AE86 AE87
47E0= 1230 2E14 F201 7202 12A9 773B 122A 2E14
47E8= 12A5 4E3C B202 12A2 773D 2CEA 1222 AE14
47F0= 129D 770C 121E 6614 1299 770C 121A 6617
47F8= 121A 2E00 F202 1292 773E 2CDE 128C AE89
4800= 72F1 2CDE 1288 AE88 72ED 2CDE 1284 AE84
4808= 2CDD AE85 72C7 2CDD 1205 AE88 AE89 7204
4810= 4100 4200 1185 49D8 12FC 2E12 6805 F201
4818= 7202 1256 773F 12F5 2E12 1252 4E0E B202
4820= 124F 770C 2CEA 12ED AE12 124A 770C 12E9
4828= 6617 2E17 4005 42E8 ACEF 3804 3805 C5EF
4830= EDEF 123C AEA7 12DF 2E00 F202 1239 7740
4838= 2CDE 12D8 AE87 1234 770C 2CDE 12D3 AE86
4840= 122F 770C 2CDE 122A AEE4 122A 2E41 ACED
4848= 2CED 4227 ACEF 2CDD ADEF 64ED 1221 2E37
4850= 4CED B2F6 2CE9 ACED 2CED 121A 4643 AE33
4858= 2CED 4634 AE42 2CED 4212 ACEF 2DEF F202
4860= 120F 7744 120D 2E33 420C ACEF 2CDD ADEF
4868= 1207 2E42 4206 ACEF 7204 4300 4A50 4A86
4870= 41FF 2CDD ADEF 64ED 12F8 2E45 4CED B2DC
4878= 12F7 7710 12F5 2E33 42F4 ACEF 2CDE ADEF
4880= 72E7 2CDE 128F AE82 12EB 7746 12E9 2E20
4888= 4005 4254 ACEF 3804 3805 C5EF 1282 AE39
4890= A638 2CDD 1247 AEFF 1247 AE80 1244 2E00
4898= F202 12D6 7747 2CDE 123F AE8A 12D1 7726
48A0= 2CDD 123A AE8A 2CDE 1235 AEF7 1235 AE81
48A8= 12C7 7748 2CDD 1230 AE80 2CDE 12BF AEE4
48B0= 12BF 7726 2CDD 12BA AEE1 AEE2 AEE3 ACBF
48B8= 1221 AEF7 1224 2E01 2600 121F AE01 A600
48C0= 12AF 7710 2CDE 1218 AE8B 1214 AEFF 12A0
48C8= 7749 EF16 75E4 EF15 75E4 EF14 75E4 EF13
48D0= 75E4 EF12 75E4 EF11 75E4 2CC2 F201 75E4
48D8= 720C 4000 1389 4200 1326 49BE 12F8 5969
48E0= 5B01 5D49 5E41 6561 5F69 EF57 75E4 12F2
48E8= 2EDB 1284 AEF0 124D 2E0A 124C AEF1 1249
48F0= 2E0C 1248 AEF2 2CE9 ACED 2CED 4244 ACEF
48F8= 2CEA ADEF 64ED 1240 2E4A 4CED B2F6 2CE9
4900= ACED 2CED 1239 4E4B F201 7202 1235 774C
4908= 2CED ACEF 4233 1230 AE21 2CEF 4230 AE22
```

```
4910= 2F22 5721 54E5 F202 1227 774C 2CED ACEF
4918= 4225 1222 AE21 2F21 ACCA 2CEF 4220 AE22
4920= 2CCA AF22 2CEF 421C AE4F 2F4F AE4D 2CEF
4928= 4218 AE50 2F50 AE4E 2E4D AE51 4213 AE52
4930= 2E4E AE53 AE54 2CCA 1E54 EDF2 8152 720A
4938= 4100 4300 4986 4A86 6081 43C9 43F2 49F2
4940= 4A1B 4A5B 2E51 42F7 AE55 2E53 AE56 2CDE
4948= 1E56 EDF2 8155 64ED 12EF 2E57 4CED B2B1
4950= EF2F 014A 00D6 0068 0001 EDE7 75DB 2CE9
4958= ACED 2CED ACEF 42E2 12DF AE21 2CDD AF21
4960= 2CEF 42DD AE22 2CDD AF22 64ED 12D5 2E57
4968= 4CED B2EF 2CDE 1213 AEDE 2CEA 12CA AE15
4970= 12CB AE58 12C9 2E58 4E59 F203 BA02 12C4
4978= 775A 12C2 6658 EDE7 72F5 7202 4000 07F6
4980= 0000 0000 0000 0000 0000 0000 0000 0000
4988= 0000 0000 0000 0000 4BD2 0000 4BE9 C000
4990= 4C93 8000 4CA2 8000 4BDD 4000 4C91 0000
4998= 4C9D 8000 4BF6 4000 4C98 8000 4CAF 0000
49A0= 4BE7 4000 4C90 6000 4CA3 C000 4BDA C000
49A8= 4BF6 4000 4C99 C000 4CA8 2000 4BFC 8000
49B0= 4C9A 6000 4CA5 0000 4C81 6000 4CA0 A000
49B8= 4CB7 2000 4BF2 8000 4C96 0000 4CAB 4000
49C0= 4BCE 4000 4BE7 4000 4C92 4000 4C9F 6000
49C8= 4C80 2000 4C9B A000 4CA7 8000 4BF1 4000
49D0= 4C96 0000 4CA8 C000 4BE1 0000 4C8D 4000
49D8= 4CA0 A000 46C8 0000 47C8 0000 4896 0000
49E0= 48C8 0000 48FA 0000 4996 0000 49AF 0000
49E8= 49C8 0000 49E1 0000 0005 0007 0001 0002
49F0= 0008 0010 000C 0003 0003 0003 0003 0003
 ..
4A00= 0003 0001 0001 0001 0000 0001 0001 0001
4A08= 0002 0002 0002 0002 0002 0002 0002 0002
4A10= 0002 0002 0002 0002 0002 0004 0004 0001
4A18= 0004 0005 0005 0005 0000 0001 0002 0003
4A20= 0004 0005 0006 0007 0008 0009 000A 000B
4A28= 000C 000D 0007 0008 0009 0000 000B 000C
4A30= 000D 0000 0001 0002 0003 0004 0005 0006
4A38= 0007 0008 0009 000A 000B 000C 0000 0001
4A40= 000A 0002 000A 000C 000D 0000 0000 0000
 ..
4A60= 0000 4437 4956 0000 FFFF 4444 4455 1C20
4A68= 0000 003C 44AF FFFF 4655 465A 44DB 0001
4A70= 0000 0006 0200 0000 0002 0000 000B 4674
4A78= 44F7 467B 4708 451B 4524 452D 470D 4717
4A80= 4712 4550 4559 4562 48C1 471B 0000 008E
4A88= 00A2 47A7 4595 47B6 45A9 45BC 45D8 0009
4A90= 45EE 47D5 45EE 47BD 00B4 47D1 48E6 48B1
4A98= 43E0 0000 0000 0000 4633 0000 0000 1334
4AA0= 4644 4672 44DB 44F0 48A9 46C7 0000 0000
4AA8= 0000 0000 4835 4505 4507 0000 0000 4512
4AB0= 4538 4547 4841 0000 008D 0096 0000 4880
4AB8= 0000 0000 0097 47A0 0085 008A 45A0 4804
4AC0= 480A 47F5 012C 47F1 4800 4826 483C 0083
4AC8= 0000 008C 4879 000A 45F3 489F 46CD 4569
4AD0= 0005 0012 494A 0000 0000 0000 0000 0000
4AD8= 0000 0000 0000 0000 0000 0029 0000 0078
4AE0= 442E 0000 0000 0000 0000 0000 0000 0000
 ..
4B28= 0000 4DB7 2801 0AFE AC01 124B 2E0F F202
4B30= 1249 7743 2C91 1246 5644 F202 1243 7745
4B38= 1240 2E02 F202 123E 7746 123C 2E47 1239
4B40= AE02 1239 2ED3 F202 1235 7748 1235 2E01
4B48= 2600 EDEA 014B 122E AE4A A649 122B 774D
4B50= 1228 2E43 2642 AE21 A620 1224 2E47 1223
4B58= AEF4 121F AE09 121E 2E4E EDEE 121A AE2D
4B60= A62C 2E33 2632 AE2B A62A 1214 2E47 1213
4B68= AEEF 1210 2E4C 264B AE4A A649 120A 2E21
4B70= 2620 EDEB 014F F201 B202 1204 7751 7204
4B78= 4100 4EB7 4000 1334 12FD 2E53 2652 AC89
4B80= A488 2C90 248F 12F5 AE19 A618 1263 2E00
4B88= F202 12F0 7754 12EE 2E4E EDEE AE56 A655
4B90= 2E4A 2649 EDEC 0149 EDEC 0159 AE58 A657
4B98= 2E47 1251 AED2 12DE 2E58 2657 EDEC 015B
4BA0= AE5E A65D 2C2A 2429 EDEB 015D EDEC 00E7
4BA8= AE60 A65F 2CEA 24E9 EDEC 0027 AE62 A661
4BB0= 2C26 2425 EDEC 8163 EDEC 0157 EDEA 0161
4BB8= EDEA 015F ACC8 A4C7 12BD 2E65 AE64 12BA
4BC0= 2E64 4005 AE66 4228 AE67 2E64 D668 4005
4BC8= AE69 4223 AE6A 2E66 4221 AE6B 2E69 421F
4BD0= AE6C 2E66 421D AE6D 2E69 421B AE6E 2E66
4BD8= 4219 AE6F 3804 3805 C76F EDEC 816E AE71
4BE0= A670 3804 3805 C76D EDEC 816C AE73 A672
4BE8= 7209 1185 4300 4E7C 4DD6 4E9A 4DD8 4E9E
4BF0= 4DDA 4E9C 3804 3805 C76B EDEC 816A EDEA
4BF8= 0172 EDEA 0170 1E67 A103 6003 A903 125C
4C00= 6664 2E74 4E64 B2BB 2E06 2605 EDEC 0081
4C08= AE5E A65D 2E04 2603 EDEC 007F EDEA 015D
4C10= ACE6 A4E5 1249 2E75 AE64 1246 2E64 4005
4C18= AE66 42D8 AE67 2E66 42CF AE69 3804 3805
4C20= C769 1E67 A103 6003 A903 1236 6664 2E76
4C28= 4E64 B2EB 2CC8 24C7 122E AE29 A628 122C
4C30= 2E7A 2679 AE78 A677 1227 2E75 AE64 1224
4C38= 2E64 4005 AE66 4222 AE67 2E66 42B3 AE69
4C40= 3804 3805 C769 EDEC 8167 EDEA 0177 AE78
4C48= A677 1212 6664 2E76 4E64 B2E9 2E78 2677
4C50= EDED 008B 1208 AE33 A632 1206 2E7B 1205
4C58= AEFE 7204 4100 4EB7 4000 4DBA 12FC 2E33
4C60= 2632 EDEB 014F BA02 12F7 777C 12F5 2E47
4C68= 12F4 AEFE 12F1 2E4E AE7D 12EE 777E 12EC
4C70= 2E7D 4E7F BA02 12E8 777E 2C87 12E5 467D
4C78= AE7D 2C92 4005 4264 12DF AE66 12DC 2E41
4C80= 2640 12DA 1E66 A103 6003 A903 2C92 4E80
4C88= BA02 12D2 7781 6492 2C92 4005 4251 12CC
4C90= AE66 3804 3805 C766 12C6 AE27 A626 2CC8
4C98= 24C7 EDEB 8182 12BF AE35 A634 2C94 4C02
4CA0= F201 7202 12B9 7783 6494 12B6 7784 12B4
4CA8= 2E85 4005 AE66 4235 AE67 12AD 2E35 2634
4CB0= 12AB 1E67 A103 6003 A903 2E66 422B AE69
4CB8= 12A2 2E33 2632 12A0 1E69 A103 6003 A903
4CC0= 2E85 4E74 BA02 1298 7786 1296 6685 1294
4CC8= 2E85 4005 AE66 4215 AE67 3804 3805 C767
4CD0= 128A AE25 A624 1288 2E66 420C AE69 3804
4CD8= 3805 C769 1204 AE23 A622 7204 4100 4E5E
4CE0= 4EBC 4EDA 1257 2E4E AC94 12F9 2E33 2632
4CE8= EDEC 0189 124F AE5E A65D 2CEA 24E9 EDEC
4CF0= 018B AE60 A65F 2CC8 24C7 EDEC 018D EDEA
4CF8= 015F EDEB 015D EDEC 018F EDF0 AE62 A661
4D00= EF3C 0161 12DC AE3B A63A EDEC 0191 EDEA
4D08= 0191 1230 AE88 A687 12D2 2E15 122B 4E7F
4D10= F201 B202 1227 7793 1225 2E88 2687 EDEF
4D18= 1223 AE9A 12C4 2E3B 263A EDEB 0088 B202
4D20= 1219 7794 1217 2E7B 1219 AE39 0C01 E401
4D28= 1211 2E47 1213 AE39 72F9 120C 2E7B 120C
4D30= AED2 1209 AEEF 12AB 2E43 2642 AE21 A620
4D38= 7205 4EB7 4000 4300 0F0C 4200 12FB 2E56
4D40= 2655 EDEB 0003 F201 B202 12F4 7795 2C86
4D48= 2485 12F0 AE58 A657 12ED 7796 12EB 2E56
4D50= 2655 EDEA 0197 AE56 A655 EDEC 0199 EDEA
4D58= 019B AE58 A657 12DE 7796 12DC 2E9E 269D
4D60= AC89 A488 2C8E 248D 124A AE19 A618 12D2
4D68= 779F 12D0 2E75 AC92 12CD 77A0 12CB 2E75
4D70= AE85 12C8 77A1 123B 2E15 4487 AE15 0C01
4D78= E401 12C0 2E75 AEA2 12BD 2EA2 4005 AE66
4D80= 422F AE67 122C 2E43 2642 12B4 1E67 A103
4D88= 6003 A903 2E66 4225 AE69 1221 2E43 2642
4D90= 12A9 1E69 A103 6003 A903 12A4 66A2 2E76
4D98= 4EA2 B2E2 129F 7745 129D 2E4E 1210 AE15
4DA0= 1299 2E7B 120C AE02 1295 77A3 1208 2E43
4DA8= 2642 AE21 A620 128E 77A4 7203 4100 4E7C
4DB0= 4E9C 0000 0000 0000 0000 0000 0000 0000
4DB8= 0000 000C 46F0 0000 3F84 0B78 3FFD 07C8
4DC0= 3FEE 2EB0 3FDF 62B6 3FD0 89A0 3FC1 BDA4
4DC8= 3FB2 E48E 3FA4 1892 3F95 3F7C 3F86 7380
4DD0= 3EEF 34D6 3ED1 9CE0 3EB3 EAB2 3E96 3886
4DD8= 3DF1 4120 3CC4 9BA4 36B9 66BE 3EBA B96E
4DE0= 40D1 51A4 3DC2 E2B8 3DB7 CAA6 40D0 AA52
4DE8= 3DC3 3F84 3DB7 774A 40D0 A924 3DC3 9E6A
4DF0= 3DB7 0DE8 40D0 AA74 3DC4 167A 3DB6 A0DA
```

```
4DF8= 40D0 A914 3DC4 93C8 3DB6 1672 40D0 AAB8
4E00= 3DC5 332A 3DB5 831E 40D0 A936 3DC5 E13A
4E08= 3DB4 C660 40D0 AB0C 3DC6 C2AC 3DB3 F4A8
4E10= 40D0 A914 3DC7 C286 3DB2 E168 40D0 AB80
4E18= 3DC9 1644 3DB1 9EF8 40D0 A958 3DCA B2E0
4E20= 3DAF EB4A 40D0 AC3A 3DCC F4A4 3DAD C1A4
4E28= 40D0 A936 3DD0 1B00 3DAA BABE 40D0 A548
4E30= 3DD4 9D7A 3DA6 149C 40D0 A9CC 3ECB CBA2
4E38= 40CD 0D16 0000 0000 4AFA 0000 0005 38A3
4E40= D70A 003C 4392 DFA4 46D2 0000 468C 0000
4E48= FFFF 0000 0000 0000 0000 0000 0000 0000
 ..
4EF8= 0000 0000 4D9B FFFF 4B3C 4D78 0000 4B4F
4F00= 0000 0000 4AFA 0000 486D 0000 48FA 0000
4F08= 4D5C 38A3 D70A 4D2C 0000 0000 0000 0000
4F10= 30D0 0998 36B8 27FA 0000 0000 0000 0000
4F18= 0000 0000 4140 0000 0002 0000 0000 0003
4F20= 0000 0000 0000 0000 0000 0000 0000 0000
4F28= 0000 0000 0000 000F 0001 0010 0000 0000
4F30= 0000 0000 FFFF 4C6E 0000 4C78 1C20 000A
4F38= 4D63 4132 4CAC 4CE4 0000 4D6D 0000 0000
4F40= 46AB 6D90 44D6 48E8 45EB B6AE 2D86 37BC
4F48= 4E9C 4000 4D72 4D27 4D4D 4DA5 4180 0000
4F50= 459B 3332 4983 0000 38E5 6040 4885 4C8B
4F58= 4CC6 0000 4B31 4B9A 37BC 4E9C 4000 4D82
4F60= 4D80 4D3B 4D5B 4DBA 4180 0000 459B 3332
4F68= 4983 0000 38E5 6040 4885 4C8B 4CC6 0000
4F70= 4B31 4B9A 0000 0000 0000 0000 0000 0000
 ..
4F80= 0000 5081 2801 0AFE AC01 125F 2E6B 266A
4F88= EDEB 8017 AC08 A407 2E09 2603 EDEB 8013
4F90= AC06 A405 2E71 2679 EDEB 0011 AC0A A409
4F98= 2C08 2407 EDEB 000D EDEC 001A EDEA 0007
4FA0= AC0C A40B 2C06 2405 EDEB 0011 EDEC 001A
4FA8= EDEA 0005 AC10 A40F 2C0A 2409 EDEB 0015
4FB0= EDEC 001A EDEA 0009 AC14 A413 2C08 2407
4FB8= AC0E A40D 2C06 2405 AC12 A411 2C0A 2409
4FC0= AC16 A415 1222 2E10 F201 751C 2C1D 121E
4FC8= AE3B AE3C 2C1D 121B AEE9 AEEA AEE8 AEE7
4FD0= 1214 2E87 2686 EDEB 001E BA01 7520 120D
4FD8= 2E87 2686 EDEB 0021 BA01 7523 1206 2E87
4FE0= 2686 EDEB 0024 7203 4100 4200 4000 F201
4FE8= B201 7520 12FA 2E87 2686 EDEB 0026 F201
4FF0= B201 7523 2C1D 12F2 AE3F AE40 12F0 AEE9
4FF8= 1265 AED5 12EA 2E10 F201 7528 2C29 12E5
5000= AE10 752A 752A 2413 EDEB 002B BA01 752D
5008= 2C1D 12DC AE3D 2C14 2413 EDF0 EDEB 002B
5010= BA01 752E 2C1D 12D2 AE3E 2C1D AC04 752A
5020= F201 752F 2C04 F201 752F 2C1D 12C0 AEE2
5028= 0C01 E401 2C0C 240B EDEB 0030 BA01 7532
5030= 2C10 240F EDEB 0030 BA01 7532 2C0C 240B
5038= EDF0 EDEB 0030 BA01 7533 2C10 240F EDF0
5040= EDEB 0030 BA01 7533 2C1D 12A0 AE3B AE3C
5048= 2C1D AC03 7534 2C29 1299 AE3E 72CE 2C29
5050= 1295 AE3B 2C1D AE3C 2C29 AC03 7534 2C29
5058= 128D AE3C 2C1D AE3B 7201 4300 72F5 2C29
5060= 1285 AE3F 1284 AEEA 2C29 1215 AEE9 AEE7
5068= 12F5 AED5 728F 2C1D 120D AE3F 2C29 AE40
5070= 72F3 2C29 1208 AEE2 2C1D AC03 AC04 72B0
5078= 7202 4200 4000 0000 0000 0000 0000 0000
 ..
5098= 416E 416C 4172 43A0 0000 5029 0000 40BD
50A0= 70A2 505E 40B5 C28E 506A 3E83 126E 3EA1
50A8= CAC0 5001 FFFF 501E 48FA 0000 5017 504A
50B0= 5070 4896 0000 504E 5056 4FC9 0000 0000
 ..
50C0= 0000 5240 2801 0AFE AC01 125B 2ED3 F201
50C8= 7504 0C01 E401 2C0B 1256 AE00 2EB3 26BA
50D0= EDEC 000C AC0F A40E EF4D 000E EDEC 0010
50D8= EDEA 0012 AC15 A414 EF45 000E EDEC 0010
50E0= EDEB 8016 EDEC 0017 EDED 0014 EDEA 0019
50E8= AC06 A405 EDEB 801B AC08 A407 1235 2E01
50F0= 2600 EDEC 001C AC1F A41E 2C21 2420 EDEB
50F8= 001E EDEC 8016 AC23 A422 2C25 2424 EDEB
```

```
5100= 0022 EDEC 8016 AC27 A426 2C29 2428 EDEB
5108= 0026 EDEC 8016 EDEA 002A 1215 AE2F A62E
5110= EDEA 002C AC0A A409 2C0A 2409 EDEF 120D
5118= AE9B 2C0A 2409 EDEB 802E B201 752F 7205
5120= 4000 529C 4100 11E4 4300 2C30 125B AE47
5128= 2C0B AE48 AE49 AE4A 2C30 12F5 AE00 2C06
5130= 2405 EDEF 12F2 AE9C 12EE 2E43 2642 EDEF
5138= 12EC AE9D 2C30 1246 AE4B AE4C 2C08 2407
5140= EDEB 0031 F202 BA01 7533 2C08 2407 EDF0
5148= EDEB 002C F202 BA01 7534 2C0B 12D6 AED4
5150= 1231 AE4D AE4E 12CD 2EE9 F201 7535 2C0B
5158= 1229 AE4F 12C6 2EF5 F201 7536 2C0B 1222
5160= AE50 12C1 2E04 F201 7537 2C0B 121B AE51
5168= 12B8 2EEC F201 7538 2C0B 1214 AE52 12B1
5170= 2EEB F201 7539 2C0B 120D AE53 120C 2E00
5178= 543A F201 753B 2C0B 1205 AE54 12A2 2EC7
5180= 7202 4200 1190 F201 753C 2C0B 12FB AE55
5188= 1298 2EE4 F201 753D 2C0B 12F4 AE56 1291
5190= 2EEE F201 753E 2C0B 12ED AE57 128A 2EED
5198= F201 753F 2C0B 12E6 AE58 1283 2ECD F201
51A0= 7540 2C0B 12DF AE59 2C30 1259 AE01 7541
51A8= 2C0B 12D8 AE47 1253 2E33 2632 EDEB 0042
51B0= BA01 7544 2C0B 12CE AE4A 2C30 AE48 1247
51B8= 2EBB 26BA EDEB 0045 F201 B201 7547 2C30
51C0= 12C1 AE49 7548 2C30 123B AED4 1238 2E43
51C8= 2642 EDEB 0049 EDEF 1233 AE9E 2C30 12B2
51D0= AE4D 2C0B AE4E 754B 2C30 122A AED4 1227
51D8= 2E43 2642 EDEA 004C EDEF 1222 AE9E 2C30
51E0= 12A1 AE4D 2C0B AE4E 2C30 1219 AE00 754E
51E8= 2C30 1298 AE4F 1213 AE00 754F 2C30 1292
51F0= AE50 120D AE00 7550 2C30 128C AE51 1207
51F8= AE00 7551 2C30 1286 AE52 7202 4100 4300
5200= 12FE AE00 7552 2C30 1235 AE53 12F8 AE00
5208= 7553 2C30 122F AE54 12F2 AE00 7554 2C30
5210= 1229 AE55 12EC AE00 7555 2C30 1223 AE56
5218= 12E6 AE00 7556 2C30 121D AE57 12E0 AE00
5220= 7557 2C30 1217 AE58 12DA AE00 7558 2C30
5228= 1211 AE59 12D4 AE00 7559 2C0B 1203 AE49
5230= 755A 2C30 1207 AE4A 2C0B AE48 AE49 755A
5238= 7201 4200 0000 0000 0000 0000 0000 0000
5240= 0000 0000 40E1 0000 50CA 0000 0000 0000
5248= 0000 0000 0000 0000 39A5 CE5A 0000 0000
5250= 46DB 147A 4CAB E000 0000 0000 11E4 4AB8
5258= E850 49D3 AA3C 4142 1A39 2410 0000 0000
5260= 27E3 5282 0000 0000 33E3 E064 0000 0000
5268= 3F8A F89C 4982 EF5C 47C8 0000 41BA 51A7
5270= FFFF 48C8 0000 51D3 51C2 51E7 51ED 51F3
5278= 51F9 5202 FFFF 5208 520E 5214 521A 5220
5280= 5226 50C8 48FA 0000 5230 4AC6 0000 522C
5288= 512B 47BE 0000 51E3 48C3 0000 5152 5159
5290= 5160 5167 516E 5175 517D 5187 518E 5195
5298= 519C 51A3 512E 10F0 532A 1000 73FD 0000
52A0= 3804 3805 C502 F50F 7510 2C12 2411 7363
52A8= 3304 3805 C502 AC14 A413 F515 B516 3804
52B0= 3805 C502 EDEA 0017 B519 2C13 241A 7353
52B8= 2C18 2417 EDEB 8002 B51C 2A02 EDE8 C5D8
52C0= 2C14 2413 EDF0 AC14 A413 2C14 2413 EDED
52C8= 0003 AC1E A41D EDEA 002A EDEF AC1F EF3C
52D0= 001F AC2D A42C 2C1E 241D EDEB 002C EDEC
52D8= 0003 AC21 A420 EDEC 0020 AC23 A422 2C0C
52E0= 240B EDEA 0022 AC2F A42E EDEC 0005 AC25
52E8= A424 2C0A 2409 EDEA 0022 EDEC 002E EDEA
52F0= 0007 AC27 A426 2C23 2422 EDEC 0024 EDED
52F8= 0026 EDEA 0030 AC29 A428 EDEB 0020 AC33
5300= A432 2C21 2420 EDEA 0028 EDED 0032 AC21
5308= A420 7202 53C2 5381 2C31 2430 EF15 001F
5310= EDEC 0020 AC0E A40D 3804 3805 C502 F534
5318= B535 2C12 2411 EDED 000D AC0E A40D 2C0E
5320= 240D 73E9 7201 5332 0000 0000 0000 0000
5328= 0000 0000 0000 0000 0000 4031 7216 45E0
5330= 0000 B11D D000 49A5 0000 4754 0000 0000
5338= 0000 52A4 52A7 4180 0000 0000 0000 52AE
5340= 52B7 46AE C6E0 520F 0000 0000 52C4 0000
```

```
..
5350= 0000 0000 0000 0000 4080 0000 0000 0000
5358= 0000 0000 4200 0000 0000 0000 5318 531E
5360= 1CF0 5370 1900 73FD 0000 2D02 EDEE 7302
5368= 7201 53C2 0000 0000 0000 0000 0000 0000
..
5380= 0000 0000 4001 60C4 AAF3 6401 2D01 BA02
5388= 4402 7203 5A33 4402 2905 2905 AAF2 2801
5390= AAF1 0A2D A2EC F224 2AEC 0200 222B 3005
5398= EDED 0003 A2E4 AAE4 3005 4AE5 AAE2 2222
53A0= A2DC 3ADC 2ADE 5A1D F205 22D7 2AD7 EDEC
53A8= 0003 A2D3 AAD3 1AD7 9AD4 F207 22D0 2AD0
53B0= EDEC 0003 A2CC AACC 72ED 2AC3 0ACB 730B
53B8= 2AC8 F201 B2D9 2A04 EDEB 7FFF 5378 C5D8
53C0= 0001 4100 1130 0C01 AC03 2C07 5A09 A405
53C8= BA02 F203 5207 AC07 E401 5203 72FC FFC3
53D0= 000C 0003 C000 0000 0000 0000 0000 0000
..
53E0= 0000 54C9 2801 0AFE AC01 2C06 1258 AEFD
53E8= AEFC AEFB AEF1 1254 2E19 2618 EDEC 0007
53F0= AC03 A402 2E19 2618 EDEC 0009 AE1B A61A
53F8= 2E19 2618 EDEC 000B AE1D A61C 2E19 2618
5400= EDEC 000D AC05 A404 123C 2E00 F201 750F
5408= 2C06 1235 AEE5 0C01 E401 1231 2ED3 F201
5410= 72F7 122E 2E15 4C10 F201 B201 7511 2C06
5418= 122A AE5C AE5D AE5E 1225 2E35 2634 EDEC
5420= 0007 EDEB 8016 AC13 A412 EF1C 0012 AC15
5428= A414 EF18 8017 AE1F A61E 1216 2E00 5418
5430= F201 7519 1212 2E01 2600 EDEB 801A F201
5438= B201 751B 1205 2E35 2634 7207 4000 4100
5440= 1190 0F0C 4200 1185 12E0 F202 BA01 751B
5448= 751C 12F6 2E35 2634 B201 7519 751C 12F0
5450= 2E1F 261E EDEB 0002 BA01 751D 2C15 2414
5458= EDEB 0002 BA01 751E 2C15 2414 EDEB 801F
5460= BA01 7520 2C15 2414 EDEB 8021 BA01 7522
5468= 12D7 2E1F 261E EDEB 8023 BA01 7522 2C24
5470= 12CE AEFB 7522 2C24 12CA AEFD 7522 12C3
5478= 2E1F 261E EDEB 0004 BA01 72F5 2C24 12BF
5480= AEFC 2C24 12BC AEE5 7286 2C24 12BC AE5C
5488= 12B7 2E15 4C25 F201 B201 7526 12B1 2E41
5490= 2640 EDEB 8027 EDEB 0028 F201 B201 7525
5498= 122A 2E01 2600 EDEB 002A F201 B201 7525
54A0= 1222 2E01 2600 EDEB 002C F201 B201 752E
54A8= 129B 2E00 5418 F201 7526 2C24 1294 AE5D
54B0= 2C06 AE5E 72CE 2C05 128E AE5D AE5E 72C9
54B8= 2C24 1289 AE5E 1283 AEF1 2C06 1284 AE5D
54C0= 72C0 7201 1334 0000 0000 0000 0000 0000
..
54D0= 4280 0000 41C0 0000 41E6 6666 41D9 9998
54D8= 540C 1C20 5484 0000 0000 0000 0000 4124
54E0= 4134 FFFF 544E 12F8 5448 5467 5472 5476
54E8= 411A 547D 4118 5480 411C FFFF 012C 5482
54F0= 4126 4385 70A2 4A96 0000 4CC8 0000 54C7
54F8= 0000 0000 0000 0000 0000 0000 0000 0000
5500= 0000 575B 2801 0AFE AC01 2CC1 1259 AEC7
5508= AE05 1257 AE6E AE6F AE70 1254 2E01 2600
5510= EDEB 003D F201 B201 75C2 2CC1 124C AE58
5518= 1248 AE60 1247 2E01 2600 EDEB 003F F201
5520= B201 75C3 123F 2E01 2600 EDEB 0041 F201
5528= B201 75C4 2C3C 243B 1233 AE37 A636 2C06
5530= ACC5 2CC5 44C3 ACC7 2CC5 4005 ACC9 422C
5538= ACCA 2CC9 422A ACCB 3804 3805 C5CA EDEB
5540= 80CB F202 BA01 75CC 2CC5 4005 ACC9 421D
5548= ACCA 2CC9 421B ACCB 3804 3805 C5CB 1CCA
5550= A103 6003 A903 2CC7 4212 ACC9 2CC1 ADC9
5558= 64C5 2C38 4CC5 B2D5 2CC6 ACC5 7208 4100
5560= 4200 1334 4300 4144 57D2 5802 41FF 2CC5
5568= 44CD ACC7 2CC5 4005 ACC9 42FC ACCA 2CC9
5570= 4263 ACCB 3804 3805 C5CA EDEB 80CB F202
5578= BA01 75CE 2CC5 4005 4257 ACC9 12E1 2E37
5580= 2636 1CC9 A103 6003 A903 2CC5 ACCA 424D
5588= ACCB 3DCB 2CCA 424A ACCF 3DCF 2CC7 42D7
5590= ACD0 2CC1 ADD0 64C5 2C38 4CC5 B2C7 12C8
5598= 2E05 F201 75D1 2CC1 12C6 AEDD 2CC1 1237
55A0= AEF7 AEE6 AEF2 0C01 E401 12BA 2E45 2644
55A8= EDEB 0047 B201 75D2 2CD3 12B3 AE60 12B3
55B0= AED8 1225 AEEB 72EF 2CC1 12AB AE60 12AB
55B8= AED8 121D AEEB 72E7 2C3A 2439 12A1 AE37
55C0= A636 75D4 129F 2E01 2600 EDEB 00D5 EDEC
55C8= 00D7 ACDA A4D9 2CDC 24DB EDEB 00D9 1290
55D0= AE37 A636 7204 57EA 57A3 57AF 4000 75D4
55D8= 2CC5 4005 ACC9 4289 ACCA 2CC9 4287 ACCB
55E0= 2CC9 4284 ACCF 3804 3805 C5CF EDEC 00DD
55E8= ACE0 A4DF 3804 3805 C5CB EDEB 00DF 1CCA
55F0= A103 6003 A903 2CD3 1260 AE07 2CC7 425F
55F8= ACE1 2CD3 ADE1 72A7 2CC7 4259 ACC9 2CD3
5600= ADC9 2CC5 4005 42D0 ACCA 124F 2E37 2636
5608= EDEC 00E2 ACE5 A4E4 2E37 2636 EDEB 00E4
5610= 1CCA A103 6003 A903 2CD3 AE05 12C0 2EE6
5618= F201 75E6 12BC 2EF2 F201 75E6 2C36 ACE7
5620= 2CE7 4005 ACC9 4234 ACCA 2CC9 4232 ACCB
5628= 122D 2E01 2600 EDEB 80CB BA02 3805 F201
5630= 28A0 ACE8 2E01 2600 EDEB 80CA F204 B202
5638= 3805 F201 28A0 5CE8 F201 75E9 64E7 2C37
5640= 4CE7 B2DE 2CC5 4291 ACC9 2DC9 F202 BA01
5648= 75EA 2CC5 428A ACC9 2CEB ADC9 2CC5 4005
5650= ACCA 4208 ACCB 7206 4100 1334 41FF 575B
5658= 5775 57BA 2CCA 425A ACCF 3804 3805 C5CF
5660= 1CCB A103 6003 A903 2CC5 4251 ACC9 2DC9
5668= F201 7201 75EC 75E9 2CC5 ACC9 4248 ACCA
5670= 2CC9 4245 ACCB 2DCB 6805 ADCA 72ED 2CC5
5678= 4005 ACC9 423B ACCA 2CC9 42DC ACCB 3804
5680= 3805 C5CA EDEB 80CB ACEE A4ED EDEB 00EF
5688= F202 BA01 75F1 2CC5 4005 ACC9 42CB ACCA
5690= 2CC9 4224 ACCB 3804 3805 C5CB 1CCA A103
5698= 6003 A903 2CC5 421C ACCF 2DCF 4CF2 B201
56A0= 75F3 2CD3 1216 AEF2 2CC5 4212 ACC9 2CF4
56A8= ADC9 2CC5 420C ACC9 2CEB ADC9 75E9 2CC5
56B0= 4207 ACC9 2CF4 ADC9 7204 4144 57A3 57AF
56B8= 4000 2CC5 4005 ACCA 42F9 ACCB 2CEE 24ED
56C0= EDEB 00EF EDEC 00F7 EDEA 80CB ACF6 A4F5
56C8= 2CCA 4290 ACCF 2CCA 42E9 ACD0 3804 3805
56D0= C5D0 1CCF A103 6003 A903 2CCA 4261 ACE1
56D8= 2CF6 24F5 EDEB 80E1 B201 72CB 2CD3 12D9
56E0= AEE6 72C7 2CC5 ACC9 42D3 ACCA 2CC9 42D0
56E8= ACCB 2DCB 6005 ADCA 72BC 2CD3 1248 AEDD
56F0= 1249 2E00 F201 75F9 12C4 2EE6 F201 75FA
56F8= 12C0 2EF2 F201 75FB 75FC 2CC1 1236 AE6F
5700= AE70 2CD3 AE6E 75FD 2CC1 122F AE70 12B1
5708= 2EF7 F201 75FC 122A 2E01 2600 EDEB 0043
5710= F202 BA01 75FE 1227 2E00 1223 26FF 121C
5718= AE39 A638 2CD3 1219 AE6F 129B AEF7 75FC
5720= 1298 2EF7 F201 75FC 1211 2E01 2600 EDEB
5728= 0045 B202 1210 7701 120E 2E03 2602 1204
5730= AE39 A638 7208 4100 4200 1334 4300 5802
5738= 575B 1185 585B 2CD3 12F8 AE70 1216 AEF7
5740= 75FC 12F4 2E01 2600 EDEB 0104 12ED AE39
5748= A638 72D0 12EB 2E01 2600 EDEA 0104 12E4
5750= AE39 A638 72E8 7201 4000 0000 0000 0000
5758= 0000 0000 0000 0000 0000 4BD2 0000 4BE9
5760= C000 4C93 8000 4CA2 8000 4BDD 4000 4C91
5768= 0000 4C9D 8000 4BF6 4000 4C98 8000 4CAF
5770= 0000 4BE7 4000 4C90 6000 4CA3 C000 4BDA
5778= C000 4BF6 4000 4C99 C000 4CA8 2000 4BFC
5780= 8000 4C9A 6000 4CA5 0000 4C81 6000 4CA0
5788= A000 4CB7 2000 4BF2 8000 4C96 0000 4CAB
5790= 4000 0005 0007 0007 4480 0000 43A0 0000
5798= 4A96 0000 4C96 0000 4CC8 0000 4AD4 8000
57A0= 4CD4 8000 42C0 0000 0000 0000 0000 0000
..
57D0= 0000 0000 0000 0000 44A0 0000 44A0 0000
57D8= 44A0 0000 44A0 0000 44A0 0000 44A0 0000
57E0= 44A0 0000 44A0 0000 0000 0000 0000 0000
..
5800= 0000 0000 0000 0000 44A0 0000 44A0 0000
5808= 44A0 0000 44A0 0000 44A0 0000 44A0 0000
5810= 44A0 0000 44A0 0000 0000 0000 0000 0000
5818= 0000 0000 0000 0000 0000 55A4 55BB 55C1
5820= 0000 0001 0000 0061 0000 0000 0000 55D7
5828= 0171 55FB 0000 0000 56EC 55B3 FFFF 552E
```

```
5830= 4C96 0000 38F5 C28E 0000 0000 4480 0000
5838= 0000 0000 0000 0000 0000 3AA5 D70A 0000
5840= 0000 5641 0000 0000 5592 566B 000C 5676
5848= 0000 0000 3A83 126E 56AE 000F 56E1 0000
5850= 0000 0000 43A0 0000 56FC 5703 571F 55A2
5858= 559D 5740 4AA2 8000 5749 4CE1 0000 48C8
5860= 0000 0000 0000 0000 0000 0000 0000 0000
5868= 0000 5940 2801 0AFE AC01 2C06 1257 AEF5
5870= AEF6 1255 2E01 2600 EDED 0004 EDEF 1250
5878= AE16 2E6F 266E EDEB 8007 EDEB 0008 EDEF
5880= 1248 AEA0 2EA0 BA01 750A 2C06 1243 AE72
5888= 123F 2E6B 266A EDEB 800B EDEB 0008 EDEF
5890= 1238 AEA1 2EA1 BA01 750C 2C06 1233 AE73
5898= 122F 2E6D 266C EDEB 800D EDEB 0008 EDEF
58A0= 1228 AEA2 2EA2 BA01 750E 2C06 1223 AE74
58A8= 121F 2E69 2668 EDEB 800F EDEB 0008 EDEF
58B0= 1218 AEA3 2EA3 BA01 7510 2C06 1213 AE75
58B8= 120F 2E71 2670 EDEB 8011 EDEB 0012 B201
58C0= 7514 2C06 1207 AE79 7205 4000 11E0 4100
58C8= 4300 4200 1265 2E01 2600 EDEB 0015 F202
58D0= BA01 7517 2C18 12F6 AE78 12F0 AEF6 2C18
58D8= 12EF AE11 12EB 2ECE F201 7519 12E7 2ED2
58E0= F201 751A 2C18 12E6 AE71 0C01 E401 2C06
58E8= 12E1 AE78 12DD 2E71 2670 EDEB 8011 EDEB
58F0= 001B B201 751D 2C18 12D5 AE79 12CF AEF5
58F8= 72DE 2C18 12CF AE72 12C9 AEF5 7239 2C18
5900= 12C9 AE73 12C3 AEF5 7233 2C18 12C3 AE74
5908= 12BD AEF5 729D 2C18 12BD AE75 12B7 AEF5
5910= 72A7 2C06 12B7 AE7A 1234 AEE5 72CE 2C06
5918= 12B1 AE7A 72D8 2C06 12AD AE79 AE7A AC03
5920= 12A7 AE11 72C2 2C06 12A5 AE71 2C03 F201
5928= 751E EF07 001F 0020 0021 0022 7202 1334
5930= 07F6 2C18 AC03 7201 2C18 1294 AE7A 1291
5938= AEE5 72AB 0000 0000 0000 0000 0000 0000
5940= 0000 0000 0000 0000 4296 6666 0000 416A
5948= 4896 0000 58F8 416E 58FE 4168 5904 416C
5950= 590A 4174 47C8 0000 58E6 4CDD E000 58F2
5958= FFFF 5910 5922 4796 0000 591A 5933 0001
5960= 0000 0006 0100 0029 002A 002B 2C1E AC03
5968= 0000 5AC3 2801 0AFE AC01 2C08 1255 AEE4
5970= AEE3 1253 AE08 1252 AEDA AED9 124D 2ED3
5978= F201 7509 2C08 124B AEA4 2C0D 240C AC0B
5980= A40A 1246 2E00 BA04 2C0F 240E AC0B A40A
5988= 123C 2EBD 26BC EDEB 000A F202 BA01 7510
5990= 2C11 1235 AEA5 1232 AEDA 1233 2E01 2600
5998= EDEB 0012 F202 BA01 7514 2C08 1228 AEA4
59A0= 1224 2EBD 26BC EDEB 0015 F201 B201 7517
59A8= 2C11 121D AEA4 2C08 121A AECA 1215 2EC7
59B0= F203 2C11 1214 AECA 2C18 AC07 2C07 441A
59B8= AC19 2C07 4005 420E AC1B 3804 3805 C51B
59C0= EDEB 001C 7207 4000 4100 4300 4200 1185
59C8= 1334 4198 B201 751E 2C19 4262 AC1B 2C11
59D0= AD1B 2C11 12F1 AEE3 12F1 AED9 0C01 E401
59D8= 2C19 4256 AC1B 2C08 AD1B 2C02 4C07 F201
59E0= 7201 751F 6407 72D2 2C18 AC07 2C07 4420
59E8= AC19 2C07 4005 4245 AC1B 3804 3805 C51B
59F0= EDEB 001C B201 7521 2C19 423A AC1B 2C11
59F8= AD1B 72D7 2C19 4234 AC1B 2C08 AD1B 2C07
5A00= 4C03 F201 7201 7522 6407 72E0 2C18 AC07
5A08= 2C07 4423 AC19 2C07 4005 42BC AC1B 3804
5A10= 3805 C51B EDEB 0024 B201 7526 2C19 4218
5A18= AC1B 2C11 AD1B 12AA AED9 12A7 AE08 2C07
5A20= 4C02 BA01 7527 6407 72E3 2C18 AC07 2C07
5A28= 4428 AC19 2C07 4005 4204 AC1B 7202 41FF
5A30= 41B0 3804 3805 C51B EDEB 0024 B201 7529
5A38= 2C19 42F6 AC1B 2C11 AD1B 1288 AED9 1285
5A40= AE08 2C07 4C03 F201 7201 752A 6407 72DF
5A48= 2C19 42E6 AC1B 2C08 AD1B 72F3 2C19 42E0
5A50= AC1B 2C08 AD1B 72CB 2C08 1256 AEA5 AEA6
5A58= 1251 2EBD 26BC EDEB 000E F202 BA01 752B
5A60= 2C11 124A AEA3 1247 AEDA 1243 AEE4 1242
5A68= 2EBD 26BC EDEB 000C B201 752C 2C11 123C
5A70= AEA4 752D 1237 2EBD 26BC EDEB 002E B201
5A78= 7530 2C11 1231 AEA4 122E AEDA 752D 2C08
5A80= 122B AEA4 752D 2C08 1227 AEA6 752D 1222
5A88= 2E91 2690 EDEB 0031 F202 BA01 7533 2C08
5A90= 121B AEC8 2C11 1217 AEDA 1216 AEC7 7534
5A98= 2C08 1212 AEC7 120E 2EBF 26BE EDEB 0035
5AA0= B201 7537 2C11 1208 AEC9 1205 AEDA 7204
5AA8= 4000 4100 4300 4200 7538 2C08 12FD AEC9
5AB0= 7538 2C08 12F9 AEA3 72B2 2C08 12F5 AEA4
5AB8= 752D 2C08 12F1 AEA5 7539 0000 0000 0000
5AC0= 0000 0000 0000 0000 0000 0008 0004 0000
5AC8= 0000 0000 0000 0000 5A53 0000 0000 47C8
5AD0= 0000 478C 0000 5AB8 FFFF 4BE1 0000 5A71
5AD8= 47DC 0000 5A82 0001 0000 00AB 0000 48E1
5AE0= 0000 59D7 59E3 00A7 59F9 5A05 00BB 48D2
5AE8= 0000 5A4D 5A24 00B7 5A47 5A86 5AB0 5AB4
5AF0= 59AA 47F0 0000 5A7E 44A0 0000 5A97 5A9A
5AF8= 48AA 0000 5AAC 59D5 5994 0000 5A9C 47DC
5B00= 0000 5CE0 2801 0AFE AC01 2C08 AC02 AC03
5B08= 1261 2ED9 26D8 EDEB 0009 B201 750B 2C0C
5B10= 125A AECB AC02 1256 2ED9 26D8 EDEB 000D
5B18= F202 BA01 750F 2C0C 124E AECC AC02 124A
5B20= 2EDB 26DA EDEB 0009 B201 7510 2C0C 1243
5B28= AECD AC02 123F 2EDB 26DA EDEB 000D F202
5B30= BA01 7511 2C0C 1237 AECE AC02 1235 2E00
5B38= BA01 7512 2C16 2415 EDEC 0015 AC1A A419
5B40= 1229 2E8B 268A EDEC 801B EDED 0019 AC1D
5B48= A41C 2E8F 268E EDEA 001E AC21 A420 2C23
5B50= 2422 EDED 0020 EDEC 001C EDEC 0024 EDEA
5B58= 0017 AC14 A413 2C27 AC26 2C26 4005 420D
5B60= AC28 3804 3805 C528 EDEB 8029 EDEB 0013
5B68= 7204 4100 4200 1185 41E6 F202 BA01 752A
5B70= 2C26 4005 42FA AC28 3804 3805 C528 EDEB
5B78= 802B EDEB 0013 F202 BA01 752A 2C0C 12EB
5B80= AECF 6426 2C2C 4C26 B2D3 12E4 2EE1 26E0
5B88= EDEB 8031 AC2E A42D 2EE3 26E2 EDEB 8031
5B90= AC30 A42F 2EE1 26E0 EDEB 0032 F202 BA01
5B98= 7534 2C08 12D0 AED0 12CD 2EE3 26E2 EDEB
5BA0= 0032 F202 BA01 7535 2C08 12C5 AED1 2C2E
5BA8= 242D EDEB 0036 F202 BA01 7538 2C08 12BB
5BB0= AED8 2C30 242F EDEB 0036 F202 BA01 7539
5BB8= 2C08 12B1 AED2 12AE 2EC3 26C2 EDEB 003A
5BC0= BA02 3305 F201 28A0 AC3C 2C3E 243D EDEB
5BC8= 803F BA02 3805 F201 28A0 5C3C F201 7540
5BD0= 2C0C 1299 AED9 1296 2EC1 26C0 EDEB 003A
5BD8= BA02 3305 F201 28A0 AC3C 2C3E 243D EDEB
5BE0= 8041 BA02 3805 F201 28A0 5C3C F201 7542
5BE8= 2C0C 1259 AEDA 2C44 2443 EDEA 0045 AC1A
5BF0= A419 1250 2E8F 268E EDEB 0019 F202 BA01
5BF8= 7547 2C08 1248 AED3 2C49 2448 EDEB 0045
5C00= AC1A A419 123F 2E8F 268E EDEB 0019 B201
5C08= 754A 2C08 1238 AED4 1238 2ED0 F201 754B
5C10= 2C08 1231 AED5 1231 2EC5 F201 754C 2C08
5C18= 122D AEDF 1228 AED6 2C08 1225 AEDC 2C4E
5C20= 244D AC07 A406 2C50 244F AC05 A404 2C27
5C28= AC26 2C26 4005 4218 AC28 3804 3805 C528
5C30= EDEB 0006 B209 2C26 4005 420E AC28 3804
5C38= 3805 C528 AC07 A406 2C26 4005 4205 AC28
5C40= 7205 4100 4200 41E6 4000 4300 3804 3805
5C48= C528 EDEB 0004 F20A BA09 2C26 4005 42F4
5C50= AC28 3804 3805 C528 AC05 A404 6426 2C2C
5C58= 4C26 B2CF 2C05 2404 EDEB 0006 EDEB 0051
5C60= F204 BA03 2C0C 12DF AEDC 12DF 2EC4 F201
5C68= 7553 2C08 12D8 AED7 12D8 2EC6 F201 7554
5C70= 2C08 12D1 AEDB 2C03 12D0 AEED 2EED 12CE
5C78= AEDC 7209 2E99 2698 EDEB 0055 B201 7557
5C80= 2C08 12C1 AEDC 0C01 E401 2C08 12BC AECB
5C88= 7558 2C08 12B8 AECC 7559 2C08 12B4 AECD
5C90= 755A 2C08 12B0 AECE 755B 2C0C 12AC AECF
5C98= 755C 2C0C 12A8 AED0 755D 2C0C 12A4 AED1
5CA0= 755E 2C0C 12A0 AED8 755F 2C0C 129C AED2
5CA8= 7560 2C08 1298 AED9 7561 2C08 1294 AEDA
5CB0= 7562 2C0C 1290 AED3 AC03 7563 2C0C 128B
5CB8= AED4 AC03 7564 2C0C 1286 AED5 AC03 7565
5CC0= 2C0C 1216 AED6 AC03 1215 AEDF 7566 2C0C
5CC8= 120F AED7 72A1 2C0C 120B AEDB AC03 72A3
```

```
5CD0= 2C0C 1206 AEDC 1205 AEED 72AD 7203 4200
5CD8= 4000 4300 0000 0000 0000 0000 0000 0000
..
5CE8= 0000 46C0 0000 5C84 FFFF 45C8 0000 5C88
5CF0= 5C8C 5C90 5B84 0000 0000 4DE1 8800 4280
5CF8= 0000 0000 0000 418A 0000 0000 44EB 3332
5D00= 0000 0000 4795 6666 4690 0000 0000 0001
5D08= 0000 41D8 5C94 41DA 0006 0000 0000 0000
5D10= 0000 41E4 4782 0000 5C98 5C9C 45D8 0000
5D18= 5CA0 5CA4 47F0 0000 0000 47A0 0000 41C2
5D20= 5CA8 41C0 5CAC 46F0 0000 4280 0000 5CB0
5D28= 45F0 0000 5CB5 5CBA 5CBF 4AFA 0000 0000
5D30= 0000 4480 0000 5CC6 5CCA 4380 0000 5CCF
5D38= 5B12 5B1E 5B29 5B35 5B84 5B9B 5BA6 5BB0
5D40= 5BBA 5BD2 5BEA 5BFB 5C0B 5C12 5C1B 7510
5D48= 0000 5E14 2801 0AFE AC01 2C05 1257 AEEE
5D50= AEEC 1255 AE04 2EC5 26C4 EDEB 0003 EDEB
5D58= 0006 B201 7508 2C05 124B AEDD 1248 2EC7
5D60= 26C6 EDEB 0009 F202 BA01 750B 2C05 1240
5D68= AEDE 123D 2EC5 26C4 EDEB 800C EDF0 EDEB
5D70= 000D F202 BA01 750F 2C05 1232 AEDF 122F
5D78= 2EC5 26C4 EDEB 800C EDEB 000D BA01 7510
5D80= 2C05 1226 AEE0 1222 2ECC 5411 F201 7512
5D88= 2C05 121E AEE2 AEE3 121A 2ECD 26CC EDEB
5D90= 0013 B201 7515 2C16 1213 AEE1 2C16 120E
5D98= AEEC 120D 2E93 2692 EDEB 0017 F202 BA01
5DA0= 7519 2C05 1205 AEE4 7203 4000 4100 4200
5DA8= 2C02 F201 751A 1262 2E01 2600 EDEB 001B
5DB0= BA01 751D 12F3 2ECC F201 751E 0C01 E401
5DB8= 2C05 12EE AEE1 12EB 2ECD 26CC EDEB 001F
5DC0= B201 7521 2C16 12E4 AEE2 72E0 2C05 12E0
5DC8= AEE1 72CF 2C16 12DC AEE5 72E3 2C05 12D8
5DD0= AEE2 12D5 2ECD 26CC EDEB 0022 B201 7524
5DD8= 2C16 12CE AEE3 72BA 12C9 2ECC F201 72D6
5DE0= 2C16 12C6 AEE6 72D2 2C05 12C2 AEE3 72B1
5DE8= 2C16 12BE AED9 12BA AEEE 7525 2C16 12B8
5DF0= AEDE 12B4 AEEE 7526 2C16 12B2 AEDF 12AE
5DF8= AEEE 7527 2C16 12AC AEE0 12A8 AEEE 7283
5E00= 2C16 12A6 AEE4 12A3 AE04 72A2 12A0 2E16
5E08= 4C28 B201 72D1 72A6 7201 1334 0000 0000
5E10= 0000 0000 0000 0000 0000 0000 FFFF 48E1
5E18= 0000 0000 45C8 0000 5DE7 49AF 0000 5DED
5E20= 41C8 48C8 0000 5DF3 5DF9 FFFF 5DB7 48A0
5E28= 0000 5DC5 FFFF 43A0 0000 5DFF 5DB5 4A96
5E30= 0000 5E05 5DC9 48FA 0000 5DCD 48AF 0000
5E38= 5DE3 5D5D 5D68 5D76 000A AEE9 AEEE AEEF
5E40= 0000 5F32 2801 0AFE AC01 2C1A 125A AEE1
5E48= AEE0 2C11 2410 AC0F A40E 2C13 2412 AC11
5E50= A410 2C15 2414 AC13 A412 2C17 2416 AC15
5E58= A414 2C19 2418 AC17 A416 1244 2E87 2686
5E60= AC19 A418 2E0E F201 751B 2C0D 4C1C BA01
5E68= 751D 640D 2C1A 1237 AEE8 AEE9 AEEE AEEF
5E70= 1231 2E11 F201 751E 122F 2E00 541F F201
5E78= 7520 1228 2E16 4C21 B201 7520 2C1A AC04
5E80= 1222 AEEA 121E 2ECD F201 7522 121A 2ED2
5E88= F201 7523 2C24 1217 AEEB AEEC 1216 AEE5
5E90= 0C01 E401 120F 2E87 2686 EDEC 0027 EDEB
5E98= 000E AC26 A425 2C26 2425 EDEB 8029 7205
5EA0= 4000 4100 4200 1185 4300 F202 BA01 752A
5EA8= 2C1A 12F9 AEE8 AEEE 2C26 2425 EDEB 000B
5EB0= F202 BA01 752B 2C24 12EE AEE9 AEEF 12E9
5EB8= AEE1 72B6 2C24 12E6 AE0E 72D4 2C1A 12E3
5EC0= AEEB AC03 12DE 2ECE F201 752C 12DA 2ED2
5EC8= F201 752D 2C24 12D7 AEEA AEEC 12D6 AEE5
5ED0= 72BF 2C26 2425 EDEB 0009 B201 7293 2C24
5ED8= 12CA AEE8 AEEE 7294 2C1A 12C5 AEE9 AEEF
5EE0= 728F 2C03 541F F201 752E 2C1A 12BC AEEC
5EE8= 12B8 2ECD F201 7522 2C24 12B5 AEEB 12B5
5EF0= AEE5 729E 2C04 541F F201 752F 2C1A 12AB
5EF8= AEEC 12A7 2ECE F201 752C 2C24 12A6 AEE5
5F00= 12A2 AEEA 728D 2C1A 129E AEEA 129E AEE5
5F08= 129A AEEC 7285 2C1A 1296 AEEB AEEC 1295
5F10= AEE5 7530 2C24 AC03 2C31 541F 6005 AC32
5F18= EF13 0031 0032 001C 0033 7530 2C24 AC04
```

```
5F20= EF0B 0031 0034 001C 0033 7530 2C1A AC03
5F28= AC04 7530 7201 07F6 0000 0000 0000 0000
..
5F38= 0000 0000 0000 40BD 70A2 3E83 126E 0000
..
5F48= 0000 0000 0000 0000 0000 5E91 0006 5EB9
5F50= 5F25 FFFF 5EBD 0014 5F0A 5EE0 FFFF 0000
5F58= 0000 4280 0000 4186 5ED0 5EDB 5F02 5EF1
5F60= 5F11 5F1D 5E8F 0001 0000 0100 0000 750A
5F68= 0000 6052 2801 0AFE AC01 1255 2E09 F202
5F70= 0C01 E401 1251 2E01 2600 EDEB 0003 BA01
5F78= 7505 2C02 F201 7506 0C01 E401 2C07 1245
5F80= AE67 2C08 AECC AECD 72F7 2C08 123E AE67
5F88= 123D 2EF4 F201 7509 1239 2EFE F201 750A
5F90= 1232 2E2B 262A EDEB 800B B201 750C 122B
5F98= 2E43 2642 EDEB 800B B201 750D 1224 2E21
5FA0= 2620 AC0F A40E 2C0F 240E EDEB 0010 F201
5FA8= B201 7512 7513 1217 2E21 2620 EDEB 0010
5FB0= F202 BA01 7513 72E3 120E 2E2B 262A EDEB
5FB8= 8014 B201 7515 1207 2E33 2632 AC0F A40E
5FC0= 72E2 7204 4100 1334 4300 4000 12FC 2E2B
5FC8= 262A AC0F A40E 72D7 12F6 2E43 2642 AC0F
5FD0= A40E 72D1 2C0F 240E EDEC 000E EDEC 0017
5FD8= AC1A A419 2C0F 240E EDEC 001B EDEB 0019
5FE0= EDEA 001D 12E0 AE2D A62C 2C07 12DF AEF4
5FE8= 2C1F AC16 12D8 2E2D 262C EDEF 12D6 AEA6
5FF0= 2C07 AE69 12D0 2ECB 26CA EDEB 0020 B201
5FF8= 7522 2C07 AC02 2C08 12C8 AE68 2C07 AECC
6000= 12C2 2E2D 262C EDEB 0023 AE2D 0000 2C07
6008= 12BC AECD 12B8 2E2D 262C F202 BA01 7525
6010= 12B2 2E33 2632 EDEB 0010 B201 7526 2C08
6018= 12AC AE6C 2C27 EDEE 12A6 AE2D A62C 2C08
6020= 12A4 AECD AECC 2C07 129E AE09 129E AE6A
6028= 2C08 AC02 0C01 E401 6C16 2C16 F201 7201
6030= 7528 7529 1290 2E2D 262C EDEF 128E AEA7
6038= 2C1F AC16 2C07 AE6B 0C01 E401 2C07 1285
6040= AE68 2C08 AECD 0C01 E401 2C07 1205 AE6C
6048= 0C01 E401 7201 4300 0000 0000 0000 0000
6050= 0000 0000 0000 0000 0000 4C86 6000 5F84
6058= 5F7D FFFF 0000 5FF1 5FAA 4120 5FB3 5FCB
6060= 0000 0000 48FA 0000 5FD1 6019 4132 5FC5
6068= 0000 37C1 FC8E 0000 0000 3EA1 CAC0 48AE
6070= C28E 000A 49FA 0000 603D 4180 0000 602B
6078= 6044 0000 6031 5F7B 0000 0000 0000 0000
6080= 0000 6496 2801 0AFE AC01 1257 2E00 F201
6088= 752B 2C2A F201 752C 2C2D 1250 AEDC AEDB
6090= AEDA AEDF AEDD 2C2F AC2E 2C2E 4248 AC30
6098= 2C2D AD30 642E 2C31 4C2E B2F7 2C2D 1240
60A0= AE04 AE05 AE06 AE0C AE17 AE19 AE1E 1239
60A8= AECA 2C32 AC2E 2C2E 4235 AC30 2C2D AD30
60B0= 642E 2C33 4C2E B2F7 2C34 AC2E 2C2E 422A
60B8= AC30 2C2D AD30 642E 2C35 4C2E B2F7 2C36
60C0= AC2A 752C 2C2D AC2A 121E 2E00 F201 7537
60C8= 2C2D AC26 1219 2E00 F201 7538 2C2D AC24
60D0= AC20 AC21 AC22 120D AED0 AED1 AEE8 AEE9
60D8= AEEA AEEB AC27 7208 1389 4000 41FF 4200
60E0= 4300 43C9 1185 1385 12FB AE20 1261 2E01
60E8= 2600 EDEB 0039 F201 B201 753B 2C2D 12F0
60F0= AE04 12EC AEDA AC28 12E9 2EDF F201 753C
60F8= 1250 2E01 2600 EDEB 003D B202 2C2D AC23
6100= 2C23 F201 753F 1245 2E01 2600 EDEB 0012
6108= BA01 7540 2C2D 12D5 AECF 12D0 AEDF 1239
6110= 2E01 2600 EDEB 0010 BA01 7541 2C2D 12C9
6118= AECE 122F 2E01 2600 EDEB 000E BA01 7542
6120= 2C2D 12BF AECB 2C44 2443 1224 AE31 A630
6128= 2C2D 12B7 AECA 12B2 2ED3 F201 7545 2C2D
6130= AC25 12AF AED4 2C46 AC2E 2C2E 42A8 AC30
6138= 2C2D AD30 642E 2C47 4C2E B2F7 2C2D AC29
6140= 129D 2ED4 F201 7548 1206 2E00 7204 12EA
6148= 1334 4100 1190 F201 7549 128F 2E00 F203
6150= 2C36 128E AE0C 0C01 E401 2C26 F202 0C01
6158= E401 2C2D AC24 AC20 AC21 AC22 125F AE2F
6160= AE30 AC28 AC27 2C36 AC26 AE34 2C2D 1257
6168= AED1 12E0 2E1F 261E EDEB 804A BA01 754B
```

```
6170= 12D9 2E1F 261E EDEB 804C BA01 754D 12D2
6178= 2E1F 261E EDEB 804E BA01 754F 2C36 123E
6180= AE13 7550 2C36 123A AE10 7550 2C36 1236
6188= AE11 7550 2C36 1232 AE12 7550 3C51 2C27
6190= F201 7552 2C2D 122B AECF 1228 AE1E 1227
6198= AECA AECB AECE AECF AEE7 121F AEDF AC23
61A0= 2C36 121C AE20 AC27 0C01 E401 12A2 2E01
61A8= 2600 EDEB 0016 F204 B202 3805 F201 28A0
61B0= AC53 2C15 2414 EDEB 8054 F204 B202 3805
61B8= F201 28A0 5C53 7203 4000 4200 4300 F201
61C0= 7555 2C36 12FB AE2C 12FA AEE9 2C2D AED1
61C8= AC20 AC21 AC22 2C1F 241E 1260 AE31 A630
61D0= 125C 2E00 F203 2C36 12EA AED0 7556 2C2D
61D8= 12E5 AE2C 12E4 AEE9 2C36 12E1 AED1 2C24
61E0= F201 7557 2C20 F201 7558 2C21 F201 7559
61E8= 2C22 F201 755A 2C2D 12D2 AED0 123F 2E1F
61F0= 261E EDEB 804C B201 755B 1238 2E43 2642
61F8= EDEB 805C B201 755D 2C36 12C0 AE23 122D
6200= 2E00 545D F201 755E 12B8 2EDC F201 755F
6208= 2C36 12B3 AEDB 7560 2C36 12B0 AE2A 2C2D
6210= 12AD AE23 12AA AEDC AEDB 2C36 AC22 7560
6218= 1214 2E00 F205 EF13 0061 0062 0063 0064
6220= 129C 2ECF F201 7565 2C36 1298 AE32 7556
6228= 2C2D 1294 AE32 7203 1389 4100 07F6 128D
6230= 2ECB F201 7566 2C36 1289 AE24 1288 AEE8
6238= 7556 2C2D 1284 AEE8 1255 AE24 12EE 2E00
6240= F203 2C36 124E AEDD 2C36 124E AE00 7556
6248= 12E4 2E00 F205 EFE3 0061 0062 0063 0067
6250= 1240 2ED5 F201 7568 2C36 123C AE2E 123B
6258= AEEA 7556 2C2D 1236 AE2E 1235 AEEA 1231
6260= 2ED1 F201 7569 2C36 122D AE2F 2C36 122B
6268= AEEB 0C01 E401 2C2D 1225 AE2F 1222 2ED9
6270= F201 756A 2C36 121E AE30 72F0 2C2D 121A
6278= AE30 1219 AEEB 1215 2ED7 F201 756B 2C36
6280= 1211 AE31 72E6 12A9 2E00 F20E 2C61 545D
6288= 6005 AC30 EFA4 0061 0030 0063 0064 7204
6290= 4000 4200 4300 1376 2C2D 12FC AE31 2C36
6298= AC24 72CF 12F6 2EED 545D F201 756C 2C36
62A0= 12F1 AE2B 72C6 2C2D 12ED AE2B 2C2D 12EB
62A8= AEE9 12E7 2ED6 F201 756D 2C36 12E3 AE2D
62B0= 12E2 AEEB 72B6 2C2D 12DE AEEB 12DB AE2D
62B8= 1263 2E00 F209 2C61 545D 6005 AC30 EF5F
62C0= 0061 0030 0063 0067 2C36 AC20 72A2 12C9
62C8= 2ECA F201 756E 2C36 12C5 AE25 0C01 E401
62D0= 2C2D 12C0 AE25 12BD 2EC9 F201 756F 2C36
62D8= 12B9 AE26 72F3 2C2D 12B5 AE26 12B2 2EC8
62E0= F201 7570 2C36 12AE AE27 72E8 2C2D 12AA
62E8= AE27 1234 2E05 F201 7571 2C2D 12A3 AE29
62F0= 12A0 AEDC AEDB 2C36 AC21 72D8 2C36 129A
62F8= AE29 1222 2E00 545D F201 72F5 1292 2EDC
6300= F201 7572 2C36 128D AEDB 72C8 2C36 128A
6308= AE2A 72E3 1286 2ED3 545D A803 50A0 5C25
6310= 5003 F201 7573 7574 2C28 F201 7575 2C36
6318= 1204 AE04 7204 1389 4200 4100 07F6 AC28
6320= 12FB 2E00 125E 5E00 F203 2C36 1258 AEDA
6328= 2C36 1258 AE00 0C01 E401 6451 2C51 4C76
6330= B201 7577 2C36 12E9 AE1F 2C62 AC51 0C01
6338= E401 6451 2C79 2478 EDEB 807A BA01 757B
6340= 2C36 123E AEE7 2C51 6805 F202 BA01 757C
6348= 2C61 AC7D 1238 2E01 2600 EDEB 007E F203
6350= BA02 2C80 AC7D 122F 2E01 2600 EDEB 0081
6358= F203 BA02 2C83 AC7D 2C7D 4005 AC30 4224
6360= AC86 2C30 4222 AC87 3804 3805 C587 EDEC
6368= 8088 EDEA 8086 AC85 A484 2C85 2484 EDEF
6370= 120F AE98 2C36 12A9 AE1C 2C51 4C89 B201
6378= 758A 2C62 AC51 2C2D AC23 7207 4000 4300
6380= 1190 1376 11E4 6496 649C 0C01 E401 2C2D
6388= 12F7 AEE7 1291 2E00 F201 758B 0C01 E401
6390= 2C36 12ED AEDF 12EE AE00 1287 AE1E 2C62
6398= AC51 2C2D AC23 0C01 E401 1261 2E09 F201
63A0= 758C 2C1B 241A 125B AE31 A630 2C36 1256
63A8= AE05 0C01 E401 2C62 AC8D 2C36 12D1 AECF
63B0= 124E 2E05 F201 758E 2C2D 1248 AE19 12C7
63B8= AEDC AEDB 12C8 2E01 2600 EDEC 008F AC92
63C0= A491 2C94 2493 EDEB 0091 EDEC 8088 AC96
63C8= A495 2C98 2497 EDEB 0095 EDEC 8088 AC9A
63D0= A499 2C9C 249B EDEB 0099 EDEC 8088 EDEA
63D8= 009D 1225 AE2F A62E 2E69 2668 EDEB 809F
63E0= F202 BA01 75A0 121B 2E69 2668 AC79 A478
63E8= 2C36 AC23 0C01 E401 2C36 1210 AE19 120D
63F0= 2E00 545D F201 72C6 128A 2EDC F201 75A1
63F8= 2C36 1285 AEDB 7203 1389 4200 4100 0C01
6400= E401 12FD 2E6B 266A AC79 A478 72E1 2C36
6408= 12F5 AE1B 72A9 2C2D 125E AECB AC29 12EF
6410= 2E09 545D F202 0C01 E401 2C1D 241C 12E7
6418= AE31 A630 2C36 124F AECE 0C01 E401 2C1B
6420= 241A 12DD AE31 A630 2C2D AC29 12D7 AE15
6428= 1242 AECA 12D2 2E00 F203 2C36 123C AECB
6430= 72EC 2C36 1238 AECA 1237 2E00 545D F201
6438= 75A2 12C3 2E00 545D F201 72DF 2C29 F201
6440= 75A3 2C2D 12BC AE00 2C36 1224 AEF8 2C2D
6448= 12B6 AE01 2C36 AC29 72D0 2C25 F201 75A4
6450= 12AE 2E01 545D F201 72C8 12A9 2E00 545D
6458= F201 75A5 2C36 12A2 AE17 120C 2EDC F201
6460= 75A6 2C36 1207 AEDB 72B8 2C36 1297 AE16
6468= 7203 4000 4300 1190 2C2D 1291 AE09 2C2D
6470= 12F9 AEDB AEDC AEF8 1289 AE17 2C36 AC25
6478= 2C83 1285 AE17 2CA8 24A7 1212 AE31 A630
6480= 729C 2C36 120C AE15 72EA 2C36 1208 AE06
6488= 7294 2C2D 1204 AE0C 72EE 7202 4200 4100
6490= 0000 0000 0000 0000 0000 0000 0000 0000
6498= 49C8 0000 49FC 4CCC 4AA6 8000 3F96 872A
64A0= 3EAF 837A 3DB0 BE0C 4A91 0000 4C86 6000
64A8= 4CD4 8000 4CE1 A000 4CE1 0000 4A96 0000
64B0= 4C8C A000 4CD7 A000 4CE1 5000 0000 0000
..
64C0= 0000 60C1 60C3 0000 0000 0024 0000 0033
64C8= 0005 0009 001D 0022 FFFF 6154 618D 47D2
64D0= 0000 6309 632C 4CCB C000 6338 639C 640A
64D8= 641E 0000 0000 6430 0048 005B 6484 6488
64E0= 411C 6181 411A 6185 4118 6189 608B 0000
64E8= 61A5 0000 1334 61D6 6268 6217 6247 6299
64F0= 62C6 620E 4132 FFFF 6214 620B 62CD 0001
64F8= 0000 0006 0800 6227 6238 0400 6259 626A
6500= 6275 6282 62A2 62B2 62CF 62DA 62E5 62F5
6508= 6305 6313 60ED 631F 000C 6336 0000 0000
6510= 412E 6386 6374 0000 4AD4 8000 0002 4BED
6518= 8000 0003 0000 0000 0000 0000 11E4 003C
6520= 6384 638F 63AA 0000 63EB 1AB9 2410 0000
6528= 0000 27E3 5282 0000 0000 33E3 E064 0000
6530= 0000 3F8A F89C 49B2 EF5C 416A 6400 6406
6538= 614C 644C 647A 6480 6464 4A97 4000 6481
6540= 6463 4A97 4000 49B2 EF5C 416A 640E 6414
6548= 614C 645A 6488 648E 6476 4A97 4000 0000
..
6560= 0000 67F4 2801 0AFE AC01 EF61 00DA 00DB
6568= 00A7 00A9 2CDC ACAD 125B 2E00 F201 75DD
6570= 2CDC 1257 AEFF ACAB 2CDF ACDE 2CDE 4252
6578= ACE0 2CDC ADE0 64DE 2CE1 4CDE B2F7 2CDA
6580= ACE2 2CE2 1CEB 9805 ACE3 2CE3 4244 ACE0
6588= 2DE0 1CEC 9805 ACE4 1CED 9805 ACE5 2CE4
6590= 1CEE 9805 ACE6 2CE4 1CEF 9805 ACE7 2CE5
6598= 1CF0 9805 ACF1 2CE6 4CF1 ACE8 2CE6 1CF2
65A0= 9805 ACF3 2CE7 4CF3 ACE9 2CE7 1CF2 9805
65A8= ACF4 2CE4 4CF4 ACEA 2CE2 421E ACF5 2CDB
65B0= ACF6 1CF6 EDF1 80F5 F201 75F7 2CE3 ACE0
65B8= 4214 ACF1 2CDC ADF1 2CE0 420D ACF3 2CDB
65C0= ACF4 2CDC 1CF4 EDF2 80F3 7207 07F6 136A
65C8= 4200 68A4 67F5 413F 42FF 2CE0 42FC ACF5
65D0= 2CDF ACF6 2CDC 1CF6 EDF2 80F5 75F8 2CE9
65D8= F201 7201 75F9 2CE9 42ED ACE0 2CFA ADE0
65E0= 2CE3 42E9 ACE0 2CDB ACF1 1CF1 EDF1 80E0
65E8= 54FB F201 75FC 125C 2E00 54FB A803 50A0
65F0= 5C80 5003 F201 75FD 2CE3 42D5 ACE0 2CDB
65F8= ACF1 2CDC 1CF1 EDF2 80E0 75FE 2CE3 42CB
6600= ACE0 2CDF ACF1 1CF1 EDF1 80E0 F202 1241
6608= 77FF 2CE3 42C2 ACE0 2CFA ADE0 2CDF 54FB
6610= 6005 ACE0 EFB4 00DF 00E0 00A7 00A9 EF32
```

```
6618= 0007 6664 661F 6625 6637 663B 6643 00EA
6620= 122A 2ED3 54FB F202 1227 7700 1221 2E00
6628= 54FB F202 1221 7700 2CFA ACAB 2CE3 429B
6630= ACE0 2CDF ACF1 2CFA 1CF1 EDF2 80E0 75F8
6638= 2CFA 1213 AE10 72EA 120E 2ED3 54FB F203
6640= 120B 2E01 ACE8 72DC 1207 7700 7206 1389
6648= 67F4 10D6 4000 69F4 4100 2CE5 12FD 4E02
6650= F201 7202 12F9 7700 75F8 12F2 2E00 54FB
6658= F202 12F2 7700 2CFA ACAB 12EF 2E0B 54FB
6660= F201 75F8 2CFA 125D AE60 2CE3 4258 ACE0
6668= 2CDB ACF1 2CFA 1CF1 EDF2 80E0 2CE5 F3F8
6670= 12DB 2005 B703 2CE8 12D7 AE04 12D5 2E04
6678= 4249 ACE0 2DE0 F201 7201 75F8 12CD 2E04
6680= 4241 ACE0 2DE0 AE05 4005 AE06 2E06 4238
6688= ACF1 2CDB ACF3 1CF3 EDF1 80F1 F202 128C
6690= 7707 2CE3 4005 422F ACE0 1236 2E05 4005
6698= 422A ACF1 3804 3805 C5F1 1CE0 A103 6003
66A0= A903 2CE2 421D ACF3 2CDB ACF4 2CFA 1CF4
66A8= EDF2 80F3 75F8 12A0 6604 72C8 2CE5 4005
66B0= 4212 ACE0 2CE8 4005 420F ACF1 3804 3805
66B8= C5F1 1CE0 A103 6003 A903 7206 67F5 413F
66C0= 4300 6868 413E 6853 2CE2 44DA ACE2 1234
66C8= 2E08 4CE2 B302 7201 6580 2CB1 12F2 AEEC
66D0= 2CB2 AEED 2CB3 AEEE 2CB4 AEEF 2CFA ACAC
66D8= 12E8 2E23 F202 2CDC ACAC 2CDF ACE2 2CE2
66E0= 4005 44F0 1259 AE09 2E09 42DA ACE0 2CDF
66E8= ACF1 1CF1 EDF1 80E0 54FB F202 124D 770A
66F0= 2CE2 6805 1249 AE0B 2CE2 6805 F201 7203
66F8= 2CDA 1242 AE0B 2CE2 6005 123E AE0C 2CE2
6700= 4CE1 F201 7203 2CF0 1237 AE0C 0000 2E0B
6708= 4005 44F0 AE0D 2E0C 4005 44F0 AE0E 2E0B
6710= 422C ACE0 2E0C 4229 ACF1 2E0D 42A9 ACF3
6718= 2CDF ACF4 ACF5 2E0E 42A3 ACF6 2CF4 AE0F
6720= 2DF1 A803 50A0 5DE0 5003 AE10 1E0F EDF1
6728= 80F6 A803 50A0 5E10 5003 AE11 1CF5 EDF1
6730= 80F3 A803 50A0 5E11 5003 ACAF 54FB F202
6738= 1203 770A 7202 68F4 4370 2CDC ACAC 64E2
6740= 2CE1 4CE2 B29C 125E 2E00 54FB F202 12F4
6748= 7712 2CFA ACAD 2CDC ACAC 1254 2E45 54FB
6750= F202 12EA 7713 124D 2E09 F202 12E5 7713
6758= 2CFA 1247 AE09 12E0 2E15 2614 1242 AE2D
6760= A62C 2CDC ACAC 123E 2E01 54FB F202 12D4
6768= 7716 1236 2EF4 F202 12CF 7716 2CFA 1231
6770= AE09 12CA 2E15 2614 122C AE2D A62C 2CDC
6778= ACAC 2CAC 54FB F202 2CDC ACAB 2CAB 1221
6780= AE0A 2CDC AE0B 12B8 7717 2CFA 1217 AEFF
6788= 1216 2E00 F203 2CFA 1215 AE5F 2CDC ACAC
6790= 2CFA ACAD 2CAC 54FB 120C AE03 2CAD AE0F
6798= 1206 2E00 1206 5E03 7205 4200 1389 4000
67A0= 4100 4300 F202 1298 7718 2CDC 12FB AE5F
67A8= 1293 7719 2CFA 12F6 AE5F 2CDC ACAE 128
67B0= 2E1A ACE2 2CE2 1288 4E1B F201 7202 1284
67B8= 771C 2CE2 4232 ACE0 2DE0 F202 122D 771D
67C0= 2CE2 422C ACE0 2CDC ADE0 1226 771C 2CE2
67C8= 4225 ACE0 2DE0 F202 121F 771C 2CE2 421E
67D0= ACE0 2CFA ADE0 ACAE 64E2 1216 2E1E 4CE2
67D8= B2D9 2CAE F209 2CDF 54FB 6005 ACE0 EF0B
67E0= 00DF 00E0 00A8 00AA 12BA 2E00 ACB0 0C01
67E8= E401 7204 07F6 68F4 43C9 68AB 0000 0000
67F0= 0000 0000 0000 0000 0000 0000 0044 0044
67F8= 410C 416C 416C 416C 416C 416C 416C 416C
6800= 0019 0019 0019 0019 0019 0019 0019 0019
6808= 0019 0019 8150 8450 8750 8A50 8D50 8F50
6810= 854C 0019 0019 0019 0019 0004 0004 0019
6818= 0019 4684 0019 4704 0019 420C 4308 410C
6820= 0019 0019 0019 412C 412C 412C 412C 412C
6828= 412C 412C 412C 0019 0019 0019 0019 412C
6830= 412C 0019 0019 0044 4654 4144 4544 4544
6838= 9148 4148 9348 0044 4148 0019 0019 0019
6840= 0019 0019 4208 4208 0019 0019 9504 9704
6848= 9904 9B04 9D04 9E04 9F04 A004 A104 A204
6850= 0019 0019 0019 0019 0019 0000 0001 46A0
6858= 0001 44C0 0001 47D2 0001 47C8 0001 47A0
6860= 0001 4DF8 1599 0000 0001 0000 0001 0000
6868= 0001 0016 0017 0000 0015 0018 0000 0018
6870= 0015 0000 0017 0016 0000 001A 0000 0019
6878= 0000 0045 0000 0043 0000 0053 0000 0054
6880= 0000 0051 0000 0052 0000 0056 0057 0058
6888= 0059 005A 0055 0056 0057 0058 0059 0000
..
6898= 0000 0000 0000 0005 0003 2000 0040 0000
..
68C8= 0000 0000 0000 0000 0000 0000 0002 0000
68D0= 0000 6784 0000 0001 0000 0007 0000 0000
68D8= 0000 0000 0000 0000 0000 0000 0000 4001
68E0= 4002 400C 4006 4003 0006 0000 0003 0000
68E8= 0000 0000 0000 65D6 66C3 65DF FFFF FFFF
68F0= 65FD 664C 6616 6654 6664 0004 FFFE 66AD
68F8= 0000 0000 0000 66AA 00BE 0000 673E 0000
6900= 0000 0000 0000 0000 0000 0000 674C 6762
6908= 0000 0000 6778 6791 67A9 67AC 000B 0012
6910= 67D3 67C6 0022 0000 0000 0000 0000 0000
..
6960= 6969 0000 0000 0000 0000 0000 0000 0000
6968= 0000 6AE6 0AFF 124B 2E00 F202 1249 7734
6970= 1248 2E0C 1245 AE2A 1244 2E0D 1241 AE2B
6978= 2E38 AE35 2E39 AE36 123D 2E00 1239 AE37
6980= 463A AE37 1235 773B 1233 2E3C AE35 2E3D
6988= AE36 2E3E AE37 122C 773B 122D 2E00 1228
6990= D63F 4640 AE35 4641 AE36 2E42 AE37 1220
6998= 2E35 AE43 121D 2E43 421F AE45 2F45 AE44
69A0= 1217 2E44 1215 5E46 6005 1212 AE47 1210
69A8= 2E44 120E 5E48 120C AE49 120A 1E4A 1208
69B0= 9E49 1206 6649 1204 2E44 7206 136A 6BE6
69B8= 4100 11C4 11C3 6B80 12FB 5E4B 12F9 2005
69C0= F74C 12F6 AE4D 12F4 1E4E 12F2 9E4D 12F0
69C8= 2E44 12EE 1E4F 9005 12EB 5E50 12E9 D63A
69D0= 12E7 AE51 12E5 6651 2E43 4260 AE45 2F45
69D8= AE52 4E53 F205 BA04 12DB 2E52 4E54 AE52
69E0= 12D7 2E52 EDEE AE56 A655 2E58 AE57 2E51
69E8= 424E AE45 2E52 4F45 BA02 12CA 7759 12C8
69F0= 2E38 AE57 12C5 775A 12C3 2E51 4241 AE45
69F8= 2E52 4F45 F201 B202 12BB 775B 12B9 2E46
6A00= AE57 12B5 775A 12B4 2E43 4005 4232 AE45
6A08= 3804 3805 C745 AC02 A401 2C02 12A9 5E38
6A10= AC02 2C02 F201 7202 12A3 775C 12A2 2E0D
6A18= F202 129E 775D 129C 2E5E AE2A 1299 774C
6A20= 1297 2E5F AE2A AE2B 1293 2E49 6005 AE60
6A28= 2E47 4649 AE61 2E49 4005 420C AE45 3804
6A30= 3805 C745 AC02 A401 7205 405E 6B70 6B71
6A38= 413E 6AE7 125A 2E60 AE62 1257 2E62 4005
6A40= 42F9 AE45 2C02 2401 EDEC 0155 EDEA 8145
6A48= AC02 A401 124A 6662 2E61 4E62 B2EE 2E4D
6A50= 4E63 F201 7202 1241 7764 123F 2E4D 4E65
6A58= F203 BA02 123A 7766 1238 2E4D 4005 4236
6A60= AE45 3804 3805 C745 EDEA 0001 AC02 A401
6A68= 122C 7764 2C02 2401 EDEB 0163 1226 AE68
6A70= A667 EDEC 016D AE6A A669 2E4D 4E65 AE4D
6A78= 2E4D 4005 AE45 421A AE6F 2E45 4217 AE70
6A80= 3804 3805 C770 EDEC 0171 EDEA 0167 EDED
6A88= 0173 1E6F A103 6003 A903 2E45 4208 AE75
6A90= 2E45 4205 AE76 7203 6BE6 6C10 6C14 3804
6A98= 3805 C776 EDEC 0171 EDEA 0169 EDED 0173
6AA0= 1E75 A103 6003 A903 12F0 7764 12EE 2E43
6AA8= 4005 428F AE45 3804 3805 C745 AC02 A401
6AB0= 2C02 12E3 5E58 12E1 5657 12DF 7777 2C02
6AB8= 12DC 5E57 AC02 12D9 2E43 4005 4221 AE45
6AC0= 2C02 2401 1E45 A103 6003 A903 12CE 6643
6AC8= 2E36 4E43 B302 7201 6999 2E37 12C6 2005
6AD0= F778 B779 12C2 2E2A 120A AE0C 12BE 2E2B
6AD8= 1206 AE0D EDE7 12B9 777A 7202 4100 413E
6AE0= 0000 0000 0000 0000 0000 0000 0000 0000
6AE8= 0000 D060 727C 3DDA 7F3C 479A 3758 3A9F
6AF0= FFE4 BE80 0000 3B95 FEDA BC10 0000 38F4
6AF8= 5176 BE3D 74BC 3CF9 FFD6 BA38 0000 3D84
6B00= 96EC B92B 95CE 0000 0000 0000 0000 0000
6B08= 0000 0000 0000 3AC8 EABE 479A 0000 369F
6B10= FC8A 0000 0000 41F9 FF2E 0000 0000 DE4A
6B18= 9452 2CB9 B212 3EDD 0528 4798 C188 0000
```

```
••
6B70= 0000 FF1E 12E3 FF1E 12E3 FE66 0730 0052
6B78= 0730 FF1E 12E3 FF1E 12E3 0000 0733 FFD8
6B80= 1000 00CD 08CD 00CD 08CD 00CD 08CD FE3E
6B88= 13EC FE3E 13EC FE3E 13EC FF1E 12E3 FF1E
6B90= 12E3 FF1E 12E3 FF1E 12E3 0294 0F64 0294
6B98= 0F64 0294 0F64 0000 0733 F060 0FA0 0000
6BA0= 1000 0000 1000 0000 1000 0000 1000 0000
6BA8= 1000 0000 1000 0000 1000 0000 1000 0000
6BB0= 1000 015E 095E 170C 1F0C 1F0C 1F0C 1F0C
6BB8= 1F0C 1F0C 1F0C 0000 0000 0000 0000 0000
6BC0= 0000 0000 0000 0000 0000 215E 215E 215E
6BC8= 215E 295E 295E 295E 0000 0000 0000 0000
6BD0= B544 B644 0000 0000 374C 0000 3F54 0000
6BD8= 4724 4F14 571C 0000 0000 0000 5901 5901
6BE0= 5901 5901 5901 5901 5901 5901 0000 0000
6BE8= 0000 0000 5901 5901 0000 0000 795E 6101
6BF0= 6101 6B01 6B01 715E 715E 715E 815E 895E
6BF8= 0000 0000 0000 0000 0000 972C 972C 0000
6C00= 0000 9F2C 9F2C 9F2C 9F2C A72C A72C A72C
6C08= A72C A72C A72C 0000 0000 0000 0000 0000
••
6C18= 0000 0000 6AD9 0000 0000 0000 0001 0014
6C20= 0002 6996 0015 0023 FFFF 000A 001A 0009
6C28= FFFE 0000 0000 0000 0003 0000 00FC 0000
6C30= 4002 0700 6AC5 0000 4008 400B 001F 0000
6C38= 0000 1FFF 4000 0000 0000 0000 FFFC 69F3
6C40= 6AA5 6A02 6A23 6A1F FFFF 0000 0000 0000
6C48= 0000 0007 6AB6 0004 6A69 0000 0000 0000
6C50= 0000 479A 0000 408E 3886 0000 0000 43A0
6C58= 0000 43C0 0000 0000 0000 6AB9 6983 698C
6C60= 696A 0000 43A0 0000 43C0 0000 0000 0000
6C68= 6AC2 6983 698C 696A 0000 0000 0000 0000
••
6CA0= 6CC8 0000 0000 0000 0000 0000 0000 0000
6CC8= 6E30 0AFF 3C28 2C28 442B AC28 4C2C F201
6CD0= B201 752D 2C2C AC28 EF5F 002E 002F 002B
6CD8= 0030 2C2E AC31 2C02 4258 AC32 2C31 4C33
6CE0= F204 B202 3805 F201 28A0 5D32 F201 752D
6CE8= 2C31 424C AC32 2D32 AC34 4437 1C38 9805
6CF0= AC35 1C39 9805 4C34 AC36 2C34 AC3A 423F
6CF8= AC3B 2D3B 6005 AC27 2C3A 4237 AC3C 2D3C
6D00= F201 753D 2C35 4234 AC32 2C36 AC3A 1C3A
6D08= EDF1 8032 543E F201 753F 2C35 4229 AC32
6D10= 2C36 AC3A 2C40 1C3A EDF2 8032 2C02 4C34
6D18= F201 7541 2C2E AC34 2C34 421A AC32 2C2F
6D20= AD32 6434 2C42 4C34 B2F7 2C39 AC43 1211
6D28= 2E01 4447 AC44 2E00 4447 AC45 2C27 AC32
6D30= 4209 AC3A 7207 07F6 41FF 6EC0 6FFF 437F
6D38= 0458 717F 2D3A AC25 2C32 4260 AC3B 2D3B
6D40= AC26 2C27 4448 AC46 2C25 5C49 6805 4446
6D48= AC4A 2C25 5C4B 1C4C 9805 AC4D 2C4D F201
6D50= 7201 754E 2C4D 4C4F F201 B201 7550 2C4F
6D58= 4C27 4C4D 543E 6005 AC51 2C51 42DB AC32
6D60= 2D32 AC26 2C53 4C46 4C4D 543E 6005 AC46
6D68= 2C53 4C4A 4C4D 543E 6005 AC4A 2C4D 4C4F
6D70= AC52 7554 2C4D 422B AC32 2D32 AC52 1C39
6D78= EF27 6E85 0029 0000 EDF5 0008 0052 EDF6
6D80= 2C4A AC32 421E AC3A 2C29 AD3A 2C32 421A
6D88= AC3B 2C2A AD3B 2C25 5C59 1C5A 9805 AC5B
6D90= 2C5B 4211 AC32 2D32 AC5B 1C5C 9C25 2C2E
6D98= AC5D 2C25 B201 755E 7206 7180 4397 3A72
6DA0= 717D 717E 6E33 2C43 4C39 F201 7201 753F
6DA8= 2C2F AC43 2C43 6005 AC5D 4433 AC5F 2C43
6DB0= 1C60 9805 AC43 2C03 4C45 F201 B200 2C2E
6DB8= 543E 6005 AC32 EF5E 002E 0032 0028 0030
6DC0= 2C26 1C4C 9805 AC61 1C63 9805 AC32 2C26
6DC8= 4C32 4447 AC62 2C61 4251 AC3A 2D3A AC61
6DD0= 1C01 EDF4 6E96 EDF5 0028 0044 0045 005B
6DD8= 0061 0062 2C5D AC64 2C64 4241 AC32 EDF5
6DE0= 0008 8032 6464 2C5F 4C64 B2F6 2C46 AC65
6DE8= 2C65 4233 AC3A EDF5 0008 803A 6465 2C4A
6DF0= 4C65 B2F6 EDF6 757E 2C27 4227 AC32 2D32
6DF8= B201 757F 2C34 421F AC32 2C40 AD32 2C2F
6E00= AC43 7580 2C35 4213 AC32 2C36 AC3A 1C3A
6E08= EDF1 8032 F201 753F 2C35 420E AC32 2C36
6E10= AC3A 2C81 1C3A EDF2 8032 2C63 AC43 7580
6E18= 7206 07F6 41FF 437F 717F 6E38 6E48 6431
6E20= 1209 2E00 4C31 B302 7201 6CDA EDE7 7582
6E28= 7201 6EC0 0000 0000 0000 0000 0000 0000
6E30= 0000 0001 000B 0001 A053 A050 A04D CC48
6E38= 5348 30B1 30B2 3033 30B4 3035 3036 30B7
6E40= 30B8 3039 B130 B1B1 B1B2 B133 B1B4 CC48
6E48= 5348 0000 0000 0000 0000 C3CC C541 D2A0
6E50= 2DA0 41CC 41D2 4DA0 2DA0 0000 0000 0000
6E58= 0000 0000 0000 0005 00B4 6E25 0001 0000
6E60= 1000 0000 0000 0003 0000 0000 0000 000F
6E68= 4004 0004 0000 0000 0000 6DF3 FFFF 6E1E
6E70= 0000 6D24 0018 0000 0000 0000 0000 0064
6E78= 0002 003F 0000 3F00 4008 0000 6D8A 0014
6E80= 6D71 0000 0000 0015 6D76 3001 8001 0200
6E88= 2001 00C0 4006 0000 2001 0000 6DA9 0000
6E90= 4002 0000 0000 0008 0000 0000 3001 6001
6E98= 8001 0100 0001 3AA0 8001 0100 6001 7001
6EA0= 0100 7001 0100 0001 4DA0 8001 0100 6002
6EA8= 701D 0100 6001 7014 0100 2001 6CD8 6E01
6EB0= 6D26 FFFF 6CCA 000B 0040 0062 0063 0064
6EB8= 0065 0066 0067 0068 0079 007C 00A8 00A9
6EC0= 00FD 0100 0160 000B 0040 0062 0063 0064
6EC8= 0065 0066 0067 0068 0079 007C 00A8 00A9
6ED0= 00AC 00AD 00AE 00AF 00B0 00B1 00B2 00B3
6ED8= 0006 0018 005E 005F 006F 0070 0071 0080
6EE0= 0081 0082 0083 0085 0086 0087 0088 0089
6EE8= 008A 008B 008C 00A4 008E 008F 0090 0092
6EF0= 0093 0094 0095 0096 0099 009A 009B 009D
6EF8= 009E 009F 00A0 00A1 00A2 000A 000D 0020
6F00= 0025 0026 0027 0028 0029 002E 002F 0030
6F08= 0031 0032 0033 0034 003C 003D 003E 003F
6F10= 007B 00A5 00A6 00E2 00E3 00E6 00E7 00EB
6F18= 00EC 00ED 0124 0101 0102 0146 0104 0105
6F20= 0106 0107 0108 0109 010A 012E 012F 0130
6F28= 0131 0132 0133 0134 0135 013A 013B 0103
6F30= 0115 0116 0117 0118 0119 011A 011B 0120
6F38= 0121 0129 012A 013E 013F 0140 0143 0144
6F40= 0145 0147 0126 0128 0141 0142 014D 014E
6F48= 0151 0152 0153 0154 0155 0156 0157 0158
6F50= 0159 015A 0161 002A 003A 00E9 00EA 00B8
6F58= 00B9 00BC 00BD 00BE 00BF 00C0 00C1 00C2
6F60= 00C3 0041 004E 0050 0051 0052 0053 0054
6F68= 0056 0057 0058 0059 005A 005B 0061 0172
6F70= 0173 0174 0175 0176 0177 0178 0073 0074
6F78= 0075 0076 0077 0078 007A 002C 00C8 00CA
6F80= 00CB 00CC 00CD 00CE 00CF 00D0 00D1 00D2
6F88= 00D3 00D4 00D5 00D6 00D7 00D8 00D9 00DA
6F90= 00DB 00DC 00DD 00DE 00DF 00E0 00E1 00E4
6F98= 00E5 0168 0169 0001 0002 0003 0005 0007
6FA0= 0009 000E 000F 0010 0011 0012 0013 0014
6FA8= 0016 0017 001A 001C 001D 001E 001F 0021
6FB8= 004D 005D 016A 015B 016C 015D 0000 0000
••
7000= 0000 0012 0029 003A 003A 0046 005A 0064
7008= 0064 0070 007B 0089 0089 0090 009A 00AC
7010= 00B9 00CB 00DD 00EF 0101 0101 010B 0119
7018= 012D 012D 0138 0138 0147 016C 017C 0189
7020= 019B 01A4 01A4 01A4 01BA 01C9 01D5 01DE
7028= 01E7 01F8 020D 021C 022D 023C 024B 0256
7030= 0267 0278 0289 0295 02AB 02B3 02B3 02B3
7038= 02B3 02BF 02D2 02D2 02E2 02F2 0304 0316
7040= 0325 0330 0330 0330 0330 0330 0330 0330
7048= 0347 0347 0359 0359 036A 0378 0391 0391
7050= 03A3 03B8 03CB 03DD 03EC 03EC 0402 0416
7058= 042C 043C 0452 0465 0465 047C 0491 04A6
7060= 04A6 04B7 04B6 04B5 04B4 04B3 04B2 04B1
7068= 04D0 04AF 04AE 04AD 04AC 04CA 04CA 04D4
7070= 04E4 04F4 04F4 0510 052C 0548 0564 0564
7078= 0564 057A 0588 0596 05A5 05A5 05A5 05A5
7080= 05AE 05B9 05CF 05E3 05E3 05F3 060E 061F
7088= 063A 064C 065F 0677 0690 0690 069C 06AC
7090= 06BB 06BB 06CE 06D8 06E5 06FD 070B 070B
```

```
7098= 0703 0713 0729 0739 0739 074D 0757 0765
70A0= 077D 078C 0797 0797 079F 07AE 07BD 07BD
70A8= 07D4 07EB 07EB 07F6 07F5 07F4 07F3 07F2
70B0= 07F1 07F0 07EF 07EE 07ED 07EC 07EB 0808
70B8= 0819 082A 082A 0835 0834 0833 0832 0831
70C0= 0830 082F 082E 082D 082C 082B 082A 0842
70C8= 084E 084E 085B 0868 0871 087A 0883 088C
70D0= 089B 08AA 08B9 08CA 08D3 08DC 08F7 0906
70D8= 090E 091F 0931 0944 094C 095C 0968 0974
70E0= 0980 098C 09A3 09B3 09C4 09CF 09D7 09DF
70E8= 09DF 09F3 0A07 0A15 0A21 0A34 0A34 0A34
 ..
7100= 0A55 0A69 0B1C 0A97 0A96 0A95 0A94 0A93
7108= 0A92 0A91 0A90 0A8F 0A8E 0A8D 0A8C 0B58
7110= 0B58 0B58 0B58 0B58 0B1B 0B1A 0B19 0B18
7118= 0B17 0B16 0B15 0B14 0B13 0B12 0B11 0B10
7120= 0B0F 0B58 0B58 0A43 0A55 0B43 0B42 0B41
7128= 0B0E 0B0D 0B0C 0B0B 0B0A 0ABB 0ABA 0AB9
7130= 0AB8 0AB7 0AB6 0AB5 0AB4 0AB3 0AB2 0AB1
7138= 0AB0 0AAF 0AAE 0AAD 0AAC 0B09 0B08 0B07
7140= 0B40 0B3F 0B06 0B05 0B04 0A7D 0B03 0B02
7148= 0B01 0B00 0AFF 0AFE 0B3E 0B3D 0B3C 0B3B
7150= 0B3A 0B39 0B38 0B37 0B36 0B35 0B34 0B33
7158= 0B32 0B31 0B58 0B58 0B58 0B58 0B58 0AD4
7160= 0AE9 0B58 0B58 0B58 0B58 0B58 0B58 0B58
7168= 0B65 0B75 0B85 0B90 0BA3 0BBB 0BBB 0BBB
7170= 0BBB 0BC6 0BC5 0BC4 0BC3 0BC2 0BC1 0BC0
7178= 0BBF 0BBE 0BBD 0BBC 0BBB 0BD6 0BD6 0BD6
7180= 0050 0101 41D4 53A0 C3CF 4ED4 A04D CF44
7188= C5A0 C94E C9D4 C941 D4C5 44A0 4259 A0CF
7190= 50C5 D2A0 0055 0102 D2D4 D2A0 53D4 D2C5
7198= 5353 A0C3 41CC C3A0 CCD4 A0B2 A048 D253
71A0= 2EA0 41D4 53A0 5355 5056 534E A0CF 4ECC
71A8= 59A0 004F 0103 D455 D242 A0CF 4EA0 CCC9
71B0= 4EC5 2EA0 41D4 53A0 5355 5056 534E A0CF
71B8= 4ECC 59A0 804A 0105 5641 CC56 C5A0 50CF
71C0= 53A0 CCC9 4DA0 CCD4 A039 35A5 8052 0106
71C8= 53CF 414B A0D4 C94D C5A0 D2C5 D12E A053
71D0= 5044 A044 C5C3 D2A0 D4CF A053 CF41 4BA0
71D8= 5350 44A0 8048 0107 D455 D242 A053 5044
71E0= A0C9 53A0 5AC5 D2CF 004A 0109 41D4 53A0
71E8= 5355 5056 534E A053 C5CC C5C3 D4C5 44A0
71F0= 0049 010A 41D4 53A0 C3CF 4ED4 A0D2 C5CA
71F8= C5C3 D4C5 44A0 C04C 010B 41D4 53A0 5355
7200= 5056 534E A0CF C6C6 A0C9 4EC9 0000 41D4
7208= C544 8045 010D CC41 D4C3 48A0 D455 D242
7210= 0048 010E D455 D242 A04E CFD4 A0CC 41D4
7218= C348 C544 0050 0201 48C5 41D4 A053 CF41
7220= 4BA0 44C5 CC41 592E A0D2 48A0 D4C5 4D50
7228= A0CC D4A0 3530 30C6 004B 0202 41D4 53A0
7230= 53D4 41D2 D455 50A0 C3CF 4D50 CCC5 D4C5
7238= 44A0 0050 0203 5355 4753 D444 A0C9 4EC9
7240= D4CC A0CC 44A0 D241 D4C5 A0BD A030 2E35
7248= A0A5 AF4D C94E 0050 0204 5355 4753 D444
7250= A0C9 4EC9 D4CC A0CC 44A0 D241 D4C5 A0BD
7258= A0B1 2E30 A0A5 AF4D C94E 0050 0205 5355
7260= 4753 D444 A0C9 4EC9 D4CC A0CC 44A0 D241
7268= D4C5 A0BD A0B1 2E35 A0A5 AF4D C94E 0050
7270= 0206 5355 4753 D444 A0C9 4EC9 D4CC A0CC
7278= 44A0 D241 D4C5 A0BD A0B2 2E30 A0A5 AF4D
7280= C94E 0048 0301 D2CF CCCC A0CF C6C6 A0D4
7288= 47A0 50C5 D24D 004C 0302 D2CF CCCC A0CF
7290= C6C6 A0D4 47A0 50C5 D24D A042 59A0 CF50
7298= C5D2 8052 0303 D2CF CCCC A0CF C6C6 A0D4
72A0= 47A0 4ECF D4A0 50C5 D24D 2EA0 CF56 C5D2
72A8= D2C9 44C5 A050 C5D2 4DA0 8049 0401 D4C6
72B0= D2A0 44C5 CC41 592E A048 C9A0 56C9 42D2
72B8= 004D 0403 CF56 C5D2 D2C9 44C5 A0C9 4EC9
72C0= D4C9 41D4 C544 A042 59A0 CF50 C5D2 0163
72C8= 0404 D4C6 D2A0 44C5 CC41 59A0 D4C9 CCA0
72D0= 53D4 4DA0 C348 53D4 A0C9 4E4E C5D2 A04D
72D8= D4CC A047 D4A0 5341 D4A0 D4C5 4D50 2EA0
72E0= D2C5 C34D 4E44 A0D4 48D2 A0D4 C54D 50A0
72E8= BDA0 D8D8 D8D8 A0C6 004E 0405 D4C6 D2A0
72F0= 44C5 CC41 592E A0CC CFA0 53D4 4DA0 C348
72F8= 53D4 A0D4 C54D 50A0 804B 0406 D4C6 D2A0
7300= D456 A0D4 CFA0 4756 A0C9 4EC9 D4C9 41D4
7308= C544 0050 0407 D4C6 D2A0 4ECF D4A0 C3CF
7310= 4D50 CCC5 D4C5 2EA0 CF50 C5D2 A0D4 414B
7318= C5A0 C3CF 4ED4 8047 0408 D4C6 D2A0 C3CF
7320= 4D50 CCC5 D4C5 44A0 8054 0502 5359 4EC3
7328= A044 C5CC 4159 2EA0 D2D4 D2A0 53D4 D2C5
7330= 5353 A0C3 CF55 CC44 A0C5 D8C3 C5C5 44A0
7338= CCC9 4DA0 804D 0503 CF50 C5D2 A050 55D4
7340= A041 55D4 CFA0 5359 4EC3 A0CF 4EA0 4155
7348= D4CF 804A 0504 424B D2A0 41C9 D2A0 53D7
7350= C9D4 C348 A0CF 50C5 4EA0 8047 0505 C6CC
7358= 44A0 424B D2A0 CCCF C34B C544 8047 0506
7360= 47C5 4EA0 424B D2A0 CCCF C34B C544 804F
7368= 0507 56CF CCD4 A0D2 C547 A053 D7C9 D4C3
7370= 48A0 4ECF D4A0 C94E A0CF C6C6 A050 CF53
7378= 8053 0508 5359 4EC3 A04E CFD4 A050 C5D2
7380= 4D2E A048 C9A0 56C9 42D2 2EA0 CF56 C5D2
7388= D2C9 44C5 A050 C5D2 4DA0 004D 0509 CF56
7390= C5D2 D2C9 44C5 A0C9 4EC9 D4C9 41D4 C544
7398= A042 59A0 CF50 C5D2 804F 050A 5359 4EC3
73A0= A04E CFD4 A050 C5D2 4D2E A047 C54E A053
73A8= 5953 A0C6 4155 CCD4 59A0 804D 050B 5350
73B0= 44A0 CF55 D4A0 CFC6 A0D2 414E 47C5 A0C6
73B8= CFD2 A053 594E C3A0 804D 050C 4ECF A0D2
73C0= 554E 4241 C34B A0C6 CFD2 A0C5 D8C3 C9D4
73C8= 41D4 C9CF 4EA0 8049 050D CF50 C5D2 A0C3
73D0= CCCF 53C5 A0C6 CC44 A042 4CD2 804F 050E
73D8= 4241 53C5 A041 44CA A04E CFD4 A041 D4A0
73E0= 4ECF A0CC 44A0 53C5 D4D4 C94E 472E 804F
73E8= 050F 56CF CCD4 A041 44CA A04E CFD4 A041
73F0= D4A0 4ECF A0CC 44A0 53C5 D4D4 C94E 472E
73F8= 804F 0510 CF50 C5D2 A050 CC41 C3C5 A056
7400= CFCC D4A0 D2C5 47A0 53D7 A0C9 4EA0 4155
7408= D4CF 804A 0511 56CF CCD4 A0D2 C547 A0CF
7410= 55D4 A0CF C6A0 53C5 D256 0054 0512 554E
7418= C9D4 A04E CFD4 A0CF 4EA0 CCC9 4EC5 2EA0
7420= D441 4BC5 A04D 414E A0C3 CF4E D4A0 D4CF
7428= A053 594E C3A0 0046 0513 47C5 4EA0 CF4E
7430= A0CC C94E C5A0 028A 0101 D2D4 D2A0 53D4
7438= D2C5 5353 A0BD A02E D8D8 D8D8 A0A0 C391
7440= 0102 D2D4 D2A0 53D4 D2C5 5353 A047 D4A0
7448= CCC9 4D2E A053 D4D2 C553 53A0 BD2E D8D8
7450= D8D8 A0A0 C08E 0201 C641 53D4 A0C9 4EC3
7458= D2A0 53D4 4DA0 C348 53D4 A0D4 C54D 50A0
7460= 44C9 C6C6 C08E 0202 C641 53D4 A044 C5C3
7468= D2A0 53D4 4DA0 C348 53D4 A0D4 C54D 50A0
7470= 44C9 C6C6 C090 0203 C641 53D4 A0C9 4EC3
7478= D2A0 C6CC 414E 47C5 A042 CFCC D4A0 D4C5
7480= 4D50 A044 C9C6 C6A0 C090 0204 C641 53D4
7488= A044 C5C3 D2A0 C6CC 414E 47C5 A042 CFCC
7490= D4A0 D4C5 4D50 A044 C9C6 C6A0 C08D 0205
7498= D4D2 C950 A0D4 55D2 422E A044 C9C6 C6A0
74A0= C5D8 50A0 2847 C54E A9A0 C089 0206 48C9
74A8= A044 C9C6 C6A0 C5D8 50A0 2847 C54E A9A0
74B0= C495 0301 D448 D2A0 53D4 4DA0 D4C5 4D50
74B8= A0CC CF2E A04D C94E C94D 554D A0D4 48D2
74C0= A0D4 C54D 50A0 BDA0 D8D8 D8D8 A0C6 C090
74C8= 0303 D2D4 D2A0 C3CF CC44 2EA0 44C5 C3D2
74D0= A0D4 48D2 A0D4 C54D 50A0 CCD4 A0B8 3030
74D8= A0C6 058F 0305 C341 CCC3 A0B1 53D4 A053
74E0= D447 A053 D44D A0D4 C54D 50A0 BDA0 D8D8
74E8= D8D8 A0C6 068C 0305 B153 D4A0 53D4 47A0
74F0= 4DD4 CCA0 D4C5 4D50 A0BD D8D8 D8D8 A0C6
74F8= C797 0306 D2CF CCCC A0CF C6C6 A0D4 47A0
7500= 48C5 CC44 2EA0 D2C5 D1A0 B153 D4A0 53D4
7508= 47A0 53D4 4DA0 D4C5 4D50 A0A0 D8D8 D8D8
7510= A0C6 C090 0308 D2CF CCCC A0CF C6C6 A0D4
7518= 47A0 48C5 CC44 2EA0 44C9 C6C6 A0C5 D850
7520= A028 47C5 4EA9 C093 0309 D2CF CCCC A0CF
7528= C6C6 A0D4 47A0 48C5 CC44 2EA0 4142 4ECF
7530= D24D A04D D4CC A0D4 C54D 50A0 44C9 C6C6
7538= C091 030A D2CF CCCC A0CF C6C6 A0D4 47A0
```

```
7540= 48C5 CC44 2EA0 48C9 A0C5 D848 A050 D2C5
7548= 5353 55D2 C5A0 C090 030B D2CF CCCC A0CF
7550= C6C6 A0D4 47A0 48C5 CC44 2EA0 D455 D242
7558= A0C5 D848 A0D4 C54D 50A0 C08D 030C D2CF
7560= CCCC A0CF C6C6 A0D4 47A0 48C5 CC44 2EA0
7568= 48C9 A0C5 C3C3 C54E C094 030E D2CF CCCC
7570= A0CF C6C6 A0D4 47A0 48C5 CC44 2EA0 CCCF
7578= A044 C548 A0C6 CC55 C944 A050 D2C5 5353
7580= 55D2 C5A0 C092 030F D2CF CCCC A0CF C6C6
7588= A0D4 47A0 48C5 CC44 2EA0 C641 55CC D459
7590= A042 D247 A0CF C9CC A053 5953 C094 0310
7598= D2CF CCCC A0CF C6C6 A0D4 47A0 48C5 CC44
75A0= 2EA0 C641 55CC D459 A047 CC41 4E44 A053
75A8= C541 CCA0 5359 53A0 C08E 0311 D2CF CCCC
75B0= A0CF C6C6 A0D4 47A0 48C5 CC44 2EA0 48B2
75B8= A0D4 C54D 50A0 48C9 C094 0312 D2CF CCCC
75C0= A0CF C6C6 A0D4 47A0 48C5 CC44 2EA0 44D2
75C8= 41C9 4EA0 5641 CC55 C553 A04E CFD4 A0CF
75D0= 50C5 4EA0 C091 0313 D2CF CCCC A0CF C6C6
75D8= A0D4 47A0 48C5 CC44 2EA0 48C9 A042 D247
75E0= A04D D4CC A0D4 C54D 50A0 C095 0401 D2D4
75E8= D2A0 53D4 D2C5 5353 A0C9 4E56 41CC C944
75F0= 2EA0 C3CF 4D50 A0C9 4EA0 53C5 D256 A0CC
75F8= D4A0 B2A0 48D2 53A0 C093 0402 48CF CC44
7600= A0CC 442E A0C6 4153 D4A0 C348 414E 47C5
7608= A0B1 53D4 A053 D447 A053 D44D A0D4 C54D
7610= 50A0 C093 0403 48CF CC44 A053 5044 2EA0
7618= C641 53D4 A0C3 4841 4E47 C5A0 B153 D4A0
7620= 53D4 47A0 53D4 4DA0 D4C5 4D50 C084 0501
7628= 48C9 A0C5 C3C3 C54E E091 DF91 DE91 DD91
7630= DC91 DB91 DA91 D991 D891 D791 D691 D591
7638= 0502 D4D2 C950 A0D4 55D2 422E A056 C942
7640= D2A0 47D4 A0CC C94D 2EA0 42D2 47A0 D8D8
7648= D8D8 A0A0 C088 0504 48CF CC44 A0CC 442E
7650= A048 C9A0 56C9 42D2 C08E 0505 44C5 C3D2
7658= A053 5044 A0D2 C5D1 A0D4 CFA0 C3CF D2D2
7660= C5C3 D4A0 56C9 42D2 C08E 0506 C94E C3D2
7668= A053 5044 A0D2 C5D1 A0D4 CFA0 C3CF D2D2
7670= C5C3 D4A0 56C9 42D2 C99A 0601 D2A0 53D4
7678= 4DA0 C348 53D4 A0D4 C54D 50A0 44C9 C6C6
7680= A047 D4A0 CCC9 4D2E A0C9 4E4E C5D2 A04D
7688= D4CC A0D4 C54D 50A0 CCCF D8D8 D8D8 A0C6
7690= CA9A 0602 D2A0 53D4 4DA0 C348 53D4 A0D4
7698= C54D 50A0 44C9 C6C6 A047 D4A0 CCC9 4D2E
76A0= A0C9 4E4E C5D2 A04D D4CC A0D4 C54D 50A0
76A8= 48C9 D8D8 D8D8 A0C6 CB9A 0603 CCA0 53D4
76B0= 4DA0 C348 53D4 A0D4 C54D 50A0 44C9 C6C6
76B8= A047 D4A0 CCC9 4D2E A0C9 4E4E C5D2 A04D
76C0= D4CC A0D4 C54D 50A0 CCCF D8D8 D8D8 A0C6
76C8= CC9A 0604 CCA0 53D4 4DA0 C348 53D4 A0D4
76D0= C54D 50A0 44C9 C6C6 A047 D4A0 CCC9 4D2E
76D8= A0C9 4E4E C5D2 A04D D4CC A0D4 C54D 50A0
76E0= 48C9 D8D8 D8D8 A0C6 C094 0607 D4D2 C950
76E8= A0D4 55D2 422E A042 4153 C5A0 C3CF 56C5
76F0= D2A0 D4C5 4D50 A044 C9C6 C6A0 47D4 A0CC
76F8= C94D A0A0 C08C 0608 4241 53C5 A0C3 CF56
7700= C5D2 A0D4 C54D 50A0 44C9 C6C6 A048 C9A0
7708= C08C 0609 41CC CCA0 44D2 41C9 4E53 A041
7710= D2C5 A04E CFD4 A0CF 50C5 4EA0 C08D 0700
7718= D4D2 C950 A0D4 55D2 422E A041 D453 A053
7720= 5550 5653 4EA0 CF4E CC59 C087 0703 CF50
7728= C5D2 A0D4 414B C5A0 C3CF 4ED4 C089 0704
7730= 5350 44A0 48CF CC44 2EA0 48C9 A056 C942
7738= D2A0 C094 0705 5350 44A0 48CF CC44 2EA0
7740= 48C9 A056 C942 D22E A053 5044 A0C9 4EC3
7748= D2A0 D4CF A041 56CF C944 A0D2 C553 C092
7750= 0706 5350 44A0 C94E C3D2 A0D4 CFA0 47C5
7758= D4A0 CFC6 C6A0 D2C5 53A0 42C5 C6CF D2C5
7760= A048 CFCC 44A0 008E 0708 D2D4 D2A0 53D4
7768= D2C5 5353 A048 C92E A044 C5C3 D2A0 CC44
7770= A0D2 41D4 C5A0 1099 0709 41C3 C3C5 CCA0
7778= D241 D4C5 A044 C5C3 D2A0 4259 A0D2 D4D2
7780= A053 D4D2 C553 532E A041 C3C3 C5CC A0D2
7788= 41D4 C5A0 BDA0 D8D8 D8D8 A0A0 008F 070A
7790= D2D4 D2A0 53D4 D2C5 5353 A041 CCCC CFD7
7798= 53A0 C94E C3D2 A0CC 44A0 D241 D4C5 1099
77A0= 070B 41C3 C3C5 CCA0 D241 D4C5 A0C9 4EC3
77A8= D2A0 4259 A0D2 D4D2 A053 D4D2 C553 532E
77B0= A041 C3C3 C5CC A0D2 41D4 C5A0 BDA0 D8D8
77B8= D8D8 A0A0 C090 070C 44C9 C6C6 A0C5 D850
77C0= A028 47C5 4EA9 A0D2 C5D1 A0C9 4EC3 D2A0
77C8= CC44 A0D2 41D4 C5A0 0091 070D 41C3 C3C5
77D0= CCA0 D241 D4C5 A0C9 4EC3 D2A0 4259 A044
77D8= C9C6 C6A0 C5D8 50A0 2847 C54E A9A0 C096
77E0= 070E 48C9 A056 C942 D2A0 D2C5 D1A0 48CF
77E8= CC44 A053 5044 2EA0 C94E C3D2 A053 5044
77F0= A0D4 CFA0 4156 CFC9 44A0 D2C5 53A0 8097
77F8= 070F 48CF CC44 A053 5044 2EA0 53C5 4E53
7800= CFD2 A0CF 55D4 A0CF C6A0 53C5 D256 C9C3
7808= C52E A9CF 56C5 D2D2 C944 C5A0 50C5 D24D
7810= C0CA 0F02 48CF CC44 A0CC 442E A048 C9A0
7818= 4DD4 CCA0 D4C5 4D50 C0CE 0F03 48CF CC44
7820= A0CC 442E A048 C9A0 414E D4C9 C3C9 50A0
7828= 4DD4 CCA0 D4C5 4D50 C0CD 0F04 48CF CC44
7830= A0CC 442E A048 C9A0 44C9 C6C6 A0C5 D850
7838= A028 47C5 4EA9 C0D1 0F06 48CF CC44 A0CC
7840= 442E A048 C9A0 414E D4C9 C3C9 50A0 44C9
7848= C6C6 A0C5 D850 A028 47C5 4EA9 C0C8 0F07
7850= 48CF CC44 A0CC 442E A0CC CFA0 5641 C3A0
7858= C0CB 0F08 48CF CC44 A0CC 442E A048 C9A0
7860= D2D4 D2A0 53D4 D2C5 5353 C0D6 0F09 48CF
7868= CC44 A0CC 442E A048 C9A0 D241 D4C5 A0CF
7870= C6A0 B153 D4A0 53D4 47A0 53D4 4DA0 D4C5
7878= 4D50 A0C3 4841 4E47 C5A0 C0CC 0F0A 48CF
7880= CC44 A0CC 442E A048 C9A0 42D2 47A0 4DD4
7888= CCA0 D4C5 4D50 C0CB 1002 48CF CC44 A053
7890= 5044 2EA0 48C9 A04D D4CC A0D4 C54D 50A0
7898= C0CF 1003 48CF CC44 A053 5044 2EA0 48C9
78A0= A041 4ED4 C9C3 C950 A04D D4CC A0D4 C54D
78A8= 50A0 C0CE 1004 48CF CC44 A053 5044 2EA0
78B0= 48C9 A044 C9C6 C6A0 C5D8 50A0 2847 C54E
78B8= A9A0 C0D2 1006 48CF CC44 A053 5044 2EA0
78C0= 48C9 A041 4ED4 C9C3 C950 A044 C9C6 C6A0
78C8= C5D8 50A0 2847 C54E A9A0 C0C8 1007 48CF
78D0= CC44 A053 5044 2EA0 CCCF A056 41C3 C0CC
78D8= 1008 48CF CC44 A053 5044 2EA0 48C9 A0D2
78E0= D4D2 A053 D4D2 C553 53A0 C0D6 1009 48CF
78E8= CC44 A053 5044 2EA0 48C9 A0D2 41D4 C5A0
78F0= CFC6 A0B1 53D4 A053 D447 A053 D44D A0D4
78F8= C54D 50A0 C348 414E 47C5 C0CD 100A 48CF
7900= CC44 A053 5044 2EA0 48C9 A042 D247 A04D
7908= D4CC A0D4 C54D 50A0 C0C9 100B 48CF CC44
7910= A053 5044 2EA0 48C9 A0C5 C3C3 C54E C086
7918= 0801 CFC9 CCA0 D4C5 4D50 A0CC CFA0 C08D
7920= 0802 CFC9 CCA0 D4C5 4D50 A0CF 55D4 A0CF
7928= C6A0 C3CF CFCC C5D2 A048 C9A0 C08D 0803
7930= CFC9 CCA0 D4C5 4D50 A0CF 55D4 A0CF C6A0
7938= C3CF CFCC C5D2 A0CC CFA0 C095 0805 D4D2
7940= C950 A0D4 55D2 422E A0D4 48D2 5553 D4A0
7948= 42D2 47A0 4DD4 CCA0 47CF 56A0 C54E 44A0
7950= D4C5 4D50 A048 C9A0 C095 0805 D4D2 C950
7958= A0D4 55D2 422E A0D4 48D2 5553 D4A0 42D2
7960= 47A0 4DD4 CCA0 47C5 4EA0 C54E 44A0 D4C5
7968= 4D50 A048 C9A0 E090 DF90 DE90 DD90 DC90
7970= DB90 DA90 D990 D890 D790 D690 D590 0805
7978= D4D2 C950 A0D4 55D2 422E A048 C9A0 4DD4
7980= CCA0 D4C5 4D50 A042 D247 D8D8 D8D8 A0A0
7988= C08F 0806 D448 D255 53D4 A042 D247 A04D
7990= D4CC A047 CF56 A0C5 4E44 A0D4 C54D 50A0
7998= 48C9 C08F 0806 D448 D255 53D4 A042 D247
79A0= A04D D4CC A047 C54E A0C5 4E44 A0D4 C54D
79A8= 50A0 48C9 E08B DF8B DE8B DD8B DC8B DB8B
79B0= DA8B D98B D88B D78B D68B D58B 0806 48C9
79B8= A04D D4CC A0D4 C54D 50A0 42D2 47A0 D8D8
79C0= D8D8 A0A0 C08A 0807 42D2 47A0 CFC9 CCA0
79C8= 50D2 C553 5355 D2C5 A0CC CFA0 C08B 0809
79D0= CFC9 CCA0 D4CF A0C3 CFCF CCC5 D2A0 D4C5
79D8= 4D50 A048 C9A0 C08B 080A 44C5 48A0 C6CC
```

```
79E0= 55C9 44A0 50D2 C553 5355 D2C5 A0CC CFA0
79E8= C087 0901 48B2 A0D4 C54D 50A0 A3B1 A048
79F0= C9A0 C087 0902 48B2 A0D4 C54D 50A0 A3B1
79F8= A0CC CFA0 C087 0903 48B2 A0D4 C54D 50A0
7A00= A3B2 A048 C9A0 C087 0904 48B2 A0D4 C54D
7A08= 50A0 A3B2 A0CC CFA0 C08D 0905 48B2 A044
7A10= 53C3 48D2 A0D4 C54D 50A0 D2C9 53C5 A047
7A18= D4A0 CCC9 4DA0 C08D 0906 C3CF CC44 A041
7A20= C9D2 A0D4 C54D 50A0 48C9 A0A3 B1A0 C3CF
7A28= CFCC C5D2 C08D 0907 C3CF CC44 A041 C9D2
7A30= A0D4 C54D 50A0 48C9 A0A3 B2A0 C3CF CFCC
7A38= C5D2 C08F 0908 C5D8 C3C9 D4C5 D2A0 D4C5
7A40= 4D50 A0D2 C953 C5A0 48C9 A0A3 B2A0 C3CF
7A48= CFCC C5D2 C087 0909 48B2 A050 D2C5 5353
7A50= 55D2 C5A0 48C9 C087 090A 48B2 A050 D2C5
7A58= 5353 55D2 C5A0 CCCF C099 090B 41C9 D2A0
7A60= 53C9 44C5 A053 C541 CCA0 CFC9 CCA0 4241
7A68= C34B A055 50A0 5055 4D50 A0D2 554E 4EC9
7A70= 4E47 2EA0 5055 D247 C5A0 47C5 4EA0 C08D
7A78= 090C 53C5 41CC A0CF C9CC A044 C9C6 C6A0
7A80= 50D2 C553 5355 D2C5 A0CC CFA0 C086 090D
7A88= 48B2 A050 55D2 C9D4 59A0 CCCF C08F 090E
7A90= C5D8 C3C9 D4C5 D2A0 D4C5 4D50 A0D2 C953
7A98= C5A0 48C9 A0A3 B1A0 C3CF CFCC C5D2 C090
7AA0= 090F 48B2 A053 C944 C5A0 53C5 41CC A0CF
7AA8= C9CC A0D4 C54D 50A0 CF55 D4A0 CFC6 A0CC
7AB0= C94D C091 0910 41C9 D2A0 53C9 44C5 A053
7AB8= C541 CCA0 CFC9 CCA0 D4C5 4D50 A0CF 55D4
7AC0= A0CF C6A0 CCC9 4DA0 C086 0911 47C5 4EA0
7AC8= CFC6 C6A0 4ECF D24D C08E 0912 48B2 A044
7AD0= 53C3 48D2 A0D4 C54D 50A0 44C9 C6C6 A047
7AD8= D4A0 CCC9 4DC9 D4A0 C08A 0A01 4850 A047
7AE0= CC41 4E44 A053 D44D A0D4 C54D 50A0 CCCF
7AE8= C08A 0A02 CC50 A047 CC41 4E44 A053 D44D
7AF0= A0D4 C54D 50A0 48C9 C08A 0A03 4850 A047
7AF8= CC41 4E44 A053 D44D A0D4 C54D 50A0 CCCF
7B00= C08A 0A04 4850 A047 CC41 4E44 A053 D44D
7B08= A0D4 C54D 50A0 48C9 C095 0A05 CC50 A0C5
7B10= D848 A0D4 C54D 50A0 47D4 A0B1 3630 C62E
7B18= A053 50D2 4159 53A0 5348 CF55 CC44 A042
7B20= C5A0 CF50 C54E C093 0A06 CC50 A0C5 D848
7B28= A0D4 C54D 50A0 47D4 A0B2 3530 C62E A053
7B30= 50D2 4159 53A0 41D2 C5A0 C3CC CF53 C544
7B38= C08A 0A07 CC50 A0C5 D848 A0D4 C54D 50A0
7B40= 47D4 A0B1 B735 C6A0 C089 0A08 CC50 A0C5
7B48= D848 A050 D2C5 5353 55D2 C5A0 48C9 0086
7B50= 0A09 C3CC CF53 C5A0 5350 D241 5953 0086
7B58= 0A0A CF50 C54E A053 50D2 4159 53A0 C092
7B60= 0B01 48C9 A041 4ED4 C9C3 C950 A044 C9C6
7B68= C6A0 C5D8 50A0 2847 C54E A92E A0D2 D4D2
7B70= A053 48CF D2D4 C092 0B02 48C9 A041 4ED4
7B78= C9C3 C950 A044 C9C6 C6A0 C5D8 50A0 2847
7B80= C54E A92E A0D2 D4D2 A0CC CF4E 47A0 C08D
7B88= 0B03 41CC CCA0 44D2 41C9 4EA0 5641 CC56
7B90= C553 A04E CFD4 A0CF 50C5 4EA0 C089 0B04
7B98= 44D2 41C9 4EA0 5641 CC56 C553 A0CF 50C5
7BA0= 4EA0 C091 0B05 44D2 41C9 4EA0 5641 CC56
7BA8= C5A0 53D7 C9D4 C348 A04E CFD4 A0C9 4EA0
7BB0= 4155 D4CF A050 CF53 C08D 0D01 41AF 44A0
7BB8= C3CF 4E56 C5D2 D4C5 D2A0 CF55 D4A0 CFC6
7BC0= A053 C5D2 56A0 C090 0D02 44C9 C6C6 A0C5
7BC8= D850 2847 C54E A9A0 53C5 4E53 CFD2 A0CF
7BD0= 55D4 A0CF C6A0 53C5 D256 C092 0D04 B153
7BD8= D4A0 53D4 47A0 53D4 4DA0 D4C5 4D50 A053
7BE0= C54E 53CF D2A0 CF55 D4A0 CFC6 A053 C5D2
7BE8= 56A0 C092 0D05 B153 D4A0 53D4 47A0 4DD4
7BF0= CCA0 D4C5 4D50 A053 C54E 53CF D2A0 CF55
7BF8= D4A0 CFC6 A053 C5D2 56A0 C08D 0D06 D248
7C00= A0D4 C54D 50A0 53C5 4E53 CFD2 A0CF 55D4
7C08= A0CF C6A0 53C5 D256 E093 DF93 DE93 DD93
7C10= DC93 DB93 DA93 D993 D893 D793 D693 D593
7C18= 0D07 56C9 42D2 A053 C54E 53CF D2A0 CF55
7C20= D4A0 CFC6 A053 C5D2 562E 53C5 4E53 CFD2
7C28= A0A3 D8D8 D8D8 A0A0 E497 E397 E297 E197
7C30= E097 DF97 DE97 DD97 DC97 DB97 DA97 D997
7C38= D897 D797 D697 D597 0D08 42D2 47A0 4DD4
7C40= CCA0 D4C5 4D50 A053 C54E 53CF D2A0 CF55
7C48= D4A0 CFC6 A053 C5D2 562E 53C5 4E53 CFD2
7C50= A0A3 D8D8 D8D8 A0A0 8093 0D09 53C5 4E53
7C58= CFD2 A0CF 55D4 A0CF C6A0 53C5 D256 2EA0
7C60= 41D4 53A0 C3CF 4ED4 A0D2 C5CA C5C3 D4C5
7C68= 44A0 0093 0D0A 53C5 4E53 CFD2 A048 CFCC
7C70= 44A0 CF56 C5D2 D2C9 44C5 A0C9 4EC9 D4C9
7C78= 41D4 C544 A042 59A0 CF50 C5D2 F393 F293
7C80= F193 F093 EF93 EE93 ED93 EC93 EB93 EA93
7C88= E993 E893 E793 E693 E593 E493 E393 E293
7C90= E193 E093 DF93 DE93 DD93 DC93 DB93 DA93
7C98= D993 D893 D793 D693 D593 0D0B D455 D242
7CA0= A053 C54E 53CF D2A0 CF55 D4A0 CFC6 A053
7CA8= C5D2 562E 53C5 4E53 CFD2 A0A3 D8D8 D8D8
7CB0= A0A0 E793 E693 E593 E493 E393 E293 E193
7CB8= E093 DF93 DE93 DD93 DC93 DB93 DA93 D993
7CC0= D893 D793 D693 D593 0D0C 47C5 4EA0 53C5
7CC8= 4E53 CFD2 A0CF 55D4 A0CF C6A0 53C5 D256
7CD0= 2EA0 53C5 4E53 CFD2 A0A3 D8D8 D8D8 A0A0
7CD8= C08B 0E01 48C5 41D4 A053 CF41 4BA0 44C5
7CE8= 41D4 A053 CF41 4BA0 44C5 CC41 592E A0D2
7CF0= 48A0 D4C5 4D50 A0CC CFA0 0F8E 0E03 C341
7CF8= CCC3 A053 CF41 4BA0 D4C9 4DC5 A0C9 4EA0
7D00= 4DC9 4EBD D8D8 D8D8 A0A0 0089 0E04 48C5
7D08= 41D4 A053 CF41 4BA0 C3CF 4D50 CCC5 D4C5
7D10= 1091 0E05 D2C5 4D41 C94E C94E 47A0 53CF
7D18= 414B A0D4 C94D C5A0 C94E A04D C94E A0BD
7D20= D8D8 D8D8 A0A0 C096 0E06 4DCF D2C5 A048
7D28= C541 D4A0 53CF 414B A0D4 C94D C5A0 D2C5
7D30= D155 C9D2 C544 2EA0 4850 A0D2 D4D2 A0D4
7D38= C54D 50A0 CCCF E08E DF8E DE8E DD8E DC8E
7D40= DB8E DA8E D98E D88E D78E D68E D58E 0503
7D48= 56C9 42D2 A047 D4A0 41CC 41D2 4DA0 CCC9
7D50= 4D2E A042 D247 D8D8 D8D8 A0A0 53C5 4E53
7D58= CFD2 A0A3 A0A0 B135 A0A0 E793 E693 E593
7D60= E493 E393 E293 E193 E093 DF93 DE93 DD93
7D68= DC93 DB93 DA93 D993 D893 D793 D693 D593
```

| Hex Starting Adrs | Program | Size |
|---|---|---|
| 20 | Sequence of Events Interrupt | 20 |
| 40 | Valve Interrupt | 60 |
| A0 | Zero Table | 60 |
| 100 | SRI Table | 20 |
| 120 | Plant CCI Subroutine | 78 |
| 198 | Speed Channel 1 Interrupt | 2F |
| 1C7 | Speed Channel 2 Interrupt | 19 |
| 1E0 | CCO Image Table | 20 |
| 200 | MONITOR | C5A |
| E5A | Monitor Patches | 6 |
| F00 | System Library | 26A |
| 116A | Breaker Open Interrupt | 16 |
| 1180 | Common Data | 300 |
| 1480 | Panel Interrupt | 20 |
| 14A0 | Turbine Trip Interrupt | 1D |
| 14BD | Auxiliary Sync. | E3 |
| 15A0 | Flash | 130 |
| 16D0 | Analog Scan | 1F0 |
| 18C0 | LCCO Subroutine | A2 |
| 1962 | Logic | 4FE |
| 1F60 | Visual Display | 220 |
| 2180 | Panel | 500 |
| 26B0 | Preset Subroutine | 80 |
| 2730 | Control | 810 |
| 2F40 | Stop/Initialize | 70 |
| 2FB0 | Speedloop Subroutine | 50 |
| 3000 | Programmers Console | 940 |
| 3940 | Short Format Library | 3B0 |
| 3E70 | Analog Digital Trend | 170 |
| 3FE0 | Task Error | 20 |
| 4000 | Automatic Turbine Startup Programs | 3D6F |

APPENDIX 8

Printout of Data Link Program in Fortran Language, etc.

```
CJOB X    2,5 PASEMANN              DEH DATA LINK
C
C              DR ALARM(OVERRUN) INTERRUPT PROGRAM
C
      INTEGER ICNT,INP,INFL
C
      LOGICAL ENDFL
C
      COMMON /INPB/INP(10)
C
      EQUIVALENCE (INP(7),ENDFL),(INP(9),ICNT),(INP(10),INFL)
C
      DATA N7/7/
C
C     ONLY WHILE INPUTTING A MESSAGE AN ALARM ZEROES INPUTCOUNT
C     AND THE ERROR MESSAGE NAK IS OUTPUT
C
      IF (ENDFL) GOTO 1000
      INFL=2
      CALL M:IN(N7)
C
      ICNT=0
C
      ENDFL=.TRUE.
C
S1000 JMP      *223
C
      END
 ORIGIN= 3CF0
SD,INPB/0EC4-0ECD
LD
 AREA USED 3CF0-*3D0D
UN
 NONE
MP
 INPB     = 0EC4-*0ECD
LB
 3CF0= 3D09 0AFF 1210 2E06 F201 7502 2C03 1208
 3CF8= AE09 EDE4 0001 1207 3E08 2C04 AE06 71DF
 3D00= EDE7 7201 0EC4 0000 0000 0000 0000 0000
 3D08= 0000 0000 0007 3CFE 0002 FFFF **** ****
PP
XT
0001: CJOB X7002,5 PASEMANN              DEH DATA LINK
0002: C
0003: C              DR ALARM(OVERRUN) INTERRUPT PROGRAM
0004: C
0005:       INTEGER ICNT,INP,INFL
0006: C
0007:       LOGICAL ENDFL
0008: C
0009:       COMMON /INPB/INP(10)
0010: C
0011:       EQUIVALENCE (INP(7),ENDFL),(INP(9),ICNT),(INP(10),INFL)
0012: C
0013:       DATA N7/7/
0014: C
0015: C     ONLY WHILE INPUTTING A MESSAGE AN ALARM ZEROES INPUTCOUNT
0016: C     AND THE ERROR MESSAGE NAK IS OUTPUT
0017: C
0018:       IF (ENDFL) GOTO 1000
    0000    0000                     DAT    X'0000'
    0001    0AFF  08 2 FF            LDB    $+X'FFFF'
    0002    1200  10 2 00            LDC    $+X'0000'
    0003    2E06  28 6 06            LDA    ENDFL ,C
    0004    F200  F0 2 00            ZJP    $+X'0000'
    0005    7502  70 5 02            JMP    *)1000 ,B
0019:       INFL=2
0020:       CALL M:IN(N7)
```

```
      0003+B   0002
      0006     2C03   28 4 03              LDA    =X'0002' ,B
      0007     1205   10 2 05              LDC     $+X'0005'
      0008     AE09   A8 6 09              STA     INFL,C
0021: C
0022:          ICNT=0
0023: C
0024:          ENDFL=.TRUE.
0025: C
      0009     EDE4   E8 5 E4              SST    *M:IN,B
      000A     0001                        ADL     N7
      000B     1204   10 2 04              LDC     $+X'0004'
      000C     3E08   38 6 08              STZ     ICNT,C
      0004+B   FFFF
      000D     2C04   28 4 04              LDA    =X'FFFF' ,B
      000E     AE06   A8 6 06              STA     ENDFL ,C
0026: S1000 JMP       *223
      000F     71DF   70 1 DF    )1000     JMP    *X'FFDF'
0027: C
0028:          END
      0010     EDE7   E8 5 E7              SST    *EXIT,B
                                            LPL
      0011     7200   70 2 00              JMP     $+X'0000'
      0012     0000                        DAT     X'0000'
      0000     0019                        ADL     X'0019'
   EXT M:IN
   EXT EXIT
   VAR ICNT   0008 IN INPB
   ARR INP    0000 IN INPB
   VAR INFL   0009 IN INPB
   VAR ENDFL    0006 IN INPB
   VAR N7  0001 IN DP
PROGRAM SIZE: 0025    DATA POOL SIZE: 0005    ERROR COUNT:  0000
CJOB X7002,5 PASEMANN              DEM DATA LINK
C
C
C          DATALINK - DR INTERRUPT PROGRAM
C
      INTEGER INP,COSY,INPUT,CCKS,ICNT,ICOMP,ETXSY,ENDSY,DATSY
C
      LOGICAL ENDFL,ACCFL
C
      COMMON /SYMB/COSY(10)
      COMMON /INPB/INP(10)
C
      EQUIVALENCE (INP(6),ICOMP),(INP(7),ENDFL),(INP(8),ACCFL)
     1, (INP(9),ICNT),(INP(10),INFL),(COSY(1),DATSY)
     2,(COSY(5),ENDSY),(COSY(6),ETXSY),(COSY(7),STXSY)
C
      DATA N7/7/
C
C          INPUT FROM DR-CARD
C
S     IOA       145
S     STA       INPUT
C
C     IS THIS FIRST INPUT ?
C
      IF(ICNT.NE.0) GO TO 30
C
C     CHECK IF DL IS READY TO ACCEPT NEW INPUTS
C
      IF (.NOT.ACCFL) GOTO 100
C
C     PROCESS FIRST INPUT
C
      IMXCNT=8
      ENDFL=.FALSE.
      CCKS=0
      INFL=0
C
      IF (INPUT.LO.DATSY)  GOTO 1000
      GOTO 100
C
C     IS THIS SECOND INPUT ?
C
```

```
 30    IF(ICNT .GT. 1) GOTO 40
C
C      PROCESS SECOND INPUT
C
       IF(INPUT.EQ.ENDSY) GOTO 1000
       GOTO 100
C
C      IS THIS SIXTH INPUT ?
C
 40    IF(ICNT.GE.5) GOTO 60
C
C      PUT INPUT IN BUFFER
C
       INP(ICNT+1)=INPUT
C
C      CALCULATE CHECKSUM
C
S      LDA       CCKS
S      EOR       INPUT
S      STA       CCKS
       GOTO 1000
C
C      CHECK IF LAST TWO TRANSMISSIONS ETX AND CCKS ARE ALL RIGHT
C
 60    IF (ICNT.EQ.6)  GOTO 70
C
       IF (INPUT.EQ.ETXSY)  GOTO 1000
       GOTO 100
C      CHECK IF THIS IS CHECKSUM IF,BID DL-TASK
C
  70   IF ( INPUT .EQ. CCKS) GOTO 900
C
C      SET UP ERROR INDICATION FOR OTHER COMPUTER
C
       INFL=3
       GOTO 101
C
C      THE EXIT IN CASE OF ANY ERRORS,THE INPUTCOUNTER IS ZEROED
C      SET UP ERROR INDICATION FOR OTHER COMPUTER
C
 100   INFL=2
 101   ICNT=-1
       ACCFL=.TRUE.
C
       GOTO 800
C
C      EXIT AFTER COMPLETE INPUT
C
 900   ACCFL=.FALSE.
       INFL=1
C
C      FINAL EXIT DL TASK IS BID
 800   CALL M:IN(N7)
C
C      SET FLAGS
C
       INP(49)=1
       ENDFL=.TRUE.
C
C      INCREMENT INPUT-COMPLETION COUNTER
C
       ICOMP=ICOMP+1
C
C      REGULAR EXIT THE INPUT-COUNTER IS INCREMETED
C
 1000 ICNT=ICNT+1
C
C      CHECK IF TOO MANY INPUTS
C
       IMXCNT=IMXCNT-1
       IF (IMXCNT.EQ.0) GOTO 100
C
C      EXIT INTERRUPT PROGRAM
C
S      JMP       *223
C
       END
```

```
 ORIGIN= 3DE0
SD,INPB,0EC4-0ECD
SD,SYMB,0EBA-0EC3
LD
 AREA USED 3DE0-*3E6C
UN
 NONE
MP
 INPB     = 0EC4-*0ECD
 SYMB     = 0EBA-*0EC3
LO
 3DE0= 3E55 0AFF 8891 AC02 1258 2E08 F201 7504
 3DE8= 1254 2E07 5405 F201 7506 2C08 AC07 2C09
 3DF0= 124C AE06 3C03 3E09 2C02 1248 4E00 F201
 3DF8= 7201 750A 7506 1241 2E08 6805 F202 BA01
 3E00= 7503 2C02 123B 4E04 F201 7201 750A 7506
 3E08= 1234 2E08 4C0C BA01 750D 122F 2E08 422D
 3E10= AC0E 2C02 AD0E 2C03 5402 AC03 750A 1225
 3E18= 2E08 4C0F F201 7201 7510 2C02 121F 4E05
 3E20= F201 7201 750A 7506 2C02 4C03 F201 7201
 3E28= 7511 2C12 1212 AE09 7513 2C14 120E AE09
 3E30= 2C05 120B AE08 2C15 AE07 7516 2C09 1205
 3E38= AE07 2C17 AE09 7202 0EC4 0EBA EDE4 0001
 3E40= 2C17 12FB AE30 2C15 AE06 6605 12F6 6608
 3E48= 6C07 2C07 F201 7201 72E0 710F EDE7 0000
 3E50= 0000 0000 0000 0000 0000 0000 0007 0000
 3E58= 0000 3DFA FFFF 3E2C 0000 0008 0000 3E45
 3E60= 3E07 0005 3E16 0000 0006 3E23 3E35 0003
 3E68= 3E2F 0002 FFFF 3E3D 0001 **** **** ****
PP
XT
0001: CJOB X7002,5 PASEMANN              DEH DATA LINK
0002: C
0003: C
0004: C         DATALINK - DR INTERRUPT PROGRAM
0005: C
0006:       INTEGER INP,COSY,INPUT,CCKS,ICNT,ICOMP,ETXSY,ENQSY,DATSY
0007: C
0008:       LOGICAL ENDFL,ACCFL
0009: C
0010:       COMMON /SYMB/COSY(10)
0011:       COMMON /INPB/INP(10)
0012: C
0013:       EQUIVALENCE (INP(6),ICOMP),(INP(7),ENDFL),(INP(8),ACCFL)
0014:      1, (INP(9),ICNT),(INP(10),INFL),(COSY(1),DATSY)
0015:      2,(COSY(5),ENQSY),(COSY(6),ETXSY),(COSY(7),STXSY)
0016: C
0017:       DATA N7/7/
0018: C
0019: C          INPUT FROM DR-CARD
0020: C
0021: S     IOA       145
    0000    0000                       DAT   X'0000'
    0001    0AFF  08 2 FF              LDB   $+X'FFFF'
    0002    8891  88 0 91              IOA   X'FF91'
0022: S     STA       INPUT
    0003    AC02  A8 4 02              STA   INPUT ,B
0023: C
0024: C     IS THIS FIRST INPUT ?
0025: C
0026:       IF(ICNT.NE.0) GO TO 30
    0004    1200  10 2 00              LDC   $+X'0000'
    0005    2E08  28 6 08              LDA   ICNT,C
    0006    F200  F0 2 00              ZJP   $+X'0000'
0027: C
0028: C     CHECK IF DL IS READY TO ACCEPT NEW INPUTS
0029: C
    0007    7504  70 5 04              JMP   *)30 ,B
0030:       IF (.NOT.ACCFL) GOTO 100
    0008    1204  10 2 04              LDC   $+X'0004'
    0009    2E07  28 6 07              LDA   ACCFL ,C
    0005+B  FFFF
    000A    5405  50 4 05              EOR   =X'FFFF' ,B
    000B    F200  F0 2 00              ZJP   $+X'0000'
0031: C
```

```
0032: C       PROCESS FIRST INPUT
0033: C
    000C      7506  70 5 06            JMP  *)100,B
0034:         IMXCNT=8
0035:         ENDFL=.FALSE.
0036:         CCKS=0
0037:         INFL=0
0038: C
0039:         IF (INPUT.EQ.DATSY)  GOTO 1000
    0008+B    0008
    000D      2C08  28 4 08            LDA  =X'0008' ,B
    000E      AC07  A8 4 07            STA   IMXCNT,B
    0009+B    0000
    000F      2C09  28 4 09            LDA  =X'0000' ,B
    0010      1208  10 2 08            LDC   $+X'0008'
    0011      AE06  A8 6 06            STA   ENDFL ,C
    0012      3C03  38 4 03            STZ   CCKS,B
    0013      3E09  38 6 09            STZ   INFL,C
    0014      2C02  28 4 02            LDA   INPUT ,B
    0015      1200  10 2 00            LDC   $+X'0000'
    0016      4E00  48 6 00            SUB   DATSY ,C
    0017      F201  F0 2 01            ZJP   $+X'0001'
    0018      7200  70 2 00            JMP   $+X'0000'
    0019      750A  70 5 0A            JMP  *)1000 ,B
0040:         GOTO 100
0041: C
0042: C       IS THIS SECOND INPUT ?
0043: C
    001A      7506  70 5 06            JMP  *)100,B
0044:  30     IF(ICNT .GT. 1) GOTO 40
    001B      120B  10 2 0B   )30      LDC   $+X'000B'
    001C      2E08  28 6 08            LDA   ICNT,C
    001D      6805  68 0 05            DCR   X'0005'
    001E      F200  F0 2 00            ZJP   $+X'0000'
    001F      BA01  B8 2 01            NJP   $+X'0001'
0045: C
0046: C       PROCESS SECOND INPUT
0047: C
    0020      750B  70 5 0B            JMP  *)40 ,B
0048:         IF(INPUT.EQ.ENQSY) GOTO 1000
    0021      2C02  28 4 02            LDA   INPUT ,B
    0022      120D  10 2 0D            LDC   $+X'000D'
    0023      4E04  48 6 04            SUB   ENQSY ,C
    0024      F201  F0 2 01            ZJP   $+X'0001'
    0025      7200  70 2 00            JMP   $+X'0000'
    0026      750A  70 5 0A            JMP  *)1000 ,B
0049:         GOTO 100
0050: C
0051: C       IS THIS SIXTH INPUT ?
0052: C
    0027      7506  70 5 06            JMP  *)100,B
0053:  40     IF(ICNT.GE.5) GOTO 60
    0028      120D  10 2 0D   )40      LDC   $+X'000D'
    0029      2E08  28 6 08            LDA   ICNT,C
    000C+B    0005
    002A      4C0C  48 4 0C            SUB  =X'0005' ,B
    002B      BA00  B8 2 00            NJP   $+X'0000'
0054: C
0055: C       PUT INPUT IN BUFFER
0056: C
    002C      750D  70 5 0D            JMP  *)60 ,B
0057:         INP(ICNT+1)=INPUT
0058: C
0059: C       CALCULATE CHECKSUM
0060: C
0061: S       LDA       CCKS
    002D      1205  10 2 05            LDC   $+X'0005'
    002E      2E08  28 6 08            LDA   ICNT,C
    002F      4202  40 2 02            ADD  =X'0000'
    0030      AC0E  A8 4 0E            STA   #AIA,B
    0031      2C02  28 4 02            LDA   INPUT ,B
    0032      AD0E  A8 5 0E            STA  *#AIA,B
    0033      2C03  28 4 03            LDA   CCKS,B
0062: S       EOR       INPUT
```

```
   0034     5402  50 4 02                EOR   INPUT ,B
0063: S     STA       CCKS
   0035     AC03  A8 4 03                STA   CCKS,B
0064:       GOTO 1000
0065: C
0066: C     CHECK IF LAST TWO TRANSMISSIONS ETX AND CCKS ARE ALL RIGHT
0067: C
   0036     750A  70 5 0A                JMP   *)1000 ,B
0068:  60   IF (ICNT.EQ.6)  GOTO 70
   0037     1208  10 2 08   )60          LDC   $+X'0008'
   0038     2E08  28 6 08                LDA   ICNT,C
   000F+B   0006
   0039     4C0F  48 4 0F                SUB   =X'0006' ,B
   003A     F201  F0 2 01                ZJP   $+X'0001'
   003B     7200  70 2 00                JMP   $+X'0000'
0069: C
   003C     7510  70 5 10                JMP   *)70 ,B
0070:       IF (INPUT.EQ.ETXSY)  GOTO 1000
   003D     2C02  28 4 02                LDA   INPUT ,B
   003E     121C  10 2 1C                LDC   $+X'001C'
   003F     4E05  48 6 05                SUB   ETXSY ,C
   0040     F201  F0 2 01                ZJP   $+X'0001'
   0041     7200  70 2 00                JMP   $+X'0000'
   0042     750A  70 5 0A                JMP   *)1000 ,B
0071:       GOTO 100
0072: C     CHECK IF THIS IS CHECKSUM IF,BID DL=TASK
0073: C
   0043     7506  70 5 06                JMP   *)100,B
0074:   70  IF ( INPUT .EQ. CCKS) GOTO 900
   0044     2C02  28 4 02   )70          LDA   INPUT ,B
   0045     4C03  48 4 03                SUB   CCKS,B
   0046     F201  F0 2 01                ZJP   $+X'0001'
   0047     7200  70 2 00                JMP   $+X'0000'
0075: C
0076: C     SET UP ERROR INDICATION FOR OTHER COMPUTER
0077: C
   0048     7511  70 5 11                JMP   *)900,B
0078:       INFL=3
0079:       GOTO 101
   0012+B   0003
   0049     2C12  28 4 12                LDA   =X'0003' ,B
   004A     1213  10 2 13                LDC   $+X'0013'
   004B     AE09  A8 6 09                STA   INFL,C
0080: C
0081: C     THE EXIT IN CASE OF ANY ERRORS,THE INPUTCOUNTER IS ZEROED
0082: C     SET UP ERROR INDICATION FOR OTHER COMPUTER
0083: C
   004C     7513  70 5 13                JMP   *)101,B
0084:  100  INFL=2
   0014+B   0002            )100
   004D     2C14  28 4 14                LDA   =X'0002' ,B
   004E     1204  10 2 04                LDC   $+X'0004'
   004F     AE09  A8 6 09                STA   INFL,C
0085:  101  ICNT=-1
0086:       ACCFL=.TRUE.
0087: C
0088:       GOTO 800
   0050     2C05  28 4 05                LDA   =X'FFFF' ,B
   0051     1203  10 2 03                LDC   $+X'0003'
   0052     AE08  A8 6 08                STA   ICNT,C
   0015+B   FFFF
   0053     2C15  28 4 15                LDA   =X'FFFF' ,B
   0054     AE07  A8 6 07                STA   ACCFL ,C
0089: C
0090: C     EXIT AFTER COMPLETE INPUT
0091: C
   0055     7516  70 5 16                JMP   *)800,B
0092:  900  ACCFL=.FALSE.
0093:       INFL=1
0094: C
0095: C     FINAL EXIT DL TASK IS BID
   0056     2C09  28 4 09                LDA   =X'0000' ,B
   0057     1206  10 2 06                LDC   $+X'0006'
   0058     AE07  A8 6 07                STA   ACCFL ,C
```

```
    0017+B   0001
    0059     2C17   28 4 17            LDA   =X'0001' ,B
    005A     AE09   A8 6 09            STA    INFL,C

                                        LPL
    005B     7200   70 2 00            JMP    $+X'0000'
    005C     0000                      DAT    X'0000'
    005D     0000                      DAT    X'0000'
0096:   800  CALL M:IN(N7)
0097: C
0098: C      SET FLAGS
0099: C
0100:        INP(49)=1
0101:        ENDFL=.TRUE.
0102: C
0103: C      INCREMENT INPUT-COMPLETION COUNTER
0104: C
0105:        ICOMP=ICOMP+1
0106: C
0107: C      REGULAR EXIT THE INPUT-COUNTER IS INCREMETED
0108: C
    005E     EDE4   E8 5 E4            SST   *M:IN,B
    005F     0001                      ADL    N7
    0060     2C17   28 4 17            LDA   =X'0001' ,B
    0061     12FB   10 2 FB            LDC    $+X'FFFB'
    0062     AE30   A8 6 30            STA    INP ,C
    0063     2C15   28 4 15            LDA   =X'FFFF' ,B
    0064     AE06   A8 6 06            STA    ENDFL ,C
    0065     6605   60 6 05            INC    ICOMP ,C
0109: C1000  ICNT=ICNT+1
0110: C
0111: C      CHECK IF TOO MANY INPUTS
0112: C
0113:        IMXCNT=IMXCNT-1
0114:        IF (IMXCNT.EQ.0) GOTO 100
    0066     12F6   10 2 F6            LDC    $+X'FFF6'
    0067     6608   60 6 08            INC    ICNT,C
    0068     6C07   68 4 07            DCR    IMXCNT,B
    0069     2C07   28 4 07            LDA    IMXCNT,B
    006A     F201   F0 2 01            ZJP    $+X'0001'
    006B     7200   70 2 00            JMP    $+X'0000'
0115: C
0116: C      EXIT INTERRUPT PROGRAM
0117: C
    006C     72E0   70 2 E0            JMP    )100
0118: S      JMP      *223
    006D     71DF   70 1 DF            JMP   *X'FFDF'
0119: C
0120:        END
    006E     EDE7   E8 5 E7            SST   *EXIT,B
    0000     0075                      ADL    X'0075'
  EXT M:IN
  EXT EXIT
  ARR INP    0000 IN INPB
  ARR COSY   0000 IN SYMB
  VAR INPUT    0002 IN DP
  VAR CCKS   0003 IN DP
  VAR ICNT   0008 IN INPB
  VAR ICOMP    0005 IN INPB
  VAR ETXSY    0005 IN SYMB
  VAR ENQSY    0004 IN SYMB
  VAR DATSY    0000 IN SYMB
  VAR ENDFL    0006 IN INPB
  VAR ACCFL    0007 IN INPB
  VAR INFL   0009 IN INPB
  VAR STXSY    0006 IN SYMB
  VAR N7  0001 IN DP
  VAR IMXCNT  0007 IN DP
  VAR #AIA  000E IN DP
PROGRAM SIZE: 0117    DATA POOL SIZE: 0024    ERROR COUNT:  0000
CJOB X7002,5 PASEMANN               DEH DATA LINK
C
C            DATA LINK  DT INTERRUPT-(OUTPUT) PROGRAM
C
      INTEGER OUT,ITMP,M,OCNT
```

```
C
      COMMON /OUTPB/OUT(50)
C
      EQUIVALENCE (OUT(49),OCNT),(OUT(48),M),(OUT(50),OEND)
C
      LOGICAL OEND
C
C
C     CHECK IF THIS IS LAST COMPLETION INTERRUPT
C
      OCNT=OCNT-1
      IF (OCNT.LE.0) GOTO 1000
C
C     SET UP ARRAY SUBSCRIPT FOR THIS OUTPUT
C
      M=M+1
      TEMP=OUT(M)
S     LDA       TEMP
S     IDA       16
      GOTO 500
C     LAST EXIT
 1000 OEND=.TRUE.
C
C     REGULAR END
C
S500  JMP       *223
      END
 ORIGIN= 0E92
SD,B  B,0ECE-0EFF
LD
 AREA USED 0E92--0EB7
UN
 NONE
MP
 OUTPB    = 0ECE--0EFF
LB
 0E90= **** **** 0EB2 0AFF 1216 6E30 2E30 F201
 0E98= B201 7502 1210 662F 2E2F 420E AC03 2D03
 0EA0= AC01 2C01 8810 7504 2C05 1205 AE31 71DF
 0EA8= EDE7 7202 0ECE 0ECD 0000 0000 0000 0000
 0EB0= 0000 0000 0000 0000 0EA3 0000 0EA6 FFFF
PP
XT
 JOB X7002,5 PASEMANN            DEH DATA LINK
 C
 C           DATA LINK  DT INTERRUPT-(OUTPUT) PROGRAM
 C
         INTEGER OUT,TEMP,M,OCNT
 C
         COMMON /OUTPB/OUT(50)
 C
         EQUIVALENCE (OUT(49),OCNT),(OUT(48),M),(OUT(50),OEND)
 C
         LOGICAL OEND
 C
 C
 C       CHECK IF THIS IS LAST COMPLETION INTERRUPT
 C
         OCNT=OCNT-1
    0000     0000                    DAT    X'0000'
    0001     0AFF  08 2 FF           LDB    $+X'FFFF'
         IF (OCNT.LE.0) GOTO 1000
    0002     1200  10 2 00           LDC    $+X'0000'
    0003     6E30  68 6 30           DCR    OCNT,C
    0004     2E30  28 6 30           LDA    OCNT,C
    0005     F201  F0 2 01           ZJP    $+X'0001'
    0006     B200  B0 2 00           PJP    $+X'0000'
 C
 C       SET UP ARRAY SUBSCRIPT FOR THIS OUTPUT
 C
    0007     7502  70 5 02           JMP    *)1000 ,B
         M=M+1
         TEMP=OUT(M)
 S       LDA       TEMP
```

```
0008    1206  10 2 06          LDC   $+X'0006'
0009    662F  60 6 2F          INC   M ,C
000A    2E2F  28 6 2F          LDA   M ,C
000B    4200  40 2 00          ADD   *X'FFFF'
000C    AC03  A8 4 03          STA   #AIA,B
000D    2D03  28 5 03          LDA   *#AIA,B
000E    AC01  A8 4 01          STA   TEMP,B
000F    2C01  28 4 01          LDA   TEMP,B
0024: S       IOA       16
0010    8810  88 0 10          IOA   X'0010'
0025:         GOTO 500
0026: C       LAST EXIT
0011    7504  70 5 04          JMP   *)500,B
0027:  1000 OEND=.TRUE.
0028: C
0029: C       REGULAR END
0030: C
0005+B  FFFF
0012    2C05  28 4 05          LDA   *X'FFFF' ,B
0013    1208  10 2 08          LDC   $+X'000B'
0014    AE31  A8 6 31          STA   OEND,C
0031: S500    JMP       *223
0015    71DF  70 1 DF   )500   JMP   *X'FFDF'
0032:         END
0016    EDE7  E8 5 E7          SST   *EXIT,B

                               LPL
0017    7200  70 2 00          JMP   $+X'0000'
0018    0000                   DAT   X'0000'
0019    FFFF                   DAT   X'FFFF'
0000    0020                   ADL   X'0020'
EX, EXIT
ARR OUT    0000 IN OUTPB
VAR TEMP   0001 IN DP
VAR M    002F IN OUTPB
VAR OCNT   0030 IN OUTPB
VAR OEND   0031 IN OUTPB
VAR #AIA   0003 IN DP
PROGRAM SIZE: 0032     DATA POOL SIZE: 0006     ERROR COUNT:  0000
CJOB X7002,5 PASEMANN              DEH DATA LINK
C
C          DATA LINK TASK
C
      INTEGER  INP,OUT,ADDR,CCKS,WDNO,HALF1,HALF2,HALF3
     1, DATSY,ETXSY,STXSY,CSFSY,NAKSY,COSY,MO,OCNT
C
      LOGICAL INLOG (10),OULOG(50),ACCFL,OEND
C
      COMMON /INPB/ INP(10)
C
      COMMON /SYMB/ COSY(10)
C
      COMMON /OUTPB/ OUT(50)
C
      EQUIVALENCE (INP(1),INLOG(1)),(OUT(1),OULOG(1))
     1,(COSY(1),DATSY)
     2,(COSY(4),NAKSY),(COSY(6),ETXSY),(COSY(7),STXSY),(COSY 8),CSFSY)
     3,(INP(7),ENDFL),(INP(8),ACCFL),(INP(9),ICNT),(INP(10),.NFL)
     4 ,(OUT(48),MO),(OUT(49),OCNT),(OUT(50),OEND)
C
      DATA MASK1,MASK2 /$00FF,$FF00/
C
C     CHECK WHICH TYPE THE INPUT IS
C
 5    IF (INFL.EQ.0) GOTO 1010
      GOTO (100,500,500) ,INFL
C
C     CHECK IF OUTPUT IS STILL BUSY
C
 100  IF (OEND) GOTO 105
      CALL M:TD(3)
C
C     STOP OUTPUT AFTER TIMEDELA
C
```

```
      OCNT=0
C
C     PROCESS ADDRESS AND WORD-NO FOR 'DAT'
C
 105  HALF1=INP(3)
      HALF2=INP(4)
      HALF3=INP(5)
C
C     REDUCE NO OF OUTPUTS IF TOO HIGH
C
      IF (HALF3.GT.40) HALF3=40
C
      WDNO=HALF3/2
      ADDR=HALF1*256+HALF2
C
C     CALCULATE CHECKSUM OF ADDRESS AND WDNO
C
      CCKS=0
S     LDA       HALF3
S     EOR       HALF2
S     EOR       HALF1
S     STA       CCKS
C
      OUT(3)=HALF1
      OUT(4)=HALF2
      OUT(5)=HALF3
C
C     PUT CONTROL-WORD IN OUTPUT-BUFFER
C
      OUT(2)=STXSY-
      M=INP(5)+6
      OUT(M)=ETXSY
C
C
C     PROCESSING 'DAT' REQUEST
C
      DO 150 K=1,WDNO
      N=2*K+5
S     LDA      *ADDR
S     AND      MASK2
S     STA      HALF1
S     LDA     *ADDR
S     AND      MASK1
S     STA      HALF2
      HALF1=HALF1/256
S     LDA      CCKS
S     EOR      HALF1
S     EOR      HALF2
S     STA      CCKS
      OUT(N-1)=HALF1
      OUT(N)=HALF2
 150  ADDR=ADDR+1
C
      OUT(M+1)=CCKS
      MO=1
      OCNT=INP(5)+7
      OEND=.FALSE.
      ACCFL=.TRUE.
C
C     INITIATE 'DAT'-TRANSMISSION WITH FIRST OUTPUT
C
S     LDA       DATSY
S     IOA       16
C
      GOTO 1000
C
C     PROCESS ERROR MESSAGES
C
 500  CALL MITD(2)
      MO=1
      OCNT=1
C
      GOTO (1000,510,610) ,INFL
C
C     SEND ERROR MESSAGE
```

```
C
C
S510  LDA       NAKSY
S     IDA       16
      GOTO 1000
C
S610  LDA       CSFSY
S     IDA       16
C
C     ZERO INPUT FLAGS
C
 1000 ICNT=0
      INFL=0
C
 1010 CALL EXIT
C
      GOTO 5
C
      END
 ORIG    3D10
HD,9
 AREA USED 3D10--3D18
SD,SYMB,0EBA-0EC3
SD,INPB,0EC4-0ECD
SD,OUTPB,0ECE-0EFF
LD
 AREA USED 3D19--3DDB
LS
UN
 M:TD
MP
 G3T:     = 1DD7
 SYMB     = 0EBA--0EC3
 INPB     = 0EC4--0ECD
 OUTPB    = 0ECE--0EFF
LB
 3D10= 3D19 0000 0000 0000 0000 0000 0000 0000
 3D18= 0000 3DDC 0AFF 125B 2E09 F201 7201 7509
 3D20= EF57 0004 3025 309D 309D 800A 1252 2E31
 3D28= F201 7503 EFD8 000C 124C 3E30 1248 2E02
 3D30= AC06 2E03 AC07 2E04 AC08 4C0D F203 BA02
 3D38= 2C0D AC08 2C08 1C0E 9805 AC05 2C06 1C0F
 3D40= F205 4407 AC03 3C04 2C08 5407 5406 AC04
 3D48= 2C06 122F AE02 2C07 AE03 2C08 AE04 122A
 3D50= 2E05 1227 AE01 1223 2E04 4411 AC10 2C10
 3D58= 4222 AC12 121F 2E05 AD12 2C14 AC13 2C13
 3D60= 4005 4416 AC15 2D03 5C02 AC06 2D03 5C01
 3D68= AC07 2C06 1C17 9805 AC06 2C04 5406 5407
 3D70= AC04 2C15 AC12 4208 AC18 7206 0EC4 1006
 3D78= 0ECE 0EBA 0ECD 0ECC 2C06 AD18 2C12 42FB
 3D80= AC19 2C07 AD19 6403 6413 2C05 4C13 B2D7
 3D88= 2C10 42EF AC12 2C04 AD12 2C14 12EA AE2F
 3D90= 12E6 2E04 441A 12E5 AE30 2C1B AE31 2C1C
 3D98= 12DE AE07 12DF 2E00 8810 751D EF64 001E
 3DA0= 2C14 12D7 AE2F AE30 EFD3 0004 3DB0 3DA9
 3DA8= 3DAD 800A 12CF 2E03 8810 751D 12CB 2E07
 3DB0= 8310 12C5 3E08 3E09 EDE7 751F 0000 0000
 3DB8= 0000 0000 0000 0000 0000 00FF FF00 0000
 3DC0= 0000 0000 0000 0000 0000 3DB3 0ECD 3D20
 3DC8= 0003 0028 4001 0008 0000 0006 0000 0000
 3D0   0001 0000 0005 4008 0000 0000 0007 000F
 3DD8= FFFF 3DB0 0002 3D1A **** **** **** ****
PP
XT:
 CJOB X7002,5 PASEMANN              DEH DATA LINK
 CJOB X7002,5 PASEMANN              DEH DATA LINK
 C
 C          DATA LINK TASK
 C
        INTEGER  INP,OUT,ADDR,CCKS,WDNO,HALF1,HALF2,HALF3
       1, DATSY,ETXSY,STXSY,CSFSY,NAKSY,COSY,MO,OCNT
 C
        LOGICAL INLOG (10),OULOG(50),ACCFL,OEND
```

```
C
      COMMON /INPB/ INP(10)
C
      COMMON /SYMB/ COSY(10)
C
      COMMON /OUTPB/ OUT(50)
C
      EQUIVALENCE (INP(1),INLOG(1)),(OUT(1),OULOG(1))
     1,(COSY(1),DATSY)
     2,(COSY(4),NAKSY),(COSY(6),ETXSY),(COSY(7),STXSY),(COSY(8),CSFSY)
     3,(INP(7),ENDFL),(INP(8),ACCFL),(INP(9),ICNT),(INP(10),INFL)
     4 ,(OUT(48),MO),(OUT(49),OCNT),(OUT(50),OEND)
C
      DATA MASK1,MASK2 /$00FF,$FF00/
C
C     CHECK WHICH TYPE THE INPUT IS
C
 5    IF (INFL.EQ.0)  GOTO 1010
   0000   0000                     DAT   X'0000'
   0001   0AFF  08 2 FF            LDB   $+X'FFFF'
   0002   1200  10 2 00   )5       LDC   $+X'0000'
   0003   2E09  28 6 09            LDA   INFL,C
   0004   F201  F0 2 01            ZJP   $+X'0001'
   0005   7200  70 2 00            JMP   $+X'0000'
   0006   7509  70 5 09            JMP   *)1010 ,B
      GOTO (100,500,500) ,INFL
   0007   EF00  E8 7 00            SST   *GOT:,B
   0008   0004                     DAT   X'0004'
   0009   0000                     ADL   )100
   000A   0000                     ADL   )500
   000B   000A                     ADL   )500
C
C     CHECK IF OUTPUT IS STILL BUSY
C
   000C   800A                     ADL   INFL
 100  IF (OEND) GOTO 105
   000D   1200  10 2 00   )100     LDC   $+X'0000'
   000E   2E31  28 6 31            LDA   OEND,C
   000F   F200  F0 2 00            ZJP   $+X'0000'
   0010   750B  70 5 0B            JMP   *)105,B
      CALL M:TD(3)
C
C     STOP OUTPUT AFTER TIMEDELAY
C
      OCNT=0
C
C     PROCESS ADDRESS AND WORD-NO FOR 'DAT'
C
   0011   EDE9  E8 5 E9            SST   *M:TD,B
   000C+B 0003
   0012   000C                     ADL   =X'0003'
   0013   1206  10 2 06            LDC   $+X'0006'
   0014   3E30  38 6 30            STZ   OCNT,C
 105  HALF1=INP(3)
      HALF2=INP(4)
      HALF3=INP(5)
C
C     REDUCE NO OF OUTPUTS IF TOO HIGH
C
      IF (HALF3.GT.40) HALF3=40
   0015   1213  10 2 13            LDC   $+X'0013'
   0016   2E02  28 6 02            LDA   INP ,C
   0017   AC06  A8 4 06            STA   HALF1 ,B
   0018   2E03  28 6 03            LDA   INP ,C
   0019   AC07  A8 4 07            STA   HALF2 ,B
   001A   2E04  28 6 04            LDA   INP ,C
   001B   AC08  A8 4 08            STA   HALF3 ,B
   000D+B 0028
   001C   4C0D  48 4 0D            SUB   =X'0028' ,B
   001D   F200  F0 2 00            ZJP   $+X'0000'
   001E   BA01  B8 2 01            NJP   $+X'0001'
C
   001F   2C0D  28 4 0D            LDA   =X'0028' ,B
   0020   AC08  A8 4 08            STA   HALF3 ,B
```

```
0049:        WDNO=HALF3/2
0050:        ADDR=HALF1*256+HALF2
0051: C
0052: C      CALCULATE CHECKSUM OF ADDRESS AND WDNO
0053: C
0054:        CCKS=0
0055: S      LDA       HALF3
    0021     2C08  28 4 08              LDA   HALF3 ,B
    000E+B   4001
    0022     1C0E  18 4 0E              LDG   =X'4001' ,B
    0023     9805  98 0 05              SHF    X'0005'
    0024     AC05  A8 4 05              STA   WDNO,B
    0025     2C06  28 4 06              LDA   HALF1 ,B
    000F+B   0008
    0026     1C0F  18 4 0F              LDG   =X'0008' ,B
    0027     9805  98 0 05              SHF    X'0005'
    0028     4407  40 4 07              ADD   HALF2 ,B
    0029     AC03  A8 4 03              STA   ADDR,B
    002A     3C04  38 4 04              STZ   CCKS,B
    002B     2C08  28 4 08              LDA   HALF3 ,B
0056: S      EOR       HALF2
    002C     5407  50 4 07              EOR   HALF2 ,B
0057: S      EOR       HALF1
    002D     5406  50 4 06              EOR   HALF1 ,B
0058: S      STA       CCKS
    002E     AC04  A8 4 04              STA   CCKS,B
0059: C
0060:        OUT(3)=HALF1
0061:        OUT(4)=HALF2
0062:        OUT(5)=HALF3
0063: C
0064: C      PUT CONTROL-WORD IN OUTPUT-BUFFER
0065: C
0066:        OUT(2)=STXSY
0067:        M=INP(5)+6
0068:        OUT(M)=ETXSY
0069: C
0070: C
0071: C      PROCESSING 'DAT' REQUEST
0072: C
0073:        DO 150 K=1,WDNO
    002F     2C06  28 4 06              LDA   HALF1 ,B
    0030     121D  10 2 1D              LDC   $+X'001D'
    0031     AE02  A8 6 02              STA   OUT ,C
    0032     2C07  28 4 07              LDA   HALF2 ,B
    0033     AE03  A8 6 03              STA   OUT ,C
    0034     2C08  28 4 08              LDA   HALF3 ,B
    0035     AE04  A8 6 04              STA   OUT ,C
    0036     1200  10 2 00              LDC   $+X'0000'
    0037     2E06  28 6 06              LDA   STXSY ,C
    0038     1208  10 2 08              LDC   $+X'0008'
    0039     AE01  A8 6 01              STA   OUT ,C
    003A     1225  10 2 25              LDC   $+X'0025'
    003B     2E04  28 6 04              LDA   INP ,C
    0011+B   0006
    003C     4411  40 4 11              ADD   =X'0006' ,B
    003D     AC10  A8 4 10              STA   M ,B
    003E     2C10  28 4 10              LDA   M ,B
    003F     4200  40 2 00              ADD   =X'FFFF'
    0040     AC12  A8 4 12              STA   #AIA,B
    0041     120B  10 2 0B              LDC   $+X'000B'
    0042     2E05  28 6 05              LDA   ETXSY ,C
    0043     AD12  A8 5 12              STA   *#AIA,B
    0014+B   0001
    0044     2C14  28 4 14              LDA   =X'0001' ,B
    0045     AC13  A8 4 13              STA   K ,B
0074:        N=2*K+5
0075: S      LDA      *ADDR
    0046     2C13  28 4 13              LDA   K ,B
    0047     4005  40 0 05              ADD   X'0005'
    0016+B   0005
    0048     4416  40 4 16              ADD   =X'0005' ,B
    0049     AC15  A8 4 15              STA   N ,B
    004A     2D03  28 5 03              LDA   *ADDR,B
```

```
0076: S      AND      MASK2
   004B      5C02  58 4 02          AND    MASK2 ,B
0077: S      STA      HALF1
   004C      AC06  A8 4 06          STA    HALF1 ,B
0078: S      LDA      *ADDR
   004D      2D03  28 5 03          LDA    *ADDR,B
0079: S      AND      MASK1
   004E      5C01  58 4 01          AND    MASK1 ,B
0080: S      STA      HALF2
   004F      AC07  A8 4 07          STA    HALF2 ,B
0081:        HALF1=HALF1/256
0082: S      LDA      CCKS
   0050      2C06  28 4 06          LDA    HALF1 ,B
   0017+B    4008
   0051      1C17  18 4 17          LDG    =X'4008' ,B
   0052      9805  98 0 05          SHF    X'0005'
   0053      AC06  A8 4 06          STA    HALF1 ,B
   0054      2C04  28 4 04          LDA    CCKS,B
0083: S      EOR      HALF1
   0055      5406  50 4 06          EOR    HALF1 ,B
0084: S      EOR      HALF2
   0056      5407  50 4 07          EOR    HALF2 ,B
0085: S      STA      CCKS
   0057      AC04  A8 4 04          STA    CCKS,B
0086:        OUT(N-1)=HALF1
0087:        OUT(N)=HALF2
   0058      2C15  28 4 15          LDA    N ,B
   0059      AC12  A8 4 12          STA    #AIA,B
   005A      4200  40 2 00          ADD    =X'FFFE'
   005B      AC18  A8 4 18          STA    #AIB,B

                                    LPL
   005C      7200  70 2 00          JMP    $+X'0008'
   005D      0000                   DAT    X'0000'
   005E      0000                   DAT    X'0000'
   005F      0000                   DAT    X'0000'
   0060      0000                   DAT    X'0000'
   0061      FFFF                   DAT    X'FFFF'
   0062      FFFE                   DAT    X'FFFE'
   0063      2C06  28 4 06          LDA    HALF1 ,B
   0064      AD18  A8 5 18          STA    *#AIB,B
   0065      2C12  28 4 12          LDA    #AIA,B
   0066      42FB  40 2 FB          ADD    =X'FFFF'
   0067      AC19  A8 4 19          STA    #AIC,B
   0068      2C07  28 4 07          LDA    HALF2 ,B
   0069      AD19  A8 5 19          STA    *#AIC,B
0088:  150   ADDR=ADDR+1
0089: C
   006A      6403  60 4 03          INC    ADDR,B
   006B      6413  60 4 13          INC    K ,B
   006C      2C05  28 4 05          LDA    WDNO,B
   006D      4C13  48 4 13          SUB    K ,B
   006E      B2D7  B0 2 D7          PJP    $+X'FFD7'
0090:        OUT(M+1)=CCKS
0091:        MO=1
0092:        OCNT=INP(5)+7
0093:        OEND=.FALSE.
0094:        ACCFL=.TRUE.
0095: C
0096: C      INITIATE 'DAT'-TRANSMISSION WITH FIRST OUTPUT
0097: C
0098: S      LDA      DATSY
   006F      2C10  28 4 10          LDA    M ,B
   0070      42EF  40 2 EF          ADD    =X'0000'
   0071      AC12  A8 4 12          STA    #AIA,B
   0072      2C04  28 4 04          LDA    CCKS,B
   0073      AD12  A8 5 12          STA    *#AIA,B
   0074      2C14  28 4 14          LDA    =X'0001' ,B
   0075      12EA  10 2 EA          LDC    $+X'FFEA'
   0076      AE2F  A8 6 2F          STA    MO,C
   0077      12E6  10 2 E6          LDC    $+X'FFE6'
   0078      2E04  28 6 04          LDA    INP ,C
   001A+B    0007
   0079      441A  40 4 1A          ADD    =X'0007' ,B
```

```
    007A     12E5   10 2 E5              LDC    $+X'FFE5'
    007B     AE30   A8 6 30              STA    OCNT,C
    001B+B   0000
    007C     2C1B   28 4 1B              LDA    *X'0000' ,B
    007D     AE31   A8 6 31              STA    OEND,C
    001C+B   FFFF
    007E     2C1C   28 4 1C              LDA    *X'FFFF' ,B
    007F     12DE   10 2 DE              LDC    $+X'FFDE'
    0080     AE07   A8 6 07              STA    ACCFL ,C
    0081     12DF   10 2 DF              LDC    $+X'FFDF'
    0082     2E00   28 6 00              LDA    DATSY ,C
0099: S      IOA       16
    0083     8810   88 0 10              IOA    X'0010'
0100: C
0101:        GOTO 1000
0102: C
0103: C      PROCESS ERROR MESSAGES
0104: C
    0084     751D   70 5 1D              JMP    *)1000 ,B
0105:  500   CALL M:TD(2)
0106:        MO=1
0107:        OCNT=1
0108: C
0109:        GOTO (1000,510,610) ,INFL
    0085     EDE9   E8 5 E9              SST    *M:TD,B
    001E+B   0002
    0086     001E                        ADL    *X'0002'
    0087     2C14   28 4 14              LDA    *X'0001' ,B
    0088     12D7   10 2 D7              LDC    $+X'FFD7'
    0089     AE2F   A8 6 2F              STA    MO,C
    008A     AE30   A8 6 30              STA    OCNT,C
    008B     EFD3   E8 7 D3              SST    *GOT:,B
    008C     0004                        DAT    X'0004'
    00..     0000                        ADL    )1000
    008E     0000                        ADL    )510
    008F     0000                        ADL    )610
0110: C
0111: C      SEND ERROR MESSAGE
0112: C
0113: C
    0090     800A                        ADL    INFL
0114: S510   LDA       NAKSY
    0091     12CF   10 2 CF    )510      LDC    $+X'FFCF'
    0092     2E03   28 6 03              LDA    NAKSY ,C
0115: S      IOA       16
    0093     8810   88 0 10              IOA    X'0010'
0116:        GOTO 1000
0117: C
    0094     751D   70 5 1D              JMP    *)1000 ,B
0118: S610   LDA       CSFSY
    0095     12CB   10 2 CB    )610      LDC    $+X'FFCB'
    0096     2E07   28 6 07              LDA    CSFSY ,C
0119: S      IOA       16
    0097     8810   88 0 10              IOA    X'0010'
0120: C
0121: C      ZERO INPUT FLAGS
0122: C
0123:  1000  ICNT=0
0124:        INFL=0
0125: C
    0098     12C5   10 2 C5              LDC    $+X'FFC5'
    0099     3E08   38 6 08              STZ    ICNT,C
    009A     3E09   38 6 09              STZ    INFL,C
0126:  1010  CALL EXIT
0127: C
    009B     EDE7   E8 5 E7              SST    *EXIT,B
0128:        GOTO 5
0129: C
    009C     751F   70 5 1F              JMP    *)5,B
0130:        END
    0000     00A3                        ADL    X'00A3'
  EXT EXIT
  EXT M:TD
  ARR INP    0000 IN INPB
```

```
  ARR OUT    0000 IN OUTPB
  VAR ADDR   0003 IN DP
  VAR CCKS   0004 IN DP
  VAR WDNO   0005 IN DP
  VAR HALF1    0006 IN DP
  VAR HALF2    0007 IN DP
  VAR HALF3    0008 IN DP
  VAR DATSY    0000 IN SYMB
  VAR ETXSY    0005 IN SYMB
  VAR STXSY    0006 IN SYMB
  VAR CSFSY    0007 IN SYMB
  VAR NAKSY    0003 IN SYMB
  ARR COSY   0000 IN SYMB
  VAR MO   002F IN OUTPB
  VAR OCNT   0030 IN OUTPB
  ARR INLOG    0000 IN INPB
  ARR OULOG    0000 IN OUTPB
  VAR ACCFL    0007 IN INPB
  VAR OEND   0031 IN OUTPB
  VAR ENDFL    0006 IN INPB
  VAR ICNT   0008 IN INPB
  VAR INFL   0009 IN INPB
  VAR MASK1    0001 IN DP
  VAR MASK2    0002 IN DP
  EXT GOT:
  VAR M    0010 IN DP
  VAR #AIA   0012 IN DP
  VAR K    0013 IN DP
  VAR N    0015 IN DP
  VAR #AIB   0018 IN DP
  VAR #AIC   0019 IN DP
PROGRAM SIZE: 0163    DATA POOL SIZE: 0032    ERROR COUNT   0000
!JOB X7002,1 PASEMANN       DEH SW DATA LINK CONTROL WD TABLE
!P2KASM
         BIN
         ABS
         ORG       X'0EBA'
*
*              CONTROL WORDS FOR DATA-LINK FOR DAT AND SPT
*
         DAT       X'003A'           DAT
         DAT       X'003B'           SPT
         DAT       X'0006'           ACK
         DAT       X'0095'           NAK
         DAT       X'0005'           ENQ
         DAT       X'0003'           ETX
         DAT       X'0082'           STX
         DAT       X'0096'           CSF
         DAT       X'0097'           SAF
         DAT       X'0098'           SVF
*
         END

!EOJ
                              0001          BIN
                              0002          ABS
0EBA                          0003          ORG     X'0EBA'
                              0004   *
                              0005   *              CONTROL WORDS FOR DATA-LINK
                                                     FOR DAT AND SPT
                              0006   *
0EBA  003A   00 0 3A A        0007          DAT     X'003A'          DAT
0EBB  003B   00 0 3B A        0008          DAT     X'003B'          SPT
0EBC  0006   00 0 06 A        0009          DAT     X'0006'          ACK
0EBD  0095   00 0 95 A        0010          DAT     X'0095'          NAK
0EBE  0005   00 0 05 A        0011          DAT     X'0005'          ENQ
0EBF  0003   00 0 03 A        0012          DAT     X'0003'          ETX
0EC0  0082   00 0 82 A        0013          DAT     X'0082'          STX
0EC1  0096   00 0 96 A        0014          DAT     X'0096'          CSF
0EC2  0097   00 0 97 A        0015          DAT     X'0097'          SAF
0EC3  0098   00 0 98 A        0016          DAT     X'0098'          SVF
                              0017   *
      0000   00 0 00 A        0018          END
0000  ERRORS
```

W.E. 43,548I2 - 43,771 - 43,772 - 43,773 - 43,774 - 43,775

APPENDIX 9

Fortran Programs for the Manual Backup Function, etc. of the DEH and ATS Systems

```
C***********************************************************************************
C
C                    VALVE CONTINGENCY/MANUAL NOT TRACKING PROGRAM
C
C***********************************************************************************
C
46     VSTATCON=.FALSE.
       TVCONT=.FALSE.
       GVCONT=.FALSE.
       MANOTRAK=.FALSE.
       IF(TM) GO TO 50
       DO 48 I=1,2
C
C            CHECK THROTTLE VALVE CONTINGENCY
C
       TEMP=ITVAO-ITVSS(I)
       IF(ABS(TEMP) .LT. TVDB) GO TO 47
       VSTATCON=.TRUE.
       TVCONT=.TRUE.
C
C            CHECK GOVERNOR VALVE CONTINGENCY
C
47     TEMP=IGVAO-IGVSS(I)
       IF(ABS(TEMP) .LT. GVDB) GO TO 48
       VSTATCON=.TRUE.
       GVCONT=.TRUE.
48     CONTINUE
C
C            CHECK MANUAL TRACKING
C
       TEMP=ITVAO-ITVMAN
       IF(ABS(TEMP) .GE. TVMANDB) GO TO 49
       TEMP=IGVAO-IGVMAN
       IF(ABS(TEMP) .LT. GVMANDB) GO TO 50
49     MANOTRAK=.TRUE.
C
 C***********************************************************************************
 C
 C                    VALVE CONTINGENCY/MANUAL NOT TRACKING PROGRAM
 C
 C***********************************************************************************
 C
    0102    EFFD  E8 7 FD          SST   *M:CCO ,B
    0103    000C                   ADL    N1
    0104    0023                   ADL    IPAT
    0105    0011                   ADL    N27
    0106    0004                   ADL    MASK
 46         VSTATCON=.FALSE.
            TVCONT=.FALSE.
            GVCONT=.FALSE.
            MANOTRAK=.FALSE.
            IF(TM) GO TO 50
    0045+B  0000
    0107    2C45  28 4 45          LDA   =X'0000' ,B
    0108    1200  10 2 00          LDC    $+X'0000'
    0109    AE05  A8 6 05          STA    VSTATCON,C
    010A    AE06  A8 6 06          STA    TVCONT,C
    010B    AE07  A8 6 07          STA    GVCONT,C
    010C    AE03  A8 6 03          STA    MANOTRAK,C
    010D    12F1  10 2 F1          LDC    $+X'FFF1'
    010E    2E13  28 6 13          LDA    TM,C
    010F    F200  F0 2 00          ZJB    $+X'0000'
    0110    F848  F8 5 48          JMP   *J50',B
            DO 48 I=1,2
 C
```

```
0392: C                       MANUAL - TRACK LOAD CONTROL
0393: C
    038D     7573  70 5 73               JMP   *)70 ,B
0394: 15000 TEMP=IGVMAN-IGVAO
0395:       TEMP=TEMP/40.96
0396:       READY=.FALSE.
0397:       IF(ABS(TEMP) .LT. DBTRKL) READY=.TRUE.
    038E     1200  10 2 00               LDC    $+X'0000'
    038F     2E14  28 6 14               LDA    IGVMAN,C
    0390     4E15  48 6 15               SUB    IGVAO ,C
    0391     EDEE  E8 5 EE               SST   *C01:,B
    0392     AC30  A8 4 30               STA    TEMP,B
    0393     A42F  A0 4 2F               STE    TEMP,B
    0394     EDED  E8 5 ED               SST   *D11:,B
    0395     003B                        ADL   =X'46A3'
    0396     AC30  A8 4 30               STA    TEMP,B
    0397     A42F  A0 4 2F               STE    TEMP,B
    0398     2C45  28 4 45               LDA   =X'0000' ,B
    0399     1200  10 2 00               LDC    $+X'0000'
    039A     AE04  A8 6 04               STA    READY ,C
    039B     EF00  E8 7 00               SST   *ABS ,B
    039C     002F                        ADL    TEMP
    039D     EDEB  E8 5 EB               SST   *S11:,B
    039E     808F                        ADL    DBTRKL
    039F     B200  B0 2 00               PJP    $+X'0000'
    03A0     2C4B  28 4 4B               LDA   =X'FFFF' ,B
    03A1     1208  10 2 08               LDC    $+X'0008'
    03A2     AE04  A8 6 04               STA    READY ,C
0398:       REFDMD=REFDMD+GR9*TEMP
0399:       IF(REFDMD .GE. MWMAX) REFDMD=MWMAX
    03A3     12D4  10 2 D4               LDC    $+X'FFD4'
    03A4     2E63  28 6 63               LDA    GR9 ,C
    03A5     2662  20 6 62               LDE    GR9 ,C
    03A6     EDEC  E8 5 EC               SST   *M11:,B
    03A7     002F                        ADL    TEMP
    03A8     EDEA  E8 5 EA               SST   *A11:,B
    03A9     807D                        ADL    REFDMD
    03AA     12CA  10 2 CA               LDC    $+X'FFCA'
    03AB     AE19  A8 6 19               STA    REFDMD,C
    03AC     A618  A0 6 18               STE    REFDMD,C
    03AD     EDEB  E8 5 EB               SST   *S11:,B
    03AE     8090                        ADL    MWMAX
    03AF     BA00  B8 2 00               NJP    $+X'0000'
    03B0     12C7  10 2 C7               LDC    $+X'FFC7'
    03B1     2E83  28 6 83               LDA    MWMAX ,C
    03B2     2682  20 6 82               LDE    MWMAX ,C
    03B3     12C1  10 2 C1               LDC    $+X'FFC1'
    03B4     AE19  A8 6 19               STA    REFDMD,C
    03B5     A618  A0 6 18               STE    REFDMD,C
0400: 15500 IF(REFDMD .LT. 0.) REFDMD=0.
    03B6     12BE  10 2 BE    )15500     LDC    $+X'FFBE'
    03B7     2E19  28 6 19               LDA    REFDMD,C
    03B8     2618  20 6 18               LDE    REFDMD,C
    03B9     B200  B0 2 00               PJP    $+X'0000'
    03BA     2C27  28 4 27               LDA   =X'0000' ,B
    03BB     2426  20 4 26               LDE   =X'0000' ,B
    03BC     12B8  10 2 B8               LDC    $+X'FFB8'
    03BD     AE19  A8 6 19               STA    REFDMD,C
    03BE     A618  A0 6 18               STE    REFDMD,C
0401:       ODMD=REFDMD
0402:       TEMP=ITESTAO
0403:       IF(TEMP .GE. TESTAIMX) READY=.FALSE.
    03BF     12B5  10 2 B5               LDC    $+X'FFB5'
    03C0     2E19  28 6 19               LDA    REFDMD,C
    03C1     2618  20 6 18               LDE    REFDMD,C
    03C2     AE01  A8 6 01               STA    ODMD,C
    03C3     A600  A0 6 00               STE    ODMD,C
    03C4     1236  10 2 36               LDC    $+X'0036'
    03C5     2E26  28 6 26               LDA    ITESTAO ,C
    03C6     EDEE  E8 5 EE               SST   *C01:,B
    03C7     AC30  A8 4 30               STA    TEMP,B
    03C8     A42F  A0 4 2F               STE    TEMP,B
    03C9     EDEB  E8 5 EB               SST   *S11:,B
    03CA     8091                        ADL    TESTAIMX
```

```
    03CB     BA00  B8 2 00           NJP   $+X'0000'
    03CC     2C45  28 4 45           LDA   *X'0000' ,B
    03CD     122C  10 2 2C           LDC   $+X'002C'
    03CE     AE04  A8 6 04           STA   READY ,C
0404:        GO TO 300
0405: C
0406: C**************************************************************
0407: C
C                    VALVE STATUS DISPLAY
C
800     IF(.NOT. VTESTPB) GO TO 850
        IF(NVTEST .EQ. 0) GO TO 830
        IWINDOW=NVTEST
        I=N5
        GO TO 620
830     J=INDEX2+N4
        GO TO 860
850     J=INDEX2
860     TEMP=ITVGVSS(J)
        TEMP=TEMP/40.96
        IW(N5)=N3
C
C                    LOCATE DECIMAL POINT
C
900     IF(TEMP .GE. 0.) GO TO 910
        TEMP=-TEMP
        IW(N5)=N10
910     IF(TEMP .GE. 9999.) TEMP=9999.
        DO 930 I=N1,N4
        IF(TEMP .LT. XCHK(I)) GO TO 940
930     CONTINUE
940     INDEX3=5-I
        IWINDOW=XCHK(INDEX3+1)*TEMP*.001
950     I=N2
960     N=N4
0193: C                      VALVE STATUS DISPLAY
0194: C
     0144    7572  70 5 72           JMP   *)900,B
0195: 800    IF(.NOT. VTESTPB) GO TO 850
     0145    1200  10 2 00   )800    LDC   $+X'0000'
     0146    2E12  28 6 12           LDA   VTESTPB ,C
     0147    5452  50 4 52           EOR   *X'FFFF' ,B
     0148    F200  F0 2 00           ZJP   $+X'0000'
     0149    7575  70 5 75           JMP   *)850,B
0196:        IF(NVTEST .EQ. 0) GO TO 830
     014A    12BD  10 2 BD           LDC   $+X'FFBD'
     014B    2E03  28 6 03           LDA   NVTEST,C
     014C    F201  F0 2 01           ZJP   $+X'0001'
     014D    7200  70 2 00           JMP   $+X'0000'
     014E    7576  70 5 76           JMP   *)830,B
0197:        IWINDOW=NVTEST
0198:        I=N5
0199:        GO TO 620
     014F    12B8  10 2 B8           LDC   $+X'FFB8'
     0150    2E03  28 6 03           LDA   NVTEST,C
     0151    AE06  A8 6 06           STA   IWINDOW ,C
     0152    2C49  28 4 49           LDA   N5,B
     0153    AC5C  A8 4 5C           STA   I ,B
     0154    7562  70 5 62           JMP   *)620,B
0200: 830    J=INDEX2+N4
0201:        GO TO 860
     0155    12B2  10 2 B2           LDC   $+X'FFB2'
     0156    2E05  28 6 05           LDA   INDEX2,C
     0157    440F  40 4 0F           ADD   N4,B
     0158    AC73  A8 4 73           STA   J ,B
     0159    7577  70 5 77           JMP   *)860,B
0202: 850    J=INDEX2
     015A    12AD  10 2 AD   )850    LDC   $+X'FFAD'
     015B    2E05  28 6 05           LDA   INDEX2,C
     015C    AC73  A8 4 73           STA   J ,B
0203: 860    TEMP=ITVGVSS(J)
0204:        TEMP=TEMP/40.96
0205:        IW(N5)=N3
```

```
0031: C
0032: C                        RESTORE SPEED CHANNEL SYSTEM
0033: C
0034: S5      LDA            *8913
    0000      0000                           DAT    X'0000'
    0001      0AFF   08 2 FF                 LDB    $+X'FFFF'
    0005+B    22D1                )5
    0002      2C05   28 4 05                 LDA    *X'22D1' ,B
0035: S       IOA            32
    0003      8820   88 0 20                 IOA    X'0020'
0036: C
0037: C                        RESET ALL CCO'S AND A/O'S
0038: C
0039:         DO 20 I=1,32
    0007+B    0001
    0004      2C07   28 4 07                 LDA    *X'0001' ,B
    0005      AC06   A8 4 06                 STA    I ,B
0040:         CALL M:CCO(N1,N0,I,MASK)
    0006      EF00   E8 7 00                 SST    *M:CCO ,B
    0007      0002                           ADL    N1
    0008      0001                           ADL    N0
    0009      0006                           ADL    I
    000A      0004                           ADL    MASK
0041: 20      CONTINUE
```

We claim as our invention:

1. A digital electrohydraulic control system for a steam turbine having at least two throttle valves and a plurality of downstream governor valves, said control system comprising an automatic digital control for generating valve position signals to operate the valves and control the turbine speed and load in response to predetermined input signals, a manual backup control for generating control signals to operate the valves for speed and load control when the automatic control is nonoperational, said automatic control including means for generating a throttle valve test select signal, means for digitally generating at least one test signal for closing the governor valve or valves downstream from a throttle valve selected for test, means for generating signals to close and reopen the test throttle valve when the downstream governor valves are closed, means for enabling the governor valves to be reopened after the throttle valve test, and means for disabling said test closing signal generating means from operating if said backup control is operating the valves when a throttle valve test selection is made.

2. A turbine control system as set forth in claim 1 wherein said automatic digital control includes a digital computer to which the test select signal is applied and from which the governor valve test signal and the throttle valve close and reopen signals are generated.

3. A digital electrohydraulic control system for a steam turbine having at least two throttle valves and a plurality of downstream governor valves, said control system comprising means for digitally generating at least one test signal for closing the governor valve or valves downstream from a throttle valve selected for test, means for generating signals to close and reopen the test throttle valve when the downstream governor valves are closed, means for enabling the governor valves to be reopened after the throttle valve test and means for increasing or decreasing the test governor valve closure signal in incremental steps to enable said automatic speed and load control to open or close the nontest governor valves as the test path governor valves are closed or open and thereby control turbine speed or load during a throttle valve test.

4. A turbine control system as set forth in claim 3 wherein said automatic digital control includes a digital computer to which the test select signal is applied and from which the governor valve test signal and the throttle valve close and reopen signals are generated and from which valve position setpoint signals are generated, and an electrohydraulic position control for operating the governor and throttle valves in response to the position setpoint signals.

5. A turbine control system as set forth in claim 4 wherein said computer generates a single governor valve test signal which is applied to said electrohydraulic position control.

6. An electric power plant comprising a steam turbine and an electric generator coupled thereto, said turbine having a plurality of throttle and governor valves for controlling the flow of steam therethrough, a digital electrohydraulic control system for generating valve control signals to operate the valves and control the turbine speed and load in response to actual and demand turbine speed and load signals, a manual backup control for generating control signals to operate the valves for speed and load control when the automatic control is nonoperational, said automatic control including means for generating a throttle valve test select signal, means for digitally generating at least one test signal for closing the governor valve or valves downstream from a throttle valve selected for test, means for generating signals to close and reopen the test throttle valve when the downstream governor valves are closed, means for enabling the governor valves to be reopened after the throttle valve test, and means for disabling said test closure signal generating means from operating if said backup control is operating the valves when a throttle valve test selection is made.

7. An electric power plant as set forth in claim 6 wherein said automatic digital control includes a digital computer to which the test select signal is applied and from which the governor valve test signal and the throttle valve close and reopen signals are generated.

8. An electric power plant comprising a steam turbine and an electric generator coupled thereto, said turbine having a plurality of throttle and governor valves for controlling the flow of steam therethrough, a digital electrohydraulic control system for generating valve control signals to operate the valves and control the turbine speed and load in response to actual and demand turbine speed and load signals, a manual backup control for generating control signals to operate the valves for speed and load control when the automatic control is nonoperational, said automatic control including means for generating a throttle valve test select signal, means for digitally generating at least one test signal for closing the governor valve or valves downstream from a throttle valve selected for test, means for generating signals to close and reopen the test throttle valve when the downstream governor valves are closed, means for enabling the governor valves to be reopened after the throttle valve test, said automatic control further including means for increasing or decreasing the test governor valve closure signal in incremental steps to enable said automatic speed and load control to open or close the nontest governor valves as the test path governor valves are closed or opened and thereby control turbine speed or load during a throttle valve test.

9. An automatic digital electrohydraulic control system for a steam turbine having a plurality of throttle and governor valves, said control system comprising means for generating respective signals representataive of the turbine speed and load, an electrohydraulic control for positioning the throttle and governor valves in response to valve position signals, and means for digitally generating valve position signals in response to a turbine speed or load demand and the turbine speed and load signals, said digital generating means including a speed/load control for generating a speed or load reference to satisfy the demand, a throttle valve control and a governor valve control for generating the valve position signals during speed and load control, and means for logically determining in response to predetermined inputs whether the reference is to be coupled to said throttle valve control or said governor valve control during speed and load control, said governor valve control further including means for storing representations of at least six points on a valve position versus load characterization, means for generating a position representation interpolated from the stored characterization points in correspondence to the generated reference, and means for generating the governor valve position signals in correspondence to the position representations.

10. A control system as set forth in claim 9 wherein said digital generating means includes a digital computer which generates the valve position signals.

11. A control system as set forth in claim 10 wherein there is provided in said computer a speed/load control including means for generating GO and HOLD logicals in response to predetermined inputs, means for comparing the demand with the reference and for comparing the resultant difference with a predetermined incremental reference change value, means for changing the reference by the incremental amount if the GO logical is true and if the difference exceeds the incremental amount and for setting the reference equal to the demand if the incremental amount exceeds the difference.

12. An electric power plant comprising a steam turbine and an electric generator coupled thereto, said turbine having a plurality of throttle and governor valves for controlling the flow of steam therethrough, and an automatic digital electrohydraulic control system having means for generating respective signals representative of the turbine speed and load, an electrohydraulic control for positioning the throttle and governor valves in response to valve position signals, and means for digitally generating valve position signals in response to a turbine speed or load demand and the turbine speed and load signals, said digital generating means including a speed/load control for generating a speed or load reference to satisfy the demand, a throttle valve control and a governor valve control for generating the valve position signals during speed and load control, and means for logically determining in response to predetermined inputs whether the reference is to be coupled to said throttle valve control or said governor valve control during speed and load control, said governor valve control further including means for storing representations of at least six points on a value position versus load characterization, means for generating a position representation interpolated from the stored characterization points in correspondence to the generated reference and means for generating the governor valve position signals in correspondence to the position representations.

13. An electric power plant as set forth in claim 12 wherein said digital generating means includes a digital computer which generates the valve position signals.

14. A digital electrohydraulic control system for a steam turbine having at least two throttle valves and a plurality of downstream governor valves, said control system comprising means for generating respective signals representative of the turbine speed and load, an electrohydraulic control for positioning the throttle and governor valves in response to valve position signals, an automatic digital control for generating valve position signals to operate the valves and control the turbine speed and load in response to predetermined input signals, a manual backup control for generating control signals to operate the valves for speed and load control when the automatic control is nonoperational, said automatic control including means for digitally generating valve position signals in response to a turbine speed or load demand and the turbine speed and load signals, said digital generating means including a speed/load control for generating a speed or load reference to satisfy the demand, a throttle valve control and a governor valve control for generating the valve position signals during speed and load control, and means for logically determining in response to predetermined inputs whether the reference is to be coupled to said throttle valve control or said governor valve control during speed and load control, means for sensing when predetermined task errors are made by said digital generating means, and means for uncoupling said automatic control and for coupling the manual backup control to the valves when preselected ones of the task errors occur.

15. An electric power plant comprising a steam turbine and an electric generator coupled thereto, said turbine having a plurality of throttle and governor valves for controlling the flow of steam therethrough, and an electrohydraulic control system having means for generating respective signals representative of the turbine speed and load, an electrohydraulic control for positioning the throttle and governor valves in response to valve position signals, an automatic digital control for generating valve position signals to operate the valves and control the turbine speed and load in response to predetermined input signals, a manual backup control for generating control signals to operate the valves for speed and load control when the automatic control is nonoperational said automatic control including means for digitally generating valve position signals in response to a turbine speed or load demand and the turbine speed and load signals, said digital generating means including a speed/load control for generating a speed or load reference to satisfy the demand a throttle valve control and a governor valve control for generating the valve position signals during speed and load control, and means for logically determining in response to predetermined inputs whether the reference is to be coupled to said throttle valve control or said governor valve control during speed and load control means for sensing when predetermined task errors are made by said digital generating means, and means for uncoupling said automatic control and for coupling the manual backup control to the valves when preselected ones of the task errors occur.

* * * * *